US012737107B2

(12) United States Patent
Moussette et al.

(10) Patent No.: US 12,737,107 B2
(45) Date of Patent: Sep. 15, 2026

(54) USER INTERFACES RESPONSIVE TO AN INPUT DIRECTED TO AN INPUT DEVICE

(71) Applicant: Apple Inc., Cupertino, CA (US)

(72) Inventors: Camille Moussette, San Francisco, CA (US); Jean-Pierre M. Mouilleseaux, San Carlos, CA (US); Madeleine S. Cordier, San Francisco, CA (US); Max L. McCarthy, San Francisco, CA (US); Peter C. Tsoi, San Mateo, CA (US); Guillaume R. Ardaud, San Francisco, CA (US); Sean Z. Amadio, San Francisco, CA (US); Marcos Alonso, Oakland, CA (US); Chanaka G. Karunamuni, San Jose, CA (US); Michael S. Soetaert, San Jose, CA (US); Johnnie B. Manzari, San Francisco, CA (US); Megan M. Sapp, Napa, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/892,230

(22) Filed: Sep. 20, 2024

(65) Prior Publication Data

US 2025/0238129 A1 Jul. 24, 2025

Related U.S. Application Data

(60) Provisional application No. 63/692,133, filed on Sep. 8, 2024, provisional application No. 63/657,709, filed (Continued)

(51) Int. Cl.

| | |
|---|---|
| ***G06F 3/0487*** | (2013.01) |
| ***G06F 1/16*** | (2006.01) |

(Continued)

(52) U.S. Cl.

CPC .......... *G06F 3/0487* (2013.01); *G06F 1/1671* (2013.01); *G06F 3/02* (2013.01);

(Continued)

(58) Field of Classification Search

CPC ........ G06F 3/0487; G06F 1/1671; G06F 3/02; G06F 3/0481; G06F 3/0482;

(Continued)

(56) References Cited

U.S. PATENT DOCUMENTS

| | | | |
|---|---|---|---|
| 3,148,500 | A | 9/1964 | Thomas |
| 4,174,606 | A | 11/1979 | Masuda et al. |

(Continued)

FOREIGN PATENT DOCUMENTS

| | | | |
|---|---|---|---|
| AU | 2010249319 | A1 | 6/2012 |
| AU | 2015101019 | A4 | 9/2015 |

(Continued)

OTHER PUBLICATIONS

Applicant-Initiated Interview Summary received for U.S. Appl. No. 18/896,881, mailed on Mar. 19, 2026, 3 pages.

(Continued)

*Primary Examiner* — David D Davis
(74) *Attorney, Agent, or Firm* — YHE Law LLP

(57) ABSTRACT

User interfaces integrating variable hardware inputs are described, including user interfaces that perform different operations in response to presses of different intensities with and without movement, user interfaces that perform different media capture operations based on presses of different lengths with and without movement, user interfaces with controls that can be customized by swiping near a hardware control, user interfaces for media playback with dynamic speed adjustments, and user interfaces that perform adjustments before and after contact with a hardware control ends.

66 Claims, 133 Drawing Sheets

Related U.S. Application Data on Jun. 7, 2024, provisional application No. 63/566,165, filed on Mar. 15, 2024, provisional application No. 63/623,205, filed on Jan. 19, 2024, provisional application No. 63/622,536, filed on Jan. 18, 2024.

(51) Int. Cl.

| | |
|---|---|
| ***G06F 3/02*** | (2006.01) |
| ***G06F 3/0481*** | (2022.01) |
| ***G06F 3/0482*** | (2013.01) |
| ***G06F 3/04845*** | (2022.01) |
| ***G06F 3/0488*** | (2022.01) |
| ***G06F 3/16*** | (2006.01) |
| ***H04N 23/61*** | (2023.01) |
| ***H04N 23/62*** | (2023.01) |
| ***H04N 23/63*** | (2023.01) |

(52) U.S. Cl.

CPC .......... *G06F 3/0481* (2013.01); *G06F 3/0482* (2013.01); *G06F 3/04845* (2013.01); *G06F 3/0488* (2013.01); *G06F 3/165* (2013.01); *H04N 23/61* (2023.01); *H04N 23/62* (2023.01); *H04N 23/631* (2023.01)

(58) Field of Classification Search

CPC .... G06F 3/04845; G06F 3/0488; G06F 3/165; G06F 2203/0339; G06F 2203/04806; G06F 1/1686; G06F 3/04847; G06F 3/04883; G06F 3/0489; H04N 23/61; H04N 23/62; H04N 23/631; H04N 23/60; G11B 27/00

See application file for complete search history.

(56) References Cited

U.S. PATENT DOCUMENTS

| | | | |
|---|---|---|---|
| 4,518,237 | A | 5/1985 | Mizokami |
| 4,933,702 | A | 6/1990 | Komatsuzaki et al. |
| 5,208,790 | A | 5/1993 | Sato et al. |
| 5,220,541 | A | 6/1993 | Vuilleumier |
| 5,455,808 | A | 10/1995 | Grupp et al. |
| 5,463,443 | A | 10/1995 | Tanaka et al. |
| 5,487,054 | A | 1/1996 | Capps et al. |
| 5,508,979 | A | 4/1996 | Eisenegger |
| 5,557,358 | A | 9/1996 | Mukai et al. |
| 5,615,384 | A | 3/1997 | Allard et al. |
| 5,659,693 | A | 8/1997 | Hansen et al. |
| 5,825,353 | A | 10/1998 | Will |
| 5,845,257 | A | 12/1998 | Fu et al. |
| 5,870,683 | A | 2/1999 | Wells et al. |
| 5,892,519 | A | 4/1999 | Hirai |
| 5,974,235 | A | 10/1999 | Nunally et al. |
| 5,986,655 | A | 11/1999 | Chiu et al. |
| 5,999,195 | A | 12/1999 | Santangeli |
| 6,043,818 | A | 3/2000 | Nakano et al. |
| 6,097,371 | A | 8/2000 | Siddiqui et al. |
| 6,199,012 | B1 | 3/2001 | Hasegawa |
| 6,262,769 | B1 | 7/2001 | Anderson et al. |
| 6,268,864 | B1 | 7/2001 | Chen et al. |
| 6,278,466 | B1 | 8/2001 | Chen |
| 6,359,837 | B1 | 3/2002 | Tsukamoto |
| 6,359,839 | B1 | 3/2002 | Schenk et al. |
| 6,416,471 | B1 | 7/2002 | Kumar et al. |
| 6,429,896 | B1 | 8/2002 | Aruga et al. |
| 6,449,219 | B1 | 9/2002 | Hepp et al. |
| 6,477,117 | B1 | 11/2002 | Narayanaswami et al. |
| 6,483,986 | B1 | 11/2002 | Krapf |
| 6,496,780 | B1 | 12/2002 | Harris et al. |
| 6,522,347 | B1 | 2/2003 | Sakai et al. |
| 6,556,222 | B1 | 4/2003 | Narayanaswami |
| 6,677,981 | B1 | 1/2004 | Mancuso et al. |
| 6,728,533 | B2 | 4/2004 | Ishii et al. |
| 6,809,724 | B1 | 10/2004 | Shiraishi et al. |
| 6,809,759 | B1 | 10/2004 | Chiang |
| 6,819,867 | B2 | 11/2004 | Mayer et al. |
| 6,871,076 | B2 | 3/2005 | Samn et al. |
| 6,900,840 | B1 | 5/2005 | Schinner et al. |
| 6,931,594 | B1 | 8/2005 | Jun |
| 7,036,090 | B1 | 4/2006 | Nguyen |
| 7,043,477 | B2 | 5/2006 | Mercer et al. |
| 7,203,380 | B2 | 4/2007 | Chiu et al. |
| 7,257,254 | B2 | 8/2007 | Tunney et al. |
| 7,293,280 | B1 | 11/2007 | Gupta et al. |
| 7,360,152 | B2 | 4/2008 | Capps et al. |
| 7,401,351 | B2 | 7/2008 | Boreczky et al. |
| 7,417,680 | B2 | 8/2008 | Aoki et al. |
| 7,463,304 | B2 | 12/2008 | Murray |
| 7,515,178 | B1 | 4/2009 | Fleischman et al. |
| 7,515,509 | B2 | 4/2009 | Klein et al. |
| 7,542,971 | B2 | 6/2009 | Thione et al. |
| 7,575,171 | B2 | 8/2009 | Lev |
| 7,583,892 | B2 | 9/2009 | Okumura |
| 7,593,749 | B2 | 9/2009 | Vallström et al. |
| 7,593,755 | B2 | 9/2009 | Colando et al. |
| 7,637,204 | B2 | 12/2009 | Sumser et al. |
| 7,751,285 | B1 | 7/2010 | Cain et al. |
| 7,843,769 | B2 | 11/2010 | Ishida et al. |
| 7,859,571 | B1 | 12/2010 | Brown et al. |
| 7,898,542 | B1 | 3/2011 | Yu et al. |
| 7,904,814 | B2 | 3/2011 | Errico et al. |
| 7,908,564 | B2 | 3/2011 | Hara et al. |
| 8,031,230 | B2 | 10/2011 | Takada |
| 8,073,207 | B2 | 12/2011 | Ayaki et al. |
| 8,105,208 | B2 | 1/2012 | Oleson et al. |
| 8,185,839 | B2 | 5/2012 | Jalon et al. |
| 8,189,087 | B2 | 5/2012 | Misawa et al. |
| D661,612 | S | 6/2012 | Hsu et al. |
| 8,253,704 | B2 | 8/2012 | Jang |
| 8,286,102 | B1 | 10/2012 | Wilensky |
| 8,364,855 | B2 | 1/2013 | James et al. |
| 8,375,326 | B2 | 2/2013 | Bucher et al. |
| 8,391,697 | B2 | 3/2013 | Cho et al. |
| 8,405,663 | B2 | 3/2013 | Wikkerink et al. |
| 8,493,408 | B2 | 7/2013 | Williamson et al. |
| 8,516,374 | B2 | 8/2013 | Fleischman et al. |
| 8,576,304 | B2 | 11/2013 | Ishibashi |
| 8,584,031 | B2 | 11/2013 | Moore et al. |
| 8,595,649 | B2 | 11/2013 | Sherrard et al. |
| 8,613,070 | B1 | 12/2013 | Borzycki et al. |
| 8,624,836 | B1 | 1/2014 | Miller et al. |
| 8,638,371 | B2 | 1/2014 | Laberge et al. |
| 8,659,555 | B2 | 2/2014 | Pihlaja |
| 8,675,084 | B2 | 3/2014 | Bolton et al. |
| 8,686,961 | B2 | 4/2014 | Yamano |
| 8,723,988 | B2 | 5/2014 | Thorn |
| 8,732,609 | B1 | 5/2014 | Bayersdorfer et al. |
| 8,736,704 | B2 | 5/2014 | Jasinski et al. |
| 8,736,716 | B2 | 5/2014 | Prentice |
| 8,742,890 | B2 | 6/2014 | Gocho et al. |
| 8,745,500 | B1 | 6/2014 | Kostello et al. |
| 8,762,844 | B2 | 6/2014 | Kim et al. |
| 8,762,895 | B2 | 6/2014 | Mehta et al. |
| 8,811,951 | B1 | 8/2014 | Faaborg et al. |
| 8,825,445 | B2 | 9/2014 | Hoffman et al. |
| 8,848,097 | B2 | 9/2014 | Makii |
| 8,866,761 | B2 | 10/2014 | Enami |
| 8,868,338 | B1 | 10/2014 | Chau et al. |
| 8,884,874 | B1 | 11/2014 | Kim et al. |
| 8,885,978 | B2 | 11/2014 | Cote et al. |
| 8,903,671 | B2 | 12/2014 | Park et al. |
| 8,941,749 | B2 | 1/2015 | Yahata |
| 8,954,889 | B2 | 2/2015 | Fujibayashi |
| 8,963,894 | B2 | 2/2015 | Klassen et al. |
| 8,990,861 | B2 | 3/2015 | Nishikawa et al. |
| 8,996,639 | B1 | 3/2015 | Faaborg et al. |
| 9,001,226 | B1 | 4/2015 | Ng et al. |
| 9,021,526 | B1 | 4/2015 | Baron et al. |
| 9,024,938 | B2 | 5/2015 | Joshi |
| 9,070,092 | B2 | 6/2015 | Shieh et al. |
| 9,075,520 | B2 | 7/2015 | Park et al. |
| 9,077,896 | B2 | 7/2015 | Park et al. |
| 9,082,018 | B1 | 7/2015 | Laska et al. |

(56) References Cited

U.S. PATENT DOCUMENTS 9,100,944 B2 8/2015 Sauhta et al.
9,141,270 B1 9/2015 Stuart et al.
9,143,692 B2 9/2015 Hayashi
9,158,974 B1 10/2015 Laska et al.
9,164,663 B1 10/2015 Berard
9,170,707 B1 10/2015 Laska et al.
9,172,866 B2 10/2015 Ito et al.
9,173,052 B2 10/2015 Hauser et al.
9,191,988 B2 11/2015 Newham
9,223,486 B2 12/2015 Shin et al.
9,230,306 B2 1/2016 Sun et al.
9,244,562 B1 1/2016 Rosenberg et al.
9,250,797 B2 2/2016 Roberts et al.
9,264,660 B1 2/2016 Petterson et al.
9,288,476 B2 3/2016 Sandrew et al.
9,313,397 B2 4/2016 Harris et al.
9,313,401 B2 4/2016 Frey et al.
9,313,556 B1 4/2016 Borel et al.
9,332,182 B2 5/2016 Nonaka et al.
9,342,230 B2 5/2016 Bastien et al.
9,350,924 B2 5/2016 Posa
9,360,671 B1 6/2016 Zhou
9,361,011 B1 6/2016 Burns et al.
9,361,521 B1 6/2016 McLean et al.
9,400,489 B2 7/2016 Kim
9,423,868 B2 8/2016 Iwasaki
9,451,144 B2 9/2016 Dye
9,459,781 B2 10/2016 Kocienda et al.
9,467,812 B2 10/2016 Jung et al.
9,477,208 B2 10/2016 Park et al.
9,489,074 B2 11/2016 Oonishi
9,507,420 B2 11/2016 Tartz et al.
9,538,069 B2 1/2017 Nagao
9,541,407 B1 1/2017 Mohler
9,544,563 B1 1/2017 Cheng et al.
9,547,425 B2 1/2017 Kocienda et al.
9,582,165 B2 2/2017 Wilson et al.
9,600,153 B2 3/2017 Roh
9,600,178 B2 3/2017 Yun et al.
9,609,221 B2 3/2017 Kim et al.
9,667,881 B2 5/2017 Harris et al.
9,716,825 B1 7/2017 Manzari et al.
9,728,230 B2 8/2017 Cudak et al.
9,729,730 B2 8/2017 Levesque et al.
9,767,613 B1 9/2017 Bedikian et al.
9,774,917 B1 9/2017 Christie et al.
9,800,525 B1 10/2017 Lerner et al.
9,874,933 B1 1/2018 Carryer
9,900,515 B2 2/2018 Kim et al.
9,942,463 B2 4/2018 Kuo et al.
9,973,674 B2 5/2018 Dye et al.
9,996,976 B2 6/2018 Zhou et al.
10,015,298 B2 7/2018 Yang et al.
10,021,294 B2 7/2018 Kwon et al.
10,027,775 B1 7/2018 Mierau et al.
10,055,121 B2 8/2018 Chaudhri et al.
10,055,887 B1 8/2018 Gil et al.
10,068,364 B2 9/2018 Cui
10,120,536 B2 11/2018 Cha et al.
10,127,639 B2 11/2018 Miura et al.
10,135,905 B2 11/2018 Chaudhri et al.
10,152,222 B2 12/2018 Ozawa et al.
10,176,622 B1 1/2019 Waggoner et al.
10,187,587 B2 1/2019 Hasinoff et al.
10,216,392 B2 2/2019 Zhao
10,219,026 B2 2/2019 Eim et al.
10,225,463 B2 3/2019 Yun et al.
10,230,901 B2 3/2019 Harris et al.
10,270,983 B1 4/2019 Van Os et al.
10,282,068 B2 5/2019 Dubin et al.
10,282,078 B2 5/2019 Choi
10,297,034 B2 5/2019 Nash et al.
10,298,643 B1 5/2019 Toal et al.
10,304,231 B2 5/2019 Saito
10,313,652 B1 6/2019 Falstrup et al.
10,325,417 B1 6/2019 Scapel et al.
10,326,942 B2 6/2019 Shabtay et al.
10,345,592 B2 7/2019 Samec et al.
10,397,469 B1 8/2019 Yan et al.
10,397,500 B1 8/2019 Xu et al.
10,444,975 B2 10/2019 Murphy et al.
10,447,908 B2 10/2019 Lee et al.
10,466,881 B2 11/2019 Sasaki et al.
10,467,729 B1 11/2019 Perera et al.
10,467,775 B1 11/2019 Waggoner et al.
10,474,194 B1 11/2019 Ell et al.
10,474,349 B2 11/2019 Jang et al.
10,488,218 B2 11/2019 Kim et al.
10,503,820 B2 12/2019 Duggan et al.
10,523,879 B2 12/2019 Dye et al.
10,534,475 B2 1/2020 Yoo et al.
10,572,215 B1 2/2020 Cooper et al.
10,574,895 B2 2/2020 Lee et al.
10,585,551 B2 3/2020 Lee et al.
10,614,139 B2 4/2020 Fujioka et al.
10,645,294 B1 5/2020 Manzari et al.
10,652,470 B1 5/2020 Manzari et al.
10,656,823 B2 5/2020 Mukherjee et al.
10,671,834 B2 6/2020 Adato et al.
10,674,072 B1 * 6/2020 Manzari ................ H04N 23/74
10,681,282 B1 6/2020 Manzari et al.
10,681,341 B2 6/2020 Lutter et al.
10,735,642 B1 8/2020 Manzari et al.
10,735,643 B1 8/2020 Manzari et al.
10,748,345 B2 8/2020 Zhou
10,762,716 B1 9/2020 Paul et al.
10,791,273 B1 9/2020 Manzari et al.
10,882,613 B2 1/2021 Sharma et al.
10,891,800 B1 1/2021 Stoyles et al.
10,902,277 B2 1/2021 Agarwal et al.
10,929,443 B2 2/2021 Grochocki et al.
10,943,382 B2 3/2021 Shapiro et al.
10,955,956 B2 * 3/2021 Gleeson ................ G06F 3/0414
10,958,850 B2 3/2021 Kwak et al.
10,962,935 B1 3/2021 Ely et al.
11,032,535 B2 6/2021 Lutter et al.
11,032,536 B2 6/2021 Lutter et al.
11,039,074 B1 6/2021 Manzari et al.
11,054,973 B1 7/2021 Manzari et al.
11,070,717 B2 7/2021 Cragg et al.
11,099,650 B1 8/2021 Haynold
11,107,219 B2 8/2021 Cohen et al.
11,112,963 B2 9/2021 Chaudhri et al.
11,140,313 B1 10/2021 Knott
11,209,957 B2 12/2021 Dryer et al.
11,212,449 B1 12/2021 Manzari et al.
11,223,728 B2 1/2022 Kim et al.
11,227,494 B1 1/2022 Stoyles et al.
11,231,832 B2 1/2022 Yang et al.
11,321,857 B2 5/2022 Stauber et al.
11,350,026 B1 5/2022 Manzari et al.
11,399,155 B2 7/2022 Van Os et al.
11,431,891 B2 8/2022 O'Leary et al.
11,468,625 B2 10/2022 Manzari et al.
11,490,017 B2 11/2022 Bernstein et al.
11,550,420 B2 1/2023 Bovet et al.
11,570,359 B2 1/2023 Lee et al.
11,606,496 B2 3/2023 Watanabe et al.
11,670,023 B2 6/2023 Xu et al.
11,747,969 B1 9/2023 Karunamuni
11,811,961 B2 11/2023 Zhang et al.
11,877,064 B1 1/2024 Douglas et al.
12,001,642 B2 6/2024 Paul et al.
2002/0012526 A1 1/2002 Sai et al.
2002/0038384 A1 3/2002 Khan et al.
2002/0054066 A1 5/2002 Kikinis et al.
2002/0054541 A1 5/2002 Hall et al.
2002/0063737 A1 5/2002 Feig et al.
2002/0081976 A1 6/2002 Fujisawa et al.
2002/0098857 A1 7/2002 Ishii
2002/0115478 A1 8/2002 Fujisawa et al.
2002/0131331 A1 9/2002 Molander et al.
2002/0140633 A1 10/2002 Rafii et al.
2002/0140803 A1 10/2002 Gutta et al.

(56) References Cited

U.S. PATENT DOCUMENTS

2002/0154888 A1 10/2002 Allen et al.
2002/0167604 A1 11/2002 Ban et al.
2002/0171737 A1 11/2002 Tullis et al.
2002/0180774 A1 12/2002 Errico et al.
2002/0180797 A1 12/2002 Bachmann
2003/0025802 A1 2/2003 Mayer, Jr. et al.
2003/0027621 A1 2/2003 Libby et al.
2003/0063130 A1 4/2003 Barbieri
2003/0067497 A1 4/2003 Pichon et al.
2003/0074647 A1 4/2003 Andrew et al.
2003/0079057 A1 4/2003 Ruskin et al.
2003/0081506 A1 5/2003 Karhu et al.
2003/0093790 A1 5/2003 Logan et al.
2003/0107664 A1 6/2003 Suzuki
2003/0110511 A1 6/2003 Schutte et al.
2003/0122930 A1 7/2003 Schofield et al.
2003/0160756 A1 8/2003 Numano
2003/0164847 A1 9/2003 Zaima et al.
2003/0174216 A1 9/2003 Iguchi et al.
2003/0182628 A1 9/2003 Lira
2003/0184587 A1 10/2003 Ording et al.
2003/0214885 A1 11/2003 Powell et al.
2004/0001105 A1 1/2004 Chew et al.
2004/0017733 A1 1/2004 Sullivan
2004/0021699 A1 2/2004 Fildebrandt et al.
2004/0027396 A1 2/2004 Lection
2004/0041924 A1 3/2004 White et al.
2004/0047244 A1 3/2004 Iino et al.
2004/0061796 A1 4/2004 Honda et al.
2004/0077462 A1 4/2004 Brown et al.
2004/0090469 A1 5/2004 Moon et al.
2004/0090546 A1 5/2004 Doron
2004/0095377 A1 5/2004 Salandro
2004/0131254 A1 7/2004 Liang et al.
2004/0189861 A1 9/2004 Tom et al.
2004/0192332 A1 9/2004 Samn
2004/0201699 A1 10/2004 Parulski et al.
2004/0201720 A1 10/2004 Robins et al.
2004/0218472 A1 11/2004 Narayanaswami et al.
2005/0015803 A1 1/2005 Macrae et al.
2005/0027515 A1 2/2005 Huang et al.
2005/0041667 A1 2/2005 Miller et al.
2005/0125744 A1 6/2005 Hubbard et al.
2005/0134695 A1 6/2005 Deshpande et al.
2005/0163345 A1 7/2005 Van Os et al.
2005/0168566 A1 8/2005 Tada et al.
2005/0171926 A1 8/2005 Thione et al.
2005/0188856 A1 9/2005 Sumser et al.
2005/0189419 A1 9/2005 Igarashi et al.
2005/0197063 A1 9/2005 White et al.
2005/0200611 A1 9/2005 Goto et al.
2005/0206981 A1 9/2005 Hung
2005/0210403 A1 9/2005 Satanek
2005/0237383 A1 10/2005 Soga et al.
2005/0248660 A1 11/2005 Stavely et al.
2005/0270397 A1 12/2005 Battles
2005/0278757 A1 12/2005 Grossman et al.
2006/0013554 A1 1/2006 Poslinski et al.
2006/0019649 A1 1/2006 Feinleib et al.
2006/0033831 A1 2/2006 Ejima et al.
2006/0034586 A1 2/2006 Millar et al.
2006/0035632 A1 2/2006 Sorvari et al.
2006/0055700 A1 3/2006 Niles et al.
2006/0069604 A1 3/2006 Leukart et al.
2006/0085765 A1 4/2006 Peterson et al.
2006/0092770 A1 5/2006 Demas
2006/0098634 A1 5/2006 Umemoto et al.
2006/0132456 A1 6/2006 Anson
2006/0132482 A1 6/2006 Oh et al.
2006/0158730 A1 7/2006 Kira
2006/0160090 A1 7/2006 Macina et al.
2006/0171453 A1 8/2006 Rohlfing et al.
2006/0187322 A1 8/2006 Janson et al.
2006/0197753 A1 9/2006 Hotelling
2006/0209067 A1 9/2006 Pellacini et al.
2006/0210092 A1 9/2006 Navid
2006/0214935 A1 9/2006 Boyd et al.
2006/0221184 A1 10/2006 Vallone et al.
2006/0279628 A1 12/2006 Fleming
2007/0006096 A1 1/2007 Kim et al.
2007/0025711 A1 2/2007 Marcus et al.
2007/0025723 A1 2/2007 Baudisch et al.
2007/0030256 A1 2/2007 Akaike et al.
2007/0031062 A1 2/2007 Pal et al.
2007/0033632 A1 2/2007 Baynger et al.
2007/0040810 A1 2/2007 Dowe et al.
2007/0065044 A1 3/2007 Park et al.
2007/0074133 A1 3/2007 Hara et al.
2007/0082707 A1 4/2007 Flynt et al.
2007/0094330 A1 4/2007 Russell et al.
2007/0097088 A1 5/2007 Battles
2007/0097113 A1 5/2007 Lee et al.
2007/0109417 A1 5/2007 Hyttfors et al.
2007/0140675 A1 6/2007 Yanagi et al.
2007/0150842 A1 6/2007 Chaudhri et al.
2007/0152979 A1 7/2007 Jobs et al.
2007/0153112 A1 7/2007 Ueda et al.
2007/0157103 A1 7/2007 Arneson et al.
2007/0162872 A1 7/2007 Hong et al.
2007/0165103 A1 7/2007 Arima et al.
2007/0174774 A1 7/2007 Lerman et al.
2007/0175998 A1 8/2007 Lev
2007/0198111 A1 8/2007 Oetzel et al.
2007/0213955 A1 9/2007 Ishida et al.
2007/0228259 A1 10/2007 Hohenberger
2007/0239754 A1 10/2007 Schnitman et al.
2007/0254640 A1 11/2007 Bliss
2007/0273769 A1 11/2007 Takahashi
2007/0279190 A1 12/2007 Lugt et al.
2007/0291152 A1 12/2007 Suekane et al.
2008/0024459 A1 1/2008 Poupyrev et al.
2008/0030592 A1 2/2008 Border et al.
2008/0033779 A1 2/2008 Coffman et al.
2008/0034306 A1 2/2008 Ording et al.
2008/0046839 A1 2/2008 Mehra et al.
2008/0052643 A1 2/2008 Ike et al.
2008/0055263 A1 3/2008 Lemay et al.
2008/0057926 A1 3/2008 Forstall et al.
2008/0062141 A1 3/2008 Chaudhri
2008/0076637 A1 3/2008 Gilley et al.
2008/0082934 A1 4/2008 Kocienda et al.
2008/0084484 A1 4/2008 Ochi et al.
2008/0098313 A1 4/2008 Pollack
2008/0100693 A1 5/2008 Jobs et al.
2008/0106601 A1 5/2008 Matsuda
2008/0122796 A1 5/2008 Jobs et al.
2008/0127268 A1 5/2008 Bergeron et al.
2008/0129759 A1 6/2008 Jeon et al.
2008/0129825 A1 6/2008 Deangelis et al.
2008/0131019 A1 6/2008 Ng
2008/0143840 A1 6/2008 Corkum et al.
2008/0155428 A1 6/2008 Lee
2008/0168396 A1 7/2008 Matas et al.
2008/0168404 A1 7/2008 Ording
2008/0172634 A1 7/2008 Choi et al.
2008/0186808 A1 8/2008 Lee
2008/0192020 A1 8/2008 Kang et al.
2008/0192021 A1 8/2008 Lim et al.
2008/0218611 A1 9/2008 Parulski et al.
2008/0222558 A1 9/2008 Cho et al.
2008/0246778 A1 10/2008 Ham et al.
2008/0253656 A1 10/2008 Schwartzberg et al.
2008/0259154 A1 10/2008 Garrison et al.
2008/0284855 A1 11/2008 Umeyama et al.
2008/0305742 A1 12/2008 Basir
2008/0309811 A1 12/2008 Fujinawa et al.
2009/0009612 A1 1/2009 Tico et al.
2009/0011821 A1 1/2009 Griswold et al.
2009/0021576 A1 1/2009 Linder et al.
2009/0021600 A1 1/2009 Watanabe
2009/0022422 A1 1/2009 Sorek et al.
2009/0027515 A1 1/2009 Maruyama et al.
2009/0027539 A1 1/2009 Kunou
2009/0040332 A1 2/2009 Yoshino et al.

(56) References Cited

U.S. PATENT DOCUMENTS

| | | | |
|---|---|---|---|
| 2009/0046097 | A1 | 2/2009 | Franklin |
| 2009/0051649 | A1 | 2/2009 | Rondel |
| 2009/0051783 | A1 | 2/2009 | Kim et al. |
| 2009/0100342 | A1 | 4/2009 | Jakobson et al. |
| 2009/0102918 | A1 | 4/2009 | Sakamoto et al. |
| 2009/0102933 | A1 | 4/2009 | Harris et al. |
| 2009/0109316 | A1 | 4/2009 | Matsui |
| 2009/0141046 | A1 | 6/2009 | Rathnam et al. |
| 2009/0144639 | A1 | 6/2009 | Nims et al. |
| 2009/0164923 | A1 | 6/2009 | Ovi et al. |
| 2009/0167671 | A1 | 7/2009 | Kerofsky |
| 2009/0167672 | A1 | 7/2009 | Kerofsky |
| 2009/0174680 | A1 | 7/2009 | Anzures et al. |
| 2009/0175511 | A1 | 7/2009 | Lee et al. |
| 2009/0177538 | A1 | 7/2009 | Brewer et al. |
| 2009/0178007 | A1 | 7/2009 | Matas et al. |
| 2009/0189915 | A1 | 7/2009 | Mercer et al. |
| 2009/0199119 | A1 | 8/2009 | Park et al. |
| 2009/0199130 | A1 | 8/2009 | Tsern et al. |
| 2009/0216556 | A1 | 8/2009 | Martin et al. |
| 2009/0220206 | A1 | 9/2009 | Kisliakov |
| 2009/0227295 | A1 | 9/2009 | Kim |
| 2009/0231356 | A1 | 9/2009 | Bames et al. |
| 2009/0239587 | A1 | 9/2009 | Negron et al. |
| 2009/0244015 | A1 | 10/2009 | Sengupta et al. |
| 2009/0244318 | A1 | 10/2009 | Makii |
| 2009/0249247 | A1 | 10/2009 | Tseng et al. |
| 2009/0254624 | A1 | 10/2009 | Baudin et al. |
| 2009/0256780 | A1 | 10/2009 | Small et al. |
| 2009/0259958 | A1 | 10/2009 | Ban |
| 2009/0262088 | A1 | 10/2009 | Moll-Carrillo et al. |
| 2009/0263044 | A1 | 10/2009 | Imagawa et al. |
| 2009/0276700 | A1 | 11/2009 | Anderson et al. |
| 2009/0282362 | A1 | 11/2009 | Matsumoto |
| 2009/0299810 | A1 | 12/2009 | Jardine et al. |
| 2009/0300513 | A1 | 12/2009 | Nims et al. |
| 2009/0305732 | A1 | 12/2009 | Marcellino et al. |
| 2009/0313299 | A1 | 12/2009 | Bonev et al. |
| 2009/0313584 | A1 | 12/2009 | Kerr et al. |
| 2009/0315671 | A1 | 12/2009 | Gocho et al. |
| 2009/0322901 | A1 | 12/2009 | Subbotin et al. |
| 2009/0327886 | A1 | 12/2009 | Whytock et al. |
| 2010/0017748 | A1 | 1/2010 | Taylor et al. |
| 2010/0020221 | A1 | 1/2010 | Tupman et al. |
| 2010/0020222 | A1 | 1/2010 | Jones et al. |
| 2010/0026640 | A1 | 2/2010 | Kim et al. |
| 2010/0033615 | A1 | 2/2010 | Mori |
| 2010/0039522 | A1 | 2/2010 | Huang |
| 2010/0048358 | A1 | 2/2010 | Tchao et al. |
| 2010/0050086 | A1 | 2/2010 | Sherrard et al. |
| 2010/0064255 | A1 | 3/2010 | Rottler et al. |
| 2010/0066853 | A1 | 3/2010 | Aoki et al. |
| 2010/0066889 | A1 | 3/2010 | Ueda et al. |
| 2010/0066890 | A1 | 3/2010 | Ueda et al. |
| 2010/0066895 | A1 | 3/2010 | Ueda et al. |
| 2010/0085203 | A1 | 4/2010 | Kahn et al. |
| 2010/0099462 | A1 | 4/2010 | Baek et al. |
| 2010/0107070 | A1 | 4/2010 | Devineni et al. |
| 2010/0110082 | A1 | 5/2010 | Myrick et al. |
| 2010/0110108 | A1 | 5/2010 | Alexandersson et al. |
| 2010/0114974 | A1 | 5/2010 | Jung et al. |
| 2010/0123724 | A1 | 5/2010 | Moore et al. |
| 2010/0123737 | A1 | 5/2010 | Williamson et al. |
| 2010/0125811 | A1 | 5/2010 | Moore et al. |
| 2010/0138764 | A1 | 6/2010 | Hatambeiki et al. |
| 2010/0138780 | A1 | 6/2010 | Marano et al. |
| 2010/0141606 | A1 | 6/2010 | Bae et al. |
| 2010/0146463 | A1 | 6/2010 | Cho et al. |
| 2010/0156807 | A1 | 6/2010 | Stallings et al. |
| 2010/0156833 | A1 | 6/2010 | Kim et al. |
| 2010/0157742 | A1 | 6/2010 | Relyea et al. |
| 2010/0162160 | A1 | 6/2010 | Stallings et al. |
| 2010/0164893 | A1 | 7/2010 | Shin et al. |
| 2010/0175006 | A1 | 7/2010 | Li |
| 2010/0178873 | A1 | 7/2010 | Lee et al. |
| 2010/0194692 | A1 | 8/2010 | Orr et al. |
| 2010/0194931 | A1 | 8/2010 | Kawaguchi et al. |
| 2010/0198453 | A1 | 8/2010 | Dorogusker et al. |
| 2010/0201815 | A1 | 8/2010 | Anderson et al. |
| 2010/0205563 | A1 | 8/2010 | Haapsaari et al. |
| 2010/0208122 | A1 | 8/2010 | Yumiki |
| 2010/0208999 | A1 | 8/2010 | Oh et al. |
| 2010/0226213 | A1 | 9/2010 | Drugge |
| 2010/0231735 | A1 | 9/2010 | Burian et al. |
| 2010/0231777 | A1 | 9/2010 | Shintani et al. |
| 2010/0232703 | A1 | 9/2010 | Aiso |
| 2010/0235726 | A1 | 9/2010 | Ording et al. |
| 2010/0238327 | A1 | 9/2010 | Griffith et al. |
| 2010/0243516 | A1 | 9/2010 | Martin et al. |
| 2010/0245287 | A1 | 9/2010 | Thorn |
| 2010/0251176 | A1 | 9/2010 | Fong et al. |
| 2010/0259645 | A1 | 10/2010 | Kaplan et al. |
| 2010/0267370 | A1 | 10/2010 | Lee |
| 2010/0269108 | A1 | 10/2010 | Boudreau et al. |
| 2010/0271312 | A1 | 10/2010 | Alameh et al. |
| 2010/0271343 | A1 | 10/2010 | Nagashima et al. |
| 2010/0281374 | A1 | 11/2010 | Schulz et al. |
| 2010/0283743 | A1 | 11/2010 | Coddington |
| 2010/0289825 | A1 | 11/2010 | Shin et al. |
| 2010/0289910 | A1 | 11/2010 | Kamshilin et al. |
| 2010/0292600 | A1 | 11/2010 | Dibenedetto et al. |
| 2010/0295789 | A1 | 11/2010 | Shin et al. |
| 2010/0295803 | A1 | 11/2010 | Kim et al. |
| 2010/0299436 | A1 | 11/2010 | Khalid et al. |
| 2010/0302280 | A1 | 12/2010 | Szeliski et al. |
| 2010/0304729 | A1 | 12/2010 | Sabotta et al. |
| 2011/0003587 | A1 | 1/2011 | Belz et al. |
| 2011/0003665 | A1 | 1/2011 | Burton et al. |
| 2011/0007611 | A1 | 1/2011 | Kato et al. |
| 2011/0008033 | A1 | 1/2011 | Ichimiya et al. |
| 2011/0012772 | A1 | 1/2011 | Chuang et al. |
| 2011/0013049 | A1 | 1/2011 | Thörn |
| 2011/0016425 | A1 | 1/2011 | Homburg et al. |
| 2011/0018695 | A1 | 1/2011 | Bells et al. |
| 2011/0018970 | A1 | 1/2011 | Wakabayashi |
| 2011/0019058 | A1 | 1/2011 | Sakai et al. |
| 2011/0019069 | A1 | 1/2011 | Kojima et al. |
| 2011/0029870 | A1 | 2/2011 | May et al. |
| 2011/0040754 | A1 | 2/2011 | Peto et al. |
| 2011/0040760 | A1 | 2/2011 | Fleischman et al. |
| 2011/0043662 | A1 | 2/2011 | Kim |
| 2011/0047014 | A1 | 2/2011 | De Angelo |
| 2011/0050864 | A1 | 3/2011 | Bond |
| 2011/0057903 | A1 | 3/2011 | Yamano et al. |
| 2011/0058052 | A1 | 3/2011 | Bolton et al. |
| 2011/0059769 | A1 | 3/2011 | Brunolli |
| 2011/0061017 | A1 | 3/2011 | Ullrich et al. |
| 2011/0071818 | A1 | 3/2011 | Jiang |
| 2011/0074699 | A1 | 3/2011 | Marr et al. |
| 2011/0074710 | A1 | 3/2011 | Weeldreyer et al. |
| 2011/0074830 | A1 | 3/2011 | Rapp et al. |
| 2011/0076003 | A1 | 3/2011 | Cho et al. |
| 2011/0078622 | A1 | 3/2011 | Missig et al. |
| 2011/0080411 | A1 | 4/2011 | Wikkerink et al. |
| 2011/0081923 | A1 | 4/2011 | Bednar et al. |
| 2011/0098928 | A1 | 4/2011 | Hoffman et al. |
| 2011/0109581 | A1 | 5/2011 | Ozawa et al. |
| 2011/0115721 | A1 | 5/2011 | Li et al. |
| 2011/0115932 | A1 | 5/2011 | Shin et al. |
| 2011/0138329 | A1 | 6/2011 | Wells et al. |
| 2011/0138332 | A1 | 6/2011 | Miyagawa |
| 2011/0145745 | A1 | 6/2011 | Hyeon et al. |
| 2011/0151415 | A1 | 6/2011 | Darling et al. |
| 2011/0157046 | A1 | 6/2011 | Lee et al. |
| 2011/0157055 | A1 | 6/2011 | Tilley et al. |
| 2011/0157379 | A1 | 6/2011 | Kimura |
| 2011/0167369 | A1 | 7/2011 | Van Os |
| 2011/0167382 | A1 | 7/2011 | Van Os |
| 2011/0175832 | A1 | 7/2011 | Miyazawa et al. |
| 2011/0176039 | A1 | 7/2011 | Lo |
| 2011/0181521 | A1 | 7/2011 | Reid et al. |
| 2011/0183650 | A1 | 7/2011 | McKee |
| 2011/0187879 | A1 | 8/2011 | Ochiai |
| 2011/0191695 | A1 | 8/2011 | Dinka et al. |

(56) References Cited

U.S. PATENT DOCUMENTS

2011/0197165 A1 8/2011 Filippov et al.
2011/0199495 A1 8/2011 Laberge et al.
2011/0202861 A1 8/2011 Fritzley et al.
2011/0202883 A1 8/2011 Oh et al.
2011/0205182 A1 8/2011 Miyazawa et al.
2011/0205851 A1 8/2011 Harris
2011/0227872 A1 9/2011 Huska et al.
2011/0228084 A1 9/2011 Colciago
2011/0234633 A1 9/2011 Ogura et al.
2011/0242369 A1 10/2011 Misawa et al.
2011/0249078 A1 10/2011 Abuan et al.
2011/0249861 A1 10/2011 Tokutake
2011/0252146 A1 10/2011 Santamaria et al.
2011/0257958 A1 10/2011 Kildevaeld
2011/0265002 A1 10/2011 Hong et al.
2011/0279852 A1 11/2011 Oda et al.
2011/0281568 A1 11/2011 Le
2011/0285656 A1 11/2011 Yaksick et al.
2011/0296163 A1 12/2011 Abernethy et al.
2011/0302518 A1 12/2011 Zhang
2011/0306393 A1 12/2011 Goldman et al.
2011/0306421 A1 12/2011 Nishimoto et al.
2011/0316858 A1 12/2011 Shen et al.
2011/0316884 A1 12/2011 Giambalvo et al.
2012/0002098 A1 1/2012 Ueda
2012/0002898 A1 1/2012 Côtéet al.
2012/0011449 A1 1/2012 Sasson et al.
2012/0011456 A1 1/2012 Noda et al.
2012/0015779 A1 1/2012 Powch et al.
2012/0019400 A1 1/2012 Patel et al.
2012/0019513 A1 1/2012 Fong et al.
2012/0019610 A1 1/2012 Hornyak et al.
2012/0026110 A1 2/2012 Yamano et al.
2012/0026378 A1 2/2012 Pang et al.
2012/0028707 A1 2/2012 Raitt et al.
2012/0040719 A1 2/2012 Lee et al.
2012/0052921 A1 3/2012 Lim et al.
2012/0054651 A1 3/2012 Tsai
2012/0056997 A1 3/2012 Jang
2012/0057064 A1 3/2012 Gardiner et al.
2012/0059664 A1 3/2012 Georgiev et al.
2012/0059787 A1 3/2012 Brown et al.
2012/0066629 A1 3/2012 Lee et al.
2012/0069206 A1 3/2012 Hsieh
2012/0070129 A1 3/2012 Lin et al.
2012/0071770 A1 3/2012 Grey et al.
2012/0084692 A1 4/2012 Bae
2012/0084729 A1 4/2012 Lin et al.
2012/0092383 A1 4/2012 Hysek et al.
2012/0098854 A1 4/2012 Ohnishi
2012/0102399 A1 4/2012 Nicholson
2012/0105358 A1 5/2012 Momeyer et al.
2012/0113008 A1 5/2012 Makinen et al.
2012/0117507 A1 5/2012 Tseng et al.
2012/0120277 A1 5/2012 Tsai et al.
2012/0124499 A1 5/2012 Tsai et al.
2012/0127189 A1 5/2012 Park et al.
2012/0127346 A1 5/2012 Sato et al.
2012/0133797 A1 5/2012 Sato et al.
2012/0144416 A1 6/2012 Wetzer et al.
2012/0146899 A1 6/2012 Teng
2012/0154293 A1 6/2012 Hinckley et al.
2012/0159380 A1 6/2012 Kocienda et al.
2012/0162242 A1 6/2012 Amano et al.
2012/0162455 A1 6/2012 Kim et al.
2012/0167008 A1 6/2012 Zaman et al.
2012/0169776 A1 7/2012 Rissa et al.
2012/0177339 A1 7/2012 Chang et al.
2012/0188394 A1 7/2012 Park et al.
2012/0194559 A1 8/2012 Lim
2012/0204123 A1 8/2012 Bauer et al.
2012/0206621 A1 8/2012 Chen et al.
2012/0214458 A1 8/2012 Levien et al.
2012/0218177 A1 8/2012 Pang et al.
2012/0218201 A1 8/2012 Tamas et al.
2012/0223890 A1 9/2012 Borovsky et al.
2012/0223935 A1 9/2012 Renwick et al.
2012/0235990 A1 9/2012 Yamaji
2012/0243802 A1 9/2012 Fintel et al.
2012/0254263 A1 10/2012 Hiestermann et al.
2012/0254318 A1 10/2012 Poniatowskl
2012/0254804 A1 10/2012 Sheha et al.
2012/0274830 A1 11/2012 Kameyama et al.
2012/0274850 A1 11/2012 Hawkins et al.
2012/0290109 A1 11/2012 Engelberg et al.
2012/0293611 A1 11/2012 Lee
2012/0304084 A1 11/2012 Kim et al.
2012/0308209 A1 12/2012 Zaletel
2012/0320141 A1 12/2012 Bowen et al.
2012/0322508 A1 12/2012 Forstall et al.
2012/0324357 A1 12/2012 Viegers et al.
2012/0324390 A1 12/2012 Tao et al.
2013/0009858 A1 1/2013 Lacey
2013/0010170 A1 1/2013 Matsuzawa et al.
2013/0014019 A1 1/2013 Kim et al.
2013/0016042 A1 1/2013 Makinen et al.
2013/0019175 A1 1/2013 Kotler et al.
2013/0024781 A1 1/2013 Douillet et al.
2013/0024802 A1 1/2013 Zeng et al.
2013/0026293 A1 1/2013 Schneider et al.
2013/0027412 A1 1/2013 Roddy
2013/0038546 A1 2/2013 Mineo
2013/0038771 A1 2/2013 Brunner et al.
2013/0044080 A1 2/2013 Chiang
2013/0046397 A1 2/2013 Fadell et al.
2013/0050263 A1 2/2013 Khoe et al.
2013/0055119 A1 2/2013 Luong
2013/0057472 A1 3/2013 Dizac et al.
2013/0057566 A1 3/2013 Kriese et al.
2013/0063364 A1 3/2013 Moore
2013/0063366 A1 3/2013 Paul
2013/0063383 A1 3/2013 Anderssonreimer et al.
2013/0067391 A1 3/2013 Pittappilly et al.
2013/0067407 A1 3/2013 Dehmann
2013/0069893 A1 3/2013 Brinda et al.
2013/0076757 A1 3/2013 Pritting
2013/0076908 A1 3/2013 Bratton et al.
2013/0082965 A1 4/2013 Wada et al.
2013/0083222 A1 4/2013 Matsuzawa et al.
2013/0088413 A1 4/2013 Raffle et al.
2013/0091205 A1 4/2013 Kotler et al.
2013/0091298 A1 4/2013 Ozzie et al.
2013/0093715 A1 4/2013 Marsden et al.
2013/0093833 A1 4/2013 Al-Asaaed et al.
2013/0093904 A1 4/2013 Wagner et al.
2013/0103797 A1 4/2013 Park et al.
2013/0107674 A1 5/2013 Gossweiler et al.
2013/0109425 A1 5/2013 Kerger et al.
2013/0116967 A1 5/2013 Akcasu et al.
2013/0117025 A1 5/2013 Park et al.
2013/0117058 A1 5/2013 Norton et al.
2013/0117383 A1 5/2013 Hymel et al.
2013/0120106 A1 5/2013 Cauwels et al.
2013/0120386 A1 5/2013 Wilensky et al.
2013/0121119 A1 5/2013 Umamoto
2013/0124997 A1 5/2013 Speir et al.
2013/0135315 A1 5/2013 Bares et al.
2013/0137073 A1 5/2013 Nacey et al.
2013/0141362 A1 6/2013 Asanuma et al.
2013/0141365 A1 6/2013 Lynn et al.
2013/0141371 A1 6/2013 Hallford et al.
2013/0142495 A1 6/2013 Terai
2013/0155308 A1 6/2013 Wu et al.
2013/0157729 A1 6/2013 Tabe
2013/0165186 A1 6/2013 Choi
2013/0169870 A1 7/2013 Lee et al.
2013/0170324 A1 7/2013 Tu et al.
2013/0173699 A1 7/2013 Parks et al.
2013/0174044 A1 7/2013 Hill
2013/0179831 A1 7/2013 Izaki
2013/0191785 A1 7/2013 Wu et al.
2013/0194254 A1 8/2013 Miyoshi et al.
2013/0194378 A1 8/2013 Brown
2013/0197679 A1 8/2013 Balakrishnan et al.

(56) References Cited

U.S. PATENT DOCUMENTS

| | | | |
|---|---|---|---|
| 2013/0201098 | A1 | 8/2013 | Schilit et al. |
| 2013/0201307 | A1 | 8/2013 | Schloter et al. |
| 2013/0205194 | A1 | 8/2013 | Decker et al. |
| 2013/0205210 | A1 | 8/2013 | Jeon et al. |
| 2013/0208093 | A1 | 8/2013 | Sun et al. |
| 2013/0209972 | A1 | 8/2013 | Carter et al. |
| 2013/0210563 | A1 | 8/2013 | Hollinger |
| 2013/0212470 | A1 | 8/2013 | Karunamuni et al. |
| 2013/0212492 | A1 | 8/2013 | Chen et al. |
| 2013/0215044 | A1 | 8/2013 | Ahn et al. |
| 2013/0222671 | A1 | 8/2013 | Tseng et al. |
| 2013/0227412 | A1 | 8/2013 | Ornstein et al. |
| 2013/0227414 | A1 | 8/2013 | Hwang et al. |
| 2013/0234924 | A1 | 9/2013 | Janefalkar et al. |
| 2013/0234929 | A1 | 9/2013 | Libin |
| 2013/0234969 | A1 | 9/2013 | Yeh et al. |
| 2013/0235222 | A1 | 9/2013 | Kam et al. |
| 2013/0235226 | A1 | 9/2013 | Kam et al. |
| 2013/0235234 | A1 | 9/2013 | Cucci et al. |
| 2013/0239057 | A1 | 9/2013 | Ubillos et al. |
| 2013/0243924 | A1 | 9/2013 | Bhandari et al. |
| 2013/0246948 | A1 | 9/2013 | Chen et al. |
| 2013/0251329 | A1 | 9/2013 | McCoy et al. |
| 2013/0254705 | A1 | 9/2013 | Mooring et al. |
| 2013/0262298 | A1 | 10/2013 | Morley et al. |
| 2013/0263043 | A1 | 10/2013 | Sarbin et al. |
| 2013/0265467 | A1 | 10/2013 | Matsuzawa et al. |
| 2013/0275875 | A1 | 10/2013 | Gruber et al. |
| 2013/0278576 | A1 | 10/2013 | Lee et al. |
| 2013/0286251 | A1 | 10/2013 | Wood et al. |
| 2013/0298021 | A1 | 11/2013 | Park et al. |
| 2013/0311186 | A1 | 11/2013 | Lee et al. |
| 2013/0314302 | A1 | 11/2013 | Jeung et al. |
| 2013/0318158 | A1 | 11/2013 | Teng et al. |
| 2013/0326418 | A1 | 12/2013 | Utsuki et al. |
| 2013/0329074 | A1 | 12/2013 | Zhang et al. |
| 2013/0331130 | A1 | 12/2013 | Lee |
| 2013/0345978 | A1 | 12/2013 | Lush et al. |
| 2013/0346916 | A1 | 12/2013 | Williamson et al. |
| 2014/0007021 | A1 | 1/2014 | Akiyama et al. |
| 2014/0009639 | A1 | 1/2014 | Lee |
| 2014/0013243 | A1 | 1/2014 | Flynn et al. |
| 2014/0013414 | A1 | 1/2014 | Bruck et al. |
| 2014/0015784 | A1 | 1/2014 | Oonishi |
| 2014/0022399 | A1 | 1/2014 | Rashid et al. |
| 2014/0028872 | A1 | 1/2014 | Lee et al. |
| 2014/0028885 | A1 | 1/2014 | Ma et al. |
| 2014/0032706 | A1 | 1/2014 | Kuscher et al. |
| 2014/0033043 | A1 | 1/2014 | Kashima |
| 2014/0033100 | A1 | 1/2014 | Noda et al. |
| 2014/0036639 | A1 | 2/2014 | Boni et al. |
| 2014/0037178 | A1 | 2/2014 | Park |
| 2014/0040831 | A1 | 2/2014 | Akasaka et al. |
| 2014/0043367 | A1 | 2/2014 | Sakaino et al. |
| 2014/0043368 | A1 | 2/2014 | Yu |
| 2014/0043517 | A1 | 2/2014 | Yim et al. |
| 2014/0045463 | A1 | 2/2014 | Hsieh et al. |
| 2014/0047389 | A1 | 2/2014 | Aarabi |
| 2014/0047525 | A1 | 2/2014 | Bonhoff |
| 2014/0049536 | A1 | 2/2014 | Neuman et al. |
| 2014/0055388 | A1 | 2/2014 | Yook et al. |
| 2014/0056475 | A1 | 2/2014 | Jang et al. |
| 2014/0059125 | A1 | 2/2014 | Hillier |
| 2014/0059493 | A1 | 2/2014 | Kim |
| 2014/0062962 | A1 | 3/2014 | Jang et al. |
| 2014/0063175 | A1 | 3/2014 | Jafry et al. |
| 2014/0063313 | A1 | 3/2014 | Choi et al. |
| 2014/0068439 | A1 | 3/2014 | Lacaze et al. |
| 2014/0071325 | A1 | 3/2014 | Kawahara et al. |
| 2014/0073256 | A1 | 3/2014 | Newham et al. |
| 2014/0074570 | A1 | 3/2014 | Hope et al. |
| 2014/0075003 | A1 | 3/2014 | Tanaka et al. |
| 2014/0078371 | A1 | 3/2014 | Kinoshita |
| 2014/0082533 | A1 | 3/2014 | Kelley et al. |
| 2014/0092272 | A1 | 4/2014 | Choi |
| 2014/0099994 | A1 | 4/2014 | Bishop et al. |
| 2014/0101169 | A1 | 4/2014 | Kurata et al. |
| 2014/0101608 | A1 | 4/2014 | Ryskamp et al. |
| 2014/0104449 | A1 | 4/2014 | Masarik et al. |
| 2014/0108928 | A1 | 4/2014 | Mumick |
| 2014/0109004 | A1 | 4/2014 | Sadhvani et al. |
| 2014/0117076 | A1 | 5/2014 | Eberlein |
| 2014/0118563 | A1 | 5/2014 | Mehta et al. |
| 2014/0123005 | A1 | 5/2014 | Forstall et al. |
| 2014/0123043 | A1 | 5/2014 | Schmidt et al. |
| 2014/0125620 | A1 | 5/2014 | Panther et al. |
| 2014/0126336 | A1 | 5/2014 | Goeller et al. |
| 2014/0129959 | A1 | 5/2014 | Battles et al. |
| 2014/0132735 | A1 | 5/2014 | Lee et al. |
| 2014/0136986 | A1 | 5/2014 | Martin et al. |
| 2014/0139422 | A1 | 5/2014 | Mistry et al. |
| 2014/0139637 | A1 | 5/2014 | Mistry et al. |
| 2014/0143671 | A1 | 5/2014 | Kovalick |
| 2014/0143678 | A1 | 5/2014 | Mistry et al. |
| 2014/0143682 | A1 | 5/2014 | Druck et al. |
| 2014/0143737 | A1 | 5/2014 | Mistry et al. |
| 2014/0149878 | A1 | 5/2014 | Mischari et al. |
| 2014/0150029 | A1 | 5/2014 | Avedissian et al. |
| 2014/0152886 | A1 | 6/2014 | Morgan-Mar et al. |
| 2014/0155123 | A1 | 6/2014 | Lee et al. |
| 2014/0156412 | A1 | 6/2014 | Tse |
| 2014/0157167 | A1 | 6/2014 | Zhu |
| 2014/0160304 | A1 | 6/2014 | Galor et al. |
| 2014/0160316 | A1 | 6/2014 | Hwang |
| 2014/0164945 | A1 | 6/2014 | Junqua et al. |
| 2014/0164955 | A1 | 6/2014 | Thiruvidam et al. |
| 2014/0168056 | A1 | 6/2014 | Swaminathan et al. |
| 2014/0171156 | A1 | 6/2014 | Pattikonda et al. |
| 2014/0173439 | A1 | 6/2014 | Gutierrez et al. |
| 2014/0176469 | A1 | 6/2014 | Lim |
| 2014/0176475 | A1 | 6/2014 | Myers et al. |
| 2014/0181183 | A1 | 6/2014 | Yamamoto et al. |
| 2014/0181219 | A1 | 6/2014 | Wang et al. |
| 2014/0184524 | A1 | 7/2014 | Schiefer et al. |
| 2014/0189577 | A1 | 7/2014 | Haslam et al. |
| 2014/0189584 | A1 | 7/2014 | Weng et al. |
| 2014/0189589 | A1 | 7/2014 | Kim et al. |
| 2014/0192232 | A1 | 7/2014 | Park et al. |
| 2014/0192233 | A1 | 7/2014 | Kakkori et al. |
| 2014/0195972 | A1 | 7/2014 | Lee et al. |
| 2014/0197946 | A1 | 7/2014 | Park et al. |
| 2014/0197965 | A1 | 7/2014 | Park et al. |
| 2014/0201023 | A1 | 7/2014 | Tang |
| 2014/0204229 | A1 | 7/2014 | Leung et al. |
| 2014/0218383 | A1 | 8/2014 | Srivastava |
| 2014/0218599 | A1 | 8/2014 | Nakamura et al. |
| 2014/0223490 | A1 | 8/2014 | Pan et al. |
| 2014/0226052 | A1 | 8/2014 | Kang et al. |
| 2014/0232838 | A1 | 8/2014 | Jorgensen et al. |
| 2014/0232921 | A1 | 8/2014 | Kim et al. |
| 2014/0237419 | A1 | 8/2014 | Ryu |
| 2014/0240122 | A1 | 8/2014 | Roberts et al. |
| 2014/0240471 | A1 | 8/2014 | Srinivasa et al. |
| 2014/0240531 | A1 | 8/2014 | Nakai et al. |
| 2014/0240551 | A1 | 8/2014 | Kim et al. |
| 2014/0240577 | A1 | 8/2014 | Masugi |
| 2014/0244165 | A1 | 8/2014 | Bells et al. |
| 2014/0245177 | A1 | 8/2014 | Maklouf et al. |
| 2014/0250391 | A1 | 9/2014 | Jong et al. |
| 2014/0253470 | A1 | 9/2014 | Havilio |
| 2014/0258854 | A1 | 9/2014 | Li |
| 2014/0258935 | A1 | 9/2014 | Nishida et al. |
| 2014/0267303 | A1 | 9/2014 | Larkin et al. |
| 2014/0267549 | A1 | 9/2014 | Pinter et al. |
| 2014/0267796 | A1 | 9/2014 | Jang et al. |
| 2014/0267867 | A1 | 9/2014 | Lee et al. |
| 2014/0269614 | A1 | 9/2014 | Maguire et al. |
| 2014/0281966 | A1 | 9/2014 | Kajiyama et al. |
| 2014/0281983 | A1 | 9/2014 | Xian et al. |
| 2014/0282223 | A1 | 9/2014 | Bastien et al. |
| 2014/0282254 | A1 | 9/2014 | Feiereisen et al. |
| 2014/0285698 | A1 | 9/2014 | Geiss |
| 2014/0289660 | A1 | 9/2014 | Min |
| 2014/0293046 | A1 | 10/2014 | Ni |

(56) References Cited

U.S. PATENT DOCUMENTS

2014/0300635 A1 10/2014 Suzuki
2014/0300779 A1 10/2014 Yeo et al.
2014/0304664 A1 10/2014 Lee et al.
2014/0306898 A1 10/2014 Cueto
2014/0307147 A1 10/2014 Hanzawa et al.
2014/0310348 A1 10/2014 Keskitalo et al.
2014/0310598 A1 10/2014 Sprague et al.
2014/0313032 A1 10/2014 Sager et al.
2014/0327639 A1 11/2014 Papakipos et al.
2014/0333671 A1 11/2014 Phang et al.
2014/0333790 A1 11/2014 Wakazono
2014/0333824 A1 11/2014 Xiu
2014/0337450 A1 11/2014 Choudhary et al.
2014/0337791 A1 11/2014 Agnetta et al.
2014/0347289 A1 11/2014 Lee et al.
2014/0351753 A1 11/2014 Shin et al.
2014/0354845 A1 12/2014 Mølgaard et al.
2014/0359438 A1 12/2014 Matsuki
2014/0359637 A1 12/2014 Yan
2014/0362257 A1 12/2014 Viljamaa et al.
2014/0362274 A1 12/2014 Christie et al.
2014/0365980 A1 12/2014 Morrison et al.
2014/0368601 A1 12/2014 Decharms
2014/0368719 A1 12/2014 Kaneko et al.
2014/0372856 A1 12/2014 Radakovitz et al.
2014/0375819 A1 12/2014 Larsen et al.
2014/0375862 A1 12/2014 Kim et al.
2014/0380229 A1 12/2014 Volodin et al.
2014/0380234 A1 12/2014 Shim et al.
2015/0022438 A1 1/2015 Hong
2015/0022649 A1 1/2015 Koppal
2015/0022674 A1 1/2015 Koss et al.
2015/0033129 A1 1/2015 Cho et al.
2015/0033136 A1 1/2015 Sasaki et al.
2015/0042852 A1 2/2015 Lee et al.
2015/0049233 A1 2/2015 Choi
2015/0049591 A1 2/2015 Adams et al.
2015/0052461 A1 2/2015 Sullivan et al.
2015/0055197 A1 2/2015 Romanoff et al.
2015/0057945 A1 2/2015 White et al.
2015/0058780 A1 2/2015 Malik et al.
2015/0067513 A1* 3/2015 Zambetti .............. G06F 3/0488 715/771
2015/0070362 A1 3/2015 Hirai
2015/0071601 A1 3/2015 Dabous et al.
2015/0085174 A1 3/2015 Shabtay et al.
2015/0092009 A1 4/2015 Deluca et al.
2015/0092077 A1 4/2015 Feder et al.
2015/0095937 A1 4/2015 Tobin
2015/0098309 A1 4/2015 Adams et al.
2015/0100537 A1 4/2015 Grieves et al.
2015/0100621 A1 4/2015 Pan
2015/0106721 A1 4/2015 Cha et al.
2015/0110419 A1 4/2015 Xu et al.
2015/0112990 A1 4/2015 Van Os et al.
2015/0113435 A1 4/2015 Phillips
2015/0113468 A1 4/2015 Clark
2015/0116353 A1 4/2015 Miura et al.
2015/0116448 A1 4/2015 Gottlieb
2015/0116542 A1 4/2015 Lee
2015/0117162 A1 4/2015 Tsai et al.
2015/0120768 A1 4/2015 Wellen et al.
2015/0130830 A1 5/2015 Nagasaki et al.
2015/0131121 A1 5/2015 Kang
2015/0135068 A1 5/2015 Chiu
2015/0135109 A1 5/2015 Zambetti et al.
2015/0135234 A1 5/2015 Hall
2015/0138079 A1 5/2015 Lannsjö
2015/0142587 A1 5/2015 Salgar et al.
2015/0145950 A1 5/2015 Murphy et al.
2015/0146079 A1 5/2015 Kim
2015/0146925 A1 5/2015 Son et al.
2015/0149967 A1* 5/2015 Bernstein ............ G06F 3/04817 715/854
2015/0150141 A1 5/2015 Szymanski et al.
2015/0153952 A1 6/2015 Grossman et al.
2015/0154448 A1 6/2015 Murayama et al.
2015/0160806 A1 6/2015 Fey et al.
2015/0172534 A1 6/2015 Miyakawa et al.
2015/0180922 A1 6/2015 Draznin et al.
2015/0181135 A1 6/2015 Shimosato
2015/0185703 A1 7/2015 Tanaka
2015/0189162 A1 7/2015 Kuo et al.
2015/0193127 A1 7/2015 Chai et al.
2015/0194050 A1 7/2015 Lee
2015/0194186 A1 7/2015 Lee et al.
2015/0195179 A1 7/2015 Skare et al.
2015/0201130 A1 7/2015 Cho et al.
2015/0212723 A1 7/2015 Lim et al.
2015/0217163 A1 8/2015 Amis et al.
2015/0220249 A1 8/2015 Snibbe et al.
2015/0248198 A1 9/2015 Somlai-Fisher et al.
2015/0248200 A1 9/2015 Cho et al.
2015/0248213 A1 9/2015 Postal
2015/0248235 A1 9/2015 Offenberg et al.
2015/0249775 A1 9/2015 Jacumet
2015/0249785 A1 9/2015 Mehta et al.
2015/0254855 A1 9/2015 Patankar et al.
2015/0254868 A1 9/2015 Srikanth et al.
2015/0256749 A1 9/2015 Frey et al.
2015/0264202 A1 9/2015 Pawlowski
2015/0268928 A1 9/2015 Park et al.
2015/0269848 A1 9/2015 Yuen et al.
2015/0271120 A1 9/2015 Langholz
2015/0271389 A1 9/2015 Huang et al.
2015/0281585 A1 10/2015 Guldogan
2015/0286372 A1 10/2015 Swindell et al.
2015/0289104 A1 10/2015 Jung et al.
2015/0297185 A1 10/2015 McCormack et al.
2015/0301608 A1 10/2015 Nagaraju et al.
2015/0301731 A1 10/2015 Okamoto et al.
2015/0310583 A1 10/2015 Hume et al.
2015/0312175 A1 10/2015 Langholz
2015/0312185 A1 10/2015 Langholz et al.
2015/0324751 A1 11/2015 Orenstein et al.
2015/0334291 A1 11/2015 Cho et al.
2015/0334292 A1 11/2015 Tartz et al.
2015/0341536 A1 11/2015 Huang et al.
2015/0350141 A1 12/2015 Yang et al.
2015/0350523 A1 12/2015 Kinoshita
2015/0350533 A1 12/2015 Harris et al.
2015/0350535 A1 12/2015 Voss
2015/0362998 A1 12/2015 Park et al.
2015/0370458 A1 12/2015 Chen
2015/0370469 A1 12/2015 Leong et al.
2015/0379476 A1 12/2015 Chaudhri et al.
2016/0005189 A1 1/2016 Gray et al.
2016/0005280 A1 1/2016 Laska et al.
2016/0005281 A1 1/2016 Laska et al.
2016/0012294 A1 1/2016 Bouck
2016/0012567 A1 1/2016 Siddiqui et al.
2016/0021168 A1 1/2016 Chaudhri et al.
2016/0026371 A1 1/2016 Lu et al.
2016/0029004 A1 1/2016 Campbell et al.
2016/0034133 A1 2/2016 Wilson et al.
2016/0034148 A1 2/2016 Wilson et al.
2016/0034152 A1 2/2016 Wilson et al.
2016/0034166 A1 2/2016 Wilson et al.
2016/0034167 A1 2/2016 Wilson et al.
2016/0036996 A1 2/2016 Midholt et al.
2016/0037140 A1 2/2016 Lindsey et al.
2016/0044236 A1 2/2016 Matsuzawa et al.
2016/0048287 A1 2/2016 Lee et al.
2016/0048598 A1 2/2016 Fujioka et al.
2016/0048599 A1 2/2016 Fujioka et al.
2016/0048725 A1 2/2016 Holz et al.
2016/0048903 A1 2/2016 Fujioka et al.
2016/0050351 A1 2/2016 Lee et al.
2016/0050446 A1 2/2016 Fujioka et al.
2016/0054710 A1 2/2016 Jo et al.
2016/0057363 A1 2/2016 Posa
2016/0058336 A1 3/2016 Blahnik et al.
2016/0062589 A1 3/2016 Wan et al.
2016/0063339 A1 3/2016 Kwon et al.

(56) References Cited

U.S. PATENT DOCUMENTS

2016/0063748 A1 3/2016 Kim et al.
2016/0065505 A1 3/2016 Iskander
2016/0065707 A1 3/2016 Yang et al.
2016/0065708 A1 3/2016 Yang et al.
2016/0065832 A1 3/2016 Kim et al.
2016/0066277 A1 3/2016 Yang et al.
2016/0073138 A1 3/2016 Francisco et al.
2016/0077725 A1 3/2016 Maeda
2016/0080639 A1 3/2016 Choi et al.
2016/0085412 A1 3/2016 Meganathan et al.
2016/0088280 A1 3/2016 Sadi et al.
2016/0093180 A1 3/2016 Fitzgibbon et al.
2016/0093338 A1 3/2016 Laska et al.
2016/0097651 A1 4/2016 Jung et al.
2016/0103830 A1 4/2016 Cheong et al.
2016/0103970 A1 4/2016 Liu et al.
2016/0105388 A1 4/2016 Bin Mahfooz et al.
2016/0117147 A1 4/2016 Zambetti et al.
2016/0117829 A1 4/2016 Yoon et al.
2016/0119552 A1 4/2016 Oh et al.
2016/0127636 A1 5/2016 Ito et al.
2016/0127638 A1 5/2016 Guo et al.
2016/0132201 A1 5/2016 Shaw et al.
2016/0133297 A1 5/2016 Thornton et al.
2016/0148384 A1 5/2016 Bud et al.
2016/0162039 A1 6/2016 Eilat et al.
2016/0173869 A1 6/2016 Srikanth et al.
2016/0188181 A1 6/2016 Smith
2016/0191992 A1 6/2016 Kwon
2016/0193502 A1 7/2016 Kang et al.
2016/0196760 A1 7/2016 Koo et al.
2016/0210568 A1 7/2016 Krupa et al.
2016/0210602 A1 7/2016 Siddique et al.
2016/0212319 A1 7/2016 Harris et al.
2016/0212374 A1 7/2016 Usbergo et al.
2016/0219212 A1 7/2016 Shoji
2016/0219217 A1 7/2016 Williams et al.
2016/0224233 A1 8/2016 Phang et al.
2016/0225175 A1 8/2016 Kim et al.
2016/0227016 A1 8/2016 Kim et al.
2016/0241777 A1 8/2016 Rav-Acha et al.
2016/0247288 A1 8/2016 Omori et al.
2016/0255268 A1 9/2016 Kang et al.
2016/0256741 A1 9/2016 Holma et al.
2016/0259413 A1 9/2016 Anzures et al.
2016/0259542 A1 9/2016 Chaudhri et al.
2016/0267081 A1 9/2016 Keene
2016/0270717 A1 9/2016 Luna et al.
2016/0283586 A1 9/2016 Thapliyal et al.
2016/0301813 A1 10/2016 Swire et al.
2016/0316147 A1 10/2016 Bernstein et al.
2016/0320849 A1 11/2016 Koo
2016/0337570 A1 11/2016 Tan et al.
2016/0337582 A1 11/2016 Shimauchi et al.
2016/0342141 A1 11/2016 Koumaiha
2016/0357353 A1 12/2016 Miura et al.
2016/0357354 A1 12/2016 Chen et al.
2016/0360097 A1 12/2016 Penha et al.
2016/0360116 A1 12/2016 Penha et al.
2016/0364114 A1 12/2016 Von Dehsen et al.
2016/0364123 A1 12/2016 Burns et al.
2016/0364129 A1 12/2016 McLean et al.
2016/0366344 A1 12/2016 Pan et al.
2016/0373631 A1 12/2016 Titi et al.
2016/0373650 A1 12/2016 Kim et al.
2016/0378277 A1 12/2016 Cho
2016/0378311 A1 12/2016 Kim et al.
2017/0006210 A1 1/2017 Dye et al.
2017/0010677 A1 1/2017 Roh et al.
2017/0011773 A1 1/2017 Lee
2017/0013179 A1 1/2017 Kang et al.
2017/0019517 A1 1/2017 Wilder et al.
2017/0019604 A1 1/2017 Kim et al.
2017/0024872 A1 1/2017 Olsson et al.
2017/0026565 A1 1/2017 Hong et al.
2017/0032269 A1 2/2017 Portilla et al.
2017/0034449 A1 2/2017 Eum et al.
2017/0038852 A1 2/2017 Hildreth et al.
2017/0039686 A1 2/2017 Miura et al.
2017/0039765 A1 2/2017 Zhou et al.
2017/0040039 A1 2/2017 Snibbe et al.
2017/0041549 A1 2/2017 Kim et al.
2017/0041677 A1 2/2017 Anderson et al.
2017/0046025 A1* 2/2017 Dascola ................ G06F 3/0416
2017/0048450 A1 2/2017 Lee et al.
2017/0048461 A1 2/2017 Lee et al.
2017/0048494 A1 2/2017 Boyle et al.
2017/0052939 A1 2/2017 Seol et al.
2017/0053008 A1 2/2017 Frenkel et al.
2017/0054960 A1 2/2017 Chien et al.
2017/0064184 A1 3/2017 Tsai
2017/0064205 A1 3/2017 Choi et al.
2017/0064213 A1 3/2017 Windmark et al.
2017/0068407 A1 3/2017 Wilson et al.
2017/0068439 A1 3/2017 Mohseni
2017/0070775 A1 3/2017 Taxier et al.
2017/0078767 A1 3/2017 Borel et al.
2017/0087469 A1 3/2017 Hardee et al.
2017/0090693 A1 3/2017 Ku et al.
2017/0092329 A1 3/2017 Kim et al.
2017/0094019 A1 3/2017 Ahmed et al.
2017/0109912 A1 4/2017 Lee et al.
2017/0111567 A1 4/2017 Pila
2017/0123571 A1 5/2017 Huang et al.
2017/0123640 A1 5/2017 Wilson et al.
2017/0124664 A1 5/2017 Savenok et al.
2017/0134605 A1 5/2017 Ju et al.
2017/0139572 A1 5/2017 Sunkavalli et al.
2017/0185277 A1 6/2017 Sundermeyer et al.
2017/0186162 A1 6/2017 Mihic et al.
2017/0192730 A1 7/2017 Yang et al.
2017/0223429 A1 8/2017 Schreiner et al.
2017/0230576 A1 8/2017 Sparks et al.
2017/0230585 A1 8/2017 Nash et al.
2017/0237888 A1 8/2017 Harris et al.
2017/0239524 A1 8/2017 Lee et al.
2017/0243389 A1 8/2017 Wild et al.
2017/0243508 A1 8/2017 Cheng et al.
2017/0244482 A1 8/2017 Dimare et al.
2017/0244896 A1 8/2017 Chien et al.
2017/0244897 A1 8/2017 Jung et al.
2017/0257559 A1 9/2017 Stricker
2017/0257596 A1 9/2017 Murata et al.
2017/0264817 A1 9/2017 Yan et al.
2017/0269792 A1 9/2017 Xu et al.
2017/0285764 A1 10/2017 Kim et al.
2017/0287220 A1 10/2017 Khalid et al.
2017/0289462 A1 10/2017 Eum et al.
2017/0302840 A1 10/2017 Hasinoff et al.
2017/0315772 A1 11/2017 Lee et al.
2017/0324784 A1 11/2017 Taine et al.
2017/0336926 A1 11/2017 Chaudhri et al.
2017/0336960 A1 11/2017 Chaudhri et al.
2017/0336961 A1 11/2017 Heo et al.
2017/0337791 A1 11/2017 Gordon-Carroll
2017/0352380 A1 12/2017 Doumbouya et al.
2017/0354845 A1 12/2017 Williams et al.
2017/0354888 A1 12/2017 Benedetto et al.
2017/0357434 A1 12/2017 Coffman et al.
2017/0358071 A1 12/2017 Yamaoka et al.
2017/0359504 A1 12/2017 Manzari et al.
2017/0359505 A1 12/2017 Manzari et al.
2017/0359506 A1 12/2017 Manzari et al.
2017/0365097 A1 12/2017 Lim et al.
2017/0366729 A1 12/2017 Itoh
2017/0371538 A1 12/2017 Zhang et al.
2017/0371844 A1 12/2017 Yao
2018/0007315 A1 1/2018 Kim et al.
2018/0014043 A1 1/2018 Zhang et al.
2018/0014077 A1 1/2018 Hou et al.
2018/0018081 A1 1/2018 Dattilo-Green et al.
2018/0019889 A1 1/2018 Burns et al.
2018/0021684 A1 1/2018 Benedetto
2018/0032536 A1 2/2018 Stachowski

(56) References Cited

U.S. PATENT DOCUMENTS

2018/0038536 A1 2/2018 Irwin et al.
2018/0047200 A1 2/2018 O'Hara et al.
2018/0048820 A1 2/2018 Hinkel et al.
2018/0052571 A1 2/2018 Seol et al.
2018/0066956 A1 3/2018 Kim et al.
2018/0067622 A1* 3/2018 Chaudhri .................. G06F 3/02
2018/0067633 A1 3/2018 Wilson et al.
2018/0077332 A1 3/2018 Shimura et al.
2018/0088787 A1 3/2018 Bereza et al.
2018/0088795 A1 3/2018 Van Os et al.
2018/0091728 A1 3/2018 Brown et al.
2018/0096487 A1 4/2018 Nash et al.
2018/0107367 A1 4/2018 Rinneberg et al.
2018/0109722 A1 4/2018 Laroia et al.
2018/0109754 A1 4/2018 Kwon
2018/0113577 A1 4/2018 Burns et al.
2018/0114543 A1 4/2018 Novikoff
2018/0115788 A1 4/2018 Burns et al.
2018/0120661 A1 5/2018 Kilgore et al.
2018/0124299 A1 5/2018 Brook
2018/0129224 A1 5/2018 Hur
2018/0146132 A1 5/2018 Manzari et al.
2018/0152611 A1 5/2018 Li et al.
2018/0184008 A1 6/2018 Kondo
2018/0184061 A1 6/2018 Kitsunai et al.
2018/0198985 A1 7/2018 Ishitsuka
2018/0199025 A1 7/2018 Holzer et al.
2018/0199080 A1 7/2018 Jackson et al.
2018/0213144 A1 7/2018 Kim et al.
2018/0213161 A1 7/2018 Kanda et al.
2018/0227479 A1 8/2018 Parameswaran et al.
2018/0227482 A1 8/2018 Holzer et al.
2018/0227505 A1 8/2018 Baltz et al.
2018/0232592 A1 8/2018 Stewart et al.
2018/0232705 A1 8/2018 Baker et al.
2018/0234608 A1 8/2018 Sudo et al.
2018/0239930 A1 8/2018 Lai et al.
2018/0249113 A1 8/2018 Faulkner
2018/0262677 A1 9/2018 Dye et al.
2018/0267703 A1 9/2018 Kamimaru et al.
2018/0270420 A1 9/2018 Lee et al.
2018/0278823 A1 9/2018 Horesh
2018/0284892 A1 10/2018 Kwon et al.
2018/0284979 A1 10/2018 Choi et al.
2018/0288310 A1 10/2018 Goldenberg
2018/0302551 A1 10/2018 Yamajo et al.
2018/0302568 A1 10/2018 Kim et al.
2018/0308282 A1 10/2018 Yokoi
2018/0310042 A1 10/2018 Mayalil et al.
2018/0322076 A1 11/2018 Prasad et al.
2018/0335901 A1 11/2018 Manzari et al.
2018/0349008 A1 12/2018 Manzari et al.
2018/0349022 A1 12/2018 Chaudhri et al.
2018/0349659 A1 12/2018 Manzari et al.
2018/0350144 A1 12/2018 Rathod
2018/0352165 A1 12/2018 Zhen et al.
2018/0364648 A1 12/2018 Chi et al.
2018/0364665 A1 12/2018 Clymer et al.
2018/0364815 A1 12/2018 Moussette et al.
2018/0376122 A1 12/2018 Park et al.
2019/0007589 A1 1/2019 Kadambala et al.
2019/0025999 A1 1/2019 Murphy et al.
2019/0026011 A1 1/2019 Wang et al.
2019/0028650 A1 1/2019 Bernstein et al.
2019/0029513 A1 1/2019 Gunnerson et al.
2019/0037004 A1 1/2019 Chaudhri et al.
2019/0051032 A1 2/2019 Chu et al.
2019/0057593 A1 2/2019 Park et al.
2019/0080189 A1 3/2019 Van Os et al.
2019/0080498 A1 3/2019 Horie et al.
2019/0082097 A1 3/2019 Manzari et al.
2019/0084670 A1 3/2019 Sharma et al.
2019/0089873 A1 3/2019 Misawa et al.
2019/0089934 A1 3/2019 Goulden et al.
2019/0108684 A1 4/2019 Callaghan
2019/0114740 A1 4/2019 Ogino et al.
2019/0121216 A1 4/2019 Shabtay et al.
2019/0121522 A1 4/2019 Davis et al.
2019/0130185 A1 5/2019 Delaney et al.
2019/0138259 A1 5/2019 Bagaria et al.
2019/0141030 A1 5/2019 Cockerill et al.
2019/0149706 A1 5/2019 Rivard et al.
2019/0158645 A1 5/2019 Yang et al.
2019/0172016 A1 6/2019 Chaudhri et al.
2019/0174054 A1 6/2019 Srivastava et al.
2019/0179423 A1 6/2019 Rose et al.
2019/0199926 A1 6/2019 An et al.
2019/0205861 A1 7/2019 Bace
2019/0206031 A1 7/2019 Kim et al.
2019/0208282 A1 7/2019 Singh et al.
2019/0213212 A1 7/2019 Adato et al.
2019/0220089 A1 7/2019 Kakizawa et al.
2019/0222769 A1 7/2019 Srivastava et al.
2019/0232110 A1 8/2019 Williams et al.
2019/0232111 A1 8/2019 Williams et al.
2019/0235743 A1 8/2019 Ono
2019/0250812 A1 8/2019 Davydov et al.
2019/0253619 A1 8/2019 Davydov et al.
2019/0268771 A1 8/2019 Seo et al.
2019/0286651 A1 9/2019 Lee et al.
2019/0289201 A1 9/2019 Nishimura et al.
2019/0295393 A1 9/2019 Lee et al.
2019/0318538 A1 10/2019 Li et al.
2019/0324546 A1 10/2019 Lee et al.
2019/0339804 A1* 11/2019 Gleeson .................. G06F 3/016
2019/0342621 A1 11/2019 Carrigan et al.
2019/0342622 A1 11/2019 Carrigan et al.
2019/0347144 A1 11/2019 Chen et al.
2019/0379821 A1 12/2019 Kobayashi et al.
2019/0379837 A1 12/2019 Kim et al.
2020/0045245 A1 2/2020 Van Os et al.
2020/0050906 A1 2/2020 Mathai
2020/0053288 A1 2/2020 Kim et al.
2020/0059605 A1 2/2020 Liu et al.
2020/0068121 A1 2/2020 Wang
2020/0082599 A1 3/2020 Manzari
2020/0104021 A1 4/2020 Bylenok et al.
2020/0105003 A1 4/2020 Stauber et al.
2020/0106952 A1 4/2020 Missig et al.
2020/0106965 A1 4/2020 Malia et al.
2020/0110443 A1 4/2020 Leong et al.
2020/0120378 A1 4/2020 Elliot
2020/0125037 A1 4/2020 Jo et al.
2020/0128191 A1 4/2020 Sun et al.
2020/0133206 A1 4/2020 Jo et al.
2020/0149921 A1 5/2020 Hoffman et al.
2020/0150836 A1 5/2020 Penha et al.
2020/0175975 A1 6/2020 Kong et al.
2020/0184478 A1 6/2020 Peled et al.
2020/0201540 A1 6/2020 Zambetti et al.
2020/0204725 A1 6/2020 Li
2020/0220914 A1 7/2020 Carrigan et al.
2020/0221020 A1 7/2020 Manzari et al.
2020/0236278 A1 7/2020 Yeung et al.
2020/0242788 A1 7/2020 Jacobs et al.
2020/0244879 A1 7/2020 Hohjoh
2020/0267267 A1 8/2020 Kim et al.
2020/0285379 A1 9/2020 George-Svahn
2020/0285806 A1 9/2020 Radakovitz et al.
2020/0302135 A1 9/2020 Nirmala
2020/0336660 A1 10/2020 Dong et al.
2020/0341610 A1 10/2020 Quintana et al.
2020/0342613 A1 10/2020 Altuev et al.
2020/0348827 A1 11/2020 Wilson et al.
2020/0356242 A1 11/2020 Wilson et al.
2020/0358963 A1 11/2020 Manzari et al.
2020/0382723 A1 12/2020 Pena et al.
2020/0410763 A1 12/2020 Hare et al.
2021/0012761 A1 1/2021 Song
2021/0014610 A1 1/2021 Carrigan et al.
2021/0027471 A1 1/2021 Cohen et al.
2021/0051275 A1 2/2021 Brown et al.
2021/0073741 A1 3/2021 Chaudhri et al.
2021/0081093 A1 3/2021 Yun et al.

(56) References Cited

U.S. PATENT DOCUMENTS

| | | | |
|---|---|---|---|
| 2021/0081450 | A1 | 3/2021 | Lopez |
| 2021/0092491 | A1 | 3/2021 | Carrigan et al. |
| 2021/0144422 | A1 | 5/2021 | Wagner et al. |
| 2021/0146838 | A1 | 5/2021 | Goseberg et al. |
| 2021/0152685 | A1 | 5/2021 | Li |
| 2021/0160431 | A1 | 5/2021 | Chen et al. |
| 2021/0168300 | A1 | 6/2021 | Wang et al. |
| 2021/0173431 | A1 | 6/2021 | Yang et al. |
| 2021/0193187 | A1 | 6/2021 | Phillips et al. |
| 2021/0195093 | A1 | 6/2021 | Manzari et al. |
| 2021/0201953 | A1 | 7/2021 | Takahashi et al. |
| 2021/0203765 | A1 | 7/2021 | Yang et al. |
| 2021/0208741 | A1 | 7/2021 | Yang et al. |
| 2021/0227145 | A1 | 7/2021 | Kasugai |
| 2021/0248371 | A1 | 8/2021 | Carter et al. |
| 2021/0263962 | A1 | 8/2021 | Chang et al. |
| 2021/0266447 | A1 | 8/2021 | Ding et al. |
| 2021/0272253 | A1 | 9/2021 | Lin et al. |
| 2021/0279409 | A1 | 9/2021 | Karunamuni et al. |
| 2021/0281746 | A1 | 9/2021 | Fleizach et al. |
| 2021/0286510 | A1 | 9/2021 | Tyler et al. |
| 2021/0304629 | A1 | 9/2021 | Barron et al. |
| 2021/0344845 | A1 | 11/2021 | Li et al. |
| 2021/0373750 | A1 | 12/2021 | Manzari et al. |
| 2021/0389850 | A1 | 12/2021 | Charlton et al. |
| 2021/0389868 | A1 | 12/2021 | Crowder |
| 2021/0397338 | A1 | 12/2021 | Davydov et al. |
| 2022/0006946 | A1 | 1/2022 | Missig et al. |
| 2022/0047918 | A1 | 2/2022 | Williams et al. |
| 2022/0050867 | A1 | 2/2022 | Waller |
| 2022/0053126 | A1 | 2/2022 | Zhao et al. |
| 2022/0053142 | A1 | 2/2022 | Manzari et al. |
| 2022/0057984 | A1 | 2/2022 | Yang et al. |
| 2022/0070385 | A1 | 3/2022 | Van Os et al. |
| 2022/0078294 | A1 | 3/2022 | Kim et al. |
| 2022/0078506 | A1 | 3/2022 | Sanders et al. |
| 2022/0086336 | A1 | 3/2022 | Zhang |
| 2022/0103758 | A1 | 3/2022 | Manzari et al. |
| 2022/0124241 | A1 | 4/2022 | Manzari et al. |
| 2022/0129858 | A1 | 4/2022 | Chaudhri et al. |
| 2022/0134226 | A1 | 5/2022 | Takura et al. |
| 2022/0138913 | A1 | 5/2022 | Huang et al. |
| 2022/0179665 | A1 | 6/2022 | Rathod |
| 2022/0207838 | A1 | 6/2022 | Anvaripour et al. |
| 2022/0210328 | A1 | 6/2022 | Anvaripour et al. |
| 2022/0210337 | A1 | 6/2022 | Anvaripour et al. |
| 2022/0217253 | A1 | 7/2022 | Tian et al. |
| 2022/0217275 | A1 | 7/2022 | Fan |
| 2022/0224828 | A1 | 7/2022 | Lim et al. |
| 2022/0240408 | A1 | 7/2022 | Faulkner et al. |
| 2022/0256068 | A1 | 8/2022 | Geiss et al. |
| 2022/0262022 | A1 | 8/2022 | Stauber et al. |
| 2022/0264028 | A1 | 8/2022 | Manzari et al. |
| 2022/0269887 | A1 | 8/2022 | Chee et al. |
| 2022/0276041 | A1 | 9/2022 | Dryer et al. |
| 2022/0279116 | A1 | 9/2022 | Zhou |
| 2022/0291793 | A1 | 9/2022 | Zambetti et al. |
| 2022/0294992 | A1 | 9/2022 | Manzari et al. |
| 2022/0319100 | A1 | 10/2022 | Manzari et al. |
| 2022/0319493 | A1 | 10/2022 | Ohishi et al. |
| 2022/0321797 | A1 | 10/2022 | Bian et al. |
| 2022/0334683 | A1 | 10/2022 | Paul et al. |
| 2022/0334693 | A1 | 10/2022 | De Vries et al. |
| 2022/0337741 | A1 | 10/2022 | Paul et al. |
| 2022/0353425 | A1 | 11/2022 | Manzari et al. |
| 2022/0377248 | A1 | 11/2022 | Minifie et al. |
| 2022/0382440 | A1 | 12/2022 | Manzari et al. |
| 2022/0382443 | A1 | 12/2022 | Clarke et al. |
| 2022/0391603 | A1 | 12/2022 | Pham et al. |
| 2022/0394190 | A1 | 12/2022 | Cui et al. |
| 2022/0408020 | A1 | 12/2022 | Zhang |
| 2022/0417416 | A1 | 12/2022 | Li et al. |
| 2023/0007186 | A1 | 1/2023 | Li et al. |
| 2023/0016178 | A1 | 1/2023 | Ma et al. |
| 2023/0018557 | A1 | 1/2023 | Jiang |
| 2023/0020616 | A1 | 1/2023 | Manzari et al. |
| 2023/0052490 | A1 | 2/2023 | Chaudhri et al. |
| 2023/0066552 | A1 | 3/2023 | Van Os et al. |
| 2023/0081664 | A1 | 3/2023 | Li |
| 2023/0082876 | A1 | 3/2023 | Guzman et al. |
| 2023/0087879 | A1 | 3/2023 | An et al. |
| 2023/0098395 | A1 | 3/2023 | O'Leary et al. |
| 2023/0115929 | A1 | 4/2023 | Bian et al. |
| 2023/0116044 | A1 | 4/2023 | Han |
| 2023/0118567 | A1 | 4/2023 | Manzari et al. |
| 2023/0136913 | A1 | 5/2023 | Zhao et al. |
| 2023/0156144 | A1 | 5/2023 | Cui |
| 2023/0156316 | A1 | 5/2023 | Kang et al. |
| 2023/0164427 | A1 | 5/2023 | Lu et al. |
| 2023/0179856 | A1 | 6/2023 | Shin |
| 2023/0188831 | A1 | 6/2023 | Hyun et al. |
| 2023/0188861 | A1 | 6/2023 | Bian |
| 2023/0209179 | A1 | 6/2023 | Manzari et al. |
| 2023/0214107 | A1 | 7/2023 | Zambetti et al. |
| 2023/0217097 | A1 | 7/2023 | Wu et al. |
| 2023/0217098 | A1 | 7/2023 | Wang et al. |
| 2023/0224575 | A1 | 7/2023 | Ding et al. |
| 2023/0229279 | A1 | 7/2023 | Paul et al. |
| 2023/0252659 | A1 | 8/2023 | Stauber et al. |
| 2023/0254573 | A1 | 8/2023 | Manzari et al. |
| 2023/0262317 | A1 | 8/2023 | O'Leary et al. |
| 2023/0291824 | A1 | 9/2023 | Yang et al. |
| 2023/0308742 | A1 | 9/2023 | Lin et al. |
| 2023/0308743 | A1 | 9/2023 | Ku et al. |
| 2023/0308778 | A1 | 9/2023 | Yang |
| 2023/0319224 | A1 | 10/2023 | Manzari et al. |
| 2023/0319394 | A1 | 10/2023 | Manzari et al. |
| 2023/0325989 | A1 | 10/2023 | Zhao |
| 2023/0328429 | A1 | 10/2023 | Bian |
| 2023/0333704 | A1 | 10/2023 | Chen |
| 2023/0334432 | A1 | 10/2023 | Chaudhri et al. |
| 2023/0336865 | A1 | 10/2023 | Da Veiga et al. |
| 2023/0345110 | A1 | 10/2023 | Yi et al. |
| 2023/0345113 | A1 | 10/2023 | Liu |
| 2023/0353862 | A1 | 11/2023 | Yi et al. |
| 2023/0359314 | A1 | 11/2023 | Karunamuni |
| 2023/0359315 | A1 | 11/2023 | Karunamuni et al. |
| 2023/0359316 | A1 | 11/2023 | Karunamuni |
| 2023/0367472 | A1 | 11/2023 | Clarke et al. |
| 2023/0370507 | A1 | 11/2023 | Chang et al. |
| 2023/0379427 | A1 | 11/2023 | Manzari et al. |
| 2023/0393705 | A1 | 12/2023 | Krenn |
| 2023/0393714 | A1 | 12/2023 | Giuliani |
| 2023/0393865 | A1 | 12/2023 | Fleizach et al. |
| 2023/0418426 | A1 | 12/2023 | Karunamuni |
| 2024/0040198 | A1 | 2/2024 | Carrigan et al. |
| 2024/0078375 | A1 | 3/2024 | Karunamuni et al. |
| 2024/0080543 | A1 | 3/2024 | Manzari et al. |
| 2024/0168626 | A1 | 5/2024 | Davydov et al. |
| 2024/0220009 | A1 | 7/2024 | Dryer et al. |
| 2024/0256100 | A1 | 8/2024 | Paul et al. |
| 2024/0259638 | A1 | 8/2024 | Carrigan et al. |
| 2024/0259669 | A1 | 8/2024 | Missig et al. |
| 2024/0259670 | A1 | 8/2024 | Manzari et al. |
| 2024/0284037 | A1 | 8/2024 | Manzari et al. |
| 2024/0310982 | A1 | 9/2024 | Chaudhri et al. |
| 2024/0316404 | A1 | 9/2024 | Williams et al. |
| 2024/0361898 | A1 | 10/2024 | Ardaud et al. |
| 2024/0406304 | A1 | 12/2024 | Foss et al. |
| 2024/0422425 | A1 | 12/2024 | Che et al. |
| 2024/0430564 | A1 | 12/2024 | Manzari et al. |
| 2025/0022211 | A1 | 1/2025 | Manzari et al. |
| 2025/0024133 | A1 | 1/2025 | Manzari et al. |
| 2025/0088734 | A1 | 3/2025 | Manzari et al. |
| 2025/0093947 | A1 | 3/2025 | Bedard et al. |
| 2025/0110574 | A1 | 4/2025 | Alonso et al. |
| 2025/0113094 | A1 | 4/2025 | Alonso et al. |
| 2025/0113095 | A1 | 4/2025 | Alonso et al. |
| 2025/0153004 | A1 | 5/2025 | Williams et al. |
| 2025/0165134 | A1 | 5/2025 | Wilson et al. |
| 2025/0165136 | A1 | 5/2025 | Zambetti et al. |
| 2025/0165930 | A1 | 5/2025 | Chaudhri et al. |
| 2025/0168456 | A1 | 5/2025 | Carrigan et al. |
| 2025/0238127 | A1 | 7/2025 | Alonso et al. |

(56) References Cited

U.S. PATENT DOCUMENTS

| | | | |
|---|---|---|---|
| 2025/0238128 | A1 | 7/2025 | Manzari et al. |
| 2025/0240516 | A1 | 7/2025 | Zumbrunnen et al. |
| 2025/0264984 | A1 | 8/2025 | Tanner et al. |
| 2025/0315796 | A1 | 10/2025 | Chaudhri et al. |

FOREIGN PATENT DOCUMENTS

| | | | |
|---|---|---|---|
| CA | 2781636 | A1 | 7/2010 |
| CA | 2729392 | A1 | 8/2011 |
| CA | 2729388 | A1 | 9/2011 |
| CA | 2792987 | A1 | 10/2011 |
| CA | 2965700 | A1 | 5/2016 |
| CA | 2729392 | C | 5/2017 |
| CA | 2965925 | A1 | 3/2018 |
| CH | 707412 | A2 | 6/2014 |
| CN | 1437365 | A | 8/2003 |
| CN | 1499878 | A | 5/2004 |
| CN | 1558690 | A | 12/2004 |
| CN | 1705346 | A | 12/2005 |
| CN | 1901717 | A | 1/2007 |
| CN | 1997957 | A | 7/2007 |
| CN | 101042618 | A | 9/2007 |
| CN | 101098535 | A | 1/2008 |
| CN | 101118469 | A | 2/2008 |
| CN | 101203821 | A | 6/2008 |
| CN | 101232528 | A | 7/2008 |
| CN | 101243383 | A | 8/2008 |
| CN | 101282422 | A | 10/2008 |
| CN | 101300830 | A | 11/2008 |
| CN | 101310519 | A | 11/2008 |
| CN | 101355655 | A | 1/2009 |
| CN | 101364031 | A | 2/2009 |
| CN | 101382438 | A | 3/2009 |
| CN | 101427574 | A | 5/2009 |
| CN | 101533330 | A | 9/2009 |
| CN | 101576996 | A | 11/2009 |
| CN | 101609505 | A | 12/2009 |
| CN | 101620494 | A | 1/2010 |
| CN | 101627349 | A | 1/2010 |
| CN | 101627361 | A | 1/2010 |
| CN | 101681462 | A | 3/2010 |
| CN | 101702112 | A | 5/2010 |
| CN | 101778220 | A | 7/2010 |
| CN | 101819486 | A | 9/2010 |
| CN | 101872240 | A | 10/2010 |
| CN | 101873386 | A | 10/2010 |
| CN | 101883213 | A | 11/2010 |
| CN | 101910992 | A | 12/2010 |
| CN | 101931691 | A | 12/2010 |
| CN | 101943883 | A | 1/2011 |
| CN | 101978374 | A | 2/2011 |
| CN | 101981987 | A | 2/2011 |
| CN | 102012738 | A | 4/2011 |
| CN | 102063253 | A | 5/2011 |
| CN | 102084327 | A | 6/2011 |
| CN | 102088554 | A | 6/2011 |
| CN | 102163098 | A | 8/2011 |
| CN | 201928419 | U | 8/2011 |
| CN | 102272700 | A | 12/2011 |
| CN | 102301415 | A | 12/2011 |
| CN | 102369723 | A | 3/2012 |
| CN | 102375690 | A | 3/2012 |
| CN | 102426490 | A | 4/2012 |
| CN | 102428655 | A | 4/2012 |
| CN | 102430244 | A | 5/2012 |
| CN | 102438092 | A | 5/2012 |
| CN | 102446059 | A | 5/2012 |
| CN | 102446435 | A | 5/2012 |
| CN | 102449560 | A | 5/2012 |
| CN | 102449561 | A | 5/2012 |
| CN | 102450040 | A | 5/2012 |
| CN | 102455860 | A | 5/2012 |
| CN | 102457661 | A | 5/2012 |
| CN | 102474560 | A | 5/2012 |
| CN | 202309894 | U | 7/2012 |
| CN | 202330968 | U | 7/2012 |
| CN | 102687176 | A | 9/2012 |
| CN | 102695302 | A | 9/2012 |
| CN | 102754071 | A | 10/2012 |
| CN | 102763066 | A | 10/2012 |
| CN | 102769705 | A | 11/2012 |
| CN | 102772211 | A | 11/2012 |
| CN | 102790826 | A | 11/2012 |
| CN | 102800045 | A | 11/2012 |
| CN | 102855079 | A | 1/2013 |
| CN | 102859480 | A | 1/2013 |
| CN | 102981727 | A | 3/2013 |
| CN | 102982401 | A | 3/2013 |
| CN | 102984342 | A | 3/2013 |
| CN | 102989159 | A | 3/2013 |
| CN | 103003668 | A | 3/2013 |
| CN | 103051837 | A | 4/2013 |
| CN | 103051841 | A | 4/2013 |
| CN | 103052961 | A | 4/2013 |
| CN | 103092469 | A | 5/2013 |
| CN | 103297719 | A | 9/2013 |
| CN | 103309602 | A | 9/2013 |
| CN | 103324329 | A | 9/2013 |
| CN | 103399480 | A | 11/2013 |
| CN | 103399750 | A | 11/2013 |
| CN | 203311163 | U | 11/2013 |
| CN | 103425451 | A | 12/2013 |
| CN | 103558916 | A | 2/2014 |
| CN | 103562832 | A | 2/2014 |
| CN | 103562841 | A | 2/2014 |
| CN | 103576902 | A | 2/2014 |
| CN | 103604272 | A | 2/2014 |
| CN | 103607660 | A | 2/2014 |
| CN | 103677618 | A | 3/2014 |
| CN | 103685925 | A | 3/2014 |
| CN | 103702039 | A | 4/2014 |
| CN | 103713843 | A | 4/2014 |
| CN | 103744671 | A | 4/2014 |
| CN | 103777742 | A | 5/2014 |
| CN | 103793075 | A | 5/2014 |
| CN | 103853493 | A | 6/2014 |
| CN | 103876721 | A | 6/2014 |
| CN | 103902165 | A | 7/2014 |
| CN | 103970472 | A | 8/2014 |
| CN | 104102388 | A | 10/2014 |
| CN | 104160362 | A | 11/2014 |
| CN | 104205785 | A | 12/2014 |
| CN | 104281257 | A | 1/2015 |
| CN | 104288983 | A | 1/2015 |
| CN | 104346080 | A | 2/2015 |
| CN | 104346099 | A | 2/2015 |
| CN | 104360735 | A | 2/2015 |
| CN | 104423946 | A | 3/2015 |
| CN | 104434314 | A | 3/2015 |
| CN | 104461288 | A | 3/2015 |
| CN | 104464010 | A | 3/2015 |
| CN | 104469512 | A | 3/2015 |
| CN | 104508426 | A | 4/2015 |
| CN | 104581043 | A | 4/2015 |
| CN | 104618672 | A | 5/2015 |
| CN | 104781773 | A | 7/2015 |
| CN | 104813322 | A | 7/2015 |
| CN | 104836947 | A | 8/2015 |
| CN | 104917794 | A | 9/2015 |
| CN | 105049726 | A | 11/2015 |
| CN | 105138259 | A | 12/2015 |
| CN | 105183442 | A | 12/2015 |
| CN | 105190511 | A | 12/2015 |
| CN | 105229571 | A | 1/2016 |
| CN | 105260078 | A | 1/2016 |
| CN | 105338256 | A | 2/2016 |
| CN | 105474163 | A | 4/2016 |
| CN | 105554516 | A | 5/2016 |
| CN | 105589637 | A | 5/2016 |
| CN | 105620393 | A | 6/2016 |
| CN | 105630290 | A | 6/2016 |
| CN | 105637855 | A | 6/2016 |
| CN | 105654532 | A | 6/2016 |
| CN | 105765967 | A | 7/2016 |

(56) References Cited

FOREIGN PATENT DOCUMENTS

| | | | |
|---|---|---|---|
| CN | 105847746 | A | 8/2016 |
| CN | 105981372 | A | 9/2016 |
| CN | 205608658 | U | 9/2016 |
| CN | 105991915 | A | 10/2016 |
| CN | 106104448 | A | 11/2016 |
| CN | 106161956 | A | 11/2016 |
| CN | 1106067947 | A | 11/2016 |
| CN | 106210184 | A | 12/2016 |
| CN | 106210550 | A | 12/2016 |
| CN | 106257909 | A | 12/2016 |
| CN | 106303280 | A | 1/2017 |
| CN | 106341611 | A | 1/2017 |
| CN | 106375662 | A | 2/2017 |
| CN | 106412214 | A | 2/2017 |
| CN | 106412412 | A | 2/2017 |
| CN | 106412445 | A | 2/2017 |
| CN | 106445219 | A | 2/2017 |
| CN | 106572326 | A | 4/2017 |
| CN | 106791357 | A | 5/2017 |
| CN | 106791377 | A | 5/2017 |
| CN | 106791420 | A | 5/2017 |
| CN | 106878676 | A | 6/2017 |
| CN | 106921829 | A | 7/2017 |
| CN | 107077274 | A | 8/2017 |
| CN | 107079141 | A | 8/2017 |
| CN | 107566721 | A | 1/2018 |
| CN | 107580693 | A | 1/2018 |
| CN | 107613235 | A | 1/2018 |
| CN | 107637073 | A | 1/2018 |
| CN | 107710135 | A | 2/2018 |
| CN | 107770448 | A | 3/2018 |
| CN | 107800945 | A | 3/2018 |
| CN | 107819928 | A | 3/2018 |
| CN | 107820011 | A | 3/2018 |
| CN | 107924113 | A | 4/2018 |
| CN | 108174096 | A | 6/2018 |
| CN | 108196761 | A | 6/2018 |
| CN | 108319629 | A | 7/2018 |
| CN | 108353126 | A | 7/2018 |
| CN | 108391053 | A | 8/2018 |
| CN | 108419019 | A | 8/2018 |
| CN | 108513070 | A | 9/2018 |
| CN | 108549522 | A | 9/2018 |
| CN | 108600610 | A | 9/2018 |
| CN | 108668083 | A | 10/2018 |
| CN | 108848308 | A | 11/2018 |
| CN | 108886569 | A | 11/2018 |
| CN | 109005366 | A | 12/2018 |
| CN | 109061985 | A | 12/2018 |
| CN | 109313530 | A | 2/2019 |
| CN | 109496425 | A | 3/2019 |
| CN | 105338244 | B | 4/2019 |
| CN | 109639970 | A | 4/2019 |
| CN | 109644217 | A | 4/2019 |
| CN | 109644229 | A | 4/2019 |
| CN | 109769396 | A | 5/2019 |
| CN | 110678832 | A | 1/2020 |
| CN | 111034164 | A | 4/2020 |
| CN | 111108740 | A | 5/2020 |
| CN | 111142724 | A | 5/2020 |
| CN | 111860479 | A | 10/2020 |
| CN | 115696026 | A | 2/2023 |
| DE | 202017002874 | U1 | 9/2017 |
| DK | 201670753 | A1 | 1/2018 |
| DK | 201670755 | A1 | 1/2018 |
| DK | 201670627 | A1 | 2/2018 |
| EP | 0257972 | A2 | 3/1988 |
| EP | 0651543 | A2 | 5/1995 |
| EP | 0651543 | A3 | 12/1997 |
| EP | 0831629 | A2 | 3/1998 |
| EP | 1079371 | A1 | 2/2001 |
| EP | 1278099 | A1 | 1/2003 |
| EP | 1659504 | A2 | 5/2006 |
| EP | 1674977 | A2 | 6/2006 |
| EP | 1679879 | A2 | 7/2006 |

| | | | |
|---|---|---|---|
| EP | 1777611 | A1 | 4/2007 |
| EP | 1832969 | A2 | 9/2007 |
| EP | 1885109 | A2 | 2/2008 |
| EP | 1953663 | A1 | 8/2008 |
| EP | 651543 | B1 | 9/2008 |
| EP | 2040146 | A2 | 3/2009 |
| EP | 2194508 | A1 | 6/2010 |
| EP | 2194698 | A1 | 6/2010 |
| EP | 2204702 | A1 | 7/2010 |
| EP | 2284646 | A1 | 2/2011 |
| EP | 2302493 | A2 | 3/2011 |
| EP | 2312512 | A1 | 4/2011 |
| EP | 2360902 | A2 | 8/2011 |
| EP | 2367098 | A2 | 9/2011 |
| EP | 2394711 | A1 | 12/2011 |
| EP | 2407219 | A2 | 1/2012 |
| EP | 2413577 | A2 | 2/2012 |
| EP | 2423810 | A1 | 2/2012 |
| EP | 2430766 | A2 | 3/2012 |
| EP | 2437148 | A2 | 4/2012 |
| EP | 2454872 | A1 | 5/2012 |
| EP | 2482179 | A2 | 8/2012 |
| EP | 2487613 | A1 | 8/2012 |
| EP | 2487913 | A2 | 8/2012 |
| EP | 2430766 | A4 | 12/2012 |
| EP | 2547117 | A1 | 1/2013 |
| EP | 2579572 | A1 | 4/2013 |
| EP | 2602759 | A2 | 6/2013 |
| EP | 2615607 | A2 | 7/2013 |
| EP | 2640060 | A1 | 9/2013 |
| EP | 2653961 | A1 | 10/2013 |
| EP | 2677775 | A1 | 12/2013 |
| EP | 2682855 | A2 | 1/2014 |
| EP | 2693382 | A2 | 2/2014 |
| EP | 2703972 | A1 | 3/2014 |
| EP | 2720126 | A1 | 4/2014 |
| EP | 2733598 | A2 | 5/2014 |
| EP | 2738640 | A2 | 6/2014 |
| EP | 2742404 | A2 | 6/2014 |
| EP | 2821912 | A1 | 1/2015 |
| EP | 2830297 | A1 | 1/2015 |
| EP | 1826724 | B1 | 3/2015 |
| EP | 2843530 | A1 | 3/2015 |
| EP | 2950198 | A1 | 12/2015 |
| EP | 2966855 | A2 | 1/2016 |
| EP | 2972677 | A1 | 1/2016 |
| EP | 2430766 | B1 | 3/2016 |
| EP | 2993602 | A1 | 3/2016 |
| EP | 2998822 | A2 | 3/2016 |
| EP | 3008575 | A1 | 4/2016 |
| EP | 3012732 | A1 | 4/2016 |
| EP | 3033837 | A1 | 6/2016 |
| EP | 3041229 | A1 | 7/2016 |
| EP | 3033837 | A4 | 3/2017 |
| EP | 3217341 | A1 | 9/2017 |
| EP | 2194508 | B1 | 12/2017 |
| EP | 3333544 | A1 | 6/2018 |
| EP | 3033837 | B1 | 10/2018 |
| EP | 3393119 | A1 | 10/2018 |
| EP | 3135028 | B1 | 1/2019 |
| EP | 3420441 | A1 | 1/2019 |
| EP | 2482179 | B1 | 3/2019 |
| EP | 3457680 | A1 | 3/2019 |
| EP | 3460770 | A1 | 3/2019 |
| EP | 3012732 | B1 | 5/2019 |
| EP | 3008575 | B1 | 7/2019 |
| EP | 3579093 | A1 | 12/2019 |
| EP | 3633975 | A1 | 4/2020 |
| EP | 3736676 | A1 | 11/2020 |
| EP | 3751405 | A1 | 12/2020 |
| EP | 2682855 | B1 | 2/2021 |
| EP | 3833002 | A1 | 6/2021 |
| EP | 3958101 | A1 | 2/2022 |
| EP | 4134799 | A1 | 2/2023 |
| EP | 3633975 | B1 | 5/2023 |
| EP | 4195658 | A1 | 6/2023 |
| GB | 2307383 | A | 5/1997 |
| GB | 2370208 | A | 6/2002 |
| GB | 2475669 | A | 6/2011 |

(56) References Cited

FOREIGN PATENT DOCUMENTS

| | | | |
|---|---|---|---|
| GB | 2515797 | A | 1/2015 |
| GB | 2523670 | A | 9/2015 |
| JP | 2-179078 | A | 7/1990 |
| JP | 3-129573 | A | 6/1991 |
| JP | 5-90390 | U | 12/1993 |
| JP | 6-215092 | A | 8/1994 |
| JP | 8-110955 | A | 4/1996 |
| JP | 8-285964 | A | 11/1996 |
| JP | 9-116792 | A | 5/1997 |
| JP | 9-179998 | A | 7/1997 |
| JP | 9-251084 | A | 9/1997 |
| JP | 11-160470 | A | 6/1999 |
| JP | 11-232013 | A | 8/1999 |
| JP | 11-355617 | A | 12/1999 |
| JP | 2000-122957 | A | 4/2000 |
| JP | 2000-207549 | A | 7/2000 |
| JP | 2000-224542 | A | 8/2000 |
| JP | 2000-241199 | A | 9/2000 |
| JP | 2000-244905 | A | 9/2000 |
| JP | 2001-101259 | A | 4/2001 |
| JP | 2001-245204 | A | 9/2001 |
| JP | 2001-298649 | A | 10/2001 |
| JP | 2001-318852 | A | 11/2001 |
| JP | 2002-507718 | A | 3/2002 |
| JP | 2002-271451 | A | 9/2002 |
| JP | 2002-342356 | A | 11/2002 |
| JP | 2002-351768 | A | 12/2002 |
| JP | 2003-8964 | A | 1/2003 |
| JP | 2003-18438 | A | 1/2003 |
| JP | 2003-30245 | A | 1/2003 |
| JP | 2003-32597 | A | 1/2003 |
| JP | 2003-228780 | A | 8/2003 |
| JP | 2003-241293 | A | 8/2003 |
| JP | 2003-248549 | A | 9/2003 |
| JP | 2004-15595 | A | 1/2004 |
| JP | 2004-110559 | A | 4/2004 |
| JP | 2004-135074 | A | 4/2004 |
| JP | 2004-177148 | A | 6/2004 |
| JP | 2004-519033 | A | 6/2004 |
| JP | 2004-184396 | A | 7/2004 |
| JP | 2005-31466 | A | 2/2005 |
| JP | 2005-191641 | A | 7/2005 |
| JP | 2005-191985 | A | 7/2005 |
| JP | 2005-532607 | A | 10/2005 |
| JP | 2005-311699 | A | 11/2005 |
| JP | 2005-333294 | A | 12/2005 |
| JP | 2006-101505 | A | 4/2006 |
| JP | 3830956 | B1 | 10/2006 |
| JP | 2006-332809 | A | 12/2006 |
| JP | 2006-350819 | A | 12/2006 |
| JP | 3872041 | B2 | 1/2007 |
| JP | 2007-28211 | A | 2/2007 |
| JP | 2007-58663 | A | 3/2007 |
| JP | 2007-124279 | A | 5/2007 |
| JP | 2007-124398 | A | 5/2007 |
| JP | 2007-179302 | A | 7/2007 |
| JP | 2007-243275 | A | 9/2007 |
| JP | 2007-258869 | A | 10/2007 |
| JP | 2007-274017 | A | 10/2007 |
| JP | 2008-66978 | A | 3/2008 |
| JP | 2008-97202 | A | 4/2008 |
| JP | 2008-236534 | A | 10/2008 |
| JP | 2009-50471 | A | 3/2009 |
| JP | 2009-95030 | A | 4/2009 |
| JP | 2009-105919 | A | 5/2009 |
| JP | 2009-201127 | A | 9/2009 |
| JP | 2009-212899 | A | 9/2009 |
| JP | 2009-217816 | A | 9/2009 |
| JP | 2009-239867 | A | 10/2009 |
| JP | 2009-246468 | A | 10/2009 |
| JP | 2009-273023 | A | 11/2009 |
| JP | 2009-290782 | A | 12/2009 |
| JP | 2009-545256 | A | 12/2009 |
| JP | 2010-60355 | A | 3/2010 |
| JP | 2010-117444 | A | 5/2010 |
| JP | 2010-119147 | A | 5/2010 |
| JP | 2010-124181 | A | 6/2010 |
| JP | 2010-182023 | A | 8/2010 |
| JP | 3162246 | U | 8/2010 |
| JP | 2010-211166 | A | 9/2010 |
| JP | 2010-245940 | A | 10/2010 |
| JP | 2010-257051 | A | 11/2010 |
| JP | 2010-268052 | A | 11/2010 |
| JP | 2011-87167 | A | 4/2011 |
| JP | 2011-91570 | A | 5/2011 |
| JP | 2011-124864 | A | 6/2011 |
| JP | 3168099 | U | 6/2011 |
| JP | 2011-525648 | A | 9/2011 |
| JP | 2011-209786 | A | 10/2011 |
| JP | 2011-211552 | A | 10/2011 |
| JP | 2011-530101 | A | 12/2011 |
| JP | 2012015978 | A | 1/2012 |
| JP | 2012-44564 | A | 3/2012 |
| JP | 2012-505478 | A | 3/2012 |
| JP | 2012-73839 | A | 4/2012 |
| JP | 2012-79302 | A | 4/2012 |
| JP | 2012-89973 | A | 5/2012 |
| JP | 2012-123460 | A | 6/2012 |
| JP | 2012-123475 | A | 6/2012 |
| JP | 2012-147379 | A | 8/2012 |
| JP | 2012-147432 | A | 8/2012 |
| JP | 2012-517630 | A | 8/2012 |
| JP | 2012-203832 | A | 10/2012 |
| JP | 2012-247283 | A | 12/2012 |
| JP | 2012-253748 | A | 12/2012 |
| JP | 2012-531607 | A | 12/2012 |
| JP | 2013-9274 | A | 1/2013 |
| JP | 2013-506225 | A | 2/2013 |
| JP | 2013-58861 | A | 3/2013 |
| JP | 2013-70303 | A | 4/2013 |
| JP | 2013-106289 | A | 5/2013 |
| JP | 2013-530458 | A | 7/2013 |
| JP | 2013-175188 | A | 9/2013 |
| JP | 2013-225844 | A | 10/2013 |
| JP | 2013-541107 | A | 11/2013 |
| JP | 2013-546238 | A | 12/2013 |
| JP | 2014-23083 | A | 2/2014 |
| JP | 2014-503861 | A | 2/2014 |
| JP | 2014-60501 | A | 4/2014 |
| JP | 2014-107836 | A | 6/2014 |
| JP | 2014-123069 | A | 7/2014 |
| JP | 2014-123197 | A | 7/2014 |
| JP | 2014-212415 | A | 11/2014 |
| JP | 2015-1716 | A | 1/2015 |
| JP | 2015-5255 | A | 1/2015 |
| JP | 2015-22716 | A | 2/2015 |
| JP | 2015-25897 | A | 2/2015 |
| JP | 2015-50713 | A | 3/2015 |
| JP | 2015-76717 | A | 4/2015 |
| JP | 2015-91098 | A | 5/2015 |
| JP | 2015-104031 | A | 6/2015 |
| JP | 2015-111822 | A | 6/2015 |
| JP | 2015-125671 | A | 7/2015 |
| JP | 2015-520456 | A | 7/2015 |
| JP | 2015-149095 | A | 8/2015 |
| JP | 2015-210587 | A | 11/2015 |
| JP | 2015-228009 | A | 12/2015 |
| JP | 2015-534742 | A | 12/2015 |
| JP | 2016-39613 | A | 3/2016 |
| JP | 2016-66978 | A | 4/2016 |
| JP | 2016-72953 | A | 5/2016 |
| JP | 2016-72965 | A | 5/2016 |
| JP | 2016-100791 | A | 5/2016 |
| JP | 2016-119600 | A | 6/2016 |
| JP | 2016-519377 | A | 6/2016 |
| JP | 2016-129315 | A | 7/2016 |
| JP | 2016-175175 | A | 10/2016 |
| JP | 2017-34474 | A | 2/2017 |
| JP | 2017-508195 | A | 3/2017 |
| JP | 2017-84253 | A | 5/2017 |
| JP | 2017-513143 | A | 5/2017 |
| JP | 2017-521737 | A | 8/2017 |
| JP | 2017-158202 | A | 9/2017 |
| JP | 2017-173998 | A | 9/2017 |

(56) References Cited

FOREIGN PATENT DOCUMENTS

| | | | |
|---|---|---|---|
| JP | 2018-10488 | A | 1/2018 |
| JP | 2018-63826 | A | 4/2018 |
| JP | 2018-107711 | A | 7/2018 |
| JP | 2018-117186 | A | 7/2018 |
| JP | 2018-121235 | A | 8/2018 |
| JP | 2018-128955 | A | 8/2018 |
| JP | 2019-507928 | A | 3/2019 |
| JP | 2019-62556 | A | 4/2019 |
| JP | 2019-203399 | A | 11/2019 |
| JP | 2020-42602 | A | 3/2020 |
| JP | 2020-57204 | A | 4/2020 |
| JP | 6982047 | B2 | 11/2021 |
| KR | 20-0425314 | Y1 | 9/2006 |
| KR | 10-0810379 | B1 | 3/2008 |
| KR | 20-2008-0004775 | U | 10/2008 |
| KR | 10-2009-0096833 | A | 9/2009 |
| KR | 10-2011-0013653 | A | 2/2011 |
| KR | 10-2011-0093040 | A | 8/2011 |
| KR | 10-2012-0003537 | A | 1/2012 |
| KR | 10-2012-0004928 | A | 1/2012 |
| KR | 10-2012-0025872 | A | 3/2012 |
| KR | 10-2012-0048397 | A | 5/2012 |
| KR | 10-2012-0054406 | A | 5/2012 |
| KR | 10-2012-0057696 | A | 6/2012 |
| KR | 10-2012-0093322 | A | 8/2012 |
| KR | 10-2013-0033445 | A | 4/2013 |
| KR | 10-1341095 | B1 | 12/2013 |
| KR | 10-1343591 | B1 | 12/2013 |
| KR | 10-1352713 | B1 | 1/2014 |
| KR | 10-2014-0019631 | A | 2/2014 |
| KR | 10-2014-0049850 | A | 4/2014 |
| KR | 10-2014-0062801 | A | 5/2014 |
| KR | 10-2014-0064687 | A | 5/2014 |
| KR | 10-2014-0073232 | A | 6/2014 |
| KR | 10-2014-0074824 | A | 6/2014 |
| KR | 10-2015-0001287 | A | 1/2015 |
| KR | 10-2015-0014290 | A | 2/2015 |
| KR | 10-2015-0043146 | A | 4/2015 |
| KR | 10-1522311 | B1 | 5/2015 |
| KR | 10-2015-0135844 | A | 12/2015 |
| KR | 10-2016-0019145 | A | 2/2016 |
| KR | 10-2016-0019760 | A | 2/2016 |
| KR | 10-2016-0020396 | A | 2/2016 |
| KR | 10-2016-0020791 | A | 2/2016 |
| KR | 10-2016-0075583 | A | 6/2016 |
| KR | 10-1674959 | B1 | 11/2016 |
| KR | 10-2017-0123125 | A | 11/2017 |
| KR | 10-1799223 | B1 | 11/2017 |
| KR | 10-2017-0135975 | A | 12/2017 |
| KR | 10-2018-0024761 | A | 3/2018 |
| KR | 10-2018-0037076 | A | 4/2018 |
| KR | 10-2018-0095331 | A | 8/2018 |
| KR | 10-2018-0108847 | A | 10/2018 |
| KR | 10-2018-0116574 | A | 10/2018 |
| KR | 10-2018-0137610 | A | 12/2018 |
| KR | 10-1939253 | | 1/2019 |
| KR | 10-2019-0034248 | A | 4/2019 |
| KR | 10-2020-0001601 | A | 1/2020 |
| KR | 10-2020-0127928 | A | 11/2020 |
| KR | 10-2020-0130139 | A | 11/2020 |
| KR | 10-2020-0140378 | A | 12/2020 |
| SG | 130285 | A1 | 4/2007 |
| TW | D144158 | S | 12/2011 |
| TW | M435665 | U1 | 8/2012 |
| TW | 201419115 | A | 5/2014 |
| WO | 99/39307 | A1 | 8/1999 |
| WO | 99/66394 | A1 | 12/1999 |
| WO | 99/66395 | A2 | 12/1999 |
| WO | 01/71433 | A1 | 9/2001 |
| WO | 02/054157 | A1 | 7/2002 |
| WO | 03/058589 | A2 | 7/2003 |
| WO | 2004/047440 | A2 | 6/2004 |
| WO | 2004/056107 | A1 | 7/2004 |
| WO | 2004/095414 | A1 | 11/2004 |
| WO | 2005/043892 | A1 | 5/2005 |
| WO | 2005/103863 | A2 | 11/2005 |
| WO | 2005/109829 | A1 | 11/2005 |
| WO | 2006/012343 | A2 | 2/2006 |
| WO | 2006/094308 | A2 | 9/2006 |
| WO | 2006/112641 | A1 | 10/2006 |
| WO | 2006/094308 | A3 | 12/2006 |
| WO | 2007/018881 | A2 | 2/2007 |
| WO | 2007/102110 | A2 | 9/2007 |
| WO | 2007/126707 | A1 | 11/2007 |
| WO | 2008/014301 | A2 | 1/2008 |
| WO | 2008/020655 | A1 | 2/2008 |
| WO | 2008/086302 | A1 | 7/2008 |
| WO | 2009/078091 | A1 | 6/2009 |
| WO | 2009/085378 | A1 | 7/2009 |
| WO | 2009/123428 | A2 | 10/2009 |
| WO | 2010/017627 | A1 | 2/2010 |
| WO | 2010/059426 | A2 | 5/2010 |
| WO | 2010/077048 | A2 | 7/2010 |
| WO | 2010/102678 | A1 | 9/2010 |
| WO | 2010/077048 | A3 | 10/2010 |
| WO | 2010/129221 | A1 | 11/2010 |
| WO | 2010/131869 | A2 | 11/2010 |
| WO | 2010/134275 | A1 | 11/2010 |
| WO | 2011/000893 | A1 | 1/2011 |
| WO | 2011/007264 | A1 | 1/2011 |
| WO | 2010/131869 | A3 | 2/2011 |
| WO | 2011/041427 | A2 | 4/2011 |
| WO | 2010/059426 | A3 | 5/2011 |
| WO | 2011/062871 | A2 | 5/2011 |
| WO | 2011/084857 | A1 | 7/2011 |
| WO | 2011/084859 | A1 | 7/2011 |
| WO | 2011/126502 | A1 | 10/2011 |
| WO | 2011/128416 | A2 | 10/2011 |
| WO | 2011/149231 | A2 | 12/2011 |
| WO | 2012/001947 | A1 | 1/2012 |
| WO | 2012/006251 | A1 | 1/2012 |
| WO | 2012/019163 | A2 | 2/2012 |
| WO | 2012/051720 | A2 | 4/2012 |
| WO | 2011/130849 | A8 | 5/2012 |
| WO | 2012/127484 | A1 | 9/2012 |
| WO | 2012/128361 | A1 | 9/2012 |
| WO | 2012/161434 | A2 | 11/2012 |
| WO | 2012/166976 | A2 | 12/2012 |
| WO | 2013/048880 | A1 | 4/2013 |
| WO | 2013/051048 | A1 | 4/2013 |
| WO | 2013/097895 | A1 | 7/2013 |
| WO | 2013/111239 | A1 | 8/2013 |
| WO | 2013/135270 | A1 | 9/2013 |
| WO | 2013/136394 | A1 | 9/2013 |
| WO | 2013/169842 | A2 | 11/2013 |
| WO | 2013/169849 | A2 | 11/2013 |
| WO | 2013/169851 | A2 | 11/2013 |
| WO | 2013/169854 | A2 | 11/2013 |
| WO | 2013/169870 | A1 | 11/2013 |
| WO | 2013/169875 | A2 | 11/2013 |
| WO | 2013/169877 | A2 | 11/2013 |
| WO | 2013/169882 | A2 | 11/2013 |
| WO | 2013/173838 | A2 | 11/2013 |
| WO | 2014/024000 | A1 | 2/2014 |
| WO | 2014/066115 | A1 | 5/2014 |
| WO | 2014/078114 | A1 | 5/2014 |
| WO | 2014/081181 | A1 | 5/2014 |
| WO | 2014/088475 | A1 | 6/2014 |
| WO | 2014/105276 | A1 | 7/2014 |
| WO | 2014/105278 | A1 | 7/2014 |
| WO | 2014/105279 | A1 | 7/2014 |
| WO | 2014/109125 | A1 | 7/2014 |
| WO | 2014/143776 | A2 | 9/2014 |
| WO | 2014/159779 | A1 | 10/2014 |
| WO | 2014/159998 | A1 | 10/2014 |
| WO | 2014/160819 | A1 | 10/2014 |
| WO | 2014/165141 | A1 | 10/2014 |
| WO | 2014/200734 | A1 | 12/2014 |
| WO | 2014/200798 | A1 | 12/2014 |
| WO | 2015/023044 | A1 | 2/2015 |
| WO | 2015/026864 | A1 | 2/2015 |
| WO | 2015/034969 | A2 | 3/2015 |
| WO | 2015/080744 | A1 | 6/2015 |
| WO | 2015/085042 | A1 | 6/2015 |

(56) References Cited

FOREIGN PATENT DOCUMENTS

| | | | | |
|---|---|---|---|---|
| WO | 2015/105649 A1 | 7/2015 | | |
| WO | 2015/105763 A1 | 7/2015 | | |
| WO | 2015/112868 A1 | 7/2015 | | |
| WO | 2014/200798 A8 | 8/2015 | | |
| WO | 2015/183438 A1 | 12/2015 | | |
| WO | 2015/183828 A1 | 12/2015 | | |
| WO | 2015/187494 A1 | 12/2015 | | |
| WO | 2015/190666 A1 | 12/2015 | | |
| WO | 2016/022203 A1 | 2/2016 | | |
| WO | 2016/024440 A1 | 2/2016 | | |
| WO | 2016/028806 A1 | 2/2016 | | |
| WO | 2016/028807 A1 | 2/2016 | | |
| WO | 2016/028808 A1 | 2/2016 | | |
| WO | 2016/028809 A1 | 2/2016 | | |
| WO | 2016/036522 A2 | 3/2016 | | |
| WO | 2016/073804 A2 | 5/2016 | | |
| WO | 2016/079889 A1 | 5/2016 | | |
| WO | 2016/073804 A3 | 7/2016 | | |
| WO | 2016/144563 A1 | 9/2016 | | |
| WO | 2016/172619 A1 | 10/2016 | | |
| WO | 2016/200603 A1 | 12/2016 | | |
| WO | 2016/204936 A1 | 12/2016 | | |
| WO | 2016/208539 A1 | 12/2016 | | |
| WO | 2017/051605 A1 | 3/2017 | | |
| WO | 2017/058834 A1 | 4/2017 | | |
| WO | 2017/187573 A1 | 11/2017 | | |
| WO | 2017/218193 A1 | 12/2017 | | |
| WO | 2018/012395 A1 | 1/2018 | | |
| WO | 2018/048838 A1 | 3/2018 | | |
| WO | 2018/057267 A1 | 3/2018 | | |
| WO | 2018/057268 A1 | 3/2018 | | |
| WO | 2018/099037 A1 | 6/2018 | | |
| WO | 2018/144339 A2 | 8/2018 | | |
| WO | 2018/159864 A1 | 9/2018 | | |
| WO | 2018/222244 A1 | 12/2018 | | |
| WO | 2018/226264 A1 | 12/2018 | | |
| WO | 2019/050562 A1 | 3/2019 | | |
| WO | 2019/054999 A1 | 3/2019 | | |
| WO | 2019/067131 A1 | 4/2019 | | |
| WO | 2019/090653 A1 | 5/2019 | | |
| WO | 2019/118933 A1 | 6/2019 | | |
| WO | 2019/217148 A1 | 11/2019 | | |
| WO | 2021/093793 A1 | 5/2021 | | |
| WO | 2021/231412 A1 | 11/2021 | | |
| WO | 2024/001513 A1 | 1/2024 | | |
| WO | WO-2024186519 A1 * | 9/2024 | .......... | G06F 3/0487 |

OTHER PUBLICATIONS

Corrected Notice of Allowance received for U.S. Appl. No. 18/892,251, mailed on Mar. 20, 2026, 2 pages.
Notice of Allowance received for U.S. Appl. No. 18/892,251, mailed on Mar. 10, 2026, 8 pages.
Corrected Notice of Allowance received for U.S. Appl. No. 18/781,667, mailed on Feb. 13, 2026, 2 pages.
Corrected Notice of Allowance received for U.S. Appl. No. 18/892,251, mailed on Nov. 4, 2025, 2 pages.
Non-Final Office Action received for U.S. Appl. No. 18/896,881, mailed on Dec. 31, 2025, 15 pages.
Notice of Allowance received for U.S. Appl. No. 18/781,667, mailed on Jan. 27, 2026, 5 pages.
Applicant-Initiated Interview Summary received for U.S. Appl. No. 18/674,435, mailed on Sep. 29, 2025, 4 pages.
Applicant-Initiated Interview Summary received for U.S. Appl. No. 18/781,667. mailed on Sep. 15, 2025, 3 pages.
Applicant-Initiated Interview Summary received for U.S. Appl. No. 18/892,251, mailed on Sep. 17, 2025, 4 pages.
Board Opinion received for Chinese Patent Application No. 201810411708.4, mailed on Sep. 15, 2025, 4 pages (1 page of English Translation and 3 pages of Official Copy).
Corrected Notice of Allowance received for U.S. Appl. No. 18/167,625, mailed on Sep. 15, 2025, 4 pages.
Decision on Appeal received for U.S. Appl. No. 18/200,480, mailed on Sep. 26, 2025, 14 pages.
Decision to Grant received for Japanese Patent Application No. 2023-158354, mailed on Sep. 8, 2025, 3 pages (1 page of English Translation and 2 pages of Official Copy).
Intention to Grant received for European Patent Application No. 24203946.9, mailed on Sep. 5, 2025, 9 pages.
Non-Final-Office Action received for U.S. Appl. No. 18/428,549, maiied on Sep. 24, 2025, 13 pages.
Non-Final-Office Action received for U.S. Appl. No. 18/674,435, maiied on Sep. 10, 2025, 29 pages.
Notice of Allowance received for U.S. Appl. No. 17/992,789, mailed on Sep. 18, 2025 12 pages.
Notice of Allowance received for U.S. Appl. No. 18/167,625, mailed on Sep. 3, 2025, 10 pages.
Office Action received for Chinese Patent Application No. 202110766668.7, mailed on Aug. 27, 2025, 17 pages (10 pages of English Transiation and 7 pages of Official copy).
Decision to Grant received for European Patent Application No. 24182717.9, malled on Oct. 16, 2025, 4 pages.
Notice of Acceptance received for Australian Patent Application No. 2023282230, mailed on Oct. 17, 2025, 3 pages.
Notice of Acceptance received for Australian Patent Application No. 2024201515, mailed on Oct. 16, 2025, 4 pages.
Notice of Allowance received for U.S. Appl. No. 18/892,251, mailed on Oct. 22, 2025, 8 pages.
Office Action received for Korean Patent Application No. 10-2024-7003524, mailed on Sep. 26, 2025, 17 pages (7 pages of English Translation and 10 pages of Official Copy).
Office Action received for Korean Patent Application No. 10-2024-7018082, mailed on Oct. 16, 2025, 20 pages (9 pages of English Translation and 11 pages of Official Copy).
Applicant-Initiated Interview Summary received for U.S. Appl. No. 18/423,234, mailed on Jan. 2, 2025, 2 pages.
Applicant-Initiated Interview Summary received for U.S. Appl. No. 18/137,369, mailed on Mar. 7, 2025, 2 pages.
Casey Jonathan, "Galaxy S21 Ultra Tips For Editing Photos and Videos", Online available at: https://www.youtube.com/watch?v=CuymInn0ias, Feb. 12, 2021, 10 pages.
Corrected Notice of Allowance received for U.S. Appl. No. 17/116,938, mailed on Feb. 18, 2025, 2 pages.
Corrected Notice of Allowance received for U.S. Patent Application No. 18/211, 150, mailed on Feb. 20, 2025, 2 pages.
Corrected Notice of Allowance received for U.S. Appl. No. 18/589,265, mailed on Feb. 26, 2025, 2 pages.
Decision on Appeal received for U.S. Appl. No. 16/943,737, mailed on Mar. 4, 2025, 10 pages.
Decision on Appeal received for U.S. Appl. No. 18/119,789, mailed on Feb. 20, 2025, 16 pages.
Decision to Grant received for Japanese Patent Application No. 2024-001951, mailed on Jan. 7, 2025, 4 pages (2 pages of English Translation and 2 pages of Official Copy).
Extended European Search Report received for European Application No. 24182717.9, mailed on Jan. 31, 2025, 6 pages.
Non-Final Office Action received for U.S. Appl. No. 18/167,625, mailed on Feb. 12, 2025, 15 pages.
Notice of Allowance received for Chinese Patent Application No. 202110367834.6, mailed on Jan. 2, 2025, 4 pages (1 page of English Translation and 3 pages of Official Copy).
Notice of Allowance received for Chinese Patent Application No. 202311577936.6, mailed on Jan. 22, 2025, 4 pages (1 page of English Translation and 3 pages of Official Copy).
Notice of Allowance received for Korean Patent Application No. 10-2023-7002360, mailed on Feb. 5, 2025, 8 pages (2 pages of English Translation and 6 pages of Official Copy).
Notice of Allowance received for U.S. Appl. No. 17/116,938, mailed on Jan. 30, 2025, 5 pages.
Notice of Allowance received for U.S. Appl. No. 18/211,150, mailed on Jan. 15, 2025, 11 pages.
Notice of Allowance received for U.S. Appl. No. 18/211,150, mailed on Jan. 29, 2025, 2 pages.
Notice of Allowance received for U.S. Appl. No. 18/589,265, mailed on Feb. 18, 2025, 10 pages.

(56) References Cited

OTHER PUBLICATIONS

Notice of Hearing received for Indian Patent Application No. 202118021941, mailed on Feb. 21, 2025, 2 pages.
Notice of Hearing received for Indian Patent Application No. 202215010325, mailed on Feb. 18, 2025, 3 pages.
Office Action received for Australian Patent Application No. 2023214377, mailed on Jan. 17, 2025, 3 pages.
Office Action received for Australian Patent Application No. 2023285697, mailed on Dec. 16, 2024, 2 pages.
Office Action received for Australian Patent Application No. 2024200958, mailed on Dec. 20, 2024, 5 pages.
Office Action received for Chinese Patent Application No. 201980012481.9, mailed on Dec. 24, 2024, 17 pages (9 pages of English Translation and 8 pages of Official Copy).
Office Action received for Chinese Patent Application No. 201980012481.9, mailed on Feb. 26, 2025, 14 pages (1 page of English Translation and 13 pages of Official Copy).
Office Action received for Chinese Patent Application No. 202110356908.6, mailed on Jan. 25, 2025, 10 pages (5 pages of English Translation and 5 pages of Official Copy).
Office Action received for Chinese Patent Application No. 202110367769.7, mailed on Dec. 27, 2024, 22 pages (7 pages of English Translation and 15 pages of Official Copy).
Office Action received for Chinese Patent Application No. 202110369265.9, mailed on Dec. 27, 2024, 16 pages (5 pages of English Translation and 11 pages of Official Copy).
Office Action received for European Patent Application No. 21157252.4, mailed on Feb. 24, 2025, 6 pages.
Office Action received for Japanese Patent Application No. 2024-015643, mailed on Jan. 28, 2025, 3 pages (1 page of English Translation and 2 pages of Official Copy).
Office Action received for Japanese Patent Application No. 2024-033171, mailed on Feb. 25, 2025, 12 pages (6 pages of English Translation and 6 pages of Official Copy).
Office Action received for Japanese Patent Application No. 2024-049961, mailed on Feb. 28, 2025, 8 pages (4 pages of English Translation and 4 pages of Official Copy).
Record of Oral Hearing received for U.S. Appl. No. 16/943,737, mailed on Feb. 24, 2025, 22 pages.
Record of Oral Hearing received for U.S. Appl. No. 18/119,789, mailed on Feb. 23, 2025, 14 pages.
Xuetao, Yang, "WP7 version of the desktop clock literary style MetroTime trial", Online available at: https://tech.sina.com.cn/s/s/2012-02-24/09216764878.shtml, Feb. 24, 2012, 10 pages (6 pages of English Translation and 4 pages of Official Copy).
Applicant-Initiated Interview Summary received for U.S. Appl. No. 18/167,625 mailed on Aug. 1, 2025, 5 pages.
Applicant-Initiated Interview Summary received for U.S. Appl. No. 18/441,971 mailed on Jul. 15, 2025, 4 pages.
Board Decision received for Chinese Patent Appiication No. 202110368426.2, mailed on Ju. 2, 2025, 2 pages (1 page of English Translation and 1 page of Official Copy).
Corrected Notice of Allowance received for U.S. Appl. No. 16/943,737, mailed on Jun. 20, 2025, 3 pages.
Corrected Notice of Allowance received for U.S. Appl. No. 17/171,089, mailed on Jul. 15, 2025, 3 pages.
Corrected Notice of Allowance received for U.S. Appl. No. 18/441,971, mailed on Aug. 21, 2025, 2 pages.
Corrected Notice of Allowance received for U.S. Appl. No. 18/611,216, mailed on Aug. 11, 2025, 2 pages.
Corrected Notice of Allowance received for U.S. Appl. No. 18/611,216, mailed on Jul. 31, 2025, 5 pages.
Corrected Notice of Allowance received for U.S. Appl. No. 18/611,216, mailed on Jun. 24, 2025, 2 pages.
Decision to Grant received for Japanese Patent Application No. 2024-173257, maiied on Aug. 5, 2025, 3 pages (1 page of Engiish Translatiqn and 2 pages of Official Copy).
Extended European Search Report received for European Patent Application No. 25184608.9, maiied on Jul. 4, 2025, 9 pages.
Extended European Search Report received for European Patent Application No. 25172958.8, maiied on Jul. 23, 2025, 11 pages.
Final Office Action received for U.S. Appl. No. 18/167,625, maiied on Jun. 13, 2025, 16 pages.
"Focus—Bokeh Camera for Dual Lens", Available Online at: http://web.archive.org/web/20180908220222/http://focos.me/, Sep. 8, 2018, 7 pages.
Intention to Grant received for European Patent Application No. 20206196.6 mailed on Jul. 14, 2025, 10 pages.
Intention to Grant received for European Patent Application No. 23158566.2 mailed on Jul. 30, 2025, 9 pages.
Intentlon to Grant received for European Patent Application No. 23173036.7, mailed on Jun. 30, 2025. 9 pages.
Intentlon to Grant received for European Patent Application No. 24182717.9, mailed on Jun. 6, 2025, 8 pages.
International Search and Written Opinion received for PCT Patent Application No. PCT/US2025/010440, mailed on Jul. 4, 2025, 20 pages.
Non-Final Office Action received for U.S. Appl. No. 18/781,667, mailed on Jul. 1, 2025, 18 pages.
Non-Final Office Action received for U.S. Appl. No. 18/892,251, mailed on Jul. 11, 2025, 28 pages.
Notice of Allowance received for Chinese Patent Application No. 202110356908.6 mailed on Jul. 1, 2025, 2 pages (1 page of English Translation and 1 page of Official Copy).
Notice of Allowance received for Chinese Patent Application No. 202110368426.2, mailed on Jul. 7, 2025, 4 pages (1 page of English Translation and 3 page of Official Copy).
Notice of Allowance received for Japanese Patent Application No. 2024-033171, mailed on Jul. 18, 2025, 4 pages (1 page of English Translation and 3 page of Official Copy).
Notice of Allowance received for Japanese Patent Application No. 2024-532566, mailed on Jul. 13, 2025, 5 pages (1 page of English Translation and 4 page of Official Copy).
Notice of Allowance received for U.S. Appl. No. 16/943,737, mailed on Aug. 25, 2025, 5 pages.
Notice of Allowance received for U.S. Appl. No. 16/943,737, mailed on Jun. 3, 2025, 6 pages.
Notice of Allowance received for U.S. Appl. No. 17/181,089, mailed on Jul. 3, 2025, 12 pages.
Notice of Allowance received for U.S. Appl. No. 18/423,234, mailed on Aug. 11, 2025, 6 pages.
Notice of Allowance received for U.S. Appl. No. 18/441,971, mailed on Aug. 5, 2025, 11 pages.
Office Action received for Australian Patent Application No. 2023285892 maiied on Jul. 21, 2025, 5 pages.
Office Action received for Australian Patent Application No. 2024201515 maiied on May 28, 2025, 3 pages.
Office Action received for Chinese Patent Application No. 202010235395.9 maiied on May 31, 2025, 15 pages (7 page of English Translation and 8 page of Official Copy).
Office Action received for Chinese Patent Application No. 20218005364.7 maiied on May 30, 2025, 19 pages (9 page of English Translation and 10 page of Official Copy).
Office Action received for European Patent Application No. 20728854.9, mailed on Jun. 20, 2025, 6 pages.
Office Action received for European Patent Application No. 22188724.3, mailed on Jul. 24, 2025, 10 pages.
Office Action received for European Patent Application No. 24155758.6, mailed on May 28, 2025, 8 pages.
Office Action received for Japanese Patent Application No. 2023-158354, mailed on Jun. 03. 2025, 6 pages (3 pages of English Translation and 3 pages of Official Copy).
Office Action received for Japanese Patent Application No. 2024-110376, mailed on Jul. 18, 2025, 6 pages (3 pages of English Translation and 3 pages of Official Copy).
Office Action received for Korean Patent Application No. 10-2023-0125143, mailed on May 19, 2025, 9 pages (4 pages of English Translation and 5 pages of Official Copy).
Summons to Oral Proceedings received for European Patent Application No. 21165295.3, mailed on Jul. 21, 2025, 11 pages.
"Apple Previews Powerful Software Updates Designed for People With Disabilities", Available online at: https://www.apple.com/

(56) References Cited

OTHER PUBLICATIONS newsroom/2021/05/apple-previews-powerful-software-updates-designed-for-people-with-disabilities/, May 19, 2021, 10 pages.
amazon.com, "Visual ID on Echo Show", Online Available at: <https://www.amazon.com/b?ie=UTF8&node=23615589011>, retrieved on Aug. 16, 2023, 3 pages.
Applicant-Initiated Interview Summary received for U.S. Appl. No. 16/140,211, mailed on Feb. 13, 2020, 3 pages.
Applicant-Initiated Interview Summary received for U.S. Appl. No. 16/140,211, mailed on Sep. 3, 2020, 4 pages.
Applicant-Initiated Interview Summary received for U.S. Appl. No. 16/140,286, mailed on Feb. 20, 2020, 5 pages.
Applicant-Initiated Interview Summary received for U.S. Appl. No. 17/484,714, mailed on Apr. 28, 2022, 2 pages.
Applicant-Initiated Interview Summary received for U.S. Appl. No. 17/484,714, mailed on Nov. 10, 2022, 2 pages.
Applicant-Initiated Interview Summary received for U.S. Appl. No. 17/484,856, mailed on Apr. 24, 2023, 4 pages.
Applicant-Initiated Interview Summary received for U.S. Appl. No. 17/484,856, mailed on Jul. 27, 2022, 7 pages.
Applicant-Initiated Interview Summary received for U.S. Appl. No. 17/484,856, mailed on Mar. 10, 2022, 3 pages.
Applicant-Initiated Interview Summary received for U.S. Appl. No. 17/484,856, mailed on Oct. 25, 2023, 5 pages.
Applicant-Initiated Interview Summary received for U.S. Appl. No. 18/211,150, mailed on Oct. 8, 2024, 3 pages.
Aprio Editorial Department, "[Line] Useful ways to use the OCR feature, and how to easily copy and translate text within images", Available online at: <https://appllio.com/line-how-to-use-ocr>, May 15, 2019, 14 pages (Official Copy Only). {See Communication Under Rule 37 CFR § 1.98(a)(3)}.
Corrected Notice of Allowance received for U.S. Appl. No. 17/484,714, mailed on Dec. 5, 2023, 3 pages.
Corrected Notice of Allowance received for U.S. Appl. No. 17/509,356, mailed on Nov. 6, 2024, 2 pages.
Corrected Notice of Allowance received for U.S. Appl. No. 17/547,065, mailed on May 1, 2023, 9 pages.
Notice of Allowance received for U.S. Appl. No. 18/125,070, mailed on Apr. 29, 2024, 2 pages.
Decision on Appeal received for U.S. Appl. No. 16/140,211, mailed on Jul. 1, 2021, 8 pages.
Decision to Grant received for European Patent Application No. 23173355.1, mailed on Oct. 24, 2024, 3 pages.
Decision to Grant received for Japanese Patent Application No. 2024-060293, mailed on Oct. 15, 2024, 3 pages (1 page of English Translation and 2 pages of Official Copy).
Ex-Parte Quayle Action received for U.S. Appl. No. 17/484,844, mailed on Sep. 8, 2022, 8 pages.
Examiner-Initiated Interview Summary received for U.S. Appl. No. 17/484,856, mailed on Sep. 6, 2023, 4 pages.
Examiner's Answer to Appeal Brief received for U.S. Appl. No. 16/140,211, mailed on Mar. 25, 2021, 21 pages.
Extended European Search Report received for European PatentrAip-plication No. 24203946.9, mailed on Oct. 24, 2024, 9 pages.
Final Office Action received for U.S. Appl. No. 16/140,211, mailed on May 26, 2020, 22 pages.
Final Office Action received for U.S. Appl. No. 17/484,714, mailed on May 23, 2022, 22 pages.
Final Office Action received for U.S. Appl. No. 17/484,856, mailed on Jun. 1, 2023, 31 pages.
Final Office Action received for U.S. Appl. No. 17/484,856, mailed on Mar. 30, 2022, 26 pages.
Final Office Action received for U.S. Appl. No. 17/484,856, mailed on Nov. 16, 2023, 29 pages.
Han, Sangwoo, "AR Glasses interaction prototype", Available Online at: https://sangwoohan.cargo.site/AR-Glasses-interaction-prototype, Oct. 2020, 4 pages.
Intention to Grant received for European Patent Application No. 22720880.8, mailed on Sep. 30, 2024, 10 pages.
Intention to Grant received for European Patent Application No. 23158566.2, mailed on Sep. 30, 2024, 8 pages.
International Preliminary Report on Patentability received for PCT Patent Application No. PCT/US2022/025096, mailed on Nov. 2, 2023, 14 pages.
International Preliminary Report on Patentability received for PCT Patent Application No. PCT/US2022/044236, mailed on Apr. 4, 2024, 12 pages.
International Preliminary Report on Patentability received for PCT Patent Application No. PCT/US2023/014177, mailed on Sep. 19, 2024, 15 pages.
International Search Report and Written Opinion received for PCT Patent Application No. PCT/US2022/025096, mailed on Sep. 26, 2022, 19 pages.
International Search Report and Written Opinion received for PCT Patent Application No. PCT/US2022/044236, mailed on Mar. 27, 2023, 17 pages.
International Search Report and Written Opinion received for PCT Patent Application No. PCT/US2023/014177, mailed on Sep. 1, 2023, 21 pages.
Invitation to Pay Additional Fees and Partial International Search Report received for PCT Patent Application No. PCT/US2023/014177, mailed on Jul. 11, 2023, 13 pages.
Invitation to Pay Additional Fees received for PCT Patent Application No. PCT/US2022/025096, mailed on Aug. 1, 2022, 11 pages.
Non-Final Office Action received for U.S. Appl. No. 16/140,211, mailed on Oct. 3, 2019, 15 pages.
Non-Final Office Action received for U.S. Appl. No. 16/140,286, mailed on Oct. 3, 2019, 14 pages.
Non-Final Office Action received for U.S. Appl. No. 16/897,551, mailed on Jun. 25, 2020, 12 pages.
Non-Final Office Action received for U.S. Appl. No. 17/142,134, mailed on Jul. 22, 2021, 11 pages.
Non-Final Office Action received for U.S. Appl. No. 17/484,714, mailed on Dec. 1, 2021, 19 pages.
Non-Final Office Action received for U.S. Appl. No. 17/484,714, mailed on Mar. 30, 2023, 19 pages.
Non-Final Office Action received for U.S. Appl. No. 17/484,856, mailed on Dec. 8, 2021, 24 pages.
Non-Final Office Action received for U.S. Appl. No. 17/484,856, mailed on Feb. 22, 2023, 26 pages.
Non-Final Office Action received for U.S. Appl. No. 17/484,856, mailed on Sep. 21, 2023, 32 pages.
Non-Final Office Action received for U.S. Appl. No. 18/125,070, mailed on Sep. 14, 2023, 13 pages.
Notice of Acceptance received for Australian Patent Application No. 2022261717, mailed on Dec. 20, 2023, 4 pages.
Notice of Allowance received for Chinese Patent Application No. 202210312775.7, mailed on Sep. 23, 2024, 5 pages (1 page of English Translation and 4 pages of Official Copy).
Notice of Allowance received for Japanese Patent Application No. 2023-560220, mailed on Mar. 1, 2024, 4 pages (1 page of English Translation and 3 pages of Official Copy).
Notice of Allowance received for Korean Patent Application No. 10-2023-7033711, mailed on Nov. 29, 2023, 9 pages (2 pages of English Translation and 7 pages of Official Copy).
Notice of Allowance received for U.S. Appl. No. 16/140,211, mailed on Sep. 10, 2021, 10 pages.
Notice of Allowance received for U.S. Appl. No. 16/140,286, mailed on Mar. 12, 2020, 5 pages.
Notice of Allowance received for U.S. Appl. No. 16/897,551, mailed on Oct. 16, 2020, 5 pages.
Notice of Allowance received for U.S. Appl. No. 17/142,134, mailed on Jan. 4, 2022, 5 pages.
Notice of Allowance received for U.S. Appl. No. 17/484,714, mailed on May 30, 2023, 6 pages.
Notice of Allowance received for U.S. Appl. No. 17/484,714, mailed on Oct. 31, 2023, 7 pages.
Notice of Allowance received for U.S. Appl. No. 17/484,844, mailed on Jan. 17, 2023, 10 pages.
Notice of Allowance received for U.S. Appl. No. 17/484,856, mailed on Oct. 30, 2024, 9 pages.

(56) References Cited

OTHER PUBLICATIONS

Notice of Allowance received for U.S. Appl. No. 17/547,065, mailed on Feb. 16, 2023, 16 pages.
Notice of Allowance received for U.S. Appl. No. 17/846,962, mailed on Oct. 25, 2024, 2 pages.
Notice of Allowance received for U.S. Appl. No. 18/125,070, mailed on Apr. 23, 2024, 6 .pages.
Notice of Allowance received for U.S. Appl. No. 18/125,070, mailed on Feb. 6, 2024, 7 pages.
Notice of Allowance received for U.S. Appl. No. 18/196,997, mailed on Nov. 4, 2024, 11 pages.
Office Action received for Australian Patent Application No. 2022261717, mailed on Nov. 6, 2023, 3 pages.
Office Action received for Australian Patent Application No. 2023214377, mailed on Sep. 25, 2024, 4 pages.
Office Action received for Australian Patent Application No. 2024213126, mailed on Sep. 26, 2024, 3 pages.
Office Action received for Chinese Patent Application No. 202110367769.7, mailed on Sep. 30, 2024, 21 pages (6 pages of English Translation and 15 pages of Official Copy).
Office Action received for Chinese Patent Application No. 202311577936.6, mailed on May 23, 2024, 20 pages (10 pages of English Translation and 10 pages of Official Copy).
Office Action received for Indian Patent Application No. 202218054598, mailed on Oct. 3, 2024, 5 pages.
Office Action received for Korean Patent Application No. 10-2023-0125143, mailed on Sep. 24, 2024, 9 pages (4 pages of English Translation and 5 pages of Official Copy).
Office Action received for Korean Patent Application No. 10-2024-7028393, mailed on Sep. 24, 2024, 6 pages (2 pages of English Translation and 4 pages of Official Copy).
smahoto.jp, "An application for capturing unreadable characters in books and signboards with a camera!", Available Online at: <https://www.kitamura.jp/smahoto/photolife/app/items/205.html>, Oct. 15, 2015, 8 pages (Official Copy Only) {See Communication Under Rule 37 CFR § 1.98(a) (3)}.
Stone Zeda, "Could AR Be the Unlikely Savior of Print?", Online available at: https://adage.com/article/digitalnext/ar-savior-print/308923, May 11, 2017, 4 pages.
Supplemental Notice of Allowance received for U.S. Appl. No. 17/142,134, mailed on Jan. 12, 2022, 2 pages.
Takafumi, Yamazoe, "Development of character recognition technology that achieves highly accurate recognition", Technology Reports, NTT DOCOMO Technical Journal vol. 20 No.1, Telecommunications Association, Apr. 1, 2012, pp. 40-43 pp (Official Copy Only) {See Communication Under Rule 37 CFR § 1.98(a) (3)}.
"Text of 2nd CD Mixed and Augmented Reality (MAR) Reference Model", International Organisation for Standardisation Organisation Internationale De Normalisation, ISO/IEC JTC 1/SC 29/WG 11, Coding of Moving Pictures and Audio, Feb. 2016, 67 pages.
Applicant-Initiated Interview Summary received for U.S. Appl. No. 18/167,625, mailed on May 2, 2025, 3 pages.
Applicant-Initiated Interview Summary received for U.S. Appl. No. 18/423,234, mailed on May 9, 2025, 2 pages.
Corrected Notice of Allowance received for U.S. Appl. No. 18/137,369, mailed on May 12, 2025, 2 pages.
Corrected Notice of Allowance received for U.S. Appl. No. 18/211,150, mailed on Mar. 26, 2025, 2 pages.
Corrected Notice of Allowance received for U.S. Appl. No. 19/030,831, mailed on May 19, 2025, 2 pages.
Decision on Appeal received for U.S. Appl. No. 17/181,089, mailed on Apr. 17, 2025, 19 pages.
Decision to Grant received for European Patent Application No. 19769316.1, mailed on Apr. 25, 2025, 4 pages.
Decision to Grant received for European Patent Application No. 22720880.8, mailed on Mar. 27, 2025, 4 pages.
Decision to Grant received for Japanese Patent Application No. 2024-015643, mailed on Mar. 25, 2025, 3 pages (1 page of English Translation and 2 pages of Official Copy).
Intention to Grant received for European Patent Application No. 20206196.6, mailed on Mar. 10, 2025, 10 pages.
Intention to Grant received for European Patent Application No. 23158566.2, mailed on Mar. 19, 2025, 9 pages.
International Search Report and Written Opinion received for PCT Patent Application No. PCT/US2024/043090, mailed on Jan. 28, 2025, 21 pages.
International Search Report and Written Opinion received for PCT Patent Application No. PCT/US2024/044796, mailed on Nov. 28, 2024, 17 pages.
Invitation to Pay Additional Fees and Partial International Search Report received for PCT Patent Application No. PCT/US2024/043090, mailed on Dec. 4, 2024, 12 pages.
Invitation to Pay Additional Fees and Partial International Search Report received for PCT Patent Application No. PCT/US2025/010440, mailed on May 13, 2025, 15 pages.
[iPhone] How to Turn On/Off (Enable/Disable) "Show Outside the Frame" On the Camera, Func !!, Available Online at: https://func.jp/iphone-camera-frame-exterior/, Nov. 5, 2024, 8 pages.
Mishra et al., "How to Change Subtitle and Audio Language in Apple TV+ App", Retrieved from the Internet: URL: https://beebom.com/how-change-subtitle-audio-language-apple-tv-app/, Dec. 3, 2019, 4 pages.
Non-Final Office Action received for U.S. Appl. No. 17/992,789, mailed on Mar. 20, 2025, 17 pages.
Non-Final Office Action received for U.S. Appl. No. 18/441,971, mailed on Apr. 10, 2025, 39 pages.
Notice of Acceptance received for Australian Patent Application No. 2023226764, mailed on Apr. 11, 2025, 3 pages.
Notice of Allowance received for Chinese Patent Application No. 202110368164.X; mailed on Mar. 13, 2025, 4 pages (1 page of English Translation and 3 pages of Official Copy).
Notice of Allowance received for Chinese Patent Application No. 2021103068460.X, mailed on Mar. 13, 2025, 4 pages (1 page of English Translation and 3 pages of Official Copy).
Notice of Allowance received for Japanese Patent Application No. 2024-049961, mailed on Apr. 7, 2025, 4 pages (1 page of English Translation and 3 pages of Official Copy).
Notice of Allowance received for U.S. Appl. No. 18/137,389, mailed on Apr. 15, 2025, 11 pages.
Notice of Allowance received for U.S. Appl. No. 18/204,888, mailed on Mar. 18, 2025, 8 pages.
Notice of Allowance received for U.S. Appl. No. 18/611,216, mailed on May 12, 2025, 8 pages.
Notice of Allowance received for U.S. Appl. No. 19/030,831, mailed on May 8, 2025, 12 pages.
Notice of Hearing received for Indian Patent Application No. 2021215010325, mailed on Mar. 10, 2025, 3 pages.
Office Action received for Australian Patent Apciication No. 2023285892, mailed on Apr. 11, 2025, 4 pages.
Office Action received for Australian Patent Apciication No. 2024200958, mailed on Apr. 1, 2025, 5 pages.
Office Action received for Chinese Patent Application No. 202010235395.9, mailed on Mar. 1, 2025, 16 pages (9 pagesrof English Translation and 7 pages of Official Copy).
Office Action received for Chinese Patent Application No. 202110368426.2, mailed on Feb. 24, 2025, 9 pages (5 pagesrof English Translation and 4 pages of Official Copy).
Office Action received for Chinese Patent Application No. 202110369265.9, mailed on Mar. 27, 2025, 16 pages (4 pagesrof English Translation and 12 pages of Official Copy).
Office Action received for Chinese Patent Application No. 202410229610.2, mailed on Feb. 27, 2025, 11 pages (7 pagesrof English Translation and 4 pages of Official Copy).
Office Action received for European Patent Application No. 217773186.8, mailed on Mar. 20, 2025, 7 pages.
Office Action received for European Patent Application No. 21782839.1, mailed on Apr. 3, 2025, 5 pages.
Office Action received for European Patent Application No. 22191264.5, mailed on Apr. 14, 2025, 6 pages.
Office Action received for European Patent Application No. 23203433.0, mailed on Mar. 5, 2025, 4 pages.

(56) References Cited

OTHER PUBLICATIONS

Office Action received for European Patent Application No. 24165156.1, mailed on Mar. 5, 2025, 6 pages.
Office Action received for Indian Patent Application No. 202118009190, mailed on Mar. 24, 2025, 7 pages.
Office Action received for Indian Patent Application No. 202318031344, mailed on Apr. 1, 2025, 7 pages.
Office Action received for Japanese Patent Application No. 2024-532566, mailed on Mar. 7, 2025, 14 pages (7 pages of English Translation and 7 pages of Official Copy).
Record of Oral Hearing received for U.S. Appl. No. 17/181,089, mailed on Mar. 27, 2025, 15 pages.
Shinobu, Umi, "What Happens if You Turn Off "Show Outside Frame" In the Camera App?—Why Can't I Ask About the iPhone Anymore?", available online at: https://news.mynavi.jp/article/20210216]iphone_why/>, Feb. 16, 2021, 5 pages (1 page of English Translation and 4 pages of Official Copy).
Shinobu, Unakami, "Camera—Intention of Continuous Shooting Will be Video Photographing by Application!?—iPhone which cannot now be heard—why—", available online at: https://news.mynavi.jp/article/20201119—iphone_why/, Nov. 19, 2020, 3 pages (Official Copy Only) {See Communication Under Rule 37 CFR § 1.98(a) (3)}.
Slice42, "iPhone 11 Quicktake", available online at: https://www.youtube.com/watch?v=hMwTfD44nUg, Sep. 30, 2019, 2 pages (Official Copy Only) {See Communication Under Rule 37 CFR § 1.98(a) (3)}.
Ygigazine, "Basic camera operation method of iphone 11 Pro", available online at: https://www.youtube.com/shorts/Jr7a6F7hUiA, Sep. 21, 2019, 2 pages (Official Copy Only) {See Communication Under Rule 37 CFR § 1.98(a) (3)}.
Notice of Allowance received for Chinese Patent Application No. 202510051318.0, mailed on Sep. 30, 2025, 4 pages (1 page of English Translation and 3 pages of Official Copy).
Office Action received for Japanese Patent Application No. 2024-199034, mailed on Oct. 2, 2025, 7 pages (4 pages of English Translation and 3 pages of Official Copy).
Office Action received for Japanese Patent Application No. 2025-145953, mailed on Oct. 2, 2025, 3 pages (1 page of English Translation and 2 pages of Official Copy).
Record of Oral Hearing received for U.S. Appl. No. 18/200,480, mailed on Oct. 14, 2025, 15 pages.
Advisory Action received for U.S. Appl. No. 18/204,888, mailed on Dec. 13, 2024, 3 pages.
Applicant-Initiated Interview Summary received for U.S. Appl. No. 18/204,888, mailed on Nov. 27, 2024, 4 pages.
Corrected Notice of Allowance received for U.S. Appl. No. 18/196,997, mailed on Nov. 15, 2024, 2 pages.
Examiner's Answer to Appeal Brief received for U.S. Appl. No. 18/200,480, mailed on Dec. 13, 2024, 9 pages.
Extended European Search Report received for European Patent Application No. 24194531.0, mailed on Nov. 12, 2024, 8 pages.
Final Office Action received for U.S. Appl. No. 18/204,888, mailed on Nov. 18, 2024, 21 pages.
Final Office Action received for U.S. Appl. No. 18/423,234, mailed on Dec. 19, 2024, 8 pages.
Intention to Grant received for European Patent Application No. 19769316.1, mailed on Dec. 17, 2024, 9 pages.
Intention to Grant received for European Patent Application No. 22720880.8, mailed on Nov. 20, 2024, 11 pages.
International Preliminary Report on Patentability received for PCT Patent Application No. PCT/US2023/024279, mailed on Dec. 12, 2024, 15 pages.
Non-Final Office Action received for U.S. Appl. No. 18/137,369, mailed on Dec. 4, 2024, 13 pages.
Notice of Acceptance received for Australian Patent Application No. 2024213126, mailed on Oct. 30, 2024, 3 pages.
Notice of Allowance received for Chinese Patent Application No. 202010697187.0, mailed on Nov. 18, 2024, 6 pages (1 page of English Translation and 5 pages of Official Copy).
Notice of Allowance received for Chinese Patent Application No. 202110369341.6, mailed on Nov. 4, 2024, 4 pages (1 page of English Translation and 3 pages of Official Copy).
Notice of Allowance received for Chinese Patent Application No. 202110369363.2, mailed on Nov. 22, 2024, 4 pages (1 page of English Translation and 3 pages of Official Copy).
Notice of Allowance received for Chinese Patent Application No. 202210312598.2, mailed on Nov. 6, 2024, 4 pages (1 page of English Translation and 3 pages of Official Copy).
Notice of Allowance received for Chinese Patent Application No. 202210849316.2, mailed on Nov. 9, 2024, 4 pages (1 page of English Translation and 3 pages of Official Copy).
Notice of Allowance received for Korean Patent Application No. 10-2023-7401271, mailed on Nov. 24, 2024, 7 pages (2 page of English Translation and 5 pages of Official Copy).
Notice of Allowance received for Korean Patent Application No. 10-2024-7028393, mailed on Nov. 29, 2024, 7 pages (2 page of English Translation and 5 pages of Official Copy).
Notice of Allowance received for U.S. Appl. No. 18/589,265, mailed on Dec. 6, 2024, 9 pages.
Notice of Allowance received for U.S. Appl. No. 18/627,363, mailed on Dec. 20, 2024, 14 pages.
Office Action received for Australian Patent Application No. 2023226764, mailed on Nov. 13, 2024, 3 pages.
Office Action received for Australian Patent Application No. 2023282230, mailed on Dec. 9, 2024, 2 pages.
Office Action received for Australian Patent Application No. 2023285892, mailed on Dec. 16, 2024, 5 pages.
Office Action received for Australian Patent Application No. 2024201515, mailed on Dec. 11, 2024, 3 pages.
Office Action received for Chinese Patent Application No. 202010235395.9, mailed on Oct. 19, 2024, 12 pages (7 page of English Translation and 5 pages of Official Copy).
Office Action received for Chinese Patent Application No. 202010295272.4, mailed on Oct. 10, 2024, 9 pages (4 page of English Translation and 5 pages of Official Copy).
Office Action received for Chinese Patent Application No. 202110367834.6, mailed on Nov. 4, 2024, 10 pages (5 pages of English Translation and 5 pages of Official Copy).
Office Action received for Chinese Patent Application No. 202110368164.X, mailed on Nov. 15, 2024, 27 pages (6 pages of English Translation and 21 pages of Official Copy).
Office Action received fdr Chinese Patent Application No. 202110368460.X, mailed on Nov. 9, 2024, 11 pages (5 pages of English Translation and 6 pages of Official Copy).
Office Action received for Chinese Patent Application No. 202210312598.2, mailed on Jun. 27, 2024, 22 pages (7 pages of English Translation and 15 pages of Official Copy).
Office Action received for Chinese Patent Application No. 202410229610.2, mailed on Dec. 2, 2024, 14 pages (8 pages of English Translation and 6 pages of Official Copy).
Office Action received for European Patent Application No. 23173036.7, mailed on Nov. 8, 2024, 5 pages.
Office Action received for Japanese Patent Application No. 2023-158354, mailed on Dec. 2, 2024, 6 pages (3 pages of English Translation and 3 pages of Official Copy).
Summons to Attend Oral Proceedings received for German Patent Application No. 112015003083.2, mailed on Oct. 28, 2024, 7 pages (3 pages of English Translation and 4 pages of Official Copy).
Supplemental Notice of Allowance received for U.S. Appl. No. 18/589,265, mailed on Dec. 18, 2024, 2 pages.
Egg Flakes, "Use Slow Shutterto capture night scenes and light trails", Online available at :https://www.jianshu.com/p/6c742da00d3c, Mar. 8, 2018, 5 pages (1 page of English Translation and 4 pages of Official Copy).
Manogajapathi et al., "Detecting Camera Based Traitor and Fraudulent Apps on Smartphone", World Conference on Futuristic Trends in Research and Innovation for Social Welfare (Startup Conclave), IEEE, February 29, 2016, 5 pages.
Wanjale et al., "AAPS: Android Based System for Camera Based Attacks", International Journal of Emerging Technologies and Engineering (IJETE) vol. 1 Issue 10, Nov. 2014, 2 pages.

(56) References Cited

OTHER PUBLICATIONS

Wu et al., "Analyzing Mobile Phone Vulnerabilities Caused by Camera", IEEE Global Communications Conference, Dec. 8, 2014, 5 pages.
Aprio Editorial Department, "[Line] Useful ways to use the OCR feature, and how to easily copy and translate text within images", Available online at: <https://appllio.com/line-how-to-use-ocr>, May 15, 2019, 14 pages.
Smahoto.JP, "An application for capturing unreadable characters in books and signboards with a camera!", Available Online at: <https://www.kitamura.jp/smahoto/photolife/app/items/205.html>, Oct. 15, 2015, 8 pages.
Takafumi, Yamazoe, "Development of character recognition technology that achieves highly accurate recognition", Technology Reports, NTT DOCOMO Technical Journal vol. 20 No. 1, Telecommunications Association, Apr. 1, 2012, pp. 40-43 pp.
Corrected Notice of Allowance received for U.S. Appl. No. 17/992,789, mailed on Oct. 7, 2025, 2 pages.
Office Action received for European Patent Application No. 24165156.1, mailed on Sep. 26, 2025, 7 pages.
Summons to Attend Oral Proceedings received for European Patent Application No. 23203433.0, mailed on Sep. 22, 2025, 7 pages.
3C Blogger Kisplay Share, "Samsung GALAXY Tab S Hands-on SideSync 3.0 Is Amazing", http://www.samsung.com/tw/article/galaxy-tab-s-blogger-kisplay., Jul. 4, 2014, 4 pages. (Official Copy only) {See Communication Under Rule 37 CFR § 1.98(a) (3)}.
"Accepted Outlook Meetings Move to Deleted Folder". Available online at:—https://social.technet.microsoft.com/Forums/office/en-US/f3301c9a-a93f-49f7-b313-c642e285f150/accepted-outlook-meetings-move-to-deleted-folder?forum=outlook, Jan. 12, 2011, 4 pages.
Advisory Action received for U.S. Appl. No. 14/752,776, mailed on Aug. 31, 2018, 3 pages.
Advisory Action received for U.S. Appl. No. 14/815,898, mailed on Aug. 30, 2016, 3 pages.
Advisory Action received for U.S. Appl. No. 14/822,769, mailed on Apr. 30, 2018, 4 pages.
Advisory Action received for U.S. Appl. No. 14/833,014, mailed on Jan. 27, 2017, 3 pages.
Advisory Action received for U.S. Appl. No. 15/405,122, mailed on Apr. 18, 2022, 5 pages.
Advisory Action received for U.S. Appl. No. 16/144,629, mailed on Dec. 13, 2019, 9 pages.
Advisory Action received for U.S. Appl. No. 16/144,629, mailed on Jan. 6, 2021, 10 pages.
Advisory Action received for U.S. Appl. No. 16/377,892, mailed on Apr. 9, 2021, 4 pages.
Advisory Action received for U.S. Appl. No. 16/378,136, mailed on Apr. 12, 2021, 4 pages.
Advisory Action received for U.S. Appl. No. 16/404,605, mailed on Apr. 15, 2020, 10 pages.
Advisory Action received for U.S. Appl. No. 16/806,981, mailed on Jun. 14, 2021, 6 pages.
Advisory Action received for U.S. Appl. No. 16/935,002, mailed on May 6, 2022, 3 pages.
Advisory Action received for U.S. Appl. No. 16/943,737, mailed on Jun. 1, 2022, 6 pages.
Advisory Action received for U.S. Appl. No. 17/181,089, mailed on Dec. 8, 2023, 3 pages.
Advisory Action received for U.S. Appl. No. 17/181,089, mailed on Dec. 20, 2022, 4 pages.
Airshow, "Airshow App for Mobile Devices", 2012, 4 pages.
"Android 2.3.4 User's Guide", Online available at: https://static.googleusercontent.com/media/www.google.com/en//help/hc/pdfs/mobile/AndroidUsersGuide-2.3.4.pdf, May 20, 2011, 384 pages.
Android Central, "BeWeather weather app for Android", Available online at: <https://www.youtube.com/watch?v=G2EY2K-XkSI>, Sep. 1, 2011, 1 page.
Android Central, "Changing the watchface on your Android Wear device", Retrieved from: https://www.youtube.com/watch?v=YYwFe2K_qil, Jul. 2, 2014, 4 pages.
Android Police, "Galaxy S9+ In-Depth Camera Review", See Especially 0:43-0:53; 1:13-1:25; 1:25-1:27; 5:11-5:38; 6:12-6:26, Available Online at <https://www.youtube.com/watch?v=GZHYCdMCv-w>, Apr. 19, 2018, 3 pages.
Androidika, "Butterfly 3D Live Wallpaper 1.0 APK", Available at: <http://net-suckga-ilauncher2.apk-dl.com/butterfly-3d-live-wallpaper>, Feb. 26, 2013, 7 pages.
Applicant-Initiated Interview Summary received for U.S. Appl. No. 16/265,938, mailed on Mar. 11, 2020, 5 pages.
Applicant-Initiated interview Summary received for U.S. Appl. No. 16/404,605, mailed on Nov. 13, 2019, 3 pages.
Applicant-Initiated Interview Summary received for U.S. Appl. No. 16/806,981, mailed on Jan. 28, 2022, 4 pages.
Applicant-Initiated Interview Summary received for U.S. Appl. No. 17/190,879, mailed on Oct. 26, 2021, 3 pages.
Applicant-Initiated Interview Summary received for U.S. Appl. No. 16/271,583 mailed on Mar. 2, 2020, 3 pages.
Applicant-Initiated Interview Summary received for U.S. Appl. No. 16/271 ,583, mailed on Jul. 14, 2020, 4 pages.
Applicant-Initiated Interview Summary received for U.S. Appl. No. 15/405,122, mailed on Dec. 22, 2020, 5 pages.
Applicant-Initiated Interview Summary received for U.S. Appl. No. 15/405,122, mailed on Jul. 7, 2021, 4 pages.
Applicant-Initiated Interview Summary received for U.S. Appl. No. 15/405,122, mailed on Mar. 1, 2022, 4 pages.
Applicant-Initiated Interview Summary received for U.S. Appl. No. 15/405,122, mailed on May 21, 2020, 5 pages.
Applicant-Initiated Interview Summary received for U.S. Appl. No. 15/995,040, mailed on Aug. 2, 2022, 5 pages.
Applicant-Initiated Interview Summary received for U.S. Appl. No. 15/995,040, mailed on Dec. 23, 2019, 5 pages.
Applicant-Initiated Interview summary received for U.S. Appl. No. 15/995,040, mailed on Jul. 27, 2020, 4 pages.
Applicant-Initiated Interview Summary received for U.S. Appl. No. 15/995,040, mailed on Nov. 18, 2022, 5 pages.
Applicant-Initiated Interview Summary received for U.S. Appl. No. 15/995,040, mailed on Nov. 24, 2020, 4 pages.
Applicant-Initiated Interview Summary received for U.S. Appl. No. 16/144,629, mailed on Jul. 2, 2020, 5 pages.
Applicant-Initiated Interview Summary received for U.S. Appl. No. 16/144,629, mailed on Nov. 23, 2020, 3 pages.
Applicant-Initiated Interview Summary received for U.S. Appl. No. 16/147,523, mailed on Apr. 27, 2020, 3 pages.
Applicant-Initiated Interview Summary received for U.S. Appl. No. 16/147,523, mailed on Dec. 10, 2021, 4 pages.
Applicant-Initiated Interview Summary received for U.S. Appl. No. 16/147,523, mailed On Jun. 13, 2022, 4 pages.
Applicant-Initiated Interview Summary received for U.S. Appl. No. 16/147,523, mailed on Oct. 26, 2020, 3 pages.
Applicant-Initiated Interview Summary received for U.S. Appl. No. 16/147,523, mailed on Sep. 14, 2021, 3 pages.
Applicant-Initiated Interview Summary received for U.S. Appl. No. 16/259,954, mailed on Mar. 23, 2020, 3 pages.
Applicant-Initiated Interview Summary received for U.S. Appl. No. 16/265,938, mailed on May 28,2020, 5 pages.
Applicant-Initiated Interview Summaryreceived for U.S. Appl. No. 16/377,892, mailed on Mar. 26, 2021 , 2 pages.
Applicant-Initiated Interview Summary received for U.S. Appl. No. 16/377,892, mailed on Oct. 13, 2020, 5 pages.
Applicant-Initiated Interview Summary received for U.S. Appl. No. 16/378,136, mailed on Mar.26, 2021, 2 pages.
Applicant-Initiated Interview Summary received for U.S. Appl. No. 16/378,136, mailed on Oct. 13, 2020, 4 pages.
Applicant-Initiated Interview Summary received for U.S. Appl. No. 16/528,257, mailed on Nov. 18, 2021, 2 pages.
Applicant-Initiated Interview Summary received for U.S. Appl. No. 16/528,941, mailed on Jun. 19,2020, Spages.
Applicant-Initiated Interview Summary received for U.S. Appl. No. 16/528,941, mailed on Nov. 10, 2020, 2 pages.

(56) References Cited

OTHER PUBLICATIONS

Applicant-Initiated Interview Summary received for U.S. Appl. No. 16/584,100, mailed on Feb. 19, 2020, 3 pages.
Applicant-Initiated Interview Summary received for U.S. Appl. No. 16/586,344, mailed on Feb. 27, 2020, 3 pages.
Applicant-Initiated Interview Summary received for U.S. Appl. No. 16/935,002, mailed on Sep. 21, 2021 , 4 pages.
Applicant-Initiated Interview Summary received for U.S. Appl. No. 16/943,737, mailed on Apr. 29, 2022, 6 pages.
Applicant-initiated Interview Summary received for U.S. Appl. No. 16/943,737, mailed on Sep. 7, 2021, 4 pages.
Applicant-Initiated Interview Summary received for U.S. Appl. No. 17/013,778, mailed on Feb. 28, 2022, 2 pages.
Applicant-Initiated Interview Summary received for U.S. Appl. No. 17/027,317, mailed on Dec. 21, 2020, 4 pages.
Applicant-Initiated Interview Summary received for U.S. Appl. No. 17/041,412, mailed on Jan. 31, 2023, 7 pages.
Applicant-Initiated Interview Summary received for U.S. Appl. No. 17/103,436, mailed on Sep. 22, 2021, 2 pages.
Applicant-Initiated Interview Summary received for U.S. Appl. No. 17/116,938, mailed on Dec. 13, 2021, 3 pages.
Applicant-Initiated Interview Summary received for U.S. Appl. No. 17/116,938, mailed on Jun. 14, 2022, 2 pages.
Applicant-Initiated Interview Summary received for U.S. Appl. No. 17/116,938, mailed on Oct. 13, 2022, 3 pages.
Applicant-Initiated Interview Summary received for U.S. Appl. No. 17/181,089, mailed on Apr. 7, 2023, 5 pages.
Applicant-Initiated Interview Summary received for U.S. Appl. No. 17/181,089, mailed on May 16,2023, 4 pages.
Applicant-Initiated Interview Summary received for U.S. Appl. No. 17/181,089, mailed on Nov. 22, 2022, 3 pages.
Applicant-initiated Interview Summary received for U.S. Appl. No. 17/181,089, mailed on Nov. 28, 2023, 3 pages.
Applicant-Initiated Interview Summary received for U.S. Appl. No. 17/181,089, mailed on Oct. 7,2022, 4 pages.
Applicant-Initiated Interview Summary received for U.S. Appl. No. 17/181,089, mailed on Sep. 18, 2023, 3 pages.
Applicant-Initiated Interview Summary received forU.S. Appl. No. 17/220,596, mailed on Aug. 18, 2021, 3 pages.
Applicant-Initiated Interview Summary received for U.S. Appl. No. 17/464,477, mailed on Mar. 21, 2022, 3 pages.
Applicant-Initiated Interview Summary received for U.S. Appl. No. 17/464,477, mailed on May 26, 2023, 2 pages.
Applicant-Initiated Interview Summary received for U.S. Appl. No. 17/464,477, mailed on Sep. 6, 2022, 3 pages.
Applicant-Initiated Interview Summary received for U.S. Appl. No. 17/466,824, mailed on Apr. 20, 2023, 2 pages.
Applicant-Initiated Interview Summary received for U.S. Appl. No. 17/466,824, mailed on Oct. 5, 2022, 2 pages.
Applicant-Initiated Interview Summary received for U.S. Appl. No. 17/466,824, mailed on Sep. 28, 2023, 2 pages.
Applicant-Initiated Interview Summary received for U.S. Appl. No. 17/479,897, mailed on Jun. 12, 2023, 2 pages.
Applicant-Initiated Interview Summary received for U.S. Appl. No. 17/479,897, mailed on Oct. 31, 2022, 3 pages.
Applicant-Initiated Interview Summary received for U.S. Appl. No. 17/516,537, mailed on Jul. 5, 2022, 4 pages.
Applicant-Initiated Interview Summary received for U.S. Appl. No. 17/516,537, mailed on Nov. 22, 2022, 2 pages.
Applicant-Initiated Interview Summary received for U.S. Appl. No. 17/546,968, mailed on Apr. 26, 2024, 2 pages.
Applicant-Initiated Interview Summary received for U.S. Appl. No. 17/546,968, mailed on Jan. 16, 2024, 3 pages.
Applicant-Initiated Interview Summary received for U.S. Appl. No. 17/572,117, mailed on Feb. 1, 2023, 4 pages.
Applicant-Initiated Interview Summary received for U.S. Appl. No. 17/572,117, mailed on Nov. 17, 2022, 4 pages.
Applicant-Initiated Interview Summary received for U.S. Appl. No. 17/951,875, mailed on Feb. 28, 2023, 2 pages.
Applicant-Initiated Interview Summary received for U.S. Appl. No. 17/951,875, mailed on Jun. 27, 2023, 2 pages.
Applicant-Initiated Interview Summary received for U.S. Appl. No. 17/975,141, mailed on Aug. 30, 2023, 4 pages.
Applicant-Initiated Interview Summary received for U.S. Appl. No. 18/119,789, mailed on Jul. 31, 2023, 4 pages.
Applicant-Initiated Interview Summary received for U.S. Appl. No. 18/119,789, mailed on Sep. 27, 2023, 3 pages.
Applicant-Initiated Interview Summary received for U.S. Appl. No. 18/204,888, mailed on Aug. 5, 2024, 4 pages.
Applicant-Initiated Interview Summary received for U.S. Appl. No. 18/211,150, mailed on Apr. 3, 2024, 3 pages.
Applicant-Initiated Interview Summary received for U.S. Appl. No. 18/211,150, mailed on Jul. 24, 2024, 3 pages.
Applicant-Initiated Interview Summary received for U.S. Appl. No. 18/628,021, mailed on Aug. 5, 2024, 4 pages.
Astrovideo, "AstroVideo enables you to use a low-cost,low-light video camera to capture astronomical images.", Available online at: https://www.coaa.co.uk/astrovideo.htm, Retrieved on: Nov. 18, 2019, 5 pages.
Avdonin, Nikita, "Astroviewer 3D", Available at: https:jjwww.youtube.comjwatch?v=zY0tslx3JHY/>, Nov. 5, 2013, 2 pages.
Axiang's Network Notebook, Deep Analysis on Samsung's 2013 New Flagship: tell you what kind of mobile phone Galaxy S4 is!, available at: https://axiang.cc/archives/6115, Apr. 22, 2013, 4 pages. (Official Copy Only) {(See Communication Under Rule 37 CFR § 1.98(a) (3)}.
"Blinkx.tv And Heinlein's Newsbox", Available at: http://http://www.technovelgy.com/ct/Science-Fiction-News.asp?NewsNum=470>, 2005, 3 pages.
Board Decision received for Chinese Patent Application No. 201580046788.2, mailed on Jun. 6, 2022, 17 pages (1 page of English Translation and 16 pages of Official Copy).
Board Decision received for Chinese Patent Application No. 201680012936.3, mailed on Jun. 16, 2021, 2 pages (1 page of English Translation and 1 page of Official Copy).
Board Decision received for Chinese Patent Application No. 201811446867.4, mailed on Apr. 26, 2023, 21 pages (5 pages of English Translation and 16 pages of Official Copy).
Board Decision received for Chinese Patent Application No. 202010295272.4, mailed on Dec. 14, 2023, 2 pages (1 page of English Translation and 1 page of Official Copy).
Board Opinion received for Chinese Patent Application No. 201580046788.2, mailed on Dec. 29, 2021 , 10 pages (4 pages of English Translation and 6 pages of Official Copy).
Board Opinion received for Chinese Patent Application No. 201811446867.4, mailed on Feb. 14, 2023, 11 pages (4 pages of English Translation and 7 pages of Official Copy).
Bogdanov, Alexei, "SKMEI 1016", XP054977588, Available online at <URL: https://www.youtube.com/watch?v=E4q4Fug05Fw>, Jun. 21, 2014, 2 pages (Official Copy only) {See Communication Under Rule 37 CFR § 1.98(a) (3)}.
Brief Communication Regarding Oral Proceedings received for European Patent Application No. 15730925.3, mailed on Feb. 18, 2020, 7 pages.
Brief Communication Regarding Oral Proceedings received for European Patent Application No. 15760008.1, mailed on Sep. 13, 2021, 8 pages.
Brief Communication Regarding Oral Proceedings received for European Patent Application No. 17184710.6, mailed on Feb. 19, 2020, 2 pages.
Brief Communication Regarding Oral Proceedings received for European Patent Application No. 17184710.6, mailed on Mar. 9, 2020, 2 pages.
Brief Communication Regarding Oral Proceedings received for European Patent Application No. 19728558.8, mailed on Jul. 5, 2022, 1 page.
Brief Communication Regarding Oral Proceedings received for European Patent Application No. 20176616.9, mailed on Jun. 9, 2022, 1 page.
Brief Communication Regarding Oral Proceedings received for European Patent Application No. 20176616.9, mailed on May 27, 2022, 1 page.

(56) References Cited

OTHER PUBLICATIONS

Brief Communication Regarding Oral Proceedings received for European Patent Application No. 21163791.3, mailed on Nov. 7, 2023, 4 pages.
Brief Communication Regarding Oral Proceedings received for European Patent Application No. 21165295.3, mailed on Feb. 27, 2024, 1 page.
Castellini, Rick, "Google Earth", Retrieved from <https://www.youtube.com/watch?v=bgjMSBXsFZQ>, How to Use Google Earth for Beginners, Feb. 12, 2013, 3 pages.
Certificate of Examination received for Australian Patent Application No. 2017100683, mailed on Jan. 16, 2018, 2 pages.
Certificate of Examination received for Australian Patent Application No. 2018101855, mailed on Aug. 6, 2019, 2 pages.
Certificate of Examination received for Australian Patent Application No. 2019100487, mailed on Jan. 7, 2020, 2 pages.
Certificate of Examination received for Australian Patent Application No. 2020100303, mailed on Apr. 17, 2020, 2 pages.
Certificate of Examination received for Australian Patent Application No. 2020100720, mailed on Nov. 11, 2020, 2 pages.
Certificate of Examination received for Australian Patent Application No. 2020100886, mailed on Dec. 22, 2020, 2 pages.
Certificate of Examination received for Australian Patent Application No. 2020104220, mailed on Apr. 1, 2021, 2 pages.
Certificate of Examination received for Australian Patent Application No. 2021100721, mailed on Dec. 16, 2021, 2 pages.
Certificate of Examination received for Australian Patent Application No. 2021103004, mailed on Sep. 13, 2021, 2 pages.
Certificate of Examination received for Australian Patent Application No. 2021107587, mailed on Apr. 29, 2022, 2 pages.
Certificate of Examination received for Australian Patent Application No. 2018100158, mailed on Oct. 23, 2018, 2 pages.
Chan, Christine, "Handoff Your Browserto Your iPhone or iPad! Plus A Chance To A Copy!", Apr. 12, 2011, 2 pages.
Clark, Josh, "Designing Great iPhone Apps", O'Reiliy Japan Co., O'Reilly Tim, vol. 1, May 24, 2012, 5 pages (Official Copy only) {See Communication Under Rule 37 CFR § 1.98(a) (3)}.
"Clock & Calendar for SmartWatch 2", https://www.youtube.com/watch?v=Uj-K2vMnrj8, Nov. 20, 2013, 2 pages.
Clover, Juli, "Moment Pro Camera App for iOS Gains Zebra Striping for Displaying Over and Underexposed Areas", Online Available at: https://web.archive.org/web/20190502081353/https://www.macrumors.com/2019/05/01/momentcamera-app-zebra-striping-and-morel, May 1, 2019, 8 pages.
Codrington, Simon, "Intuitive Scrolling Interfaces with CSS Scroll Snap Points", Online Available at: https://www.sitepoint.com/intuitive-scrolling-interfaces-with-css-scroll-snap-points/, Dec. 8, 2015, 14 pages.
Communication for Board of Appeal received for European Patent Application No. 17184710.6, mailed on Feb. 29, 2024, 13 pages.
Computerhilfen, "WhatsApp: voice message without holding the button", available online at: https://www.youtube.com/watch?v=ofFCKvs5URw, Jan. 14, 2018, 9 pages.
Corrected Notice of Allowance received for U.S. Appl. No. 14/641,251, mailed on Jun. 17, 2016, 2 pages.
Corrected Notice of Allowance received for U.S. Appl. No. 14/815,879, mailed on Jul. 13, 2017, 3 pages.
Corrected Notice of Allowance received for U.S. Appl. No. 14/815,879, mailed on Jul. 28, 2017, 3 pages.
Corrected Notice of Allowance received for U.S. Appl. No. 14/815,879, mailed on Sep. 21, 2017, 2 pages.
Corrected Notice of Allowance received for U.S. Appl. No. 14/822,769, mailed on Jan. 17, 2019, 8 pages.
Corrected Notice of Allowance received for U.S. Appl. No. 14/841,402, mailed on May 4, 2018, 2 pages.
Corrected Notice of Allowance received for U.S. Appl. No. 14/841,614, mailed on Jan. 8, 2019, 3 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 15/273,453, mailed on Dec. 21, 2017, 3 pages.
Corrected Notice of Allowance received for U.S. Appl. No. 15/273,453, mailed on Feb. 8, 2018, 2 pages.
Corrected Notice of Allowance received for U.S. Appl. No. 15/273,453, mailed on Nov. 27, 2017, 2 pages.
Corrected Notice of Allowance received for U.S. Appl. No. 15/273,503, mailed on Nov. 2, 2017, 2 pages.
Corrected Notice of Allowance received for U.S. Appl. No. 15/273,503, mailed on Nov. 24, 2017, 2 pages.
Corrected Notice of Allowance received for U.S. Appl. No. 15/355,956, mailed on Jan. 3, 2020, 2 pages.
Corrected Notice of Allowance received for U.S. Appl. No. 15/798,257, mailed on Aug. 26, 2019, 2 pages.
Corrected Notice of Allowance received for U.S. Appl. No. 15/798,257, mailed on Jul. 9, 2019, 2 pages.
Corrected Notice of Allowance received for U.S. Appl. No. 15/798,257, mailed on Jun. 12, 2019, 2 pages.
Corrected Notice of Allowance received for U.S. Appl. No. 15/858,175, mailed on Sep. 21, 2018, 2 pages.
Corrected Notice of Allowance received for U.S. Appl. No. 16/103,699, mailed on May 29,2019, 2 pages.
Corrected Notice of Allowance received for U.S. Appl. No. 16/144,629, mailed on Ap. 21, 2022, 5 pages.
Corrected Notice of Allowance received for U.S. Appl. No. 16/144,629, mailed on Aug. 24, 2022, 6 pages.
Corrected Notice of Allowance received for U.S. Appl. No. 16/144,629. mailed on Jun. 23, 2022, 5 pages.
Corrected Notice of Allowance received for U.S. Appl. No. 16/191,117, mailed on Dec. 9, 2019, 2 pages.
Corrected Notice of Allowance received for U.S. Appl. No. 16/191,117, mailed on Feb. 28, 2020, 2 pages.
Corrected Notice of Allowance received for U.S. Appl. No. 16/191,117, mailed on Nov. 20, 2019, 2 pages.
Corrected Notice of Allowance received for U.S. Appl. No. 16/377,892, mailed on Aug. 11, 2021, 3 pages.
Corrected Notice of Allowance received for U.S. Appl. No. 16/378,136, mailed on Aug. 11, 2021, 2 pages.
Corrected Notice of Allowance received for U.S. Appl. No. 16/378,136, mailed on Jun. 11, 2021, 2 pages.
Corrected Notice of Allowance received for U.S. Appl. No. 16/404,605, mailed on Dec. 23, 2020, 3 pages.
Corrected Notice of Allowance received for U.S. Appl. No. 16/528,257, mailed on Feb. 3, 2022, 2 pages.
Corrected Notice of Allowance received for U.S. Appl. No. 16/582,595, mailed on Apr. 7, 2020, 5 pages.
Corrected Notice of Allowance received for U.S. Appl. No. 16/582,595, mailed on Apr. 22, 2020, 5 pages.
Corrected Notice of Allowance received for U.S. Appl. No. 16/583,020, mailed on Mar. 24, 2020, 2 pages.
Corrected Notice of Allowance received for U.S. Appl. No. 16/584,044, mailed on Apr. 16, 2020, 3 pages.
Corrected Notice of Allowance received for U.S. Appl. No. 16/584,044, mailed on Jan. 29, 2020, 3 pages.
Corrected Notice of Allowance received for U.S. Appl. No. 16/584,044, mailed on Mar. 4, 2020, 2 pages.
Corrected Notice of Allowance received for U.S. Appl. No. 16/584,100, mailed on Feb. 21, 2020, 9 pages.
Corrected Notice of Allowance received for U.S. Appl. No. 16/584,693. mailed on Feb. 21, 2020, 15 pages.
Corrected Notice of Allowance received for U.S. Appl. No. 16/584,693, mailed on Mar. 4, 2020, 2 pages.
Corrected Notice of Allowance received for U.S. Appl. No. 16/584,693, mailed on Mar. 20, 2020, 2 pages.
Corrected Notice of Allowance received for U.S. Appl. No. 16/586,314, mailed on Apr. 8, 2020, 5 pages.
Corrected Notice of Allowance received for U.S. Appl. No. 16/586,314, mailed on Mar. 4, 2020, 3 pages.
Corrected Notice of Allowance received for U.S. Appl. No. 16/586,344, mailed on Apr. 7, 2020, 4 pages.

(56) References Cited

OTHER PUBLICATIONS

Corrected Notice of Allowance received for U.S. Appl. No. 16/586,344, mailed on Jan. 23,2020, 4 pages.
Corrected Notice of Allowance received for U.S. Appl. No. 16/586,344, mailed on Mar. 17, 2020, 4 pages.
Corrected Notice of Allowance received for U.S. Appl. No. 16/825,879, mailed on Aug. 13, 2021, 2 pages.
Corrected Notice of Allowance received for U.S. Appl. No. 16/825,879, mailed on Jul. 23, 2021, 2 pages.
Corrected Notice of Allowance received for U.S. Appl. No. 16/825,879, mailed on Sep. 15, 2021, 2 pages.
Corrected Notice of Allowance received for U.S. Appl. No. 16/835,651, mailed on Aug. 10, 2021, 4 pages.
Corrected Notice of Allowance received for U.S. Appl. No. 16/835,651, mailed on Aug. 13, 2021, 2 pages.
Corrected Notice of Allowance received for U.S. Appl. No. 16/835,651, mailed on Jul. 28, 2021, 4 pages.
Corrected Notice of Allowance received for U.S. Appl. No. 16/835,651, mailed on Jun. 14, 2021, 2 pages.
Corrected Notice of Allowance received for U.S. Appl. No. 16/935,002, mailed on Jul. 17,2023, 5 pages.
Corrected Notice of Allowance received for U.S. Appl. No. 16/935,002, mailed on Mar. 2, 2023, 2 pages.
Corrected Notice of Allowance received for U.S. Appl. No. 16/935,002, mailed on Mar. 28, 2023, 2 pages.
Corrected Notice of Allowance received for U.S. Appl. No. 17/013,778, mailed on Mar. 7, 2023, 5 pages.
Corrected Notice of Allowance received for U.S. Appl. No. 17/027,484, mailed on May 14, 2021, 5 pages.
Corrected Notice of Allowance received for U.S. Appl. No. 17/027,484, mailed on May 28, 2021, 5 pages.
Corrected Notice of Allowance received for U.S. Appl. No. 17/041,412. mailed on Apr. 12, 2023, 2 pages. .
Corrected Notice of Allowance received for U.S. Appl. No. 17/041 ,412, mailed on March 23, 2023, 7 pages.
Corrected Notice of Allowance received for U.S. Appl. No. 17/041,412, mailed on Mar. 31, 2023, 6 pages.
Corrected Notice of Allowance received for U.S. Appl. No. 17/041,412, mailed on May 17, 2023, 2 pages.
Corrected Notice of Allowance received for U.S. Appl. No. 17/103,436, mailed on Dec. 22, 2021 , 2 pages.
Corrected Notice of Allowance received for U.S. Appl. No. 17/190,879, mailed on Nov. 19, 2021, 2 pages.
Corrected Notice of Allowance received for U.S. Appl. No. 17/220,596, mailed on Nov. 4, 2021, 3 pages.
Corrected Notice of Allowance received for U.S. Appl. No. 17/220,596, mailed on Nov. 18, 2021, 27 pages.
Corrected Notice of Allowance received for U.S. Appl. No. 17/354,376, mailed on Apr. 11, 2022, 5 pages.
Corrected Notice of Allowance received for U.S. Appl. No. 17/354,376, mailed on Feb. 16, 2022, 5 pages.
Corrected Notice of Allowance received for U.S. Appl. No. 17/354,376, mailed on Mar. 23, 2022, 6 pages.
Corrected Notice of Allowance received for U.S. Appl. No. 17/466,824, mailed on Feb. 6, 2024, 2 pages.
Corrected Notice of Allowance received for U.S. Appl. No. 17/479,897, mailed on Aug. 17, 2023, 2 pages.
Corrected Notice of Allowance received for U.S. Appl. No. 17/510,168, mailed on Mar. 16, 2023, 2 pages.
Corrected Notice of Allowance received for U.S. Appl. No. 17/510,168, mailed on Mar. 29, 2023, 2 pages.
Corrected Notice of Allowance received for U.S. Appl. No. 17/566,094, mailed on Feb. 8, 2023, 2 pages.
Corrected Notice of Allowance received for U.S. Appl. No. 17/566,094, mailed on Jan. 5, 2023, 2 pages.
Corrected Notice of Allowance received for U.S. Appl. No. 17/566,094, mailed on Jan. 23, 2023, 2 pages.
Corrected Notice of Allowance received for U.S. Appl. No. 17/566,094, mailed on Mar. 7, 2023, 2 pages.
Corrected Notice of Allowance received for U.S. Appl. No. 17/740,032, mailed on Feb. 15, 2023, 6 pages.
Corrected Notice of Allowance received for U.S. Appl. No. 17/740,032, mailed on Nov. 3, 2022, 6 pages.
Corrected Notice of Allowance received for U.S. Appl. No. 18/121 ,458, mailed on Jan. 18, 2024, 2 pages.
Corrected Notice of Allowance received for U.S. Appl. No. 18/196,997, mailed on Apr. 18, 2024, 2 pages.
Corrected Notice of Allowance received for U.S. Appl. No. 18/196,997, mailed on Apr. 25, 2024, 2 pages.
Corrected Notice of Allowance received for U.S. Appl. No. 18/196,997, mailed on Aug. 19, 2024, 2 pages.
Corrected Notice of Allowance received for U.S. Appl. No. 18/196,997, mailed on Jun. 3, 2024, 2 pages.
Corrected Notice of Allowance received for U.S. Appl. No. 18/196,997, mailed on Jun. 13, 2024, 2 pages.
Corrected Notice of Allowance received for U.S. Appl. No. 18/196,997, mailed on May 23, 2024, 2 pages.
Corrected Notice of Allowance received for U.S. Appl. No. 18/375,457, mailed on Apr. 11, 2024, 2 pages.
Corrected Notice of Allowance received for U.S. Appl. No. 18/375,457, mailed on Aug. 16, 2024, 2 pages.
Corrected Notice of Allowance received for U.S. Appl. No. 18/628,021, mailed on Jun. 24, 2024, 2 pages.
Corrected Notice of Allowance received for U.S. Appl. No. 18/628,021, mailed on Sep. 12, 2024, 2 pages.
Decision of Refusal received for Japanese Patent Application No. 2018-243463, mailed on Feb. 25, 2019, 8 pages (5 pages of English Translation and 3 pages of Official Copy).
Decision of Refusal received for Japanese Patent Application No. 2018-545502, mailed on Feb. 25, 2019, 11 pages (7 pages of English Translation and 4 pages of Official Copy).
Decision on Acceptance received for Australian Patent Application No. 2015298710, mailed on Jul. 19, 2019, 18 pages.
Decision on Acceptance received for Australian Patent Application No. 2018201089, mailed on Apr. 20, 2021, 28 pages.
Decision on Appeal received for Japanese Patent Application No. 2018-225131, mailed on Mar. 11, 2021, 5 pages (4 pages of English Translation and 1 page of Official Copy).
Decision on Appeal received for Japanese Patent Application No. 2018-545502, mailed on Mar. 25, 2021, 3 pages (1 page of English Translation and 2 pages of Official Copy).
Decision on Appeal received for U. S. U.S. Appl. No. 14/833,014, mailed on Oct. 30, 2019, 10 pages.
Decision on Appeal received for U.S. Appl. No. 14/815,890, mailed on Nov. 24, 2020, 13 pages.
Decision on Appeal received for U.S. Appl. No. 15/128,952, mailed on Dec. 28, 2020, 23 pages.
Decision on Appeal received for U.S. Appl. No. 15/405,122, mailed on Dec. 12, 2023, 18 pages.
Decision on Appeal received for U.S. Appl. No. 15/995,040, mailed on Dec. 29, 2021, 14 pages.
Decision on Appeal received for U.S. Appl. No. 16/144,629, mailed on Jan. 18, 2022, 8 pages.
Decision on Appeal received for U.S. Appl. No. 17/116,938, mailed on Jun. 14, 2024, 12 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant received for Danish Patent Application No. PA201570788, mailed on Jul. 10, 2017, 2 pages.
Decision to Grant received for Danish Patent Application No. PA201570791, mailed on Jun. 7, 2017, 2 pages.
Decision to Grant received for Danish Patent Application No. PA201670320, mailed on Oct. 18, 2018, 2 pages.
Decision to Grant received for Danish Patent Application No. PA201670627, mailed on Nov. 29, 2018, 2 pages.
Decision to Grant received for Danish Patent Application No. PA201670753, mailed on Mar. 6, 2019, 2 pages.
Decision to Grant received for Danish Patent Application No. PA201670755, mailed on Mar. 6, 2019, 2 pages.

(56) References Cited

OTHER PUBLICATIONS

Decision to Grant received for Danish Patent Application No. PA201970593, mailed on Sep. 7, 2021, 2 pages.
Decision to Grant received for Danish Patent Application No. PA201970601, mailed on Feb. 3, 2021, 2 pages.
Decision to Grant received for Danish Patent Application No. PA201970603, mailed on May 21, 2021, 2 pages.
Decision to Grant received for European Patent Application No. 15711969.4, mailed on Sep. 26, 2019, 2 pages.
Decision to Grant received for European Patent Application No. 15712218.5, mailed on Jun. 7, 2018, 2 pages.
Decision to Grant received for European Patent Application No. 15730925.3, mailed on Dec. 9, 2021, 2 pages.
Decision to Grant received for European Patent Application No. 15739110.3, mailed on Sep. 19, 2019, 2 pages.
Decision to Grant received for European Patent Application No. 15747595.5, mailed on Jul. 16, 2020, 2 pages.
Decision to Grant received for European Patent Application No. 15753796.0, mailed on Sep. 26, 2024, 3 pages.
Decision to Grant received for European Patent Application No. 15759998.6, mailed on Jun. 18, 2020, 2 pages.
Decision to Grant received for European Patent Application No. 15760008.1, mailed on Aug. 11, 2022, 2 pages.
Decision to Grant received for European Patent Application No. 17809168.2, mailed on Oct. 21, 2021, 3 pages.
Decision to Grant received for European Patent Application No. 18176890.4, mailed on Jul. 9, 2020, 3 pages.
Decision to Grant received for European Patent Application No. 18183054.8, mailed on Jan. 21, 2021, 3 pages.
Decision to Grant received for European Patent Application No. 18209460.7, mailed on Apr. 9, 2021, 2 pages.
Decision to Grant received for European Patent Application No. 18214698.5, mailed on Sep. 10, 2020, 3 pages.
Decision to Grant received for European Patent Application No. 19185318.3, mailed on Mar. 31, 2022, 3 pages.
Decision to Grant received for European Patent Application No. 19203942.8, mailed on Nov. 16, 2023, 2 pages.
Decision to Grant received for European Patent Application No. 20168009.7, mailed on Jun. 22, 2023, 4 pages.
Decision to Grant received for European Patent Application No. 20185974.1, mailed on Aug. 19, 2022, 3 pages.
Decision to Grant received for European Patent Application No. 20206197.4, mailed on Oct. 6, 2023, 4 pages.
Decision to Grant received for European Patent Application No. 20210373.5, mailed on May 19, 2023, 4 pages.
Decision to Grant received for European, Patent Application No. 21733324.4, mailed on Jun. 2, 2023, 3 pages.
Decision to Grant received for Japanese Patent Application No. 2018-243463, mailed on Aug. 17, 2020, 2 pages (1 page of English Translation and 1 page of Official Copy).
Decision to Grant received for Japanese Patent Application No. 2019-203399, mailed on Oct. 20, 2021, 3 pages (1 page of English Translation and 2 pages of Official Copy).
Decision to Grant received for Japanese Patent Application No. 2020-070418, mailed on Feb. 8, 2021, 3 pages (1 page of English Translation and 2 pages of Official Copy).
Decision to Grant received for Japanese Patent Application No. 2020-184470, mailed on Jul. 1, 2021, 3 pages (1 page of English Translation and 2 pages of Official Copy).
Decision to Grant received for Japanese Patent Application No. 2020-184471, mailed on Jul. 1, 2021, 3 pages (1 page of English Translation and 2 pages of Official Copy).
Decision to Grant received for Japanese Patent Application No. 2021-051385, mailed on Jul. 8, 2021, 3 pages (1 page of English Translation and 2 pages of Official Copy).
Decision to Grant received for Japanese Patent Application No. 2021-051415, mailed on Jan. 6, 2022, 3 pages (1 page of English Translation and 2 pages of Official Copy).
Decision to Grant received for Japanese Patent Application No. 2021-187533, mailed on Sep. 28, 2023, 3 pages (1 page of English Translation and 2 pages of Official Copy).
Decision to Grant received for Japanese Patent Application No. 2022-104306, mailed on January 04, 2024, 5 pages (3 pages of English Translation and 2 pages of Official Copy).
Decision to Grant received for Japanese Patent Application No. 2022-130725, mailed on Dec. 11, 2023, 2 pages (1 page of English Translation and 1 page of Official Copy).
Decision to Grant received for Japanese Patent Application No. 2022-145387, mailed on Mar. 4, 2024, 3 pages (1 page of English Translation and 2 pages of Official Copy).
Decision to Refuse received for European Patent Application No. 15730924.6, mailed on Mar. 15, 2019, 12 pages.
Decision to Refuse received for European Patent Application No. 17184710.6, mailed on Jun. 16, 2020, 9 pages.
Decision to Refuse received for European Patent Application No. 17810749.6, mailed on Jan. 29, 2021, 24 pages.
Decision to Refuse received for European Patent Application No. 21163791.3, mailed on Dec. 4, 2023, 16 pages.
Decision to Refuse received for European Patent Application No. 21165295.3, mailed on Apr. 29, 2024, 14 pages.
Decision to Refuse received for Japanese Patent Application No. 2018-225131, mailed on Jul. 8, 2019, 6 pages (4 pages of English Translation and 2 pages of Official Copy).
Decision to Refuse received for Japanese Patent Application No. 2018-243463, mailed on Jul. 8, 2019, 5 pages (3 pages of English Translation and 2 pages of Official Copy).
Decision to Refuse received for Japanese Patent Application No. 2018-545502, mailed on Jul. 8, 2019, 5 pages (3 pages of English Translation and 2 pages of Official Copy).
"Deluxe Moon -Guide", available online at:—https://web.archive.org/web/20130520161057/http://www.lifewaresolutions.com/deluxe_moon_guide_ip.html, May 20, 2013, 5 pages.
Demetriou, Soteris, "Analyzing & Designing the Security of Shared Resources On Smartphone Operating Systems", Dissertation, University of Illinois at Urbana-Champaign Online available at: https://www.ideals.illinois.edu/bitstream/handle/2142/100907/DEMETRIOU-DISSERTATION-2018.pdf?sequence=1&isAllowed=n, 2018, 211 pages.
Drunk Beauty Flower Digital Technology, "iPhone Xs Max Camera Tips, Tricks, Features and Complete Tutorial", Available online at: https://www.ixigua.com/6606874981844386308?wid_try=1, Oct. 2, 2018, 2 pages (Official Copy only) {See Communication Under Rule 37 CFR § 1.98(a) (3)}.
Dutta, Tushars., "Warning! iOS Apps With Camera Access Permission Can Spy On You", Online available at: https://web.archive.org/web/20180219092123/https://techviral.net/ios-apps-camera-can-spy/, Feb. 19, 2018, 3 pages.
Ebpman Tech Reviews,"LG G3 Tips: How to customize the clock face", Available online at: https://www.youtube.com/watch?v=evraMWFb1fY, Jul. 25, 2014, 1 page.
Ellis, Benus, "Use a Phone Number in the Google Calendar Where Line for One Click Calling", Available online at: https://ellisbenus.com/ellis-benus/use-a-phone-numberin-the-google-calender-where-line-for-one-click-calling, Ellis Benus-Small Business Web Guru, Oct. 3, 2012, 2 pages.
"Ergonomic requirements for office work with visual display terminals (VDTs)", Part 13: User guidance, International Standard ISO, Zuerich, CH, vol. 9241-13, Jul. 15, 1998, 40 pages.
European Search Report received for European Patent Application No. 18209460.7, mailed on Mar. 15, 2019, 4 pages.
European Search Report received for European Patent Application No. 18214698.5, mailed on Mar. 21, 2019, 5 pages.
European Search Report received for European Patent Application No. 20206196.6, mailed on Dec. 8, 2020, 4 pages.
European Search Report received for European Patent Application No. 20206197.4, mailed on Nov. 30, 2020, 4 pages.
European Search Report received for European Patent Application No. 20210373.5, mailed on Apr. 13, 2021, 4 pages.
European Search Report received for European Patent Application No. 21157252.4, mailed on Apr. 16, 2021, 4 pages.

(56) References Cited

OTHER PUBLICATIONS

European Search Report received for European Patent Application No. 21163791.3, mailed on May 6, 2021, 5 pages.
European Search Report received for European Patent Application No. 21165295.3, mailed on Jun. 18, 2021, 4 pages.
Evgenyevich, Sergey, "Earth & Moon in HD Gyro 3D", Available at <https://www.youtube.com/watch?v=IRwNcaSYrls/>, Dec. 1, 2013, 2 pages.
Examiner-Initiated Interview Summary received for U.S. Appl. No. 16/528,941, mailed on Dec. 1, 2020, 2 pages.
Examiner-Initiated Interview Summary received for U.S. Appl. No. 16/806,981, mailed on Mar. 26, 2021, 2 pages.
Interview Summary received for U.S. Appl. No. 16/806,981, mailed on Jan. 13, 2022, 4 pages.
Interview Summary received for U.S. Appl. No. 16/806,981, mailed on May 24, 2021, 4 pages.
Interview Summary received for U.S. Appl. No. 17/220,596, mailed on Oct. 7, 2021, 2 pages.
Answer to Appeal Brief received for U.S. Appl. No. 14/815,890, mailed on Mar. 20, 2020, 16 pages.
Answer to Appeal Brief received for U.S. Appl. No. 14/833,014, mailed on Nov. 2, 2017, 48 pages.
Answer to Appeal Brief received for U.S. Appl. No. 15/128,952, mailed on Jan. 8, 2020, 9 pages.
Answer to Appeal Brief received for U.S. Patent Application No. 15/405, 122, mailed on Jan. 11, 2023, 16 pages.
Examiner's Answer to Appeal Brief received for U.S. Appl. No. 15/995,040, mailed on Jun. 23, 2021, 31 pages.
Examiner's Answer to Appeal Brief received for U.S. Appl. No. 16/144,629, mailed on Jul. 21, 2021, 21 pages.
Answer to Appeal Brief received for U.S. Appl. No. 16/943,737, mailed on Feb. 2, 2024, 15 pages.
Answer to Appeal Brief received for U.S. Appl. No. 17/013,778, mailed on Dec. 20, 2022, 9 pages.
Answer to Appeal Brief received for U.S. Appl. No. 17/116,938, mailed on Oct. 31, 2023, 55 pages.
Answer to Appeal Brief received for U.S. Appl. No. 17/181,089, mailed on Apr. 15, 2024, 11 pages.
Answer to Appeal Brief received for U.S. Appl. No. 18/119,789, mailed on Jan. 22, 2024, 45 pages.
Examiner's Pre-Review Report received for Japanese Patent Application No. 2018-080122, mailed on Feb. 25, 2020, 6 pages (3 pages of English Translation and 3 pages of Official Copy).
Extended European Search Report (includes Partial European Search Report and European Search Opinion) received for European Patent Application No. 16190252.3, mailed on Mar. 1, 2017, 10 pages.
Extended European Search Report received for European Application No. 19185318.3, mailed on Nov. 20, 2019, 8 pages.
Extended European Search Report received for European Patent Application No. 19203942.8, mailed on Apr. 1, 2020, 10 pages.
Extended European Search Report received for European Patent Application No. 20168009.7, mailed on Sep. 11, 2020, 12 pages.
Extended European Search Report received for European Patent Application No. 20176616.9, mailed on Sep. 8, 2020, 7 Pages.
Extended European Search Report received for European Patent Application No. 20185974.1, mailed on Oct. 28, 2020, 7 pages.
Extended European Search Report received for European Patent Application No. 22157106.0, mailed on Jun. 27, 2022, 8 pages.
Extended European Search Report received for European Patent Application No. 22169639.6, mailed on Jul. 19, 2022, 14 pages.
Extended European Search Report received for European Patent Application No. 22179347.4, mailed on Oct. 13, 2022, 7 pages.
Extended European Search Report received for European Patent Application No. 22188724.3, mailed on Mar. 2, 2023, 14 pages.
Extended European Search Report received for European Patent Application No. 22197186.4, mailed on Jan. 19, 2023, 9 pages.
Extended European Search Report received for European Patent Application No. 23158566.2, mailed on Jun. 14, 2023, 10 pages.
Extended European Search Report received for European Patent Application No. 23173036.7, mailed on Jul. 24, 2023, 13 pages.
Extended European Search Report received for European Patent Application No. 23173355.1, mailed on Aug. 4, 2023, 8 pages.
Extended European Search Report received for European Patent Application No. 23203433.0, mailed on Feb. 7, 2024, 7 pages.
Extended European Search Report received for European Patent Application No. 24155758.6, mailed on Mar. 20, 2024, 11 pages.
Extended European Search Report received for European Patent Application No. 24165156.1, mailed on Jul. 16, 2024, 7 pages.
Extended European Search Report received for European Patent Application No. 24179066.6, mailed on Aug. 8, 2024, 10 pages.
Extended European Search Report received for European Patent Application No. 22191264.5, mailed on Nov. 11, 2022, 8 pages.
Extended Search Report received for European Patent Application No. 17809168.2, mailed on Jun. 28, 2018, 9 pages.
Extended Search Report received for European Patent Application No. 21161005.0, mailed on Jun. 14, 2021, 12 pages.
Feldman, Ari, "Excerpts from: Designing Arcade Computer Game Graphics", Available online at: http://www.phatcode.net/res/269/files/dacgg.pdf, Jan. 1, 2001, 35 pages.
Feng et al., "3D Direct Human-Computer Interface Paradigm Based on Free Hand Tracking", Chinese Journal of Computers, vol. 37, No. 6, Jun. 30, 2014, 15 pages (Official Copy only) {See Communication Under Rule 37 CFR § 1.98(a) (3)}.
Final Office Action received for U.S. Appl. No. 11/462,696, mailed on Jan. 6, 2009, 22 pages.
Final Office Action received for U.S. Appl. No. 11/462,696, mailed on Jul. 7, 2010, 24 pages.
Final Office Action received for U.S. Appl. No. 11/462,696, mailed on May 5, 2011, 42 pages.
Final Office Action received for U.S. Appl. No. 14/752,776, mailed on May 29, 2018, 36 pages.
Final Office Action received for U.S. Appl. No. 14/815,890, mailed on Feb. 26, 2018, 20 pages.
Final Office Action received for U.S. Appl. No. 14/815,890, mailed on May 14, 2019, 22 pages.
Final Office Action received for U.S. Appl. No. 14/815,890, mailed on Nov. 21, 2016, 18 pages.
Final Office Action received for U.S. Appl. No. 14/815,898, mailed on Jun. 9, 2016, 19 pages.
Final Office Action received for U.S. Appl. No. 14/822,769, mailed on Jan. 4, 2018, 25 pages.
Final Office Action received for U.S. Appl. No. 14/833,014, mailed on Oct. 26, 2016, 32 pages.
Final Office Action received for U.S. Appl. No. 14/841,402, mailed on Aug. 25, 2017, 17 pages.
Final Office Action received for U.S. Appl. No. 14/841,614, mailed on May 10, 2018, 13 pages.
Final Office Action received for U.S. Appl. No. 14/841,623, mailed on Sep. 5, 2017, 16 pages.
Final Office Action received for U.S. Appl. No. 15/128,952, mailed on Jul. 18, 2018, 19 pages.
Final Office Action received for U.S. Appl. No. 15/268,115, mailed on Oct. 11, 2017, 48 pages.
Final Office Action received for U.S. Appl. No. 15/352,215, mailed on Mar. 7, 2019, 22 pages.
Final Office Action received for U.S. Appl. No. 15/405,122, mailed on Jan. 21, 2020, 36 pages.
Final Office Action received for U.S. Appl. No. 15/405,122, mailed on Nov. 5, 2021, 45 pages.
Final Office Action received for U.S. Appl. No. 15/995,040, mailed on Oct. 6, 2022, 27 pages.
Final Office Action received for U.S. Appl. No. 15/995,040, mailed on Oct. 17, 2019, 20 pages.
Final Office Action received for U.S. Appl. No. 15/995,040, mailed on Sep. 2, 2020, 21 pages.
Final Office Action received for U.S. Appl. No. 16/144,629, mailed on Sep. 11, 2020, 22 pages.
Final Office Action received for U.S. Appl. No. 16/144,629, mailed on Sep. 18, 2019, 22 pages.
Final Office Action received for U.S. Appl. No. 16/147,523, mailed on Aug. 4, 2020, 15 pages.
Final Office Action received for U.S. Appl. No. 16/147,523, mailed on Oct. 14, 2021, 22 pages.

(56) References Cited

OTHER PUBLICATIONS

Final Office Action received for U.S. Appl. No. 16/265,938, mailed on Apr. 7, 2020, 45 pages.
Final Office Action received for U.S. Appl. No. 16/271,583, mailed on Aug. 26, 2020, 18 pages.
Final Office Action received for U.S. Appl. No. 16/377,892, mailed on Jan. 28, 2021, 11 pages.
Final Office Action received for U.S. Appl. No. 16/378,136, mailed on Jan. 28, 2021, 9 pages.
Final Office Action received for U.S. Appl. No. 16/404,605, mailed on Feb. 10, 2020, 21 pages.
Final Office Action received for U.S. Appl. No. 16/528,941, mailed on Jul. 13, 2020, 15 pages.
Final Office Action received for U.S. Appl. No. 16/806,981, mailed on Apr. 14, 2021, 24 pages.
Final Office Action received for U.S. Appl. No. 16/806,981, mailed on Mar. 1, 2022, 33 pages.
Final Office Action received for U.S. Appl. No. 16/935,002, mailed on Jan. 5, 2022, 25 pages.
Final Office Action received for U.S. Appl. No. 16/943,737, mailed on Feb. 4, 2022, 24 pages.
Final Office Action received for U.S. Appl. No. 17/013,778, mailed on Apr. 1, 2022, 11 pages.
Final Office Action received for U.S. Appl. No. 17/116,938, mailed on Dec. 29, 2022, 42 pages.
Final Office Action received for U.S. Appl. No. 17/116,938, mailed on Mar. 1, 2022, 27 pages.
Final Office Action received for U.S. Appl. No. 17/181,089, mailed on Apr. 19, 2023, 13 pages.
Final Office Action received for U.S. Appl. No. 17/181,089, mailed on Oct. 13, 2023, 15 pages.
Final Office Action received for U.S. Appl. No. 17/181,089, mailed on Oct. 21, 2022, 15 pages.
Final Office Action received for U.S. Appl. No. 17/464,477, mailed on Jun. 22, 2022, 21 pages.
Final Office Action received for U.S. Appl. No. 17/466,824, mailed on Nov. 25, 2022, 35 pages.
Final Office Action received for U.S. Appl. No. 17/479,897, mailed on Jan. 10, 2023, 15 pages.
Final Office Action received for U.S. Appl. No. 17/516,537, mailed on Oct. 11, 2022, 9 pages.
Final Office Action received for U.S. Appl. No. 17/546,968, mailed on Mar. 19, 2024, 43 pages.
Final Office Action received for U.S. Appl. No. 17/572,117, mailed on Dec. 22, 2022, 16 pages.
Final Office Action received for U.S. Appl. No. 17/951,875, mailed on May 30, 2023, 12 pages.
Final Office Action received for U.S. Appl. No. 18/119,789, mailed on Aug. 30, 2023, 29 pages.
Final Office Action received for U.S. Appl. No. 18/200,480, mailed on Jun. 17, 2024, 19 pages.
Final Office Action received for U.S. Appl. No. 18/211,150, mailed on Jul. 2, 2024, 11 pages.
Final Office Action received for U.S. Appl. No. 11/462,696, mailed on Nov. 16, 2011, 45 pages.
Final Office Action received for U.S. Appl. No. 14/815,879, mailed on Mar. 24, 2016, 46 pages.
Final Office Action received for U.S. Appl. No. 14/822,769, mailed on Nov. 9, 2016, 18 pages.
First Action Interview received for U.S. Appl. No. 14/815,890, mailed on Aug. 12, 2016, 3 pages.
Frakes, Dan, "How to Get Started with Airplay", available at: https://www.macworld.com/article/2039770/how-to-get-started-with-airplay.html, Macworld, May 27, 2013, 8 pages.
Franks Tech Help, "DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Fukuda, Kazuhiro, "Xperia Z1 Perfect Manual", Sotec Co., Ltd., No. 1, Nov. 15, 2013, pp. 217-218.
Gavin's Gadgets, "Honor 10 Camera App Tutorial—How to use All Modes + 90 Photos Camera Showcase", See Especially 2:58-4:32, Available Online at: <https://www.youtube.com/watch?v=M5XZwXJcK74>, May 26, 2018, 3 pages.
Gazer, "iPhone 4S Super Manual", Shuwa System Co., Saito Kazukuni, vol. 1, Jun. 6, 2013, 7 pages (Official Copy only) {See Communication Under Rule 37 CFR § 1.98(a) (3)}.
Geary, David, "Programming HTML5 Canvas", O'Reilly Japan, Inc., No. 1, Jul. 23, 2014, pp. 327-330.
Gibson, Andrews., "Aspect Ratio: What it is and Why it Matters", Retrieved from <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
"Google Earth 7.0.1.8244", retrieved from the Internet: http://dl.google.com/dl/earth/client/ge7/release_7_0_1/googleearth-win-bundle-7.0.1.8244.exe, Oct. 29, 2012, 1 page.
"Google Earth on Android—AndroidCentral.com", Available online at:—https://www.youtube.com/watch?v=1WxN1RunrE4, Feb. 22, 2010, 1 page.
Gottabemobile, "How to Change Watch Faces on Android Wear", available online at URL: https://www.youtube.com/watch?v=B8iRGkGq6a8, Jul. 9, 2014, 4 pages.
GSM Arena, "Honor 10 Review: Camera", Available Online at <https://web.archive.org/web/20180823142417/https://www.gsmarena.com/honor_10-review-1771p5.php>, Aug. 23, 2018, 11 pages.
"GT-19500(Galaxy S4) User Manual, SAMSUNG, Rev.1.1", http://org.downloadcenter.samsung.com/downloadfile/ContentsFile.aspx?CDSite=UNI_TW &CttFileID=5406113&CDCttType=UM &ModelType=N&ModelName=GTI9500&VPath=UM/ 201305/20130520173017063/GTI9500_UM_Open_Taiwan_Jellybean_Chi_Rev.1.1_13052 0.pdf., May 2013, 14 pages. (Official Copy only) {See Communication Under Rule 37 CFR § 1.98(a) (3)}.
Hall, Brent, "Samsung Galaxy Phones Pro Mode (S7/S8/S9/Note 8/Note 9): When, why, & How to Use It", See Especially 3:18-5:57, Available Online at <https://www.youtube.com/watch?v=KwPxGUDRKTg>, Jun. 19, 2018, 3 pages.
Hayakawa, Atsushi, "An On-Line Wear Club", Mac People, Ascii Corp, Japan, vol. 8, No. 20., Oct. 15, 2002, 4 pages (Official Copy only) {See Communication Under Rule 37 CFR § 1.98(a) (3)}.
Hearing Notice received for Indian Patent Application No. 201817024430, mailed on Apr. 6, 2023, 2 pages.
Hernández, Carlos, "Lens Blur in the New Google Camera App", Available online at: https://research.googleblog.com/2014/04/lens-blur-in-new-google-camera-app.html, https://ai.googleblog.com/2014/04/1ens-blur-in-new-google-camera-app.html, Apr. 16, 2014, 6 pages.
Horowitz, Paul, "Always Show Scroll Bars in Mac OS X", Os X Daily, available online at: URL: http:josxdaily.com/2011/08/03/show-scroll-bars-mac-os-x-lion/, Aug. 3, 2011, 7 pages.
Huawei Mobile PH, "Huawei P10 Tips & Tricks: Compose Portraits With Wide Aperture (Bokeh)", Available Online at <https://www.youtube.com/watch?v=WM4yo5-hrrE>, Mar. 30, 2017, 2 pages.
IDB, "HomeCam is the Best Way to View Multiple HomeKit Cameras on iPhone & Apple TV", Available online at: https://www.youtube.com/watch?v=6x20CHgSVUU, Feb. 20, 2018, 3 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.

(56) References Cited

OTHER PUBLICATIONS

Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
Imagespacetv, "Olympus Om-D E-M1 Mark II—Highlights & Shadows with Gavin Hoey", Online available at: https://www.youtube.com/watch?v=goEhh1n--hQ, Aug. 3, 2018, 3 pages.
"Instruction Manual, Detailed version", KDDI Corporation, No. 1, vol. 1, Jun. 2014, 4 pages.
Intention to Grant received for Danish Patent Application No. PA201570496, mailed on Feb. 17, 2016, 6 pages.
Intention to Grant received for Danish Patent Application No. PA201570563, mailed on Mar. 17, 2016, 7 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for Danish Patent Application No. PA201670320, mailed on May 17, 2018, 2 pages.
Intention to Grant received for Danish Patent Application No. PA201670627, mailed on Jun. 11, 2018, 2 pages.
Intention to Grant received for Danish Patent Application No. PA201670753, mailed on Oct. 29, 2018, 2 pages.
Intention to Grant received for Danish Patent Application No. PA201670755, mailed on Nov. 13, 2018, 2 pages.
Intention to Grant received for Danish Patent Application No. PA201970593, mailed on Apr. 13, 2021, 2 pages.
Intention to Grant received for Danish Patent Application No. PA201970601, mailed on Sep. 21, 2020, 2 pages.
Intention to Grant received for Danish Patent Application No. PA201970603, mailed on Jan. 13, 2021, 2 pages.
Intention to Grant received for Danish Patent Application No. PA202070611, mailed on May 5, 2021, 2 pages.
Intention to Grant received for European Patent Application No. 15711969.4, mailed on May 29, 2019, 11 pages.
Intention to Grant received for European Patent Application No. 15712218.5, mailed on Jan. 24, 2018, 7 pages.
Intention to Grant received for European Patent Application No. 15730925.3, mailed on Aug. 16, 2021, 10 pages.
Intention to Grant received for European Patent Application No. 15730925.3, mailed on May 28, 2020, 10 pages.
Intention to Grant received for European Patent Application No. 15739110.3, mailed on Mar. 7, 2019, 8 pages.
Intention to Grant received for European Patent Application No. 15739110.3, mailed on Sep. 11, 2019, 6 pages.
Intention to Grant received for European Patent Application No. 15747595.5, mailed on Feb. 17, 2020, 8 pages.
Intention to Grant received for European Patent Application No. 15753796.0, mailed on Jan. 12, 2024, 9 pages.
Intention to Grant received for European Patent Application No. 15753796.0, mailed on Jun. 5, 2024, 8 pages.
Intention to Grant received for European Patent Application No. 15759998.6, mailed on Apr. 17, 2020, 10 pages.
Intention to Grant received for European Patent Application No. 15759998.6, mailed on Nov. 21, 2019, 12 pages.
Intention to Grant received for European Patent Application No. 15760008.1, mailed on Apr. 6, 2022, 11 pages.
Intention to Grant received for European Patent Application No. 15760008.1, mailed on Oct. 5, 2021, 11 pages.
Intention to Grant received for European Patent Application No. 16708014.2, mailed on May 10, 2022, 8 pages.
Intention to Grant received for European Patent Application No. 17809168.2, mailed on Jun. 25, 2021, 8 pages.
Intention to Grant received for European Patent Application No. 18176890.4, mailed on Feb. 28, 2020, 8 pages.
Intention to Grant received for European Patent Application No. 18183054.8, mailed on Nov. 5, 2020, 6 pages.
Intention to Grant received for European Patent Application No. 18209460.7, mailed on Jan. 15, 2021, 8 pages.
Intention to Grant received for European Patent Application No. 18214698.5, mailed on Apr. 21, 2020, 8 pages.
Intention to Grant received for European Patent Application No. 19185318.3, mailed on Dec. 10, 2021, 12 pages.
Intention to Grant received for European Patent Application No. 19203942.8, mailed on Aug. 1, 2023, 8 pages.
Intention to Grant received for European Patent Application No. 20168009.7, mailed on Feb. 28, 2023, 10 pages.
Intention to Grant received for European Patent Application No. 20168009.7, mailed on May 17, 2022, 9 pages.
Intention to Grant received for European Patent Application No. 20168009.7, mailed on Oct. 31, 2022, 9 pages.
Intention to Grant received for European Patent Application No. 20185974.1, mailed on Apr. 28, 2022, 8 pages.
Intention to Grant received for European Patent Application No. 20206196.6, mailed on Nov. 10, 2023, 10 pages.
Intention to Grant received for European Patent Application No. 20206197.4, mailed on Dec. 15, 2022, 10 pages.
Intention to Grant received for European Patent Application No. 20206197.4, mailed on May 25, 2023, 9 pages.
Intention to Grant received for European Patent Application No. 20210373.5, mailed on Jan. 10, 2023, 12 pages.
Intention to Grant received for European Patent Application No. 21733324.4, mailed on Jan. 9, 2023, 9 pages.
Intention to Grant received for European Patent Application No. 21733324.4, mailed on Sep. 13, 2022, 7 pages.
Intention to Grant received for European Patent Application No. 23173355.1, mailed on Jun. 28, 2024, 9 pages.
International Preliminary Report on Patentability received for PCT Patent Application No. PCT/US2015/019298, mailed on Mar. 16, 2017, 12 pages.
International Preliminary Report on Patentability received for PCT Patent Application No. PCT/US2015/019317, mailed on Dec. 15, 2016, 18 pages.
International Preliminary Report on Patentability received for PCT Patent Application No. PCT/US2015/034604, mailed on Feb. 16, 2017, 21 pages.
International Preliminary Report on Patentability received for PCT Patent Application No. PCT/US2015/034606, mailed on Feb. 16, 2017, 11 pages.
International Preliminary Report on Patentability received for PCT Patent Application No. PCT/US2015/034607, mailed on Feb. 16, 2017, 18 pages.
International Preliminary Report on Patentability received for PCT Patent Application No. PCT/US2015/038173, mailed on Jan. 5, 2017, 10 pages.
International Preliminary Report on Patentability received for PCT Patent Application No. PCT/US2015/038174, mailed on Jan. 5, 2017, 27 pages.
International Preliminary Report on Patentability received for PCT Patent Application No. PCT/US2015/041424, mailed on Feb. 2, 2017, 13 pages.
International Preliminary Report on Patentability received for PCT Patent Application No. PCT/US2015/044517, mailed on Mar. 16, 2017, 10 pages.
International Preliminary Report on Patentability received for PCT Patent Application No. PCT/US2015/046262, mailed on Mar. 16, 2017, 26 pages.
International Preliminary Report on Patentability received for PCT Patent Application No. PCT/US2016/017271, mailed on Sep. 21, 2017, 13 pages.
International Preliminary Report on Patentability received for PCT Patent Application No. PCT/USZ017/035321, mailed on Dec. 27, 2018, 11 pages.
International Preliminary Report on Patentability received for PCT Patent Application No. PCT/US2017/035554, mailed on Dec. 20, 2018,39 pages.
International Preliminary Report on Patentability received for PCT Patent Application No. PCT/US2019/017363, mailed on Aug. 20, 2020, 9 pages.
International Preliminary Report on Patentability received for PCT Patent Application No. PCT/US2019/030963, mailed on Nov. 19, 2020, 12 pages.

(56) References Cited

OTHER PUBLICATIONS

International Preliminary Report on Patentability received for PCT Patent Application No. PCT/US2019/049101, mailed on Mar. 25, 2021, 17 pages.
International Preliminary Report on Patentability received for PCT Patent Application No. PCT/US2020/031643, mailed on Nov. 18, 2021,27 pages.
International Preliminary Report on Patentability received for PCT Patent Application No. PCT/US2021/034304, mailed on Dec. 15, 2022, 19 pages.
International Preliminary Report on Patentability received for PCT Patent Application No. PCT/US2021/046861, mailed on Mar. 16, 2023, 8 pages.
International Preliminary Report on Patentability received for PCT Patent Application No. PCT/US2021/046877, mailed on Apr. 6, 2023, 12 pages.
International Preliminary Report on Patentability received for PCT Patent Application No. PCT/US2022/050916, mailed on Jun. 13, 2024, 18 pages.
International Preliminary Report on Patentability received for PCT Patent Application No. PCT/US2015/046787, mailed on Mar. 16, 2017, 19 pages.
International Search Report and Written Opinion received for PCT Patent Application No. PCT/US2015/034604, mailed on Nov. 9, 2015, 30 pages.
International Search Report and Written Opinion received for PCT Patent Application No. PCT/US2015/019298, mailed on Jul. 13, 2015, 17 pages.
International Search Report and Written Opinion received for PCT Patent Application No. PCT/US2015/019317, mailed on Aug. 25, 2015, 24 pages.
International Search Report and Written Opinion received for PCT Patent Application No. PCT/US2015/034606, mailed on Dec. 2, 2015, 17 pages.
International Search Report and Written Opinion received for PCT Patent Application No. PCT/US2015/038173 mailed on Sep. 25, 2015, 13 pages.
International Search Report and Written Opinion received for PCT Patent Application No. PCT/US2015/038174, mailed on Ja. 18, 2016, 38 pages.
International Search Report and Written Opinion received for PCT Patent Application No. PCT/US2015/041424, mailed on Mar. 31, 2016, 18 pages.
International Search Report and Written Opinion received for PCT Patent Application No. PCT/US2015/044517, mailed on Oct. 28, 2015, 13 pages.
International Search Report and Written Opinion received for PCT Patent Application No. PCT/US2015/046262, mailed on Mar. 15, 2016, 34 pages.
International Search Report and Written Opinion received for PCT Patent Application No. PCT/US2015/046787, mailed on Apr. 1, 2016, 26 pages.
International Search Report and Written Opinion received for PCT Patent Application No. PCT/US2016/017271, mailed on Sep. 1, 2016, 18 pages.
International Search Report and Written Opinion received for PCT Patent Application No. PCT/US2017/035321, mailed on Oct. 6, 2017, 15 pages.
International Search Report and Written Opinion received for PCT Patent Application No. PCT/US2017/035554, mailed on Sep. 22, 2017, 42 pages.
International Search Report and Written Opinion received for PCT Patent Application No. PCT/US2019/017363, mailed on Aug. 12, 2019, 12 pages.
International Search Report and Written Opinion received for PCT Patent Application No. PCT/US2019/030963, mailed on Oct. 17, 2019, 21 pages.
International Search Report and Written Opinion received for PCT Patent Application No. PCT/US2019/049101, mailed on Dec. 16, 2019, 26 pages.
International Search Report and Written Opinion received for PCT Patent Application No. PCT/US2020/031643, mailed on Dec. 2, 2020, 33 pages.
International Search Report and Written Opinion received for PCT Patent Application No. PCT/US2020/031643, mailed on Nov. 2, 2020, 34 pages.
International Search Report and Written Opinion received for PCT Patent Application No. PCT/US2021/034304, mailed on Oct. 11, 2021, 24 pages.
International Search Report and Written Opinion received for PCT Patent Application No. PCT/US2021/046861, mailed on Dec. 9, 2021, 11 pages.
International Search Report and Written Opinion received for PCT Patent Application No. PCT/US2021/046877, mailed on Mar. 1, 2022, 17 pages.
International Search Report and Written Opinion received for PCT Patent Application No. PCT/US2022/050916, mailed on May 15, 2023, 23 pages.
International Search Report and Written Opinion received for PCT Patent Application No. PCT/US2023/024279, mailed on Nov. 17, 2023, 20 pages.
International Search Report and Written Opinion received for PCT Patent Application No. PCT/US2015/034607, mailed on Dec. 1, 2015, 23 pages.
Inventerium, "Tropical Fish 14", Available online at: https://www.turbosquid.com/3d-models/tropical-fish-3d-model/388510, Feb. 4, 2008, 2 pages.
Invitation to Additional Fees and Partial International Search Report received for PCT Patent Application No. PCT/US2015/034604 mailed on Sep. 4, 2015, 6 pages.
Invitation to Additional Fees and Partial International Search Report received for PCT Patent Application No. PCT/US2015/034606 mailed on Sep. 9, 2015, 6 pages.
Invitation to Pay Addition Fees received for PCT Patent Application No. PCT/US2017/035321, mailed on Aug. 17, 2017, 3 pages.
Invitation to Pay Additional Fee received for European Patent Application No. 15747595.5, mailed on Feb. 9, 2018, 6 pages.
Invitation to Pay Additional Fee received for PCT Patent Application No. PCT/US2022/050916, mailed on Mar. 23, 2023, 16 pages.
Invitation to Pay Additional Fees and Partial International Search Report received for PCT Patent Application No. PCT/US2019/049101, mailed on Oct. 24, 2019, 17 pages.
Invitation to Pay Additional Fees and Partial International Search Report received for PCT Patent Application No. PCT/US2023/024279, mailed on Sep. 26, 2023, 12 pages.
Invitation to Pay Additional Fees received for PCT Patent Application No. PCT/US2015/019317, mailed on May 22, 2015, 7 pages.
Invitation to Pay Additional Fees received for PCT Patent Application No. PCT/US2015/034607, mailed on Sep. 30, 2015, 4 pages.
Invitation to Pay Additional Fees received for PCT Patent Application No. PCT/US2015/038174, mailed on Oct. 5, 2015, 5 pages.
Invitation to Pay Additional Fees received for PCT Patent Application No. PCT/US2015/041424, mailed on Nov. 12, 2015, 6 pages.
Invitation to Pay Additional Fees received for PCT Patent Application No. PCT/US2015/046262, mailed on Nov. 23, 2015, 7 pages.
Invitation to Pay Additional Fees received for PCT Patent Application No. PCT/US2015/046787, mailed on Dec. 15, 2015, 8 pages.
Invitation to Pay Additional Fees received for PCT Patent Application No. PCT/US2016/017271, mailed on May 25, 2016, 7 pages.
Invitation to Pay Additional Fees received for PCT Patent Application No. PCT/US2017/035554, mailed on Jul. 20, 2017, 2 pages.
Invitation to Pay Additional Fees received for PCT Patent Application No. PCT/US2019I017363, mailed on Jun. 17, 2019, 8 pages.
Invitation to Pay Additional Fees received for PCT Patent Application No. PCT/U82019/030963, mailed on Aug. 22, 2019, 12 pages.
Invitation to Pay Additional Fees received for PCT Patent Application No. PCT/US2020/031643, mailed on Sep. 9, 2020, 30 pages.
Invitation to Pay Additional Fees received for PCT Patent Application No. PCT/US2021/034304, mailed on Aug. 20, 2021, 16 pages.
Invitation to Pay Additional Fees received for PCT Patent Application No. PCT/US2021/046877, mailed on Jan. 5, 2022, 10 pages.

(56) References Cited

OTHER PUBLICATIONS

Invitation to Pay Search Fees received for European Patent Application No. 15753796.0, mailed on Mar. 24, 2020, 3 pages.
Invitation to Pay Search Fees received for European Patent Application No. 19728558.8, mailed on Apr. 20, 2021, 4 pages.
Invitation to Pay Search Fees received for European Patent Application No. 20728854.9, mailed on Feb. 23, 2024, 3 pages.
"iPhone User Guide For IOS 4.2 and 4.3 Software", Available at https://manuals.info.apple.com/MANUALS/1000/MA1539/en_US/iPhone_iOS4_User_Guid e.pdf, 2011, 274 pages.
Iphone, "User Guide for iOS 7.1 Software", Mar. 2014, 162 pages.
Jepson, Tom, "How to auto-forward specific emails in gmail?", Available online at <http://www.tomjepson.co.uk/how-to-auto-forward-specific-emails-in-gmail/>, May 19, 2013, 7 pages.
Junxiang, Zhang, "Playing My New iPad", The Publishing House of Ordinance Industry, Sep. 30, 2012, pp. 217-219 (Official Copy only) {See Communication Under Rule 37 CFR § 1.98(a) (3)}.
Kenney, Briley, "How To Customize a Smartwatch and other Personalization Questions", Available online at: <https://smartwatches.org/learn/customize-smartwatch/>, Jan. 23, 2014, 3 pages.
Kidizoom Smartwatch, Available online at <URL: https://www.vtechnl.com/media/downloads/Kidizoom-Smart-Watch.pdf>, Jun. 24, 2014, 23 pages.
"Kinect Gesture Commands—Kinect Voice Commands, Xbox Wire", Available Online At: <https://hwcdn.libsyn.com/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b >, 2013, 2 pages.
King, Juliea., "How to Check the Exposure Meter on Your Nikon D5500", Online available at: https://www.dummies.com/article/home-auto-hobbies/photography/how-to-check-the-exposuremeter-on-your-nikon-d5500-142677, Mar. 26, 2016, 6 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
"Link to Wayback Machine with link to Google Play showing different layouts of complications associated with a clock face", available online at <https://play.google.com/store/apps/details?id=com.levelup.beautifulwidgets.free&hl=da >, Sep. 9, 2013, 6 pages.
"Living Earth", available at: http;//www.livingcarthapp.com/, 2014, 6 pages.
Lyons et al., "Facet: A Multi-Segment Wrist Worn System", Online available at: <http://fetlab.io/publications/2012-Facet-a%20multi-segment%20wrist%20worn%20system.pdf>, Oct. 7-10, 2012, pp. 123-129.
"Microsoft Outlook 2010(TM) A Beginners Guide", Available online at:—http://www.reading.ac.uk/web/files/its/outlook2010.pdf, Apr. 1, 2012, 24 pages.
Minutes of the Oral Proceedings received for European Patent Application No. 15730924.6, mailed on Mar. 13, 2019, 4 pages.
Minutes of the Oral Proceedings received for European Patent Application No. 15730925.3, mailed on May 26, 2020, 11 pages.
Minutes of the Oral Proceedings received for European Patent Application No. 21165295.3, mailed on Apr. 26, 2024, 6 pages.
Minutes of the Oral Proceedings received for European Patent Application No. 15711969.4, mailed on May 16, 2019, 7 pages.
Minutes of the Oral Proceedings received for European Patent Application No. 15760008.1, mailed on Sep. 21, 2021, 6 pages.
Minutes of the Oral Proceedings received for European Patent Application No. 17184710.6, mailed on May 22, 2024, 4 pages.
Minutes of the Oral Proceedings received for European Patent Application No. 17810749.6, mailed on Jan. 26, 2021, 8 pages.
Minutes of the Oral Proceedings received for European Patent Application No. 21163791.3, mailed on Dec. 1, 2023, 6 pages.
Mugs, Online Available at: https://web.archive.org/web/20151029034349/http://le-mugs.com/, Oct. 29, 2015, 14 pages.
Nerdtalk, "The Best Android Clock Widgets", available at: https://www.youtube.com/watch?v=E1bAprWByfU, Apr. 25, 2011, 1 page.
Netsapiens, "Click to Call in MS Outlook", Available online at <https://netsapiens.com/click-to-call-in-ms-outlook-windows-apps/>, May 4, 2012, 8 pages.
"New, but unsigned—Easy StopWatch for Symbian, XP55393563", Available online at <http://www.allaboutsymbian.com/flow/item/19490_New_but_unsigned-Easy_StopWatc.php>, Mar. 15, 2014, 15 pages.
"Nikon Digital Camera D7200 User's Manual", Online available at: https://download.nikonimglib.com/archive3/dbHI400jWws903mGr6q98a4k8F90/D7200UM_SG(En)05.pdf, 2005, 416 pages.
Non-Final Office Action received for U.S. Appl. No. 14/815,890, mailed on Jun. 6, 2017, 19 pages.
Non-Final Office Action received for U.S. Appl. No. 14/815,890, mailed on Oct. 19, 2015, 5 pages.
Non-Final Office Action received for U.S. Appl. No. 14/822,769, mailed on Feb. 5, 2016, 14 pages.
Non-Final Office Action received for U.S. Appl. No. 14/833,014, mailed on Mar. 21, 2016, 26 pages.
Non-Final Office Action received for U.S. Appl. No. 17/464,477, mailed on Feb. 8, 2022, 16 pages.
Non-Final Office Action received for U.S. Appl. No. 11/462,696, mailed on Aug. 5, 2008, 15 pages.
Non-Final Office Action received for U.S. Appl. No. 11/462,696, mailed on Nov. 16, 2010, 43 pages.
Non-Final Office Action received for U.S. Appl. No. 11/462,696, mailed on Sep. 1, 2009, 18 pages.
Non-Final Office Action received for U.S. Appl. No. 17/013,778, mailed on Aug. 20, 2021, 9 pages.
Non-Final Office Action received for U.S. Appl. No. 16/528,257, mailed on Jul. 30, 2021, 12 pages.
Non-Final Office Action received for U.S. Appl. No. 14/805,403, mailed on Nov. 16, 2017, 21 pages.
Non-Final Office Action received for U.S. Appl. No. 14/752,776, mailed on Jan. 2, 2018, 30 pages.
Non-Final Office Action received for U.S. Appl. No. 14/752,776, mailed on Nov. 5, 2018, 48 pages.
Non-Final Office Action received for U.S. Appl. No. 14/815,879, mailed on Dec. 15, 2016, 33 pages.
Non-Final Office Action received for U.S. Appl. No. 14/815,890, mailed on Dec. 18, 2018, 21 pages.
Non-Final Office Action received for U.S. Appl. No. 14/822,769, mailed on Jun. 29, 2016, 14 pages.
Non-Final Office Action received for U.S. Appl. No. 14/822,769, mailed on May 4, 2017, 21 pages.
Non-Final Office Action received for U.S. Appl. No. 14/822,769, mailed on May 24, 2018, 30 pages.
Non-Final Office Action received for U.S. Appl. No. 14/841,402, mailed on Jan. 25, 2017, 18 pages.
Non-Final Office Action received for U.S. Appl. No. 14/841,608, mailed on Apr. 12, 2017, 9 Pages.
Non-Final Office Action received for U.S. Appl. No. 14/841,614, mailed on Jul. 27, 2017, 13 pages.
Non-Final Office Action received for U.S. Appl. No. 14/841,623, mailed on Feb. 2, 2017, 17 pages.
Non-Final Office Action received for U.S. Appl. No. 14/869,807, mailed on Dec. 2, 2016, 23 pages.
Non-Final Office Action received for U.S. Appl. No. 15/128,952, mailed on Apr. 1, 2019, 20 pages.
Non-Final Office Action received for U.S. Appl. No. 15/128,952, mailed on Dec. 29, 2017, 13 pages.
Non-Final Office Action received for U.S. Appl. No. 15/268,115, mailed on Apr. 13, 2017, 44 pages.
Non-Final Office Action received for U.S. Appl. No. 15/273,522, mailed on Nov. 30, 2016, 15 pages.
Non-Final Office Action received for U.S. Appl. No. 15/273,544, mailed on May 25, 2017, 18 pages.
Non-Final Office Action received for U.S. Appl. No. 15/352,215, mailed on Sep. 20, 2018, 31 pages.
Non-Final Office Action received for U.S. Appl. No. 15/355,956, mailed on May 31, 2019, 32 pages.
Non-Final Office Action received for U.S. Appl. No. 15/405,122, mailed on Apr. 2, 2021, 35 pages.

(56) References Cited

OTHER PUBLICATIONS

Non-Final Office Action received for U.S. Appl. No. 15/405,122, mailed on May 31, 2019, 43 pages.
Non-Final Office Action received for U.S. Appl. No. 15/405,122, mailed on Sep. 24, 2020, 30 pages.
Non-Final Office Action received for U.S. Appl. No. 15/995,040, mailed on Apr. 8, 2022, 21 pages.
Non-Final Office Action received for U.S. Appl. No. 15/995,040, mailed on Apr. 15, 2020, 19 pages.
Non-Final Office Action received for U.S. Appl. No. 15/995,040, mailed on Jun. 7, 2023, 26 pages.
Non-Final Office Action received for U.S. Appl. No. 15/995,040, mailed on May 16, 2019, 24 pages.
Non-Final Office Action received for U.S. Appl. No. 16/103,699, mailed on Nov. 30, 2018, 14 pages.
Non-Final Office Action received for U.S. Appl. No. 16/144,629, mailed on Mar. 13, 2020, 24 pages.
Non-Final Office Action received for U.S. Appl. No. 16/144,629, mailed on Mar. 29, 2019, 18 pages.
Non-Final Office Action received for U.S. Appl. No. 16/147,523, mailed on Apr. 26, 2022, 22 pages.
Non-Final Office Action received for U.S. Appl. No. 16/147,523, mailed on Dec. 27, 2019, 11 pages.
Non-Final Office Action received for U.S. Appl. No. 16/147,523, mailed on Jul. 21, 2021, 20 pages.
Non-Final Office Action received for U.S. Appl. No. 16/259,954, mailed on Feb. 5, 2020, 10 pages.
Non-Final Office Action received for U.S. Appl. No. 16/265,938, mailed on Nov. 4, 2019, 28 pages.
Non-Final Office Action received for U.S. Appl. No. 16/271,583, mailed on May 6, 2020, 24 pages.
Non-Final Office Action received for U.S. Appl. No. 16/271,583, mailed on Nov. 29, 2019, 18 pages.
Non-Final Office Action received for U.S. Appl. No. 16/377,892, mailed on May 21, 2020, 9 pages.
Non-Final Office Action received for U.S. Appl. No. 16/378,136, mailed on Jun. 2, 2020, 8 pages.
Non-Final Office Action received for U.S. Appl. No. 16/404,605, mailed on Jun. 24, 2020, 18 pages.
Non-Final Office Action received for U.S. Appl. No. 16/404,605, mailed on Aug. 1, 2019, 19 Pages.
Non-Final Office Action received for U.S. Appl. No. 16/404,612, mailed on Feb. 28, 2020, 13 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/582,595, mailed on Nov. 26, 2019, 17 pages.
Non-Final Office Action received for U.S. Appl. No. 16/583,020, mailed on Nov. 14, 2019, 9 pages.
Non-Final Office Action received for U.S. Appl. No. 16/806,981, mailed on Nov. 13, 2020, 22 pages.
Non-Final Office Action received for U.S. Appl. No. 16/806,981, mailed on Sep. 1, 2021, 27 pages.
Non-Final Office Action received for U.S. Appl. No. 16/825,879, mailed on May 5, 2021, 12 pages.
Non-Final Office Action received for U.S. Appl. No. 16/935,002, mailed on Jun. 25, 2021, 20 pages.
Non-Final Office Action received for U.S. Appl. No. 16/943,737, mailed on Jun. 25, 2021, 18 pages.
Non-Final Office Action received for U.S. Appl. No. 16/943,737, mailed on Mar. 28, 2023, 28 pages.
Non-Final Office Action received for U.S. Appl. No. 17/013,778, mailed on Dec. 9, 2021, 11 pages.
Non-Final Office Action received for U.S. Appl. No. 17/027,317, mailed on Nov. 17, 2020, 17 pages.
Non-Final Office Action received for U.S. Appl. No. 17/041,412, mailed on Dec. 5, 2022, 13 pages.
Non-Final Office Action received for U.S. Appl. No. 17/103,436, mailed on Aug. 18, 2021, 16 pages.
Non-Final Office Action received for U.S. Appl. No. 17/116,938, mailed on Aug. 1, 2022, 15 pages.
Non-Final Office Action received for U.S. Appl. No. 17/116,938, mailed on Jul. 30, 2021, 19 pages.
Non-Final Office Action received for U.S. Appl. No. 17/181,089, mailed on Aug. 4, 2023, 15 pages.
Non-Final Office Action received for U.S. Appl. No. 17/181,089, mailed on Feb. 17, 2023, 14 pages.
Non-Final Office Action received for U.S. Appl. No. 17/181,089, mailed on May 13, 2022, 12 pages.
Non-Final Office Action received for U.S. Appl. No. 17/190,879, mailed on Oct. 13, 2021, 10 pages.
Non-Final Office Action received for U.S. Appl. No. 17/220,596, mailed on Jun. 10, 2021, 31 pages.
Non-Final Office Action received for U.S. Appl. No. 17/464,477, mailed on Mar. 10, 2023, 21 pages.
Non-Final Office Action received for U.S. Appl. No. 17/466,824, mailed on May 11, 2022, 30 pages.
Non-Final Office Action received for U.S. Appl. No. 17/466,824, mailed on May 25, 2023, 33 pages.
Non-Final Office Action received for U.S. Appl. No. 17/479,897, mailed on Apr. 25, 2023, 14 pages.
Non-Final Office Action received for U.S. Appl. No. 17/479,897, mailed on Aug. 30, 2022, 10 pages.
Non-Final Office Action received for U.S. Appl. No. 17/510,168, mailed on Dec. 6, 2022, 11 pages.
Non-Final Office Action received for U.S. Appl. No. 17/516,537, mailed on May 5, 2022, 8 pages.
Non-Final Office Action received for U.S. Appl. No. 17/546,968, mailed on Nov. 24, 2023, 34 pages.
Non-Final Office Action received for U.S. Appl. No. 17/572,117, mailed on Oct. 6, 2022, 15 pages.
Non-Final Office Action received for U.S. Appl. No. 17/827,004, mailed on Nov. 9, 2022, 27 pages.
Non-Final Office Action received for U.S. Appl. No. 17/846,962, mailed on May 9, 2024, 19 pages.
Non-Final Office Action received for U.S. Appl. No. 17/951,875, mailed on Jan. 23, 2023, 12 pages.
Non-Final Office Action received for U.S. Appl. No. 17/975,141, mailed on Jul. 6, 2023, 22 pages.
Non-Final Office Action received for U.S. Appl. No. 18/114,880, mailed on Aug. 29, 2023, 10 pages.
Non-Final Office Action received for U.S. Appl. No. 18/119,789, mailed on Jun. 28, 2023, 31 pages.
Non-Final Office Action received for U.S. Appl. No. 18/196,997, mailed on Nov. 20, 2023, 12 pages.
Non-Final Office Action received for U.S. Appl. No. 18/200,480, mailed on Feb. 29, 2024, 16 pages.
Non-Final Office Action received for U.S. Appl. No. 18/200,480, mailed on Mar. 6, 2024, 17 pages.
Non-Final Office Action received for U.S. Appl. No. 18/200,480, mailed on May 20, 2024, 19 pages.
Non-Final Office Action received for U.S. Appl. No. 18/204,888, mailed on Jul. 18, 2024, 21 pages.
Non-Final Office Action received for U.S. Appl. No. 18/211,150, mailed on Feb. 14, 2024, 11 pages.
Non-Final Office Action received for U.S. Appl. No. 18/211,150, mailed on Sep. 16, 2024, 11 pages.
Non-Final Office Action received for U.S. Appl. No. 18/423,234, mailed on Sep. 16, 2024, 9 pages.
Non-Final Office Action received for U.S. Appl. No. 14/815,879, mailed on Nov. 6, 2015, 35 pages.
Non-Final Office Action received for U.S. Appl. No. 14/815,898, mailed on Dec. 1, 2015, 22 pages.
Non-Final Office Action received for U.S. Appl. No. 14/815,907, mailed on Jan. 12, 2016, 22 pages.
Non-Final Office Action received for U.S. Appl. No. 14/815,909, mailed on Nov. 27, 2015, 12 pages.
Notice of Acceptance received for Australian Patent Application No. 2015267671, mailed on Apr. 4, 2018, 3 pages.

(56) References Cited

OTHER PUBLICATIONS

Notice of Acceptance received for Australian Patent Application No. 2015279544, mailed on Mar. 1, 2018, 3 pages.
Notice of Acceptance received for Australian Patent Application No. 2015298710, mailed on Oct. 8, 2019, 3 pages.
Notice of Acceptance received for Australian Patent Application No. 2016231598, mailed on Mar. 1, 2018, 3 pages.
Notice of Acceptance received for Australian Patent Application No. 2017277971, mailed on Feb. 17, 2021, 3 pages.
Notice of Acceptance received for Australian Patent Application No. 2017286130, mailed on Apr. 26, 2019, 3 pages.
Notice of Acceptance received for Australian Patent Application No. 2018201089, mailed on May 28, 2021, 3 pages.
Notice of Acceptance received for Australian Patent Application No. 2018202751, mailed on Sep. 4, 2019, 3 pages.
Notice of Acceptance received for Australian Patent Application No. 2018204286, mailed on Feb. 27, 2020, 3 pages.
Notice of Acceptance received for Australian Patent Application No. 2019213341, mailed on Aug. 25, 2020, 3 pages.
Notice of Acceptance received for Australian Patent Application No. 2019218241, mailed on Mar. 9, 2022, 3 pages.
Notice of Acceptance received for Australian Patent Application No. 2019338180, mailed on Jun. 27, 2022, 3 pages.
Notice of Acceptance received for Australian Patent Application No. 2020203919, mailed on Sep. 3, 2021, 3 pages.
Notice of Acceptance received for Australian Patent Application No. 2020239717, mailed on Jun. 1, 2022, 3 pages.
Notice of Acceptance received for Australian Patent Application No. 2020250323, mailed on Feb. 28, 2022, 3 pages.
Notice of Acceptance received for Australian Patent Application No. 2020260413, mailed on Oct. 14, 2021, 3 pages.
Notice of Acceptance received for Australian Patent Application No. 2020267151, mailed on Dec. 9, 2020, 3 pages.
Notice of Acceptance received for Australian Patent Application No. 2020277216, mailed on Mar. 15, 2021, 3 pages.
Notice of Acceptance received for Australian Patent Application No. 2021201167, mailed on Mar. 15,2021, 3 pages.
Notice of Acceptance received for Australian Patent Application No. 2021203210, mailed on Jul. 9, 2021, 3 pages.
Notice of Acceptance received for Australian Patent Application No. 2021203636, mailed on Apr. 14, 2022, 3 pages.
Notice of Acceptance received for Australian Patent Application No. 2021254567, mailed on Nov. 17, 2021 , 3 pages.
Notice of Acceptance received for Australian Patent Application No. 2021277718, mailed on Mar. 3, 2023, 3 pages.
Notice of Acceptance received for Australian PatentApplication No. 2021290292, mailed on Jan. 23, 2023, 3 pages.
Notice of Acceptance received for Australian Patent Application No. 2022200966, mailed on Feb. 25, 2022, 3 pages.
Notice of Acceptance received for Australian Patent Application No. 2022202377, mailed on May 11, 2022, 3 pages.
Notice of Acceptance received for Australian Patent Application No. 2022203957, mailed on Sep. 27, 2023, 3 pages.
Notice of Acceptance received for Australian Patent Application No. 2022204465, mailed on May 26, 2023, 3 pages.
Notice of Acceptance received for Australian Patent Application No. 2022204466, mailed on Jul. 25, 2023, 3 pages.
Notice of Acceptance received for Australian Patent Application No. 2022209277, mailed on Apr. 28, 2023, 3 pages.
Notice of Acceptance received for Australian Patent Application No. 2022221466, mailed on Aug. 31, 2023, 3 pages.
Notice of Acceptance received for Australian Patent Application No. 2022228121, mailed on Dec. 13, 2023, 3 pages.
Notice of Acceptance received for Australian Patent Application No. 2022228191, mailed on Oct. 10, 2023, 3 pages.
Notice of Acceptance received for Australian Patent Application No. 2023200607, mailed on May 9, 2024, 3 pages.
Notice of Acceptance received for Australian Patent Application No. 2023202432, mailed on Nov. 6, 2023, 3 pages.
Notice of Acceptance received for Australian Patent Application No. 2023251497, mailed on Sep. 19, 2024, 3 pages.
Notice of Acceptance received for Australian Patent Application No. 2015279545, mailed on Feb. 9, 2018, 3 pages.
Notice of Allowance received for Brazilian Patent Application No. 112018074765-3, mailed on Oct. 8, 2019, 2 pages (1 page of English Translation and 1 page of Official Copy).
Notice of Allowance received for Brazilian, Patent Application No. BR122018076550-0 mailed on Jan. 3,2022, 3 pages (1 page of English Translation and 2 pages of Official Copy).
Notice of Allowancereceived for Chinese Patent Application No. 201510479088.4, mailed on Jan. 21, 2021, 2 pages (1 page of English Translation and 1 page of Official Copy).
Notice of Allowance received for Chinese Patent Application No. 201510481525.6, mailed on May 27, 2019, 2 pages (1 page of English Translation and 1 page of Official Copy).
Notice of Allowance received for Chinese Patent Application No. 201510483268.X, mailed on Nov. 6, 2019, 2 pages (1 page of English translation and 1 page of Official Copy).
Notice of Allowance received for Chinese Patent Application No. 201510483305.7, mailed on Jan. 8, 2019, 3 pages (1 page of English Translation and 2 pages of Official Copy).
Notice of Allowance received for Chinese Patent Application No. 201510484514.3, mailed on Jun. 6, 2019, 2 pages (1 page of English Translation and 1 page of Official Copy).
Notice of Allowance received for Chinese Patent Application No. 201510557356.X, mailed on Mar. 5, 2020, 2 pages (1 page of English Translation and 1 page of Official Copy).
Notice of Allowance received for Chinese Patent Application No. 201520594249.X, mailed on Jul. 12, 2016, 4 pages (2 pages of English Translation and 2 pages of Official Copy).
Notice of Allowance received for Chinese Patent Application No. 201580028505.1, mailed on Sep. 19, 2019, 2 pages (1 page of English Translation and 1 page of Official Copy).
Notice of Allowance received for Chinese Patent Application No. 201580029054.3, mailed on Jul. 19, 2019, 2 pages (1 page of English Translation and 1 page of Official Copy).
Notice of Allowance received for Chinese Patent Application No. 201580046237.6, mailed on Aug. 29, 2018, 4 pages (1 page of English Translation and 3 pages of Official Copy).
Notice of Allowance received for Chinese Patent Application No. 201680012936.3, mailed on Jul. 13, 2021, 4 pages (1 page of English Translation and 3 pages of Official Copy).
Notice of Allowance received for Chinese Patent Application No. 201710439448.7, mailed on Jan. 26, 2021, 2 pages (1 page of English Translation and 1 page of Official Copy).
Notice of Allowance received for Chinese Patent Application No. 201710657424.9, mailed on May 8, 2020, 2 pages (1 page of English Translation and 1 page of Official Copy).
Notice of Allowance received for Chinese Patent Application No. 201780002533.5, mailed on Apr. 14, 2020, 2 pages (1 page of English Translation and 1 page of Official Copy).
Notice of Allowance received for Chinese Patent Application No. 201780034203.4, mailed on Jan. 17, 2022, 2 pages (1 page of English Translation and 1 page of Official Copy).
Notice of Allowance received for Chinese Patent Application No. 201810566134.8, mailed on Apr. 7, 2020, 3 pages (1 page of English Translation and 2 pages of Official Copy).
Notice of Allowance received for Chinese Patent Application No. 201810664927.3, mailed on Jul. 19, 2019, 2 pages (1 page of English Translation and 1 page of Official Copy).
Notice of Allowance received for Chinese Patent Application No. 201811512767.7, mailed on Jul. 27, 2020, 4 pages (1 page of English Translation and 3 pages of Official Copy).
Notice of Allowance received for Chinese Patent Application No. 201910875660.7, mailed on Jan. 4, 2024, 2 pages (1 page of English Translation and 1 page of Official Copy).
Notice of Allowance received for Chinese Patent Application No. 201911099970.0, mailed on Jun. 25, 2023, 4 pages (1 page of English Translation and 3 pages of Official Copy).
Notice of Allowance received for Chinese Patent Application No. 202010287950.2, mailed on Mar. 22, 2022, 7 pages (3 pages of English Translation and 4 pages of Official Copy).

(56) References Cited

OTHER PUBLICATIONS

Notice of Allowance received for Chinese Patent Application No. 202010287953.6, mailed on Mar. 18, 2021, 7 pages (3 pages of English Translation and 4 pages of Official Copy).
Notice of Allowance received for Chinese Patent Application No. 202010287958.9, mailed on Aug. 27, 2021, 6 pages (3 pages of English Translation and 3 pages of Official Copy).
Notice of Allowance received for Chinese Patent Application No. 202010287961.0, mailed on Mar. 9, 2021, 8 pages (4 pages of English Translation and 4 pages of Official Copy).
Notice of Allowance received for Chinese Patent Application No. 202010287975.2, mailed on Mar. 1, 2021, 7 pages (3 pages of English Translation and 4 pages of Official Copy).
Notice of Allowance received for Chinese Patent Application No. 202010600151.6, mailed on Aug. 13, 2021, 2 pages (1 page of English Translation and 1 page of Official Copy).
Notice of Allowance received for Chinese Patent Application No. 202010600197.8, mailed on Feb. 9, 2022, 5 pages (1 page of English Translation and 4 pages of Official Copy).
Notice of Allowance received for Chinese Patent Application No. 202010601484.0, mailed on Nov. 23, 2021, 2 pages (1 page of English Translation and 1 page of Official Copy).
Notice of Allowance received for Chinese Patent Application No. 202011336156.9, mailed on Jan. 6, 2022, 3 pages (2 pages of English Translation and 1 page of Official Copy).
Notice of Allowance received for Chinese Patent Application No. 202011480411.7, mailed on Feb. 18, 2022, 6 pages (3 pages of English Translation and 3 pages of Official Copy).
Notice of Allowance received for Chinese Patent Application No. 202110248576.X, mailed on Mar. 21, 2022, 2 pages (1 page of English Translation and 1 page of Official Copy).
Notice of Allowance received for Chinese Patent Application No. 202110369386.3, mailed on Jul. 9, 2024, 5 pages (1 page of English Translation and 4 pages of Official Copy).
Notice of Allowance received for Chinese Patent Application No. 202110369387.8, mailed on Aug. 30, 2024, 2 pages (1 page of English Translation and 1 page of Official Copy).
Notice of Allowance received for Chinese Patent Application No. 202180002106.3, mailed on May 5, 2022, 6 pages (3 pages of English Translation and 3 pages of Official Copy).
Notice of Allowance received for Chinese Patent Application No. 202210326960.1, mailed on Jun. 21, 2024, 5 pages (1 page of English Translation and 4 pages of Official Copy).
Notice of Allowance received for Chinese Patent Application No. 202210463449.6, mailed on Mar. 9, 2024, 2 pages (1 page of English Translation and 1 page of Official Copy).
Notice of Allowance received for Chinese Patent Application No. 202211081603.X, mailed on Jul. 29, 2024, 2 pages (1 page of English Translation and 1 page of Official Copy).
Notice of Allowance received for Chinese Patent Application No. 202211110081.1, mailed on Jul. 24, 2024, 2 pages (1 page of English Translation and 1 page of Official Copy).
Notice of Allowance received for Danish Patent Application No. PA201570495, mailed on Feb. 22, 2017, 1 page.
Notice of Allowance received for Danish Patent Application No. PA201570496, mailed on Apr. 18, 2016, 2 pages.
Notice of Allowance received for Danish Patent Application No. PA201570563, mailed on May 24, 2016, 2 pages.
Notice of Allowance received for Danish Patent Application No. PA201570667, mailed on Nov. 11, 2016, 2 pages.
Notice of Allowance received for Japanese Patent Application No. 2016-569669, mailed on Mar. 19, 2018, 4 pages (1 page of English translation and 3 pages of Official Copy).
Notice of Allowance received for Japanese Patent Application No. 2017-505450, mailed on Mar. 9, 2018, 10 pages (7 pages of English Translation and 3 pages of Official Copy).
Notice of Allowance received for Japanese Patent Application No. 2017-505842, mailed on Mar. 16, 2020, 4 pages (1 page of English Translation and 3 pages of Official Copy).
Notice of Allowance received for Japanese Patent Application No. 2017-505847, mailed on May 20, 2019, 4 pages (1 page of English Translation and 3 pages of Official Copy).
Notice of Allowance received for Japanese Patent Application No. 2018-074971, mailed on Apr. 23, 2019, 4 pages (1 page of English Translation and 3 pages of Official Copy).
Notice of Allowance received for Japanese Patent Application No. 2018-080122, mailed on May 7, 2021, 28 pages (1 page of English Translation and 27 pages of Official Copy).
Notice of Allowance received for Japanese Patent Application No. 2018-107114, mailed on Mar. 22, 2019, 4 pages (1 page of English Translation and 3 pages of Official Copy.
Notice of Allowance received for Japanese Patent Application No. 2018-171188, mailed on Jul. 16, 2019, 3 pages (1 page of English Translation and 2 pages of Official Copy).
Notice of Allowance received for Japanese Patent Application No. 2019-096219, mailed on Jun. 26, 2020, 4 pages (1 page of English Translation and 3 pages of Official Copy).
Notice of Allowance received for Japanese Patent Application No. 2020-124605, mailed on Dec. 5, 2022, 4 pages (1 page of English Translation and 3 pages of Official Copy).
Notice of Allowance received for Japanese Patent Application No. 2020-159338, mailed on Jul. 19, 2022, 3 pages (1 page of English Translation and 2 pages of Official Copy).
Notice of Allowance received for Japanese Patent Application No. 2020-542592, mailed on Nov. 14, 2022, 2 pages (1 page of English Translation and 1 page of Official Copy).
Notice of Allowance received for Japanese Patent Application No. 2020-560927, mailed on May 30, 2022, 3 pages (1 page of English Translation and 2 pages of Official Copy).
Notice of Allowance received for Japanese Patent Application No. 2021-510849, mailed on May 16, 2022, 4 pages (1 page of English Translation and 3 pages of Official Copy).
Notice of Allowance received for Japanese Patent Application No. 2021-565919, mailed on Oct. 3, 2022, 3 pages (1 page of English Translation and 2 pages of Official Copy).
Notice of Allowance received for Japanese Patent Application No. 2022-016138, mailed on Sep. 25, 2023, 3 pages (1 page of English Translation and 2 pages of Official Copy).
Notice of Allowance received for Japanese Patent Application No. 2022-095182, mailed on Feb. 5, 2024, 4 pages (1 page of English Translation and 3 pages of Official Copy).
Notice of Allowance received for Japanese Patent Application No. 2022-205934, mailed on Jun. 10, 2024, 4 pages (1 page of English Translation and 3 pages of Official Copy).
Notice of Allowance received for Korean Patent Application No. 10-2016-7032902, mailed on Sep. 7, 2018, 3 pages (1 page of English Translation and 2 pages of Official Copy).
Notice of Allowance received for Korean Patent Application No. 10-2017-7005939, mailed on Mar. 30, 2018, 5 pages (2 pages of English Translation and 3 pages of Official Copy).
Notice of Allowance received for Korean Patent Application No. 10-2018-7018904, mailed. on Jun. 26, 2020, 4 pages (1 page of English Translation and 3 pages of Official Copy).
Notice of Allowance received for Korean Patent Application No. 10-2018-7026743, mailed on Mar. 20, 2019, 7 pages (1 page of English Translation and 6 pages of Official Copy).
Notice of Allowance received for Korean Patent Application No. 10-2018-7028849, mailed on Feb. 1, 2019, 4 pages (1 page of English Translation and 3 pages of Official Copy).
Notice of Allowance received for Korean Patent Application No. 10-2018-7034780, mailed on Jun. 19, 2019, 4 pages (1 page of English Translation and 3 pages of Official Copy).
Notice of Allowance received for Korean Patent Application No. 10-2018-7035747, mailed on Dec. 9, 2020, 5 pages (2 pages of English Translation and 3 pages of Official Copy).
Notice of Allowance received for Korean Patent Application No. 10-2018-7036893, mailed on Jun. 12, 2019, 4 pages (1 page of English Translation and 3 pages of Official Copy).
Notice of Allowance received for Korean Patent Application No. 10-2019-7027042, mailed on Nov. 26, 2020, 4 pages (1 page of English Translation and 3 pages of Official Copy).

(56) References Cited

OTHER PUBLICATIONS

Notice of Allowance received for Korean Patent Application No. 10-2020-0052618, mailed on Mar. 23, 2021, 5 pages (2 page of English Translation and 3 pages of Official Copy).
Notice of Allowance received for Korean Patent Application No. 10-2020-0124139, mailed on Jun. 19, 2023, 7 pages (2 pages of English Translation and 5 pages of Official Copy).
Notice of Allowance received for Korean Patent Application No. 10-2020-0143726, mailed on Nov. 10, 2020, 5 pages (2 pages of English Translation and 3 pages of Official Copy).
Notice of Allowance received for Korean Patent Application No. 10-2020-0155924, mailed on Nov. 23, 2020, 7 pages (2 pages of English Translation and 5 pages of Official Copy).
Notice of Allowance received for Korean Patent Application No. 10-2020-7022663, mailed on Jun. 23, 2022, 6 pages (2 pages of English Translation and 4 pages of Official Copy).
Notice of Allowance received for Korean Patent Application No. 10-2020-7026036, mailed on Jul. 26, 2021, 4 pages (1 page of English Translation and 3 pages of Official Copy).
Notice of Allowance received for Korean Patent Application No. 10-2020-7031700, mailed on Apr. 21, 2021, 4 pages (2 pages of English Translation and 2 pages of Official Copy).
Notice of Allowance received for Korean Patent Application No. 10-2021-0022053, mailed on Nov. 23, 2021, 5 pages (2 pages of English Translation and 3 pages of Official Copy).
Notice of Allowance received for Korean Patent Application No. 10-2021-7000954, mailed on Aug. 18, 2021, 5 pages (2 pages of English Translation and 3 pages of Official Copy).
Notice of Allowance received for Korean Patent Application No. 10-2021-7006145, mailed on Mar. 6, 2023, 5 pages (2 pages of English Translation and 3 pages of Official Copy).
Notice of Allowance received for Korean Patent Application No. 10-2021-7022610, mailed on Oct. 13, 2021, 3 pages (1 page of English Translation and 2 pages of Official Copy).
Notice of Allowance received for Korean Patent Application No. 10-2021-7034748, mailed on Jan. 27, 2022, 6 pages (2 pages of English Translation and 4 pages of Official Copy).
Notice of Allowance received for Korean Patent Application No. 10-2021-7035687, mailed on Dec. 30, 2021, 5 pages (1 page of English Translation and 4 pages of Official Copy).
Notice of Allowance received for Korean Patent Application No. 10-2021-7036337, mailed on Apr. 5, 2022, 4 pages (1 page of English Translation and 3 pages of Official Copy).
Notice of Allowance received for Korean Patent Application No. 10-2022-7001332, mailed on Oct. 25, 2023, 7 pages (2 pages of English Translation and 5 pages of Official Copy).
Notice of Allowance received for Korean Patent Application No. 10-2022-7010505, mailed on Dec. 26, 2022, 7 pages (2 pages of English Translation and 5 pages of Official Copy).
Notice of Allowance received for Korean Patent Application No. 10-2022-7014529, mailed on Dec. 13, 2022, 8 pages (2 pages of English Translation and 6 pages of Official Copy).
Notice of Allowance received for Korean Patent Application No. 10-2022-7023077, mailed on Nov. 1, 2022, 8 pages (2 pages of English Translation and 6 pages of Official Copy).
Notice of Allowance received for Korean Patent Application No. 10-2022-7033119, mailed on Jul. 26, 2023, 7 pages (2 pages of English Translation and 5 pages of Official Copy).
Notice of Allowance received for Korean Patent Application No. 10-2023-7008854, mailed on Jul. 26, 2024, 8 pages (2 pages of English Translation and 6 pages of Official Copy).
Notice of Allowance received for Korean Patent Application No. 10-2023-7009943, mailed on Aug. 31, 2023, 7 pages (2 pages of English Translation and 5 pages of Official Copy).
Notice of Allowance received for Korean Patent Application No. 10-2023-7016569, mailed on Sep. 10, 2024, 7 pages (2 pages of English Translation and 5 pages of Official Copy).
Notice of Allowance received for Korean Patent Application No. 10-2023-7036985, mailed on Apr. 11, 2024, 7 pages (2 pages of English Translation and 5 pages of Official Copy).
Notice of Allowance received for Korean Patent Application No. 10-2024-7001084, mailed on May 22, 2024, 7 pages (2 pages of English Translation and 5 pages of Official Copy).
Notice of Allowance received for Netherlands Patent Application No. 2019753, mailed on Jul. 6, 2018, 6 pages (2 pages of English Translation and 4 pages of Official copy).
Notice of Allowance received for Taiwanese Patent Application No. 104107328, mailed on Jun. 12, 2017, 3 pages (Official Copy only) {See Communication Under Rule 37 CFR § 1.98(a) (3)}.
Notice of Allowance received for Taiwanese Patent Application No. 104108223, mailed on Jan. 10, 2017, 3 pages (Official Copy only) {See Communication Under Rule 37 CFR § 1.98(a) (3)}.
Notice of Allowance received for Taiwanese Patent Application No. 104123593, mailed on Oct. 1, 2018, 4 pages (1 pages of English Translation and 3 pages Official Copy).
Notice of Allowance received for Taiwanese Patent Application No. 104124962, mailed on Jul. 27, 2017, 3 pages (Official Copy only) {See Communication Under Rule 37 CFR § 1.98(a) (3)}.
Notice of Allowance received for Taiwanese Patent Application No. 104124963, mailed on Sep. 28, 2017, 5 pages (1 page of English Translation of Search report and 4 pages of Official Copy).
Notice of Allowance received for Taiwanese Patent Application No. 104124995, mailed on Jul. 27, 2017, 3 pages (Official Copy only) {See Communication Under Rule 37 CFR § 1.98(a) (3)}.
Notice of Allowance received for Taiwanese Patent Application No. 104124997, mailed on Jun. 16, 2017, 5 pages (1 page of English Translation of Search report and 4 pages of Official Copy).
Notice of Allowance received for Taiwanese Patent Application No. 104124998, mailed on Mar. 31, 2017, 3 pages (Official Copy only) {See Communication Under Rule 37 CFR § 1.98(a) (3)}.
Notice of Allowance received for Taiwanese Patent Application No. 104128519, mailed on Nov. 20, 2017, 5 pages (2 page of English Translation and 3 pages of Official Copy).
Notice of Allowance received for Taiwanese Patent Application No. 104128684, mailed on Feb. 23, 2017, 3 pages (Official Copy only) {See Communication Under Rule 37 CFR § 1.98(a) (3)}.
Notice of Allowance received for U.S. Appl. No. 16/528,941, mailed on Aug. 10, 2021, 5 pages.
Notice of Allowance received for U.S. Appl. No. 16/528,941, mailed on May 19, 2021, 5 pages.
Notice of Allowance received for U.S. Appl. No. 14/841,608, mailed on Nov. 14, 2017, 5 pages.
Notice of Allowance received for U.S. Appl. No. 14/641,251, mailed on May 18, 2016, 13 pages.
Notice of Allowance received for U.S. Appl. No. 14/805,403, mailed on Jul. 11, 2018, 15 pages.
Notice of Allowance received for U.S. Appl. No. 14/815,879, mailed on Jun. 26, 2017, 8 pages.
Notice of Allowance received for U.S. Appl. No. 14/815,890, mailed on Feb. 12, 2021, 8 pages.
Notice of Allowance received for U.S. Appl. No. 14/815,898, mailed on Dec. 5, 2016, 3 pages.
Notice of Allowance received for U.S. Appl. No. 14/815,898, mailed on Oct. 24, 2016, 14 pages.
Notice of Allowance received for U.S. Appl. No. 14/815,907, mailed on Jul. 28, 2016, 9 pages.
Notice of Allowance received for U.S. Appl. No. 14/815,907, mailed on Nov. 30, 2016, 2 pages.
Notice of Allowance received for U.S. Appl. No. 14/815,909, mailed on Jun. 9, 2016, 3 pages.
Notice of Allowance received for U.S. Appl. No. 14/815,909, mailed on May 3, 2016, 12 pages.
Notice of Allowance received for U.S. Appl. No. 14/815,909, mailed on May 20, 2016, 2 pages.
Notice of Allowance received for U.S. Appl. No. 14/815,909, mailed on Sep. 6, 2016, 2 pages.
Notice of Allowance received for U.S. Appl. No. 14/822,769, mailed on Nov. 29, 2018, 12 pages.
Notice of Allowance received for U.S. Appl. No. 14/833,014, mailed on Nov. 20, 2019, 5 pages.
Notice of Allowance received for U.S. Appl. No. 14/841,402, mailed on Apr. 26, 2018, 16 pages.

(56) References Cited

OTHER PUBLICATIONS

Notice of Allowance received for U.S. Appl. No. 14/841,614, mailed on Oct. 24, 2018, 10 pages.
Notice of Allowance received for U.S. Appl. No. 14/841,623, mailed on Feb. 23, 2018, 8 pages.
Notice Of Allowance received for U.S. Appl. No. 14/869,807, mailed on Jun. 21, 2017, 9 Pages.
Notice of Allowance received for U.S. Appl. No. 14/869,807, mailed on Oct. 10, 2017, 9 pages.
Notice of Allowance received for U.S. Patent Application No. 15/268, 115, mailed on Mar. 7, 2018, 15 pages.
Notice of Allowance received for U.S. Appl. No. 15/273,453, mailed on Oct. 12, 2017, 11 pages.
Notice of Allowance received for U.S. Appl. No. 15/273,503, mailed on Aug. 14, 2017, 9 pages.
Notice of Allowance received for U.S. Appl. No. 15/273,522, mailed on Mar. 28, 2017, 9 Pages.
Notice of Allowance received for U.S. Appl. No. 15/273,522, mailed on May 19, 2017, 2 pages.
Notice of Allowance received for U.S. Appl. No. 15/273,522, mailed on May 23, 2017, 2 pages.
Notice of Allowance received for U.S. Appl. No. 15/273,544, mailed on Mar. 13, 2018, 8 pages.
Notice of Allowance received for U.S. Appl. No. 15/273,544, mailed on Oct. 27, 2017, 8 pages.
Notice of Allowance received for U.S. Appl. No. 15/352,215, mailed on Nov. 27, 2019, 20 pages.
Notice of Allowance received for U.S. Appl. No. 15/355,956, mailed on Nov. 22, 2019, 29 pages.
Notice of Allowance received for U.S. Appl. No. 15/616,480, mailed on Jan. 3, 2019, 8 pages.
Notice of Allowance received for U.S. Appl. No. 15/798,257, mailed on May 22, 2019, 14 pages.
Notice of Allowance received for U.S. Appl. No. 15/858,175, mailed on Jun. 1, 2018, 8 pages.
Notice of Allowance received for U.S. Appl. No. 15/858,175, mailed on Sep. 12, 2018, 8 pages.
Notice of Allowance received for U.S. Appl. No. 15/975,581, mailed on Oct. 3, 2018, 25 pages.
Notice of Allowance received for U.S. Appl. No. 16/103,699, mailed on Apr. 11, 2019, 8 pages.
Notice of Allowance received for U.S. Appl. No. 16/144,629, mailed on Apr. 7, 2022, 8 pages.
Notice of Allowance received for U.S. Appl. No. 16/144,629, mailed on Jul. 25, 2022, 10 pages.
Notice of Allowance received for U.S. Appl. No. 16/147,523, mailed on Aug. 4, 2022, 9 pages.
Notice of Allowance received for U.S. Appl. No. 16/147,523, mailed on Nov. 28, 2022, 8 pages.
Notice of Allowance received for U.S. Appl. No. 16/147,523, mailed on Oct. 4, 2022, 8 pages.
Allowance received for U.S. Appl. No. 16/191,117, mailed on Oct. 29, 2019, 9 pages.
Notice of Allowance received for U.S. Appl. No. 16/259,954,7miailed on May 7, 2020, 9 pages.
Notice ofAllowance received for U.S. Appl. No. 16/265,938, mailed on Oct. 15, 2020, 8 pages.
Notice of Allowance received for U.S. Appl. No. 16/271,583, mailed on Apr. 14, 2021, 6 pages.
Notice of Allowance received for U.S. Appl. No. 16/271,583, mailed on Dec. 9, 2020, 6 pages.
Notice of Allowance received for U.S. Appl. No. 16/271,583, mailed on Jul. 23, 2021, 6 pages.
Notice of Allowance received for U.S. Appl. No. 16/271,583, mailed on May 10, 2021, 3 pages.
Notice of Allowance received for U.S. Appl. No. 16/377,892, mailed on May 24, 2021, 9 pages.
Notice of Allowance received for U.S. Appl. No. 16/377,892, mailed on Sep. 9, 2021, 9 pages.
Notice of Allowance received for U.S. Appl. No. 16/378,136, mailed on Jun. 3, 2021, 7 pages.
Notice of Allowance received for U.S. Appl. No. 16/378,136, mailed on Sep. 22, 2021, 7 pages.
Notice of Allowance received for U.S. Appl. No. 16/404,605, mailed on Sep. 18, 2020, 5 pages.
Notice of Allowance received for U.S. Appl. No. 16/404,612, mailed on Jul. 13, 2020, 6 pages.
Notice of Allowance received for U.S. Appl. No. 16/404,612. mailed on Aug. 7, 2019, 9 pages.
Notice ofAllowance received for U.S. Appl. No. 16/528,257, mailed on Jan. 14, 2022, 10 pages.
Notice of Allowance received for U.S. Appl. No. 16/582,595. mailed on Mar. 20, 2020, 9 pages.
Notice of Allowance received for U.S. Appl. No. 16/583,020, mailed on Apr. 1, 2020, 5 pages.
Notice of Allowance received for U.S. Appl. No. 16/583,020, mailed on Feb. 28, 2020, 5 pages.
Notice of Allowance received for U.S. Appl. No. 16/584,044, mailed on Dec. 11, 2019, 15 pages.
Notice of Allowance received for U.S. Appl. No. 16/584,044, mailed on Mar. 30, 2020, 16 pages.
Notice of Allowance received for U.S. Appl. No. 16/584,044, mailed on Nov. 14, 2019, 13 pages.
Notice of Allowance received for U.S. Appl. No. 16/584,100, mailed on Apr. 8, 2020, 12 pages.
Notice of Allowance received for U.S. Patent Application No. 16/584, 100, mailed on Jan. 14, 2020, 13 pages.
Notice of Allowance received for U.S. Appl. No. 16/584,693, mailed on Jan. 15, 2020, 15 pages.
Notice of Allowance received for U.S. Appl. No. 16/584,693, mailed on May 4, 2020, 12 pages.
Notice of Allowance received for U.S. Appl. No. 16/586,314, mailed on Apr. 1, 2020, 8 pages.
Notice of Allowance received for U.S. Appl. No. 16/586,314, mailed on Jan. 9, 2020, 10 pages.
Notice ofAllowance received for U.S. Appl. No. 16/586,344, mailed on Dec. 16, 2019, 12 pages.
Notice of Allowance received for U.S. Appl. No. 16/586,344, mailed on Mar. 27, 2020, 12 pages.
Notice of Allowance received for U.S. Appl. No. 16/825,879, mailed on Jul. 13, 2021, 9 pages.
Notice of Allowance received for U.S. Appl. No. 16/825,879, mailed on Sep. 28, 2021, 8 pages.
Notice of Allowance received for U.S. Appl. No. 16/835,651, mailed on Jul. 23, 2021, 8 pages.
Notice of Allowance received for U.S. Appl. No. 16/835,651, mailed on Jun. 1, 2021, 10 pages.
Notice of Allowance received for U.S. Appl. No. 16/835,651, mailed on Nov. 10, 2021 , 9 pages.
Notice of Allowance received for U.S. Appl. No. 16/935,002, mailed on Feb. 15, 2023, 15 pages.
Notice of Allowance received for U.S. Appl. No. 16/935,002, mailed on Jun. 28, 2023, 8 pages.
Notice of Allowance received for U.S. Appl. No. 17/013,778, mailed on Feb. 23, 2023, 8 pages.
Notice of Allowance received for U.S. Appl. No. 17/027,317, mailed on Apr. 12, 2021, 7 pages.
Notice of Allowance received for U.S. Appl. No. 17/027,317, mailed on Jan. 13, 2021, 10 pages.
Notice of Allowance received for U.S. Appl. No. 17/027,484, mailed on May 3, 2021, 11 pages.
Notice of Allowance received for U.S. Appl. No. 17/041,412, mailed on Apr. 26, 2023, 11 pages.
Notice of Allowance received for U.S. Appl. No. 17/041 ,412, mailed on Mar. 15, 2023, 13 pages.
Notice of Allowance received for U.S. Appl. No. 17/103,436, mailed on Dec. 8, 2021, 12 pages.
Notice of Allowance received for U.S. Appl. No. 17/116,938, mailed on Sep. 18, 2024, 5 pages.
Notice of Allowance received for U.S. Appl. No. 17/190,879, mailed on Nov. 10, 2021, 8 pages.

(56) References Cited

OTHER PUBLICATIONS

Notice of Allowance received for U.S. Appl. No. 17/220,596, mailed on Oct. 21,2021, 43 pages.
Notice of Allowance received for U.S. Appl. No. 17/354,376, mailed on Jan. 27, 2022, 10 pages.
Notice of Allowance received for U.S. Appl. No. 17/354,376, mailed on Mar. 4, 2022, 5 pages.
Notice of Allowance received for U.S. Appl. No. 17/354,376, mailed on Mar. 30, 2022, 5 pages.
Notice of Allowance received for U.S. Appl. No. 17/464,477, mailed on Jul. 25, 2023, 5 pages.
Notice of Allowance received for U.S. Appl. No. 17/466,824, mailed on Mar. 13, 2024, 5 pages.
Notice of Allowance received for U.S. Appl. No. 17/466,824, mailed on Nov. 8, 2023, 5 pages.
Notice of Allowance received for U.S. Appl. No. 17/479,897, mailed on Jul. 26, 2023, 7 pages.
Notice of Allowance received for U.S. Appl. No. 17/479,897, mailed on Oct. 3, 2023, 5 pages.
Notice of Allowance received for U.S. Appl. No. 17/510,168, mailed on Feb. 13, 2023, 10 pages.
Notice of Allowance received for U.S. Appl. No. 17/510,168, mailed on May 3, 2023, 10 pages.
Notice of Allowance received for U.S. Appl. No. 17/516,537, mailed on Apr. 17, 2023, 8 pages.
Notice of Allowance received for U.S. Appl. No. 17/516,537, mailed on Dec. 27, 2022, 7 pages.
Notice of Allowance received for U.S. Appl. No. 17/546,968, mailed on May 31, 2024, 24 pages.
Notice of Allowance received for U.S. Appl. No. 17/546,968, mailed on Sep. 13, 2024, 25 pages.
Notice of Allowance received for U.S. Appl. No. 17/566,094, mailed on Feb. 23, 2023, 8 pages.
Notice of Allowance received for U.S. Appl. No. 17/566,094, mailed on Nov. 22, 2022, 10 pages.
Notice of Allowance received for U.S. Appl. No. 17/572,117, mailed on Apr. 4, 2023, 9 pages.
Notice of Allowance received for U.S. Appl. No. 17/732,191, mailed on Feb. 27, 2023, 12 pages.
Notice of Allowance received for U.S. Appl. No. 17/732,191, mailed on Nov. 9, 2022, 12 pages.
Notice of Allowance received for U.S. Appl. No. 17/740,032, mailed on Feb. 1, 2023, 9 pages.
Notice of Allowance received for U.S. Appl. No. 17/740,032, mailed on Oct. 13, 2022, 11 pages.
Notice of Allowance received for U.S. Appl. No. 17/846,962, mailed on Aug. 1, 2024, 7 pages.
Notice of Allowance received for U.S. Appl. No. 17/846,962, mailed on Sep. 30, 2024, 8 pages.
Notice of Allowance received for U.S. Appl. No. 17/951,875, mailed on Dec. 26, 2023, 7 pages.
Notice of Allowance received for U.S. Appl. No. 17/951,875, mailed on Jul. 26, 2023, 7 pages.
Notice of Allowance received for U.S. Appl. No. 17/951,875, mailed on Oct. 20, 2023, 8 pages.
Notice of Allowance received for U.S. Appl. No. 17/975,141, mailed on Apr. 29, 2024, 9 pages.
Notice of Allowance received for U.S. Patent Application No. 17/975, 141, mailed on Dec. 7, 2023, 10 pages.
Notice of Allowance received for U.S. Appl. No. 18/114,880, mailed on Feb. 15, 2024, 17 pages.
Notice of Allowance received for U.S. Appl. No. 18/114,880, mailed on Nov. 15, 2023, 11 pages.
Notice of Allowance received for U.S. Appl. No. 18/121,458, mailed on Dec. 6, 2023, 9 pages.
Notice of Allowance received for U.S. Appl. No. 18/121,458, mailed on Mar. 12, 2024, 9 pages.
Notice of Allowance received for U.S. Appl. No. 18/196,997, mailed on Jul. 15, 2024, 11 pages.
Notice of Allowance received for U.S. Appl. No. 18/196,997, mailed on Mar. 28, 2024, 11 pages.
Notice of Allowance received for U.S. Appl. No. 18/375,457, mailed on Feb. 23, 2024, 16 pages.
Notice of Allowance received for U.S. Appl. No. 18/375,457, mailed on May 16, 2024, 15 pages.
Notice of Allowance received for U.S. Appl. No. 18/628,021, mailed on Aug. 28, 2024, 9 pages.
Notice of Allowance received for U.S. Appl. No. 18/628,021, mailed on Jun. 5, 2024, 9 pages.
Notice of Allowance received for U.S. Appl. No. 11/462,696, mailed on Apr. 2, 2012, 18 pages.
Notice of Hearing received for Indian Patent Application No. 201818045872, mailed on Nov. 16, 2023, 2 pages.
Notice of Hearing received for Indian Patent Application No. 201818046896, mailed on Jul. 11, 2023, 2 pages.
Notice of Hearing received for Indian Patent Application No. 202118028159, mailed on Nov. 22, 2023, 2 pages.
Nova, "Tour of the Solar System", Retrieved from: <http://www.pbs.org/wgbh/nova/space/tour-solar-system.html>, May 24, 2013, 14 pages.
Obara, Yuuta, "iPhone Application Selection for University Students", Shuwa System Co., Saito Kazukuni, vol. 1, May 16, 2013, 4 pages (Official Copy only) {See Communication Under Rule 37 CFR § 1.98(a) (3)}.
Octoba, "Just Install It—Utilizing Method for Android Application Business", Ascii Media Works Co. Takano Kiyoshi, vol. 1, Apr. 25, 2013, 6 pages (Official Copy only) {See Communication Under Rule 37 CFR § 1.98(a) (3)}.
Office Action received for Australian Patent Application No. 2015101020, mailed on Oct. 26, 2015, 8 pages.
Office Action received for Danish Patent Application No. PA201570499, mailed on Nov. 1, 2017, 6 pages.
Office Action received for European Patent Application No. 15711969.4, mailed on Nov. 17, 2017, 9 pages.
Office Action received for European Patent Application No. 15730924.6, mailed on Dec. 12, 2017, 8 pages.
Office Action received for Australian Patent Application No. 2015101019, issued on Oct. 14, 2015, 3 pages.
Office Action received for Australian Patent Application No. 2015101019, issued on Apr. 7, 2016, 4 pages.
Office Action received for Australian Patent Application No. 2015101021, issued on Apr. 26, 2016, 4 pages.
Office Action received for Australian Patent Application No. 2015101021, issued on Oct. 28, 2015, 10 pages.
Office Action received for Australian Patent Application No. 2015267671, mailed on Apr. 5, 2017, 2 pages.
Office Action received for Australian Patent Application No. 2015279544, mailed on Apr. 18, 2017, 4 pages.
Office Action received for Australian Patent Application No. 2015279544, mailed on Feb. 13, 2018, 5 pages.
Office Action received for Australian Patent Application No. 2015298710, mailed on Apr. 13, 2017, 3 pages.
Office Action received for Australian Patent Application No. 2015298710, mailed on Feb. 15, 2017, 2 pages.
Office Action received for Australian Patent Application No. 2015298710, mailed on Nov. 6, 2018, 4 pages.
Office Action received for Australian Patent Application No. 2015298710, mailed on Sep. 24, 2018, 4 pages.
Office Action received for Australian Patent Application No. 2016100411, mailed on Jun. 10, 2016, 3 pages.
Office Action received for Australian Patent Application No. 2016100476, mailed on Jun. 9, 2016, 4 pages.
Office Action received for Australian Patent Application No. 2016100765, issued on Aug. 5, 2016, 2 pages.
Office Action received for Australian Patent Application No. 2016100765, mailed on Dec. 16, 2016, 3 pages.
Office Action received for Australian Patent Application No. 2016231598, mailed on Apr. 7, 2017, 5 pages.
Office Action received for Australian Patent Application No. 2017100667, mailed on Aug. 3, 2017, 9 pages.
Office Action received for Australian Patent Application No. 2017100683, mailed on Sep. 20, 2017, 3 pages.

(56) References Cited

OTHER PUBLICATIONS

Office Action received for Australian Patent Application No. 2017100684, mailed on Jan. 24, 2018, 4 pages.
Office Action received for Australian Patent Application No. 2017100684, mailed on Oct. 5, 2017, 4 pages.
Office Action received for Australian Patent Application No. 2017277971, mailed on Aug. 12, 2020, 3 pages.
Office Action received for Australian Patent Application No. 2017277971, mailed on Jun. 3, 2020, 3 pages.
Office Action received for Australian Patent Application No. 2017286130, mailed on Jan. 21, 2019, 4 pages.
Office Action received for Australian Patent Application No. 2018100158, mailed on Apr. 23, 2018, 5 pages.
Office Action received for Australian Patent Application No. 2018101855, mailed on Feb. 22, 2019, 4 pages.
Office Action received for Australian Patent Application No. 2018201089, mailed on Jul. 23, 2020, 4 pages.
Office Action received for Australian Patent Application No. 2018201089, mailed on Oct. 11, 2019, 4 pages.
Office Action received for Australian Patent Application No. 2018202751, mailed on Apr. 2, 2019, 4 pages.
Office Action received for Australian Patent Application No. 2018204286, mailed on Apr. 17, 2019, 5 pages.
Office Action received for Australian Patent Application No. 2018204286, mailed on Nov. 12, 2019, 5 pages.
Office Action received for Australian Patent Application No. 2018204286, mailed on Sep. 5, 2019, 5 pages.
Office Action received for Australian Patent Application No. 2019100487, mailed on Aug. 16, 2019, 5 pages.
Office Action received for Australian Patent Application No. 2019100523, mailed on Jan. 23, 2020, 3 pages.
Office Action received for Australian Patent Application No. 2019100523, mailed on Mar. 2, 2020, 3 pages.
Office Action received for Australian Patent Application No. 2019100523, mailed on Sep. 2, 2019, 3 pages.
Office Action received for Australian Patent Application No. 2019213341, mailed on Jun. 30, 2020, 6 pages.
Office Action received for Australian Patent Application No. 2019218241, mailed on Apr. 1, 2021, 3 pages.
Office Action received for Australian Patent Application No. 2019267527, mailed on Dec. 2, 2021, 4 pages.
Office Action received for Australian Patent Application No. 2019267527, mailed on Jun. 15, 2022, 3 pages.
Office Action received for Australian Patent Application No. 2019267527, mailed on Jun. 24, 2021, 8 pages.
Office Action received for Australian Patent Application No. 2019267527, mailed on Mar. 3, 2022, 3 pages.
Office Action received for Australian Patent Application No. 2019338180, mailed on Feb. 18, 2022, 3 pages.
Office Action received for Australian Patent Application No. 2020100720, mailed on Jul. 9, 2020, 7 pages.
Office Action received for Australian Patent Application No. 2020100720, mailed on Sep. 1, 2020, 5 pages.
Office Action received for Australian Patent Application No. 2020100886, mailed on Aug. 5, 2020, 6 pages.
Office Action received for Australian Patent Application No. 2020203919, mailed on Dec. 23, 2020, 5 pages.
Office Action received for Australian Patent Application No. 2020203919, mailed on Jul. 19, 2021, 7 pages.
Office Action received for Australian Patent Application No. 2020203919, mailed on Mar. 30, 2021, 5 pages.
Office Action received for Australian Patent Application No. 2020203919, mailed on Oct. 19, 2020, 5 pages. Action received for Australian Patent Application No. 2020239717, mailed on Dec. 15, 2021, 6 pages. Action received for Australian Patent Application No. 2020239717, mailed on Jun. 23, 2021, 7 pages.
Office Action received for Australian Patent Application No. 2020239717, mailed on Dec. 15, 2021, 6 pages.
Office Action received for Australian Patent Application No. 2020239717, mailed on Jun. 23, 2021, 7 pages.
Office Action received for Australian Patent Application No. 2020239717, mailed on Mar. 16, 2022, 4 pages.
Office Action received for Australian Patent Application No. 2020239717, mailed on Sep. 28, 2021, 6 pages.
Office Action received for Australian Patent Application No. 2020250323, mailed on Dec. 14, 2021, 2 pages.
Office Action received for Australian Patent Application No. 2020260413, mailed on Jun. 24, 2021, 2 pages.
Office Action received for Australian Patent Application No. 2020277216, mailed on Dec. 17, 2020, 5 pages.
Office Action received for Australian Patent Application No. 2021100721, mailed on Jun. 4, 2021, 7 pages.
Office Action received for Australian Patent Application No. 2021100721, mailed on Oct. 18, 2021, 4 pages.
Office Action received for Australian Patent Application No. 2021103004, mailed on Aug. 12, 2021, 5 pages.
Office Action received for Australian Patent Application No. 2021107587, mailed on Feb. 1, 2022, 6 pages.
Office Action received for Australian Patent Application No. 2021203636, mailed on Mar. 23, 2022, 3 pages.
Office Action received for Australian Patent Application No. 2021277718, mailed on Dec. 5, 2022, 3 pages.
Office Action received for Australian Patent Application No. 2021277718, mailed on Jan. 23, 2023, 4 pages.
Office Action received for Australian Patent Application No. 2021277718, mailed on Oct. 17, 2022, 4 pages.
Office Action received for Australian Patent Application No. 2021290292, mailed on Nov. 24, 2022, 2 pages.
Office Action received for Australian Patent Application No. 2022203957, mailed on May 12, 2023, 5 pages.
Office Action received for Australian Patent Application No. 2022204465, mailed on Mar. 10, 2023, 4 pages.
Office Action received for Australian Patent Application No. 2022204466, mailed on Jun. 7, 2023, 4 pages.
Office Action received for Australian Patent Application No. 2022209277, mailed on Mar. 10, 2023, 6 pages.
Office Action received for Australian Patent Application No. 2022221466, mailed on Jun. 16, 2023, 2 pages.
Office Action received for Australian Patent Application No. 2022228121, mailed on Jul. 7, 2023, 3 pages.
Office Action received for Australian Patent Application No. 2022228121, mailed on Sep. 20, 2023, 3 pages.
Office Action received for Australian Patent Application No. 2022228191, mailed on Aug. 16, 2023, 4 pages.
Office Action received for Australian Patent Application No. 2023200607, mailed on Dec. 20, 2023, 3 pages.
Office Action received for Australian Patent Application No. 2023200607, mailed on Feb. 22, 2024, 2 pages.
Office Action received for Australian Patent Application No. 2023202432, mailed on Sep. 18, 2023, 4 pages.
Office Action received for Australian Patent Application No. 2023214377, mailed on Jun. 5, 2024, 4 pages.
Office Action received for Australian Patent Application No. 2023214377, mailed on Mar. 27, 2024, 3 pages.
Office Action received for Australian Patent Application No. 2023251497, mailed on Aug. 9, 2024, 2 pages.
Office Action received for Australian Patent Application No. 2015101019, mailed on Feb. 12, 2016, 4 pages.
Office Action received for Australian Patent Application No. 2015279545, mailed on Apr. 13, 2017, 3 pages.
Office Action received for Brazilian Patent Application No. BR122018076550-0, mailed on Sep. 28, 2022, 7 pages (1 page of English Translation and 6 pages of Official Copy).
Office Action received for Chinese Patent Application No. 201520595384.6, mailed on Mar. 25, 2016, 3 pages (1 page of English Translation and 2 pages of Official Copy).
Office Action received for Chinese Patent Application No. 201510479088.4, mailed on Apr. 22, 2020, 7 pages (3 pages of English Translation and 4 pages of Official Copy).
Office Action received for Chinese Patent Application No. 201510479088.4, mailed on Mar. 12, 2018, 20 pages (6 pages of English Translation and 14 pages of Official Copy).

(56) References Cited

OTHER PUBLICATIONS

Office Action received for Chinese Patent Application No. 201510479088.4, mailed on May 7, 2019, 6 pages (3 pages of English Translation and 3 pages of Official Copy).
Office Action received for Chinese Patent Application No. 201510481525.6, mailed on Aug. 29, 2018, 10 pages (5 pages of English Translation and 5 pages of Official Copy).
Office Action received for Chinese Patent Application No. 201510481525.6, mailed on Nov. 29, 2017, 9 pages (3 pages of English Translation and 6 pages of Official Copy).
Office Action received for Chinese Patent Application No. 201510483268.X, mailed on Apr. 16, 2019, 6 pages (3 pages of English Translation and 3 pages of Official Copy).
Office Action received for Chinese Patent Application No. 201510483268.X, mailed on Dec. 1, 2017, 11 pages (5 pages of English Translation and 6 pages of Official Copy).
Office Action received for Chinese Patent Application No. 201510483268.X, mailed on Oct. 19, 2018, 10 pages (5 pages of English Translation and 5 pages of Official Copy).
Office action received for Chinese Patent Application No. 201510483305.7, mailed on Aug. 31, 2018, 10 pages (5 pages of English Translation and 5 pages of Official Copy).
Office action received for Chinese Patent Application No. 201510483305.7, mailed on Dec. 1, 2017, 13 pages (5 pages of English Translation and 8 pages of Official Copy).
Office Action received for Chinese Patent Application No. 201510484514.3, mailed on Apr. 4, 2018, 12 pages (5 pages of English Translation and 7 pages of Official Copy).
Office Action received for Chinese Patent Application No. 201510484514.3, mailed on Dec. 24, 2018, 13 pages (6 pages of English Translation and 7 pages of Official Copy).
Office Action received for Chinese Patent Application No. 201510557356.X, mailed on Aug. 15, 2019, 12 pages (7 pages of English Translation and 5 pages of Official Copy).
Office Action received for Chinese Patent Application No. 201510557356.X, mailed on Dec. 29, 2017, 11 pages (5 pages of English Translation and 6 pages of Official Copy).
Office Action received for Chinese Patent Application No. 201510557356.X, mailed on Nov. 23, 2018, 12 pages (5 pages of English Translation and 7 pages of Official Copy).
Office Action received for Chinese Patent Application No. 201520594249.X, mailed on Mar. 25, 2016, 3 pages (1 page of English Translation and 2 pages of Official Copy).
Office Action received for Chinese Patent Application No. 201520595384.6, mailed on Dec. 30, 2016, 2 pages (Official Copy only) {See Communication Under Rule 37 CFR § 1.98(a) (3)}.
Office Action received for Chinese Patent Application No. 201520595384.6, mailed on Jul. 22, 2016, 3 pages (1 page of English Translation and 2 pages of Official Copy).
Office Action received for Chinese Patent Application No. 201520595385.0, mailed on Dec. 30, 2016, 2 pages (Official Copy only) {See Communication Under Rule 37 CFR § 1.98(a) (3)}.
Office Action received for Chinese Patent Application No. 201520595385.0, mailed on Jul. 22, 2016, 3 pages (1 page of English Translation and 2 pages of Official Copy).
Office Action received for Chinese Patent Application No. 201520595385.0, mailed on Mar. 25, 2016, 3 pages (1 page of English Translation and 2 pages of Official Copy).
Office Action received for Chinese Patent Application No. 201520595408.8, mailed on Dec. 9, 2015, 4 pages. (2 pages of English Translation and 2 pages of Official Copy).
Office Action received for Chinese Patent Application No. 201520595408.8, mailed on Dec. 30, 2016, 2 pages (Official Copy only) {See Communication Under Rule 37 CFR § 1.98(a) (3)}.
Office Action received for Chinese Patent Application No. 201520595408.8, mailed on Jul. 25, 2016, 3 pages (1 page of English Translation and 2 pages of Official Copy).
Office Action received for Chinese Patent Application No. 201520595408.8, mailed on Mar. 25, 2016, 3 pages (1 page of English Translation and 2 pages of Official Copy).
Office Action received for Chinese Patent Application No. 201520595538.1, mailed on Dec. 30, 2016, 2 pages (Official Copy only) {See Communication Under Rule 37 CFR § 1.98(a) (3)}.
Office Action received for Chinese Patent Application No. 201520595538.1, mailed on Jul. 22, 2016, 3 pages (1 page of English Translation and 2 pages of Official Copy).
Office Action received for Chinese Patent Application No. 201520595538.1, mailed on Mar. 25, 2016, 3 pages (1 page of English Translation and 2 pages of Official Copy).
Office Action received for Chinese Patent Application No. 201520679198.0, mailed on Jun. 24, 2016, 5 pages (3 pages of English Translation and 2 pages of Official Copy).
Office Action received for Chinese Patent Application No. 2015206791980, mailed on Mar. 7, 2016, 6 pages (4 pages of English Translation and 2 pages of Official Copy).
Office Action received for Chinese Patent Application No. 2015206791980, mailed on Nov. 18, 2015, 4 pages (2 pages English Translation and 2 pages Official Copy).
Office Action received for Chinese Patent Application No. 201580028505.1, mailed on Jan. 16, 2019, 15 pages (5 pages of English Translation and 10 pages of Official Copy).
Office Action received for Chinese Patent Application No. 201580028505.1, mailed on Jun. 20, 2019, 7 pages (3 pages of English Translation and 4 pages of Official Copy).
Office Action received for Chinese Patent Application No. 201580029054.3, mailed on Dec. 5, 2018, 12 pages (6 pages of English Translation and 6 pages of Official Copy).
Office Action received for Chinese Patent Application No. 201580046237.6, mailed on Feb. 6, 2018, 10 pages (5 pages of English Translation and 5 pages of Official Copy).
Office Action received for Chinese Patent Application No. 201580046788.2, mailed on Apr. 15, 2019, 13 pages (6 pages of English Translation and 7 pages of Official Copy).
Office Action received for Chinese Patent Application No. 201580046788.2, mailed on Feb. 25, 2020, 14 pages (7 pages of English Translation and 7 pages of Official Copy).
Office Action received for Chinese Patent Application No. 201580046788.2, mailed on Mar. 25, 2021, 9 pages (4 pages of English Translation and 5 pages of Official Copy).
Office Action received for Chinese Patent Application No. 201580046788.2, mailed on Sep. 22, 2020, 10 pages (5 pages of English Translation and 5 pages of Official Copy).
Office Action received for Chinese Patent Application No. 201621208900.6, mailed on Apr. 26, 2017, 2 pages (Official Copy only) {See Communication Under Rule 37 CFR § 1.98(a) (3)}.
Office Action received for Chinese Patent Application No. 201680012936.3, mailed on Aug. 18, 2020, 15 pages (5 pages of English Translation and 10 pages of Official Copy).
Office Action received for Chinese Patent Application No. 201680012936.3, mailed on Dec. 1, 2020, 21 pages (8 pages of English Translation and 13 pages of Official Copy).
Office Action received for Chinese Patent Application No. 201680012936.3, mailed on Mar. 3, 2021, 12 pages (5 pages of English Translation and 7 pages of Official Copy).
Office Action received for Chinese Patent Application No. 201680012936.3, mailed on Mar. 20, 2020, 23 pages (11 pages of English Translation and 12 pages of Official Copy).
Office Action received for Chinese Patent Application No. 201710439448.7, mailed on Mar. 27, 2020, 13 pages (7 pages of English Translation and 6 pages of Official Copy).
Office Action received for Chinese Patent Application No. 201710439448.7, mailed on Oct. 10, 2020, 19 pages (8 pages of English Translation and 11 pages of Official Copy).
Office Action received for Chinese Patent Application No. 201710657424.9, mailed on Sep. 17, 2019, 23 pages (11 pages of English Translation and 12 pages of Official Copy).
Office Action received for Chinese Patent Application No. 201780002533.5, mailed on Apr. 25, 2019, 17 pages (7 pages of English Translation and 10 pages of Official Copy).
Office Action received for Chinese Patent Application No. 201780002533.5, mailed on Feb. 3, 2020, 6 pages (3 pages of English Translation and 3 pages of Official Copy).

(56) References Cited

OTHER PUBLICATIONS

Office Action received for Chinese Patent Application No. 201780002533.5, mailed on Sep. 26, 2019, 21 pages (9 pages of English Translation and 12 pages of Official Copy).
Office Action received for Chinese Patent Application No. 201780034203.4, mailed on Jul. 14, 2021, 12 pages (5 pages of English Translation and 7 pages of Official Copy).
Office Action received for Chinese Patent Application No. 201780034203.4, mailed on Sep. 24, 2021, 7 pages (3 pages of English Translation and 4 pages of Official Copy).
Office Action received for Chinese Patent Application No. 201810411708.4, mailed on Feb. 24, 2022, 10 pages (5 pages of English Translation and 5 pages of Official Copy).
Office Action received for Chinese Patent Application No. 201810411708.4, mailed on Feb. 26, 2021, 16 pages (8 pages of English Translation and 8 pages of Official Copy).
Office Action received for Chinese Patent Application No. 201810411708.4, mailed on Nov. 12, 2021, 12 pages (6 pages of English Translation and 6 pages of Official Copy).
Office Action received for Chinese Patent Application No. 201810566134.8, mailed on Aug. 13, 2019, 14 pages (8 pages of English Translation and 6 pages of Official Copy).
Office Action received for Chinese Patent Application No. 201810664927.3, mailed on Mar. 28, 2019, 11 pages (5 pages of English Translation and 6 pages of Official Copy).
Office Action received for Chinese Patent Application No. 201811446867.4, mailed on Dec. 31, 2019, 12 pages (5 pages of English Translation and 7 pages of Official Copy).
Office Action received for Chinese Patent Application No. 201811446867.4, mailed on May 6, 2020, 10 pages (5 pages of English Translation and 5 pages of Official Copy).
Office Action received for Chinese Patent Application No. 201811446867.4, mailed on Sep. 8, 2020, 9 pages (4 pages of English Translation and 5 pages of Official Copy).
Office Action received for Chinese Patent Application No. 201811512767.7, mailed on Dec. 20, 2019, 14 pages (7 pages of English Translation and 7 pages of Official Copy).
Office Action received for Chinese Patent Application No. 201811512767.7, mailed on Jun. 4, 2020, 6 pages (3 pages of English Translation and 3 pages of Official Copy).
Office Action received for Chinese Patent Application No. 201910875660.7, mailed on Aug. 12, 2023, 15 pages (6 pages of English Translation and 9 pages of Official Copy).
Office Action received for Chinese Patent Application No. 201910875660.7, mailed on Dec. 26, 2022, 7 pages (3 pages of English Translation and 4 pages of Official Copy).
Office Action received for Chinese Patent Application No. 201910875660.7, mailed on Oct. 18, 2023, 6 pages (3 pages of English Translation and 3 pages of Official Copy).
Office Action received for Chinese Patent Application No. 201911099970.0, mailed on Feb. 23, 2023, 15 pages (5 pages of English Translation and 10 pages of Official Copy).
Office Action received for Chinese Patent Application No. 201980012481.9, mailed on Jan. 12, 2023, 18 pages (9 pages of English Translation and 9 pages of Official Copy).
Office Action received for Chinese Patent Application No. 201980012481.9, mailed on Jun. 8, 2023, 16 pages (9 pages of English Translation and 7 pages of Official Copy).
Office Action received for Chinese Patent Application No. 201980012481.9, mailed on Nov. 21, 2023, 18 pages (10 pages of English Translation and 8 pages of Official Copy).
Office Action received for Chinese Patent Application No. 202010235395.9, mailed on Mar. 16, 2024, 18 pages (9 pages of English Translation and 9 pages of Official Copy).
Office Action received for Chinese Patent Application No. 202010287950.2, mailed on Aug. 10, 2021, 12 pages (6 pages of English Translation and 6 pages of Official Copy).
Office Action received for Chinese Patent Application No. 202010287950.2, mailed on Feb. 20, 2021, 22 pages (10 pages of English Translation and 12 pages of Official Copy).
Office Action received for Chinese Patent Application No. 202010287950.2, mailed on Nov. 19, 2021, 8 pages (5 pages of English Translation and 3 pages of Official Copy).
Office Action received for Chinese Patent Application No. 202010287953.6, mailed on Jan. 14, 2021, 14 pages (7 pages of English Translation and 7 pages of Official Copy).
Office Action received for Chinese Patent Application No. 202010287958.9, mailed on Jan. 5, 2021, 16 pages (8 pages of English Translation and 8 pages of Official Copy).
Office Action received for Chinese Patent Application No. 202010287961.0, mailed on Dec. 30, 2020, 16 pages (8 pages of English Translation and 8 pages of Official Copy).
Office Action received for Chinese Patent Application No. 202010287975.2, mailed on Dec. 30, 2020, 17 pages (9 pages of English Translation and 8 pages of Official Copy).
Office Action received for Chinese Patent Application No. 202010295272.4, mailed on Aug. 28, 2023, 8 pages (4 pages of English Translation and 4 pages of Official Copy).
Office Action received for Chinese Patent Application No. 202010295272.4, mailed on Feb. 5, 2024, 14 pages (6 pages of English Translation and 8 pages of Official Copy).
Office Action received for Chinese Patent Application No. 202010295272.4, mailed on Feb. 27, 2023, 15 pages (6 pages of English Translation and 9 pages of Official Copy).
Office Action received for Chinese Patent Application No. 202010295272.4, mailed on Jun. 11, 2024, 12 pages (5 pages of English Translation and 7 pages of Official Copy).
Office Action received for Chinese Patent Application No. 202010600151.6, mailed on Apr. 29, 2021, 11 pages (5 pages of English Translation and 6 pages of Official Copy).
Office Action received for Chinese Patent Application No. 202010600197.8, mailed on Jul. 2, 2021, 14 pages (6 pages of English Translation and 8 pages of Official Copy).
Office Action received for Chinese Patent Application No. 202010601484.0, mailed on Jun. 3, 2021, 13 pages (6 pages of English Translation and 7 pages of Official Copy).
Office Action received for Chinese Patent Application No. 202010697187.0, mailed on Jul. 25, 2024, 16 pages (5 pages of English Translation and 11 pages of Official Copy).
Office Action received for Chinese Patent Application No. 202011336156.9, mailed on May 20, 2021, 13 pages (7 pages of English Translation and 6 pages of Official Copy).
Office Action received for Chinese Patent Application No. 202011480411.7, mailed on Aug. 2, 2021, 12 pages (6 pages of English Translation and 6 pages of Official Copy).
Office Action received for Chinese Patent Application No. 202011480411.7, mailed on Jan. 12, 2022, 7 pages (4 pages of English Translation and 3 pages of Official Copy).
Office Action received for Chinese Patent Application No. 202110248576.X, mailed on Sep. 15, 2021, 28 pages (16 pages of English Translation and 12 pages of Official Copy).
Office Action received for Chinese Patent Application No. 202110368426.2, mailed on Aug. 23, 2024, 17 pages (8 pages of English Translation and 9 pages of Official Copy).
Office Action received for Chinese Patent Application No. 202110369265.9, mailed on Jul. 31, 2024, 18 pages (6 pages of English Translation and 12 pages of Official Copy).
Office Action received for Chinese Patent Application No. 202110369341.6, mailed on Jul. 24, 2024, 11 pages (5 pages of English Translation and 6 pages of Official Copy).
Office Action received for Chinese Patent Application No. 202110369363.2, mailed on Jul. 9, 2024, 14 pages (6 pages of English Translation and 8 pages of Official Copy).
Office Action received for Chinese Patent Application No. 202110369387.8, mailed on Jul. 2, 2024, 10 pages (4 pages of English Translation and 6 pages of Official Copy).
Office Action received for Chinese Patent Application No. 202110766668.7, mailed on Feb. 16, 2022, 12 pages (6 pages of English Translation and 6 pages of Official Copy).
Office Action received for Chinese Patent Application No. 202110766668.7, mailed on Jan. 20, 2023, 11 pages (6 pages of English Translation and 5 pages of Official Copy).

(56) References Cited

OTHER PUBLICATIONS

Office Action received for Chinese Patent Application No. 202110766668.7, mailed on Jun. 7, 2023, 13 pages (9 pages of English Translation and 4 pages of Official Copy).
Office Action received for Chinese Patent Application No. 202110766668.7, mailed on Sep. 15, 2022, 18 pages (9 pages of English Translation and 9 pages of Official Copy).
Office Action received for Chinese Patent Application No. 202180002106.3, mailed on Feb. 16, 2022, 12 pages (6 pages of English Translation and 6 pages of Official Copy).
Office Action received for Chinese Patent Application No. 202210312775.7, mailed on Jun. 19, 2024, 13 pages (6 pages of English Translation and 7 pages of Official Copy).
Office Action received for Chinese Patent Application No. 202210463449.6, mailed on Dec. 19, 2023, 11 pages (6 pages of English Translation and 5 pages of Official Copy).
Office Action received for Chinese Patent Application No. 202210849242.2, mailed on Jan. 20, 2023, 12 pages (6 pages of English Translation and 6 pages of Official Copy).
Office Action received for Chinese Patent Application No. 202210849316.2, mailed on Aug. 30, 2024, 7 pages (4 pages of English Translation and 3 pages of Official Copy).
Office Action received for Chinese Patent Application No. 202210849316.2, mailed on Jan. 18, 2024, 12 pages (6 pages of English Translation and 6 pages of Official Copy).
Office Action received for Chinese Patent Application No. 202211081603.X, mailed on Apr. 29, 2024, 6 pages (3 pages of English Translation and 3 pages of Official Copy).
Office Action received for Chinese Patent Application No. 202211081603.X, mailed on Jan. 10, 2024, 10 pages (5 pages of English Translation and 5 pages of Official Copy).
Office Action received for Chinese Patent Application No. 202211081603.X, mailed on Oct. 20, 2023, 15 pages (7 pages of English Translation and 8 pages of Official Copy).
Office Action received for Chinese Patent Application No. 202211096369.8, mailed on Sep. 29, 2023, 13 pages (6 pages of English Translation and 7 pages of Official Copy).
Office Action received for Chinese Patent Application No. 202211110081.1, mailed on Apr. 28, 2024, 6 pages (3 pages of English Translation and 3 pages of Official Copy).
Office Action received for Chinese Patent Application No. 202211110081.1, mailed on Jan. 8, 2024, 14 pages (6 pages of English Translation and 8 pages of Official Copy).
Office Action received for Chinese Patent Application No. 202211110081.1, mailed on Oct. 13, 2023, 16 pages (7 pages of English Translation and 9 pages of Official Copy).
Office Action received for Chinese Patent Application No. 202410229610.2, mailed on Sep. 3, 2024, 14 pages (7 pages of English Translation and 7 pages of Official Copy).
Office Action received for Chinese Patent Application No. 201520594249.X, mailed on Dec. 9, 2015, 4 pages (2 pages of English Translation and 2 pages of Official Copy).
Office Action received for Chinese Patent Application No. 201520595384.6, mailed on Dec. 9, 2015, 4 pages. (2 pages of English Translation and 2 pages of Official Copy).
Office Action received for Chinese Patent Application No. 201520595385.0, mailed on Dec. 9, 2015, 4 pages (2 pages of English Translation and 2 pages of Official Copy).
Office Action received for Chinese Patent Application No. 201520595538.1, mailed on Dec. 9, 2015, 4 pages (2 pages of English Translation and 2 pages of Official Copy).
Office Action received for Danish Patent Application No. PA201570495, mailed on Dec. 9, 2016, 2 pages.
Office action received for Danish Patent Application No. PA201570495, mailed on May 4, 2016, 8 pages.
Office Action received for Danish Patent Application No. PA201570495, mailed on Oct. 29, 2015, 7 pages.
Office Action received for Danish Patent Application No. PA201570497, mailed on Feb. 21, 2017, 3 pages.
Office Action received for Danish Patent Application No. PA201570497, mailed on May 17, 2016, 6 pages.
Office Action received for Danish Patent Application No. PA201570497, mailed on Nov. 15, 2016, 2 pages.
Office Action received for Danish Patent Application No. PA201570497, mailed on Oct. 24, 2017, 2 pages.
Office Action received for Danish Patent Application No. PA201570498, mailed on Feb. 6, 2017, 2 pages.
Office Action received for Danish Patent Application No. PA201570498, mailed on Jun. 2, 2016, 8 pages.
Office Action received for Danish Patent Application No. PA201570498, mailed on Oct. 26, 2017, 5 pages.
Office Action received for Danish Patent Application No. PA201570498, mailed on Oct. 30, 2015, 7 pages.
Office Action received for Danish Patent Application No. PA201570499, mailed on Feb. 14, 2017, 2 pages.
Office Action received for Danish Patent Application No. PA201570499, mailed on Jun. 16, 2016, 8 pages.
Office Action received for Danish Patent Application No. PA201570499, mailed on Jun. 19, 2018, 4 pages.
Office Action received for Danish Patent Application No. PA201570499, mailed on Nov. 3, 2015, 7 pages.
Office Action received for Danish Patent Application No. PA201570667, mailed on Apr. 1, 2016, 7 pages.
Office Action received for Danish Patent Application No. PA201570667, mailed on Sep. 2, 2016, 2 pages.
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Apr. 6, 2016, 12 pages.
Office action received for Danish Patent Application No. PA201570791, mailed on Sep. 6, 2016, 4 pages.
Office Action received for Danish Patent Application No. PA201670319, mailed on Aug. 2, 2016, 6 pages.
Office Action received for Danish Patent Application No. PA201670319, mailed on Jun. 21, 2017, 6 pages.
Office Action received for Danish Patent Application No. PA201670319, mailed on Nov. 24, 2016, 7 pages.
Office Action received for Danish Patent Application No. PA201670320, mailed on Aug. 4, 2016, 9 pages.
Office Action received for Danish Patent Application No. PA201670320, mailed on Dec. 5, 2016, 4 pages.
Office Action received for Danish Patent Application No. PA201670320, mailed on Jan. 18, 2018, 2 pages.
Office Action received for Danish Patent Application No. PA201670320, mailed on Jul. 3, 2017, 4 pages.
Office Action received for Danish Patent Application No. PA201670627, mailed on Apr. 5, 2017, 3 pages.
Office Action received for Danish Patent Application No. PA201670627, mailed on Nov. 6, 2017, 2 pages.
Office Action received for Danish Patent Application No. PA201670627, mailed on Oct. 11, 2016, 8 pages.
Office Action received for Danish Patent Application No. PA201670753, mailed on Dec. 20, 2016, 7 pages.
Office Action received for Danish Patent Application No. PA201670753, mailed on Jul. 5, 2017, 4 pages.
Office Action received for Danish Patent Application No. PA201670753, mailed on Mar. 23, 2018, 5 pages.
Office Action received for Danish Patent Application No. PA201670755, mailed on Apr. 6, 2017, 5 pages.
Office Action received for Danish Patent Application No. PA201670755, mailed on Apr. 20, 2018, 2 pages.
Office Action received for Danish Patent Application No. PA201670755, mailed on Dec. 22, 2016, 6 pages.
Office Action received for Danish Patent Application No. PA201670755, mailed on Oct. 20, 2017, 4 pages.
Office Action received for Danish Patent Application No. PA201770423, mailed on Jun. 12, 2018, 7 pages.
Office Action received for Danish Patent Application No. PA201770423, mailed on Mar. 29, 2019, 6 pages.

(56) References Cited

OTHER PUBLICATIONS

Office Action received for Danish Patent Application No. PA201870623, mailed on Jan. 30, 2020, 2 pages.
Office Action received for Danish Patent Application No. PA201870623, mailed on Jul. 12, 2019, 4 pages.
Office Action received for Danish Patent Application No. PA201970592, mailed on Mar. 2, 2020, 5 pages.
Office Action received for Danish Patent Application No. PA201970592, mailed on Oct. 26, 2020, 5 pages.
Office Action received for Danish Patent Application No. PA201970593, mailed on Apr. 16, 2020, 2 pages.
Office Action received for Danish Patent Application No. PA201970593, mailed on Feb. 2, 2021, 2 pages.
Office Action received for Danish Patent Application No. PA201970593, mailed on Mar. 10, 2020, 4 pages.
Office Action received for Danish Patent Application No. PA201970595, mailed on Mar. 10, 2020, 4 pages.
Office Action received for Danish Patent Application No. PA201970600, mailed on Mar. 9, 2020, 5 pages.
Office Action received for Danish Patent Application No. PA201970601, mailed on Aug. 13, 2020, 3 pages.
Office Action received for Danish Patent Application No. PA201970601, mailed on Jan. 31, 2020, 3 pages.
Office Action received for Danish Patent Application No. PA201970601, mailed on Nov. 11, 2019, 8 pages.
Office Action received for Danish Patent Application No. PA201970603, mailed on Nov. 4, 2020, 3 pages.
Office Action received for Danish Patent Application No. PA201970605, mailed on Mar. 10, 2020, 5 pages.
Office Action received for Danish Patent Application No. PA202070611, mailed on Dec. 22, 2020, 7 pages.
Office Action received for Danish Patent Application No. PA201570496, mailed on Oct. 29, 2015, 6 pages.
Office Action received for Danish Patent Application No. PA201570497, mailed on Oct. 30, 2015, 6 pages.
Office Action received for European Patent Application No. 17809168.2, mailed on Jan. 7, 2020, 5 pages.
Office Action received for European Patent Application No. 17809168.2, mailed on Oct. 8, 2020, 4 pages.
Office Action received for European Patent Application No. 15712218.5, mailed on Aug. 3, 2017, 4 pages.
Office Action received for European Patent Application No. 15730925.3, mailed on Apr. 12, 2018, 8 pages.
Office Action received for European Patent Application No. 15739109.5, mailed on Jan. 31, 2018, 7 pages.
Office Action received for European Patent Application No. 15739110.3, mailed on Jan. 31, 2018, 8 pages.
Office Action received for European Patent Application No. 15747595.5, mailed on Apr. 15, 2019, 4 pages.
Office Action received for European Patent Application No. 15747595.5, mailed on Jun. 27, 2018, 8 pages.
Office Action received for European Patent Application No. 15753796.0, mailed on Aug. 4, 2020, 9 pages.
Office Action received for European Patent Application No. 15753796.0, mailed on Jun. 2, 2022, 2 pages.
Office Action received for European Patent Application No. 15759998.6, mailed on Dec. 19, 2018, 6 pages.
Office Action received for European Patent Application No. 15759998.6, mailed on Jul. 16, 2018, 6 pages.
Office Action received for European Patent Application No. 15759998.6, mailed on May 29, 2019, 6 pages.
Office Action received for European Patent Application No. 15760008.1, mailed on Jul. 16, 2019, 9 pages.
Office Action received for European Patent Application No. 16190252.3, mailed on Feb. 19, 2018, 7 pages.
Office Action received for European Patent Application No. 16708014.2, mailed on Apr. 3, 2019, 7 pages.
Office Action received for European Patent Application No. 16708014.2, mailed on Mar. 4, 2021, 7 pages.
Office Action received for European Patent Application No. 17184710.6, mailed on Dec. 21, 2018, 7 pages.
Office Action received for European Patent Application No. 17810749.6, mailed on Aug. 20, 2019, 9 pages.
Office Action received for European Patent Application No. 18176890.4, mailed on Oct. 16, 2018, 8 pages.
Office Action received for European Patent Application No. 18183054.8, mailed on Feb. 24, 2020, 6 pages.
Office Action received for European Patent Application No. 18183054.8, mailed on Nov. 16, 2018, 8 Pages.
Office Action received for European Patent Application No. 18209460.7, mailed on Apr. 10, 2019, 7 pages.
Office Action received for European Patent Application No. 18209460.7, mailed on Apr. 21, 2020, 5 pages.
Office Action received for European Patent Application No. 18214698.5, mailed on Apr. 2, 2019, 8 pages.
Office Action received for European Patent Application No. 19203942.8, mailed on Oct. 29, 2021, 6 pages.
Office Action received for European Patent Application No. 19707557.5, mailed on Jun. 3, 2022, 5 pages.
Office Action received for European Patent Application No. 19728558.8, mailed on Jun. 21, 2021, 9 pages.
Office Action received for European Patent Application No. 19769316.1, mailed on Jan. 12, 2023, 10 pages.
Office Action received for European Patent Application No. 20168009.7, mailed on Apr. 20, 2021, 6 pages.
Office Action received for European Patent Application No. 20168009.7, mailed on Sep. 13, 2021, 8 pages.
Office Action received for European Patent Application No. 20176616.9, mailed on Jun. 10, 2021, 4 pages.
Office Action received for European Patent Application No. 20206196.6, mailed on Aug. 10, 2022, 13 pages.
Office Action received for European Patent Application No. 20206196.6, mailed on Jan. 13, 2021, 10 pages.
Office Action received for European Patent Application No. 20206197.4, mailed on Aug. 27, 2021, 6 pages.
Office Action received for European Patent Application No. 20206197.4, mailed on Jan. 12, 2021, 9 pages.
Office Action received for European Patent Application No. 20206197.4, mailed on Mar. 18, 2022, 7 pages.
Office Action received for European Patent Application No. 20210373.5, mailed on Dec. 9, 2021, 7 pages.
Office Action received for European Patent Application No. 20210373.5, mailed on May 10, 2021, 9 pages.
Office Action received for European Patent Application No. 20210373.5, mailed on May 31, 2022, 5 pages.
Office Action received for European Patent Application No. 20728854.9, mailed on Apr. 8, 2024, 7 pages.
Office Action received for European Patent Application No. 20728854.9, mailed on May 7, 2024, 10 pages.
Office Action received for European Patent Application No. 21157252.4, mailed on Apr. 23, 2021, 8 pages.
Office Action received for European Patent Application No. 21157252.4, mailed on Jul. 24, 2023, 5 pages.
Office Action received for European Patent Application No. 21161005.0, mailed on Apr. 22, 2022, 11 pages.
Office Action received for European Patent Application No. 21163791.3, mailed on Jun. 2, 2021, 8 pages.
Office Action received for European Patent Application No. 21163791.3, mailed on Sep. 20, 2022, 6 pages.
Office Action received for European Patent Application No. 21165295.3, mailed on Jul. 1, 2021, 10 pages.
Office Action received for European Patent Application No. 22157106.0, mailed on Dec. 21, 2023, 6 pages.
Office Action received for European Patent Application No. 22197186.4, mailed on Jun. 25, 2024, 5 pages.
Office Action received for European Patent Application No. 23158566.2, mailed on Apr. 9, 2024, 7 pages.
Office Action received for European Patent Application No. 23203433.0, mailed on Jul. 9, 2024, 6 pages.
Office Action received for European Patent Application No. 15730925.3, mailed on Feb. 27, 2019, 5 pages.

(56) References Cited

OTHER PUBLICATIONS

Office Action received for German Patent Application No. 112015003083.2, mailed on Mar. 9, 2018, 12 pages (5 pages of English Translation and 7 pages of Official Copy).
Office Action received for Indian Patent Application No. 201817024430, mailed on Sep. 27, 2021, 8 pages.
Office Action received for Indian Patent Application No. 201818025015, mailed on Feb. 4, 2022, 7 pages.
Office Action received for Indian Patent Application No. 201818045872, mailed on Oct. 13, 2021, 7 pages.
Office Action received for Indian Patent Application No. 201818046896, mailed on Feb. 2, 2022, 7 pages.
Office Action received for Indian Patent Application No. 202014041530, mailed on Dec. 8, 2021, 7 pages.
Office Action received for Indian Patent Application No. 202117009020, mailed on Feb. 6, 2023, 7 pages.
Office Action received for Indian Patent Application No. 202117017871, mailed on Apr. 4, 2024, 8 pages.
Office Action received for Indian Patent Application No. 202118021941, mailed on Mar. 23, 2022, 5 pages.
Office Action received for Indian Patent Application No. 202118028158, mailed on Apr. 22, 2024, 7 pages.
Office Action received for Indian Patent Application No. 202118028159, mailed on Jun. 27, 2022, 6 pages.
Office Action received for Indian Patent Application No. 202118046028, mailed on Apr. 6, 2022, 6 pages.
Office Action received for Indian Patent Application No. 202215010325, mailed on Oct. 10, 2022, 7 pages.
Office Action received for Indian Patent Application No. 202218016788, mailed on Sep. 4, 2024, 5 pages.
Office Action received for Japanese Patent Application No. 2017-505450, mailed on Jun. 20, 2017, 8 pages (4 pages of English Translation and 4 pages of Official Copy).
Office Action received for Japanese Patent Application No. 2017-505842, mailed on Feb. 22, 2019, 11 pages (6 pages of English Translation and 5 pages of Official Copy).
Office Action received for Japanese Patent Application No. 2017-505842, mailed on Sep. 9, 2019, 7 pages (3 pages of English Translation and 4 pages of Official Copy).
Office Action received for Japanese Patent Application No. 2017-505847, mailed on Feb. 12, 2019, 13 pages (6 pages of English Translation and 7 pages of Official Copy).
Office Action received for Japanese Patent Application No. 2017-510631, mailed on Mar. 2, 2018, 12 pages (7 pages of English Translation and 5 pages of Official Copy).
Office Action received for Japanese Patent Application No. 2018-074971, mailed on Jan. 28, 2019, 6 pages (3 pages of English Translation and 3 pages of Official Copy).
Office Action received for Japanese Patent Application No. 2018-080122, mailed on Aug. 9, 2019, 5 pages (2 pages of English Translation and 3 pages of Official Copy).
Office Action received for Japanese Patent Application No. 2018-080122, mailed on Jan. 28, 2019, 11 pages (6 pages of English Translation and 5 pages of Official Copy).
Office Action received for Japanese Patent Application No. 2018-080122, mailed on Nov. 27, 2020, 16 pages (8 pages of English Translation and 8 pages of Official Copy).
Office Action received for Japanese Patent Application No. 2018-107114, mailed on Oct. 9, 2018, 4 pages (2 pages of English Translation and 2 pages of Official Copy).
Office Action received for Japanese Patent Application No. 2018-225131, mailed on Aug. 17, 2020, 21 pages (6 pages of English Translation and 15 pages of Official Copy).
Office Action received for Japanese Patent Application No. 2018-225131, mailed on Mar. 4, 2019, 10 pages (6 pages of English Translation and 4 pages of Official Copy).
Office Action received for Japanese Patent Application No. 2018-545502, mailed on Aug. 17, 2020, 14 pages (6 pages of English Translation and 8 pages of Official Copy).
Office Action received for Japanese Patent Application No. 2019-203399, mailed on Aug. 10, 2021, 4 pages (2 pages of English Translation and 2 pages of Official Copy).
Office Action received for Japanese Patent Application No. 2020-070418, mailed on Aug. 3, 2020, 22 pages (14 pages of English Translation and 8 pages of Official Copy).
Office Action received for Japanese Patent Application No. 2020-124605, mailed on Dec. 17, 2021, 2 pages (1 page of English Translation and 1 page of Official Copy).
Office Action received for Japanese Patent Application No. 2020-124605, mailed on May 13, 2022, 6 pages (3 pages of English Translation and 3 pages of Official Copy).
Office Action received for Japanese Patent Application No. 2020-124605, mailed on Sep. 3, 2021, 5 pages (2 pages of English Translation and 3 pages of Official Copy).
Office Action received for Japanese Patent Application No. 2020-159338, mailed on Dec. 8, 2021, 9 pages (5 pages of English Translation and 4 pages of Official Copy).
Office Action received for Japanese Patent Application No. 2020-184470, mailed on May 10, 2021, 3 pages (1 page of English Translation and 2 pages of Official Copy).
Office Action received for Japanese Patent Application No. 2020-184471, mailed on May 10, 2021, 3 pages (1 page of English Translation and 2 pages of Official Copy).
Office Action received for Japanese Patent Application No. 2020-542592, mailed on Aug. 1, 2022, 5 pages (2 pages of English Translation and 3 pages of Official Copy).
Office Action received for Japanese Patent Application No. 2020-542592, mailed on Sep. 21, 2021, 5 pages (3 pages of English Translation and 2 pages of Official Copy).
Office Action received for Japanese Patent Application No. 2020-560927, mailed on Dec. 1, 2021, 3 pages (1 page of English Translation and 2 pages of Official Copy).
Office Action received for Japanese Patent Application No. 2020-560927, mailed on Jun. 10, 2021, 5 pages (2 pages of English Translation and 3 pages of Official Copy).
Office Action received for Japanese Patent Application No. 2021-051415, mailed on Jul. 19, 2021, 4 pages (2 pages of English Translation and 2 pages of Official Copy).
Office Action received for Japanese Patent Application No. 2021-187533, mailed on Feb. 6, 2023, 7 pages (4 pages of English Translation and 3 pages of Official Copy).
Office Action received for Japanese Patent Application No. 2021-187533, mailed on Jun. 26, 2023, 6 pages (3 pages of English Translation and 3 pages of Official Copy).
Office Action received for Japanese Patent Application No. 2021-565919, mailed on Jun. 13, 2022, 4 pages (2 pages of English Translation and 2 pages of Official Copy).
Office Action received for Japanese Patent Application No. 2022-016138, mailed on Apr. 24, 2023, 9 pages (5 pages of English Translation and 4 pages of Official Copy).
Office Action received for Japanese Patent Application No. 2022-095182, mailed on Sep. 25, 2023, 10 pages (5 pages of English Translation and 5 pages of Official Copy).
Office Action received for Japanese Patent Application No. 2022-104306, mailed on Sep. 19, 2023, 4 pages (2 pages of English Translation and 2 pages of Official Copy).
Office Action received for Japanese Patent Application No. 2022-130725, mailed on Sep. 4, 2023, 2 pages (1 page of English Translation and 1 page of Official Copy).
Office Action received for Japanese Patent Application No. 2022-145387, mailed on Oct. 2, 2023, 7 pages (3 pages of English Translation and 4 pages of Official Copy).
Office Action received for Japanese Patent Application No. 2022-199433, mailed on Jan. 29, 2024, 6 pages (3 pages of English Translation and 3 pages of Official Copy).
Office Action received for Japanese Patent Application No. 2022-199433, mailed on Jul. 2, 2024, 6 pages (3 pages of English Translation and 3 pages of Official Copy).
Office Action received for Japanese Patent Application No. 2022-205934, mailed on Mar. 11, 2024, 4 pages (2 pages of English Translation and 2 pages of Official Copy).

(56) References Cited

OTHER PUBLICATIONS

Office Action received for Japanese Patent Application No. 2024-060293, mailed on Jul. 29, 2024, 6 pages (3 pages of English Translation and 3 pages of Official Copy).
Office Action received for Korean Patent Application No. 10-2017-7005939, mailed on Jun. 30, 2017, 6 pages (2 pages of English Translation and 4 pages of Official Copy).
Office Action received for Korean Patent Application No. 10-2018-7018904, mailed on Aug. 20, 2019, 8 pages (3 pages of English Translation and 5 pages of Official Copy).
Office Action received for Korean Patent Application No. 10-2018-7026743, mailed on Jan. 17, 2019, 5 pages (2 pages of English Translation and 3 pages of Official Copy).
Office Action received for Korean Patent Application No. 10-2018-7034780, mailed on Apr. 4, 2019, 11 pages (5 pages of English Translation and 6 pages of Official Copy).
Office Action received for Korean Patent Application No. 10-2018-7035747, mailed on Apr. 9, 2020, 11 pages (5 pages of English Translation and 6 pages of Official Copy).
Office Action received for Korean Patent Application No. 10-2018-7035747, mailed on Oct. 14, 2020, 6 pages (3 pages of English Translation and 3 pages of Official Copy).
Office Action received for Korean Patent Application No. 10-2018-7036893, mailed on Apr. 9, 2019, 6 pages (2 pages of English Translation and 4 pages of Official Copy).
Office Action received for Korean Patent Application No. 10-2019-7027042, mailed on May 13, 2020, 6 pages (2 pages of English Translation and 4 pages of Official Copy).
Office Action received for Korean Patent Application No. 10-2020-0052618, mailed on Aug. 18, 2020, 11 pages (5 pages of English Translation and 6 pages of Official Copy).
Office Action received for Korean Patent Application No. 10-2020-0124139, mailed on Jan. 17, 2023, 10 pages (5 pages of English Translation and 5 pages of Official Copy).
Office Action received for Korean Patent Application No. 10-2020-7022663, mailed on Aug. 17, 2021, 11 pages (5 pages of English Translation and 6 pages of Official Copy).
Office Action received for Korean Patent Application No. 10-2020-7026036, mailed on Dec. 7, 2020, 8 pages (3 pages of English Translation and 5 pages of Official Copy).
Office Action received for Korean Patent Application No. 10-2020-7031700, mailed on Dec. 15, 2020, 6 pages (2 pages of English Translation and 4 pages of official Copy).
Office Action received for Korean Patent Application No. 10-2021-0022053, mailed on Mar. 1, 2021, 11 pages (5 pages of English Translation and 6 pages of Official Copy).
Office Action received for Korean Patent Application No. 10-2021-7000954, mailed on Jan. 28, 2021, 5 pages (2 pages of English Translation and 3 pages of Official Copy).
Office Action received for Korean Patent Application No. 10-2021-7006145, mailed on Oct. 12, 2022, 14 pages (6 pages of English Translation and 8 pages of Official Copy).
Office Action received for Korean Patent Application No. 10-2021-7036337, mailed on Dec. 8, 2021, 6 pages (2 pages of English Translation and 4 pages of Official Copy).
Office Action received for Korean Patent Application No. 10-2022-7001332, mailed on Apr. 20, 2023, 8 pages (4 pages of English Translation and 4 pages of Official Copy).
Office Action received for Korean Patent Application No. 10-2022-7010505, mailed on Jun. 14, 2022, 5 pages (2 pages of English Translation and 3 pages of Official Copy).
Office Action received for Korean Patent Application No. 10-2022-7023077, mailed on Jul. 25, 2022, 6 pages (2 pages of English Translation and 4 pages of Official Copy).
Office Action received for Korean Patent Application No. 10-2022-7033119, mailed on Mar. 29, 2023, 5 pages (2 pages of English Translation and 3 pages of Official Copy).
Office Action received for Korean Patent Application No. 10-2023-7002360, mailed on Jun. 5, 2024, 6 pages (2 pages of English Translation and 4 pages of Official Copy).
Office Action received for Korean Patent Application No. 10-2023-7008854, mailed on Nov. 15, 2023, 6 pages (2 pages of English Translation and 4 pages of Official Copy).
Office Action received for Korean Patent Application No. 10-2023-7016569, mailed on Jan. 22, 2024, 10 pages (4 pages of English Translation and 6 pages of Official Copy).
Office Action received for Netherlands Patent Application No. 2015245, mailed on Jan. 24, 2017, 11 pages (1 page of English Translation and 10 pages of Official Copy).
Office Action received for Netherlands Patent Application No. 2019753, mailed on Apr. 12, 2018, 8 pages (3 page of English Translation and 5 pages of Official Copy).
Office Action received for Netherlands Patent Application No. 2015239, mailed on Oct. 28, 2016, 13 pages (5 pages of English Translation and 8 pages of Official Copy).
Office Action received for Taiwanese Patent Application No. 104124962, issued on Nov. 29, 2016, 6 pages (3 pages of English Translation and 3 pages of Official Copy).
Office Action received for Taiwanese Patent Application No. 104124998, mailed on Nov. 29, 2016, 6 pages (3 pages of English Translation and 3 pages of Official Copy).
Office Action received for Taiwanese Patent Application No. 104108223, mailed on Apr. 25, 2016, 10 pages (5 pages of English Translation and 5 pages of Official Copy).
Office Action received for Taiwanese Patent Application No. 104123593, mailed on May 24, 2016, 57 pages (26 pages of English Translation and 31 pages of Official Copy).
Office Action received for. Taiwanese Patent Application No. 104123593, mailed on Sep. 13, 2016, 8 pages (3 pages of English Translation and 5 pages of Official Copy).
Office Action received for Taiwanese Patent Application No. 104124963, mailed on Jan. 5, 2017, 11 pages (5 pages of English Translation and 6 pages of Official Copy).
Office Action received for Taiwanese Patent Application No. 104124995, issued on Dec. 1, 2016, 6 pages (3 pages of English Translation and 3 pages of Official Copy).
Office Action received for Taiwanese Patent Application No. 104124997, issued on Dec. 8, 2016, 12 pages (5 pages of English Translation and 7 pages of Official Copy).
Office Action received for Taiwanese Patent Application No. 104128519, mailed on Mar. 29, 2017, 16 pages (7 pages of English Translation and 9 pages of Official Copy).
Office Action received for Taiwanese Patent Application No. 104128684, mailed on Nov. 8, 2016, 24 pages (9 pages of English Translation and 15 pages of Official Copy).
Office Action received for Taiwanese Patent Application No. 104128705, mailed on Aug. 29, 2016, 18 pages (7 pages of English Translation and 11 pages of Official Copy).
Office Action received for Taiwanese Patent Application No. 104128705, mailed on Mar. 16, 2017, 3 pages (Official Copy only) {See Communication Under Rule 37 CFR § 1.98(a) (3)}.
Office Action received for Taiwanese Patent Application No. 104107328, mailed on Dec. 28, 2016, 4 pages (1 page of Search Report and 3 pages of Official Copy).
Office Action received for Taiwanese Patent Application No. 104120843, mailed on Jan. 30, 2016, 5 pages (1 page of English Translation of Search Report and 4 pages of Official Copy).
Office Action received for Australian Patent Application No. 2015101183, issued on Nov. 6, 2015, 4 pages.
Omar Romero, "Sony Smartwatch 2 Custom Watchfaces Tutorial", Retrieved From: <https://www.youtube.com/watch?v=8odbxqwSQR8>, May 1, 2014, 2 pages.
Osxdaily, "How to Zoom the Camera on iPhone", Available Online at: https://osxdaily.com/2012/04/18/zoom-camera-iphone/, Apr. 18, 2012, 6 pages.
Partial Supplementary European Search Report received for European Patent Application No. 17810749.6, mailed on Apr. 25, 2019, 8 pages.
"Pentax K20D Operating Manual", http://www.ricoh-imaging.eu/en/operating-manuals-download.html, Pentax Corporation, 2008, pp. 173-174.

(56) References Cited

OTHER PUBLICATIONS

Phonebuff, "Hybrid Stopwatch & Timer Android App Review", Available Online at: https://www.youtube.com/watch?v=B43oCFPIWVY, Apr. 4, 2012, 7 pages.
Playmemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
Pre-Appeal Review Report received for Japanese Patent Application No. 2018-225131, mailed on Jan. 24, 2020, 8 pages (4 pages of English Translation and 4 pages of Official Copy).
Pre-Appeal Review Report received for Japanese Patent Application No. 2018-545502, mailed on Jan. 24, 2020, 8 pages (3 pages of English Translation and 5 pages of Official Copy).
Pre-Interview First Office Action received for U.S. Appl. No. 14/815,890, mailed on May 26, 2016, 4 pages.
"Procamera Capture the Moment", Online Available at: http://www.procamera-app.com/procamera_manual/ProCamera_Manual_EN.pdf, Apr. 21, 2016, 63 pages.
Razykdreviews, "In Depth Review of Apple Watch Activity and Workout App", available at <URL: https://www.youtube.com/watch?v=GkKI3qIKOow>, Category: X Claims: 1-5Category: L Reason: Internet citation/video, May 11, 2015, 1 page.
Record of Oral Hearing received for U.S. Appl. No. 14/815,890, mailed on Nov. 20, 2020, 18 pages.
Record of Oral Hearing received for U.S. Appl. No. 15/405,122, mailed on Sep. 12, 2023, 20 pages.
Record of Oral Hearing received for U.S. Appl. No. 16/144,629, mailed on Jan. 28, 2022, 13 pages.
Record of Oral Hearing received for U.S. Appl. No. 17/116,938, mailed on May 29, 2024, 13 pages.
Rehman, A., "Install Android 4.2 Gesture-Based Keyboard & Clock App On Jelly Bean 4.1 Or Higher", Excerpts From, Available online at: <http://www.addictivetips.com/android/install-android-4-2-keyboard-clock-app-apk-on-jelly-bean-4-1-x/>, Nov. 3, 2012, 4 pages.
"Remote Phone Call", Available online at:—https://web.archive.org/web/20140625104844/https://www.justremotephone.com/>, Jun. 25, 2014, 22 pages.
"Remote Shot for SmartWatch 2", Available online at:—https://play.google.com/store/apps/details?id=net.watea.sw2.rshot&h1=en, Nov. 21, 2017, 3 pages.
Responding to a meeting invitation, Available online at:—https://web.archive.org/web/20121128174157/https://www.zimbra.com/desktop7/help/en_US/Calendar/Responding_to_an_invitation.htm, Nov. 28, 2012, 1 page.
Restriction Requirement received for U.S. Appl. No. 14/815,890, mailed on Feb. 22, 2016, 5 pages, 5 pages.
Result of Consultation received for European Patent Application No. 15760008.1, mailed on Sep. 9, 2021, 7 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Result of Consultation received for European Patent Application No. 17810749.6, mailed on Dec. 15, 2020, 3 pages.
Result of Consultation received for European Patent Application No. 17810749.6, mailed on Jan. 18, 2021, 3 pages.
Result of Consultation received for European Patent Application No. 17810749.6, mailed on Jan. 21, 2021, 18 pages.
Result of Consultation received for European Patent Application No. 19728558.8, mailed on Jun. 28, 2022, 4 pages.
Result of Consultation received for European Patent Application No. 20185974.1, mailed on Apr. 4, 2022, 4 pages.
Result of Consultation received for European Patent Application No. 20206196.6, mailed on Mar. 27, 2024, 4 pages.
Result of Consultation received for European Patent Application No. 21165295.3, mailed on Apr. 18, 2024, 3 pages.
Result of Consultation received for European Patent Application No. 15730925.3, mailed on Nov. 24, 2020, 4 pages.
Rizknows, "Garmin Connect Mobile App—Review #2", https://www.youtube.com/watch?v=7my3wMpeRbE, Category: X Claims: 1-5Category: L Reason: Internet citation/video, May 11, 2015, 1 page.
Rowinski, Dan, "Why The All-In-One Smartwatch Isn't Happening Any Time Soon", Online available at:—https://web.archive.org/web/20140123074218if_/https://readwrite.com/2014/01/20/smartwatch-wearable-fitness-remote-control/, Jan. 20, 2014, 6 pages.
Samsung, "SM-G900F User Manual", English (EU). Rev.1.0, Mar. 2014, 249 pages.
Schiffhauer, Alexander, "See the Light with Night Sight", Available online at: https://www.blog.google/products/pixel/see-light-night-sight, Nov. 14, 2018, 6 pages.
Search Report and Opinion received for Danish Patent Application No. PA201770423, mailed on Oct. 4, 2017, 10 pages.
Search Report and Opinion received for Danish Patent Application No. PA201870623, mailed on Dec. 20, 2018, 8 pages.
Search Report and Opinion received for Danish Patent Application No. PA201970592, mailed on Nov. 7, 2019, 8 pages.
Search Report and Opinion received for Danish Patent Application No. PA201970593, mailed on Oct. 29, 2019, 10 pages.
Search Report and Opinion received for Danish Patent Application No. PA201970595, mailed on Nov. 8, 2019, 16 pages.
Search Report and Opinion received for Danish Patent Application No. PA201970600, mailed on Nov. 5, 2019, 11 pages.
Search Report and Opinion received for Danish Patent Application No. PA201970603, mailed on Nov. 15, 2019, 9 pages.
Search Report and Opinion received for Danish Patent Application No. PA201970605, mailed on Nov. 12, 2019, 10 pages.
Search Report and Opinion received for Netherlands Patent Application No. 2015232, mailed on Jan. 25, 2017, 9 pages (1 page of English Translation and 8 pages of Official Copy).
Search Report and Opinion received for Netherlands Patent Application No. 2015242, issued on Jul. 4, 2017, 20 pages (10 pages of English Translation of Search Opinion and 10 pages of Official Copy).
Search Report and Opinion received for Netherlands Patent Application No. 2015364, issued on Jul. 4, 2017, 12 pages (5 pages of English Translation of Search Opinion and 7 pages of Official Copy).
Search Report and Opinion received for Netherlands Patent Application No. 2018531, issued on Jul. 27, 2017, 14 pages (6 pages of English Translation and 8 pages of Official Copy).
Search Report and Opinion received for Netherlands Patent Application No. 2015236, mailed on Apr. 21, 2021, 19 pages (13 pages of English Translation and 6 pages of Official Copy).
Shankland Stephen, "Chrome OS Gets 'OK Google' Voice Search Control", available online at <http://www.cnet.com/news/chrome-os-gets-ok-google-voice-search-control/>, May 21, 2014, 4 pages.
Shareit, "WhatsApp Easy Way to Record Long Voice Messages—New Update", Retrieved from Internet: https://www.youtube.com/watch?v=3MVnYGt8v11 I>, Apr. 7, 2018, 39 pages.
Shaw et al., "Skills for Closeups Photography", Watson-Guptill Publications, Nov. 1999, 5 pages (Official Copy only) {See Communication Under Rule 37 CFR § 1.98(a) (3)}.
Shiftdelete.net, "Oppo Reno 10x Zoom on Inceleme Huawei P30 Pro'ya rakip mi geliyor?", Available online at <https://www.youtube.com/watch?v=ev2wlUztdrg>, See especially 5:34-6:05., Apr. 24, 2019, 2 pages.
Shiota, Shinji, "Windows 7 Dojo", Weekly ASCII, Ascii Mediaworks Inc., vol. 798, Aug. 31, 2010, 3 pages.
Siewiorek et al., "SenSay: A context-aware mobile phone", Retrieved from the Internet: URL: http://www.cs.cmu.edu/aura/docdir/sensay_iswc.pdf sensay_iswc.pdf, 2003, 10 pages.
Sigdel Prakash, "How to record WhatsApp voice massage without continue holding down button", Available Online at: https://www.youtube.com/watch?v=m3Hz6TXt0PA, Dec. 6, 2017, 9 pages.
Smart Reviews, "Honor10 AI Camera's in Depth Review", See Especially 2:37-2:48; 6:39-6:49, Available Online at <https://www.youtube.com/watch?v=oKFqRvxeDBQ>, May 31, 2018, 2 pages.
Smartwatch, "App Earth Space HD Live Wallpaper APK for Smart Watch", Version 1.7, Android version 2.2, Aug. 27, 2013, 1 page.
"Solar Walk Free", Vito Technology, Jun. 19, 2014, 9 pages.

(56) References Cited

OTHER PUBLICATIONS

Sony Smartwatch 2 update—new feartures and watchface creator !!! NEW !!! , Online available at: https://www.youtube.com/watch?v=k3jBv7QZSk, May 8, 2014, 3 pages.
"Sony Xperia XZ3 Camera Review—The Colors, Duke, The Colors!, Android Headlines—Android News & Tech News", Available online at <https://www.youtube.com/watch?v=mwpYXzWVOgw>, See especially 1:02-1:27, 2:28-2:30, Nov. 3, 2018, 3 pages.
Sony, "Live View_ micro display", Extended User Guide, Aug. 2010, 27 pages.
Sony, "Sony Smartwatch 3 SWR50", User Guide, Jul. 2014, 31 pages.
Sony, "Sony SmartWatch", User Guide, Dec. 2011, 18 pages.
Sony, "User Guide, Xperia XZ3, H8416/H9436/H9493", Sony Mobile Communications Inc., Retrieved from <https://www-support- downloads.sonymobile.com/h8416/userguide_EN_H8416-H9436-H9493_2_Android9.0.pdf>, See pp. 86-102., 2018, 121 pages.
Stateoftech, "Samsung Galaxy Gear Tips—Installing and Customizing Clock Faces", Online available at: https://www.youtube.com/watch?v=p2GzpL3xlUo, Dec. 12, 2013, 3 pages.
Stateoftech, "Samsung Galaxy Gear Tips—Change the Clock Face", Retrieved from: https://www.youtube.com/watch?v=GOom7AZUAjY, Dec. 11, 2013, 2 pages.
Summons to Attend Oral Proceedings received for European Patent Application No. 15711969.4, mailed on Oct. 22, 2018, 12 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 15739109.5, mailed on Aug. 23, 2018, 9 pages.
Summons to Attend Oral Proceedings received for European Patent Application No. 15739109.5, mailed on Oct. 4, 2018, 3 pages.
Summons to Attend Oral Proceedings received for European Patent Application No. 15739110.3, mailed on Aug. 23, 2018, 10 pages.
Summons to Attend Oral Proceedings received for European Patent Application No. 15739110.3, mailed on Oct. 2, 2018, 3 pages.
Summons to Attend Oral Proceedings received for European Patent Application No. 15760008.1, mailed on Feb. 5, 2021, 11 pages.
Summons to Attend Oral Proceedings received for European Patent Application No. 16190252.3, mailed on Jan. 8, 2019, 3 pages.
Summons to Attend Oral Proceedings received for European Patent Application No. 16190252.3, mailed on Oct. 30, 2018, 13 pages.
Summons to Attend Oral Proceedings received for European Patent Application No. 16708014.2, mailed on Oct. 10, 2022, 5 pages.
Summons to Attend Oral Proceedings received for European Patent Application No. 17184710.6, mailed on Sep. 17, 2019, 7 pages.
Summons to Attend Oral Proceedings received for European Application No. 17810749.6, mailed on Aug. 12, 2020, 11 pages.
Summons to Attend Oral Proceedings received for European Patent Application No. 19707557.5, mailed on Jan. 26, 2024, 6 pages.
Summons to Attend Oral Proceedings received for European Patent Application No. 19728558.8, mailed on Jan. 18, 2022, 9 pages.
Summons to Attend Oral Proceedings received for European Patent Application No. 20176616.9, mailed on Dec. 17, 2021, 7 pages.
Summons to Attend Oral Proceedings received for European Patent Application No. 21161005.0, mailed on Dec. 13, 2022, 9 pages.
Summons to Attend Oral Proceedings received for European Patent Application No. 21163791.3, mailed on May 3, 2023, 6 pages.
Summons to Attend Oral Proceedings received for European Patent Application No. 21165295.3, mailed on Jul. 25, 2023, 14 pages.
Summons to Oral Proceedings received for European Patent Application No. 17184710.6, mailed on May 10, 2023, 3 pages.
Sun Set, "Sun Set solar image clock", Available at <https://web.archive.orgjweb/20140719005410/http://www.sunsetclock.com/>, 2013, 5 pages.
Supplemental Notice of Allowance received for U.S. Appl. No. 14/805,403, mailed on Oct. 4, 2018, 3 pages.
Supplemental Notice of Allowance received for U.S. Appl. No. 14/815,890, mailed on Mar. 10, 2021, 2 pages.
Supplemental Notice of Allowance received for U.S. Appl. No. 14/833,014, mailed on Mar. 12, 2020, 2 pages.
Supplemental Notice of Allowance received for U.S. Appl. No. 14/841,608, mailed on Jan. 25, 2018, 2 pages.
Supplemental Notice of Allowance received for U.S. Appl. No. 15/616,480, mailed on Mar. 28, 2019, 2 pages.
Supplemental Notice of Allowance received for U.S. Appl. No. 16/147,523, mailed on Aug. 23, 2022, 2 pages.
Supplemental Notice of Allowance received for U.S. Appl. No. 17/546,968, mailed on Jun. 14, 2024, 2 pages.
Supplemental Notice of Allowance received for U.S. Appl. No. 17/546,968, mailed on Sep. 25, 2024, 2 pages.
Supplemental Notice of Allowance received for U.S. Appl. No. 17/951,875, mailed on Aug. 25, 2023, 2 pages.
Supplemental Notice of Allowance received for U.S. Appl. No. 17/975,141, mailed on Aug. 12, 2024, 2 pages.
Supplemental Notice of Allowance received for U.S. Appl. No. 17/975,141, mailed on Feb. 26, 2024, 2 pages.
Supplementary European Search Report received for European Patent Application No. 17810749.6, mailed on Aug. 6, 2019, 6 pages.
Supplementary European Search Report received for European Patent Application No. 18176890.4, mailed on Sep. 20, 2018, 4 pages.
Supplementary European Search Report received for European Patent Application No. 18183054.8, mailed on Oct. 11, 2018, 4 pages.
Tablet Talk, "Tablet Talk App: Frequently Asked Questions—Tablet Talk.", available at https://web.archive.org/web/20140625102903/http:/1www.tablettal app.com/faq, Jun. 25, 2014, pp. 1-6.
Talkandroid, "Android Wear walkthrough", Available online at: https://www.youtube.com/watch?v=4xntpZac4sw, Jun. 30, 2014, 1 page.
Tech Stuff, "Telegram 4.0: Video Messages + Telescope, Payments and more . . .", Available Online at: https://www.youtube.com/watch?v=y0alJRPH7nQ, May 20, 2017, 6 pages.
Techcloud, "How to Create Custom Watch Face for Samsung Galaxy Gear Smartwatch just in Few Seconds", Online available at: https://www.youtube.com/watch?v=6rO-_SREDjQ, Oct. 9, 2013, 3 pages.
Techsmith, "Snagit® 11 Snagit 11.4 Help", Online available at <http://assets.techsmith.com/Downloads/ua-tutorials-snagit-11/Snagit_11.pdf>, Jan. 2014, 146 pages.
Telleen et al., "Synthetic Shutter Speed Imaging", University of California, Santa Cruz, vol. 26, No. 03, 2007, 8 pages.
The Nitpicker, "Sony Xperia XZ3 | in-depth Preview", Available online at <https://www.youtube.com/watch?v=TGCKxBuiO5c>, See especially 12:40-17:25, Oct. 7, 2018, 3 pages.
"The Ultimate Beautiful Holo Stopwatch: Ultimate Stopwatch & Timer", Available online at: https://sspai.com/post/21699, Mar. 1, 2013, 4 pages (Official Copy only) {See Communication Under Rule 37 CFR § 1.98(a) (3)}.
Theunlockr, "How to Change the Watch Face on the Galaxy Gear", Online available at: https://www.youtube.com/watch?v=Z7EBG5aBiZg, Jan. 3, 2014, 3 pages.
Tico et al., "Robust method of digital image stabilization", Nokia Research Center, ISCCSP, Malta, Mar. 12-14, 2008, pp. 316-321.
Travel Tech Sports Channel, "New WhatsApp update-voice message recording made easy-Want to record long voice messages", Available Online at: https://www.youtube.com/watch?v=SEviqgsAdUk, Nov. 30, 2017, 13 pages.
"UlKit User Interface Catalog: Page Controls", Available online at https://web.archive.org/web/20140703123442/https://developer.apple.com/library/ios/documentation/userexperience/conceptual/UIKitUICatalog/UIPageControl.html, Dec. 16, 2013, 4 pages.
Vanhemert, Kyle, "Why Siri Could Be the Killer App for Smartwatches", XP002798416, Retrieved from the Internet: URL: https://www.wired.com/2013/12/what-can-a-smartwatch-really-do/, Dec. 19, 2013, 14 pages.

(56) References Cited

OTHER PUBLICATIONS

Viticci, Frederico, "Checking Time Zones with Living Earth—MacStories", Available at <https://www.macstories.net/reviews/checking-time-zones-with-living-earth/>, Dec. 11, 2013, pp. 1-5.
Vivo India, "Bokeh Mode | Vivo V9", Available Online at <https://www.youtube.com/watch?v=B5AIHhH5Rxs>, Mar. 25, 2018, 3 pages.
Watchophilia, "Mickey Mouse Watches", Online Available at: https://web.archive.org/web/20130929065422/https://www.watchophilia.com/photogallery/m ickey-mouse/, Sep. 29, 2013, 16 pages.
Watchuseek, "The watch every father needs: M-I-C-K-E-Y, M-O-U-S-E. Mickey Mouse ", Online Available at: https://forums.watchuseek.com/f2/watch-every-father-needs-m-i-c-k-e-y-m-o-u-s-e-mickey-mouse-855069.html, 2013, 3 pages.
Whitacre, Michele, "Photography 101 | Exposure Meter", Online available at: https://web.archive.org/web/20160223055834/http://www.michelewhitacrephotographyblog.com, Feb. 23, 2016, 4 pages.
Wikipedia, "Emoji", Online Available at: https://web.archive.org/web/20140829025736/https://en.wikipedia.org/wiki/Emoji, 2014, 13 pages.
Wong, Richard, "Huawei Smartphone (P20/P10/P9, Mate 10/9) Wide Aperture Mode Demo", Available Online at <https://www.youtube.com/watch?v=eLY3LsZGDPA>, May 7, 2017, 2 pages.
Wu et al., "Security Threats to Mobile Multimedia Applications: Camera-Based Attacks on Mobile Phones", IEEE Communications Magazine, Available online at: http://www.ieeeprojectmadurai.in/BASE/ANDROID/Security%20Threats%20to%20Mobile.pdf, Mar. 2014, pp. 80-87.
Xeetechcare, "Samsung Galaxy S10 - Super Night Mode & Ultra Fast Charging!", Online Available at: https://www.youtube.com/watch?v=3bguV4FX6aA, Mar. 28, 2019, 4 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Yuan, Ye, "Iphone 4s Original Secrets", China Railway Press, 2012, 15 pages (Official Copy only) {See Communication Under Rule 37 CFR § 1.98(a) (3)}.
Zelgadis, "Reuse Animations -Synfig Animation Studio", Available online at: https://wiki.synfig.org/index.php?title=Doc:Reuse_Animations&oldid=18173, May 20, 2013, 5 pages.
Zukerman, Erez, "6 Beautiful, Interesting & Versatile Timer Apps [Android]", available at: http://www.makeuseof.com/tag/beautiful-interesting-versatile-timer-apps-android/, May 18, 2012, 5 pages.

* cited by examiner

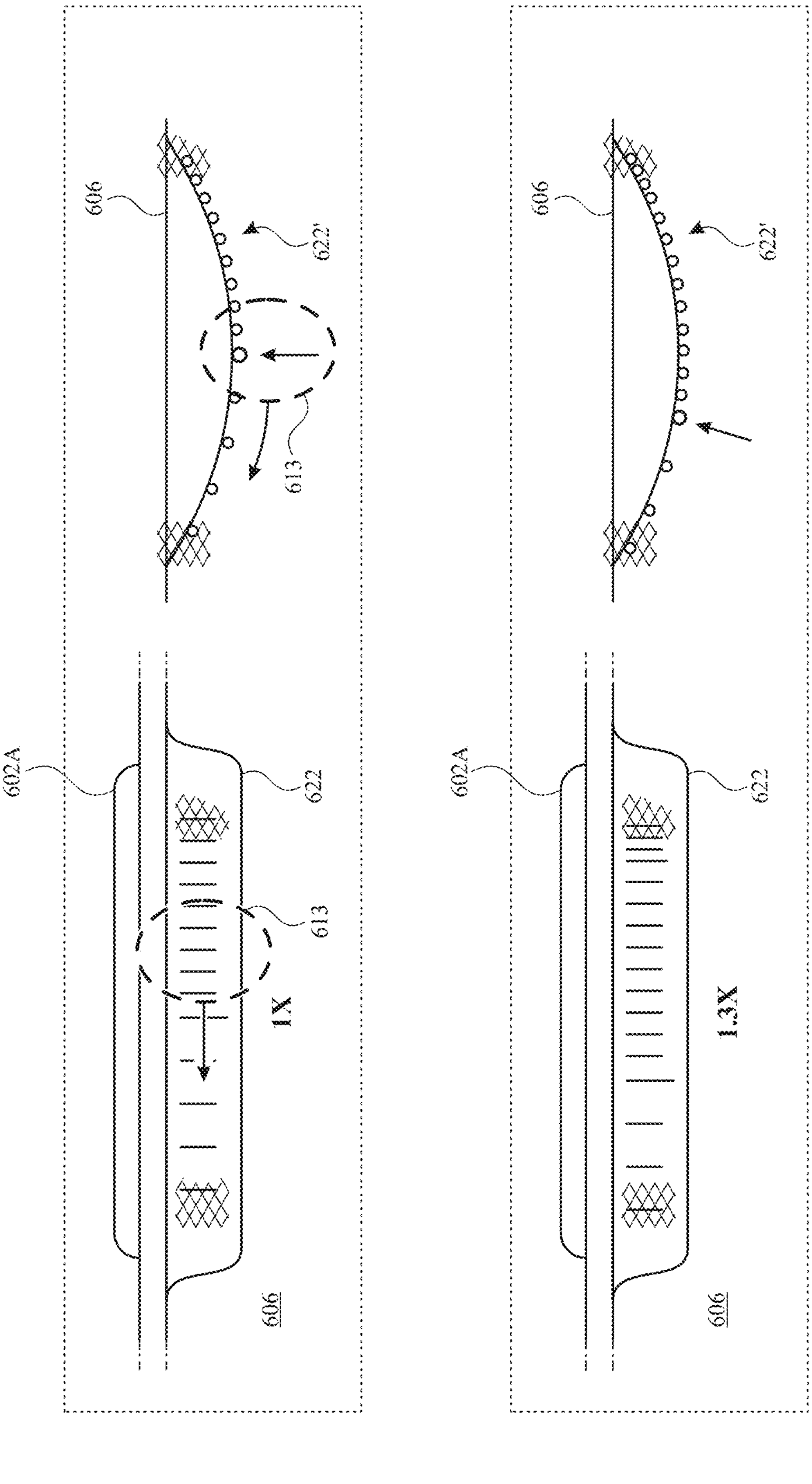
FIG. 6J1

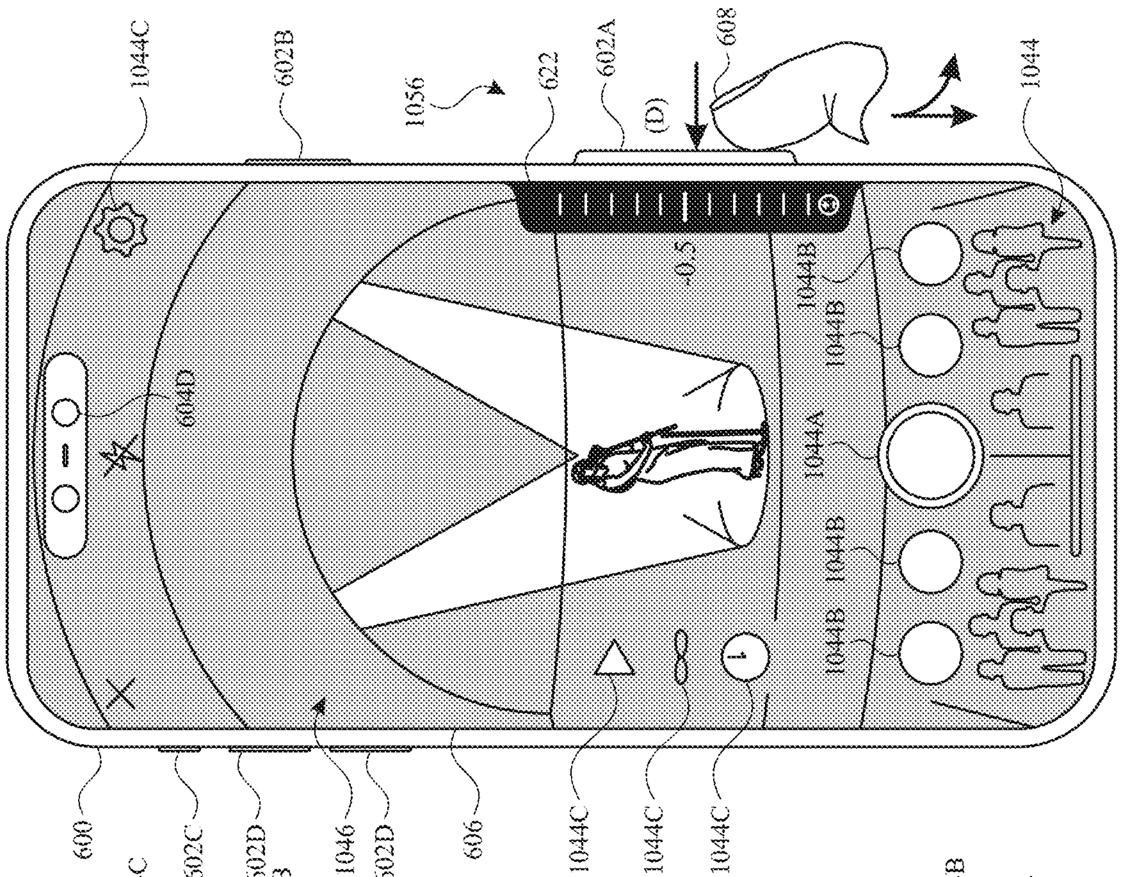
FIG. 10U
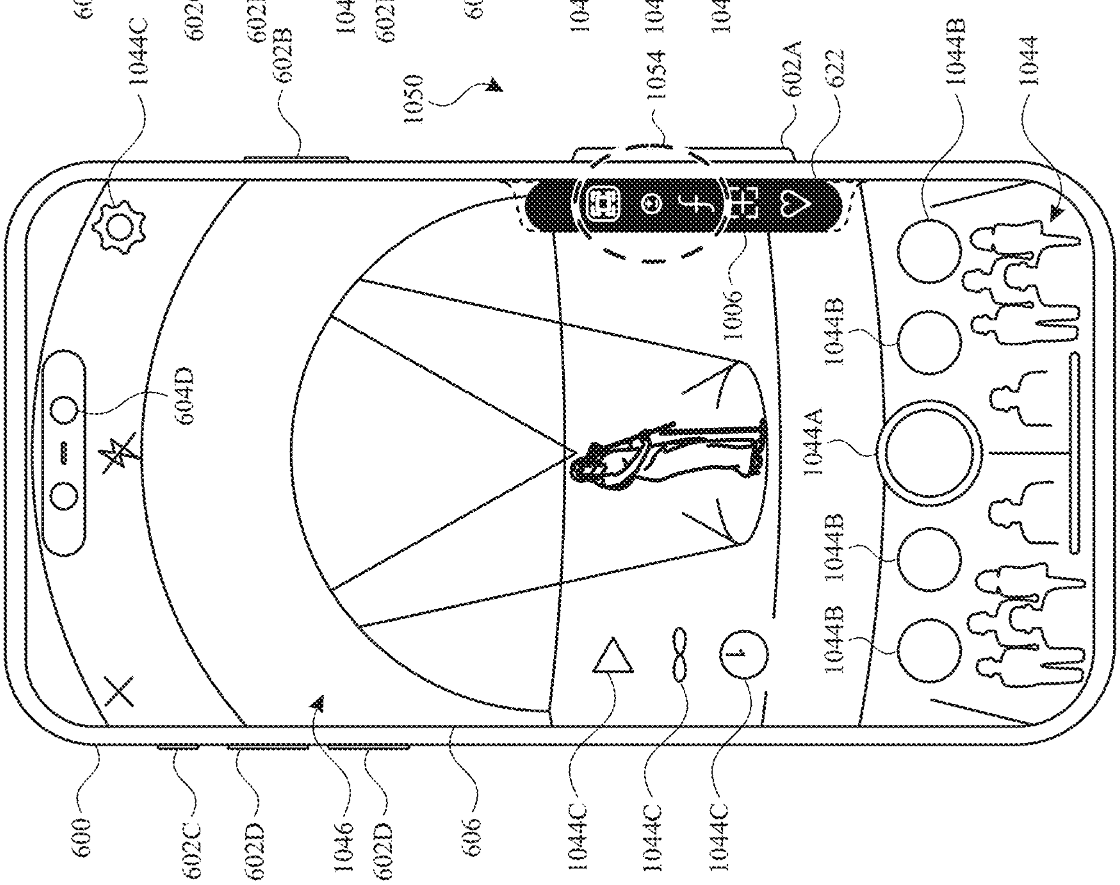
FIG. 10T1

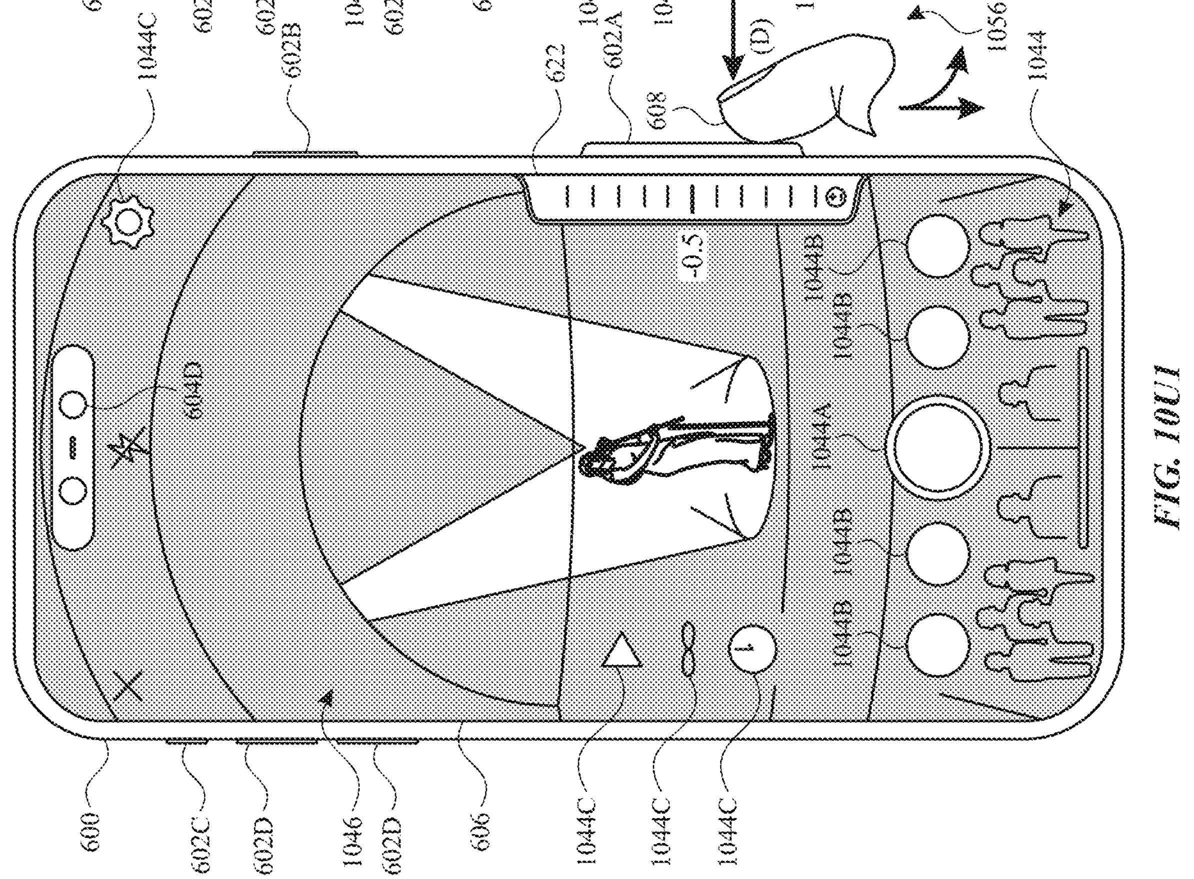
FIG. 10U1
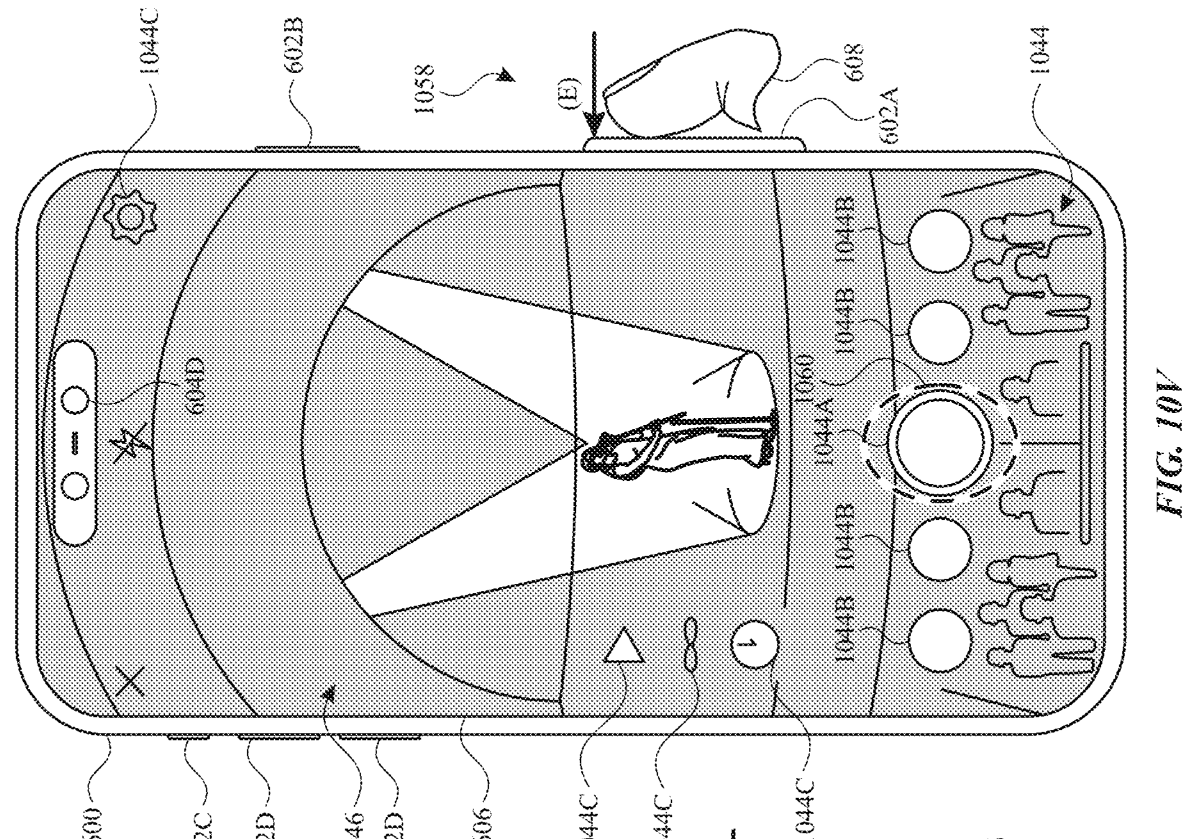
FIG. 10V

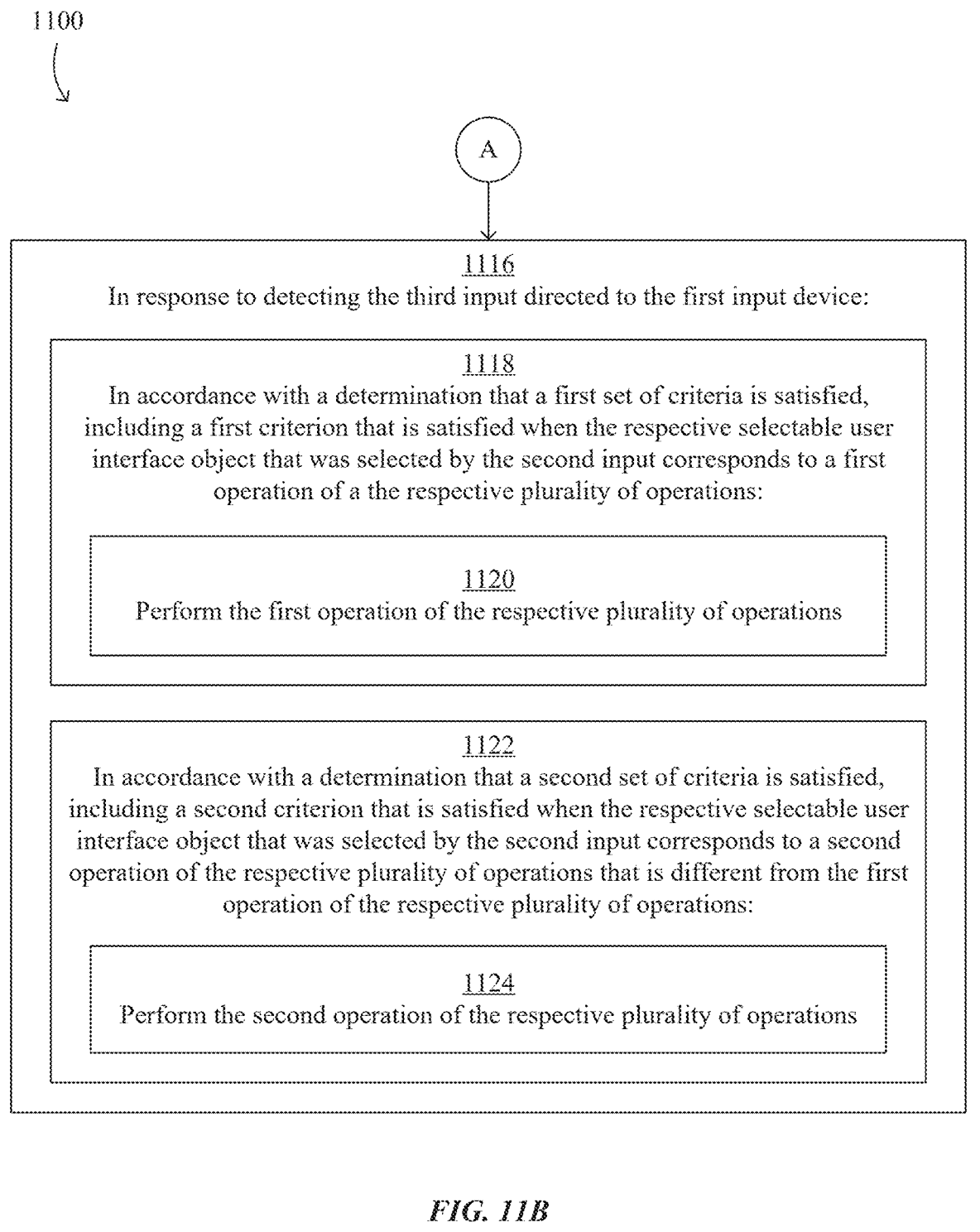

1100

(A)

1116
In response to detecting the third input directed to the first input device:

1118
In accordance with a determination that a first set of criteria is satisfied, including a first criterion that is satisfied when the respective selectable user interface object that was selected by the second input corresponds to a first operation of a the respective plurality of operations:

1120
Perform the first operation of the respective plurality of operations

1122
In accordance with a determination that a second set of criteria is satisfied, including a second criterion that is satisfied when the respective selectable user interface object that was selected by the second input corresponds to a second operation of the respective plurality of operations that is different from the first operation of the respective plurality of operations:

1124
Perform the second operation of the respective plurality of operations

*FIG. 11B*

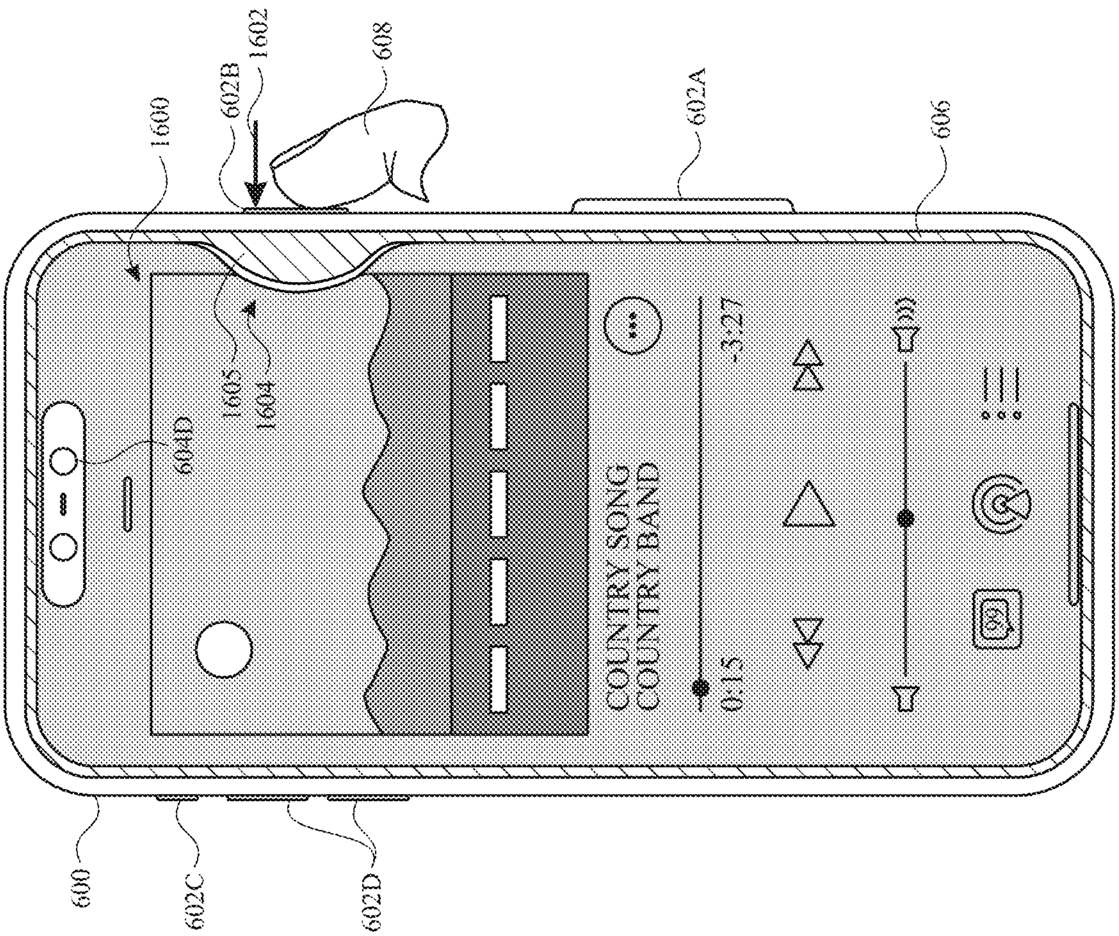
*FIG. 16D1*

USER INTERFACES RESPONSIVE TO AN INPUT DIRECTED TO AN INPUT DEVICE

CROSS-REFERENCE TO RELATED APPLICATIONS

This application claims priority to U.S. Provisional Application No. 63/622,536, entitled "Camera," filed on Jan. 18, 2024, U.S. Provisional Application No. 63/623,205, entitled "USER INTERFACES INTEGRATING HARDWARE BUTTONS," filed on Jan. 19, 2024, U.S. Provisional Application No. 63/566,165, entitled "USER INTERFACES INTEGRATING HARDWARE BUTTONS," filed on Mar. 15, 2024, U.S. Provisional Application No. 63/657,709, entitled "USER INTERFACES INTEGRATING HARDWARE BUTTONS," filed on Jun. 7, 2024, and U.S. Provisional Application No. 63/692,133, entitled "USER INTERFACES INTEGRATING HARDWARE BUTTONS," filed on Sep. 8, 2024, each of which is hereby incorporated by reference in their entirety.

FIELD

The present disclosure relates generally to computer user interfaces, and more specifically to techniques for providing user interfaces that integrate one or more hardware buttons.

BACKGROUND

Electronic devices, such as smart phones, tablets, and wearable devices, provide user interfaces for controlling an ever-increasing scope, variety, and sophistication of functionality. Example user interfaces can be interacted with (e.g., controlled) using displayed software controls, such as user interface elements that can be interacted with via a touch-sensitive surface of a display, and hardware controls, such as buttons and switches.

BRIEF SUMMARY

Some systems and techniques for providing user interfaces that integrate one or more hardware buttons using electronic devices, however, are generally limited, cumbersome, and inefficient. For example, integrating numerous hardware buttons can increase the size, weight, and cost of electronic devices, but systems with user interfaces that over-rely on displayed software controls (e.g., touch controls) or require frequent switching between displayed software controls and hardware buttons are complex, error-prone, distracting, uncomfortable, and require more time than necessary, wasting user time and device energy. This latter consideration is particularly important in battery-operated devices.

Accordingly, the present technique provides electronic devices with faster, more efficient methods and interfaces for providing interfaces that integrate one or more hardware buttons. Such methods and interfaces optionally complement or replace other methods for providing interfaces that integrate one or more hardware buttons. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system that is in communication with a display generation component and a first input device, and comprises: detecting, via the first input device, a first set of one or more inputs directed to the first input device; and in response to detecting the first set of one or more inputs: in accordance with a determination that the first set of one or more inputs satisfies a first set of criteria, performing a first operation, wherein the first set of criteria includes: a first criterion that is satisfied when the first set of one or more inputs includes a first input intensity that exceeds a first threshold intensity; and a second criterion that is satisfied when the first set of one or more inputs includes more than a threshold amount of movement of a first type; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity.

In accordance with some embodiments, a non-transitory computer-readable storage medium is described. The non-transitory computer-readable storage medium stores one or more programs configured to be executed by one or more processors of a computer system that is in communication with a display generation component and a first input device, the one or more programs including instructions for: detecting, via the first input device, a first set of one or more inputs directed to the first input device; and in response to detecting the first set of one or more inputs: in accordance with a determination that the first set of one or more inputs satisfies a first set of criteria, performing a first operation, wherein the first set of criteria includes: a first criterion that is satisfied when the first set of one or more inputs includes a first input intensity that exceeds a first threshold intensity; and a second criterion that is satisfied when the first set of one or more inputs includes more than a threshold amount of movement of a first type; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity.

In accordance with some embodiments, a transitory computer-readable storage medium is described. The transitory computer-readable storage medium stores one or more programs configured to be executed by one or more processors of a computer system that is in communication with a display generation component and a first input device, the one or more programs including instructions for: detecting, via the first input device, a first set of one or more inputs directed to the first input device; and in response to detecting the first set of one or more inputs: in accordance with a determination that the first set of one or more inputs satisfies a first set of criteria, performing a first operation, wherein the first set of criteria includes: a first criterion that is satisfied when the first set of one or more inputs includes a first input intensity that exceeds a first threshold intensity; and a second criterion that is satisfied when the first set of one or more inputs includes more than a threshold amount of movement of a first type; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity.

In accordance with some embodiments, a computer system is described. The computer system is configured to communicate with a display generation component and a first input device, the computer system comprising one or more processors and memory storing one or more programs configured to be executed by the one or more processors, the one or more programs including instructions for: detecting, via the first input device, a first set of one or more inputs directed to the first input device; and in response to detecting the first set of one or more inputs: in accordance with a determination that the first set of one or more inputs satisfies a first set of criteria, performing a first operation, wherein the first set of criteria includes: a first criterion that is satisfied when the first set of one or more inputs includes a first input intensity that exceeds a first threshold intensity; and a second criterion that is satisfied when the first set of one or more inputs includes more than a threshold amount of movement of a first type; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity.

In accordance with some embodiments, a computer system is described. The computer system is configured to communicate with a display generation component and a first input device, the computer system comprising: means for detecting, via the first input device, a first set of one or more inputs directed to the first input device; and means for, in response to detecting the first set of one or more inputs: in accordance with a determination that the first set of one or more inputs satisfies a first set of criteria, performing a first operation, wherein the first set of criteria includes: a first criterion that is satisfied when the first set of one or more inputs includes a first input intensity that exceeds a first threshold intensity; and a second criterion that is satisfied when the first set of one or more inputs includes more than a threshold amount of movement of a first type; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity.

In accordance with some embodiments, a computer program product is described. The computer program product comprises one or more programs configured to be executed by one or more processors of a computer system that is in communication with a display generation component and a first input device, the one or more programs including instructions for: detecting, via the first input device, a first set of one or more inputs directed to the first input device; and in response to detecting the first set of one or more inputs: in accordance with a determination that the first set of one or more inputs satisfies a first set of criteria, performing a first operation, wherein the first set of criteria includes: a first criterion that is satisfied when the first set of one or more inputs includes a first input intensity that exceeds a first threshold intensity; and a second criterion that is satisfied when the first set of one or more inputs includes more than a threshold amount of movement of a first type; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity.

In accordance with some embodiments, a method is described. The method is performed at a computer system that is in communication with a display generation component, one or more cameras, and a first input device, and comprises: detecting, via the first input device, a first set of one or more inputs directed to the first input device; in response to detecting the first set of one or more inputs: in accordance with a determination that the first set of one or more inputs satisfies a first set of criteria, capturing, via the one or more cameras, first photo media, wherein the first set of criteria includes a first criterion that is satisfied when the first set of one or more inputs includes a press input of a first type; and in accordance with a determination that the first set of one or more inputs satisfies a second set of criteria, capturing, via the one or more cameras, first video media, wherein the second set of criteria includes a second criterion that is satisfied when the first set of one or more inputs includes a press input of a second type different from the first type; while capturing the first video media, detecting an end of the first set of one or more inputs; and in response to detecting the end of the first set of one or more inputs: in accordance with a determination that the first set of one or more inputs included a movement of a first type, continuing to capture the first video media after detecting the end of the first set of one or more inputs.

In accordance with some embodiments, a non-transitory computer-readable storage medium is described. The non-transitory computer-readable storage medium stores one or more programs configured to be executed by one or more processors of a computer system that is in communication with a display generation component, one or more cameras, and a first input device, the one or more programs including instructions for: detecting, via the first input device, a first set of one or more inputs directed to the first input device; in response to detecting the first set of one or more inputs: in accordance with a determination that the first set of one or more inputs satisfies a first set of criteria, capturing, via the one or more cameras, first photo media, wherein the first set of criteria includes a first criterion that is satisfied when the first set of one or more inputs includes a press input of a first type; and in accordance with a determination that the first set of one or more inputs satisfies a second set of criteria, capturing, via the one or more cameras, first video media, wherein the second set of criteria includes a second criterion that is satisfied when the first set of one or more inputs includes a press input of a second type different from the first type; while capturing the first video media, detecting an end of the first set of one or more inputs; and in response to detecting the end of the first set of one or more inputs: in accordance with a determination that the first set of one or more inputs included a movement of a first type, continuing to capture the first video media after detecting the end of the first set of one or more inputs.

In accordance with some embodiments, a transitory computer-readable storage medium is described. The transitory computer-readable storage medium stores one or more programs configured to be executed by one or more processors of a computer system that is in communication with a display generation component, one or more cameras, and a first input device, the one or more programs including instructions for: detecting, via the first input device, a first set of one or more inputs directed to the first input device; in response to detecting the first set of one or more inputs: in accordance with a determination that the first set of one or more inputs satisfies a first set of criteria, capturing, via the one or more cameras, first photo media, wherein the first set of criteria includes a first criterion that is satisfied when the first set of one or more inputs includes a press input of a first type; and in accordance with a determination that the first set of one or more inputs satisfies a second set of criteria, capturing, via the one or more cameras, first video media, wherein the second set of criteria includes a second criterion that is satisfied when the first set of one or more inputs includes a press input of a second type different from the first type; while capturing the first video media, detecting an end of the first set of one or more inputs; and in response to detecting the end of the first set of one or more inputs: in accordance with a determination that the first set of one or more inputs included a movement of a first type, continuing to capture the first video media after detecting the end of the first set of one or more inputs.

In accordance with some embodiments, a computer system is described. The computer system is configured to communicate with a display generation component, one or more cameras, and a first input device, the computer system comprising one or more processors and memory storing one or more programs configured to be executed by the one or more processors, the one or more programs including instructions for: detecting, via the first input device, a first set of one or more inputs directed to the first input device; in response to detecting the first set of one or more inputs: in accordance with a determination that the first set of one or more inputs satisfies a first set of criteria, capturing, via the one or more cameras, first photo media, wherein the first set of criteria includes a first criterion that is satisfied when the first set of one or more inputs includes a press input of a first type; and in accordance with a determination that the first set of one or more inputs satisfies a second set of criteria, capturing, via the one or more cameras, first video media, wherein the second set of criteria includes a second criterion that is satisfied when the first set of one or more inputs includes a press input of a second type different from the first type; while capturing the first video media, detecting an end of the first set of one or more inputs; and in response to detecting the end of the first set of one or more inputs: in accordance with a determination that the first set of one or more inputs included a movement of a first type, continuing to capture the first video media after detecting the end of the first set of one or more inputs.

In accordance with some embodiments, a computer system is described. The computer system is configured to communicate with a display generation component, one or more cameras, and a first input device, the computer system comprising: means for detecting, via the first input device, a first set of one or more inputs directed to the first input device; means for, in response to detecting the first set of one or more inputs: in accordance with a determination that the first set of one or more inputs satisfies a first set of criteria, capturing, via the one or more cameras, first photo media, wherein the first set of criteria includes a first criterion that is satisfied when the first set of one or more inputs includes a press input of a first type; and in accordance with a determination that the first set of one or more inputs satisfies a second set of criteria, capturing, via the one or more cameras, first video media, wherein the second set of criteria includes a second criterion that is satisfied when the first set of one or more inputs includes a press input of a second type different from the first type; means for, while capturing the first video media, detecting an end of the first set of one or more inputs; and means for, in response to detecting the end of the first set of one or more inputs: in accordance with a determination that the first set of one or more inputs included a movement of a first type, continuing to capture the first video media after detecting the end of the first set of one or more inputs.

In accordance with some embodiments, a computer program product is described. The computer program product comprises one or more programs configured to be executed by one or more processors of a computer system that is in communication with a display generation component, one or more cameras, and a first input device, the one or more programs including instructions for: detecting, via the first input device, a first set of one or more inputs directed to the first input device; in response to detecting the first set of one or more inputs: in accordance with a determination that the first set of one or more inputs satisfies a first set of criteria, capturing, via the one or more cameras, first photo media, wherein the first set of criteria includes a first criterion that is satisfied when the first set of one or more inputs includes a press input of a first type; and in accordance with a determination that the first set of one or more inputs satisfies a second set of criteria, capturing, via the one or more cameras, first video media, wherein the second set of criteria includes a second criterion that is satisfied when the first set of one or more inputs includes a press input of a second type different from the first type; while capturing the first video media, detecting an end of the first set of one or more inputs; and in response to detecting the end of the first set of one or more inputs: in accordance with a determination that the first set of one or more inputs included a movement of a first type, continuing to capture the first video media after detecting the end of the first set of one or more inputs.

In accordance with some embodiments, a method is described. The method is performed at a computer system that is in communication with a display generation component and a first input device, and comprises: detecting a first input including a movement that starts at a first location corresponding to the first input device and ends at a second location that is different from the first location; in response to detecting the first input, displaying, via the display generation component, an option user interface, including a plurality of selectable user interface objects corresponding to a respective plurality of operations that can be associated with the first input device; while displaying the options user interface, detecting a second input selecting a respective selectable user interface object of the plurality of selectable user interface objects; after detecting the second input, detecting, via the first input device, a third input directed to the first input device; and in response to detecting the third input directed to the first input device: in accordance with a determination that a first set of one or more criteria is satisfied, performing a first operation of the respective plurality of operations, wherein the first set of one or more criteria includes a first criterion that is satisfied when the respective selectable user interface object that was selected by the second input corresponds to the first operation; and in accordance with a determination that a second set of one or more criteria is satisfied, performing a second operation of the respective plurality of operations that is different from the first operation of the respective plurality of operations, wherein the second set of one or more criteria includes a second criterion that is satisfied when the respective selectable user interface object that was selected by the second input corresponds to the second operation.

In accordance with some embodiments, a non-transitory computer-readable storage medium is described. The non-transitory computer-readable storage medium stores one or more programs configured to be executed by one or more processors of a computer system that is in communication with a display generation component and a first input device, the one or more programs including instructions for: detecting a first input including a movement that starts at a first location corresponding to the first input device and ends at a second location that is different from the first location; in response to detecting the first input, displaying, via the display generation component, an option user interface, including a plurality of selectable user interface objects corresponding to a respective plurality of operations that can be associated with the first input device; while displaying the options user interface, detecting a second input selecting a respective selectable user interface object of the plurality of selectable user interface objects; after detecting the second input, detecting, via the first input device, a third input directed to the first input device; and in response to detecting the third input directed to the first input device: in accordance with a determination that a first set of one or more criteria is satisfied, performing a first operation of the respective plurality of operations, wherein the first set of one or more criteria includes a first criterion that is satisfied when the respective selectable user interface object that was selected by the second input corresponds to the first operation; and in accordance with a determination that a second set of one or more criteria is satisfied, performing a second operation of the respective plurality of operations that is different from the first operation of the respective plurality of operations, wherein the second set of one or more criteria includes a second criterion that is satisfied when the respective selectable user interface object that was selected by the second input corresponds to the second operation.

In accordance with some embodiments, a transitory computer-readable storage medium is described. The transitory computer-readable storage medium stores one or more programs configured to be executed by one or more processors of a computer system that is in communication with a display generation component and a first input device, the one or more programs including instructions for: detecting a first input including a movement that starts at a first location corresponding to the first input device and ends at a second location that is different from the first location; in response to detecting the first input, displaying, via the display generation component, an option user interface, including a plurality of selectable user interface objects corresponding to a respective plurality of operations that can be associated with the first input device; while displaying the options user interface, detecting a second input selecting a respective selectable user interface object of the plurality of selectable user interface objects; after detecting the second input, detecting, via the first input device, a third input directed to the first input device; and in response to detecting the third input directed to the first input device: in accordance with a determination that a first set of one or more criteria is satisfied, performing a first operation of the respective plurality of operations, wherein the first set of one or more criteria includes a first criterion that is satisfied when the respective selectable user interface object that was selected by the second input corresponds to the first operation; and in accordance with a determination that a second set of one or more criteria is satisfied, performing a second operation of the respective plurality of operations that is different from the first operation of the respective plurality of operations, wherein the second set of one or more criteria includes a second criterion that is satisfied when the respective selectable user interface object that was selected by the second input corresponds to the second operation.

In accordance with some embodiments, a computer system is described. The computer system is configured to communicate with a display generation component and a first input device, the computer system comprising one or more processors and memory storing one or more programs configured to be executed by the one or more processors, the one or more programs including instructions for: detecting a first input including a movement that starts at a first location corresponding to the first input device and ends at a second location that is different from the first location; in response to detecting the first input, displaying, via the display generation component, an option user interface, including a plurality of selectable user interface objects corresponding to a respective plurality of operations that can be associated with the first input device; while displaying the options user interface, detecting a second input selecting a respective selectable user interface object of the plurality of selectable user interface objects; after detecting the second input, detecting, via the first input device, a third input directed to the first input device; and in response to detecting the third input directed to the first input device: in accordance with a determination that a first set of one or more criteria is satisfied, performing a first operation of the respective plurality of operations, wherein the first set of one or more criteria includes a first criterion that is satisfied when the respective selectable user interface object that was selected by the second input corresponds to the first operation; and in accordance with a determination that a second set of one or more criteria is satisfied, performing a second operation of the respective plurality of operations that is different from the first operation of the respective plurality of operations, wherein the second set of one or more criteria includes a second criterion that is satisfied when the respective selectable user interface object that was selected by the second input corresponds to the second operation.

In accordance with some embodiments, a computer system is described. The computer system is configured to communicate with a display generation component and a first input device, the computer system comprising: means for detecting a first input including a movement that starts at a first location corresponding to the first input device and ends at a second location that is different from the first location; means for, in response to detecting the first input, displaying, via the display generation component, an option user interface, including a plurality of selectable user interface objects corresponding to a respective plurality of operations that can be associated with the first input device; means for, while displaying the options user interface, detecting a second input selecting a respective selectable user interface object of the plurality of selectable user interface objects; means for, after detecting the second input, detecting, via the first input device, a third input directed to the first input device; and means for, in response to detecting the third input directed to the first input device: in accordance with a determination that a first set of one or more criteria is satisfied, performing a first operation of the respective plurality of operations, wherein the first set of one or more criteria includes a first criterion that is satisfied when the respective selectable user interface object that was selected by the second input corresponds to the first operation; and in accordance with a determination that a second set of one or more criteria is satisfied, performing a second operation of the respective plurality of operations that is different from the first operation of the respective plurality of operations, wherein the second set of one or more criteria includes a second criterion that is satisfied when the respective selectable user interface object that was selected by the second input corresponds to the second operation.

In accordance with some embodiments, a computer program product is described. The computer program product comprises one or more programs configured to be executed by one or more processors of a computer system that is in communication with a display generation component and a first input device, the one or more programs including instructions for: detecting a first input including a movement that starts at a first location corresponding to the first input device and ends at a second location that is different from the first location; in response to detecting the first input, displaying, via the display generation component, an option user interface, including a plurality of selectable user interface objects corresponding to a respective plurality of operations that can be associated with the first input device; while displaying the options user interface, detecting a second input selecting a respective selectable user interface object of the plurality of selectable user interface objects; after detecting the second input, detecting, via the first input device, a third input directed to the first input device; and in response to detecting the third input directed to the first input device: in accordance with a determination that a first set of one or more criteria is satisfied, performing a first operation of the respective plurality of operations, wherein the first set of one or more criteria includes a first criterion that is satisfied when the respective selectable user interface object that was selected by the second input corresponds to the first operation; and in accordance with a determination that a second set of one or more criteria is satisfied, performing a second operation of the respective plurality of operations that is different from the first operation of the respective plurality of operations, wherein the second set of one or more criteria includes a second criterion that is satisfied when the respective selectable user interface object that was selected by the second input corresponds to the second operation.

In accordance with some embodiments, a method is described. The method is performed at a computer system that is in communication with a display generation component, and comprises: receiving a request to play a video media item; and in response to receiving the request to play the video media item, playing the video media item, including, while playing the video media item, decreasing a playback speed of a respective portion of the video media item, wherein the respective portion of the video media item is automatically selected based on content of the video media item, including: in accordance with a determination that a first portion of the video media item satisfies a set of one or more video characteristic criteria, slowing down the first portion of the video media item relative to at least one other portion of the video media item while playing the video media item; and in accordance with a determination that a second portion of the video media item, different from the first portion of the video media item, satisfies the set of one or more video characteristic criteria, slowing down the second portion of the video media item relative to at least one other portion of the video media item while playing the video media item.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: receiving a request to play a video media item; and in response to receiving the request to play the video media item, playing the video media item, including, while playing the video media item, decreasing a playback speed of a respective portion of the video media item, wherein the respective portion of the video media item is automatically selected based on content of the video media item, including: in accordance with a determination that a first portion of the video media item satisfies a set of one or more video characteristic criteria, slowing down the first portion of the video media item relative to at least one other portion of the video media item while playing the video media item; and in accordance with a determination that a second portion of the video media item, different from the first portion of the video media item, satisfies the set of one or more video characteristic criteria, slowing down the second portion of the video media item relative to at least one other portion of the video media item while playing the video media item.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: receiving a request to play a video media item; and in response to receiving the request to play the video media item, playing the video media item, including, while playing the video media item, decreasing a playback speed of a respective portion of the video media item, wherein the respective portion of the video media item is automatically selected based on content of the video media item, including: in accordance with a determination that a first portion of the video media item satisfies a set of one or more video characteristic criteria, slowing down the first portion of the video media item relative to at least one other portion of the video media item while playing the video media item; and in accordance with a determination that a second portion of the video media item, different from the first portion of the video media item, satisfies the set of one or more video characteristic criteria, slowing down the second portion of the video media item relative to at least one other portion of the video media item while playing the video media item.

In accordance with some embodiments, a computer system is described. The computer system is configured to communicate with a display generation component, the computer system comprising one or more processors and memory storing one or more programs configured to be executed by the one or more processors, the one or more programs including instructions for: receiving a request to play a video media item; and in response to receiving the request to play the video media item, playing the video media item, including, while playing the video media item, decreasing a playback speed of a respective portion of the video media item, wherein the respective portion of the video media item is automatically selected based on content of the video media item, including: in accordance with a determination that a first portion of the video media item satisfies a set of one or more video characteristic criteria, slowing down the first portion of the video media item relative to at least one other portion of the video media item while playing the video media item; and in accordance with a determination that a second portion of the video media item, different from the first portion of the video media item, satisfies the set of one or more video characteristic criteria, slowing down the second portion of the video media item relative to at least one other portion of the video media item while playing the video media item.

In accordance with some embodiments, a computer system is described. The computer system is configured to communicate with a display generation component, the computer system comprising: means for receiving a request to play a video media item; and means for, in response to receiving the request to play the video media item, playing the video media item, including, while playing the video media item, decreasing a playback speed of a respective portion of the video media item, wherein the respective portion of the video media item is automatically selected based on content of the video media item, including: in accordance with a determination that a first portion of the video media item satisfies a set of one or more video characteristic criteria, slowing down the first portion of the video media item relative to at least one other portion of the video media item while playing the video media item; and in accordance with a determination that a second portion of the video media item, different from the first portion of the video media item, satisfies the set of one or more video characteristic criteria, slowing down the second portion of the video media item relative to at least one other portion of the video media item while playing the video media item.

In accordance with some embodiments, a computer program product is described. The computer program product comprises one or more programs configured to be executed by one or more processors of a computer system that is in communication with a display generation component, the one or more programs including instructions for: receiving a request to play a video media item; and in response to receiving the request to play the video media item, playing the video media item, including, while playing the video media item, decreasing a playback speed of a respective portion of the video media item, wherein the respective portion of the video media item is automatically selected based on content of the video media item, including: in accordance with a determination that a first portion of the video media item satisfies a set of one or more video characteristic criteria, slowing down the first portion of the video media item relative to at least one other portion of the video media item while playing the video media item; and in accordance with a determination that a second portion of the video media item, different from the first portion of the video media item, satisfies the set of one or more video characteristic criteria, slowing down the second portion of the video media item relative to at least one other portion of the video media item while playing the video media item.

In accordance with some embodiments, a method is described. The method is performed at a computer system that is in communication with a display generation component, and comprises: detecting an input directed to a control element of a user interface, wherein the input includes a detected movement component; in response to detecting the input directed to the control element, causing a first adjustment to a value of a parameter associated with the control element, wherein the first adjustment is based on the detected movement component; detecting an end of the input; and after detecting the end of the input, causing a second adjustment to the value of the parameter associated with the control element, wherein the second adjustment is based on the detected movement component.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: detecting an input directed to a control element of a user interface, wherein the input includes a detected movement component; in response to detecting the input directed to the control element, causing a first adjustment to a value of a parameter associated with the control element, wherein the first adjustment is based on the detected movement component; detecting an end of the input; and after detecting the end of the input, causing a second adjustment to the value of the parameter associated with the control element, wherein the second adjustment is based on the detected movement component.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: detecting an input directed to a control element of a user interface, wherein the input includes a detected movement component; in response to detecting the input directed to the control element, causing a first adjustment to a value of a parameter associated with the control element, wherein the first adjustment is based on the detected movement component; detecting an end of the input; and after detecting the end of the input, causing a second adjustment to the value of the parameter associated with the control element, wherein the second adjustment is based on the detected movement component.

In accordance with some embodiments, a computer system is described. The computer system is configured to communicate with a display generation component, the computer system comprising one or more processors and memory storing one or more programs configured to be executed by the one or more processors, the one or more programs including instructions for: detecting an input directed to a control element of a user interface, wherein the input includes a detected movement component; in response to detecting the input directed to the control element, causing a first adjustment to a value of a parameter associated with the control element, wherein the first adjustment is based on the detected movement component; detecting an end of the input; and after detecting the end of the input, causing a second adjustment to the value of the parameter associated with the control element, wherein the second adjustment is based on the detected movement component.

In accordance with some embodiments, a computer system is described. The computer system is configured to communicate with a display generation component, the computer system comprising: means for detecting an input directed to a control element of a user interface, wherein the input includes a detected movement component; means for, in response to detecting the input directed to the control element, causing a first adjustment to a value of a parameter associated with the control element, wherein the first adjustment is based on the detected movement component; means for detecting an end of the input; and means for, after detecting the end of the input, causing a second adjustment to the value of the parameter associated with the control element, wherein the second adjustment is based on the detected movement component.

In accordance with some embodiments, a computer program product is described. The computer program product comprises one or more programs configured to be executed by one or more processors of a computer system that is in communication with a display generation component, the one or more programs including instructions for: detecting an input directed to a control element of a user interface, wherein the input includes a detected movement component; in response to detecting the input directed to the control element, causing a first adjustment to a value of a parameter associated with the control element, wherein the first adjustment is based on the detected movement component; detecting an end of the input; and after detecting the end of the input, causing a second adjustment to the value of the parameter associated with the control element, wherein the second adjustment is based on the detected movement component.

In accordance with some embodiments, a method is described. The method is performed at a computer system that is in communication with one or more display generation components and a plurality of input devices that includes at least a first hardware input device and a second hardware input device different from the first hardware input devices, and comprises: displaying, via the one or more display generation components, a user interface; while displaying the user interface, detecting, via one or more of the plurality of input devices, a set of one or more inputs; and in response to detecting the set of one or more inputs, displaying, via the one or more display generation components, the user interface with one or more deformations, wherein displaying the user interface with the one or more deformations includes: in accordance with a determination that the set of one or more inputs includes a first press input directed to the first hardware input device, displaying the user interface with a first deformation at a first region, wherein the first region corresponds to a location of the first hardware input device; and in accordance with a determination that the set of one or more inputs includes a second press input directed to the second hardware input device, displaying the user interface with a second deformation at a second region, different from the first region, wherein the second region corresponds to a location of the second hardware input device.

In accordance with some embodiments, a non-transitory computer-readable storage medium is described. The non-transitory computer-readable storage medium stores one or more programs configured to be executed by one or more processors of a computer system that is in communication with one or more display generation components and a plurality of input devices that includes at least a first hardware input device and a second hardware input device different from the first hardware input devices, the one or more programs including instructions for: displaying, via the one or more display generation components, a user interface; while displaying the user interface, detecting, via one or more of the plurality of input devices, a set of one or more inputs; and in response to detecting the set of one or more inputs, displaying, via the one or more display generation components, the user interface with one or more deformations, wherein displaying the user interface with the one or more deformations includes: in accordance with a determination that the set of one or more inputs includes a first press input directed to the first hardware input device, displaying the user interface with a first deformation at a first region, wherein the first region corresponds to a location of the first hardware input device; and in accordance with a determination that the set of one or more inputs includes a second press input directed to the second hardware input device, displaying the user interface with a second deformation at a second region, different from the first region, wherein the second region corresponds to a location of the second hardware input device.

In accordance with some embodiments, a transitory computer-readable storage medium is described. The transitory computer-readable storage medium stores one or more programs configured to be executed by one or more processors of a computer system that is in communication with one or more display generation components and a plurality of input devices that includes at least a first hardware input device and a second hardware input device different from the first hardware input devices, the one or more programs including instructions for: displaying, via the one or more display generation components, a user interface; while displaying the user interface, detecting, via one or more of the plurality of input devices, a set of one or more inputs; and in response to detecting the set of one or more inputs, displaying, via the one or more display generation components, the user interface with one or more deformations, wherein displaying the user interface with the one or more deformations includes: in accordance with a determination that the set of one or more inputs includes a first press input directed to the first hardware input device, displaying the user interface with a first deformation at a first region, wherein the first region corresponds to a location of the first hardware input device; and in accordance with a determination that the set of one or more inputs includes a second press input directed to the second hardware input device, displaying the user interface with a second deformation at a second region, different from the first region, wherein the second region corresponds to a location of the second hardware input device.

In accordance with some embodiments, a computer system is described. The computer system is configured to communicate with one or more display generation components and a plurality of input devices that includes at least a first hardware input device and a second hardware input device different from the first hardware input devices, the computer system comprising one or more processors and memory storing one or more programs configured to be executed by the one or more processors, the one or more programs including instructions for: displaying, via the one or more display generation components, a user interface; while displaying the user interface, detecting, via one or more of the plurality of input devices, a set of one or more inputs; and in response to detecting the set of one or more inputs, displaying, via the one or more display generation components, the user interface with one or more deformations, wherein displaying the user interface with the one or more deformations includes: in accordance with a determination that the set of one or more inputs includes a first press input directed to the first hardware input device, displaying the user interface with a first deformation at a first region, wherein the first region corresponds to a location of the first hardware input device; and in accordance with a determination that the set of one or more inputs includes a second press input directed to the second hardware input device, displaying the user interface with a second deformation at a second region, different from the first region, wherein the second region corresponds to a location of the second hardware input device.

In accordance with some embodiments, a computer system is described. The computer system is configured to communicate with one or more display generation components and a plurality of input devices that includes at least a first hardware input device and a second hardware input device different from the first hardware input devices, the computer system comprising: means for displaying, via the one or more display generation components, a user interface; means for, while displaying the user interface, detecting, via one or more of the plurality of input devices, a set of one or more inputs; and means for, in response to detecting the set of one or more inputs, displaying, via the one or more display generation components, the user interface with one or more deformations, wherein displaying the user interface with the one or more deformations includes: in accordance with a determination that the set of one or more inputs includes a first press input directed to the first hardware input device, displaying the user interface with a first deformation at a first region, wherein the first region corresponds to a location of the first hardware input device; and in accordance with a determination that the set of one or more inputs includes a second press input directed to the second hardware input device, displaying the user interface with a second deformation at a second region, different from the first region, wherein the second region corresponds to a location of the second hardware input device.

In accordance with some embodiments, a computer program product is described. The computer program product comprises one or more programs configured to be executed by one or more processors of a computer system that is in communication with one or more display generation components and a plurality of input devices that includes at least a first hardware input device and a second hardware input device different from the first hardware input devices, the one or more programs including instructions for: displaying, via the one or more display generation components, a user interface; while displaying the user interface, detecting, via one or more of the plurality of input devices, a set of one or more inputs; and in response to detecting the set of one or more inputs, displaying, via the one or more display generation components, the user interface with one or more deformations, wherein displaying the user interface with the one or more deformations includes: in accordance with a determination that the set of one or more inputs includes a first press input directed to the first hardware input device, displaying the user interface with a first deformation at a first region, wherein the first region corresponds to a location of the first hardware input device; and in accordance with a determination that the set of one or more inputs includes a second press input directed to the second hardware input device, displaying the user interface with a second deformation at a second region, different from the first region, wherein the second region corresponds to a location of the second hardware input device.

In accordance with some embodiments, a method is described. The method is performed at a computer system that is in communication with one or more display generation components, a plurality of cameras including a first camera and a second camera that is different from the first camera, and one or more input devices including a first hardware input device, and comprises: while displaying, via the one or more display generation components, a camera user interface for capturing media primarily using the first camera, detecting, via the first hardware input device, a first movement input; and in response to detecting the first movement input, displaying, via the one or more display generation components, a camera user interface for capturing media primarily using the second camera without displaying the camera user interface for capturing media primarily using the first camera.

In accordance with some embodiments, a non-transitory computer-readable storage medium is described. The non-transitory computer-readable storage medium stores one or more programs configured to be executed by one or more processors of a computer system that is in communication with one or more display generation components, a plurality of cameras including a first camera and a second camera that is different from the first camera, and one or more input devices including a first hardware input device, the one or more programs including instructions for: while displaying, via the one or more display generation components, a camera user interface for capturing media primarily using the first camera, detecting, via the first hardware input device, a first movement input; and in response to detecting the first movement input, displaying, via the one or more display generation components, a camera user interface for capturing media primarily using the second camera without displaying the camera user interface for capturing media primarily using the first camera In accordance with some embodiments, a transitory computer-readable storage medium is described. The transitory computer-readable storage medium stores one or more programs configured to be executed by one or more processors of a computer system that is in communication with one or more display generation components, a plurality of cameras including a first camera and a second camera that is different from the first camera, and one or more input devices including a first hardware input device, the one or more programs including instructions for: while displaying, via the one or more display generation components, a camera user interface for capturing media primarily using the first camera, detecting, via the first hardware input device, a first movement input; and in response to detecting the first movement input, displaying, via the one or more display generation components, a camera user interface for capturing media primarily using the second camera without displaying the camera user interface for capturing media primarily using the first camera In accordance with some embodiments, a computer system is described. The computer system is configured to communicate with one or more display generation components, a plurality of cameras including a first camera and a second camera that is different from the first camera, and one or more input devices including a first hardware input device, the computer system comprising one or more processors and memory storing one or more programs configured to be executed by the one or more processors, the one or more programs including instructions for: while displaying, via the one or more display generation components, a camera user interface for capturing media primarily using the first camera, detecting, via the first hardware input device, a first movement input; and in response to detecting the first movement input, displaying, via the one or more display generation components, a camera user interface for capturing media primarily using the second camera without displaying the camera user interface for capturing media primarily using the first camera In accordance with some embodiments, a computer system is described. The computer system is configured to communicate with one or more display generation components, a plurality of cameras including a first camera and a second camera that is different from the first camera, and one or more input devices including a first hardware input device, the computer system comprising: means for while displaying, via the one or more display generation components, a camera user interface for capturing media primarily using the first camera, detecting, via the first hardware input device, a first movement input; and means for, in response to detecting the first movement input, displaying, via the one or more display generation components, a camera user interface for capturing media primarily using the second camera without displaying the camera user interface for capturing media primarily using the first camera In accordance with some embodiments, a computer program product is described. The computer program product comprises one or more programs configured to be executed by one or more processors of a computer system that is in communication with one or more display generation components, a plurality of cameras including a first camera and a second camera that is different from the first camera, and one or more input devices including a first hardware input device, the one or more programs including instructions for: while displaying, via the one or more display generation components, a camera user interface for capturing media primarily using the first camera, detecting, via the first hardware input device, a first movement input; and in response to detecting the first movement input, displaying, via the one or more display generation components, a camera user interface for capturing media primarily using the second camera without displaying the camera user interface for capturing media primarily using the first camera.

In accordance with some embodiments, a method is described. The method is performed at a computer system that is in communication with one or more display generation components, a one or more cameras, and one or more input devices including a hardware input device, and comprises: detecting, via the hardware input device, a press input; and in response to detecting the press input: in accordance with a determination that the press input satisfies a first set of one or more criteria, performing a first operation, wherein performing the first operation includes: displaying, via the one or more display generation components, a viewfinder user interface including a representation of a field-of-view of the one or more cameras; displaying, via the one or more display generation components, one or more indications associated with the representation of the field-of-view of the one or more cameras, wherein displaying the one or more indications associated with the representation of the field-of-view of the one or more cameras includes: in accordance with a determination that the representation of the field-of-view of the one or more cameras includes a first type of content, displaying, in the viewfinder user interface, a first indication associated with the first type of content; and in accordance with a determination that the representation of the field-of-view of the one or more cameras includes a second type of content that is different from the first type of content, displaying, in the viewfinder user interface, a second indication associated with the second type of content that is different from the first indication.

In accordance with some embodiments, a non-transitory computer-readable storage medium is described. The non-transitory computer-readable storage medium stores one or more programs configured to be executed by one or more processors of a computer system that is in communication with one or more display generation components, a one or more cameras, and one or more input devices including a hardware input device, the one or more programs including instructions for: detecting, via the hardware input device, a press input; and in response to detecting the press input: in accordance with a determination that the press input satisfies a first set of one or more criteria, performing a first operation, wherein performing the first operation includes: displaying, via the one or more display generation components, a viewfinder user interface including a representation of a field-of-view of the one or more cameras; displaying, via the one or more display generation components, one or more indications associated with the representation of the field-of-view of the one or more cameras, wherein displaying the one or more indications associated with the representation of the field-of-view of the one or more cameras includes: in accordance with a determination that the representation of the field-of-view of the one or more cameras includes a first type of content, displaying, in the viewfinder user interface, a first indication associated with the first type of content; and in accordance with a determination that the representation of the field-of-view of the one or more cameras includes a second type of content that is different from the first type of content, displaying, in the viewfinder user interface, a second indication associated with the second type of content that is different from the first indication.

In accordance with some embodiments, a transitory computer-readable storage medium is described. The transitory computer-readable storage medium stores one or more programs configured to be executed by one or more processors of a computer system that is in communication with one or more display generation components, a one or more cameras, and one or more input devices including a hardware input device, the one or more programs including instructions for: detecting, via the hardware input device, a press input; and in response to detecting the press input: in accordance with a determination that the press input satisfies a first set of one or more criteria, performing a first operation, wherein performing the first operation includes: displaying, via the one or more display generation components, a viewfinder user interface including a representation of a field-of-view of the one or more cameras; displaying, via the one or more display generation components, one or more indications associated with the representation of the field-of-view of the one or more cameras, wherein displaying the one or more indications associated with the representation of the field-of-view of the one or more cameras includes: in accordance with a determination that the representation of the field-of-view of the one or more cameras includes a first type of content, displaying, in the viewfinder user interface, a first indication associated with the first type of content; and in accordance with a determination that the representation of the field-of-view of the one or more cameras includes a second type of content that is different from the first type of content, displaying, in the viewfinder user interface, a second indication associated with the second type of content that is different from the first indication.

In accordance with some embodiments, a computer system is described. The computer system is configured to communicate with one or more display generation components, a one or more cameras, and one or more input devices including a hardware input device, the computer system comprising one or more processors and memory storing one or more programs configured to be executed by the one or more processors, the one or more programs including instructions for: detecting, via the hardware input device, a press input; and in response to detecting the press input: in accordance with a determination that the press input satisfies a first set of one or more criteria, performing a first operation, wherein performing the first operation includes: displaying, via the one or more display generation components, a viewfinder user interface including a representation of a field-of-view of the one or more cameras; displaying, via the one or more display generation components, one or more indications associated with the representation of the field-of-view of the one or more cameras, wherein displaying the one or more indications associated with the representation of the field-of-view of the one or more cameras includes: in accordance with a determination that the representation of the field-of-view of the one or more cameras includes a first type of content, displaying, in the viewfinder user interface, a first indication associated with the first type of content; and in accordance with a determination that the representation of the field-of-view of the one or more cameras includes a second type of content that is different from the first type of content, displaying, in the viewfinder user interface, a second indication associated with the second type of content that is different from the first indication.

In accordance with some embodiments, a computer system is described. The computer system is configured to communicate with one or more display generation components, a one or more cameras, and one or more input devices including a hardware input device, the computer system comprising: means for detecting, via the hardware input device, a press input; and means for, in response to detecting the press input: in accordance with a determination that the press input satisfies a first set of one or more criteria, performing a first operation, wherein performing the first operation includes: displaying, via the one or more display generation components, a viewfinder user interface including a representation of a field-of-view of the one or more cameras; displaying, via the one or more display generation components, one or more indications associated with the representation of the field-of-view of the one or more cameras, wherein displaying the one or more indications associated with the representation of the field-of-view of the one or more cameras includes: in accordance with a determination that the representation of the field-of-view of the one or more cameras includes a first type of content, displaying, in the viewfinder user interface, a first indication associated with the first type of content; and in accordance with a determination that the representation of the field-of-view of the one or more cameras includes a second type of content that is different from the first type of content, displaying, in the viewfinder user interface, a second indication associated with the second type of content that is different from the first indication.

In accordance with some embodiments, a computer program product is described. The computer program product comprises one or more programs configured to be executed by one or more processors of a computer system that is in communication with one or more display generation components, a one or more cameras, and one or more input devices including a hardware input device, the one or more programs including instructions for: detecting, via the hardware input device, a press input; and in response to detecting the press input: in accordance with a determination that the press input satisfies a first set of one or more criteria, performing a first operation, wherein performing the first operation includes: displaying, via the one or more display generation components, a viewfinder user interface including a representation of a field-of-view of the one or more cameras; displaying, via the one or more display generation components, one or more indications associated with the representation of the field-of-view of the one or more cameras, wherein displaying the one or more indications associated with the representation of the field-of-view of the one or more cameras includes: in accordance with a determination that the representation of the field-of-view of the one or more cameras includes a first type of content, displaying, in the viewfinder user interface, a first indication associated with the first type of content; and in accordance with a determination that the representation of the field-of-view of the one or more cameras includes a second type of content that is different from the first type of content, displaying, in the viewfinder user interface, a second indication associated with the second type of content that is different from the first indication.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing event notifications, thereby increasing the effectiveness, efficiency, and user satisfaction with such devices. Such methods and interfaces may complement or replace other methods for managing event notifications.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 11A-11B are a flow diagram of methods for customizing and controlling operations of a computer system using hardware inputs in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces that integrate one or more hardware buttons. For example, hardware button inputs can be used to control a variety of different functionality depending on the type of hardware button input detected (e.g., long or short presses, light or hard presses, and/or presses with other characteristics), the device context in which the hardware button input is detected (e.g., the user interface being displayed and/or the settings associated with the hardware button), and/or the hardware button being pressed (e.g., automatically switching between different media capture modes for a camera application using different buttons). Such techniques can improve the flexibility, ergonomics, and ease of use of user interfaces and reduce the cognitive burden on a user interacting with the user interface, thereby enhancing productivity. Further, such techniques can reduce processor and battery power otherwise wasted on redundant user inputs.

Figure 6A:
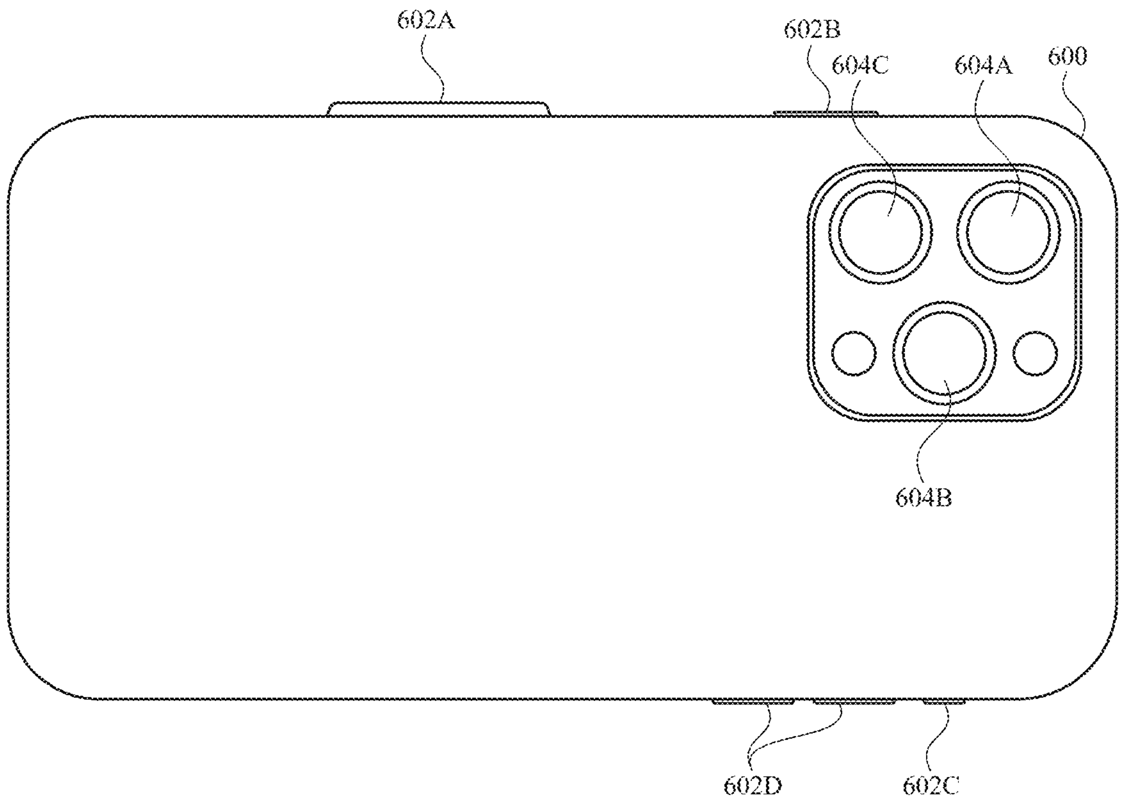
FIGS. 6A-6AM illustrate example techniques and systems for controlling a computer system based on variable characteristics of hardware inputs in accordance with some embodiments.
Figure 7:
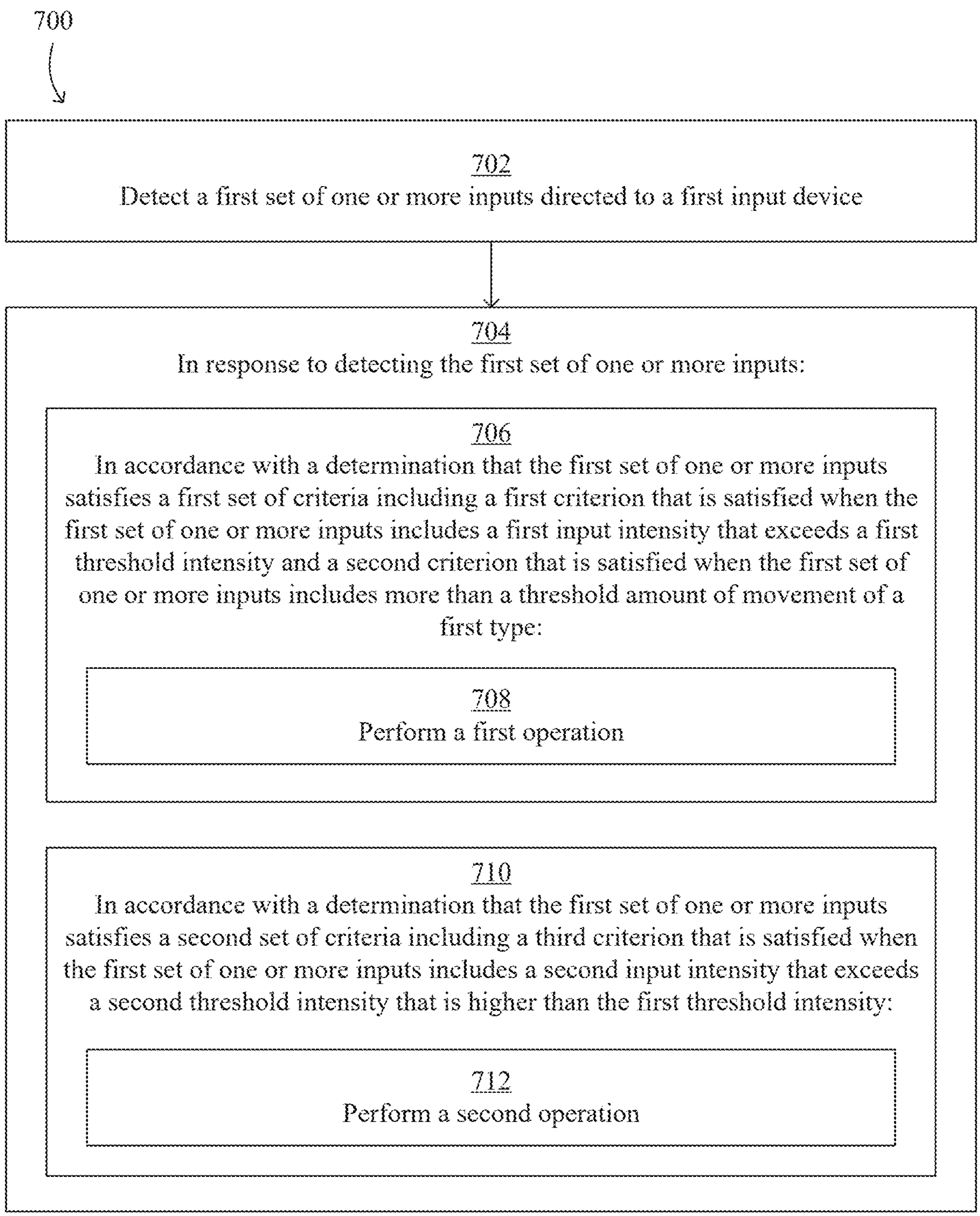
FIG. 7 is a flow diagram of methods for controlling a computer system based on variable characteristics of hardware inputs in accordance with some embodiments.
Figures 8A, 8B:
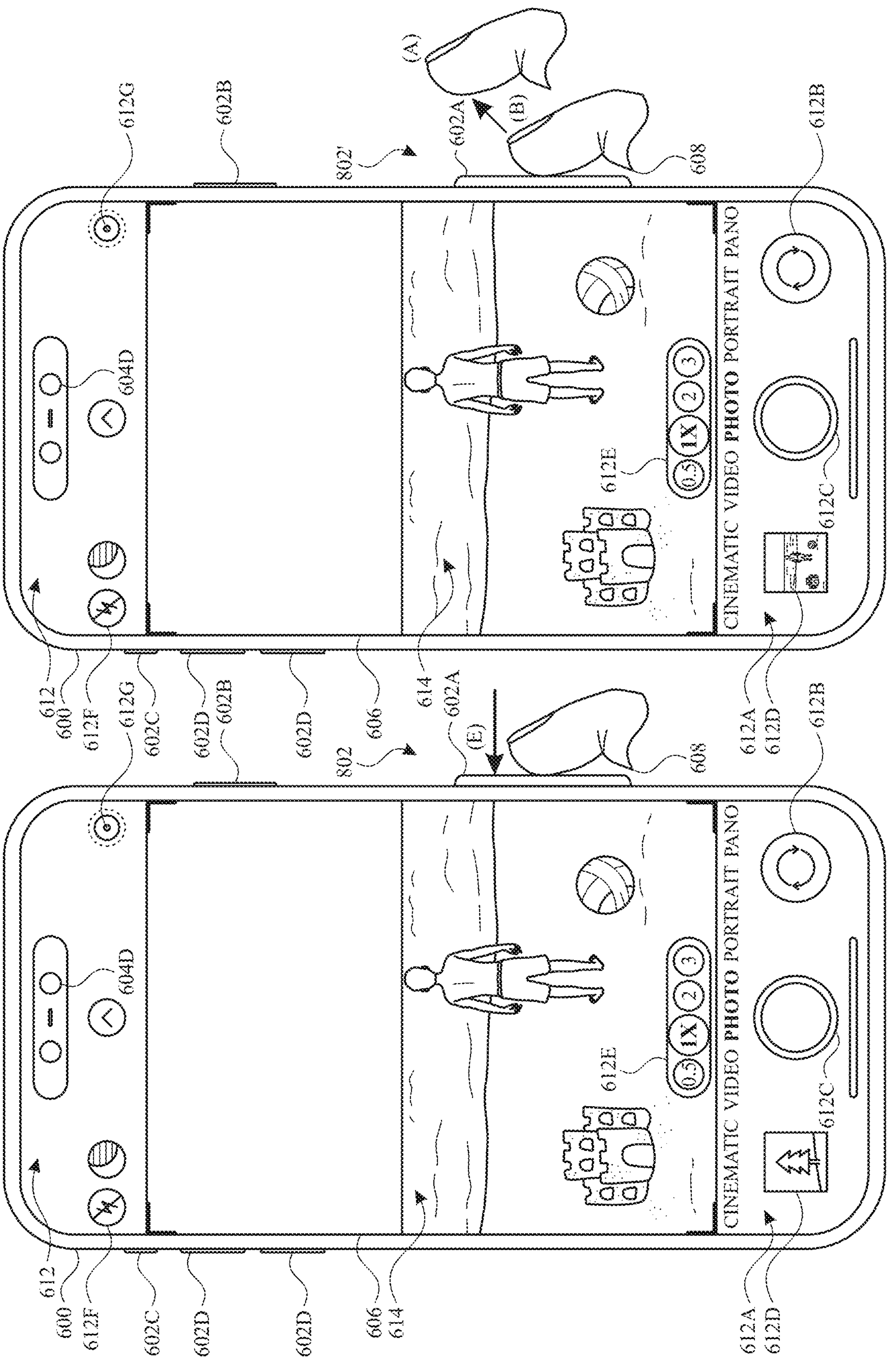
FIGS. 8A-8P illustrate example techniques and systems for controlling media capture operations based on variable characteristics of hardware inputs in accordance with some embodiments.
Figure 8P:
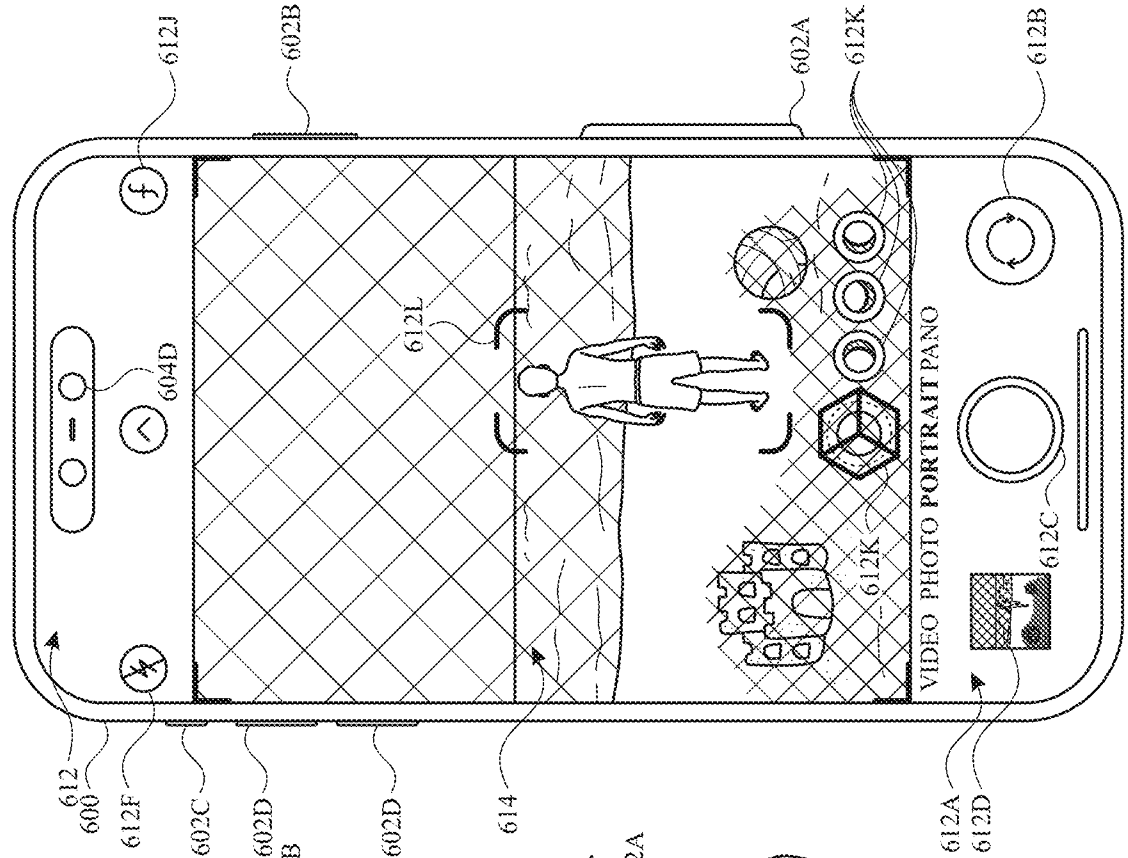
Figure 9A:
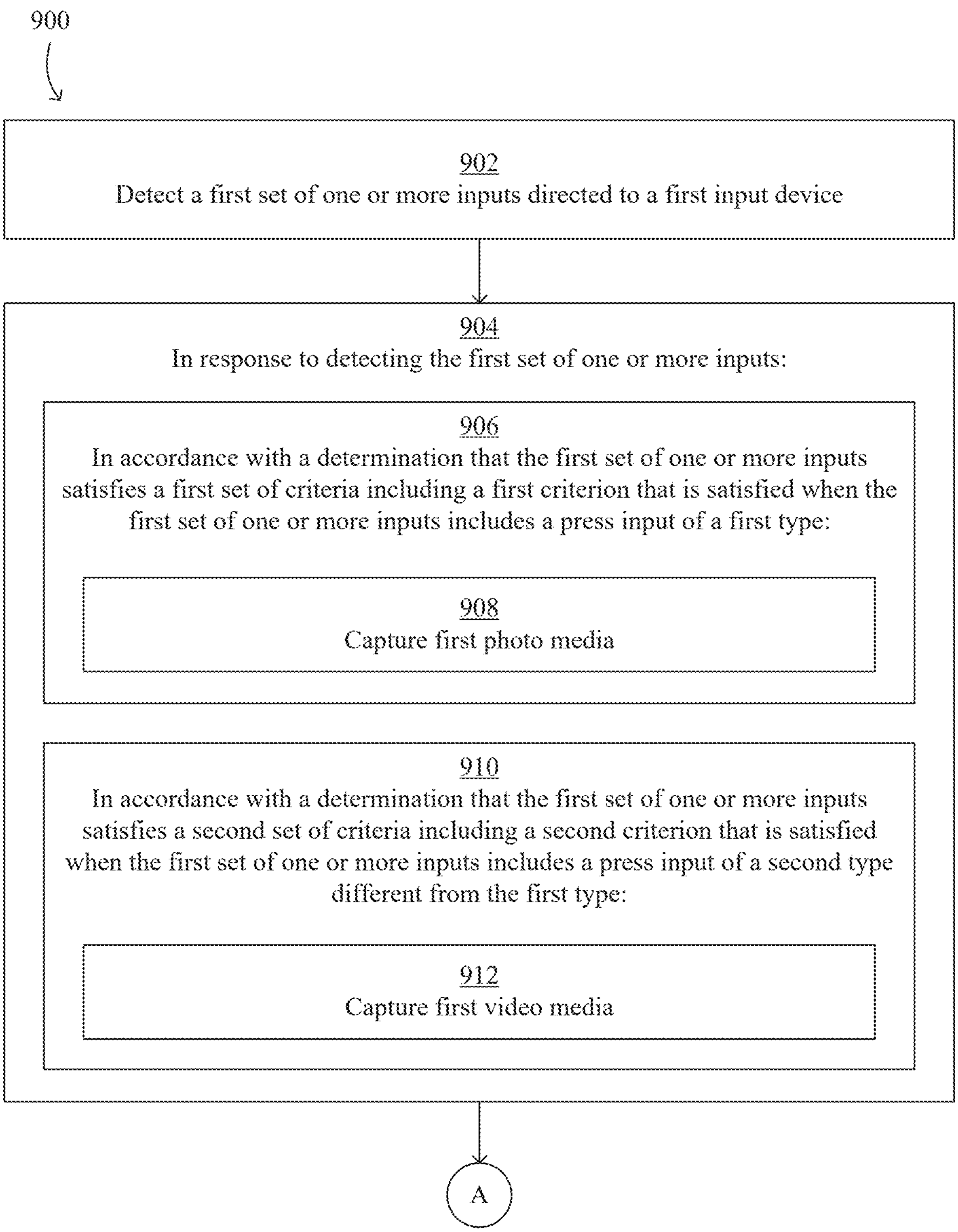
FIGS. 9A-9B are a flow diagram of methods for controlling media capture operations based on variable characteristics of hardware inputs in accordance with some embodiments.
Figure 9B:
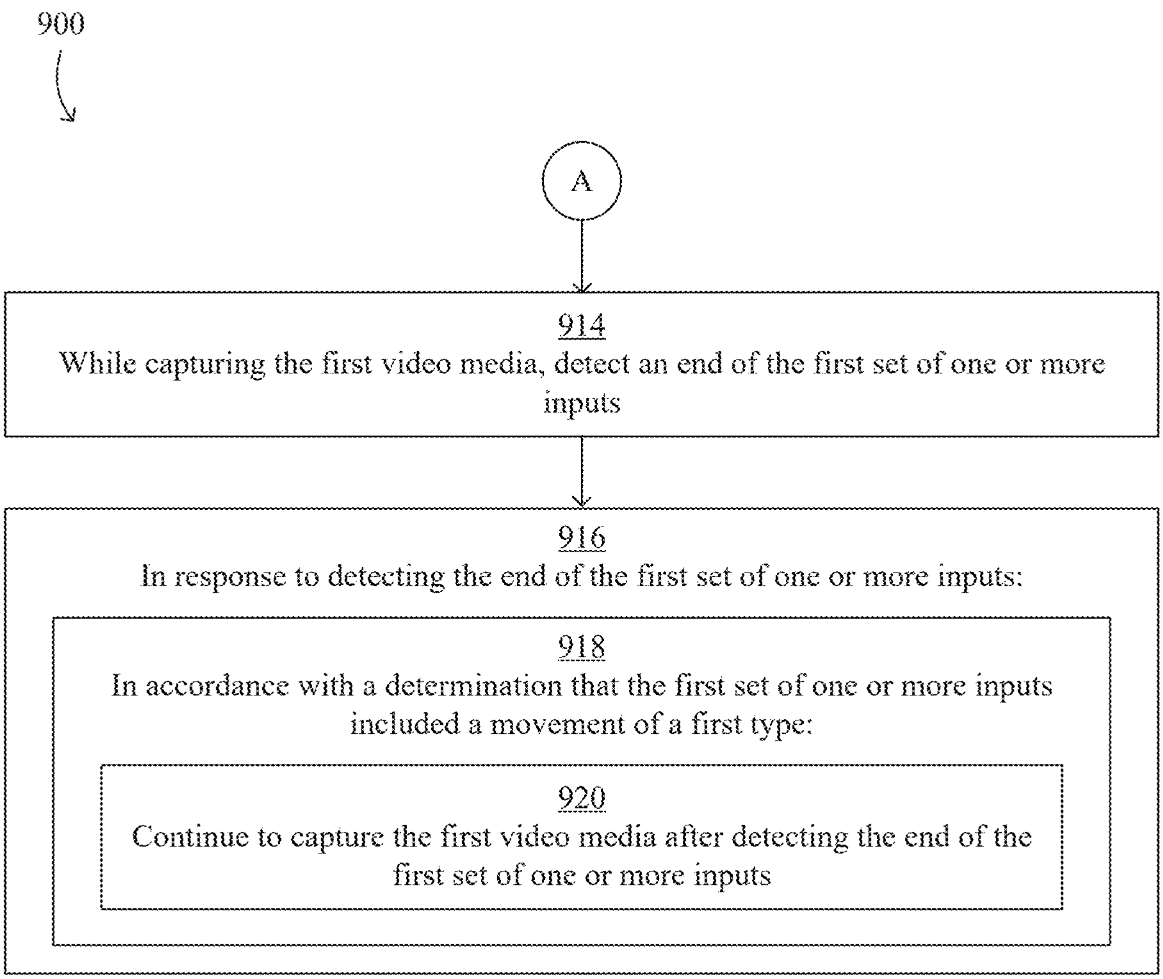
Figure 10A:
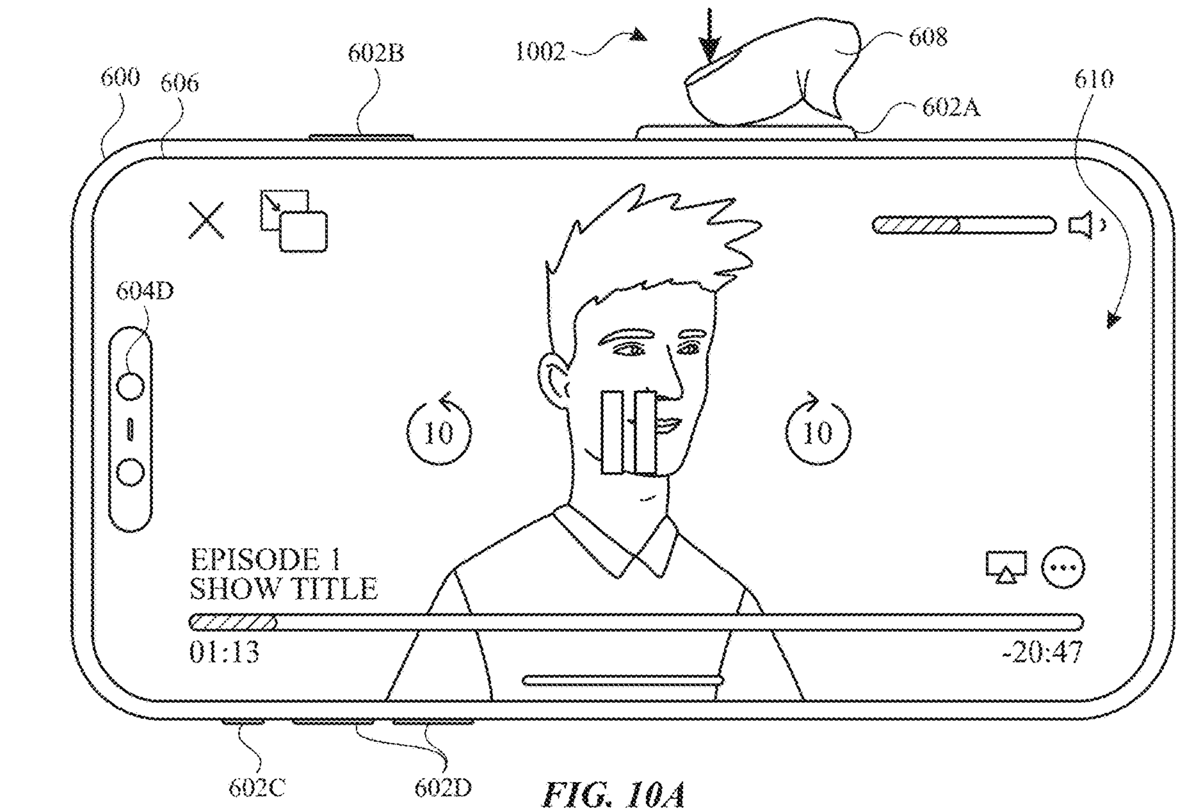
FIGS. 10A-10W illustrate example techniques and systems for customizing and controlling operations of a computer system using hardware inputs in accordance with some embodiments.
Figure 10W:
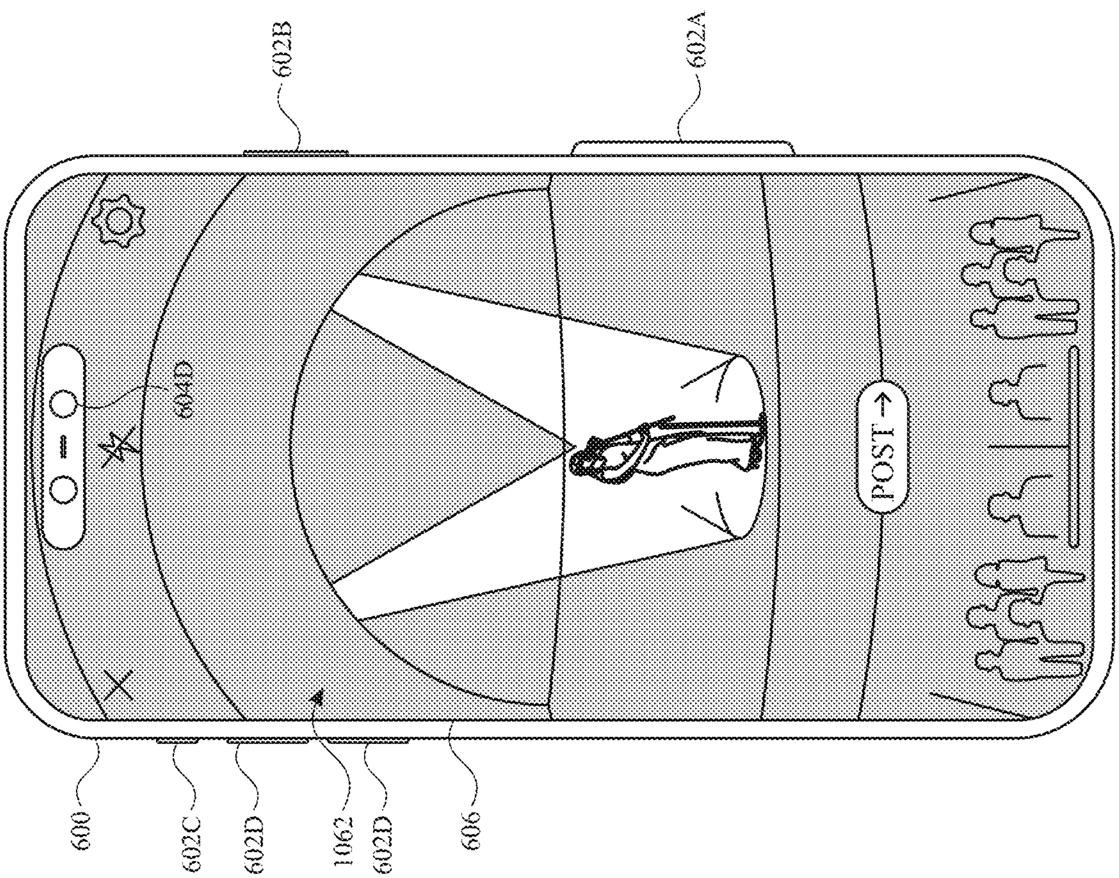
Figure 11A:
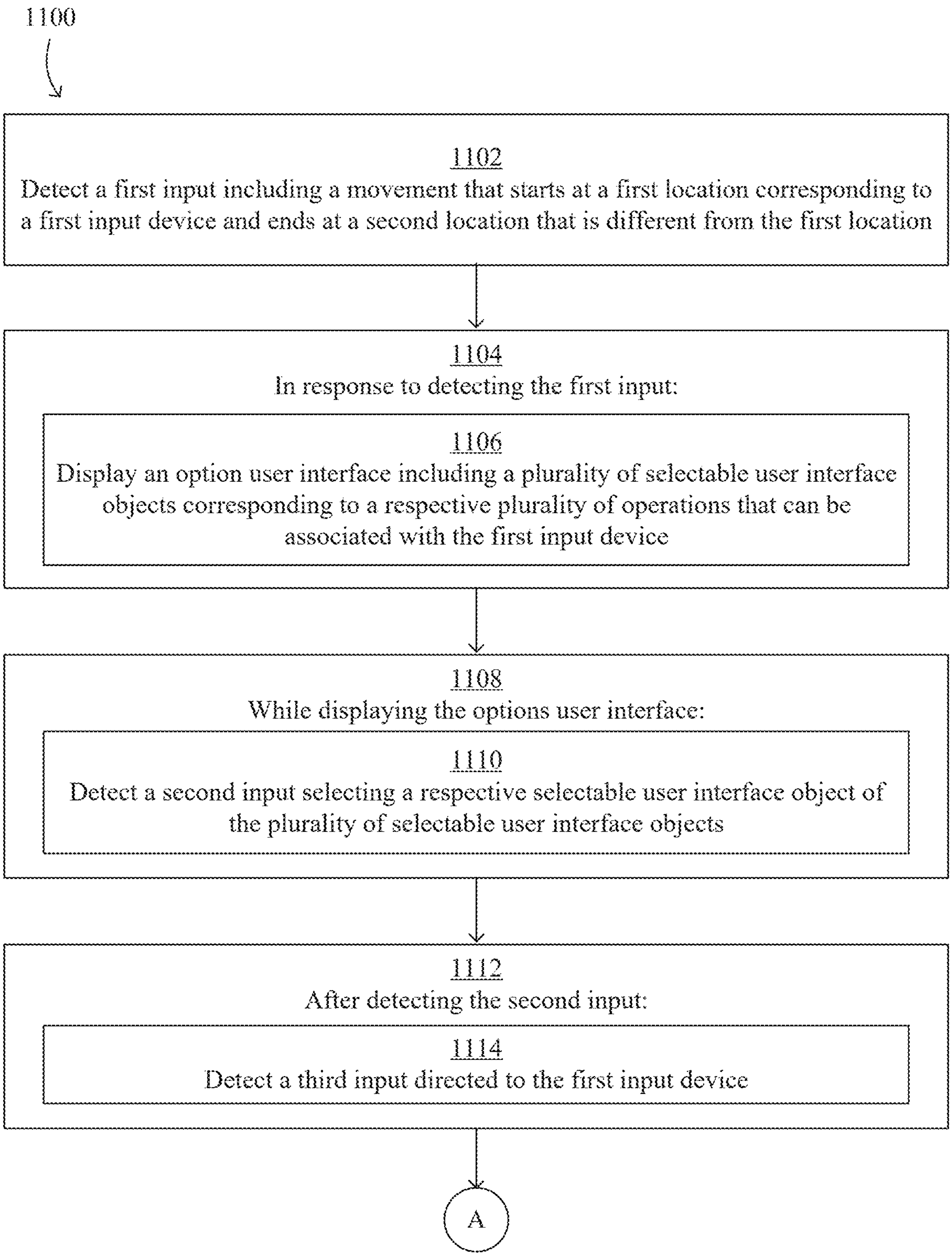
Figure 13:
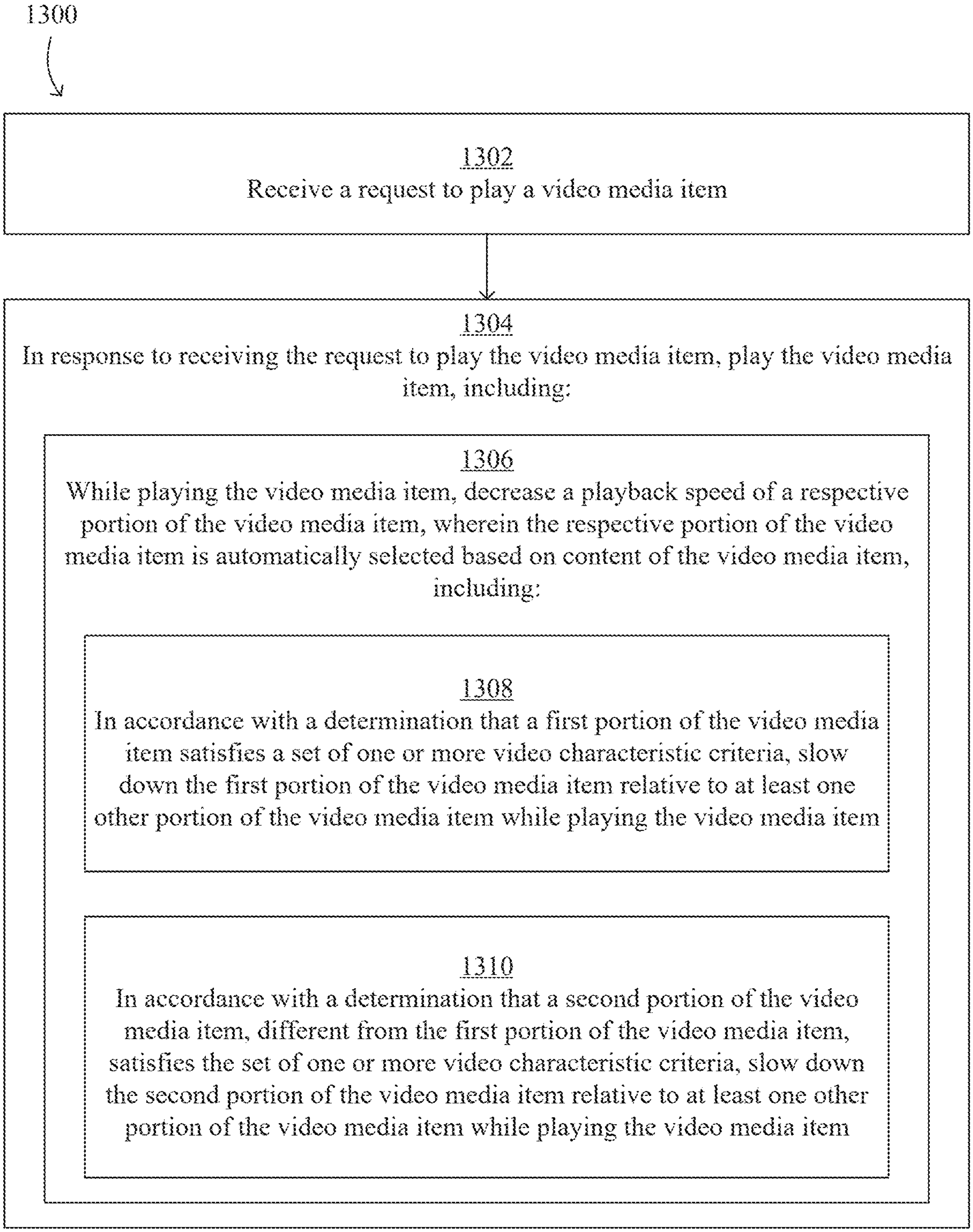
FIG. 13 is a flow diagram of methods for customizing playback speed of video media in accordance with some embodiments.
Figure 14A:
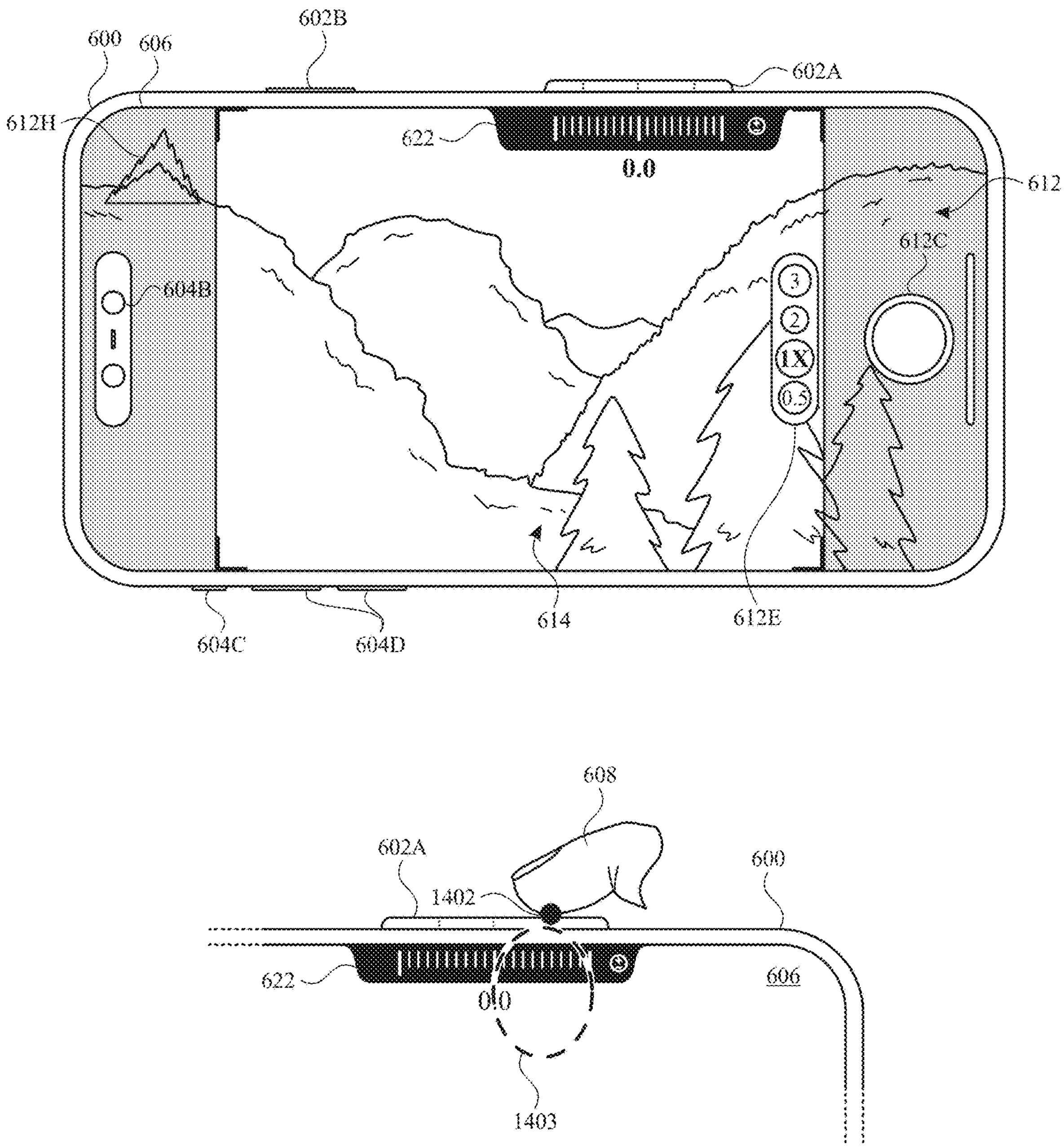
FIGS. 14A-14Z illustrate example techniques and systems for controlling settings of a computer system based on movement characteristics of hardware inputs in accordance with some embodiments.
Figure 14B:
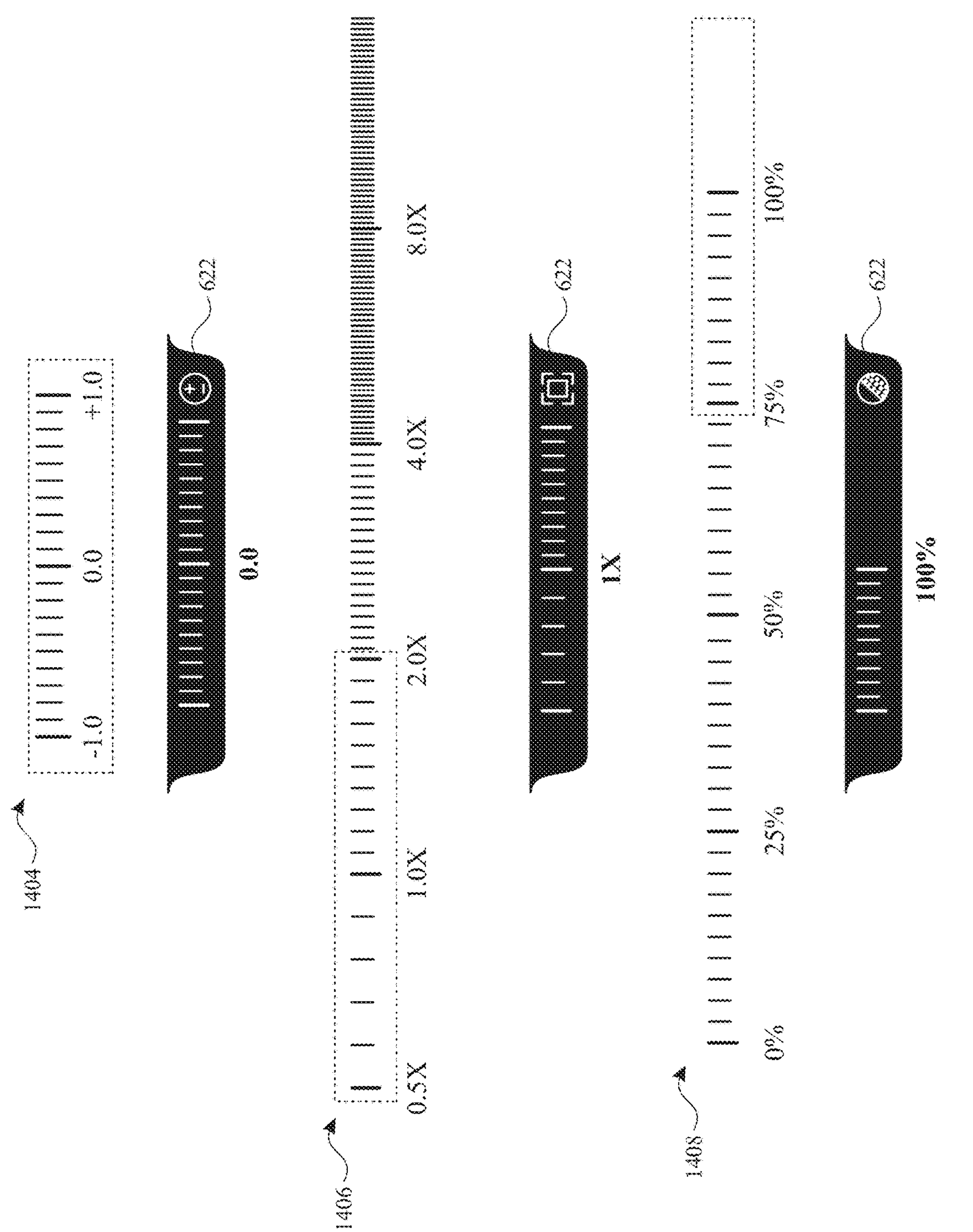
Figure 14Z:
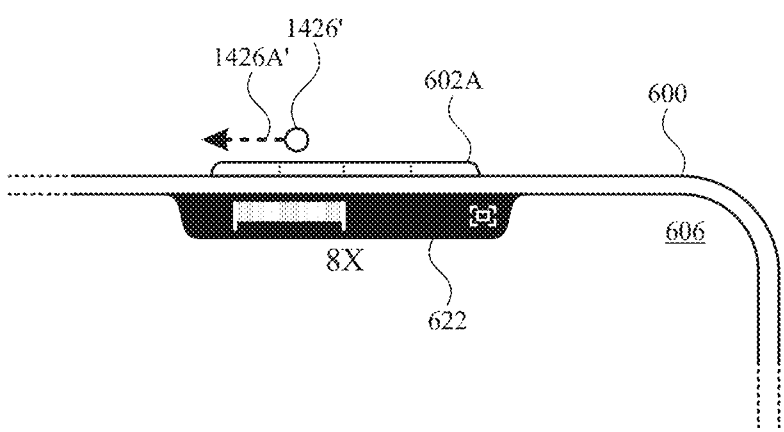
Figure 15:
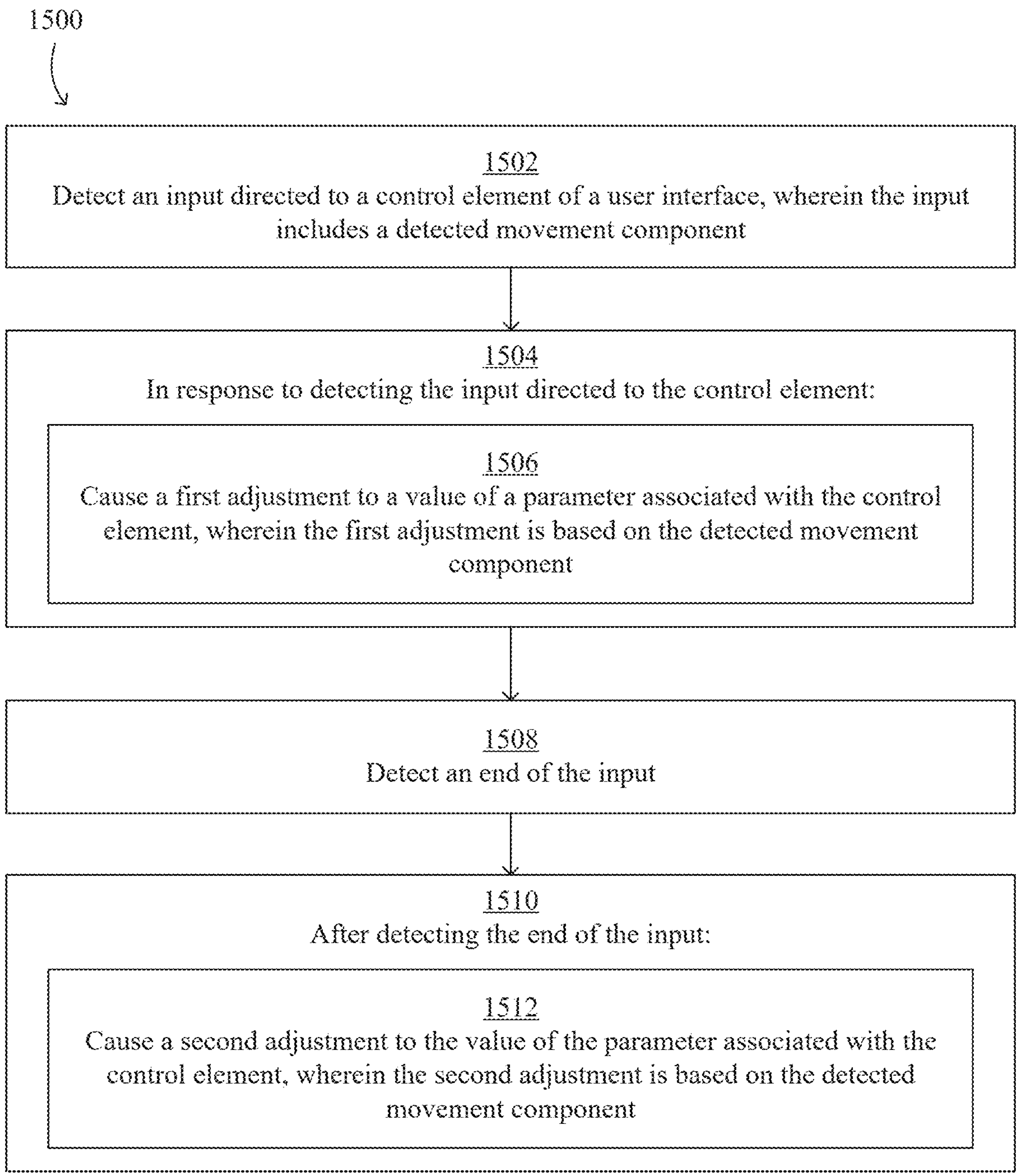
FIG. 15 is a flow diagram of methods for controlling settings of a computer system based on movement characteristics of hardware inputs in accordance with some embodiments.
Figure 16A:
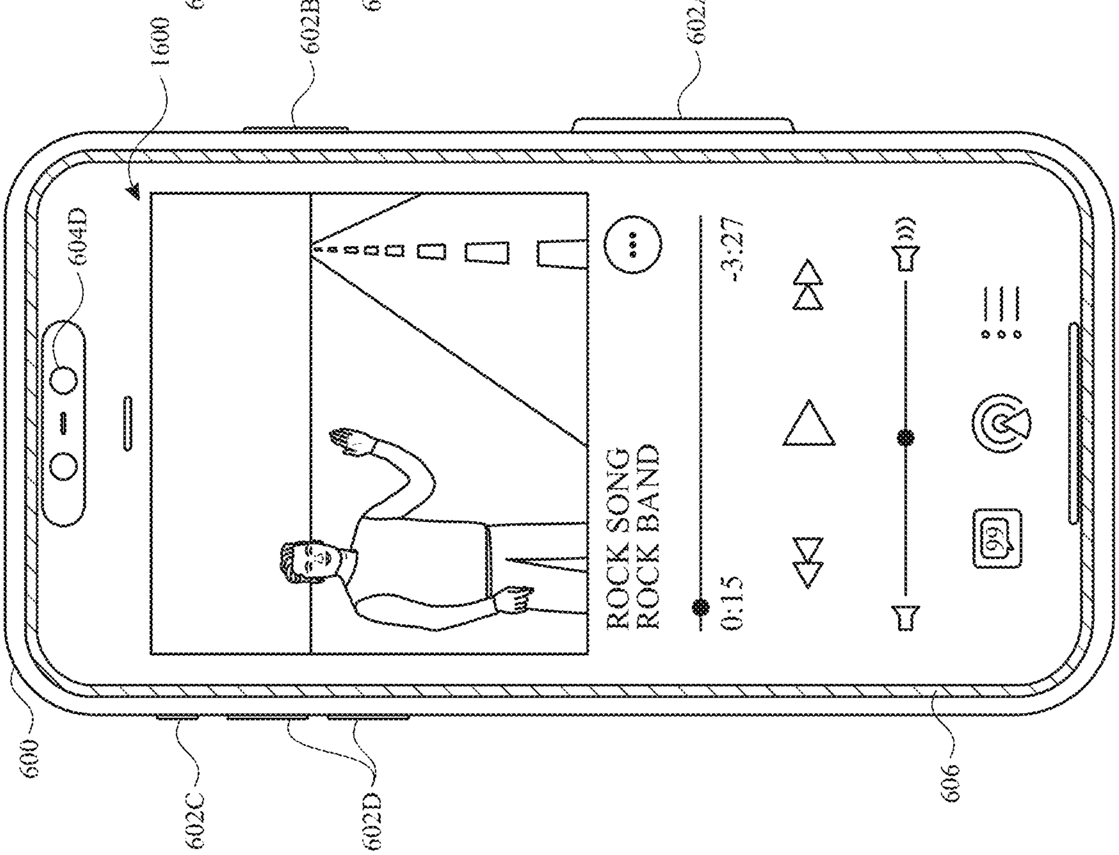
Figure 16S:
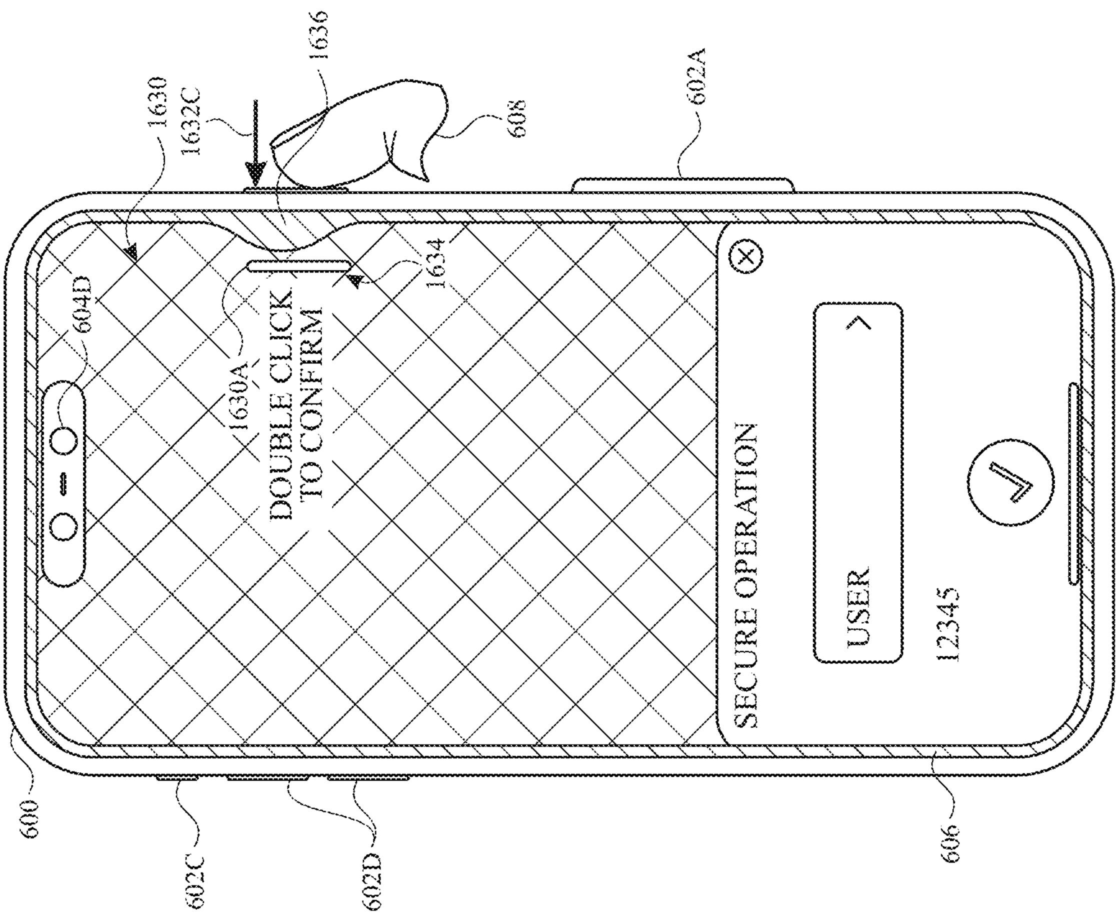
Figure 17:
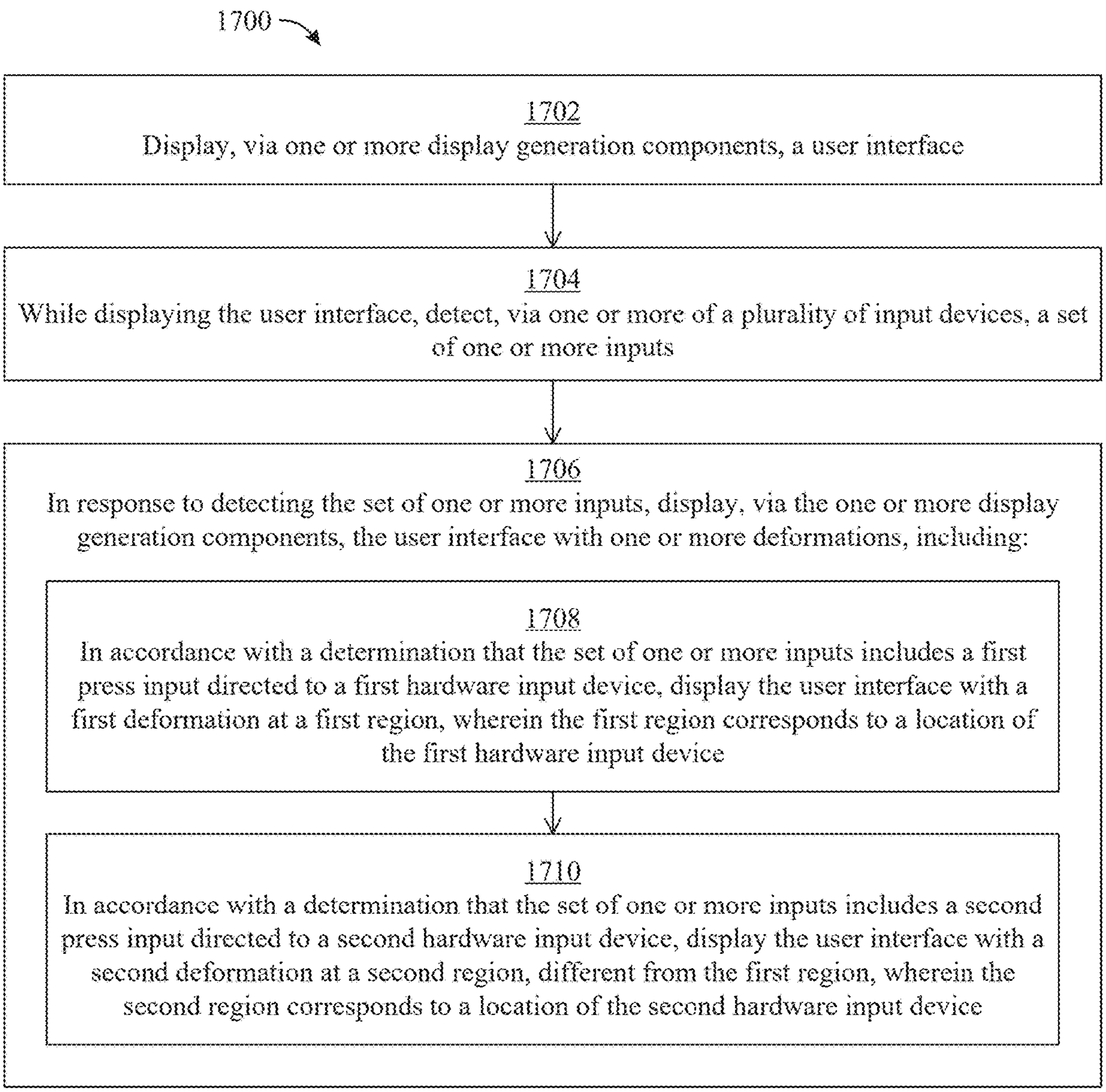
FIG. 17 is a flow diagram of methods for controlling a computer system with multiple hardware input devices, in accordance with some embodiments.
Figure 18A:
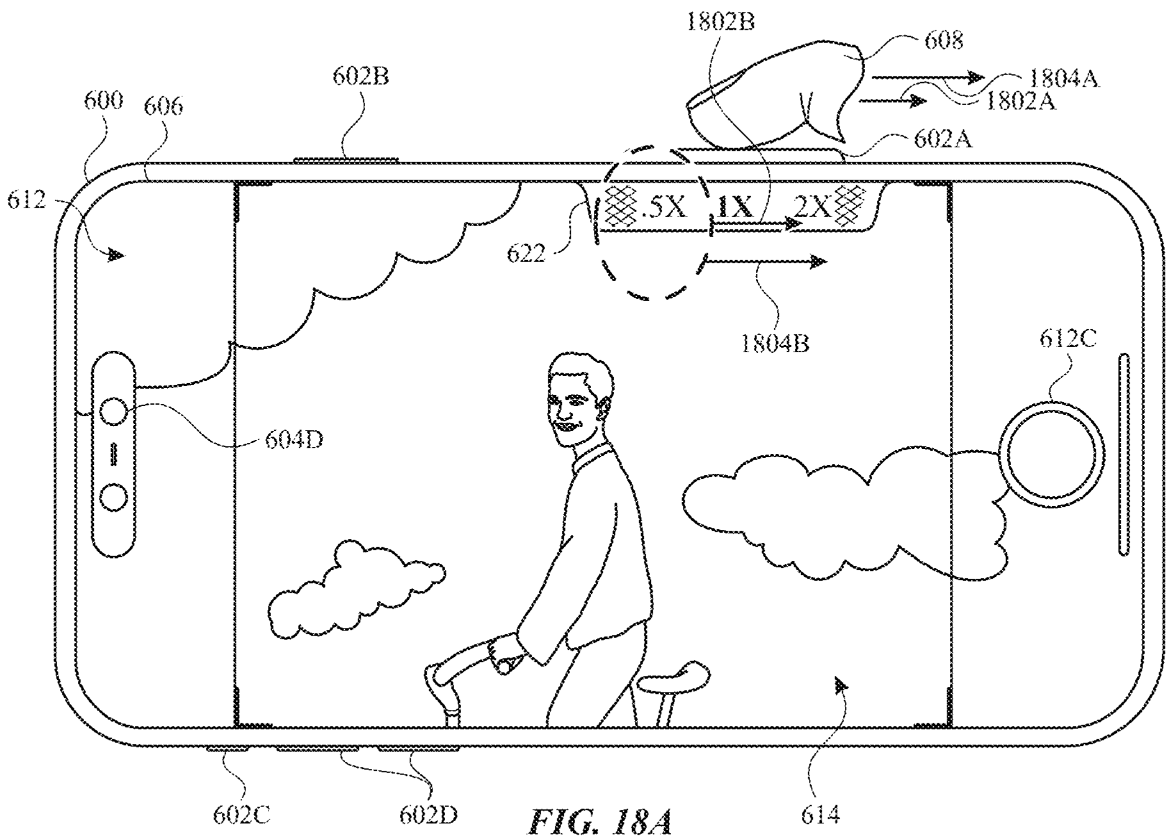
FIGS. 18A-18T illustrate example techniques and systems for controlling media capture using a computer system with multiple cameras, in accordance with some embodiments.
Figure 18B:
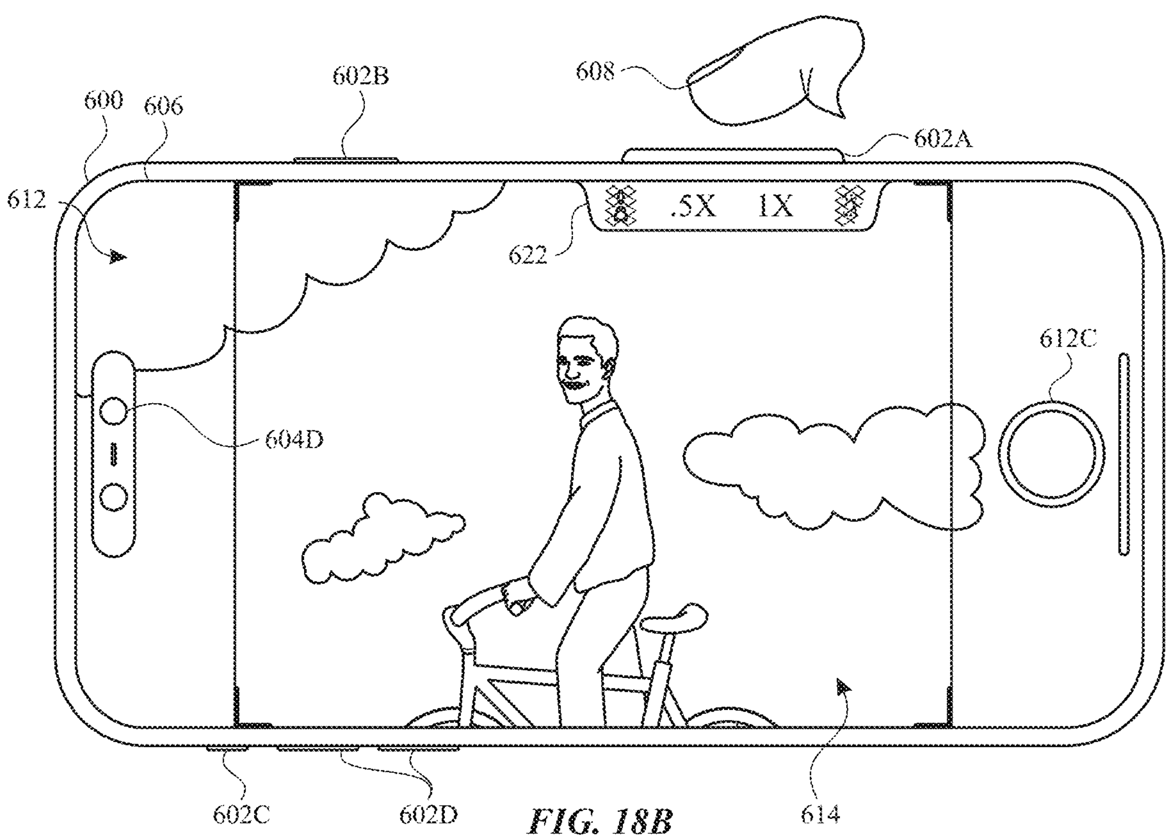
Figure 18C:
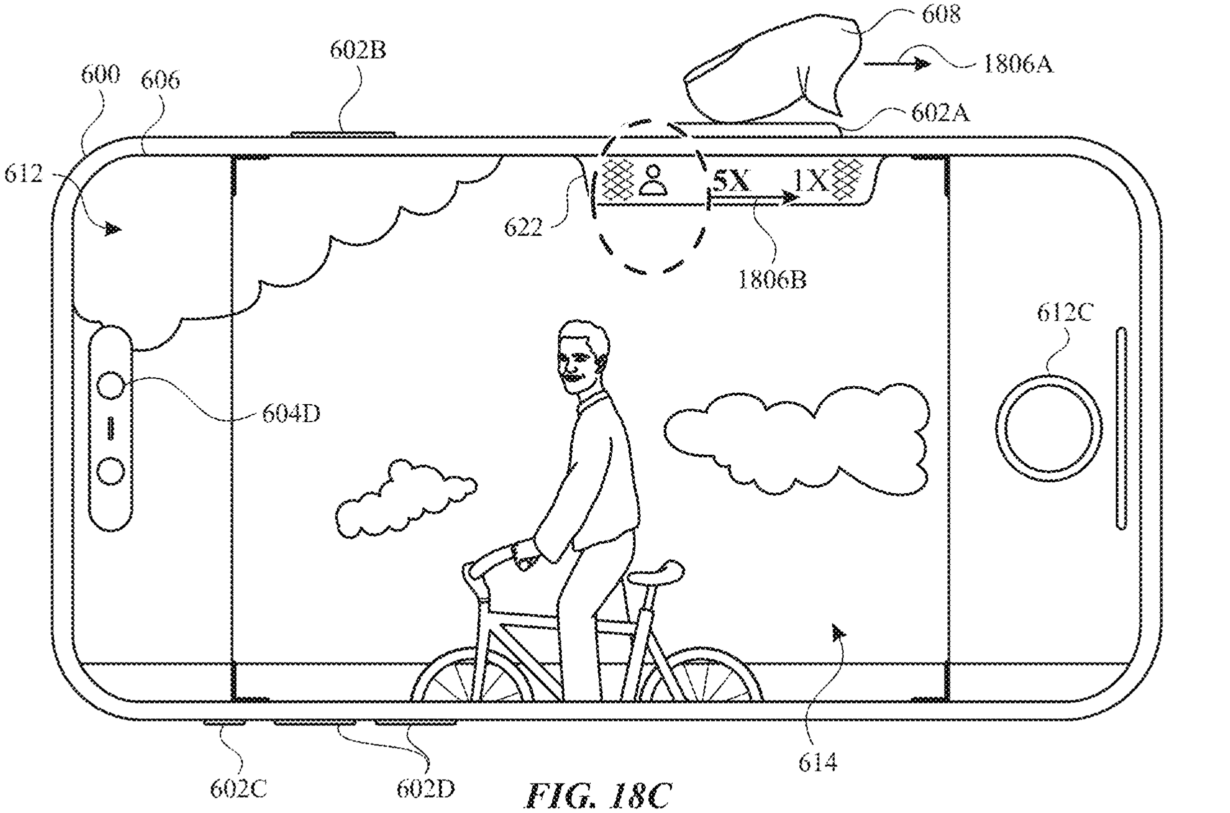
Figure 18D:
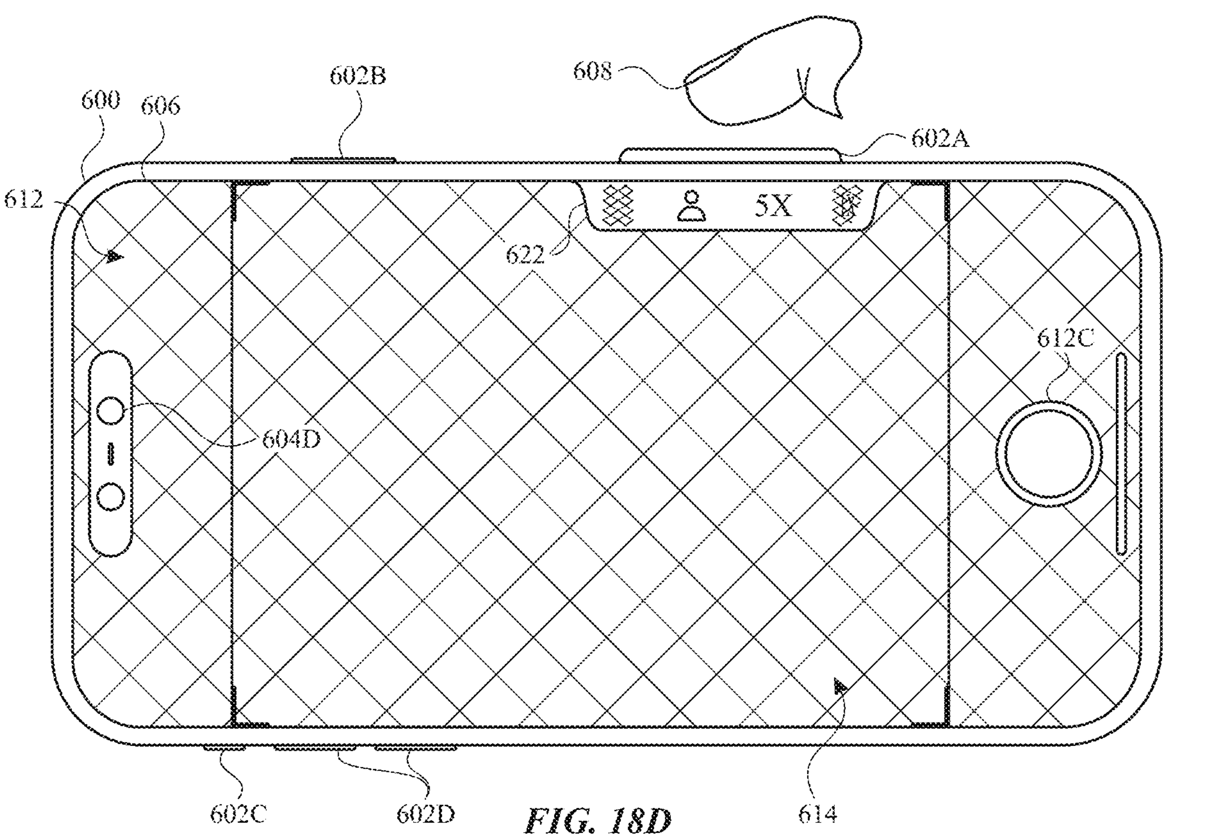
Figure 18E:
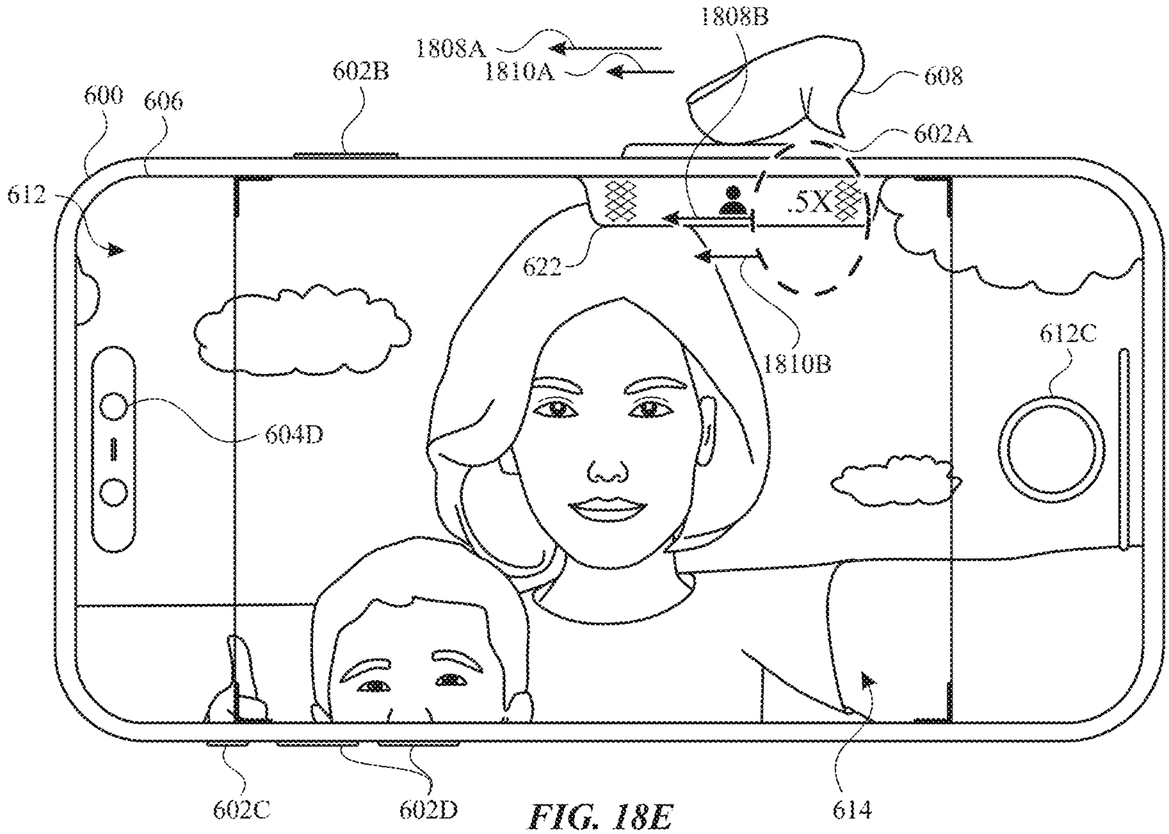
Figure 18F:
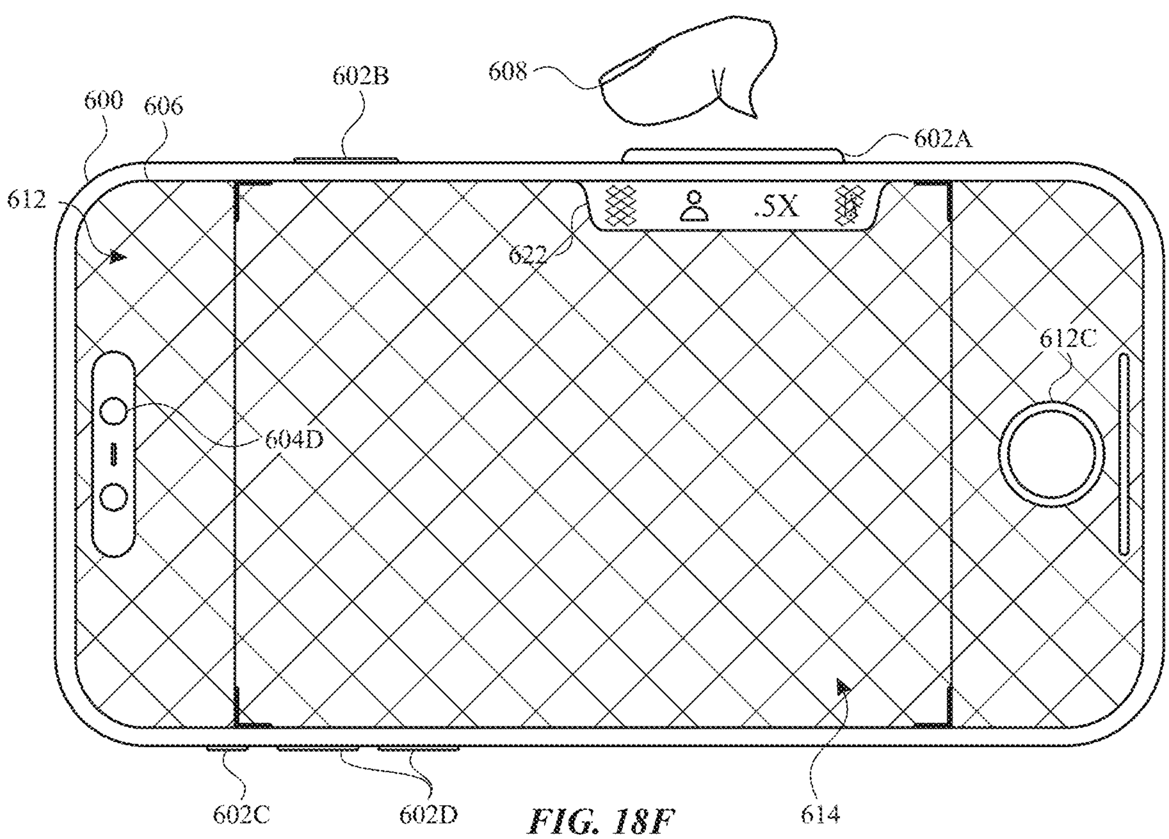
Figure 18G:
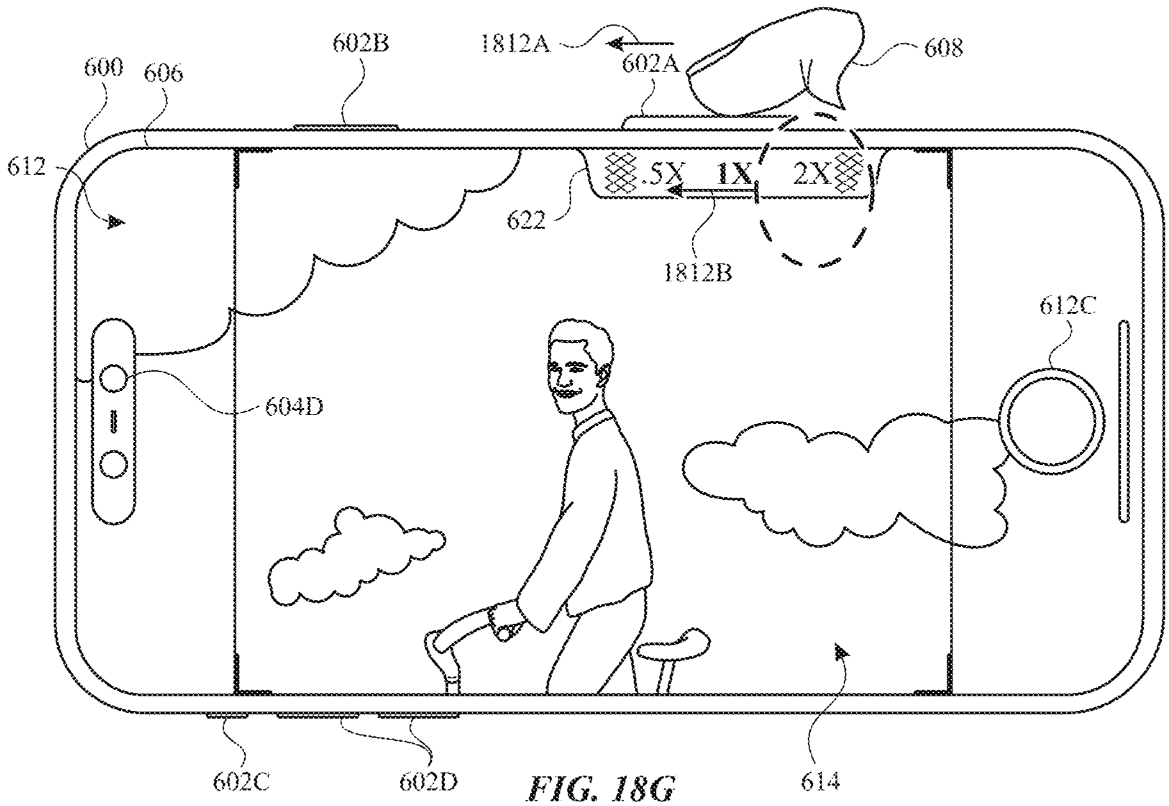
Figure 18H:
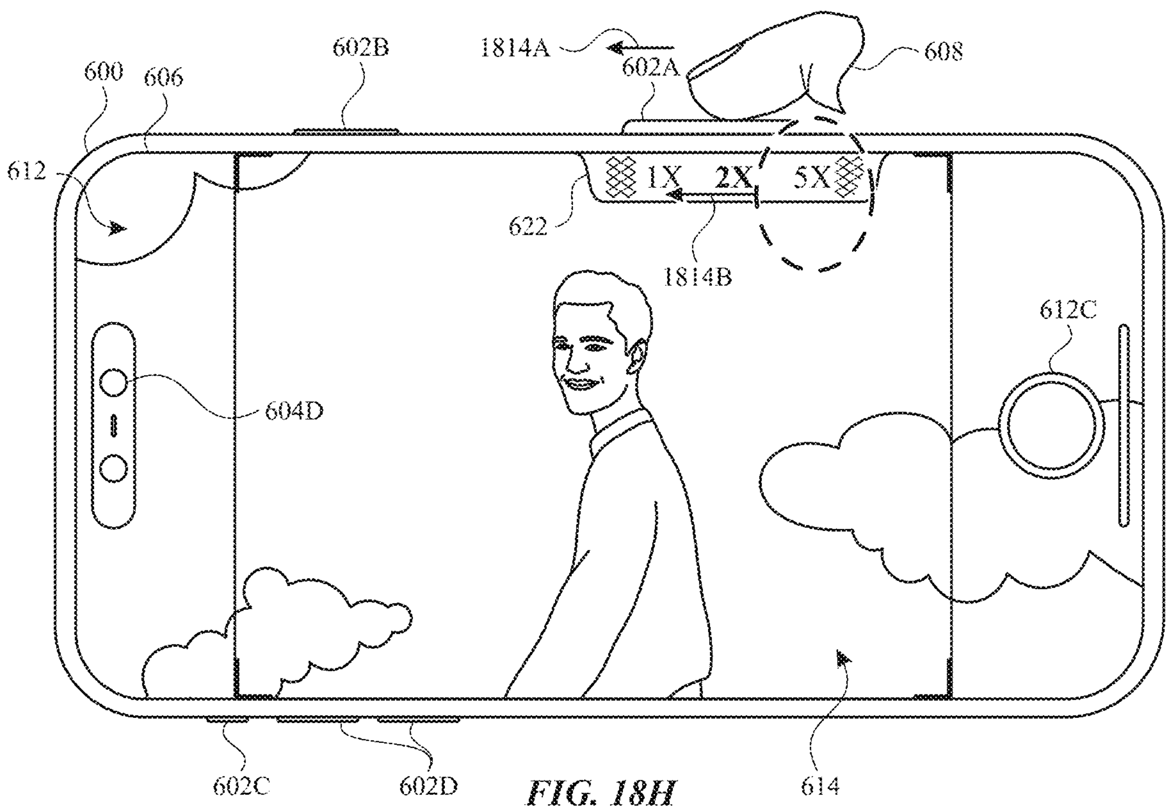
Figure 18I:
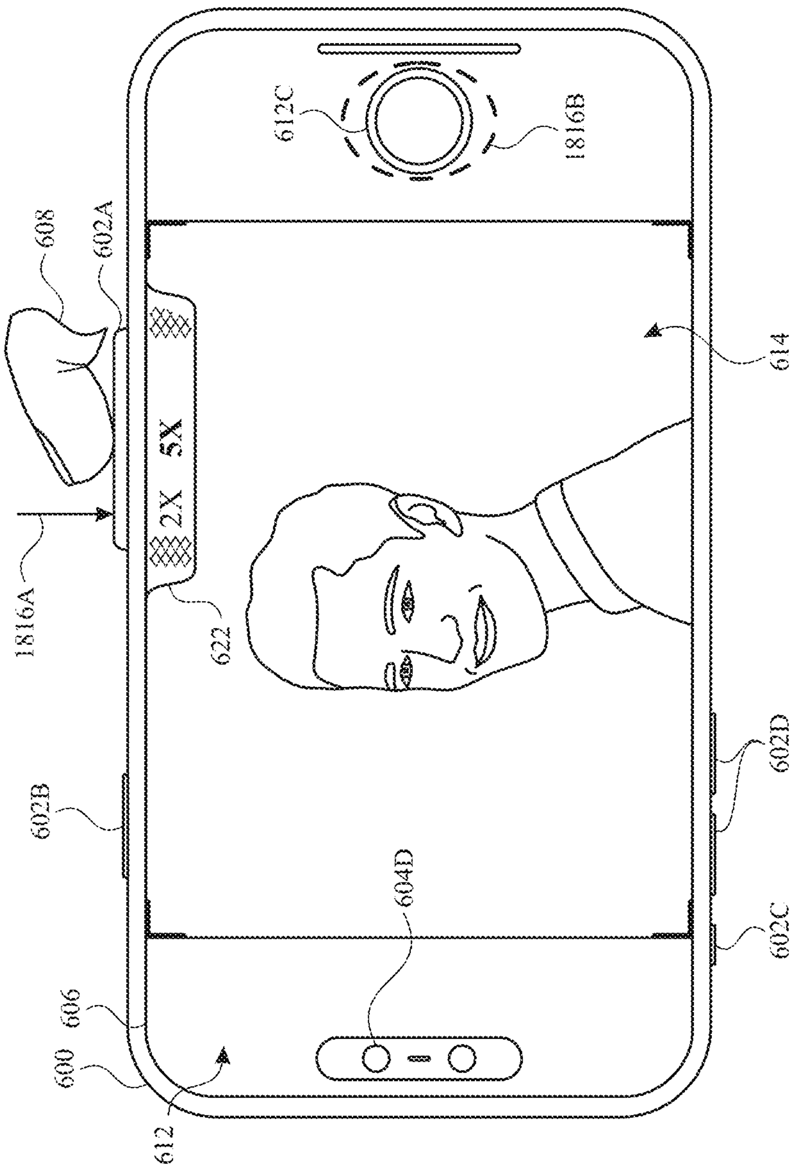
Figure 18T:
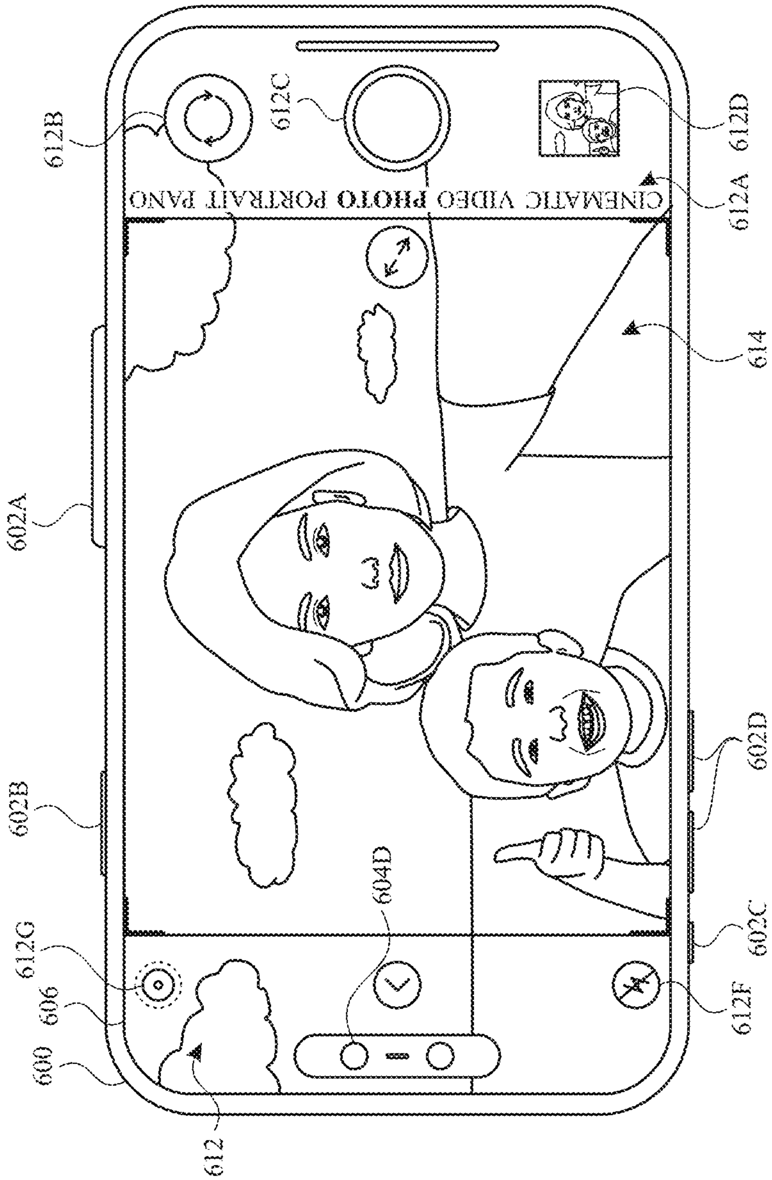
Figure 19:
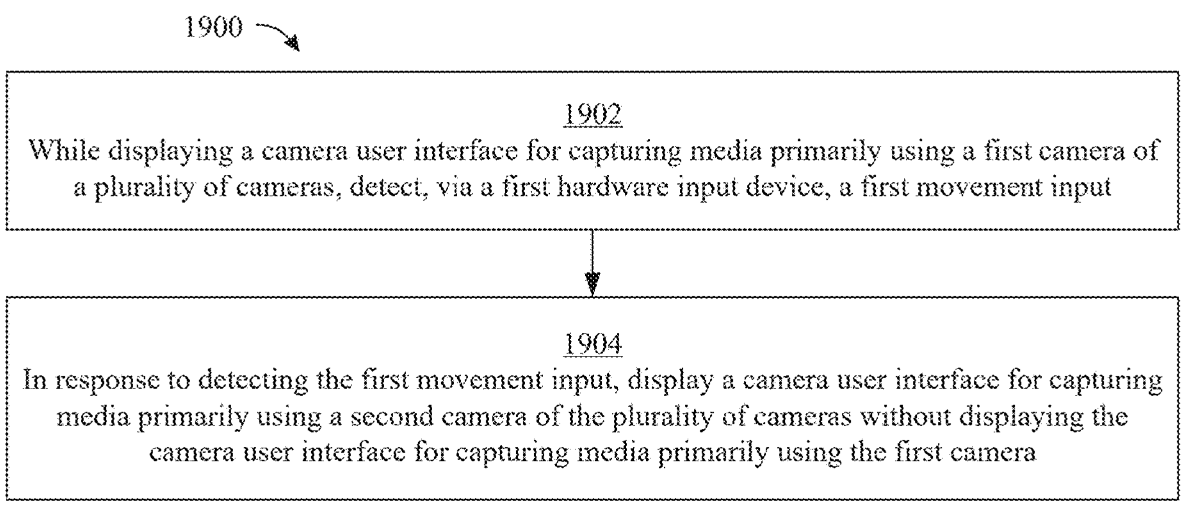
FIG. 19 is a flow diagram of methods for controlling media capture using a computer system with multiple cameras, in accordance with some embodiments.

Below, FIGS. 1A-1B, 2, 3A-3G, 4A-4B, and 5A-5H provide a description of exemplary devices for performing the techniques for managing event notifications. FIGS. 6A-6AM illustrate exemplary techniques and systems for controlling a computer system based on variable characteristics of hardware inputs. FIG. 7 is a flow diagram illustrating methods for controlling a computer system based on variable characteristics of hardware inputs in accordance with some embodiments. FIGS. 8A-8P illustrate exemplary techniques and systems for controlling media capture operations based on variable characteristics of hardware inputs. FIGS. 9A-9B are a flow diagram illustrating methods for controlling media capture operations based on variable characteristics of hardware inputs in accordance with some embodiments. FIGS. 10A-10W illustrate exemplary techniques and systems for customizing and controlling operations of a computer system using hardware inputs. FIGS. 11A-11B are a flow diagram illustrating methods for customizing and controlling operations of a computer system using hardware inputs in accordance with some embodiments. FIGS. 12A-12O illustrate exemplary techniques and systems for customizing playback speed of video media. FIG. 13 is a flow diagram illustrating methods for customizing playback speed of video media in accordance with some embodiments. FIGS. 14A-14Z illustrate exemplary techniques and systems controlling settings of a computer system based on movement characteristics of hardware inputs. FIG. 15 is a flow diagram illustrating methods for controlling settings of a computer system based on movement characteristics of hardware inputs in accordance with some embodiments. FIGS. 16A-16S illustrate exemplary techniques and systems for controlling a computer system with multiple hardware input devices. FIG. 17 is a flow diagram illustrating methods for controlling a computer system with multiple hardware input devices in accordance with some embodiments. FIGS. 18A-18T illustrate exemplary example techniques and systems for controlling media capture using a computer system with multiple cameras. FIG. 19 is a flow diagram of methods for controlling media capture using a computer system with multiple cameras. FIGS. 20A-20AL illustrate example techniques and systems for controlling visual intelligence functionality of a computer system with one or more cameras. FIG. 21 is a flow diagram of methods for controlling visual intelligence functionality of a computer system with one or more cameras.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component (e.g., a display device such as a head-mounted display (HMD), a display, a projector, a touch-sensitive display, or other device or component that presents visual content to a user, for example on or in the display generation component itself or produced from the display generation component and visible elsewhere). The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
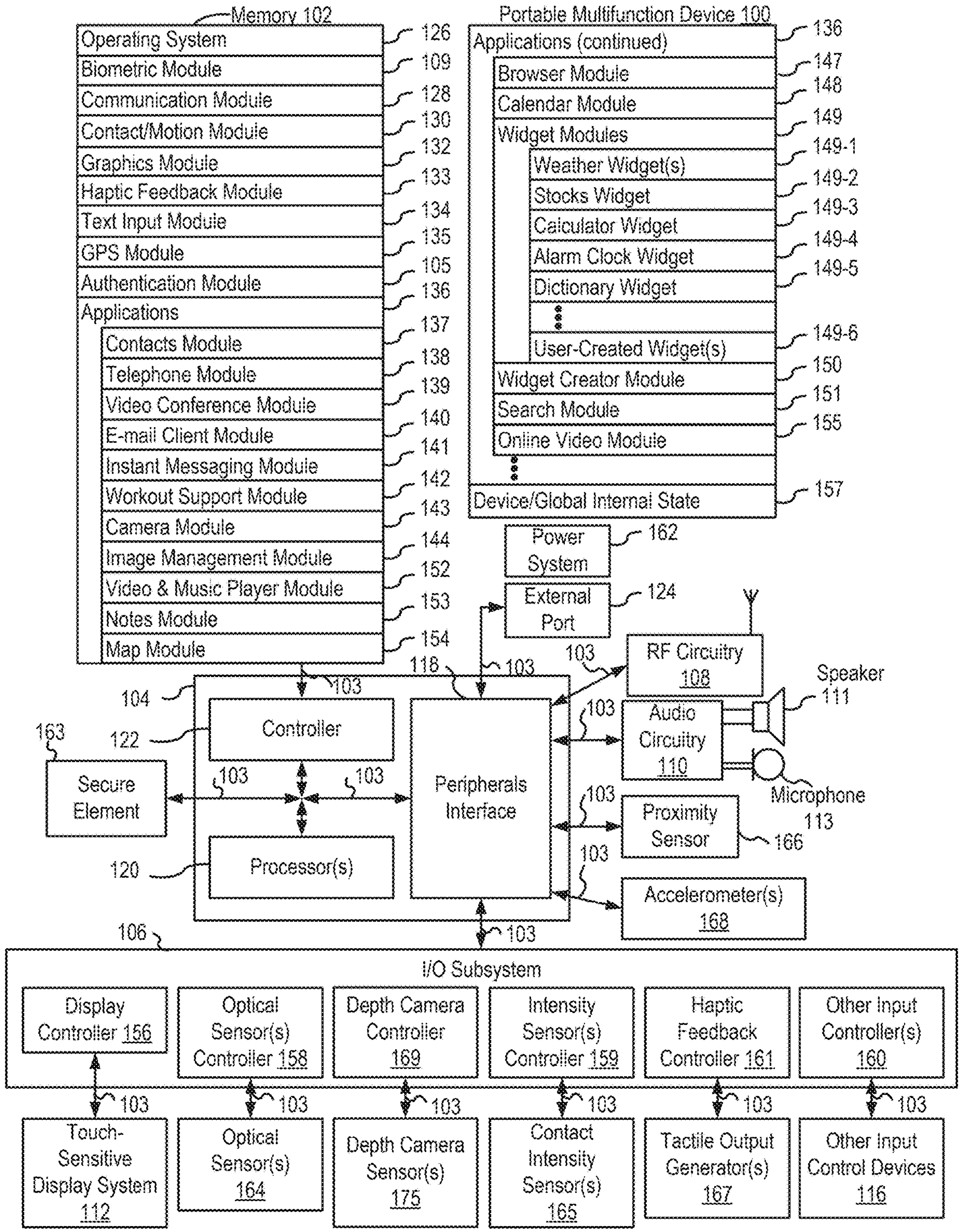
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage media), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes secure element 163 for securely storing information. In some embodiments, secure element 163 is a hardware component (e.g., a secure microcontroller chip) configured to securely store data or an algorithm. In some embodiments, secure element 163 provides (e.g., releases) secure information (e.g., payment information (e.g., an account number and/or a transaction-specific dynamic security code), identification information (e.g., credentials of a state-approved digital identification), and/or authentication information (e.g., data generated using a cryptography engine and/or by performing asymmetric cryptography operations)). In some embodiments, secure element 163 provides (or releases) the secure information in response to device 100 receiving authorization, such as a user authentication (e.g., fingerprint authentication; passcode authentication; detecting double-press of a hardware button when device 100 is in an unlocked state, and optionally, while device 100 has been continuously on a user's wrist since device 100 was unlocked by providing authentication credentials to device 100, where the continuous presence of device 100 on the user's wrist is determined by periodically checking that the device is in contact with the user's skin). For example, device 100 detects a fingerprint at a fingerprint sensor (e.g., a fingerprint sensor integrated into a button) of device 100. Device 100 determines whether the detected fingerprint is consistent with an enrolled fingerprint. In accordance with a determination that the fingerprint is consistent with the enrolled fingerprint, secure element 163 provides (e.g., releases) the secure information. In accordance with a determination that the fingerprint is not consistent with the enrolled fingerprint, secure element 163 forgoes providing (e.g., releasing) the secure information.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3A:
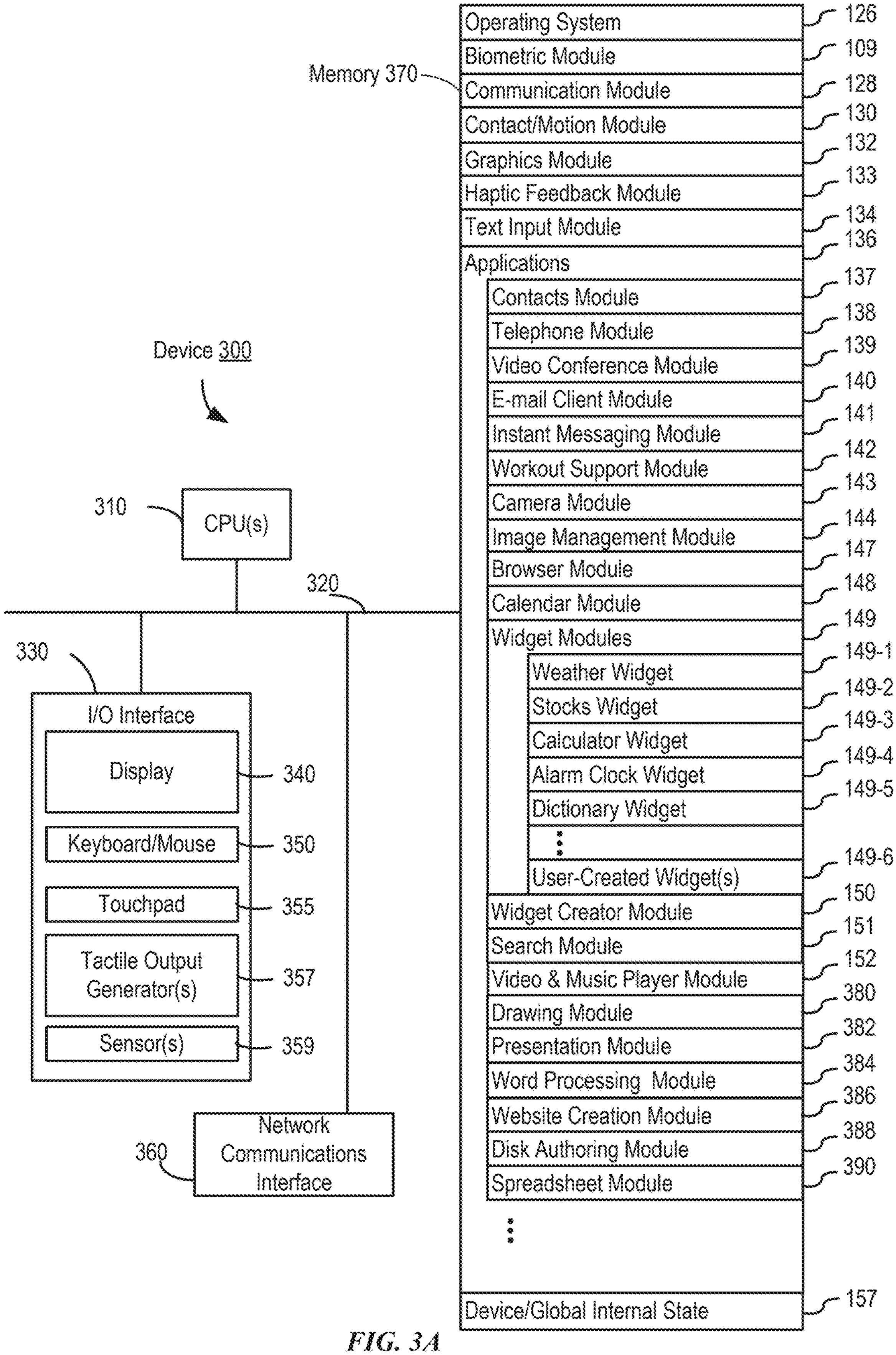
FIG. 3A is a block diagram of an exemplary multifunction device with a display and a touch-sensitive surface in accordance with some embodiments.

In some embodiments, the software components stored in memory 102 include operating system 126, biometric module 109, communication module (or set of instructions) 128, contact/motion module (or set of instructions) 130, graphics module (or set of instructions) 132, text input module (or set of instructions) 134, Global Positioning System (GPS) module (or set of instructions) 135, authentication module 105, and applications (or sets of instructions) 136. Furthermore, in some embodiments, memory 102 (FIG. 1A) or 370 (FIG. 3A) stores device/global internal state 157, as shown in FIGS. 1A and 3A. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as Vx Works) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE®, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Biometric module 109 optionally stores information about one or more enrolled biometric features (e.g., fingerprint feature information, facial recognition feature information, eye and/or iris feature information) for use to verify whether received biometric information matches the enrolled biometric features. In some embodiments, the information stored about the one or more enrolled biometric features includes data that enables the comparison between the stored information and received biometric information without including enough information to reproduce the enrolled biometric features. In some embodiments, biometric module 109 stores the information about the enrolled biometric features in association with a user account of device 100. In some embodiments, biometric module 109 compares the received biometric information to an enrolled biometric feature to determine whether the received biometric information matches the enrolled biometric feature.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Authentication module 105 determines whether a requested operation (e.g., requested by an application of applications 136) is authorized to be performed. In some embodiments, authentication module 105 receives for an operation to be perform that optionally requires authentication. Authentication module 105 determines whether the operation is authorized to be performed, such as based on a series of factors, including the lock status of device 100, the location of device 100, whether a security delay has elapsed, whether received biometric information matches enrolled biometric features, and/or other factors. Once authentication module 105 determines that the operation is authorized to be performed, authentication module 105 triggers performance of the operation.

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript® file. In some embodiments, a widget includes an XML (Extensible Markup Language) file and a JavaScript® file (e.g., Yahoo!® Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
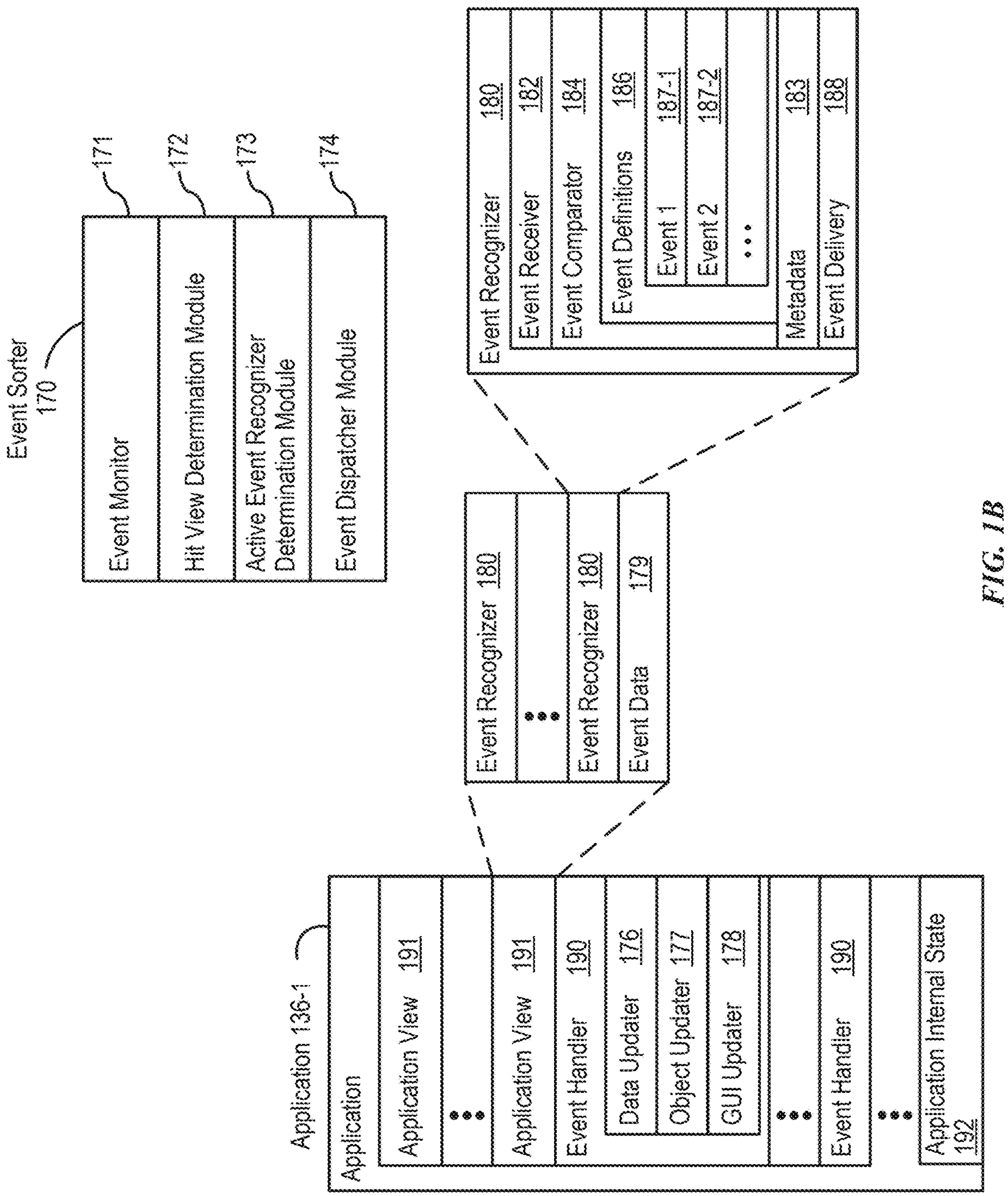
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3A) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
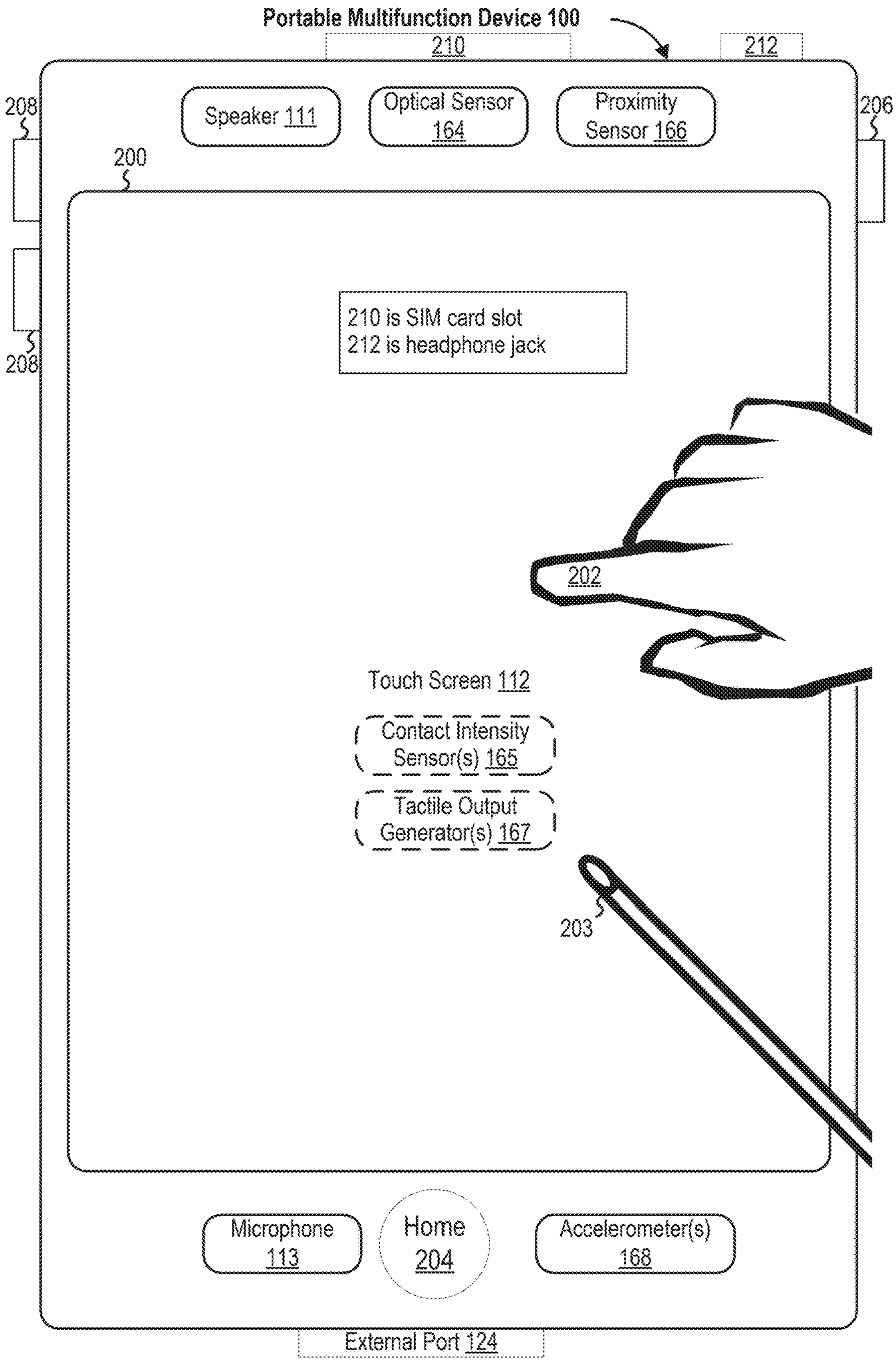
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
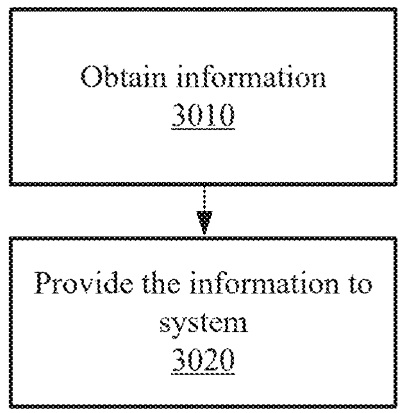
FIGS. 3B-3G illustrate the use of Application Programming Interfaces (APIs) to perform operations.
Figure 3C:
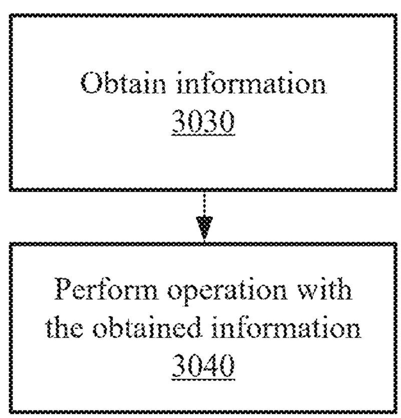

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
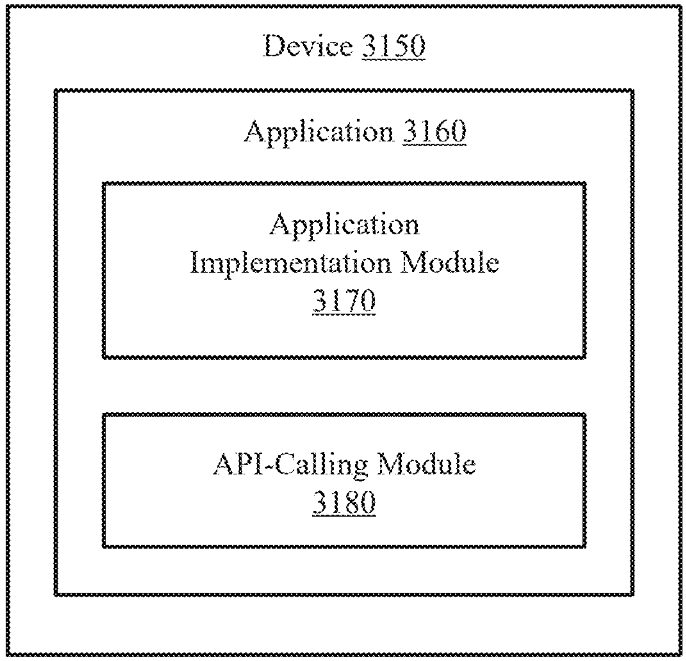
Figure 3E:
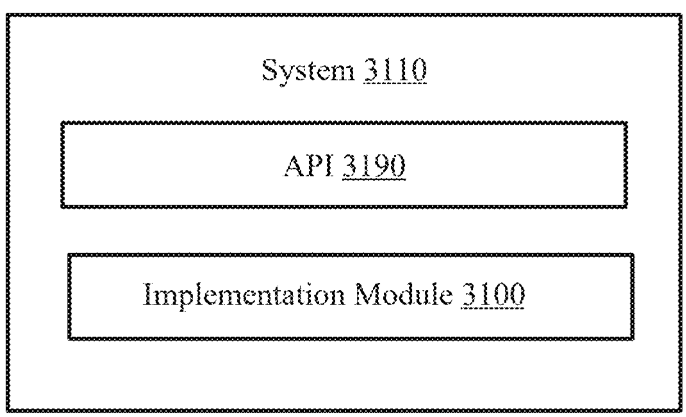
Figure 3F:
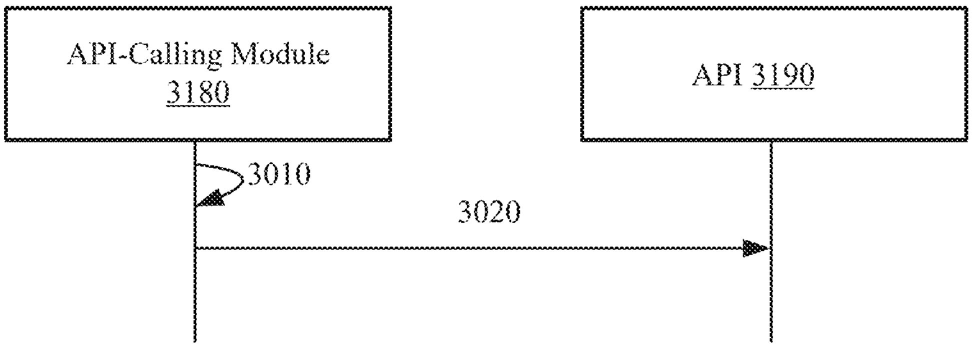

Referring to FIG. 3B and FIG. 3F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
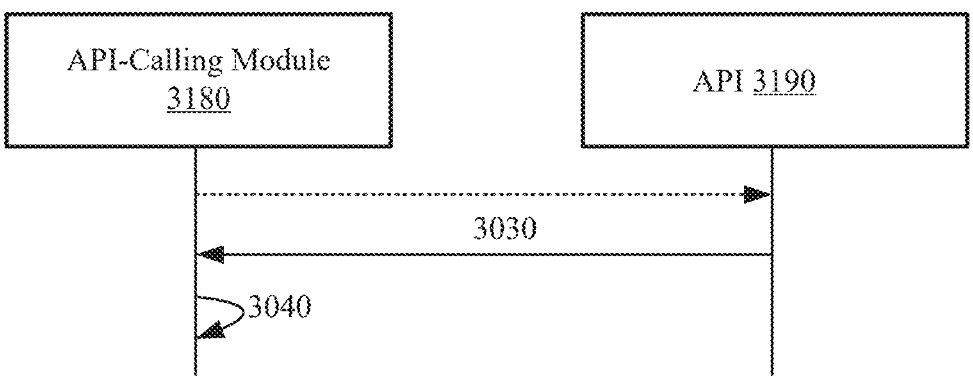

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform methods 700, 900, 1100, 1300, 1500, 1700, 1900, and/or 2100 (FIGS. 7, 9A-9B, 11A-11B, 13, 15, 17, 19, and/or 21) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed towards embodiments of user interfaces that are, optionally, implemented on, for example, portable multifunction device 100.

Figure 4A:
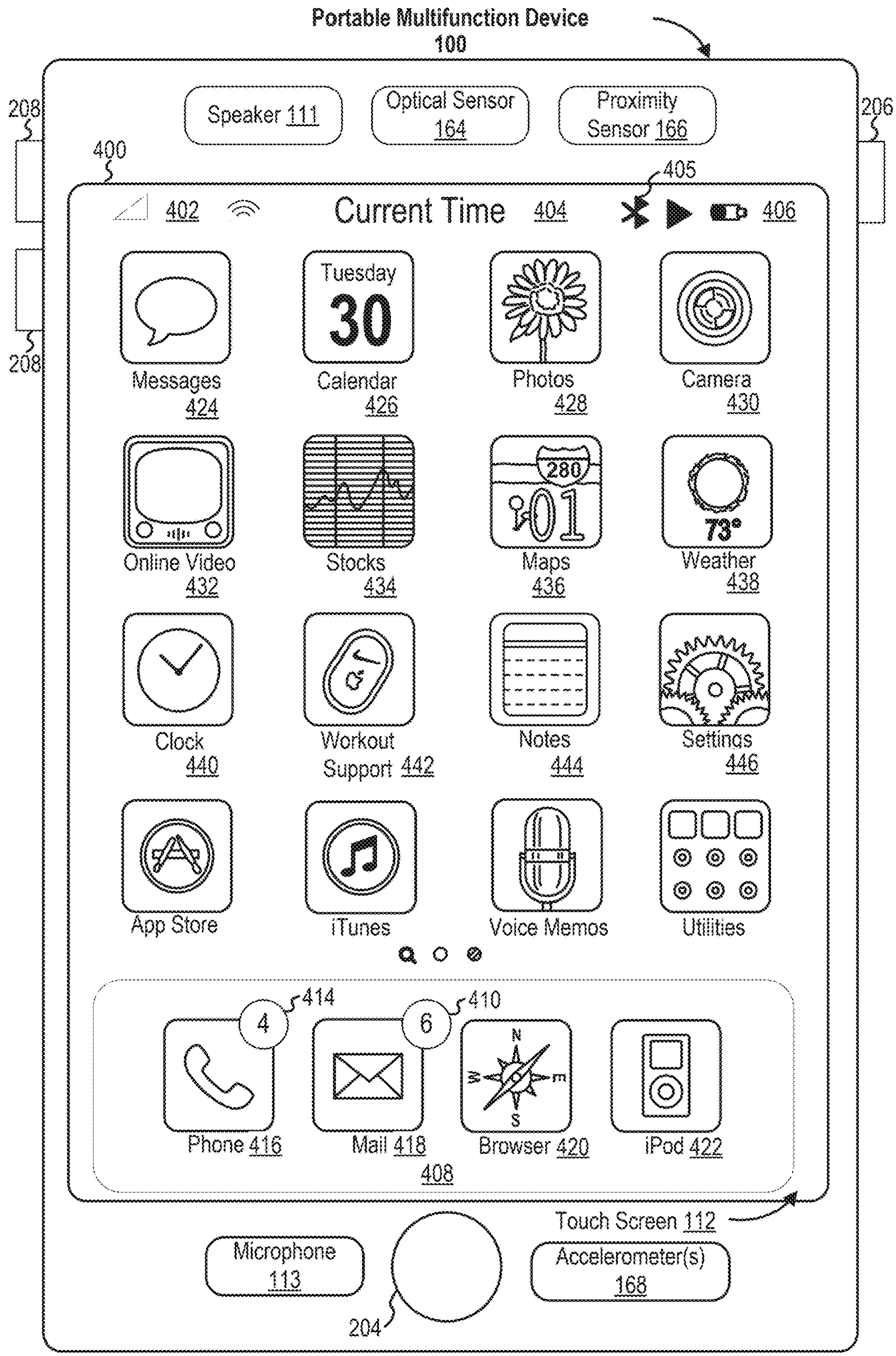
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;")
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
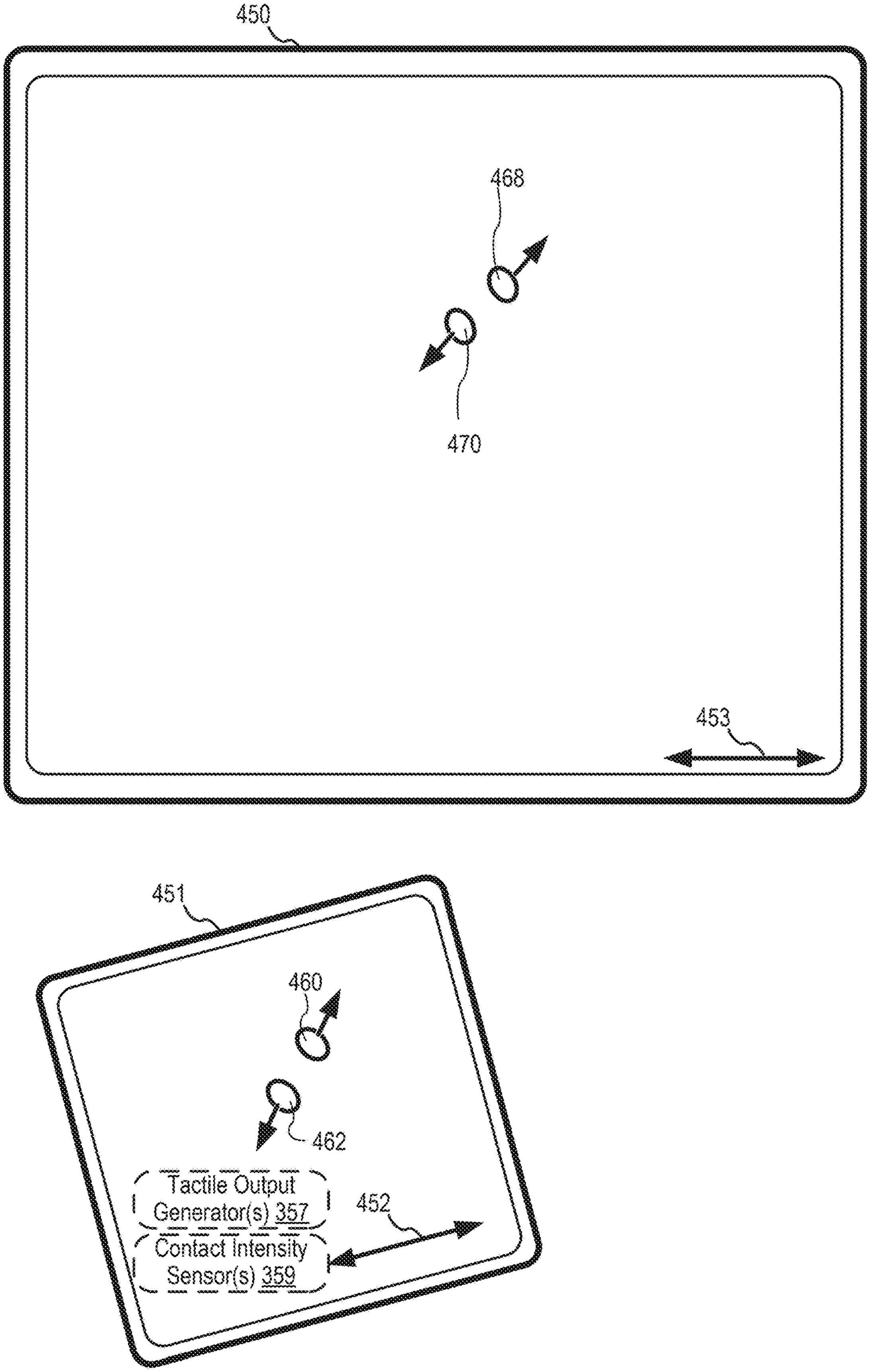
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contact 460 and contact 462, and movements thereof) detected by the device on the touch-sensitive surface (e.g., touch-sensitive surface 451 in FIG. 4B) are used by the device to manipulate the user interface on the display (e.g., display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
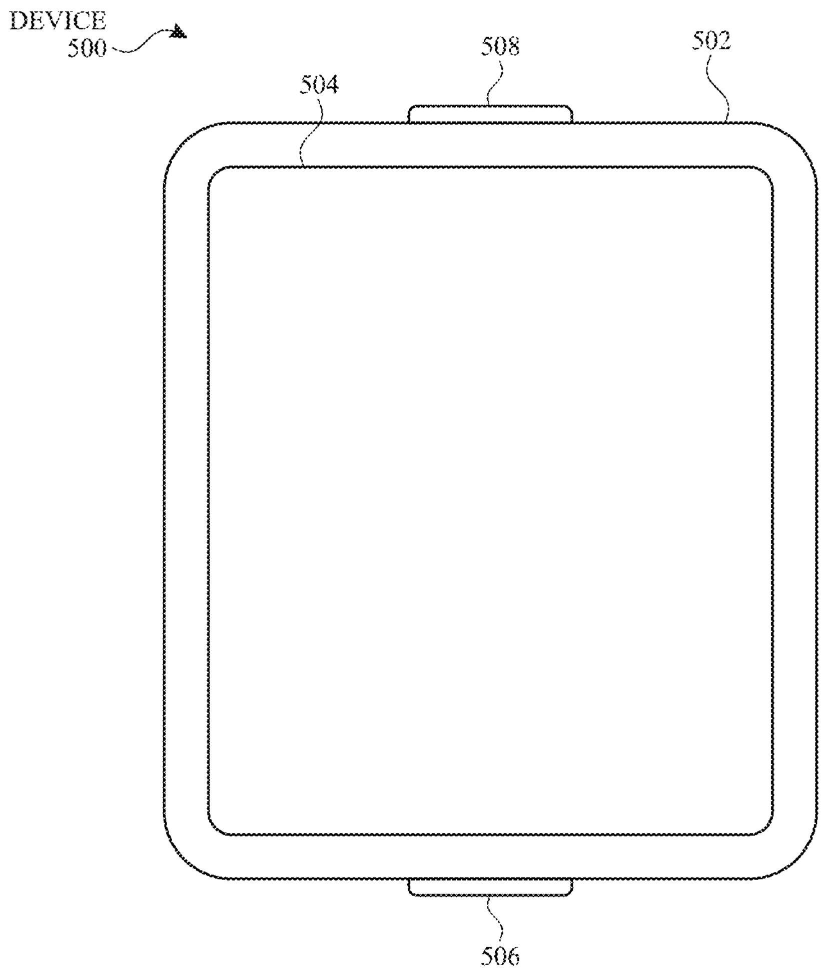
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
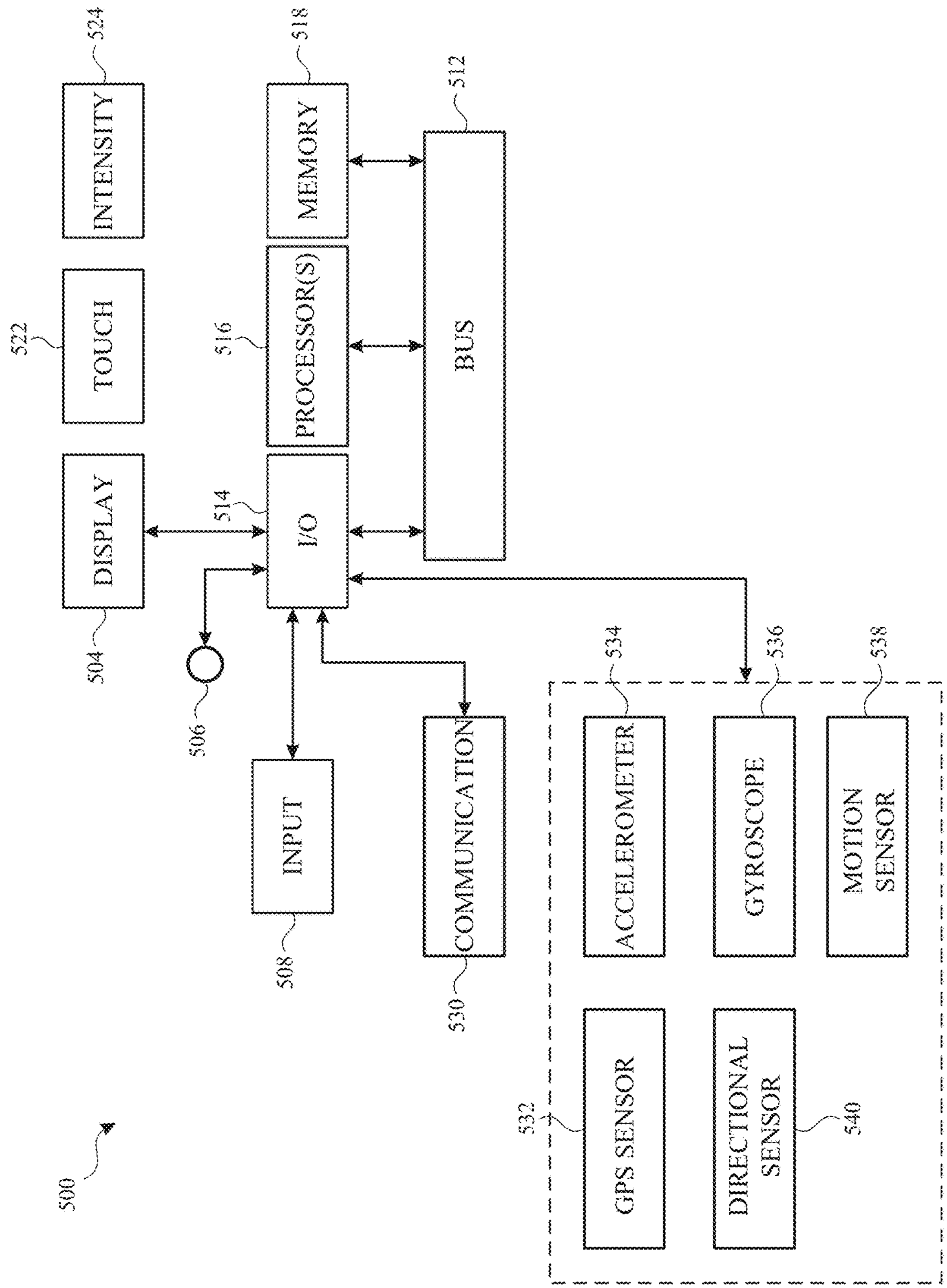
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3A. Device 500 has bus 512 that operatively couples I/O section 514 with one or more computer processors 516 and memory 518. I/O section 514 can be connected to display screen 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage media, for storing computer-executable instructions, which, when executed by one or more computer processors 516, for example, can cause the computer processors to perform the techniques described below, including processes described with respect to FIGS. 7, 9A-9B, 11A-11B, 13, 15, 17, 19, and 21 (processes 700, 900, 1100, 1300, 1500, 1700, 1900, and 2100). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray® technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3A, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
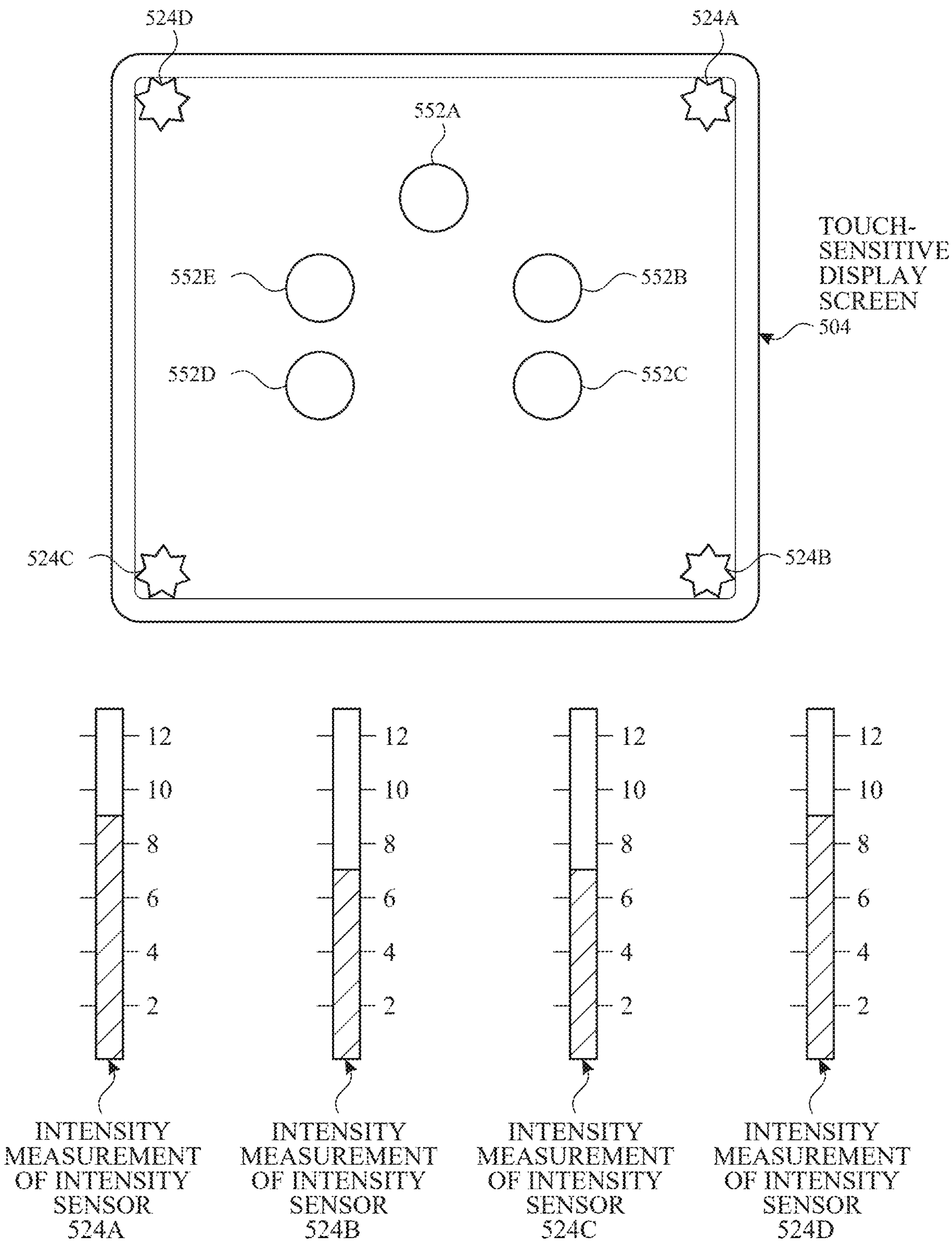
FIGS. 5C-5D illustrate exemplary components of a personal electronic device having a touch-sensitive display and intensity sensors in accordance with some embodiments.
Figure 5D:
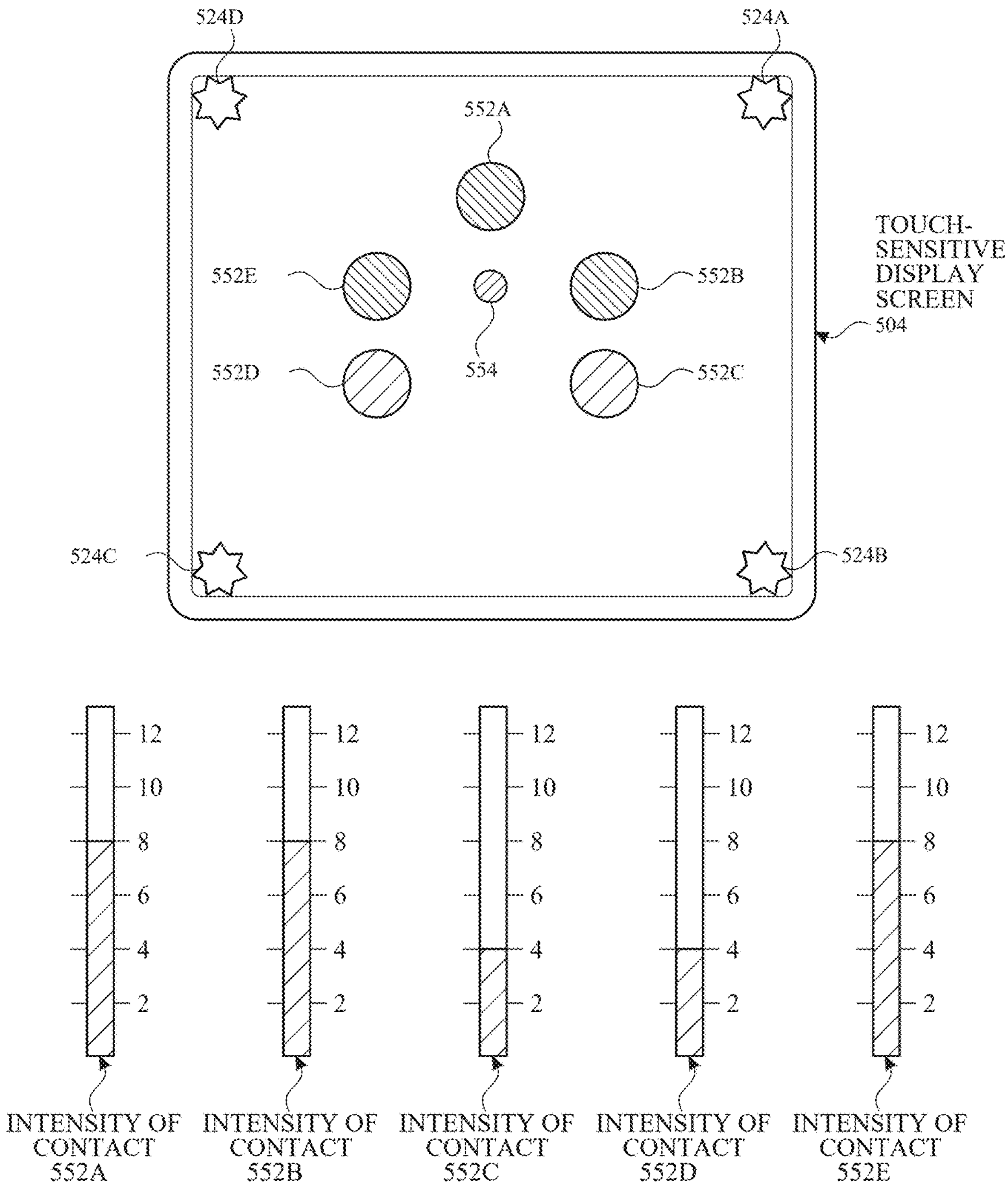

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
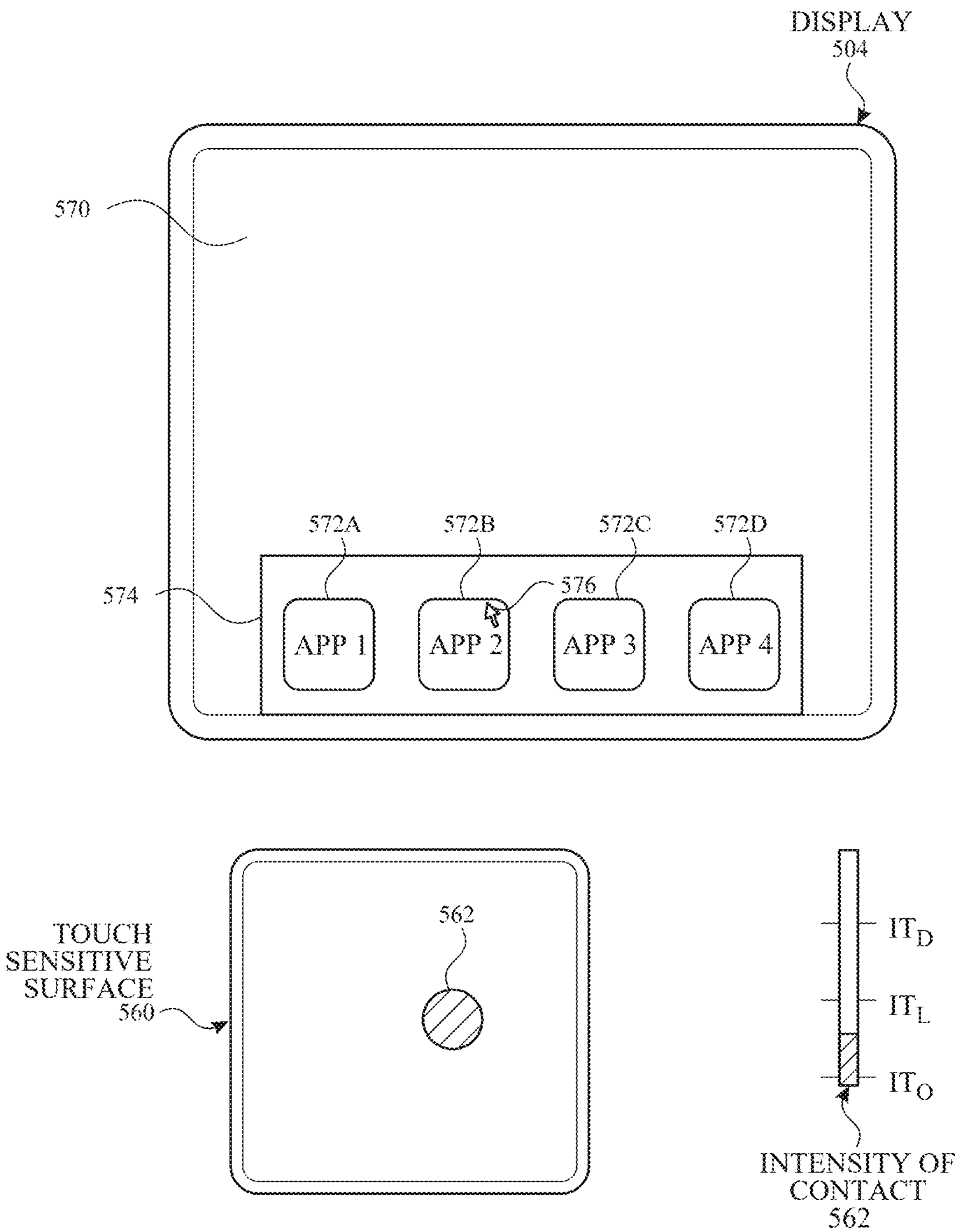
FIGS. 5E-5H illustrate exemplary components and user interfaces of a personal electronic device in accordance with some embodiments.
Figure 5F:
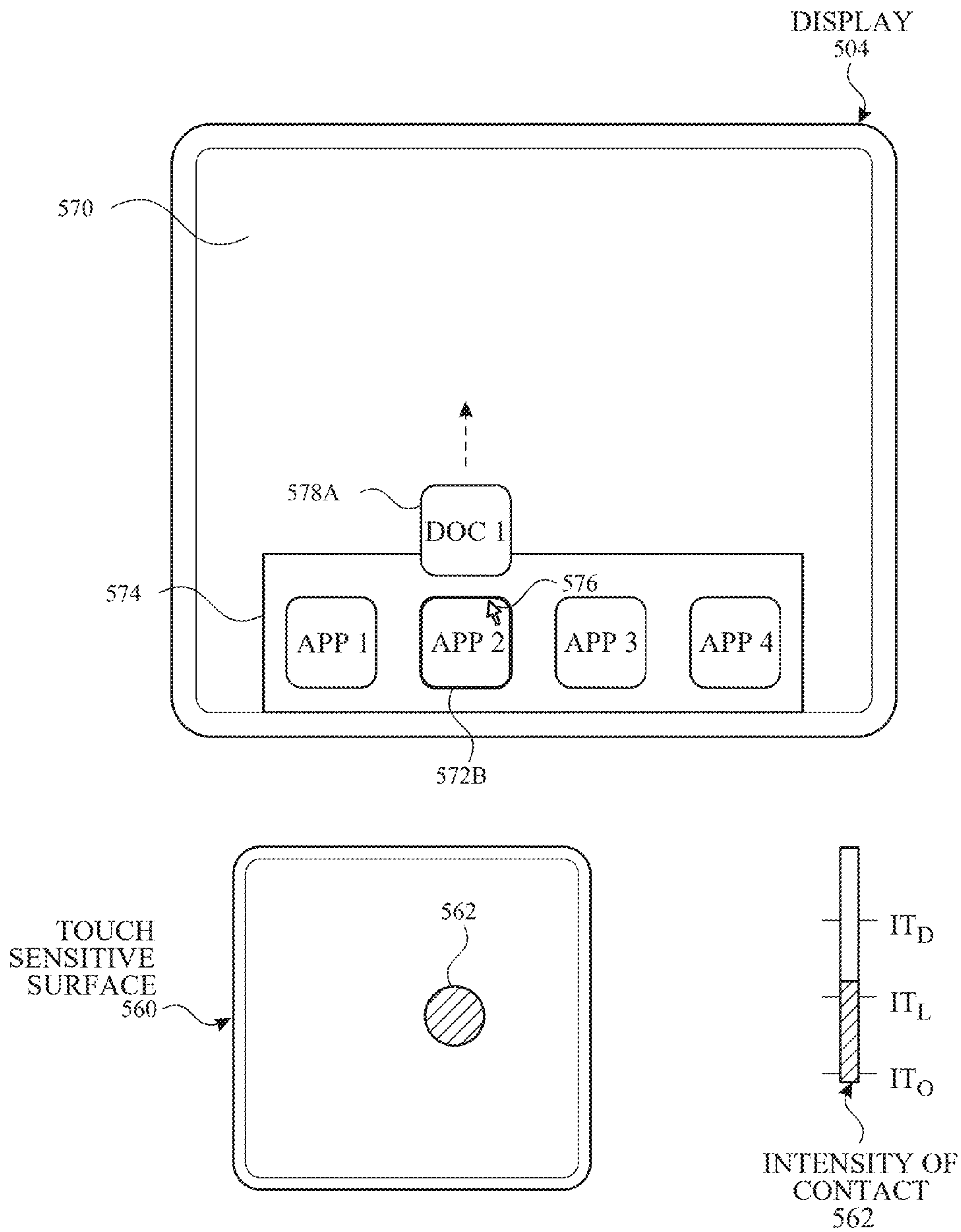
Figure 5G:
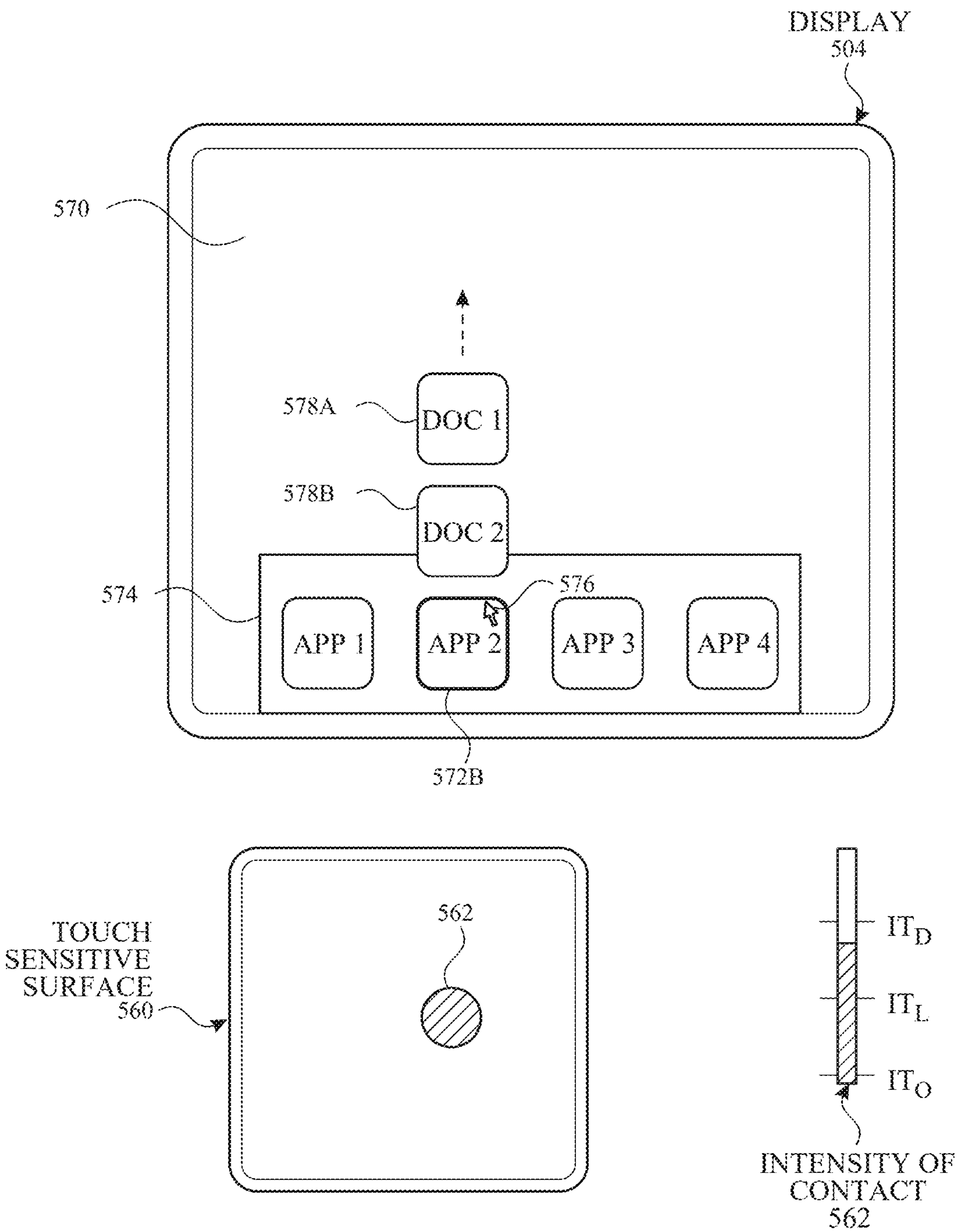
Figure 5H:
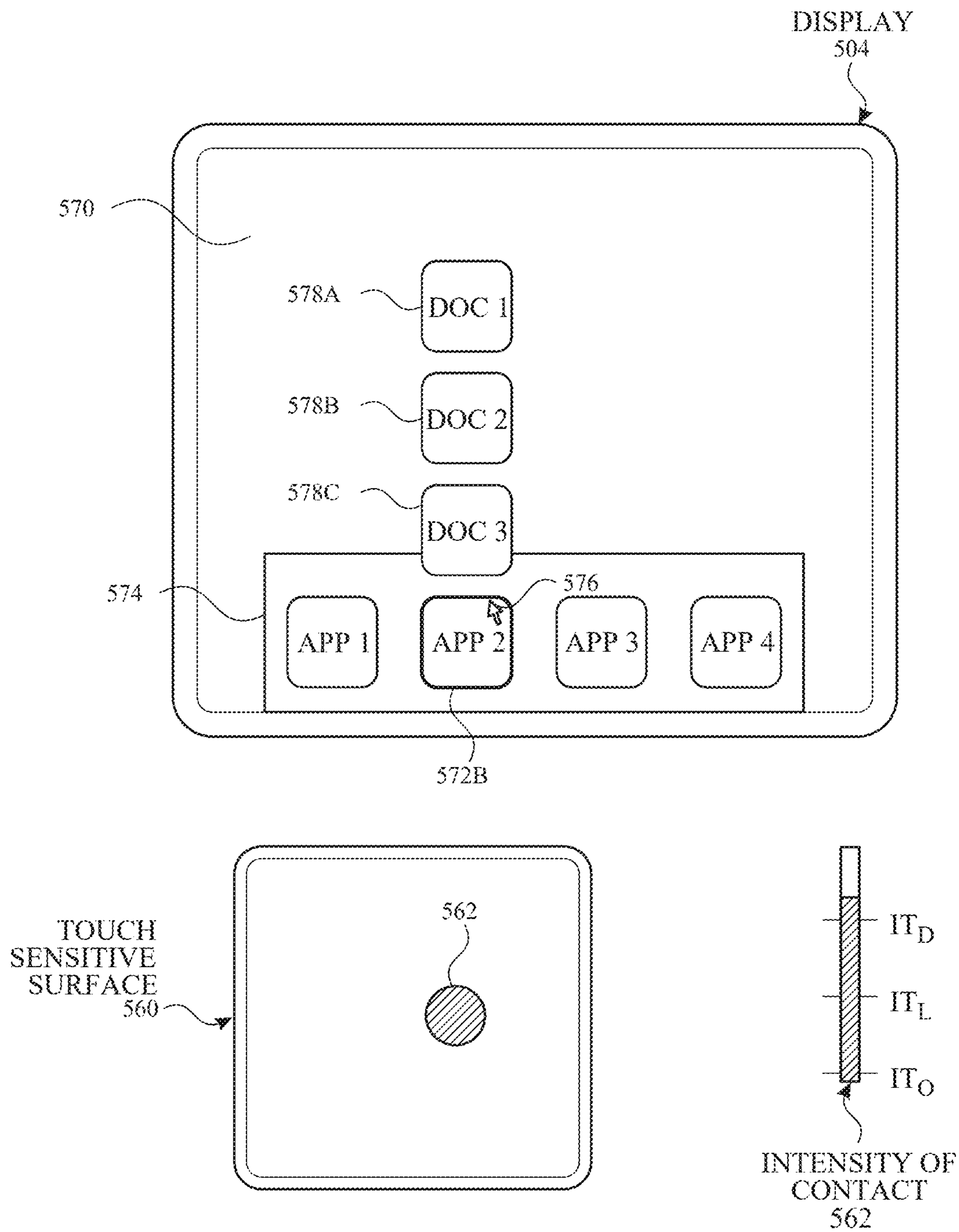

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display screen 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application Ser. No. 16/134,49737 does not close the first application. When the second application is displayed and the first application ceases to be displayed, the first application becomes a background application.

As described herein, content is automatically generated by one or more computers in response to a request to generate the content. The automatically-generated content is optionally generated on-device (e.g., generated at least in part by a computer system at which a request to generate the content is received) and/or generated off-device (e.g., generated at least in part by one or more nearby computers that are available via a local network or one or more computers that are available via the internet). This automatically-generated content optionally includes visual content (e.g., images, graphics, and/or video), audio content, and/or text content.

In some embodiments, novel automatically-generated content that is generated via one or more artificial intelligence (AI) processes is referred to as generative content (e.g., generative images, generative graphics, generative video, generative audio, and/or generative text). Generative content is typically generated by an AI process based on a prompt that is provided to the AI process. An AI process typically uses one or more AI models to generate an output based on an input. An AI process optionally includes one or more pre-processing steps to adjust the input before it is used by the AI model to generate an output (e.g., adjustment to a user-provided prompt, creation of a system-generated prompt, and/or AI model selection). An AI process optionally includes one or more post-processing steps to adjust the output by the AI model (e.g., passing AI model output to a different AI model, upscaling, downscaling, cropping, formatting, and/or adding or removing metadata) before the output of the AI model used for other purposes such as being provided to a different software process for further processing or being presented (e.g., visually or audibly) to a user. An AI process that generates generative content is sometimes referred to as a generative AI process.

A prompt for generating generative content can include one or more of: one or more words (e.g., a natural language prompt that is written or spoken), one or more images, one or more drawings, and/or one or more videos. AI processes can include machine learning models including neural networks. Neural networks can include transformer-based deep neural networks such as large language models (LLMs). Generative pre-trained transformer models are a type of LLM that can be effective at generating novel generative content based on a prompt. Some AI processes use a prompt that includes text to generate either different generative text, generative audio content, and/or generative visual content. Some AI processes use a prompt that includes visual content and/or an audio content to generate generative text (e.g., a transcription of audio and/or a description of the visual content). Some multi-modal AI processes use a prompt that includes multiple types of content (e.g., text, images, audio, video, and/or other sensor data) to generate generative content. A prompt sometimes also includes values for one or more parameters indicating an importance of various parts of the prompt. Some prompts include a structured set of instructions that can be understood by an AI process that include phrasing, a specified style, relevant context (e.g., starting point content and/or one or more examples), and/or a role for the AI process.

Generative content is generally based on the prompt but is not deterministically selected from pre-generated content and is, instead, generated using the prompt as a starting point. In some embodiments, pre-existing content (e.g., audio, text, and/or visual content) is used as part of the prompt for creating generative content (e.g., the pre-existing content is used as a starting point for creating the generative content). For example, a prompt could request that a block of text be summarized or rewritten in a different tone, and the output would be generative text that is summarized or written in the different tone. Similarly, a prompt could request that visual content be modified to include or exclude content specified by a prompt (e.g., removing an identified feature in the visual content, adding a feature to the visual content that is described in a prompt, changing a visual style of the visual content, and/or creating additional visual elements outside of a spatial or temporal boundary of the visual content that are based on the visual content). In some embodiments, a random or pseudo-random seed is used as part of the prompt for creating generative content (e.g., the random or pseud-random seed content is used as a starting point for creating the generative content). For example, when generating an image from a diffusion model, a random noise pattern is iteratively denoised based on the prompt to generate an image that is based on the prompt. While specific types of AI processes have been described herein, it should be understood that a variety of different AI processes could be used to generate generative content based on a prompt.

Attention is now directed towards embodiments of user interfaces ("UI") and associated processes that are implemented on an electronic device, such as portable multifunction device 100, device 300, or device 500.

FIGS. 6A-6AM illustrate exemplary techniques and systems for controlling a computer system based on variable characteristics of hardware inputs, in accordance with some embodiments. The user interfaces in these figures are used to illustrate the processes described below.

Figure 6B:
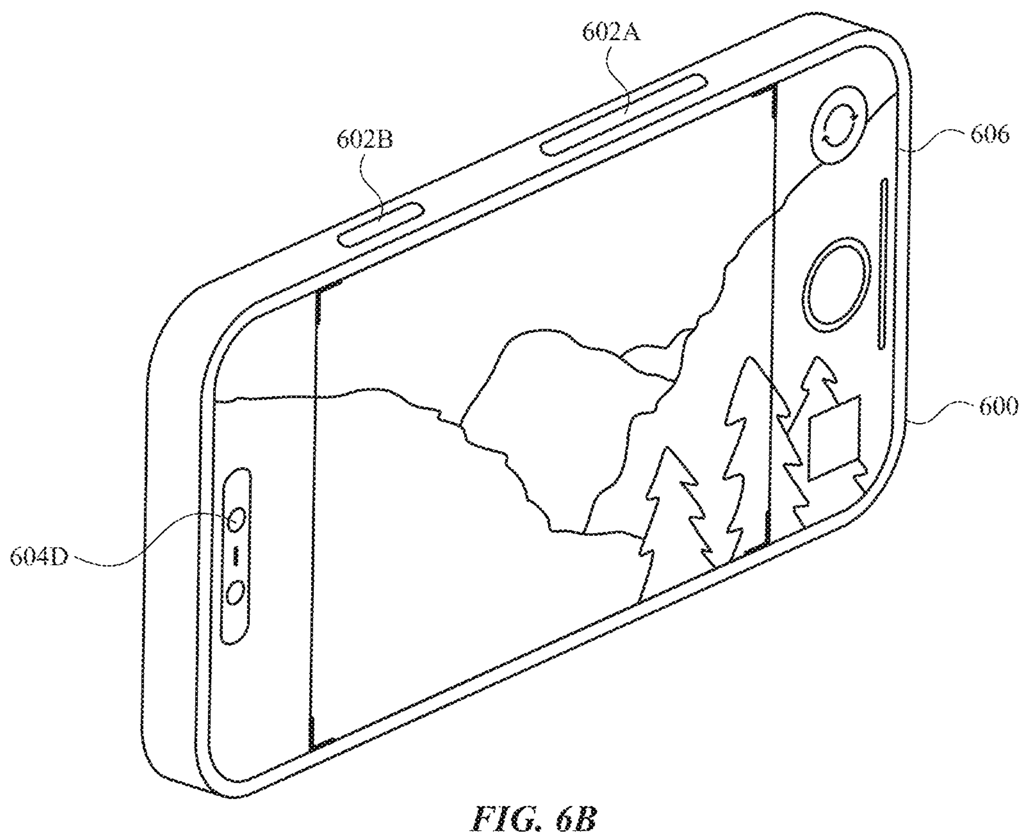
Figure 6C:
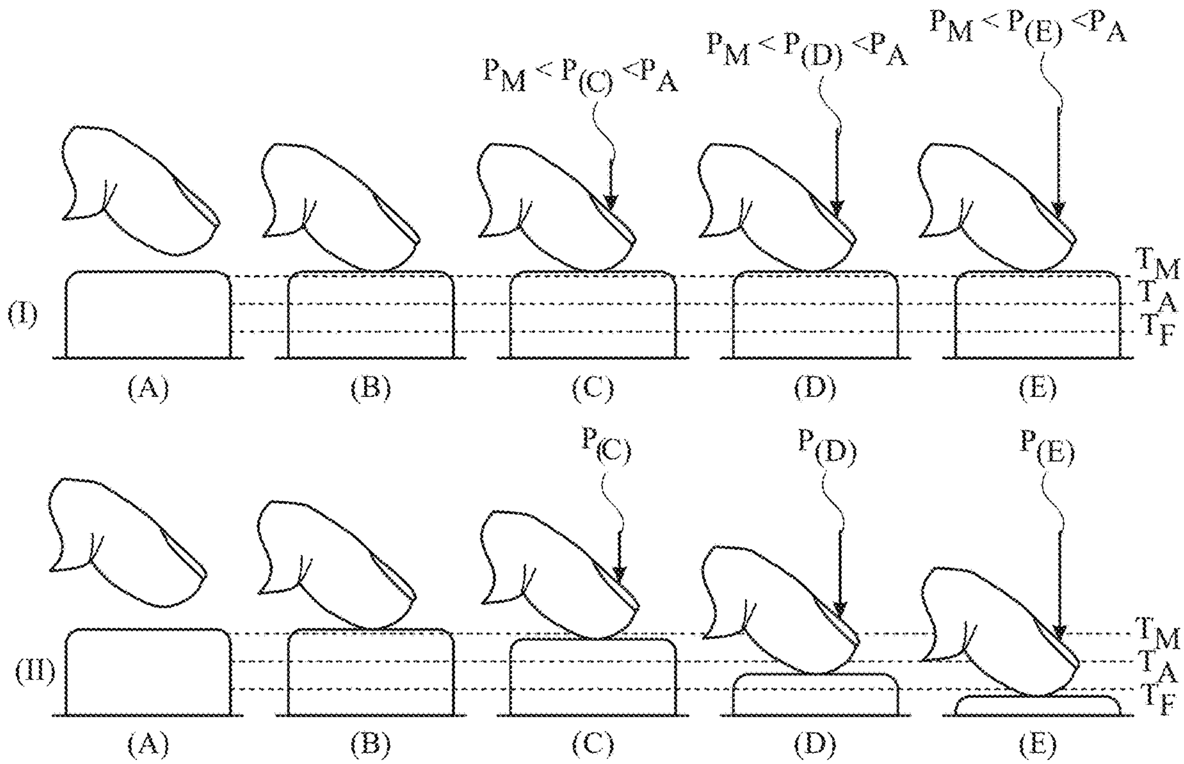

FIGS. 6A, 6B, and 6C illustrate back (e.g., FIG. 6A), isometric (e.g., FIG. 6B), and front (e.g., FIG. 6D) views of computer system 600 (e.g., a mobile phone device) that includes a set of hardware buttons including first button 602A, second button 602B, third button 602C, and fourth button 602D, a set of cameras including first camera 604A, second camera 604B, third camera 604C, and 604D, and a display 606 including a touch-sensitive surface. As illustrated in FIG. 6C, the set of hardware buttons including first button 602A are arranged outside of the display on the edges of computer system 600. In FIGS. 6A and 6C-6AM, the set of hardware buttons including first button 602A are illustrated as extending up (e.g., protruding) from the edge of device 600; however, as illustrated in FIG. 6B, in some embodiments, the set of hardware buttons including first 602A are flush with, or even inset below, the edge of device 600. It should be noted that buttons that are flush with or inset below the edge of the device are less prone to accidental activation while the device is being held.

In some embodiments, the set of hardware buttons may include different numbers of buttons, different arrangements of buttons, different types of buttons (e.g., mechanical and/or solid-state buttons, described in further detail with respect to FIG. 6C), and/or compound buttons (e.g., one or more independently-operable buttons combined into a compound form or housing). In some embodiments, the set of cameras may include different numbers of cameras, different arrangements of cameras, and/or different types of cameras. For example, the different types of cameras may include one or more wide-angle lenses, one or more telephoto lenses, and/or one or more macro lenses. For example, the different types of cameras may vary in geometry (e.g., physical or equivalent focal lengths, such as 5 mm, 13 mm, 22 mm, 24 mm, 28 mm, 50 mm, 77 mm, 100 mm, and/or 300 mm, or f-stops of f/1.2, f/1.78, f/2.2, f/2.8, f/3.4, and/or f/8.4), resolution (e.g., 8 MP, 12 MP, 24 MP, 48 MP, and/or 72 MP), pixel size (e.g., 100 nm, 0.5 μm, 1.0 μm, 2.44 μm, 5 μm), and/or presence of other hardware features (e.g., dual or quad pixels, dual pixel autofocus capabilities, and/or optical image stabilization capabilities). In some embodiments, computer system 600 includes one or more sensors, such as light sensors, depth sensors, motion sensors, and/or audio sensors. In some embodiments, the methods described herein using computer system 600 are implemented using (e.g., in conjunction with computer system 600) one or more user devices (e.g., mobile phones, tablet computers, laptop computers, and/or wearable electronic devices (e.g., smart watches)), remote devices (e.g., servers and/or network-connected devices), and/or peripheral devices (e.g., external storage drives, microphones, speakers, and/or hardware input devices). In some embodiments, computer system 600 includes one or more features of devices 100, 300, or 500 (e.g., the set of cameras can include optical sensor 164).

FIG. 6C illustrates exemplary hardware button states (A)-(E) that can be detected by computer system 600 via the set of hardware buttons (e.g., first button 602A, second button 602B, third button 602C, and/or fourth button 602D). The top panel (I) illustrates an embodiment including a pressure-sensitive button that does not physically depress when pressure is applied by a user (e.g., a solid-state button), and the bottom panel (II) illustrates an embodiment including a mechanical button, which physically depresses when pressure is applied by a user (e.g., by the user's finger 608). In some embodiments, a pressure-sensitive button that does not physically depress (e.g., a solid-state button) includes one or more haptic (e.g., tactile) output generators that create the sensation of physically depressing the button by different amounts (e.g., as illustrated in bottom panel (II)) without the button actually moving (e.g., as illustrated in top panel (I)). In some embodiments, the solid-state button and/or the mechanical button include one or more pressure sensors, one or more capacitive (e.g., touch) sensors, and/or one or more intensity sensors (e.g., as described with respect to FIGS. 5C-5D). In some embodiments, computer system 600 may detect hardware button states (A)-(E) based on touch proximity, the directly-measured applied pressure, and/or the amount of physical (e.g., mechanical) depression of a button. In some embodiments, the pressure (e.g., intensity) thresholds and depression thresholds described below may correspond to the same states of the hardware button, for example, such that applying the threshold pressure values PM, PA, and/or PF physically depresses a hardware button to the respective depression levels TM, TA, and/or Tp. In some embodiments, one or more of the hardware buttons is a hybrid button that uses both intensity (e.g., pressure) sensitivity and mechanical depression to detect input characteristics, as described in further detail below. For example, one or more of hardware button states (A)-(E) are detected using the physical depression of the hybrid button (e.g., as a substitute measurement for force/pressure) and one or more of hardware button states (A)-(E) are detected using the intensity sensors of the hybrid button (e.g., directly measuring force/pressure applied to the hybrid button).

In some embodiments, the pressure (e.g., intensity) thresholds and depression thresholds described below are customizable. For example, a user can define custom values for threshold pressure values $P_M$, $P_A$, and/or $P_F$ and/or threshold depression levels $T_M$, $T_A$, and/or $T_F$ by inputting numeric values, adjusting threshold controls in a user interface (e.g., using displayed sliders, dials, or menus to adjust the thresholds up and down and/or to select between different presets), and/or inputting presses of different intensities in a testing user interface to generate one or more of the thresholds based on detected characteristics of the test presses. Accordingly, references to the hardware button states (e.g., (A)-(E)) and press types (e.g., light/partial presses and/or hard/full presses) described with respect to said thresholds are to be understood as being implemented with threshold pressure values $P_M$, $P_A$, and/or $P_F$ and/or threshold depression levels $T_M$, $T_A$, and/or $T_F$ as currently defined by computer system 600. Additionally, in some embodiments, the pressure (e.g., intensity) thresholds and depression thresholds described below differ between two or more different hardware buttons of a plurality of hardware buttons. For example, the threshold pressure values $P_M$, $P_A$, and/or $P_F$ and/or the threshold depression levels $T_M$, $T_A$, and/or $T_F$ for first button 602A are different than the threshold pressure values $P_M$, $P_A$, and/or $P_F$ and/or the threshold depression levels $T_M$, $T_A$, and/or $T_F$ for second button 602B. For example, a user can define different custom values for two or more different hardware buttons.

As illustrated in FIG. 6C, computer system 600 detects hardware button state (A) when a user is not using or pressing the hardware button. Accordingly, as illustrated in bottom panel (II), in hardware button state (A), the mechanical button is not (e.g., 0%) physically depressed (e.g., the mechanical button is in a "rest" position). Computer system 600 detects hardware button state (B) when a finger is detected (e.g., using the one or more capacitive sensors) near (e.g., hovering over) or resting on (e.g., touching, but not pressing) the button. As illustrated in bottom panel (II), in hardware button state (B), the mechanical button remains in the rest position. In some embodiments, computer system 600 may detect hardware button state (B) when less than a maintenance pressure threshold $P_M$ (e.g., 5 g/cm$^2$, 10 g/cm$^2$, 16 g/cm$^2$, or 20 g/cm$^2$) is detected (e.g., using the one or more pressure sensors) and/or when a mechanical button is physically depressed less than a maintenance depression threshold $T_M$ (e.g., the least-depressed state illustrated in bottom panel (II); e.g., 2% depressed, 5% depressed, 10% depressed, or 18% depressed).

Computer system 600 detects hardware button state (C) when the user begins to press the hardware button. In some embodiments, computer system 600 detects hardware button state (C) when a user applies pressure P (c) to the button, where P (c) is less than an activation pressure threshold $P_A$ (e.g., 25 g/cm$^2$, 50 g/cm$^2$, 75 g/cm$^2$, 82 g/cm$^2$, or 100 g/cm$^2$) and, in some embodiments, greater or equal to than the maintenance pressure threshold $P_M$. In some embodiments, computer system 600 detects hardware button state (C) when a mechanical button is physically depressed less than an activation depression threshold $T_A$ (e.g., the partially-depressed state illustrated in bottom panel (II); e.g., 15% depressed, 30% depressed, 40% depressed, 43% depressed, or 50% depressed) and, in some embodiments, physically depressed to at least the maintenance depression threshold $T_M$.

Computer system 600 registers a "light" or "partial" press (e.g., a first type of button press) of the hardware button when computer system 600 detects hardware button state (D). In some embodiments, computer system 600 detects hardware button state (D) when a user applies pressure P (D) to the button, where P (D) is less than a hard-press pressure threshold PH (e.g., 75 g/cm$^2$, 100 g/cm$^2$, 123 g/cm$^2$, or 150 g/cm$^2$) and greater than or equal to the activation pressure threshold $P_A$. In some embodiments, computer system 600 detects hardware button state (D) when a mechanical button is physically depressed less than a hard-press depression threshold TH (e.g., the mostly-depressed state illustrated in bottom panel (II); e.g., 65% depressed, 72% depressed, 80% depressed, or 90% depressed) and physically depressed to at least the activation depression threshold $T_A$. In some embodiments, once computer system 600 detects hardware button state (D) (e.g., "activating" the light/partial button press), computer system 600 will register hardware button state (C) (e.g., "maintaining" the light/partial button press) as a continued or maintained light/partial press (e.g., the first type of button press), for instance, until computer system 600 detects one of hardware button state (A), hardware button state (B) (e.g., releasing the light/partial button press), or hardware button state (E) (e.g., transitioning to a hard/full press, as described below). For example, once the user has activated a light/partial press by pressing a button with more than the activation pressure threshold $P_A$ and/or beyond the activation depression threshold $T_A$, the user can maintain the light/partial press with a lighter touch, as long as the button is still pressed with more than the maintenance pressure threshold $P_M$ and/or beyond the maintenance depression threshold $T_M$. In some embodiments, presses meeting a light press intensity threshold (e.g., as described above with respect to FIGS. 5C-5D) may be registered as light/partial-type button presses (for example, a light press intensity may correspond to hardware button state (C) and/or hardware button state (D)). As used herein, a light/partial press corresponds to a light press and/or a partial press, and a hard/full press corresponds to a hard and/or full press.

Computer system 600 registers as a "hard" or "full" press (e.g., a second type of button press) when computer system 600 detects hardware button state (E). In some embodiments, computer system 600 detects hardware button state (E) when a user applies pressure $P_{(E)}$ to the button, where $P_{(E)}$ is greater than or equal to the hard-press pressure threshold $P_H$, and/or when a mechanical button is physically depressed to at least the hard-press depression threshold $T_H$. In some embodiments, if computer system 600 detects hardware button state (E) less than a threshold duration of time (e.g., 0.1, 0.25 s, 0.5 s, 1 s, or 2 s) after detecting hardware button state (D), computer system 600 registers hardware button state (E) as a "quick" hard/full press and, in some embodiments, does not register or respond to the detection of hardware button state (D) as a light/partial press. For example, a user can provide a hard/full press without necessarily activating a light/partial press by quickly increasing pressure from activation pressure threshold $P_A$ to hard-press pressure threshold $P_H$ and/or quickly depressing the button from activation depression threshold $T_A$ to hard-press depression threshold $T_H$. In some embodiments, presses meeting a deep press intensity threshold (e.g., as described above with respect to FIGS. 5C-5D) may be registered as hard/full-type button presses (for example, a deep press intensity may correspond to hardware button state (E)).

In the following, where computer system 600 is described as "detecting" the intensity of a press, computer system 600 may measure the intensity directly, based on sensor data, and/or indirectly, based on physical depression to a certain state, for instance, depending on whether first button 602A is a solid-state or physically-depressible button and/or how many distinct physical depression states first button 602A has. For example, a hard/full press may be detected either by measuring an intensity greater than hard-press pressure threshold $P_H$ and/or detecting first button 602A depressing to hard-press depression threshold $T_H$. For example, using a hybrid button, a hard/full press is detected when the hybrid button has been physically depressed to hard-press depression threshold $T_H$, a light/partial press is detected by directly measuring an intensity greater than or equal to the activation pressure threshold $P_A$ (e.g., without physically depressing to hard-press depression threshold $T_H$), and maintenance of a light/partial press is detected by directly measuring an intensity greater or equal to than the maintenance pressure threshold $P_M$. In some embodiments, computer system 600 provides tactile feedback using the one or more haptic (e.g., tactile) output generators when a press reaches an intensity threshold measured using the intensity sensors (e.g., the user feels a vibration and/or other tactile sensation when inputting a light/partial press) but foregoes providing tactile feedback when a press reaches an intensity threshold measured using the mechanical states (e.g., because the user can physically feel the hardware button reaching the hard/full press state).

Figure 6D:
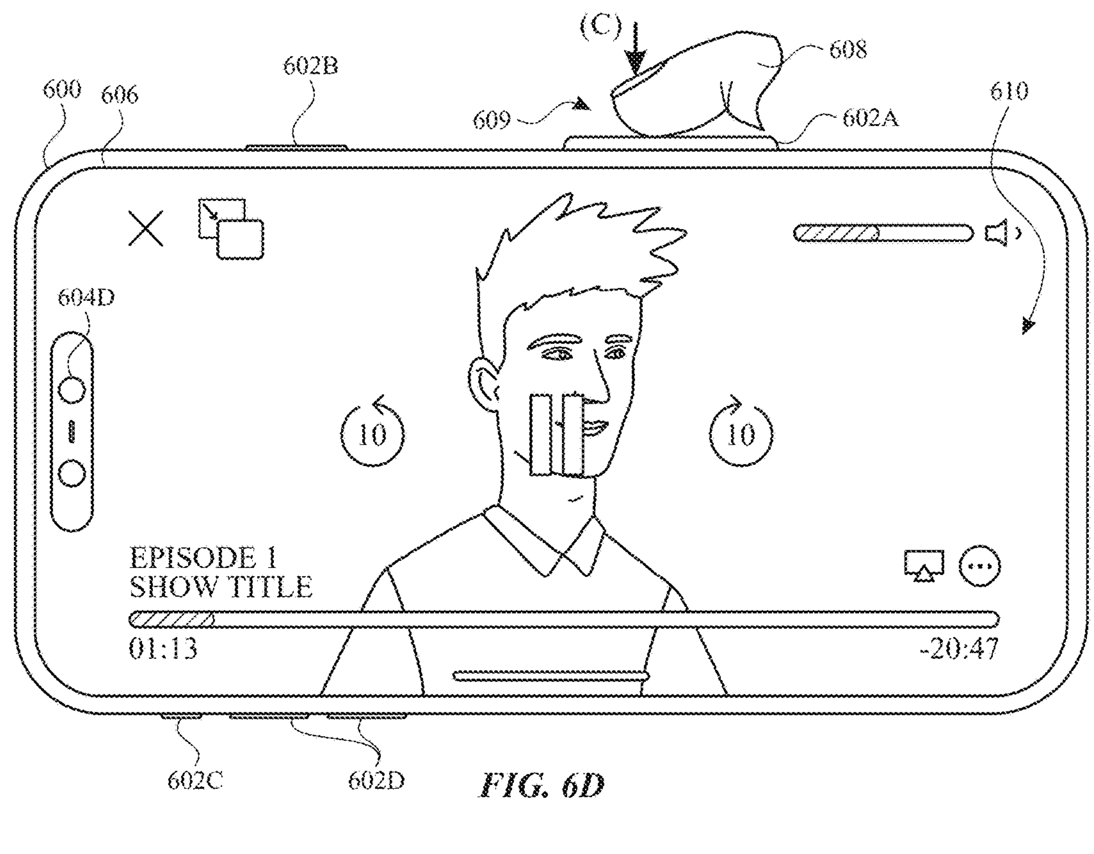
Figure 6E:
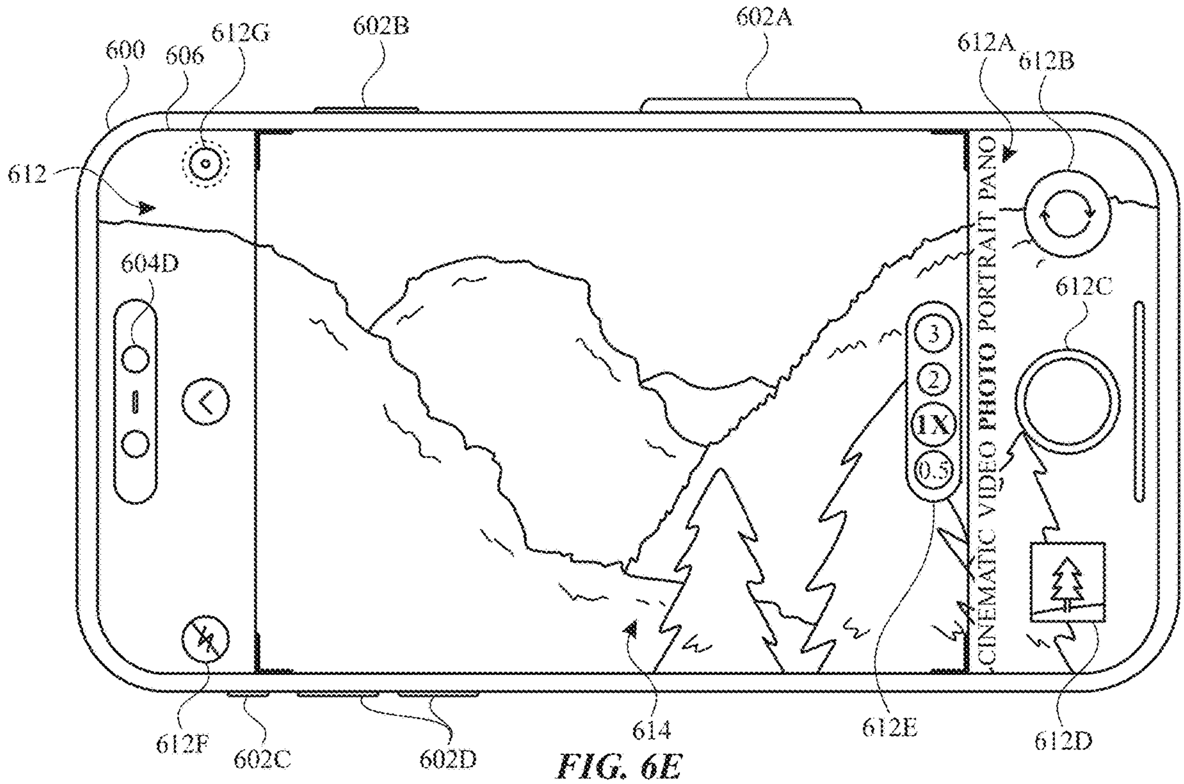

FIGS. 6D-6E illustrate using a press of one of the hardware buttons to launch a camera user interface from a non-camera context, such as a video application. As illustrated in FIG. 6D, while displaying user interface 610 for a media player application, computer system detects input 609, a press input of first button 602A. In some embodiments, input 609 is a particular type of input, such as a hard/full press placing first button 602A into hardware button state (E) or a light/partial press placing first button 602A into hardware button state (D).

In response to detecting input 609, at FIG. 6E, computer system 600 launches camera user interface 612 of a first-party camera application of computer system 600, for example, opening and/or displaying the first-party camera application. In some embodiments, computer system 600 launches camera user interface 612 in response to press inputs of first button 602A such as 609 if camera user interface 612 is associated with first button 602A and will launch a different camera user interface (e.g., 1046) if the other camera is associated with first button 602A. For example, the user can select between a plurality of camera utilities (e.g., user interfaces and/or applications) to associate with first button 602A using a settings menu for computer system 600 (e.g., as described in more detail with respect to FIGS. 10A-10W). In some embodiments, computer system 600 launches camera user interface 612, the associated camera utility, in response to press inputs of first button 602A, such as 609 if the press input is detected while displaying a non-camera user interface, such as user interface 610 for a media player application, a home or lock screen of computer system 600, an application without a camera utility (e.g., a game, a clock application, and/or a podcast application), and/or a non-camera user interface of an application that includes an embedded camera utility (e.g., a social media application, a financial application, a creative application, and/or a messaging application).

As illustrated in FIG. 6E, camera user interface 612 includes touch controls 612A-612G for navigating, using, assisting with, and/or changing settings of the camera user interface via the touch-sensitive surface of display 606, and camera preview 614, which represents a portion of the field-of-view of the set of cameras of computer system 600, e.g., as it would currently be captured in a photo or video capture. Capture mode affordance 612A is a menu (e.g., a sliding toolbar) for selecting between capture modes including a standard photo capture mode (e.g., a mode for capturing photo media that are not designated for display with synthetic depth-of-field effects), a portrait capture mode (e.g., a mode for capturing photo media that are designated for display with synthetic depth-of-field effects, lighting effects, and/or other post-processing effects), a panoramic photo capture mode (e.g., a mode for capturing photos from different positions and/or angles that are stitched together to create a single, larger form-factor image), a standard video capture mode (e.g., a mode for capturing video media that are not designated for display with synthetic depth-of-field effects), and/or a cinematic video capture mode (e.g., a mode for capturing video media that are designated for display with synthetic depth-of-field effects, lighting effects, and/or other post-processing effects). Camera selection affordance 612B is a software button for switching between capture using a front-facing (e.g., environment-facing) camera (e.g., first camera 604A, second camera 604B, and/or third camera 604C) and using a back-facing (e.g., user-facing) camera (e.g., fourth camera 604D). Shutter affordance 612C is a software button that can be selected to initiate the capture of media. Captured media icon 612D is a selectable thumbnail icon that previews captured media and can be selected to view captured media (e.g., in a media viewing or media library user interface). Zoom affordance 612E is a menu (e.g., a platter of multiple software buttons) for changing the capture magnification and/or switching between cameras/lenses with different magnification. Multi-frame photo affordance 612F is a software button for toggling between capturing single-frame/still photo capture and capturing photo media with a limited duration (e.g., 1, 3, and/or 5 seconds), for example, including content from before and/or after a capture input is detected that can be displayed in sequence for a "live" effect. Camera flash affordance 612G is a software button for selecting a camera flash mode (e.g., on, off, or automatic).

Figure 6F:
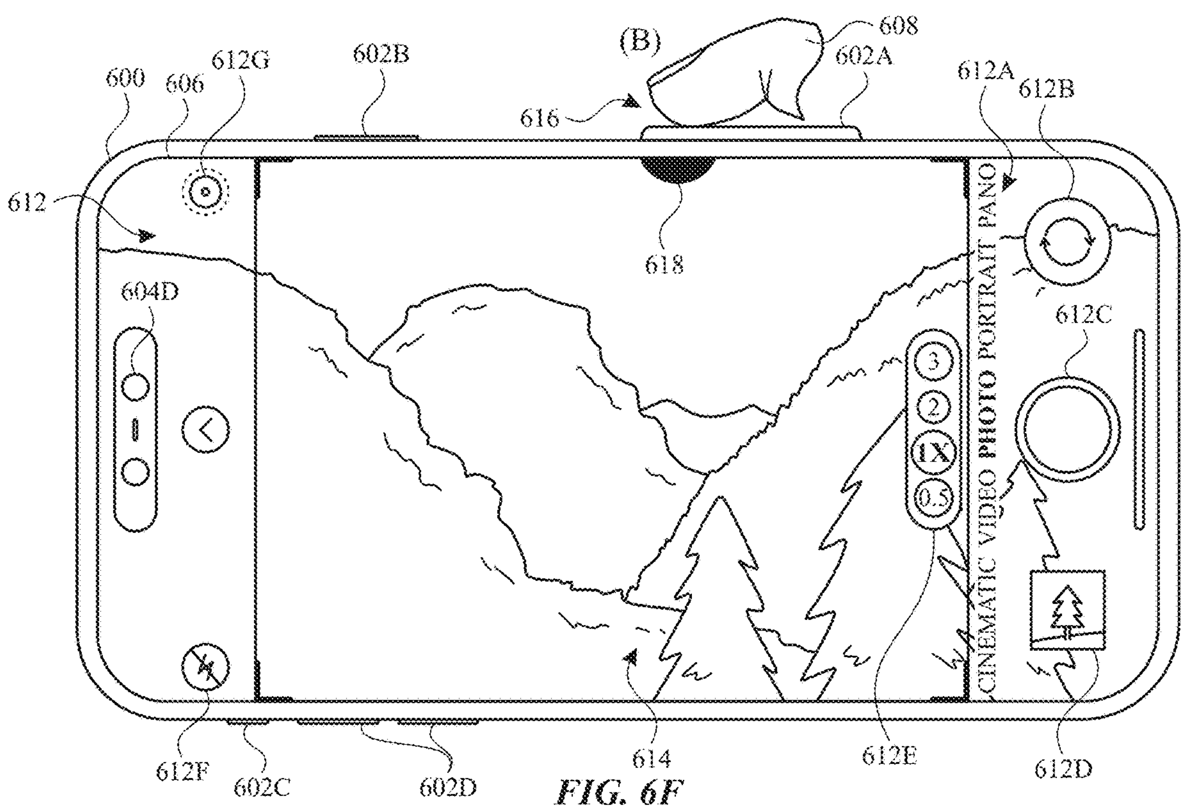
Figure 6G:
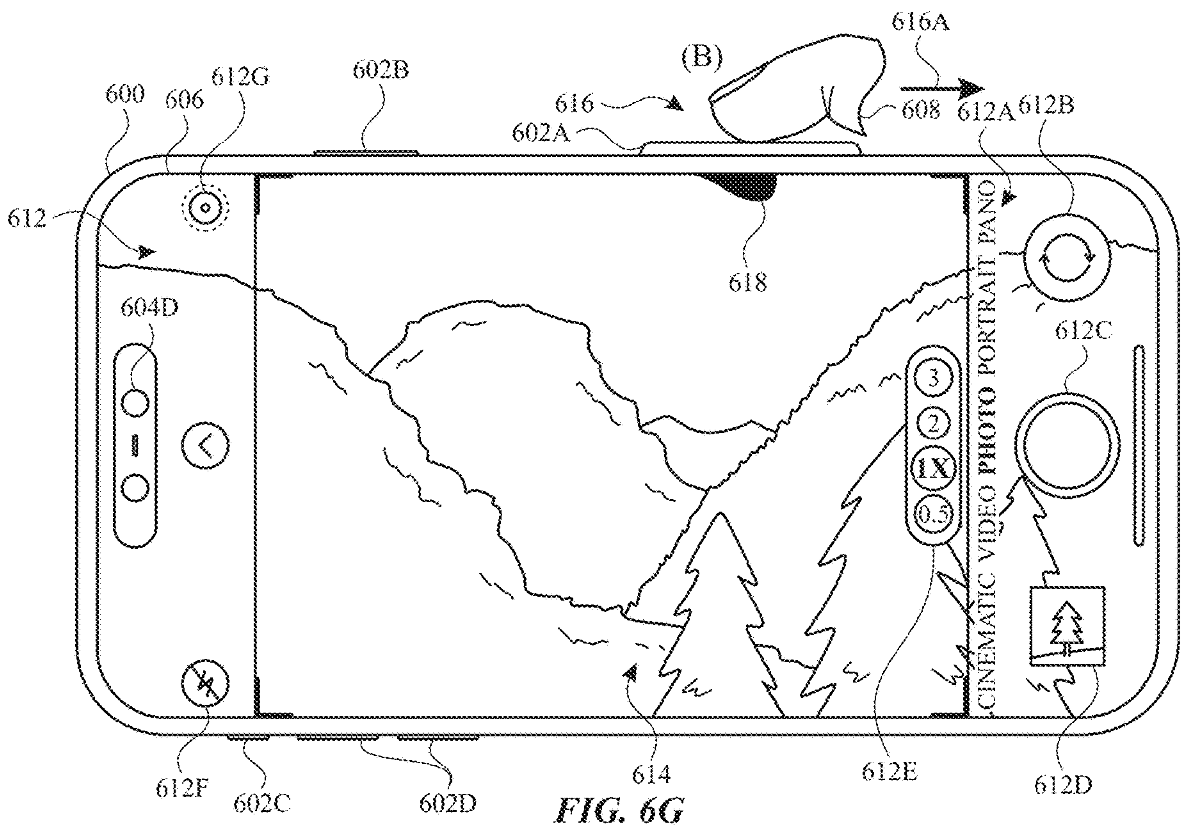
Figure 6H:
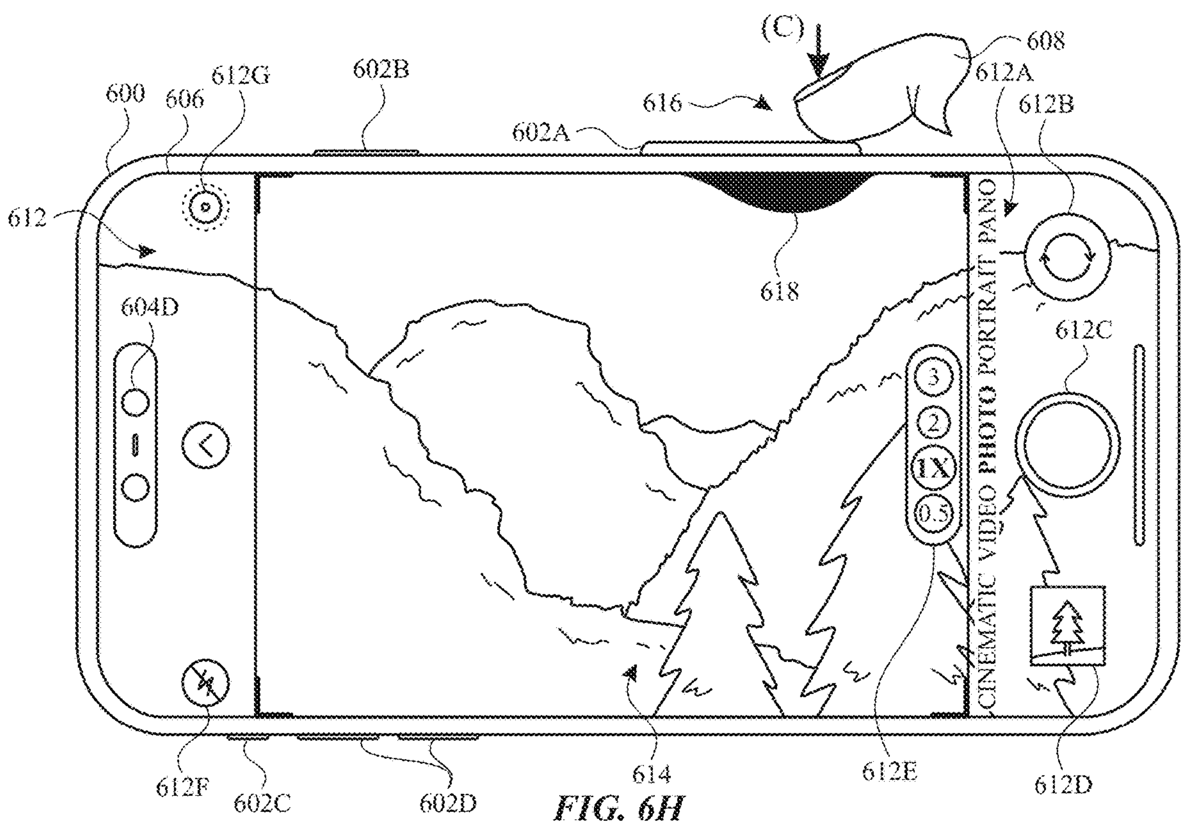
Figure 6I:
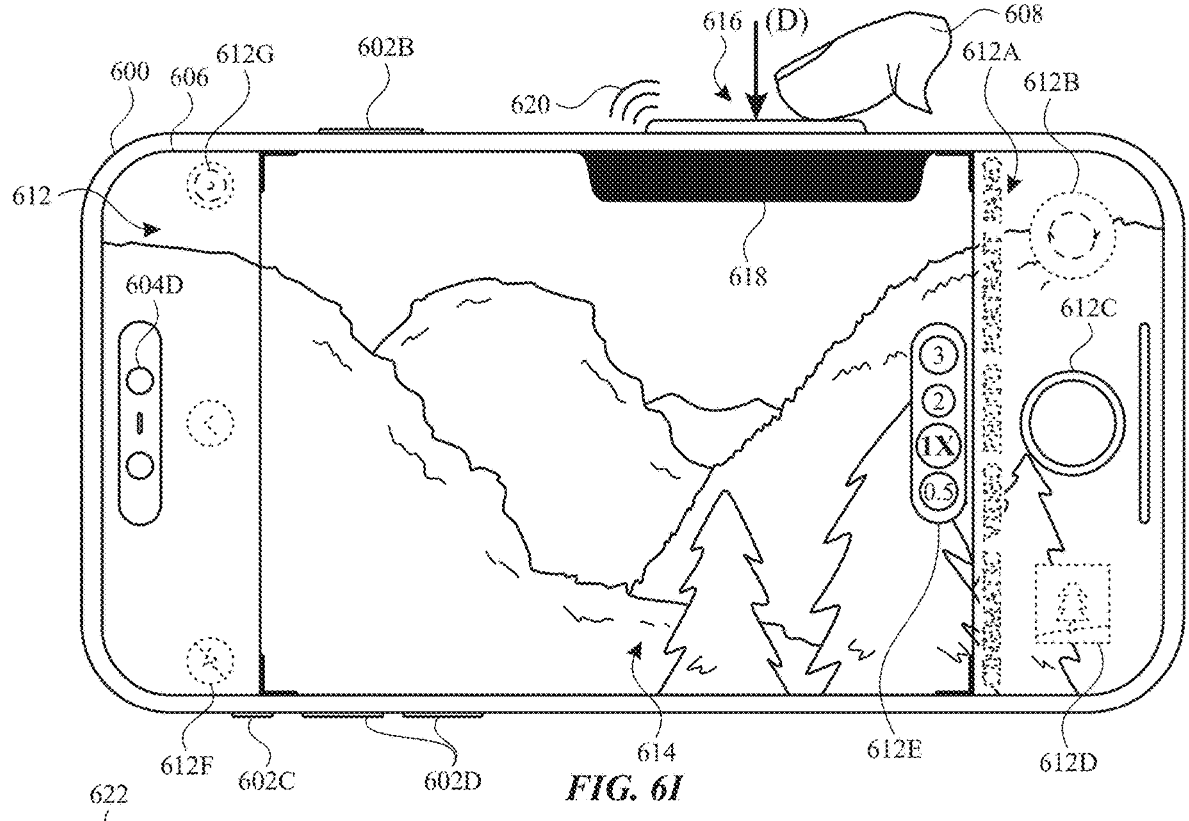

FIGS. 6F-6I illustrate displaying an indicator of one or more characteristics of an input via the hardware button, which responds to changes in intensity of the input, changes in location of the input, and, as illustrated in FIG. 6I, morphs into a settings control element when the intensity of the input meets light/partial press criteria (e.g., hardware button state (D)). At FIG. 6I, the computer system additionally provides a tactile (e.g., haptic) output when the intensity of the input meets light/partial press criteria.

As illustrated in FIG. 6F, while displaying camera user interface 612, computer system 600 detects input 616, where finger 608 is resting on the surface of first button 602A but not applying enough pressure to qualify as a light/partial press (e.g., first button 602A is in hardware button state (B)). In response to detecting input 616, computer system 600 displays contact indicator 618. Contact indicator 618 is displayed as a cut-out from camera user interface 612 (e.g., blocking out a portion of camera user interface 612) extending into display 606 from the edge region of display 606 that is adjacent to first button 602A. Contact indicator 618 indicates certain characteristics of input 616. As shown in FIG. 6F, as finger 608 is resting on the left side of first button 602A, computer system 600 displays contact indicator 618 below the left side of first button 602A (e.g., indicating the current location of input 616), and as first button 602A is in hardware button state (B), computer system 600 displays contact indicator 618 as a relatively small cut-out (e.g., indicating the current intensity of input 616).

As illustrated in FIG. 6G, computer system 600 detects input 616 beginning to move, for example, detecting movement component 616A via one or more touch sensors of first button 602A. Accordingly, computer system 600 animates contact indicator 618 moving to the right (e.g., in the direction of movement component 616A) by an amount similar to the amount traveled by movement component 616A, for instance, deforming the cut-out shape of contact indicator 618 during the animation to depict the movement. For example, computer system 600 animates contact indicator 618 moving to remain below finger 608 as it moves to the right side of first button 602A.

In some embodiments, if detected movement component 616A exceeds a threshold magnitude, computer system 600 proceeds as discussed below with respect to FIG. 6J, displaying settings control 622 and displaying camera user interface 612 in a "quiet" mode. For example, a swipe input across the full length or a majority of the length of first button 602A along the edge of display 606 can be used additionally or alternatively to a light/partial press of first button 602A as discussed with respect to FIGS. 6I-6J.

As illustrated in FIG. 6H, computer system 600 detects input 616 increasing in intensity, transitioning from hardware button state (B) to hardware button state (C) without yet qualifying as a light/partial press. Accordingly, computer system 600 animates contact indicator 618 growing, indicating the increasing intensity, while remaining located below finger 608 on the right side of first button 602A. In some embodiments, in response to detecting input 616 decreasing in intensity (e.g., transitioning from hardware button state (C) to hardware button state (B)), computer system 600 shrinks contact indicator 618, and in response to detecting input 616 ending (e.g., transitioning to hardware button state (A)), computer system 600 stops displaying contact indicator 618.

Figure 6J:
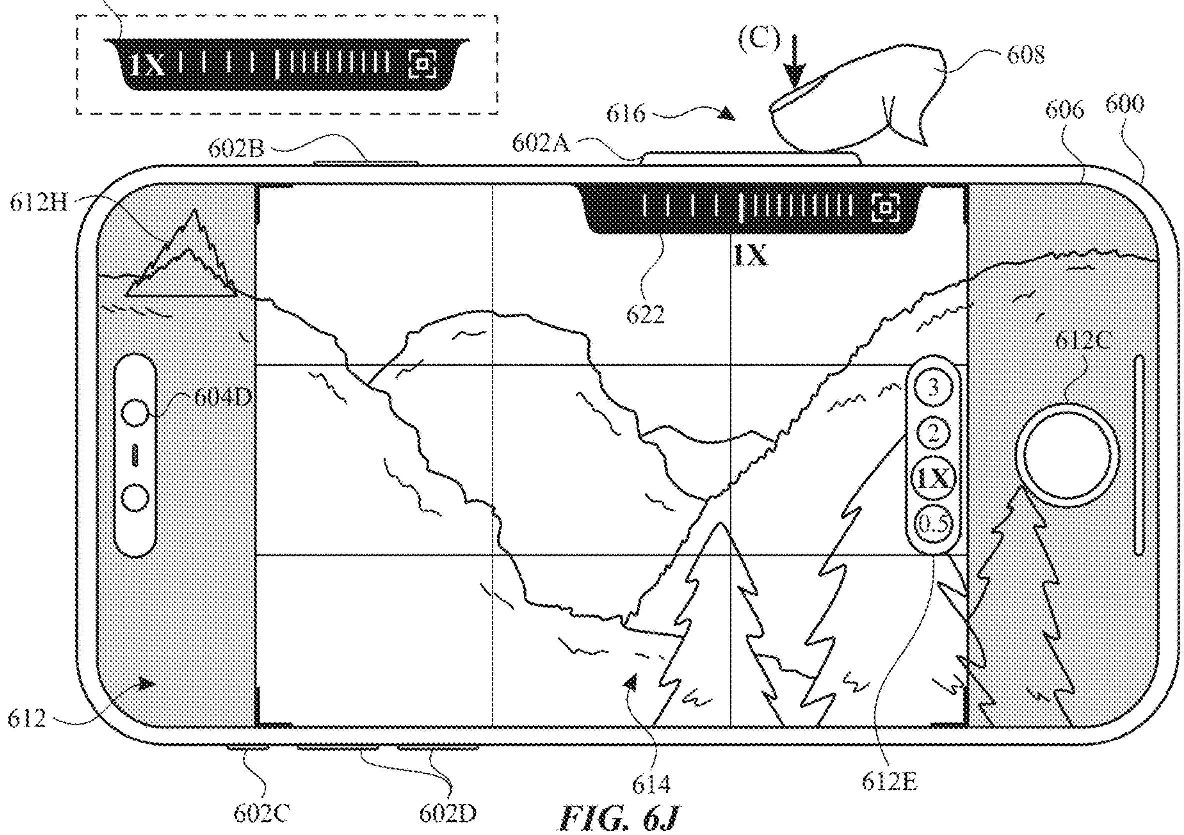

As illustrated in FIGS. 6I-6J, computer system detects input 616 increasing in intensity past a light/partial press threshold, e.g., transitioning to hardware button state (D). In response to this light/partial press of first button 602A, computer system 600 displays settings control 622 for a zoom setting of camera user interface 612. In some embodiments, the zoom setting is associated with first button 602A as described with respect to FIGS. 10A-10W, below, when input 616 is detected.

As illustrated in FIG. 6I, before displaying settings control 622, computer system 600 displays contact indicator 618 growing further in size and morphing into the shape of settings control 622, a tab-shaped cut-out from camera user interface 612 extending into display 606 from the location of first button 602A. Additionally, computer system 600 provides tactile output 620 indicating that light/partial press of first button 602A has been detected, for example, providing a vibration or a tactile response simulating the feeling of lightly pressing or clicking a button at the location of first button 602A. As illustrated in FIGS. 6I-6J, computer system 600 also transitions camera user interface 612 to a "quiet" or "ready to capture" mode in response to the light/partial press of first button 602A. As illustrated in FIG. 6I, computer system 600 fades out (e.g., increases the transparency of and/or visually deemphasizes) several of the touch controls included in camera user interface 612, including capture mode affordance 612A, camera selection affordance 612B, captured media icon 612D, multi-frame photo affordance 612F, and camera flash affordance 612G. In some embodiments, computer system 600 displays removal of one or more of the touch controls in other manners, such as animating the removed touch controls sliding off of display 606. For the "quiet" or "ready to capture" mode of camera user interface 612, computer system also begins displaying levels affordance 612H, a histogram indicating the tonal range and content of camera preview 614, and a capture guidance grid displayed over camera preview 614.

FIG. 6J illustrates displaying a settings control element for a zoom setting of the camera user interface in response to the input meeting light/partial press criteria (along with an inset illustrating an alternative embodiment of the settings control element).

As illustrated in FIG. 6J, settings control 622 for the zoom setting of camera user interface 612 includes text indicating the current zoom level ("1×"), an icon representing the zoom setting, and a representation of a zoom scale. In particular, the representation of the zoom scale includes a plurality of tick marks representing ordered zoom levels in intervals of 0.1× zoom. As illustrated in FIG. 6J, the representation of the zoom scale includes a portion of an overall zoom scale with tick marks representing 0.6× to 1.9× zoom, and the tick mark representing the current zoom level of 1.0× is displayed at a center point of settings control 622 (e.g., centered within the cut-out tab of settings control 622). In some embodiments, computer system 600 centers the text indicating the current zoom level at the current tick mark, outside of the cut-out tab region of settings control 622, and in some embodiments, as illustrated by the side panel of FIG. 6J, computer system 600 displays the text indicating the current zoom level inside the cut-out tab of settings control 622 (e.g., to the side of the representation of the zoom scale). As illustrated in FIG. 6J, the representation of the zoom scale is oriented such that the zoom levels represented by the tick marks increase going from left to right with respect to the view of the environment included in camera preview 614. In particular, the tick mark representing 0.6× is located below the edge of first button 602A closest to the set of cameras (e.g., considered the "top" of the device), and the tick mark representing 1.9× is located below the edge of first button 602A the regions further away from the set of cameras (e.g., considered the "bottom" of the device). Settings control 622, and, in particular, the representation of the zoom scale, are described in greater detail with respect to FIGS. 14A-14Z, below.

As illustrated in FIG. 6J1, in some embodiments, settings control 622 is displayed with an appearance that simulates a curved, rotatable dial. The left panels illustrated in FIG. 6J1 represent settings control 622 as displayed via display 606 and the right panels represent corresponding top-down views of simulated dial 622', which is simulated as curving outwards from the surface of display 606. Accordingly, to create the appearance of simulated dial 622', system 600 gradually blurs, darkens, fades, and/or otherwise obscures the representation of the zoom scale (e.g., described in further detail below) as the zoom scale approaches the edges (e.g., the left and right edges where simulated dial 622' has an appearance that appears to curve away from the user and into the surface of display 606) and/or distorts the representation of the zoom scale based on a projection of the apparent curve of simulated dial 622' onto the surface of display 606, for instance, decreasing the spacing between tick marks as the zoom scale approaches the edges to simulate the foreshortening of placing the tick marks on the physically curved surface of simulated dial 622'. As illustrated in FIG. 6J1, the visual distortion simulating the curved dial is represented by the crosshatching at the edges of settings control 622. As illustrated in FIG. 6J1, when adjusting the zoom setting using settings control 622 (e.g., as described in detail herein), system 600 simulates input 613, a movement input swiping right-to-left along settings control 622, as an input rotating simulated dial 622' clockwise, moving the previously-centered tick mark (marked with an arrow in FIG. 6J1) to the left and adjusting the appearance of settings control 622 to simulate the resulting position of simulated dial 622'.

Figure 6K:
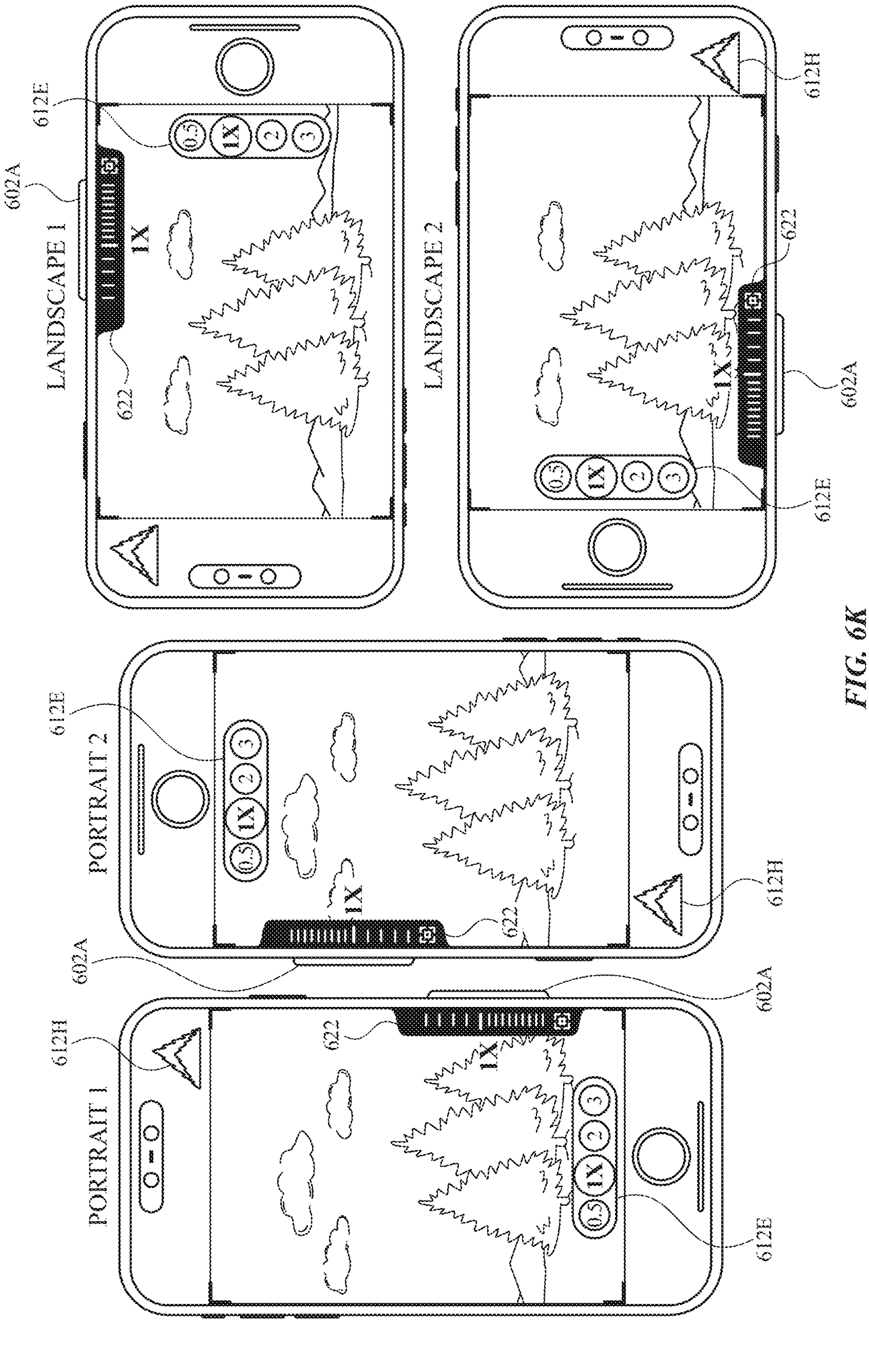

FIG. 6K illustrates the display of settings control 622 at different orientation states of computer system 600. For example, using one or more motion or orientation sensors, computer system 600 detects how computer system 600 is being held with respect to the environment. In the Portrait 1 orientation state, computer system 600 is held in an "upright" portrait orientation with first button 602A to the right relative to the field of view of first camera 604A, second camera 604B, and/or third camera 604C; in the Portrait 2 orientation state, computer system 600 is held in an "upside-down" portrait orientation with first button 602A to the left relative to the field of view of first camera 604A, second camera 604B, and/or third camera 604C; in the Landscape 1 orientation state (e.g., the orientation state depicted in FIGS. 6E-6J and 6L-6V), computer system 600 is held in a "right-handed" portrait orientation with first button 602A at the top relative to the field of view of first camera 604A, second camera 604B, and/or third camera 604C; and in the Landscape 2 orientation state, is held in a "left-handed" portrait orientation with first button 602A at the bottom relative to the field of view of first camera 604A, second camera 604B, and/or third camera 604C. As illustrated in FIG. 6K, in each of the different orientation states, computer system 600 displays settings control 622 at a consistent position near the location of first button 602A (e.g., a hardware-locked position on the display), such that in Portrait 1, settings control 622 appears at the lower right edge of camera preview 614 (e.g., and/or camera user interface 612); in Portrait 2, settings control 622 appears at the upper left edge of camera preview 614; in Landscape 1, settings control 622 appears at the top edge of camera preview 614; and in Landscape 2, settings control 622 appears at the bottom edge of camera preview 614. Additionally, in each of the different orientation states, computer system 600 orients the representation of the zoom scale in the same manner with respect to first button 602A, such that the zoom levels represented by the tick marks increase going in the direction from the set of cameras towards the charging port of computer system 600, whether that direction is up, down, left, or right with respect to camera preview 614. In some embodiments, computer system 600 rotates some elements of the camera user interface and/or settings control 622 as the orientation state changes. In particular, as illustrated in FIG. 6K, computer system 600 rotates the text indicating the current zoom level ("1×"), the text included in zoom affordance 612E, and levels affordance 612H with respect to the hardware such that those elements appear upright with respect to the camera preview.

FIGS. 6L-6T illustrate adjusting the zoom setting of camera user interface 612 and capturing media in response to various inputs, including movement inputs (e.g., swipes, flicks, and/or directional taps) detected while displaying settings control 622 and press inputs of first button 602A.

Figure 6L:
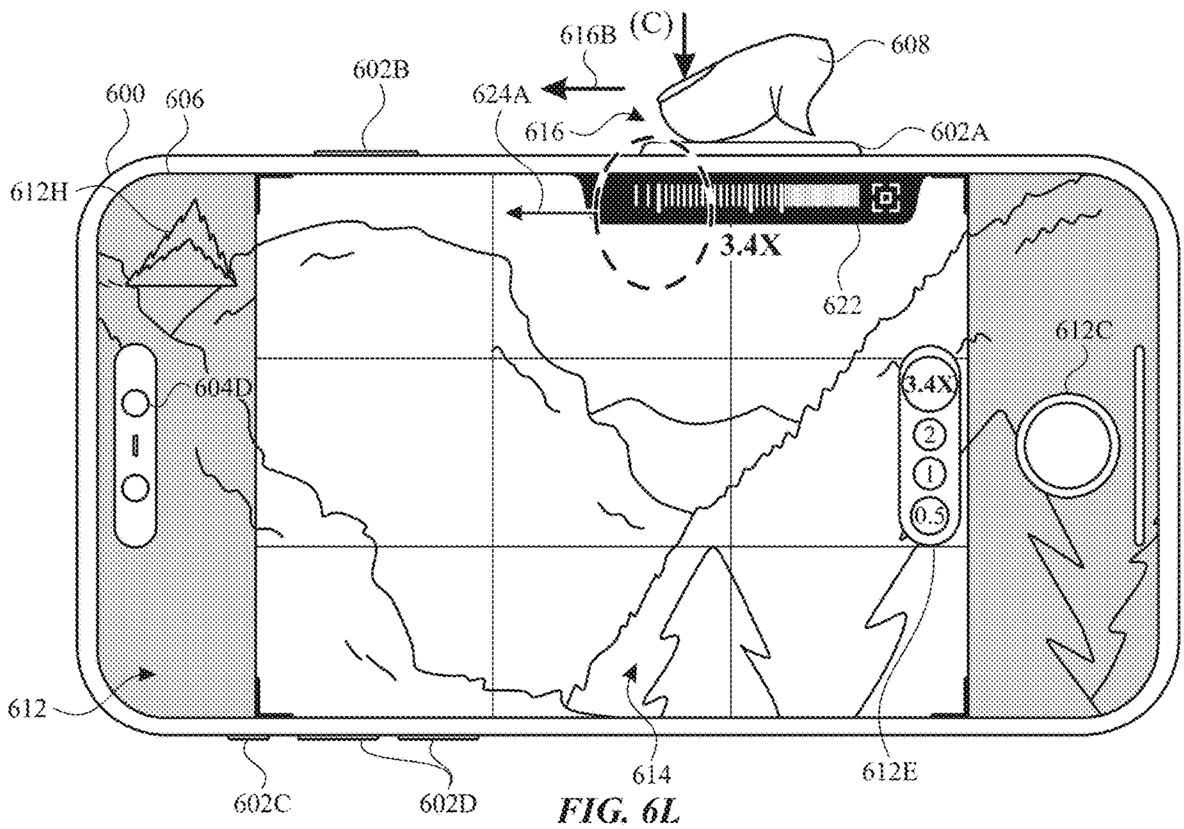

At FIG. 6L, while displaying settings control 622 for the zoom setting of camera user interface 612, computer system 600 detects a movement input, such as movement component 616B of input 616 where finger 608 swipes from right to left along the surface of first button 602A and/or touch input 624A, a right-to-left swipe gesture (e.g., a touch with movement) directed to settings control 622 on the touch-sensitive surface of display 606. In some embodiments, once settings control 622 is displayed in response to the light/partial press of first button 602A (e.g., once the intensity of input 616 passes the light/partial press threshold), computer system 600 continues displaying settings control 622 and displaying camera user interface 612 in the "quiet" mode, and remains responsive to detected movement inputs, after the intensity of input 616 drops below the light/partial press intensity. For example, as illustrated in FIGS. 6L, movement component 616A is detected while the intensity of input 616 has lessened, placing first button 602A into hardware button state (C). In some embodiments, input 616 can be fully lifted off of first button 602A (e.g., in hardware button state (A)) while detecting touch input 624A via settings control 622 on the touch-sensitive surface of display 606. In some embodiments, computer system 600 continues displaying settings control 622 and displaying camera user interface 612 in the "quiet" mode and remains responsive to detected movement inputs for at least a threshold period of time (e.g., 0.25 s, 0.3 s, 0.5 s, or 1 s) after contact with first button 602A and/or with settings control 622 on the touch-sensitive surface of display 606 lifts off, allowing the user to briefly lift and replace finger 608 without needing to provide another light/partial press.

At FIG. 6L, computer system 600 adjusts the zoom setting of camera user interface 612 based on the detected movement input (e.g., movement component 616B and/or touch input 624A), increasing the zoom level (e.g., zooming in) from 1× to 3.4× zoom as shown by the increased magnification of the field-of-view of the environment displayed in camera preview 614. In particular, adjusting to increase the zoom level (e.g., zooming in) corresponds to the direction of the detected movement input with respect to the displayed representation of the zoom scale, and adjusting the zoom level by a magnitude of 1.4× corresponds to the magnitude of the detected movement input with respect to the displayed representation of the zoom scale. For example, computer system 600 makes the adjustment based on the detected movement input as if settings control 622 were a physical zoom dial (e.g., with the same or a proportional scale to the displayed representation of the zoom scale, such as simulated rotatable dial 622', illustrated in FIG. 6J1) being rotated by input 616 and/or touch input 624A.

In some embodiments, adjusting the zoom level includes performing an optical zoom (e.g., switching between capturing camera data using first camera 604A, second camera 604B, and/or third camera 604C for the different magnifications produced by each different lens), performing a digital zoom (e.g., digitally cropping the portion of the field-of-view of the environment represented in camera preview 614), or a combination of both an optical zoom and a digital zoom.

As illustrated in FIG. 6L, upon adjusting the zoom setting of camera user interface 612 to 3.4× magnification, computer system 600 displays the representation of the zoom scale with the tick mark representing 3.4× zoom at the center point of settings control 622, surrounded by tick marks representing 1.8× to 6.6× zoom, and additionally updates the text indicating the current zoom level in settings control 622 to 3.4×. In some embodiments, computer system 600 additionally updates the text included in zoom affordance 612E to reflect the current zoom level. In some embodiments, computer system 600 animates the representation of the zoom scale sliding to the left along with movement component 616A and/or touch input 624A (e.g., as described further with respect to FIGS. 14A-14Z), for instance, with the same speed/acceleration or a proportionate speed/acceleration as movement component 616B and/or touch input 624, as if the representation of the zoom scale were being physically dragged. In some embodiments, computer system 600 updates the text of settings control 622 and/or displays camera preview 614 at the zoom levels represented by the tick marks as they move past the center of settings control 622, providing a "live" preview of the zoom adjustment during the movement inputs.

Figure 6M:
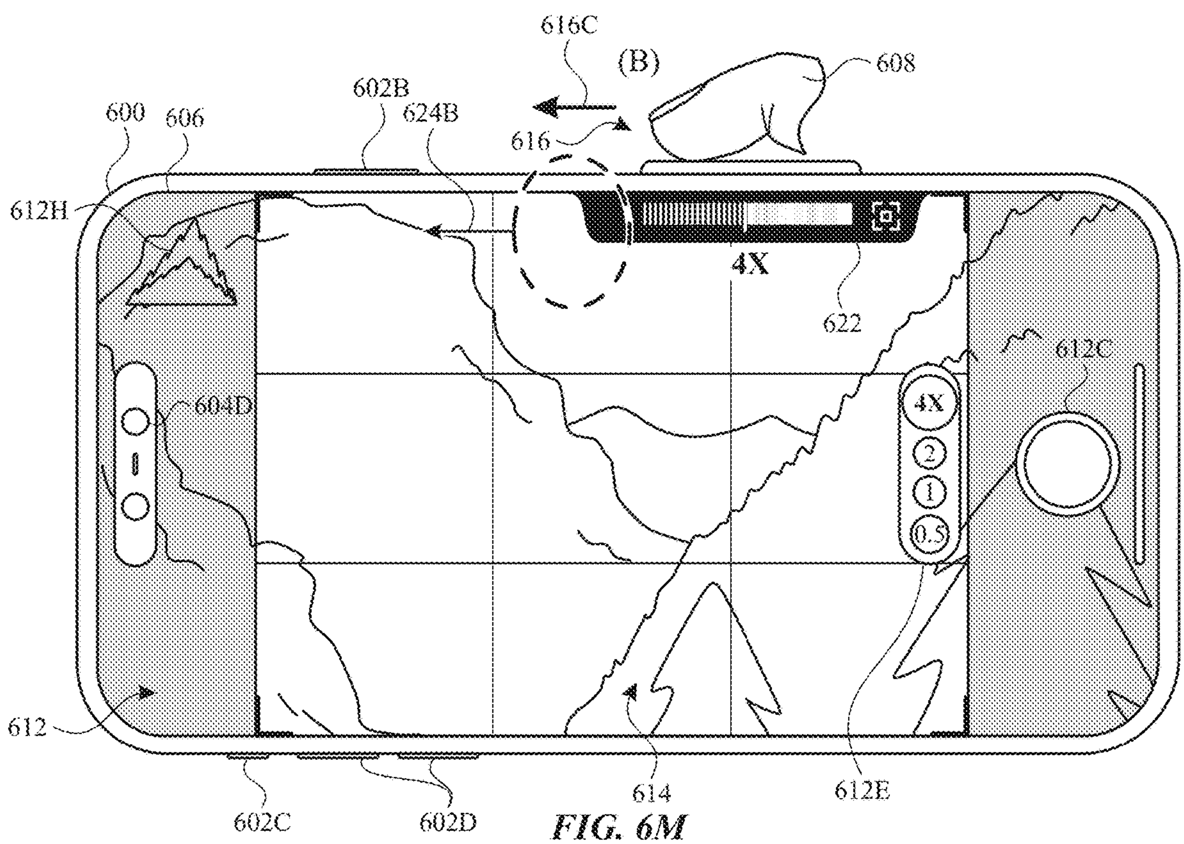
Figure 6N:
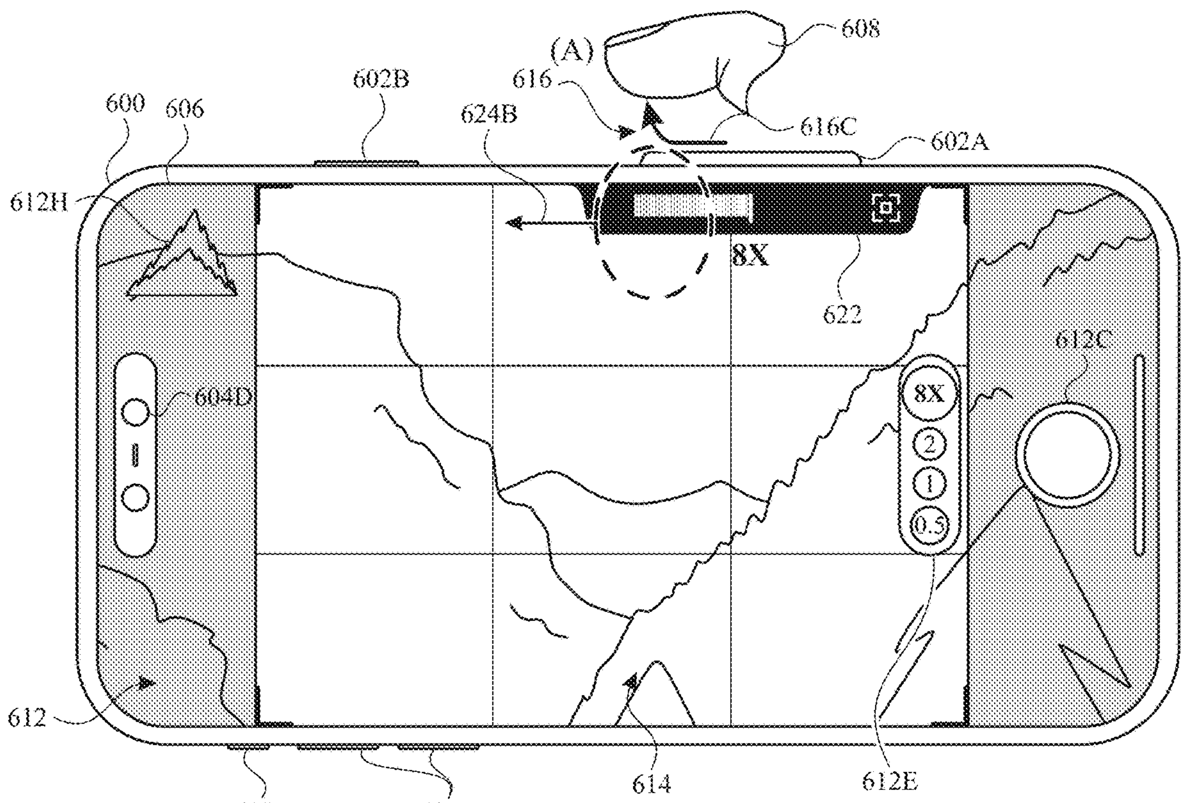

FIGS. 6M-6N illustrate adjusting the zoom setting of camera user interface 612 in response to detecting a "flick" movement via first button 602A and/or the touch-sensitive surface of display 606, also described in detail with respect to FIGS. 14A-14Z. At FIG. 6M, computer system 600 detects a movement input, such as movement component 616C of input 616 swiping further from right to left along the surface of first button 602A (e.g., while in hardware button state (B)) and/or touch input 624B, a further right-to-left swipe gesture directed to settings control 622 on the touch-sensitive surface of display 606, and begins adjusting the zoom setting as described with respect to FIG. 6L, increasing the zoom level from 3.4× zoom to 4.0× zoom. At FIG. 6N, without first slowing down and/or stopping the right-to-left movement of movement component 616C and/or touch input 624B, the user lifts off of (e.g., ceases contact with) first button 602A and/or the touch-sensitive surface of display 606, producing a right-to-left "flick" movement. Computer system 600 thus detects a flick movement based on detecting a lift-off from first button 602A and/or the touch-sensitive surface of display 606 coupled with movement near (e.g., before and/or after) the time of the lift-off. A flick input is generally differentiated from a drag input because a flick input ends (e.g., based on lift off of the input) with more than a threshold amount of movement while a drag input ends (e.g., based on lift off of the input or an end of motion of the input) with less than the threshold amount of movement. Operations that are performed in response to detecting a flick input typically include a component of the operation that is performed after the flick input ends (e.g., based on simulated inertia based on the movement that was detected when the flick input ended).

As illustrated in FIG. 6N, in response to detecting the right-to-left flick movement, computer system 600 increases the zoom setting of camera user interface 612 to 8.0×, displaying the representation of the zoom scale with the tick mark representing 8.0× at the center point of settings control 622. As described further with respect to FIGS. 14A-14Z, in some embodiments, the adjustment to the zoom setting made after detecting the lift-off (e.g., zooming in from 4.0× to 8.0×) is a "snapping" adjustment that adjusts to the next zoom value in a predetermined set of zoom values (e.g., 8.0×, 2.0×, 1.0×, and 0.5×) in response to the flick, and in some embodiments, the adjustment to the zoom setting made after detecting the lift-off (e.g., zooming in from 4.0× to 8.0×) is based on simulated physics, for instance, as though the flick gesture were transferring momentum to a physical zoom dial that keeps spinning to 8.0×. Accordingly, the user can zoom in to 8.0× zoom without needing to provide a movement input of a commensurate distance (e.g., as described with respect to FIG. 6L). Following the lift-off detected at FIG. 6N, computer system 600 continues displaying settings control 622 and displaying camera user interface 612 in the "quiet" mode for at least the threshold period of time (e.g., 0.25 s, 0.3 s, 0.5 s, or 1 s).

Figure 6O:
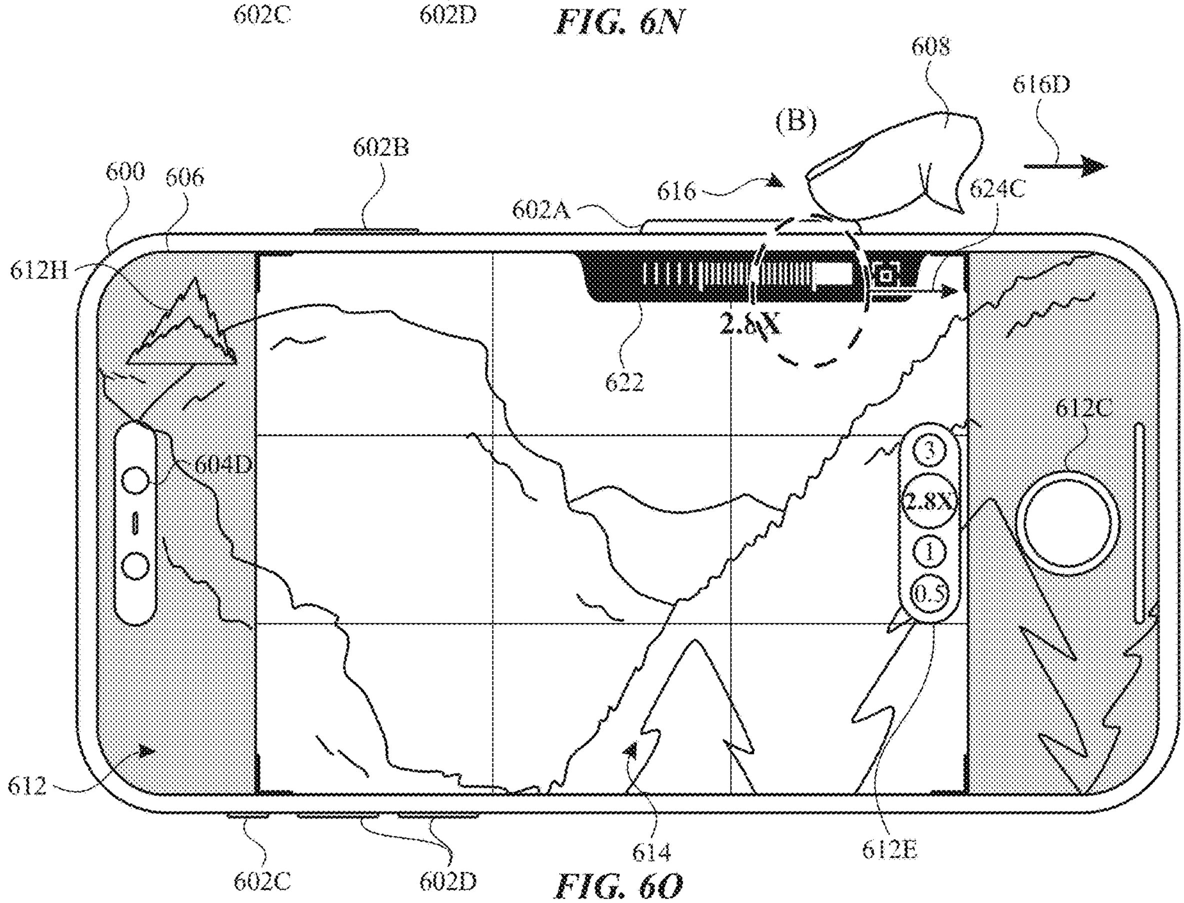

At FIG. 6O, while continuing to display settings control 622 (e.g., within the threshold period of time after lift-off), computer system 600 detects resumed contact with first button 602A (e.g., hardware button state (B)) and/or with settings control 622 via the touch-sensitive surface of display 606 detects a subsequent movement input, such as movement component 616D of input 616 where finger 608 swipes from left to right along the surface of first button 602A and/or touch input 624C, a left-to-right swipe gesture (e.g., a touch with movement) directed to settings control 622 on the touch-sensitive surface of display 606. As contact with first button 602A and/or with settings control 622 is reestablished within the threshold period of time after lift-off, the intensity of input 616 does not need to exceed the light/partial press threshold (e.g., as described with respect to FIGS. 6I-6J) again before movement inputs are detected. For example, as illustrated in FIG. 6O, movement component 616D is detected while first button 602A is in hardware button state (B), e.g., with finger 608 just resting on the surface of the button.

As illustrated in FIG. 6O, in response to detecting the subsequent left-to-right movement input, computer system 600 adjusts the zoom setting of camera user interface 612 based on the detected movement input, decreasing the zoom level (e.g., zooming out) from 8× to 2.8× zoom. As discussed with respect to FIG. 6L, decreasing the zoom level to 2.8× zoom corresponds to the direction and magnitude of the detected movement input with respect to the displayed representation of the zoom scale, for example, adjusting the zoom level as though the movement inputs were physically dragging the tick mark representing 2.8× zoom in the representation of the zoom scale towards the center of settings control 622.

Figure 6P:
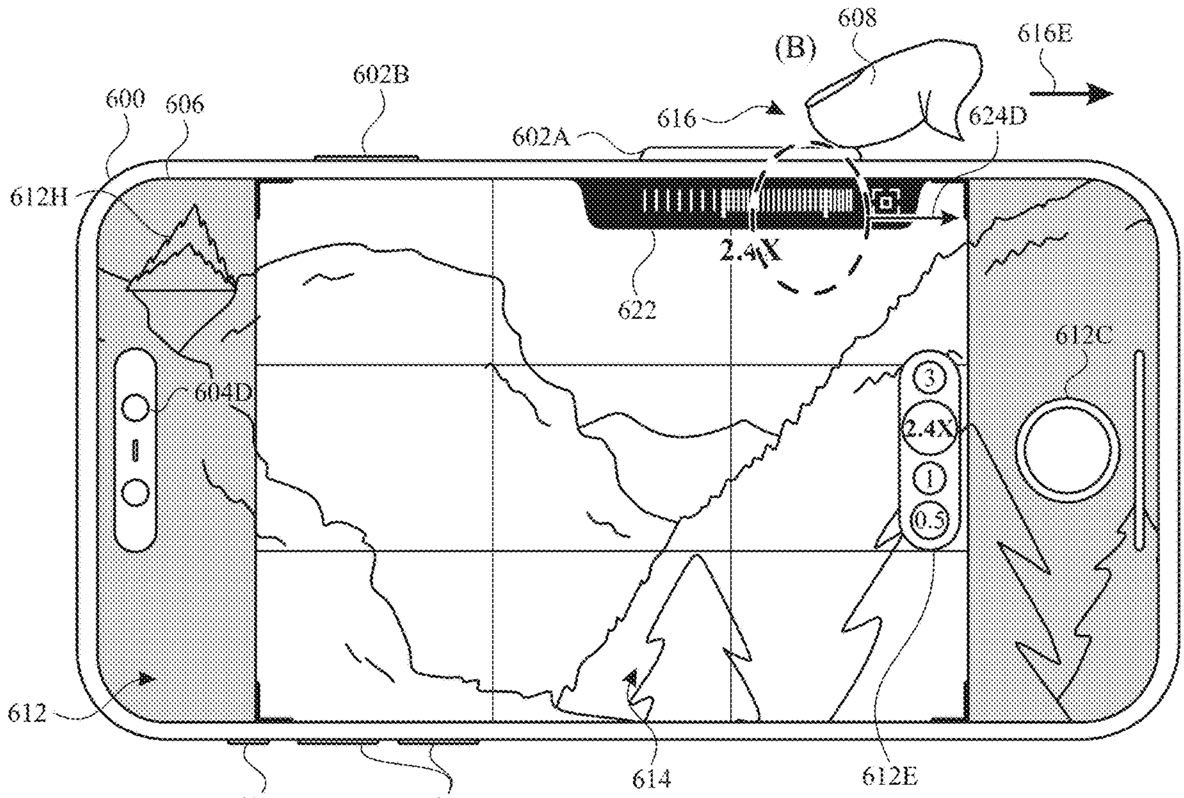
Figure 6Q:
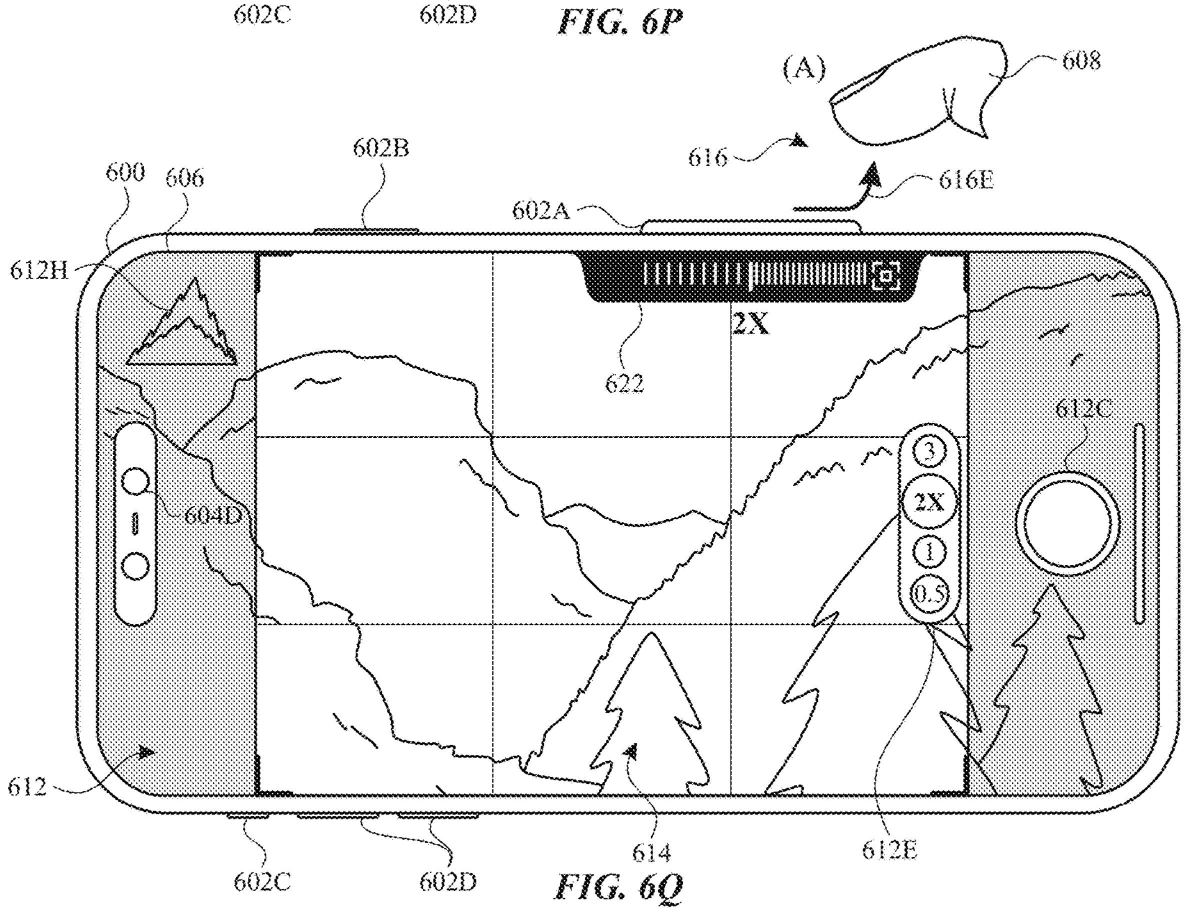

FIGS. 6P-6Q illustrate adjusting the zoom setting of camera user interface 612 in response to detecting a flick movement, as described above with respect to FIGS. 6M-6N. At FIG. 6P, computer system 600 detects a left-to-right movement input such as movement component 616E of input 616 and/or touch input 624D, and begins adjusting the zoom setting, decreasing the zoom level to 2.4× zoom. At FIG. 6Q, while continuing the left-to-right motion of the movement input(s), the user lifts off of first button 602A and/or the touch-sensitive surface of display 606, producing a left-to-right flick movement. As illustrated in FIG. 6Q, in response to detecting the left-to-right flick movement, computer system 600 decreases the zoom setting of camera user interface 612 to 2.0×, for example, based on simulating a transfer of momentum from the flick movement and/or based on 2.0× being the next predetermined "snapping" value in the direction of movement.

Figure 6R:
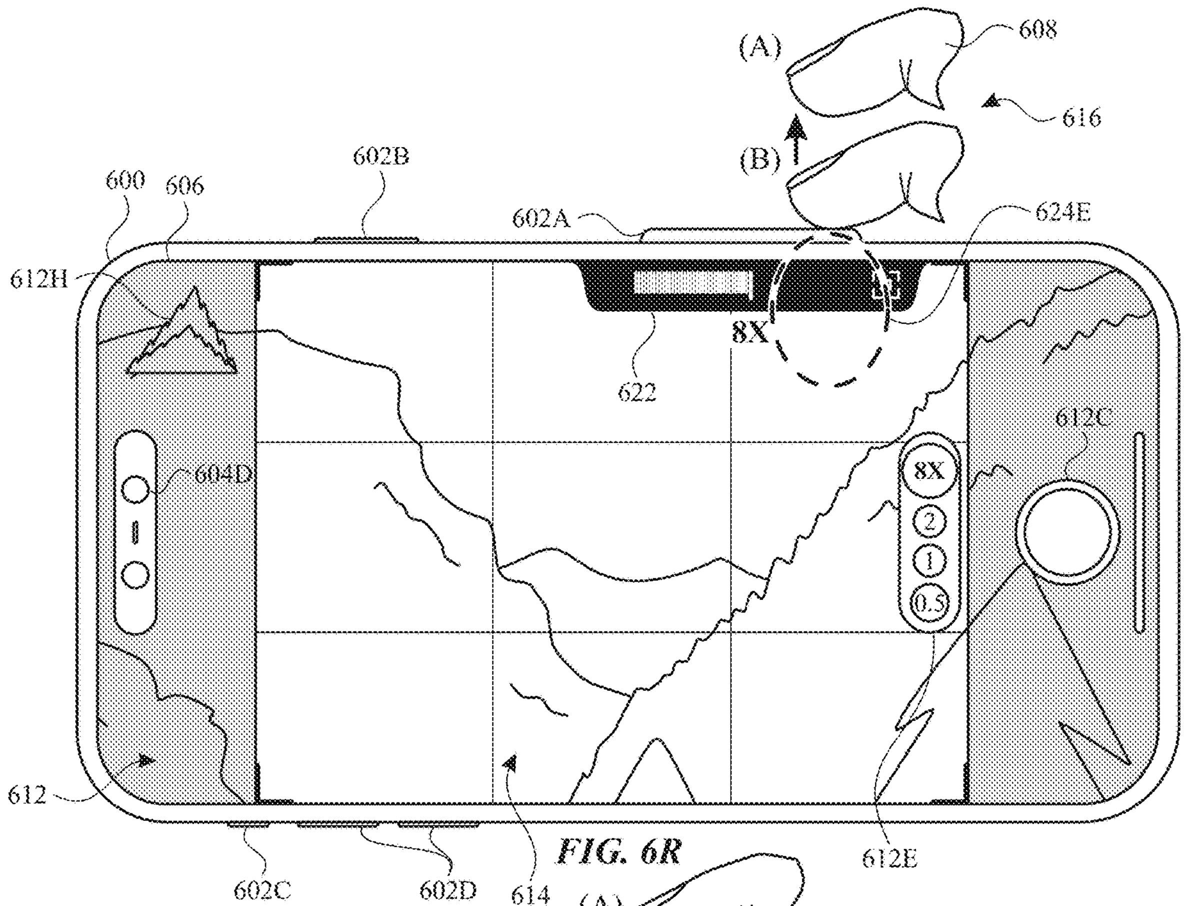
Figure 6S:
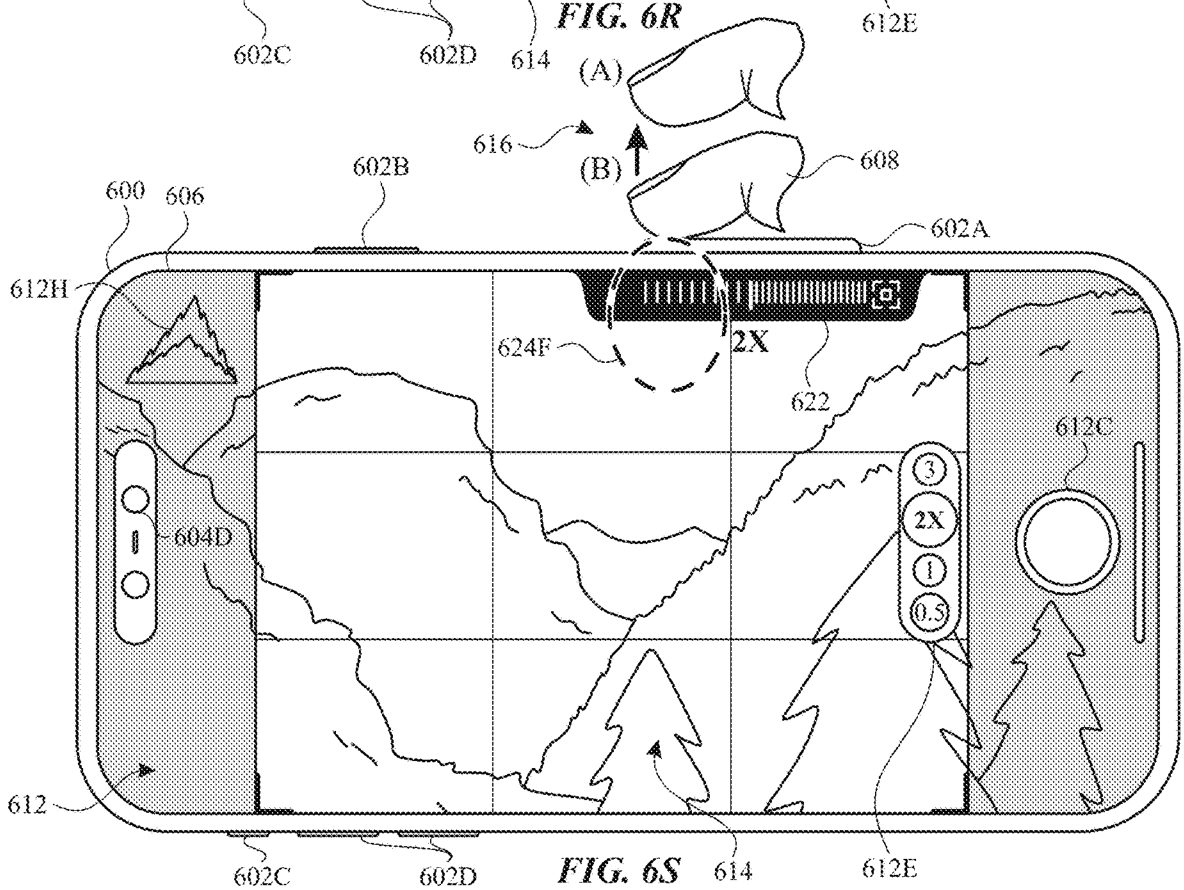

FIGS. 6R-6S illustrate adjusting the zoom setting of camera user interface 612 in response to detecting a directional tap input via first button 602A and/or the touch-sensitive surface of display 606. At FIG. 6R, while continuing to display settings control 622, computer system 600 detects input 616 briefly contacting and then lifting off of the right side of first button 602A and/or touch input 624E briefly contacting and then lifting off of the right side of settings control 622. As the right side of the representation of the zoom scale corresponds to higher zoom values, in response to detecting the tap inputs, computer system 600 adjusts the zoom setting of camera user interface 612, increasing the zoom level from 2.0× zoom to 8.0× zoom, the next predetermined "snapping" value in the direction of the tap. At FIG. 6S, while continuing to display settings control 622, computer system 600 detects input 616 briefly contacting and then lifting off of the left side of first button 602A and/or touch input 624F briefly contacting and then lifting off of the left side of settings control 622. As the left side of the representation of the zoom scale corresponds to lower zoom values, in response to detecting the tap inputs, computer system 600 adjusts the zoom setting of camera user interface 612, decreasing the zoom level from 8.0× zoom to 2.0× zoom, the next predetermined "snapping" value in the direction of the tap. Following the lift-off of the tap inputs at FIGS. 6R-6S, computer system 600 continues displaying settings control 622 and displaying camera user interface 612 in the "quiet" mode for at least the threshold period of time (e.g., 0.25 s, 0.3 s, 0.5 s, or 1 s).

Figure 6T:
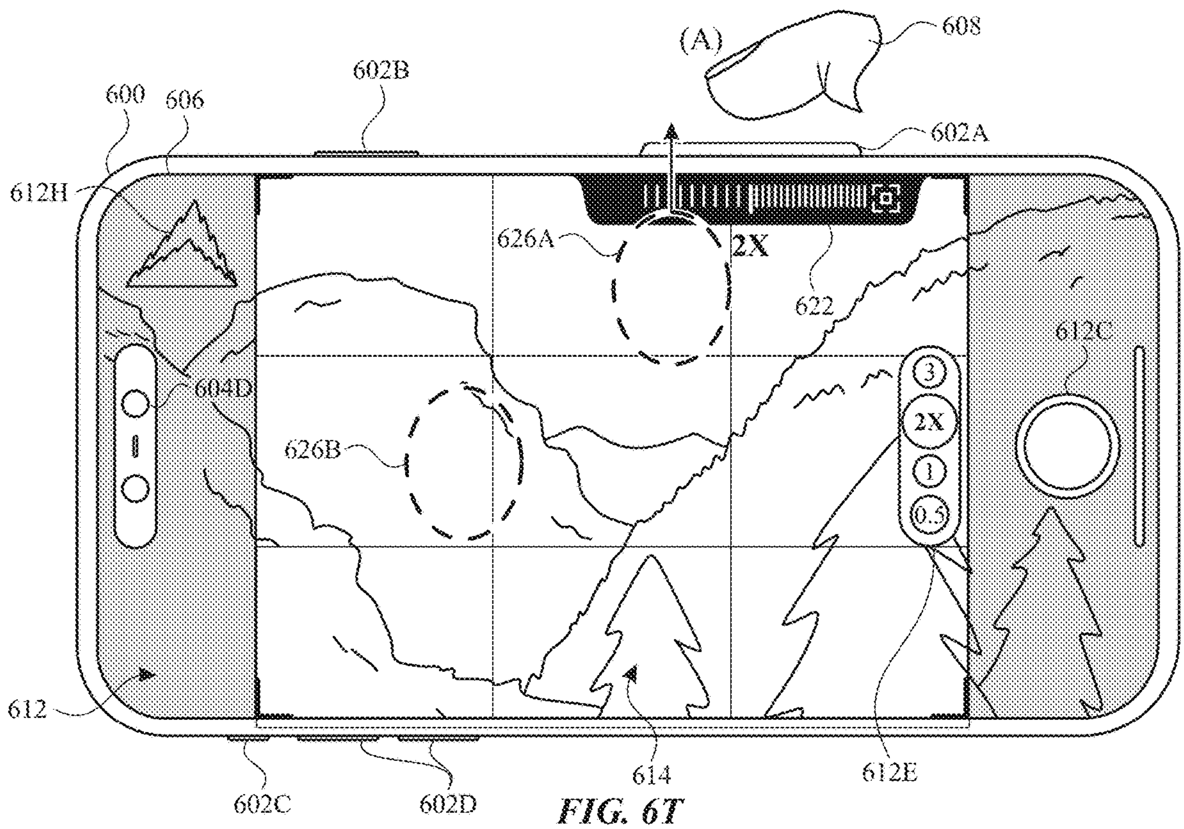
Figure 6U:
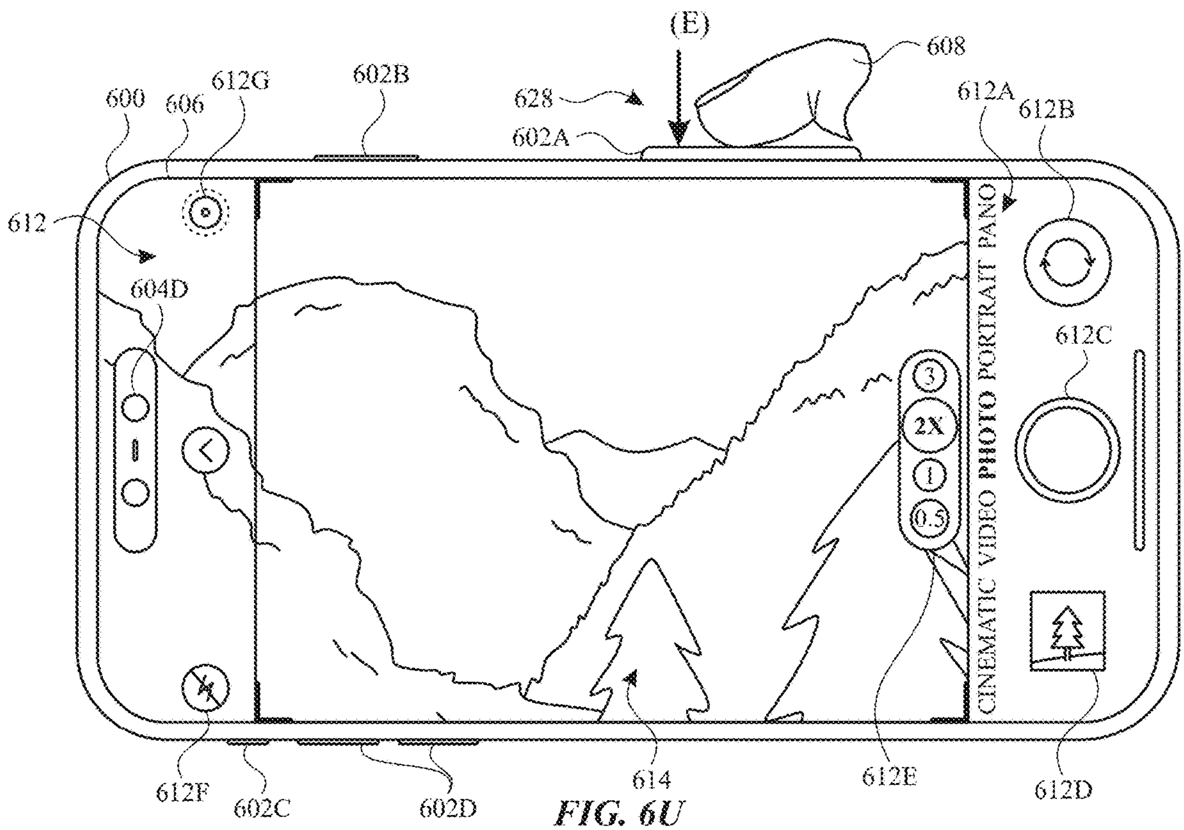

At FIG. 6T, computer system 600 detects lift-off from of button 602A (e.g., ending input 616) and/or settings control 622 on the touch-sensitive surface of display 606. As discussed above, in some embodiments, computer system 600 continues displaying settings control 622 and displaying camera user interface 612 in the "quiet" mode for at least the threshold period of time (e.g., 0.25 s, 0.3 s, 0.5 s, or 1 s) after lift-off. If contact with button 602A and/or settings control 622 on the touch-sensitive surface of display 606 is not re-established within the threshold period of time, computer system 600 stops displaying settings control 622 and reverts camera user interface 612 to a default mode (e.g., the initial appearance of camera user interface 612 described with respect to FIG. 6E) as illustrated in FIG. 6U, ceasing display of levels affordance 612H and the capture guidance grid and re-displaying capture mode affordance 612A, camera selection affordance 612B, captured media icon 612D, multi-frame photo affordance 612F, and camera flash affordance 612G. Alternatively, in some embodiments, computer system 600 stops displaying settings control 622 and reverts camera user interface 612 to the default mode as illustrated in FIG. 6U in response to a separate input dismissing settings control 622. For example, as illustrated in FIG. 6T, the separate input dismissing settings control 622 may include touch input 626A, a swipe gesture moving across settings control 622 towards the outside edge of display 606, or touch input 626B, a touch input (e.g., a tap or press) directed to a portion of camera user interface 612 outside of the region of settings control 622.

As illustrated in FIG. 6U, after computer system 600 ceases displaying settings control 622 and returns camera user interface 612 to the default mode, the zoom setting of camera user interface 612 remains set to 2× zoom, the zoom level selected via settings control 622.

At FIG. 6U, while camera user interface 612 is in the default mode and settings control 622 is not displayed, computer system 600 detects input 628, a press input that places first button 602A into hardware button state (E) (e.g., applying intensity that exceeds a hard/full press intensity threshold), qualifying as a hard/full press. In some embodiments, computer system 600 does not display contact indicator 618, display settings control 622, and/or display camera user interface 612 in the "quiet" mode in response to input 628 if input 628 is a "quick" hard/full press. For example, a quick hard/full press places first button 602A into hardware button state (E) less than a first threshold duration of time after placing first button 602A into hardware button state (B) (e.g., after initiating contact with first button 602A) and/or less than a second threshold duration of time after placing first button 602A into hardware button state (D) (e.g., after reaching a light/partial press state).

Figure 6V:
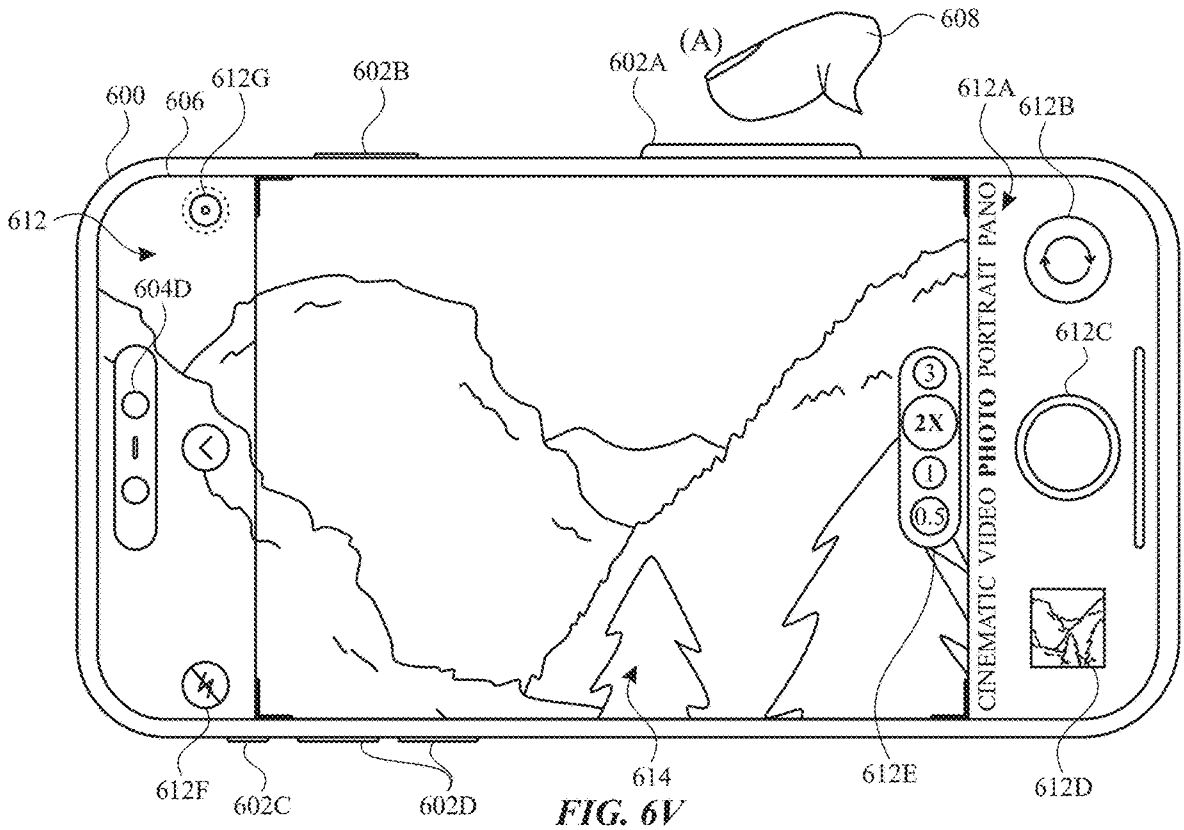

In response to detecting input 628 (e.g., a hard/full press of first button 602A), computer system 600 initiates capturing media. As illustrated in FIGS. 6U-6V, the media is captured at 2× zoom, the zoom level selected via settings control 622. At FIG. 6V, computer system 600 detects lift-off from first button 602A within a threshold period of time (e.g., 0.5 s, 0.75 s, 1 s, or 1.5 s) after input 628 qualifies as a hard/full press (e.g., input 628 is a quick press, as discussed in more detail with respect to FIGS. 8A-8Z). Accordingly, computer system 600 captures photo media in response to input 628, updating captured media icon 612D to display a thumbnail of the captured photo media.

Although FIGS. 6L-6V depict adjusting a zoom setting of camera user interface 612 based on movement inputs while computer system 600 is in the Landscape 1 orientation state, it is to be understood that the techniques and user interfaces described with respect to FIGS. 6L-6V can be likewise applied to perform operations based on movement inputs in other orientation states. For example, FIGS. 6W-6AD illustrate controlling the zoom setting of camera user interface 612 using movement inputs while computer system 600 is in the Landscape 2 orientation state, and FIGS. 6AE-6AM illustrate controlling other operations (e.g., adjusting different settings of camera user interface 612) using movement inputs while in the Portrait 1 orientation state.

Figure 6W:
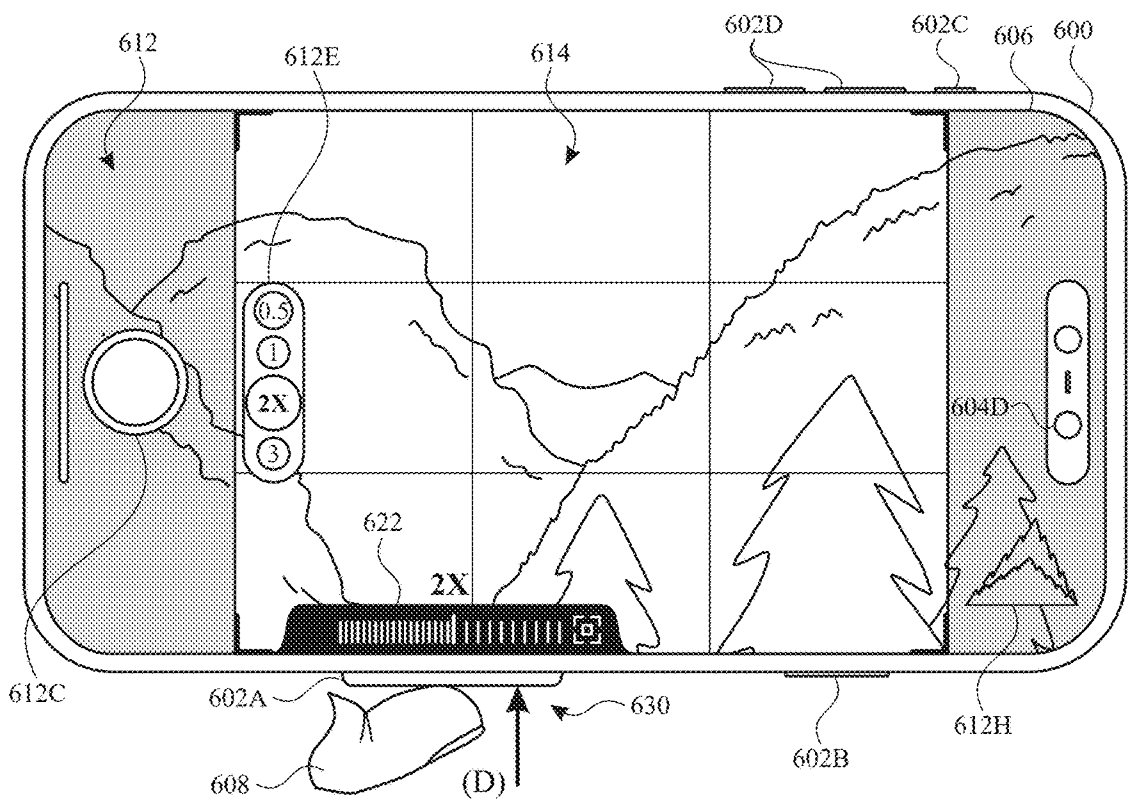

At FIG. 6W, computer system 600 detects input 630 placing first button 602A into hardware button state (D), qualifying as a light/partial press of first button 602A. In response to input 630 (and/or in response to a full swipe of first button 602A, as described above), computer system 600 displays settings control 622 for the zoom setting of camera user interface 612 and additionally displays camera user interface 612 in the "quiet" mode, as described with respect to FIGS. 6F-6J. As described with respect to FIG. 6K, at FIG. 6W, computer system 600 displays settings control 622 at the edge of display 606 near the location of first button 602A, which, while in the Landscape 2 orientation state, appears at the bottom left edge of camera preview 614. As illustrated in FIG. 6W, the representation of the zoom scale is oriented such that the zoom levels represented by the tick marks increase going from right to left with respect to the view of the environment included in camera preview 614. Although the orientation of the representation of the zoom scale in FIG. 6W is oriented opposite to the orientation illustrated in FIG. 6J with respect to the environment, the representation of the zoom scale is oriented consistently with respect to the hardware of computer system 600 regardless of the orientation state. Specifically, computer system 600 displays the tick mark representing the lowest displayed zoom level near the edge of first button 602A closest to the set of cameras (e.g., the "top" of the device) and the tick mark representing the highest displayed zoom level is located near the edge of first button 602A closest to, e.g., a charging port of computer system 600 (e.g., the "bottom" of the device). As described with respect to FIG. 6K, at FIG. 6W, computer system 600 displays the text indicating the current zoom level ("2×"), the text included in zoom affordance 612E, and levels affordance 612H oriented upright with respect to the environment.

Figure 6X:
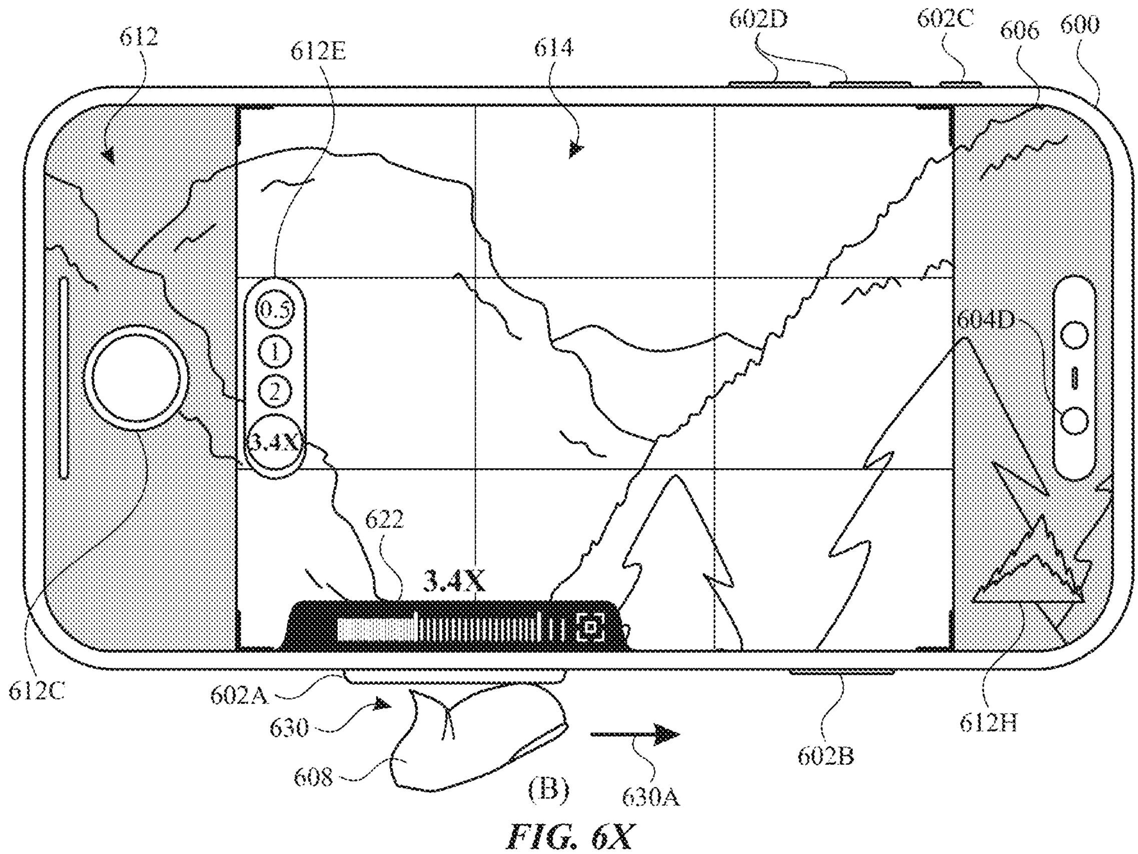

At FIG. 6X, while displaying settings control 622, computer system 600 detects movement component 630A of input 630 via first button 602A (and/or a flick, directional tap, and/or a swipe directed to settings control 622 via the touch-sensitive surface of display 606, as discussed above), where finger 608 swipes from left to right along the surface of first button 602A. As illustrated in FIG. 6X, computer system 600 adjusts the zoom setting of camera user interface 612 based on movement component 630A, e.g., as described with respect to FIG. 6L. In particular, computer system 600 increases the zoom level (e.g., zooming in) from 2× to 3.4×, corresponding to the magnitude of movement component 630A and the direction of movement component 630A with respect to the displayed representation of the zoom scale. Accordingly, although movement component 630A is a movement from left to right and movement component 616B (in FIG. 6L) is a movement from right to left, e.g., with respect to the view of the environment included in camera preview 614, both movement component 630A and movement component 616B increase the zoom setting of camera user interface 612, as both movement components correspond to the same direction with respect to the displayed representation of the zoom scale (e.g., dragging the higher zoom level tick marks towards the center of settings control 622).

Figure 6Y:
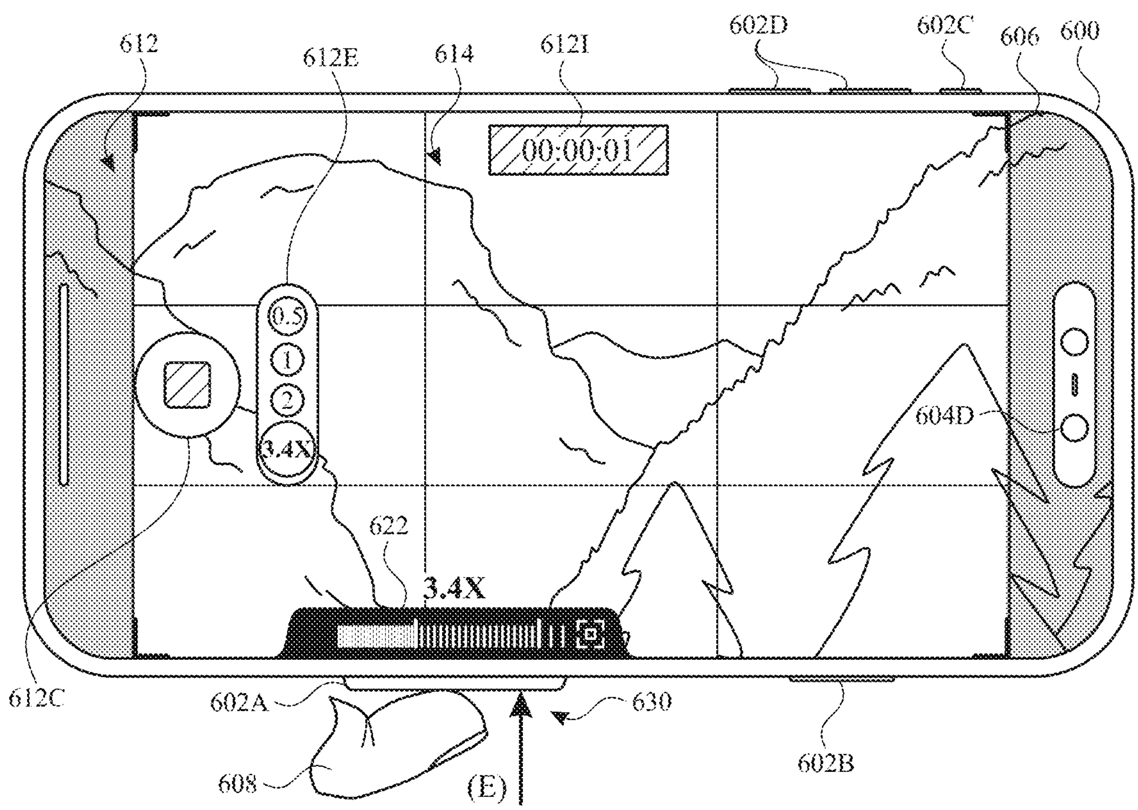

At FIG. 6Y, while displaying settings control 622, computer system 600 detects the input 630 transitioning first button 602A into hardware button state (E), e.g., increasing in intensity past the hard/full press threshold. As discussed with respect to FIG. 6U, in response to detecting the hard/full press of first button 602A, computer system 600 initiates media capture. As illustrated in FIG. 6Y, in response to detecting input 630 maintaining hardware button state (E) for at least a threshold period of time (e.g., 0.5 s, 0.75 s, 1 s, or 1.5 s), computer system 600 initiates capture of video media (e.g., as discussed in more detail with respect to FIGS. 8A-8P). While capturing video media, computer system 600 displays camera user interface 612 in a video capture mode, in particular, changing the aspect ratio of camera preview 614 to a wider format, ceasing display of levels affordance 612H, updating the appearance of shutter affordance 612C to appear as a stop recording button, and displaying capture timer 612I, as discussed in more detail with respect to FIGS. 8A-8P. Additionally, as computer system 600 detected the hard/full press of first button 602A while displaying settings control 622, computer system 600 continues displaying settings control 622.

Figure 6Z:
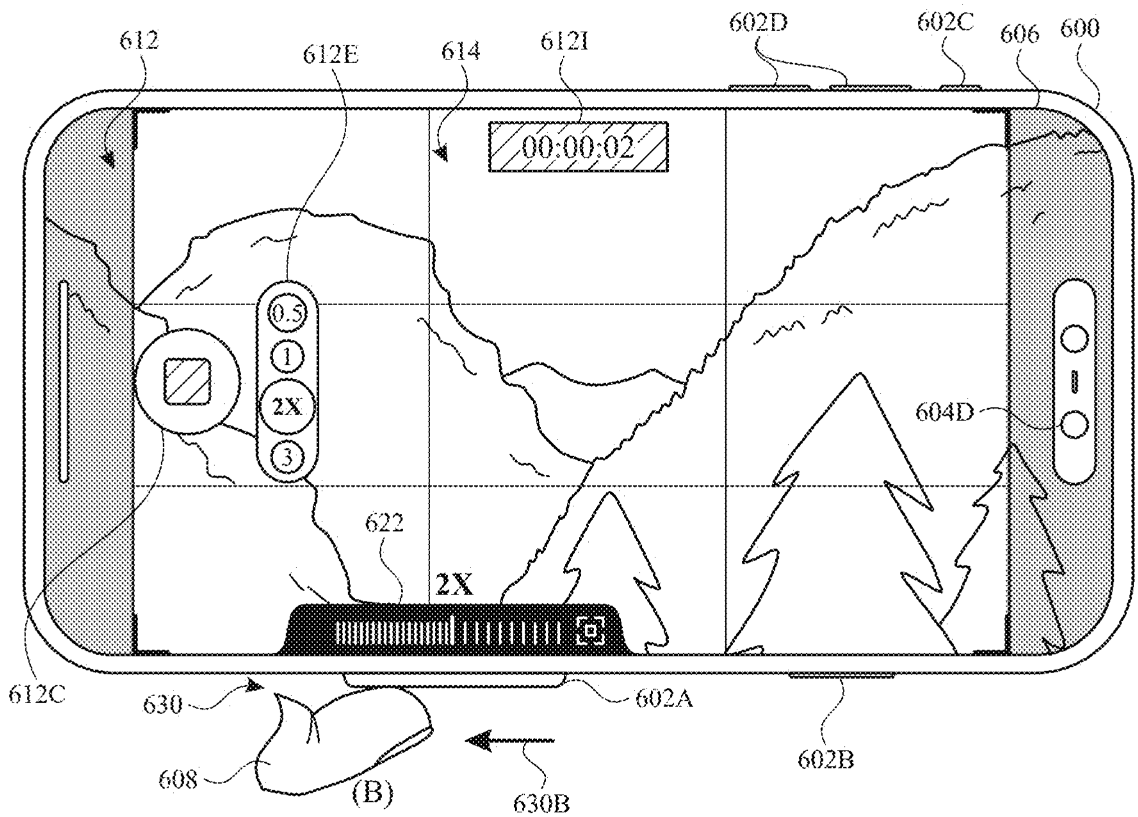
Figure 6A:
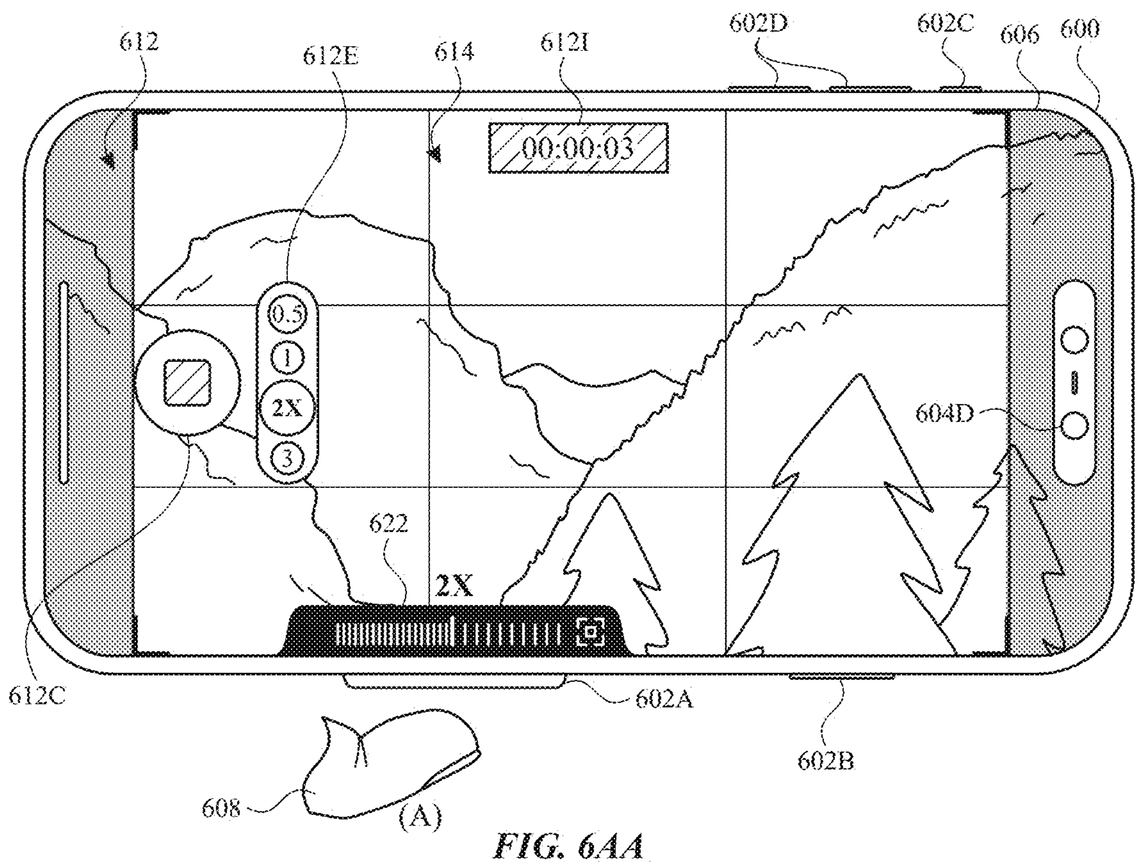
Figure 6A:
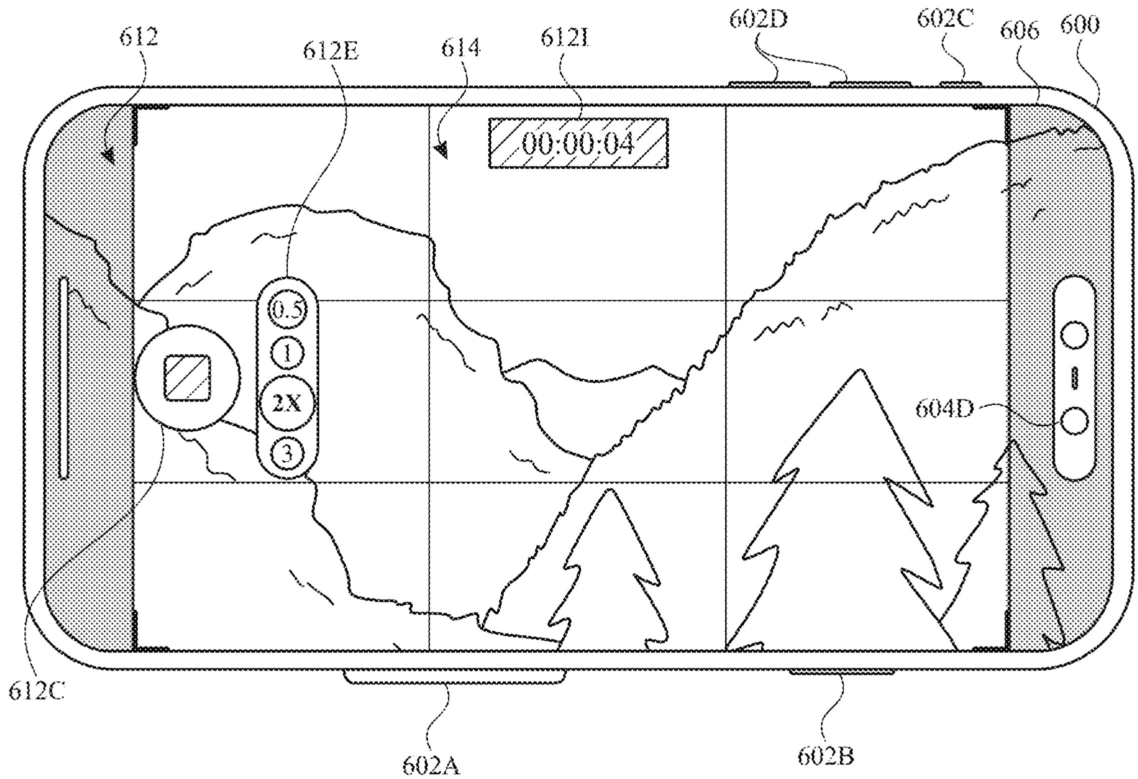
Figure 6A:
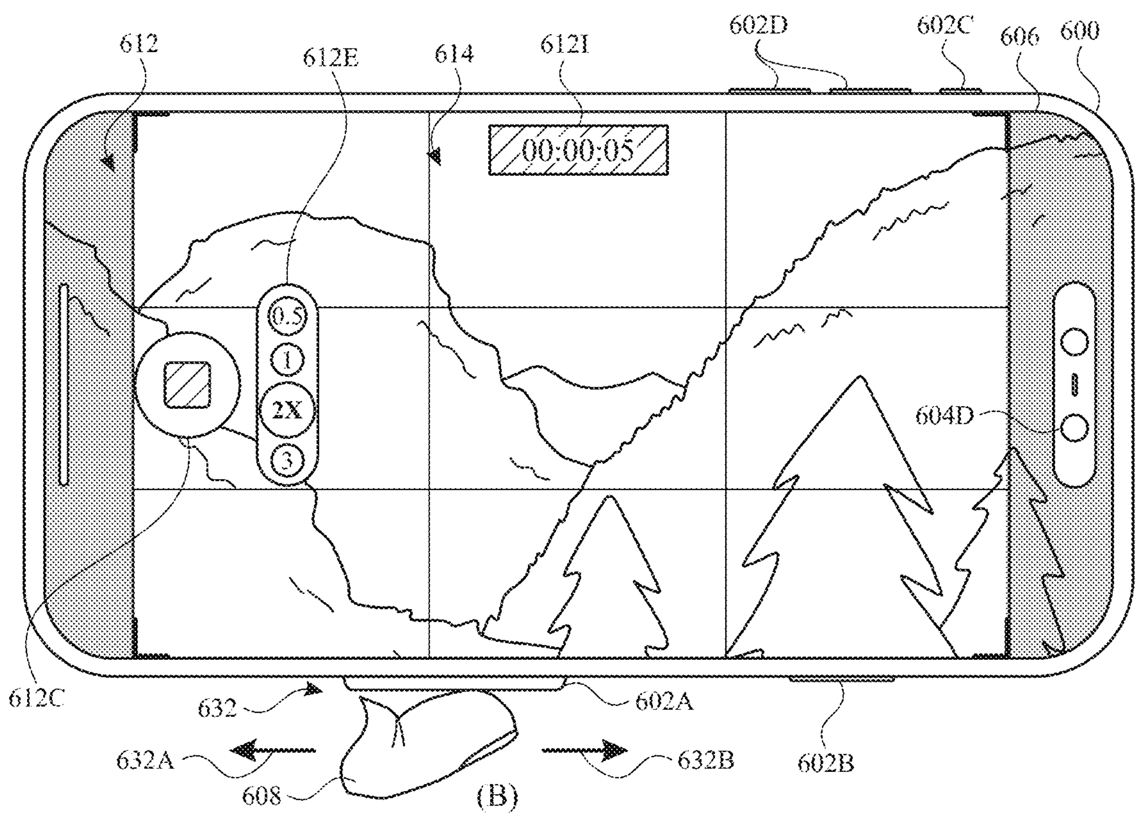
Figure 6A:
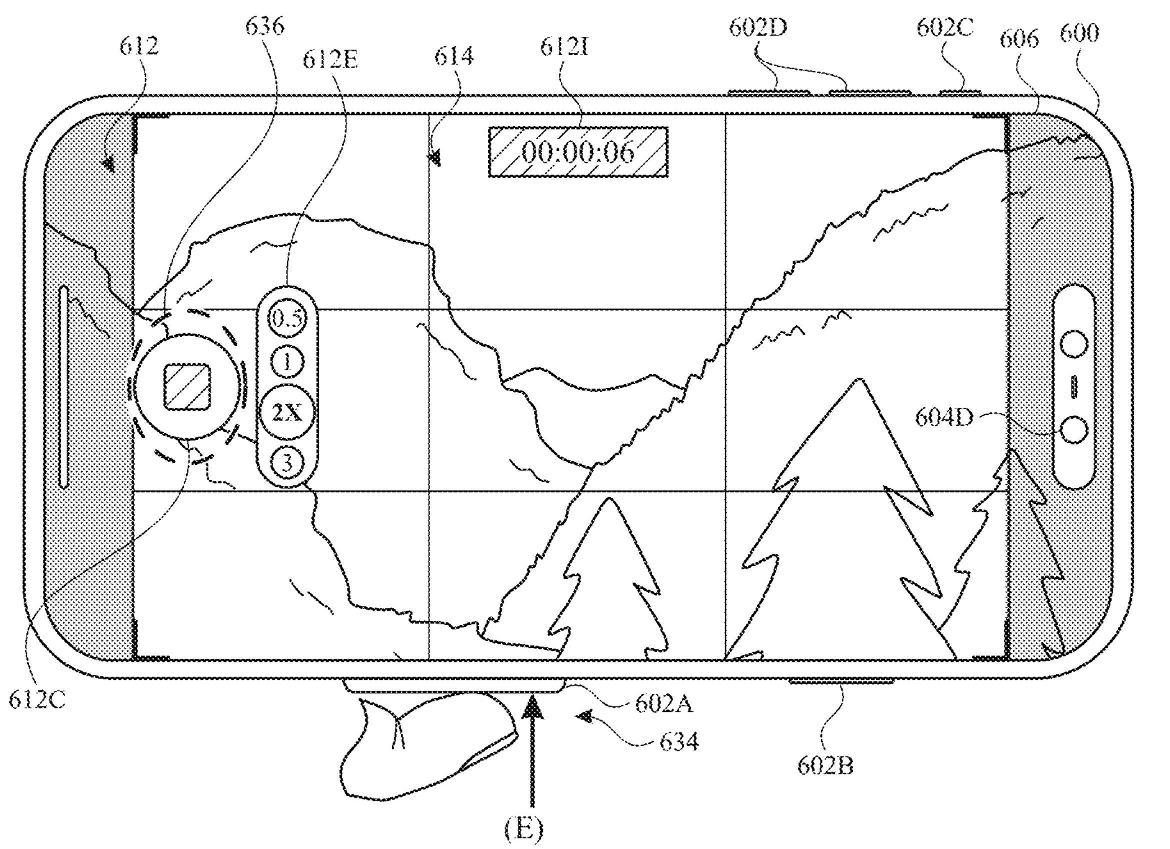
Figure 6A:
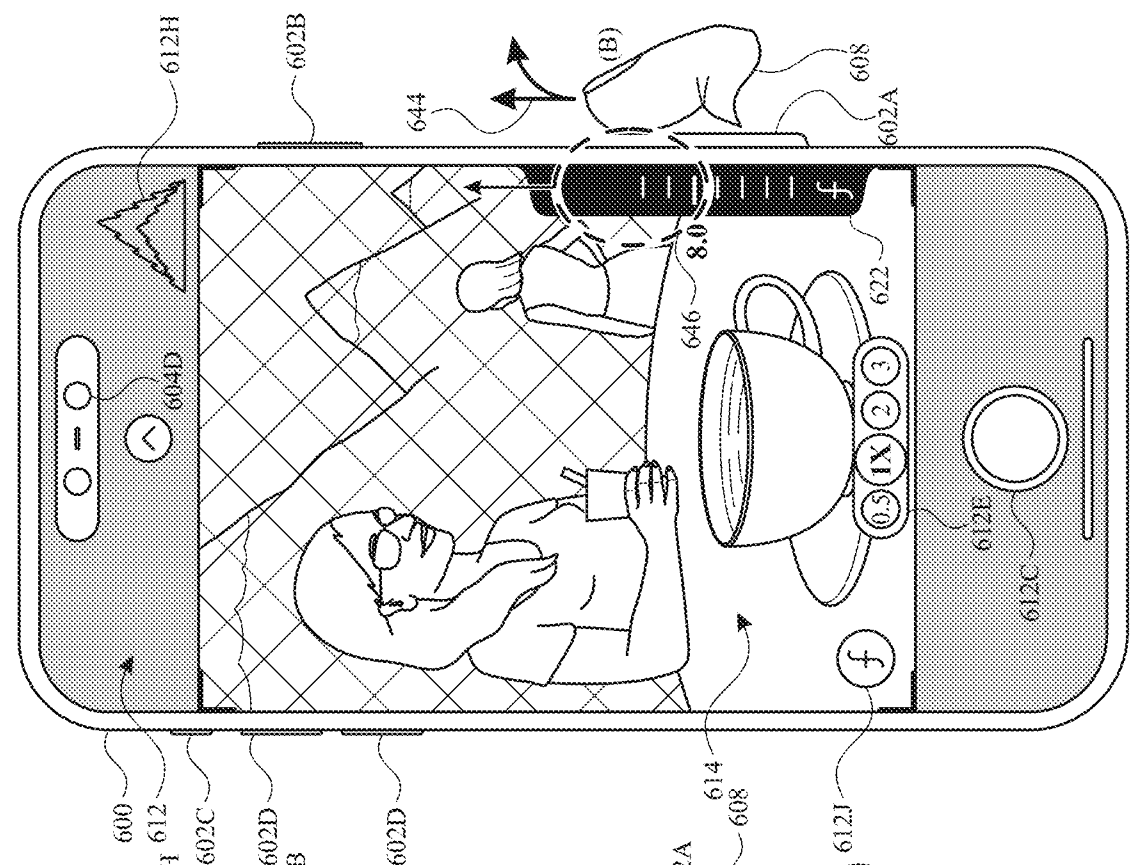
Figure 6A:
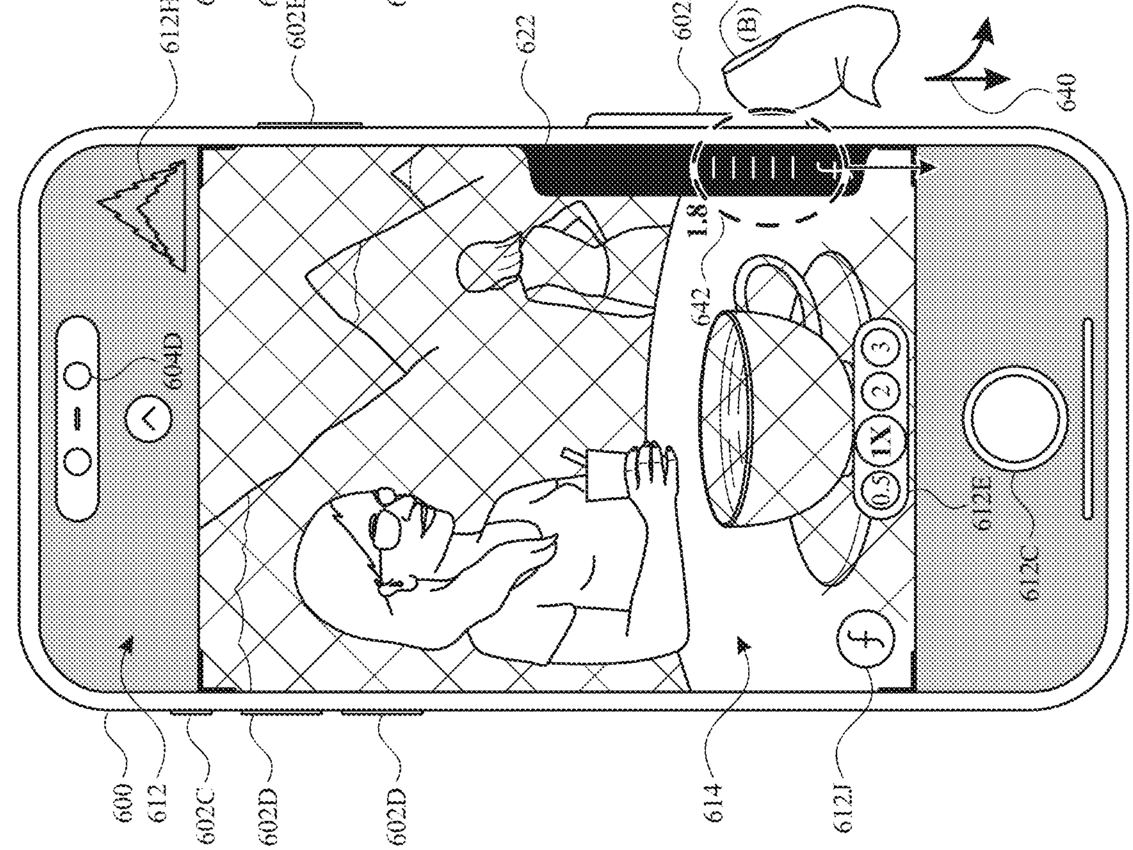
Figure 6A:
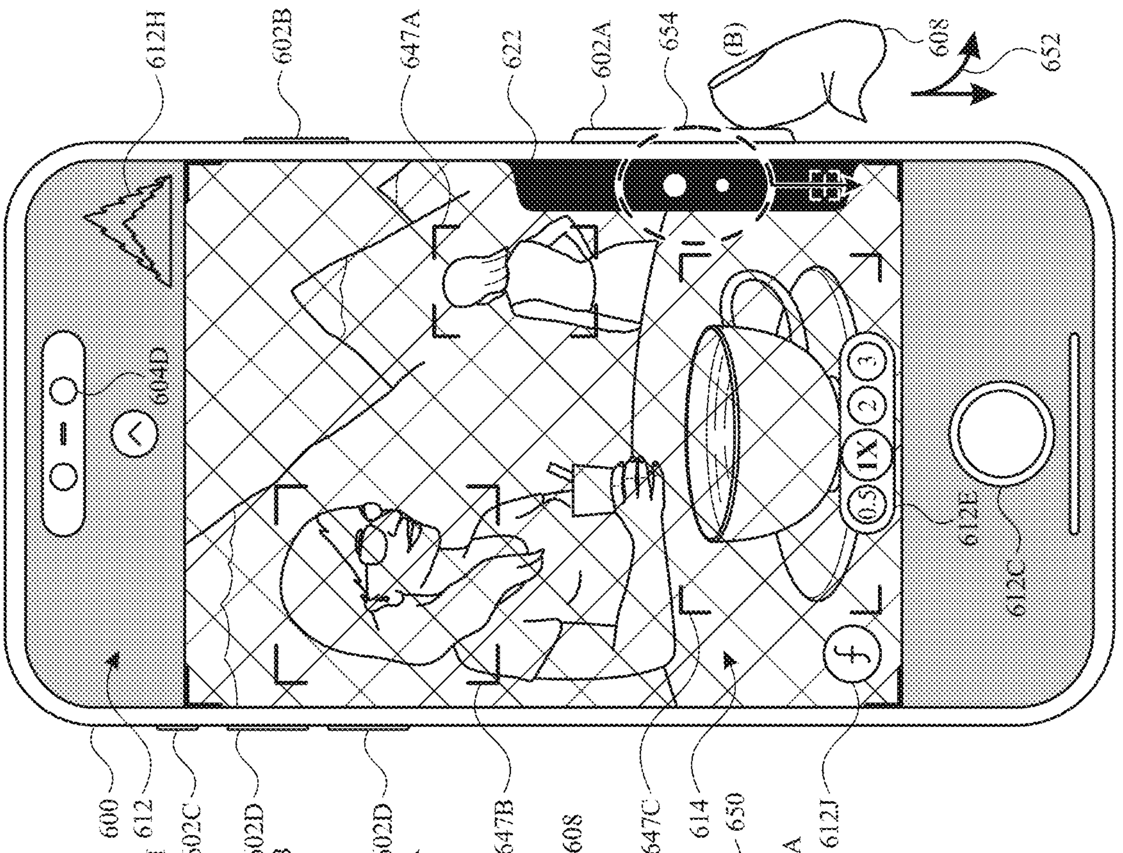
Figure 6A:
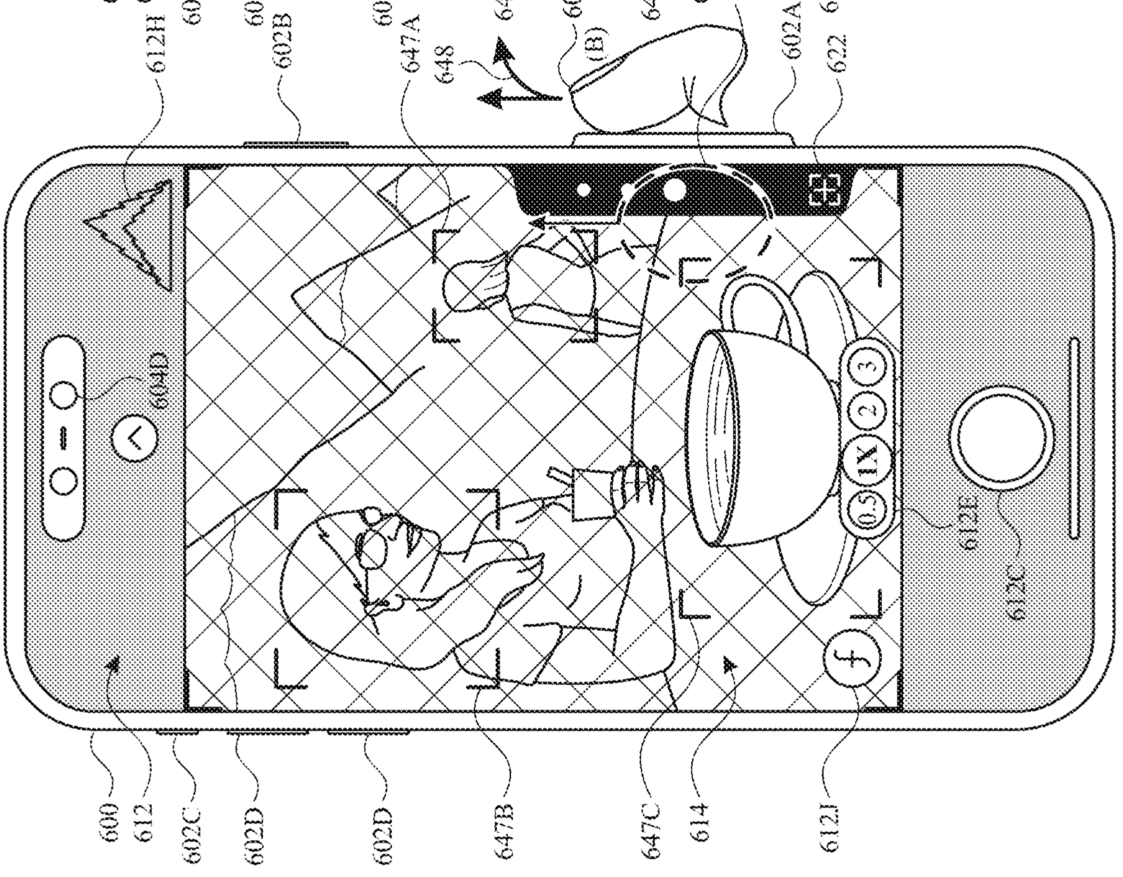
Figure 6A:
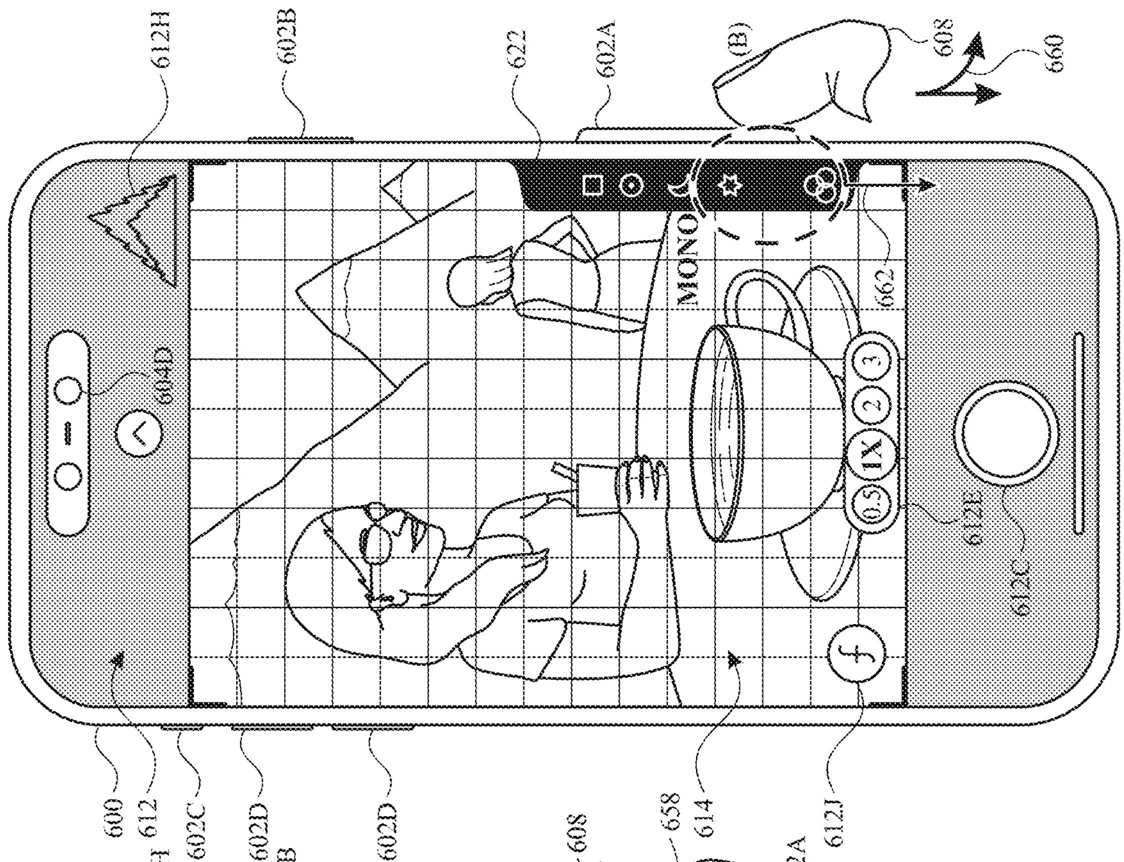
Figure 6A:
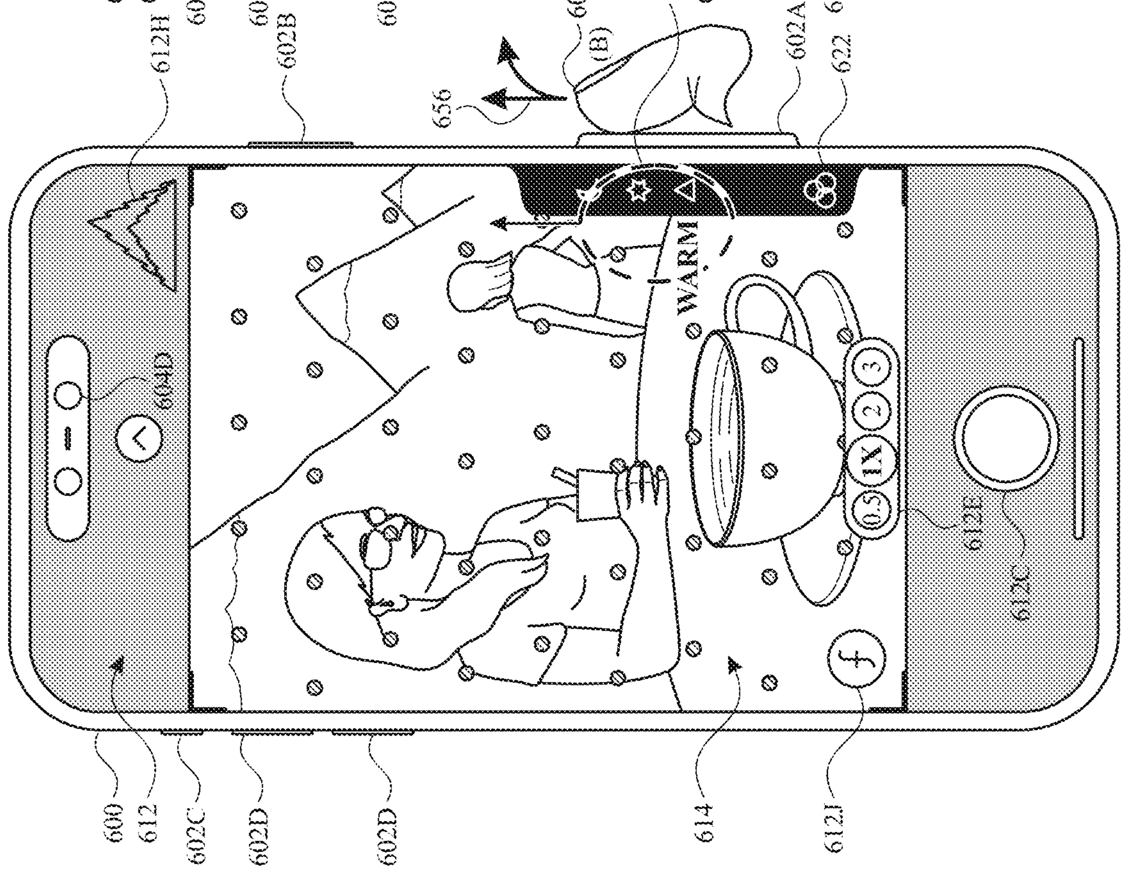
Figure 6A:
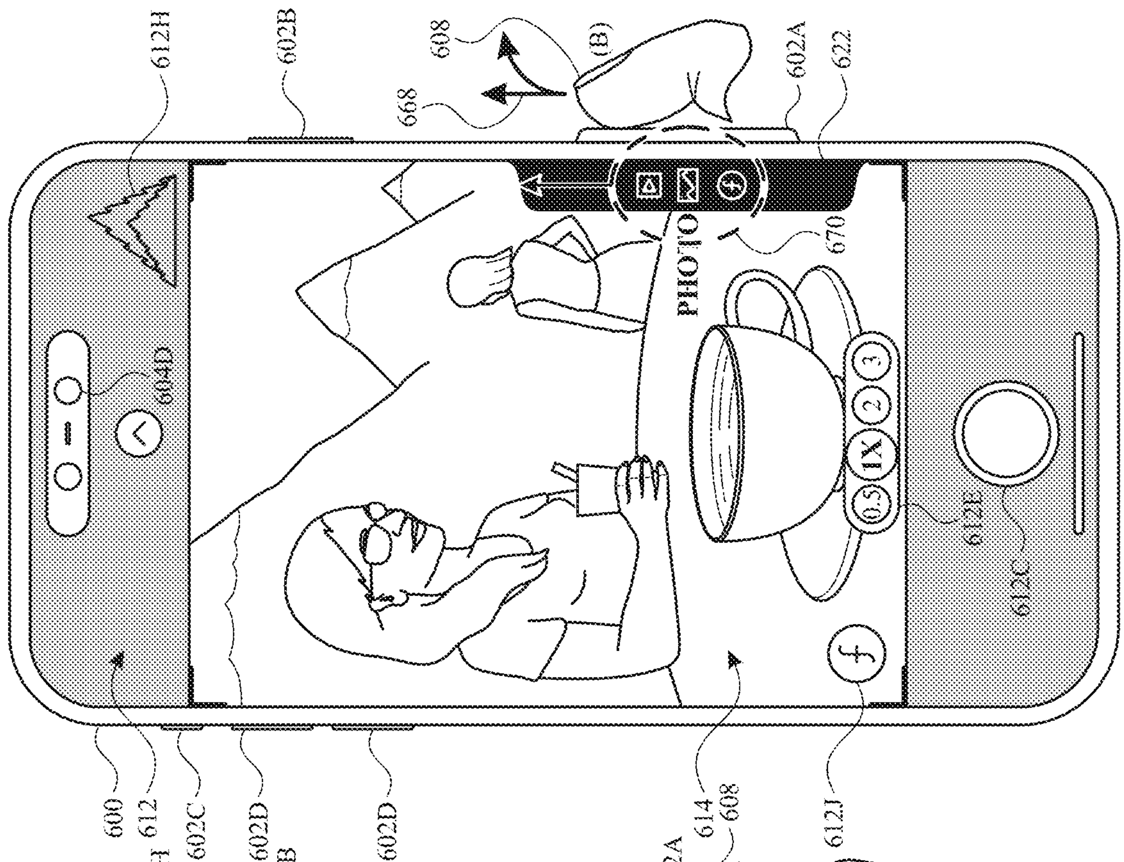
Figure 6A:
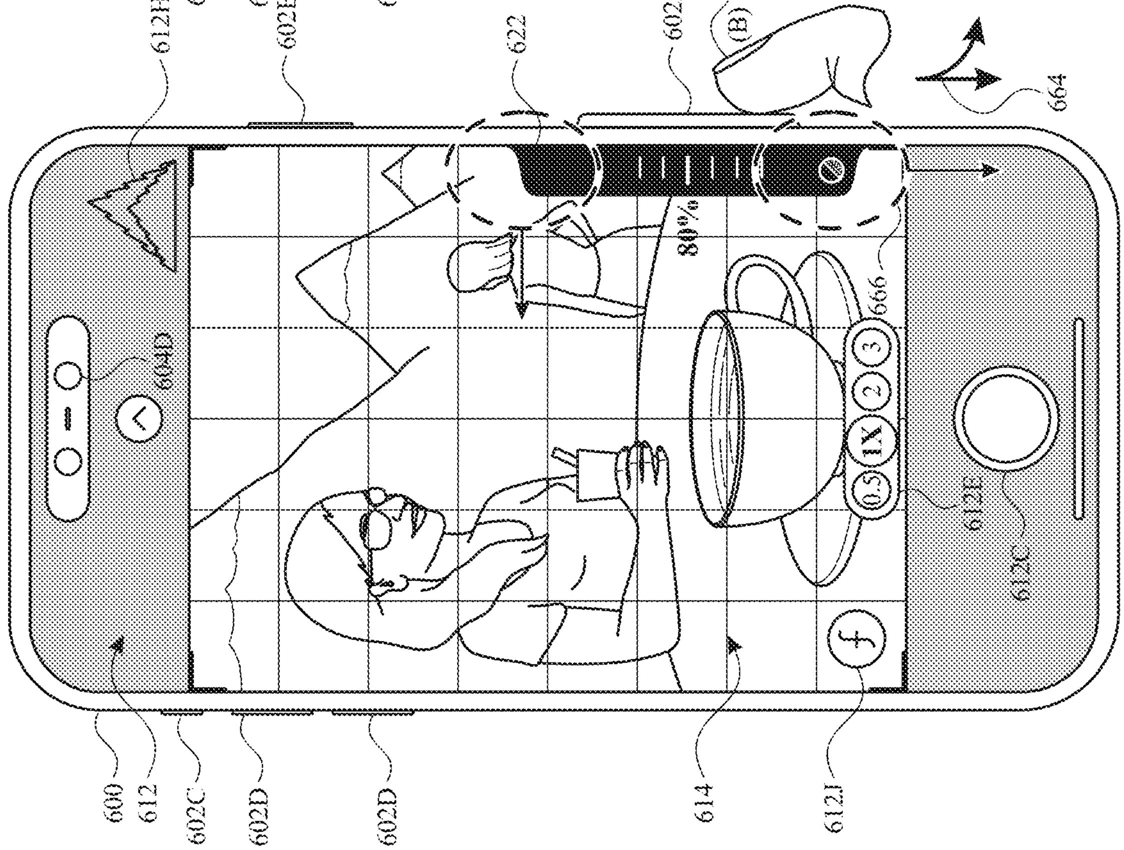
Figure 6A:
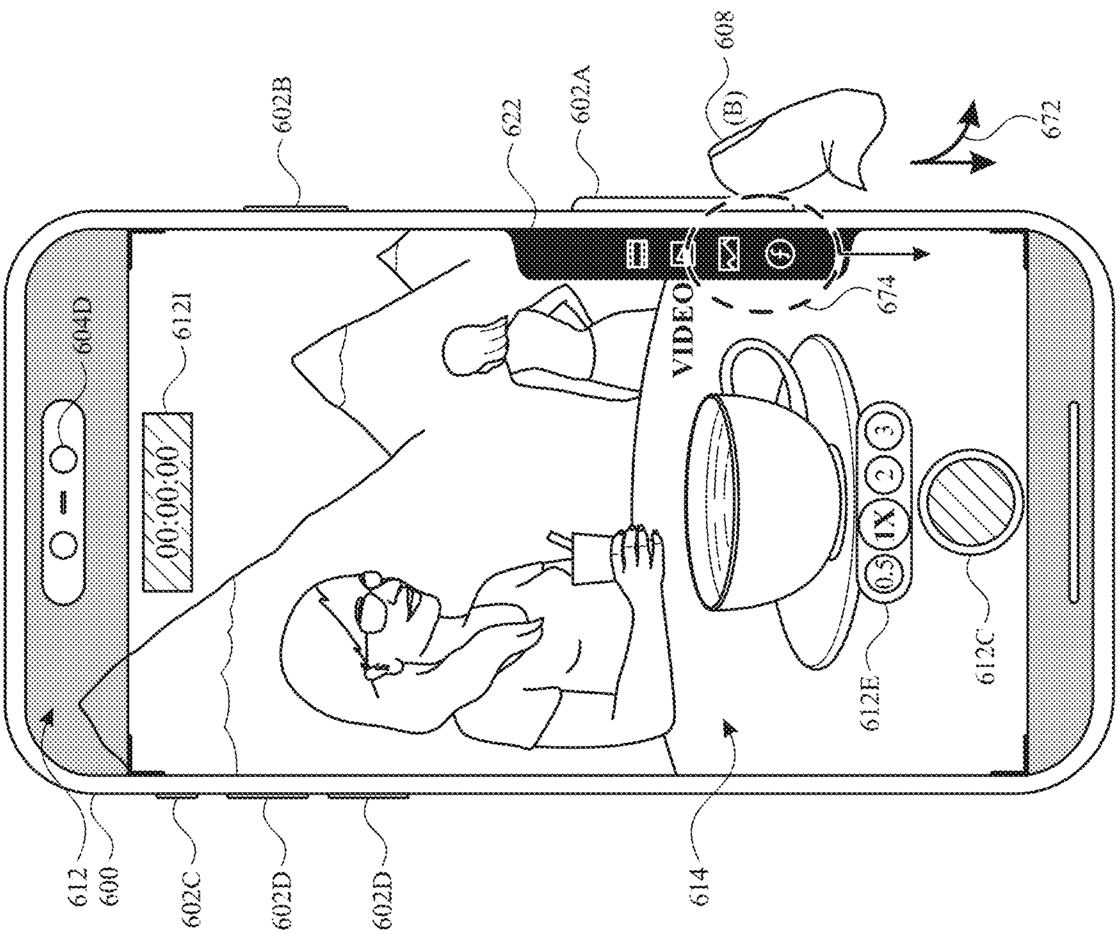

At FIG. 6Z, while capturing the video media and displaying settings control 622, computer system 600 detects movement component 630B of input 630 via first button 602A (and/or a swipe directed to settings control 622 via the touch-sensitive surface of display 606, as discussed above), where finger 608 swipes from right to left along the surface of first button 602A. As illustrated in FIG. 6Z, computer system 600 adjusts the zoom setting of camera user interface 612 based on movement component 630B, decreasing the zoom level of the ongoing video media capture from 3.4× to 2×. In some embodiments, as input 630 was not lifted off of first button 602A following the hard/full press initiating the video capture, computer system 600 responds to movement component 630B while first button 602A is in hardware button state (B), without needing to detect another light/partial press before adjusting the zoom setting.

At FIG. 6AA, while capturing the video media, computer system 600 detects lift-off from button 602A (e.g., ending input 630) and, as described above, continues displaying settings control 622 for at least a threshold period of time after lift-off. At FIG. 6AB, after the threshold period of time has elapsed without detecting re-established contact with first button 602A and/or settings control 622 on the touch-sensitive surface of display 606, computer system 600 ceases displaying settings control 622, as described above with respect to FIG. 6U, and continues capturing the video media at 2.0× zoom. As illustrated in FIG. 6AB, as video capture is ongoing, computer system 600 does not revert camera user interface 612 to the default mode following the lift-off, instead remaining in the video capture mode.

At FIG. 6AC, after ceasing to display settings control 622, computer system 600 detects input 632, including movement component 632A and/or movement component 632B, via first button 602A. As settings control 622 is not currently displayed and input 632 is insufficient (e.g., in intensity) to place first button 602A into hardware button state (D) (and/or movement component 632A and movement component 632B are insufficient in magnitude to qualify as a full swipe of first button 602A), computer system 600 does not display settings control 622 or adjust the zoom setting of camera user interface 612 based on movement component 632A and/or movement component 632B. In some embodiments, if input 632 qualified as a light/partial press, computer system 600 would re-display settings control 622 and adjust the zoom setting in response to subsequent movement inputs while continuing the video media capture. In some embodiments, computer system 600 will display contact indicator 618 (e.g., as described with respect to FIGS. 6F-6H) in response to input 632 while the video capture is ongoing.

At FIG. 6AD, computer system 600 detects input 634, a press input that places first button 602A into hardware button state (E), qualifying as a hard/full press (and, in some embodiments, a quick hard/full press, which does not result in displaying the contact indicator 618 and/or settings control 622). In response to input 634, computer system 600 ends the capture of the video media. Alternatively, in some embodiments, computer system 600 ends the capture of video media in response to detecting touch input 636 directed to shutter affordance 612C via the touch-sensitive surface of display 606. Upon ending the capture of the video media, computer system 600 will revert camera user interface 612 to the default mode and return the aspect ratio of camera preview 614 and the appearance of shutter affordance 612C to the state illustrated in FIG. 6W, cease displaying capture timer 612I, and re-display capture mode affordance 612A, camera selection affordance 612B, captured media icon 612D, multi-frame photo affordance 612F, and camera flash affordance 612G.

FIGS. 6AE-6AM illustrate computer system 600 displaying settings control 622 for settings of camera user interface 612 other than the zoom setting, in particular, a depth-of-field setting, a focus setting, a filter setting, and a capture mode setting. In some embodiments, computer system 600 displays settings control 622 for a respective settings of camera user interface 612 as illustrated in FIGS. 6AE-6AM in response to a light/partial press of first button 602A or a full swipe of first button 602A, such as described with respect to displaying settings control 622 for the zoom setting of camera user interface 612 in FIGS. 6E-6J. In some embodiments, computer system 600 displays settings control 622 for a respective setting of camera user interface 612 in response to a light/partial press or full swipe when the respective setting is currently associated with first button 602A, for example, as described in further detail with respect to FIGS. 10A-10W.

As illustrated in FIGS. 6AE-6AF, computer system 600 displays settings control 622 for a simulated depth-of-field setting of camera user interface 612. For example, the simulated depth-of-field setting of camera user interface 612 controls visual effects simulating the depth-of-field of a camera or lens with a particular aperture setting (e.g., an f-stop value, which defines a ratio between the focal length of a photographic lens and the aperture size, such as f/1.8, f/2.8, or f/8), such that portions of the environment within the simulated depth-of-field's range (e.g., the current focal plane or focal range) appear in focus (e.g., sharp) in camera preview 614 and/or in captured media, while portions of the environment outside of the simulated depth-of-field's range appear out of focus (e.g., blurry). In some embodiments, computer system 600 displays camera preview 614 with the simulated depth-of-field effects applied while displaying settings control 622 for the simulated depth-of-field setting (e.g., in response to a light/partial press and/or full swipe of first button 602A), while camera user interface 612 is in a particular capture mode (e.g., a portrait or cinematic capture mode, for instance, selected using capture mode affordance 612A), and/or while capture of depth information is enabled (e.g., indicated in FIGS. 6AE-6AF by the display of depth capture affordance 612J, an f-stop icon that indicates depth information is being captured and/or can be selected to toggle the display of the simulated depth-of-field effects). As illustrated in FIGS. 6AE-6AF, settings control 622 for the simulated depth-of-field setting of camera user interface 612 includes text indicating the current f-stop value, an icon representing the simulated depth-of-field setting, and a representation of an f-stop scale. In particular, the representation of the f-stop scale includes a plurality of tick marks representing ordered f-stop values in intervals of f/0.1, with f-stop values for narrower depths-of-field (e.g., f/1.8) are displayed closer to the set of cameras and f-stop values for wider depths-of-field (e.g., f/8.0) are displayed further from the set of cameras.

At FIG. 6AE, while displaying settings control 622 for the simulated depth-of-field setting of camera user interface 612, computer system 600 detects a downwards movement input (e.g., moving away from the set of cameras) such as movement input 640 directed to first button 602A and/or touch input 642 directed to settings control 622 on the touch-sensitive surface of display 606. For example, movement input 640 and/or touch input 642 may include swipe/drag movements (e.g., movements remaining in contact with first button 602A and/or display 606, as described with respect to FIGS. 6L and 6O), flick movements (e.g., as described with respect to FIGS. 6M-6N and 6P-6Q), and/or directional tap inputs (e.g., as described with respect to FIGS. 6R-6S) directed towards the lower region of first button 602A and/or settings control 622 (e.g., the regions further away from the set of cameras).

In response to movement input 640 and/or touch input 642, computer system 600 adjusts the simulated depth-of-field setting of camera user interface 612 to an f-stop value of f/1.8. As illustrated in FIG. 6AE, at the f-stop value of f/1.8 (e.g., a relatively narrow depth-of-field), computer system 600 displays camera preview 614 with the midground (e.g., including the woman sitting at the table) in focus and selectively blurs the foreground (e.g., including the coffee cup) and background (e.g., including the person standing behind the table and the mountains in the distance), with the blurring represented in these figures by crosshatching. Additionally, computer system displays the representation of the f-stop scale with the tick mark representing f/1.8 at the center point of settings control 622 and updates the text indicating the current f-stop value in settings control 622 to "1.8." As described with respect to FIG. 6L, in some embodiments, computer system 600 animates the representation of the f-stop scale being dragged down along with the movement inputs, pulling the f/1.8 tick mark towards the center, and may update the simulated depth-of-field effects applied to camera preview 614 to reflect the f-stop values of the tick marks as they pass the center of settings control 622, providing a "live" preview of the depth-of-field adjustment. As described with respect to FIGS. 6M-6N and 6P-6Q, in some embodiments, if the detected movements are flick or tap movements, computer system 600 adjusts the simulated depth-of-field setting to skip or snap to the next f-stop value of a set of predetermined f-stop values (e.g., f/1.8, f/2.4, and f/4.0).

Likewise, at FIG. 6AF, while displaying settings control 622 for the simulated depth-of-field setting of camera user interface 612, computer system 600 detects an upwards movement input (e.g., moving towards the set of cameras), such as movement input 644 directed to first button 602A and/or touch input 642 directed to settings control 622 on the touch-sensitive surface of display 606, and in response, adjusts the simulated depth-of-field setting of camera user interface 612 to an f-stop value of f/8.0. For example, movement input 640 and/or touch input 646 may include swipe/drag movements, flick movements, and/or directional tap inputs directed towards the upper region of first button 602A and/or settings control 622 (e.g., the regions closer to the set of cameras). As illustrated in FIG. 6AF, at the f-stop value of f/8.0 (e.g., a relatively wide depth-of-field), computer system 600 displays camera preview 614 with a wider region of the midground (e.g., including the woman sitting at the table, the coffee cup, and the person standing behind the table) in focus and selectively blurs the background (e.g., including the mountains in the distance) and additionally displays the representation of the f-stop scale with the tick mark representing f/8.0 at the center point of settings control 622, and updates the text indicating the current f-stop value in settings control 622 to "8.0." As described above, in some embodiments, computer system 600 animates the representation of the f-stop scale being dragged up along with the movement inputs, pulling the f/8.0 tick mark towards the center, and may display "live" updates camera preview 614 and/or the text included in settings control 622 along with the movement inputs.

As illustrated in FIGS. 6AG-6AH, computer system 600 displays settings control 622 for a focus setting of camera user interface 612. For example, the focus setting of camera user interface 612 controls which subjects detected in the field-of-view of the environment appear in focus (e.g., sharp) in camera preview 614 and/or in captured media and selectively blurring other subjects and/or regions (e.g., similarly to applying the simulated depth-of-field effects). In some embodiments, computer system 600 detects potential subjects for selective focus while displaying settings control 622 for the focus setting (e.g., in response to a light/partial press and/or full swipe of first button 602A), while camera user interface 612 is in a particular capture mode (e.g., a portrait or cinematic capture mode, for instance, selected using capture mode affordance 612A), and/or while capture of depth information is enabled. As illustrated in FIGS. 6AG-6AH, settings control 622 for the simulated depth-of-field setting of camera user interface 612 includes an icon representing the focus setting and a representation of available (e.g., detected) subjects for selective focus. In particular, the representation of available subjects includes graphical elements (e.g., dots) representing, from top to bottom, the person standing behind the table, the woman sitting at the table, and the coffee cup on the table, also indicated in camera preview 614 by subject indicators 647A, 647B, and 647C.

At FIG. 6AG, while displaying settings control 622 for the focus setting of camera user interface 612, computer system 600 detects an upwards movement input (e.g., moving towards the set of cameras) such as movement input 648 directed to first button 602A and/or touch input 650 directed to settings control 622 on the touch-sensitive surface of display 606, e.g., swipe/drag movements, flick movements, and/or directional tap inputs directed towards the upper region of first button 602A and/or settings control 622 (e.g., the regions closer to the set of cameras). In response to movement input 648 and/or touch input 650, computer system 600 adjusts the focus setting of camera user interface 612 to select the coffee cup on the table as the subject of selective focus, displaying camera preview 614 with the coffee cup in focus while blurring the other portions of the field-of-view (e.g., including the other detected subjects). Additionally, computer system displays the representation of the available subjects with the graphical element representing the coffee cup at the center point of settings control 622, for example, animating the representation of the available subjects being dragged up along with the movement inputs, pulling the bottom dot (representing the coffee cup) towards the center.

Likewise, at FIG. 6AH, while displaying settings control 622 for the focus setting of camera user interface 612, computer system 600 detects a downwards movement input (e.g., moving away from the set of cameras) such as movement input 652 directed to first button 602A and/or touch input 654 directed to settings control 622 on the touch-sensitive surface of display 606, e.g., swipe/drag movements, flick movements, and/or directional tap inputs directed towards the lower region of first button 602A and/or settings control 622 (e.g., the regions further away from the set of cameras). In response to movement input 652 and/or touch input 654, computer system 600 adjusts the focus setting of camera user interface 612 to select the person standing behind the table as the subject of selective focus, displaying camera preview 614 with the person standing behind the table in focus while blurring the other portions of the field-of-view (e.g., including the other detected subjects). Additionally, computer system displays the representation of the available subjects with the graphical element representing the person standing behind the table at the center point of settings control 622, for example, animating the representation of the available subjects being dragged down along with the movement inputs, pulling the top dot (representing the person standing behind the table) towards the center.

As illustrated in FIGS. 6AI-6AK, computer system 600 displays settings control 622 for a filter setting of camera user interface 612, e.g., a setting for applying effects such as color grading, blurring, vignetting, simulated lighting, and/or augmented reality effects to media capture. For example, as illustrated in FIGS. 6AI-6AJ, the filter setting of camera user interface 612 controls which filter of a plurality of available filters is applied to camera preview 614 and/or the captured media. As another example, as illustrated in FIG. 6AK, the filter setting of camera user interface 612 adjusts the intensity of a filter being applied to camera preview 614 and/or the captured media. In some embodiments, computer system 600 applies a filter to camera preview 614 while displaying settings control 622 for the filter setting (e.g., in response to a light/partial press and/or full swipe of first button 602A) and/or while filter effects are enabled (e.g., by another control of camera user interface 612).

As illustrated in FIGS. 6AI-6AJ, settings control 622 for selecting between available filters of camera user interface 612 includes an icon representing the filter setting, text indicating the currently selected filter, and a representation of available filters. In particular, the representation of available filters includes graphical elements (e.g., icons) representing each of the available filters, such as a triangle icon representing a warm color grading filter, a starburst icon representing a cool color grading filter, a moon icon representing a monochromatic filter, a circle representing a vignetting effect, and a square representing an AR face filter.

At FIG. 6AI, while displaying settings control 622 for selecting a filter for camera user interface 612, computer system 600 detects an upwards movement input (e.g., moving towards the set of cameras) such as movement input 656 directed to first button 602A and/or touch input 658 directed to settings control 622 on the touch-sensitive surface of display 606, e.g., swipe/drag movements, flick movements, and/or directional tap inputs directed towards the upper region of first button 602A and/or settings control 622 (e.g., the regions closer to the set of cameras). In response to movement input 656 and/or touch input 658, computer system 600 changes the filter selection applied to camera user interface 612 to apply the warm color grading filter to camera preview 614, represented in FIG. 6AI by an overlay of dots. As illustrated in FIG. 6AI, computer system displays the representation of the available filter with the triangle icon representing the warm color grading filter at the center point of settings control 622, for example, animating the representation of the available filters being dragged up along with the movement inputs, pulling the triangle icon towards the center. Additionally, computer system 600 updates the text of settings control 622 to indicate the selected filter (e.g., displaying the text "WARM" at the center point of settings control 622).

Likewise, at FIG. 6AJ, while displaying settings control 622 for selecting a filter for camera user interface 612, computer system 600 detects a downwards movement input (e.g., moving away from the set of cameras) such as movement input 660 directed to first button 602A and/or touch input 662 directed to settings control 622 on the touch-sensitive surface of display 606, e.g., swipe/drag movements, flick movements, and/or directional tap inputs directed towards the lower region of first button 602A and/or settings control 622 (e.g., the regions further away from the set of cameras). In response to movement input 652 and/or touch input 654, changes the filter selection applied to camera user interface 612 to apply the monochromatic filter to camera preview 614, represented in FIG. 6AJ by a square grid overlay. Additionally, computer system updates the text (e.g., to "MONO") and displays the representation of the available subjects with the moon icon representing the monochromatic filter at the center point of settings control 622, for example, animating the representation of the available filters being dragged down along with the movement inputs, pulling the moon icon towards the center.

As illustrated in FIG. 6AK, settings control 622 for adjusting a filter intensity of camera user interface 612 includes an icon representing the filter setting, text indicating the current filter intensity (e.g., as a percentage), and a representation of a filter intensity scale. In particular, the representation of the filter intensity scale includes a plurality of tick marks representing ordered filter intensity values in intervals of 5%, with tick marks representing higher intensities (e.g., 100%) displayed closer to the set of cameras and tick marks representing lower intensities (e.g., 0%) displayed further from the set of cameras. At FIG. 6AK, while displaying settings control 622 for adjusting the filter intensity of camera user interface 612, computer system 600 detects a downwards movement input (e.g., a swipe/drag, flick, and/or directional tap), such as movement input 664 directed to first button 602A and/or touch input 666 directed to settings control 622 on the touch-sensitive surface of display 606. In response to movement input 664 and/or touch input 666, computer system 600 reduces the filter intensity to 80%, represented in FIG. 6AK by the lower density of the square grid overlay.

As illustrated in FIGS. 6AL-6AM, computer system 600 displays settings control 622 for selecting a capture mode of camera user interface 612, such as selecting between a standard photo capture mode, a portrait photo capture mode (e.g., for capturing photo media with simulated depth-of-field effects applied), a standard video capture mode, and/or a cinematic video capture mode (e.g., for capturing photo media with a high frame rate and/or simulated depth-of-field effects applied). As illustrated in FIGS. 6AL-6AM, settings control 622 for selecting the capture mode of camera user interface 612 includes graphical elements (e.g., icons) representing the available capture modes. In particular, the representation of available capture modes includes a film strip icon representing the cinematic video capture mode, a video play icon representing the standard video capture mode, a landscape icon representing the standard photo capture mode, and an f-stop icon representing the portrait photo capture mode.

At FIG. 6AL, while displaying settings control 622 for selecting the capture mode of camera user interface 612, computer system 600 detects an upwards movement input (e.g., moving towards the set of cameras), such as movement input 668 directed to first button 602A and/or touch input 670 directed to settings control 622 on the touch-sensitive surface of display 606, e.g., swipe/drag movements, flick movements, and/or directional tap inputs directed towards the upper region of first button 602A and/or settings control 622 (e.g., the regions closer to the set of cameras). In response to movement input 648 and/or touch input 650, computer system 600 places camera user interface 612 into a standard photo capture mode, displaying the representation of the available capture modes with the landscape icon representing the standard photo capture mode at the center point of settings control 622 (e.g., animating the representation of the available capture modes being dragged up along with the movement inputs, pulling the landscape icon towards the center) and displaying the text "PHOTO" at the center of settings control 622.

Likewise, at FIG. 6AM, while displaying settings control 622 for selecting the capture mode of camera user interface 612, computer system 600 detects a downwards movement input (e.g., moving away from the set of cameras) such as movement input 672 directed to first button 602A and/or touch input 674 directed to settings control 622 on the touch-sensitive surface of display 606, e.g., swipe/drag movements, flick movements, and/or directional tap inputs directed towards the lower region of first button 602A and/or settings control 622 (e.g., the regions further away from the set of cameras). In response to movement input 672 and/or touch input 674, computer system 600 places camera user interface 612 into the standard video capture mode, in particular, changing the aspect ratio of camera preview 614 to a wider format, ceasing display of levels affordance 612H, updating the appearance of shutter affordance 612C to appear as a stop recording button, and displaying capture timer 612I. Additionally, computer system displays the representation of the available capture modes with the video play icon representing the standard video capture mode at the center point of settings control 622 (e.g., animating the representation of the available capture modes being dragged down along with the movement inputs, pulling the video play icon towards the center) and displaying the text "VIDEO" at the center of settings control 622.

FIG. 7 is a flow diagram illustrating method 700 for controlling a computer system based on variable characteristics of hardware inputs, in accordance with some embodiments. The method is performed at a computer system (e.g., 100, 300, 500, and/or 600) that is in communication with a display generation component (e.g., 606) (e.g., a display controller; a touch-sensitive display system; a display (e.g., integrated and/or connected), a 3D display, a transparent display, a projector, and/or a heads-up display) and a first input device (e.g., 602A, 602B, 602C, 602D, and/or a touch sensitive surface of display 606) (e.g., including one or more hardware buttons and/or surfaces, such as mechanical (e.g., physically depressible), solid-state, intensity-sensitive, and/or touch-sensitive (e.g., capacitive) buttons and/or surfaces), e.g., as illustrated in FIGS. 6A-6B. In some embodiments, the first input device is included in a plurality of input devices in communication with the computer system. In some embodiments, the computer system is optionally in communication with one or more cameras (e.g., 604A, 604B, 604C, and/or 604D), such as a rear (user-facing) camera and a forward (environment-facing) camera and/or a plurality of cameras with different lenses, such as a standard camera, a telephoto camera, and/or a wide-angle camera. In some embodiments, the computer system is optionally in communication with one or more sensors, such as camera sensors, optical sensors, depth sensors, capacitive sensors, intensity sensors, motion sensors, vibration sensors, and/or audio sensors.

The computer system (e.g., 600) detects (702), via the first input device (e.g., 602A, 602B, 602C, 602D, and/or a touch sensitive surface of display 606), a first set of one or more inputs directed to the first input device (e.g., 609, 616, 624, 628, 630, 632, 634, 640, 642, 644, 646, 648, 650, 652, 654, 656, 658, 660, 662, 664, 666, 668, 670, 672, 674, and/or other inputs as described with respect to FIGS. 8A-11 and/or 14A-15) (e.g., one or more presses, taps, clicks, swipes, and/or other manipulations of the first input device). In some embodiments, the first set of one or more inputs includes a single input. In some embodiments, the first set of one or more inputs includes a single continuous contact with the first input device that includes multiple component inputs, such as a press, followed by movement.

In response to detecting the first set of one or more inputs (704) and in accordance with a determination that the first set of one or more inputs satisfies (e.g., meets) a first set of criteria (706), the computer system performs (708) a first operation (e.g., as described with respect to FIGS. 6L-6S, 6X, 6Z, 6AE-6AM, 10G, 10J, 10N-10O, 10R, 10U, and/or 14A-14Z) (e.g., changing an appearance of a user interface, displaying a menu, selecting an option, changing a setting, and/or previewing a media capture effect; e.g., displaying controls for and/or changing a zoom level, an exposure level, an f-stop value for a simulated depth-of-field effect, a selected subject/focal point, a saturation level, a color balance setting, and/or a capture guidance setting). In some embodiments, the first operation is performed based on the movement of the first type, e.g., changing a setting based on a direction and magnitude of the movement. In some embodiments, in accordance with a determination that the first input does not satisfy the first set of criteria, the computer system foregoes performing the first operation. In some embodiments, the first set of criteria are satisfied when the set of inputs includes a light/partial press accompanied by movement on the first input device, e.g., simultaneously (e.g., maintaining a light/partial inward press while moving a finger across the surface of the first input device), with some temporal overlap (e.g., beginning to move the finger while performing a light/partial press), and/or sequentially (e.g., beginning to move the finger across the surface of the first input device within a threshold period of time after releasing/lifting the light/partial press).

The first set of criteria includes a first criterion that is satisfied when the first set of one or more inputs includes a first input intensity (e.g., an input detected by an intensity sensor, such as a pressure sensor, and/or by a mechanical button that can be physically depressed to one or more states when pushed) that exceeds a first threshold intensity (e.g., as described with respect to input 616 at FIG. 6I and/or input 630 at FIG. 6W) (e.g., a light/partial press threshold; in some embodiments, a force or pressure threshold, e.g., 25 g/cm$^3$, 50 g/cm$^3$, or 100 g/cm$^3$; in some embodiments, a threshold mechanical state corresponding to the first threshold intensity, e.g., detecting physical depression of a mechanical button to a light/partial press state as a substitute measurement for force/pressure). In some embodiments, the first threshold intensity is an activation threshold, such that the first criterion remains satisfied once the input intensity exceeds the first (e.g., activation) threshold intensity until a different set of conditions are met, e.g., until the applied pressure exceeds a higher threshold pressure (e.g., transitioning to a hard/full press); until the input intensity drops below a lower, maintenance threshold intensity; until a release of the first input is detected; and/or until a threshold period of time passes without detecting particular inputs and/or input characteristics.

The first set of criteria includes a second criterion that is satisfied when the first set of one or more inputs includes more than a threshold amount of movement of a first type (e.g., 616B, 624B, 616C, 624B, 616D, 624C, 616E, 624D, 630A, 630B, 644, 646, 648, 650, 652,654,656, 658, 660, 662, 664, 666, 668, 670, and/or 672, and/or as described with respect to FIGS. 10G, 10J, 10N, 10O, 10R, 10U, and/or 14A-14Z, below). In some embodiments, a movement of the first type includes a movement component perpendicular to the direction of the first input intensity, such as swiping and/or flicking gestures across, over, and/or around the surface of the first input device that the first input intensity is pressing into. In some embodiments, a movement of the first type includes a lift-off movement from the first input device, such as discrete tapping and/or flicking gestures. In some embodiments, the threshold amount includes a threshold distance/length of movement, e.g., 0.1 mm, 1 mm, 2.5 mm, or 1 cm.; In some embodiments, the first set of criteria includes a criterion that is met (e.g., satisfied) when the first input intensity does not exceed a higher threshold intensity (e.g., the second threshold intensity) for at least a threshold period of time (e.g., 0.05 s, 0.25 s, 0.7 s, or 1 s) after the first input intensity exceeds the first threshold intensity. For example, if the first input quickly transitions from a light/partial press to a hard/full press, the computer system foregoes performing the first operation. In some embodiments, the first set of criteria includes a criterion that is met when the second criterion is met after the first criterion is met. For example, the first set of criteria are only met if more than the threshold amount of movement of the first type is detected after detecting the first threshold intensity. In some embodiments, the first set of criteria includes a criterion that is met when the second criterion is met within a threshold period of time after the first criterion is met and/or when the second criteria is met while displaying a particular user interface, e.g., the user can briefly lift and replace a finger while making the movement. In some embodiments, in accordance with a determination that the first input satisfies at least the first criterion but not the second criterion (e.g., in response to detecting a light/partial press input without accompanying movement), the computer system performs a different operation, such as changing the appearance of a user interface without changing a setting. In some embodiments, in accordance with a determination that the first input satisfies the second criterion and not the first criterion (e.g., in response to detecting movement without detecting an activation pressure), the computer system foregoes responding to the first input.

In response to detecting the first set of one or more inputs (704) and in accordance with a determination that the first set of one or more inputs directed to the first input device satisfies (e.g., meets) a second set of criteria different from the first set of criteria (710) (in some embodiments, the second set of criteria are satisfied when the press input is a hard/full press), the computer system performs (712) a second operation different from the first operation (e.g., as described with respect to FIGS. 6U-6V, 6Y, 6AD, 8A, 8C, 10H, and/or 10V) (in some embodiments, a media capture operation, e.g., capturing photo media, initiating capture of video media, and/or stopping capture of video media). The second set of criteria includes a third criterion that is satisfied when the first set of one or more inputs includes a second input intensity that exceeds a second threshold intensity that is higher than the first threshold intensity (e.g., 628 and/or 634) (e.g., a hard/full press threshold; in some embodiments, a force or pressure threshold, e.g., 100 g/cm$^3$, 150 g/cm$^3$, or 200 g/cm$^3$; in some embodiments, a threshold mechanical state corresponding to the second threshold intensity, e.g., detecting physical depression of a mechanical button to a hard/full press state as a substitute measurement for force/pressure) (in some embodiments, in accordance with a determination that the first input does not satisfy the second set of criteria, the computer system forgoes performing the second operation). Conditionally performing a first operation in response to a lower-intensity input that includes movement and performing a second operation in response to a higher-intensity input provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, a user can quickly and easily switch back and forth between performing the first and second operations merely by changing input intensity and without needing to provide additional inputs, switch between different user interface elements and/or input devices, e.g., a hardware button and a touch-sensitive display. Doing so also provides improved ergonomics of computer systems, for example, by expanding the controls available using a particular input device and reducing the need for users to move their hands back and forth between different user interface elements and/or input devices, which also reduces the overall number of hardware components needed for control (e.g., compared to mapping the first and second operation to different input devices), resulting in a more compact, lighter, and cheaper device.

In some embodiments, performing the first operation includes changing an operation setting (e.g., zoom level, exposure/brightness level, applied filter type, filter intensity, media capture type, selected subject/focus, and/or simulated depth-of-field/focal length setting) to a respective value (e.g., as described with respect to FIGS. 6L-6S, 6X, 6Z, 6AE-6AM, 10G, 10J, 10N, 10O, 10R, 10U, and 14A-14Z) (e.g., a value selected based on a magnitude and/or direction of the first type of input); and For example, changing the operation setting to a respective value based on the magnitude and/or direction of input (e.g., contact) movement can be performed as described with respect to FIGS. 6A-6AM, 10A-11, and 14A-15. In some embodiments, the amount of change to the operation setting (e.g., the amount by which the parameter value changes with respect to a numeric scale or with respect to a set of available values) may be related to the distance moved by a contact across a surface of the first input device. For example, the relation may be proportional, logarithmic, based on simulated physics, and/or based on other relational rules (e.g., as described in detail with respect to FIGS. 14A-15). In some embodiments, the operation setting is increased (or moved “forward” through non-numeric parameter values) in response to movements in one direction (e.g., towards the “top” of a device) and decreased (or moved “backward”) in response to movements in the opposite direction.

In some embodiments, performing the second operation includes performing the second operation based on a current value of the operation setting (e.g., as described with respect to FIGS. 6U-6V, 6Y, 10H, and/or 10V) (e.g., performing a media capture operation with the current zoom level, exposure/brightness level, applied filter type, filter intensity, media capture type, selected subject/focus, and/or simulated depth-of-field/focal length setting), wherein, in accordance with a determination that the first set of one or more inputs satisfied the first set of criteria prior to satisfying the second set of criteria (e.g., the first set of one or more inputs exceeds the first (lower) threshold intensity and includes more than a threshold amount of movement of a first type, and the computer system performs the first operation, before the first set of one or more inputs exceeds the second (higher) threshold intensity), the current value of the operation setting is the respective value. For example, if the first operation is performed prior to the second operation, the first operation modifies the performance of the second operation. For example, the user modifies the operation setting using a lower-intensity input with movement (e.g., increasing the zoom level to 2.0×), then transitions to a higher-intensity input to perform the second operation using (e.g., according to) the modified operation setting (e.g., taking a photo at 2.0× zoom). Changing a setting of the second operation in response to a lower-intensity input that includes movement and performing the second operation in response to a higher-intensity input provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, a user can quickly and easily switch back and forth between performing the second operation and adjusting the setting of the second operation without needing to provide additional inputs, such as opening a separate settings menu. Doing so also provides improved ergonomics of computer systems, for example, by providing related controls using a particular input device and reducing the need for users to move their hands back and forth between different user interface elements and/or input devices.

In some embodiments, performing the first operation includes changing a media capture setting (e.g., as described with respect to FIGS. 6L-6S, 6X, 6Z, 6AE-6AM, 10G, 10J, 10N, 10O, 10R, 10U, and 14A-14Z) (e.g., modifying a zoom level, exposure/brightness level, applied filter type, filter intensity, media capture type, selected subject/focus, and/or simulated depth-of-field/focal length setting). In some embodiments, changing the media capture setting includes updating display of a media capture preview (e.g., a camera viewfinder) according to the changed media capture setting, allowing the user to preview the changed setting for media capture. In some embodiments, modifying an exposure or brightness level includes simulating different camera exposure times, shutter speeds, aperture sizes, and/or ISO speeds, where higher exposure levels correspond to brighter captures (e.g., longer exposure times/slower shutter speeds, slower ISO speeds, and/or larger aperture sizes) and lower exposure levels correspond to darker captures (e.g., shorter exposure times/faster shutter speeds, faster ISO speeds, and/or smaller aperture sizes). For example, at a higher exposure value, the computer system combines image data from a higher number of captured frames (e.g., simulating a longer exposure, slower speed, and/or larger aperture) to create a brighter image.

In some embodiments, performing the second operation includes capturing media based on the media capture setting (e.g., as described with respect to FIGS. 6U-6V, 6Y, 10H, and/or 10V) (e.g., based on the current value(s) of one or more media capture settings including the media capture setting that is changed via the first operation). In some embodiments, capturing media includes capturing a still photo. In some embodiments, capturing media includes capturing photo media with a limited duration, such as a short (e.g., 0.25, 0.5, 1, 3, and/or 5 second) multi-frame capture that includes content from before and/or after a capture input (e.g., the full/hard press) is detected, creating a "live" effect. In some embodiments, capturing media includes capturing video media. In some embodiments, if the computer system performs the first operation changing the media capture setting to a respective value before performing the second operation (e.g., and does not detect subsequent input(s) satisfying the first set of criteria, resulting in further changes to the media capture setting), capturing media is performed based on the respective value of the media capture setting. In some embodiments, the media capture setting is a setting of a set of media capture settings that is currently associated with an input device used to detect the first set of one or more inputs. For example, if a zoom setting is associated with a hardware button when the first set of one or more inputs is detected, the first operation modifies the zoom level for media capture, and if an exposure setting is associated with a hardware button when the first set of one or more inputs is detected, the first operation modifies the exposure level for media capture. Changing a media capture setting in response to a lower-intensity input that includes movement and performing a media capture in response to a higher-intensity input provides improved control of media capture without cluttering the user interface with additional displayed controls. Doing so also assists the user with composing media capture events and reduces the risk that transient media capture opportunities are missed or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, a user can quickly and easily switch back and forth between capturing media and adjusting the settings for capturing media merely by changing input intensity and without needing to provide additional inputs (such as opening a separate settings menu) or to switch between different user interface elements and/or input devices.

In some embodiments, the media capture setting includes a zoom setting (e.g., magnification level) for media capture (e.g., as described with respect to FIGS. 6L-6S, 6X, 6Z, 100, 10R, and/or 14P-14Z). In some embodiments, modifying a zoom level media capture setting includes performing an optical zoom (e.g., switching between different fixed focal-length lenses of different magnifications and/or varying the focal length of a hardware zoom lens) and/or performing a digital zoom (e.g., digitally magnifying camera by resizing, interpolating, and/or combining data captured at one or more optical zoom levels). In some embodiments, changing the zoom setting includes updating display of a media capture preview (e.g., a camera viewfinder) according to the current zoom level, allowing the user to preview capture at the current zoom level.

In some embodiments, the media capture setting includes a filter setting for media capture (e.g., as described with respect to FIGS. 6AI-6AK) (e.g., an adjustment to and/or overlay of media capture, such as filters for color grading, tone adjustment, blurring, smoothing, vignetting, noise reduction, and/or applying other visual and/or audio effects). In some embodiments, changing the filter setting includes changing the type of filter being applied to the media capture. For example, the computer system switches between a cool color grading filter, a warm color grading filter, and a monochrome color grading filter, or switches between a color grading filter, a bokeh filter, and a cartoon face filter. In some embodiments, changing the filter setting includes changing the intensity of a filter being applied. For example, for a monochrome color grading filter, a filter intensity of 100% results in an entirely grayscale media capture, a filter intensity of 50% results in a moderately desaturated (but still full-color) media capture, and a filter intensity of 0% results in a media capture with un-adjusted saturation.

In some embodiments, the media capture setting includes a simulated depth-of-field setting for media capture (e.g., as described with respect to FIGS. 6AE-6AF and/or 10N) (e.g., a setting for simulating capture with a particular focal length (f-stop) by selectively blurring portions of a media capture that would not be in focus (e.g., would be outside of the depth-of-field) when captured using a lens with the particular focal length). In some embodiments, the simulated depth-of-field effect is based on detection of one or more subjects in the camera preview and/or captured media. In some embodiments, the simulated depth-of-field effect is based on detected or estimated depth information (e.g., a depth map) about objects in the camera preview and/or captured media. In some embodiments, the depth information is captured at the time the media item is captured and is associated with the media item. In some embodiments, the depth information includes a distance of an object (or a portion of an object) from a sensor (e.g., a camera or lens) or other point of reference. In some embodiments, the depth information includes a distance of an object (or a portion of an object) from another object (or portion of an object) (e.g., the relative distance between two objects or portions of objects). In some embodiments, the depth-of-field effect is based on segmentation information that separates a subject from other elements, such as foreground and/or background elements. In some embodiments, the simulated depth-of-field effect includes blurring (e.g., artificially blurring and/or adding a blurring effect to) a portion of a media item (e.g., image or video) that is in a foreground and/or a background relative to a subject (e.g., a detected subject and/or a designated subject) or a depth plane of the image (e.g., a simulated focal plane and/or a plane perpendicular to an optical axis). In some embodiments, the portion of the image that is blurred when the simulated depth-of-field effect is applied is not blurry when the depth-of-field effect is not applied. In some embodiments, when the simulated depth-of-field effect is applied, portions of the image that are at a different depth (e.g., along an optical axis) than the subject are blurred. In some embodiments, portions of the image that are not within a threshold depth (or range of depths) relative to the subject are blurred. In some embodiments, an amount or degree of blurring applied to a portion of a media item (e.g., image or video) varies based on a distance (e.g., along an optical axis) from the subject or a simulated focal plane. For example, the simulated depth-of-field effect includes applying a greater amount of blur to a portion of the image that is farther from the subject than to a portion of the image that is closer to the subject (e.g., objects in the image that are further from the subject are blurred by a greater amount than objects that are closer to the subject). In some embodiments, changing the simulated depth-of-field setting includes changing the simulated focal length (f-stop), e.g., from f/1.8 (e.g., with foreground and/or background objects having a greater degree of applied blurring or simulated bokeh effect) to f/8.4 (e.g., with foreground and/or background objects having a lower degree of applied blurring or simulated bokeh effect). In some embodiments, changing the simulated depth-of-field setting includes changing or selecting which detected subject(s) appears in focus with the simulated depth-of-field effect applied. In some embodiments, changing the simulated depth-of-field setting includes enabling or disabling application of the simulated depth-of-field effect to the camera preview and/or captured media.

In some embodiments, the media capture setting includes a media capture type setting (e.g., as described with respect to FIGS. 6AL-6AM). In some embodiments, changing the media capture type setting includes selecting between capture modes, such as standard photo capture, portrait photo capture (e.g., photo capture with applied simulated lighting and/or simulated depth-of-field effects), standard video capture, cinematic video capture (e.g., video capture with applied lighting and/or simulated depth-of-field effects and/or enhanced capture quality, such as high frame rate and/or high resolution), and/or panoramic photo capture. In some embodiments, changing the media capture type setting includes changing a capture type option, such as toggling multi-frame photo capture or spatial capture (e.g., capture including depth information) on or off. In some embodiments, applying simulated lighting effects (e.g., natural light, studio light, contour light, stage light, and/or stage light mono effects) includes simulation of one or more light sources (e.g., directional, ambient, and/or point) at different locations in space and/or at different intensities. In some embodiments, applying simulated lighting effects includes blurring one or more image portions, e.g., to create a bokeh effect or a simulated bokeh effect. In some embodiments, applying simulated lighting effects includes simulating a background portion of a media item (e.g., image or video), e.g., displaying subjects in the camera preview/captured media with a single-color background or other simulated backdrop. In some embodiments, applying simulated lighting effects includes modifying the hue, saturation, brightness, and/or contrast of the camera data. In some embodiments, the simulated lighting effects are simulated based on depth map information associated with the camera/image data and/or detected facial features and optionally simulate light falling in different ways on different portions of a surface based on an angle of the surface relative to an angle of a simulated light source. In some embodiments, changing a value of parameter associated with a simulated lighting effect includes changing a simulated intensity of the light and/or changing a simulated distance of the simulated light source from one or more surfaces in the image.

In some embodiments, the media capture setting includes a focus subject selection (e.g., as described with respect to FIGS. 6AG-6AH). In some embodiments, changing the focus subject selection includes changing which subject included in a camera preview (e.g., a detected person, pet, and/or other content) is in focus. For example, the computer system can change which subject is in focus by changing the application of simulated depth-of-field effects (e.g., blurring) to keep the selected subject in focus (e.g., unblurred).

In some embodiments, performing the first operation includes selecting, based on one or more characteristics of the movement of the first type (e.g., direction, location, distance, speed, acceleration, and/or input style (e.g., movement as part of a drag, flick, tap, and/or press)), a first settings value (e.g., parameter value) from an ordered sequence of settings values (e.g., as described with respect to FIGS. 6L-6S, 6X, 6Z, 6AE-6AF, 6AK, 10G, 10J, 10N, 10O, 10R, 10U, and/or 14P-14Z) (e.g., an incremented set of possible parameter values for a setting, such as zoom levels between 0.5×-12.0× magnification in increments of 0.1×, simulated f-stop values between f/32 and f/1.2 in increments of 0.1× (or variable increments, such as f/0.1 steps from f/1.2 to f/4.8 and f/2.0 steps from f/6 to f/32), and/or filter intensity levels between 0%-100% in increments of 1%). In some embodiments, selecting the settings value from the ordered sequence of settings based on the characteristics of the movement of the first type includes incrementing/decrementing the settings value by an amount based on a distance of the movement of the first type (e.g., the distance moved along a particular axis and/or on a particular sensing area), at a rate based on a speed or acceleration of the movement of the first type, and/or in a direction (e.g., incrementing up or down) based on a direction of the movement of the first type. In some embodiments, selecting a settings value from an ordered sequence of settings based on the characteristics of the movement of the first type includes using simulated physics to model the selection of the settings value from the ordered sequence of settings, e.g., as if the movement of the first type were adjusting a physical control for the setting, such as a knob, dial, wheel, and/or slider, which the computer system can model with simulated physical characteristics (e.g., size, weight, friction, and/or elasticity). In some embodiments, selecting the first settings value is performed as described with respect to FIGS. 14A-14Z and 15. Providing selection from an ordered sequence of settings values in response to a lower-intensity input that includes movement provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, selecting from the ordered sequence of settings using input movement provides fine-grained control of settings in an intuitive manner without needing to display additional controls or input fields.

In some embodiments, selecting the first settings value from the ordered sequence of settings values includes simulating a transfer of momentum from the movement of the first type to a model of the ordered sequence of settings values (e.g., as described with respect to FIGS. 6N, 6Q, and/or 14C-14Z). For example, when a touch input lifts from a touch-sensitive surface while swiping in a particular direction, the computer system continues to change the settings value (e.g., increments the settings value in the same direction) after the lift-off as if momentum from the first type of movement were transferring to a physical control (e.g., a knob, dial, wheel, and/or slider) for the setting. Selecting (e.g., adjusting) a settings value by simulating the transfer of momentum from the input movement provides improved control of computer system functionality, reducing the number of inputs needed to adjust settings and improving ergonomics of computer systems, which, additionally, reduces power usage and improves battery life of the system by enabling the user to use the system more quickly and efficiently. For example, simulating the physics intuitively translates input movement into a settings adjustment (e.g., as if moving a physical control element) and, by continuing to adjust the settings with some transferred momentum (e.g., adjusting after the end of the movement), the user can reach particular settings values with less movement and/or fewer inputs (e.g., using a quick flick to scroll with momentum to a particular setting rather than needing to drag the whole distance or drag, lift, and reset), which also allows for optimized input device size.

In some embodiments, the ordered sequence of settings values includes a subset of one or more preset values (e.g., "snapping" values, for example: preset zoom levels of 0.5×, 1.0×, 2.0×, and 8.0×; preset simulated f-stop values of f/1.2, f/2.4, and f/4.6; and/or preset filter intensity levels of 0%, 25%, 50%, 75%, and 100%). In some embodiments, selecting, based on the one or more characteristics of the movement of the first type, the first settings value from the ordered sequence of settings values includes, in accordance with a determination that the first set of one or more inputs satisfies a set of one or more drag criteria (e.g., during a drag input, e.g., a moving input that remains in contact with the first input device), selecting the first settings value from the ordered sequence of settings values based on a direction of the movement of the first type and an amount of the movement of the first type (e.g., as described with respect to FIGS. 6L-6M, 6O-6P, 6X, 6Z, 14C, 14K, 14N, 14R, 14S, 14V, and/or 14Y), wherein the set of one or more drag criteria includes a criterion that is satisfied when the first set of one or more inputs includes a contact that is maintained on the first input device (e.g., while contact is maintained; in some embodiments, contact is maintained when a third threshold intensity (e.g., the same as or lower than the first threshold intensity; e.g., a minimum/maintenance threshold) is exceeded). For example, while the user is providing a drag input, such as a touch input moving across a touch-sensitive surface without lifting off (and/or falling below a maintenance intensity threshold), the computer system adjusts the settings value by scrolling through the ordered sequence of settings values by an amount and in a direction commensurate to the distance and direction of the movement.

In some embodiments, selecting, based on the one or more characteristics of the movement of the first type, the first settings value from the ordered sequence of settings values includes, in accordance with a determination that the first set of one or more inputs satisfies a set of one or more flick criteria (e.g., during a flick input, e.g., a moving input quickly followed by lift-off), selecting the first settings value from the subset of one or more preset values based on a direction of the movement of the first type (e.g., as described with respect to FIGS. 6N, 6Q, 14F, 14O,14T, and/or 14Z) (e.g., the computer system "snaps" to the next preset value in the ordered sequence in the direction of the flick). In some embodiments, the set of one or more flick criteria includes a first flick criterion that is satisfied when the first set of one or more inputs ceases to be detected on the first input device; For example, the first flick criterion is met when contact with the first input device lifts off and/or falls below a maintenance intensity threshold. In some embodiments, the set of one or more flick criteria includes a second flick criterion that is satisfied when the movement of the first type includes more than a second threshold amount of movement within a threshold period of time before the first flick criterion is satisfied (e.g., the input includes movement near the end of contact). For example, the second flick criterion is met when the input is moving at or near the end of contact with the first input device, e.g., the movement is a quick flick rather than a drag that comes to a stop prior to lift-off. In some embodiments, the set of one or more flick criterion include a third flick criterion that is met when the movement of the first type includes movement in the direction of one of the preset values. For example, flicking to zoom in from 5.5× will snap to 8.0×, but flicking to zoom in from 8.5× will not snap to a preset value (e.g., instead simply stopping adjustment when the input ends or continuing to adjust with some simulated momentum from the flick) as no preset values above 8.0× are included in the subset. As another example, flicking to increase filter intensity from 100% (e.g., a maximum preset value) will not snap to a higher value, but flicking to decrease filter intensity from 100% will snap to the next preset value of 75%. In some embodiments, the set of one or more flick criterion include a fourth flick criterion that is met when simulated momentum from the flick would adjust the settings value past one of the preset values, for example, as described with respect to FIGS. 14A-14Z and 15. Adjusting continuously through the ordered sequence of values in response to movement during input contact (e.g., drag movements) and adjusting by skipping between preset values of the ordered sequence in response to movement quickly followed by lift-off (e.g., flick movements) makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. Doing so also provides improved ergonomics of computer systems. For example, the user can achieve both fine-grained controls (scrolling through the entire ordered sequence of values) and quick/optimized (snapping between preset values) simply by changing movement style from a drag to a flick, without needing to provide additional inputs or use different user interface elements and/or input devices.

In some embodiments, performing the first operation includes selecting, based on one or more characteristics of the movement of the first type (e.g., direction, location, distance, speed, acceleration, and/or input style (e.g., movement as part of a drag, flick, tap, and/or press)), a second settings value (e.g., parameter value) from a predetermined set of settings values (e.g., as described with respect to FIGS. 6AG-6AJ and/or 6AL-6AM (e.g., a set of available, preselected, and/or preferred values for the setting)). For example, for a focus selection setting, the predetermined set of settings values includes each of a group of subjects identified (e.g., detected) in the camera preview, e.g., allowing the user to select between focusing on a first subject, a second subject, and/or a third subject. For example, for a filter setting, the predetermined set of settings values includes available filters, such as a warm tone filter, a cool tone filter, a monochromatic filter, a sepia filter, a cartoon face filter, and/or a smoothing filter. For example, for a media capture type setting, the predetermine set of settings values includes available capture types, such as standard photo capture, standard video capture, portrait photo capture, cinematic video capture, and so forth. In some embodiments, the predetermined set of settings values is a subset of one or more preset settings values (e.g., snapping values) included in an ordered sequence of settings values. In some embodiments, the second settings value is the same as the first settings value. Providing selection from a predetermined set of settings values in response to a lower-intensity input that includes movement provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, selecting from the predetermined settings values using input movement allows the user to adjust settings in a quick and intuitive manner without needing to display additional controls.

In some embodiments, the first set of criteria includes a fourth criterion that is satisfied when the second criterion (e.g., which is satisfied when the first set of one or more inputs includes more than a threshold amount of movement of a first type) is satisfied after the first criterion (e.g., which is satisfied when the first set of one or more inputs includes a first input intensity that exceeds a first threshold intensity) is satisfied (e.g., as described with respect to FIGS. 6L-6S, 6X, and/or 6Z). In some embodiments, if the computer system detects (e.g., via the first input device) movement before the first set of inputs reaches the first threshold intensity, the computer system ignores the movement and/or foregoes perform the first operation (e.g., as described with respect to FIGS. 6G and/or 6AC). In some embodiments, the computer system foregoes detecting movement using the first input device until the first criterion is satisfied, for example, leaving the movement sensors of the first input device in an off or inactive state until the first threshold intensity is exceeded (e.g., until a light press is detected). Conditionally performing the first operation in response to input movement based on whether or not an input exceeding the first threshold intensity has been detected makes the user-system interface more efficient by helping the user to provide proper inputs and reducing user mistakes when operating/interacting with the system, which, additionally, reduces power usage and improves battery life of the system by enabling the user to use the system more quickly and efficiently. For example, performing the first operation in response to movement after the first threshold intensity has been exceeded increases confidence that the user intends to perform the first operation, decreasing the likelihood of unintended inputs while still allowing the user to quickly and intuitively perform the first operation. Doing so also improves the ergonomics and extensibility of the first input device, for example, allowing placement of the first input device in an area the user might touch or move across without wanting to perform the first operation and/or allowing movement on the first input device without first exceeding the first threshold intensity to be mapped to other functionality.

In some embodiments, after determining that the first set of one or more inputs satisfies the first criterion (e.g., as described with respect to input 616 at FIG. 6I and/or input 630 at FIG. 6W) (e.g., after the first set of one or more inputs includes the first input intensity that exceeds the first threshold intensity), the computer system detects a first movement input included in the first set of one or more inputs (e.g., a movement input detected before detecting an end of the first set of one or more inputs; in some embodiments, the end of the first set of one or more inputs is detected when a lift-off is detected and/or when a lift-off is detected and contact is not re-established within a threshold period of time), wherein the movement input is detected while an input intensity of the first set of one or more inputs does not exceed the first threshold intensity (e.g., 616B, 624B, 616C, 624B, 616D, 624C, 616E, 624D, 630A, and/or 630B) (e.g., the first movement input is detected after initially reaching the first threshold intensity (e.g., a threshold for activating a first control element) and then falling below the first threshold intensity). In some embodiments, in response to the first movement input, the computer system performs the first operation based on the first movement input (e.g., as described with respect to FIGS. 6L-6S, 6X, and/or 6Z) (e.g., responding to the first movement input). For example, the computer system performs the first operation based on movement that occurs after the press input shifts below the light/partial press threshold (e.g., an activation threshold). In some embodiments, the first movement is more than the threshold amount of movement of the first type, e.g., the second criterion can be satisfied by the first movement input. In some embodiments, the first movement input is detected while the input intensity exceeds a lower threshold intensity (e.g., a maintenance threshold; in some embodiments, a force or pressure threshold, e.g., 5 $g/cm^3$, 10 $g/cm^3$, or 24 $g/cm^3$; in some embodiments, a threshold mechanical state corresponding to the lower threshold intensity). For example, after reaching the activation intensity, the computer system remains responsive to movement until contact ends and/or until a threshold period of time after contact ends. Performing the first operation based on movement that occurs after the input intensity exceeds and subsequently falls below the first intensity threshold makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. Doing so also provides improved ergonomics of computer systems. For example, performing the first operation is initially gated by the first intensity threshold, which reduces inadvertent performance of the first operation (e.g., in response to a user unintentionally brushing, touching, or bumping an input device), but after the first intensity threshold is reached, the computer system remains responsive to movement even after the intensity drops, making it easier for users to continuously control the first operation.

In some embodiments, after determining that the first set of one or more inputs satisfies the first criterion (e.g., as described with respect to input 616 at FIG. 6I and/or input 630 at FIG. 6W) (e.g., after the first set of one or more inputs includes the first input intensity that exceeds the first threshold intensity), the computer system detects a lift-off of the first set of one or more inputs (e.g., as described with respect to FIGS. 6N, 6Q, 6R-6T, and/or 6AA) (in some embodiments, a period where contact with the first input device has ceased; in some embodiments, a period where input intensity has dropped below a maintenance intensity threshold). In some embodiments, after detecting the lift-off of the first set of one or more inputs, the computer system detects, via the first input device, a second movement input (e.g., 616D, 624C, 616E, 624D, 632A, and/or 632B). In some embodiments, in response to detecting the second movement input and in accordance with a determination that the second movement input was detected within a threshold period of time (e.g., 0.001 s, 0.07 s, 0.5 s, 1 s, or 1.3 s) after detecting the lift-off of the first set of one or more inputs, the computer system performs the first operation based on the movement input (e.g., as described with respect to FIGS. 6O-6P). In some embodiments, in accordance with a determination that the movement input was detected at least the threshold period of time after detecting the lift-off of the first set of one or more inputs, the computer system foregoes performing the first operation based on the movement input (e.g., as described with respect to FIG. 6AC). In some embodiments, in accordance with a determination that the movement input was detected at least the threshold period of time after detecting the lift-off of the first set of one or more inputs and that the first criterion was satisfied by a second set of inputs prior to detecting the movement input (e.g., re-activating responsiveness to motion), the computer system performs the first operation based on the movement input (e.g., as described with respect to FIGS. 6× and/or 6Z). Performing the first operation based on detected movement inputs until lift-off exceeds a threshold duration of time makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. Doing so also provides improved ergonomics of computer systems. For example, the computer system automatically stops responding to movement inputs by performing the first operation after a threshold period of time passes without input contact, which reduces inadvertent performance of the first operation (e.g., in response to a user unintentionally brushing, touching, or bumping an input device), but the computer system remains responsive to movement inputs after brief lift-offs, allowing users to better maintain and adjust control of the first operation.

In some embodiments, after determining that the first set of one or more inputs satisfies the first criterion (e.g., as described with respect to input 616 at FIG. 6I and/or input 630 at FIG. 6W) (e.g., after the first set of one or more inputs includes the first input intensity that exceeds the first threshold intensity), the computer system detects a third movement input. In some embodiments, in response to detecting the third movement input and in accordance with a determination that a lift-off of the first set of one or more inputs (in some embodiments, a period where contact with the first input device has ceased; in some embodiments, a period where input intensity has dropped below a maintenance intensity threshold) was not detected prior to detecting the third movement input, performing the first operation based on the third movement input (e.g., as described with respect to FIGS. 6L-6S). In some embodiments, in accordance with a determination that a lift-off of the first set of one or more inputs was detected prior to detecting the movement input, the computer system foregoes performing the first operation based on the movement input. In some embodiments, in accordance with a determination that a lift-off of the first set of one or more inputs was detected prior to detecting the movement input and that the movement input was detected within a threshold period of time after detecting lift-off, the computer system performs the first operation based on the movement input. Performing the first operation based on movements detected while maintaining an input via an input device (e.g., by maintaining contact or proximity) makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. Doing so also provides improved ergonomics of computer systems. For example, performing the first operation is initially gated by the first intensity threshold, which reduces inadvertent performance of the first operation (e.g., in response to a user unintentionally brushing, touching, or bumping an input device), but after the first intensity threshold is reached, the computer system remains responsive to movement as long as input is maintained (e.g., by maintaining contact or proximity), making it easier for users to continuously control the first operation.

In some embodiments, after performing the second operation (e.g., as described with respect to FIG. 6Y), the computer system detects, via the first input device, a fourth movement input (e.g., 630B, 632A, and/or 632B) (e.g., a swipe, drag, flick, and/or tap), and in response to detecting the fourth movement input and in accordance with a determination that a lift-off event (in some embodiments, a period where contact with the first input device has ceased; in some embodiments, a period where input intensity has dropped below a maintenance intensity threshold) was not detected in between detecting the second input intensity that exceeds the second threshold intensity and detecting the fourth movement input, the computer system performs the first operation based on the fourth movement input (e.g., as described with respect to FIG. 6Z). For example, after an input reaches the second threshold intensity (e.g., the full/hard press threshold), triggering performance of the second operation, the computer system remains responsive to movement inputs as long as/until the input is ended via lift-off. For example, a user can take a picture (second operation) using a full/hard press and then continue to adjust media capture settings (first operation) via movement inputs without needing to re-apply or maintain the first threshold intensity (e.g., light/partial press activation intensity).

In some embodiments, in response to detecting the fourth movement input and in accordance with a determination that a lift-off event (in some embodiments, a period where contact with the first input device has ceased; in some embodiments, a period where input intensity has dropped below a maintenance intensity threshold) was detected in between detecting the second input intensity that exceeds the second threshold intensity and detecting the fourth movement input, the computer system forgoes performing the first operation based on the fourth movement input (e.g., as described with respect to FIG. 6AC). For example, after an input reaches the second threshold intensity (e.g., the full/hard press threshold), triggering performance of the second operation, the computer system remains responsive to movement inputs as long as/until the input is ended via lift-off. For example, after a user takes a picture (second operation) using a full/hard press and ends the first set of inputs (e.g., lifts off of the first input device), the user must re-apply the first threshold intensity (e.g., light/partial press activation intensity) before adjusting media capture settings (first operation) using movement inputs.

In some embodiments, in accordance with a determination that the first set of one or more inputs satisfies a set of feedback criteria, the computer system provides a non-visual feedback output (e.g., 620) (e.g., an audio and/or tactile output), wherein the set of feedback criteria includes the first criterion that is satisfied when the first set of one or more inputs includes the first input intensity that exceeds the first threshold intensity (e.g., as described with respect to FIG. 6I) (e.g., the activation intensity threshold). For example, when the user presses the first input device with sufficient intensity to exceed the first threshold intensity, the computer system generates non-visual feedback, such as an audio chime or click, a vibration, and/or a haptic response such as a haptic simulating the tactile sensation of physically depressing a button. In some embodiments, the set of feedback criteria includes a criterion that is satisfied when the first set of one or more inputs did not include an intensity that exceeds the first threshold intensity prior to detecting the first detected intensity, e.g., the non-visual feedback is only provided when the threshold is initially reached, and is not provided again in response to the first set of one or more inputs. Providing non-visual feedback when an input meets the first criterion (e.g., exceeds a threshold intensity) provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. For example, the non-visual feedback indicates to a user that the first criterion is met, and thus, that the computer system will respond to movements by performing the first operation, allowing the user to quickly initiate control of the first operation (e.g., without checking for displayed feedback) or to end the input if control of the first operation is not immediately desired.

In some embodiments, the first input device includes a first hardware button (e.g., 602A, 602B, 602C, and/or 602D) (e.g., as described with respect to FIG. 6C). In some embodiments, the first hardware button includes a mechanical button, such as a button that can be physically depressed to one or more states. In some embodiments, the first hardware button includes a solid-state button, such as a button that simulates the tactile sensation (e.g., via tactile/haptic output generators) of pressing a mechanical button. In some embodiments, the first hardware button includes one or more sensors, such as pressure sensors, touch sensors, capacitive sensors, and/or motion sensors. Providing control of multiple different operations using a hardware button provides improved control and ergonomics of computer systems without cluttering a displayed user interface with additional controls, which makes the user-system interface more efficient (e.g., by helping the user to provide proper inputs and reducing user mistakes when operating/interacting with the system), and, additionally, reduces power usage and improves battery life of the system by enabling the user to use the system more quickly and efficiently. For example, a user can control the first and second operations via a dedicated hardware button instead of via touch-sensitive display, which reduces the need to display controls for the first and second operations and allows the user to control the first and second operations without obscuring the display. Conditionally providing control of multiple different operations using a hardware button based on intensity and movement characteristics of detected inputs also reduces the overall number of hardware components needed for control (e.g., compared to mapping different functions to different buttons), resulting in a more compact, lighter, and cheaper device.

In some embodiments, a first input element is activated based on the second input intensity exceeding a third intensity threshold. In some embodiments, the third threshold intensity is the same as the second threshold intensity, e.g., the initial full/hard press threshold, e.g., 100 $g/cm^3$, 150 $g/cm^3$, or 200 $g/cm^3$. In some embodiments, the third threshold intensity is lower than the second threshold intensity, e.g., after exceeding the second threshold intensity, the user can maintain a full/hard press with a slightly lower intensity, e.g., 75 $g/cm^3$, 90 $g/cm^3$, or 120 $g/cm^3$. For example, the first input element is activated when at least the third threshold intensity is measured (e.g., using intensity sensors) and/or determined from a corresponding mechanical state (e.g., a level/state of physical depression of a mechanical button). In some embodiments, performing the second operation includes, in accordance with a determination that the first input element remains activated for at least a second threshold amount of time (e.g., 0.05, 0.1, 0.2, 0.5 s, 1 s, or 1.3 s), capturing video media (e.g., as described with respect to FIGS. 6Y, 8C-8E, and/or 8H-8I). For example, the computer system captures video in response to a long (e.g., held) full/hard press. In some embodiments, performing the second operation includes, in accordance with a determination that the first input element remains activated for less than the second threshold amount of time (e.g., 0.5 s, 1 s, or 1.3 s), capturing photo media (e.g., as described with respect to FIGS. 6U-6V, 8A, and/or 8M). For example, the computer system captures photo media in response to a quick full/hard press. In some embodiments, the computer system captures photo media if, prior to reaching the second threshold amount of time, the full/hard press is released (e.g., the input intensity falls below a threshold intensity and/or a lift-off event occurs). In some embodiments, the computer system captures photo media in response to the full/hard press and, if the full/hard press duration later reaches the second threshold amount of time, also captures video. For example, the computer system preemptively captures photo media and may discard the photo media if the full/hard press resolves into a held press. In some embodiments, the photo media includes a still photo capture. In some embodiments, the photo media includes photo media with a limited duration, such as a short (e.g., 0.01, 0.02, 0.05, 0.1, 0.25, 0.5, 1, 3, and/or 5 second) multi-frame capture that includes content from before and/or after a capture input (e.g., the full/hard press) is detected, creating a "live" effect. Conditionally performing a photo capture or a video capture in response to a higher-intensity input based on the duration of the higher intensity provides improved control and ergonomics of computer systems without cluttering a displayed user interface with additional controls. Doing so also assists the user with composing media capture events and reduces the risk that transient media capture opportunities are missed or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, a user can quickly select between performing photo and video captures using a full/hard press without needing to move the position of their hands or divert their attention from the capture to use a displayed control. Conditionally providing control of multiple different operations using a hardware button based on a duration of an intensity also reduces the overall number of hardware components needed for control (e.g., compared to mapping different functions to different buttons), resulting in a more compact, lighter, and cheaper device.

In some embodiments, the first set of criteria and the second set of criteria each include a requirement (e.g., a camera criterion) that is satisfied when the first set of one or more inputs is detected while the computer system is displaying, via the display generation component, a camera user interface (e.g., 612 and/or 1044) (e.g., a user interface for media capture, such as a camera application or a social media application with camera functionality; in some embodiments, any camera user interface included in a set of available camera user interfaces).

In some embodiments, in response to detecting the first set of one or more inputs and in accordance with a determination that the first set of one or more inputs satisfies a set of launch criteria, the computer system displays, via the display generation component, a respective camera user interface (e.g., as illustrated in FIGS. 6E and/or 10B) (in some embodiments, a particular camera user interface of the set of available camera user interfaces; in some embodiments, a default camera user interface), wherein the set of launch criteria includes a criterion that is satisfied when a first input element is activated (in some embodiments, the first input element is activated based on an input intensity exceeding a third intensity threshold) while the computer system is not displaying, via the display generation component, a camera user interface (e.g., as illustrated in FIGS. 6D and/or 10A) (e.g., any camera user interface included in a set of available camera user interfaces). For example, the computer system displays, surfaces, and/or launches a camera interface in response to press inputs detected while the camera interface is not already displayed, active, and/or running. In some embodiments, the computer system will open a particular camera application if the particular camera application is not already open. In some embodiments, the computer system will open the particular camera application unless any camera application is already open. In some embodiments, the set of one or more launch criteria include a criterion that is satisfied when the first set of one or more inputs includes input intensity that exceeds the second threshold intensity (e.g., the full/hard press threshold), e.g., the user can launch a camera application using a hard/full press, and then use a hard/full press while in the camera application to perform the second operation. In some embodiments, the set of launch criteria includes a criterion that is satisfied when the first input element is activated while the computer system is displaying a non-camera user interface (e.g., a home screen, a lock screen, a UI for an application that does not include a camera UI, and/or a non-camera UI for an application that does include a camera UI).

In some embodiments, in response to detecting the first set of one or more inputs and in accordance with a determination that the first set of one or more inputs satisfies a third set of criteria, the computer system ceases displaying, via the display generation component, a first set of one or more user interface objects (e.g., 612A, 612B, 612D, 612F, and/or 612G, as illustrated in FIGS. 6I-6J) (e.g., selectable user interface objects, such as touch controls, and/or other display elements), wherein the third set of criteria includes the first criterion that is satisfied when the first set of one or more inputs includes the first input intensity that exceeds the first threshold intensity and a criterion that is satisfied when the first set of one or more inputs is detected while displaying, via the display generation component, a user interface that includes the first set of one or more user interface objects (e.g., 612). For example, while displaying a particular user interface, the computer system hides certain display elements/affordances of the user interface in response a light/partial press, providing a "quiet" mode for the user interface. In some embodiments, the first set of one or more user interface objects includes media capture user interface objects, such as captured media preview and/or capture setting controls (e.g., zoom, flash, and/or mode controls), for example, as described with respect to FIG. 6E. In some embodiments, ceasing displaying the set of one or more user interface objects includes fading out one or more selectable user interface objects, e.g., by gradually increasing transparency, reducing contrast, and/or otherwise reducing their visual prominence. In some embodiments, ceasing displaying the set of one or more user interface objects includes animating one or more selectable user interface objects moving off of the display until no longer visible. In some embodiments, the computer system continues displaying the respective user interface without the set of one or more user interface objects (e.g., in the "quiet" mode) while the computer system is responsive to movement (e.g., when the computer system performs the first operation based on detected movements), and re-displays the hidden set of user interface objects in response to the inputs falling below a maintenance intensity threshold, ending or lifting off of the first input device, and/or exceeding the second threshold intensity. Hiding certain user interface objects of a user interface when an input meets the first criterion (e.g., in response to a light/partial press) provides users with real-time visual feedback about a state of the computer system, indicating to the user when a light/partial press state has been reached and allowing the user to quickly initiate control of the first operation (e.g., without checking for displayed feedback) or to end the input if control of the first operation is not immediately desired. Doing so also provides improved control and ergonomics of computer systems without cluttering a displayed user interface with additional controls, which makes the user-system interface more efficient (e.g., by helping the user to provide proper inputs and reducing user mistakes when operating/interacting with the system), and, additionally, reduces power usage and improves battery life of the system by enabling the user to use the system more quickly and efficiently. For example, providing a "quiet" UI can help the user better observe the performance of the first operation (e.g., in response to movements detected after reaching the light/partial press state) and/or prepare to perform the second operation (e.g., by transitioning from a light/partial press to a hard/full press).

In some embodiments, in response to detecting the first set of one or more inputs and in accordance with a determination that the first set of one or more inputs satisfies a fourth set of criteria, the computer system displays, via the display generation component, a second set of one or more user interface objects (e.g., 612H, 612J, and/or capture guidance elements, such as the capture guidance grid and/or 647A, 547B, and/or 647C) (e.g., selectable user interface objects, such as touch controls, and/or other display elements) in a respective user interface (e.g., as illustrated in FIG. 6J), wherein the fourth set of criteria includes the first criterion that is satisfied when the first set of one or more inputs includes the first input intensity that exceeds the first threshold intensity; and a criterion that is satisfied when the first set of one or more inputs is detected while displaying, via the display generation component, the respective user interface (e.g., 612). For example, while displaying a particular user interface, the computer system displays additional display elements/affordances for the user interface in response a light/partial press, for example, providing a "ready" mode for the user interface. In some embodiments, the second set of one or more user interface objects includes capture guidance user interface objects, such as a capture guidance grid, capture guidance alignment indicator, detected subject indicator(s), and/or image histogram (e.g., a color histogram and/or tonality curve for the current capture). In some embodiments, the capture guidance user interface objects are conditionally displayed based on a current state of the computer system. For example, the computer system displays, changes the appearance of appearance, and/or stops displaying an alignment indicator based on how far displaced the computer system is from a target (e.g., level) orientation. For example, if certain subjects, such as people, pets, faces, and/or other subjects of determined significance, are detected in the camera preview, the computer system displays subject indicators framing the detected subjects in the camera preview. For example, the computer system updates the image histogram based on the current tonal content of the camera preview, such that the image histogram changes as the captured field-of-view changes (e.g., due to movement of the camera, changes to the captured environment, and/or changed media capture settings). In some embodiments, displaying the set of one or more user interface objects includes fading in one or more user interface objects, e.g., by gradually increasing opacity, increasing contrast, and/or otherwise increasing their visual prominence. In some embodiments, displaying the set of one or more user interface objects includes animating one or more selectable user interface objects moving onto the display. In some embodiments, the computer system continues displaying the user interface with the second set of one or more user interface objects (e.g., in the "ready" mode) while the computer system is responsive to movement (e.g., when the computer system performs the first operation based on detected movements), and hides the second set of user interface objects in response to the inputs falling below a maintenance intensity threshold, ending or lifting off of the first input device, and/or exceeding the second threshold intensity. Displaying additional user interface objects of a user interface when an input meets the first criterion (e.g., in response to a light/partial press) provides users with real-time visual feedback about a state of the computer system, indicating to the user when a light/partial press state has been reached and allowing the user to quickly initiate control of the first operation (e.g., without checking for displayed feedback) or to end the input if control of the first operation is not immediately desired. Doing so also provides improved control and ergonomics of computer systems without cluttering a displayed user interface with additional controls, which makes the user-system interface more efficient (e.g., by helping the user to provide proper inputs and reducing user mistakes when operating/interacting with the system), and, additionally, reduces power usage and improves battery life of the system by enabling the user to use the system more quickly and efficiently. For example, the computer system can refrain from displaying certain user interface elements that are relevant to the first and/or second operation until the light/partial press state is reached (e.g., when the user is preparing to perform the first and/or second operation).

In some embodiments, while displaying, via the display generation component, a user interface object corresponding to the first operation (e.g., 622) (e.g., a displayed control affordance or indicator for the first operation, such as a menu, slider, gauge, and/or wheel), the computer system detects a first tap input directed to the first input device (e.g., 616, 624E, and/or 624F as illustrated in FIGS. 6R-6S). In some embodiments, the user interface object corresponding to the first operation is initially displayed in response to detecting an input that satisfies the first criterion (e.g., exceeds the first threshold intensity). In some embodiments, computer system ceases displaying the user interface object corresponding to the first operation in response to detecting a lift-off, in response to detecting a lift-off and without detecting further input for at least a threshold period of time, and/or in response to detecting an input dismissing the user interface object corresponding to the first operation (e.g., a tap in another display region, a swipe across the first user interface object, and/or an input exiting the camera user interface). In some embodiments, the first tap input is included in the first set of one or more inputs. In some embodiments, the first tap input is separate from the first set of one or more inputs. In some embodiments, in response to detecting the first tap input, the computer system performs the first operation based on the first tap input, wherein performing the first operation based on the first tap input includes, in accordance with a determination that the first tap input is directed to a first region of the first input device (e.g., a tap on the upper, front, or left portion), changing a current settings value (e.g., a parameter value) from an initial settings value to a first updated settings value selected from a predetermined set of settings values (e.g., as illustrated in FIG. 6R) (e.g., a set of available, preselected, and/or preferred values for a setting; in some embodiments, "snapping values" of an ordered sequence of settings values), and in accordance with a determination that the first tap input is directed to a second region of the first input device that is different from the first region of the first input device (e.g., a tap on the lower, back, or right portion), changing the current settings value from the initial settings value to a second updated settings value selected from the predetermined set of settings values (e.g., as illustrated in FIG. 6S), wherein the first updated settings value is different from the second updated settings value and a direction of change from the initial settings value to the first updated settings value is different from a direction of change from the initial settings value to the second updated settings value (e.g., tapping on different portions of the first input device effects changes in different directions). For example, for a first operation of adjusting a camera zoom setting, in response to a tap detected in one region of the first input device, the computer system zooms in to the next designated zoom level, and in response to a tap detected in a different region of the first input device, the computer system zooms out to the next designated zoom level. As another example, for a first operation of selecting a camera filter, the computer system advances forward through the available filters in response to a tap detected in one region of the first input device and reverses backward through the available filters in response to a tap detected in the other region. In some embodiments, the first region and second region of the first input device are different regions of a touch-sensitive surface. In some embodiments, the first region and the second region of the first input device are regions with different hardware buttons and/or sensors (e.g., different operable regions of a compound button). In some embodiments, the user interface corresponding to the first operation is displayed in response to detecting a light/partial press (e.g., an input that satisfies the first criterion, e.g., exceeding the first threshold intensity). In some embodiments, the user interface corresponding to the first operation remains displayed until the input transitions into a full/hard press or until the first set of one or more inputs ends (e.g., until a lift-off event is detected or until a threshold period of time passes after a lift-off event without detecting subsequent inputs). Adjusting an operation setting in different directions in response to a tap input depending on where the tap input is detected provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, selecting from the predetermined settings values using tap inputs allows the user to adjust settings in a quick and intuitive manner without needing to display additional controls.

In some embodiments, in response to detecting the first set of one or more inputs (in some embodiments, and in accordance with a determination that the first set of one or more inputs has not yet satisfied the first criterion), the computer system displays (e.g., initially displays), via the display generation component, an indication of one or more characteristics (e.g., location and/or intensity) of the first set of one or more inputs (e.g., 618). For example, the computer system displays an indication of an initial contact with the first input device, even before the contact resolves into a light/partial press (e.g., exceeds the first intensity threshold) or a full/hard press (e.g., exceeds the second intensity threshold). In some embodiments, the displayed indication is displayed near the first input device, e.g., at the edge of a display nearest to a hardware button. For example, the displayed indication may include a "cut out" displayed near the hardware button appearing as though the inputs were pushing the hardware button into the display. Displaying an indication of input characteristics in response to detected inputs provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. For example, the input indication shows a user that input is being detected, even if the input does not yet satisfy the criteria to perform the first or second operation, allowing the user to adjust the input if performance of the first or second operation is desired or to stop the input if not.

In some embodiments, displaying the indication (e.g., 618) of one or more characteristics of the first set of one or more inputs includes, in accordance with a determination that the first set of one or more inputs includes a contact (e.g., 616) (e.g., a touch or press input) at a first location of the first input device, displaying the indication with a first appearance (e.g., as illustrated in FIG. 6F) (e.g., at a first display location); For example, the computer system displays the indication near the first location, e.g., at the edge of the display near the first location of the first input device. In some embodiments, the computer system displays the indication with other visual characteristics (e.g., size, shape, color, and/or transparency) based on where (or in which region) contact is detected via the first input device. In some embodiments, displaying the indication of one or more characteristics of the first set of one or more inputs includes, in accordance with a determination that the first set of one or more inputs includes a contact at a second location, different from the first location, of the first input device, displaying the indication with a second appearance different from the first appearance (e.g., as illustrated in FIGS. 6G-6H) (e.g., at a second, different display location). For example, the computer system displays the indication near the second location. In some embodiments, the computer system moves the indication relative to the first input device (e.g., moving along the edge of the display parallel to the first input device) as the input moves along the first input device, such that the indication appears to follow contact with the first input device. Visually indicating a location of a detected input provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. For example, indicating the location of an input orients the user with respect to the first input device, preparing the user to provide movement inputs to control the first operation.

In some embodiments, displaying the indication (e.g., 618) of one or more characteristics of the first set of one or more inputs includes, in accordance with a determination that the first set of one or more inputs includes an input (e.g., a touch or press input) of a first input intensity, displaying the indication with a third appearance (e.g., as illustrated in FIG. 6F). In some embodiments, displaying the indication of one or more characteristics of the first set of one or more inputs includes, in accordance with a determination that the first set of one or more inputs includes an input of a second input intensity different from the first input intensity, displaying the indication with a fourth appearance different from the third appearance (e.g., as illustrated in FIG. 6H). For example, the computer system displays the indication with particular visual characteristics (e.g., location, size, shape, color, and/or transparency) based on how much or how hard the user is pressing the first input device. For example, the computer system increases the size of the indication as intensity increases and decreases the size of the indication as intensity decreases, e.g., displaying the indication at its smallest size when the input is resting on the first input device without pressing and displaying the indication at its largest size as the input intensity reaches the first intensity threshold. For example, the computer system displays the indication as a round bump when the input is resting on the first input device without pressing and displays the indication as a wide tab (e.g., morphing into a displayed control corresponding to the first operation). Visually indicating an intensity of a detected input provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. For example, indicating the intensity of an input helps the user know to increase the intensity if performance of the first or second operation is desired or to decrease the intensity (and/or end the input) if performance of the first or second operation is not desired.

In some embodiments, while displaying the indication (e.g., 618) of the one or more characteristics of the first set of one or more inputs (e.g., as illustrated in FIG. 6F), the computer system detects a change to at least one of the one or more characteristics of the first set of one or more inputs (e.g., a change in location and/or intensity), and in response to detecting the change to at least one of the one or more characteristics of the first set of one or more inputs, the computer system changes (e.g., based on the change to the input characteristics) an appearance (e.g., visual characteristics of the indication, such as location, size, shape, color, and/or transparency) of the indication of the one or more characteristics of the first set of one or more inputs based on the change to the one or more characteristics of the first set of one or more inputs (e.g., as illustrated in FIGS. 6G-6I) (e.g., based on the magnitude and/or direction of the change). For example, the computer system moves the indication in a direction and/or by an amount on the display to reflect the direction and/or magnitude of movement of the input across the first input device. For example, the computer system grows, shrinks, warps, or changes the visual prominence of the indication in a direction and/or by an amount to reflect the direction and/or magnitude of changes to the intensity, e.g., as the applied intensity approaches or retreats from the first threshold intensity. In some embodiments, the computer system changes the appearance of the indication based on multiple changes to the characteristics of the inputs, such as moving the indication to follow movement of the input while also increasing the size and opacity of the indication as the intensity of the input increases. Visually indicating a change to the characteristics of a detected input provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. For example, visually indicating changes to the characteristics of an input indicates how the user can control the first input device, e.g., visually indicating that the computer system can detect and respond to changes in location and intensity, and allows the user to adjust the characteristics of the input to achieve an intended effect.

In some embodiments, while displaying the indication (e.g., 618) of the one or more characteristics of the first set of one or more inputs, detecting that the first set of one or more inputs satisfies a fifth set of criteria, wherein the fifth set of criteria includes the first criterion that is satisfied when the first set of one or more inputs includes the first input intensity that exceeds the first threshold intensity. In some embodiments, in response to detecting that the first set of one or more inputs satisfies the fifth set of criteria, the computer system displays the indication of the one or more characteristics of the first set of one or more inputs displaying a respective user interface object corresponding to the first operation (e.g., a displayed control affordance or indicator for the first operation, such as a menu, slider, gauge, and/or wheel) in place of the indication of the one or more characteristics of the first set of one or more inputs (e.g., as illustrated in FIGS. 6I-6J). In some embodiments, the computer system displays (e.g., animates with a plurality of intermediate states that are displayed over time) the indication of the one or more characteristics of the first set of one or more inputs morphing into the respective user interface object. For example, before the input reaches the first threshold intensity, the computer system displays the indicator as a small bump extending from the edge of the display near the first input device, then displays the indicator expanding into a wide tab with control information for the first operation once the first criterion is met. In some embodiments, the tenth set of criteria includes a criterion that is met when the intensity of the input does not exceed the second threshold intensity for at least a threshold period of time after satisfying the first criterion, e.g., the computer system does not display the indication morphing into the control object in response to a quick full/hard press. Displaying an indication of one or more input characteristics that morphs into a user interface object corresponding to the first operation when the input transitions to a light/partial press provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. For example, visually indicating changes to the characteristics of an input indicates how the user can control the first input device, e.g., visually indicating that the computer system can detect and respond to changes in location and intensity, and allows the user to adjust the characteristics of the input to achieve an intended result.

In some embodiments, in response to detecting the first set of one or more inputs and in accordance with a determination that the first set of one or more inputs satisfies an sixth set of criteria, the computer system displays (e.g., initially displays), via the display generation component, a user interface object (e.g., 622) corresponding to the first operation (e.g., as illustrated in FIG. 6J) (e.g., a displayed control affordance or indicator controlled by the first operation, such as a menu, slider, gauge, and/or wheel), wherein the sixth set of criteria includes the first criterion that is satisfied when the first set of one or more inputs includes the first input intensity that exceeds the first threshold intensity. In some embodiments, in response to detecting the first set of one or more inputs and in accordance with a determination that the first set of one or more inputs satisfies a seventh set of criteria, performing the first operation, wherein performing the first operation includes adjusting the user interface object (e.g., as illustrated in FIGS. 6L-6S, 6X, 6Z, 6AE-6AM, 10G, 10J, 10N, 10O, 10R, 10U, and/or 14A-14Z) (e.g., changing an appearance of the user interface object to indicate a result of the first operation) and the seventh set of criteria includes a criterion that is satisfied when the first set of one or more inputs includes a respective type of input (e.g., 616B, 624B, 616C, 624B, 616D, 624C, 616E, 624D, 630A, 630B, 644, 646, 648, 650, 652,654,656, 658, 660, 662, 664, 666, 668, 670, 672, and/or movement inputs described with respect to FIGS. 10G, 10J, 10N, 10O, 10R, 10U, and/or 14A-14Z) (e.g., a movement of more than a threshold amount of movement of the first type (e.g., a swipe, drag, and/or flick) and/or a tap; e.g., inputs directed to the first input device and/or to the displayed user interface object) detected while displaying the user interface object corresponding to the first operation. In some embodiments, in accordance with a determination that the respective type of input is detected while the user interface object associated with the first operation is not being displayed, the computer system foregoes performing the first operation in response to the respective type of input. For example, as long as the user interface object corresponding to the first operation is displayed, the computer system will perform the first operation in response to appropriate inputs (e.g., swipes, drags, flicks, and/or taps on the hardware button or on the displayed user interface object), but the computer system will not respond to those inputs while the user interface object is not being displayed (e.g., until the control is re-invoked via a light/partial press or full swipe). In some embodiments, displaying and adjusting the user interface object is performed as described with respect to FIGS. 14A-14Z and 15. Displaying a user interface object corresponding to the first operation in response to a light/partial press provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. For example, initially displaying the user interface object indicates that the computer system is ready to respond to movement inputs via the first input device, and adjusting the user interface object provides visual feedback on the results of the computer system's response to movement inputs.

In some embodiments, while the user interface object corresponding to the first operation is not displayed, the computer system detects a respective input. In some embodiments, the respective input does not satisfy the first criterion. For example, the respective input does not include a input intensity that exceeds the first threshold intensity, e.g., the respective input does not include a light/partial press of sufficient intensity to activate the user interface object corresponding to the first operation. In some embodiments, in response to detecting the respective input and in accordance with a determination that the respective input includes more than a second threshold amount of movement of the first type (e.g., a swipe across the surface of the first input device; in some embodiments, the second threshold amount of movement is a lower amount of movement than the threshold amount of movement), the computer system displays (e.g., initially displays), via the display generation component, the user interface object (e.g., 622) corresponding to the first operation (e.g., as described with respect to FIG. 6J). For example, the first set of one or more inputs includes more than the second threshold amount of movement when the first set of one or more inputs includes a swipe across the entire length of the first input device, a swipe of at least a predetermined portion of the length of the first input device (e.g., 90%, 70%, 50%, or 45%), and/or a swipe off of the end of the first input device (e.g., a swipe across and off the surface of the first input device). In some embodiments, while displaying the user interface object corresponding to the first operation, in accordance with a determination that the first set of one or more inputs includes movement that satisfies the second criterion, the computer system performs the first operation based on the movement, e.g., the computer system performs the first operation in response to movement inputs while the user interface object corresponding to the first operation is displayed, whether the user interface object corresponding to the first operation was initially displayed in response to a light/partial press or in response to a movement of more than the second threshold amount. In some embodiments, if the respective input does not satisfy the first criterion, in accordance with a determination that the respective input does not include a movement input that exceeds the threshold amount of movement, the computer system forgoes displaying the user interface object corresponding to the first operation. Displaying a user interface object corresponding to the first operation in response to a long swipe of the first input device provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. For example, initially displaying the user interface object indicates that the computer system is ready to respond to movement inputs via the first input device.

In some embodiments, while displaying the user interface object (e.g., 622) corresponding to the first operation, the computer system detects a lift-off event (e.g., as described with respect to FIGS. 6N, 6Q, 6R-6S, 6T, and/or 6AA). In some embodiments, a lift-off event is detected when contact with the first input device ends, for example, when contact is no longer detected by one or more touch/capacitive sensors of the first input device, e.g., due to the user moving their finger or stylus away from the surface of the first input device. In some embodiments, a lift-off event is detected when a input intensity of the one or more inputs falls below a light/partial press maintenance threshold, e.g., a force or pressure threshold, e.g., 0.5 g/cm$^3$, 1 g/cm$^3$, or 5 g/cm$^3$, for example, when the user is resting a finger on the first input device but not pressing in.

In some embodiments, in response to detecting the lift-off event and in accordance with a determination that an input that satisfies an eighth set of criteria (e.g., a light/partial press, a movement of more than a threshold amount of movement of the first type (e.g., a swipe, drag, and/or flick) and/or a tap; e.g., inputs directed to the first input device and/or to the displayed user interface object) is not detected, via the first input device, within a threshold period of time after detecting the lift-off event (e.g., 0.5 s, 1 s, 1.3 s, or 2 s), the computer system ceases displaying the user interface object corresponding to the first operation (e.g., as described with respect to FIGS. 6U and/or 6AB). In some embodiments, in accordance with a determination that an input that satisfies the eighth set of criteria is detected within a threshold period of time after detecting the lift-off event, the computer system continues displaying the user interface object and performing the first operation in response to qualifying movement of the first type. For example, after a lift-off of the first set of one or more inputs, the computer system continues to display the user interface object for at least the threshold period of time, then dismisses the user interface object if no further interaction with the user interface object is detected in that time. Automatically ceasing display of the user interface object corresponding to the first operation a threshold period of time after a lift-off of the one or more inputs if no further inputs are detected following the lift-off provides improved control of computer system functionality without cluttering the user interface with additional displayed controls and provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. For example, displaying the user interface object indicates that the computer system will continue to perform the first operation in response to appropriate movements even after a brief lift-off (e.g., without needing to provide another light/partial press first), while ceasing displaying the user interface object indicates that another light/partial press is needed to re-activate control of the first operation.

In some embodiments, displaying the user interface object (e.g., 622) corresponding to the first operation includes, in accordance with a determination that an orientation of the computer system (in some embodiments, a physical orientation, e.g., with respect to the direction of gravity's pull) is in a first state (e.g., one state of one or more portrait orientation states and one or more landscape orientation states), displaying the user interface object at a first location within a respective user interface, and in accordance with a determination that the orientation of the computer system is in second state different from the first state, displaying the user interface object at a second location, different from the first location, within the respective user interface (e.g., as described with respect to FIG. 6K). In some embodiments, the first location and the second location are different relative to the overall orientation of the respective user interface, but both the first location and the second location are displayed near the physical location of the first input device (e.g., the location of the user interface object is device- or hardware-locked). For example, while the computer system is in a portrait orientation, the user interface object is displayed on a side of the user interface relative to the user interface's overall orientation (e.g., the orientation of text, icons, and/or other elements in the user interface), and while the computer system is in a landscape orientation, the user interface object is displayed at the top or bottom of the user interface relative to object is displayed on a side of the user interface relative to the user interface's overall orientation. For example, where the first input device includes a hardware button located outside of the display on which the user interface is displayed, the user interface object is always displayed near the hardware button, e.g., at the bottom of the user interface when the computer system is oriented such that the hardware button is at the bottom of the user interface, and at the top of the user interface when the computer system is oriented such that the hardware button is at the top of the user interface. Displaying the user interface object at different locations within a user interface depending on the orientation of the computer system provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. For example, changing where the user interface object is displayed within a user interface allows the user interface object to be consistently displayed near the first input device, thus providing the user with improved feedback about inputs performed via the first input device.

In some embodiments, displaying the user interface object (e.g., 622) corresponding to the first operation includes, in accordance with a determination that an orientation of the computer system (in some embodiments, a physical orientation, e.g., with respect to the direction of gravity's pull) is in a first state (e.g., one state of one or more portrait orientation states and one or more landscape orientation states), displaying one or more elements of the user interface object in a first display configuration, and in accordance with a determination that the orientation of the computer system is in a second state different from the first state, displaying the or more elements of the user interface object in a second display configuration, different from the first display configuration (e.g., as described with respect to FIG. 6K). For example, the first and second display configuration define how different elements of the user interface object, such as tick marks, text, icons, frame elements, and/or other graphical elements are positioned and/or rotated with respect to each other (e.g., within the frame of reference of the user interface object). In some embodiments, the first display configuration and the second display configuration differ in at least one way with respect to the overall orientation of the respective user interface. For example, a zoom user interface object in a camera user interface includes tick marks representing zoom levels, where tick marks representing higher zoom levels may be above, below, left, or right of tick marks representing lower zoom levels within the frame of reference of the camera user interface (e.g., where above, below, left, and right are defined with respect to the upright orientation of other text or elements within the camera user interface); however, the tick marks representing higher zoom levels may always be displayed further away from the one or more cameras (e.g., closer to the bottom of the device) than the tick marks representing lower zoom levels within the frame of reference of the hardware. In some embodiments, the first display configuration and the second display configuration differ in at least one way with respect to the hardware of the computer system. For example, the zoom user interface object includes text, representing a current zoom level, that the computer system orients in the same direction as other text in the camera user interface, but depending on the orientation of the computer system, the text is above, below, left, or right of the first input device. Displaying the user interface object in different configurations depending on the orientation of the computer system provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently. For example, changing the configuration of the user interface object as the orientation of the computer system provides an up-to-date and visually-clear indication of the polarity of movement needed to achieve a certain result with the first operation.

In some embodiments, while displaying the user interface object (e.g., 622) corresponding to the first operation, the computer system detects (e.g., via a touch sensitive display that is displaying the user interface object) a third set of one or more inputs including an input directed to a display location of the user interface object (e.g., 624B, 624B1, 624C, 624D, 624E, 624F, 642, 646, 650, 654, 658, 662, 666, 670, and/or 674) (e.g., a swipe, flick, drag, tap, and/or press at a location on the touch sensitive display on the user interface object). In some embodiments, in response to detecting the third set of one or more inputs, the computer system performs the first operation based on the input directed to the display location of the user interface object (e.g., as described with respect to FIGS. 6L-6S and/or 6AE-6AM) (e.g., based on the location, direction of movement, magnitude of movement, and/or speed of movement of the input to the user interface object). For example, in computer systems where the first input device includes a hardware button or sensor separate from a touch-sensitive display, the computer system performs the first operation both in response to light/partial press inputs with movement detected via the hardware button/sensor and in response to inputs manipulating the user interface object via the touch-sensitive display. Performing the first operation in response to inputs directed to the displayed user interface object in addition to in response to inputs satisfying the first set of criteria provides improved control of computer system functionality. Doing so makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems. For example, after movement control of the first operation is activated (e.g., using a light/partial press and/or a full swipe of a hardware button), the computer system provides flexible control of the first operation, where the user can provide inputs via either a hardware button or the displayed touch control for the first operation.

In some embodiments, displaying the user interface object corresponding to the first operation (e.g., 622) includes displaying one or more graphical elements of a plurality of graphical elements (e.g., tick marks, dots, text, icons, and/or symbols) within a first display region. In some embodiments, performing the first operation includes adjusting a parameter value for a setting, and the plurality of graphical elements represent a respective plurality of parameter values (e.g., zoom levels, filter types, filter intensities, exposure values, f-stop values, and/or focus subjects). In some embodiments, displaying the one or more graphical elements of the plurality of graphical elements within the first display region includes: distorting an appearance (e.g., blurring, warping, changing color, changing brightness, and/or changing opacity of) of the one or more graphical elements at a first portion of the first display region corresponding to a first edge of the first display region; and distorting an appearance of the one or more graphical elements at a second portion of the first display region, different from the first portion of the display region, corresponding to a second edge of the first display region different from the first edge of the display region (e.g., as illustrated in FIG. 6J1). For example, the plurality of graphical elements are represented in the user interface object as options on simulated dial that curves (e.g., outwards or inwards) relative to the user (or a viewpoint of the user), a front of the user interface, or a surface of the display (e.g., simulating a round dial that can be rotated by lateral movements across the surface of the display), so the graphical elements are distorted (e.g., blurring, warping, changing color, changing brightness, and/or changing opacity of) to appear as though they are curving away from the user (e.g., around the edge of the simulated dial and/or into a plane of the display or user interface) towards the edges of the user interface object. In some embodiments, the distortion is progressive and increases toward the edges of the option user interface. In some embodiments, performing the first operation includes adjusting a parameter value for a setting, and the user interface object corresponding to the first operation includes a platter or slider for selecting a value of the parameter. For example, the platter or slider is distorted near the edges of the operation user interface to simulate a curved dial. Distorting elements of the user interface object corresponding to the first operation at the edges of the user interface object (e.g., to simulate the appearance of a curved dial) provides users with real-time feedback about a state of the computer system without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, displaying the user interface object as a simulated curved dial intuitively indicates to the user how to perform the first operation (e.g., using lateral gesture inputs, as if rotating the dial) and/or the range of values available for the first operation (e.g., the user can "rotate" the dial to display additional parameter values).

In some embodiments, while displaying a user interface object (e.g., 622) corresponding to the first operation, the computer system detects (in some embodiments, via the first input device; in some embodiments, via another input device) a second set of one or more inputs (e.g., 626A and/or 626B). In some embodiments, the user interface object corresponding to the first operation is initially displayed in response to detecting an input that satisfies the first criterion (e.g., exceeds the first threshold intensity). In some embodiments, computer system ceases displaying the user interface object corresponding to the first operation in response to detecting a lift-off and without detecting further input for at least a threshold period of time. In some embodiments, in response to detecting the second set of one or more inputs and in accordance with a determination that the second set of one or more inputs corresponds to a request to dismiss the user interface object corresponding to the first operation, the computer system ceases displaying the user interface object corresponding to the first operation (e.g., as illustrated in FIG. 6U). In some embodiments, the second set of one or more inputs corresponds to a request to dismiss the user interface object if it includes a tap directed to a location outside of the display region of the user interface object (e.g., on a touch sensitive display). In some embodiments, the second set of one or more inputs corresponds to a request to dismiss the user interface object if it includes a swipe across the user interface object towards an edge of the display, e.g., swiping from the interior of the display, across the user interface object, and off the edge of the display. For example, the user can tap outside of the user interface object or swipe over the user interface object to dismiss it prior to the threshold period of time elapsing following a lift-off. Automatically ceasing display of the user interface object corresponding to the first operation a threshold period of time after a lift-off of the one or more inputs if no further inputs are detected following the lift-off provides improved control of computer system functionality without cluttering the user interface with additional displayed controls and provides users with real-time feedback about a state of the computer system, which assists the user with control of the computer system via the first input device. Doing so also makes the user-system interface more efficient (e.g., by helping the user to provide proper inputs and reducing user mistakes when operating/interacting with the system), which, additionally, reduces power usage and improves battery life of the system by enabling the user to use the system more quickly and efficiently.

In some embodiments, the first set of one or more inputs includes a first movement input, wherein the first movement input is more than the threshold amount of movement of the first type and the first movement input moves in a first direction (in some embodiments, relative to a user interface in which the UI object is displayed, e.g., up, down, left, or right with respect to the user interface's orientation; in some embodiments, relative to the direction of gravity's pull; in some embodiments, relative to the first input device and/or the computer system, e.g., towards the top, bottom, left side, or right side of the electronic device). In some embodiments, performing the first operation (e.g., in response to the first set of one or more inputs) includes, in accordance with a determination that the first movement input is detected while an orientation of the computer system is in a first state, changing a current settings value (e.g., a parameter value) from an initial settings value to a first updated settings value (e.g., as illustrated in FIGS. 6L-6M, where the computer system increases zoom in response to right-to-left movements 616B, 624A, 616C, and/or 624B). In some embodiments, performing the first operation includes, in accordance with a determination that the first movement input is detected while the orientation of the computer system is in a second state different from the first state, changing the current settings value from the initial settings value to a second updated settings value different from the second updated settings value, wherein a direction of change from the initial settings value to the first updated settings value (e.g., increasing a parameter value, decreasing a parameter value, cycling forward through parameter values, and/or cycling backwards through parameter values) is different from a direction of change from the initial settings value to the second updated settings value (e.g., as illustrated in FIG. 6Z, where the computer system decreases zoom in response to right-to-left movement 630B). In some embodiments, the first direction is defined relative to the hardware of the computer system, e.g., towards the top (e.g., towards one or more cameras), bottom (e.g., towards a charge port), left (e.g., with respect to the display), or right (e.g., with respect to the display) of the device. For example, for a first operation of controlling a zoom level in a camera user interface, swiping towards the cameras increases zoom regardless of how the camera user interface is oriented (e.g., regardless of whether the swipe is moving towards the top, bottom, left, or right of the user interface) and/or the direction of gravity's pull (e.g., regardless of how the computer system is oriented within the environment). Changing the direction of adjustment made by the first operation in response to a particular direction of movement based on the orientation of the computer system provides improved control of computer system functionality. Doing so makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems. For example, although the orientation of the user interface might change as the orientation of the computer system changes, the user can achieve consistent results for the first operation by swiping in the same direction with respect to the first input device.

Note that details of the processes described above with respect to method 700 (e.g., FIG. 7) are also applicable in an analogous manner to the methods described above and below. For example, controls based on variable characteristics of hardware inputs as described with respect to method 700 can be used for capturing media as described with respect to method 900, controlling customizable functions as described with respect to method 1100, controlling media playback as described with respect to method 1300, and/or adjusting a setting as described with respect to method 1500. For brevity, these details are not repeated below.

FIGS. 8A-8P illustrate example techniques and systems for controlling media capture operations based on variable characteristics of hardware inputs in accordance with some embodiments. For example, FIGS. 8A-8P illustrate capturing photo media using short press inputs, capturing video media using long press inputs, and locking the video media for capture after a press input ends using movement inputs.

At FIG. 8A, computer system 600 displays camera user interface 612, as described with respect to FIG. 6E. In particular, at FIG. 8A, camera user interface 612 is in a standard photo capture mode, indicated by the "PHOTO" menu item being centered and emphasized in capture mode affordance 612A. For example, in the standard photo capture mode, in response to inputs selecting shutter affordance 612C, computer system 600 captures photo media without simulated depth-of-field effects (e.g., the captured photo media is designated for display without the simulated blurring described with respect to FIGS. 6AE-6AH). While displaying camera user interface 612, computer system 600 detects press input 802 of first button 602A. As illustrated in FIG. 8A, press input 802 is a hard/full press of first button 602A, e.g., a press with enough intensity to place first button 602*a* into hardware button state (E). In some embodiments, press input 802 is a "quick" hard/full press, which places first button 602*a* into hardware button state (E) (e.g., passing the hard/full press threshold intensity) less than a first threshold period of time (e.g., 0.05 s, 0.1 s, 0.25 s, or 0.5 s) after press input 802 places first button 602*a* into hardware button state (D) (e.g., passing the light/partial press threshold intensity), so computer system 600 does not update camera user interface 612 to a "quiet" or "ready to capture" mode/appearance as described with respect to FIGS. 6I-6J.

At FIG. 8B, less than a second threshold period of time (e.g., 0.25 s, 0.5 s, 0.8 s, or 1 s) after press input 802 places first button 602*a* into hardware button state (E), computer system 600 detects end 802' of press input 802. In some embodiments, computer system 600 detects end 802' of press input 802 when the intensity of press input 802 falls below a maintenance threshold, for instance, transitioning into hardware button state (B), but finger 608 may remain resting on first button 602*a*, e.g., a press-and-release without lift-off. In some embodiments, computer system 600 detects end 802' of press input 802 when finger 608 is lifted off of first button 602*a*, for instance, transitioning into hardware button state (A), e.g., a press-and-release with lift-off. Because press input 802 ends within the second threshold period of time, computer system 600 registers press input 802 is a "short" hard/full press (e.g., a hard/full press with a short duration, in contrast to the quick hard/full press, which resolves quickly into a hard/full press from a less-intense state).

In response to press input 802 (e.g., a short hard/full press), at FIG. 8B, computer system 600 captures photo media and updates captured media icon 612D to include a thumbnail of the captured photo media. As press input 802 was detected while camera user interface 612 is in the standard photo capture mode, computer system 600 captures the photo media without applying simulated depth-of-field effects.

While remaining in the standard photo capture mode of camera user interface 612, computer system 600 detects press input 804, another hard/full press of first button 602A. At FIG. 8D, as the duration of press input 804 (e.g., the elapsed time since initially registering press input 804 as a hard/full press without detecting an end of press input 804) approaches the second threshold period of time (e.g., nears 0.25 s, 0.5 s, 0.8 s, or 1 s), computer system 600 begins to transition the display of camera user interface 612 to a video capture mode (e.g., as described at FIG. 6Y). In particular, as illustrated in FIG. 8D, computer system 600 begins to lengthen the aspect ratio of camera preview 614 (e.g., from an initial aspect ratio of 4:3), animates shutter affordance 612C morphing into a stop recording button (e.g., showing a white center circle of shutter affordance 612C shrinking, changing shape, and changing color), and begins to fade out (e.g., increases the transparency of and/or visually deemphasizes) several of the touch controls included in camera user interface 612, including capture mode affordance 612A, camera selection affordance 612B, captured media icon 612D, multi-frame photo affordance 612F, and camera flash affordance 612G.

Figure 8D:
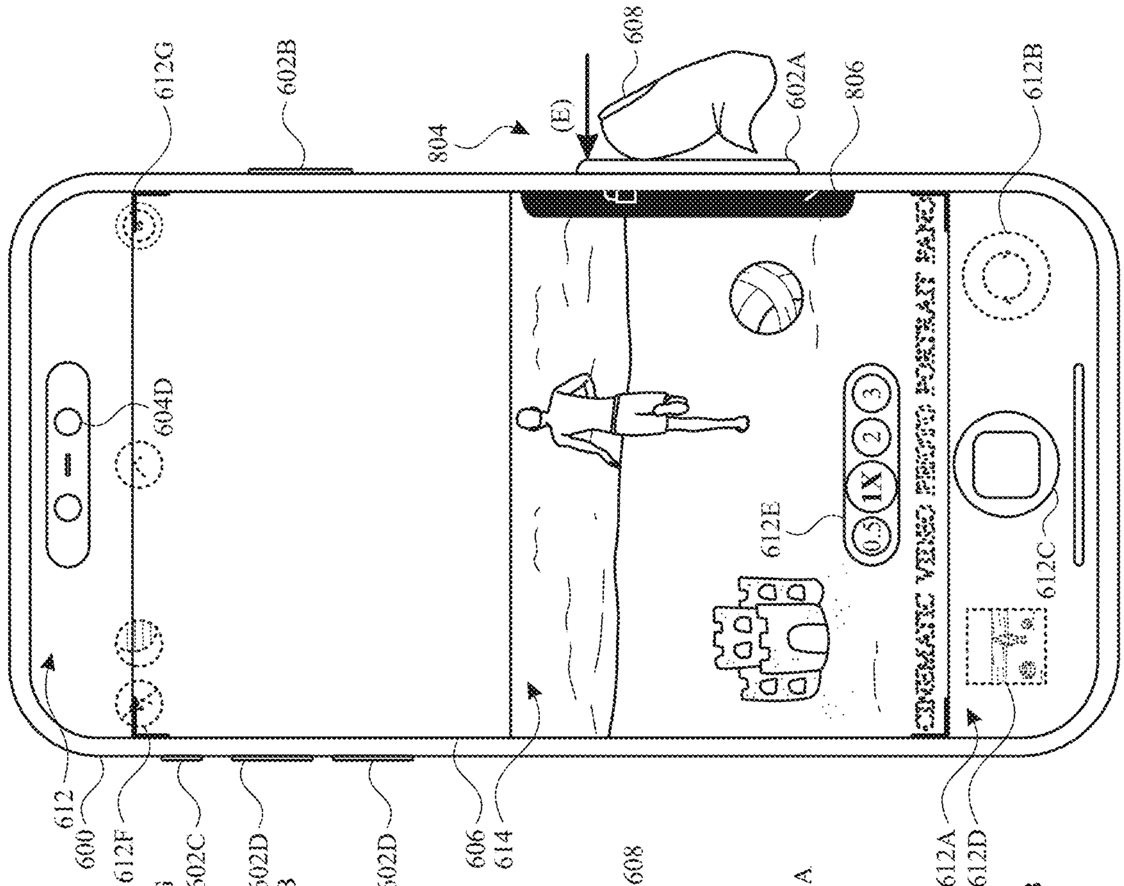
Figure 8C:
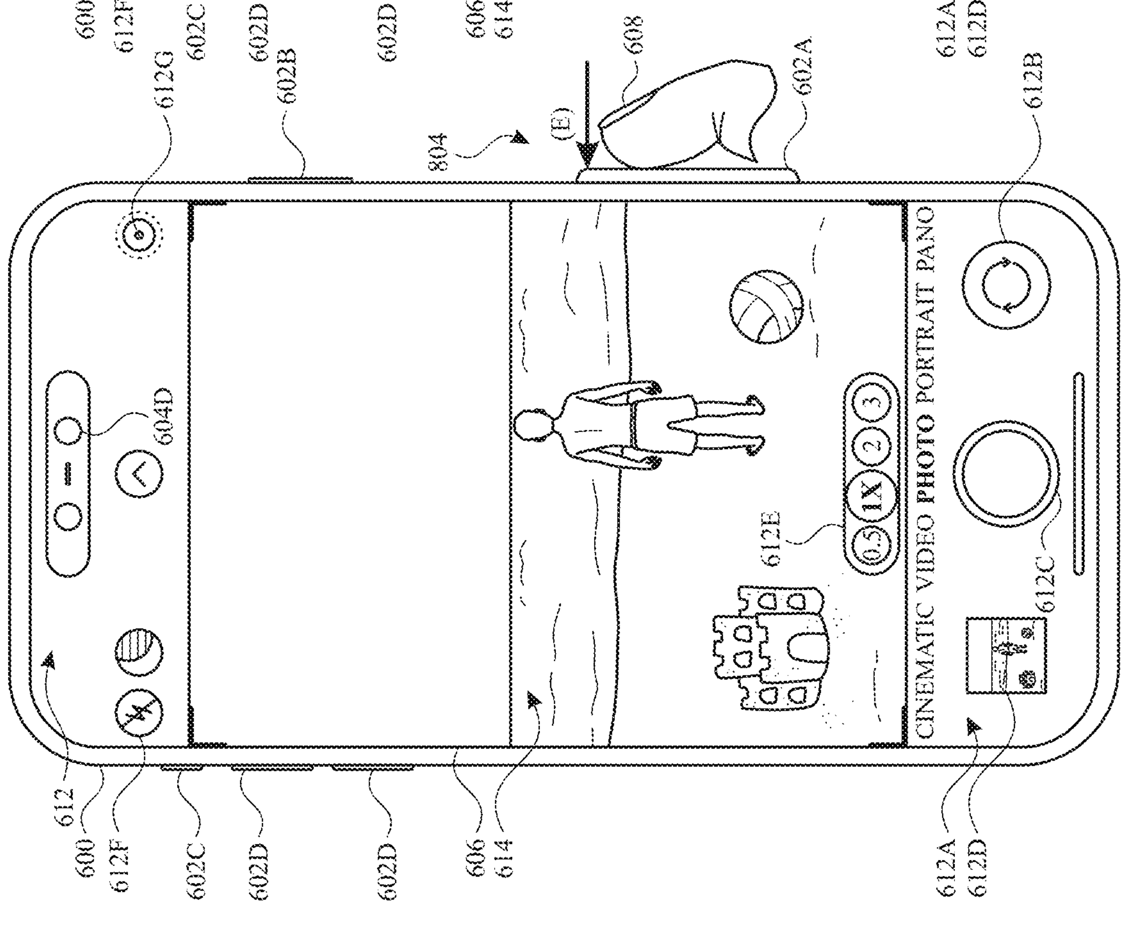
Figure 8F:
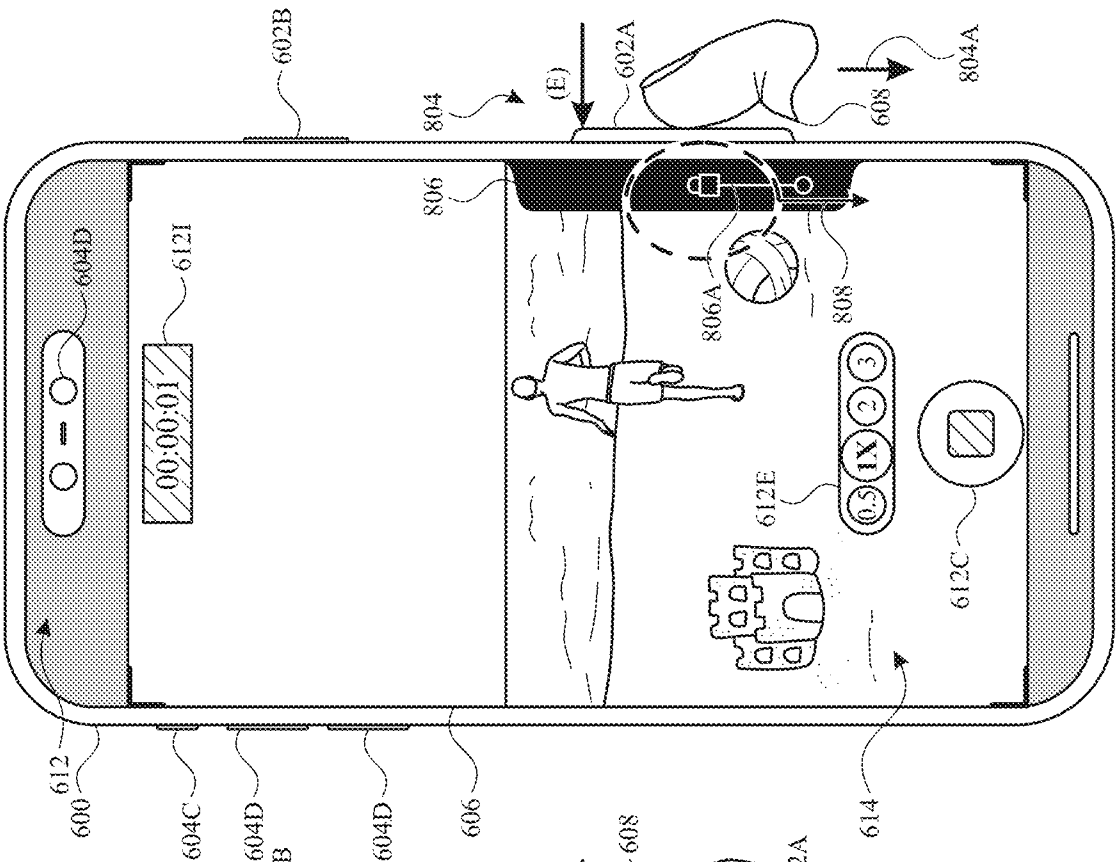

Additionally, at FIG. 8D, computer system 600 begins displaying lock affordance 806. Lock affordance 806 (illustrated in full at FIG. 8E) is a slider user interface element displayed within a tab-shaped cut-out from camera user interface 612 extending into display 606 from the location of first button 602A (e.g., the lower-right edge of display 606 adjacent to first button 602A). As illustrated in FIG. 8D, computer system 600 animates lock affordance 806 beginning to emerge from the location of first button 602A as the duration of press input 804 approaches the second threshold period of time. In some embodiments, if press input 804 ends before reaching the second threshold period of time, computer system 600 reverts the changes to camera user interface 612 to return to the appearance illustrated at FIG. 8C.

Figure 8E:
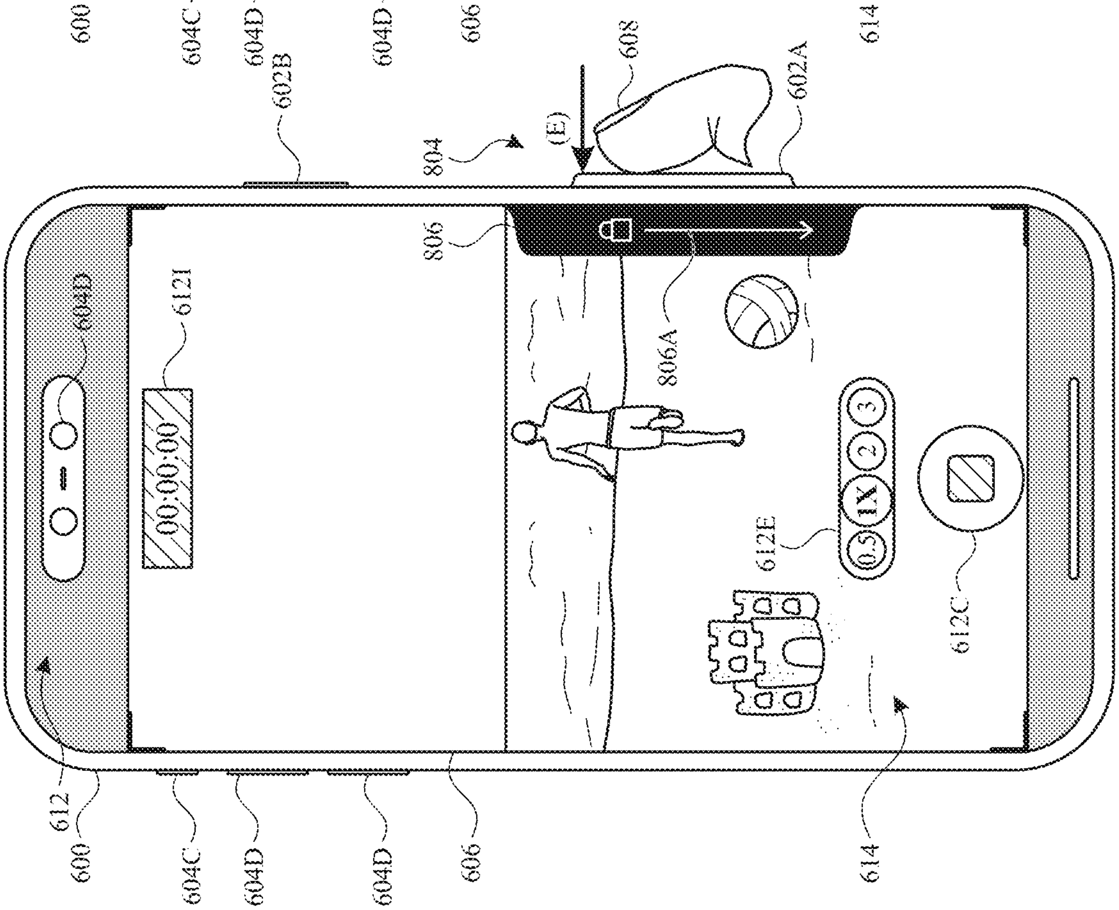

At FIG. 8E, the duration of press input 804 exceeds the second threshold period of time, registering as a "held" long/full press, and in response, computer system 600 initiates capturing video media. Because press input 804 is detected while camera user interface 612 is in the standard photo capture mode, computer system 600 initiates a standard video capture, without applying simulated depth-of-field effects to camera preview 614 and/or the captured media. As illustrated in FIG. 8E, when the capture of video media begins, computer system 600 displays camera user interface 612 in the video capture mode, completing the transition started at FIG. 8D. In particular, at FIG. 8E, the faded touch controls are removed completely, the aspect ratio of camera preview 614 has lengthened to a video capture aspect ratio (e.g., 16:9), and shutter affordance 612C is displayed as a stop recording button (e.g., a circle with a red square in the middle). Additionally, computer system 600 displays capture timer 612I, indicating the current elapsed time of the capture of video media.

At FIG. 8E, computer system 600 displays lock affordance 806 fully emerged from the edge of display 606 near first button 602A. As illustrated in FIG. 8E, lock affordance 806 includes slider element 806A, a lock icon with an arrow pointing down, e.g., away from the lock icon and the set of cameras along the edge of first button 602A. Lock affordance 806 indicates that the ongoing capture of video media is currently a temporary video media capture, which will continue at least as long as press input 804 continues (e.g., at least until computer system 600 detects press input 804 ending, as described with respect to end 802'). Lock affordance 806 also indicates how to "lock" the initiated capture of video media in order to continue the capture after press input 804 ends (e.g., a persistent video capture, as described in further detail with respect to FIGS. 8I-8L, below). Specifically, lock affordance 806 indicates the direction (e.g., downward) and magnitude (e.g., distance) of a movement input needed to lock the capture. For example, the magnitude may be a predetermined distance (e.g., the full length of first button 602A, 75% of the length of first button 602A, or 50% of the length of first button 602A) and/or a dynamic distance (e.g., swiping from the initial contact position all the way to the bottom edge of first button 602A, 90% of the way to the bottom edge of first button 602A, or 75% of the way to the bottom edge of first button 602A).

At FIG. 8F, while capturing the video media, computer system 600 detects movement 804A, where press input 804 begins to slide downwards across the surface of first button 602A (e.g., away from the set of cameras). In some embodiments, as illustrated in FIG. 8F, movement 804A is detected while press input 804 maintains a hard/full press of first button 602A.

In response to detecting movement 804A, computer system 600 updates slider element 806A to show the lock icon sliding down along the direction of the arrow towards an end point of slider element 806A by an amount corresponding to the distance traveled along the edge of display 606 by movement 804A. In some embodiments, if computer system 600 detects movement in the opposite direction (e.g., up), computer system 600 animates the lock icon sliding back up, opposite the direction of the arrow and away from the end point. In some embodiments, computer system 600 animates the lock icon sliding in a direction corresponding to current the direction of detected movement of press input 804 and at a speed corresponding to the current speed of detected movement of press input 804, such that the lock icon travels along the slider to follow press input 804 as finger 608 moves up and down along first button 602A and the instant location of the lock icon relative to the end point of slider element 806A corresponds to the distance press input 804 still needs to travel to lock the video capture. For example, if movement 804A has traveled three-quarters of the distance needed to lock the video capture, computer system 600 displays the lock icon three-quarters of the way down the initial length of slider element 806A.

Alternatively, in some embodiments, computer system 600 detects swipe 807 directed to lock affordance 806 on the touch-sensitive surface of display 606 and updates slider element 806A based on swipe 807 as described with respect to movement 804A, animating the lock icon to follow swipe 807 along slider element 806A. In some embodiments, computer system 600 continues the video capture for at least as long as swipe 807 is detected on lock affordance 806 via the touch-sensitive surface of display 606, for instance, allowing the user to maintain the temporary video capture via either first button 602A or lock affordance 806. For example, while displaying lock affordance 806, computer system 600 may continue the video capture for a third threshold period of time (e.g., 0.05 s, 0.1 s, or 0.25 s) after detecting input 804 end and only stops the video capture as described with respect to FIG. 8G if contact with lock affordance 806 is not established before the end of the third threshold period of time.

As illustrated in FIG. 8F, movement 804A (and/or swipe 807) does not move the lock icon all the way to the end point of slider element 806A. Accordingly, at FIG. 8G, when computer system 600 detects end 804' of press input 804, computer system 600 stops the capture of video media and updates captured media icon 612D to include a thumbnail of the captured video media. As illustrated in FIG. 8G, computer system 600 begins to revert camera user interface 612 back to the standard photo capture mode, removing capture timer 612I, fading the removed touch controls back in, shrinking the aspect ratio of camera preview 614 back to 4:3, and retracting lock affordance 806 (e.g., sliding off of display 606 towards first button 602A).

Figure 8H:
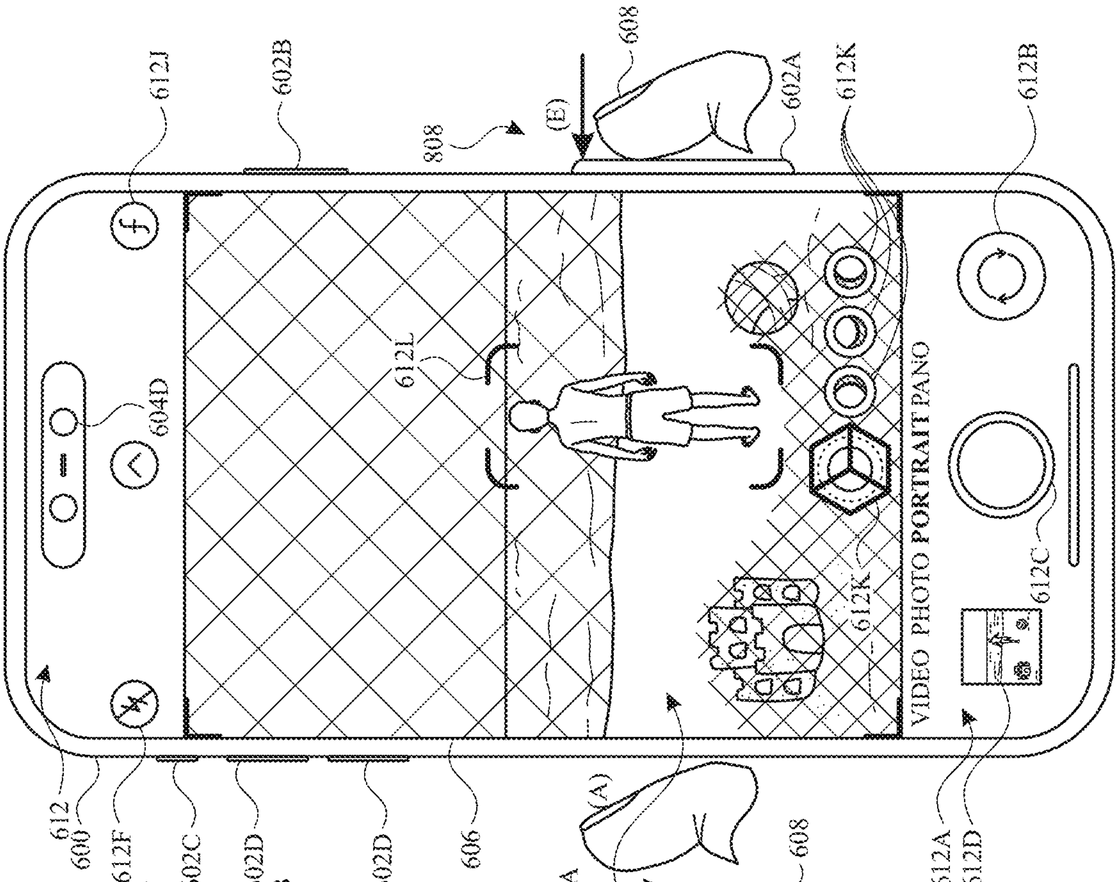
Figure 8G:
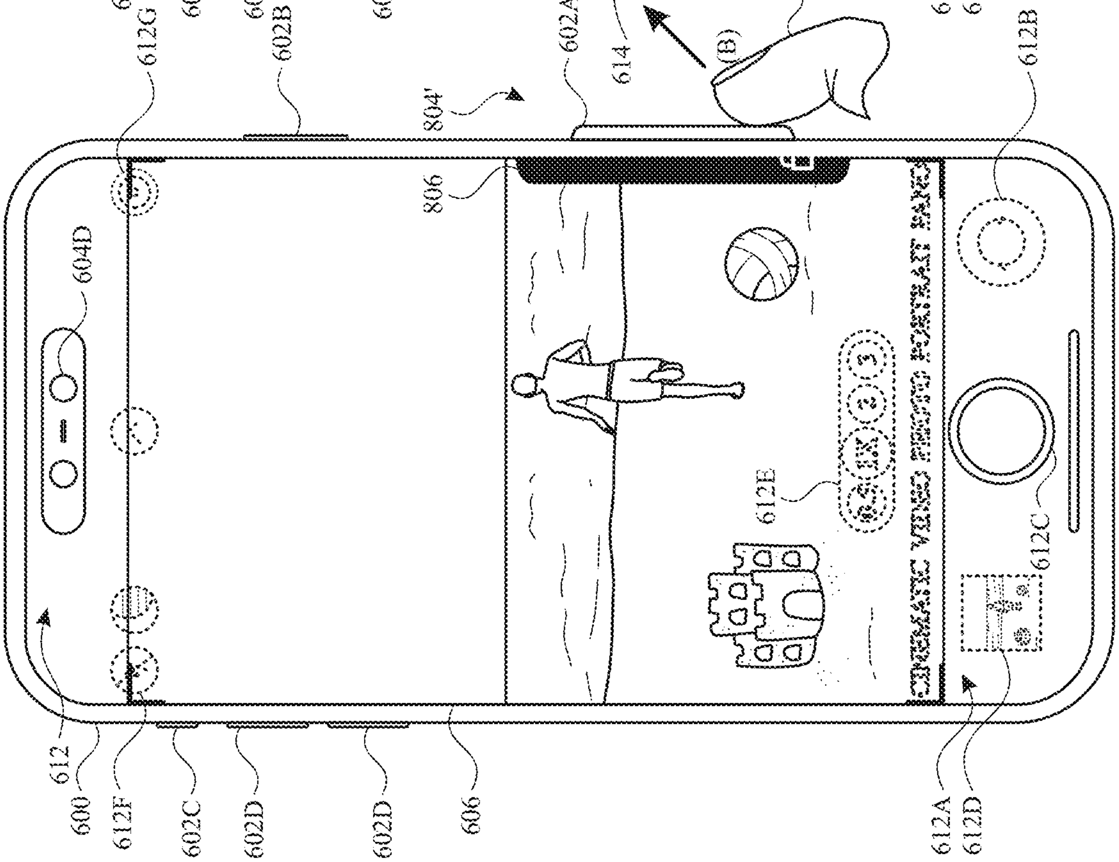

At FIG. 8H, computer system 600 displays camera user interface 612 in a portrait photo capture mode, indicated by the "PORTRAIT" menu item being centered and emphasized in capture mode affordance 612A. For example, in the portrait photo capture mode, in response to inputs selecting shutter affordance 612C, computer system 600 captures photo media with simulated depth-of-field effects and/or other portrait photo effects (e.g., simulated lighting effects, filters, and/or other effects) applied. As illustrated in FIG. 8H, in the portrait photo capture mode, computer system 600 displays camera preview 614 with simulated depth-of-field effects applied, blurring portions of the foreground (e.g., including the sandcastle, volleyball, and portions of the beach closest to the set of cameras) and background (e.g., including the ocean and sky) while leaving the midground (e.g., including the person) in focus. Additionally, computer system 600 displays depth capture affordance 612J, portrait effect affordances 612K (e.g., touch controls for applying different types of portrait effects), and subject indicator 612L (e.g., framing the person identified as a subject within camera preview 614).

At FIG. 8H, while displaying camera user interface 612 in the portrait photo capture mode, computer system 600 detects press input 808, another hard/full press of first button 602A. As described with respect to FIG. 8E, once the duration of press input 808 exceeds the second threshold period of time (e.g., registering as a held long/full press), at FIG. 8I, computer system 600 initiates capturing video media. Because press input 808 is detected while camera user interface 612 is in the portrait photo capture mode, computer system 600 initiates a cinematic video capture (e.g., a video capture mode corresponding to the portrait photo capture mode), applying simulated depth-of-field effects to camera preview 614 and the captured video media. As illustrated in FIG. 8I, during the cinematic video capture, computer system 600 displays camera user interface in the video capture mode, with certain touch elements faded out, camera preview 614 expanded to the 16:9 aspect ratio, shutter affordance 612C displayed as the video stop button, and capture timer 612I indicating the current elapsed time of the capture. Additionally, computer system 600 initiates display of lock affordance 806. In some embodiments, computer system 600 displays camera user interface 612 transitioning to the video capture mode and lock affordance 806 emerging from first button 602A as the duration of press input 808 nears the second threshold period of time as described with respect to FIG. 8D.

Figure 8J:
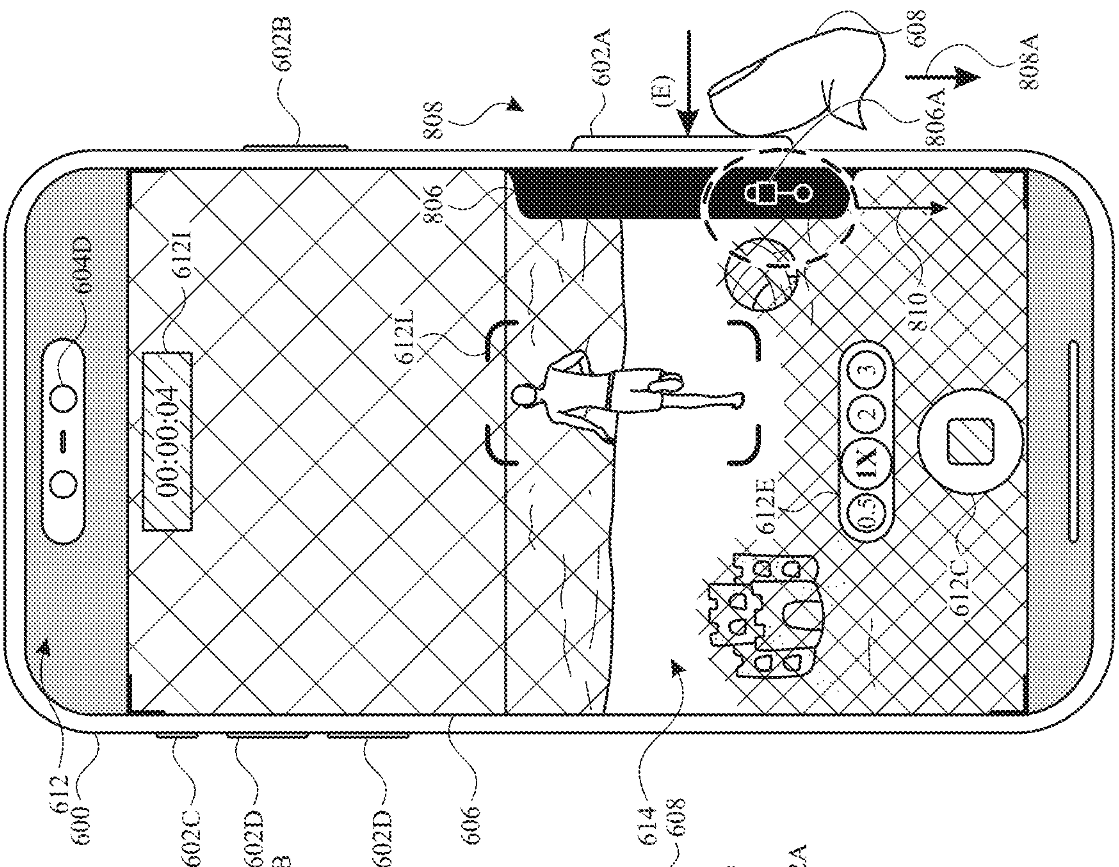
Figure 8I:
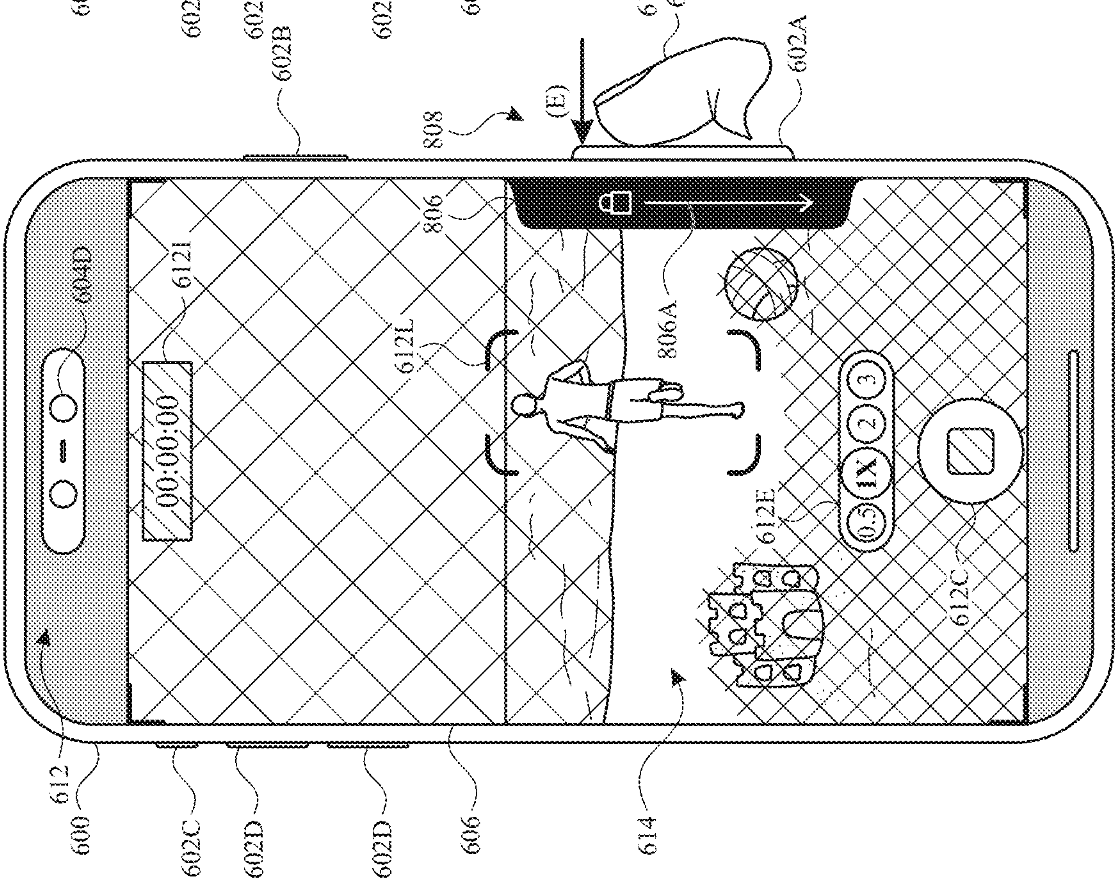

At FIG. 8J, while capturing the video media, computer system 600 detects movement 808A of press input 808, where press input 808 begins to slide downwards across the surface of first button 602A. Alternatively, as described with respect to FIG. 8F, computer system 600 detects a corresponding swipe 810 directed to lock affordance 806 via the touch-sensitive surface of display 606. In response to detecting movement 808A, computer system 600 updates slider element 806A as described with respect to FIG. 8F, animating the lock icon sliding down slider element 806A to follow movement 808A. In some embodiments, computer system 600 continues displaying lock affordance 806 at least as long as press input 808 is maintained, allowing the user to provide movement 808A at any time and/or at any speed. For example, as illustrated in FIG. 8F, movement 808A moves the lock icon most of the way down slider element 806A when the elapsed time of the video capture is at 4 seconds (e.g., indicated by capture timer 612I).

Figures 8K, 8L:
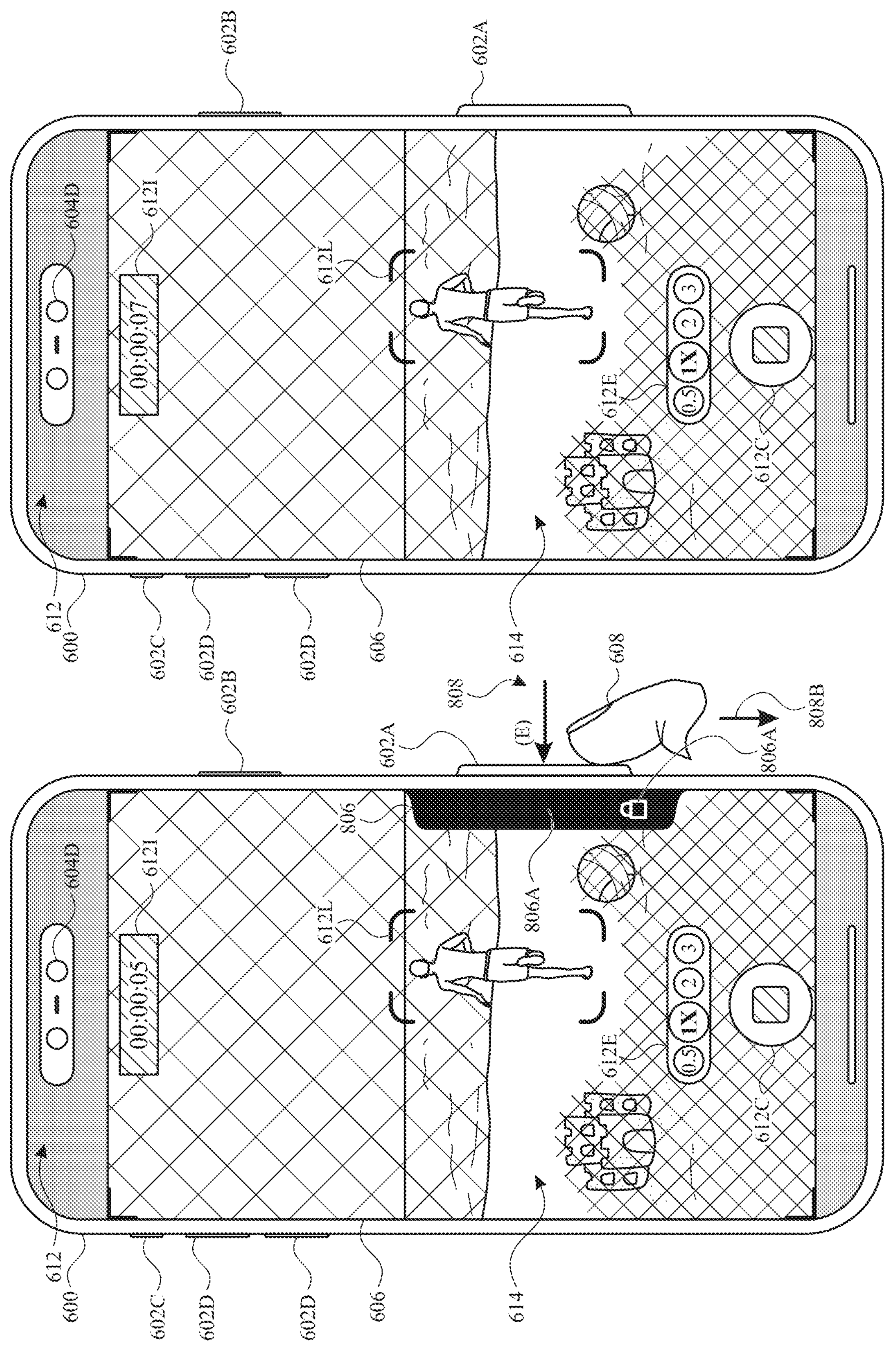

At FIG. 8K, while capturing the video media, computer system 600 detects movement 808B of press input 808, a further movement downwards across first button 602A. Based on movement 808B, computer system 600 displays the lock icon sliding the remainder of the way to the end point of slider element 806A, e.g., reaching a locked position. In some embodiments, computer system 600 displays additional indications that the movement inputs have reached the locked position, for instance, displaying the lock icon with increased emphasis as illustrated in FIG. 8K. The updated appearance of lock affordance 806 indicates that the ongoing capture of video media is currently a persistent video capture, which continues without the user needing to maintain press input 808. In some embodiments, after detecting movement 808B and/or displaying slider element 806A with the lock icon in the locked position, computer system 600 stops displaying lock affordance 806, for instance, animating lock affordance 806 retracting into first button 602A.

As illustrated in FIG. 8L, once the video capture is locked in response to movement 808A and movement 808B swiping down a sufficient distance along first button 602A, computer system 600 continues capturing the video media after press input 808 ends (e.g., as described with respect to FIGS. 8B and 8G). Accordingly, at FIG. 8L, the user is free to provide other inputs without needing to keep pressing first button 602A, such as interacting with camera user interface 612 via the touch-sensitive surface of display 606 and/or adjusting capture settings via first button 602A/settings control 622 (e.g., as described with respect to FIG. 6Z).

Figure 8N:
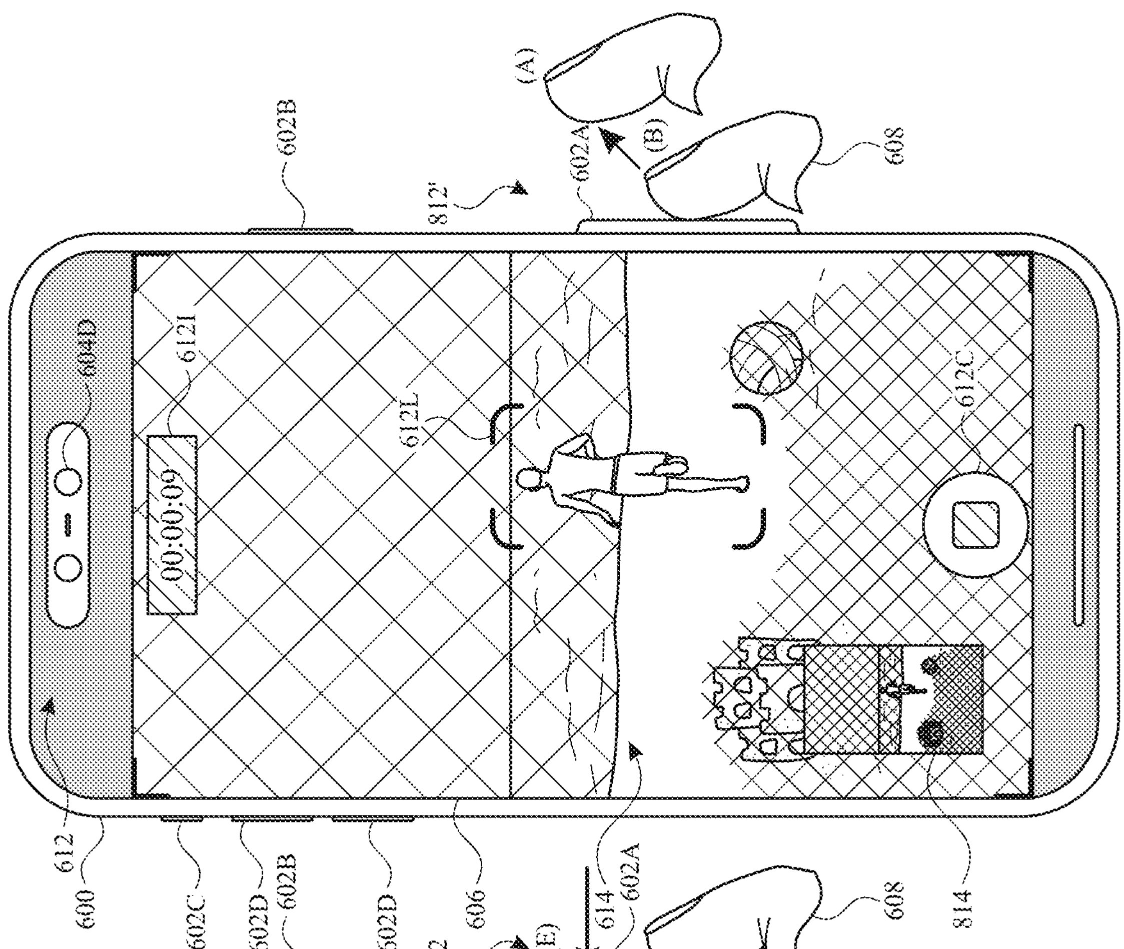
Figure 8M:
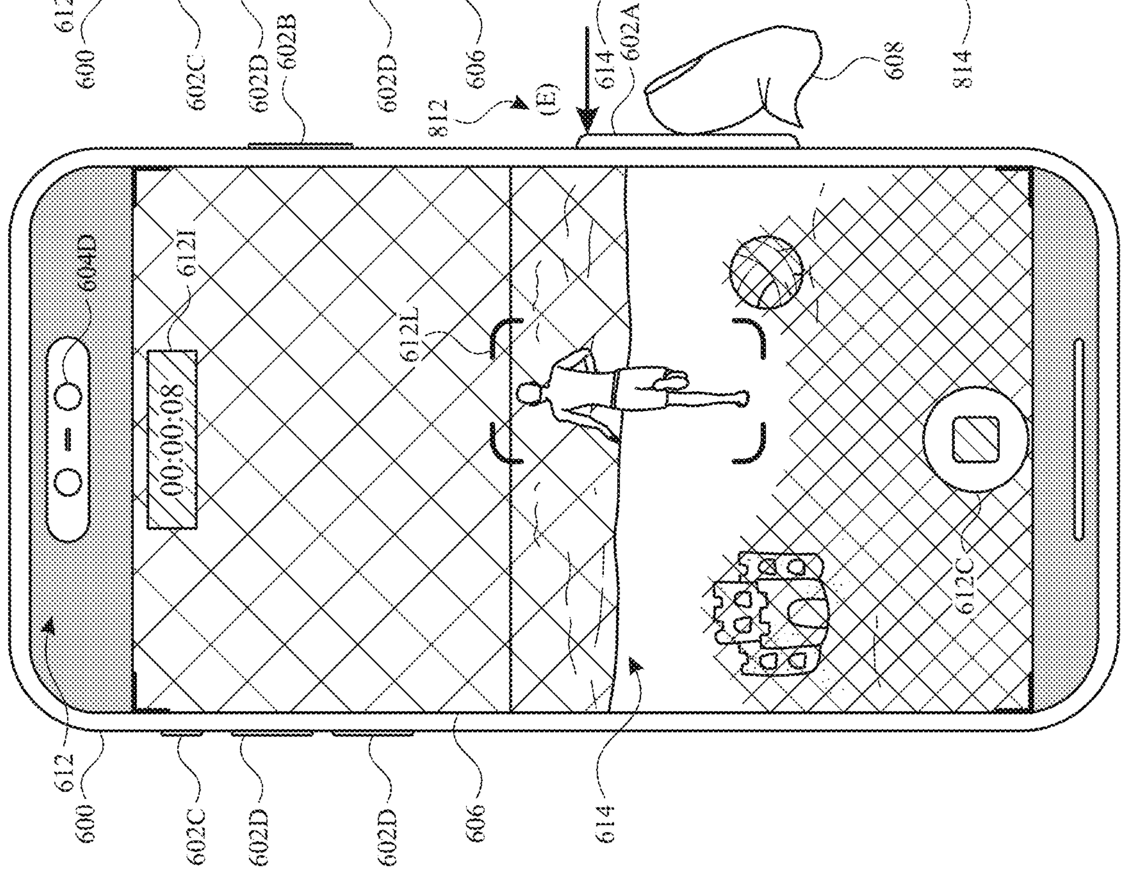

At FIG. 8M, while the ongoing video capture is locked, computer system 600 detects press input 812, a hard/full press of first button 602A. In some embodiments, in response to detecting end 812' of press input 812, at FIG. 8N, computer system 600 captures photo media while continuing the capture of the video media. As illustrated in FIG. 8N, computer system 600 temporarily displays thumbnail 814 of the captured photo media, for example, before fading thumbnail 814 and/or sliding thumbnail 814 off of display 606. As illustrated in thumbnail 814, the captured photo media is displayed with simulated depth-of-field effects applied, e.g., the captured photo media is a portrait photo capture. In some embodiments, computer system 600 captures the photo media in response to detecting end 812' of press input 812 within the first threshold period of time (e.g., in response to a short hard/full press, as described with respect to FIGS. 8A-8B).

Figure 8O:
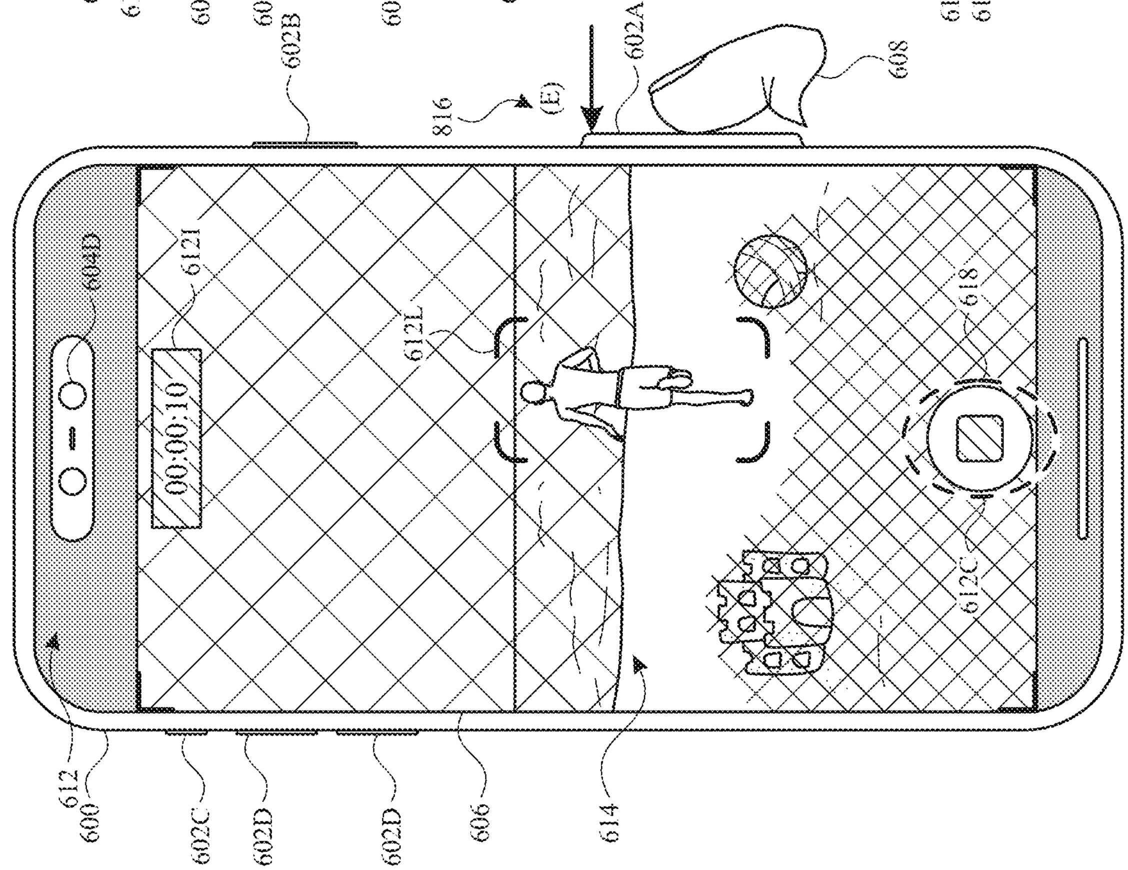

At FIG. 8O, while the ongoing video capture is locked, computer system 600 detects an input requesting to end the video capture, such as press input 816 of first button 602A and/or touch input 818 directed to shutter affordance 612C via the touch-sensitive surface of display 606. In response to detecting press input 816 and/or touch input 818, at FIG. 8P computer system 600 ends the capture of video media, reverting camera user interface 612 to the portrait photo capture mode (e.g., the state camera user interface 612 was in prior to starting the video capture) and updating captured media icon 612D to show a thumbnail of the captured video media. As illustrated in captured media icon 612D, the captured video media is displayed with the cinematic video capture mode simulated depth-of-field effects. In some embodiments, computer system 600 captures the photo media in response to detecting press input 812 end after the first threshold period of time.

FIGS. 9A-9B are a flow diagram illustrating method 900 for controlling a computer system based on variable characteristics of hardware inputs, in accordance with some embodiments. The method is performed at a computer system (e.g., 100, 300, 500, and/or 600) that is in communication with a display generation component (e.g., 606) (e.g., a display controller; a touch-sensitive display system; a display (e.g., integrated and/or connected), a 3D display, a transparent display, a projector, and/or a heads-up display), one or more cameras (e.g., 604A, 604B, 604C, and/or 604D) (e.g., one or more rear (user-facing) cameras and/or one or more forward (environment-facing) cameras), and a first input device (e.g., 602A, 602B, 602C, 602D, and/or a touch sensitive surface of display 606) (e.g., including one or more hardware buttons and/or surfaces, such as mechanical (e.g., physically depressible), solid-state, intensity-sensitive, and/or touch-sensitive (e.g., capacitive) buttons and/or surfaces), e.g., as illustrated in FIGS. 6A-6B. In some embodiments, the one or more cameras include one or more cameras with different lenses/lens types, such as a standard camera, a telephoto camera, and/or a wide-angle camera. In some embodiments, the first input device is included in a plurality of input devices in communication with the computer system. In some embodiments, the computer system is optionally in communication with one or more sensors, such as camera sensors, optical sensors, depth sensors, capacitive sensors, intensity sensors, motion sensors, vibration sensors, and/or audio sensors.

The computer system detects (902), via the first input device (e.g., 602A, 602B, 602C, 602D, and/or a touch sensitive surface of display 606), a first set of one or more inputs directed to the first input device (e.g., 802, 804, 807, 808, 810, 812, 816, and/or other inputs as described with respect to FIGS. 6A-7 and 10A-11B, and/or 14A-15) (e.g., a press, tap, click, swipe, and/or other manipulation of the first input device). In response to detecting the first set of one or more inputs (904) (in some embodiments, a single input; in some embodiments, a single continuous contact with the first input device that includes multiple component inputs, such as a press, followed by movement) and in accordance with a determination that the first set of one or more inputs satisfies a first set of criteria (906), the computer system captures (908), via the one or more cameras, first photo media (e.g., as described with respect to FIGS. 8A-8B and/or 8M-8N) (in some embodiments, the first photo media includes still (e.g., single-frame) photo media. In some embodiments, the first photo media includes photo media with a limited (e.g., 0.5 s, 1 s, 3 s, and/or 5 s) duration, such as a multi-frame capture that includes content (e.g., frames) from before and/or after a capture input is detected, creating a "live" effect. In some embodiments, the first photo media includes one or more images (e.g., frames) that are displayed in sequence, such as a media item that saved in the graphical interface file format. In some embodiments, the first photo media includes spatial media content such as depth information), wherein the first set of criteria includes a first criterion that is satisfied when the first set of one or more inputs includes a press input of a first type (in some embodiments, the press input of the first type is a hard/full press input, e.g., a detected contact that applies at least a threshold intensity and/or depresses a mechanical input device at least a threshold amount. In some embodiments, the press input of the first type is a short press input, where the press is released and/or lifted off within a threshold amount of time (e.g., 0.1 s, 0.6 s, 1 s, or 1.5 s) after initially registering).

In response to detecting the first set of one or more inputs (904) and in accordance with a determination that the first set of one or more inputs satisfies a second set of criteria (910), the computer system captures (912), via the one or more cameras, first video media (e.g., as described with respect to FIGS. 8E-8F and/or 8I-8P) (in some embodiments, the first video media includes spatial media content such as depth information), wherein the second set of criteria includes a second criterion that is satisfied when the first set of one or more inputs includes a press input of a second type different from the first type. In some embodiments, a press input of the second type is a hard/full press input, e.g., a detected contact that applies at least the threshold intensity and/or depresses a mechanical input device at least the threshold amount. In some embodiments, the press input of the second type is a long/held press input, where the threshold intensity is maintained (e.g., continuously and/or without dropping below a respective threshold intensity) for over the threshold amount of time (e.g., 0.1 s, 0.6 s, 1 s, or 1.5 s) after initially registering. In some embodiments, a detected contact is maintained (e.g., continues to register) until the contact intensity falls below the hard/full threshold intensity and/or ceases to depress the mechanical input device to at least the threshold amount. In some embodiments, a detected contact is maintained until the contact intensity falls below a lower threshold intensity than the hard/full threshold and/or ceases to depress the mechanical input device to a less-depressed threshold amount. In some embodiments, in accordance with a determination that the first input includes the second type of press input different from the first type of press input, the computer system discards photo media captured in response to detecting the first input. In some embodiments, both the first set of criteria and the second set of criteria include a criterion that is met when the first set of one or more inputs is detected while displaying a camera user interface for capturing media using the one or more cameras.

At FIG. 9B, while capturing the first video media (914), the computer system detects an end of the first set of one or more inputs (e.g., as described with respect to FIGS. 8G and/or 8L). In some embodiments detecting the end of the first input includes detecting a lift-off of an input element (e.g., a user's finger or a stylus) from the first input device. In some embodiments, detecting the end of the first set of one or more inputs includes detecting the input intensity of the one or more inputs falling below a maintenance threshold intensity and/or ceasing to depress the mechanical input device to at least the threshold amount. In some embodiments, detecting the end of the first set of one or more inputs includes determining that movement of the first set of one or more inputs has not been detected for at least a threshold period of time. In response to detecting the end of the first set of one or more inputs (916) and in accordance with a determination that the first set of one or more inputs included a movement of a first type (918), the computer system continues (920) to capture the first video media after detecting the end of the first set of one or more inputs (e.g., as described with respect to FIGS. 8L-8O) (e.g., if a movement of the first type (e.g., a downwards/leftwards swipe) was detected subsequent to the second type of press input (e.g., a long/held press), the video capture is a persistent capture that continues after the press is released. E.g., a user can lock an initiated video capture using the movement of the first type). In some embodiments, in accordance with a determination that the first input does not include a movement of a first type, the computer system ceases capturing the video media. For example, if a movement of the first type (e.g., a downwards/leftwards swipe) was not detected prior to the release of the press input, the video capture is a temporary capture that stops when the press is released (e.g., as illustrated in FIG. 8G). For example, the user can capture "quick-take" video without locking the initiated video capture with the movement of the first type. In some embodiments, a movement of the first type includes a movement detected after detecting the second type of press input, e.g., the movement of the first type includes a movement detected after the press has been maintained for over the threshold amount of time. In some embodiments, a movement of the first type includes a movement detected prior to detecting the cessation of the first set of one or more inputs. In some embodiments, a movement of the first type includes a movement detected while the first set of one or more inputs includes a detected contact of at least a threshold intensity, e.g., the movement of the first type includes a movement detected while detecting at least the hard/full threshold intensity and/or the maintenance threshold intensity. In some embodiments, a movement of the first type includes a movement component perpendicular to the direction of contact intensity, such as swiping, scrolling, sliding, and/or rotating movements/gestures across, over, and/or around a surface of the first input device. In some embodiments, a movement of the first type includes a movement component of at least a threshold distance/length, e.g., 0.1 mm, 1 mm, 2.5 mm, or 1 cm. In some embodiments, a movement of the first type includes a movement component in a particular direction, e.g., down, up, left, and/or right. In some embodiments, the particular direction is based on the computer system hardware, e.g., away from the location of the cameras and/or towards a respective edge of a device. In some embodiments, the particular direction is based on the orientation of media capture. For example, when capturing in portrait orientation, the first set of one or more inputs includes a movement of the first type if it includes a downwards movement, and when capturing in a landscape orientation, the first set of one or more inputs includes a movement of the first type if it includes a leftwards movement.

Conditionally performing different types of media captures, and in particular, a photo media capture, a persistent video capture, or a temporary video capture, based on input type and input movement, provides improved control of media capture without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, a user can quickly and easily capture a photo, capture video, end video capture, and/or "lock" the capture of video (e.g., switch to a persistent video capture mode) all via the first input device, without the computer system needing to detect additional inputs, wait for the user to navigate between different user interface elements or input devices (e.g., a hardware button and a touch-sensitive display), and/or display additional dedicated user interface elements for controlling the media capture type. Doing so also provides improved ergonomics of computer systems, for example, by expanding the controls available using a particular input device and reducing the need for users to move their hands back and forth between different user interface elements and/or input devices, blocking the user's view or distracting the user from transient media capture opportunities.

In some embodiments, the press input of the first type includes a first input portion (e.g., 802 and/or 812), detected (e.g., via the first input device) at a first time, that has an input intensity that exceeds a first threshold intensity (e.g., as described with respect to FIGS. 8A and/or 8M), and a second input portion (e.g., 802' and/or 812'), detected (e.g., via the first input device) at a second time after the first time, that includes an input intensity that is below the first intensity threshold and is detected while an input element maintains contact with the first input device (e.g., as described with respect to FIGS. 8B and/or 8N). For example, the first threshold intensity corresponds to a press activation threshold (e.g., the intensity at which an input is registered as a press) or a hard/full press threshold. In some embodiments, the first threshold intensity includes a force or pressure threshold, e.g., 75 g/cm$^3$, 100 g/cm$^3$, or 150 g/cm$^3$. In some embodiments, the first threshold intensity includes a threshold mechanical state corresponding to the first threshold intensity, e.g., detecting physical depression of a mechanical button to a "full" press state as a substitute measurement for force/pressure. For example, the computer system captures the first photo media in response to a press and release without fully lifting off of the first input device. For example, the second threshold intensity corresponds to a press release threshold, e.g., the intensity at which the input is no longer registered as a press. In some embodiments, the second threshold intensity includes a force or pressure threshold, e.g., 15 g/cm$^3$, 25 g/cm$^3$, or 36 g/cm$^3$. In some embodiments, the second threshold intensity includes a threshold mechanical state corresponding to the second threshold intensity, e.g., detecting physical depression of a mechanical button as a substitute measurement for force/pressure. In some embodiments, the second time is less than a threshold period of time (e.g., 0.1 s, 0.6 s, 1 s, or 1.5 s) after the first time, e.g., the press input of the first type is a quick press-and-release. Conditionally performing a photo capture in response to a press-and-release input provides improved control of computer system functionality without cluttering the user interface with additional displayed controls. Doing so also assists the user with composing media capture events and reduces the risk that transient media capture opportunities are missed or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, a user can quickly and easily capture a photo via the first input device, without the computer system needing to detect additional inputs, wait for the user to navigate between different user interface elements or input devices (e.g., a hardware button and a touch-sensitive display), and/or display additional dedicated user interface elements for controlling the media capture type. Doing so also provides improved ergonomics of computer systems, for example, by reducing the need for users to move their hands back and forth between different user interface elements and/or input devices, which can block the user's view of or distract the user from transient media capture opportunities.

In some embodiments, the press input of the first type includes a respective press input (e.g., 802 and/or 812) with a respective input intensity that falls below a first threshold intensity (e.g., a release threshold, e.g., 15 g/cm$^3$, 25 g/cm$^3$, or 36 g/cm$^3$ and/or a corresponding mechanical state) within a first threshold period of time (e.g., a "quick" press threshold, e.g., 0.1 s, 0.6 s, 1 s, or 1.5 s) after the respective press input is initially detected (e.g., as described with respect to FIGS. 8B and/or 8N). For example, the computer system captures the first photo media in response to a quick press-and-release, e.g., without a full lift-off. In some embodiments, the computer system initially detects the respective press input when an intensity greater than a threshold intensity (e.g., a press activation threshold or a hard/full press threshold, e.g., 75 g/cm$^3$, 100 g/cm$^3$, or 150 g/cm$^3$ and/or a corresponding mechanical state) is detected. For example, a press input of the first type (e.g., a short press input) can follow a prolonged light/partial press as long as the press is quickly released after transitioning into a hard/full press. Conditionally performing a photo capture in response to a quick press-and-release input provides improved control of computer system functionality without cluttering the user interface with additional displayed controls. Doing so also assists the user with composing media capture events and reduces the risk that transient media capture opportunities are missed or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, a user can quickly and easily capture a photo via a short press of the first input device, without the computer system needing to detect additional inputs, wait for the user to navigate between different user interface elements or input devices (e.g., a hardware button and a touch-sensitive display), and/or display additional dedicated user interface elements for controlling media capture. Doing so also provides improved ergonomics of computer systems, for example, by reducing the need for users to move their hands back and forth between different user interface elements and/or input devices to select and perform a photo media capture, which can block the user's view of or distract the user from transient media capture opportunities.

In some embodiments, the press input of the first type includes a respective press input (e.g., 802 and/or 812) that lifts off of the first input device within a second threshold period of time (e.g., a "quick" press threshold, e.g., 0.1 s, 0.6 s, 1 s, or 1.5 s; in some embodiments, the second threshold period of time is the same as the first threshold period of time) after initially detecting the respective press input (e.g., as described with respect to FIGS. 8B and/or 8N). For example, the computer system captures the first photo media in response to a quick press-and-lift. In some embodiments, the computer system initially detects the respective press input when an intensity greater than a second threshold intensity (e.g., a press activation threshold or a hard/full press threshold, e.g., 75 g/cm$^3$, 100 g/cm$^3$, or 150 g/cm$^3$ and/or a corresponding mechanical state) is detected. In some embodiments, the respective press input of the first set of one or more inputs lifts off of the first input device when the respective press input is no longer detected via one or more sensors of the first input device, e.g., intensity sensors, capacitive sensors, and/or mechanical sensors. Conditionally performing a photo capture in response to a quick press-and-lift input provides improved control of computer system functionality without cluttering the user interface with additional displayed controls. Doing so also assists the user with composing media capture events and reduces the risk that transient media capture opportunities are missed or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, a user can quickly and easily capture a photo via a short press of the first input device, without the computer system needing to detect additional inputs, wait for the user to navigate between different user interface elements or input devices (e.g., a hardware button and a touch-sensitive display), and/or display additional dedicated user interface elements for controlling media capture. Doing so also provides improved ergonomics of computer systems, for example, by reducing the need for users to move their hands back and forth between different user interface elements and/or input devices to select and perform a photo media capture, which can block the user's view of or distract the user from transient media capture opportunities.

In some embodiments, the press input of the second type includes a respective press input (e.g., 804 and/or 808) with a respective input intensity that does not fall below a second threshold intensity (e.g., a release threshold e.g., 25 g/cm$^3$, 36 g/cm$^3$, or 50 g/cm$^3$ and/or a corresponding mechanical state) within a third threshold period of time (e.g., a "held" or "long" press threshold, e.g., 0.1 s, 0.6 s, 1 s, or 1.5 s; in some embodiments, the third threshold period of time is the same as the first threshold period of time and/or the second threshold period of time) after initially detecting the respective press input (e.g., as described with respect to FIGS. 8C-8E and/or 8H-8I). For example, the computer system captures the first video media in response to a long/held press, e.g., a press that is not quickly released and/or lifted off. In some embodiments, the computer system initially detects the respective press input when an intensity greater than a second threshold intensity (e.g., a press activation threshold or a hard/full press threshold, e.g., 75 g/cm$^3$, 100 g/cm$^3$, or 150 g/cm$^3$ and/or a corresponding mechanical state) is detected. For example, a light/partial press is not registered as the second type of press (e.g., a held/long press) even if the light/partial press is held for more than the third threshold period of time. Providing video capture in response to a held/long press input where the video capture ends when the input ends unless a movement of the first type is included in the input provides improved control of computer system functionality without cluttering the user interface with additional displayed controls. Doing so also assists the user with composing media capture events and reduces the risk that transient media capture opportunities are missed or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, a user can quickly and easily capture a video of the desired duration simply by holding a press input to initiate capture and releasing the press input to end capture, reducing the need for users to move their hands back and forth between different user interface elements and/or input devices to select, initiate, and/or end a video media capture, which can block the user's view of or distract the user from transient media capture opportunities.

In some embodiments, the press input of the second type includes a respective press input (e.g., 804 and/or 808) with a respective input intensity that does not fall below a third threshold intensity (e.g., a release threshold, e.g., 25 g/cm$^3$, 36 g/cm$^3$, or 50 g/cm$^3$ and/or a corresponding mechanical state) within a fourth threshold period of time (e.g., a "held" or "long" press threshold, e.g., 0.1 s, 0.6 s, 1 s, or 1.5 s; in some embodiments, the third threshold period of time is the same as the first threshold period of time and/or the second threshold period of time) after initially detecting the respective press input (e.g., as described with respect to FIGS. 8C-8E and/or 8H-8I). For example, the computer system captures the first video media in response to a long/held press, e.g., a press that is not quickly released and/or lifted off. In some embodiments, the computer system initially detects the respective press input when an intensity greater than a second threshold intensity (e.g., a press activation threshold or a hard/full press threshold, e.g., 75 g/cm$^3$, 100 g/cm$^3$, or 150 g/cm$^3$ and/or a corresponding mechanical state) is detected. For example, a light/partial press is not registered as the second type of press (e.g., a held/long press) even if the light/partial press is held for more than the fourth threshold period of time. In some embodiments, the movement of the first type includes a respective movement (e.g., 808A, 808B, and/or 810) (e.g., a swipe, drag, scroll, slide, and/or other gesture) detected (e.g., via the first input device) more than the fourth threshold period of time after initially detecting the respective press input (e.g., as described with respect to FIGS. 8J-8K). For example, the computer system continues to capture the first video media after detecting the end of the first set of one or more inputs if movement is detected after to the respective press input resolves into a held/long press. For example, while capturing video in response to a held/long press of the first input device, the user swipes the first input device to lock the capture. In some embodiments, the respective movement is detected before the input intensity falls below the third threshold intensity and/or before detecting the end of the first set of one or more inputs. Providing persistent video capture in response to a held/long press input with subsequent movement provides improved control of computer system functionality without cluttering the user interface with additional displayed controls. Doing so also assists the user with composing media capture events and reduces the risk that transient media capture opportunities are missed or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, after initiating a video capture with a held/long press of the first input device, the user can easily lock the video capture (e.g., to continue capturing without holding the first input device) via a swipe (e.g., or other movement) of the first input device, without inadvertently ending the video capture.

In some embodiments, the first input device includes a first hardware element (e.g., 602A, 602B, 602C, and/or 602D) (e.g., hardware button or physically differentiated input region). For example, the first hardware element includes at least one hardware button (e.g., mechanical and/or solid-state buttons) that includes a touch-sensitive surface (e.g., touch and/or proximity sensors; e.g., capacitive sensors). In some embodiments, the first hardware element is distinct from a touch-sensitive surface of the display generation component, e.g., a button or touch-sensitive surface separate from a touch-sensitive display. In some embodiments, the movement of the first type includes a movement in a first direction across a first surface of the first hardware element (e.g., 808A and/or 808B) (e.g., hardware button or physically differentiated input region). For example, the movement of the first type (e.g., the movement used to lock the video capture) includes a swipe, drag, and/or other gesture performed on the surface of the first hardware element. In some embodiments, the first surface of the first hardware element is a top surface of the first hardware element, e.g., the surface that the user presses into when pressing the button, e.g., the movement in the first direction is a movement perpendicular to the direction of a press. In some embodiments, the computer system displays an indication of the first direction, e.g., displaying an arrow near the location of the first hardware element pointing in the first direction. In some embodiments, the first direction is defined with respect to the computer system hardware, e.g., a swipe moving in a direction away from the one or more cameras. In some embodiments, the first direction is defined with respect to a current orientation of the device, e.g., downwards while in a portrait orientation and/or to the right while in a landscape orientation. In some embodiments, the movement of the first type does not include a movement in a direction different from the first direction across the first surface of the first hardware element. Conditionally performing temporary or persistent video capture based on whether a movement across a hardware input element is detected provides improved control of media capture without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems, for example, by expanding the controls available using the hardware element (e.g., allowing different mappings for inputs with movements vs. inputs without) and reducing the need for users to move their hands back and forth between different user interface elements and/or input devices, which can block the user's view, distract the user from transient media capture opportunities, or risk accidentally ending a temporary video capture.

In some embodiments, the first input device includes a touch-sensitive surface of the display generation component (e.g., 606). In some embodiments, the movement of the first type includes a movement in a second direction (in some embodiments, the second direction is the same as the first direction, e.g., corresponding movements are used to lock capture via the touch-sensitive surface and the hardware element) across the touch-sensitive surface of the display generation component (e.g., 810). For example, the movement of the first type (e.g., the movement used to lock the video capture) includes a swipe, drag, and/or other gesture performed on the touch-sensitive surface. In some embodiments, the computer system displays an indication of the second direction, e.g., displaying an arrow pointing in the second direction. In some embodiments, the movement in the second direction is directed to the displayed indication on the touch-sensitive surface, e.g., the user swipes or drags across the indication to lock the capture. In some embodiments, the second direction is defined with respect to the computer system hardware, e.g., a swipe moving in a direction away from the one or more cameras. In some embodiments, the second direction is defined with respect to a current orientation of the device, e.g., downwards while in a portrait orientation and/or to the right while in a landscape orientation. In some embodiments, the movement of the first type does not include a movement in a direction different from the second direction across the first touch-sensitive surface. Conditionally performing temporary or persistent video capture based on whether a particular movement across a touch-sensitive surface is detected assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems, for example, by expanding the controls available using the touch-sensitive surface (e.g., allowing different mappings for inputs with movements vs. inputs without).

In some embodiments, while capturing the first video media and prior to detecting the end of the first set of one or more inputs (e.g., as illustrated in FIGS. 8E-8F and/or 8I-8K) (and, In some embodiments, prior to detecting the movement of the first type and/or locking the video capture), the computer system displays, via the display generation component, a graphical indicator (e.g., 806) prompting the movement of the first type. In some embodiments, the graphical indicator indicates a direction and/or a magnitude of the movement of the first type, e.g., an arrow, text, and/or a slider indicating which way and how far the input need to move to lock the video capture. In some embodiments, the graphical indicator includes a selectable graphical user interface object (e.g., a touch control, such as a slider), where a movement of the first type directed to the selectable graphical user interface object via a touch-sensitive surface of the display locks the video capture. In some embodiments, the graphical indicator is displayed near a hardware input element. For example, the computer system displays the graphical indicator at the edge of the display near a hardware button, indicating the direction and distance of movement the user needs to provide via the hardware button to lock the video capture. Displaying an indicator prompting the movement of the first type provides users with real-time feedback about a state of the computer system without cluttering the user interface with additional displayed controls. Doing so also assists the user with composing media capture events and reduces the risk that transient media capture opportunities are missed and/or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the displayed indicator both indicates that the video capture is currently in a temporary state and indicates how to put the video capture into a persistent state.

In some embodiments, the first input device includes a second hardware element (in some embodiments, the second hardware element is the same as the first hardware element) located outside of a display region of the display generation component (e.g., 602A, 602B, 602C, and/or 602D). For example, the second hardware element includes at least one hardware button (e.g., mechanical and/or solid-state buttons) that includes a touch-sensitive surface (e.g., touch and/or proximity sensors; e.g., capacitive sensors). In some embodiments, the second hardware element is located on a side or edge of the computer system outside of the display. In some embodiments, the graphical indicator (e.g., 806) prompting the movement of the first type is displayed proximate to the second hardware element within the display region of the display generation component (e.g., as illustrated in FIGS. 8E-8F and/or 8I-8K). For example, the computer system displays graphical indicator at the edge of the display closest to the second hardware element. Displaying an indicator prompting the movement of the first type near a hardware input device that can be used to detect the movement of the first type provides users with real-time feedback about a state of the computer system without cluttering the user interface with additional displayed controls. Doing so also assists the user with composing media capture events and reduces the risk that transient media capture opportunities are missed and/or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the displayed indicator both indicates that the video capture is currently in a temporary state and indicates how to put the video capture into a persistent state using the hardware input device, including indicating to the user that video capture can be locked without moving their finger from the hardware input device.

In some embodiments, the graphical indicator prompting the movement of the first type includes a first indication of a respective direction of the movement of the first type (e.g., as illustrated in FIGS. 8E-8F and/or 8I-8K). For example, the graphical indicator includes an arrow, text, and/or a slider element showing the direction of movement needed to lock the video capture. Displaying an indicator prompting movement in a respective direction provides users with real-time feedback about a state of the computer system without cluttering the user interface with additional displayed controls. Doing so also assists the user with composing media capture events and reduces the risk that transient media capture opportunities are missed and/or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the displayed indicator both indicates that the video capture is currently in a temporary state and indicates how to put the video capture into a persistent state.

In some embodiments, movement of at least a first threshold magnitude is required to continuing to capture the first video media after detecting the end of the first set of one or more inputs (e.g., as described with respect to FIGS. 8J-8K) (e.g., a threshold overall distance moved in a respective direction). In some embodiments, the first distance is a predetermined distance, e.g., a swipe or drag of at least half the length of the hardware button is used to lock video capture. In some embodiments, the first distance is a dynamic distance, e.g., a swipe or drag from the initial contact position to or past a terminus, such as the edge of the hardware button or the graphical indication, is used to lock video capture. In some embodiments, while displaying the graphical indicator prompting the movement of the first type, the computer system detects a first movement input of the first set of one or more inputs, wherein the first movement input is a movement of a second magnitude that is less than the first threshold magnitude (e.g., 804, 807, and/or 808A) (e.g., a second distance moved along an axis of the respective direction). In some embodiments, the second magnitude is a negative magnitude, e.g., the first movement input moves opposite the respective direction. In some embodiments, in response to detecting the first movement input of the first set of one or more inputs, the computer system updates the graphical indicator (e.g., 806) prompting the movement of the first type to indicate how much additional movement is needed to get to the first threshold magnitude of movement (e.g., as illustrated in FIGS. 8F and/or 8J). For example, the computer system updates the graphical indicator to show progress towards the threshold to lock the video capture. For example, the computer system displays a slider with a track/path of a length corresponding to the first magnitude, that moves to track input movement along the axis of the respective direction, moving the slider closer to a "goal" end of the track in response to movement in the respective direction and moving the slider away from the goal end of the track in response to movement opposite the respective direction. In some embodiments, updating the graphical indicator includes changing an appearance of the graphical indicator based on how much additional movement is needed to get to the first threshold magnitude of movement. For example, in accordance with a determination that a particular amount of additional movement is still needed, the computer system may display the graphical indicator with a first appearance, and in accordance with a determination that a different amount of additional movement is still needed, the computer system may display the graphical indicator with a second, different appearance. For example, for a graphical indicator including a lock icon that moves along with the input movement, the computer system may display the lock icon growing, shrinking, changing in opacity, changing in color, and/or morphing into a different shape as it moves closer to the lock threshold. Displaying an indicator that updates to indicate how much movement is still required to lock video capture provides users with real-time feedback about a state of the computer system without cluttering the user interface with additional displayed controls. Doing so also assists the user with composing media capture events and reduces the risk that transient media capture opportunities are missed and/or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, updating the displayed indicator both indicates that the video capture remains in a temporary state and indicates how to put the video capture into a persistent state.

In some embodiments, while displaying the graphical indicator prompting the movement of the first type, the computer system detects a second movement input (in some embodiments, the second movement input is the same as the first movement input) of the first set of one or more inputs (e.g., 804, 807, 808A, 808B, and/or 810), and, in response to detecting the second movement input and in accordance with a determination that the second movement input includes movement of at least the first threshold magnitude (e.g., the movement needed to lock the video capture), the computer system ceases displaying the graphical indicator (e.g., as described with respect to FIG. 8L). For example, when the input has moved at least a threshold distance in a respective direction (e.g., as indicated by the graphical indicator), the graphical indicator disappears, indicating that the video capture has been placed in a persistent capture state. Ceasing displaying an indicator prompting the first type of movement after the first type movement has been detected provides users with real-time feedback about a state of the computer system without cluttering the user interface with additional displayed controls. Doing so also assists the user with composing media capture events and reduces the risk that transient media capture opportunities are missed and/or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, ceasing displaying the indicator indicates that the provided inputs have placed the video capture into a persistent state and thus that the user can end the set of one or more inputs (e.g., stopping movement and/or lifting off) without ending the video capture.

In some embodiments, the press input of the second type includes a press input (e.g., 804 and/or 808) (in some embodiments, of at least a first threshold intensity, e.g., a hard/full press threshold; e.g., 100 $g/cm^3$, 150 $g/cm^3$, or 200 $g/cm^3$) maintained (e.g., held continuously and/or without dropping below a maintenance threshold intensity, e.g., 90 $g/cm^3$, 140 $g/cm^3$, or 190 $g/cm^3$) for at least a first threshold period of time (e.g., as described with respect to FIGS. 8E and/or 8I) (e.g., 0.1 s, 0.6 s, 1 s, or 1.5 s). In some embodiments, at a first time prior to capturing the first video media, the computer system detects (e.g., initially detecting) a first press input (in some embodiments, of at least the first threshold intensity) of the first set of one or more inputs (e.g., 804 and/or 808), and, while detecting the first press input (e.g., while the first press input is maintained, e.g., with at least the second and/or first threshold intensity) and less than the first threshold period of time after the first time (e.g., before the first input qualifies as a press input of the second type; e.g., before capturing the first video media), the computer system changes an appearance of a media capture user interface (e.g., 612) (e.g., a camera UI) from a first appearance state (e.g., an initial state; in some embodiments, a photo capture mode appearance of the media capture user interface, e.g., for a standard or portrait photo capture mode) to a second appearance state (e.g., as described with respect to FIG. 8D) (e.g., an intermediate appearance between the initial appearance and a video capture mode appearance of the media capture user interface, e.g., for a standard or cinematic video capture mode). In some embodiments, the computer system gradually transitions the appearance of the capture user interface between the first appearance state and a third appearance state (e.g., a video capture mode appearance) as the first press input is held. In some embodiments, after the first press input is held for at least the first threshold period of time, the computer system changes the appearance of the media capture user interface from the second appearance state to the third appearance state, e.g., completing the transition to the video capture mode appearance. Changing the appearance of a media capture interface as a press input is held provides users with real-time feedback about a state of the computer system without cluttering the user interface with additional displayed controls, and additionally reduces latency in transitioning the media capture user interface between photo and video capture modes. Doing so also assists the user with composing media capture events and reduces the risk that transient media capture opportunities are missed and/or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, beginning to change the appearance of the media capture user interface from a photo capture appearance to a video capture appearance while a press input is being held indicates that continuing to hold the input will initiate a video capture.

In some embodiments, while displaying the media capture user interface in the second appearance state (e.g., as described with respect to FIG. 8D) (in some embodiments, less than the first threshold period of time after the first time, In some embodiments, before beginning to capture the first video media), the computer system detects an end of the first press input. In some embodiments, detecting the end of the first press input includes detecting that an intensity of the first press input has fallen below a maintenance threshold intensity, e.g., the first press is no longer a full/hard press. In some embodiments, detecting the end of the first press input includes detecting that the first press input has lifted off of the first input device. In some embodiments, in response to detecting the end of the first press input, the computer system changes the appearance of the media capture user interface from the second appearance state to the first appearance state (e.g., as described with respect to FIG. 8A). For example, if the press input ends before the first threshold period of time/before capturing the first video media is initiated, the computer system reverts the changes made to the camera UI while the press input was being maintained, e.g., returning the appearance of the camera UI to the photo capture mode appearance. Reverting changes the appearance of a media capture interface when a press input is released before initiating video capture provides users with real-time feedback about a state of the computer system without cluttering the user interface with additional displayed controls. Doing so also assists the user with composing media capture events and reduces the risk that transient media capture opportunities are missed and/or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, reverting changes the appearance of the media capture user interface back to a photo capture appearance indicates when the press input is no longer qualifying to initiate a video capture.

In some embodiments, changing the appearance of the media capture user interface from the first appearance state to the second appearance state includes displaying (e.g., animating) a capture mode selection user interface element (e.g., 612A) of the media capture user interface (e.g., a capture mode menu, slider, and/or other affordance) transitioning from a photo capture mode to a video capture mode (e.g., as described with respect to FIG. 8D). For example, the computer system animates the capture mode selection user interface element moving from a photo capture mode menu item to a video capture mode menu item, e.g., shifting the menu, reducing the visual emphasis of a photo capture mode menu item, and/or increasing the visual emphasis of a video capture mode menu item. Changing the appearance of a capture mode selection element as a press input is held provides users with real-time feedback about a state of the computer system without cluttering the user interface with additional displayed controls, and additionally reduces latency in transitioning the media capture user interface between photo and video capture modes. Doing so also assists the user with composing media capture events and reduces the risk that transient media capture opportunities are missed and/or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, showing the capture mode selection transitioning between photo capture and video capture while a press input is being held indicates that continuing to hold the input will initiate a video capture.

In some embodiments, changing the appearance of the media capture user interface from the first appearance state to the second appearance state includes displaying (e.g., animating) a media capture user interface element (e.g., 612C) of the media capture user interface (e.g., a software button that can be selected to initiate and/or end media capture) changing (e.g., morphing) from a photo capture user interface element to a video capture user interface element (e.g., as described with respect to FIG. 8D). For example, the computer system animates a software capture button morphing from a photo capture shutter button (e.g., an affordance that can be selected to capture photo media) into a video recording button (e.g., an affordance that can be selected to stop capturing the first video media). Changing the appearance of a media capture affordance as a press input is held provides users with real-time feedback about a state of the computer system without cluttering the user interface with additional displayed controls, and additionally reduces latency in transitioning the media capture user interface between photo and video capture modes. Doing so also assists the user with composing media capture events and reduces the risk that transient media capture opportunities are missed and/or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, showing the media capture affordance morphing from a photo capture button into a video recording button while a press input is being held indicates that continuing to hold the input will initiate a video capture.

In some embodiments, changing the appearance of the media capture user interface from the first appearance state to the second appearance state includes displaying an aspect ratio of a media capture preview (e.g., 614) of the media capture user interface (e.g., a camera viewfinder region including the portion of the current field-of-view of the one or more captures that will be included in a media capture) changing (e.g., growing and/or shrinking in one or more dimensions) from a first aspect ratio (e.g., a photo capture aspect ratio, e.g., 4:3, 1:1, and/or 16:9) to a second aspect ratio (e.g., as described with respect to FIG. 8D) (e.g., a video capture aspect ratio, e.g., 16:9, 4:3, and/or 1:1). Changing the aspect ratio of a media capture preview as a press input is held provides users with real-time feedback about a state of the computer system without cluttering the user interface with additional displayed controls, and additionally reduces latency in transitioning the media capture user interface between photo and video capture modes. Doing so also assists the user with composing media capture events and reduces the risk that transient media capture opportunities are missed and/or captured with unintended settings, which enhances the operability and ergonomics of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, beginning to change the aspect ratio of the camera preview while a press input is being held both indicates that continuing to hold the input will initiate a video capture and previews the framing (e.g., the aspect ratio and what is included within the frame from the field-of-view of the one or more cameras) of the video capture that will be initiated, allowing the user to adjust framing as desired before the video capture begins.

In some embodiments, in accordance with a determination that the first set of one or more inputs is detected while a first photo media capture mode is selected (e.g., as described with respect to FIGS. 8A and/or 8C), capturing the first photo media includes capturing the first photo media in the first photo media capture mode (e.g., as described with respect to FIGS. 8A-8B), and capturing the first video media includes capturing the first video media in a first video media capture mode (e.g., as described with respect to FIGS. 8E-8F). In some embodiments, the first video media capture mode corresponds to the first photo media capture mode, e.g., the first photo media capture mode is a standard photo mode, without applied simulated depth-of-field effects, and the video media capture mode is a standard video mode, also without applied simulated depth-of-field effects. In some embodiments, in accordance with a determination that the first set of one or more inputs is detected while a second photo media capture mode, different from the first photo media capture mode, is selected (e.g., as described with respect to FIG. 8H), capturing the first photo media includes capturing the first photo media in the second photo media capture mode (e.g., as described with respect to FIGS. 8M-8N), and capturing the first video media includes capturing the first video media in a second video media capture mode, different from the first video media capture mode (e.g., as described with respect to FIGS. 8J-8O). In some embodiments, the second video media capture mode corresponds to the second photo media capture mode, e.g., the second photo media capture mode is a portrait photo mode, with applied simulated depth-of-field effects, and the second video media capture mode is a cinematic video capture, also with applied simulated depth-of-field effects. In some embodiments, capturing media (photo or video) with simulated depth-of-field effects includes capturing depth information. In some embodiments, after capturing media (photo or video) with simulated depth-of-field effects, the simulated depth-of-field effects can be enabled, disabled, and/or adjusted (e.g., to change which regions/subjects in the media appear in focus). Conditionally performing different types of video captures in response to the second type of press input based on the current photo capture mode when the second type of press input is detected provides improved control of media capture without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, performing different types of video captures based on the current photo capture mode increases the range of functionality available via the first input device/the second type of press input and reduces the number of inputs needed to change capture mode (e.g., the user only needs to change between photo capture modes, and does not need to also change between video capture modes).

In some embodiments, capturing the first photo media in the first photo media capture mode includes capturing the first photo media with a set of one or more standard photo settings (e.g., as described with respect to FIGS. 8A-8B) (e.g., a standard resolution, a standard aspect ratio, and/or without applying simulated capture effects, such as simulated depth-of-field effects and/or simulated lighting effects), and capturing the first video media in the first video media capture mode includes capturing the first video media with a set of one or more standard video settings (e.g., as described with respect to FIGS. 8E-8F) (e.g., a standard resolution, a standard aspect ratio, a standard frame rate, and/or without applying simulated capture effects). In some embodiments, the set of one or more standard photo settings and the set of one or more standard video settings have one or more overlapping (e.g., shared) and/or corresponding settings, e.g., both capture without applying simulated capture effects. Performing a standard video capture in response to the second type of press input when in a standard photo capture mode provides improved control of media capture and improved feedback on a state of the computer system without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, while enabling the user to switch between corresponding standard photo capture and standard video capture using different types of press inputs, the computer system provides a zero-latency preview of capture settings shared between the standard photo capture mode and standard video capture.

In some embodiments, capturing the first photo media in the second photo media capture mode includes capturing the first photo media with a set of one or more portrait photo settings, wherein the set of one or more portrait photo settings includes applying simulated depth-of-field to the first photo media (e.g., as described with respect to FIGS. 8M-8N), and capturing the first video media in the second video media capture mode includes capturing the first video media with a set of one or more cinematic video settings, wherein the set of one or more portrait video settings includes applying the simulated depth-of-field effects to the first video media (e.g., as described with respect to FIGS. 8J-8O). In some embodiments, applying the simulated depth-of-field effects includes simulating capture with a particular focal length (f-stop) by selectively blurring portions of a media capture that would not be in focus (e.g., would be outside of the depth-of-field) when captured using a lens with the particular focal length. In some embodiments, while the second photo media capture mode is selected and/or while capturing the first video media in the second video media capture mode, the computer system applies the simulated depth-of-field effects to a preview of the media capture (e.g., a camera viewfinder displaying at least a portion of the field-of-view of the one or more cameras). In some embodiments, the set of one or more cinematic video settings includes one or more settings differing from the one or more standard video settings, such as a higher resolution and/or a higher frame rate. Performing a cinematic video capture in response to the second type of press input when in a portrait photo capture mode provides improved control of media capture and improved feedback on a state of the computer system without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, while enabling the user to switch between corresponding portrait photo capture and cinematic video capture using different types of press inputs, the computer system also provides a zero-latency preview of the simulated depth-of-field effects shared between the corresponding photo and video modes.

In some embodiments, the computer system detects, via the first input device, a second set of one or more inputs directed to the first input device, and in response to detecting the second set of one or more inputs and in accordance with a determination that the second set of one or more inputs satisfies a set of launch criteria, displaying, via the display generation component, a respective camera user interface (e.g., 612 and/or 1046) (in some embodiments, launching (e.g., opening and/or displaying) a camera application or user interface; in some embodiments, a camera application/UI included in a set of available camera user interfaces; in some embodiments, a default camera application/UI), wherein the set of launch criteria includes a criterion that is satisfied when a first input element is activated (in some embodiments, the first input element is activated based on an input intensity exceeding a particular intensity threshold) while the computer system is not displaying, via the display generation component, a camera user interface (e.g., as described with respect to FIGS. 6D-6E and/or 10A-10B) (e.g., a user interface for media capture, such as a camera application or a social media application with camera functionality; in some embodiments, any camera user interface included in a set of available camera user interfaces). In some embodiments, the first set of criteria and the second set of criteria both include a criterion that is met when a camera user interface is displayed when detecting the press input. For example, while the camera user interface is not open or displayed, the computer system launches the camera user interface in response to press inputs, and while the camera user interface is displayed, the computer system captures media (e.g., photo or video media) in response press inputs. For example, the computer system displays, surfaces, and/or launches a camera interface in response to press inputs detected while the camera interface is not already displayed, active, and/or running. In some embodiments, the computer system will open a particular camera application if the particular camera application is not already open. In some embodiments, the computer system will open the particular camera application unless any camera application is already open. In some embodiments, the set of launch criteria includes a criterion that is satisfied when the first input element is activated while the computer system is displaying a non-camera user interface (e.g., a home screen, a lock screen, a UI for an application that does not include a camera UI, and/or a non-camera UI for an application that does include a camera UI). Launching a camera user interface in response to press inputs detected while the camera user interface is not displayed provides improved control of media capture without cluttering the user interface with additional displayed controls. Doing so also assists the user with composing media capture events and reduces the risk that transient media capture opportunities are missed, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the user can launch the camera user interface then quickly capture media in the camera user interface via press inputs of the first input device, without needing to move their hands and/or change input mode.

In some embodiments, while capturing the first video media, the computer system detects, via the first input device, a first movement input of the first set of one or more inputs, wherein the first movement input is a movement of the first type (e.g., 808A and 808B) (e.g., the first movement input locks the ongoing video capture, e.g., making the video capture a persistent video capture), and, after detecting the first movement input of the first set of one or more inputs (e.g., while the video capture is locked/persistent), the computer system detects, via the first input device, a first press input (e.g., 812) (in some embodiments, a full/hard press); in some embodiments, the first press input is detected after the end of the first set of one or more inputs. In some embodiments, the first press input is a full/hard press followed by a lift-off from the first input device. In some embodiments, the first press input is a full/hard press without subsequent lift-off from the first input device. In some embodiments, in response to detecting the first press input (in some embodiments, and in accordance with a determination that the first press input satisfies capture criteria), the computer system captures, via the one or more cameras, second photo media (e.g., as described with respect to FIGS. 8M-8N). Capturing photo media in response to press inputs detected while capturing video in a persistent capture mode provides improved control of media capture without cluttering the user interface with additional displayed controls. Doing so also assists the user with composing media capture events and reduces the risk that transient media capture opportunities are missed, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, via press and movement inputs on the first input device, the user can initiate and lock the video capture, then quickly capture photo media during the video capture, without needing to move their hands and/or change input mode.

In some embodiments, while capturing the first video media, the computer system detects, via the first input device, a second movement input of the first set of one or more inputs, wherein the second movement input is a movement of the first type (e.g., 808A and 808B) (e.g., the first movement input locks the ongoing video capture, e.g., making the video capture a persistent video capture), and, after detecting the second movement input of the first set of one or more inputs (e.g., while the video capture is locked/persistent), the computer system detects, via the first input device, a second press input (e.g., 816) (in some embodiments, a full/hard press). In some embodiments, the first press input is detected after the end of the first set of one or more inputs. In some embodiments, the first press input is a full/hard press followed by a lift-off from the first input device. In some embodiments, the first press input is a full/hard press without subsequent lift-off from the first input device. In some embodiments, in response to detecting the second press input (in some embodiments, and in accordance with a determination that the first press input satisfies video control criteria), the computer system ceases capturing the first video media (e.g., as described with respect to FIGS. 8O-8P). Stopping a persistent video capture in response to press inputs detected after locking the video capture provides improved control of media capture without cluttering the user interface with additional displayed controls. Doing so also assists the user with composing media capture events and reduces the risk that transient media capture opportunities are missed, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, via press and movement inputs on the first input device, the user can initiate, lock, and stop the video capture without needing to move their hands and/or change input mode.

Note that details of the processes described above with respect to method 900 (e.g., FIGS. 9A-9B) are also applicable in an analogous manner to the methods described above and below. For example, media capture controls based on variable characteristics of hardware inputs as described with respect to method 900 can be used along with the controls described with respect to method 700, the customizable functions as described with respect to method 1100, and/or the settings adjustments described with respect to method 1500, and may be used to capture media for playback as described with respect to method 1300. For brevity, these details are not repeated below.

FIGS. 10A-10U illustrate example techniques and systems for customizing and controlling operations of a computer system using hardware inputs in accordance with some embodiments. For example, FIGS. 10A-10U illustrate using a swipe input to open a menu for selecting between a zoom function, an exposure function, and a synthetic depth-of-field function to associate with the hardware button, where the computer system adjusts the function currently associated with the hardware button in response to inputs via the hardware button, e.g., as described with respect to FIGS. 6A-6AI.

Figure 10B:
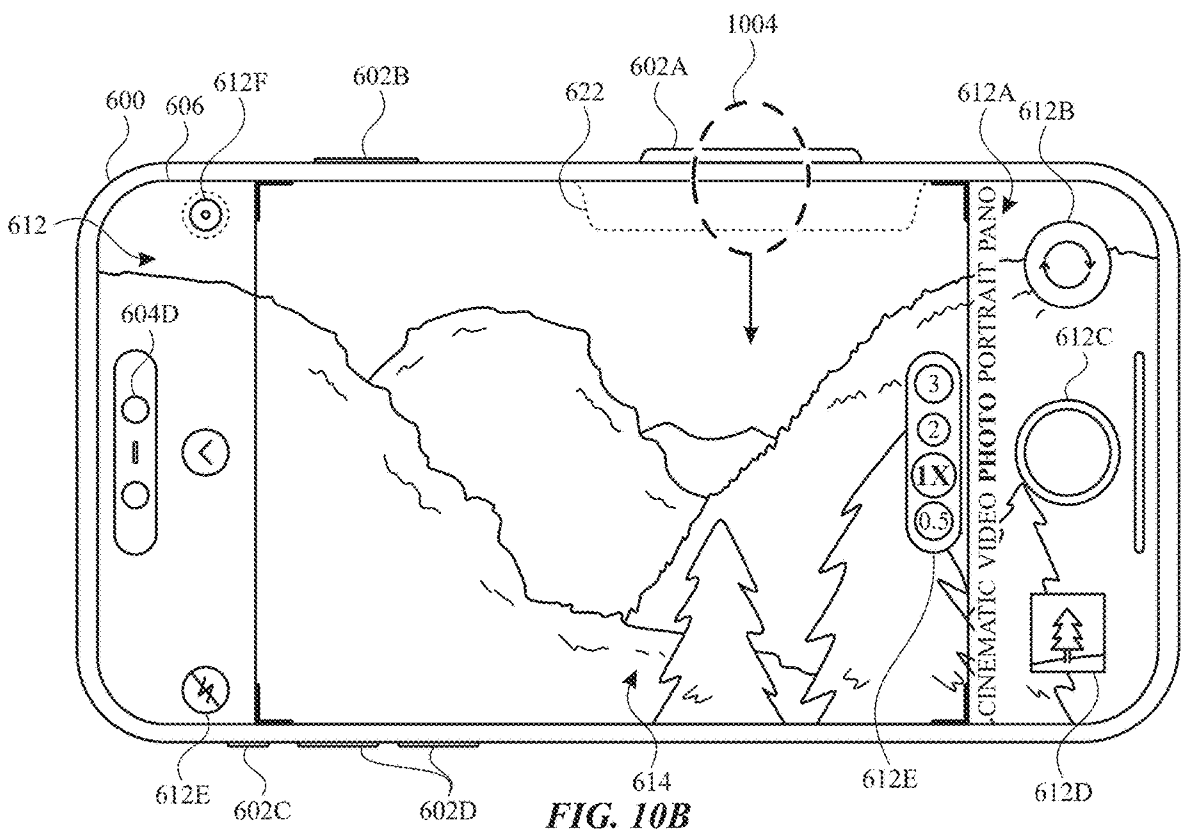

FIGS. 10A-10B illustrate using a press of first button 602A to launch a camera user interface from a non-camera context, as also discussed with respect to FIGS. 6D-6E. As illustrated in FIG. 10A, computer system 600 displays user interface 610 for a media player application. Although user interface 610 includes a displayed representation of media (e.g., a television show), user interface 610 for the media player application is not a media capture user interface, e.g., a camera utility or application for capturing media content with the set of cameras and/or other sensors of computer system 600. Accordingly, while displaying user interface 610 for a media player application, computer system detects input 1002, a press input of first button 602A, and in response, at FIG. 10B, computer system launches camera user interface 612, which is a media capture user interface for a first-party camera application of computer system 600. In some embodiments, input 1002 is a particular type of input, such as a hard/full press placing first button 602A into hardware button state (E) or a light/partial press placing first button 602A into hardware button state (D).

In some embodiments, camera user interface 612 is associated with first button 602A when input 1002 is detected. For example, camera user interface 612 may be associated with first button 602A by default, or a user may select to associate camera user interface 612 with first button 602A via the settings of computer system 600 in order to launch camera user interface 612 in response to presses of first button 602A while a media capture user interface is not being displayed. In some embodiments, camera user interface 612 is one of a plurality of media capture user interfaces that can be associated with first button 602A, and the user may select a different camera user interface, such as camera user interface 612 described below, to launch in response to presses of first button 602A while a media capture user interface is not being displayed.

As illustrated in FIG. 10B, while displaying camera user interface 612 and, in some embodiments, while displaying settings control 622 for controlling a setting of camera user interface 612 (e.g., as described with respect to FIGS. 6E-6AM, above), computer system 600 detects input 1004 via the touch-sensitive surface of display 606. Input 1004 is a gesture originating near the location of first button 602A (e.g., off, at, or near the edge of display 606 adjacent to first button 602A) and moving substantially towards the center of display 606, e.g., swiping inwards from first button 602A. In some embodiments, input 1004 is a swipe inwards across settings control 622. As described in further detail with respect to FIGS. 18J-18K, in some embodiments, in response to detecting a contact on first button 602A (e.g., finger 608 resting on the surface of first button 602A without pressing down and/or moving more than a threshold amount) that lasts for at least a threshold duration (e.g., 0.1, 0.2, 0.25, 0.5, 1, 3, or 5 s), system 600 displays an indicator near first button 602A to indicate that a swipe input, such as input 1004, can be used to display customization menu 1006 as described below.

Figure 10C:
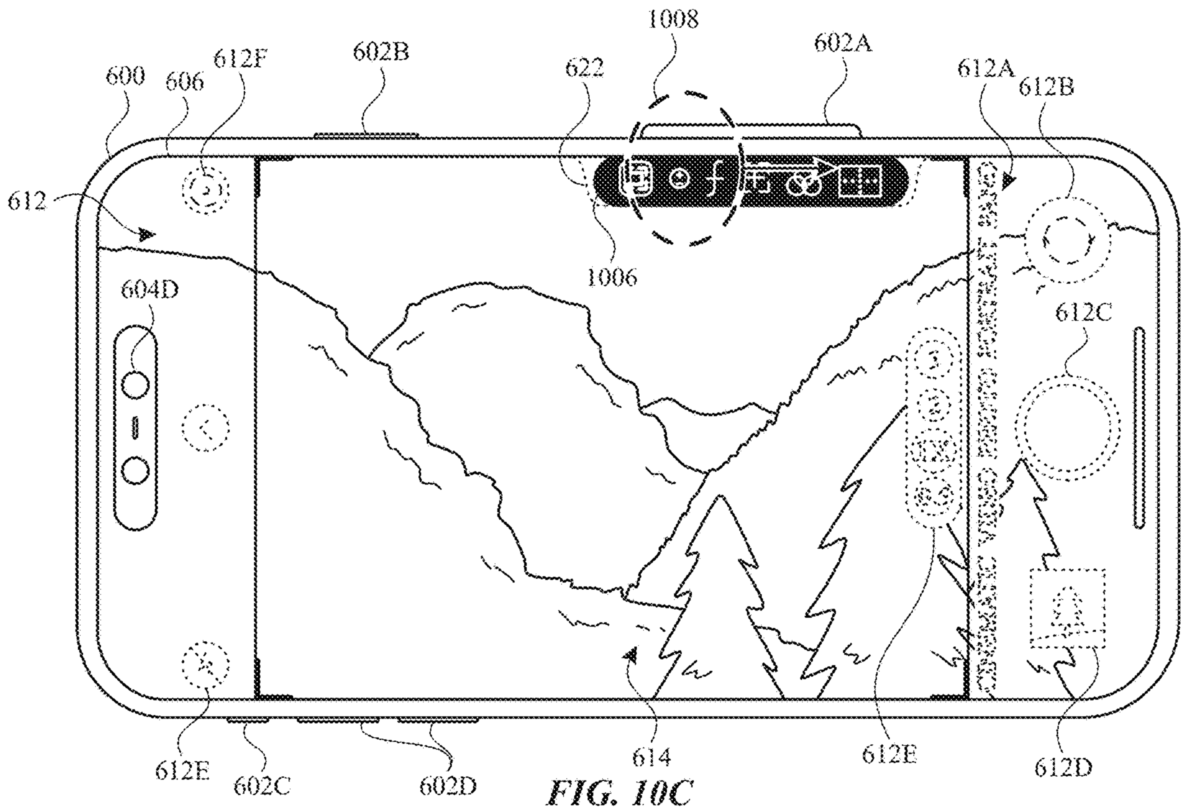

In response to detecting input 1004, at FIG. 10C, computer system 600 displays customization menu 1006. Customization menu 1006 provides options of operations that can be associated with first button 602A in camera user interface 612 to control using first button 602A and/or settings control 622 as described above with respect to FIGS. 6E-6AM. As illustrated in FIG. 10C, customization menu 1006 is displayed as a cut-out (e.g., a platter or tab) from camera user interface 612 (e.g., blocking out a portion of camera user interface 612 and/or overlaying settings control 622) adjacent to first button 602A, which includes menu items with icons corresponding to the operations available to associate with first button 602A. In some embodiments (e.g., as illustrated in FIGS. 18L-18M), customization menu 1006 is displayed with an appearance that simulates a curved, rotatable dial, such as described with respect to FIG. 6J1. For example, computer system 600 gradually blurs, darkens, fades, and/or distorts the icons at the edges of customization menu 1006 to create the appearance of a three-dimensional curve.

In particular, going from left to right, the icons correspond to a zoom setting (e.g., as described with respect to FIGS.

6J-6AD), an exposure setting (e.g., for controlling an exposure length of capture and/or a brightness level), a simulated depth-of-field setting (e.g., as described with respect to FIGS. 6AE-6AF), a focus setting (e.g., as described with respect to FIGS. 6AG-6AH), a filter setting (e.g., as described with respect to FIGS. 6AI-6AK), and a capture guidance setting (e.g., for controlling guidance elements such as a capture grid and/or level indicator). In some embodiments, customization menu 1006 includes an option for a camera selection setting, as described in further detail with respect to FIGS. 18A-18T. As further described with respect to FIG. 10T1, in some embodiments, the set of options provided in customization menu 1006 depends on the application and/or user interface in which customization menu 1006 is opened. For example, opening customization menu 1006 in camera user interface 612 provides the options illustrated in FIG. 10C, and opening customization menu 1006 in a different user interface (e.g., a home screen, a lock screen, a different application, and/or a different camera user interface) provides more, fewer, and/or different options than illustrated in FIG. 10C. While displaying customization menu 1006, computer system 600 deemphasizes (e.g., increases transparency of and/or grays out) other elements of camera user interface 612, including settings control 622.

Figure 10D:
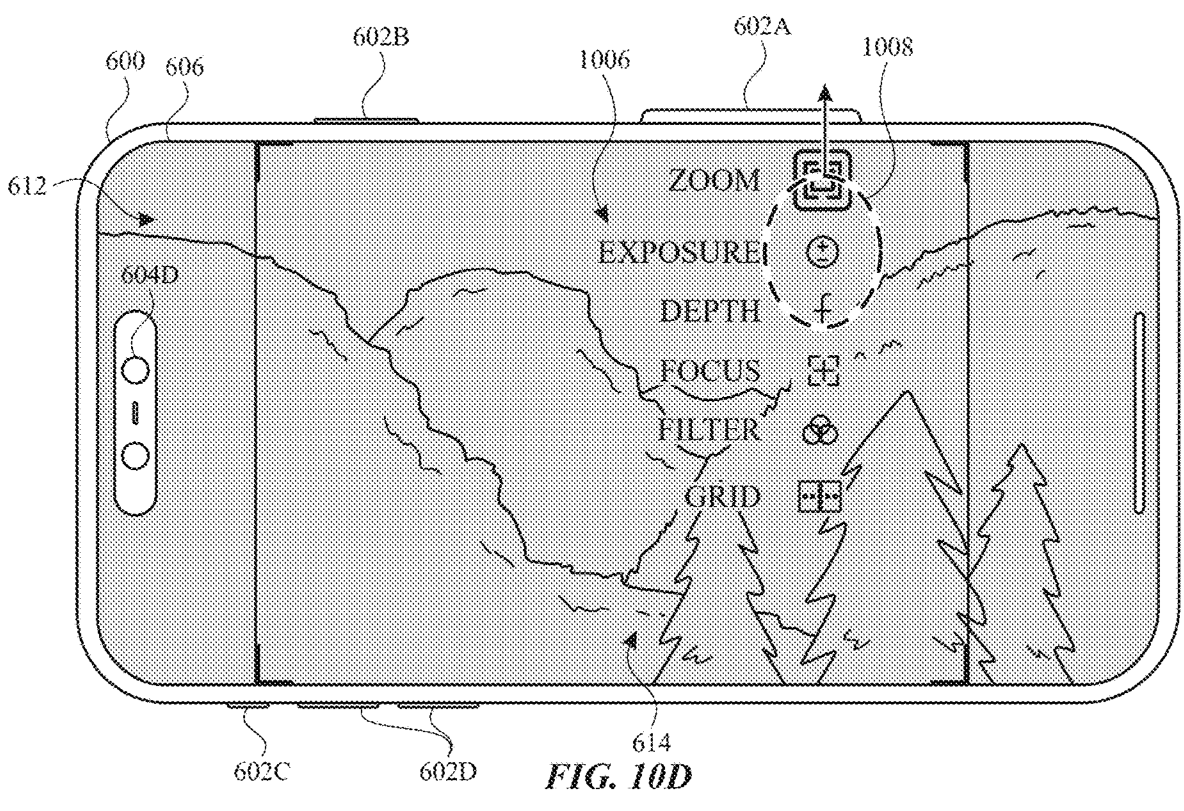

Alternatively, as illustrated in FIG. 10D, customization menu 1006 is displayed as a pull-out menu emerging from first button 602A, including menu items with icons and text corresponding to the available operations, and a full-screen overlay dimming out camera user interface 612 behind the menu items while displaying customization menu 1006. As illustrated in both FIGS. 10C and 10D, when input 1004 is detected, the zoom setting of camera user interface 612 is associated with first button 602A, indicated by the icon corresponding to the zoom setting being emphasized (e.g., highlighted, framed, and/or otherwise increased in prominence) compared to the other icons or menu items in customization menu 1006.

While displaying customization menu 1006, computer system 600 detects input 1008 directed to customization menu 1006 via the touch-sensitive surface of display 606. Input 1008 selects the menu item corresponding to the exposure setting of camera user interface 612 to associate the exposure setting with first button 602A. For example, input 1008 may include a tap, touch, or press directed to the location of menu item within customization menu 1006, and/or a movement input (e.g., a swipe or flick) across customization menu 1006 to scroll or drag the exposure menu item into a "selected" position (e.g., at the top or center of customization menu 1006) and/or drag the highlighting/selection frame from the zoom menu item onto the exposure menu item. In some embodiments, input 1008 may include inputs provided via first button 602A, such as swipes, flicks, taps, or presses on the surface of first button 602A. For example, repeated light/partial presses of first button 602A cycle through selecting each of the options in customization menu 1006.

Figure 10E:
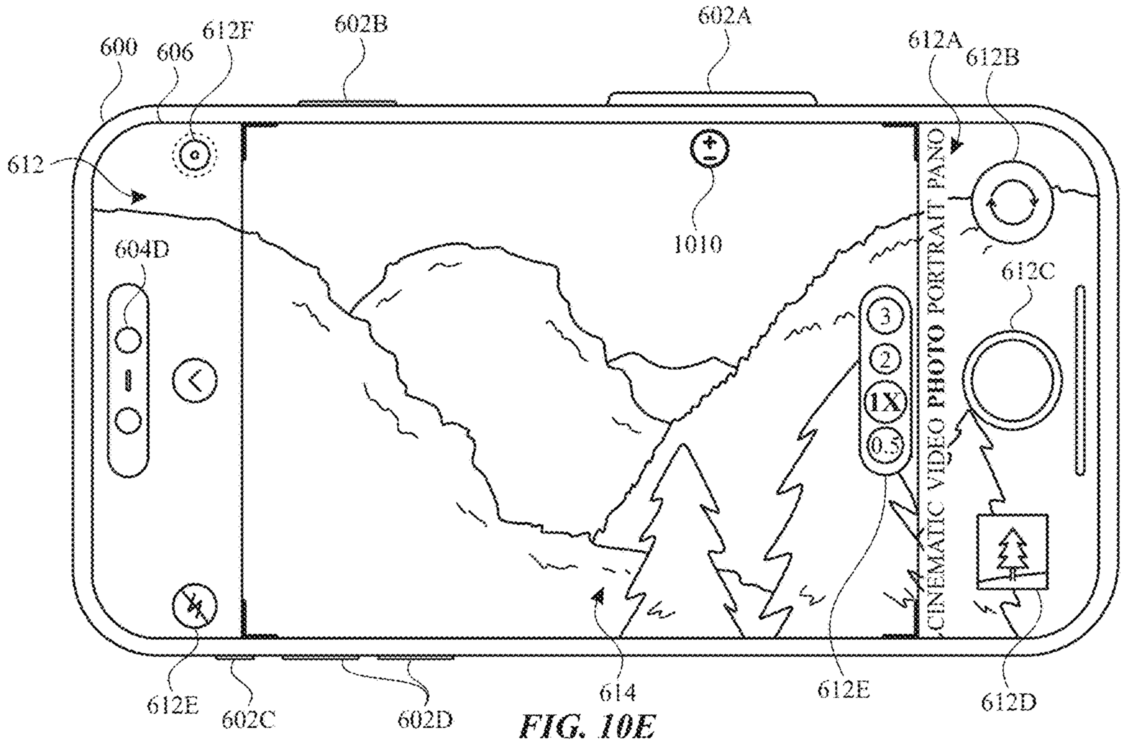

In response to detecting input 1008, computer system 600 associates the exposure setting of camera user interface 612 with first button 602A. After camera system 600 associates the exposure setting of camera user interface 612 with first button 602A, at FIG. 10E, computer system 600 closes customization menu 1006. In some embodiments, computer system 600 closes customization menu 1006 in response to input 1008 (e.g., an input selecting a new operation to associate with first button 602A) and/or in response to a separate input for closing customization menu 1006, such as a touch input outside of the region of customization menu 1006 and/or a swipe back up across customization menu 1006 (e.g., similar to touch inputs 626A and 626B for dismissing settings control 622, described with respect to FIG. 6T). In some embodiments, as illustrated in FIG. 10E, when computer system 600 stops displaying customization menu 1006, computer system 600 displays customization indicator 1010, including the exposure setting icon, near first button 602A, indicating that the setting associated with first button 602A has been successfully changed. Additionally, in some embodiments, computer system 600 returns the appearance of camera user interface 612 to its default state (e.g., returning the other user interface elements to their standard prominence and/or removing the overlay) and/or stops displaying settings control 622 (e.g., if settings control 622 was displayed when input 1004 was detected). As further described with respect to FIGS. 18M-18P, in some embodiments, computer system 600 closes customization menu 1006 in response to an input swiping outwards (e.g., toward an edge of the device) across customization menu 1006 (e.g., opposite to input 1004). As further described with respect to FIGS. 18M-18P, in some embodiments, in response to the input swiping outwards across customization menu 1006, computer system 600 replaces customization menu 1006 with settings control 622, configured to control the currently-selected setting.

Figure 10F:
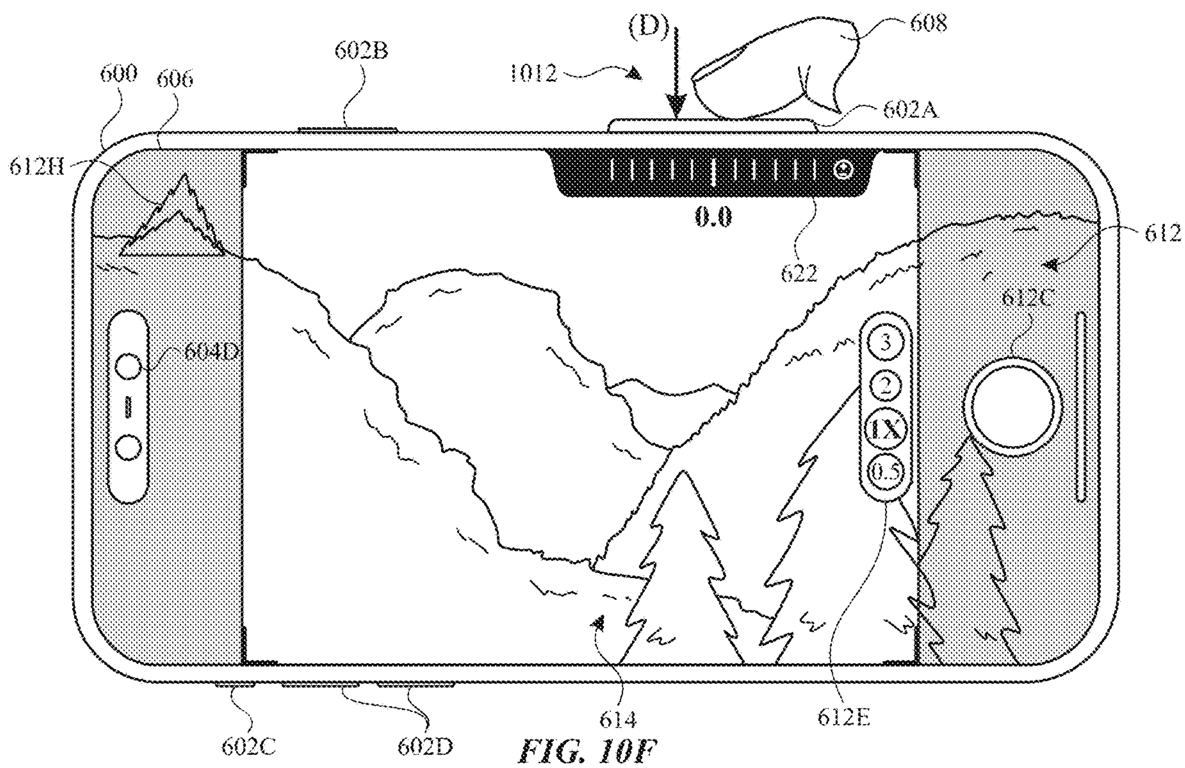

After computer system 600 associates the exposure setting of camera user interface 612 with first button 602A, at FIG. 10F, computer system 600 detects input 1012, a light/partial press of first button 602A, and in response (e.g., as described with respect to FIGS. 6E-6J), displays settings control 622 for the exposure setting of camera user interface 612. As illustrated in FIG. 10F, settings control 622 for the exposure setting includes text indicating the current exposure value ("0.0"), an icon representing the exposure setting, and a representation of an exposure scale. In particular, the representation of the exposure scale includes a plurality of tick marks representing ordered exposure values in intervals of 0.1, with lower exposure values (e.g., −1.0) are displayed closer to the set of cameras and higher exposure values (e.g., +1.0) are displayed further from the set of cameras. For example, the exposure setting controls media capture brightness, for instance, by simulating different camera shutter speeds, aperture sizes, and/or ISO speeds, where higher exposure setting values correspond to brighter captures (e.g., slower shutter speeds, slower ISO speeds, and/or larger aperture sizes) and lower exposure setting values correspond to darker captures (e.g., faster shutter speeds, faster ISO speeds, and/or smaller aperture sizes).

Figure 10G:
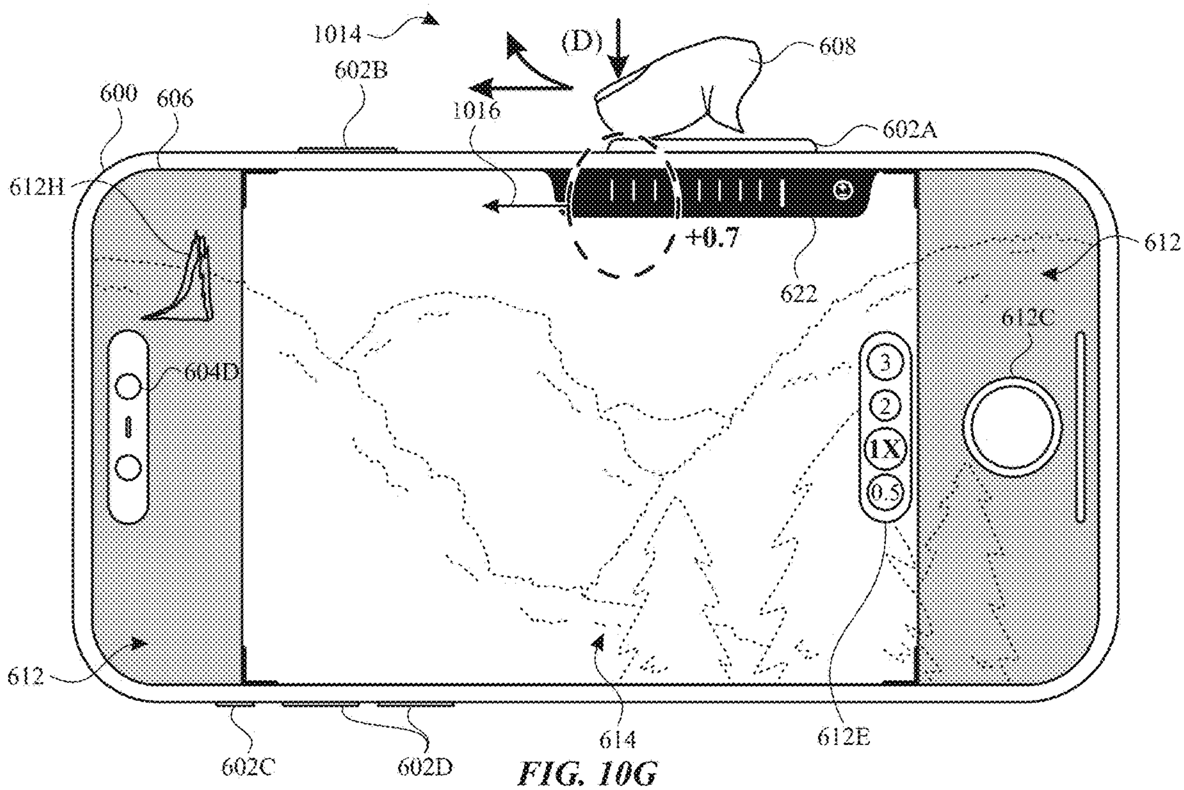

At FIG. 10G, while displaying settings control 622 for the exposure setting of camera user interface 612, computer system 600 detects a right-to-left movement input (e.g., moving towards the set of cameras) such as movement input 1014 directed to first button 602A and/or touch input 1016 directed to settings control 622 on the touch-sensitive surface of display 606, which may include swipe/drag movements, flick movements, and/or directional tap inputs. As illustrated in FIG. 10G, in response to movement input 1014 and/or touch input 1016, computer system 600 adjusts the exposure setting of camera user interface 612 to an exposure value of +0.7 (e.g., a longer exposure setting for media capture). At the exposure value of +0.7, computer system 600 displays camera preview 614 with increased brightness, represented in FIG. 10G by the lightly dashed lines of the field-of-view of the environment. In some embodiments, the adjustment to the exposure setting of camera user interface 612, and likewise the update of settings control 622 and/or camera user interface 612, based on movement input 1014 and/or touch input 1016 is performed as described with respect to FIGS. 6J-6AM and 7.

Figure 10H:
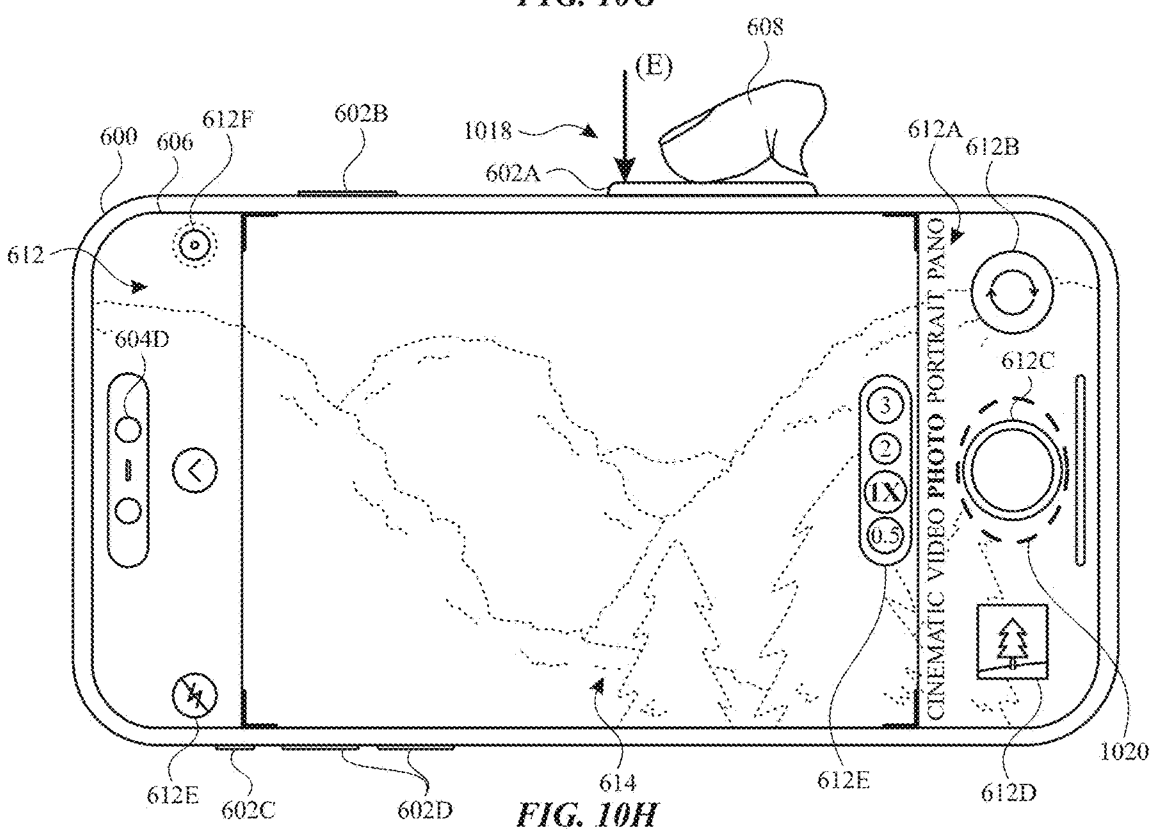

After the exposure setting of camera user interface 612 is adjusted via settings control 622, the exposure setting remains set to a value of +0.7 after computer system 600 ceases display of settings control 622 for the exposure setting (e.g., after a threshold period of time without further inputs and/or in response to an input dismissing settings control 622, as described with respect to FIG. 6T), as illustrated by camera preview 614 in FIG. 10H remaining at the increased brightness level.

Figure 10I:
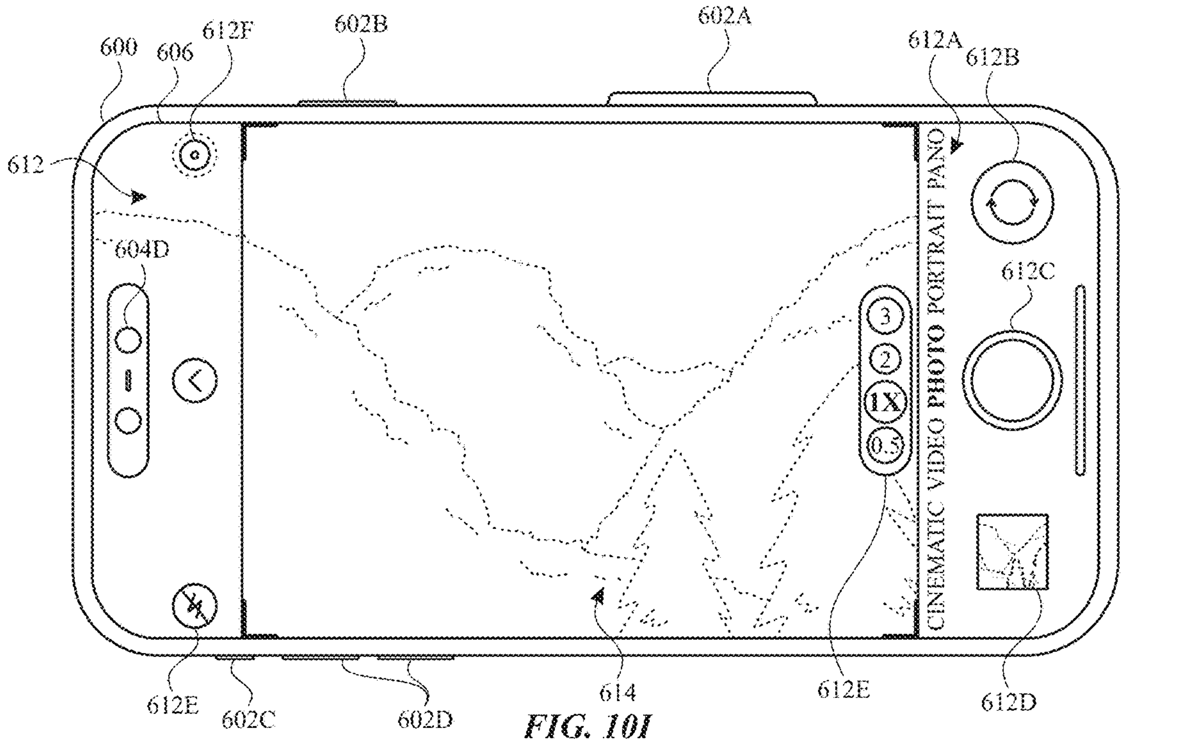

At FIG. 10H, computer system 600 detects an input requesting to capture media, such as press input 1018 directed to first button 602A (e.g., as described with respect to FIGS. 6U-6V and/or FIGS. 8A-8P) and/or touch input 1020 directed to shutter affordance 612C. In response to press input 1018 and/or touch input 1020, computer system 600 captures media with an exposure level of +0.7, the exposure level selected via settings control 622. As illustrated in FIG. 10I, computer system 600 updates captured media icon 612D to display a thumbnail of the media captured with the selected settings, represented in FIG. 10I by the dashed lines of the thumbnail.

Figure 10J:
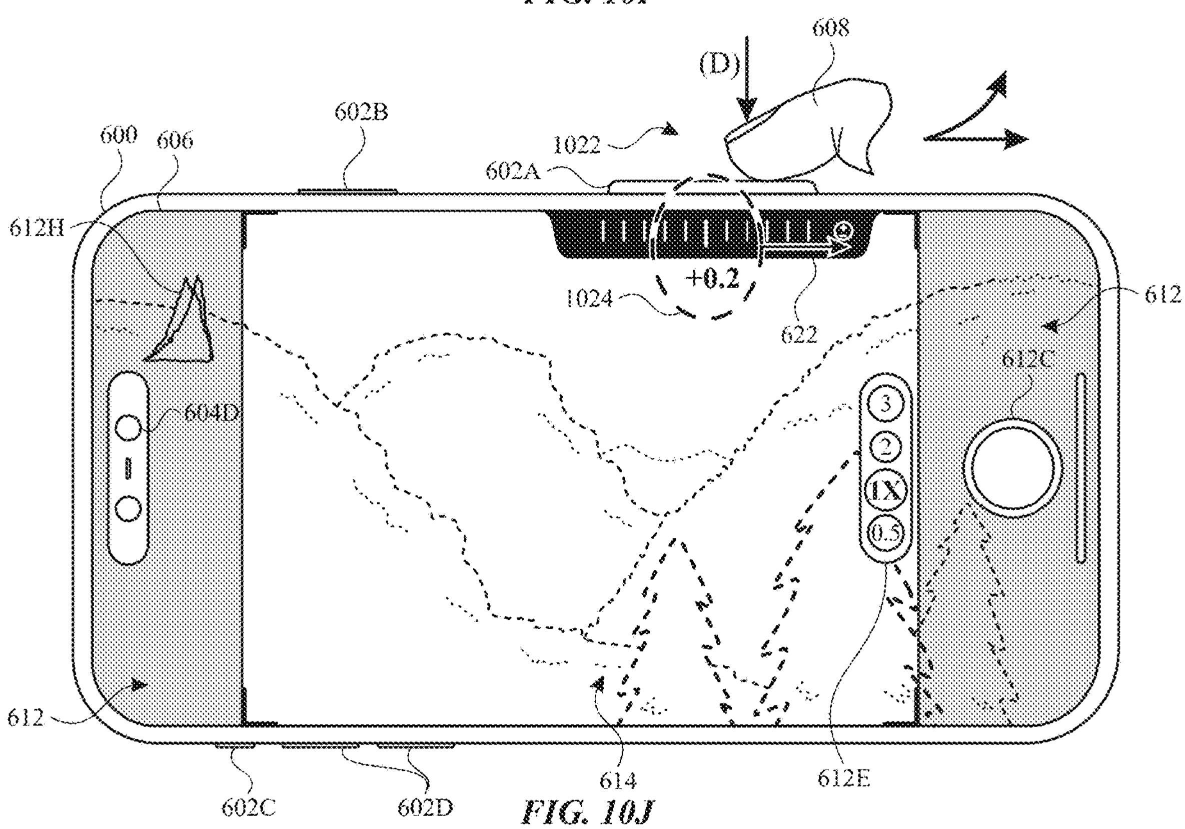

At FIG. 10J, the exposure setting of camera user interface 612 remains associated with first button 602A, and accordingly, in response to detecting movement input 1022 and/or touch input 1024 (e.g., swipe/drag, flick, and/or directional tap inputs) while displaying settings control 622 for the exposure setting of camera user interface 612 (e.g., in response to a light/partial press and/or full swipe of first button 602A), computer system 600 again adjusts the exposure setting. As illustrated in FIG. 10J, based on the left-to-right movement of movement input 1022 and/or touch input 1024, computer system 600 reduces the exposure value to +0.2, decreasing the brightness of camera preview 614, represented in FIG. 10J by the darker dashed lines of the field-of-view of the environment (e.g., media capture is reduced in brightness compared to at FIGS. 10G-10H, but remains brighter than at FIGS. 10B-10F).

At FIG. 10K, at a later time, the exposure setting of camera user interface 612 remains associated with first button 602A and the exposure value remains set to +0.2 (e.g., computer system 600 maintains the custom operation selected via customization menu 1006 and the settings value selected via settings control 622 until new selections are made). While displaying camera user interface 612 and settings control 622 for the exposure setting, computer system 600 detects input 1026, a gesture swiping inwards from first button 602A, e.g., as described with respect to input 1004 at FIG. 10B.

Figure 10L:
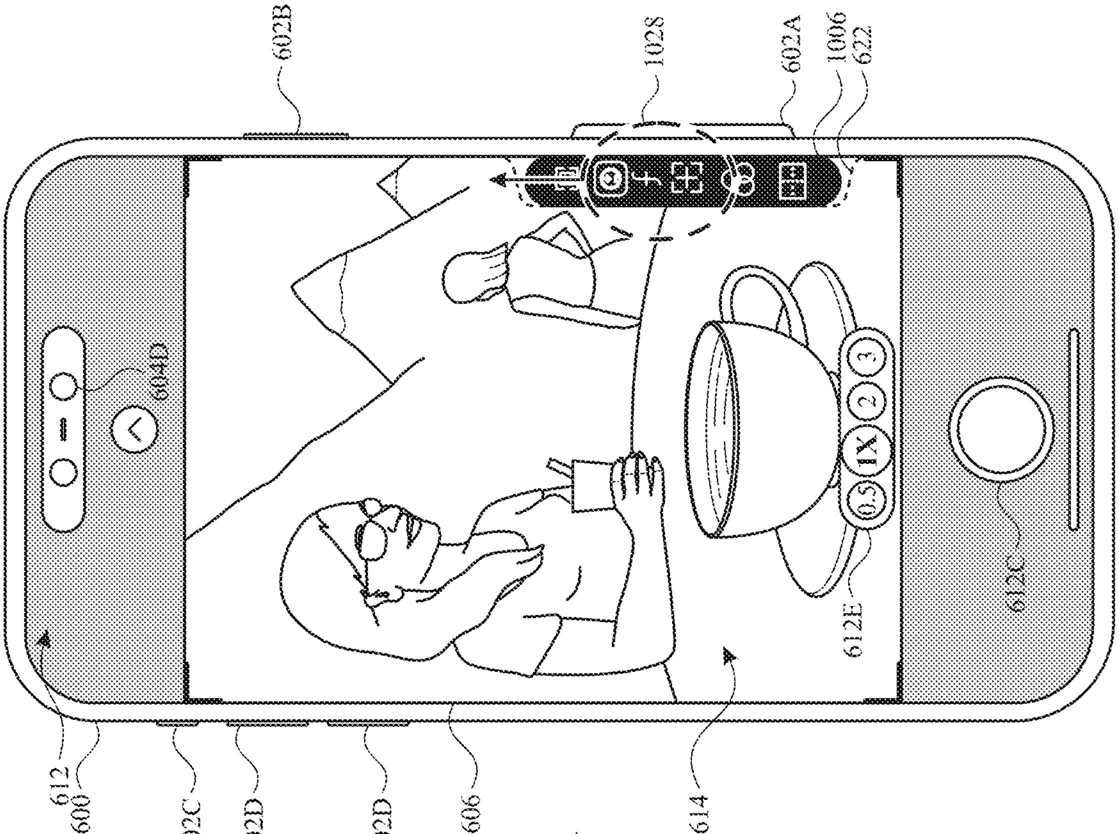
Figure 10K:
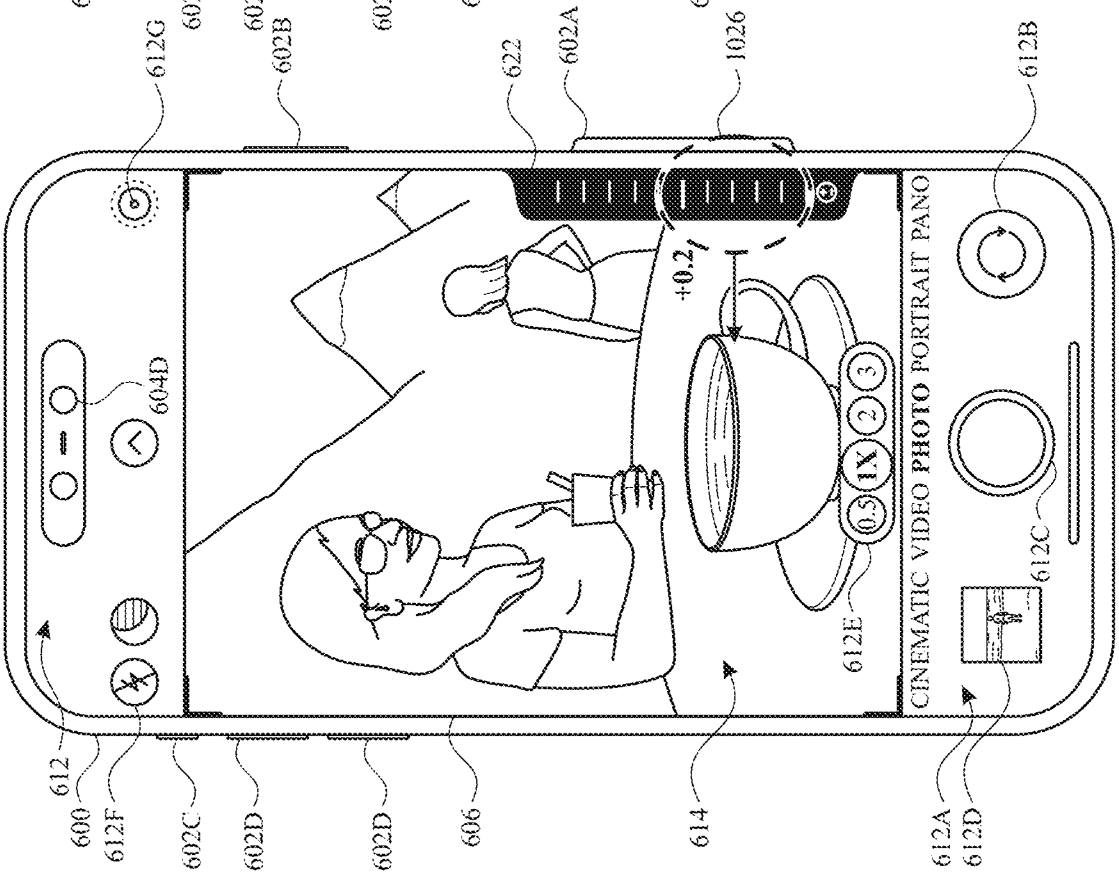
Figure 10N:
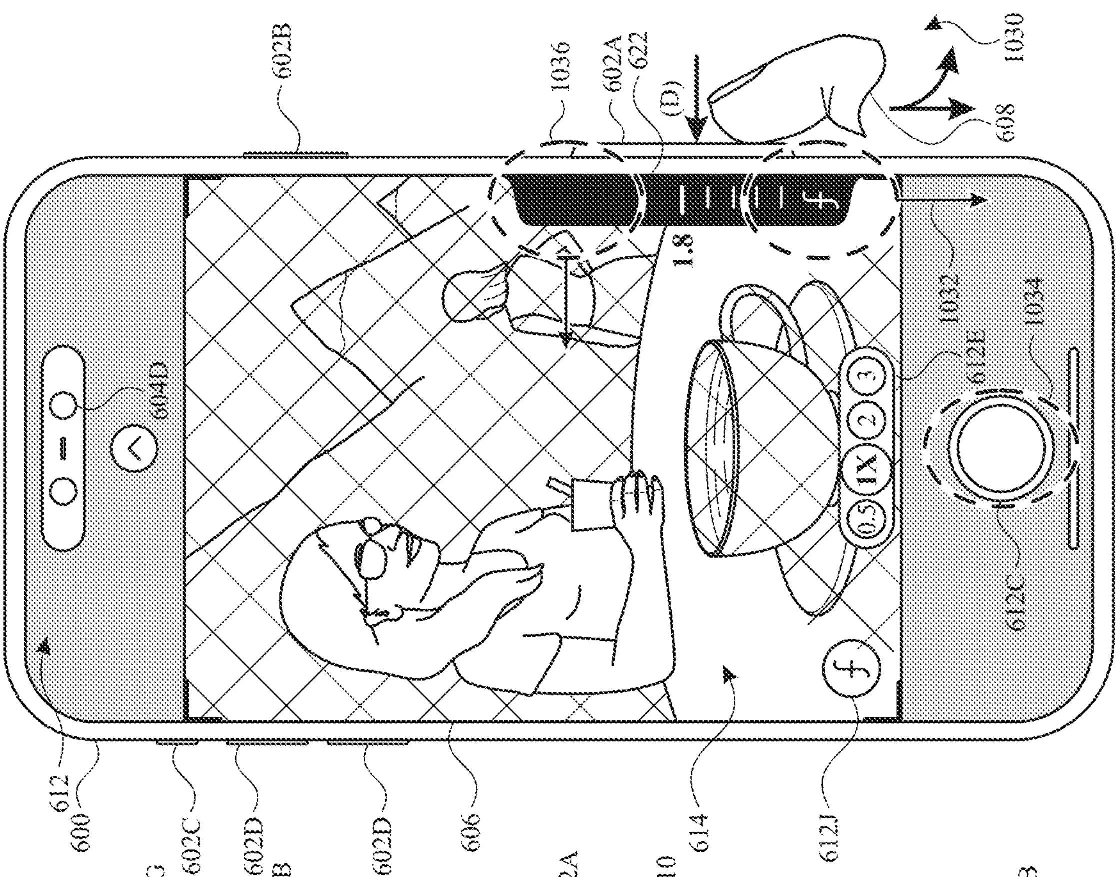
Figure 10M:
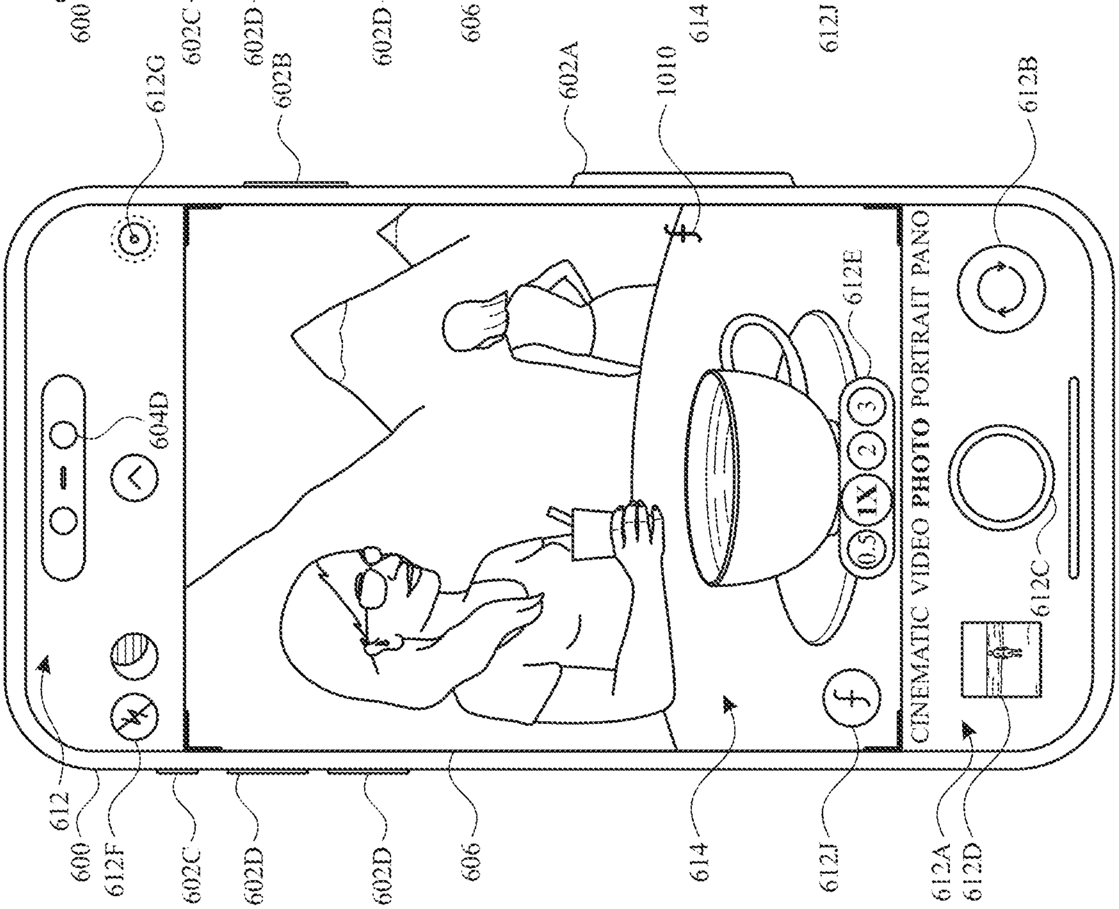

In response to detecting input 1026, at FIG. 10L, computer system 600 displays customization menu 1006 with the icon corresponding to the exposure setting emphasized, indicating the current selection. While displaying customization menu 1006, computer system 600 detects input 1028 directed to customization menu 1006 via the touch-sensitive surface of display 606, selecting the menu item corresponding to the simulated depth-of-field setting of camera user interface 612 to associate the simulated depth-of-field setting with first button 602A. In response to detecting input 1028, computer system 600 associates the simulated depth-of-field setting with first button 602A as illustrated in FIG. 10M, displaying customization indicator 1010, including the simulated depth-of-field setting icon, near first button 602A to indicate that the setting associated with first button 602A has been successfully changed (e.g., as described with respect to FIG. 10E).

After computer system 600 associates the simulated depth-of-field setting of camera user interface 612 with first button 602A, the user can control the simulated depth-of-field setting via first button 602A and settings control 622, as described with respect to FIGS. 6J-6AM and 10F-10J. As illustrated in FIG. 10N, while displaying settings control 622 for the simulated depth-of-field setting, computer system 600 detects movement input 1030 and/or touch input 1032 and, in response, adjusts the simulated depth-of-field setting of camera user interface 612 to an f-stop value of f/1.8 (e.g., as described with respect to FIG. 6AE). Accordingly, media captured using an input such as input 1034 is designated for display with the midground (e.g., including the woman sitting at the table) in focus and the foreground (e.g., including the coffee cup) and background (e.g., including the person standing behind the table and the mountains in the distance) blurred, as shown in camera preview 614. In some embodiments, while the simulated depth-of-field setting is associated with first button 602A, while displaying settings control 622 for the simulated depth-of-field setting, and/or while capture of depth information is enabled, computer system 600 displays depth capture affordance 612J.

After adjusting the simulated depth-of-field setting of camera user interface 612 to an f-stop value of f/1.8, the user again updates the customized operation associated with first button 602A, for instance, opening customization menu 1006 using inward swipe input 1036 across settings control 622 and selecting the menu item corresponding to the zoom setting. At FIG. 10O, while the zoom setting is associated with first button 602A and settings control 622 for the zoom setting is displayed, computer system 600 adjusts the zoom setting of camera user interface 612 to 0.5× zoom based on movement input 1038 and/or touch input 1040 (e.g., as described with respect to FIG. 6O-6Q and 6S). As illustrated in FIG. 10O, the f-stop value for the simulated depth-of-field setting remains set to f/1.8 when the zoom value is changed to 0.5× zoom (e.g., even after the simulated depth-of-field setting is no longer associated with first button 602A), so media captured using an input such as input 1042 is captured at 0.5× magnification and with the foreground and background blurred as shown in camera preview 614. Accordingly, the user can adjust one setting using settings control 622 (e.g., as described with respect to FIGS. 6E-6AM), swipe in from first button 602A to select a different setting using customization menu 1006, adjust the different setting using settings control 622, and so forth to select the desired combination of settings for media capture, then capture media via shutter affordance 612C and/or first button 602A (e.g., as described with respect to FIGS. 6U-6V, 6Y-6AD, and 8A-8P) with the selected settings.

Figure 10P:
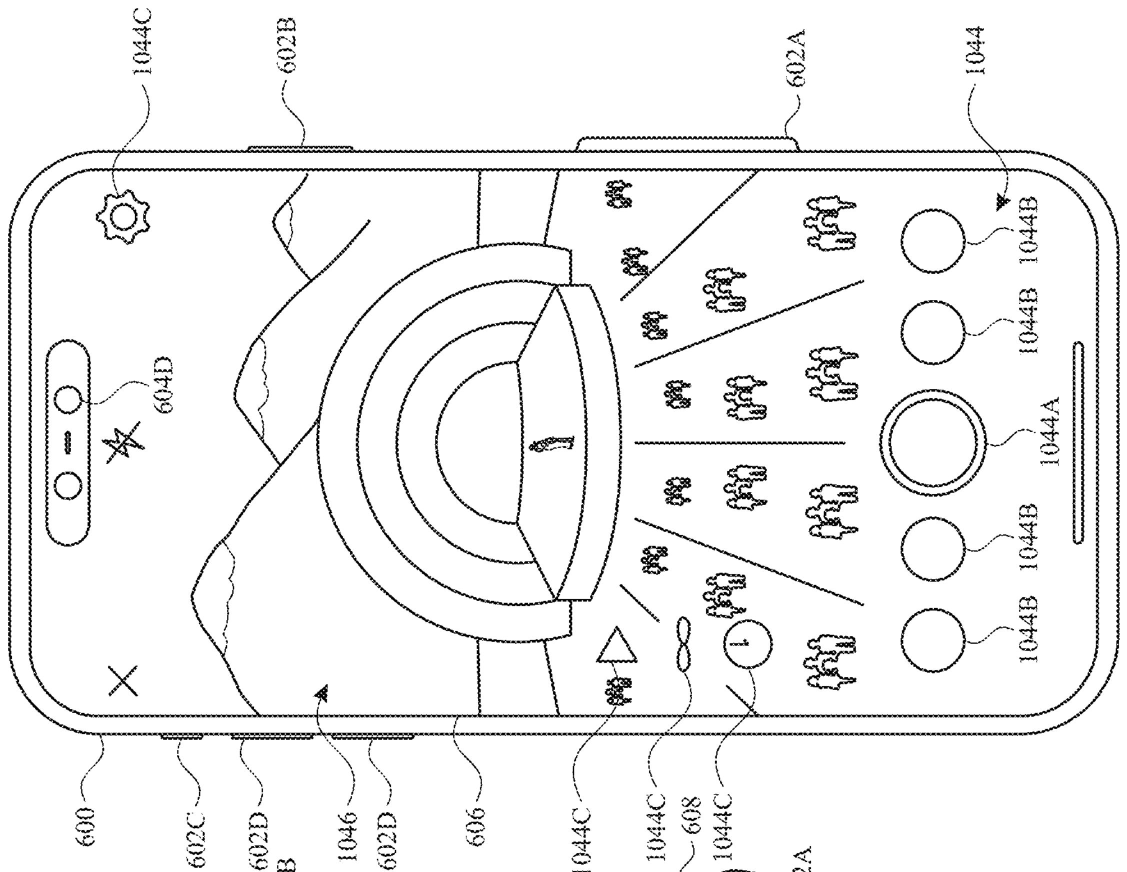
Figure 10O:
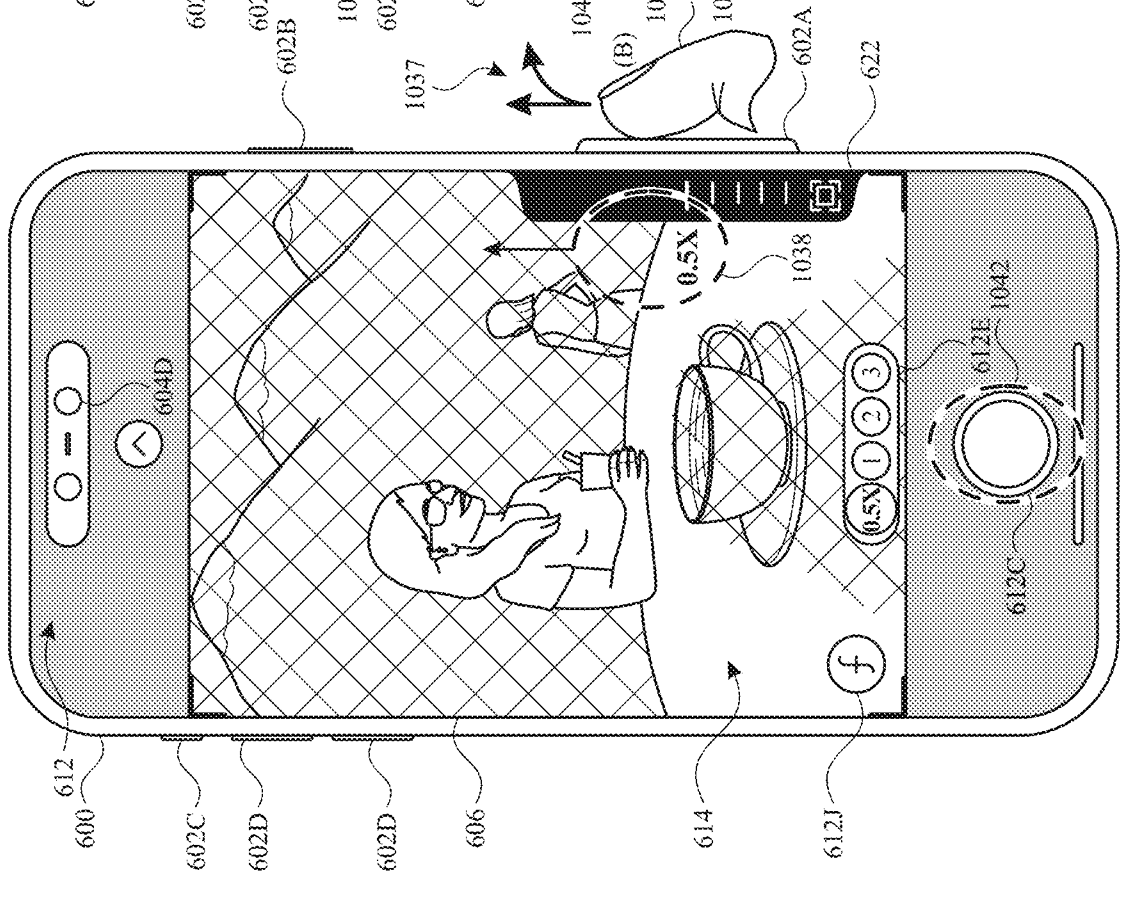
Figure 10R:
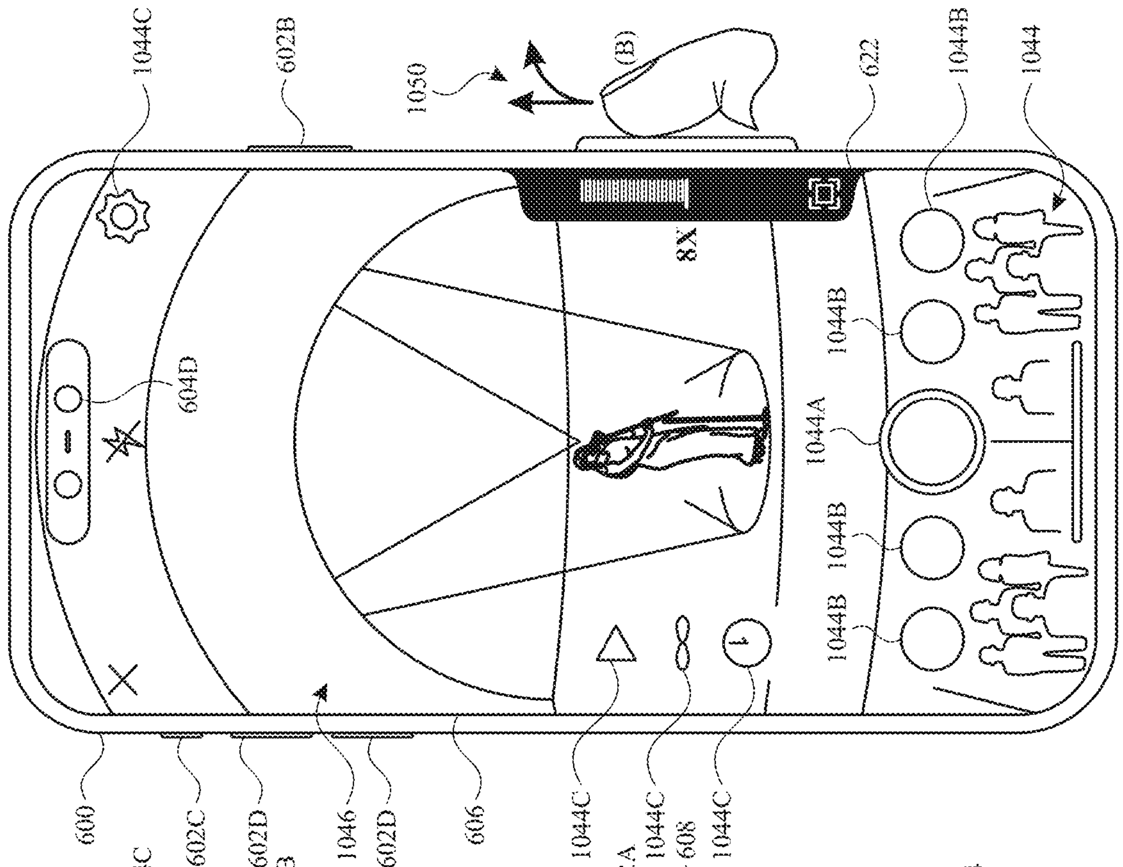

At FIG. 10P, computer system 600 displays camera user interface 1044, for example, a user interface for a camera utility embedded in a social media application. As illustrated in FIG. 10P, camera user interface 1044 includes shutter affordance 1044A, filter affordances 1044B, and other control affordances 1044C. Camera user interface 1044 also includes camera preview 1046, which, like camera preview 614 of camera user interface 612, represents a portion of the field-of-view of the set of cameras of computer system 600. For example, computer system 600 provides the camera feed from the set of cameras as an input to both the camera application of camera user interface 612 and the embedded camera utility within the social media application of camera user interface 1044. As discussed with respect to camera user interface 612, in some embodiments, camera user interface 1044 can be associated with first button 602A. If camera user interface 1044 is associated with first button 602A, in response to a press input of first button 602A detected while displaying a non-camera user interface (e.g., user interface 610 for the media player application, but not camera user interface 612), computer system 600 displays camera user interface 1044, for example, opening the social media application and navigating directly to the camera utility.

Figure 10Q:
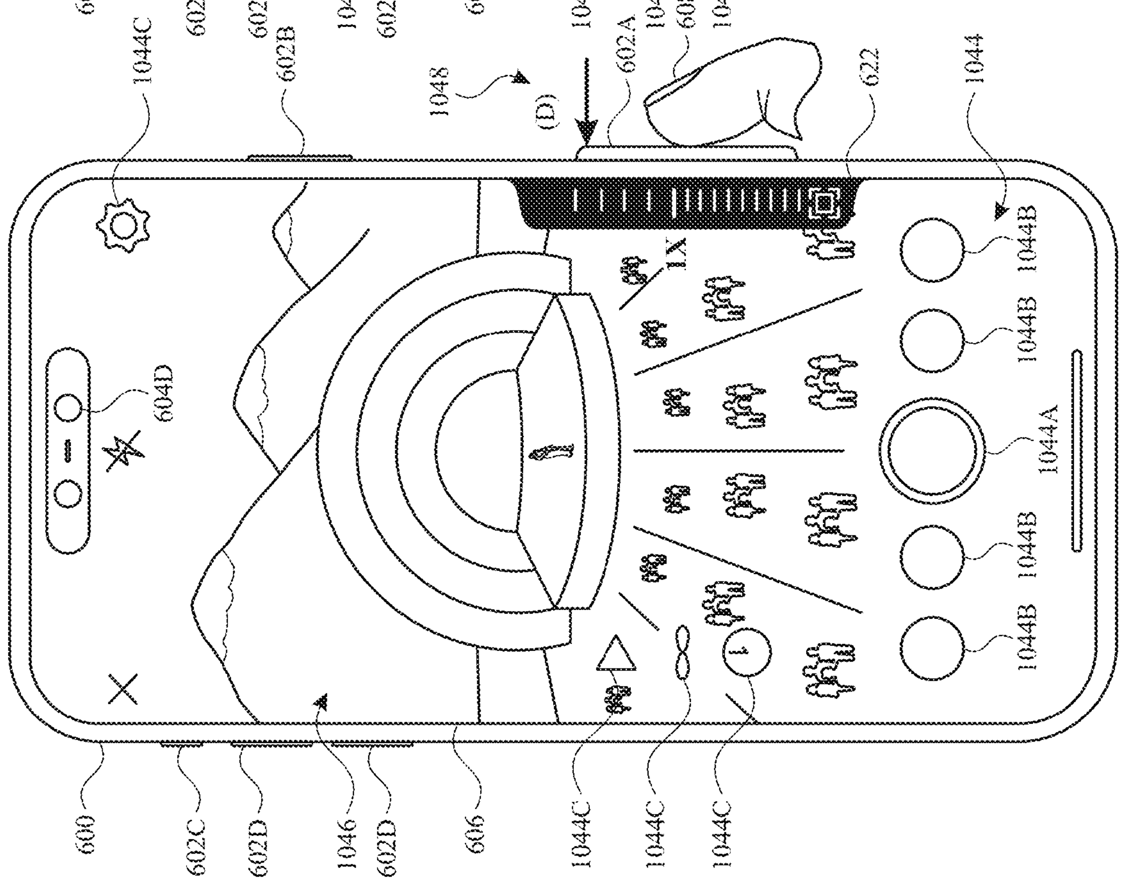

At FIG. 10Q, while displaying camera user interface 1044, computer system 600 displays settings control 622 in response to input 1048, a light/partial press of first button 602A (e.g., as described with respect to displaying settings control 622 in camera user interface 612). As in the context of camera user interface 612, computer system 600 displays settings control 622 as a tab-shaped cut-out extending into display 606 from the location of first button 602A and obscuring or overlaying a portion of camera user interface 1044. As illustrated in FIG. 10Q, computer system 600 displays settings control 622 for the zoom setting in response to input 1048, reflecting the setting previously associated with first button 602A (e.g., from within camera user interface 612). As in camera user interface 612, in camera user interface 1044, settings control 622 for the zoom setting includes text indicating the current zoom level ("1×"), the icon representing the zoom setting, and the representation of a zoom scale, with the zoom levels represented by the plurality of tick marks increasing from top (e.g., the side closer to the set of cameras) to bottom (e.g., the side further from the set of cameras). In some embodiments, as illustrated in FIG. 10Q, computer system 600 does not change other elements of camera user interface 1044 while displaying settings control 622, e.g., unlike camera user interface 612, a light/partial press of first button 602A does not cause displaying camera user interface 1044 in a "quiet" or "ready to capture" mode.

At FIG. 10R, while displaying settings control 622 for the zoom setting, computer system 600 detects movement input 1050, an upwards swipe/drag, flick, or directional tap directed to first button 602A. In some embodiments, as in the context of camera user interface 612, computer system 600 also detects movement inputs directed to settings control 622 via the touch-sensitive surface of display 606 while displaying settings control 622 in camera user interface 1044. As illustrated in FIG. 10R, computer system 600 adjusts the zoom setting based on movement input 1050, increasing the zoom level to 8.0× and displaying the representation of the zoom scale with the tick mark representing 8.0× pulled up to the center point of settings control 622, for example, as described with respect to FIG. 6N.

As discussed with respect to FIG. 6L, in some embodiments, adjusting the zoom level includes performing an optical zoom (e.g., switching between capturing camera data using first camera 604A, second camera 604B, and/or third camera 604C for the different magnifications produced by each different lens) and/or performing a digital zoom (e.g., digitally cropping the portion of the field-of-view of the environment represented in camera preview 1046). In some embodiments, computer system 600 adjusts the zoom level of the camera feed being captured via the set of cameras and provides the adjusted camera feed to the social media application as an input to display in camera preview 1046 of camera user interface 1044.

Figure 10T:
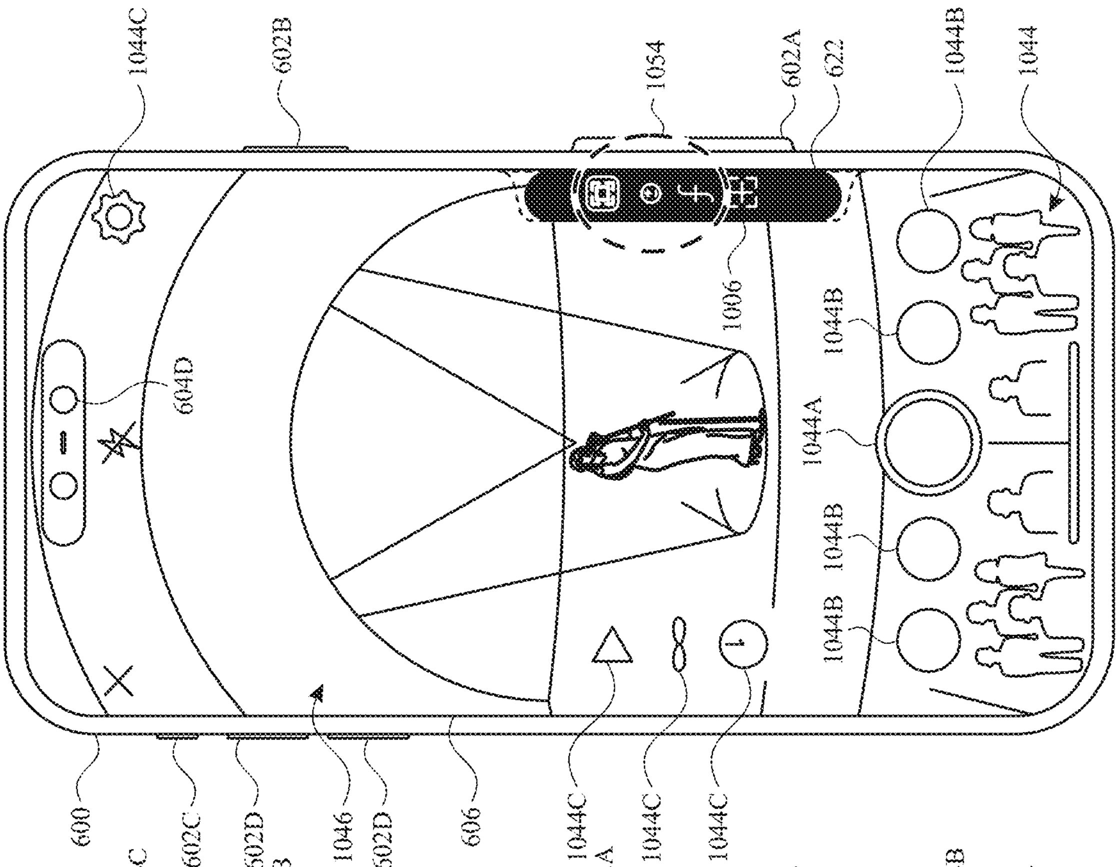
Figure 10S:
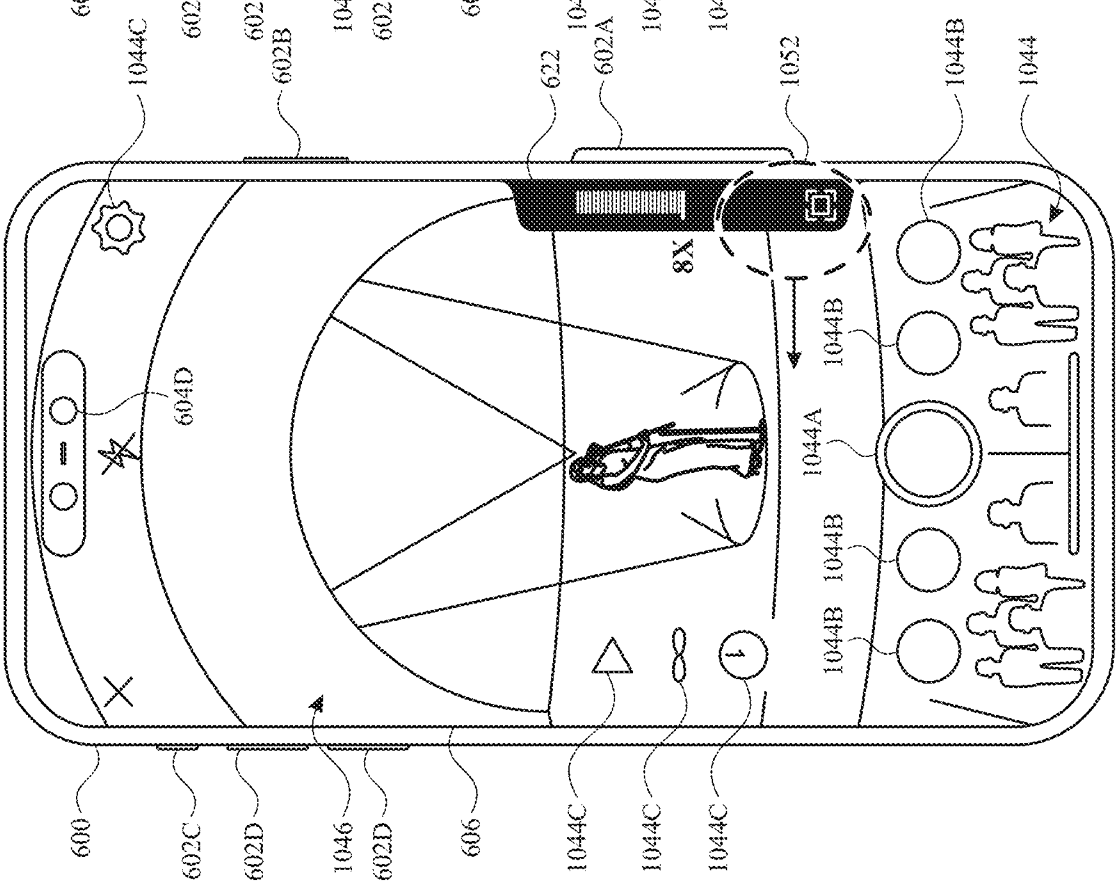

At FIG. 10S, while displaying settings control 622 for the zoom setting within camera user interface 1044, computer system 600 detects input 1052, a gesture swiping inwards from first button 602A, e.g., as described with respect to inputs 1004 and 1026. In response, at FIG. 10T, computer system 600 displays customization menu 1006 in camera user interface 1044, e.g., as described with respect to displaying customization menu 1006 in camera user interface 612.

As illustrated in FIG. 10T, when invoked in camera user interface 1044, customization menu 1006 includes a different set of menu items than in camera user interface 612, providing different options of operations that can be associated with first button 602A in camera user interface 1044 than the options that can be associated with first button 602A in camera user interface 612. In particular, at FIG. 10T, customization menu 1006 includes, from top to bottom, menu items for the zoom setting, the exposure setting, the simulated depth-of-field setting, and the focus setting. However, the filter setting (e.g., as described with respect to FIGS. 6AI-6AK) may be omitted as redundant or incompatible with the custom media filter options (e.g., via filter affordances 1044B) for the social media application of camera user interface 1044, or the capture guidance setting may be omitted as unnecessary for the type of media typically captured from within a social media application.

As illustrated in FIG. 10T1, in some embodiments, the different options provided in customization menu 1006 for camera user interface 1044 include one or more additional options (e.g., application-specific options other than those provided in customization menu 1006 for camera user interface 612, such as the zoom, exposure, depth, focus, filter, grid, and camera selection options described with respect to FIGS. 10C-10D and 18L). In some embodiments, developers of third-party applications for computer system 600 define (e.g., within the application installation and/or software data) which operations to include in customization menu 1006 when invoked from within the applications, selecting between system-provided options (e.g., the menu options described with respect to FIGS. 10C-10D and/or 18A-18L), and/or defining application-specific options to include. For example, the social media application defines a menu item (illustrated in FIG. 10T1 by a heart icon) for an audio setting (e.g., for selecting background audio for media capture) to include in customization menu 1006 for camera user interface 1044, allowing the user to associate the audio setting with, and to control the audio setting using, first button 602A. In some embodiments an API is provided for an application to select which system-provided options are used and to define and or identify application-provided options that should be included in the customization menu. Accordingly, the user can customize first button 602A to be associated with appropriate operations for the different camera user interfaces.

At FIG. 10T, computer system 600 detects input 1054 directed to customization menu 1006 via the touch-sensitive surface of display 606. Input 1054 selects the menu item corresponding to the exposure setting (e.g., as discussed with respect to input 1008), and in response, computer system 600 associates the exposure setting with first button 602A.

As illustrated in FIG. 10U, while the exposure setting is associated with first button 602A, computer system 600 displays settings control 622 for the exposure setting in camera user interface 1044, for instance, in response to another light/partial press of first button 602A to invoke settings control 622. While displaying settings control 622 for the exposure setting in camera user interface 1044, computer system 600 detects movement input 1056, a downwards swipe/drag, flick, or directional tap directed to first button 602A. As illustrated in FIG. 6U, computer system 600 adjusts the zoom setting based on movement input 1056, reducing the exposure value to –0.5 (e.g., a shorter exposure setting for media capture) and displaying camera preview 1046 with decreased brightness. In some embodiments, computer system 600 adjusts the exposure level (e.g., the simulated camera shutter speed, aperture size, and/or ISO speed) of the camera feed being captured via the set of cameras and provides the adjusted camera feed to the social media application as an input to display in camera preview 1046 of camera user interface 1044. In some embodiments, computer system 600 performs the other available operations for camera user interface 1044 in the same manner, for instance, applying simulated depth-of-field or selective focus blurring effects to the camera feed from the set of cameras and providing the camera data with the applied effects as an input to camera user interface 1044.

In some embodiments, system 600 adjusts the appearance of settings control 622, including the indicator of the current settings value (e.g., the text "−0.5"), based on changes to the appearance of the underlying user interface. For example, as illustrated in FIG. 10U1, when the appearance of camera preview 1046 darkens behind settings control 622 (e.g., in response to movement input 1056, the downwards swipe/drag, flick, or directional tap directed to first button 602A reducing the exposure value), system 600 adjusts the appearance of settings control 622 to increase contrast and visibility against the darkened background. In particular, system 600 displays settings control 622 and the indicator of the current settings value with high-contrast (e.g., white, light, and/or brightly-colored) borders (e.g., keylines) and changes the colors of settings control 622 (e.g., changing to dark-colored tick marks on a light-colored background). In some embodiments, system 600 adjusts the brightness of the display pixels used to display settings control 622 and/or the indicator of the current settings value to increase visual prominence against the background. In some embodiments, system 600 adjusts the appearance of customization menu 1006 based on changes to the appearance of the underlying user interface in a similar manner.

At FIG. 10V, while displaying camera user interface 1044, computer system 600 detects an input requesting to capture media, such as press input 1058 directed to first button 602A (e.g., as described with respect to FIGS. 6U-6V and/or FIGS. 8A-8P) or touch input 1060 directed to shutter affordance 1044C of camera user interface 1044. As illustrated in FIG. 10W, in response to press input 1058 and/or touch input 1060, computer system 600 captures media (e.g., photo and/or video media) and displays a representation of the captured media in media editing user interface 1062 of the social media application (e.g., a user interface for adding text, adding annotations, applying visual effects, applying filters, adding music, and/or otherwise editing media to post on the social media application). As shown in the representation of the captured media, the media capture is performed at 8× zoom and with −0.5 exposure, as set using first button 602A, customization menu 1006, and setting control 622 within camera user interface 1044. In some embodiments, although press input 1058 may be the same type of press input as input 609 and/or input 1002, computer system 600 does not launch camera user interface 612 in response to press input 1058, as a camera user interface is already being displayed. Accordingly, press inputs of first button 602A can be used both to capture media from within a variety of different camera user interfaces and to launch a selected or default camera user interface from outside of the camera user interfaces.

FIGS. 11A-11B are a flow diagram illustrating method 1100 for customizing and controlling operations of a computer system using hardware inputs, in accordance with some embodiments. The method is performed at a computer system (e.g., 100, 300, 500, and/or 600) that is in communication with a display generation component (e.g., 606) (e.g., a display controller; a touch-sensitive display system; a display (e.g., integrated and/or connected), a 3D display, a transparent display, a projector, and/or a heads-up display) and a first input device (e.g., 602A, 602B, 602C, 602D, and/or a touch sensitive surface of display 606) (e.g., including one or more hardware buttons and/or surfaces, such as mechanical (e.g., physically depressible), solid-state, intensity-sensitive, and/or touch-sensitive (e.g., capacitive) buttons and/or surfaces), e.g., as illustrated in FIGS. 6A-6B. In some embodiments, the first input device is included in a plurality of input devices in communication with the computer system. In some embodiments, the computer system is optionally in communication with one or more cameras (e.g., 604A, 604B, 604C, and/or 604D), such as a rear (user-facing) camera and a forward (environment-facing) camera and/or a plurality of cameras with different lenses, such as a standard camera, a telephoto camera, and/or a wide-angle camera. In some embodiments, the computer system is optionally in communication with one or more sensors, such as camera sensors, optical sensors, depth sensors, capacitive sensors, intensity sensors, motion sensors, vibration sensors, and/or audio sensors.

The computer system detects (1102) (e.g., via the first input device and/or via a second input device, such as a touch-sensitive surface located adjacent to the first input device) a first input including a movement (1004, 1026, 1036, and/or 1052) (e.g., a swipe gesture) that starts at a first location corresponding to the first input device (e.g., an edge/region of a touch sensitive surface close to where the first input device (e.g., hardware button) is situated) (in some embodiments, the display generation component is a touch-sensitive display and the first input is detected on a region of the display that corresponds to and/or is adjacent to the first input device) and ends at a second location that is different from the first location (e.g., as described with respect to FIGS. 10B, 10K, 10N, and/or 10S) (e.g., an gesture input swiping from the first input device inwards towards the center of the touch sensitive surface). In some embodiments, the second location is farther from the first input device than the first location, e.g., the movement includes an inward swipe from the edge of the touch-sensitive display closest to the hardware button towards the center of the touch-sensitive display.

In response to detecting the first input (1104) (in some embodiments, in accordance with a determination that the first input includes the movement), the computer system displays (1106), via the display generation component, an option user interface (e.g., 1006), (e.g., a menu with controls for selecting/changing a customizable function of the first input device (e.g., the hardware button). In some embodiments, the options user interface is displayed overlaying (e.g., semi-transparently and/or opaquely) a user interface displayed when the first input is detected.) including a plurality of selectable user interface objects corresponding to a respective plurality of operations that can be associated with the first input device (e.g., as described with respect to FIGS. 10C-10D, 10L, and/or 10T) (e.g., the one or more respective operations are operations that can be associated with the first input device, such as operations for launching an application, capturing media, and/or changing a setting, such as changing a zoom level, simulated depth-of-field setting, exposure setting, filter setting, and/or capture guidance setting). In some embodiments, one selectable user interface object of the plurality of selectable user interface objects corresponds to two or more related operations, e.g., a simulated depth-of-field menu item corresponds to both toggling displaying of a camera preview with simulated depth-of-field effects applied and adjusting a simulated f-stop value for the simulated depth-of-field effects. In some embodiments, the plurality of selectable user interface objects includes a first selectable user interface object that corresponds to a first operation and a second selectable user interface object, different from the first selectable user interface object, that corresponds to a second operation different from the first operation.

While displaying the options user interface (1108), the computer system detects (1110) (in some embodiments, via the second input device) a second input (e.g., 1008, 1028, and/or 1054) (in some embodiments, a tap input) selecting a respective selectable user interface object of the plurality of selectable user interface objects (e.g., as described with respect to FIGS. 10C-10D, 10L, and/or 10T) (in some embodiments, in response to detecting the second input, the computer system associates the respective operation that corresponds to the selected user interface object with the first input device). After detecting the second input (1112) (e.g., and without detecting a subsequent input selecting one of the one or more selectable user interface objects from the option user interface, e.g., while the respective selectable user interface object is the most recently selected user interface object from the options user interface), the computer system detects (1114), via the first input device, a third input directed to the first input device (e.g., 1012, 1014, 1016, 1022, 1024, 1030, 1032, 1037, 1038, 1048, 1050, and/or 1056) (e.g., a press, tap, click, swipe, and/or other manipulation of the first input device).

At FIG. 11B, in response to detecting the third input directed to the first input device (1116): in accordance with a determination that a first set of one or more criteria is satisfied (1118), the computer system performs (1120) a first operation of the respective plurality of operations, wherein the first set of one or more criteria includes a first criterion that is satisfied when the respective selectable user interface object that was selected by the second input (e.g., the most recently selected user interface object from the options user interface) corresponds to the first operation (in some embodiments, the first criterion is satisfied if the first operation is currently (e.g., remains) associated with the first hardware button); and in accordance with a determination that a second set of one or more criteria is satisfied (1122), the computer system performs (1124) a second operation of the respective plurality of operations that is different from the first operation of the respective plurality of operations, wherein the second set of one or more criteria includes a second criterion that is satisfied when the respective selectable user interface object that was selected by the second input corresponds to the second operation (e.g., as described with respect to FIGS. 10F-10G, 10J, 10N, 10O, 10Q-10R, and/or 10U). For example, the first criterion is satisfied when the second input was a selection of a selectable user interface object corresponding to the first operation. For example, the second criterion is satisfied when the second input was a selection of a selectable user interface object corresponding to the second operation. In some embodiments, the second criterion is satisfied if the second operation is currently (e.g., remains) associated with the first hardware button. In some embodiments, the first criterion and the second criterion are mutually exclusive. In some embodiments, the first and/or second set of one or more criterion includes a criterion that is satisfied when the third input is detected while displaying a respective user interface. For example, the computer system only performs the first operation if an appropriate application (e.g., a camera application for a camera function) is open when the third input is detected. In some embodiments, if the third input is detected while displaying a different user interface, the computer system opens the respective user interface in response to the third input. In some embodiments, the first and/or second set of one or more criterion includes a criterion that is satisfied when the third input includes an input of a particular type, such as a press and/or a movement/gesture. In some embodiments, the first and/or second set of one or more criterion includes a criterion that is satisfied when the third input includes an input with particular characteristics, such as a press of a certain intensity (e.g., a light/partial press or a hard/full press), a press of a certain duration, a certain type of gesture, and/or a certain magnitude of gesture. In some embodiments, if the third input does not include an input of the particular type/characteristics, the computer system performs an operation other than the first operation, the second operation, and/or the one or more respective operations. Customizing an operation performed using a first input device, where the operation is customized by selecting from multiple available operations via a menu accessed by a gesture input starting from the first input device, provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, by providing users with a menu to customize the operations controlled by the first input device, the computer system reduces the number of display elements and/or inputs needed to control a wide variety of functionality (e.g., the available custom operations). Doing so also provides improved ergonomics of computer systems, for example, by expanding the controls available using a particular input device and reducing the need for users to move their hands back and forth between different user interface elements and/or input devices, which also reduces the overall number of hardware components needed for control (e.g., compared to mapping the first and second operation to different input devices), resulting in a more compact, lighter, and cheaper device. For example, a user can open the customization menu, select between multiple custom operations, and control the multiple custom operations operation using only inputs in the vicinity of the first input device. Opening the menu in response to a gesture input starting from the first input device also provides users with real-time feedback about a state of the computer system, namely, intuitively presenting information about the current operational capabilities of the first input device.

In some embodiments, the computer system displays, via the display generation component, a first user interface (e.g., 612 and/or 1046) (in some embodiments, a media capture user interface, such as a user interface for a camera application or a camera utility embedded within an application), wherein the first user interface is displayed while detecting the first input and while displaying the option user interface (e.g., 1006). For example, the option user interface is displayed within, near, and/or overlaying the user interface being displayed when the swipe from the first user interface is detected. In some embodiments, while displaying the option user interface (e.g., 1006) (e.g., in response to detecting the first input), the computer system reduces a visual prominence of the first user interface relative to a visual prominence of the option user interface (e.g., as illustrated in FIGS. 10C-10D and/or 10L). In some embodiments, the computer system fades, darkens, blurs, increases transparency of, shrinks, moves, and/or ceases display of one or more regions, selectable user interface objects, and/or other graphical elements in the first user interface such that the first user interface is deemphasized in comparison to the option user interface. In some embodiments, the computer system brightens, sharpens, increases opacity of, grows, and/or moves the option user interface such that the option user interface is emphasized in comparison to the first user interface. Reducing the visual prominence of another user interface while displaying the option user interface provides users with real-time feedback about a state of the computer system, which also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, deemphasizing other UI elements reduces visual clutter and draws attention to the option user interface, making it easier to view and customize controls associated with the first input device.

In some embodiments, reducing the visual prominence of the first user interface relative to the visual prominence of the option user interface includes ceasing displaying a first portion of (e.g., ceasing displaying one or more regions, selectable user interface objects, and/or graphical elements of) the first user interface in a first display region, wherein the option user interface is displayed in the first display region (e.g., as described with respect to FIG. 10C and/or 10L). For example, the option user interface is displayed in a cut-out and/or or opaque overlay of the first user interface, such as a tab and/or platter covering the first portion of the first user interface. In some embodiments, the computer system continues displaying a second portion of the first user interface in a second display region different from the first display region. For example, the option user interface cut-out or overlay only removes or obscures part of the first user interface. In some embodiments, the second portion of the first user interface is visually deemphasized in another way while continuing to be displayed, e.g., the portion of the first user interface outside of the first display region (e.g., the option user interface cut out) is faded and/or darkened while the option user interface is displayed. Ceasing displaying a portion of another user interface while displaying the option user interface provides users with real-time feedback about a state of the computer system, which also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, ceasing displaying a portion of the underlying user interface reduces visual clutter and draws attention to the option user interface, making it easier to view and customize controls associated with the first input device.

In some embodiments, reducing the visual prominence of the first user interface relative to the visual prominence of the option user interface includes fading (e.g., darkening, lightening, reducing contrast of, and/or increasing transparency of) a second portion of the first user interface (e.g., as illustrated in FIG. 10D) (e.g., one or more regions, selectable user interface objects, and/or graphical elements of the first user interface). In some embodiments, the second portion of the first user interface is the portion of the first user interface displayed outside of the first display region, e.g., the portion of the first user interface that is not removed/obscured by the option user interface cut-out. Fading portions of another user interface while displaying the option user interface provides users with real-time feedback about a state of the computer system, which also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, fading other UI elements reduces visual clutter and draws attention to the option user interface, making it easier to view and customize controls associated with the first input device.

In some embodiments, the first set of one or more criteria includes a press criterion that is satisfied when the third input includes a first press input (e.g., 1012, 1022, 1030, 1037, 1048, and/or 1056) directed to the first input device (e.g., as described with respect to FIGS. 10F-10G, 10J, 10N, 10O, 10Q-10R, 10U, and/or 6A-6AM). In some embodiments, the third input includes a first press input when the first input device detects at least a threshold intensity, e.g., detecting an applied pressure of at least 25 $g/cm^3$, 50 $g/cm^3$, 100 $g/cm^3$, 150 $g/cm^3$, or 200 $g/cm^3$ and/or detecting a corresponding mechanical state. For example, the computer system performs the first operation in response to a light/partial press and/or a full/hard press of the first input device. In some embodiments, the second set of one or more criteria also includes the press criterion. For example, the option user interface provides customization of operations corresponding to press inputs of the first input device. For example, the first operation includes toggling an option in response to a press input, and the second operation includes launching an application in response to a press input. Customizing an operation performed using a press input of the first input device provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, customizing the first input device to cause performance of the first operation in response to a press input reduces the number of display elements and/or inputs needed to perform the first operation.

In some embodiments, the first set of one or more criteria includes a movement criterion that is satisfied when the third input includes a movement input (e.g., 1014, 1016, 1022, 1024, 1030, 1032, 1037, 1038, 1050, and/or 1056) (e.g., a swipe, flick, drag, and/or other gesture) directed to the first input device (e.g., as described with respect to FIGS. 10G, 10J, 10N, 10O, 10R, 10U, 6A-6AM, and/or 14A-14Z). In some embodiments, the third input includes a movement input when the first input device detects at least a threshold amount of movement in a respective direction, e.g., across or above the surface of the first input device and along the edge of a display. In some embodiments, performing the first operation includes performing the first operation based on one or more characteristics of the movement input, e.g., magnitude, direction, speed, acceleration, duration, and/or intensity. For example, the first operation includes adjusting a parameter by an amount and in a direction corresponding to the magnitude and direction of movement along the edge of the display. In some embodiments, the second set of one or more criteria also includes the movement criterion. For example, the option user interface provides customization of operations corresponding to movement inputs on the first input device. For example, the first operation includes adjusting a zoom setting using input movement, and the second operation includes adjusting a filter setting using input movement. Customizing an operation performed using a movement input on the first input device provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, customizing the first input device to cause performance of the first operation in response to a movement input reduces the number of display elements and/or inputs needed to perform the first operation.

In some embodiments, the computer system detects a fourth input directed to the first input device (e.g., 1018, 1020, 1034, 1058, and/or 1060), wherein the fourth input does not satisfy the movement criterion (e.g., the fourth input is not a touch, press, and/or tap input without a movement component in the respective direction), and, in response to detecting the fourth input directed to the first input device, the computer system performs a respective (e.g., standard) operation (e.g., as described with respect to FIGS. 10H-10I and/or 10V). In some embodiments, the standard operation is different from the first operation and different from the second operation. In some embodiments, the standard operation is not included in the plurality of operations and/or does not correspond to one of the plurality of selectable user interface objects, e.g., the standard operation is different from the customizable functions. For example, performance of the standard operation using the first input device remains unchanged even as the operation selected by the second input changes (e.g., when either the first criterion or the second criterion is satisfied). Customizing an operation performed using a movement input on the first input device while performing a standard operation in response to a different input on the first input device provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, providing both a customizable function and a standard function by using different types of input via the first input device reduces the number of display elements and/or inputs needed to perform operations while also providing a wider variety of functionality, allowing the user to quickly switch between performing a custom function and performing a standard function without needing to move their hands between different user interface elements and/or input devices.

In some embodiments, the fourth input includes a second press input directed to the first input device or a first tap gesture directed to the first input device (e.g., 1018, 1020, 1034, 1058, and/or 1060). In some embodiments, the third input includes a second press input when the first input device detects at least a threshold intensity, e.g., detecting an applied pressure of at least 25 g/cm$^3$, 50 g/cm$^3$, 100 g/cm$^3$, 150 g/cm$^3$, or 200 g/cm$^3$ and/or detecting a corresponding mechanical state. For example, the computer system performs the standard operation in response to a light/partial press and/or a full/hard press of the first input device.

In some embodiments, performing the respective operation includes performing a media capture operation (e.g., as described with respect to FIGS. 10H-10I and/or 10V) (e.g., capturing photo media and/or video media, e.g., via one or more cameras). In some embodiments, the third set of criteria includes a criterion that is satisfied when the third input is detected while displaying a camera user interface, such as a user interface for a camera application and/or a user interface for a camera utility within another application (e.g., an embedded camera interface for a social media application). Customizing an operation performed using a movement input on the first input device while performing a standard operation in response to a tap or press input on the first input device provides improved control of computer system functionality without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, providing both a customizable function and a media capture function by using different types of input via the first input device reduces the number of display elements and/or inputs needed to perform operations and allows the user to quickly switch between performing a custom function (such as a media capture settings adjustment) and capturing media without needing to move their hands between different user interface elements and/or input devices.

In some embodiments, the first operation of the respective plurality of operations includes adjusting (e.g., changing) a first setting. In some embodiments, the first setting is a media capture setting, such as zoom, filter intensity, exposure, and/or simulated depth-of-field settings. In some embodiments, the second operation of the plurality of operations includes adjusting a second setting, different from the first setting. In some embodiments, the computer system displays, via the display generation component, a media capture user interface (e.g., 612 and/or 1044) (in some embodiments, a user interface for a camera application or a camera utility embedded within an application) that includes a representation of a field-of-view of one or more cameras (e.g., 614 and/or 1046) (e.g., a camera viewfinder, which displays a representation of the portion of the current field-of-view of one or more cameras of the computer system that will be included in a media capture), wherein the media capture user interface is displayed while detecting the third input, and, in response to detecting the third input directed to the first input device and while performing the first operation of the respective plurality of operations, the computer system displays, via the display generation component, an indicator of a current value of the first setting, wherein the indicator of the current value of the first setting is displayed overlaying (e.g., replacing and/or semi-transparently layering over) a portion of the representation of the field-of-view of the one or more cameras (e.g., as illustrated in FIGS. 6J-6T, 6W-6AA, 6AE-6AF, 6AI-6AM, 10F-10G, 10J-10K, 10N-10O, 10Q-10S, and/or 10U). In some embodiments, while performing the first operation, the computer system updates the appearance of the camera viewfinder based on the current value of the first setting, e.g., displaying a live preview of the changes to the setting. In some embodiments, while displaying the indicator of the current value of the first setting, the computer system updates the appearance of the indicator in response to adjustments made to the first setting, e.g., via the third input, via another input (e.g., adjusting the setting via displayed touch controls), and/or automatic adjustments. In some embodiments, after detecting an end of the third input, the computer system maintains display of the indicator of the current value of the first setting until either another input is detected or a threshold period of time elapses without further input (e.g., as described with respect to FIGS. 6A-7). In some embodiments, while performing the second operation of the respective plurality of operations, the computer system displays, via the display generation component, an indicator of a current value of the second setting overlaying at least a portion of the camera viewfinder. Displaying an indicator of a settings value overlaying a camera viewfinder while performing a custom operation to adjust the settings value provides users with improved visual feedback about a state of the computer system without cluttering the display, which assists the user with control of the computer system via the first input device. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, by overlaying the indicator of the settings value over the camera viewfinder when adjusting the setting using a hardware button, the computer system provides feedback on the results of the adjustment operations to the user without cluttering the camera user interface with additional displayed controls, which can distract from or obscure the camera viewfinder.

In some embodiments, while displaying the indicator of the current value of the first setting, the computer system detects a change in an appearance of the representation of the field-of-view of the one or more cameras (e.g., 614 and/or 1046) (in some embodiments, detecting a change in content within the camera viewfinder) within a respective display region that includes the portion of the representation of the field-of-view of the one or more cameras (e.g., the portion of the camera viewfinder overlaid by the indicator). In some embodiments, detecting the change in the appearance of the camera viewfinder includes determining (e.g., sampling, averaging, and/or otherwise analyzing) image data characteristics (e.g., brightness, hue, and/or contrast) of the portion of the field-of-view of the one or more cameras represented in the respective display region over time. In some embodiments, detecting the change in the appearance of the camera viewfinder includes determining that the appearance (e.g., the image data characteristics) has changed by at least a threshold amount (e.g., a 5%, 10%, and/or 50% change in average brightness) and/or has changed from one state to another state (e.g., the average hue has changed from red to green). In some embodiments, in response to detecting the change in the appearance of the representation of the field-of-view of the one or more cameras within the respective display region that includes the portion of the representation of the field-of-view of the one or more cameras, the computer system changes an appearance (e.g., color, brightness, luminosity, size, line weight, and/or border) of the indicator of the current value of the first setting based on the change in the appearance of the representation of the field-of-view of the one or more cameras within the respective display region that includes the portion of the representation of the field-of-view of the one or more cameras (e.g., as illustrated in FIG. 10U1). For example, changing the appearance of the indicator based on the change in the appearance of the media capture preview includes changing the appearance of the indicator to increase visual prominence of the indicator relative to the appearance of the camera viewfinder within the respective display region. For example, in accordance with a determination that the contents of the camera viewfinder darkened behind the indicator, the computer system changes the indicator to be brighter (e.g., more white content), and in accordance with a determination that the contents of the camera viewfinder lightened behind the indicator, the computer system changes the indicator to be darker (e.g., more black content) or to be displayed with increased luminosity. Adjusting the appearance of the indicator of the settings value based on the appearance of the camera viewfinder underlying the indicator provides improved visual feedback about a state of the computer system without cluttering the display, which assists the user with control of the computer system via the first input device. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, adjusting the appearance of the indicator improves the visibility of the indicator to the user even as the contents of the camera viewfinder change.

In some embodiments, the first set of one or more criteria includes a third criterion that is satisfied when the third input is detected while displaying, via the display generation component, a first user interface of a first application (e.g., 612) or a second user interface of a second application different from the first application (e.g., 1046). In some embodiments, the second set of one or more criteria also includes the third criterion, e.g., two or more of the respective plurality of operations can be performed via the first input device in multiple different user interfaces. In some embodiments, the first user interface is associated with a first application (e.g., a media capture user interface for a camera application) and the second user interface is associated with a second application different from the first application (e.g., an embedded camera user interface within a social media application). In some embodiments, the first application and the second application are created by different developers, managed by different entities, and/or distributed as separate products. For example, the first application may be a first-party camera application for a mobile device, and the second application may be a third-party social media application with embedded camera functionality. In some embodiments, the third criterion is satisfied when the third input is detected while displaying any one of a predetermined plurality of user interfaces/applications. For example, the customizable operations include adjustments to media capture settings (e.g., zoom, exposure, simulated depth-of-field effects, focus, filters, and/or other media capture options/parameters) that can be performed via the first input device in a variety of compatible media capture applications and/or user interfaces, such as a dedicated camera application and an embedded media capture user interface in a social media, messaging, and/or creative application. Customizing an operation to be performed via the first input device in multiple different user interfaces and/or applications provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, after selecting a custom operation via the option user interface, the first input device can be used to quickly and easily perform the custom operation across different applications and user interfaces.

In some embodiments, performing the first operation includes, changing a first property of (e.g., adjusting) a first set of data (e.g., as described with respect to FIGS. 10G, 10J, 10N, 10O, 10R, 10U, FIGS. 6A-6AM, and/or 14A-14Z) (in some embodiments, the first set of data includes a live data feed, e.g., a camera feed and/or another sensor data feed), wherein the first set of data is provided as an input to the first user interface of the first application (e.g., while displaying the first user interface) and the first set of data is provided as an input to the second user interface of the second application (e.g., while displaying the second user interface). For example, performing the first operation includes adjusting a property (e.g., zoom, exposure, simulated depth-of-field effect, focus, and/or filtering) of a camera feed used by multiple different applications/user interfaces. In some embodiments, performing the second operation includes changing a second property, different from the first property, of the first set of data. For example, the first operation changes a zoom level and the second operation changes an exposure level for a camera feed shared by multiple different applications/user interfaces. Customizing an operation adjusting a property of input data shared between different applications/user interfaces to be performed via the first input device provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, by adjusting the data being input to the different user interfaces/applications, performing the first operation with the first input device produces predictable and intuitive adjustments across the computer system without requiring the different user interfaces/applications to separately adjust the property.

In some embodiments, performing the first operation includes performing a first media capture operation (e.g., as described with respect to FIGS. 10G, 10J, 10N, 10O, 10R, 10U, FIGS. 6A-6AM, and/or 14A-14Z) (e.g., adjusting a capture setting, enabling or disabling a media capture feature, and/or changing a media capture state/mode). In some embodiments, performing the second operation includes performing a second media capture operation different from the first media capture operation. In some embodiments, performing the media capture operation is based on one or more characteristics of the third input, such as the movement (e.g., magnitude, speed, and/or direction), location, intensity, and/or duration of the input. Customizing a media capture operation to be performed using the first input device provides improved control of computer system functionality without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, using the first input device to perform a custom media capture operation reduces the number of display elements and/or inputs needed to perform the media capture operation, allowing for faster and less distracting control of media capture.

In some embodiments, performing the first media capture operation includes adjusting a zoom setting for media capture (e.g., as described with respect to FIGS. 10O, 10R, 6L-6S, 6X, 6Z, and/or 14P-14Z). In some embodiments, adjusting the zoom includes adjusting an optical zoom level (e.g., changing between lenses of different magnifications) and/or a digital zoom level (e.g., zooming in or out on camera data captured with a given lens), e.g., as described with respect to FIGS. 6A-7. In some embodiments, the first set of one or more criteria includes a movement criterion (e.g., that is satisfied when the third input includes a movement input, such as a swipe, flick, drag, and/or other gesture directed to the first input device), and adjusting the zoom level includes adjusting the zoom level based on the magnitude, direction, speed, and/or location of the movement.

In some embodiments, performing the first media capture operation includes adjusting a simulated depth-of-field setting for media capture (e.g., as described with respect to FIGS. 6AE-6AF and/or 10N) (e.g., a setting for simulating capture with a particular focal length (f-stop) by selectively blurring portions of a media capture that would not be in focus (e.g., would be outside of the depth-of-field) when captured using a lens with the particular focal length), e.g., as described with respect to FIGS. 6A-7. In some embodiments, changing the simulated depth-of-field setting includes changing the simulated focal length (f-stop), e.g., from f/1.8 to f/8.4. In some embodiments, changing the simulated depth-of-field setting includes enabling or disabling displaying simulated depth-of-field effects, e.g., in a media capture preview and/or when viewing captured media. In some embodiments, changing the simulated depth-of-field setting includes enabling or disabling capture of depth information with a media capture.

In some embodiments, performing the first media capture operation includes adjusting an exposure setting for media capture (e.g., as described with respect to FIGS. 10G, 10J, 10U, and/or 14C-14O). In some embodiments, adjusting an exposure setting includes simulating different camera exposure times, shutter speeds, aperture sizes, and/or ISO speeds for media capture, e.g., as described with respect to FIGS. 6A-7. In some embodiments, performing the first media capture operation includes adjusting a filter setting for media capture (e.g., as described with respect to FIGS. 6AI-6AK) (e.g., an adjustment to and/or overlay of media capture, such as filters for color grading, tone adjustment, blurring, smoothing, vignetting, noise reduction, and/or applying other visual and/or audio effects, e.g., as described with respect to FIGS. 6A-7). In some embodiments, adjusting the filter setting includes changing the type of filter being applied to the media capture. In some embodiments, changing the filter setting includes changing the intensity of a filter being applied.

In some embodiments, the computer system detects an additional set of one or more inputs directed to the first input device (e.g., 1002 and/or 609), and, in response to detecting the additional set of one or more inputs and in accordance with a determination that the additional set of one or more inputs satisfies a set of launch criteria, the computer system displays, via the display generation component, a respective camera user interface (e.g., 612 and/or 1046; e.g., as described with respect to FIGS. 10A-10B and/or 6D-6E) (in some embodiments, launching (e.g., opening and/or displaying) a camera application or user interface; in some embodiments, a camera application/UI included in a set of available camera user interfaces; in some embodiments, a default camera application/UI), wherein the set of launch criteria includes a criterion that is satisfied when a first input element is activated (in some embodiments, the first input element is activated based on an input intensity exceeding a particular intensity threshold) while the computer system is not displaying, via the display generation component, a camera user interface (e.g., 612 and/or 1046) (e.g., a user interface for media capture, such as a camera application or a social media application with camera functionality; in some embodiments, any camera user interface included in a set of available camera user interfaces). For example, the computer system displays, surfaces, and/or launches a camera interface in response to press inputs detected while the camera interface is not already displayed, active, and/or running. In some embodiments, the computer system will open a particular camera application if the particular camera application is not already open. In some embodiments, the computer system will open the particular camera application unless any camera application is already open. In some embodiments, the set of launch criteria includes a criterion that is satisfied when the first input element is activated while the computer system is displaying a non-camera user interface (e.g., a home screen, a lock screen, a UI for an application that does not include a camera UI, and/or a non-camera UI for an application that does include a camera UI). In some embodiments, the first set of one or more criteria and the second set of one or more criteria both include a criterion that is met when a respective camera user interface is displayed when detecting the third input (e.g., the first set of one or more criteria and the second set of criteria are not satisfied if the launch criterion is satisfied). For example, while the camera user interface is not open or displayed, the computer system launches the camera user interface in response to a press input of the first input device, and while the camera user interface is displayed, the computer system performs custom media capture operations using the first input device. Launching a camera user interface in response to press inputs detected while the camera user interface is not displayed provides improved control of media capture without cluttering the user interface with additional displayed controls. Doing so also assists the user with composing media capture events and reduces the risk that transient media capture opportunities are missed, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the user can launch the camera user interface then quickly perform custom operations in the camera user interface via the first input device, without needing to move their hands and/or change input mode.

In some embodiments, the computer system detects a fourth input directed to the first input device (e.g., 1018, and/or 1058), wherein the fourth input includes a fourth press input directed to the first input device; in some embodiments, the fourth input includes a first press input when the first input device detects at least a threshold intensity, e.g., detecting an applied pressure of at least 25 g/cm$^3$, 50 g/cm$^3$, 100 g/cm$^3$, 150 g/cm$^3$, or 200 g/cm$^3$ and/or detecting a corresponding mechanical state. In some embodiments, in response to detecting the fourth input directed to the first input device and in accordance with a determination that the fourth input directed to the first input device is detected while displaying a user interface of a first camera application (e.g., 612), the computer system performs a media capture operation using the first camera application (e.g., without performing a camera operation using the second camera application) (e.g., as described with respect to FIGS. 10H-10I) (in some embodiments, capturing, initiating capturing, and/or stopping capturing photo and/or video media). In some embodiments, in response to detecting the fourth input directed to the first input device and in accordance with a determination that the fourth input directed to the first input device is detected while displaying a user interface of a second camera application (e.g., 1046), the computer system performs the media capture operation (e.g., as described with respect to FIGS. 10V-10U). For example, the computer system performs a media capture operation in response to a press input detected both in a media capture user interface for a camera application and in an embedded camera user interface within a social media application, and or while displaying any one of a predetermined plurality of camera user interfaces/applications. In some embodiments, if none of the camera user interfaces/applications are displayed, the computer system displays the camera user interface in response to a press input. Using the first input device to perform media capture operations in multiple different camera applications/user interfaces provides improved control of computer system functionality without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, performing the media capture operation in different user interfaces/applications with the first device provides intuitive and predictable control of media capture across the computer system.

In some embodiments, displaying the option user interface (e.g., 1006) including the plurality of selectable user interface objects corresponding to the respective plurality of operations that can be associated with the first input device includes, in accordance with a determination that the first input is detected while displaying, via the display generation component, the user interface of the first camera application (e.g., 612), displaying a first selectable user interface object corresponding to a first operation that can be associated with the first input device (e.g., as illustrated in FIGS. 10C-10D and/or 10L). In some embodiments, displaying the option user interface (e.g., 1006) including the plurality of selectable user interface objects corresponding to the respective plurality of operations that can be associated with the first input device includes, in accordance with a determination that the first input is detected while displaying, via the display generation component, the user interface of the second camera application (e.g., 1046), the computer system foregoes displaying the first selectable user interface object corresponding to the first operation that can be associated with the first input device (e.g., as described with respect to FIG. 10T). For example, when accessed in a default camera application, the option user interface includes options to associate zoom adjustment, exposure adjustment, simulated depth-of-field setting adjustment, and filter adjustment operations with the first input device, and when accessed in an embedded camera user interface of a social media application, the option user interface includes the options to associate zoom adjustment, exposure adjustment, and simulated depth-of-field setting adjustment operations with the first input device, but not the option to associate the filter adjustment operation with the first input device. For example, different subsets of available operations can be associated with the first input device in different applications. Providing the menu for selecting a custom operation for the first input device in different user interfaces/applications, where different custom operation options are provided in the different user interfaces/applications, provides improved computer system functionality without cluttering the user interface with additional displayed controls. Doing so also provides users with real-time feedback about a state of the computer system, which also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, different custom operation options can be provided based on what is relevant to and/or compatible with the current user interface/application, which also intuitively indicates to the user what customization options are available in a particular context.

In some embodiments, in response to detecting the third input directed to the first input device and in accordance with a determination that a respective set of one or more criteria is satisfied, the computer system performs a respective operation different from the first operation and different from the second operation (e.g., as described with respect to FIGS. 10H, 10N-10O, and/or 10V). In some embodiments, the respective operation is not included in the respective plurality of operations that can be associated with the first input device via the option user interface), e.g., the respective operation is an operation other than the customizable operations. For example, the respective operation includes initiating a media capture (e.g., capturing photo media and/or initiating capturing video media). In some embodiments, in accordance with a determination that the respective set of one or more criteria is not satisfied, the computer system performs the first operation (e.g., if the first set of one or more criteria is satisfied), the second operation (e.g., if the second set of one or more criteria is satisfied), a different operation than the first operation, second operation, and respective operation, and/or foregoes performing an operation. In some embodiments, the respective set of one or more criteria includes a respective criterion that is satisfied when the third input directed to the first input device is a press input of a respective type (e.g., a hard/full press and/or a press without movement). In some embodiments, if the respective criterion is satisfied, the first set of one or more criteria and the second set of one or more criteria are not satisfied (e.g., the computer system does not perform the first operation and/or second operation in response to press inputs of the respective type). In some embodiments, the respective set of one or more criteria does not include the first criterion or the second criterion (e.g., the computer system performs the respective operation without regard to whether the first input device is configured to perform a first operation or a second operation) (e.g., the respective set of one or more criteria can be satisfied whether the respective selectable user interface object that was selected by the second input corresponds to the first operation, the second operation, and/or another operation of the respective plurality of operations). In some embodiments, the respective set of one or more criteria includes a criterion that is satisfied when the third input is detected while displaying a respective user interface. For example, the computer system optionally only performs the respective operation if an appropriate application (e.g., a camera application for a camera function) is open when the third input is detected. Performing an operation other than the customizable operations in response to a particular type of press input detected by the first input device provides improved control of computer system functionality without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, using the particular type of press input to perform a consistent operation, regardless of which customizable operation is currently associated with the hardware button, expands the functionality available to the user via the hardware button without sacrificing its customizability. Doing so also provides improved ergonomics of computer systems, for example, by expanding the controls available using a particular input device and reducing the need for users to move their hands back and forth between different user interface elements and/or input devices, which also reduces the overall number of hardware components needed for control (e.g., compared to mapping the first and second operation to different input devices), resulting in a more compact, lighter, and cheaper device.

In some embodiments, the computer system detects a press input directed to the first input device (e.g., 1002, 1012, 1018, 1022, 1030, 1037, 1048, 1056, and/or 1058). In some embodiments, in response to detecting the press input and in accordance with a determination that a user interface for a camera application (e.g., 612 and/or 1046) (e.g., a respective camera user interface/application of a plurality of camera user interfaces/applications associated with the first input device) was not displayed when the press input (e.g., 1002) was detected, displaying a user interface for a default camera application (e.g., as described with respect to FIGS. 10A-10B) (e.g., without performing an operation corresponding to the default camera application); in some embodiments, the user interface for the default camera application is included in the plurality of camera user interfaces/applications associated with the first input device. In some embodiments, in response to detecting the press input and in accordance with a determination that a user interface for a first camera application was displayed when the press input (e.g., 1012, 1018, 1022, 1030, 1037, 1048, 1056, and/or 1058) was detected, the computer system performs an operation corresponding to the first camera application (e.g., as described with respect to FIGS. 10F-10J, 10N, 10O, 10Q-10R, 10U, and/or 10Q). In some embodiments, in response to detecting the press input, in accordance with a determination that a user interface for a second camera application (e.g., that is different from the first camera application) was displayed when the press input was detected, performing an operation corresponding to the second camera application (e.g., without displaying the user interface for the first camera application or performing the operation corresponding to the first camera application). In some embodiments, in response to detecting the press input, in accordance with a determination that a user interface for a third camera application (e.g., that is different from the first camera application and the second camera application) was displayed when the press input was detected, performing an operation corresponding to the third camera application (e.g., without displaying the user interface for the first camera application or performing the operation corresponding to the first camera application, without displaying the user interface for the second camera application or performing the operation corresponding to the second camera application). In some embodiments the first camera application is the default camera application. In some embodiments the second camera application is the default camera application. In some embodiments, the third camera application is the default camera application. Launching a default camera user interface in response to press inputs detected while a camera user interface is not displayed and performing a media capture operation in response to press inputs detected while a camera application is displayed provides improved control of media capture without cluttering the user interface with additional displayed controls. Doing so also assists the user with composing media capture events and reduces the risk that transient media capture opportunities are missed, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the user can quickly launch and control the default camera user interface by pressing the first input device, without needing to move their hands and/or change input mode, while also being able to control other camera user interfaces by pressing the first input device (e.g., without opening the default camera user interface).

In some embodiments, displaying the user interface for the default camera application includes, in accordance with a determination that a user has selected the first camera application as the default camera application, displaying the user interface for the first camera application (e.g., 612), and, in accordance with a determination that the user has selected a second camera application, different from the first camera application as the default camera application, displaying the user interface for the second camera application (e.g., 1046). In some embodiments, the user selection of the default camera user interface is received via a settings user interface for the first input device, such as a menu including available and/or compatible camera applications and user interfaces. In some embodiments, the user selection of the default camera user interface is included in a user profile, e.g., a user's favorited or preferred camera application or user interface. For example, the user can select the camera user interface that will be opened by default in response to a press from the plurality of camera user interfaces that can be opened and controlled using the first input device. Launching a camera user interface specified by a user in response to a press input while a camera user interface associated with the first input device is not displayed provides improved control of media capture without cluttering the user interface with additional displayed controls. Doing so also assists the user with composing media capture events and reduces the risk that transient media capture opportunities are missed, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the user can quickly launch and control the camera user interface of their choice by pressing the first input device, without needing to move their hands and/or change input mode.

Figure 18J:
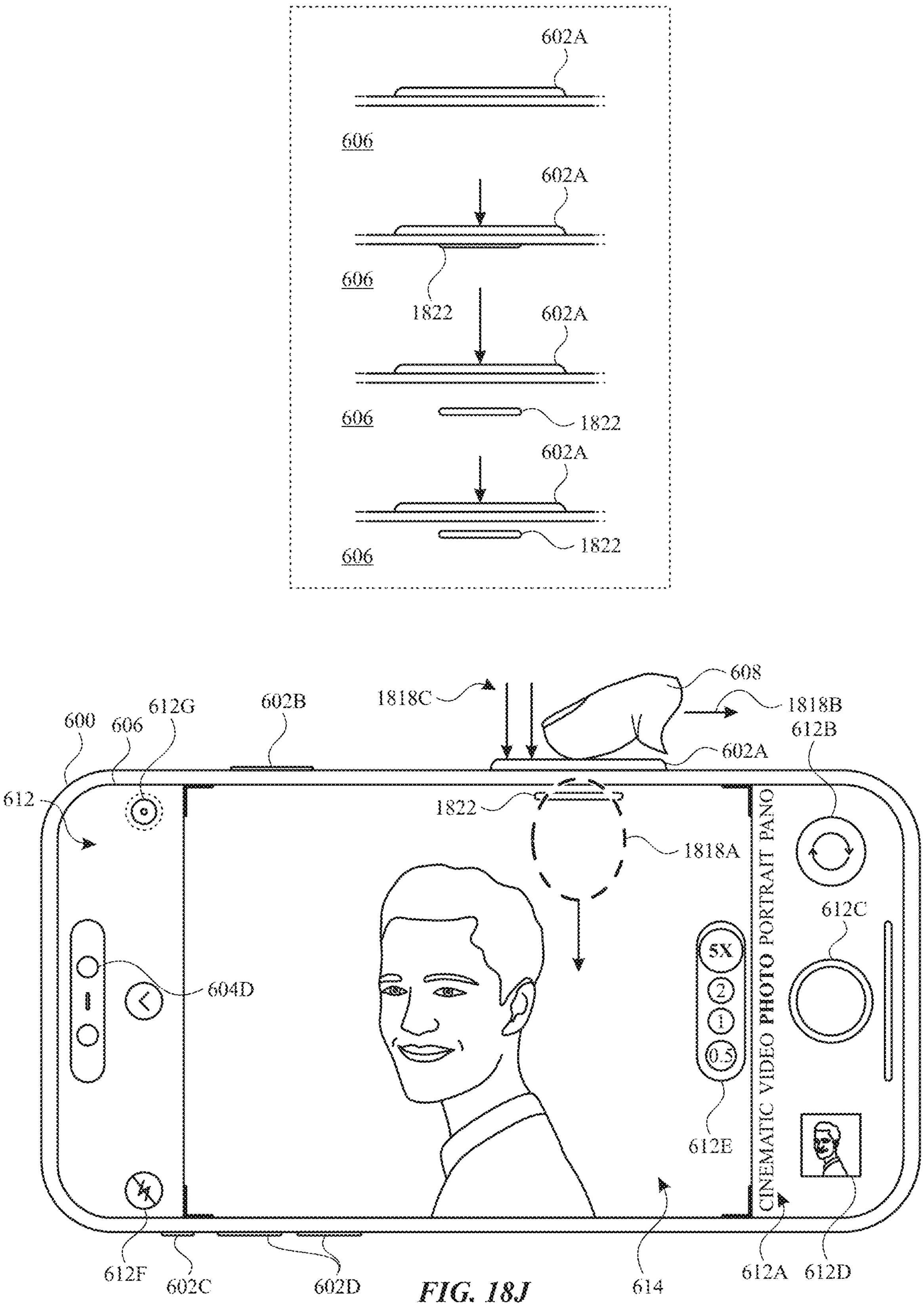
Figure 18K:
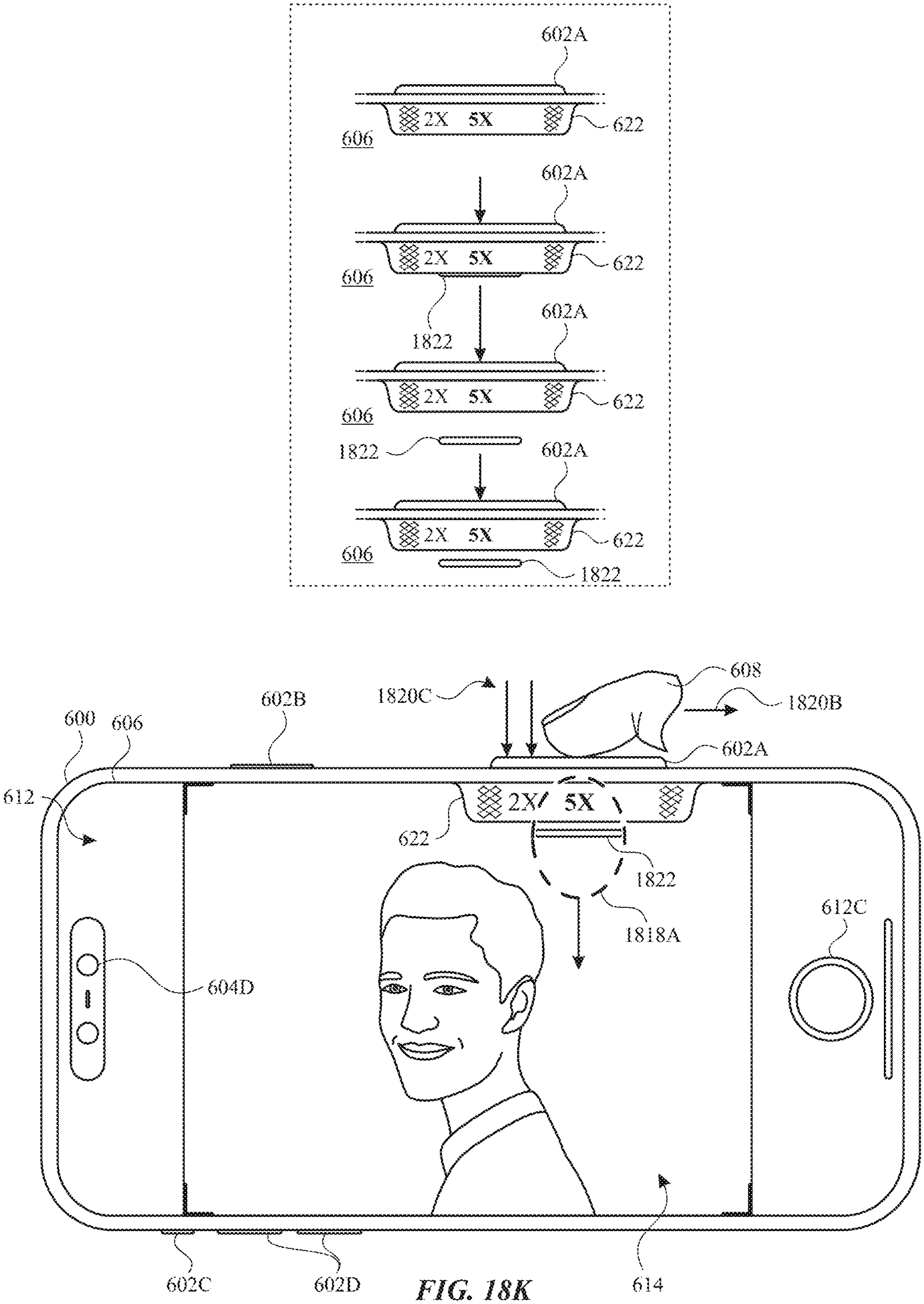
Figure 18L:
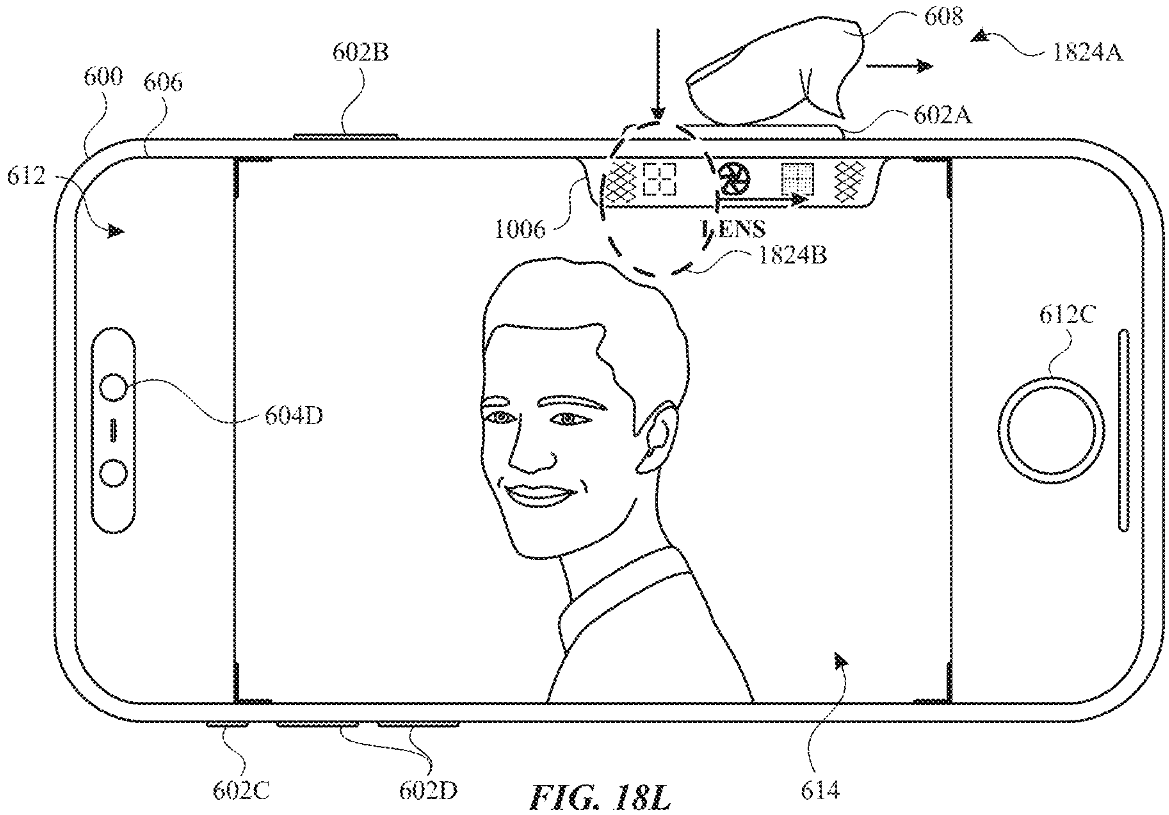
Figure 18M:
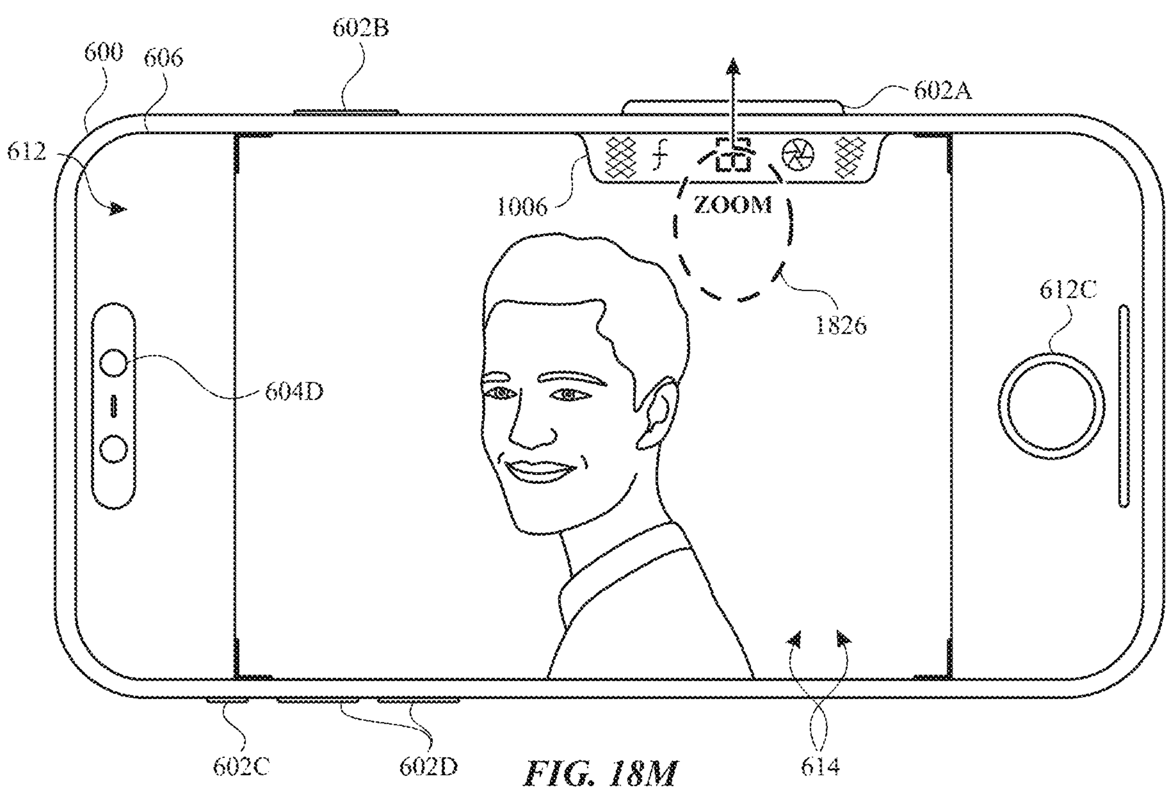

In some embodiments, the computer system detects, via the first input device, a respective input at the first input device (e.g., an input physically contacting the first input device), and, in response to detecting the respective input at the first input device and in accordance with a determination that the respective input at the first input device satisfies a respective set of one or more criteria (e.g., prompt-display criteria) that includes a requirement (e.g., based on one or more criteria) that the respective input be maintained (e.g., with less than a threshold amount of movement, with less than a threshold amount of intensity, and/or less than a threshold amount of change in intensity) for more than a threshold amount of time (e.g., 0.1, 0.2, 0.25, 0.5, 1, 3, or 5 s) in order for the respective set of one or more criteria to be satisfied, the computer system displays, via the display generation component, a prompt (e.g., 1822) to provide additional input to display one or more controls (e.g., 622 and/or 1006) for adjusting a function of the first input device (e.g., as illustrated in FIGS. 18J-18K) (e.g., a hint of the gesture input that can be used to display the options user interface such as a movement input that starts at or near a location of the prompt and moves away from the first input device). In some embodiments, the indication of the movement is displayed at a hint location corresponding to the first input device (e.g., a location near the first input device). In some embodiments, the hint location is between the first location and the second location, e.g., that the indication of the movement is displayed in the path of the movement such that the user swipes across the hint location to display the option user interface. In some embodiments, the respective set of one or more criteria (e.g., prompt-display criteria) include a first criterion that is satisfied when the contact input is detected while the option user interface is not displayed. Displaying an indication of a movement used to invoke the option menu for customizing the first input device if detected contact with the first input device lasts longer than a threshold duration provides improved feedback on a state of the computer system without cluttering the user interface with additional displayed controls, which also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the indication provides the user with feedback on available functionality of the hardware button (e.g., the customizability) when the user rests or hesitates on the hardware button, but not if the user is providing another input via the hardware button or merely contacts the hardware button incidentally.

In some embodiments, while displaying the option user interface (e.g., 1006) (e.g., a user interface that indicates a current operation that has been selected of the plurality of operations to be controlled by inputs directed to the first input device), the computer system detects (e.g., via the first input device and/or via a second input device, such as a touch-sensitive surface located adjacent to the first input device) a first movement input (e.g., 1826) that includes movement (e.g., across a touch-sensitive display that is displaying the option user interface) toward a location of the first input device (e.g., a movement that starts at a third location and ends at a fourth location corresponding to the first input device, wherein the third location is farther from the first input device than the fourth location). In some embodiments, a direction of the movement that starts at the third location and ends at the third location is different than (e.g., at least partially opposite to) a direction of the movement that starts at the first location and ends at the second location. For example, the movement that starts at the first location and ends at the second location is a gesture input swiping away from the first input device towards the center of the touch-sensitive surface, and the movement that starts at the third location and ends at the fourth location is a gesture input swiping towards the edge of the touch-sensitive surface near the first input device. In some embodiments, the first location and the fourth location are both within a first region (e.g., a region of the touch-sensitive display near the first input device), and the second location and the third location are both within a second region different from the first region (e.g., a region of the touch-sensitive display that is closer to the center of the display than the first region). In some embodiments, in response to detecting the first movement input, the computer system ceases displaying at least a portion of the option user interface (e.g., as described with respect to FIGS. 18M-18N) (e.g., ceasing to display some or all of the option user interface). Dismissing the customizable operation menu in response to a gesture input moving towards the first input device (e.g., an inverse movement to the movement used to invoke the menu) provides users with real-time feedback about a state of the computer system without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems, for example, by reducing the need for users to move their hands back and forth between different user interface elements and/or input devices. For example, once the user finishes selecting a customizable operation to associate with a hardware button, the user can intuitively dismiss the menu for customization, which confirms to the user that the hardware button association has been set, without moving their hands away from the hardware button, allowing the user to intuitively and efficiently transition to controlling the selected customizable operation via the hardware button.

In some embodiments, in response to detecting the first movement input, the computer system displays an operation user interface (e.g., 622) for a respective operation of the plurality of operations that can be associated with the first input device (e.g., a user interface that indicates a current status of an operation of the plurality of operations, where the current status can be controlled by inputs directed to the first input device). For example, the operation user interface is a settings control affordance or indicator, such as a menu, slider, gauge, and/or wheel, as described with respect to FIGS. 6A-7 and/or 14A-15. In some embodiments, while displaying the operation user interface (e.g., 622), the computer system detects a second movement input (e.g., 1832) that includes movement (e.g., across a touch-sensitive display that is displaying the operation user interface) toward a location of the first input device (e.g., movement that starts at a fifth location and ends at a sixth location corresponding to the first input device, wherein the fifth location is farther from the first input device than the sixth location). In some embodiments, a direction of the movement that starts at the fifth location and ends at the sixth location is at least partially the same as a direction of the movement that starts at the third location and ends at the fourth location. In some embodiments, a direction of the movement that starts at the fifth location and ends at the sixth location is different than (e.g., at least partially opposite to) a direction of the movement that starts at the first location and ends at the second location. For example, the movement that starts at the first location and ends at the second location is a gesture input swiping away from the first input device towards the center of the touch-sensitive surface, and the movement that starts at the fifth location and ends at the sixth location is a gesture input swiping towards the edge of the touch-sensitive surface near the first input device. In some embodiments, the first location, fourth location, and sixth are all within a first region (e.g., a region of the touch-sensitive display near the first input device), and the second location, third location, and fifth location are all within a second region different from the first region (e.g., a region of the touch-sensitive display that is closer to the center of the display than the first region). In some embodiments, in response to detecting the second movement input, the computer system ceases displaying at least a portion of the operation user interface (e.g., as illustrated in FIGS. 18O-18P) (e.g., ceasing to display some or all of the operation user interface). In some embodiments, while displaying the operation user interface, in response to detecting a third movement input that starts at one location corresponding to the first input device and ends at another location corresponding to the first input device, the computer system performs the respective operation, e.g., adjusting a setting based on the third movement input, as described with respect to FIGS. 6A-7 and/or 14A-15. For example, the third movement input is a gesture swiping laterally along the edge of the touch-sensitive display near the first input device, while the second movement input is a gesture swiping outwards towards the first input device. In some embodiments, in response to detecting a movement input that starts at one location corresponding to the first input device and ends at another location corresponding to the first input device while the operation user interface is not being displayed, the computer system foregoes performing the respective operation. Displaying an operation user interface for a customizable operation associated with a first input device in response to an input dismissing a menu used to select the customizable operation, which can then be dismissed with the same input used to dismiss the menu, provides users with real-time feedback about a state of the computer system without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems, for example, by reducing the need for users to move their hands back and forth between different user interface elements and/or input devices. For example, once the user finishes selecting a customizable operation to associate with a hardware button and dismisses the menu for customization, displaying the user interface for the associated customizable operation confirms to the user that the hardware button association has been set and allows the user to intuitively and efficiently transition to controlling the selected customizable operation, while also allowing the user to efficiently and intuitively dismiss the controls for the selected customizable operation.

In some embodiments, performing the first operation of the respective plurality of operations includes, in accordance with a determination that the third input directed to the first input device satisfies light press criteria (e.g., as described with respect to 616, 630, 1012, and/or 1836), the computer system displays, via the display generation component, a control user interface (e.g., 622) for the first operation (e.g., as described with respect to FIGS. 6I-6J, 6W, 10F, and/or 18Q-18R), wherein the light press criteria include a criterion that is satisfied when the third input includes a press that reaches a first intensity threshold (e.g., an activation intensity threshold; in some embodiments, a force or pressure threshold, e.g., 25 g/cm$^3$, 50 g/cm$^3$, or 100 g/cm$^3$; in some embodiments, a threshold mechanical state corresponding to the first intensity threshold, e.g., detecting physical depression of a mechanical button to a light/partial press state as a substitute measurement for force/pressure) without reaching a second intensity threshold (e.g., a hard/full press threshold; in some embodiments, a force or pressure threshold, e.g., 100 g/cm$^3$, 150 g/cm$^3$, or 200 g/cm$^3$; in some embodiments, a threshold mechanical state corresponding to the second threshold intensity) that is higher than the first intensity threshold (e.g., the third input includes a light/partial press input). In some embodiments, performing the second operation of the respective plurality of operations includes, in accordance with a determination that the third input directed to the first input device satisfies the light press criteria, displaying, via the display generation component, a control user interface for the second operation (e.g., the computer system displays controls for the selected customizable function in response to a light/partial press) (e.g., as described with respect to FIGS. 6A-7). In some embodiments, the light press criteria include a criterion that is satisfied when the respective intensity exceeds a lower threshold intensity, e.g., an activation intensity threshold. In some embodiments, the light press criteria include a criterion that is satisfied when the light/partial press is a single light/partial press, e.g., when the light/partial press is maintained for over a threshold period of time and/or when a second light/partial press is not detected within a threshold period of time after the first light/partial press is released. Displaying a user interface for a customizable operation associated with a first input device in response to a light or partial press input of the first input device provides users with real-time feedback about a state of the computer system without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, providing users with controls for the customizable function associated with a hardware button in response to a light or partial press input assists the user with controlling the customizable function via the hardware button and improves ease of providing additional inputs, such as movement inputs, via the hardware button (e.g., without needing to change intensity).

In some embodiments, the option user interface (e.g., 1006) is not displayed when the third input is detected. In some embodiments, in response to detecting the third input directed to the first input device and in accordance with a determination that the third input directed to the first input device satisfies multiple-press criteria (e.g., as described with respect to 1820C), the computer system displays, via the display generation component, the option user interface (e.g., as described with respect to FIGS. 18K-18J), wherein the multiple-press criteria include a requirement that a plurality of press inputs were detected at the first input device within a threshold amount of time in order for the multiple press criteria to be satisfied. In some embodiments, the multiple-press criteria include a first multiple-press criterion that is satisfied when the third input includes a first press input with a first intensity that does not exceed an upper threshold intensity (e.g., a first light/partial press) and a second multiple-press criterion that is satisfied when the third input includes a second press input with a second intensity that does not exceed the respective threshold intensity (e.g., a second light/partial press), wherein the second press is detected within a threshold time after detecting the first intensity fall below a lower threshold intensity, wherein the lower threshold intensity is lower than the upper threshold intensity (e.g., the third input includes a double light/partial press, where a second light/partial press is detected quickly after a first light/partial press is released). In some embodiments, the multiple-press criteria include one or more criteria in common with the light press criteria, e.g., taken individually, the first press input and the second press input are light/partial presses. In some embodiments, the light press criteria are not satisfied if the second multiple-press criterion is satisfied, e.g., the light press criteria are satisfied by a single light/partial press input but not a double light/partial press input. In some embodiments, in accordance with a determination that the third input directed to the first input device does not satisfy the multiple-press criteria, the computer system foregoes displaying the option user interface in response to the third input. Displaying a menu used to select a customizable operation to associate with a first hardware button in response to a double press input on the first hardware button provides users with real-time feedback about a state of the computer system without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems, for example, by reducing the need for users to move their hands back and forth between different user interface elements and/or input devices. For example, displaying the customization menu in response to a double press input on the first hardware button allows the user to intuitively and efficiently transition between using the first hardware button to control the customizable operation and customizing the operation, informs the user of the wide variety of functionality and provides the user with access to said functionality without the user needing to move their finger off of the first hardware button.

In some embodiments, the computer system detects a fifth input directed to the first input device (e.g., 616A, 1818B, and/or 1820B), and, in response to detecting the fifth input directed to the first input device and in accordance with a determination that the fifth input directed to the first input device satisfies swipe criteria including a swipe criterion that is satisfied when the fifth input includes more than a threshold amount of movement along the first input device, the computer system displays, via the display generation component, a control (e.g., 622 and/or 1006) for adjusting a function associated with the first input device (e.g., as described with respect to FIGS. 6G-6J and/or 18J-18K). (e.g., a control for selecting which operation is associated with the first input device and/or a control for adjusting a parameter of an operation that is currently associated with the first input device) In some embodiments, the function associated with the first input device is the first operation (e.g., in accordance with a determination that the first operation is associated with the first input device, e.g., via the option user interface), the second operation (e.g., in accordance with a determination that the second operation is associated with the first input device), and/or another operation of the respective plurality of operations. For example, the control is a zoom control, exposure control, filter control, depth-of-field control, and/or lens selection control. In some embodiments, the swipe criteria include a criterion that is satisfied when the fifth input includes a movement that starts a first location on a surface (e.g., a touch-sensitive surface) of the first input device and ends at a second location, different from the first location, on the surface of the first input device. In some embodiments, the swipe criteria include a criterion that is satisfied when the magnitude of the movement exceeds a threshold amount (e.g., a swipe of at least a predetermined portion of the length of the first input device, such as a swipe traveling 25%, 50%, 70%, 90%, or 99% of the length of the button surface). In some embodiments, the swipe criteria include a criterion that is satisfied when the movement is a movement in a particular direction (e.g., along a particular axis of the button, such as the axis running parallel to the edge of the display, and/or in a specific direction along that axis, such as a swipe moving towards the cameras). Displaying a menu used to select a customizable operation to associate with a first hardware button in response to a swipe input on the first hardware button provides users with real-time feedback about a state of the computer system without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems, for example, by reducing the need for users to move their hands back and forth between different user interface elements and/or input devices. For example, displaying the customization menu in response to a swipe input on the first hardware button allows the user to intuitively and efficiently transition between using the first hardware button to control the customizable operation and customizing the operation, informs the user of the wide variety of functionality and provides the user with access to said functionality without the user needing to move their finger off of the first hardware button.

In some embodiments, the second input selecting the respective selectable user interface object of the plurality of selectable user interface objects includes an input directed to a location of the respective selectable user interface object on a touch-sensitive surface of the display generation component (e.g., 1008, 1028, 1028, 1054, and/or 1824B) (e.g., a touch input on the touch-sensitive display, such as a tap or gesture input). Selecting a customizable operation to associate with a first hardware button in response to an input directed to the option menu makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the user can swipe to open the option menu and then quickly tap in the same region to select a customizable operation to associate with a first hardware button.

In some embodiments, the second input selecting the respective selectable user interface object of the plurality of selectable user interface objects includes an input (e.g., 1824) directed to the first input device (e.g., as described with respect to FIGS. 10C-10D), and the input directed to the first input device satisfies press criteria (e.g., hard/full press criteria or light/partial press criteria). In some embodiments, the light press criteria include a criterion that is satisfied when the input directed to the first input device includes a press with a characteristic intensity that reaches a first intensity threshold without reaching a second intensity threshold that is higher than the first intensity threshold. Selecting a customizable operation to associate with a first hardware button in response to a light or partial press input directed to the first hardware button makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the user can use the hardware button to select the customizable function, then quickly transition to using the hardware button to control the customizable function.

In some embodiments, in response to detecting, via the first input device, a respective input, the computer system compares a detected intensity of the respective input to a set of intensity thresholds to determine whether the respective input meets one or more criteria for detecting a respective type of gesture (e.g., detecting a touch that is not a press input, detecting a press input, detecting a light press input, and/or detecting a hard press input), wherein the set of intensity thresholds includes one or more intensity thresholds selected based on input from a user of the computer system (e.g., as described with respect to FIG. 6B). In some embodiments, the computer system responds (or forgoes responding) to the respective input based on the determined intensity characteristic, as described throughout with respect to the different responses to different types of hardware button inputs. In some embodiments, based on the determined intensity characteristic, the computer system registers the respective input as a particular type of input, e.g., a light/partial press, a hard/full press, and/or a contact. In some embodiments, the set of intensity thresholds include intensity thresholds that define the various criteria described throughout with respect to FIGS. 6A-7, such as the light press criteria. For example, a user can define the intensity threshold distinguishing light/partial presses from hard/full presses to be lower (e.g., requiring less pressure to be applied to achieve a hard/full press) or higher (e.g., requiring more pressure to be applied to achieve a hard/full press). Using user-customizable intensity thresholds to evaluate inputs detected via a first hardware button makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, user-customized intensity thresholds improve control of user interfaces via the hardware button by tailoring the hardware button's responsiveness to the user's needs or preferences, such as requiring less pressure to achieve a hard/full press for a user with reduced hand strength or requiring more pressure to be applied to achieve a hard/full press for a user who wants to avoid pressing the hardware button by accident.

In some embodiments, in response to detecting, via the first input device, the respective input and in accordance with a determination that the intensity of the respective input satisfies a first set of intensity criteria, displaying, via the display generation component, an input indicator with first appearance (e.g., as described with respect to FIGS. 6F-6J), (e.g., displaying the input indicator with an indication that the press input has been detected); and For example, the input indicator includes a notch, cut-out, icon, platter, deformation, user interface element, and/or other visual element (e.g., 618, 622, 1605, 1611, 1617, 1621, 1625A, 1625B, 1630A, and/or 1822). In some embodiments, the input indicator is displayed at a location corresponding to the first input device, e.g., at an edge of the display near the location of the first input device. In some embodiments, in response to detecting, via the first input device, the respective input and in accordance with a determination that the intensity of the respective input does not satisfy the first set of intensity criteria, forgoing displaying, via the display generation component, the input indicator with first appearance (e.g., as described with respect to FIG. 6E) (e.g., displaying the input indicator without an indication that the press input has been detected). In some embodiments, in accordance with a determination that the intensity of the respective input satisfies a second set of intensity criteria different from the first set of intensity criteria, the computer system displays, via the display generation component, the input indicator with second appearance different from the first appearance. For example, displaying the input indicator with the first appearance includes displaying the input indicator with a particular size, color, opacity, and/or shape, and displaying the input indicator with the second appearance includes displaying the input indicator with a different size, color, opacity, and/or shape. For example, the computer system displays the input indicator with the first appearance in response to a light/partial press as defined by the user-customized intensity thresholds used to determine the intensity characteristic, and displays the input indicator with the second appearance in response to a hard/full press as defined by the user-customized intensity thresholds used to determine the intensity characteristic. In some embodiments, in accordance with a determination that the intensity of the respective input does not satisfy the one or more criteria for detecting a respective type of gesture (e.g., the first set of intensity criteria, second set of intensity criteria, and/or another set of intensity criteria). In some embodiments, the respective input is detected while the computer system is displaying a configuration user interface associated with the first input device (e.g., a testing user interface), and, while displaying the configuration user interface, the computer system foregoes performing one or more operations (e.g., the plurality of respective operations) in response to detecting the respective input. For example, while in the testing user interface, the computer system displays input indicators in response to inputs via the first input device, but does not capture media or adjust settings in response to inputs via the first input device.

In some embodiments, displaying the option user interface (e.g., 1006) includes displaying one or more selectable user interface objects of the plurality of selectable user interface objects within a first display region, wherein displaying the one or more selectable user interface objects of the plurality of selectable user interface objects within a first display region includes: distorting an appearance (e.g., blurring, warping, changing color, changing brightness, and/or changing opacity of) of the one or more selectable user interface objects at a first portion of the first display region corresponding to a first edge of the first display region; and distorting an appearance of the one or more selectable user interface objects at a second portion of the first display region, different from the first portion of the display region, corresponding to a second edge of the first display region different from the first edge of the display region (e.g., as described with respect to FIG. 6J1). For example, the plurality of selectable user interface objects are represented in the option user interface as options on simulated dial that curves (e.g., outwards or inwards) relative to the user (or a viewpoint of the user), a front of the user interface, or a surface of the display (e.g., simulating a round dial that can be rotated by lateral movements across the surface of the display), so the selectable user interface objects are distorted (e.g., blurring, warping, changing color, changing brightness, and/or changing opacity of) to appear as though they are curving away from the user (e.g., around the edge of the simulated dial and/or into a plane of the display or user interface) towards the edges of the option user interface display region. In some embodiments, the distortion is progressive and increases toward the edges of the option user interface. In some embodiments, performing a respective operation of the respective plurality of operations (e.g., the first operation and/or second operation) includes displaying a corresponding operation user interface including one or more user interface objects corresponding to a parameter of the respective operation (e.g., such as described with respect to FIGS. 6A-7 and/or 14A-15), including distorting the appearance of the one or more user interface objects near the edges of the corresponding operation user interface, e.g., as described with respect to the option user interface. For example, the one or more user interface objects corresponding to the parameter of the respective operation include a platter or slider for selecting a value of the parameter, and the platter or slider is distorted near the edges of the operation user interface to simulate a curved dial. Distorting the option menu at the edges of the menu area (e.g., to simulate the appearance of a curved dial) provides users with real-time feedback about a state of the computer system without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, displaying the option menu as a simulated curved dial intuitively indicates to the user how to adjust the selected customizable operation (e.g., using lateral gesture inputs, as if rotating the dial) and/or that additional customizable operations are available (e.g., the user can "rotate" the dial to display additional options).

Note that details of the processes described above with respect to method 1100 (e.g., FIGS. 11A-11B) are also applicable in an analogous manner to the methods described above and below. For example, controls for customizable functions as described with respect to method 1100 can be used with the controls based on variable hardware inputs described with respect to method 700, used when capturing media as described with respect to method 900, used when controlling media playback as described with respect to method 1300, and/or used to customize settings adjusted as described with respect to method 1500. For brevity, these details are not repeated below.

FIGS. 12A-12O illustrate example techniques and systems for customizing playback speed of video media in accordance with some embodiments. For example, FIGS. 12A-12O illustrate automatically identifying portions of video media to slow down during playback.

At FIG. 12A, computer system 600 displays media viewing user interface 1200, including a representation of media item 1202. Media item 1202 is a multi-frame media item, such as a video or a multi-frame photo capture that can be played back to create a "live" effect. Media viewing user interface 1200 includes edit affordance 1200A, which can be selected to initiate processes for editing media item 1202; play affordance 1200B, a play button for initiating playback of media item 1202; and media carousel 1200C, which includes thumbnails of media item 1202 and other media items that can be viewed in media viewing user interface 1200 (e.g., a camera roll).

Additionally, as illustrated in FIG. 12A, media viewing user interface 1200 includes speed effect affordance 1200D, a badge with the text "APEX." Speed effect affordance 1200D indicates that computer system 600 has identified at least a portion of media item 1202 that could be slowed down to create a cinematic effect. In some embodiments, computer system 600 analyzes the contents of media items, including video data, audio data, and/or associated metadata to identify portions of the media items that include high amounts of action, high amounts of camera movement, high levels of detail, and/or other subject matter identified as exciting, important, or distinctive as "apex moments." In some embodiments, computer system 600 automatically identifies whether at least one apex moment is present in a media item when viewing the media item in media viewing user interface 1200, when initiating playback of the media item, and/or when capturing the media item.

Figure 12B:
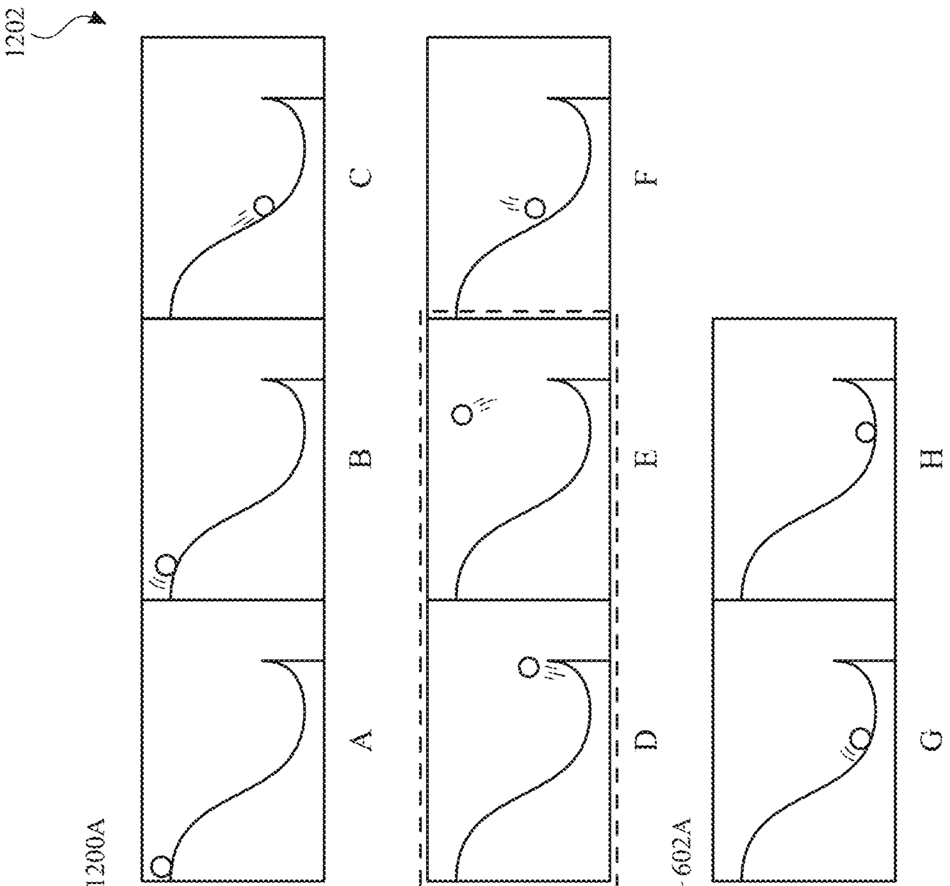
FIGS. 12A-12O illustrate example techniques and systems for customizing playback speed of video media in accordance with some embodiments.
Figure 12A:
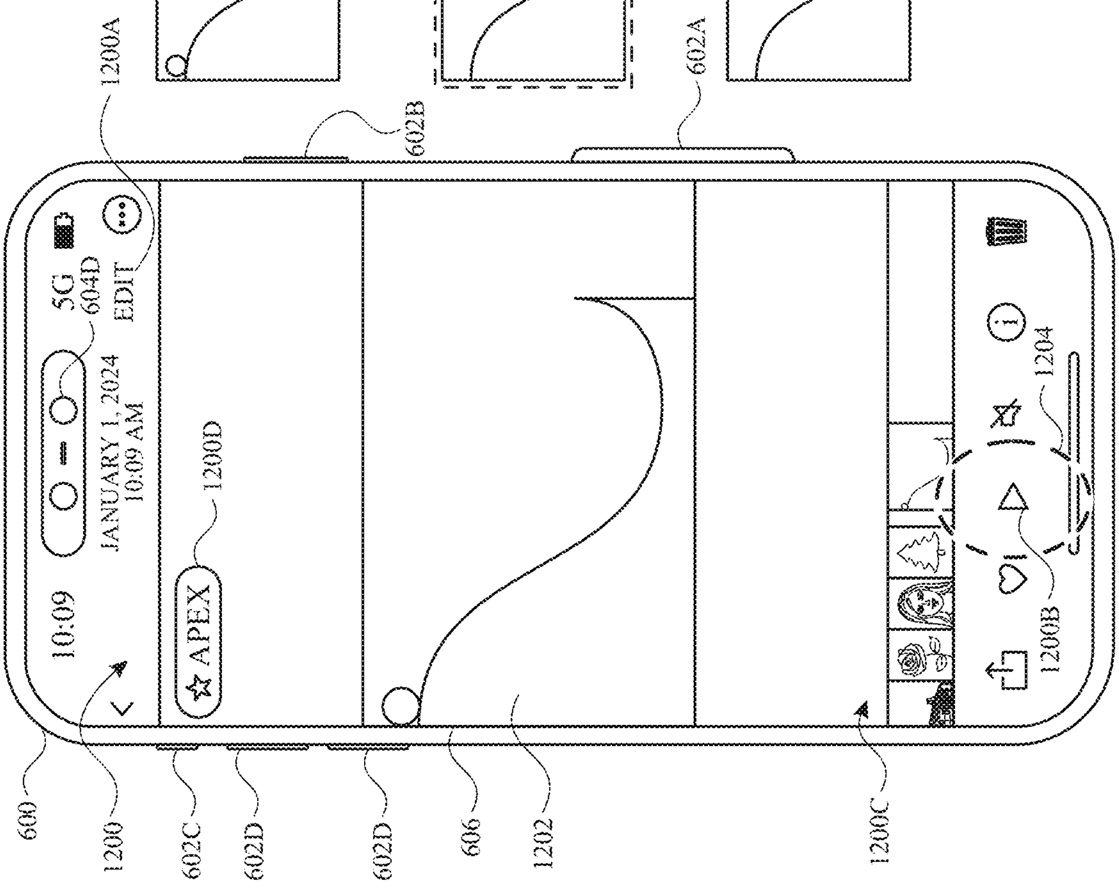

Media item 1202, illustrated in FIG. 12B as sequential frames A through H, depicts a ball rolling along a surface down a hill, off a ramp, into the air, and back down onto the surface. Computer system 600 identifies the highlighted segment D-E as an apex moment of media item 1202. For example, the video data (e.g., the frames of media item 1202) and/or metadata such as depth sensor data and/or motion sensor data of media item 1202 can be analyzed to determine that the ball jumps off the ramp into the air during segment D-E, indicating a high level of action in those segments. As another example, the audio data of media item 1202 can be analyzed to detect clapping and cheering during segment D-E, indicating a high level of excitement in those segments. Accordingly, computer system 600 selects the segment D-E to slow down during playback, showing the jump off of the ramp with a cinematic, slow motion (e.g., slo-mo) effect. Media item 1202 is depicted with only eight frames (and the apex moment D-E as only two frames) for clarity of description; it is to be understood that the techniques described herein can be scaled to media and apex moments of any number of frames.

Other examples of potential apex moments include: a segment of a ball flying towards a goal in a sports game, a segment right before music starts at a concert, a segment of a firework exploding in the air, a segment of a dog jumping off the ground to catch a treat, a segment after a dolly shot running up to a subject, a segment rotating quickly around a subject, a montage, and/or a fight scene. In some embodiments, in addition to selecting segments of a media item to slow down during playback, computer system 600 may select segments of a media item to speed up. For example, based on the video data, audio data, and/or associated metadata, computer system 600 can identify repetitive, slow, or uninteresting segments of a media item to fast-forward, such as a segment depicting transit between different locations, a theater filling before a performance begins, or time passing between dives at a swim meet.

Figure 12C:
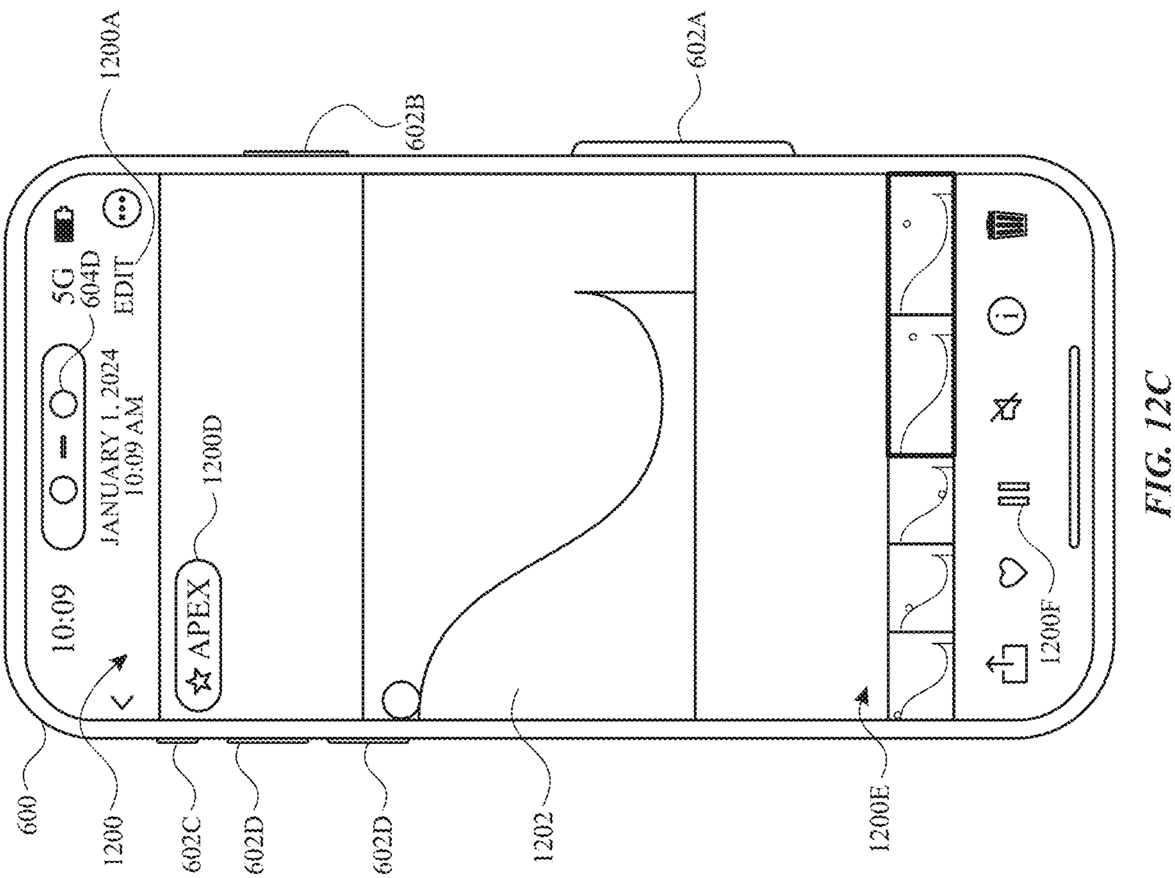

At FIG. 12A, computer system 600 detects input 1204 selecting play affordance 1200B. In response, at FIG. 12C, computer system 600 begins playback of media item 1202, during which media viewing user interface 1200 is displayed with pause affordance 1200F replacing play affordance 1200B and playback timeline 1200E, a sequential representation of the segments of media item 1202, replacing media carousel 1200C. During playback of media item 1202, computer system 600 slows down segment D-E to appear at half speed compared to the other segments of media item 1202. As illustrated in FIG. 12C, the representations of frames D and E in playback timeline 1200E are wider than to other segments represented in playback timeline 1200E, indicating the location of the slowed-down portion within media item 1202.

Figure 12D:
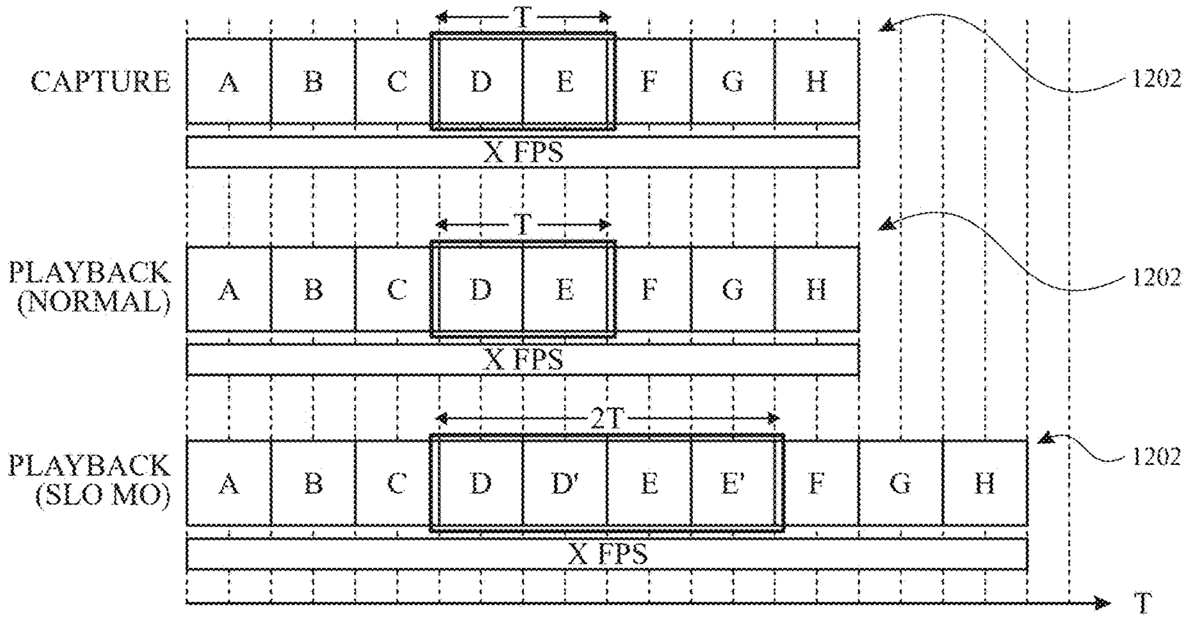

FIG. 12D illustrates an example timing diagram for playing back media item 1202 with the apex moment, segment D-E, slowed down to half speed. The first line of the diagram represents the capture of media item 1202. Media item 1202 is captured at a capture frame rate of X frames per second, and the duration of segment D-E during capture (e.g., the real-time duration of segment D-E) is T seconds. Playing back media item 1202 at a playback frame rate of X frames per second throughout, as illustrated in the second line of the diagram, results in a normal-speed playback, where the ball appears to move at the speed at which it was actually moving during capture, and where the playback duration of segment D-E is still T seconds.

The third line of the diagram represents playback of media item 1202 with segment D-E slowed down. As illustrated in the third line of FIG. 12D, computer system plays media item 1202 back at the playback frame rate of X frames per second. Segments A-C and F-H are thus played back at their normal speed. However, interpolated frames D' and E' are inserted between frames D-E and E-F. Accordingly, the original frames D and E are effectively played back at a frame rate of 0.5×, appearing at half speed, and the playback of segment D-E, now including frames D-D'-E-E', lasts 2T seconds.

Figure 12E:
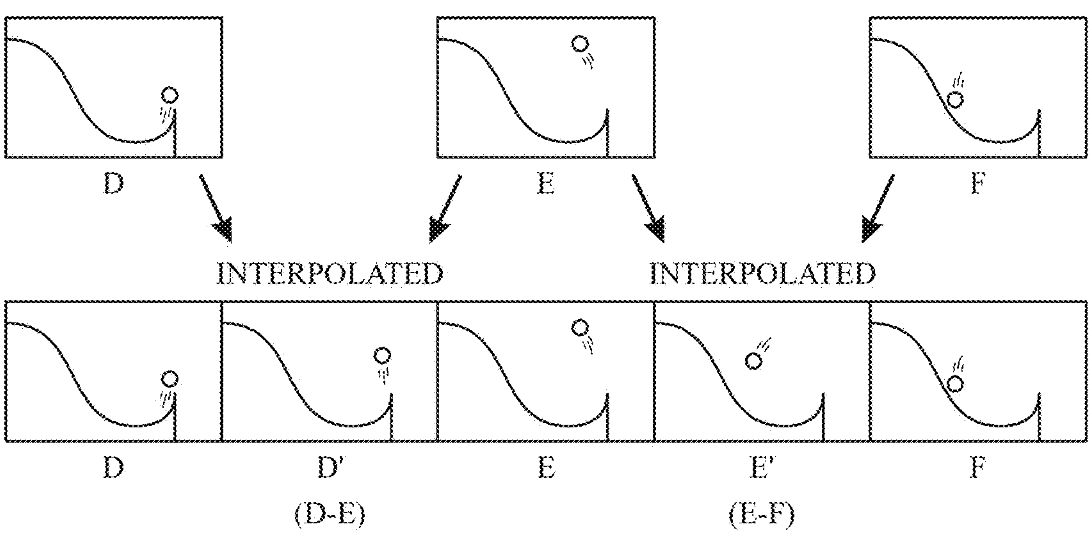

Referring to FIG. 12E, interpolated frames D' and E' are extra video frames generated by computer system 600. For example, using image processing, motion intelligence, and/or other artificial intelligence techniques to analyze the contents of media item 1202 before, during, and/or after segment D-E, computer system 600 generates interpolated frame D', showing the ball in a position between its position in frame D and its position in frame E along an inferred path of movement, and interpolated frame E', showing the ball in a position between its position in frame E and its position in frame F along the inferred path of movement. For example, if media item 1202 was captured at a lower frame rate such as 30 FPS, although original frames D and E are effectively played back at 15 FPS (e.g., a frame rate that can be perceived by the human as choppy), the insertion of interpolated frames D' and E' maintains the actual playback frame rate at 30 FPS. Accordingly, the half-speed movement of the ball depicted in the apex moment D-E appears smooth. In some embodiments, computer system 600 may generate more than one interpolated frame to insert between original frames of media item 1202, for example, inserting three interpolated frames between each pair of original frames to slow down playback to a quarter speed.

Figure 12F:
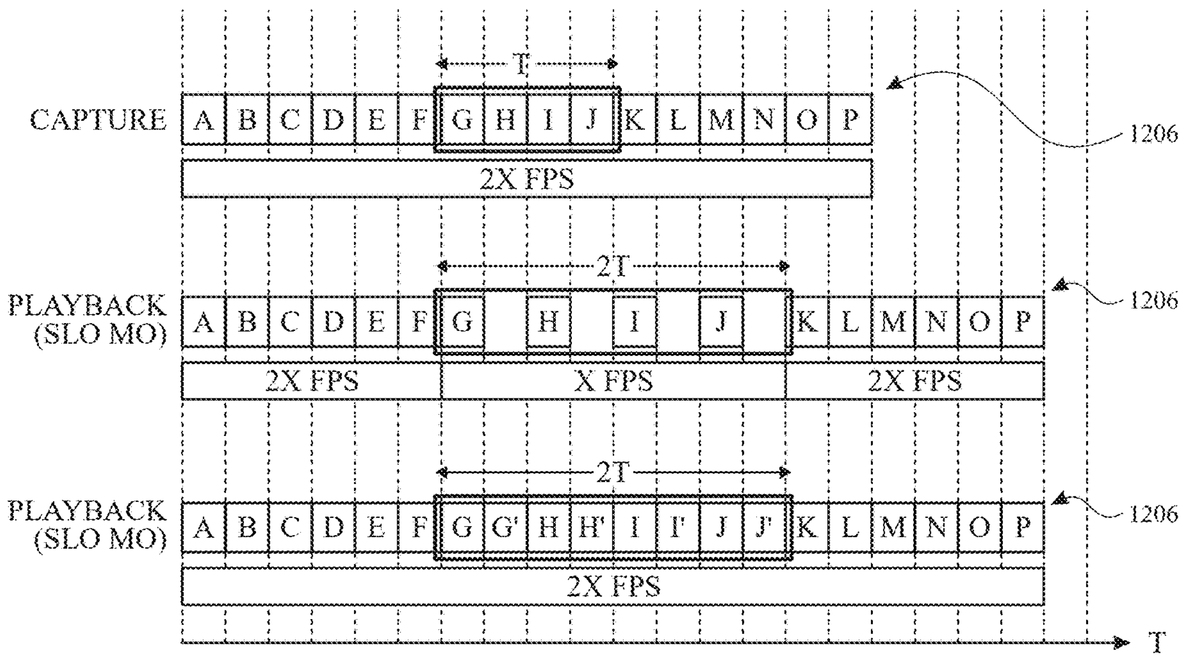
Figure 12G:
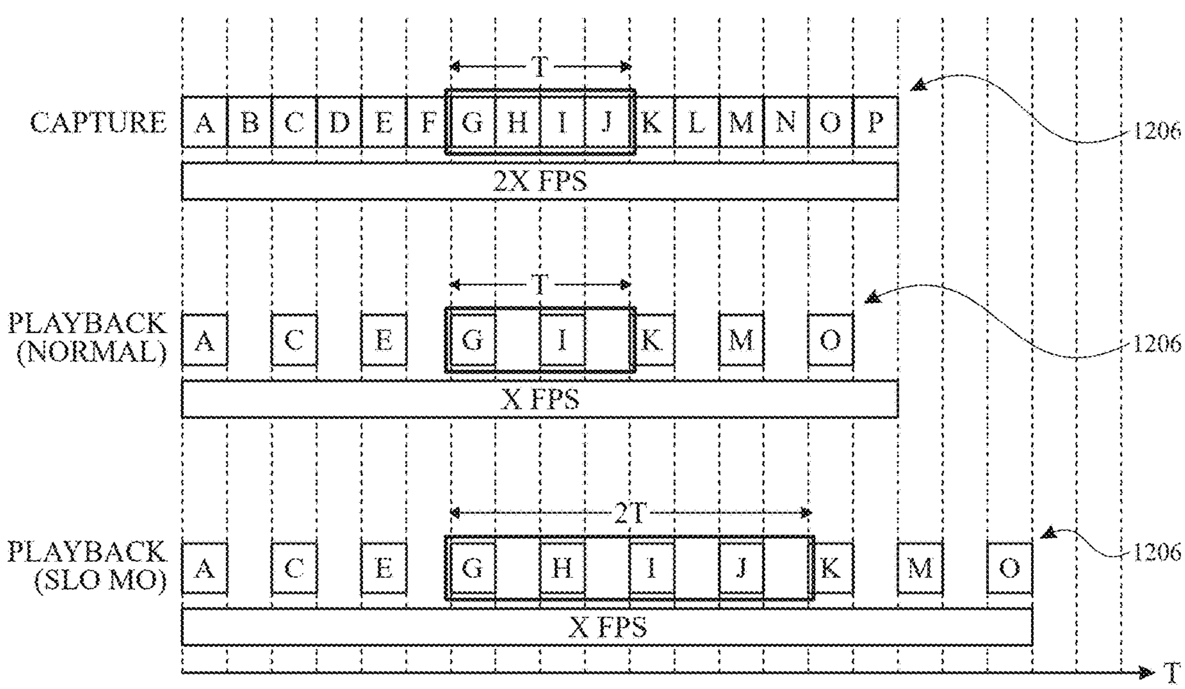
Figure 12H:
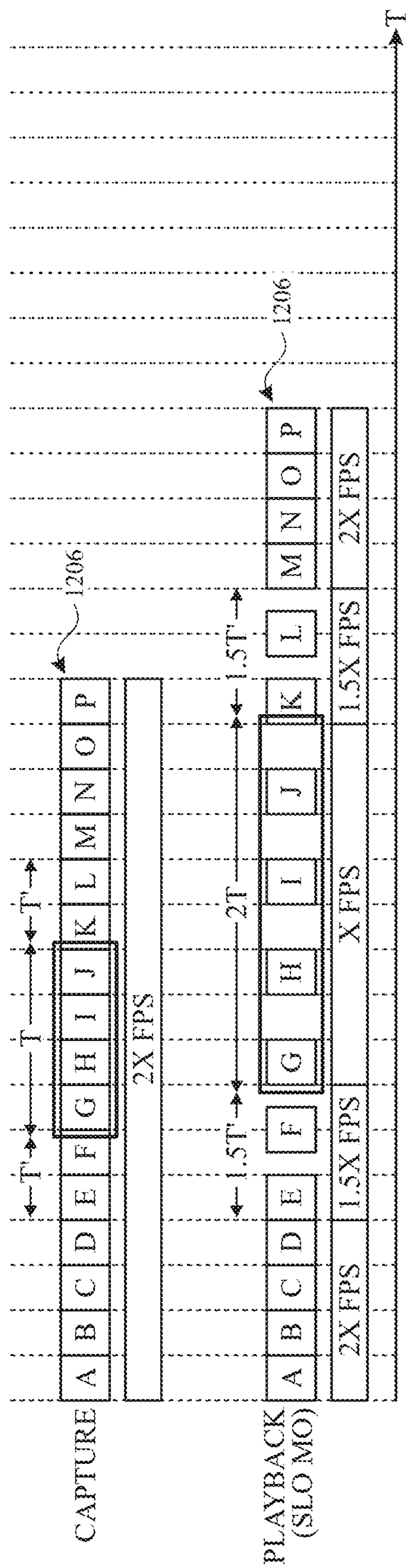

FIGS. 12F-12H illustrate additional example timing diagrams for playing back media item 1206, a media item including sequential frames A-P, with a half-speed apex moment, segment G-J. As illustrated in the first lines of FIGS. 12F-12H, media item 1206 is captured at a frame rate of 2×FPS (e.g., a higher frame rate, such as 60 FPS or 120 FPS), and the real-time duration of segment G-J is T seconds.

As illustrated in the second line of FIG. 12F, in some embodiments, computer system 600 plays back segments A-F and K-P at a playback frame rate of 2×FPS (e.g., the capture frame rate), such that movement in the non-apex segments appears at normal speed, and plays back segment G-J at a playback frame rate of X FPS (e.g., half the capture frame rate), such that the playback duration of segment G-J is 2T seconds and movement in segment G-J appears at half speed. For higher frame rate video, such as 60 or 120 FPS video, the frame rate can be halved without movement appearing choppy. Accordingly, segment G-J can be slowed to half speed without needing to insert interpolated frames. However, as illustrated in the third line of FIG. 12F, computer system 600 can generate and insert interpolated frames (e.g., G', H', I', and J') in order to play back media item 1206 at a constant frame rate of 2×FPS and/or to slow down segment G-I to appear slower than half speed (e.g., playing segment G-G'-H-H'-I-I'-J-J' at X FPS, extending the duration to 4T seconds).

As illustrated in the second line of FIG. 12G, in some embodiments where the capture frame rate of 2×FPS is a high frame rate capture, computer system 600 may play back media item 1206 at×FPS, but drop half of the original frames such that the movement in media item 1206 appears at its normal (e.g., real-time) speed. Accordingly, in some embodiments, computer system slows down segment G-J during playback by playing back all of the frames of segment G-J at X FPS, e.g., refraining from dropping any frames from segment G-J, as illustrated in the third line of FIG. 12G.

As illustrated in FIG. 12H, in some embodiments, computer system 600 gradually transitions the speed of playback around the slowed-down apex moment. As illustrated in the first line of FIG. 12H, segment E-F (leading into segment G-I) and segment K-L (leading out of segment G-J) each have a real-time duration of T'. During playback of media item 1206, computer system 600 plays back segments E-F and K-L at 1.5×, extending their duration to 1.5T' such that the segments appear at two-thirds speed, ramping between the normal speed and the half-speed of the slowed down segment G-J. In some embodiments, computer system 600 may only slow down one of segment E-F (e.g., only gradually ramping the speed down) or segment K-L (e.g., only gradually ramping the speed back up) or slow down segments E-F and K-L by different amounts. In some embodiments, computer system 600 may ramp the speed before and/or after segment G-J over different segment lengths (e.g., 0.25 seconds, 0.5 seconds, and/or 1 second of real-time capture). In some embodiments, computer system 600 may generate interpolated frames as needed to slow down the ramping segments without changing the frame rate (e.g., as discussed with respect to FIG. 12F). In some embodiments, computer system 600 may gradually ramp the frame rate of the ramping segments, for instance, playing frames of the ramping segments successively farther apart or successively further together.

Figure 12J:
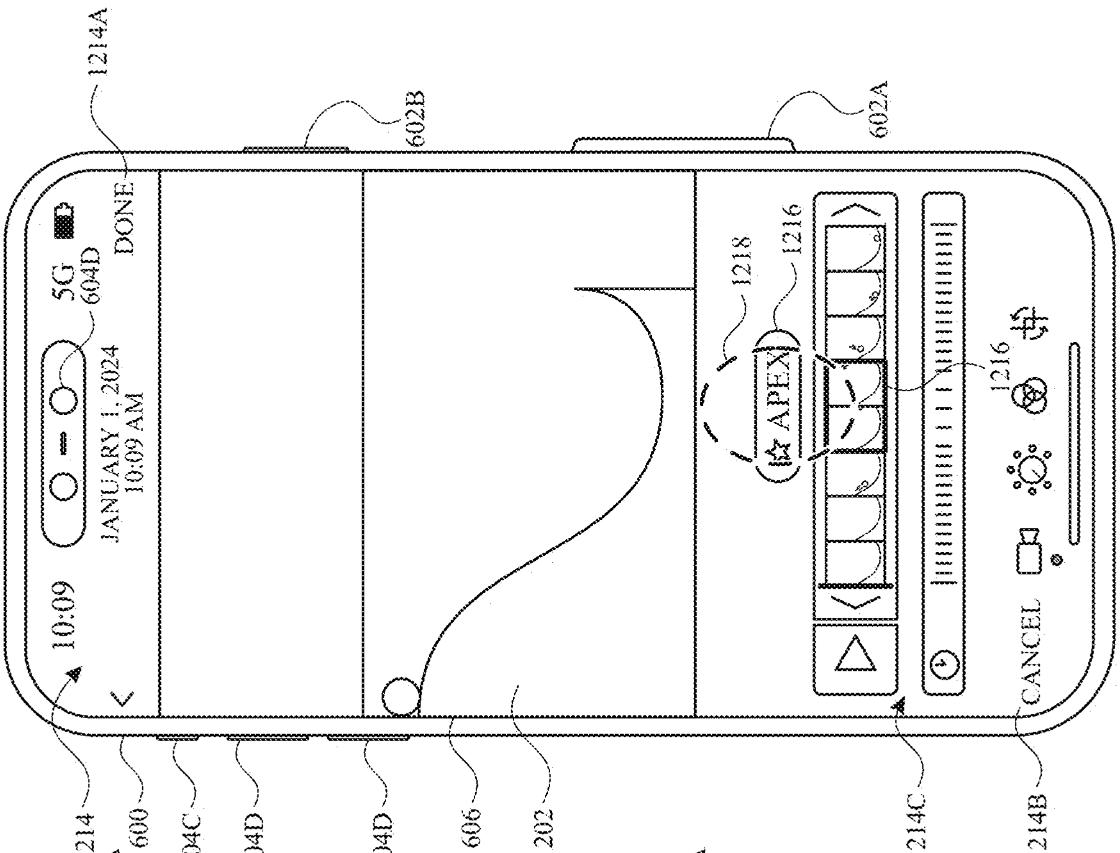
Figure 12I:
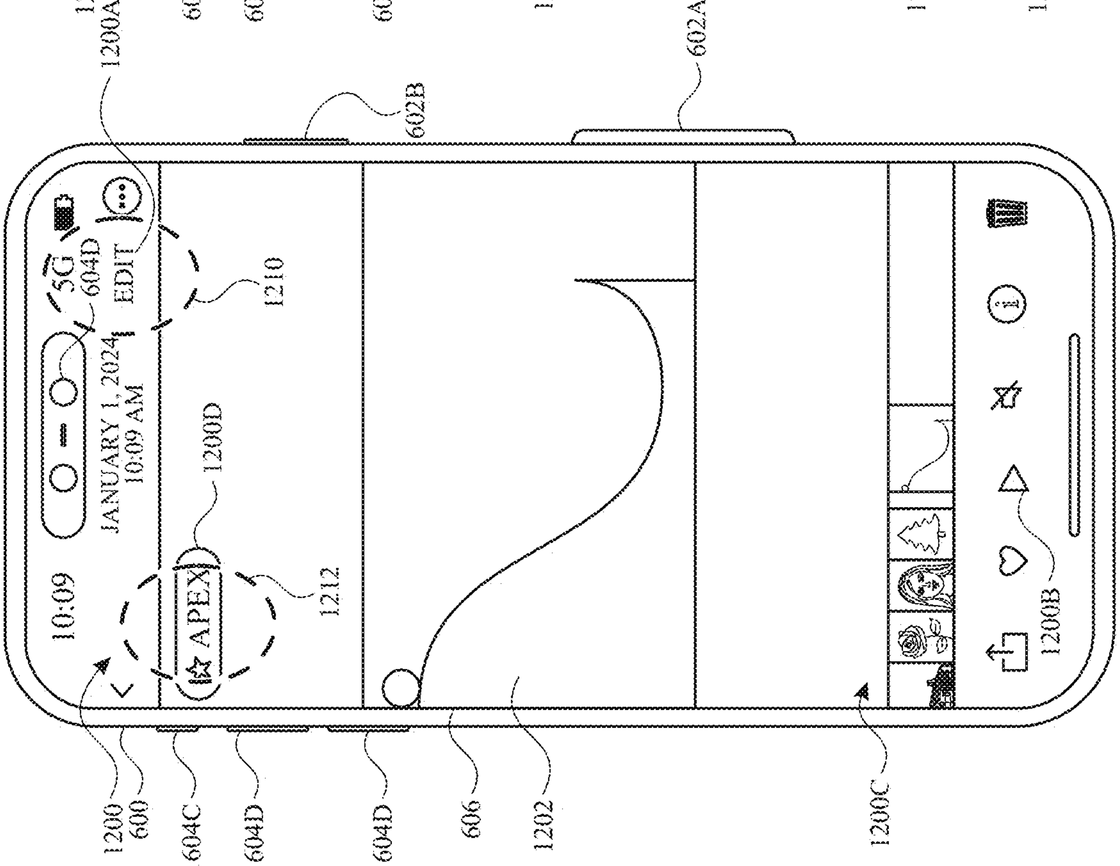

At FIG. 12I, computer system 600 displays a representation of media item 1202 in media viewing user interface 1200 (e.g., as described with respect to FIG. 12A), computer system 600 detects an input requesting to edit media item 1202, such as input 1210 selecting edit affordance 1200A and/or input 1212 selecting speed effect affordance 1200D. In response, at FIG. 12J, computer system 600 displays video editing user interface 1214 for editing media item 1202. Video editing user interface 1214 includes finish affordance 1214A, which can be selected to finalize edits made to media item 1202 and return to media viewing user interface 1200; cancel affordance 1214B, which can be selected to revert edits made to media item 1202 and return to media viewing user interface 1200; and timeline editing elements 1214C, including a representation (e.g., thumbnails) of sequential segments of media item 1202, framing affordances around the representation of sequential segments that can be dragged to cut media item 1202 at different points, and a timeline element graphically indicating the effective playback speed of the original frames of media item 1202. As illustrated in FIG. 12J, computer system 600 displays one or more indicators 1216 of segment of media item 1202 selected to slow down during playback (e.g., the identified apex moment), such as highlighting or framing the identified segment in the representation of sequential segments and/or displaying a speed effect badge above the segment in the representation of sequential segments. Additionally, the timeline element graphically indicates that the identified segment will be slowed down during playback, for instance, represented by the tick marks in the timeline element (e.g., representing frames, units of time, and/or other subdivided segments of media item 1202) being spaced twice as far apart below the identified apex segment than below the other segments of media item 1202.

While displaying media item 1202 in video editing user interface 1214, computer system 600 detects input 1218 directed to timeline editing elements 1214C, corresponding to an input editing the playback timing profile of media item 1202. In response, computer system 600 initiates a process for changing the playback timing profile of media item 1202, such as selecting one or more segments of media item 1202 to slow down or speed up. For example, input 1218 may include a "stretch" gesture, e.g., two contacts that initially frame a representation of a segment of media item 1202 in the sequential segments and/or the timeline element then slide apart in opposite directions, which results in computer system 600 slowing down the "stretched" segment. As another example, input 1218 may include a "pinch" gesture, e.g., two contacts that initially frame a representation of a segment of media item 1202 then slide towards each other, which results in computer system 600 slowing down the "pinched" segment. As another example, input 1218 may include a tap input directed to the speed effect badge, which provides access to different speed controls, such as a slider for precisely selecting the effective frame rate of a segment and/or an affordance for ramping speed in certain segments.

Figure 12L:
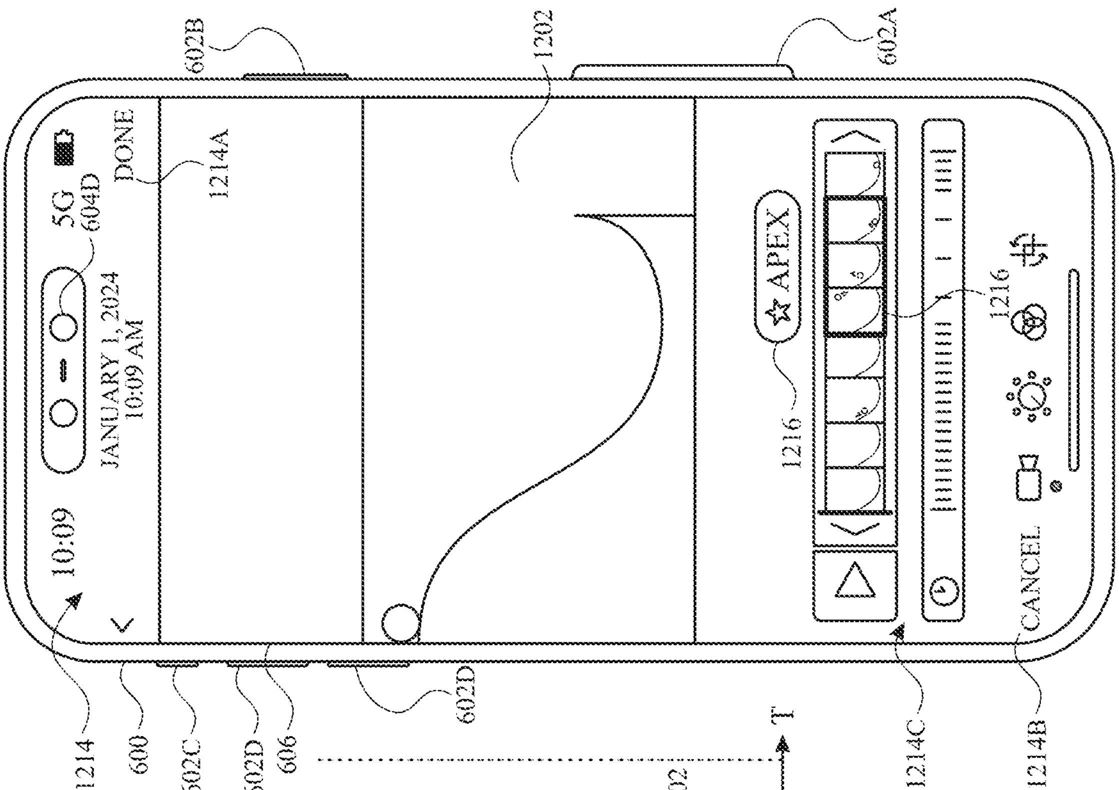
Figure 12K:
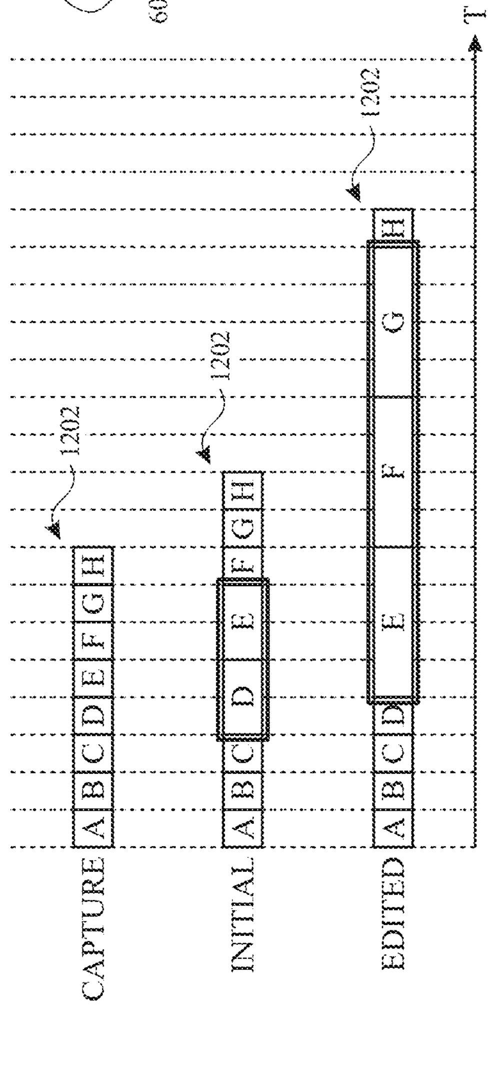

As illustrated by the timing diagram in FIG. 12K, in response to input 1218, computer system 600 edits the playback timing profile of media item 1202 such that, instead of playing back segment D-E at half speed, computer system 600 plays back segment E-G at one-third speed. Accordingly, the user can edit the apex moment to start and end at different times, to last a different duration, and/or to appear at a different speed than automatically selected by computer system 600. As illustrated in FIG. 12L, computer system 600 updates video editing user interface 1214 as inputs for editing the playback timing profile of media item 1202 are detected, moving the one or more indicators 1216 and changing the spacing of tick marks on the timeline element to indicate the new apex moment and playback timing profile of media item 1202.

Figure 12N:
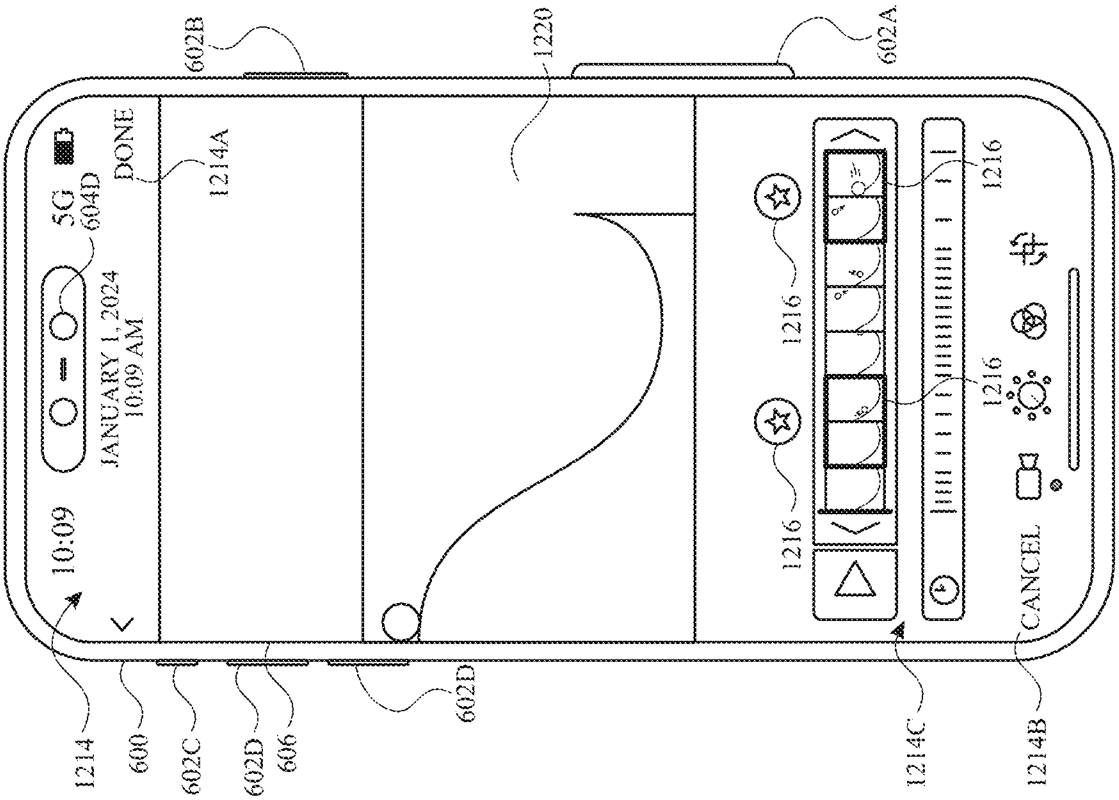
Figure 12M:
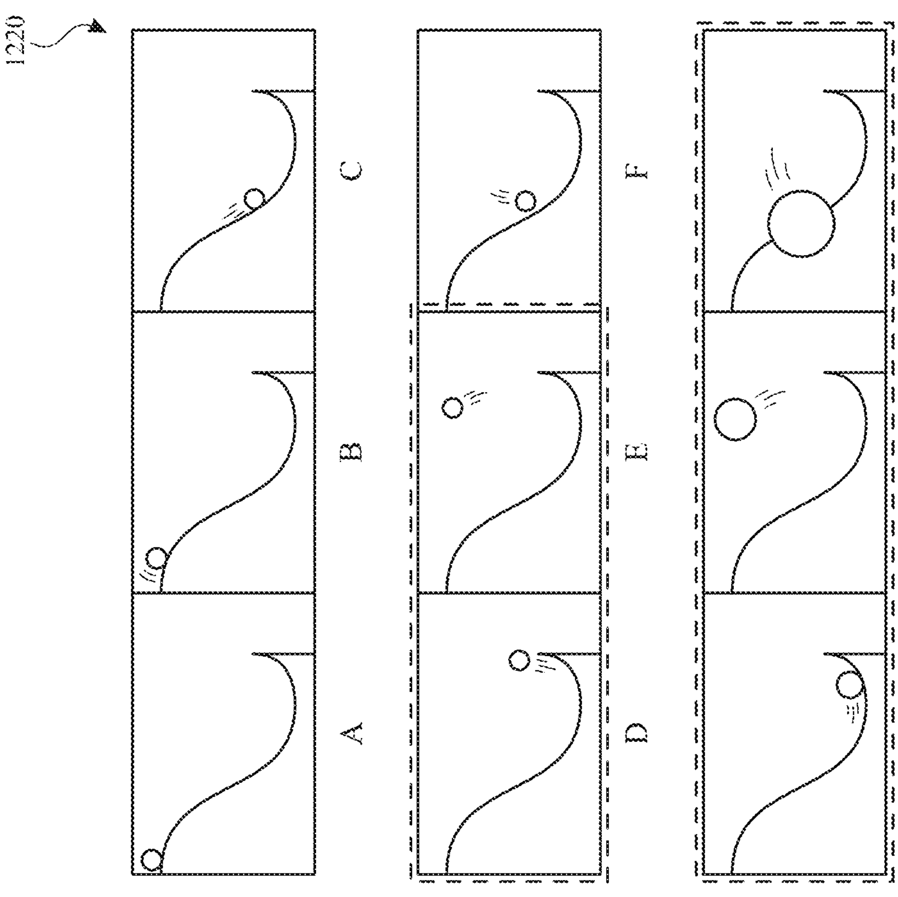
Figure 120:
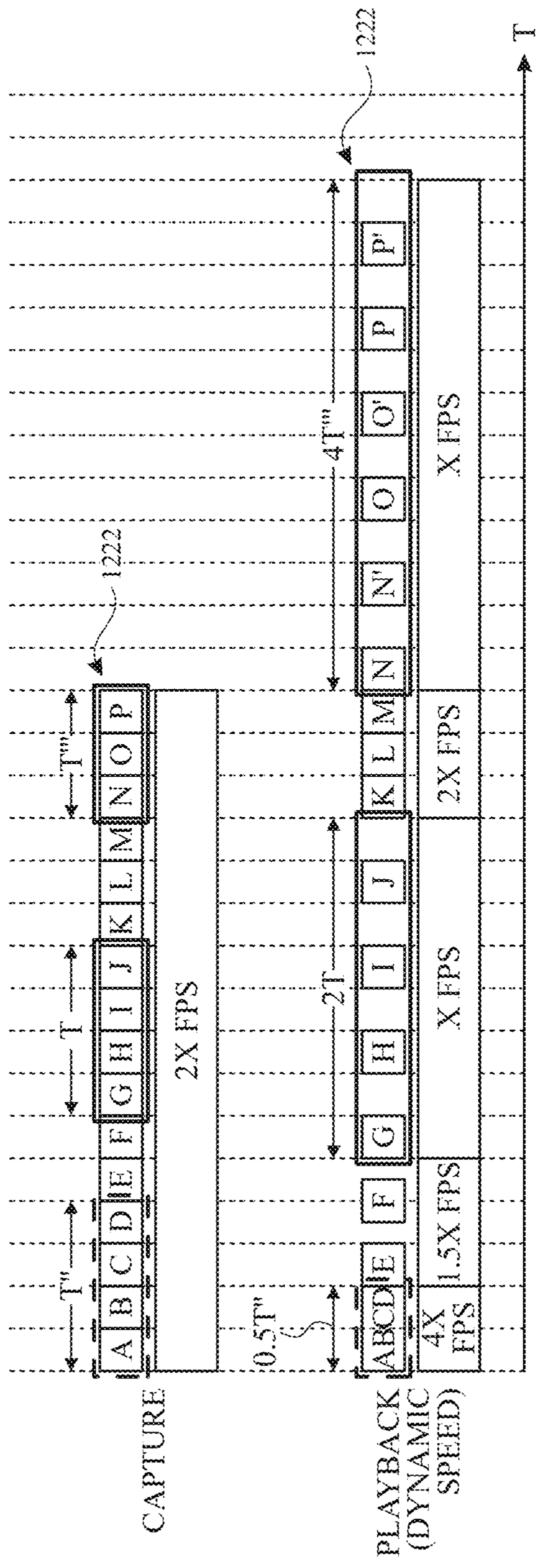

FIG. 12M illustrates media item 1220 as sequential frames A-H, depicting a ball rolling along a surface down a hill, off a ramp, into the air, and back down onto the surface (e.g., as in media item 1202) before bouncing back up and towards the camera. As described with respect to selecting segment D-E of media item 1202 to slow down during playback, computer system 600 selects both highlighted segments D-E and G-I to slow down during playback, for instance, as both segments depict high amounts of action. In some embodiments, computer system 600 selects to slow down segment G-I more than segment D-E during playback, for instance, as segment G-I includes a higher amount of action with the ball flying towards the camera. When editing media item 1220, computer system 600 displays video editing user interface 1214 as illustrated in FIG. 12N, for instance, highlighting and displaying speed effect badges over both segments in timeline editing elements 1214C, and displaying the tick marks of the timeline element representing segment G-I spaced apart further than the tick marks representing segment D-E.

FIG. 12O illustrates a timing diagram for media item 1222, for instance, a 2×FPS capture consisting of frames A-P, with a playback timing profile combining the techniques described herein to produce a complex, cinematic playback speed profile. As illustrated in FIG. 10O, segment A-D (e.g., a low-interest moment identified by computer system 600 and/or a segment selected by the user in video editing user interface 1214) is sped up during playback, being played back at 4×FPS (e.g., or dropping half of the frames) to appear at double speed. Segments G-J and N-P (e.g., apex moments identified by computer system 600 and/or selected by the user) are played back at X FPS, appearing slowed down. However, as interpolated frames N', O', and P' are inserted into segment N-P, segment N-P appears at one quarter speed while segment G-J appears at half speed. Segment E-F ramps down to the half-speed playback of segment G-J, being played back at 1.5×FPS and appearing at two-thirds speed, and segment K-M is played at normal speed. In some embodiments, computer system 600 automatically selects the playback frame rates and generates the interpolated frames illustrated in FIG. 12O based on the contents of media item 1222, as described with respect to FIG. 12B.

FIG. 13 is a flow diagram illustrating method 1300 for customizing playback speed of video media, in accordance with some embodiments. The method is performed at a computer system (e.g., 100, 300, 500, and/or 600) that is in communication with a display generation component (e.g., 606) (e.g., a display controller; a touch-sensitive display system; a display (e.g., integrated and/or connected), a 3D display, a transparent display, a projector, and/or a heads-up display), e.g., as illustrated in FIGS. 6A-6B. In some embodiments, the computer system is optionally in communication with one or more input devices (e.g., 602A, 602B, 602C, 602D, and/or a touch sensitive surface of display 606), such as mechanical (e.g., physically depressible), solid-state, intensity-sensitive, and/or touch-sensitive (e.g., capacitive) hardware buttons and/or surfaces. In some embodiments, the computer system is optionally in communication with one or more cameras (e.g., 604A, 604B, 604C, and/or 604D), such as a rear (user-facing) camera and a forward (environment-facing) camera and/or a plurality of cameras with different lenses, such as a standard camera, a telephoto camera, and/or a wide-angle camera. In some embodiments, the computer system is optionally in communication with one or more sensors, such as camera sensors, optical sensors, depth sensors, capacitive sensors, intensity sensors, motion sensors, vibration sensors, and/or audio sensors.

The computer system receives (1302) a request (e.g., 1204) to play a video media item (e.g., 1202, 1206, 1220, and/or 1222) (e.g., a multi-frame media capture, such as a standard video, a spatial video, and/or a multi-frame photo capture). in response to receiving the request to play the video media item, the computer system plays (1304) the video media item, including, while playing the video media item, decreasing (1306) (e.g., automatically and/or in response to a user input, such as an input selecting to enable cinematic speed adjustments) a playback speed (e.g., the speed at which time appears to advance in the video with respect to real time, wherein advancing one second of capture time (e.g., "real time") per second of playback appears to the user as "normal" speed, advancing more than one second of capture time per second of playback appears to the user as fast motion/sped up video, and advancing less than one second of capture time per second of playback appears to the user as slow motion/slowed down video) of a respective portion (e.g., D-E of media item 1202, G-J of media item 1206, D-E and G-I of media item 1220, and/or G-J and N-P of media item 1222) of the video media item (e.g., the first video segment appears slowed down during playback with respect to the timescale of capture (e.g., real time) and/or with respect to the timescale of other segments of the video media item).

The respective portion of the video media item is automatically selected (e.g., by the computer system or by a remote computer system) based on content of the video media item (e.g., as described with respect to FIGS. 12C-12D, 12F-12H, 12K, and/or 12O) (the computer system automatically detects at least one "apex" segment of the video media item, which is a portion of the video media item depicting relatively high levels of activity, motion, detail, and/or significance, e.g., compared to at least one other segment of the video media item), including: in accordance with a determination that a first portion of the video media item satisfies a set of one or more video characteristic criteria, slowing down the first portion of the video media item relative to at least one other portion of the video media item while playing the video media item (1308) (e.g., the respective portion includes the first portion); and in accordance with a determination that a second portion of the video media item, different from the first portion of the video media item, satisfies the set of one or more video characteristic criteria, slowing down the second portion of the video media item relative to at least one other portion of the video media item while playing the video media item (1310) (e.g., the respective portion includes the second portion). In some embodiments, the computer system selects the respective portion (e.g., determines that the first video segment satisfies the one or more video characteristic criteria) based visual content (e.g., video component), audio content, spatial content (e.g., depth information and/or motion data), and/or other metadata (e.g., capture specifications, sensor data, image processing data, audio processing data, and/or user information) associated with the video media item. In some embodiments, computer system identifies the first video segment while displaying, via the display generation component, a representation of the video media item, e.g., in a media viewing user interface or a media editing user interface. In some embodiments, the set of one or more video characteristic criteria include a criterion that is met when a portion of the video media item includes (e.g., depicts) more than a threshold amount of activity, a criterion that is met when a portion of the video media item includes more than a threshold change in activity, a criterion that is met when a portion of the video media item includes more than a threshold amount of motion, a criterion that is met when a portion of the video media item includes more than a threshold change in motion, a criterion that is met when a portion of the video media item includes more than a threshold amount of detail, and/or a criterion that is met when a portion of the video media item includes content of determined significance (e.g., a recognized person, pet, and/or other subject).

In some embodiments, decreasing the playback speed of the respective portion of the video media item, including slowing down the first and/or second portions of the video media item, includes reducing the frame rate of playback of the respective portion. For example, for a video media item captured at 60 FPS, the computer system plays back the first and/or second portions at 30 FPS, so the timescale of the respective portion appears to the user at half speed. In some embodiments, decreasing the playback speed of the respective portion of the video media item, including slowing down the first and/or second portions of the video media item, includes including (e.g., playing) additional frames during playback of the first and/or second portions, e.g., by adding interpolated frames (e.g., if the video media item was captured at a lower frame rate and/or cannot be slowed down without negatively impacting playback quality, for instance, by reducing the playback frame rate below a desired playback frame rate) and/or foregoing skipping/dropping frames from the first and/or second portion (e.g., if the video media item was captured at higher frame rate than the desired playback frame rate). For example, for a video media item captured at 60 FPS, the computer system adds interpolated frames to the first and/or second portions of the video media item at a 1:1 ratio to effectively turn the first and/or second portions into 120 FPS video, such that playback of the first and/or second portions of the video media item at 60 FPS appears at a half-speed timescale. In some embodiments, decreasing the playback speed of the respective portion of the video media item, including slowing down the first and/or second portions of the video media item, includes increasing the frame rate of playback of a different segment of the video media item and/or dropping additional frames during playback of the different segment. For example, the computer system "fast forwards" non-apex moments.

In some embodiments, the computer system identifies the respective portion of the video media item, including the first and/or second portions, and in response to identifying the first video segment, the computer system displays, via the display generation component, a prompt (e.g., 1200D) (e.g., text, symbols, icons, highlighting, and/or other visual elements) for decreasing the playback speed of the respective portion of the video media item. In some embodiments, the prompt includes an indication of the first video segment, e.g., highlighting or otherwise visually indicating the "apex moment" portion of the video media item that satisfies the video characteristic criteria. In some embodiments, the prompt includes and/or is displayed concurrently with one or more selectable UI objects (e.g., affordances) that, when selected, initiate a process for changing the playback speed of the video media item to slow down the first video segment relative to the first timescale during playback. Automatically detecting and slowing down playback of portions of a video media item with certain characteristics provides improved control and performance of media playback, making the user-system interface more efficient by reducing the number of inputs and amount of time needed to produce desirable video speed effects, which, additionally, reduces power usage and improves battery life of the system by enabling the user to use the system more quickly and efficiently. For example, the computer system automatically slows down dynamic or exciting portions of a video, such as portions with high amounts of content movement, camera movement, detail, and/or other detected subject matter, automatically creating a cinematic effect without requiring extensive editing of the video media item by the user. Doing so also provides improved feedback on a state of a computer system, indicating the computer system's capabilities with respect to modifying playback speed of video media items.

In some embodiments, playing the video media item includes, while playing the video media item, ramping (e.g., gradually increasing or decreasing) a playback speed of one or more transition portions of the video media item between a first playback speed (e.g., an initial or final playback speed; in some embodiments, a normal (e.g., not slowed) playback speed for the video media item) and a second playback speed that is lower than the first playback speed (e.g., as described with respect to FIGS. 12H and/or 12O). In some embodiments, the one or more transition portions are adjacent to a segment of the respective portion of the video media item (e.g., immediately before or immediately after at least one detected apex moment of the respective portion), and decreasing the playback speed of the respective portion of the video media item includes playing the segment of the respective portion of the video media item at the second playback speed (e.g., as described with respect to FIG. 12H). For example, the computer system gradually decreases (e.g., ramps down) the playback speed of the video media item leading into a slowed-down portion of the video media item and/or gradually increases (e.g., ramps up) the playback speed of the video media item coming out of a slowed-down portion of the video media item. Automatically ramping the playback speed of the video media item near the respective portion of the video media item provides improved control and performance of media playback, making the user-system interface more efficient by reducing the number of inputs and amount of time needed to produce desirable video speed effects, which, additionally, reduces power usage and improves battery life of the system by enabling the user to use the system more quickly and efficiently. For example, the computer system automatically smooths down transitions between portions of the video media item played at different playback speeds, creating a cinematic effect without requiring extensive editing of the video media item by the user.

In some embodiments, the one or more transition portions of the video media item includes a first transition portion of the video media item (e.g., E-F, as described with respect to FIG. 12H), wherein the first transition portion of the video media item is before (e.g., immediately before) the segment of the respective portion of the video media item (e.g., G-J, as described with respect to FIG. 12H). In some embodiments, ramping the playback speed of the first transition portion includes decreasing the playback speed of the first transition portion from the first playback speed to the second playback speed, e.g., gradually lowering the playback speed leading into the slowed-down apex moment.

In some embodiments, the one or more transition portions of the video media item includes a second transition portion of the video media item (e.g., K-L, as described with respect to FIG. 12H), wherein the second transition portion of the video media item is after (e.g., immediately after) the segment of the respective portion of the video media item (e.g., G-J, as described with respect to FIG. 12H). In some embodiments, ramping the playback speed of the second transition portion includes decreasing the playback speed of the second transition portion from the second playback speed to the first playback speed, e.g., gradually increasing the playback speed coming out of the slowed-down apex moment.

In some embodiments, while playing the video media item, the computer system decreases a playback speed of a second respective portion of the video media item (e.g., as described with respect to FIGS. 12M-12O), different from the respective portion of the video media item. In some embodiments, the second respective portion of the video media item is automatically selected based on the content of the video media item, (e.g., the computer system identifies both the respective portion of the video media item and the second respective portion of the video media item as apex moments) including: in accordance with a determination that a fourth portion of the video media item satisfies the set of one or more video characteristic criteria, slowing down the fourth portion of the video media item relative to at least one other portion of the video media item while playing the video media item; and in accordance with a determination that a fifth portion of the video media item satisfies the set of one or more video characteristic criteria, slowing down the fifth portion of the video media item relative to at least one other portion of the video media item while playing the video media item. For example, the computer system detects multiple apex moments in a video, and slows down each of the multiple apex moments during playback. In some embodiments, the respective portion of the video media item and the second respective portion of the video media item are separated by another portion of the video media item not included in either respective portion (e.g., a non-apex moment). In some embodiments, the computer system slows down the respective portion of the video media item and the second respective portion of the video media item by the same amount; in some embodiments, the computer system slows down the respective portion of the video media item and the second respective portion of the video media item by different amounts. Automatically detecting and slowing down playback of multiple different portions of a video media item with certain characteristics provides improved control and performance of media playback, making the user-system interface more efficient by reducing the number of inputs and amount of time needed to produce desirable video speed effects, which, additionally, reduces power usage and improves battery life of the system by enabling the user to use the system more quickly and efficiently. For example, the computer system automatically slows down multiple dynamic or exciting portions of a video, such as different portions with high amounts of content movement, camera movement, detail, and/or other detected subject matter, automatically creating a cinematic effect without requiring extensive editing of the video media item by the user. Doing so also provides improved feedback on a state of a computer system, indicating the computer system's capabilities with respect to modifying playback speed of video media items.

In some embodiments, playing the video media item includes, while playing the video media item, increasing the playback speed of a third respective portion of the video media item different from the respective portion of the video media item (e.g., as described with respect to segment ABCD in FIG. 12O). In some embodiments, the third respective portion of the video media item is automatically selected based on the content of the video media item, including: in accordance with a determination that a sixth portion of the video media item does not satisfy the set of one or more video characteristic criteria and in accordance with a determination that the sixth portion of the video media item satisfies a second set of one or more video characteristic criteria, speeding up the sixth portion of the video media item relative to at least one other portion of the video media item while playing the video media item. For example, the computer system automatically speeds up (e.g., fast forwards) certain portions of the video media item other than the detected apex moments. For example, the second set of one or more criteria include criteria satisfied when a portion of the video media item is repetitive, slow, low-motion, low-detail, and/or lacking content of determined significance. Automatically detecting different portions of a video media item to slow down and speed up provides improved control and performance of media playback, making the user-system interface more efficient by reducing the number of inputs and amount of time needed to produce desirable video speed effects, which, additionally, reduces power usage and improves battery life of the system by enabling the user to use the system more quickly and efficiently. For example, the computer system automatically slows down dynamic or exciting portions of a video, such as portions with high amounts of content movement, camera movement, detail, and/or other detected subject matter, automatically creating a cinematic effect without requiring extensive editing of the video media item by the user. Doing so also provides improved feedback on a state of a computer system, indicating the computer system's capabilities with respect to modifying playback speed of video media items.

In some embodiments, the respective portion of the video media item includes a plurality of frames, and decreasing the playback speed of the respective portion of the video media item includes inserting a plurality of interpolated fames into the plurality of frames for playback (e.g., as described with respect to FIGS. 12D-12F and/or 12O). In some embodiments, the plurality of interpolated frames includes a first interpolated frame (e.g., D', as described with respect to FIG. 12E) generated (e.g., by the computer system) based on a first frame (e.g., D) of the plurality of frames and a second frame (e.g., E) of the plurality of frames, wherein the first interpolated frame is inserted between the first frame and the second frame for playback. In some embodiments, the plurality of interpolated frames includes a second interpolated frame (e.g., E') generated (e.g., by the computer system) based on the second frame (e.g., E) of the plurality of frames and a third frame (e.g., F) of the plurality of frames, wherein the second interpolated frame is inserted between the second frame and the third frame for playback. For example, the computer system generates additional frames to insert between the existing (e.g., captured) frames of the apex moment. For example, the computer system uses motion intelligence technology to generate frames representing one or more intermediate states between two captured frames. Slowing down the respective portion of the video media item by inserting interpolated frames into the respective portion provides improved control and performance of media playback, making the user-system interface more efficient by reducing the number of inputs, amount of time, and amount of video data needed to produce desirable video speed effects, which, additionally, reduces power usage and improves battery life of the system by enabling the user to use the system more quickly and efficiently. For example, by interpolating frames to insert into the apex moment segment, the computer system improves the appearance of the slowed-down portion during playback, allowing the captured video frames to be played back at a slower frame rate without reducing the actual frame rate of playback to a point where playback quality degrades (e.g., below 24 FPS), which further allows the cinematic slowing effects to be applied even to video media items captured at lower frame rates.

In some embodiments, while displaying, via the display generation component, a representation of the video media item (e.g., in a media viewing and/or media editing user interface), the computer system receives a request (e.g., 1210 and/or 1212) to edit a playback speed profile of the video media item (e.g., as described with respect to FIG. 12I), and in response to receiving the request to edit the playback speed profile of the video media item, the computer system displays a set of one or more selectable user interface objects (e.g., 1214C, as described with respect to FIG. 12J) (e.g., touch controls; in some embodiments, included in an editing user interface). In some embodiments, the set of one or more controls includes a first selectable user interface object that, when selected, selects a seventh portion of the video media item to be slowed down, wherein slowing down the seventh portion of the video media item includes decreasing a playback speed of the seventh portion of the video media item during playback of the video media item, and a second selectable user interface objects that, when selected, selects a first playback speed for an eighth portion of the video media item, wherein selecting the first playback speed for the eight portion of the video media item causes the eighth portion of the video media item to be played at the first playback speed during playback. For example, the first control can be used to select a start point, end point, and/or duration of a portion of the video to slow down during playback. In some embodiments, the seventh (e.g., selected) portion includes some or all of the respective (e.g., automatically detected) portion. For example, the second control can be used to adjust how much a portion of the video is slowed down during playback. In some embodiments, the eighth portion includes some or all of the seventh portion and/or the respective portion. Providing user interface controls for modifying which portion(s) of the video media item is slowed down and by how much provides improved control and performance of media playback, making the user-system interface more efficient by reducing the number of inputs and amount of time needed to produce desirable video speed effects, which, additionally, reduces power usage and improves battery life of the system by enabling the user to use the system more quickly and efficiently. For example, in addition to automatically identifying the respective portion of the video media item to slow down, the computer system allows the user to modify the speed profile of the video media item.

In some embodiments, while displaying the set of one or more selectable user interface objects, the computer system displays (e.g., 1216) an indication of the respective portion of the video media item (e.g., as described with respect to FIGS. 12J, 12L, and/or 12N) (e.g., the automatically detected apex moment). For example, the computer system labels, marks, and/or visually emphasizes the respective portion of the video media item, e.g., in a timeline representing the video media item. In some embodiments, the computer system displays both the indication of the respective portion of the video media item and an indication of any additional/different portion of the video media item selected using the second control. Displaying an indication of an automatically-detected apex moment in a video provides improved control and performance of media playback, making the user-system interface more efficient by reducing the number of inputs and amount of time needed to produce desirable video speed effects, which, additionally, reduces power usage and improves battery life of the system by enabling the user to use the system more quickly and efficiently. For example, by indicating the automatically detected portion, the computer system provides the user with a baseline for cinematic speed effects, which the user can then quickly and easily adjust.

In some embodiments, while displaying, via the display generation component, a representation of the video media item (e.g., in a media viewing and/or media editing user interface), in accordance with a determination that at least one portion of the video media item satisfies the set of one or more video characteristic criteria, the computer system displays, via the display generation component, a graphical indication (e.g., 1200D and/or 1216) (e.g., a selectable user interface object, icon, label, and/or text) that the at least one portion of the video media item has been automatically selected for playback with reduced speed. For example, the computer system displays an indication that an apex moment has been detected in the video media item. In some embodiments, the graphical indication includes a selectable user interface object. In some embodiments, the graphical indication can be selected to enable or disable decreasing the speed of the detected apex moment during playback. Displaying a graphical indication that a portion of a video has been automatically selected for playback with slowed-down speed effects provides improved feedback on a state of a computer system, indicating the computer system's capabilities with respect to modifying playback speed of video media items.

In some embodiments, the graphical indication is displayed in a media editing user interface (e.g., 1214). In some embodiments, the graphical indication includes a selectable user interface object that, when selected, initiates a process for changing a playback speed of the at least one portion of the video media item during playback (e.g., as described with respect to FIG. 12I). In some embodiments, selecting the graphical indication enables decreasing the speed of the selected portion during playback (e.g., enables the cinematic speed effects). In some embodiments, selecting the graphical indication disables decreasing the speed of the selected portion during playback (e.g., turns off the cinematic speed effects). In some embodiments, selecting the graphical indication causes the computer system to display a user interface for editing the speed profile of the video media item, e.g., including the selectable user interface objects for modifying the speed profile.

Note that details of the processes described above with respect to method 1300 (e.g., FIG. 13) are also applicable in an analogous manner to the methods described above and below. For example, the processes described with respect to method 1300 can be used when playing back media captured using the methods described with respect to methods 700, 900, 800, 1500, and/or 1700. For brevity, these details are not repeated below.

FIGS. 14A-14Z illustrate example techniques and systems for controlling settings of a computer system based on movement characteristics of hardware inputs in accordance with some embodiments. For example, FIGS. 14A-14Z illustrate adjusting settings continuously (e.g., through an ordered set of values) based on movement detected during contact with the hardware button and/or touch-sensitive display, continuing to adjust settings after contact ends based on movement detected near the end of contact, and "snapping" to particular settings values when movement detected during contact and/or near the end of contact satisfies certain conditions, such as moving in the direction of or with enough "momentum" to reach the next particular settings value.

As illustrated in FIG. 14A, computer system 600 displays camera user interface 612 (e.g., in the quiet or ready-to-capture mode) and settings control 622 for an exposure setting of camera user interface 612, for example, as described with respect to FIGS. 6A-6AM, 7, 10A-10V, and 11. For clarity, the lower panel of FIG. 14A and FIGS. 14B-14Z depict the only portion of computer system 600 including first button 602A and the display of settings control 622 (e.g., the region of display 606 proximate to first button 602A); it is to be understood that, during the processes described with respect to FIGS. 14A-14B-14Z, camera user interface 612 is displayed and updated, for instance, as described with respect to FIGS. 6A-6AM, 7, 10A-10V, and 11. Additionally, in FIGS. 14A-14Z, first button 602A is depicted with dotted lines demarcating quadrants of the touch-sensitive surface of first button 602A in order to better illustrate movement inputs detected via first button 602A. In the foregoing description of FIGS. 14A-14Z, directional terms such as "right," "left," "up," and "down" are used with respect to the page. Accordingly, in the embodiment of computer system 600 illustrated in these figures, "left" refers to the direction approaching (e.g., moving closer to) to the set of cameras (e.g., first camera 604A, second camera 604B, third camera 604C, and fourth camera 604D), "right" refers to the direction moving away from the set of cameras, "up" refers to the direction away from computer system 600/out from the surface of first button 602A, and "down" refers to the direction towards computer system 600/into the surface of first button 602A.

At FIG. 14A, while displaying settings control 622 for the exposure setting, computer system 600 detects contact 1402, where finger 608 contacts (e.g., touches and/or lightly presses) first button 602A. Contact 1402 is detected at a first location on first button 602A, starting at a point near the right side of first button 602A between the middle-right and right quadrants of the touch-sensitive surface of first button 602A.

Alternatively, in some embodiments, computer system 600 detects contact 1403 directed to settings control 622 on the touch-sensitive surface of display 606, in particular, to a location on settings control 622 that corresponds to the location of contact 1402 on first button 602A. For example, settings control 622 is displayed below first button 602A, and contact 1402 is directed to a point on settings control 622 directly below the point near the right side of first button 602A between the middle-right and right quadrants. Accordingly, in some embodiments, the techniques described herein as being applied based on particular locations and movements of contact directed to first button 602A can likewise be applied based on corresponding locations and movements of contact directed to settings control 622 on the touch-sensitive surface of display 606. For illustrative purposes, finger 608 is not depicted in all of FIGS. 14B-14Z; instead, a filled dot (such as contact 1402) is used to illustrate the current location of an ongoing contact with first button 602A (e.g., and/or a corresponding location of an ongoing contact with settings control 622 via the touch-sensitive surface of display 606) and an open dot is used to illustrate a lifted contact, e.g., when finger 608 is no longer touching first button 602A and/or settings control 622. In some embodiments, ongoing contact with first button 602A is registered while first button 602A is in hardware button state (B), (C), and/or (D) (e.g., finger 608 rests on or lightly presses first button 602A), and lifted contact is registered when first button 602A enters hardware button state (A).

As described with respect to FIGS. 6A-6AM and 10A-10W, while first button 602A is associated with (e.g., customized to perform) particular settings adjustment operations, computer system 600 displays settings control 622 with a representation of a scale of values for the associated setting, including tick marks representing ordered values in consistent intervals. FIG. 14B provides more detailed views of the scales of values and the representations of the scales of values situated within settings control 622 for (e.g., from top to bottom) the exposure setting, the zoom setting, and the filter intensity setting. The top of FIG. 14B depicts full scale of exposure values 1404, ranging from −1.0 (e.g., corresponding to the darkest provided exposure setting, e.g., the fastest simulated shutter speed, fastest ISO speed, and/or smallest aperture size) to +1.0 (corresponding to the brightest provided exposure setting, e.g., the slowest simulated shutter speed, slowest ISO speed, and/or largest aperture size), where each tick mark represents an interval of 0.1. The center of FIG. 14B depicts full scale of zoom values, 1406 ranging from 0.5× (e.g., a wide-angle magnification, e.g., captured using a wide-angle lens) to 12× (e.g., a telephoto magnification, e.g., captured using an 8× zoom lens and further digital magnification), where each tick mark represents an interval of 0.1×. As illustrated in FIG. 14B, although the value intervals between each tick mark are consistent (e.g., 0.1× zoom), the scale of zoom values is displayed with the tick marks spaced increasingly close together as the zoom level increases, such that the distance between 0.5× and 1.0× on the scale is the same as the distance between 1.0× and 2.0×, between 0.2× and 4.0×, and between 4.0× and 8.0×. In some embodiments, the spacing between subsequent tick marks is successively compressed, for instance, as a logarithmic scale of values. The bottom of FIG. 14B depicts full scale of filter intensity values 1408, ranging from 0% (e.g., not applying the filter effects) to 100% (e.g., applying the filter effects to their greatest extent), where each tick mark represents an interval of 2.5%.

The representations of the scales of settings values displayed within settings control 622 include a fixed-width "window" of the full scales of values, represented in FIG. 14B by dashed boxes, which is centered on the tick mark representing the current setting value. As shown below full scale of exposure values 1404, at an exposure value of 0.0, settings control 622 is displayed with the tick mark representing 0.0 at the center and tick marks ranging from −1.0 to +1.0 on either side within the window. As shown below full scale of zoom values 1406, at a zoom level of 1×, settings control 622 is displayed with the tick mark representing 1× at the center and tick marks ranging from 0.5× to 2.0× on either side within the window; accordingly, although 1× is not the middle zoom value within the window, the 1× tick mark is spatially centered within the window due to the successively compressed spacing. As shown below full scale of filter intensity values 1408, at a filter intensity level of 100%, settings control 622 is displayed with the tick mark representing 100% at the center, with tick marks ranging down to 75% displayed to the left within the window and the right of the window left empty. In some embodiments, computer system 600 displays settings control 622 on display 606 such that the width of the window within settings control 622 corresponds to the width of the touch-sensitive surface first button 602A and/or the center of the window within settings control 622 corresponds to the center of the touch-sensitive surface of first button 602A. For example, at an exposure value of 0.0, the tick mark representing-1.0× falls below the left-most edge of first button 602A, the tick mark representing 1.0× falls below the right-most edge of first button 602A, and the tick mark representing 0.0× falls below the center of first button 602A (e.g., right between the middle-left and middle-right quadrants).

Figure 14C:
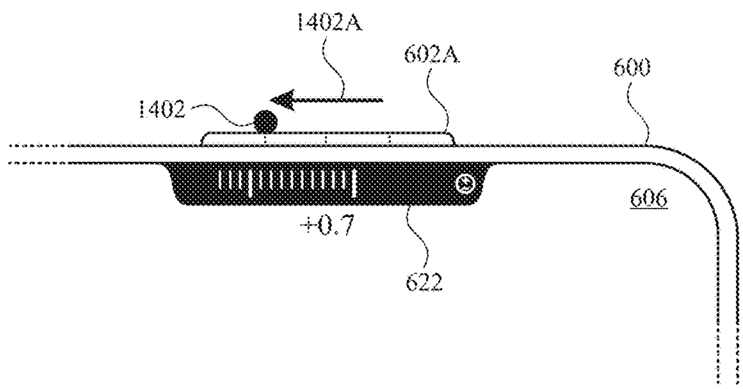

At FIG. 14C, computer system 600 detects movement 1402A of contact 1402, where contact 1402 moves from the initial location illustrated in FIG. 14A at the right side of first button 602A to a new location at the left side of first button 602A, between the left and middle-left quadrants. Computer system 600 adjusts the exposure value to +0.7 based on movement 1402A and, as illustrated in FIG. 14C, displays settings control 622 with the tick mark representing +0.7 at the center, above the updated text "+0.7." In particular, based on the direction of movement 1402A from right to left, computer system 600 increases the exposure value, as if contact 1402 were "dragging" the tick marks of the exposure scale representing higher exposure values towards the center of settings control 622. Additionally, based on the magnitude of movement 1402A, computer system 600 changes the exposure value by a magnitude of 0.7, as the distance from the initial location of contact 1402 between the middle-right and right quadrants of first button 602A and the new location between the left and middle-left quadrants corresponds to (e.g., matches, approximately matches, and/or is proportional to) the distance between the tick marks representing 0.0 and +0.7 in settings control 622, as if contact 1402 were moving a physical knob, dial, or slider with the same scale of exposure values.

Figure 14D:
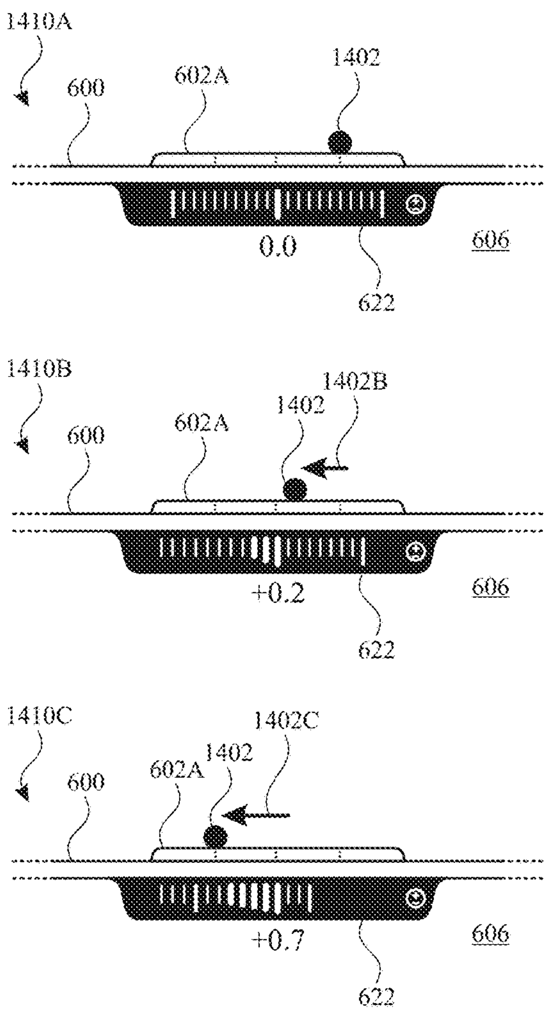

FIG. 14D illustrates the display of settings control 622 during movement 1402A, e.g., as contact 1402 slides from right to left across the surface of first button 602A from the initial location illustrated in FIG. 14A to the new location illustrated in FIG. 14C. As illustrated in first panel 1410A, upon initially detecting contact 1402, computer system 600 displays the tick mark corresponding to the initial exposure value, 0.0, with increased visual emphasis, depicted in panel 1410A by the increased length and width of the center tick mark.

As illustrated in second panel 1410B, during right-to-left movement 1402B, the initial portion of movement 1402A, computer system 600 adjusts the exposure value from 0.0 to +0.2 and animates the representation of the exposure scale (e.g., full scale of exposure values 1404) sliding right to left through the window of settings control 622 along with contact 1402 (e.g., at a similar speed to movement 1402B), moving the tick mark representing +0.2 from its initial position in first panel 1410A to the center of settings control 622. As computer system 600 animates the representation of the exposure scale sliding from right to left, computer system displays the tick mark at the center of settings control 622 with increased visual emphasis, then gradually reverts the tick mark to its non-emphasized appearance once the tick mark is no longer at the center of settings control 622. Accordingly, during the adjustment from 0.0 to +0.2, computer system emphasizes the tick mark corresponding to 0.0 as shown in panel 1410A, then emphasizes the tick mark corresponding to +0.1 while slightly deemphasizing (e.g., shortening and/or narrowing) the tick mark corresponding to 0.0, then, as illustrated in second panel 1410B, emphasizes the tick mark corresponding to +0.2 while slightly deemphasizing the tick mark corresponding to 0.1 and further deemphasizing the tick mark corresponding to 0.0, creating a "tail" of emphasis running through the previously-selected exposure values within the representation of scale of exposure values 1404.

As illustrated in third panel 1410C, during right-to-left movement 1402C, the latter portion of movement 1402A, computer system adjusts the exposure value from +0.2 to +0.7 and animates scale of exposure values 1404 as described with respect to second panel 1410B, sliding scale of exposure values 1404 to move the tick mark representing +0.7 to the center of settings control 622. While animating scale of exposure values 1404, computer system 600 continues to adjust the emphasis of the tick marks as described above, emphasizing the tick marks as they cross the center of settings control 622 before gradually reverting the emphasis. As illustrated in third panel 1410C, the "tail" of emphasis appears to lengthen as more tick marks move past the center of settings control 622. For example, the length of the "tail" depends on the speed of movement 1402A (e.g., the speed at which tick marks are animated moving past the center of settings control 622) relative to the rate at which emphasis is decreased (e.g., the time taken for a tick mark to return to its initial appearance, representing the end of the "tail"). In some embodiments, computer system 600 reverts the emphasis of the tick marks based on simulated physics, for instance, modeling the tick marks using spring physics, where the tick marks spring back to their initial length after being "stretched" when crossing the center point.

Accordingly, by animating settings control 622 as illustrated in FIG. 14B, computer system 600 provides a "live" depiction of the adjustment to the exposure value responsive to movement 1402A. In some embodiments, while adjusting the exposure, computer system 600 adjusts the display of a camera preview (e.g., camera preview 614 and/or camera preview 1046) to reflect the exposure value represented by the tick mark currently at the center (e.g., the current exposure value at a given time during movement 1402A). For example, during movement 1402A, the brightness of the camera preview increases (e.g., by increasing the number of frames combined to digitally produce a brighter capture) at a rate corresponding to the speed of movement 1402A.

Figure 14E:
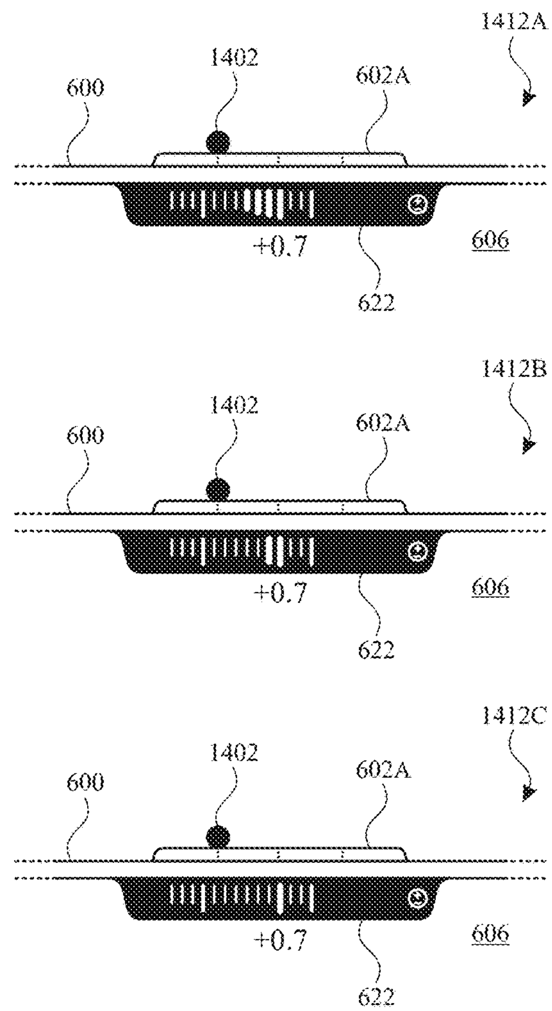

FIG. 14E illustrates the display of settings control 622 if contact 1402 stopped on the surface of first button 602A following movement 1402A. As described above, as a result of movement 1402A, the tick mark representing the exposure level of +0.7 is displayed at the center of settings control 622 in an emphasized state. As illustrated in first panel 1412A and second panel 1412B of FIG. 14E, while contact 1402 remains at the same location, the tick marks passed on the way to +0.7 (e.g., corresponding to +0.5 and +0.6) gradually revert to their un-emphasized appearances. Accordingly, at third panel 1412C, after a period of time without movement, the representation of the scale of exposure values is displayed with the tick mark corresponding to +0.7 emphasized and all other displayed tick marks with their original, un-emphasized appearances.

Figure 14F:
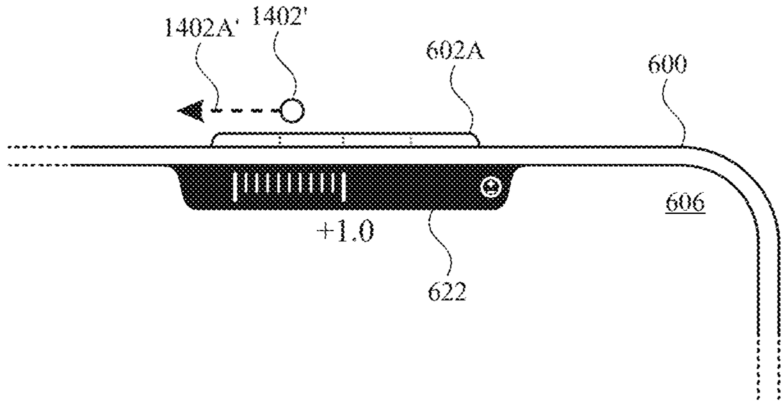

At FIG. 14F, immediately following movement 1402A and without first stopping contact 1402 on the surface of first button 602A (e.g., as described with respect to FIG. 14E), computer system 600 detects lift-off 1402' of contact 1402 from the surface of first button 602A (e.g., the end of contact 1402). For example, movement 1402A turns into a flick movement, where contact 1402 is lifted with some forward momentum while moving from right to left. As illustrated in FIG. 14F, computer system 600 continues to adjust the exposure setting after detecting the end of contact 1402, further increasing the exposure to +1.0. The adjustment following lift-off of contact 1402 is based on movement detected near (e.g., within 0.05 s, 0.1 s, and/or 0.2 s of detecting) the lift-off 1402'. In some embodiments, the movement near the end of contact 1402 includes the last portion of movement 1402A detected before the end of contact 1402, e.g., via the touch-sensitive surface of first button 602A. In some embodiments, the movement near lift-off 1402' includes movement detected after the end of contact 1402, for instance, using proximity sensors or other non-contact motion sensors.

In some embodiments, the adjustment to +1.0 following lift-off 1402' is based on movement 1402A adjusting the exposure setting towards a predetermined "snapping" value near the end of contact 1402. For example, the snapping values for the exposure setting are +1.0, 0.0, and −1.0. When lift-off 1402' is detected while at an exposure value of +0.7, movement 1402A is moving from right to left (e.g., corresponding to increasing the exposure value), towards the snapping value of +1.0. Accordingly, computer system 600 may "snap" the exposure value to the next snapping value after contact 1402 ends.

In some embodiments, the adjustment to +1.0 following lift-off of contact 1402 is a simulated physical adjustment based on movement 1402A. For example, computer system 600 simulates the adjustment of the exposure setting as a physical control being actuated by contact 1402, such as a dial with the scale of exposure values that can be rotated clockwise and counter-clockwise by lateral movement across first button 602A. Upon detecting lift-off 1402', computer system 600 models a transfer of momentum from movement 1402A of contact 1402 to the simulated physical control, such that the simulated physical control continues to move with simulated movement 1402A', e.g., based off of the velocity of movement 1402A at the time of lift-off 1402' and one or more simulated physical characteristics of the settings control (e.g., mass and/or coefficient of friction). For example, computer system 600 models the dial with the scale of exposure values continuing to spin far enough to adjust the exposure value by an amount corresponding to simulated movement 1402A' before stopping at +1.0. In some embodiments, the "snapping" value of +1.0 acts as a brake point for the simulated physical control, where computer system 600 stops the adjustment of the exposure value at +1.0 if simulated movement 1402A' would continue spinning (e.g., has a great enough magnitude) the dial past the tick mark representing +1.0.

Figure 14G:
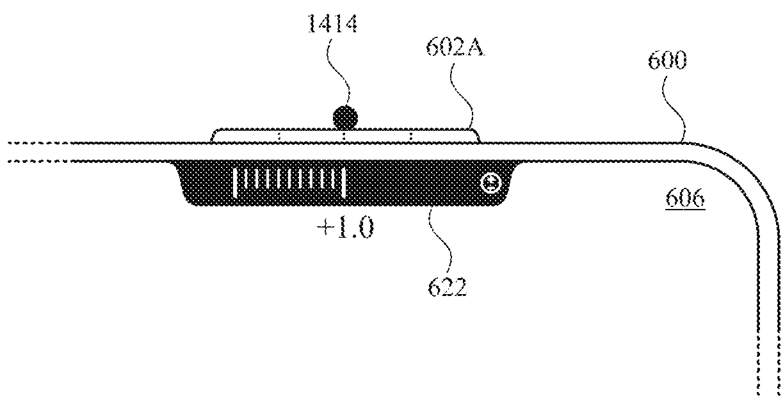

At FIG. 14G, after adjusting the exposure value to +1.0, while displaying settings control 622 for the exposure setting, computer system 600 detects contact 1414 at the center point of first button 602A. In some embodiments, contact 1414 is detected less than a threshold period of time after detecting the end of contact 1402, e.g., before computer system 600 dismisses settings control 622 following lift-off. At FIG. 14H, computer system 600 detects movement 1414A of contact 1414, where contact 1414 moves from the initial location at the center of first button 602A to the left, between the left and middle-left quadrants. Although movement from right to left corresponds to increasing the exposure value, as described with respect to FIG. 14C, as indicated by full scale of exposure values 1404, the current exposure value of +1.0 is the maximum (e.g., brightest/longest) exposure value available via settings control 622, and accordingly, computer system 600 does not further increase the exposure value beyond +1.0.

Figure 14H:
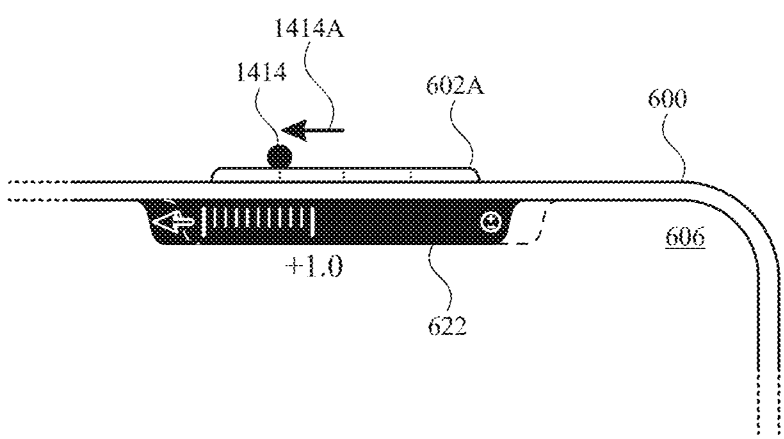

At FIG. 14H, as the exposure value is not adjusted in response to movement 1414A, instead of sliding the representation of the exposure scale right to left through the window of settings control 622 (e.g., as described with respect to FIGS. 14C-14D), computer system 600 displays settings control 622 sliding to the left with along with contact 1414. As illustrated in FIG. 14H, all elements of settings control 622, including the representation of the exposure scale, the text indicating the current exposure value, the icon corresponding to the exposure setting, and the cut-out tab all slide left together, offsetting from the center of first button 602A. In some embodiments, computer system 600 models settings control 622 moving with some "resistance," e.g., not sliding settings control 622 to the left to the full extent of movement 1414A. For example, computer system 600 simulates the movement of settings control 622 with spring physics, animating settings control 622 sliding with more resistance the further settings control 622 displaces from the center of first button 602A. For example, computer system 600 only animates settings control 622 sliding in response to movement 1414A over to a maximum displacement, even if movement 1414A continues after displaying settings control at the maximum displacement.

Figure 14I:
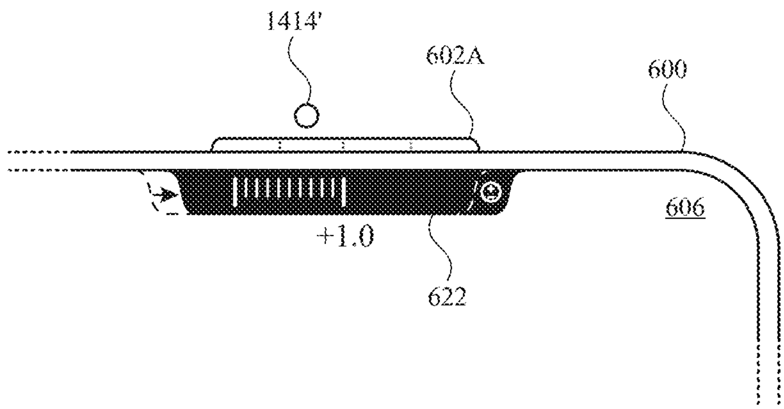

At FIG. 14I, while displaying settings control 622 displaced from the center of computer system 600, detects lift-off 1414' of contact 1414 from the surface of first button 602A (e.g., the end of contact 1414). In response to detecting lift-off 1414', computer system 600 displays settings control 622 sliding back to the right to re-center below first button 602A.

Figure 14J:
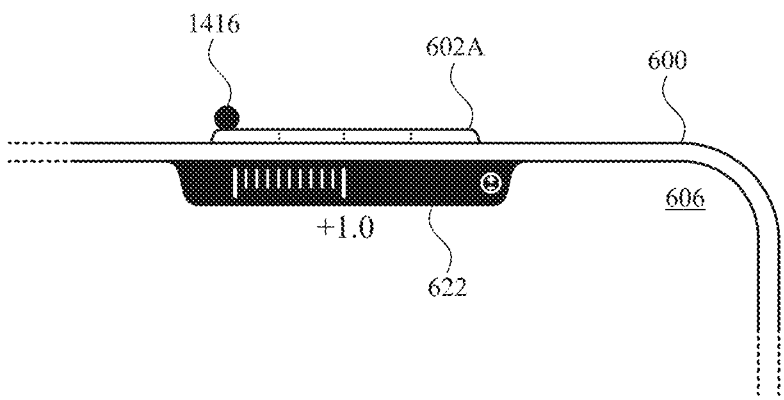
Figure 14K:
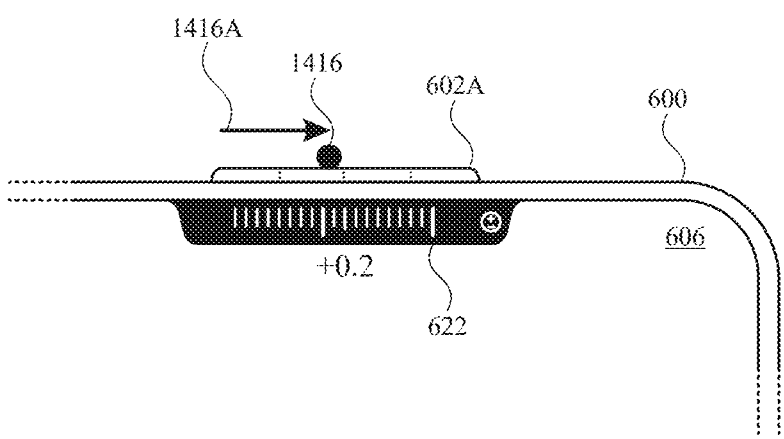

At FIG. 14J, while the exposure value is set to +1.0 and while displaying settings control 622 for the exposure setting, computer system 600 detects contact 1416 at the left edge of first button 602A. At FIG. 14K, computer system 600 detects movement 1416A, where contact 1416 moves from the left edge of first button 602A towards the center of first button 602A. Computer system 600 adjusts the exposure value based on movement 1416A as described with respect to FIGS. 14C-14D, reducing the exposure value to +0.2 and displaying settings control 622 with the tick mark representing +0.2 at the center, above the updated text "+0.2." For example, computer system 600 animates the scale of exposure values dragging left-to-right along with movement 1416A, with the text of the current exposure value updating and the corresponding tick marks elongating then retracting as they cross the center of settings control 622.

Figure 14L:
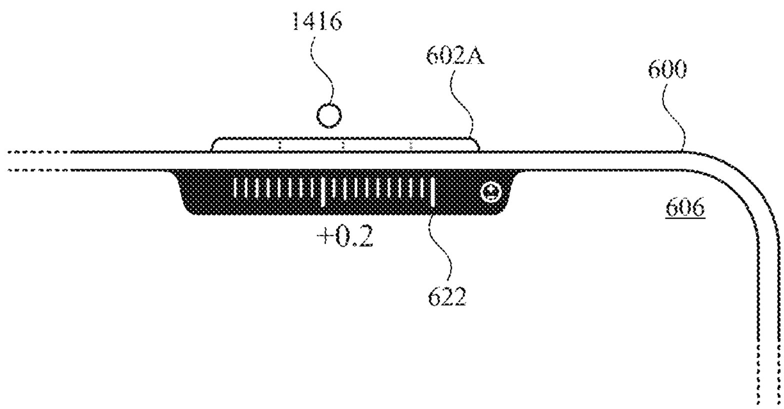

Following movement 1416A, contact 1416 stops moving near the center of first button 602A. After movement 1416A stops, computer system 600 detects lift-off 1416' of contact 1416. For example, contact 1416 is lifted straight up off of first button 602A, such that no movement is detected near the time of lift-off 1416'. As illustrated in FIG. 14L, computer system 600 does not continue to adjust the exposure setting after the end of contact 1416, for instance, because movement 1416A was not moving in the direction of a snapping value when lift-off 1416' is detected and/or because when simulating the adjustment as a physical control, stopping movement 1416A prior to lift-off 1416' results in no simulated transfer of momentum. Accordingly, the user can precisely select settings values based on a swipe/drag that stops before lifting, but skip quickly between snapping values based on a flick-type movement.

Figure 14M:
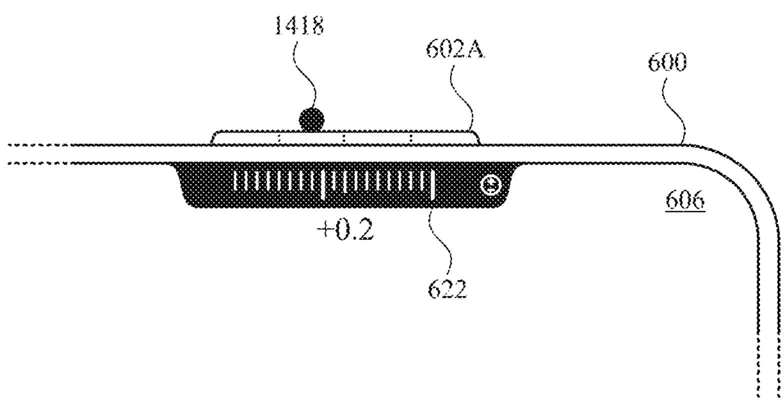
Figure 14N:
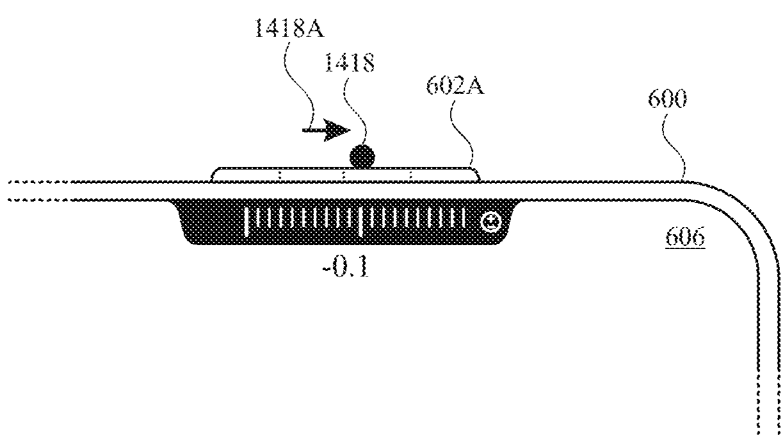

At FIG. 14M, while the exposure value is set to +0.2 and while displaying settings control 622 for the exposure setting, computer system 600 detects contact 1418 in the middle-left quadrant of first button 602A. At FIG. 14N, computer system 600 detects movement 1418A, where contact 1418 moves left-to-right across first button 602 past the center of first button 602A. Computer system 600 adjusts the exposure value based on movement 1418A as described with respect to FIGS. 14C-14D, reducing the exposure value to −0.1 and displaying settings control 622 with the tick mark representing −0.1 at the center, above the updated text "−0.1." For example, computer system 600 animates the scale of exposure values dragging left-to-right along with movement 1418A, with the text of the current exposure value updating and the corresponding tick marks elongating then retracting as they cross the center of settings control 622. Although the exposure value of 0.0 is included in the predetermined set of snapping values for exposure, because contact 1418 is maintained during movement 1418A as the exposure value is adjusted past 0.0 (e.g., as the tick mark representing 0.0 crosses over the center of settings control 622), computer system 600 does not stop the adjustment at the snapping value.

Figure 14O:
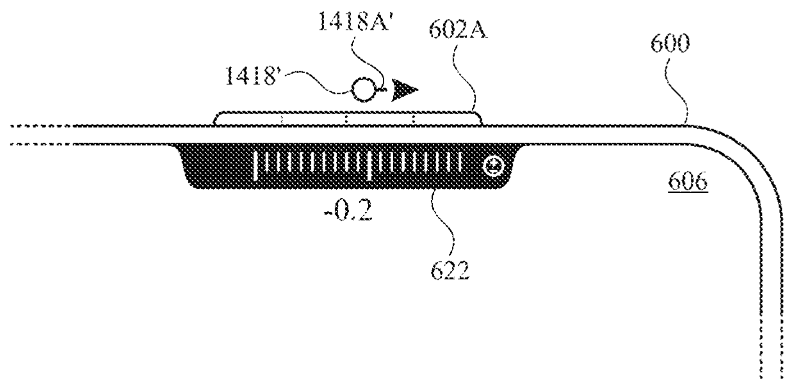

At FIG. 14O, immediately following movement 1418A and without first stopping contact 1418 on the surface of first button 602A, computer system 600 detects lift-off 1418' of contact 1418 from the surface of first button 602A, e.g., a left-to-right flick movement. As illustrated in FIG. 14O, computer system 600 continues to adjust the exposure setting after detecting the end of contact 1418, further decreasing the exposure to −0.2 based on the characteristics of movement 1418A near the time of lift-off 1418'. In some embodiments, as illustrated in FIG. 14O, although movement 1418A is moving in the direction of the snapping value −1.0 (e.g., decreasing below 0.0) at the time of lift-off 1418', computer system 600 does not continue adjustment to −1.0 because simulated movement 1418A' (e.g., continued movement based on the speed of movement 1418A at lift off and the one or more simulated physical characteristics of the settings control) has too small a magnitude to simulate adjusting the exposure value the rest of the way to −1.0. For example, the snapping values may act as brake points for continued adjustment after lift-off 1418' without pulling (e.g., snapping) the adjustment all the way to the next snapping value.

The techniques described with respect to adjusting the exposure setting based on movement inputs can also be applied to other adjustment operations, such as the other camera settings described in FIGS. 6A-6AM and 10A-10W. In particular, FIGS. 14P-14Z illustrate applying these techniques to adjusting the zoom setting.

Figure 14P:
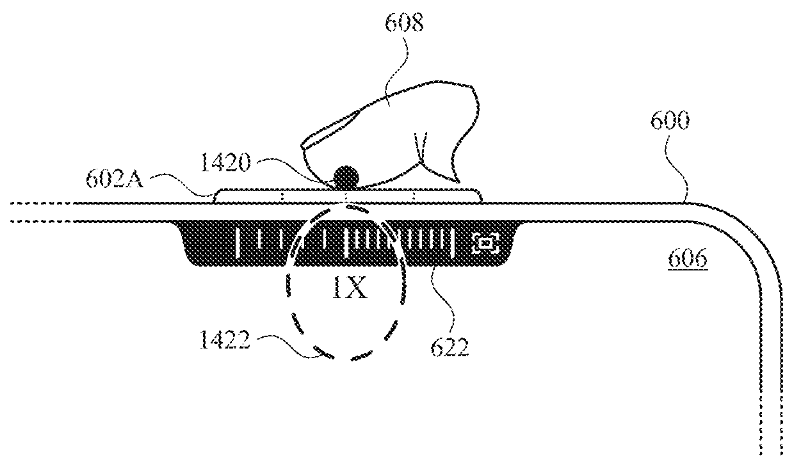

At FIG. 14P, while displaying settings control 622 for the zoom setting, computer system 600 detects contact 1420, where finger 608 contacts the center of first button 602A. Alternatively, as discussed with respect to FIG. 14A, computer system 600 detects contact 1422 directed to the center of settings control 622 (e.g., corresponding to the location of contact 1420 on first button 602A). As illustrated in FIG. 14P, at an initial zoom value of 1×, computer system 600 displays settings control 622 with the tick mark representing 1× at the center above the text "1×." The representation of the zoom scale included in settings control 622 at 1× zoom (e.g., the "window" of full scale of zoom values 1406) includes tick marks representing zoom values going down to 0.5× to the left of the 1× tick mark and tick marks going up to 2.0× zoom to the right, with the tick marks on the left compressed less than the tick marks on the right, as described with respect to FIG. 14B.

Figure 14Q:
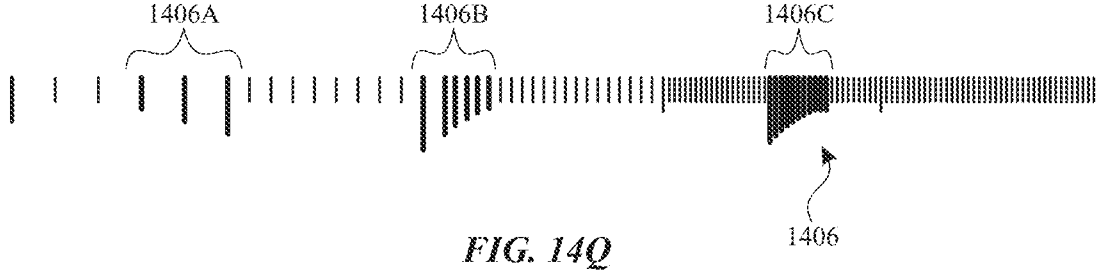

As the spacing between tick marks is successively compressed as the represented zoom levels increase, when animating the changes to the emphasis of the tick marks during adjustment of the zoom level as described with respect to FIG. 14D, different numbers of tick marks may be displayed in an emphasized state depending on where along full scale of zoom values 1406 the adjustment is taken place. As illustrated in FIG. 14Q, segments 1406A, 1406B, and 1406C of full scale of zoom values 1406 correspond to movements of approximately the same length along first button 602A (and/or along settings control 622 via the touch-sensitive surface of display 606). However, fewer tick marks pass through the center of settings control 622 when traversing segment 1406A, the segment including the lowest zoom levels, than traversing segment 1406B or traversing segment 1406C, the segment including the highest zoom levels. Accordingly, computer system 600 displays fewer tick marks in emphasized states when adjusting across segment 1406A than when adjusting across segment 1406B or segment 1406C.

Figure 14R:
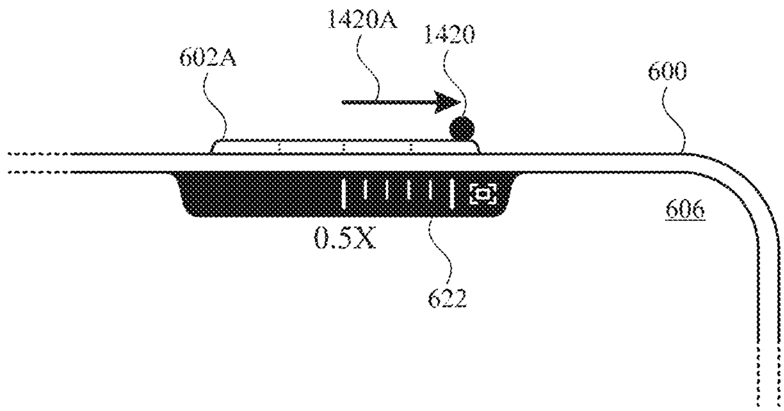
Figure 14S:
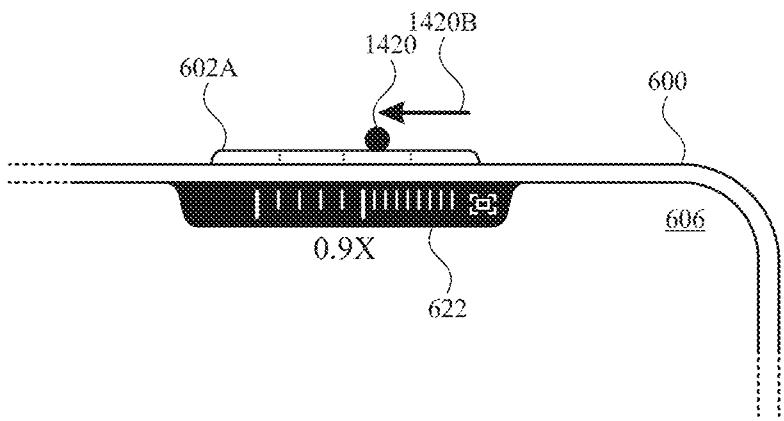

At FIG. 14R, computer system 600 detects movement 1420A of contact 1420, moving from the center of first button 602A to the right edge of first button 602A. Computer system adjusts the zoom value based on movement 1420A as described with respect to FIGS. 14C-14D, decreasing the zoom level to 0.5×, updating the text to "0.5×," and animating the representation of the zoom scale sliding to the right to center the tick mark corresponding to 0.5× within settings control 622. In some embodiments, while adjusting the zoom, computer system 600 adjusts the display of a camera preview (e.g., camera preview 614 and/or camera preview 1046) to reflect the zoom value represented by the tick mark currently at the center (e.g., the current exposure value at a given time during movement 1420A). For example, during movement 1420A, the magnification of the camera preview decreases (e.g., by transitioning from capturing using a 1× zoom lens to a 0.5× zoom lens of the set of cameras and/or digitally zooming out) at a rate corresponding to the speed of movement 1420A with respect to the representation of the zoom scale.

Figure 14T:
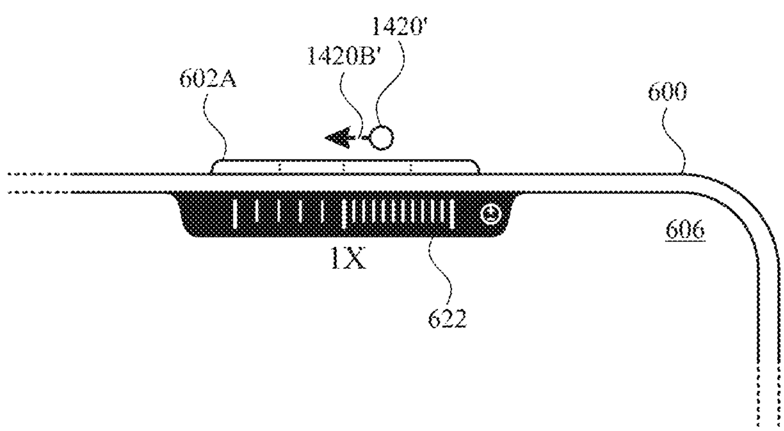

At FIG. 14R, computer system 600 detects movement 1420B of contact 1420, moving from the right edge of first button 602A back towards the center. Computer system adjusts the zoom value based on movement 1420A as described above, increasing the zoom level to 0.9×, updating the text to "0.9×," and animating the representation of the zoom scale sliding to the left to center the tick mark corresponding to 0.9× within settings control 622. At FIG. 14T, immediately following movement 1420B and without first stopping contact 1420 on the surface of first button 602A, computer system 600 detects lift-off 1420' of contact 1420 from the surface of first button 602A, e.g., a right-to-left flick movement. As illustrated in FIG. 14T, computer system 600 continues to adjust the zoom setting after detecting the end of contact 1420, further increasing the zoom level to 1.0×.

In some embodiments, as discussed with respect to adjusting the exposure value, the zoom setting has set of predetermined "snapping" values. For example, the snapping values include 0.5×, 1.0×, 2.0×, and 8.0× zoom. For example, the snapping values may include the optical zoom levels of the set of cameras of computer system 600 (e.g., a 0.5× wide angle lens, a 1.0× standard lens, and an 8.0× telephoto lens), and accordingly, the zoom values that produce high-quality optical captures without needing to perform digital zoom (e.g., digitally interpolating between camera data from the different lenses and/or magnifying the camera data). As illustrated in FIG. 14T, computer system 600 adjusts the zoom level to the snapping value of 1.0× based on movement 1420B (e.g., the movement occurring near the time of lift-off 1420') moving (e.g., adjusting) in the direction of value 1.0×. As discussed with respect to FIG. 14F, in some embodiments, the adjustment to 1.0× from 0.9× is based only on the direction of movement 1420B when lift-off 1420' is detected (e.g., "snapping" the zoom to the next predetermined value), and in some embodiments, the adjustment to 1.0× from 0.9× is based on simulated movement 1420B', which would continue to move (e.g., adjust) the zoom level past 1.0× but for the snapping value acting as a brake point.

Figure 14U:
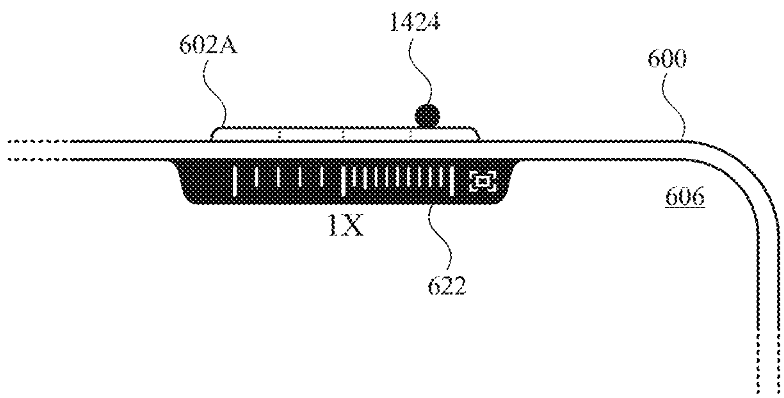
Figure 14V:
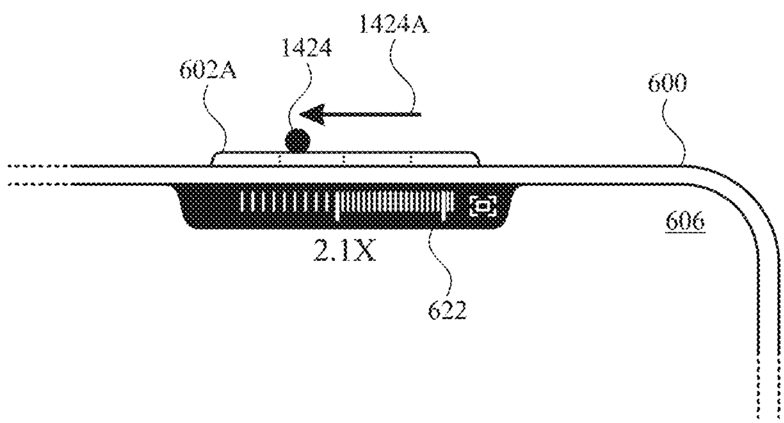
Figure 14W:
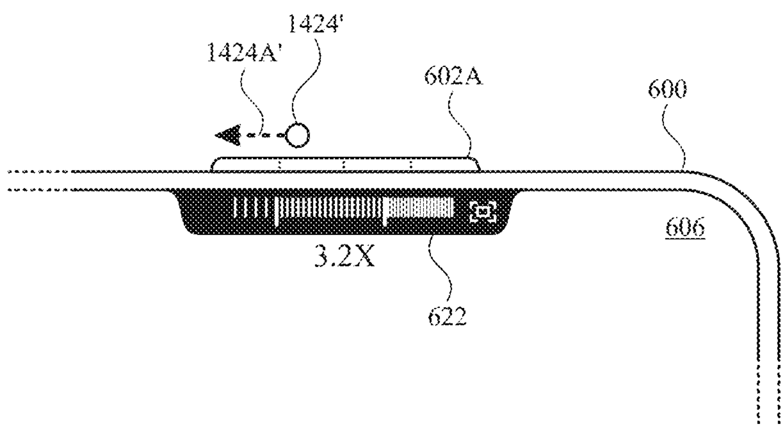

At FIG. 14U, while displaying settings control 622 for the zoom setting at 1.0× zoom, computer system 600 detects contact 1424 in the right quadrant of first button 602A. At FIG. 14V, computer system 600 detects movement 1424A of contact 1424, moving from the right quadrant all the way into the middle-left quadrant of first button 602A. Computer system adjusts the zoom value based on movement 1424A as described above, increasing the zoom level to 2.1×, updating the text to "2.1×," and animating the representation of the zoom scale sliding to the left to center the tick mark corresponding to 2.1× within settings control 622. At FIG. 14W, immediately following movement 1424A and without first stopping contact 1424 on the surface of first button 602A, computer system 600 detects lift-off 1424' of contact 1424 from the surface of first button 602A, e.g., a right-to-left flick movement. As illustrated in FIG. 14W, computer system 600 continues to adjust the zoom setting after detecting the end of contact 1424, further increasing the zoom level to 3.2×. In some embodiments, because simulated movement 1424A' following lift-off 1424' does not adjust the zoom level past the next snapping value, 8.0×, computer system 600 only adjusts the zoom setting to the extent of simulated movement 1424', for example, gradually slowing down the adjustment as the zoom value approaches 3.2× as the simulated settings control loses momentum.

Figure 14X:
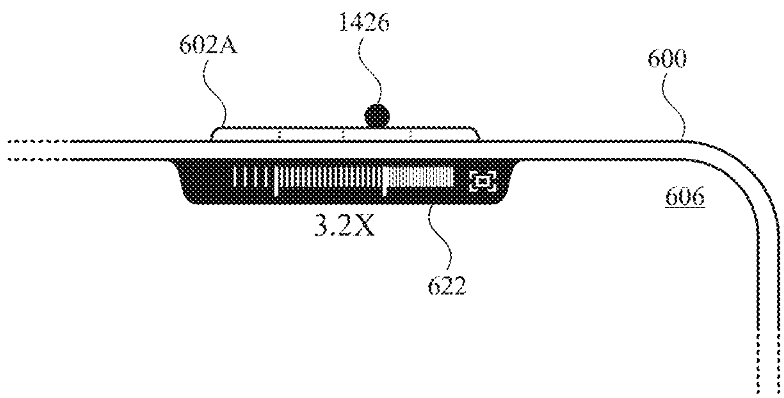
Figure 14Y:
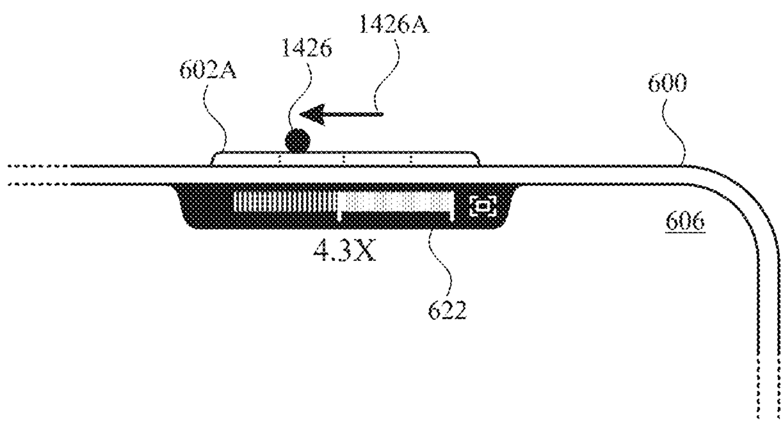

At FIG. 14X, while displaying settings control 622 for the zoom setting at 3.2× zoom, computer system 600 detects contact 1426 in the middle-right quadrant of first button 602A. At FIG. 14Y, computer system 600 detects movement 1426A of contact 1426, moving from the middle-right quadrant into the middle-left quadrant of first button 602A. Computer system adjusts the zoom value based on movement 1426A as described above, increasing the zoom level to 4.3×, updating the text to "4.3×," and animating the representation of the zoom scale sliding to the left to center the tick mark corresponding to 4.3× within settings control 622. As illustrated in FIGS. 14V and 14X, although movement 1426A is shorter than movement 1424A, both movements result in an increase of 1.1× zoom. For example, both movement 1426A and movement 1424A correspond to moving 11 tick marks past the center of settings control 622, as the tick marks between 3.2× and 4.3× (moved by movement 1426A) are more compressed than the tick marks between 1× and 2.1× (moved by movement 1424A).

At FIG. 14Z, immediately following movement 1426A and without first stopping contact 1426 on the surface of first button 602A, computer system 600 detects lift-off 1426' of contact 1426 from the surface of first button 602A, e.g., a right-to-left flick movement. As illustrated in FIG. 14Z, computer system 600 continues to adjust the zoom setting after detecting the end of contact 1426, further increasing the zoom level to 8.0×. In some embodiments, computer system 600 continues to adjust the zoom to 8.0× after detecting lift-off 1426' because movement 1426A was moving in the direction of the snapping value 8.0× and/or because simulated movement 1426A', based on the characteristics of movement 1426A near the time of lift-off 1426', would be sufficient to adjust the zoom level to or past 8.0×.

FIG. 15 is a flow diagram illustrating method 1500 for controlling settings of a computer system based on movement characteristics of hardware inputs, in accordance with some embodiments. The method is performed at a computer system (e.g., 100, 300, 500, and/or 600) that is in communication with a display generation component (e.g., 606) (e.g., a display controller; a touch-sensitive display system; a display (e.g., integrated and/or connected), a 3D display, a transparent display, a projector, and/or a heads-up display), e.g., as illustrated in FIGS. 6A-6B. In some embodiments, the computer system is optionally in communication with one or more input devices (e.g., 602A, 602B, 602C, 602D, and/or a touch sensitive surface of display 606), such as mechanical (e.g., physically depressible), solid-state, intensity-sensitive, and/or touch-sensitive (e.g., capacitive) hardware buttons and/or surfaces. In some embodiments, the computer system is optionally in communication with one or more cameras (e.g., 604A, 604B, 604C, and/or 604D), such as a rear (user-facing) camera and a forward (environment-facing) camera and/or a plurality of cameras with different lenses, such as a standard camera, a telephoto camera, and/or a wide-angle camera. In some embodiments, the computer system is optionally in communication with one or more sensors, such as camera sensors, optical sensors, depth sensors, capacitive sensors, intensity sensors, motion sensors, vibration sensors, and/or audio sensors.

The computer system (e.g., 600) detects (1502) (e.g., via a touch-sensitive surface of the display generation component, via a hardware input device separate from the display generation component, and/or via one or more sensors of the computer system) an input (e.g., 1402, 1403, 1416, 1418, 1420, 1424, and/or 1426) (e.g., a touch, tap, press, click, gesture, and/or air gesture input) directed to a control element of a user interface (in some embodiments, a camera user interface), wherein the input includes a detected movement component (e.g., 1204A, 1402B, 1402C, 1416A, 1418A, 1420A, 1420B, 1424A, 1426A). In some embodiments, the input directed to the control element of the user interface is an input via an input device associated with controlling the user interface, such as a hardware button, surface, and/or knob. In some embodiments, the computer system displays the control element, e.g., as a user interface object, and the input directed to the control element of the user interface is an input directed to a displayed location of the user interface object.

In response to detecting the input directed to the control element (1504) (e.g., and while the input and/or the movement component of the input are ongoing), the computer system causes (1506) a first adjustment to a value of a parameter (e.g., a zoom level, brightness, filter intensity, simulated depth-of-field setting, and/or focus setting) associated with the control element (e.g., changing a value of the parameter), wherein the first adjustment is based on the detected movement component (e.g., as described with respect to FIGS. 14C-14D, 14H, 14K, 14N, 14R-14S, 14V, and/or 14Y). For example, the computer system adjusts the parameter based on a current direction, acceleration, speed, and/or distance of the detected movement. In some embodiments, the computer system adjusts the parameter using simulated physics based on the movement component, e.g., as if the parameter were controlled by a physical dial or slider being moved by the input. In some embodiments, causing the first adjustment to the parameter includes updating an appearance of the user interface, e.g., changing a zoom level, brightness, filter intensity, simulated depth-of-field effect, and/or focus represented in a camera preview of a camera user interface.

The computer system detects (1508) an end (e.g., 1402', 1418', 1420', 1424', and/or 1426') of the input. In some embodiments, detecting the end of the first input includes detecting a lift-off of an input element, e.g., a user's finger or a stylus. In some embodiments, detecting the end of the first input includes detecting an intensity of the input falling below a threshold intensity. After (e.g., in response to) detecting the end of the input (1510), the computer system causes (1512) a second adjustment to the value of the parameter associated with the control element, wherein the second adjustment is based on the detected movement component (e.g., as described with respect to FIGS. 14F, 14O, 14T, 14W, and/or 14Z). For example, the computer system continues to adjust the parameter based on the direction, acceleration, speed, and/or distance of the movement at, near, and/or after (e.g., as detected using a proximity sensor or other motion sensor) the end of the input. In some embodiments, the computer system adjusts the parameter using simulated physics based on the movement component at or near the end of the input, e.g., as if a physical dial/slider controlling the parameter continues to move with some momentum from the movement of the input. In some embodiments, causing the second adjustment to the parameter includes updating the appearance of the camera user interface, e.g., changing a zoom level, brightness, filter intensity, simulated depth-of-field effect, and/or focus represented in a camera preview. In some embodiments, the computer system causes the second adjustment to the parameter in accordance with a determination that the movement component did not end more than a threshold period of time prior to the end of the input (e.g., the movement was ongoing at or near the end of the input), and in accordance with a determination that the movement component ended more than the threshold period of time prior to the end of the input, the computer system foregoes causing the second adjustment. Adjusting a parameter value (e.g., setting) associated with a control element both in response to movement inputs directed to the control element and after inputs directed to the control element have ended provides improved control of functions such as media capture, reducing the risk that transient media capture opportunities are missed and/or captured with unintended parameters, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems and reduces the overall amount of hardware components needed for control, resulting in a more compact, lighter, and cheaper device. For example, adjusting the parameter value during and after contact expands the range of adjustment available via movements of a particular magnitude, which allows for a smaller control element and for smaller, quicker movements by the user.

In some embodiments, a magnitude of the first adjustment to the value of the parameter associated with the control element is based on a magnitude of the detected movement component (e.g., as described with respect to FIGS. 14C-14D, 14H, 14K, 14N, 14R-14S, 14V, and/or 14Y). In some embodiments, the magnitude of the first adjustment is proportional to the magnitude of the detected movement component, e.g., the computer system adjusts the parameter by a uniform amount per unit of distance traveled along a particular axis. In some embodiments, the computer system adjusts the parameter by a non-uniform amount per unit of distance traveled along a particular axis. For example, the distance traveled by the movement component is mapped to a non-linear scale of parameter values (e.g., a logarithmic scale or scale with successively compressed intervals), such that the magnitude of adjustment made in response to a movement component of a given length varies based on the initial parameter value and the direction of movement. In some embodiments, the magnitude of the second adjustment is based on simulated physics, e.g., modeling movement along a scale of parameter values (e.g., a uniform/linear, logarithmic, or successively-compressed scale) as if the detected movement were physically moving a slider, knob, or dial for the parameter value. In some embodiments, causing the first adjustment to the value of the parameter associated with the control element includes: in accordance with a determination that the detected movement component includes a movement of a first magnitude, adjusting the value of the parameter by a first amount; and in accordance with a determination that the detected movement component includes a movement of a second magnitude different from the first magnitude, adjusting the value of the parameter by a second amount. In some embodiments, the second amount is different from the first amount. In some embodiments, if the first magnitude and the second magnitude correspond to the same number of tick marks (e.g., due to the tick marks being spaced at different intervals throughout the adjustment scale), the second amount is the same as the first amount. Initially adjusting a parameter value by an amount based on the amount of movement detected during the first input (e.g., during contact with the control element) provides improved control of functions such as media capture, reducing the risk that transient media capture opportunities are missed and/or captured with unintended parameters, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the computer system "moves" the parameter value (e.g., adjusts the parameter value along a scale) along with the detected movement (e.g., as if the detected movement were moving a physical slider, knob, or dial for the camera parameter value), providing intuitive and precise control of the parameter value via the control element.

In some embodiments, a magnitude of the second adjustment to the value of the parameter associated with the control element is based on a magnitude of a first movement component detected within a first threshold period of time (e.g., 0.05 s, 0.1 s, 0.2 s, or 0.5 s) of detecting the end of the input (e.g., as described with respect to FIGS. 14F, 14O, 14T, 14W, and/or 14Z). In some embodiments, the magnitude of the second adjustment is based on simulated physics, e.g., modeling movement along a scale of parameter values (e.g., a uniform/linear, logarithmic, or successively-compressed scale) with some momentum based on the movement near the end of the input, as if the detected movement were transferring momentum to a physical slider, knob, or dial for the parameter value. In some embodiments, the first threshold period of time spans before and/or after detecting the end of the input. For example, the first movement component includes movement detected shortly before the end of the input (e.g., while contact with the control element is continued) and/or movement detected shortly after the end of the input (e.g., after contact with the control element ends; e.g., using one or more non-contact proximity or motion sensors). In some embodiments, the first movement component includes a portion of the detected movement component. In some embodiments, causing the second adjustment to the value of the parameter associated with the control element includes: in accordance with a determination that the first movement component has a first magnitude, adjusting the value of the parameter by a first amount; and in accordance with a determination that the first movement component has a second magnitude different from the first magnitude, adjusting the value of the parameter by a second amount. In some embodiments, the second amount is different from the first amount. In some embodiments, if the first magnitude and the second magnitude correspond to the same number of tick marks (e.g., due to the tick marks being spaced at different intervals throughout the adjustment scale), the second amount is the same as the first amount. Continuing to adjust a parameter value after the end of an input by an amount based on the amount of movement detected near the end of the first input provides improved control of functions such as media capture, reducing the risk that transient media capture opportunities are missed and/or captured with unintended parameters, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems and reduces the overall amount of hardware components needed for control, resulting in a more compact, lighter, and cheaper device. For example, the continued adjustment after the end of the input allows users to adjust the parameter to a particular value without needing to maintain contact with the control element, which allows for shorter, quicker user inputs and for a smaller control element (e.g., as the user can reach the particular value without needing to pick up and replace their finger to extend the range of movement).

In some embodiments, a direction of the first adjustment to the value of the parameter associated with the control element corresponds to a direction of the detected movement component (e.g., as described with respect to FIGS. 14C-14D, 14H, 14K, 14N, 14R-14S, 14V, and/or 14Y). For example, a movement input in one direction increases the parameter and/or shifts the parameter forward through a set of values, while a movement input in a different direction decreases the parameter and/or shifts the parameter backwards through a set of values. In some embodiments, the direction of the detected movement is defined relative to an axis of the computer system and/or of the control element, e.g., the component of the detected movement traveling along the edge of a display where the control element is located. In some embodiments, a direction of the second adjustment to the value of the parameter associated with the control element is based on a direction of a second movement component detected within a second threshold period of time (e.g., 0.05 s, 0.1 s, 0.2 s, or 0.5 s) of detecting the end of the input. For example, the computer system continues adjusting the parameter value in the direction the parameter was being adjusted in shortly before the end of the input (e.g., with some simulated "momentum"). In some embodiments, causing the first adjustment to the value of the parameter associated with the control element includes: in accordance with a determination that the detected movement component includes a movement in a first direction, adjusting the value of the parameter in a first direction; and in accordance with a determination that the detected movement component includes a movement in a second direction different from the first direction, adjusting the value of the parameter in a second direction different from the first direction. In some embodiments, the first direction and the second direction are defined with respect to the computer system hardware. For example, the first direction may be defined as movement towards the edge of the computer system 600 where the one or more cameras (e.g., 604A, 604B, 604C, and/or 604D) are located (e.g., such as right-to-left movement 616C illustrated in FIG. 6M and left-to-right movement 630A illustrated in FIG. 6X), and the second direction may be defined as movement away from the edge where the one or more cameras are located (e.g., such as left-to-right movement 616E illustrated in FIG. 6P and right-to-left movement 630B illustrated in FIG. 6Z). For example, mapping the direction of adjustment to the detected movement direction as defined with respect to the computer system hardware provides a consistent response, regardless of the orientation of the computer system with respect to the user and/or the environment. Adjusting a parameter value in a direction corresponding to a direction of movement detected during the first input (e.g., during contact with the control element) provides improved control of functions such as media capture, reducing the risk that transient media capture opportunities are missed and/or captured with unintended parameters, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the computer system moves the parameter value along with the detected movement (e.g., as if the detected movement were moving a physical slider, knob, or dial for the parameter value), providing intuitive control of the parameter value via the control element.

In some embodiments, causing the second adjustment to the value of the parameter associated with the control element includes, in accordance with a determination that a direction of a second movement component detected within a second threshold period of time (e.g., 0.05 s, 0.1 s, 0.2 s, or 0.5 s; in some embodiments, the second threshold period of time is the same as the first threshold period of time) of detecting the end of the input corresponds to a direction from a current parameter value to a first parameter values included in a first set of parameter values (e.g., a set of "snapping" values, such as 0.5×, 1×, 2×, and/or 8× zoom levels; 0%, 50%, and/or 100% filter intensity levels; and/or −1.0, 0.0, and/or +1.0 exposure levels; e.g., in accordance with a determination that the input is adjusting a parameter value towards at least one "snapping" value near the end of movement), adjusting the value of the parameter from the current parameter value to the first parameter value of the first set of parameter values (e.g., as described with respect to 14F, 14T, and/or 14Z) (e.g., the next nearest "snapping" value in the direction the input was moving near the end of the input). In some embodiments, causing the second adjustment to the value of the parameter associated with the control element includes, in accordance with a determination that the direction of the second movement component detected within the second threshold period of time of detecting the end of the input does not correspond to the direction from the current parameter value to the first parameter value included in the first set of parameter values, foregoing adjusting the value of the parameter from the current parameter value to the first parameter value of the one or more parameter values. For example, if the input is moving to increase filter intensity when the input ends at 25% filter intensity, the computer system continues to adjust the filter intensity to 50% after the end of the input, and if the input is moving to decrease filter intensity when the input ends at 25% filter intensity, the computer system continues to adjust the filter intensity to 0% after the end of the input. In some embodiments, in accordance with a determination that the direction of the second movement component does not correspond to a direction from the current parameter value to one or more parameter values included in the first set of parameter values (e.g., in accordance with a determination that the input is not adjusting a parameter value towards a "snapping" value near the end of movement), the computer system adjusts the value of the parameter from the current parameter value to a parameter value not included in the first set of parameter values. In some embodiments, the second movement component is the same as the first movement component. Continuing to adjust a parameter value to the next nearest parameter value of a predetermined set of parameter values after an input ends provides improved control of functions such as media capture, reducing the risk that transient media capture opportunities are missed and/or captured with unintended parameters, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems and reduces the overall amount of hardware components needed for control, resulting in a more compact, lighter, and cheaper device. For example, "snapping" the parameter value to the next predetermined value in the direction the parameter value was being adjusted near the end of the input allows users to adjust the parameter to a snapping value without needing to maintain contact with the control element, which allows for shorter, quicker user inputs and for a smaller control element (e.g., as the user can reach the snapping value without needing to pick up and replace their finger to extend the range of movement).

In some embodiments, causing the first adjustment to the value of the parameter associated with the control element includes, in accordance with a determination that adjusting the value of the parameter by a first magnitude and in a first direction, wherein the first magnitude is based on a magnitude of the detected movement component and the first direction corresponds to a direction of the detected movement component, would adjust the value of the parameter past a respective value of a second set of parameter values while the input is ongoing, adjusting the value of the parameter by the first magnitude and in the first direction past the respective value (e.g., as described with respect to FIGS. 14M-14N, 14R-14S, and/or 14U-14V). For example, the computer system will adjust the parameter value past a "snapping" value while the input is ongoing. In some embodiments, the second set of parameter values is the same as the first set of parameter values.

In some embodiments, causing the second adjustment to the value of the parameter associated with the control element includes, in accordance with a determination that adjusting the value of the parameter by a second magnitude and in a second direction, wherein the second magnitude is based on a magnitude of a third movement component detected within a third threshold period of time (e.g., 0.05 s, 0.1 s, 0.2 s, or 0.5 s; in some embodiments, the third threshold period of time is the same as the second threshold period of time and/or the first threshold period of time) of detecting the end of the input and the second direction corresponds to a direction of the third movement component, would adjust the value of the parameter past a respective value of a second set of parameter values after the input has ended, adjusting the parameter value to the respective value of the second set of parameter values (e.g., as described with respect to FIG. 14F, 14T, and/or 14Z) (e.g., and stopping adjusting the parameter value when the camera parameter value reaches the respective value). For example, the computer system will not adjust the camera parameter value past a snapping value after the input ends, and will instead stop adjusting the camera parameter value at a snapping value that would be passed by continuing to move with some momentum based on movement detected near the end of the input. Adjusting a parameter value by an amount based on the amount of movement detected during the first input (e.g., during contact with the control element) and stopping adjustment of the parameter value at a snapping value if adjusting the parameter value after the end of the input would pass the snapping value provides improved control of media capture and reduces the risk that transient media capture opportunities are missed and/or captured with unintended parameters, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, users can precisely control the parameter adjustment with movement inputs during contact with the control element and can skip to a predetermined value with movement input near the end of contact with the control element.

In some embodiments, the parameter is a camera zoom parameter (e.g., as described with respect to FIGS. 14P-14Z, 6L-6S, 6X, 6Z, 100, and/or 10R). For example, adjusting the parameter includes adjusting optical and or digital zoom for media capture (e.g., as described with respect to FIGS. 6A-7 and 10A-11). In some embodiments, the second set of parameter values (e.g., the snapping values) includes one or more zoom levels (e.g., 0.5×, 1×, 2×, and/or 8× zoom levels) corresponding to higher-quality media capture (e.g., relative to zoom levels not included in the second set of parameter values). For example, the second set of parameter values are zoom levels at which the computer system can capture media with at least a threshold resolution and/or less than a threshold level of image degradation. Stopping adjustment of a camera zoom level at a zoom levels corresponding to higher-quality captures provides improved control of media capture and reduces the risk that transient media capture opportunities are missed and/or captured with unintended parameters, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, users can quickly skip between optimized zoom levels with movement input near the end of contact with the control element, allowing efficient zooming in and out without sacrificing image quality.

In some embodiments, the one or more zoom levels corresponding to higher-quality media capture correspond to one or more zoom levels of one or more respective fixed focal length lenses of one or more cameras in communication with the computer system (e.g., 604A, 604B, 604C, and/or 604D). For example, the zoom level snapping values correspond to the inherent magnifications provided by one or more physical lenses of the one or more cameras used for media capture, e.g., one or more wide-angle lenses (e.g., providing 0.5× magnification), one or more standard lenses (e.g., providing 1× magnification), and one or more telephoto lenses (e.g., providing 2×, 5×, and/or 8× magnification). Stopping adjustment of a camera zoom level at a zoom levels corresponding to the magnifications provided by one or more physical, fixed focal length lenses provides improved control of media capture and reduces the risk that transient media capture opportunities are missed and/or captured with unintended parameters, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, users can quickly skip between optical zoom levels with movement input near the end of contact with the control element, allowing efficient zooming in and out without performing digital magnification.

In some embodiments, the second set of parameter values includes a plurality of values of the parameter (e.g., as described with respect to FIGS. 14A-14Z). Stopping adjustment of the parameter value at different snapping value if adjusting the parameter value after the end of the input would pass the snapping values provides improved control of functions such as media capture, reducing the risk that transient media capture opportunities are missed and/or captured with unintended parameters, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, users can quickly skip between multiple snapping values with movement input near the end of contact with the control element.

In some embodiments, the computer system displays, via the display generation component, a plurality of graphical elements (e.g., within 622) (e.g., tick marks, dots, and/or other icons) representing an ordered plurality of values of the parameter (e.g., 1404, 1406, and/or 1408) (e.g., a graphical scale of parameter values), wherein the ordered plurality of values of the parameter are uniformly spaced values (e.g., incremental values), and a first pair of graphical elements of the plurality of graphical elements representing a first pair of subsequent parameter values of the ordered plurality of values are displayed farther apart than a second pair of graphical elements of the plurality of graphical elements representing a second pair of subsequent parameter values of the ordered plurality of values, wherein the first pair of subsequent parameter values are lower than (or, alternatively, higher than) the second pair of subsequent parameter values (e.g., as described with respect to 1406 in FIG. 14B). For example, the ordered plurality of values for a zoom parameter includes 0.5×-12× zoom in increments of 0.1×. For example, tick marks representing 0.5× zoom and 0.6× zoom are displayed spaced further apart than tick marks representing 8.0× zoom and 8.1× zoom. In some embodiments, the graphical elements representing the ordered plurality of values of the parameter is a logarithmic scale, e.g., where the spacing between tick marks is successively compressed at each increment (e.g., every 0.1× zoom) and/or at other intervals (e.g., compressing spacing more between 1× zoom and 2× zoom than between 0.5× zoom and 1× zoom). Displaying graphical elements (e.g., tick marks) representing evenly spaced parameter values where spacing between the graphical elements is compressed as the represented parameter values increase provides improved control of media capture without cluttering the user interface with displayed controls. For example, using a logarithmic (or otherwise successively-compressed) scale to represent the parameters, the computer system can visually represent a greater range of parameter values without occupying a large portion of the display. Doing so also provides users with real-time feedback about a state of the computer system, for example, indicating to a user that the parameter value will be adjusted more in response to movements of a particular magnitude the higher the parameter value gets.

In some embodiments, in response to detecting the input directed to the control element and in accordance with a determination that the value of the parameter is adjusted to a first parameter value of the ordered plurality of values of the parameter (e.g., as part of the first adjustment and/or the second adjustment), the computer system displays a visual prominence of a first graphical element of the plurality of graphical elements that represents the first parameter value increasing to a first visual prominence (e.g., a higher level of prominence indicating that the first graphical element/first parameter value is selected) and after displaying the visual prominence of the first graphical element that represents the first parameter value increasing to the first visual prominence and in accordance with a determination that the value of the parameter is no longer adjusted to the first parameter value, the computer system displays the visual prominence of the first graphical element decreasing (e.g., gradually) to a second visual prominence that is less visually prominent than the first visual prominence (e.g., as described with respect to FIGS. 14D-14E) (e.g., a lower level of prominence, such as a default or initial prominence). For example, increasing the visual prominence of the first graphical element includes lengthening, widening, brightening, darkening, changing the color of, and/or otherwise visually emphasizing the first graphical element relative to the previous appearance of the first graphical element. In some embodiments, the computer system displays the visual prominence of the first graphical element decreasing gradually over a period of time, e.g., 0.5 s, 1 s, and/or 2 s. In some embodiments, in accordance with a determination that the value of the parameter is again adjusted to the first parameter value, the computer system again increases the visual prominence of the first graphical element.

In some embodiments, in response to detecting the input directed to the control element and in accordance with a determination that the value of the parameter is adjusted to a second parameter value of the ordered plurality of parameter values (e.g., as part of the first adjustment and/or the second adjustment), the computer system displays a visual prominence of a second graphical element of the plurality of graphical elements that represents the second parameter value increasing to the first visual prominence (e.g., a higher level of prominence indicating that the second graphical element/second parameter value is selected), and after displaying the visual prominence of the second graphical element that represents the second parameter value increasing to the first visual prominence and in accordance with a determination that the value of the parameter is no longer adjusted to the second parameter value, the computer system displays the visual prominence of the second graphical element decreasing (e.g., gradually) to the second visual prominence (e.g., as described with respect to FIGS. 14D-14E). For example, increasing the visual prominence of the second graphical element includes lengthening, widening, brightening, darkening, changing the color of, and/or otherwise visually emphasizing the second graphical element relative to the previous appearance of the second graphical element. In some embodiments, the computer system displays the visual prominence of the second graphical element decreasing gradually over a period of time, e.g., 0.3 s, 0.5 s, 1 s, or 2 s. In some embodiments, in accordance with a determination that the value of the parameter is again adjusted to the second parameter value, the computer system again increases the visual prominence of the second graphical element. In some embodiments, the computer system increases the visual prominence of the second graphical element while decreasing the visual prominence of the first graphical element and/or increases the visual prominence of the first graphical element while decreasing the visual prominence of the second graphical element. For example, multiple tick marks may be displayed in various states of visual prominence as the parameter value is adjusted to different values. Increasing the visual prominence of graphical elements (e.g., tick marks) as the corresponding parameter values are selected provides users with real-time feedback about a state of the computer system, for example, indicating the current selection by the most emphasized tick mark and visualizing the adjustment of the selection by the gradually-reverting tick marks.

In some embodiments, the computer system adjusts the value of the parameter from a third parameter value of the ordered plurality of parameter values to a fourth parameter value of the ordered plurality of parameter values (e.g., as part of the first adjustment and/or second adjustment; in some embodiments, adjusting between subsequent value in the ordered plurality of parameter values), wherein adjusting the value of the parameter from the third parameter value to the fourth parameter value includes displaying a visual prominence of a fourth graphical element of the plurality of graphical elements that represents the fourth parameter value increasing to the first visual prominence. In some embodiments, after adjusting the value of the parameter from the third parameter value to the fourth parameter value, adjusting the value of the parameter from the fourth parameter value to a fifth parameter value of the ordered plurality of parameter values (e.g., as part of the first adjustment and/or second adjustment; in some embodiments, adjusting between subsequent value in the ordered plurality of parameter values), wherein adjusting the value of the parameter from the fourth parameter value to the fifth parameter value includes displaying a visual prominence of a fifth graphical element of the plurality of graphical elements that represents the fifth parameter value increasing to the first visual prominence and displaying a visual prominence of the fourth graphical element of the plurality of graphical elements that represents the fourth parameter value decreasing to the second visual prominence (e.g., as described with respect to FIGS. 14D-14E). In some embodiments, after adjusting the value of the parameter from the fourth value to the fifth value, the computer system adjusts the parameter to another value and displays a visual prominence of the selected value increasing to the first prominence while displaying the visual prominence of the fifth and/or fourth graphical elements decreasing to the second prominence. For example, the computer system visually emphasizes a tick mark while the corresponding value is selected then gradually reverts tick marks to their un-emphasized appearances as the selection moves, creating a “tail” of gradually de-emphasizing tick marks behind (e.g., in the direction of adjustment) the currently-selected tick mark. In some embodiments, while adjusting the value of the parameter in a particular direction, the computer system slightly visually emphasizes one or more tick marks ahead of the currently selected tick mark in the particular direction. Increasing the visual prominence of graphical elements (e.g., tick marks) as the corresponding parameter values are selected provides users with real-time feedback about a state of the computer system, for example, indicating the current selection by the most emphasized tick mark and visualizing the adjustment of the selection by the gradually-reverting tick marks, which create a temporary “tail” of emphasis as the adjustment continues.

In some embodiments, displaying a respective visual prominence of a respective graphical element of the plurality of graphical elements decreasing to the second visual prominence includes animating the respective graphical element contracting (e.g., in length and/or width) based on simulated physics (e.g., as described with respect to FIGS. 14D-14E). For example, the visual prominence of the graphical elements can be modeled using spring physics, where adjusting to a parameter value “stretches” the corresponding tick mark and adjusting away from the parameter value allows the corresponding tick mark to spring back to its original state.

In some embodiments, the plurality of graphical elements representing the ordered plurality of values of the parameter (e.g., 1404, 1406, and/or 1408) are included in a first user interface element (e.g., 622) (e.g., a tab, cutout, frame, and/or platter) displayed in the user interface. In some embodiments, the first user interface element visually obscures a first portion of the camera user interface, e.g., the first user interface element is an overlay or cutout of the camera user interface. In some embodiments, the computer system detects a second input (e.g., 1414) directed to the control element, wherein the second input includes a second detected movement component (e.g., 1414A). In some embodiments, in response to detecting the second input directed to the control element and in accordance with a determination that a third adjustment based on the second detected movement component would adjust the value of the parameter to a parameter value outside of a range of parameter values included in the ordered plurality of parameter values (e.g., above the maximum parameter value of the ordered plurality or below the minimum parameter value of the ordered plurality), the computer system displays the first user interface element shifting from an initial position to an offset position in a direction of the second detected movement component (e.g., as described with respect to FIG. 14H). In some embodiments, the computer system also foregoes causing an adjustment to the value of the parameter in response to the second input. In some embodiments, displaying the first user interface element includes visually obscuring a different portion of the camera user interface. In some embodiments, the graphical elements representing the ordered plurality of values do not move with respect to the first user interface element while shifting the first user interface element. For example, the computer system animates the first user interface element being "pulled" by the second input. In some embodiments, if the second input includes a subsequent detected movement component in an opposite direction, the computer system displays the first user interface element shifting back to the initial position. In some embodiments, in accordance with a determination that the third adjustment based on the second detected movement component would not adjust the value of the parameter to a parameter value outside of a range of parameter values included in the ordered plurality of parameter values, the computer system causes an adjustment to the value of the parameter associated with the control element as described with respect to causing the first adjustment. Shifting the displayed parameter value scale in response to a movement input corresponding to an adjustment beyond the range of available parameter values provides users with real-time feedback about a state of the computer system, for example, indicating to the user when the movement has reached an upper or lower limit.

In some embodiments, while displaying the first user interface element in the offset position, the computer system detects an end of the second input (e.g., 1414'), and in response to detecting the end of the second input, the computer system displays the first user interface element shifting back to the initial position (e.g., as described with respect to FIG. 14I) (e.g., opposite the direction of the second detected movement component). For example, the computer system displays the first user interface element snapping back to its initial position once the second input is released.

In some embodiments, the control element of the camera user interface includes a hardware control element (e.g., 602A, 602B, 602C, and/or 602D) (e.g., hardware button, touch-sensitive surface, and/or rotatable element; e.g., as described herein with respect to FIGS. 6A-12). In some embodiments, the control element is separate from and/or located outside of the display on which the camera user interface is displayed, for example, a hardware button on a side or edge of the display. In some embodiments, the hardware control element includes one or more sensors, such as pressure sensors, touch sensors, proximity sensors, and/or other sensors. Using a hardware control element to adjust a value of a parameter for an application provides improved control of functions such as media capture, and reducing the risk that transient media capture opportunities are missed and/or captured with unintended parameters, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides improved ergonomics of computer systems and reduces the overall amount of hardware components needed for control, resulting in a more compact, lighter, and cheaper device. For example, adjusting the value of a parameter using movement inputs via a hardware control element, such as a button located outside of the display on which the user interface is displayed, reduces the number of displayed elements and inputs needed to adjust the parameter and allows the user to provide inputs without blocking the camera user interface.

In some embodiments, the control element of the user interface includes a selectable user interface element (e.g., 622) displayed via the display generation component (e.g., a software control affordance, such as a button, slider, menu, and/or platter). In some embodiments, the parameter associated with the control element includes one or more of a camera zoom parameter, a camera exposure parameter, and a camera filter intensity parameter. For example, adjusting the camera zoom parameter, camera exposure parameter, and/or camera filter intensity parameter can be performed as described with respect to FIGS. 6A-7 and 10A-11.

In some embodiments, the computer system displays, via the display generation component, user interface object corresponding to the control element (e.g., 622). In some embodiments, displaying the user interface object corresponding to the control element includes: displaying one or more graphical elements of a plurality of graphical elements (e.g., tick marks, dots, text, icons, and/or symbols) representing a respective plurality of values of the parameter (e.g., a graphical scale of parameter values); distorting an appearance (e.g., blurring, warping, changing color, changing brightness, and/or changing opacity of) of the one or more graphical elements at a first portion of the first display region corresponding to a first edge of the first display region; and distorting an appearance of the one or more graphical elements at a second portion of the first display region, different from the first portion of the display region, corresponding to a second edge of the first display region different from the first edge of the display region (e.g., as described with respect to FIG. 6J1). For example, the plurality of graphical elements are represented in the user interface object as options on simulated dial that curves (e.g., outwards or inwards) relative to the user (or a viewpoint of the user), a front of the user interface, or a surface of the display (e.g., simulating a round dial that can be rotated by lateral movements across the surface of the display), so the graphical elements are distorted (e.g., blurring, warping, changing color, changing brightness, and/or changing opacity of) to appear as though they are curving away from the user (e.g., around the edge of the simulated dial and/or into a plane of the display or user interface) towards the edges of the user interface object. In some embodiments, the distortion is progressive and increases toward the edges of the option user interface. In some embodiments, performing the first operation includes adjusting a parameter value for a setting, and the user interface object corresponding to the first operation includes a platter or slider for selecting a value of the parameter. For example, the platter or slider is distorted near the edges of the operation user interface to simulate a curved dial. Distorting elements of the user interface object corresponding to the first operation at the edges of the user interface object (e.g., to simulate the appearance of a curved dial) provides users with real-time feedback about a state of the computer system without cluttering the user interface with additional displayed controls. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, displaying the user interface object as a simulated curved dial intuitively indicates to the user how to perform the first operation (e.g., using lateral gesture inputs, as if rotating the dial) and/or the range of values available for the first operation (e.g., the user can "rotate" the dial to display additional parameter values).

Note that details of the processes described above with respect to method 1500 (e.g., FIG. 15) are also applicable in an analogous manner to the methods described above and below. For example, controlling settings adjustments as described with respect to method 1500 can be performed as part of the controls based on variable characteristics of hardware inputs described with respect to method 700, when capturing media as described with respect to method 900, to control selected customizable functions as described with respect to method 1100, and/or to control media playback as described with respect to method 1300. For brevity, these details are not repeated below.

FIGS. 16A-16S illustrate exemplary techniques and systems for controlling a computer system with multiple hardware input devices, in accordance with some embodiments. The user interfaces in these figures are used to illustrate the processes described below.

At FIG. 16A, computer system 600 displays user interface 1600, a song playback user interface in a music player application, on display 606. As illustrated in FIG. 16A, user interface 1600 is displayed with a standard (e.g., non-distorted) appearance, including an album cover image, playback timer, volume bar, and various other controls for song playback. For illustrative purposes, in FIGS. 16A-16S, user interfaces such as user interface 1600, power interface 1626, screen capture user interface 1628, and/or user interface 1630 are shown as being displayed on less than the entire surface of display 606, such that user interface content is not displayed in the shaded border region of display 606. However, the user interfaces and techniques described below could also be implemented with respect to edge-to-edge/edgeless displays and user interfaces.

Figure 16B:
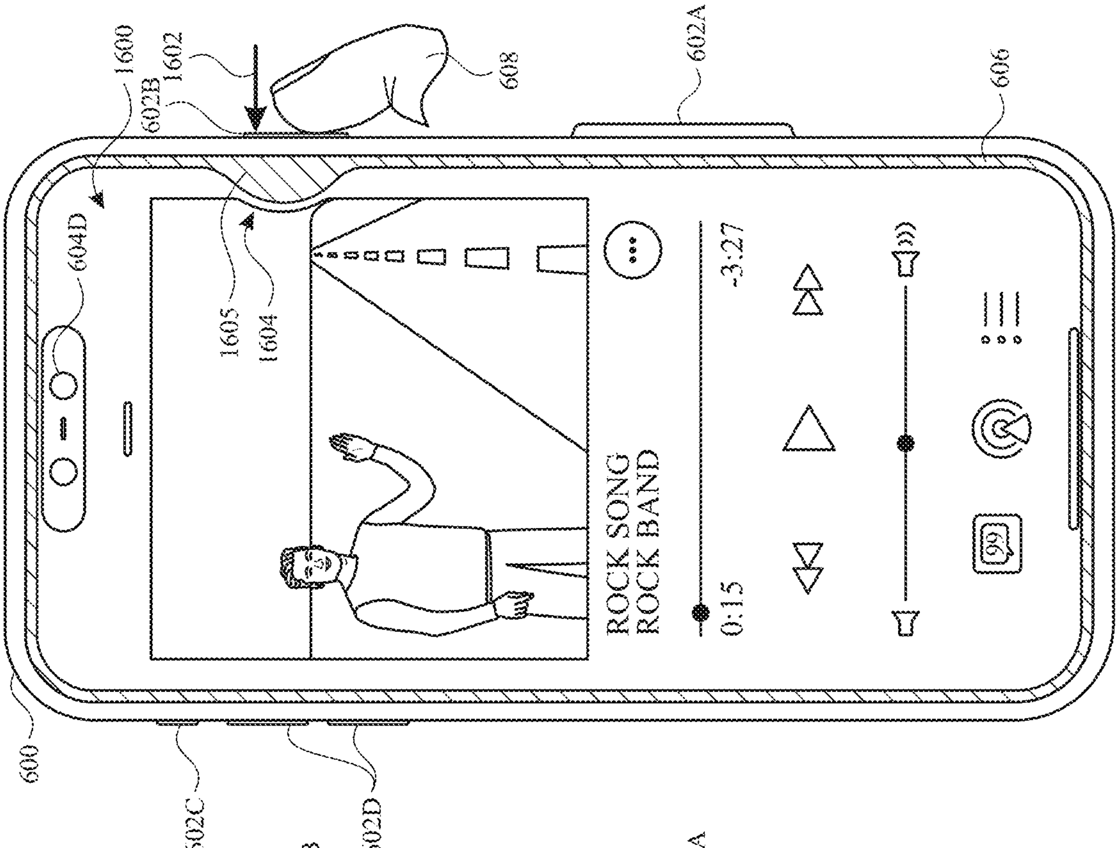
FIGS. 16A-16S illustrate example techniques and systems for controlling a computer system with multiple hardware input devices, in accordance with some embodiments.

While displaying user interface 1600, at FIG. 16B, computer system 600 detects press input 1602, for example, a light/partial press (e.g., as described with respect to FIG. 6C). Press input 1602 is a press input of second button 602B. In response to detecting press input 1602, computer system 600 visually deforms (e.g., distorts) user interface 1600 at region 1604, a portion of display 606 adjacent to second button 602B. As illustrated in FIG. 16B, at region 1604, computer system 600 warps the appearance of the edge of the album cover and the background of user interface 1600 image near second button 602B, for instance, as though press input 1602 were physically bending the outer edge of user interface 1600 and the album cover art away from second button 602B.

Figure 16C:
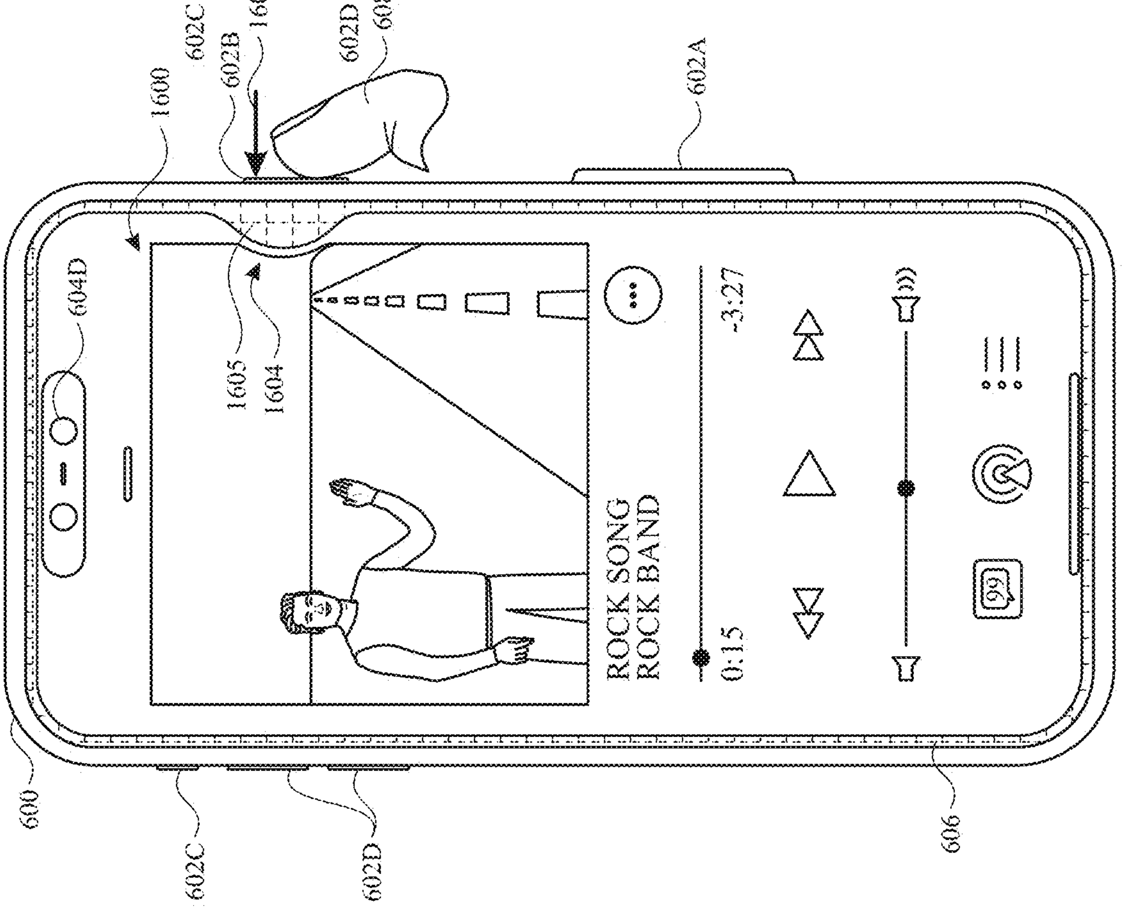

As illustrated in FIG. 16B, as part of the deformation to user interface 1600 at region 1604, computer system 600 displays contact indicator 1605. As described with respect to contact indicator 618 in FIGS. 6F-6H, contact indicator 1605 is displayed as a cut-out from user interface 1600 extending into display 606 from the edge region of display 606 that is adjacent to second button 602B. In particular, at FIG. 16B, contact indicator 1605 is displayed with the same color as the border region of display 606 (e.g., black), such that contact indicator 1605 appears to push user interface 1600 back at region 1604 to distort the appearance of user interface 1600. As illustrated in FIG. 16C, in some embodiments, contact indicator 1605 is displayed with a different color, such as a color selected to match other hardware of computer system 600 (e.g., the color of the frame surrounding display 606 and/or the color of second button 602B) such that press input 1602 appears to be physically pushing the hardware into display 606 at region 1604.

Figure 16D:
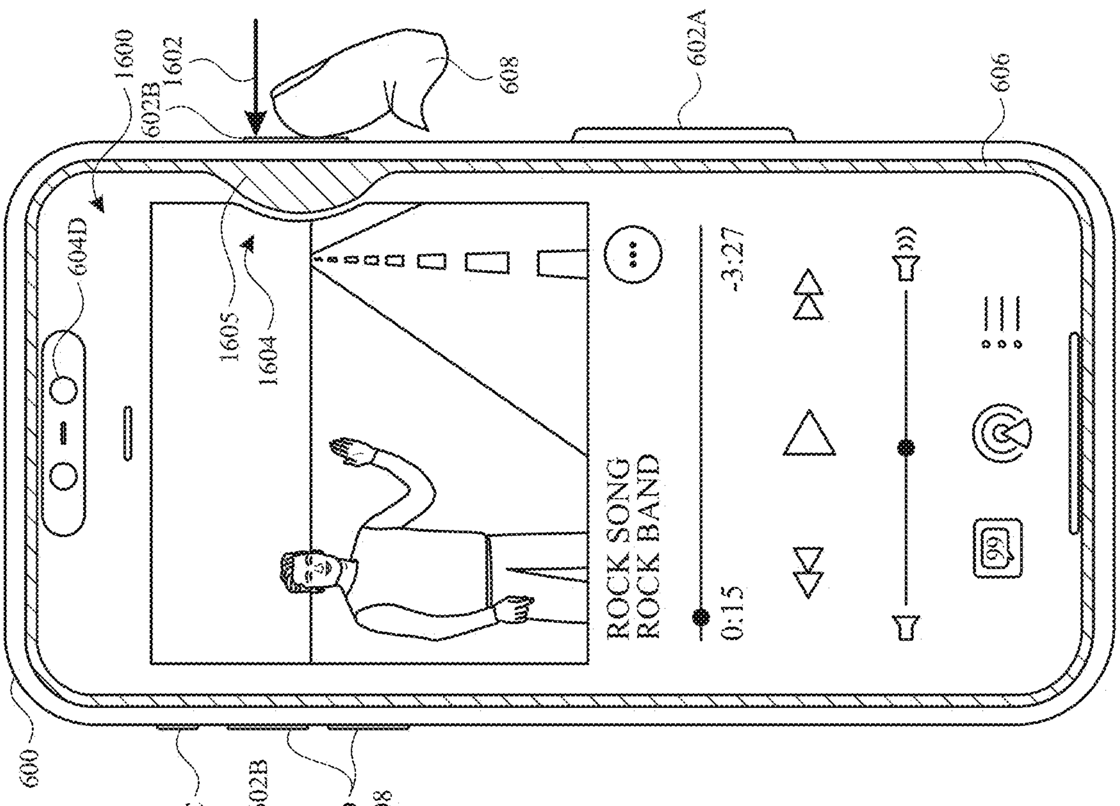

At FIG. 16D, computer system 600 detects press input 1602 increasing in intensity (e.g., transitioning from a light/partial press to a hard/full press). As described with respect to contact indicator 618 in FIGS. 6F-6H, contact indicator 1605 indicates certain characteristics of press input 1602. Accordingly, computer system 600 animates contact indicator 1605 growing (e.g., expanding outward into user interface 1600 and lengthwise along the edge of display 606) at region 1604 to indicate the increasing intensity being detected by second button 602B. Additionally, as illustrated in FIG. 16D, computer system 600 further warps the appearance of user interface 1600 at region 1604 to indicate the increasing intensity, bending the outer edge of user interface 1600 and the album cover art out further away from second button 602B. In some embodiments, as intensity of press input 1602 increases, computer system 600 increases the magnitude of the deformation to region 1604 up to a magnitude limit (e.g., a maximum amount of deformation to user interface 1600 at region 1604).

In some embodiments (e.g., if second button 602B is implemented with a touch-sensitive surface), computer system 600 also updates the deformation of user interface 1600 (e.g., including contact indicator 1605) based on the location of finger 608 on second button 602B (e.g., as described with respect to contact indicator 618 in FIG. 6G), for instance, shifting the deformation up and down as finger 608 moves up and down along the edge of display 606. In some embodiments, the deformation at region 1604 remains vertically centered at the center of second button 602B (e.g., without moving in response to movement inputs) as the deformation increases and decreases in magnitude.

In some embodiments, system 600 adjusts the appearance of contact indicator 1605 based on the current appearance of user interface 1600 (e.g., as described above with respect to FIG. 10U1). For example, as illustrated in FIG. 16D1, when user interface 1600 is displayed with a darker appearance (e.g., when a dark-mode setting for the media player application is enabled and/or when playing a song with a darker album cover), system 600 adjusts the appearance of contact indicator 1605 to increase contrast and visibility, for instance, displaying a high-contrast border (e.g., keyline) around contact indicator 1605 and/or using a high-contrast color fill for contact indicator 1605.

Second button 602B is associated with (e.g., via system settings and/or user-defined settings, such as settings for customizing second button 602B as described with respect to first button 602A in FIGS. 10A-11) a digital assistant system implemented on computer system 600. At FIG. 16E, in response to detecting press input 1602 at second button 602B (e.g., in response to press input 1602 resolving into a hard/full press of second button 602B), computer system 600 initiates a digital assistant session, displaying digital assistant user interface elements 1606, including an edge glow (e.g., a simulated lighting effect overlaying the edges of user interface 1600) and digital assistant control options with suggested tasks. In some embodiments, computer system 600 specifically associated a long/held press of second button 602B with the digital assistant system (e.g., computer system 600 initiates the digital assistant session after press input 1602 has been maintained for at least a threshold period of time). Deforming user interface 1600 at region 1604 as described above thus provides an additional, visual indication of press input 1602 and the user continues to hold the input to initiate the digital assistant session.

At FIG. 16E, computer system 600 detects an end of press input 1602 when the user lifts finger 608 off of second button 602B (e.g., and/or reduces press intensity to below a threshold point). In response to detecting the end of press input 1602, computer system 600 removes the deformation of user interface 1600 at region 1604. Additionally or alternatively, in some embodiments, computer system 600 removes the deformation of user interface 1600 at region 1604 in response to initiating the digital assistant session. For example, computer system 600 stops displaying contact indicator 1605 and returns the appearance of user interface 1600 to its original appearance (e.g., as illustrated in FIG. 16A) under the overlay of digital assistant user interface elements 1606. In some embodiments, computer system 600 animates contact indicator 1605 transitioning (e.g., morphing and/or fading) into digital assistant user interface elements 1606 (e.g., as described with respect to contact indicator 618 morphing into settings control 622 at FIGS. 6I-6J). In some embodiments, if press input 1602 does not end once digital assistant user interface elements 1606 are displayed, computer system 600 continues to display the deformation of user interface 1600 at region 1604, but overlays the deformation with digital assistant user interface elements 1606 (e.g., such that the deformation is partially obscured).

Figure 16F:
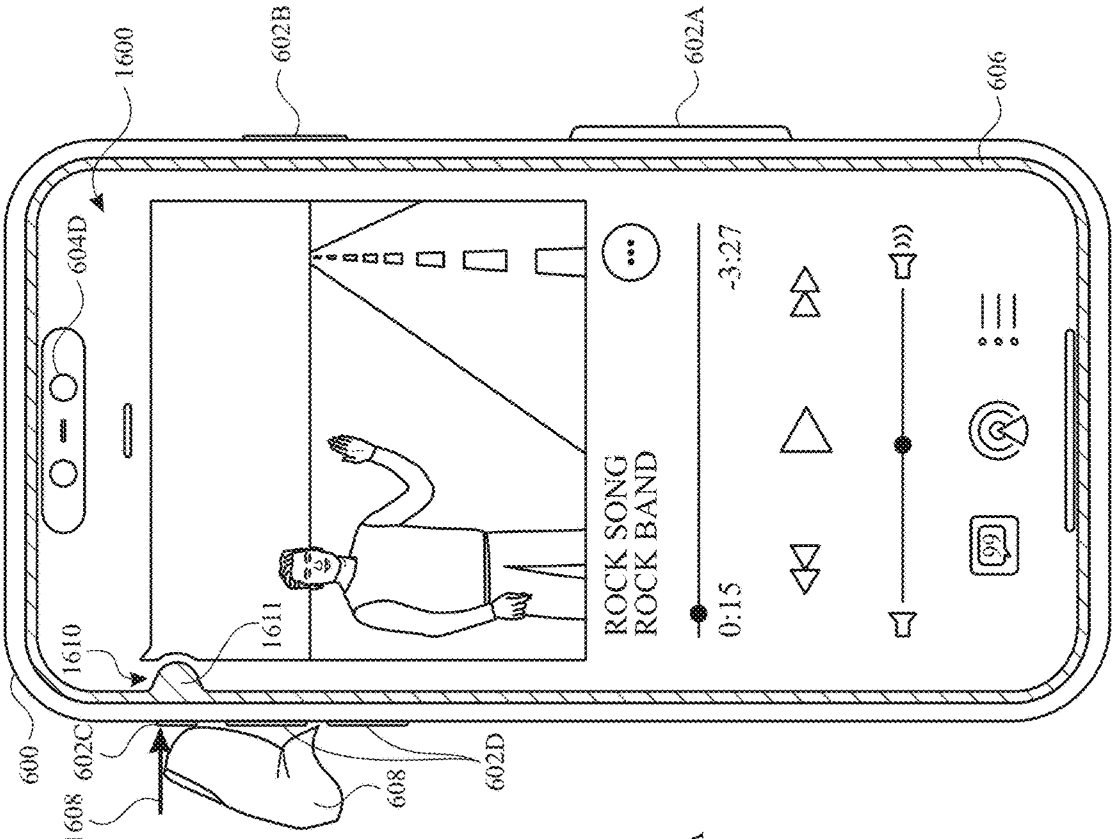
Figure 16E:
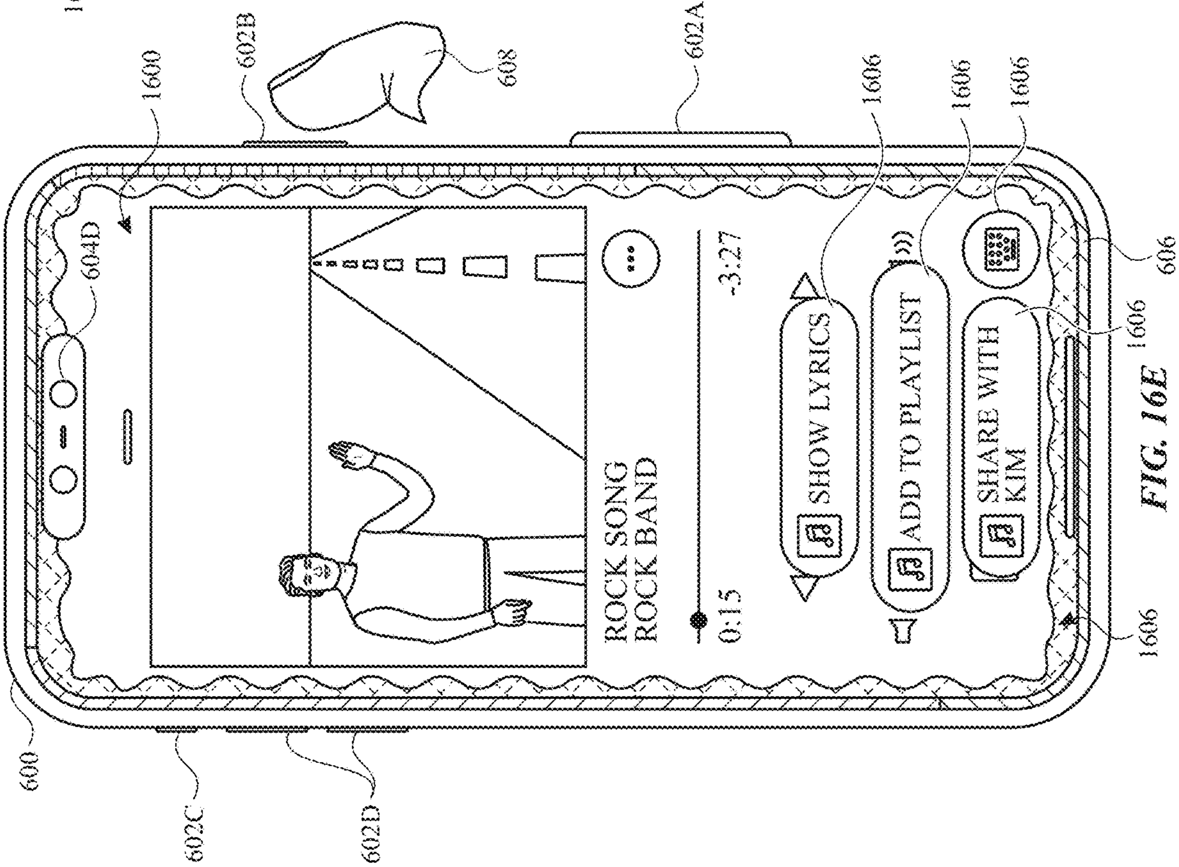

At FIG. 16F, while displaying user interface, computer system 600 detects press input 1608, a hard/full press input of third button 602C. In response to detecting press input 1608, computer system 600 visually deforms user interface 1600 at region 1610, a portion of display 606 adjacent to third button 602C. As illustrated in FIG. 16F, at region 1610, computer system 600 warps the appearance of the edge of the album cover and the background of user interface 1600 image near third button 602C and displays contact indicator 1611, such that press input 1608 appears to physically bend user interface 1600 at region 1610 as described above (e.g., including gradually increasing the extent of the deformation at region 1610 if the intensity of press input 1608 is gradually increased to a hard/full press).

As illustrated in FIG. 16F, the deformation to user interface 1600 at region 1610, including contact indicator 1611, is shaped and sized differently than the deformation to user interface at region 1604 including contact indicator 1605 (e.g., the deformation displayed in response to press input 1602 at second button 602B). In particular, the length of contact indicator 1611 along the edge of display 606 is shorter than the length of contact indicator 1605, corresponding to the relatively smaller size of third button 602C compared to second button 602B. In some embodiments, the deformation to user interface 1600 at region 1610 does not extend as far into user interface 1600 as the deformation to user interface 1600 at region 1604. In some embodiments, computer system 600 changes the deformation to user interface 1600 at region 1610 changes (e.g., changes size, shape, and/or appearance) at a different rate than the deformation to user interface 1600 at region 1604.

Third button 602C is associated with (e.g., via system settings and/or user-defined settings) a do not disturb setting of computer system 600. Accordingly, in response to press input 1608, computer system 600 changes the do not disturb setting to an on state, including muting the output of audio alerts for notifications. At FIG. 16G, computer system 600 displays user interface element 1600A, a struck-through ringer icon, indicating the change to the do not disturb setting. As illustrated in FIG. 16G, user interface element 1600A, which is overlaid over other elements of user interface 1600, is displayed near third button 602C, but inside of (e.g., to the right of) contact indicator 1611. Additionally, as the duration of press input 1608 increases (e.g., as the user holds the press input), computer system 600 increases the magnitude of the deformation, expanding contact indicator 1611 further into user interface 1600 and warping user interface 1600 around it. In some embodiments, as the duration of press input 1608 increases, computer system 600 increases the magnitude of the deformation to region 1610 up to a magnitude limit (e.g., a maximum amount of deformation to user interface 1600 at region 1610).

Figure 16H:
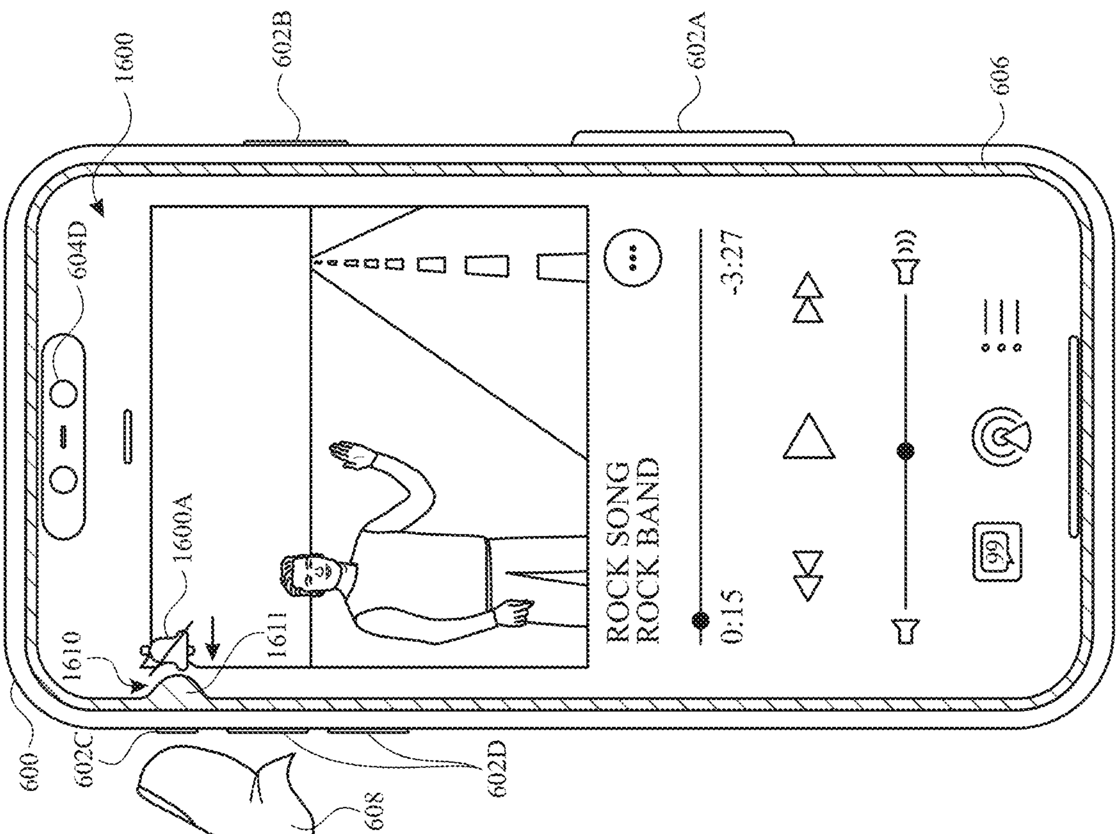
Figure 16G:
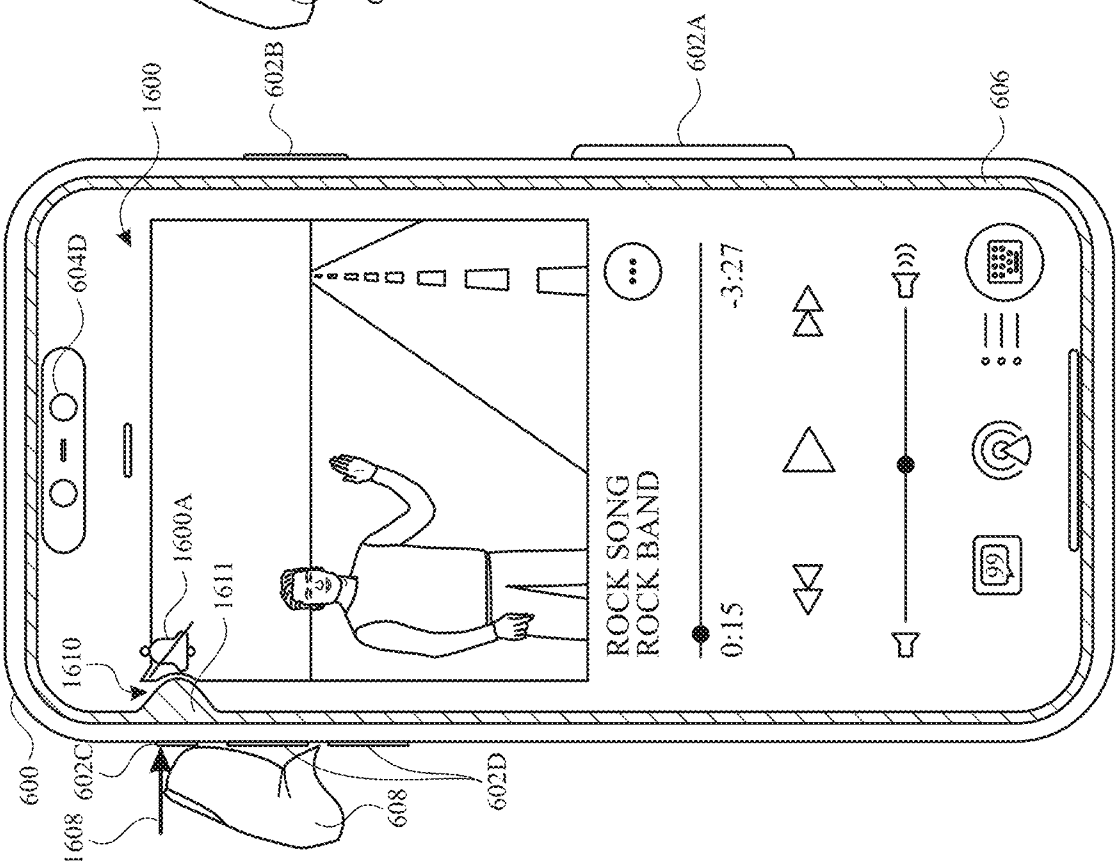

At FIG. 16H, computer system 600 detects an end of press input 1608. In response to the end of press input 1608, computer system 600 gradually reverses the deformation to user interface 1600 at region 1610 until user interface 1600 is no longer distorted at region 1610. As illustrated in FIG. 16H-16I, computer system 600 displays contact indicator 1611 shrinking back towards the edge of display 606 near third button 602C and straightens the edges of user interface 1600 and the album cover images out in region 1610. Additionally, as illustrated in FIG. 16H-16I, computer system 600 displays user interface element 1600A (e.g., the ringer element) moving towards the edge of display 606 near third button 602C, following the contraction of contact indicator 1611. Accordingly, at FIG. 16I, when contact indicator 1611 is no longer displayed and user interface 1600 is no longer distorted at region 1610, user interface element 1600A is displayed next to third button 602C (e.g., as described with respect to customization indicator 1010 and first button 602A in FIGS. 10A-11).

In some embodiments, computer system 600 continues to display user interface element 1600A for a period of time after changing the do not disturb setting (e.g., as described with respect to customization indicator 1010) before ceasing to display user interface element 1600A. Accordingly, if computer system 600 detects another press input directed to third button 602C while user interface element 1600A remains displayed, computer system 600 deforms user interface 1600 by moving user interface element 1600A inward (e.g., to the right) in addition to displaying a contact indicator, bending the edges of user interface 1600 (e.g., as described below with respect to FIGS. 16J-16L and/or 16P-16S).

Figure 16J:
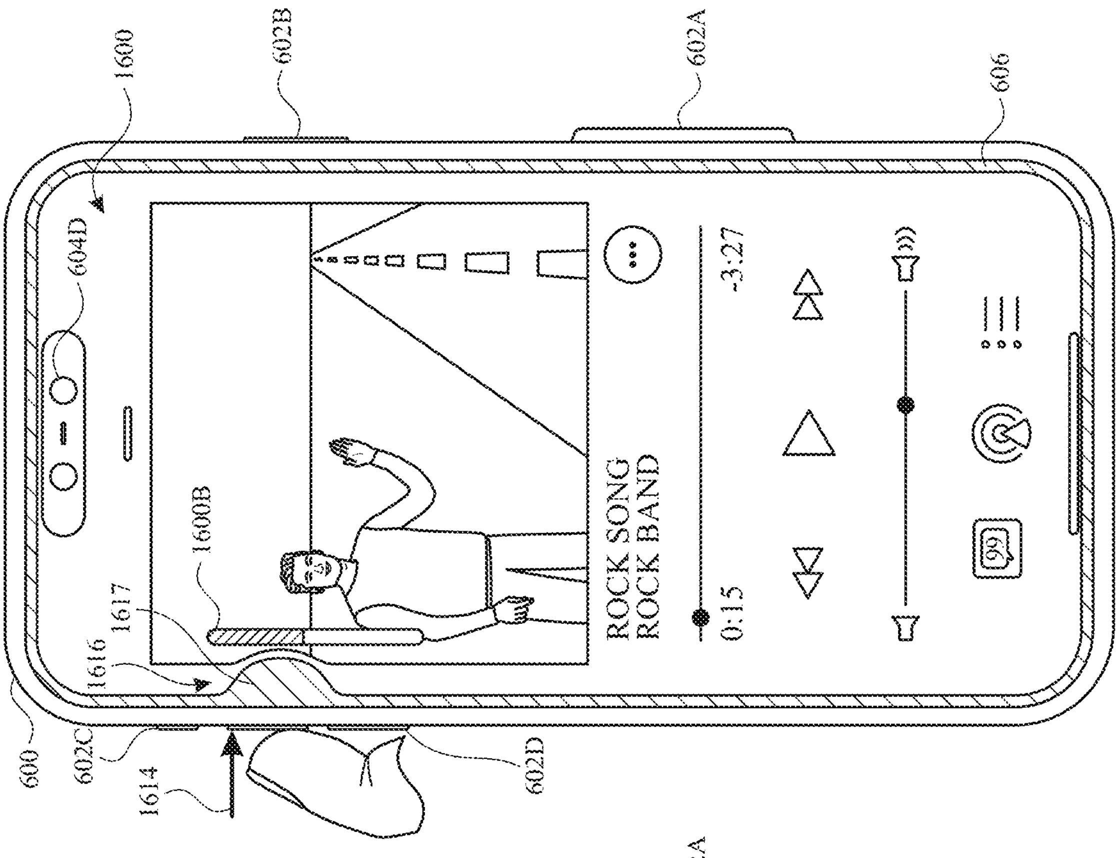
Figure 16I:
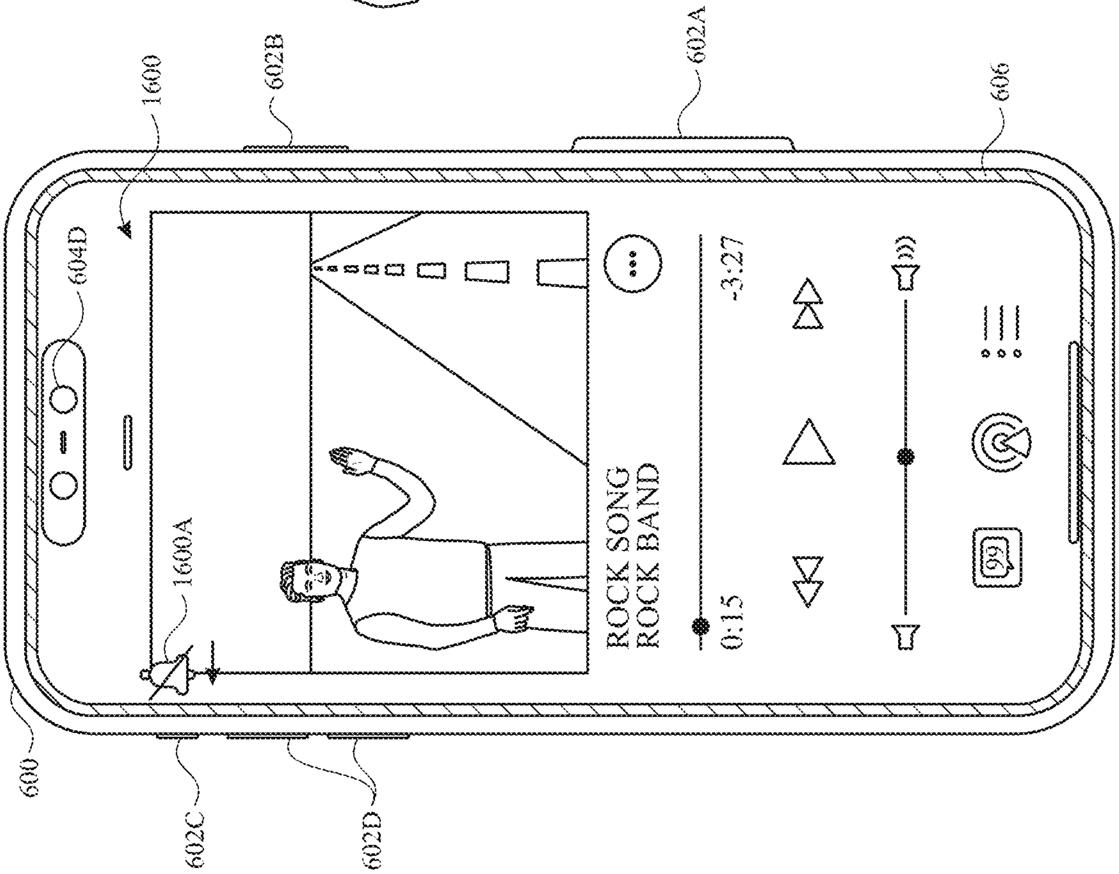

At FIG. 16J, computer system 600 detects press input 1614 directed to the upper portion of fourth button 604D. Fourth button 604D is a volume button that includes two independently operable (e.g., independently depressible) portions: the upper portion, which corresponds to increasing a volume setting, and the lower portion, which corresponds to decreasing a volume setting. Accordingly, in response to press input 1614, computer system 600 deforms user interface 1600 at region 1616, a portion of display 606 adjacent to fourth button 602D. In particular, in addition to displaying contact indicator 1617 and warping the edge of user interface 1600 at region 1616, computer system 600 displays user interface element 1600B, a volume bar element, near fourth button 604D, but at the inner (e.g., right) edge of contact indicator 1617.

In response to detecting press input 1614, computer system 600 increases the volume setting (e.g., increasing the selected playback volume for user interface 1600). As illustrated in FIG. 16K, computer system 600 updates the appearance of user interface element 1600B to represent the increased volume, for instance, raising the filled region of the volume bar (and, for example, updating the volume control in user interface 1600 to show the same increase).

At FIG. 16K, computer system 600 detects an end of press input 1614. In response to the end of press input 1614, computer system 600 reverses the deformation to user interface 1600 at region 1616 until user interface 1600 is no longer deformed at region 1616. As illustrated at FIG. 16K, reversing the deformation to user interface 1600 at region 1616 includes moving user interface element 1600B towards the edge of display 606 near fourth button 602D (e.g., to the left), for instance, following the retreat of contact indicator 1617.

As described with respect to user interface element 1600A, computer system 600 continues to display user interface element 1600B for a short period of time after changing the volume setting. At FIG. 16L, computer system 600 detects press input 1618, a press input directed to the lower portion of fourth button 602D (e.g., the volume down button) while user interface element 1600B is displayed. Accordingly, at FIG. 16L, in response to press input 1618, computer system 600 distorts user interface 1600 at region 1620, a portion of display 606 adjacent to fourth button 602D, including displaying contact indicator 1621, warping the edge of user interface 1600, and displaying user interface element 1600A moving inward, for instance, as though press input 1618 were physically pushing user interface element 1600B across the surface of display 606 and user interface 1600. Additionally, computer system 600 decreases the volume setting, updating the appearance of user interface element 1600B and/or the volume control of user interface 1600 to reflect the decreased volume.

Figure 16L:
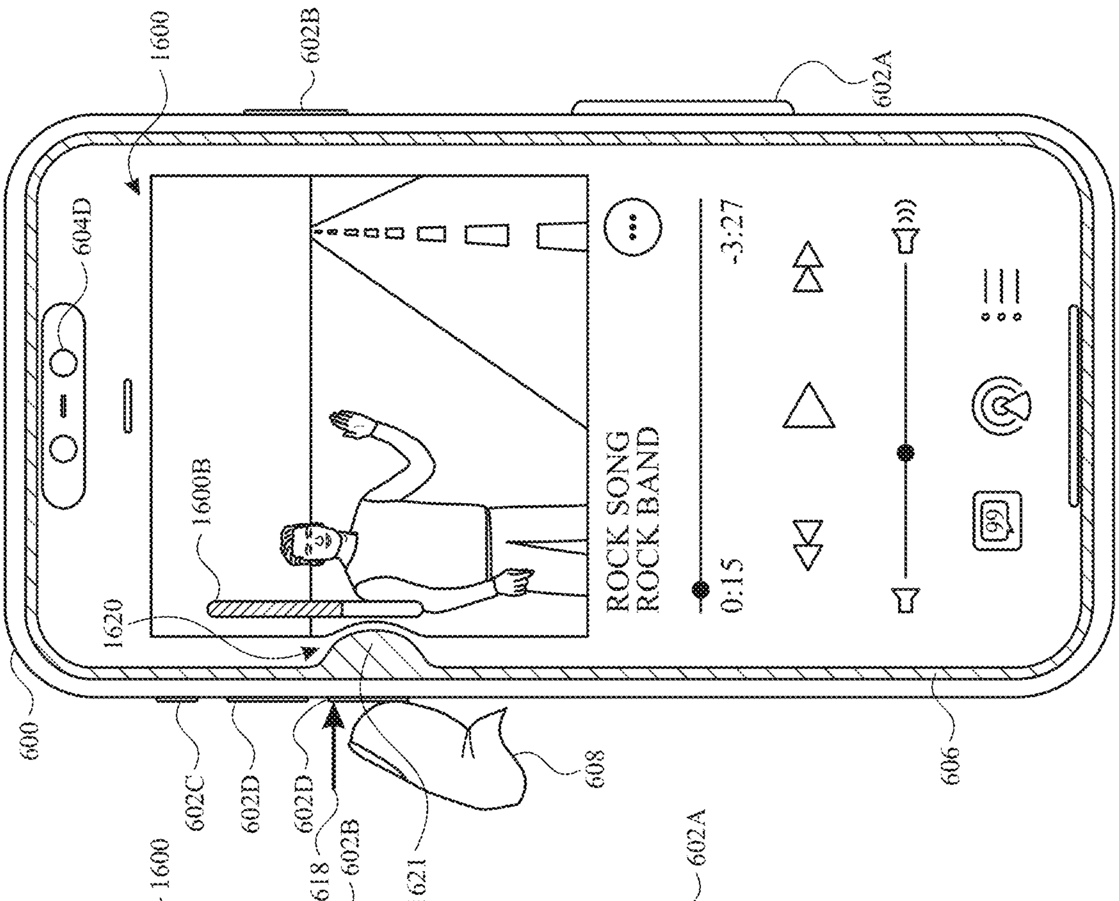
Figure 16K:
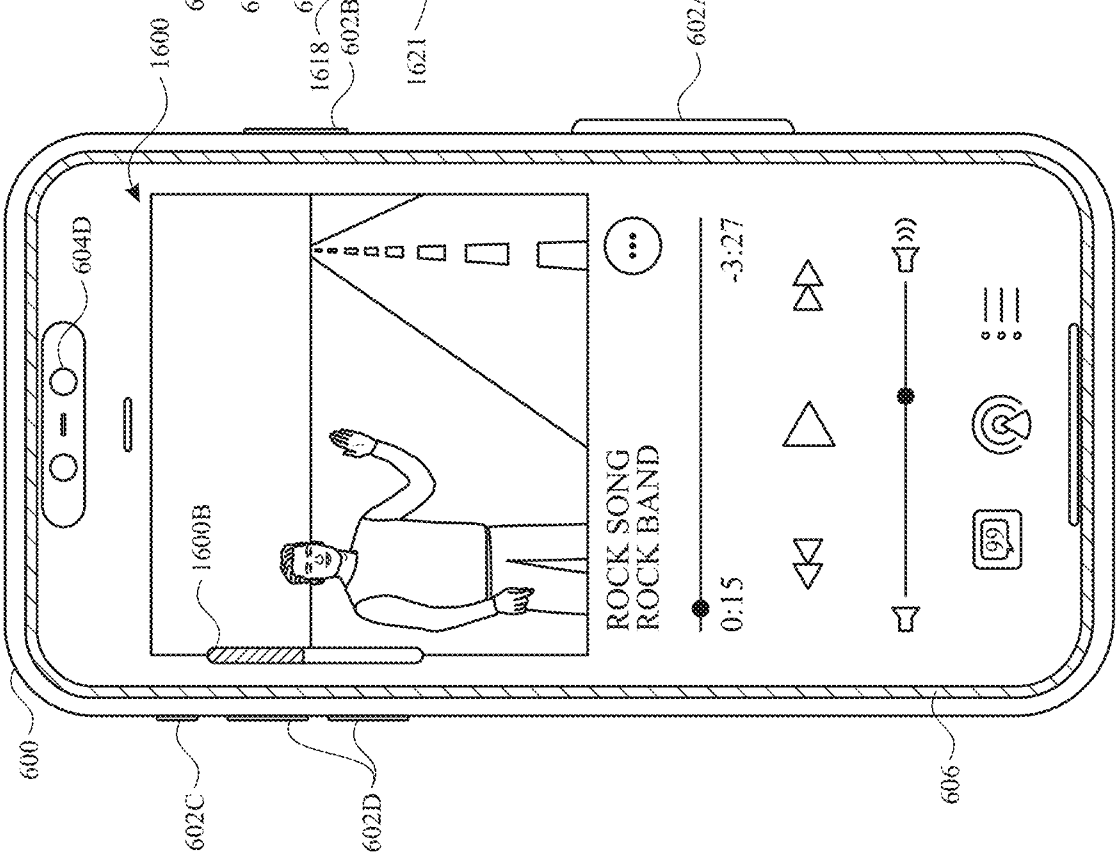

As illustrated in FIG. 16L, although user interface element 1600B is initially displayed at region 1620, computer system 600 does not warp the appearance of user interface element 1600B when moving user interface element 1600B inwards across user interface 1600. In some embodiments, region 1616 and region 1620 are distinct regions (e.g., an upper and lower region of user interface 1600, corresponding to the upper and lower region of fourth button 602D). In some embodiments, region 1616 and region 1620 are the same region, and computer system 600 vertically centers deformations at fourth button 602D (e.g., distorting user interface 1600 in the same way in response to both volume up and volume down inputs).

Figure 16M:
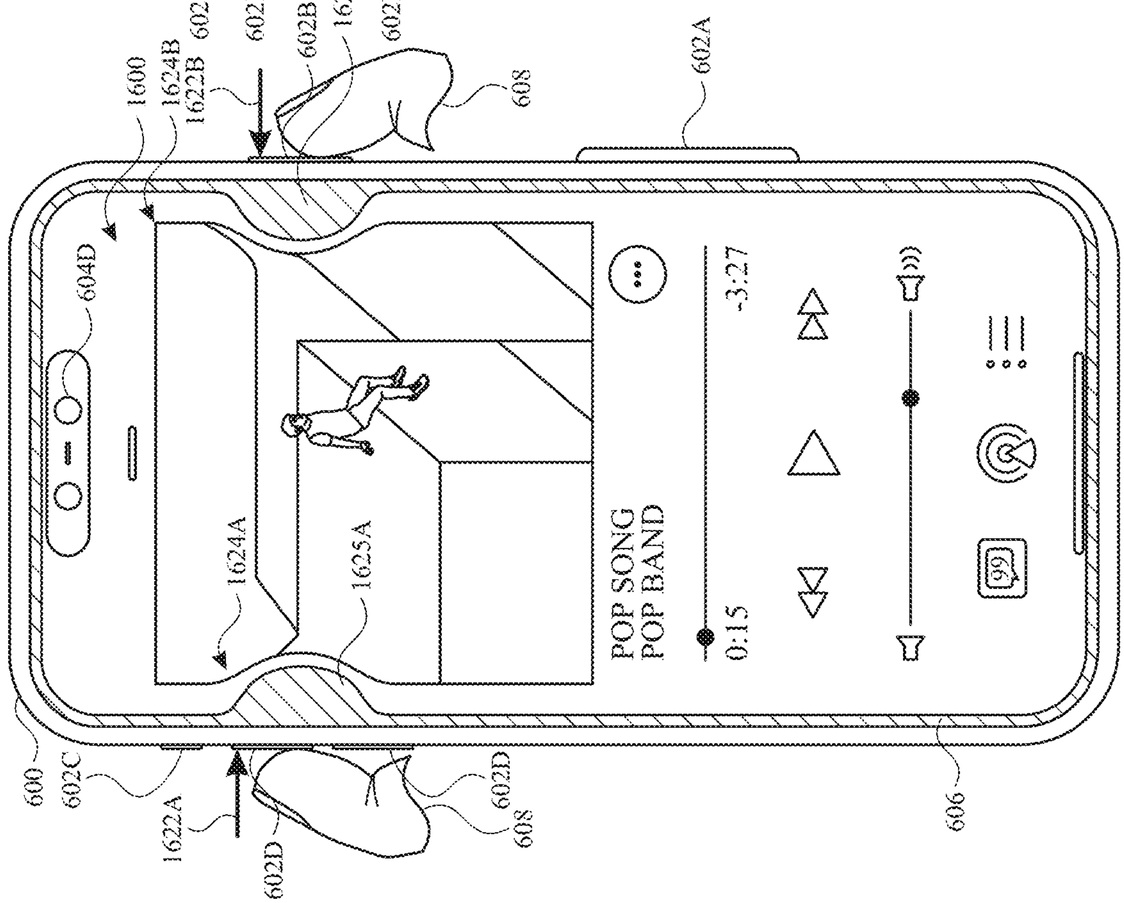

At FIG. 16M, computer system 600 detects press input 1622A, directed to fourth button 602D, and press input 1622B, directed to second button 602B, at overlapping times (e.g., the user presses both fourth button 602D and second button 602B concurrently, such that each press is detected before the other ends). In response to detecting press input 1622A, computer system 600 visually deforms user interface 1600 at region 1624A, a portion of display 606 adjacent to fourth button 602D, and in response to detecting press input 1622B, computer system 600 visually deforms user interface 1600 at region 1624B, a portion of display 606 adjacent to second button 602B. As illustrated in FIG. 16M, both region 1624A and region 1624B of user interface 1600 are deformed simultaneously while press input 1622A and press input 1622B are concurrently maintained, such that contact indicator 1625A appears to push into user interface 1600 from the right from fourth button 602D, while contact indicator 1625B appears to push into user interface 1600 from the left from second button 602B. In some embodiments, the deformation to user interface 1600 at region 1624A and the deformation to user interface 1600 at region 1624B are different shapes and/or sizes while being concurrently displayed. For example, the deformation to user interface 1600 at region 1624A is based on the respective input characteristics (e.g., intensity and/or duration) of press input 1622A and/or the respective characteristics of third button 602C (e.g., the size, length, and/or hardware button type of third button 602C), and the deformation to user interface 1600 at region 1624B is based on the respective input characteristics (e.g., intensity and/or duration) of press input 1622B and/or the respective characteristics of second button 602B.

Figure 16N:
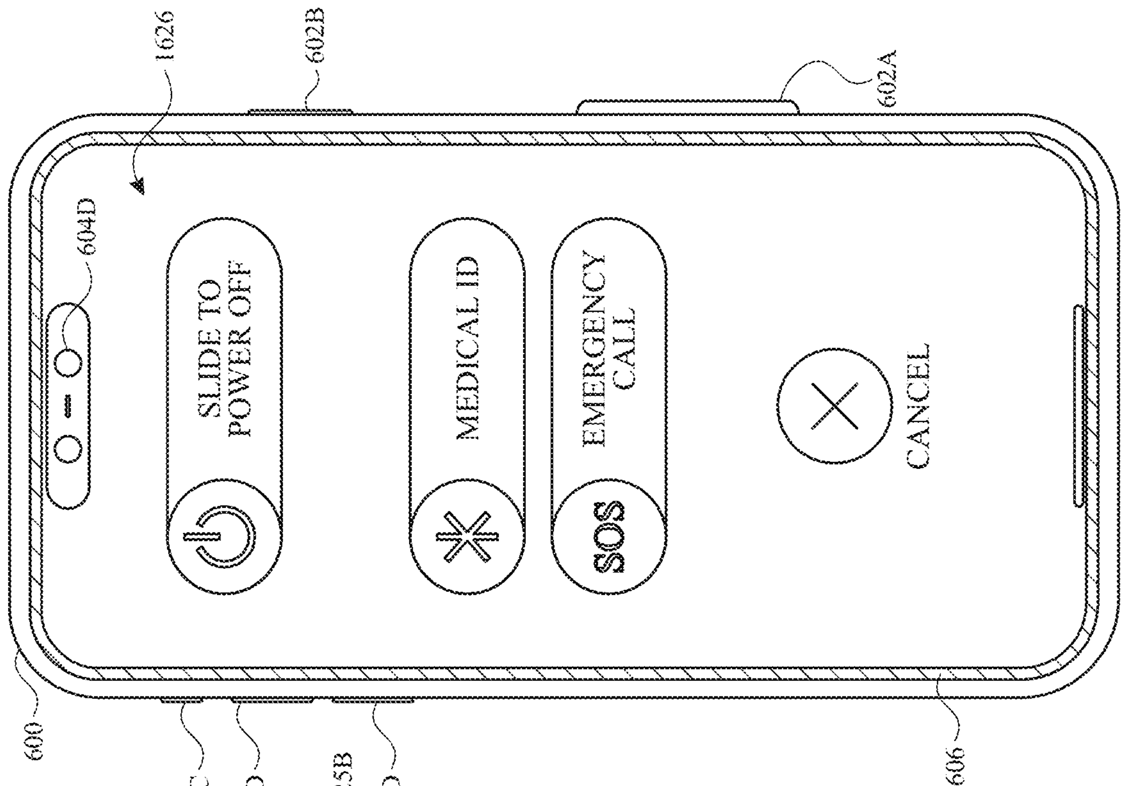

In some embodiments, in response to concurrent presses of both fourth button 602D and second button 602B held for at least a threshold period of time, computer system 600 displays power interface 1626, as illustrated in FIG. 16N, which includes controls for powering down computer system 600 (e.g., turning computer system 600 off and/or placing computer system 600 into a standby state) and accessing emergency features, such as an emergency call system and a digital medical identification card. In some embodiments, in response to concurrent presses of both fourth button 602D and second button 602B held for less than a respective period of time, computer system 600 performs a screen capture operation, displaying the captured screen image in screen capture user interface 1628, as illustrated in FIG. 16O. Accordingly, the visual indication of press input 1622A and press input 1622B provided by deforming region 1624A and region 1624B helps the user monitor the inputs to achieve the desired result.

As discussed above, at FIG. 16O, computer system 600 displays screen capture user interface 1628, which includes representation 1628A (e.g., a screenshot) of the content displayed on display 606 at FIG. 16M, including user interface 1600. As illustrated in FIG. 16O, representation 1628A depicts user interface 1600 without the deformations to region 1624A and region 1624B. For example, the edges of user interface 1600 and the album cover image shown in representation 1628A are unbent, and representation 1628A does not include contact indicator 1625A or contact indicator 1625B.

Figure 16P:
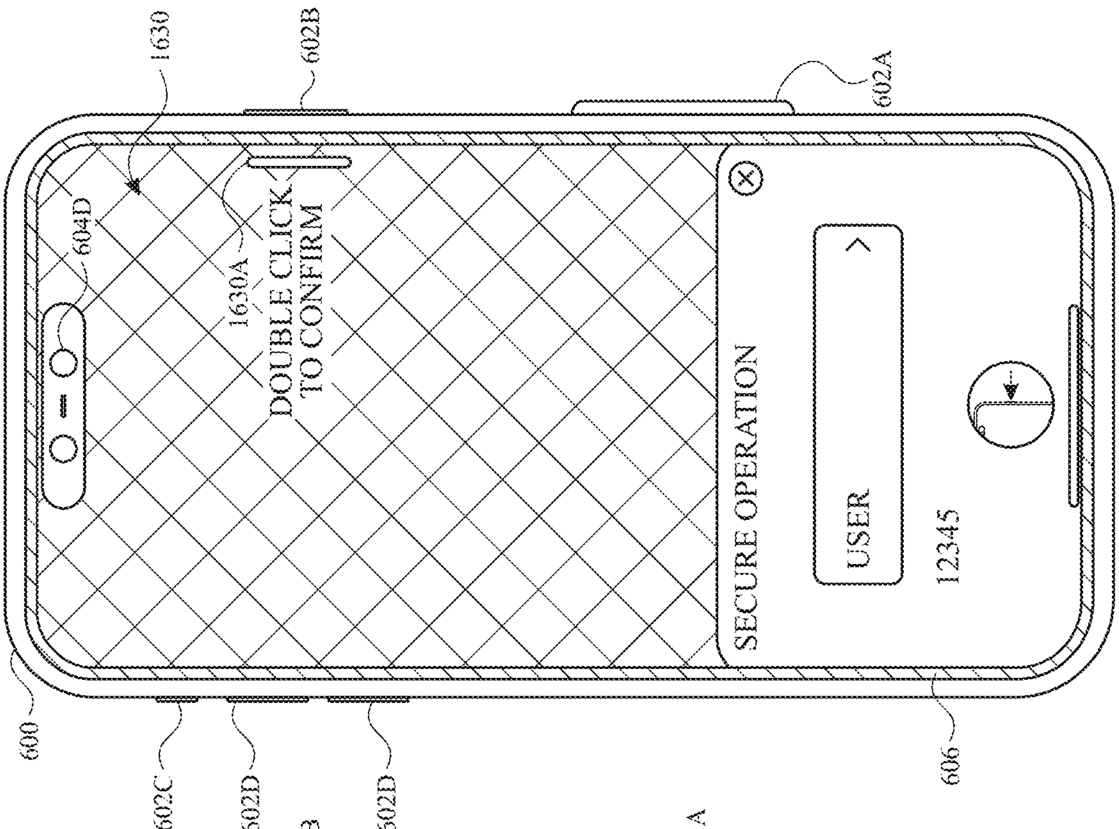
Figure 16O:
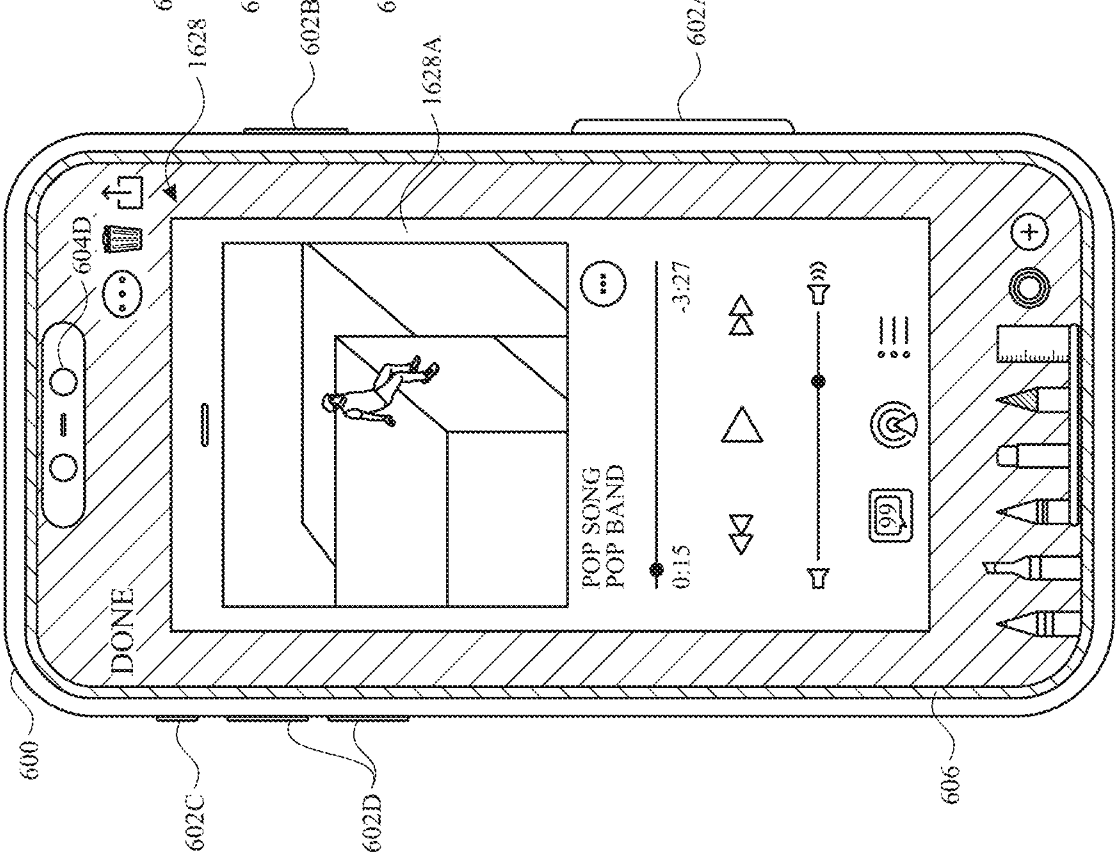
Figure 16R:
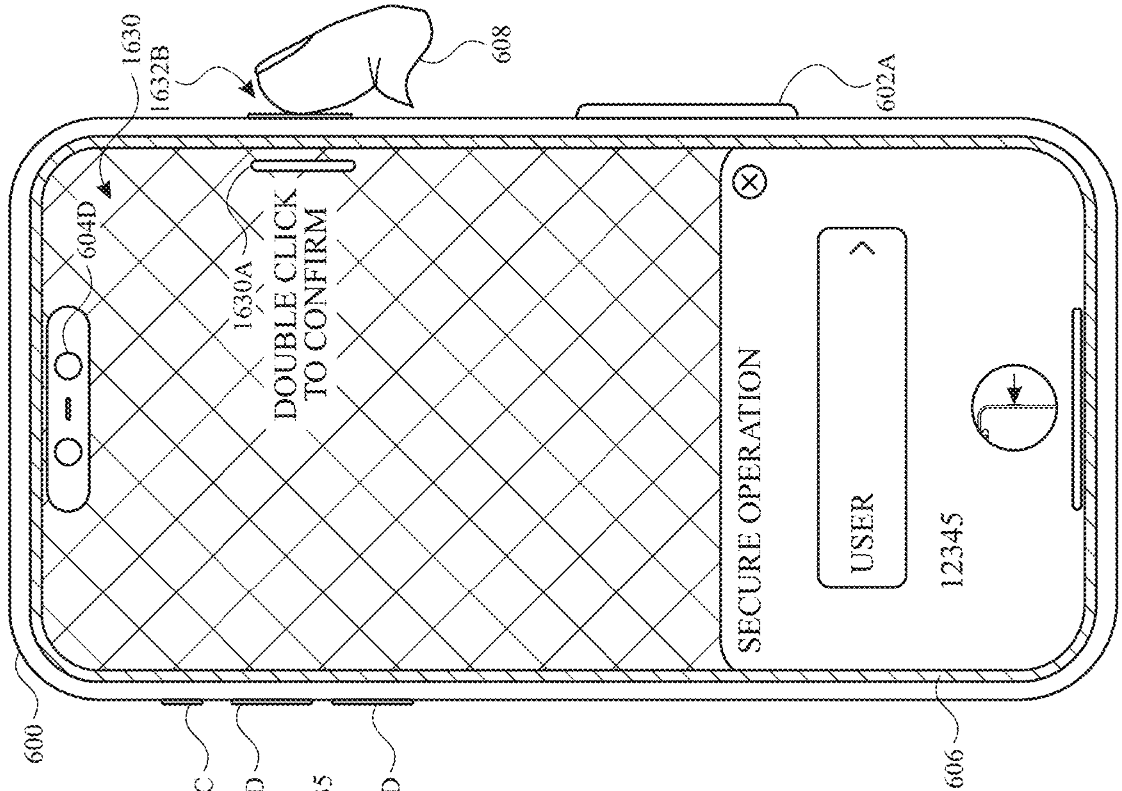

At FIG. 16P, computer system 600 displays, via display 606, user interface 1630, a user interface for performing a secure operation (e.g., signing into a secure account, reading or logging biometric data, and/or performing a secure transaction). For example, user interface 1630 is displayed in response to a request to perform the secure operation. At FIG. 16P, user interface 1630 includes user interface element 1630A, which includes instructions for confirming performance of the secure operation by double clicking (e.g., performing two short presses in quick succession) on second button 602B. As illustrated in FIG. 16P, user interface element 1630A is displayed at the edge of display 606 next to second button 602B.

Figure 16Q:
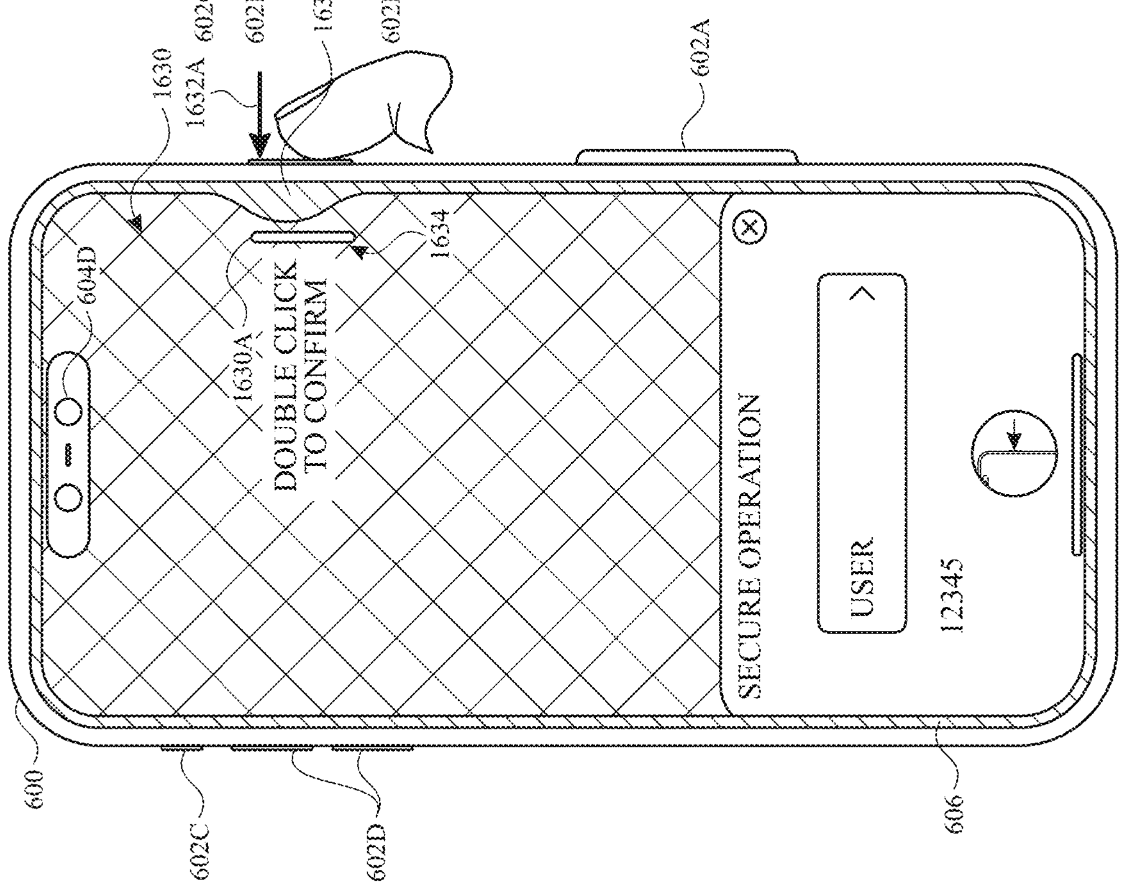

At FIG. 16Q, computer system 600 detects first press input 1632A of second button 602B. In response, computer system 600 deforms user interface 1630 at region 1634, the portion of display 606 adjacent to second button 602B. In particular, computer system 600 displays contact indicator 1635 extending inwards from second button 602B (e.g., as described with respect to FIGS. 16B-16D) and displays user interface element 1630A moving inward, away from second button 602B, as though user interface element 1630A were being physically pushed across the surface of display 606 and/or user interface 1630 by first press input 1632A (e.g., as described with respect to FIG. 16L).

At FIG. 16R, computer system 600 detects an end of first press input 1632A, for instance, detecting the intensity of first press input 1632A falling below a particular intensity threshold for parsing a double click input. In response, computer system 600 reverses the deformation to user interface 1630 at region 1634, including ceasing displaying contact indicator 1635 and moving user interface element 1630A back to its original position, closer to second button 602B. In some embodiments, computer system 600 detects input contact 1632B at second button 602B after detecting the end of first press input 1632A (e.g., the user does not lift finger 608 entirely off of second button 602B). Accordingly, in some embodiments, computer system 600 does not fully reverse the deformation to user interface 1630 at region 1634, but does shrink the size of contact indicator 1635 and move user interface element 1630A partially back towards second button 602B.

At FIG. 16S, after computer system 600 detects the end of first press input 1632A, computer system 600 detects second press input 1632B of second button 602B. In response to second press input 1632B, computer system 600 re-distorts user interface 1630 at region 1634, displaying contact indicator 1636 extending inwards from second button 602B and displaying user interface element 1630A moving back inward, as described with respect to FIG. 16R. Accordingly, when the user performs a double click input using second button 602B, user interface element 1630A appears to be bounced out from second button 602B (e.g., by the displayed contact indicators) twice in a row, providing visual confirmation of the double click. As illustrated at FIG. 16S, in response to detecting second press input 1632B, computer system 600 performs the secure transaction, indicated by the confirmation icon displayed at the bottom of user interface 1630.

As described with respect to FIG. 6C, above, in some embodiments, computer system 600 implements customizable and/or button-specific thresholds (e.g., intensity and/or mechanical depression thresholds) used to define different button press states. Accordingly, in some embodiments, computer system 600 adjusts the distortions as described above relative to the thresholds associated with the button(s) being pressed and/or relative one or more user-customized thresholds. In some embodiments, computer system 600 provides a user interface for customizing the thresholds used to define the different button press states by inputting test button presses to generate corresponding custom thresholds. In some embodiments, in the user interface for customizing the thresholds, computer system 600 displays and adjusts distortions to the user interface based on the test button presses as described above, providing visual feedback to the user about the detected characteristics of the test button presses. However, in contrast to the various press inputs described herein, in the user interface for customizing the thresholds, computer system 600 does not perform other operations in response to the test button presses, such as launching camera user interface 612, displaying settings control 622, performing media capture operations, and so forth.

FIG. 17 is a flow diagram illustrating method 1700 for controlling a computer system with multiple hardware input devices, in accordance with some embodiments. The method is performed at a computer system (e.g., 100, 300, 500, and/or 600) that is in communication with one or more display generation components (e.g., 606) (e.g., a display controller; a touch-sensitive display system; a display (e.g., integrated and/or connected), a 3D display, a transparent display, a projector, and/or a heads-up display) and a plurality of input devices (e.g., 602A, 602B, 602C, 602D, and/or a touch sensitive surface of display 606) (e.g., hardware buttons and/or surfaces, such as mechanical (e.g., physically depressible), solid-state, intensity-sensitive, and/or touch-sensitive (e.g., capacitive) buttons and/or surfaces) that includes at least a first hardware input device (e.g., 602A, 602B, 602C, 602D) (e.g., a hardware input device separate from the one or more display generation components) and a second hardware input device (e.g., 602A, 602B, 602C, 602D) (e.g., a hardware input device separate from the one or more display generation components) different from the first hardware input device. In some embodiments, the set of hardware input devices includes one or more mechanical buttons, such as buttons that can be physically depressed to one or more states. In some embodiments, the set of hardware input devices includes one or more solid-state buttons, such as buttons that simulate the tactile sensation (e.g., via tactile/haptic output generators) of pressing a mechanical button. In some embodiments, the first hardware button includes one or more sensors, such as pressure sensors, touch sensors, capacitive sensors, and/or motion sensors. In some embodiments, the first and second hardware input devices comprise multiple independently operable buttons in a compound form (e.g., multiple pressure sensors in a single button housing and/or a trackpad with multiple zones). In some embodiments, the first and second hardware input devices are different from a touch-sensitive surface of the display generation components, for example, mechanical or solid-state buttons arranged outside of a display and/or on a different surface or edge of a device than the display. In some embodiments, the computer system is optionally in communication with one or more cameras (e.g., 604A, 604B, 604C, and/or 604D), such as a rear (user-facing) camera and a forward (environment-facing) camera and/or a plurality of cameras with different lenses, such as a standard camera, a telephoto camera, and/or a wide-angle camera. In some embodiments, the computer system is optionally in communication with one or more sensors, such as camera sensors, optical sensors, depth sensors, capacitive sensors, intensity sensors, motion sensors, vibration sensors, and/or audio sensors.

The computer system (e.g., 600) displays (1702), via the one or more display generation components (e.g., 606), a user interface (e.g., 1600, 1626, 1628, 1630, 610, 612, 1046, 1200, and/or 1214) (e.g., a camera user interface, a media player user interface, a digital wallet user interface, a home page, a lock screen, a messaging application, and/or another application or system user interface). While displaying the user interface, the computer system detects (1704), via one or more of the plurality of input devices, a set of one or more inputs (e.g., 616, 806, 1602, 1608, 1614, 1618, 1622A, 1622B, 1632A, 1632B, and/or any other inputs described with respect to FIGS. 6A-14) (e.g., a press input and/or a movement input). In some embodiments, the set of one or more inputs includes at least one press input directed to at least one hardware input device that is separate from the one or more display generation components (e.g., the first hardware input device, the second hardware input device, and/or another hardware input device). In some embodiments, the set of one or more inputs includes a press input of at least a threshold magnitude, e.g., applying at least a threshold amount of intensity, e.g., a threshold force and/or pressure (e.g., 5 g/cm$^3$, 50 g/cm$^3$, or 100 g/cm$^3$) and/or physical depression of a hardware input device to at least a threshold state (e.g., as a substitute measurement for force/pressure), for example, as described with respect to FIGS. 6A-14. In some embodiments, the set of one or more inputs includes a press input of at least a threshold duration, e.g., detected for at least 0.01 s, 0.06 s, 0.1 s, or 0.15 s.

In response to detecting the set of one or more inputs, the computer system displays (1706), via the one or more display generation components, the user interface with one or more deformations (e.g., as illustrated in FIGS. 6F-6I, 8D-8G, 8I-8K, 16B-16D, 16F-16H, 16J, 16L-16M, 16Q, and/or 16S) (e.g., changes to a shape, size, and/or arrangement of the respective user interface). In some embodiments, in response to detecting the press input, the computer system maintains displaying at least one portion of the respective user interface with a consistent appearance (e.g., foregoes changing the portion of the respective user interface) while displaying the one or more deformations. For example, the one or more deformations are localized, such that the respective user interface only changes shape, size, and/or arrangement in respective regions (e.g., as described below). In some embodiments, in response to detecting the press input, the computer system modifies the appearance of one or more portions of the user interface.

Displaying the user interface with the one or more deformations (1706) includes, in accordance with a determination that the set of one or more inputs includes a first press input directed to the first hardware input device (e.g., 602A, 602B, 602C, and/or 602D) (in some embodiments, the press input is a press input directed to the first input device), displaying (1708) the user interface with a first deformation at a first region (e.g., 1604, 1610, 1616, 1620, 1624A, 1624B, and/or 1634) (e.g., of a display), wherein the first region corresponds to a location of the first hardware input device (e.g., the first region is a portion of the display physically close to the first hardware input device, e.g., a display region adjacent to the first hardware input device). For example, the computer system displays the respective user interface (e.g., and/or the user interface elements thereof) warping, shifting, and/or distorting near the location of the first press input at the first hardware input device. In some embodiments, one or more characteristics of the first deformation to the respective user interface are based on one or more characteristics of the first press input directed to the first hardware input device, such as the press input's intensity, duration, position, and/or movement (e.g., as described with respect to FIGS. 6F-6I). In some embodiments, in accordance with a determination that the press input includes the first press input directed to the first input device, the computer system modifies an appearance of a first portion of the user interface, wherein the first portion of the user interface corresponds to the location of the first input device.

Displaying the user interface with the one or more deformations (1706) includes, in accordance with a determination that the set of one or more inputs includes a second press input directed to the second hardware input device (e.g., 602A, 602B, 602C, and/or 602D) (in some embodiments, the press input is a press input directed to the second hardware input device), displaying (1710) the user interface with a second deformation at a second region (e.g., 1604, 1610, 1616, 1620, 1624A, 1624B, and/or 1634) (e.g., of a display), different from the first region, wherein the second region corresponds to a location of the second hardware input device (e.g., the second region is a portion of the display physically close to the second hardware input device, e.g., a display region adjacent to the second hardware input device). For example, the computer system displays the respective user interface (e.g., and/or the user interface elements thereof) warping, shifting, and/or distorting near the location of the second press input at the second hardware input device, e.g., as described above. In some embodiments, in accordance with a determination that the press input includes the second press input directed to the second input device, the compute system modifies an appearance of a second portion of the user interface, wherein the second portion of the user interface corresponds to the location of the second input device. Deforming a portion of a displayed user interface near a first hardware input device (e.g., button) in response to a press input directed to the first input device and deforming a portion of the displayed user interface near a second hardware input device (e.g., button) in response to a press input directed to the second input device provides users with improved visual feedback about a state of the computer system without cluttering the display. Doing so also assists the user with control of the computer system via the various input devices by helping the user to provide proper inputs and reduce user mistakes while interacting with the various input devices, which makes the computer system more efficient, e.g., reducing power usage and/or improving battery life of the system. For example, the deformations to the displayed user interface intuitively indicate to the user that the computer system has detected an input via a particular hardware input device, confirming an intended input and alerting the user to adjust an unintended input.

In some embodiments, the first deformation and second deformation change the size, shape, and/or arrangement of the user interface in the same manner (e.g., albeit at different regions). For example, the first deformation replaces (e.g., removes and/or overlays) a first portion of the user interface adjacent to the first hardware button and the second deformation replaces a second portion of the user interface, of the same size and/or shape as the first portion, adjacent to the second hardware button. In some embodiments, the first deformation and second deformation change the size, shape, and/or arrangement of the user interface in different manners. For example, the size, shape, color, opacity, and/or dynamic characteristics (e.g., animations of moving, growing, shrinking, changing shape, changing color, and/or changing opacity) of the first portion of the user interface replaced by the first deformation differ from that of the second portion of the user interface replaced by the second deformation. For example, the first deformation replaces the first portion of the user interface, while the second deformation rearranges the elements of the user interface in the second portion. In some embodiments, the first deformation and the second deformation include different changes to the shape, size, and/or arrangement of the respective user interface and/or the elements thereof. For example, the size and/or shape of the first deformation is based on input characteristics (e.g., intensity, location on button surface, movement, and/or duration) of the first press input directed to the first hardware input device and the size and/or shape of the second deformation is based on input characteristics of the second press input directed to the second hardware input device, such that the respective deformations appear differently to reflect the different presses. In some embodiments, the first deformation and the second deformation differ in appearance based on differing characteristics of the first hardware input device and the second hardware input device (e.g., button type, button size, button location, and/or button function). For example, deformations displayed in response to presses on larger or longer hardware input devices are larger than deformations displayed in response to (e.g., otherwise comparable) presses on smaller or shorter hardware input devices (e.g., longer input device first button 602A vs. shorter input device third button 602C). As another example, deformations displayed in response to presses on touch- or pressure-sensitive buttons appear and change appearance differently (e.g., appearing and/or changing based on location, movement, and/or intensity) than deformations displayed in response to presses on mechanical buttons without touch- and/or pressure-sensitivity. In some embodiments, the first deformation and second deformation differ in other ways, such as different shapes, different rates of change over time, different magnitude ranges, and/or different interactions with displayed user interface elements.

In some embodiments, displaying the user interface with the first deformation at the first region includes bending (e.g., compressing, curving, warping, and/or otherwise changing the curvature of a line of) a portion of an edge of the user interface within the first region (e.g., as illustrated in FIGS. 16B-16D, 16F-16H, 16J, 16L-16M, 16Q, and/or 16S). For example, the first deformation includes bending the edge of the user interface away from the location of the first hardware input device, for instance, as though the first press input were physically pushing into a flexible edge of the user interface. In some embodiments, displaying the user interface with the second deformation at the second region includes bending (e.g., compressing, curving, warping, and/or otherwise changing the curvature of a line of) a second portion of the edge of the user interface within the second region. Bending an edge of a displayed user interface near a particular hardware input device (e.g., button) in response to a press input directed to the particular input device provides users with improved visual feedback about a state of the computer system without cluttering the display. Doing so also assists the user with control of the computer system via the various input devices by helping the user to provide proper inputs and reduce user mistakes while interacting with the various input devices, which makes the computer system more efficient, e.g., reducing power usage and/or improving battery life of the system. For example, deforming the displayed user interface by bending the edge of the user interface near the pressed input device indicates to the user that the computer system has detected an input via a particular hardware input device while still allowing the user to view the displayed user interface.

In some embodiments, displaying the user interface with the first deformation at the first region includes displaying, via the one or more display generation components, a graphical element of a solid color (e.g., 618, 1605, 1611, 1617, 1621, 1625A, 1625B, 1635, and/or 1636) (e.g., one or more solid, single-color shapes, such as a semicircle, tab, and/or blob) replacing a respective portion of the user interface (e.g., a portion of the same size and shape as the graphical element) within the first region (e.g., as illustrated in FIGS. 6F-6I, 16B-16D, 16F-16H, 16J, 16L-16M, 16Q, and/or 16S) (e.g., the computer system ceases displaying the respective portion of the user interface). For example, the graphical element appears as a cut-out or opaque overlay of the user interface near the location of the first hardware input device. In some embodiments, displaying the user interface with the second deformation at the second region includes displaying, via the one or more display generation components, a second graphical element of a second solid color (e.g., one or more solid, single-color shapes, such as a semicircle, tab, and/or blob) replacing a second respective portion of the user interface (e.g., a portion of the same size and shape as the graphical element) within the second region (e.g., the computer system ceases displaying the second respective portion of the user interface). In some embodiments, the second graphical element is the same shape, a similar shape, and/or a different shape than the graphical element. In some embodiments, the second graphical element is the same color and/or a different color than the graphical element. Replacing a portion of a displayed user interface near a particular hardware input device (e.g., button) with a solid color in response to a press input directed to the particular input device provides users with improved visual feedback about a state of the computer system without cluttering the display. Doing so also assists the user with control of the computer system via the various input devices by helping the user to provide proper inputs and reduce user mistakes while interacting with the various input devices, which makes the computer system more efficient, e.g., reducing power usage and/or improving battery life of the system. For example, deforming the displayed user interface by replacing a portion of the user interface with a solid color near the pressed input device intuitively indicates to the user that the computer system has detected a press input via a particular hardware input device.

In some embodiments, displaying the user interface with the first deformation at the first region includes displaying, via the one or more display generation components, a graphical element (e.g., 618, 1605, 1611, 1617, 1621, 1625A, 1625B, 1635, and/or 1636) (e.g., one or more shapes, such as a semicircle, tab, and/or blob) of a respective color replacing a respective portion of the user interface (e.g., a portion of the same size and shape as the graphical element) within the first region (e.g., the computer system ceases displaying the respective portion of the user interface), wherein the respective color represents a color (in some embodiments, is a color) of a portion of a hardware component of the computer system located near (e.g., physically close to) the first region (e.g., as described with respect to FIGS. 16B-16C). For example, the graphical element extends the color of a nearby hardware component into the display region previously occupied by the portion of the user interface. In some embodiments, the hardware component includes one or more display generation components near the first hardware input device. In some embodiments, the hardware component includes the first hardware input device. In some embodiments, the hardware component includes a device housing (e.g., body) between the first hardware input device and the display(s). For example, for a computer system in communication with a red hardware button, the computer system displays a red cut-out/overlay replacing a portion of the user interface near the red hardware button in response to a press of the red hardware button, e.g., extending the color of the first hardware input device into the display. For example, for a computer system with a titanium frame housing the one or more display generation components and one or more input devices, the computer system displays a silvery cut-out/overlay replacing a portion of the user interface, e.g., extending the color of the frame into the display near the first hardware input device. In some embodiments, displaying the user interface with the first deformation at the first region includes displaying, via the one or more display generation components, a second graphical element (e.g., one or more shapes, such as a semicircle, tab, and/or blob) of a second respective color replacing a second respective portion of the user interface (e.g., a portion of the same size and shape as the graphical element) within the second region (e.g., the computer system ceases displaying the respective portion of the user interface), wherein the second respective color represents a color of a second portion of a second hardware component of the computer system located near (e.g., physically close to) the second region. Replacing a portion of a displayed user interface near a particular hardware input device (e.g., button) with a color corresponding to a nearby hardware color in response to a press input directed to the particular input device provides users with improved visual feedback about a state of the computer system without cluttering the display. Doing so also assists the user with control of the computer system via the various input devices by helping the user to provide proper inputs and reduce user mistakes while interacting with the various input devices, which makes the computer system more efficient, e.g., reducing power usage and/or improving battery life of the system. For example, deforming the displayed user interface by replacing a portion of the user interface with a color of the hardware near the pressed input device intuitively indicates to the user that the computer system has detected a press input via a particular hardware input device.

In some embodiments, the portion of a hardware component of the computer system located near (e.g., physically close to) the first region includes a portion of at least one of the one or more display generation components (e.g., 606). In some embodiments, the portion of the at least one display generation component includes part of a border portion of a display, e.g., a region around the edges of the display where the user interface is not displayed. In some embodiments, graphical element is black, for instance, representing the color of the display when blank and/or off. For example, the computer system displays a black cut-put/overlay extending the border portion of the display into the user interface near the first hardware input device. Replacing a portion of a displayed user interface near a particular hardware input device (e.g., button) with a color corresponding to a nearby display color in response to a press input directed to the particular input device provides users with improved visual feedback about a state of the computer system without cluttering the display. Doing so also assists the user with control of the computer system via the various input devices by helping the user to provide proper inputs and reduce user mistakes while interacting with the various input devices, which makes the computer system more efficient, e.g., reducing power usage and/or improving battery life of the system. For example, deforming the displayed user interface by replacing a portion of the user interface with a color of the display near the pressed input device (e.g., the black border region of a display) creates an intuitive cut-out effect indicating the detection of the press input.

In some embodiments, while displaying the user interface with the first deformation at the first region, the computer system detects an end (e.g., a release and/or lift-off) of the first press input directed to the first hardware input device (e.g., as illustrated in FIGS. 16E, 16H, 16K, and/or 16R). In some embodiments, the computer system detects an end of the first press input when an intensity of the first press input falls below a threshold intensity (e.g., a maintenance threshold). In some embodiments, the computer system detects an end of the first press input when a detected contact with the first hardware input device ends (e.g., when a user lifts their finger off of the first hardware button). In some embodiments, in response to detecting the end of the first press input directed to the first hardware input device, the computer system reduces a magnitude of the first deformation (e.g., as illustrated in FIGS. 16E, 16H-16I, 16K, and/or 16R) (e.g., reducing the extent to which the user interface is visibly deformed at the first region; e.g., reverting or partially reverting one or more changes to the display made before the end of the first press input). For example, where the first deformation includes a graphical element (e.g., a cut-out/overlay of the user interface), reducing the magnitude includes displaying the first deformation pulling back towards the edge of the display near the first hardware input device, shrinking, flattening, caving in, and/or fading. For example, where the first deformation includes moving one or more other graphical elements away from their initial positions, reducing the magnitude includes moving the one or more other graphical elements back towards their initial positions. In some embodiments, after reducing the magnitude of the first deformation, the computer system displays the user interface without the first deformation at the first region (e.g., ceases displaying the first deformation). In some embodiments, while displaying the user interface with the second deformation at the second region, the computer system detects an end of the second press input directed to the second hardware input device; and in response to detecting the end of the second press input directed to the second hardware input device, the computer system reduces a magnitude of the second deformation. Reducing the amount by which a portion of a displayed user interface near a particular hardware input device (e.g., button) is deformed once a press input directed to the particular input device ends provides users with improved visual feedback about a state of the computer system without cluttering the display. Doing so also assists the user with control of the computer system via the various input devices by helping the user to provide proper inputs and reduce user mistakes while interacting with the various input devices, which makes the computer system more efficient, e.g., reducing power usage and/or improving battery life of the system. For example, reverting the deformations to the displayed user interface intuitively indicates to the user that the computer system has stopped registering a press input via a particular hardware input device, confirming an intended release and alerting the user to adjust an unintended release.

In some embodiments, reducing the magnitude of the first deformation includes gradually changing an appearance of the first deformation (e.g., as illustrated in FIGS. 16H-16I) (e.g., over time or in response to a change in intensity of the input). For example, the computer system animates the first deformation gradually reducing after the press is released, e.g., until the deformation disappears. Gradually reducing the amount by which a portion of a displayed user interface near a particular hardware input device (e.g., button) is deformed once a press input directed to the particular input device ends provides users with improved visual feedback about a state of the computer system without cluttering the display, which assists the user with control of the computer system via the various input devices.

In some embodiments, while displaying the user interface with the one or more deformations, the computer system changes (e.g., increasing and/or decreasing over time) a magnitude of a respective deformation (e.g., changing the extent to which the user interface is visibly deformed at a respective region) of the one or more deformations (e.g., as illustrated in FIGS. 16B-16D and/or 16F-16I). In some embodiments, the first deformation and/or the second deformation. For example, where the respective deformation includes a graphical element (e.g., a cut-out/overlay of the user interface), reducing the magnitude includes displaying the deformation pulling back towards the edge of the display near the respective hardware input device, shrinking, flattening, caving in, and/or fading; and increasing the magnitude includes displaying the deformation extending further out from the edge of the display near the respective hardware input device, growing, expanding, curving out, and/or otherwise increasing in visual prominence. For example, where the deformation includes moving one or more other graphical elements away from their initial positions, reducing the magnitude includes moving the one or more other graphical elements back towards their initial positions; and increasing the magnitude includes moving the one or more other graphical elements further away from their initial positions. In some embodiments, the rate or overall amount of change that the computer system makes to the respective deformation differs based on which hardware input device is pressed to display the respective deformation. For example, deformations displayed at the first region in response to a press input at the first hardware input device increase (e.g., and/or decrease) in size at a higher rate per unit time and/or per unit intensity than deformations displayed at the second region in response to a press input at the second hardware input device (or vis versa). For example, at its maximum size, the first distortion extends further into the user interface than the second distortion (e.g., the first region extends further into the user interface than the second region) (or vis versa). For example, deformations displayed in response to a press input at a longer hardware input device (e.g., first button 602A) change by both extending outward from the edge of the display generation component and lengthening along the edge of the display generation component, while deformations displayed in response to a press input at a shorter hardware input device (e.g., third button 602C) change by extending outward from the edge of the display generation component without lengthening. Changing the amount by which a portion of a displayed user interface near a particular hardware input device (e.g., button) while a press input directed to the particular input device is held provides users with improved visual feedback about a state of the computer system without cluttering the display, which assists the user with control of the computer system via the various input devices.

In some embodiments, changing the magnitude of the respective deformation of the one or more deformations includes, while detecting the first press input directed to the first hardware input device (e.g., in accordance with the determination that the set of one or more inputs includes the first press input directed to the first hardware input device and a determination that the first press input has not ended (e.g., been released/lifted)), the computer system changes (e.g., increasing or decreasing; in some embodiments, gradually changing) the magnitude of the first deformation at the first region based on a current duration of the first press input (e.g., as described with respect to FIG. 16G). In some embodiments, the magnitude of the deformation gradually increases as the first press input is held. For example, the first deformation gradually grows or expands until the first press is released and/or a magnitude limit (e.g., a predetermined maximum extent of deformation) is reached. For example, the first deformation expands into a new user interface element after the press is held for a threshold duration of time (e.g., 0.1 s, 0.25 s, 0.5 s, 1 s, or 2 s) (e.g., as described with respect to FIGS. 6F-6J). In some embodiments, changing the magnitude of the respective deformation of the one or more deformations includes, while detecting the second press input directed to the second hardware input device (e.g., in accordance with the determination that the set of one or more inputs includes the second press input directed to the first hardware input device and a determination that the second press input has not ended (e.g., been released/lifted)), the computer system changes (in some embodiments, gradually changes) the magnitude of the second deformation at the second region based on a current duration of the second press input. Changing the amount by which a portion of a displayed user interface near a particular hardware input device (e.g., button) is deformed based on the held duration of a press input directed to the particular input device provides users with improved visual feedback about a state of the computer system without cluttering the display, which assists the user with control of the computer system via the various input devices. For example, changing the magnitude of the deformation assists a user in providing press inputs of proper durations, e.g., short presses and long/held presses.

In some embodiments, changing the magnitude of the respective deformation of the one or more deformations includes, while detecting the first press input directed to the first hardware input device (e.g., in accordance with the determination that the set of one or more inputs includes the first press input directed to the first hardware input device and a determination that the first press input has not ended (e.g., been released/lifted)), detecting a change in an intensity of the first press input (e.g., as described with respect to FIGS. 6F-6I and/or 16D). In some embodiments, changing the magnitude of the respective deformation of the one or more deformations includes, in response to detecting the change in the intensity of the first press input, changing (e.g., increasing or decreasing) the magnitude of the first deformation at the first region based on the change in the intensity of the first press input (e.g., as described with respect to FIGS. 6F-6I and/or 16D). In some embodiments, the magnitude of the deformation increases as the magnitude of the intensity of the first press input increases. In some embodiments, the magnitude of the deformation decreases as the magnitude of the intensity of the first press input decreases. For example, the first deformation grows or expands until the intensity of the first press reaches an upper intensity threshold (e.g., a hard/full press threshold) and/or shrinks/contracts until the intensity of the first press falls below a lower intensity threshold (e.g., a maintenance press threshold) and/or the first press ends. In some embodiments, changing the magnitude of the respective deformation of the one or more deformations includes, while detecting the second press input directed to the second hardware input device (e.g., in accordance with the determination that the set of one or more inputs includes the second press input directed to the first hardware input device and a determination that the second press input has not ended (e.g., been released/lifted)), the computer system detects a change in an intensity of the second press input; and in response to detecting the change in the intensity of the second press input, the computer system changes the magnitude of the second deformation at the second region based on the change in the intensity of the second press input. Changing the amount by which a portion of a displayed user interface near a particular hardware input device (e.g., button) is deformed based on the detected intensity of a press input directed to the particular input device provides users with improved visual feedback about a state of the computer system without cluttering the display, which assists the user with control of the computer system via the various input devices. For example, changing the magnitude of the deformation assists a user in providing press inputs of proper intensities, e.g., light/partial presses and hard/full presses.

In some embodiments, while displaying the user interface with the one or more deformations (e.g., as illustrated in FIGS. 6F-6I, 16B-16D, 16F-16H, 16J, 16L-16M, 16Q, and/or 16S), the computer system detects an end (e.g., a release and/or lift-off) of the set of one or more inputs (e.g., as illustrated in FIGS. 16E, 16H, 16K, and/or 16R). In some embodiments, in response to detecting the end of the set of one or more inputs, the computer system displays the user interface without the one or more deformations (e.g., as illustrated in FIGS. 16E, 16I, 16K, and/or 16R). In some embodiments, while displaying the user interface without the one or more deformations, the computer system detects, via one or more of the plurality of input devices, a second set of one or more inputs (e.g., a press input and/or a movement input). In some embodiments, in response to detecting the second set of one or more inputs, displaying, via the one or more display generation components, the user interface with one or more additional deformations (e.g., as described with respect to FIGS. 16L and/or 16S) (e.g., repeatedly deforming the user interface in response to repeated presses), wherein displaying the user interface with the one or more additional deformations includes, in accordance with a determination that the set of one or more inputs includes a first additional press input directed to the first hardware input device (in some embodiments, the press input is a press input directed to the first input device), displaying the user interface with a first additional deformation at the first region, and in accordance with a determination that the set of one or more inputs includes a second additional press input directed to the second hardware input device (in some embodiments, the press input is a press input directed to the second input device), displaying the user interface with a second additional deformation at the second region. In some embodiments, the first additional deformation changes the size, shape, and/or arrangement of the user interface in the same manner as the first deformation and/or in a different manner than the first deformation. In some embodiments, the second additional deformation changes the size, shape, and/or arrangement of the user interface in the same manner as the second deformation and/or in a different manner than the second deformation. Repeatedly deforming and restoring the appearance of the user interface in response to repeated press inputs provides users with improved visual feedback about a state of the computer system without cluttering the display, which assists the user with control of the computer system via the various input devices.

In some embodiments, the user interface includes a set of one or more user interface elements including a first user interface element (e.g., 1600A, 1600B, and/or 1630A) displayed at the first region (e.g., on the display near the location of the first hardware input device). In some embodiments, the first user interface element corresponds to (e.g., represents and/or provides a control for) a function associated with the first hardware input device (e.g., the first user interface element includes one or more software buttons, indicators, icons, and/or other user interface objects associated with a function that can be performed using an input via the first hardware input device). In some embodiments, the set of one or more user interface elements includes a second user interface element (e.g., one or more user interface objects) displayed at the second region (e.g., on the display near the location of the second hardware input device). In some embodiments, displaying the user interface with the first deformation at the first region includes changing a location of the first user interface element (e.g., as illustrated in FIGS. 16G-16L and/or 16P-16S). In some embodiments, the computer system changes the location of the first user interface element while changing the magnitude of the first deformation, for example, increasing the magnitude of the first deformation by moving the first user interface element farther away from the location of the first hardware input device and decreasing the magnitude of the first deformation by moving the first user interface element closer to the location of the first hardware input device. For example, for a user interface element displayed when the first press input is detected, in response to detecting the first press input, the computer system displays the user interface element moving away from the location of the first hardware input device. For example, for a user interface element displayed (e.g., initially displayed) in response to detecting the first press input, in response to detecting a change in the intensity and/or an end of the first press input, the computer system displays the user interface element moving back towards the location of the first hardware input device. In some embodiments, displaying the user interface with the second deformation at the first region includes changing a location of the second user interface element. In some embodiments, moving a user interface element as part of displaying a deformation in response to a press detected by a hardware input device located on a first side of the display generation component (e.g., first button 602A and/or second button 602B) includes moving the user interface element in a first direction (e.g., to the left, as illustrated in FIGS. 16P-16S). In some embodiments, moving a user interface element as part of displaying a deformation in response to a press detected by a hardware input device located on a second side of the display generation component different from the first side (e.g., third button 602C and/or fourth button 602D) includes moving the user interface element in a second direction different from the first direction (e.g., to the right, as illustrated in FIG. 16L). Deforming a displayed user interface by moving a user interface element near a particular hardware input device (e.g., button) in response to a press input directed to the particular input device provides users with improved visual feedback about a state of the computer system without cluttering the display, which assists the user with control of the computer system via the various input devices. For example, moving the user interface element near the hardware input device draws the user's attention to information or controls associated with the detected press input.

In some embodiments, the first user interface element includes a visual representation (e.g., one or more software buttons, indicators, icons, and/or other user interface objects) of a custom operation associated with (e.g., currently associated with) the first hardware input device (e.g., 1600A) (in some embodiments, the first hardware input device is a customizable button). For example, the custom operation is an operation selected from a plurality of operations that can be associated with the first hardware input device, e.g., as described with respect to FIGS. 10C-10D and 11. In some embodiments, the method further comprises, in response to the first press input, initiating a process for performing the custom operation associated with the first hardware input device. For example, the process for performing the respective operation associated with the first hardware input device includes displaying an expanded control for the custom operation, e.g., as described with respect to FIGS. 6L-6S, 6X, 6Z, 6AE-6AM, 10G, 10J, 10N-10O, 10R, 10U, and/or 14A-14Z. For example, the process for performing the respective operation associated with the first hardware input device includes controlling the operation, for instance, changing a settings value by cycling through available values in response to repeated press inputs.

In some embodiments, the first user interface element includes a volume indicator element (e.g., 1600B). In some embodiments, the first hardware input device is a volume control button, e.g., a volume up or volume down button. In some embodiments, the method further comprises, in response to the first press input, initiating a process for changing a volume setting for an audio output of the computer system (e.g., using one or more audio output devices in communication with the computer system, such as speakers, headsets, and/or headphones), e.g., a ringer volume, an alarm volume, an audio communication volume, and/or a media playback volume.

In some embodiments, the computer system receives a request to perform a secure operation (e.g., as described with respect to FIG. 16P). In some embodiments, the requested operation is a secure operation, such as logging into an account, using a digital ticket or identification, controlling home security, making a purchase, providing identification information (e.g., a virtual ID such as a passport or driver's license), and/or making a payment. In some embodiments, receiving the request and/or performing the operation include communicating via a short-range device (e.g., a transmitter or antenna), such as via a Bluetooth, Wi-Fi, near-field communication (NFC), Zigbee, or other wireless or wired communication network. In some embodiments, in response to receiving the request to perform the operation, the computer system displays (e.g., initially displays), via the one or more display generation components, the first user interface element (e.g., 1630A), wherein the first user interface element includes a confirmation element for the secure operation. In some embodiments, the method further comprises, in response to detecting, via the first hardware input device, a respective type of input, wherein the respective type of input includes the first press input, initiating performance of the operation. For example, the respective type of input is a double press of the first hardware input device, another type of compound press (e.g., triple press, quadruple press, and/or other multiple press), a hard/full press, and/or a light/partial press. In some embodiments, the confirmation element includes an indication of the respective type of input (e.g., a description of an input used to confirm performance of the operation via the first hardware input device).

In some embodiments, displaying the user interface with the one or more deformations includes, in accordance with a determination that the first press input (e.g., 1622A) directed to the first hardware input device (e.g., 602D) and the second press input (e.g., 1622A) directed to the second hardware input device (e.g., 602B) are concurrently detected (e.g., the first press input and second press input at least partially overlap in time), displaying the user interface with both the first deformation at the first region and the second deformation at the second region (e.g., as illustrated in FIG. 16M) (e.g., concurrently deforming the first region and the second region of the user interface). In some embodiments, the first deformation and the second deformation are concurrently displayed with different appearances based on different characteristics of the respective first press input and second press input, different characteristics the respective first hardware input device and second hardware input device, different user interface elements displayed at or near the respective first region and second region, and/or other features. For example, if the first press input is detected before the second press input is detected, such that the duration of the first press input is longer than the duration of the second press input when the inputs are concurrently detected, the first deformation is displayed extending further into the user interface than the second deformation (e.g., at least when the second deformation is initially displayed). For example, if the first hardware input device is shorter than the second hardware input device (e.g., measured along the edge of the display generation component), the second deformation is displayed with a greater length than the first distortion (e.g., corresponding to the relative length of the hardware input devices). Concurrently deforming multiple portions of a displayed user interface in response to concurrent press inputs on different hardware input devices (e.g., different buttons) provides users with improved visual feedback about a state of the computer system without cluttering the display, which assists the user with control of the computer system via the various input devices. For example, deforming the displayed user interface near two or more different hardware input devices assists users with providing compound inputs and/or controlling multiple different operations associated with the multiple buttons.

In some embodiments, while displaying the user interface with the first deformation at the first region (e.g., in accordance with the determination that the set of one or more inputs includes the first press input directed to the first hardware input device and a determination that the first press input has not ended (e.g., been released/lifted)), in accordance with a determination that the set of one or more inputs does not include a respective press input directed to the second hardware input device, the computer system foregoes displaying the user interface with a respective deformation at the second region (e.g., as illustrated in FIGS. 6F-6I, 16B-16D, 16F-16H, 16J, 16L, 16Q, and/or 16S). For example, if the first hardware input device is pressed without pressing any of the other hardware input devices, the user interface is only deformed at the first region and not at regions near the other hardware input devices. Deforming the user interface near the hardware input device where a press input is detected while foregoing deforming the user interface near hardware input devices where a press input is not detected provides users with improved visual feedback about a state of the computer system without cluttering the display, which assists the user with control of the computer system via the various input devices.

In some embodiments, while displaying the user interface with the second deformation at the second region (e.g., in accordance with the determination that the set of one or more inputs includes the second press input directed to the second hardware input device and a determination that the second press input has not ended (e.g., been released/lifted)), in accordance with a determination that the set of one or more inputs does not include a respective press input directed to the first hardware input device, the computer system foregoes displaying the user interface with a respective deformation at the first region (e.g., as illustrated in FIGS. 6F-6I, 16B-16D, 16F-16H, 16J, 16L, 16Q, and/or 16S). For example, if the second hardware input device is pressed without pressing any of the other hardware input devices, the user interface is only deformed at the second region and not at regions near the other hardware input devices.

In some embodiments, the one or more input devices include a customizable hardware input device (e.g., 602A and/or 602C) (e.g., a user-customizable button, as described with respect to FIGS. 10A-10W and 11). In some embodiments, the customizable hardware input device is the first hardware input device. In some embodiments, the customizable hardware input device is the second hardware input device. In some embodiments, in response to detecting the set of one or more inputs and in accordance with a determination that set of one or more inputs includes a respective press input directed to the customizable hardware input device, the computer system displays the user interface with a respective deformation at a respective region (e.g., 1616), wherein the respective region corresponds to a location of the customizable hardware input device. In some embodiments, the respective deformation is the first deformation at the first region. In some embodiments, the respective deformation is the second deformation at the second region. In some embodiments, in response to detecting the set of one or more inputs and in accordance with a determination that the respective press input directed to the customizable hardware input device satisfies a set of action criteria, the computer system initiates a process for performing a custom operation associated with the customizable hardware input device (e.g., as described with respect to FIGS. 10A-11 and/or 16F-16I). In some embodiments, the set of action criteria include a criterion satisfied when the custom operation is associated with the hardware input device when the respective press input is detected. For example, the custom operation is an operation selected from a plurality of operations that can be associated with a hardware input device, e.g., as described with respect to FIGS. 10C-10D and 11. In some embodiments, the set of action criteria include a criterion satisfied when the respective press input has certain characteristics, e.g., the press input includes a light/partial press, a hard/full press, a short press, a long press, and/or another specific type of input (e.g., a movement of a particular type). For example, the process for performing the respective operation associated with the customizable hardware input device includes displaying an expanded control for the custom operation, e.g., as described with respect to FIGS. 6L-6S, 6X, 6Z, 6AE-6AM, 10G, 10J, 10N-10O, 10R, 10U, and/or 14A-14Z. For example, the process for performing the respective operation associated with the customizable hardware input device includes controlling the operation, for instance, changing a settings value by cycling through available values in response to repeated press inputs. Deforming a portion of a displayed user interface near a hardware button used for a particular operation in response to a press input of the hardware button provides users with improved visual feedback ab out a state of the computer system without cluttering the display, which assists the user with control of the particular operation via the hardware input device.

In some embodiments, the one or more input devices include one or more hardware volume control devices (e.g., 602D) (e.g., one or more volume buttons, such as a volume up button and/or a volume down button; in some embodiments, the one or more volume control devices include the first hardware input device and/or the second hardware input device.). In some embodiments, in response to detecting the set of one or more inputs and in accordance with a determination that set of one or more inputs includes a respective press input directed to the one or more volume control devices, the computer system displays the user interface with a respective deformation at a respective region (e.g., 1616 and/or 1620), wherein the respective region corresponds to a location of the one or more volume control devices (e.g., as illustrated in FIGS. 16J and/or 16L). In some embodiments, the respective deformation is the first deformation at the first region. In some embodiments, the respective deformation is the second deformation at the second region. In some embodiments, if the press input is a press of the volume up button, the user interface is deformed near the volume up button, and if the press input is a press of the volume up button, the user interface is deformed near the volume down button.

In some embodiments, in response to detecting the set of one or more inputs and in accordance with a determination that the respective press input directed to the one or more volume control devices satisfies a set of volume increase criteria, the computer system increases a volume setting for an audio output (e.g., as described with respect to FIGS. 16J-16K) (e.g., an audio output provided using one or more audio output devices in communication with the computer system, such as speakers, headsets, and/or headphones, such as a ringer volume, an alarm volume, an audio communication volume, and/or a media playback volume). In some embodiments, the volume increase criteria include a criterion satisfied when the respective press input is directed to a volume up button of the volume control device. In some embodiments, the volume increase criteria include a criterion satisfied when the respective press input is accompanied by a movement input in a particular direction (e.g., up). In some embodiments, in response to detecting the set of one or more inputs and in accordance with a determination that the respective press input directed to the one or more volume control devices satisfies a set of volume decrease criteria, the computer system decreases a volume setting for the audio output (e.g., as described with respect to FIG. 16L). In some embodiments, the volume decrease criteria include a criterion satisfied when the respective press input is directed to a volume down button of the volume control device. In some embodiments, the volume decrease criteria include a criterion satisfied when the respective press input is accompanied by a movement input in a different direction (e.g., down). In some embodiments, the volume increase criteria and volume decrease criteria are mutually exclusive. Deforming a portion of a displayed user interface near a hardware button used for a volume control in response to a press input of the hardware button provides users with improved visual feedback about a state of the computer system without cluttering the display, which assists the user with volume control via the hardware input device.

In some embodiments, the one or more input devices include a hardware power control device (e.g., 602B and/or 602D) (e.g., a power button; in some embodiments, the power button is the first hardware input device; in some embodiments, the power button is the second hardware input device.). In some embodiments, in response to detecting the set of one or more inputs and in accordance with a determination that set of one or more inputs includes a respective press input directed to the hardware power control device, the computer system displays the user interface with a respective deformation at a respective region (e.g., 1624A and/or 1624B), wherein the respective region corresponds to a location of the hardware power control device (e.g., as illustrated in FIG. 16M). In some embodiments, the respective deformation is the first deformation at the first region. In some embodiments, the respective deformation is the second deformation at the second region. In some embodiments, in response to detecting the set of one or more inputs and in accordance with a determination that the respective press input directed to the hardware power control device satisfies a set of power criteria, the computer system initiates a process for changing a power state of the computer system (e.g., as illustrated in FIG. 16N) (e.g., placing the computer system in a standby or off state). In some embodiments, the set of power criteria include a criterion satisfied when the set of one or more inputs includes a press input directed to another hardware input device concurrent with the respective press input. In some embodiments, the set of power criteria include a criterion satisfied when the set of one or more inputs exceeds a threshold duration (e.g., 0.25 s, 0.5 s, 1 s, 1.5 s, 3 s, 5 s, 10 s, 20 s, or 30 s). In some embodiments, initiating the process for changing the power state of the computer system includes displaying a power state user interface, for instance, including software controls for confirming changing the power state. Deforming a portion of a displayed user interface near a hardware button used for device power control in response to a press input of the hardware button provides users with improved visual feedback about a state of the computer system without cluttering the display, which assists the user with power control via the hardware input device.

In some embodiments, the one or more input devices include a hardware input device associated with a digital assistant system (e.g., 602B) (in some embodiments, the hardware input device is the first hardware input device; in some embodiments, the hardware input device is the second hardware input device.). In some embodiments, in response to detecting the set of one or more inputs and in accordance with a determination that set of one or more inputs includes a respective press input directed to the hardware input device associated with the digital assistant system, the computer system displays the user interface with a respective deformation at a respective region (e.g., 1604), wherein the respective region corresponds to a location of the hardware input device associated with the digital assistant system (e.g., as illustrated in FIGS. 6B-6D). In some embodiments, the respective deformation is the first deformation at the first region. In some embodiments, the respective deformation is the second deformation at the second region. In some embodiments, in accordance with a determination that the respective press input directed to the hardware input device associated with the digital assistant system satisfies a set of digital assistant criteria, the computer system initiates a digital assistant session using the digital assistant system (e.g., as illustrated in FIG. 6E) (e.g., invoking a digital assistant and/or causing performance of a task using a digital assistant). In some embodiments, the set of digital assistant criteria include a criterion satisfied when the set of one or more inputs does not include a press input directed to another hardware input device concurrent with the respective press input. In some embodiments, the set of digital assistant criteria include a criterion satisfied when the respective press input exceeds a threshold duration (e.g., 0.25, 0.5 s, 1 s, 1.5 s, 3 s, 5 s, or 10 s). In some embodiments, initiating the digital assistant session using the digital assistant system includes displaying a digital assistant user interface. In some embodiments, displaying the digital assistant user interface includes displaying a visual effect and/or an animated visual effect (e.g., a shimmer effect, a sparkle effect, an edge glow effect, an animated border and/or icon, and/or another graphical element associated with the digital assistant) that is displayed at or near the respective region and, optionally, around some or all of the border of the display region (e.g., as illustrated in FIG. 16E). In some embodiments, the visual effect is displayed simultaneously with the respective deformation. In some embodiments, the respective deformation is removed/reversed while displaying the visual effect. Deforming a portion of a displayed user interface near a hardware button associated with a digital assistant in response to a press input of the hardware button provides users with improved visual feedback about a state of the computer system without cluttering the display, which assists the user with invoking and/or controlling the digital assistant via the hardware input device.

In some embodiments, while displaying the user interface with the one or more deformations (e.g., as illustrated in FIGS. 6F-6I, 16B-16D, 16F-16H, 16J, 16L-16M, 16Q, and/or 16S) (e.g., while detecting the set of one or more inputs), the computer system captures a screenshot of the user interface (e.g., 1628A), wherein the screenshot of the user interface does not include the one or more deformations (e.g., as illustrated in FIG. 16O). For example, when displaying the screenshot of the user interface, the representation of the user interface is displayed without the one or more deformations (e.g., the user interface in the screen shot appears as it did just prior to detecting the inputs that caused the screenshot to be captured). In some embodiments, capturing the screenshot of the user interface is performed in response to detecting one or more press inputs directed to one or more hardware input devices. Capturing a screenshot of the user interface without including the one or more deformations provides users with improved visual feedback about a state of the computer system without negatively impacting the results of operations performed while displaying the deformations, such as screen capture operations.

In some embodiments, the one or more input devices include a hardware input device associated with a media capture user interface (e.g., 602A) (in some embodiments, the hardware input device is the first hardware input device; in some embodiments, the hardware input device is the second hardware input device.). In some embodiments, in response to detecting the set of one or more inputs and in accordance with a determination that set of one or more inputs includes a respective press input directed to the hardware input device associated with the media capture user interface, the computer system displays the user interface with a respective deformation at a respective region (e.g., as illustrated in FIGS. 6F-6I), wherein the respective region corresponds to a location of the hardware input device associated with the media capture user interface. In some embodiments, the respective deformation is the first deformation at the first region. In some embodiments, the respective deformation is the second deformation at the second region. In some embodiments, in response to detecting the set of one or more inputs and in accordance with a determination that the respective press input directed to the hardware input device associated with the media capture user interface satisfies a set of media capture criteria, the computer system initiates a process for performing a media capture operation. For example, the media capture operation includes performing a media capture, initiating a media capture, stopping a media capture, and/or changing a setting for media capture, e.g., as described with respect to FIGS. 6A-7, 10A-11, and/or 14A-15. For example, the media capture criteria include the input criteria described above with respect to FIGS. 6A-7, 10A-11, and/or 14A-15. Deforming a portion of a displayed user interface near a hardware button used for media capture operations in response to a press input of the hardware button provides users with improved visual feedback about a state of the computer system without cluttering the display, which assists the user with media capture via the hardware input device.

In some embodiments, displaying the user interface with the one or more deformations (e.g., as illustrated in FIGS. 6F-6I, 16B-16D, 16F-16H, 16J, 16L-16M, 16Q, and/or 16S) includes displaying the user interface with a respective deformation at a respective region, and in accordance with a determination that a visual characteristic (e.g., brightness, hue, saturation, and/or contrast, e.g., with respect to the respective deformation) of a portion of the user interface corresponding to the respective region (e.g., a portion near, adjacent to, overlapping with, and/or within the distorted respective region) satisfies a set of one or more appearance criteria, displaying at least a respective portion of a border (e.g., some or all of the border) of the respective deformation (e.g., a border surrounding at least a portion of the respective deformation) with a first appearance (e.g., as described with respect to FIG. 10U1 and/or 16D1). For example, the set of one or more appearance criteria includes a criterion that is satisfied when a brightness characteristic of the portion of the user interface corresponding to the respective region is lower than a threshold brightness level (e.g., the user interface is darker than 25%, 45%, 50%, and/or 75% gray). For example, displaying the border of the respective deformation includes displaying a keyline around at least part of the deformation, such as a portion of the deformation that opaquely overlays the user interface (e.g., the cut-out or control platter). In some embodiments, displaying the border of the respective deformation with the first appearance includes displaying the border with a particular color, luminosity, and/or line weight. For example, the color is a preselected color (e.g., displaying the deformation with a white line border against a dark background) or a color selected based on the visual characteristic of the portion of the user interface (e.g., displaying the deformation with a line border in a color selected to contrast with the dark background). In some embodiments, displaying the user interface with the one or more deformations includes, in accordance with a determination that the visual characteristic of a portion of the user interface corresponding to the respective region does not satisfy set of one or more appearance criteria, foregoing displaying the respective portion of the border of the respective deformation with the first appearance (e.g., as described with respect to FIGS. 10U and/or 16D). In some embodiments, the computer system foregoes displaying the border, e.g., only displaying a border around the deformation when the background is sufficiently dark. In some embodiments, the computer system displays the border with a different appearance from the first appearance, for example, changing the color, luminosity, and/or line weight of the border based on the visual characteristic of the portion of the user interface (e.g., displaying the deformation with a line border that contrasts with the background). Outlining a portion of a deformation displayed in response to a press input directed to an input device based on visual characteristics of the user interface near the deformation provides users with improved visual feedback about a state of the computer system without cluttering the display. Doing so also assists the user with control of the computer system via the various input devices by helping the user to provide proper inputs and reduce user mistakes while interacting with the various input devices, which makes the computer system more efficient, e.g., reducing power usage and/or improving battery life of the system. For example, displaying a border around the deformation if the surrounding user interface is dark improves the visual prominence of the deformation, informing the user that the computer system has detected a press input via a particular hardware input device even if the contrast between the deformation and the surrounding user interface is low.

Note that details of the processes described above with respect to method 1700 (e.g., FIG. 17) are also applicable in an analogous manner to the methods described above. For example, displaying deformations to a user interface in response to hardware inputs as described with respect to method 1700 can be performed when controlling functions based on variable characteristics of hardware inputs described with respect to method 700, when capturing media using hardware inputs as described with respect to method 900, when controlling selected customizable functions using hardware inputs as described with respect to method 1100, when controlling media playback as described with respect to method 1300, and/or when adjusting settings using hardware inputs as described with respect to method 1500. For brevity, these details are not repeated.

FIGS. 18A-18T illustrate exemplary techniques and systems for controlling media capture using a computer system with multiple cameras, in accordance with some embodiments. The user interfaces in these figures are used to illustrate the processes described below.

At FIG. 18A, computer system 600 displays settings control 622 for a camera selection setting of camera user interface 612. As described herein, the camera selection setting of camera user interface 612 configures which of first camera 604A, second camera 604B, third camera 604C, and/or fourth camera 604D are used when capturing media in camera user interface 612 (e.g., in response to a hard/full press of first button 602A and/or an input directed to shutter affordance 612C on a touch-sensitive surface of display 606). As illustrated in FIGS. 18A-18I and described in more detail below, settings control 622 for the camera selection setting includes menu items corresponding to each of first camera 604A, second camera 604B, third camera 604C, and fourth camera 604D, as well as a menu item corresponding to a simulated lens.

In some embodiments, computer system 600 displays settings control 622 for the camera selection setting of camera user interface 612 in response to a light/partial press of first button 602A and/or a full swipe of first button 602A (e.g., as described with respect to FIGS. 6E-6J, illustrating displaying settings control 622 for the zoom setting of camera user interface 612). In some embodiments, computer system displays settings control 622 for the camera selection setting in accordance with a determination that the camera selection setting has been associated with first button 602A via customization menu 1006 (e.g., as described with respect to FIGS. 10D-10E and further with respect to FIGS. 18L-18M). In some embodiments, while displaying settings control 622 for the camera selection setting, computer system 600 displays camera user interface 612 in a "quiet" or "ready to capture" mode (e.g., as illustrated in FIGS. 18A-18I and/or as described with respect to FIGS. 6I-6J). In some embodiments, while displaying settings control 622 for the camera selection setting, computer system 600 displays camera user interface 612 in a default state (e.g., as described with respect to FIG. 6E).

At FIG. 18A, settings control 622 for the camera selection setting indicates that camera user interface 612 is currently configured to capture media using third camera 604C. In particular, a menu item with text reading "1×," corresponding to a native zoom level of third camera 604C (e.g., a camera with a 24 mm focal length), is centered within settings control 622. For example, third camera 604C is a fixed-focal length camera (e.g., a camera with a fixed-focal length lens) that captures at an optical magnification of 1×. While third camera 604C is selected, the field-of-view of the environment represented in camera preview 614 includes and/or approximates the field-of-view of third camera 604C. For example, computer system 600 captures representations of the environment using one or more of first camera 604A, second camera 604B, and third camera 604C (e.g., the forward cameras), digitally cropping, scaling, and/or combining the representations as needed to approximate capture using third camera 604C (e.g., exclusively). Accordingly, at FIG. 18A, the field-of-view of the environment represented in camera preview 614 is displayed at 1× magnification.

While third camera 604C is selected, in response to an input via shutter affordance 612C and/or first button 602A requesting to capture media (e.g., as described with respect to FIGS. 6U-6V, 6Y-6AD, and 8A-8P), computer system 600 captures media (e.g., photo and/or video media) primarily using third camera 604C (e.g., exclusively and/or in combination with one or more other cameras). In the following description, references to capturing media "primarily" using a particular camera indicate that computer system 600 captures media using the selected (e.g., "primary") camera and, optionally, one or more other cameras that face the same direction, for instance, digitally cropping, scaling, and/or combining the representations as needed to approximate capture using the primary camera exclusively. In some embodiments, a majority of the information (e.g., camera data) included in at least one frame of the media item is captured using the primary camera (e.g., the non-selected cameras are used to capture supplementary camera data that is combined with camera data from the primary camera to generate a media item).

At FIG. 18A, while displaying settings control 622 for the camera selection setting of camera user interface 612, computer system 600 detects a movement input, such as button input 1802A, where finger 608 swipes, drags, and/or flicks one or more times from left to right along the surface of first button 602A and/or touch input 1802B, one or more left-to-right swipe gestures (e.g., touches with movement) directed to settings control 622 on the touch-sensitive surface of display 606. Alternatively, touch input 1802B includes a tap directed to the menu item with text reading "0.5×."

At FIGS. 18B-18C, in response to button input 1802A and/or touch input 1802B, computer system 600 adjusts the camera selection setting of camera user interface to select first camera 604A based on the detected movement characteristics (e.g., of 1802A and/or 1802B). As illustrated in FIG. 18C, computer system 600 moves the menu item with text reading "0.5×," corresponding to a native zoom level of first camera 604A (e.g., a camera with a fixed-focal length (e.g., 13 mm), wide-angle lens), to the center of settings control 622 to indicate the new selection. As described with respect to FIGS. 6L-6S and/or 14A-14Z, the adjustment to first camera 604A is based on the direction and/or magnitude (e.g., distance traveled along the surface of first button 602A) of button input 1802A and/or touch input 1802B. For example, the direction and magnitude of button input 1802A and/or touch input 1802B correspond to moving settings control 622 (e.g., as though rotating a physical dial) to the right to drag the "0.5×" menu item to the center of settings control 622. As another example, in response to button movement 1804A and/or touch movement 1804B, left-to-right movements with greater magnitude (e.g., traveling a greater distance along first button 602A) than button input 1802A and/or touch input 1802B, computer system 600 adjusts the camera selection setting of camera user interface 612 further through the options displayed in settings control 622, for instance, changing the selection to fourth camera 604D (e.g., described with respect to FIGS. 18D-18E) from third camera 604C.

As described with respect to FIGS. 14A-14Z, in some embodiments, computer system 600 adjusts the camera selection setting based on movement near the end of the detected movement input (e.g., 1802A and/or 1802B), simulating a transfer of momentum from the movement input to settings control 622 and/or "snapping" to the next menu item when the detected movement input ends before the movement component slows and/or stops (e.g., when the movement input is a flick movement or a movement that travels off of the end of first button 602A). For example, as illustrated in FIG. 18B, finger 608 lifts off of first button 602A and/or the touch-sensitive surface of display 606 while moving the "0.5×" menu item to the right, but before the "0.5×" menu item has moved all the way to the center of settings control 622. In response, computer system 600 continues to adjust settings control 622 to move the "0.5×" menu item to the center (e.g., coasting and/or snapping to the selection of first camera 604A).

As illustrated in FIG. 18B-18C, while adjusting the camera selection setting from third camera 604C (e.g., the 1× fixed-focal length camera) to first camera 604A (e.g., the 0.5× fixed-focal length, wide-angle camera), computer system 600 animates camera preview 614 gradually transitioning from representing (e.g., including and/or approximating) the field-of-view of third camera 604C to representing (e.g., including and/or approximating) the field-of-view of first camera 604A. For example, computer system 600 digitally interpolates between the fields-of-view captured by the two cameras to animate a smooth zooming out, as though adjusting a variable focal length (e.g., zoom) lens from 1× magnification to 0.5× magnification instead of changing between fixed-focal length lenses. As illustrated in FIG. 18C, in some embodiments, computer system 600 continues to display settings control 622 for the camera selection setting for at least a threshold period of time after the end of the movement inputs (e.g., as described with respect to FIGS. 6N-6O), allowing the user to make further adjustments to the camera selection.

As illustrated in FIG. 18C, while first camera 604A is selected, the field-of-view of the environment represented in camera preview 614 includes and/or approximates the field-of-view of first camera 604A (e.g., a wide-angle view of the environment displayed at 0.5× magnification). While first camera 604A is selected, in response to an input shutter affordance 612C and/or first button 602A requesting to capture media (e.g., as described with respect to FIGS. 6U-6V, 6Y-6AD, and 8A-8P), computer system 600 captures media (e.g., photo and/or video media) primarily using first camera 604A (e.g., exclusively and/or in combination with one or more other cameras depending on an adjusted zoom setting).

At FIG. 18C, while displaying settings control 622 for the camera selection setting of camera user interface 612, computer system 600 detects a movement input, such as button input 1806A and/or touch input 1806B, both of which move in a left-to-right direction (e.g., the same direction as button movement 1802A and touch movement 1802B). Alternatively, touch input 1806B includes a tap directed to the menu item with a person icon.

Accordingly, in response to button input 1806A and/or touch input 1806B, computer system 600 adjusts the camera selection setting of camera user interface to select fourth camera 604D based on the detected movement characteristics (e.g., as described above). As illustrated in FIGS. 18D-18E, computer system 600 moves the menu items of settings control 622 further to the right to center a menu item with an icon representing fourth camera 604D. For example, the icon representing fourth camera 604D is person symbol, representing fourth camera 604D's rear (e.g., user-facing) orientation within computer system 600 (e.g., fourth camera 604D is a "selfie camera," as it faces the user while the user is facing display 606, allowing the user to monitor camera preview 614 while capturing self-portrait media).

As illustrated in FIGS. 18D-18E, because first camera 604A and fourth camera 604D are located on different sides of computer system 600, facing different directions (e.g., forward vs. rear), computer system 600 displays a different transition animation while adjusting the camera selection from first camera 604A to fourth camera 604D than the gradual zoom-out animation displayed while adjusting the camera selection from third camera 604C to first camera 604A (e.g., which are located on the same side of computer system 600 and face the same direction). In particular, as illustrated in FIG. 18D, computer system 600 temporarily obscures camera preview 614, for instance, graying out (e.g., or blacking out, whiting out, and/or otherwise opaquely overlaying) and/or blurring camera preview 614 to obscure the change between the field-of-view represented before detecting the input (e.g., a forward-facing view of the environment) and the field-of-view represented after detecting the input (e.g., a rear-facing view of the environment).

As illustrated in FIG. 18E, while fourth camera 604D is selected, the field-of-view of the environment represented in camera preview 614 includes at least a portion of the field-of-view of fourth camera 604D. In some embodiments, the field-of-view captured by fourth camera 604D is cropped and/or modified for display in camera preview 614. For example, fourth camera 604D is a wide-angle camera, and the representation of the field-of-view displayed at FIG. 18E digitally zooms in on, crops, and/or removes wide-angle distortion from the field-of-view as captured to provide an optimized tight selfie shot (e.g., a selfie including a single person or a few closely-gathered people). While fourth camera 604D is selected, in response to an input shutter affordance 612C and/or first button 602A requesting to capture media (e.g., as described with respect to FIGS. 6U-6V, 6Y-6AD, and 8A-8P), computer system 600 captures media (e.g., photo and/or video media) primarily using fourth camera 604D (e.g., including cropping and/or removing distortion from the capture provided by fourth camera 604D as done in camera preview 614).

At FIG. 18E, while displaying settings control 622 for the camera selection setting of camera user interface 612, computer system 600 detects a movement input, such as button input 1808A and/or touch input 1808B, both of which move in a right-to-left direction (e.g., opposite the previously-detected movement inputs). Accordingly, in response to button input 1808A and/or touch input 1808B, computer system 600 adjusts the camera selection setting back to third camera 604C based on the detected direction and magnitude of the movement (e.g., as described above). Alternatively, touch input 1808B includes a tap directed to the menu item with text reading "1×." As illustrated in FIGS. 18F-18G, computer system 600 moves the menu items of settings control 622 back to the left to center the "1×" menu item representing third camera 604C. As another example, in response to button input 1810A and/or touch input 1810B, right-to-left movements with lesser magnitude (e.g., traveling a shorter distance along first button 602A) than button input 1808A and/or touch input 1808B, computer system 600 adjusts the camera selection setting interface back to first camera 604A (e.g., the 0.5× wide-angle camera). Alternatively, touch input 1808B includes a tap directed to the menu item with text reading "0.5×." Accordingly, in response to different lengths of right-to-left swipes and/or multiple right-to-left swipes, system 600 adjusts back through the options displayed in settings control 622, for instance, changing the selection from fourth camera 604D to any one of the forward cameras and/or a simulated lens (e.g., as described with respect to FIG. 18H).

As illustrated in FIGS. 18F-18G, because fourth camera 604D is located on a different side of computer system 600 than the other camera options (e.g., 604A, 604B, and/or 604C), computer system 600 displays the transition animation that temporarily obscures camera preview 614 (e.g., as described with respect to FIGS. 18D-18E) while adjusting the camera selection from fourth camera 604D to third camera 604C (e.g., and/or to one of the other forward cameras or the simulated lens option). At FIG. 18G, while third camera 604C is selected, the field-of-view of the environment represented in camera preview 614 includes and/or approximates at least a portion of the field-of-view of third camera 604C (e.g., as described with respect to FIG. 18A).

At FIG. 18G, while displaying settings control 622 for the camera selection setting of camera user interface 612, computer system 600 detects a movement input, such as button input 1812A and/or touch input 1812B, both of which move in a right-to-left direction. Alternatively, touch input 1812B includes a tap directed to the menu item with text reading "2×." Accordingly, in response to button input 1812A and/or touch input 1812B, computer system 600 adjusts the camera selection setting to select a simulated lens, represented in settings control 622 by the icon with the text "2×."

The simulated lens provides a magnification level for camera user interface 612 that does not correspond to a native zoom level of any of the fixed-focal length (e.g., 604A, 604B, 604C, and/or 604D). As illustrated in FIG. 18H, while the simulated lens is selected, camera preview 614 displays a representation of the field-of-view of the environment at 2× magnification, which falls between the 1× native zoom level of third camera 604C and the 5× native zoom level of second camera 604B (e.g., the next-highest optical magnification). In some embodiments, computer system 600 simulates a field-of-view of a 2× prime lens in camera preview 614 by digitally magnifying the field-of-view of one or more of the lower-magnification fixed-focal length cameras (e.g., 604A and/or 604C) and/or by interpolating between the fields-of-view of second camera 604B (e.g., the higher-magnification fixed-focal length camera) and one or more of the lower-magnification fixed-focal length cameras. Similarly, while the simulated lens is selected, in response to an input via shutter affordance 612C and/or first button 602A requesting to capture media (e.g., as described with respect to FIGS. 6U-6V, 6Y-6AD, and 8A-8P), computer system 600 captures media (e.g., photo and/or video media) using one or more of the forward cameras (e.g., 604A, 604B, and/or 604C) to simulate capture using a 2× prime lens.

For example, simulating the 2× zoom level of the simulated lens and/or simulating capture using a 2× prime lens includes expanding (e.g., digitally expanding) (e.g., by unbinning (e.g., reversing pixel binning) and/or unbinning pixels that are binned and/or bent at the native resolution of at least one of the plurality of cameras) one or more frames captured by first camera 604A, second camera 604B, and/or third camera 604C at the cameras' respective native zoom levels (e.g., 0.5×, 1×, and 5×, respectively) and resolutions, then combining (e.g., binning the pixels) to generate a frame at the simulated 2× zoom level with a target resolution (e.g., a resolution the same as and/or similar to the native resolutions of first camera 604A, second camera 604B, and/or third camera 604C).

In some embodiments, because the simulated lens is simulated using one or more of the forward cameras (e.g., 604A, 604B, and/or 604C), computer system 600 displays a transition animation gradually changing the representation of the field-of-view in camera preview 614 (e.g., smoothly zooming in) when changing to the simulated lens from third camera 604C (e.g., and/or from any of the other forward cameras), as described with respect to FIGS. 18B-18C. Likewise, in some embodiments, computer system 600 displays a transition animation as described with respect to FIGS. 18D and 18F when changing from the simulated lens to fourth camera 604D (e.g., the rear camera).

At FIG. 18H, while displaying settings control 622 for the camera selection setting of camera user interface 612, computer system 600 detects a movement input, such as button input 1814A and/or touch input 1814B, both of which move in a right-to-left direction. Alternatively, touch input 1814B includes a tap directed to the menu item with text reading "5×." Accordingly, in response to button input 1814A and/or touch input 1814B, computer system 600 adjusts the camera selection setting to select second camera 604B based on the detected movement characteristics. As illustrated in FIG. 18I, computer system 600 moves the menu item with text reading "5×," corresponding to a native zoom level of second camera 604B (e.g., a camera with a fixed-focal length (e.g., 120 mm), telephoto lens), to the center of settings control 622 to indicate the new selection. In some embodiments, computer system 600 displays a transition animation gradually zooming in from 2× magnification to 5× magnification while changing the selection from the simulated lens to second camera 604B.

At FIG. 18I, computer system 600 detects an input requesting to capture media, such as button press input 1816A directed to first button 602A and/or touch input 1816B directed to shutter affordance 612C. For example, button press input 1816A is a short hard/full press for capturing photo media (e.g., as described with respect to FIGS. 6U-6V) or a long press (e.g., a long hard/full press) for initiating capturing video media (e.g., as described with respect to FIGS. 6Y-6AD). In response to the input requesting to capture media (e.g., 1816A and/or 1816B), computer system 600 captures media at a 5× optical magnification primarily using second camera 604B. In some embodiments, the media is captured using second camera 604B alone or in combination with one or more other cameras (e.g., which can be used to capture additional camera data and/or to provide additional inputs for media capture, such as stereoscopic depth information and/or light data). As illustrated in FIG. 18J, captured media icon 612D is updated to include a thumbnail of the media captured at the 5× optical magnification.

FIGS. 18J-18K illustrate inputs (e.g., 1818A, 1818B, 1818C, 1820A, 1820B, and/or 1820C) used to open customization menu 1006 for changing an operation associated with first button 602A (e.g., as described with respect to FIGS. 10A-10W) from the camera selection setting adjustment to another operation, such as a zoom setting adjustment, an exposure setting adjustment, a simulated depth-of-field setting adjustment, a focus setting adjustment, a filter setting adjustment, and/or a capture guidance setting adjustment. At FIG. 18J, computer system 600 detects the inputs (e.g., 1818A, 1818B, and/or 1818C) while settings control 622 is not (e.g., is no longer) displayed on display 606 and camera user interface 612 is displayed in a default mode (e.g., as described with respect to FIG. 6E). At FIG. 18K, computer system 600 detects the inputs (e.g., 1820A, 1820B, and/or 1820C) while settings control 622 is displayed and camera user interface 612 is displayed in the "quiet" or "ready-to-capture" mode. Accordingly, using the inputs described with respect to FIGS. 18J-18K, a user can access customization menu 1006 whether or not settings control 622 is displayed.

Touch input 1818A and touch input 1820A are gesture inputs including an inward movement from near first button 602A into display 606, for instance, as described with respect to input 1004 in FIGS. 10B-10C. In some embodiments, in response to detecting finger 608 contacting first button 602A for at least a threshold period of time without moving over a threshold amount and/or transitioning into a light/partial press, computer system 600 displays indicator 1822 near first button 602A, as illustrated in FIG. 18J, and/or near settings control 622, as illustrated in FIG. 18K. For example, indicator 1822 provides a hint of the motion that can be used to open customization menu 1006 (e.g., dragging indicator 1822 away from first button 602A to "pull" customization menu 1006 onto display 606 from first button 602A).

Button input 1818B and button input 1820B are movement inputs detected via first button 602A. In some embodiments, computer system 600 displays customization menu 1006 in response to movement inputs swiping across the full length and/or a majority of the length of first button 602A along the edge of display 606.

Button input 1818C and button input 1820C are multiple-press (e.g., combination) inputs detected via first button 602A. For example, computer system 600 displays customization menu 1006 in response to detecting a particular sequence of two or more presses with particular characteristics within a threshold period of time (e.g., 0.1 s, 0.25 s, 0.5 s, 1 s, or 3 s), where each press in the sequence is at least partially released (e.g., reduced in intensity and/or lifted) prior to detecting the next press in the sequence. For example, button input 1818C and/or button input 1820C are double-half press inputs, where computer system detects a press intensity exceeding a light/partial press threshold (e.g., activation pressure threshold $P_A$, activation depression threshold $T_A$, and/or another intensity threshold), then, within the threshold period of time, the detected intensity drops below a lower-intensity press threshold (e.g., maintenance pressure threshold $P_M$, maintenance depression threshold $T_M$, and/or another intensity threshold) before again the light/partial press threshold (e.g., or another intensity threshold) a second time. In some embodiments, button input 1818C and/or button input 1820C are double-full press inputs, for example, exceeding, dropping below, then exceeding a hard/full press threshold (e.g., hard-press pressure threshold $P_H$ and/or hard-press depression threshold $T_H$) within the threshold period of time. Other multiple-press input types include different numbers of presses and/or different combinations of press characteristics (e.g., light/partial followed by hard/full, short followed by long, and/or vis versa).

As illustrated in the upper panels of FIGS. 18J-18K, in some embodiments, computer system 600 displays indicator 1822 and/or updates the appearance of indicator 1822 based on the characteristics of press inputs detected by first button 602A (e.g., 1818C and/or 1820C). For example, computer system 600 moves indicator 1822 downward (e.g., further away from first button 604A) and/or upward (e.g., back towards first button 604A and/or settings control 622) by an amount and/or at a rate based on the amount and/or change in intensity detected by first button 602A (e.g., represented in the upper panels by the relative lengths of the arrows on first button 602A). For example, when detecting a double-press (and/or other multiple-press) input, such as described above with respect to button input 1818C and button input 1820C, computer system 600 animates indicator 1822 bouncing out and in with each of the presses and releases, allowing the user to visually monitor the combination of inputs detected by first button 602A.

In response to the inputs detected at FIGS. 18J and/or 18K, at FIG. 18L, computer system 600 displays customization menu 1006 for customizing an operation associated with first button 602A in camera user interface 612 (e.g., as described with respect to FIGS. 10B-10D). As illustrated in FIG. 18L, customization menu 1006 includes a menu item with an aperture icon corresponding to the camera selection setting in addition to menu items for the zoom setting, exposure setting, simulated depth-of-field setting, focus setting, filter setting, and/or capture guidance setting described with respect to FIGS. 10C-10D. In some embodiments, the menu item for the camera selection setting is also included in customization menu 1006 for another camera user interface or application, such as camera user interface 1044 (e.g., a user interface for a camera utility embedded in a social media application, as described with respect to FIGS. 10P-10W). For example, developers for third-party applications that use two or more of first camera 604A, second camera 604B, third camera 604C, and/or fourth camera 604D can define whether or not to include the camera selection setting in customization menu 1006 when customization menu 1006 is invoked within the third-party application.

At FIG. 18L, the menu item for the camera selection setting is visually emphasized (e.g., bolded) and displayed at the center of customization menu 1006 with a text label ("lens"), indicating that first button 602A is currently associated with the camera selection setting. While displaying customization menu 1006, computer system 600 detects a movement input, such as button input 1824A directed to first button 602A and/or touch input 1824B directed to customization menu 1006 on a touch-sensitive surface of display 606, both of which move in a left-to-right direction. Alternatively, button input 1824A includes one or more presses on first button 602A (e.g., repeated press inputs to cycle through the menu options of customization menu 1006). Alternatively, touch input 1824B includes a tap directed to a zoom setting menu item in customization menu 1006. At FIG. 18M, in response to button input 1824A and/or touch input 1824B (e.g., based on the movement characteristics and/or tap location), computer system 600 associates the zoom setting of camera user interface 612 with first button 602A (e.g., as described with respect to FIGS. 10C-10E).

As described above with respect to FIGS. 10C-10M, in response to movement and/or tap inputs with different characteristics (e.g., directions, magnitudes, numbers of presses, and/or locations) directed to first button 602A and/or customization menu 1006, computer system 600 changes the operation associated with first button 602A in camera user interface 612 from the camera selection to setting to other settings included in customization menu 1006, such as the exposure setting, simulated depth-of-field setting, focus setting, filter setting, and/or capture guidance setting described with respect to FIGS. 10C-10D.

At FIG. 18M, after associating the zoom setting of camera user interface 612 with first button 602A (e.g., as indicated by visually emphasizing and centering the corresponding menu item in customization menu 1006 and/or displaying the text "zoom"), computer system 600 detects input 1826 via the touch-sensitive surface of display 606. Input 1826 is a gesture moving outwards on display 606, swiping towards first button 602A over customization menu 1006. For example, the gesture of input 1826 is an inverse of the gestures of touch input 1818A and/or touch input 1818B (e.g., the gestures used to invoke customization menu 1006).

Figure 18N:
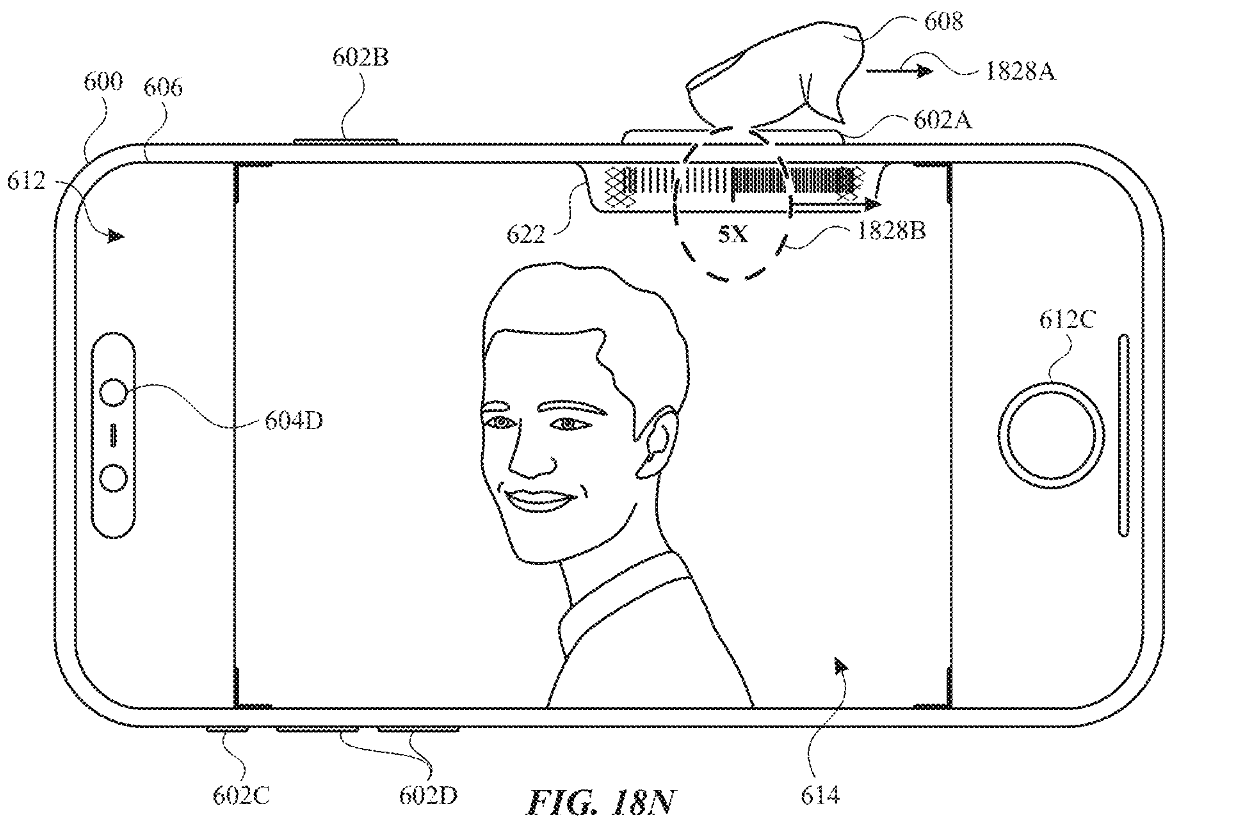
Figure 18O:
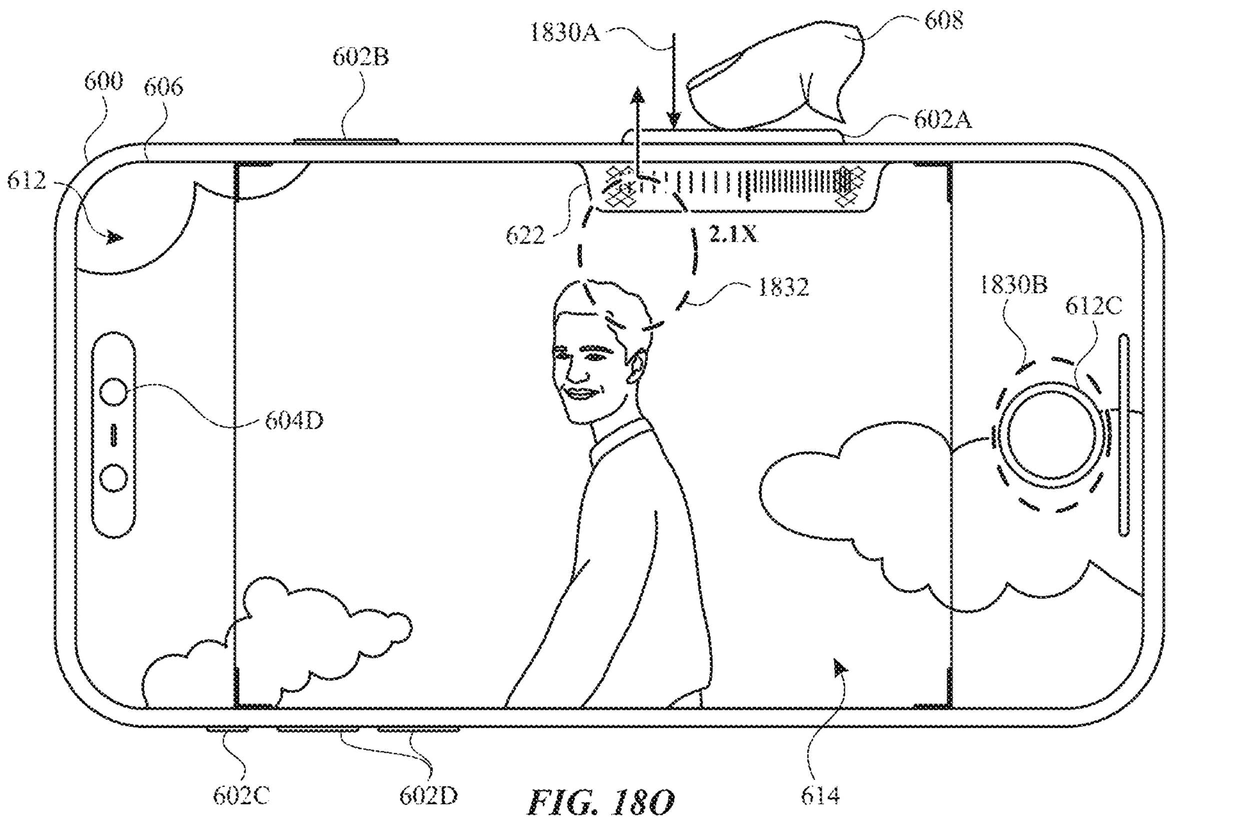
Figure 18P:
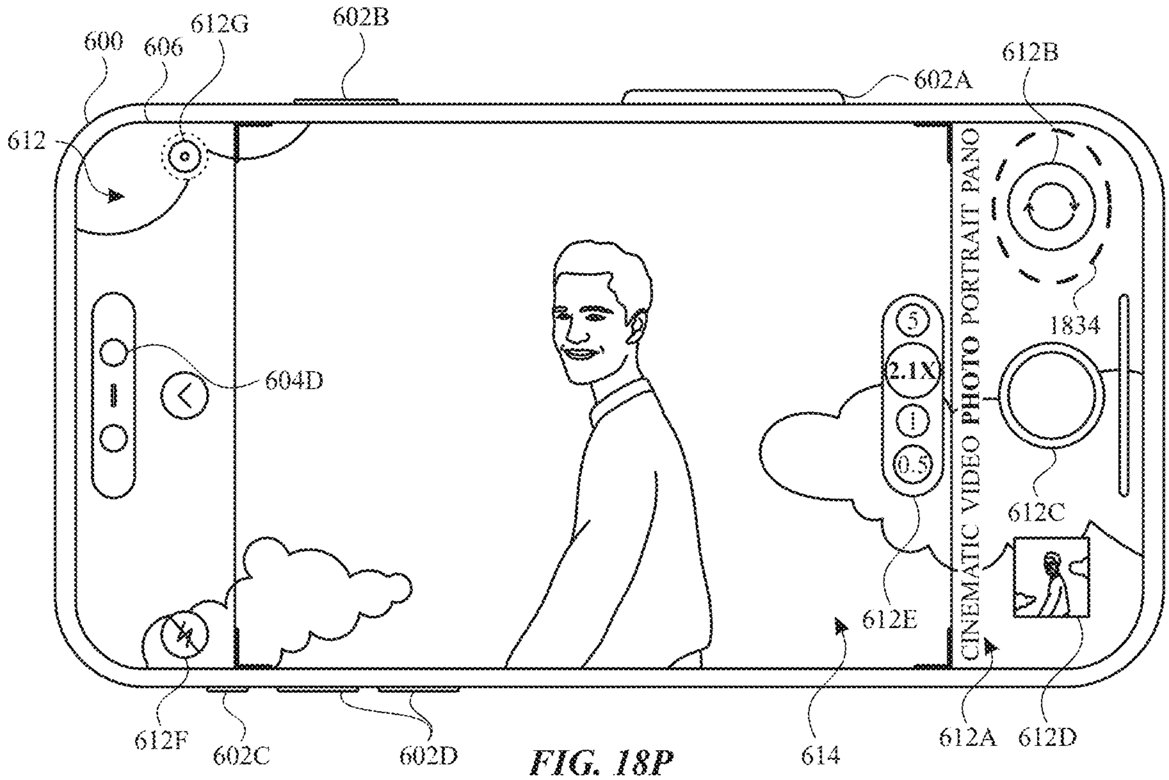

In response to detecting input 1826, at FIG. 18N, computer system 600 ceases displaying customization menu 1006 and instead displays settings control 622, now configured for the zoom setting of camera user interface 612. Alternatively, in some embodiments, computer system 600 ceases displaying customization menu 1006 and instead displays settings control 622 in response to button input 1824A and/or touch input 1824A, for instance, automatically replacing customization menu 1006 with settings control 622 when the operation controlled by settings control 622 is changed.

In some embodiments, computer system 600 ceases displaying customization menu 1006 without displaying settings control 622 in response to input 1826, and settings control 622 for the zoom setting of camera user interface 612 is displayed in response to a subsequent input (e.g., a light/partial press, long swipe, double press, and/or another type of input for invoking settings control 622, e.g., as described above with respect to FIGS. 6E-6J). In some embodiments, computer system 600 ceases displaying customization menu 1006 without displaying settings control 622 in response to another type of input (e.g., a tap directed to another element of camera user interface 612 and/or a portion of camera preview 614 outside of customization menu 1006) and/or after a threshold period of time (e.g., 0.1 s, 0.25 s, 0.5 s, 1 s, 3 s, or 5 s) without detecting further inputs directed to first button 602A and/or customization menu 1006.

As illustrated in FIG. 18N, because second camera 604B was selected (e.g., as described above) when settings control 622 for the zoom setting is initially displayed, the zoom setting for camera user interface 612 is set to 5× magnification, the native zoom level of second camera 604B. Likewise, after using the camera selection setting to select first camera 604A, third camera 604C, or the simulated lens, the zoom setting would be set to 0.5×, 1×, or 2× magnification, respectively.

At FIG. 18N, computer system 600 detects a movement input, such as button input 1828A and/or touch input 1828B, both of which move in a right-to-left direction. In response to button input 1828A and/or touch input 1828B, at FIG. 18O, computer system 600 adjusts the zoom setting to a 2.1× zoom level based on the magnitude, direction, and/or simulated momentum of the movements, as described with respect to FIGS. 6L-6S and/or 14A-14Z. As described with respect to FIGS. 14A-14Z, while adjusting the zoom setting via settings control 622, computer system 600 changes the zoom level between an ordered plurality of zoom levels (e.g., in 0.1× increments) that includes zoom levels falling in between and/or outside of the discrete magnifications (e.g., 0.5×, 1×, 2×, and 5×) provided via the camera selection setting. For example, settings control 622 adjusts the zoom level by 0.1× increments between 0.5× and 12.0×, using one or more of the forward cameras and/or digital zoom techniques to represent the environment at the selected zoom level. In some embodiments, while adjusting the zoom setting via settings control 622, computer system 600 gradually changes the magnification of the representation of the field-of-view of the environment included in camera preview 614, for instance, smoothly zooming in or out based on the movement input. In contrast to adjusting the camera selection setting as described above, computer system 600 does not switch between the forward cameras (e.g., 604A, 604B, and 604C) and the rear camera when adjusting the zoom setting via settings control 622.

At FIG. 18O, computer system 600 detects an input requesting to capture media, such as button press input 1830A directed to first button 602A and/or touch input 1830B directed to shutter affordance 612C. In response to the input requesting to capture media (e.g., 1830A and/or 1830B), computer system 600 captures media at a 2.1× digital magnification, for example, using one or more of the forward cameras (e.g., 604A, 604B, and 604C).

At FIG. 18O, while displaying settings control 622 for the zoom setting, computer system 600 detects input 1832 via the touch-sensitive surface of display 606, a gesture moving outwards on display 606, swiping towards first button 602A over settings control 622 (e.g., the same type of gesture as input 1026, the outward swipe over customization menu 1006). In response to input 1832, at FIG. 18P, computer system 600 ceases displaying settings control 622 and returns camera user interface 612 to the default appearance (e.g., as described with respect to FIGS. 6T-6U). Alternatively, computer system 600 ceases displaying settings control 622 and returns camera user interface 612 to the default appearance in response to another type of input (e.g., a tap directed to another element of camera user interface 612 and/or a portion of camera preview 614 outside of settings control 622) and/or after a threshold period of time (e.g., 0.1 s, 0.25 s, 0.5 s, 1 s, 3 s, or 5 s) without detecting further inputs directed to first button 602A and/or settings control 622.

At FIG. 18P, computer system 600 detects input 1834 directed to camera selection affordance 612B. In response, at FIG. 18Q, computer system 600 configures camera user interface 612 to capture media using fourth camera 604D (e.g., as described with respect to FIG. 18E), displaying a portion of the field-of-view of fourth camera 604D in camera preview 614. For example, as described with respect to FIG. 18E, the representation of the field-of-view displayed at FIG. 18P digitally zooms in on, crops, and/or removes wide-angle distortion from the field-of-view of fourth camera 604D to preview a tight selfie shot. In particular, at FIG. 18Q, camera preview 614 includes a partially zoomed-in representation of the field-of-view of fourth camera 604D with a tight crop that includes one person's face, but cuts off another.

Figure 18Q:
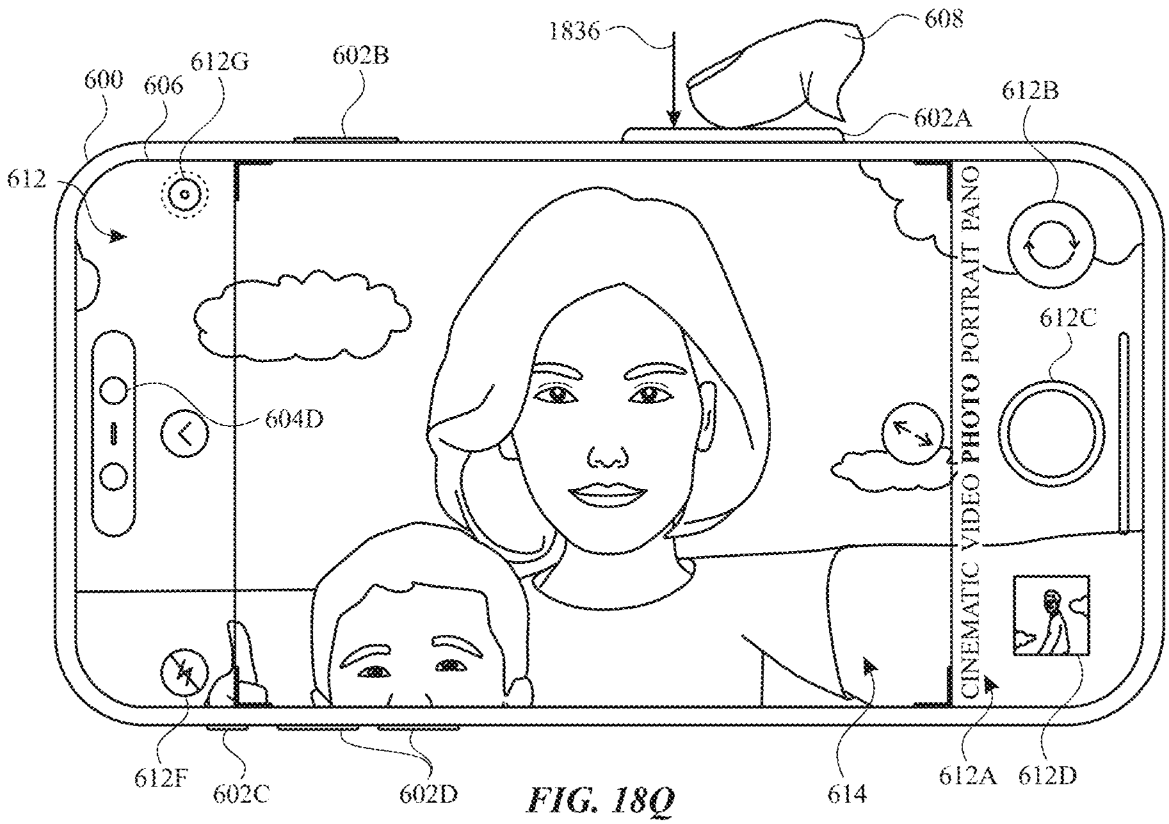

At FIG. 18Q, computer system 600 detects input 1836, a light/partial press of first button 602A (e.g., as described with respect to FIGS. 6E-6J). Because the zoom setting is associated with first button 602A (e.g., as described with respect to FIGS. 18L-18M), At FIG. 18R, in response to input 1836, computer system 600 displays settings control 622 for the zoom setting of camera user interface 612.

Figure 18R:
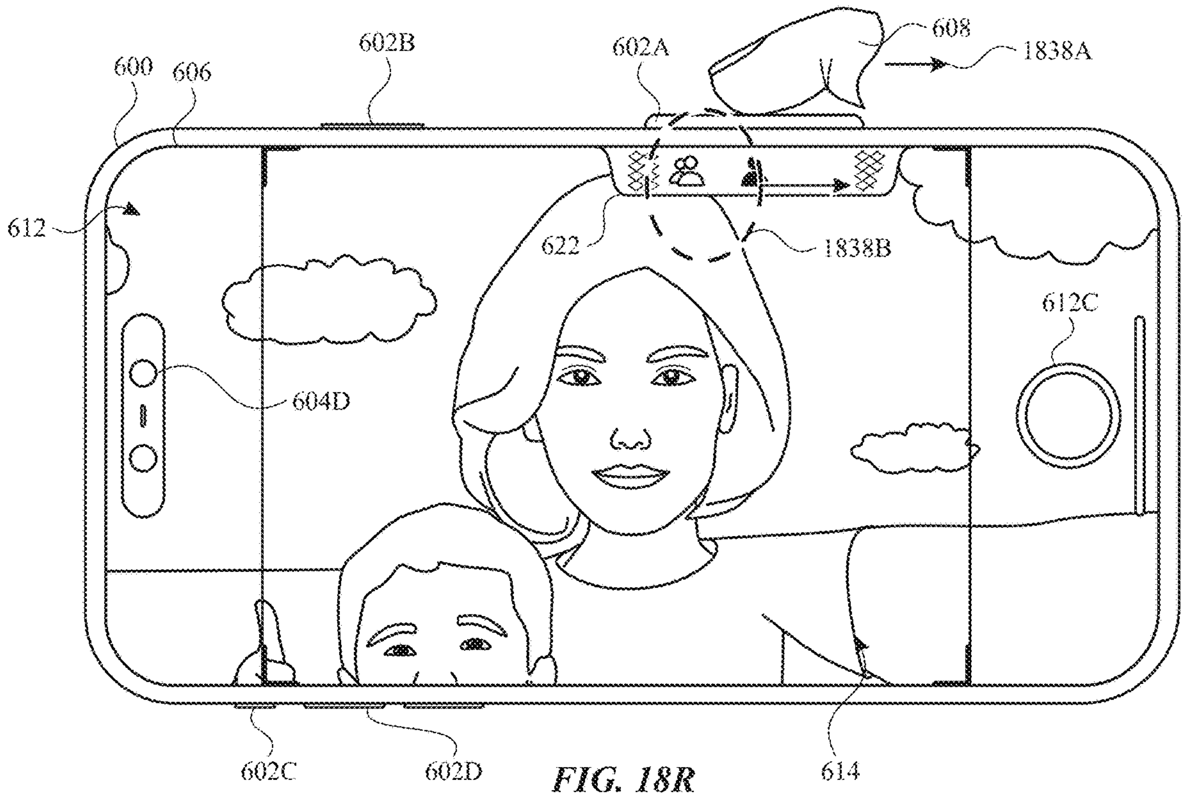

As illustrated in FIG. 18R, while camera user interface 612 is configured to capture media using fourth camera 604D, rather than displaying a zoom scale as described with respect to FIGS. 14A-14Z, computer system 600 displays settings control 622 with a limited set of menu items. The menu item selected (e.g., visually emphasized and centered within settings control 622) at FIG. 18R, with a single person icon, represents the zoom level for the tight selfie shot currently displayed in camera preview 614, and the other menu item, with two person icons, represents a zoom level for a wide selfie shot, as described further below.

Figure 18S:
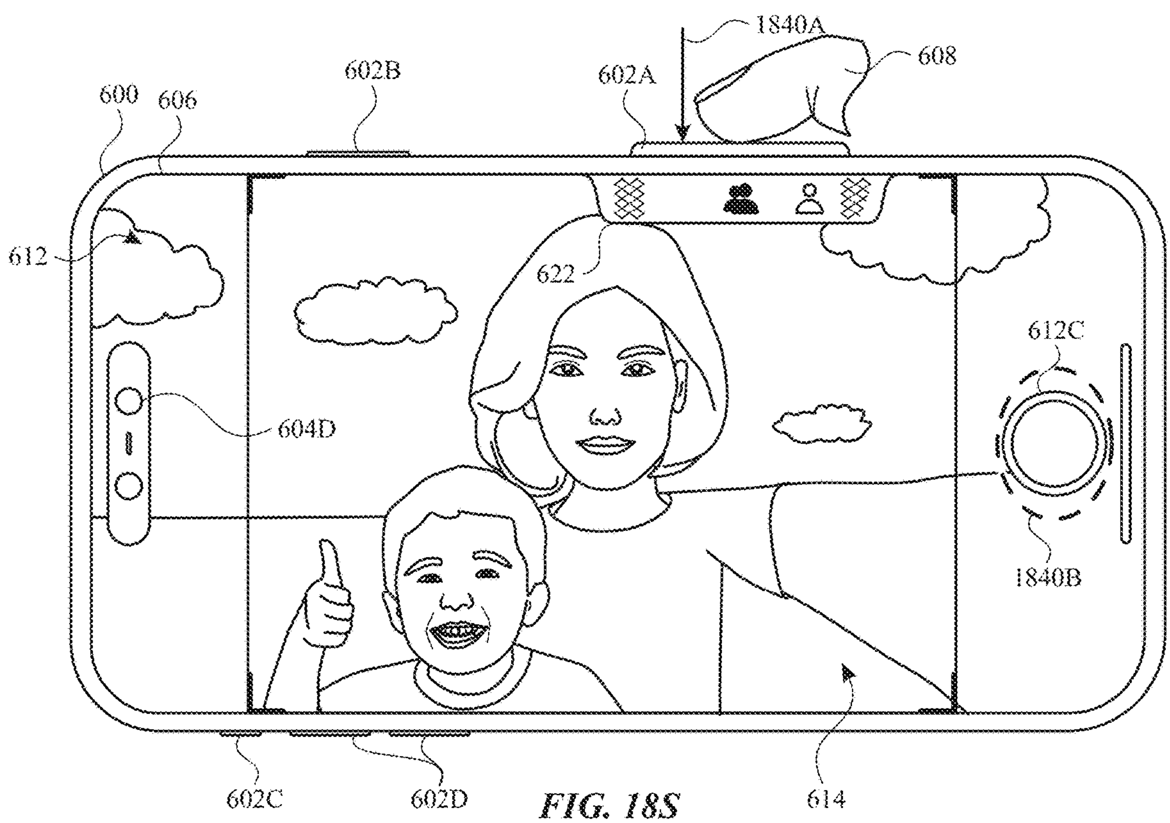

At FIG. 18R, computer system 600 detects a movement input, such as button input 1838A and/or touch input 1838B, moving in a left-to-right direction. Alternatively, touch input 1838B includes a tap directed to the menu item with the two person icons. In response to button input 1838A and/or touch input 1838B, at FIG. 18S, computer system 600 adjusts the zoom level for camera user interface 612 to the zoom level for the wide selfie shot, moving the corresponding menu item to the center of settings control 622. As illustrated in FIG. 18S, at the zoom level for the wide selfie shot, camera preview 614 includes a larger portion of the field-of-view of fourth camera 604D (e.g., a wider shot of the environment) than at the zoom level for the tight selfie shot. In particular, at FIG. 18Q, camera preview 614 includes a representation of the field-of-view of fourth camera 604D with a wider crop that includes both people's entire faces. Accordingly, using settings control 622 for the zoom setting, a user can zoom in to the tight shot (e.g., for selfies including a single person or a few closely-gathered people) and out to the wide shot (e.g., for selfies including more of the surrounding environment and/or a larger group of people) using fourth camera 604D.

At FIG. 18S, computer system 600 detects an input requesting to capture media, such as button press input 1840A directed to first button 602A and/or touch input 1840B directed to shutter affordance 612C. In response to the input requesting to capture media (e.g., 1840A and/or 1840B), computer system 600 captures media at the zoom level for the wide selfie shot using fourth camera 604D. As illustrated in FIG. 18T in the thumbnail of captured media icon 612D, the media captured in response to button press input 1840A and/or touch input 1840B includes the portion of the field-of-view of fourth camera 604D previewed in camera preview 614, including both people's faces.

FIG. 19 is a flow diagram illustrating method 1900 for controlling media capture using a computer system with multiple cameras, in accordance with some embodiments. The method is performed at a computer system (e.g., 100, 300, 500, 600, and/or 1000) that is in communication with one or more display generation components (e.g., 606) (e.g., a display controller; a touch-sensitive display system; a display (e.g., integrated and/or connected), a 3D display, a transparent display, a projector, and/or a heads-up display), a plurality of cameras (e.g., 604A, 604B, 604C, and/or 604D) including a first camera and a second camera that is different from the first camera (e.g., as a rear (user-facing) camera and a forward (environment-facing) camera and/or a plurality of cameras with different lenses, such as a standard camera, a telephoto camera, and/or a wide-angle camera), and one or more input devices including a first hardware input device (e.g., 602A, 602B, 602C, and/or 602D) (e.g., including one or more hardware buttons and/or surfaces, such as mechanical (e.g., physically depressible), solid-state, intensity-sensitive, and/or touch-sensitive (e.g., capacitive) buttons and/or surfaces) (in some embodiments, the computer system is optionally in communication with one or more sensors, such as camera sensors, optical sensors, depth sensors, capacitive sensors, intensity sensors, motion sensors, vibration sensors, and/or audio sensors): In some embodiments, the first hardware input device is included in a plurality of input devices in communication with the computer system. In some embodiments, the first hardware input device is separate from a touch-sensitive surface of the display generation component, e.g., a separate button outside of a touch screen. In some embodiments, the first hardware button is a customizable button, as described with respect to FIGS. 10A-11B.

While displaying, via the one or more display generation components, a camera user interface (e.g., 612) for capturing media primarily using the first camera (e.g., exclusively using the first camera or using the first camera in combination with one or more other cameras, optionally with more of the information that is used to generate a corresponding media item coming from the camera that is being primarily used than from any other camera), the computer system detects (1902), via the first hardware input device (e.g., and/or one or more of the other input devices), a first movement input (e.g., 1802A, 1802B, 1804A, 1804B, 1806A, 1806B, 1808A, 1808B, 1810A, 1810B, 1812A, 1812B, 1814A, and/or 1814B) (e.g., a swipe, flick, and/or other gesture performed on a touch-sensitive surface of the first hardware input device). In some embodiments, a capture affordance that, when activated, causes the device to capture media using the first camera is displayed while displaying one or more controls for adjusting settings associated with the first camera, and/or displaying a representation of a field-of-view of (e.g., detected and/or captured by) the first camera in a capture preview (e.g., a camera viewfinder) of a camera user interface (e.g., while the capture preview includes at least a portion of the field-of-view of the first camera). In some embodiments, displaying a representation of the field-of-view of a respective camera of the plurality of cameras in the camera preview includes displaying a live- or near-live camera feed. In some embodiments, in response to detecting a capture input (e.g., a tap, touch, press, gesture, and/or other input) while displaying a representation of the field-of-view of a respective camera of the plurality of cameras in the capture preview, the computer system captures media (e.g., photo and/or video media)

primarily using the respective camera. In some embodiments, the first movement input includes a movement component in a first direction. In some embodiments, the first movement input includes at least a threshold amount of movement and/or at least a threshold rate of movement (e.g., in the first direction), e.g., a swipe traversing at least 2%, 5%, 10%, 13%, 25%, 50%, and/or 75% of the length of the first hardware input device in under 0.1, 0.2, 0.25, 0.5, 0.75, 1, 2, and/or 4 seconds. In some embodiments, the first movement input satisfies one or more criteria associated with the second camera, e.g., moving in a direction, at a speed, and/or by an amount associated with changing to the second camera from the first camera (e.g., via a displayed control element, such as a platter, dial, and/or slider), similarly to the movement characteristics associated with selection of different zoom values as described with respect to FIGS. 14A-15. In some embodiments, the input is detected while a lens selection function is associated with the first hardware input device, e.g., after selecting the lens selection function from an option user interface (e.g., customization menu) as described with respect to FIGS. 10A-11B. In some embodiments, the input is detected while displaying a lens selection control element. In some embodiments, the computer system displays the lens selection control element in response to a particular type of input, such as described with respect to FIGS. 6A-7B, e.g., light/partial press of the first hardware input device and/or a long swipe of the first hardware input device.

In response to detecting the first movement input, the computer system displays (1904), via the one or more display generation components, a camera user interface (e.g., 612) for capturing media primarily using the second camera (e.g., exclusively using the second camera or using the second camera in combination with one or more other cameras, optionally with more of the information that is used to generate a corresponding media item coming from the camera that is being primarily used than from any other camera) without (e.g., or instead of) displaying the camera user interface for capturing media primarily using (e.g., exclusively using or using in combination with one or more other cameras) the first camera (e.g., as illustrated in FIGS. 18C, 18E, and/or 18G-18I) (e.g., exclusively using the first camera or using the first camera in combination with one or more other cameras, optionally with more of the information that is used to generate a corresponding media item coming from the camera that is being primarily used than from any other camera). In some embodiments, a capture affordance that, when activated, causes the device to capture media using the second camera is displayed along with displaying one or more controls for adjusting settings associated with the second camera, and/or displaying a representation of a field-of-view of (e.g., detected and/or captured by) the second camera in the camera preview). In some embodiments, in response to detecting the first movement input the computer system ceases to display the representation of the field-of-view of the first camera in the camera preview, changes the capture affordance to cause the device to capture media primarily using the second camera instead of the first camera, and/or changes one or more controls for adjusting settings associated with the first camera to adjusting settings associated with the second camera). For example, the computer system switches which camera(s) of the plurality of cameras is currently selected for use in the camera user interface (e.g., the respective camera(s) currently capturing the image data included in the camera preview). Configuring a camera user interface to capture media with different cameras (e.g., of a plurality of cameras) using a movement input on a first hardware input device (e.g., a hardware button) provides improved control of computer system functionality without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, by responding to movement inputs via the first input device, the computer system reduces the number of display elements, inputs, and/or time needed to control media capture using a plurality of different cameras.

In some embodiments, the plurality of cameras include at least one camera (e.g., the first camera, second camera, third camera, or another camera) that is housed (e.g., within a device of the computer system) facing a first direction (e.g., 604A, 604B, and/or 604C) and at least one camera (e.g., the second respective camera is the first camera, second camera, third camera, and/or another camera) that is housed (e.g., within the device of the computer system) facing a second direction (e.g., 604D), different (e.g., opposite) from the first direction (e.g., as illustrated in FIGS. 6A-6B). For example, at least two cameras of the plurality of cameras face different directions, such as a rear (e.g., user-facing) camera and a forward (e.g., environment-facing) camera. In some embodiments, the computer system is a single electronic device having a housing with multiple sides and the first camera is mounted on a first side of the electronic device and the second camera is housed on a second side of the electronic device and faces in a different direction (e.g., an opposite direction) from the first side. Using a movement input to configure the camera user interface to capture media with cameras that face different directions provides improved control of computer system functionality without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, by responding to movement inputs via the first input device, the computer system reduces the number of display elements, inputs, and/or time needed to switch between capturing media with a forward (e.g., environment-facing) and capturing media with a rear (e.g., user-facing) camera.

In some embodiments, the plurality of cameras includes at least one camera (e.g., the respective camera is the first camera, second camera, third camera, or another camera) that is housed (e.g., within a device of the computer system) facing a respective direction and at least one camera (e.g., the second respective camera is the first camera, second camera, third camera, and/or another camera) that is housed (e.g., within the device of the computer system) facing the respective direction (e.g., 604A, 604B, and/or 604C) (e.g., as illustrated in FIG. 6A) (e.g., facing the same respective direction). For example, at least two cameras of the plurality of cameras face the same direction, such as two or more forward (and/or or two or more rear) cameras of different geometries, maximum focal length, minimum focal length, aperture size, speed, sensor configuration, sensor dimensions, resolution, and/or hardware specifications. Using a movement input to configure the camera user interface to capture media with different cameras that face the same direction provides improved control of computer system functionality without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, by responding to movement inputs via the first input device, the computer system reduces the number of display elements, inputs, and/or time needed to switch between capturing media with multiple different types of cameras, such as a wide-angle lens, a portrait lens, a macro lens, and/or a telephoto lens.

In some embodiments, in response to detecting the first movement input and in accordance with a determination that a first set of criteria is satisfied, the computer system displays a first transition animation between the camera user interface for capturing media primarily using the first camera (e.g., exclusively using the first camera or using the first camera in combination with one or more other cameras, optionally with more of the information that is used to generate a corresponding media item coming from the camera that is being primarily used than from any other camera) and the camera user interface for capturing media primarily using the second camera (e.g., as illustrated in FIGS. 18C-18G) (e.g., exclusively using the second camera or using the second camera in combination with one or more other cameras, optionally with more of the information that is used to generate a corresponding media item coming from the camera that is being primarily used than from any other camera), wherein the first set of criteria includes a criterion that is satisfied when the first camera is housed facing a first direction and the second camera is housed facing a second direction that is different from the first direction (e.g., when the movement input switches between cameras on two different sides of the computer system). In some embodiments, in response to detecting the first movement input and in accordance with a determination that the first set of criteria is not satisfied (e.g., when the movement input switches between two cameras on the same side of the computer system), the computer system displays a second transition animation between the camera user interface for capturing media primarily using the first camera and the camera user interface for capturing media primarily using the second camera (e.g., as illustrated in FIGS. 18A-18C), wherein the second transition animation is different from the first transition animation. In some embodiments, the first transition animation applies different visual effects (e.g., blurring, lightening, darkening, obscuring, and/or distorting effects), changes different user interface elements (e.g., adding, updating, and/or removing camera user interface objects), and/or lasts a different duration than the second transition animation. For example, when the first and second camera are on different sides of the device, the computer system pauses, blurs, brightens or darkens, and/or otherwise temporarily obscures a camera preview region of the camera user interface before displaying the camera user interface for capturing media using the second camera, and when the first and second camera are on the same side of the device, the computer system animates the camera preview region gradually morphing from a preview of media capture primarily using the first camera to a preview of media capture primarily using the second camera (in some embodiments, the computer system animates the camera preview region morphing by interpolating between the appearance of the field-of-view of the first camera and the appearance of the field-of-view of the second camera). Conditionally displaying different transition animations when switching between cameras facing the same direction and cameras facing different directions provides improved visual feedback to the user, which reduces the power usage and improves the battery life of the computer system by enabling the user to use the device more quickly and efficiently. For example, the transition animations provide the user with additional feedback as to which camera will be used to capture media, which assists the user in framing and capturing media using the multiple available cameras.

In some embodiments, while displaying the camera user interface for capturing media primarily using the second camera (e.g., exclusively using the second camera or using the second camera in combination with one or more other cameras, optionally with more of the information that is used to generate a corresponding media item coming from the camera that is being primarily used than from any other camera), the computer system detects, via the first hardware input device, a second movement input (e.g., 1802A, 1802B, 1804A, 1804B, 1806A, 1806B, 1808A, 1808B, 1810A, 1810B, 1812A, 1812B, 1814A, and/or 1814B) (e.g., a swipe, flick, and/or other gesture performed on a touch-sensitive surface of the first hardware input device), wherein the second movement input moves in a same direction as the first movement input. In some embodiments, the second movement input is a continuation of the first movement input, e.g., two portions of a long swipe or drag across the first hardware input device. In some embodiments, the second movement input is an additional movement input, e.g., a swipe, flick, drag, or other gesture performed after ending the first movement input. In some embodiments, the second movement input includes at least a threshold amount of movement (e.g., in the first direction), e.g., a swipe traversing at least 2%, 5%, 10%, 13%, 25%, 50%, and/or 75% of the length of the first hardware input device. In some embodiments, the second movement input satisfies one or more criteria associated with the third camera, e.g., moving at a speed and/or by an amount associated with changing to the third camera from the second camera. In some embodiments, in response to detecting the second movement input, the computer system 600 displays a camera user interface for capturing media primarily using a third camera of the plurality of cameras (e.g., exclusively using the third camera or using the third camera in combination with one or more other cameras, optionally with more of the information that is used to generate a corresponding media item coming from the camera that is being primarily used than from any other camera) without displaying the camera user interface for capturing media primarily using the second camera (e.g., transitioning from third camera 604C to first camera 604A to fourth camera 604D as illustrated in FIGS. 18A-18E and/or transitioning from fourth camera 604D to third camera 604C to second camera 604B as illustrated in FIGS. 18E-18I) (e.g., or displaying the camera user interface for capturing media using the first camera), wherein the third camera is different from the first camera and different from the second camera (e.g., displaying a capture affordance that, when activated, causes the device to capture media using the third camera, displaying one or more controls for adjusting settings associated with the third camera, and/or displaying a representation of a field-of-view of (e.g., detected and/or captured by) the third camera in the camera preview). Continuing to change the selected camera for capturing media using a movement input in the same direction as the first movement input (e.g., a continued movement input) provides improved control of computer system functionality without cluttering the user interface with additional displayed controls. Doing so also provides improved ergonomics, assists the user with composing media capture events, and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the user can efficiently and intuitively configure the media capture interface to capture media using three or more different cameras using repeated movements in a single direction, without needing to display numerous controls for configuring the cameras and/or requiring the user to move their hand around to perform multiple different inputs.

In some embodiments, the first camera, the second camera, and the third camera (e.g., 604A, 604B, and 604C) are housed (e.g., within a device of the computer system) facing a same direction. For example, multiple swipes in a single direction transition the camera user interface between three different forward cameras (or three rear cameras) with different geometries, resolution, and/or hardware specifications, such as a wide-angle lens, a telephoto lens, and a macro lens. In some embodiments, the third camera (e.g., 604D) is housed (e.g., within a device of the computer system) facing a first direction and at least one of the first camera and the second camera (e.g., 604A, 604B, and/or 604C) is housed (e.g., within the device of the computer system) facing a second direction, different (e.g., opposite) from the first direction. For example, one swipe in a given direction transitions between two forward cameras (or two rear cameras) and another swipe in the same direction transitions between a forward camera and a rear camera.

In some embodiments, while displaying the camera user interface for capturing media using the second camera of the plurality of cameras, the computer system detects, via the first hardware input device, a third movement input (e.g., 1802A, 1802B, 1804A, 1804B, 1806A, 1806B, 1808A, 1808B, 1810A, 1810B, 1812A, 1812B, 1814A, and/or 1814B) (e.g., a swipe, flick, and/or other gesture performed on a touch-sensitive surface of the first hardware input device). In some embodiments, the third movement input is a continuation of the first movement input, e.g., two portions of a long swipe or drag across the first hardware input device. In some embodiments, the third movement input is an additional movement input, e.g., a swipe, flick, drag, or other gesture performed after ending the first movement input. In some embodiments, the third movement input includes at least a threshold amount of movement, e.g., a swipe traversing at least 2%, 5%, 10%, 13%, 25%, 50%, and/or 75% of the length of the first hardware input device. In some embodiments, the third movement input satisfies one or more criteria associated with the simulated lens, e.g., moving at a speed and/or by an amount associated with changing to the simulated lens from the second camera. In some embodiments, in response to detecting the third movement input, the computer system displays, via the one or more display generation components, a camera user interface for capturing media primarily using a simulated lens (e.g., as illustrated in FIG. 18H), wherein capturing media using the simulated lens includes digitally scaling (e.g., digitally zooming in or out from) a field-of-view from one or more of the plurality of cameras to a simulated zoom level (e.g., a simulated prime lens zoom level, such as a 2× "lens" simulated by digitally zooming input from a 1× camera lens and/or interpolating between the field-of-view of the 1× camera lens and the field-of-view of one or more a higher-magnification prime lenses, such as a 3× camera lens, a 5× camera lens, and/or an 8× camera lens). For example, simulating the zoom level includes expanding (e.g., digitally expanding) (e.g., by unbinning (e.g., reversing pixel binning) and/or unbinning pixels that are binned and/or bent at the native resolution of at least one of the plurality of cameras) one or more frames captured by the one or more cameras of the plurality of cameras at the cameras' respective native zoom levels and resolutions to combine (e.g., binning the pixels) to generate a frame at the simulated zoom level with a high resolution (e.g., a resolution the same as and/or similar to the native resolutions of the fixed focal-length cameras). In some embodiments, displaying a field-of-view from one or more of the plurality of cameras at a simulated zoom level and/or capturing image data at the simulated zoom level includes generating image data having a selected resolution (e.g., a target resolution and/or a "full resolution", such as 24 MP) by unbinning camera sensor pixel data from one or more captured images and/or by unbinning camera sensor data that was previously binned (e.g., by reversing pixel binning) (e.g., unbinning pixels from an image captured with a 12 MP resolution) and combining that data with one or more captured images with pixel binning (e.g., a 12 MP capture produced via binning pixels from a 48 MP sensor) to produce image data at the target resolution (e.g., 24 MP). For example, displaying the camera user interface for capturing media using the simulated camera includes displaying a capture affordance that, when activated, causes the device to capture media at the simulated zoom level and/or display a representation of the digitally-scaled field-of-view of the one or more cameras in the camera preview. In some embodiments, each camera of the plurality of cameras has a respective native zoom level (e.g., a zoom level that the fixed focus camera is capable of capturing media at without additional digital processing to change the zoom level of the captured image), and the simulated zoom level is not a native zoom level of any of the plurality of cameras and/or not a native zoom level of any cameras of the plurality of cameras housed facing a particular direction. Configuring a camera user interface to capture media with a simulated prime lens in addition to multiple different cameras (e.g., with different, physical lenses) using a movement input on a first hardware input device (e.g., a hardware button) provides improved control of computer system functionality without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, by responding to movement inputs via the first input device, the computer system reduces the number of display elements, inputs, and/or time needed to capture media with a variety of different settings, including both optical and simulated zoom levels, focus characteristics, and/or cropping.

In some embodiments, while displaying the camera user interface for capturing media primarily using the second camera, the computer system detects, via the first hardware input device, an end of the first movement input. In some embodiments, in response to detecting the end of the first movement input and in accordance with a determination that the end of the first movement input satisfies a set of one or more movement criteria, the computer system displays, via the one or more display generation components, a camera user interface for capturing media primarily using a fourth camera (e.g., exclusively using the fourth camera or using the fourth camera in combination with one or more other cameras, optionally with more of the information that is used to generate a corresponding media item coming from the camera that is being primarily used than from any other camera) that is different from the second camera (in some embodiments, the fourth camera is the first camera, the third camera, the simulated camera, or another camera) without (e.g., or instead of) displaying the camera user interface for capturing media primarily using the second camera (e.g., as described with respect to FIGS. 18A-18C and/or 18E-18G). In some embodiments, the computer system continues to adjust the camera selection based on the detected movement (e.g., based on simulated momentum from the detected movement), as described with respect to FIGS. 14A-15. In some embodiments, the set of one or more movement criteria include a criteria that is satisfied when, near (e.g., within 1.5 s, 1 s, 0.5 s, 0.2 s, or 0.05 s of) the end of the first movement input, the first movement input included movement in a particular direction (e.g., a direction corresponding to a selection of the fourth camera) and/or at least a threshold speed and/or amount of movement. In some embodiments, in response to detecting the end of the first movement input and in accordance with a determination that the end of the first movement input does not satisfy the set of one or more movement criteria, the computer system maintains displaying the user interface for capturing media primarily using the second camera. For example, in response to a flick (e.g., a quick swipe that lifts off of the first hardware device without first coming to a stop), the computer system continues to adjust the camera selection from the second camera to the fourth camera, and in response to a swipe that stops on the surface of the first hardware device before lifting off, the computer system does not continue to adjust the camera selection. Conditionally continuing to adjust the camera selected for media capture after the movement input ends (e.g., based on simulated momentum from the movement input) reduces the number of inputs needed to perform operations via the camera user interface, which reduces the power usage and improves the battery life of the computer system by enabling the user to use the device more quickly and efficiently. For example, the user can quickly switch between three or more different cameras using movement inputs with more momentum, such as flicks or quick swipes, while switching between different cameras with greater control using movement inputs with less momentum, such as swipes or drags that stop before ending.

In some embodiments, while displaying the camera user interface for capturing media primarily using the second camera, the computer system detects, via the first hardware input device, a fourth movement input (e.g., a swipe, flick, and/or other gesture performed on a touch-sensitive surface of the first hardware input device), wherein the fourth movement input (e.g., 1808A, 1808B, 1810A, 1810B, 1812A, 1812B, 1814A, and/or 1814B) moves in a different direction than (e.g., opposite to) the first movement input (e.g., 1802A, 1082B, 1084A, 1804B, 1806A, and/or 1806B). In some embodiments, the fourth movement input includes at least a threshold amount of movement (e.g., in the first direction), e.g., a swipe traversing at least 2%, 5%, 10%, 13%, 25%, 50%, and/or 75% of the length of the first hardware input device. In some embodiments, the fourth movement input satisfies one or more criteria associated with the first camera, e.g., moving at a direction, speed and/or by an amount associated with changing to the first camera from the second camera. In response to detecting the fourth movement input, displaying, via the one or more display generation components, the camera user interface for capturing media primarily using the first camera without displaying the camera user interface for capturing media primarily using the second camera (e.g., returning to the first camera). Changing the selected camera for capturing media back to the previously-selected camera using a movement input in the opposite direction as the first movement input (e.g., a reverse movement input) provides improved control of computer system functionality without cluttering the user interface with additional displayed controls. Doing so also provides improved ergonomies, assists the user with composing media capture events, and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the user can efficiently and intuitively switch back and forth between different cameras using directional movements, without needing to display numerous controls for configuring the cameras and/or requiring the user to move their hand around to perform multiple different inputs.

In some embodiments, while displaying the camera user interface for capturing media primarily using the first camera, the computer system detects, via the first hardware input device, a fifth movement input (e.g., a swipe, flick, and/or other gesture performed on a touch-sensitive surface of the first hardware input device), wherein the fifth movement input (e.g., 1808A, 1808B, 1810A, 1810B, 1812A, 1812B, 1814A, and/or 1814B) moves in a different direction than (e.g., opposite to) the first movement input (e.g., 1802A, 1082B, 1084A, 1804B, 1806A, and/or 1806B). In some embodiments, the fifth movement input includes at least a threshold amount of movement (e.g., in the first direction), e.g., a swipe traversing at least 2%, 5%, 10%, 13%, 25%, 50%, and/or 75% of the length of the first hardware input device. In some embodiments, the fifth movement input satisfies one or more criteria associated with the fifth camera, e.g., moving at a direction, speed and/or by an amount associated with changing to the first camera from the fifth camera. In some embodiments, in response to detecting the fourth movement input, the computer system displays, via the one or more display generation components, a camera user interface for capturing media primarily using a fifth camera (exclusively using the fifth camera or using the fifth camera in combination with one or more other cameras, optionally with more of the information that is used to generate a corresponding media item coming from the camera that is being primarily used than from any other camera) (in some embodiments, the fifth camera is the third camera, the fourth camera, the simulated camera, and/or another camera) without displaying the camera user interface for capturing media primarily using the first camera (e.g., displaying a capture affordance that, when activated, causes the device to capture media using the fifth camera, displaying one or more controls for adjusting settings associated with the fifth camera, and/or displaying a representation of a field-of-view of (e.g., detected and/or captured by) the fifth camera in the camera preview). Configuring a camera user interface to capture media with different cameras using directional movement inputs on a first hardware input device (e.g., a hardware button) provides improved control of computer system functionality without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, by switching between different cameras based on the direction of a movement detected by the first hardware input device, the computer system reduces the number of display elements, inputs, and/or time needed to control media capture using a plurality of different cameras.

In some embodiments, the first camera includes a first fixed-focal length (e.g., prime) lens and the second camera includes a second fixed-focal length lens, different from the first fixed-focal length lens (e.g., 604A, 604B, 604C, and/or 604D) (e.g., the two cameras have physically distinct lenses). In some embodiments, the focal length of the first lens is different from (e.g., longer, shorter, and/or different in proportion to aperture size) the focal length of the second lens. In some embodiments, the first camera includes a different camera sensor than the second camera (e.g., a camera sensor with different dimensions, pixel size, pixel density, and/or other sensor parameter). Configuring a camera user interface to capture media with different fixed focal-length cameras using a movement input on a first hardware input device provides improved control of computer system functionality without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, by switching between different fixed focal-length cameras in response to movement inputs, the user can quickly switch between different optical zoom levels, which provide high-quality images and reduce the amount of processing and power required for performing digital zoom processes.

In some embodiments, the plurality of cameras provides a first plurality of zoom levels for capturing media (e.g., as illustrated in FIGS. 18A-18I) (e.g., the optical magnifications provided by each of the plurality of cameras, e.g., 0.5×, 1×, 3×, 8×, and/or 10× magnification). In some embodiments, the computer system detects, via the one or more input devices an input (e.g., 1824A and/or 1824B) including a request to associate a zoom option with the first hardware input device (e.g., as illustrated in FIGS. 18L-18M and further described with respect to FIGS. 10A-11B). In some embodiments, while displaying a camera user interface for capturing media primarily using a respective camera of the plurality of cameras (e.g., exclusively using the respective camera or using the respective camera in combination with one or more other cameras, optionally with more of the information that is used to generate a corresponding media item coming from the camera that is being primarily used than from any other camera) (in some embodiments, the respective camera is the first camera, second camera, third camera, fourth camera, fifth camera, simulated camera, and/or another camera), the computer system detects, via the first hardware input device, a respective movement input (e.g., 1828A, 1828B, 1838A, and/or 1838B). In some embodiments, in response to detecting the respective movement input and in accordance with a determination that the zoom option is associated with the first hardware input device when the respective movement input is detected (in some embodiments, after detecting the input including a request to associate the zoom option with the first hardware input device), the computer system changes a zoom level for capturing media to a respective zoom level selected (e.g., based on the respective movement input) from a second plurality of zoom levels (e.g., as illustrated in FIGS. 18N-18O and/or 18R-18S) (e.g., an ordered plurality of zoom levels that interpolate between and/or extrapolate from the optical zoom levels the plurality of cameras), wherein the second plurality of zoom levels includes more zoom levels than the first plurality of zoom levels (e.g., as described with respect to FIGS. 14B, 18N-18O, and/or 18R-18S). For example, performing the zoom operation performs a quasi-continuous zoom adjustment (e.g., simulating changing camera magnification with a zoom lens by digitally scaling and/or interpolating between the fields-of-view of the plurality of cameras) rather than switching between the discrete optical zoom levels provided by the plurality of cameras. In some embodiments, the second plurality of zoom levels includes a plurality of zoom levels that fall between two zoom levels of the first plurality of zoom levels (e.g., two nearest neighbor zoom levels, such as a plurality of zoom levels falling between 0.5× and 1 and/or a plurality of zoom levels falling between 1× and 3×) and/or zoom levels that fall outside of the range of the first plurality of zoom levels (e.g., zoom levels higher than the highest optical magnification, such as 10.1×-20× digital zoom levels). In some embodiments, the second plurality of zoom levels include an ordered plurality of zoom levels separated by an interval (e.g., 0.05× zoom, 0.1× zoom, 0.2× zoom, 0.5× zoom, and/or 1× zoom) that is smaller than an interval between the first plurality of zoom levels. In some embodiments, in response to detecting the respective movement input and in accordance with a determination that the zoom option is not associated with the first hardware input device when the respective movement input is detected, the computer system performs a different operation (e.g., adjusts a different media capture setting) based on the respective movement input, such as adjusting an exposure setting, simulated depth-of-field setting, filter selection, filter intensity, capture guidance setting, focus setting, camera selection setting, and/or application-specific setting (e.g., as described with respect to FIGS. 10A-11B). Providing an option to change the operation associated with the hardware input device to either change directly between multiple cameras or to perform a zoom operation (e.g., which includes both digitally zooming and optically zooming) in response to movement inputs provides improved control of computer system functionality without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the computer system reduces the number of display elements, inputs, and/or time needed to control both the selected camera and the specific zoom level used to capture media.

In some embodiments, the computer system detects, via the one or more input devices, an input (e.g., 1824A and/or 1824B) including a request to associate a zoom option with the first hardware input device. In some embodiments, while displaying a camera user interface for capturing media primarily using a respective camera of the plurality of cameras (in some embodiments, the respective camera is the first camera, second camera, third camera, fourth camera, fifth camera, simulated camera, and/or another camera), the computer system detects, via the first hardware input device, a respective movement input (e.g., 1828A, 1828B, 1838A, and/or 1838B). In some embodiments, in response to detecting the respective movement input and in accordance with a determination that the zoom option is associated with the first hardware input device when the respective movement input is detected (in some embodiments, after detecting the input including a request to associate the zoom option with the first hardware input device), the computer system changes a zoom level for capturing media to a respective zoom level (e.g., as illustrated in FIGS. 18N-180 and/or 18R-18S). In some embodiments, changing the zoom level for capturing media to the respective zoom level includes, in accordance with a determination that the respective movement input is detected while displaying a camera user interface for capturing media primarily using a sixth camera (e.g., 604D) of the plurality of cameras, wherein the sixth camera of the plurality of cameras is housed facing a first direction, selecting (e.g., based on the respective movement input) the respective zoom level from a third plurality of zoom levels (e.g., as described with respect to FIGS. 18R-18S) (e.g., a set of zoom levels associated with the sixth camera). In some embodiments, the third plurality of zoom levels includes a limited set of zoom levels (e.g., two, three, and/or five zoom levels). In some embodiments, selecting the respective zoom level from the third plurality of zoom levels includes performing a digital zoom operation that scales the field-of-view detected by the sixth camera. For example, the sixth camera is a rear (e.g., user-facing) camera with a fixed focal-length, and changing the zoom level while the camera user interface is configured to capture media using the sixth camera switches between a limited number of available zoom levels for the rear camera, such as a standard zoom level and a wide-angle zoom level. In some embodiments, changing the zoom level for capturing media to the respective zoom level includes, in accordance with a determination that the respective movement input is detected while displaying a camera user interface for capturing media primarily using a seventh camera (e.g., 604A, 604B, and/or 604C) of the plurality of cameras, wherein the seventh camera is housed facing a second direction, selecting (e.g., based on the respective movement input) the respective zoom level from a fourth plurality of zoom levels (e.g., as described with respect to FIGS. 18N-180), wherein the fourth plurality of zoom levels includes a plurality of zoom levels between a zoom level associated with the seventh camera and a zoom level associated with another camera of the plurality of cameras (e.g., an incremented set of zoom levels available using the optical zoom levels of the plurality of cameras (e.g., 0.5×, 1×. 2×, 3×, 5×, 8×, 10×, and/or 12× native zoom levels) and/or digital zoom interpolating between and/or extrapolating from the optical zoom levels, such as zoom levels between 0.5×-12× magnification in increments of 0.1×). Providing a selection from different sets of zoom levels in response to movement inputs depending on whether the camera user interface is configured to capture media using a camera facing a first direction or a second direction provides improved control of computer system functionality without cluttering the user interface with additional displayed controls. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, when the hardware button is associated with the zoom operation, the user can perform the zoom operation using the hardware button using both rear and forward cameras, which reduces the number of display elements, inputs, and/or time needed to perform the zoom operation, while also assisting the user to select between suitable zoom levels for a given camera.

In some embodiments, the computer system detects, via the first hardware input device, a press input (e.g., 1816A, 1830A, and/or 1840A). In some embodiments, the press input is a particular type of press input (e.g., as described with respect to FIGS. 6A-7B), such as a hard/full press and/or a long press (e.g., to capture video, as described with respect to FIGS. 8A-9). In some embodiments, in response to detecting the press input, the computer system performs a media capture operation (e.g., as described with respect to FIGS. 18I-18J, 18O-18P, and/or 18S-18T). In some embodiments, performing the media capture operation includes, in accordance with a determination that the press input is detected while displaying the camera user interface for capturing media primarily using the first camera, capturing media primarily using the first camera. In some embodiments, the computer system captures media using only the first camera and/or using the first camera in addition to one or more other cameras (e.g., to capture media using a zoom level other than an optical zoom level of the first camera, to capture depth information, and/or to otherwise enhance the capture using the first camera). In some embodiments, performing the media capture operation includes, in accordance with a determination that the press input is detected while displaying the camera user interface for capturing media primarily using the second camera, capturing media primarily using the second camera. In some embodiments, the computer system captures media using only the second camera and/or using the second camera in addition to one or more other cameras (e.g., to capture media using a zoom level other than an optical zoom level of the second camera, to capture depth information, and/or to otherwise enhance the capture using the second camera). In some embodiments, in accordance with a determination that the press input is detected while displaying a camera user interface for capturing media using a simulated lens, the computer system captures media using multiple cameras of the plurality of cameras. In some embodiments, in accordance with a determination that the press input is detected while the camera user interface is not displayed, the computer system displays the camera user interface (e.g., as described with respect to FIGS. 6D-6E, 10A-10B, and/or 20AL).

FIGS. 20A-20AL illustrate example techniques and systems for controlling visual intelligence functionality of a computer system with one or more cameras, in accordance with some embodiments.

At FIG. 20A, while displaying user interface 2000, a lock screen user interface, computer system 600 detects a press input directed to at least one of the hardware buttons, such as input 2002A directed to first button 602A, input 2002B directed to second button 602B, input 2002B directed to third button 602C, and/or input 2002D directed to fourth button 602D. The press input (e.g., 2002A, 2002B, 2002C, and/or 2002D) is a particular type of input, such as a long (e.g., held) press input (e.g., a press maintained for at least a threshold duration with at least a threshold intensity, such as a long light/partial press and/or a long hard/full press). In some embodiments, the press input (e.g., 2002A, 2002B, 2002C, and/or 2002D) is a type of press input that is different than the type of input used to launch a camera user interface from a non-camera context (e.g., described with respect to FIGS. 6D-6E, 10A-10B, and 20V-20W). For example, the type of press input detected at FIG. 20A includes presses with certain characteristics (e.g., intensity, duration, movement, and/or input sequence) and/or presses directed to certain hardware buttons that differ from the characteristics and/or hardware buttons of the type of presses used to launch camera user interface 612.

At FIG. 20B, in response to detecting the press input (e.g., 2002A, 2002B, 2002C, and/or 2002D), computer system 600 launches user interface 2004 for a visual intelligence experience (e.g., an experience that provides information and/or actions based on automatically detected features of visual content such as image features and/or text detected using machine vision and/or artificial intelligence, various examples of which are described in greater detail below). User interface 2004 includes viewfinder 2004A, which displays a representation of a portion of the environment captured by one or more of cameras 604A, 604B, 604C, and/or 604D. At FIG. 20B, computer system 600 displays viewfinder 2004A in a "live" mode, displaying a live or near-live representation (e.g., stream) of the field-of-view of the one or more cameras (e.g., pass-through video), such that as the field-of-view of the one or more cameras and/or the portion of the environment captured therein changes, the changes are visible in viewfinder 2004A.

Figure 20B:
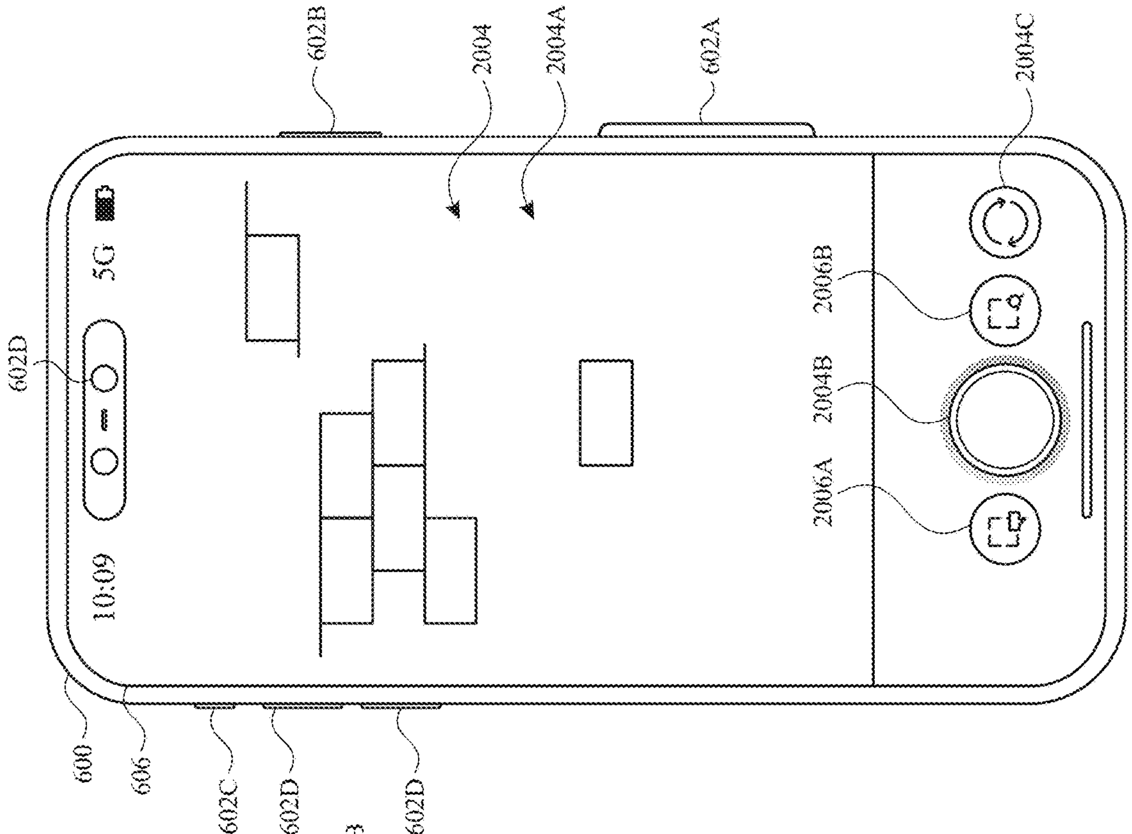
FIGS. 20A-20AL illustrate example techniques and systems for controlling visual intelligence functionality of a computer system with one or more cameras, in accordance with some embodiments.
Figure 20A:
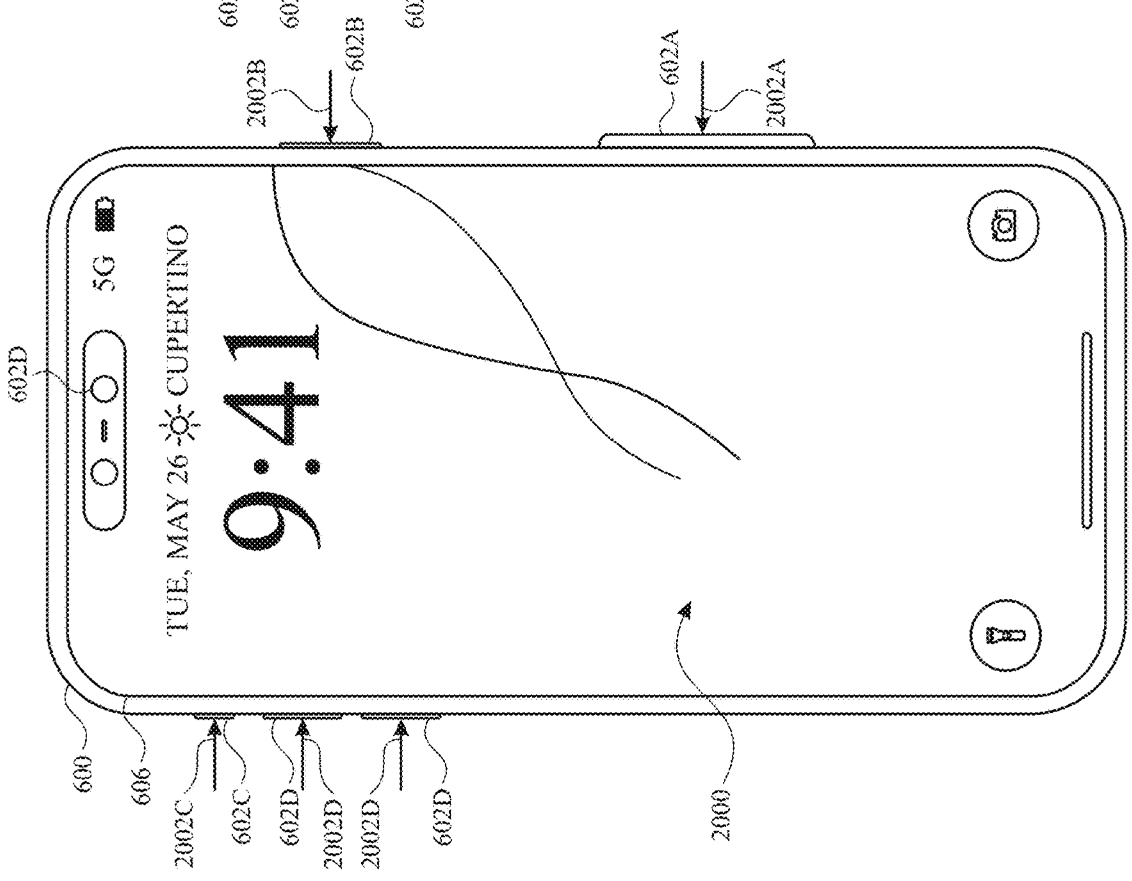
Figure 20D:
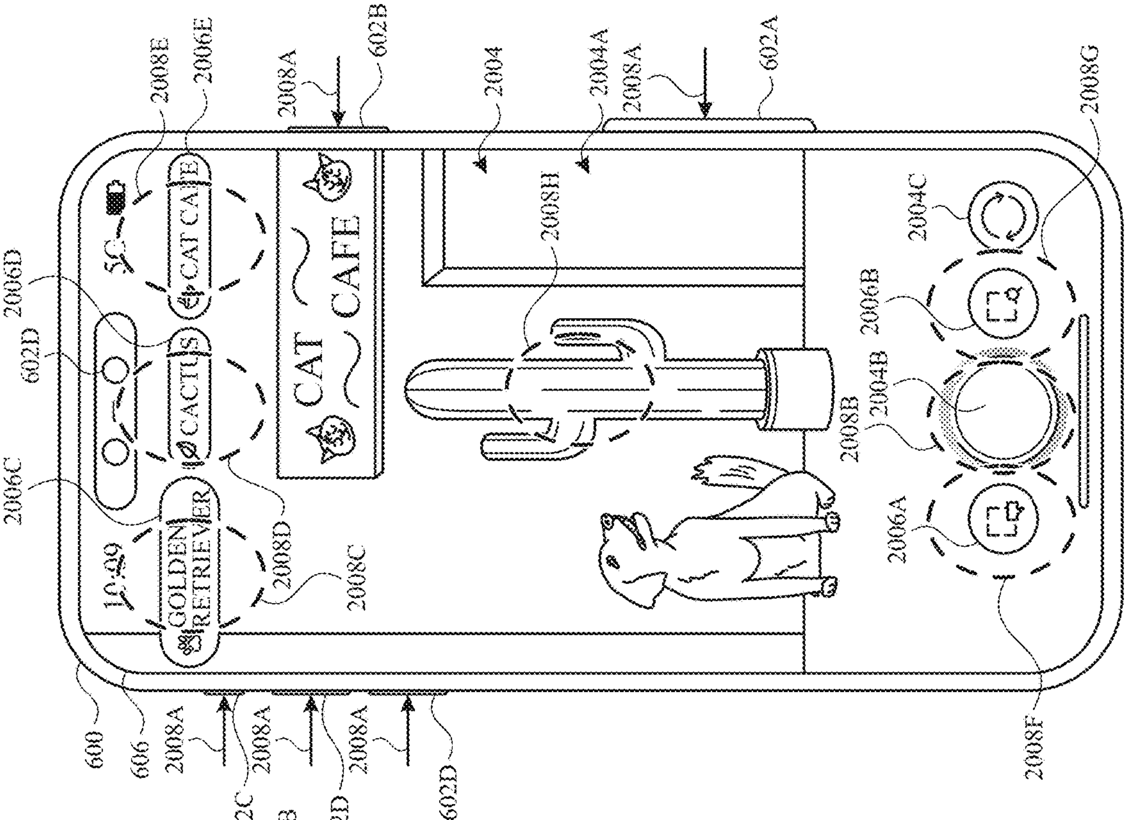

FIGS. 20B-20AL illustrate interactions with user interface 2004. The following describes actions performed by computer system 600 in response to particular inputs directed to the different control elements (e.g., hardware and software buttons) described herein. While displaying user interface 2004 for the visual intelligence experience, actions described as being performed in response to an input directed to a particular control element (e.g., a control element referred to by a particular reference number) can also be performed using inputs directed to the particular control element other than the particularly-described inputs. For example, an input directed to content option 2006D at FIG. 20K would produce the same (or substantially the same) response described with respect to the inputs directed to content option 2006D at FIGS. 20D and/or 20G (e.g., 2008D and 2010B, respectively).

User interface 2004 also includes viewfinder control object 2004B, a software button (e.g., touch control) for changing between the live mode and a freeze frame mode for viewfinder 2004A, and camera selection object 2004C, a software button for switching between using one or more of the forward cameras (e.g., 604A, 604B, and/or 604C) and the rear camera (e.g., 604D) for viewfinder 2004A, both described in greater detail below. In some embodiments, viewfinder control object 2004B is displayed with an edge (e.g., border) effect, such as an animated glow and/or shimmer effect in one or more different colors overlaying viewfinder 2004A around the border of viewfinder control object 2004B.

As described in detail with respect to FIGS. 20B-20AL, user interface 2004 for the visual intelligence experience provides options for a user to interact with computer system 600 based on the field-of-view of the environment represented in viewfinder 2004A (e.g., using the displayed portion of the environment as visual context for the interactions). For example, computer system 600 obtains visual context information about the portion of the environment displayed in viewfinder 2004A, using image and/or video processing techniques, such as machine vision and/or other machine learning techniques to identify (e.g., recognize) certain objects, types (e.g., classes) of objects, types of visual information (e.g., text, symbols, and/or patterns), environmental features (e.g., landmarks, buildings, pathways, and/or weather conditions), and/or other information about the visible environment captured by the one or more cameras. In some embodiments, computer system 600 obtains certain visual context information by processing the field-of-view captured by the cameras (e.g., and represented in viewfinder 2004A) locally, for instance, using image and/or video processing services stored and executed on a device used to display user interface 2004 (e.g., a mobile phone, tablet, headset, and/or other personal electronic device). In some embodiments, computer system 600 obtains certain visual context information by providing portions of the field-of-view captured by the cameras to a remote image and/or video processing service, such as a server-based machine vision service. As described herein, unless otherwise specified, references to computer system 600 determining (e.g., detecting and/or identifying) the contents of viewfinder 2004A should be understood as including embodiments using local processing, remote processing, and/or both local and remote processing to obtain the visual context described.

As illustrated in FIG. 20B, user interface 2004 includes selectable options (e.g., software buttons) for interacting with the field-of-view of the environment represented in viewfinder 2004A. As described in further detail below, the selectable options include assistant option 2006A, an option for interacting with the visual intelligence experience using natural-language inputs (e.g., using an intelligent automated assistant, chatbot service, and/or other AI process, such as a generative AI process that generates, based on the visual context of the visual intelligence experience and/or user-provided prompts, generative text to provide to the user as text and/or speech (e.g., synthesized speech) outputs in a conversational interaction)), and search option 2006B, an option for interacting with the visual intelligence experience using a visual search engine.

As illustrated in FIG. 20B, viewfinder 2004A shows a plain, brick wall. At FIG. 20B, computer system 600 determines that the field-of-view of the environment currently represented in viewfinder 2004A does not include content of a type included in a base set of recognized content types. For example, the base set of recognized content types includes people, animals, plants, places, text, and/or personal effects, so, although computer system 600 may be able to recognize other objects and/or features of the environment pictured in viewfinder 2004A (e.g., identifying that the wall is made of brick), computer system 600 does not provide any indications of recognized content at FIG. 20B, such as the content-specific options described with respect to the following figures.

Figure 20C:
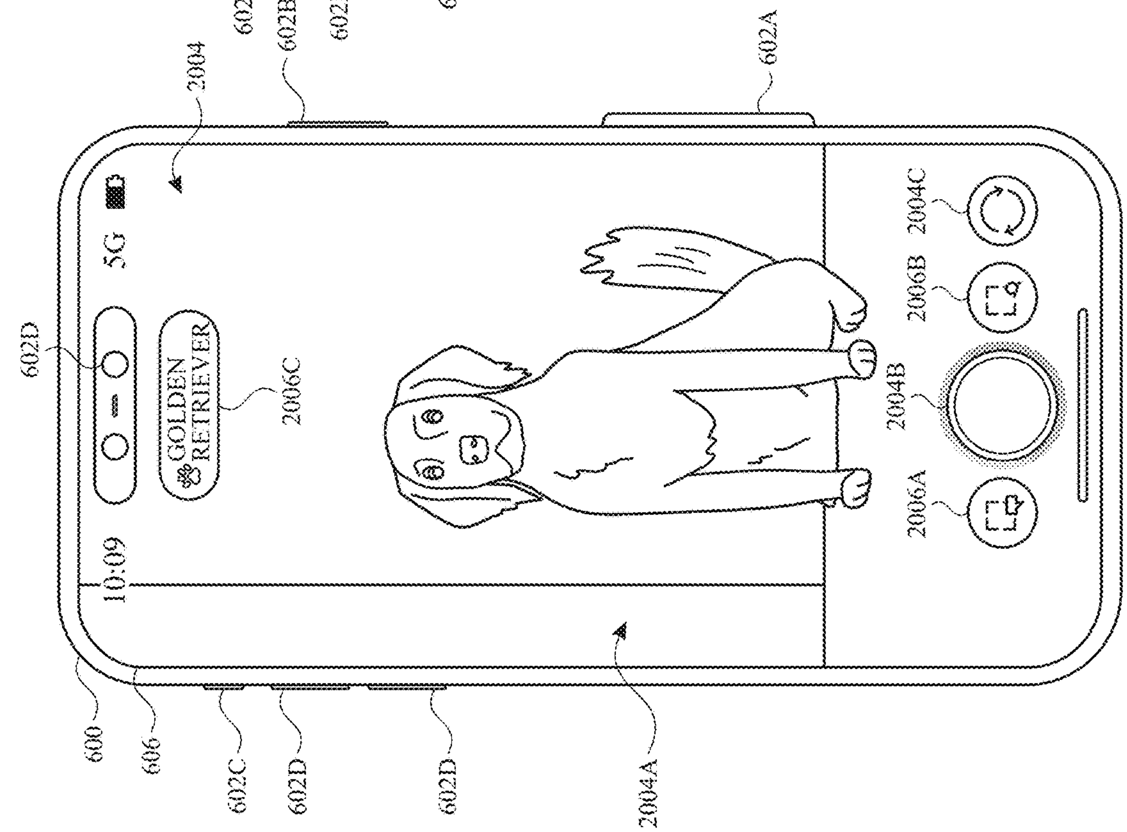

At FIG. 20C, as viewfinder 2004A is being displayed in the live mode, the contents of viewfinder 2004A update to show a dog sitting in front of the wall, for example, due to the user changing the field-of-view of the cameras (e.g., panning over to the dog) and/or the environment changing within the field-of-view of the cameras (e.g., the dog walking into the frame). As animal-type content is one of the types of content included in the base set of recognized content types, in response to detecting the dog in the field-of-view of the environment currently represented in viewfinder 2004A, computer system 600 displays content option 2006C, a content-specific indication. As illustrated in FIG. 20C, content option 2006C includes a paw print icon and a text label identifying the recognized animal-type content more specifically as a golden retriever dog. While viewfinder 2004A is displayed in the live mode, content option 2006C is displayed at the top of viewfinder 2004A.

In some embodiments, the image and/or video processing techniques used to detect the types of content included in the base set of recognized content types are performed locally. For example, image and/or video processing services stored and executed on computer system 600 (e.g., without using remote services) are specifically trained for recognizing content of the base set of recognized content types. In some embodiments, computer system 600 displays content-specific indications, such as content option 2006C, with varying degrees of specificity. For example, computer system 600 displays content option 2006C with the text "Golden Retriever" based on the image and/or video processing techniques determining (e.g., with sufficient confidence) that the dog in viewfinder 2004A is a golden retriever (e.g., based on the dog's golden color, medium coat, floppy ears, size, and/or other visual characteristics), but content option 2006C may also identify the dog more generically as a "dog" or an "animal" (e.g., if the image and/or video processing techniques do not result in a more specific identification).

At FIG. 20D, the contents of viewfinder 2004A update to show more of the environment, including the dog, a potted cactus plant, and a sign on a building reading "Cat Café." As illustrated in FIG. 20C, in response to detecting additional content items of types included in the base set of recognized content types in viewfinder 2004A, computer system 600 additionally displays content option 2006D, a content-specific indication corresponding to plant-type content, and content option 2006E, a content-specific indication corresponding to place-type content, at the top of viewfinder 2004A. Content option 2006D includes a leaf icon and text label reading "cactus," and content option 2006E includes a leaf icon and text label reading "Cat Café."

At FIG. 20D, while displaying viewfinder 2004A in the live mode with content options 2006C, 2006D, and 2006E, computer system 600 detects one or more inputs directed to user interface 2004 via the touch-sensitive surface of display 606 and/or the hardware buttons (e.g., 602A, 602B, 602C, and/or 602D). For example, input 2008A includes button press inputs directed to one or more of the hardware buttons, input 2008B is an input directed to viewfinder control object 2004B, inputs 2008C, 2008D, 2008E, 2008F, and 2008G are inputs directed to selectable options 2006C, 2006D, 2006E, 2006A, and 2006B, respectively, and input 2008H is an input directed viewfinder 2004A. In some embodiments, input 2008A is a particular type of button input, such as a short press input (e.g., a press maintained for less than the long press duration threshold duration with at least a threshold intensity, such as a short light/partial press and/or a short hard/full press). Responses to the various inputs in FIG. 20D are illustrated in and described with respect to FIGS. 20E-20L.

Figure 20E:
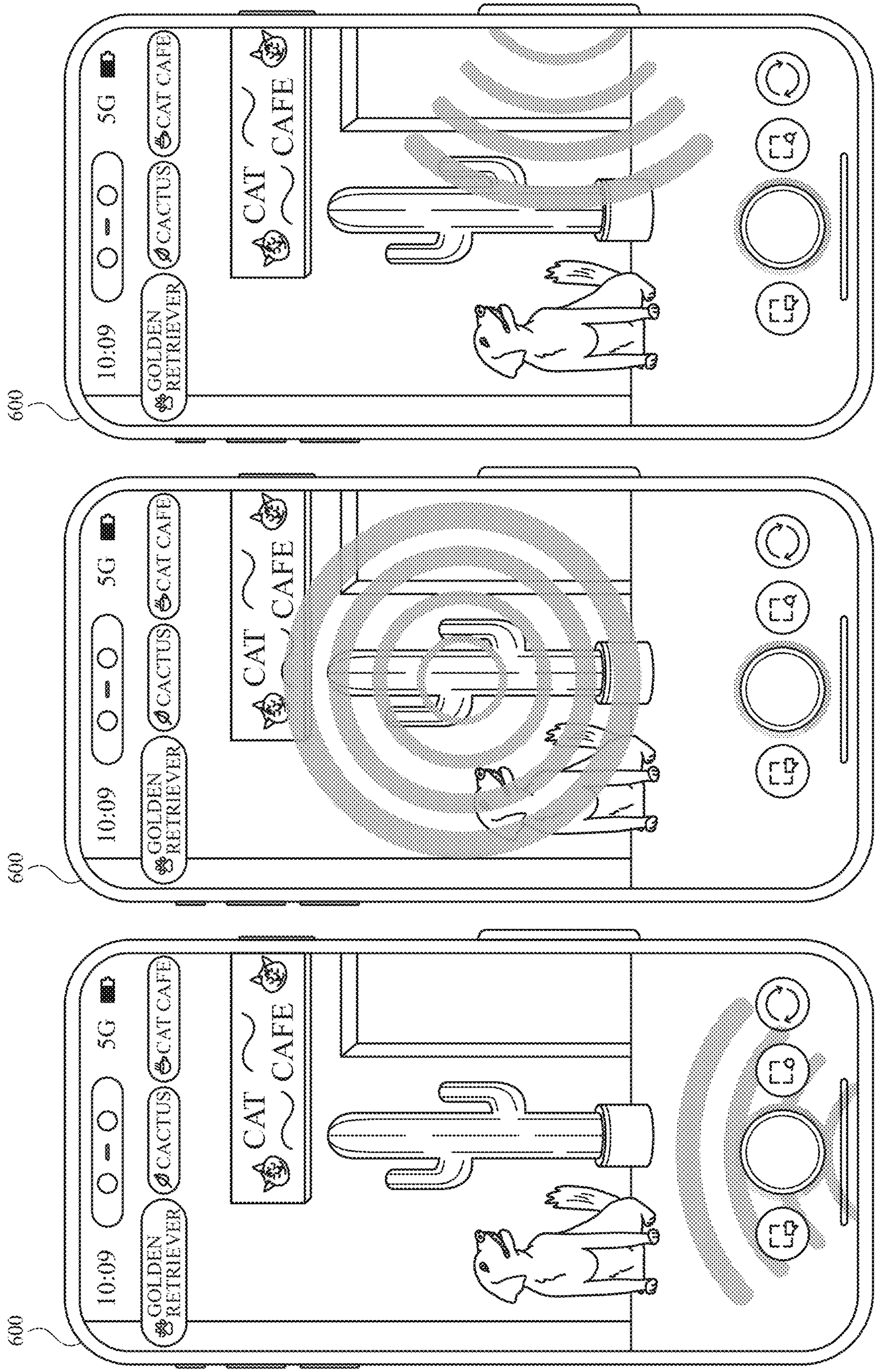
Figure 20G:
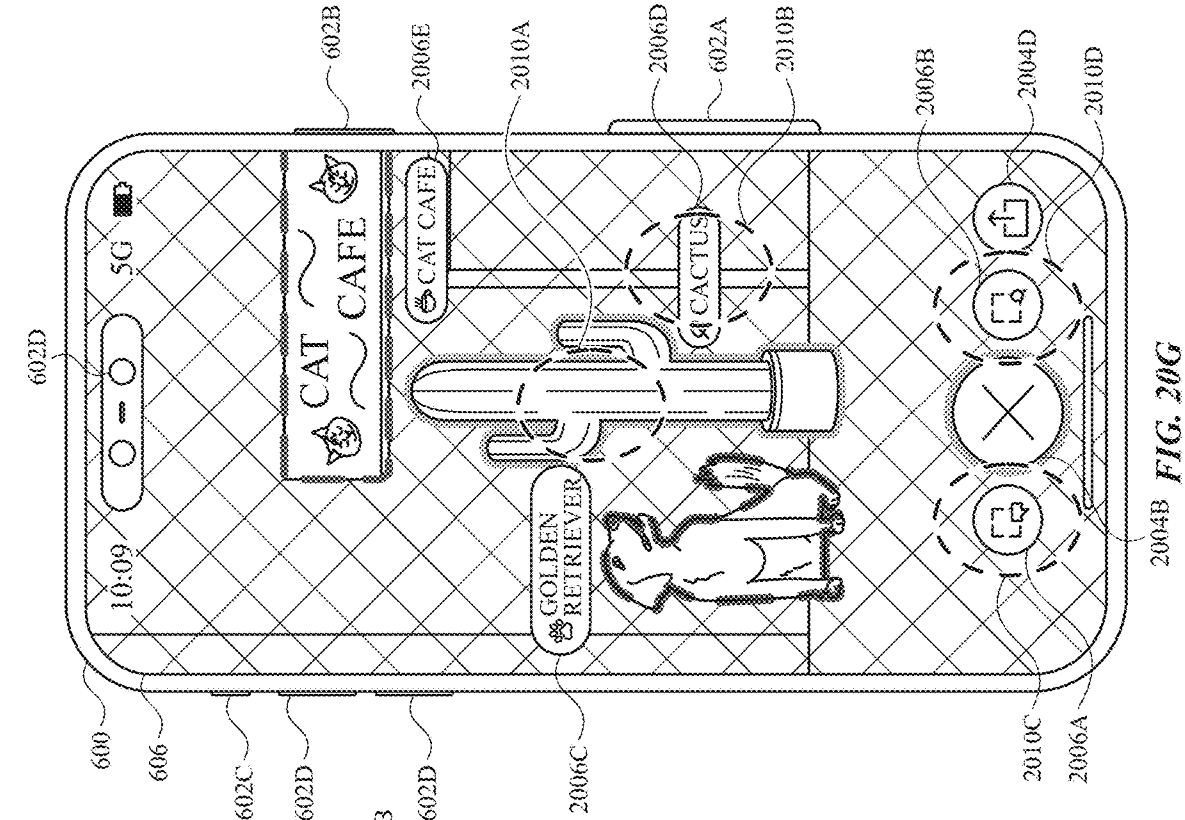
Figure 20F:
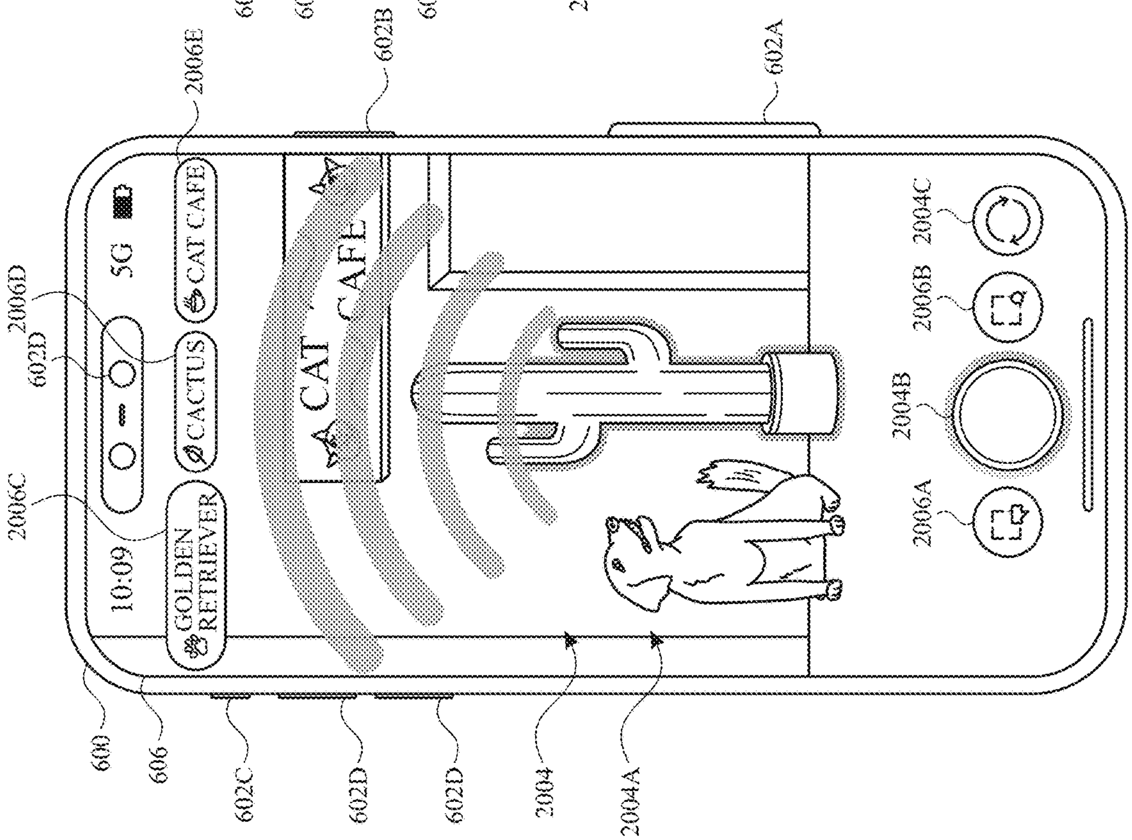

As illustrated in FIGS. 20E-20G, in response to the inputs detected at FIG. 20D (e.g., any of inputs 2008A-2008H), computer system 600 changes viewfinder 2004A from the live mode to a freeze frame mode. In the freeze frame mode, viewfinder 2004A pauses the feed of the representation of the field-of-view of the one or more cameras at a point at or near the time the inputs are detected, displaying a "freeze frame" rather than continuously updating to provide the live or near-live representation of the field-of-view of the one or more cameras. Accordingly, in the freeze frame mode, computer system 600 continues displaying the representation of the environment including the dog, cactus, and sign, even if the portion of the environment within the field-of-view of the one or more cameras changes. Additionally, as illustrated in FIG. 20G, in the freeze frame mode, computer system 600 ceases displaying camera selection object 2004C.

In some embodiments, computer system 600 changes viewfinder 2004A to the freeze frame mode in response to any of the inputs illustrated in FIG. 20D. For example, computer system 600 automatically changes viewfinder 2004A to the freeze frame mode while responding to selections of the selectable options (e.g., 2006A-2006E) as described below. In some embodiments, computer system 600 changes viewfinder 2004A to the freeze frame mode in response to input 2008A (e.g., the button press inputs directed to one or more of the hardware buttons), input 2008B (e.g., the input directed to viewfinder control object 2004B), and/or input 2008H (e.g., the input directed to viewfinder 2004A), but does not automatically change viewfinder 2004A to the freeze frame mode while responding to selections of the selectable options (e.g., 2006A-2006E).

As illustrated in FIGS. 20E-20F, in response to an input changing viewfinder 2004A to the freeze frame mode, computer system 600 displays a freeze animation of a visual overlay effect moving across the area of viewfinder 2004A (e.g., "scanning" the freeze frame). In some embodiments, the visual overlay effect is an effect similar to the edge effect displayed around viewfinder control object 2004B, such as a glow and/or shimmer effect in the same colors. As illustrated in FIG. 20E, computer system 600 displays the freeze animation emanating (e.g., traveling, spreading, and/or expanding outwards from) different points in viewfinder 2004A depending on the location of the detected input. As illustrated in the left panel of FIG. 20E, in response to input 2008A, the freeze animation emanates outwards from the bottom of display 606 near viewfinder control object 2004B. As illustrated in the center panel of FIG. 20E, in response to input 2008H, the freeze animation emanates outwards from the location of input 2008H. As illustrated in the left panel of FIG. 20E, in response to input 2008A directed to first button 602A, the freeze animation emanates outwards from the lower right of display 606 near first button 602A. Although not specifically illustrated, the freeze animation can emanate from other locations depending on the detected input, such as emanating from selectable options 2006A-2006E, emanating from near other hardware buttons, and/or emanating from other locations within viewfinder 2004A.

In addition to the visual overlay effect moving across viewfinder 2004A, the freeze animation includes animating an indication of content recognized in the freeze frame of viewfinder 2004A. As illustrated in FIG. 20F, as the visual overlay effect moves across viewfinder 2004A, computer system 600 visually emphasizes the portion of the freeze frame that includes the cactus plant, one of the content items of the base set of recognized content types. For example, computer system 600 applies a glow and/or shimmer effect in the same colors as the edge effect of viewfinder control object 2004B and/or the transition animation within and/or around the edges of the recognized cactus plant. In some embodiments, computer system 600 selects the cactus plant to visually emphasize in response to input 2008D, the input selecting content option 2006D for the cactus plant, and/or input 2008H, the input directed to the cactus plant in viewfinder 2004A (e.g., user selections of the cactus plant). In some embodiments, in response to inputs such as 2008A, 2008B, 2008G, and/or 2008F, which do not correspond to a specific content item in viewfinder 2004A, computer system 600 automatically selects the cactus plant to visually emphasize. In response to input 2008A (e.g., a button press input), 2008B (e.g., the input directed to viewfinder control object 2004B), and/or 2008H (e.g., the input directed to the cactus plant in viewfinder 2004A), computer system 600 displays user interface 2004 as described with respect to FIG. 20G.

At FIG. 20G, while displaying viewfinder 2004A in the freeze frame mode (e.g., once the freeze animation has completed), computer system 600 updates the appearance of user interface 2004. As illustrated in FIG. 20G, computer system 600 updates the appearance of viewfinder control object 2004B to indicate the freeze frame state, for instance, displaying viewfinder control object 2004B with an "X" icon, indicating that viewfinder control object 2004B can be selected to switch back to the live mode (e.g., as described with respect to FIG. 20AA-20AB). Instead of displaying the content-specific selectable options 2006C, 2006D, and 2006E at the top of viewfinder 2004A, computer system 600 distributes the content-specific selectable options throughout the area of viewfinder 2004A, displaying each at a location near the corresponding content. Additionally, computer system 600 displays share object 2004D (e.g., replacing camera selection object 2004C), a software button for sharing content from the visual intelligence experience (e.g., as described with respect to FIG. 20S-20V).

As illustrated in FIG. 20G, computer system 600 visually emphasizes the recognized content items within viewfinder 2004A, for instance, fading and/or darkening the background portions of the freeze frames (e.g., the portions in which content of the base set of recognized content types is not detected) and/or displaying the recognized content items with edge or fill effects. In some embodiments, the visual emphasis of the recognized content items within viewfinder 2004A indicates which of the recognized content items is currently active (e.g., based on an explicit user selection, such as inputs 2008D and/or 2008H, or an automatic selection by computer system 600). For example, as illustrated in FIG. 20G, computer system 600 displays the cactus plant with the visual effects (e.g., edge glow) that were applied during the freeze animation, but visually emphasizes the dog and the sign to a lesser extent. For example, the unselected recognized content items are emphasized with fainter, thinner, more transparent, lower-contrast, and/or otherwise less visually prominent effects than the cactus plant.

Figure 20I:
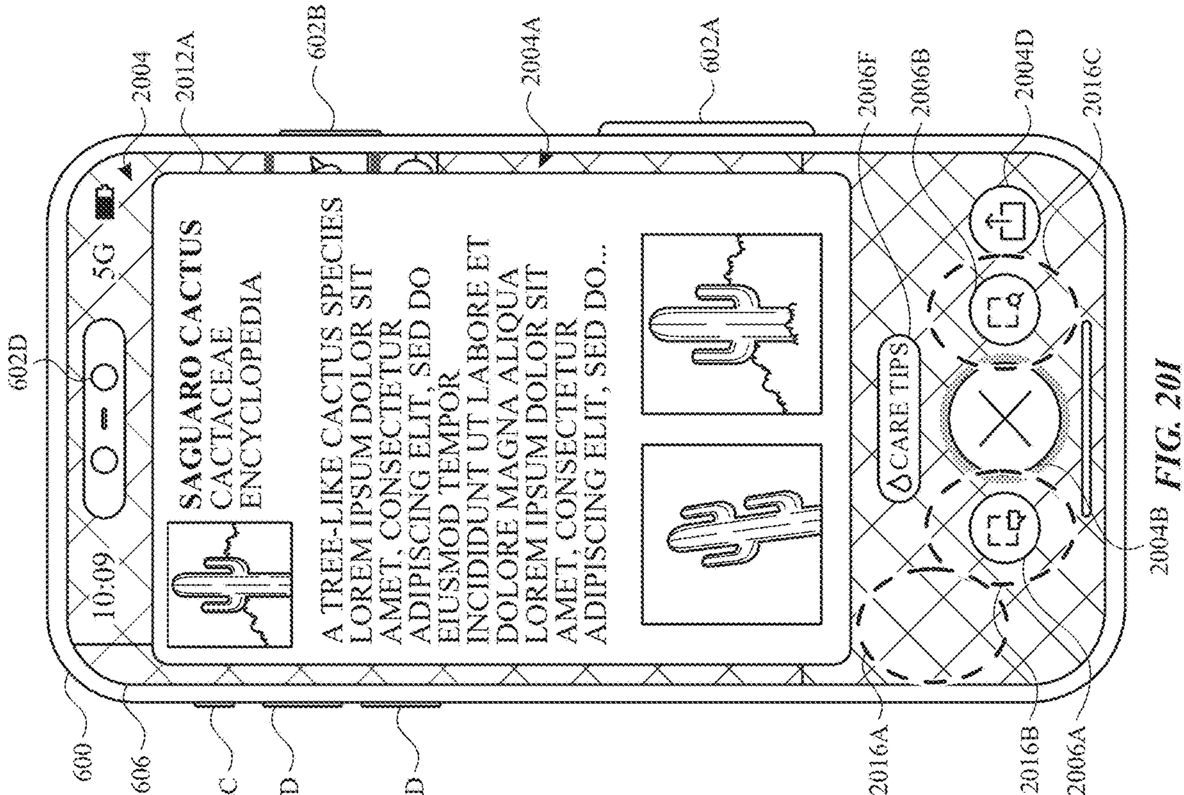
Figure 20H:
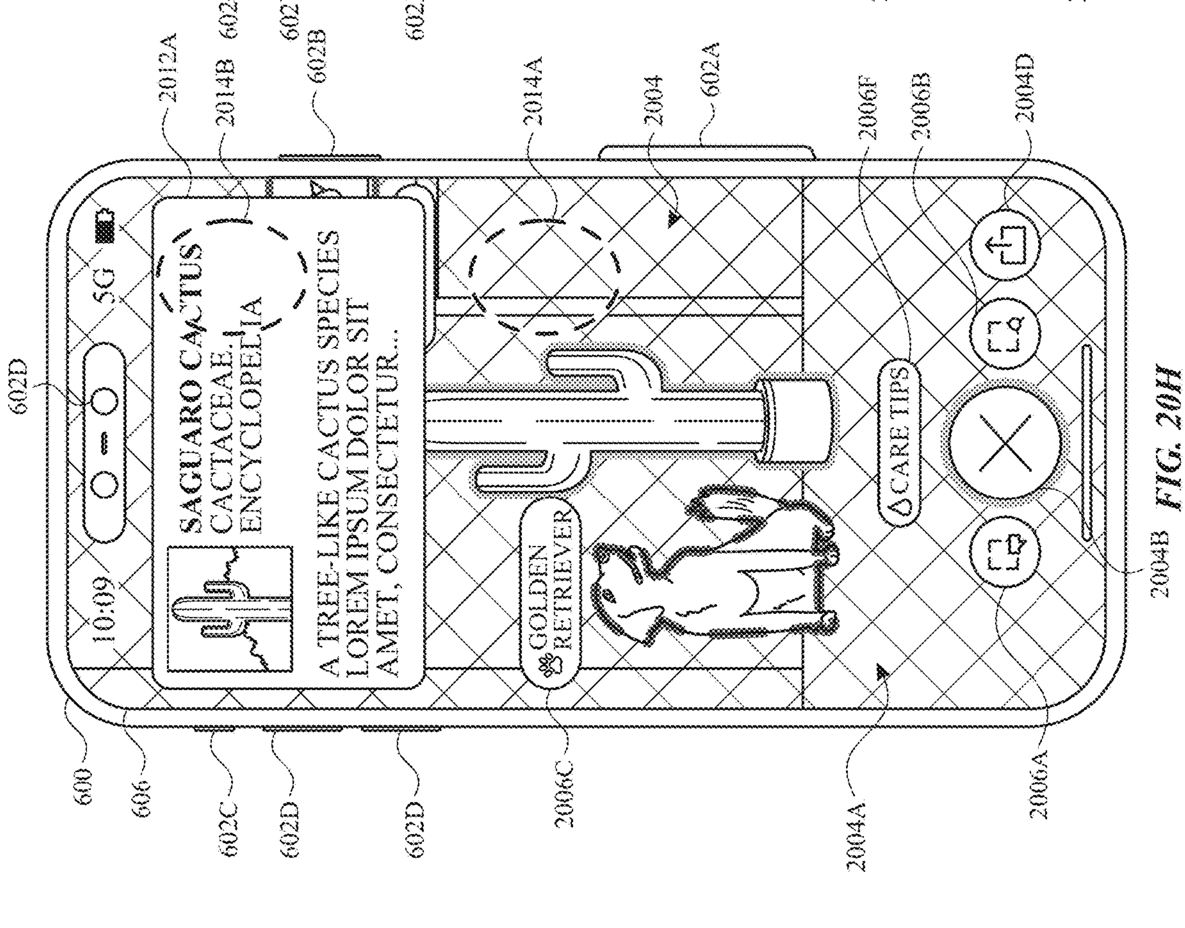

In response to detecting input 2008D at FIG. 20D, the input directed to content option 2006D for the cactus plant while viewfinder 2004A is in the live mode, computer system 600 displays user interface 2004 as described with respect to FIG. 20H. Alternatively, computer system 600 displays user interface 2004 as described with respect to FIG. 20H in response to input 2010A, an input directed to the cactus plant in viewfinder 2004A, and/or input 2010B, an input directed to content option 2006D, which are detected at FIG. 20D while viewfinder 2004A is in the freeze frame mode.

At FIG. 20H, while displaying viewfinder 2004A in the freeze frame mode, computer system 600 displays content panel 2012A, which includes additional information related to the cactus plant, for instance, identifying the cactus plant as a saguaro cactus, providing an image of a saguaro cactus, and/or providing a portion of text about the cactus species. As illustrated in FIG. 20H, computer system 600 displays content panel 2012A overlaying a top portion of user interface 2004 and/or viewfinder 2004A. In some embodiments, control panel 2012A replaces content option 2006D (e.g., content panel 2012A is an expanded view of content option 2006D). In response to input 2014A, an input directed to viewfinder 2004A outside of the region overlaid by content panel 2012A, computer system 600 ceases displaying content panel 2012A and resumes displaying content option 2006C (e.g., selecting outside of content panel 2012A minimizes the expanded view, returning user interface 2004 to the appearance illustrated in FIG. 20G).

In some embodiments, computer system 600 retrieves the additional information about the recognized cactus plant in response to detecting the cactus plant in viewfinder 2004A and/or detecting one or more of the inputs described above (e.g., 2008A, 2008B, 2008D, 2008H, 2010A, and/or 2010B). In some embodiments, the additional information is obtained from one or more local services, such as a knowledge base and/or application stored on and/or executed by computer system 600. In some embodiments, the additional information is obtained based on visual context information about the cactus determined using one or more local services, such as a machine vision model and/or other intelligence service stored on and/or executed by computer system 600. For example, the additional information about the saguaro cactus plant is obtained without transmitting visual content (e.g., portions of the image and/or video data captured by the one or more cameras and/or represented in viewfinder 2004A) to a remote service.

Additionally, at FIG. 20H, computer system 600 displays content option 2006F, a new content-specific indication for the cactus plant with the text "Care Tips." For example, content option 2006F is a follow-up suggestion, indicating additional information and/or actions computer system 600 can provide based on the identified visual context of the cactus plant. For example, in response to an input selecting content option 2006F, computer system 600 updates content panel 2012A with information about caring for cactus plants and/or displays a new overlay panel within user interface 2004, such as an embedded application user interface for a plant care application. In some embodiments, content option 2006F represents additional information and/or actions computer system 600 can provide without providing the visual content (e.g., the portions of the image and/or video data captured by the one or more cameras and/or represented in viewfinder 2004A) to a remote service.

In response to input 2014B, an input directed to content panel 2012A, computer system 600 expands content panel 2012A as illustrated in FIG. 20I, providing additional information beyond what was initially provided (e.g., in FIG. 20H), such as a larger portion of text about the cactus species and/or additional saguaro cactus images. In response to input 2016A, an input directed to viewfinder 2004A outside of the expanded region overlaid by content panel 2012A, computer system 600 ceases displaying content panel 2012A and resumes displaying content option 2006C (e.g., returning user interface 2004 to the appearance illustrated in FIG. 20G) and/or resumes displaying the more compact view of content panel 2012 illustrated in FIG. 20H.

Figure 20K:
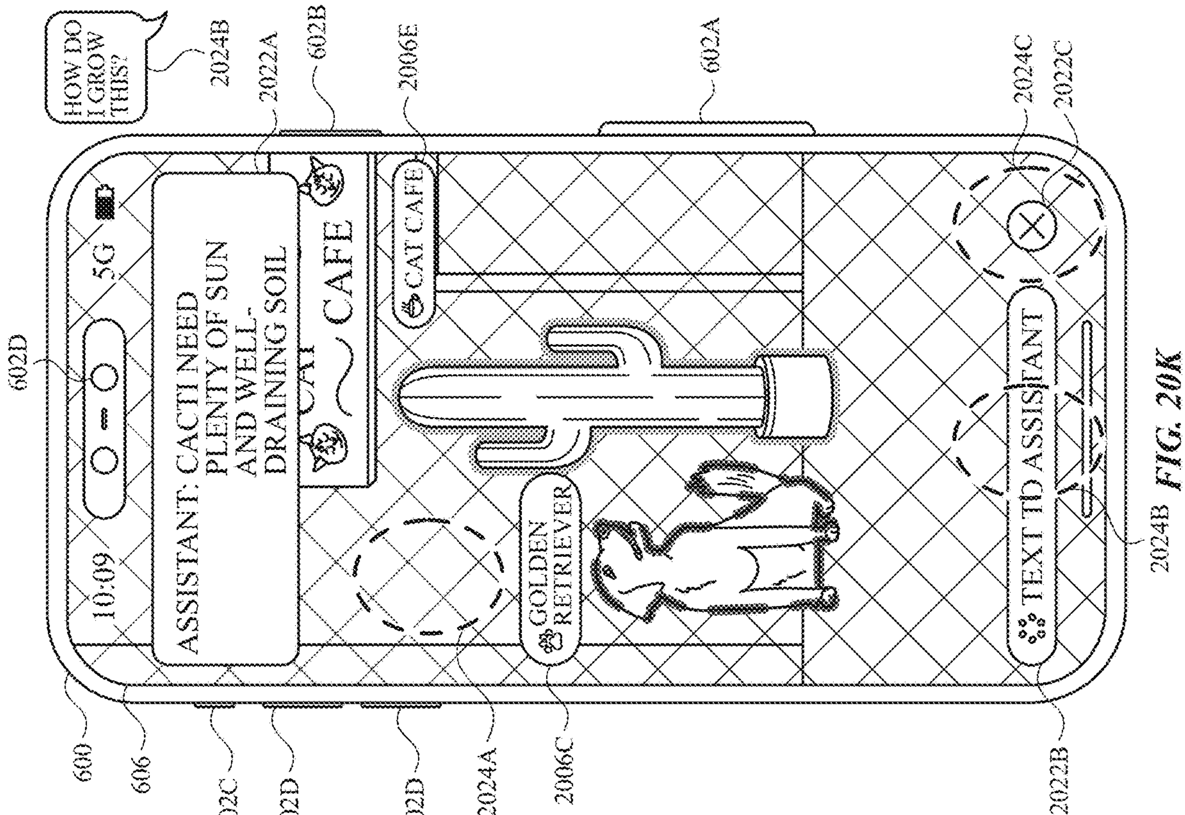
Figure 20J:
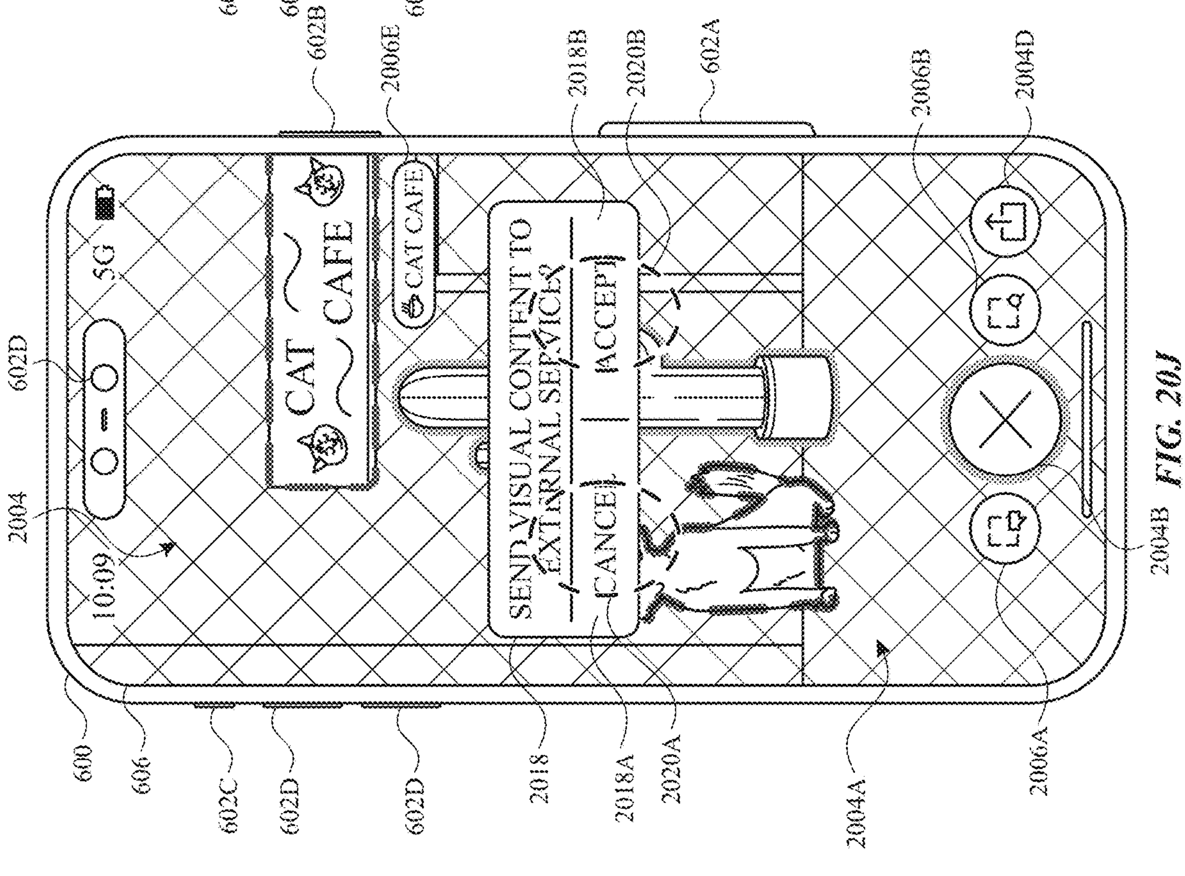
Figure 21:
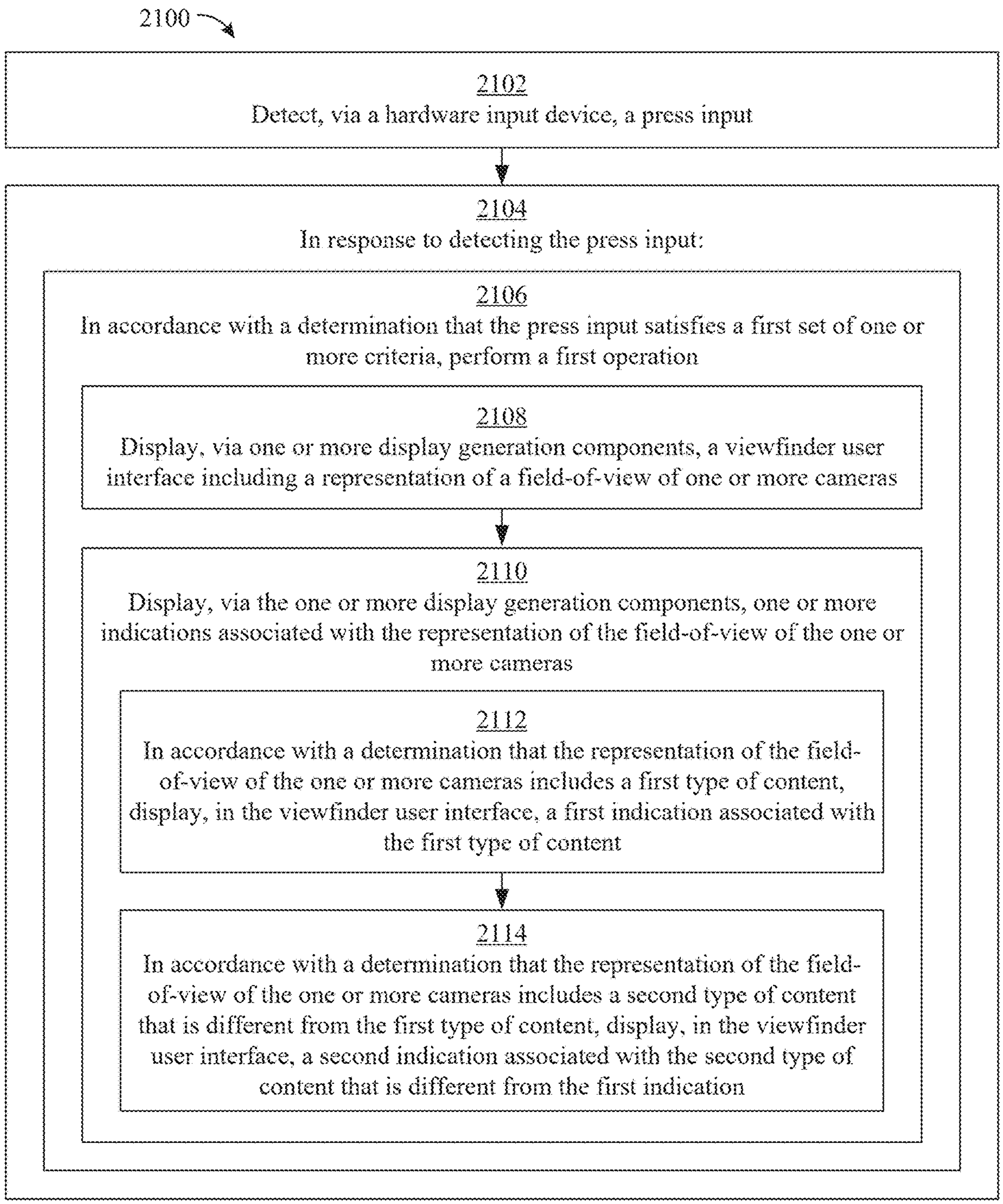
FIG. 21 is a flow diagram of methods for controlling visual intelligence functionality of a computer system with one or more cameras, in accordance with some embodiments.

In response to detecting input 2008E at FIG. 20D, the input directed to assistant option 2006A while viewfinder 2004A is in the live mode, computer system 600 displays user interface 2004 as described with respect to FIGS. 20J-20K. Alternatively, computer system 600 displays user interface 2004 as described with respect to FIGS. 20J-20K in response to detecting input 2010C and/or input 2016B directed to assistant option 2006A while viewfinder 2004A is in the freeze frame mode at FIG. 20G and 20I, respectively.

At FIGS. 20J-20K, while displaying viewfinder 2004A in the freeze frame mode, computer system 600 initiates a process for interacting with the visual intelligence experience using natural-language inputs using an assistant service, such as an intelligent automated assistant, chatbot service, and/or other AI process for providing generative content based on natural-language inputs and visual context information, such as a generative AI process that generates generative text to provide to the user as text and/or speech (e.g., synthesized speech) outputs in a conversational interaction.

In some embodiments, the assistant service is a remote service, such as a server-based assistant that computer system 600 communicates with over a network connection (e.g., ethernet, cellular data, WiFi, Bluetooth, and/or another type of communication network). Accordingly, at FIG. 20J, computer system 600 displays privacy user interface 2018, which includes an indication that visual content from the visual intelligence experience (e.g., portions of the image and/or video data captured by the one or more cameras and/or represented in viewfinder 2004A) will be provided to the remote service in response to the selection of assistant option 2006A if the user grant permission. Privacy user interface 2018 includes cancel option 2018A, which will cancel use of the assistant without providing (e.g., transmitting) any of the visual content to the remote service, and accept option 2018B, which grants permission to use the assistant by providing the remote service with the visual content. In response to input 2020A directed to cancel option 2018A, computer system 600 cancels use of the assistant, ceases displaying privacy user interface 2018, and returns user interface 2004 to the appearance illustrated in FIG. 20G.

In some embodiments, computer system 600 displays privacy user interface 2018 prior to providing visual content from the visual intelligence experience to any remote services (e.g., including the assistant service and/or the visual search engine, described further below), for example, requesting permission from the user each time visual content is to be transmitted remotely. In some embodiments, computer system 600 displays privacy user interface 2018 less frequently, for instance, requesting permission from the user only the first time a given remote service is to be used in a visual intelligence experience session.

In response to detecting input 2020B directed to accept option 2018B, at FIG. 20K, computer system 600 displays user interface objects for interacting with the assistant service overlaying a portion of user interface 2004 and/or viewfinder 2004A, including dialogue panel 2022A, text input field 2022B, and exit option 2022C. In response to an input such as input 2024A, directed to viewfinder 2004A outside of the user interface objects for interacting with the assistant service, and/or input 2024B, directed to exit option 2022C, computer system 600 ceases displaying the user interface objects for interacting with the assistant service (e.g., returning user interface 2004 to the appearance illustrated in FIG. 20G).

As illustrated in FIG. 20K, dialogue panel 2022A displays content generated by the assistant service based on a portion of visual content (e.g., image and/or video data captured by the one or more cameras and/or displayed in viewfinder 2004A) provided by computer system 600. In some embodiments, computer system 600 provides the assistant service with one or more entire frames (e.g., to generate responses based on the overall freeze frame). In some embodiments, because the cactus plant was the active recognized content item when assistant option 2006A was selected, computer system 600 provides the assistant service with a portion of the visual content used to recognize the cactus plant to use as the search query, for instance, cropping and/or cutting out one or more frames to isolate the cactus plant for response generation. In some embodiments, computer system 600 provides the portion of the visual content to the assistant service to use as an initial prompt or seed for generating a response. In some embodiments, in response to detecting the natural-language input "How do I grow this," received via input 2024C directed to text input field 2022B (e.g., a typed input, as described further with respect to FIG. 20Q) and/or speech input 2024B (e.g., detected via one or more audio input devices of computer system 600), computer system 600 provides a representation of the natural-language input to the assistant service as a prompt and provides the portion of the visual content to the assistant service as context information for responding to the prompt.

Figure 20M:
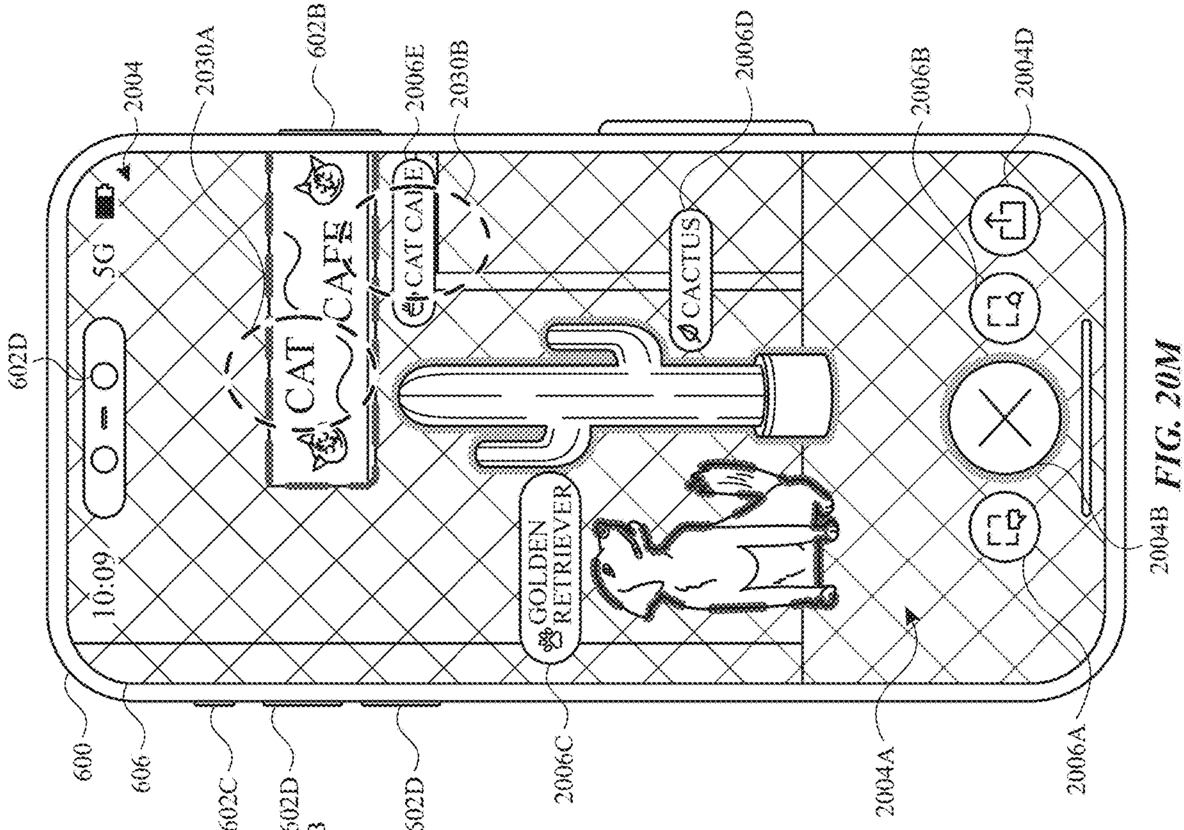
Figure 20L:
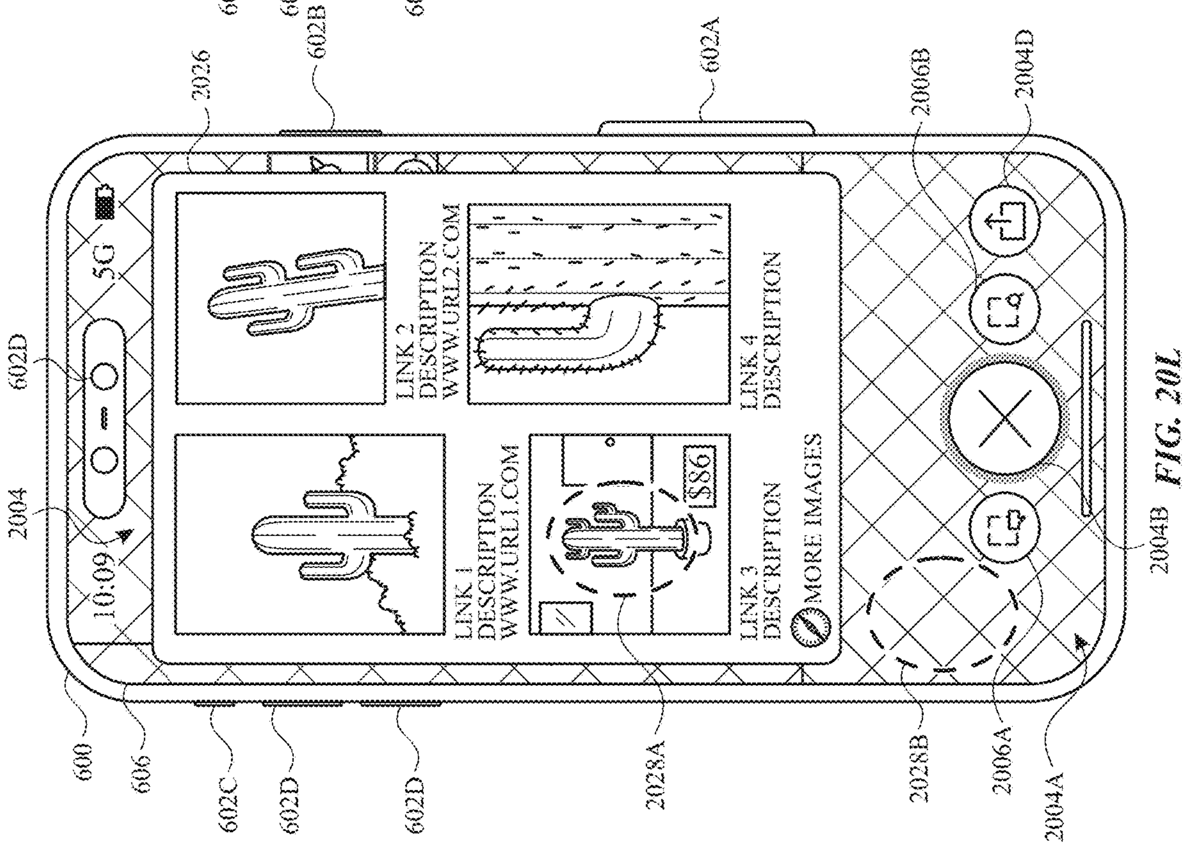

In response to detecting input 2008F at FIG. 20D, the input directed to search option 2006B while viewfinder 2004A is in the live mode, computer system 600 displays user interface 2004 as described with respect to FIG. 20L. Alternatively, computer system 600 displays user interface 2004 as described with respect to FIG. 20L in response to detecting input 2010D and/or input 2016C directed to search option 2006B while viewfinder 2004A is in the freeze frame mode at FIG. 20G and 20I, respectively.

At FIG. 20L, while displaying viewfinder 2004A in the freeze frame mode, computer system 600 initiates a process for performing a search based on the visual content of viewfinder 2004A using a visual search engine. In some embodiments, the visual search engine is a remote service, such as a web-based visual search engine (e.g., a reverse image search engine, which accepts image and/or video data as a search query and returns results that include the same or similar images and/or videos). Accordingly, in some embodiments, computer system 600 displays privacy user interface 2018 to request user permission prior to providing any visual content to the visual search engine, as described with respect to FIG. 20J.

As illustrated in FIG. 20L, computer system 600 displays search result panel 2026 overlaying a portion of user interface 2004 and/or viewfinder 2004A. Search result panel 2026 includes search results with image and/or video content the same as and/or similar to a portion of visual content (e.g., image and/or video data captured by the one or more cameras and/or displayed in viewfinder 2004A) provided by computer system 600 to the visual search engine. In some embodiments, computer system 600 provides the visual search engine with one or more entire frames (e.g., to perform a whole-image search, returning results with images similar to the overall freeze frame). In some embodiments, because the cactus plant was the active recognized content item when search option 2006B was selected, computer system 600 provides the visual search engine with a portion of the visual content used to recognize the cactus plant to use as the search query, for instance, cropping and/or cutting out one or more frames to isolate the cactus plant for searching. In some embodiments, search result panel 2026 provides options for interacting further with the results of the visual search. For example, the search results displayed in search result panel 2026 can be selected, via input 2028A, to navigate to the source of the selected result, and the text "more images" can be selected to display additional search results (e.g., within result panel 2026 and/or another user interface). In response to detecting input 2028B, an input directed to viewfinder 2004A outside of the region overlaid by search result panel 2026, at FIG. 20M, computer system 600 ceases displaying search result panel 2026, returning user interface 2004 to the appearance described with respect to FIG. 20G.

Figure 20O:
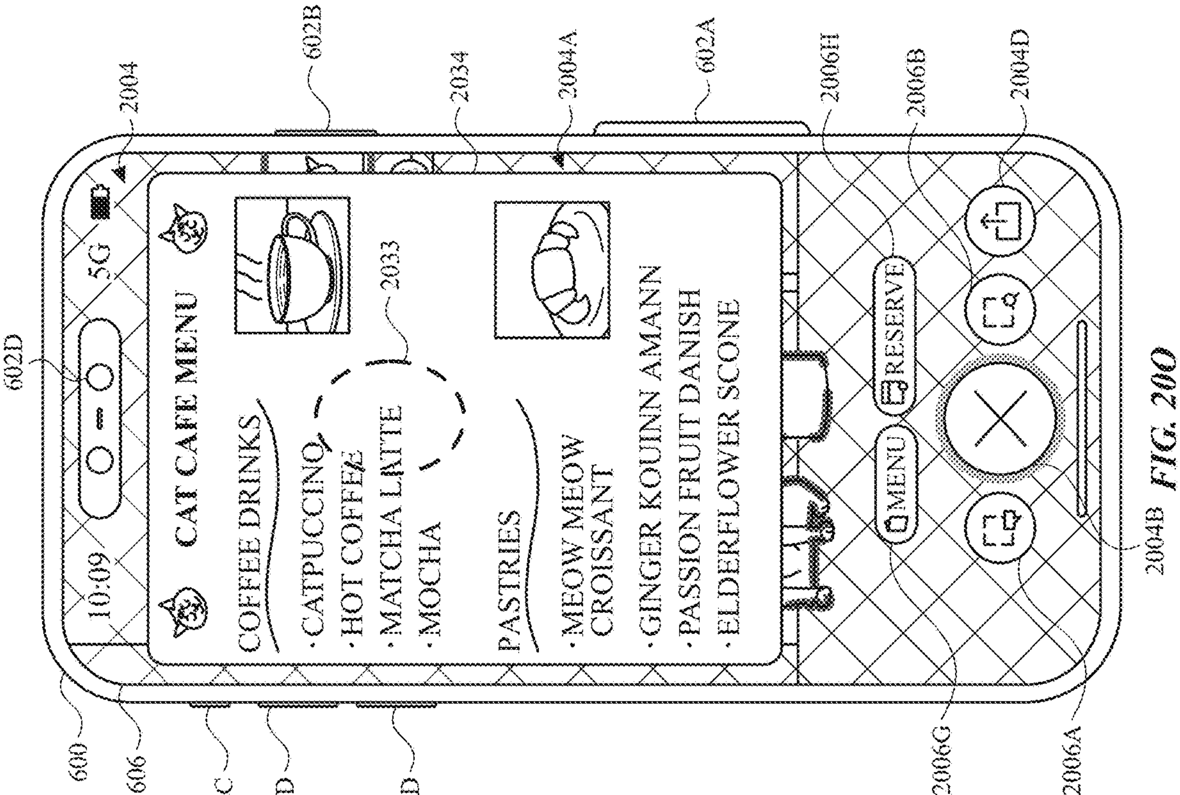
Figure 20N:
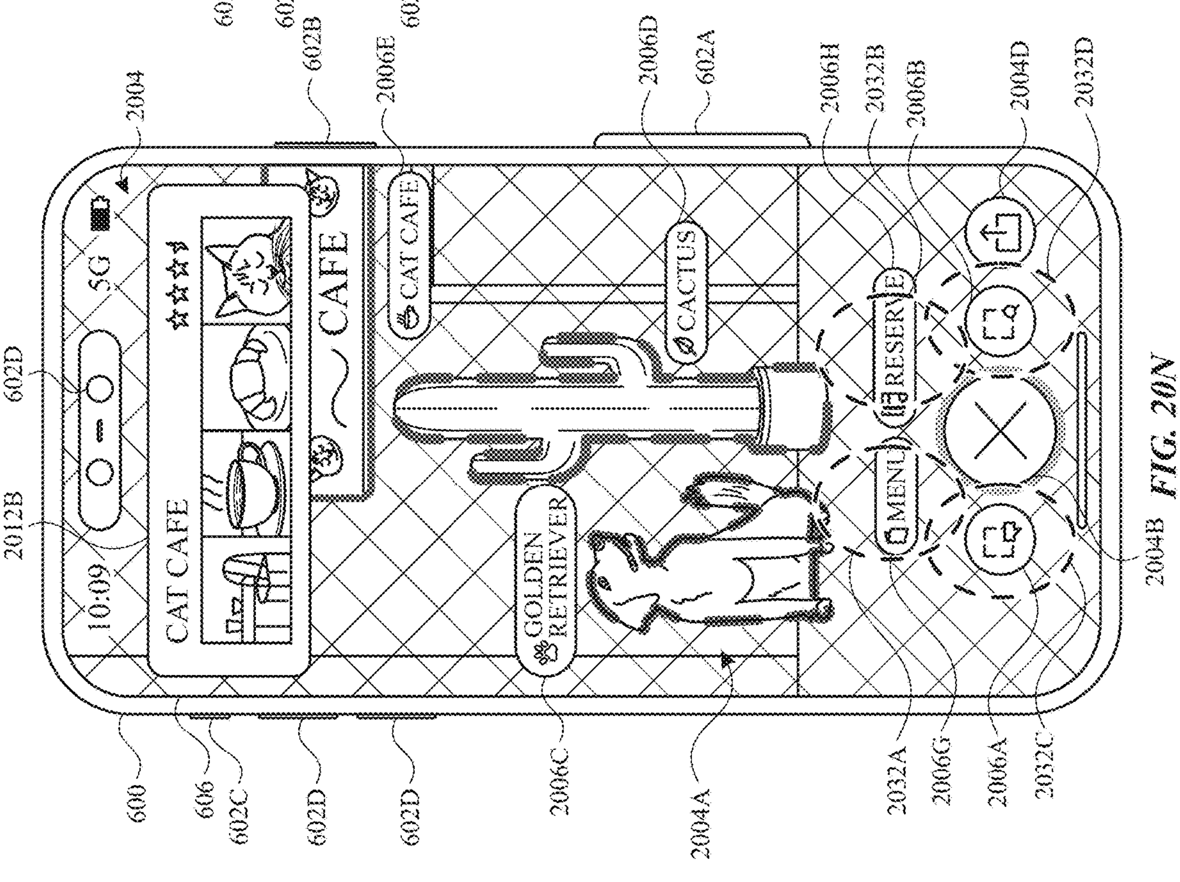

At FIG. 20M, computer system 600 detects an input such as input 2030A, which is directed to the sign reading "Cat Café" within viewfinder 2004A, and/or input 2030B, which is directed to content option 2006E for the sign. In response to input 2030A and/or input 2030B, computer system 600 selects the sign as the active recognized content item (e.g., replacing the cactus plant). As illustrated in FIG. 20N, computer system 600 updates the visual emphasis of the recognized content items within viewfinder 2004A to increase the visual emphasis on the sign and decrease the visual emphasis on the cactus plant, for instance, switching the more prominent edge glow effects on the border of the cactus plant to the border of the sign.

While the sign is selected as the active recognized content item in viewfinder 2004A, in response to inputs directed to assistant option 2006A and/or search option 2006B, computer system 600 performs actions based on the recognized sign (e.g., using a portion of the visual content of viewfinder 2004A) corresponding to the actions based on the recognized cactus plant described with respect to FIGS. 20J-20L (e.g., using the assistant service and/or visual search engine). For example, in response to input 2032C selecting assistant option 2006A, computer system 600 initiates a process for interacting with the visual intelligence experience using the assistant service (e.g., as described in more detail with respect to FIGS. 20P-20R), and in response to input 2032D selecting search option 2006B, computer system 600 initiates a process for performing a search based on the visual content of viewfinder 2004A using the visual search engine. Accordingly, although the results of the operations provided by assistant option 2006A and search option 2006B vary based on the specific visual content provided by computer system 600, the operations themselves are not content-specific (e.g., the assistant service and visual search engine can be used regardless of what content is recognized and/or selected in viewfinder 2004A).

In response to detecting input 2030A and/or input 2030B, at FIG. 20N, computer system 600 displays content panel 2012B, which includes additional information related to the café identified from the text of the sign selected in viewfinder 2004A, such as an average visitor rating and photos of the café. As described with respect to content panel 2012A for the cactus plant, in some embodiments, the additional information is obtained without transmitting visual content to a remote service. For example, the additional information provided in content panel 2012B is obtained from an application or service, such as a maps application and/or a crowdsourced review application, using the text extracted from viewfinder 2004A (e.g., using optical character recognition and/or another image-to-text processing technique) and non-visual contextual information (e.g., precise or approximate location information for computer system 600) as opposed to providing any external services with the image and/or video data itself. In some embodiments, selecting content panel 2012B expands content panel 2012B to display more and/or different information than illustrated in FIG. 20N, such as expanding content panel 2012B to include excerpts of visitor reviews, hours of operation, and/or contact information for the location.

As illustrated in FIG. 20N, in response to detecting input 2030A and/or input 2030B, computer system 600 also displays content option 2006G (e.g., a content-specific selectable indication with the text "menu") and content option 2006H (e.g., a content-specific selectable indication with the text "reserve"), representing follow-up suggestions for additional information and/or actions computer system 600 can provide based on the identified visual context of the café sign. At FIG. 20O, in response to input 2032A selecting content option 2006G, computer system 600 displays content panel 2034, including a menu for the café identified from viewfinder 2004A. As illustrated in FIG. 20O, content panel 2034 partially overlays user interface 2004 and/or viewfinder 2004A, providing the menu without navigating away from (e.g., closing) the visual intelligence experience. In response to inputs directed to content panel 2034, such as input 2033, the user can navigate through the menu (e.g., scrolling, paging back and forth, and/or viewing more detailed information for menu items), select items to add to an order (e.g., via an online ordering application), and/or perform other operations using the menu. Likewise, selecting content option 2006H (e.g., with input 2032B) opens a content panel for making a reservation for the café identified from viewfinder 2004A, for instance, displaying an embedded user interface overlaying viewfinder 2004A for using a restaurant reservation application and/or service (e.g., without navigating away from the visual intelligence experience).

Figures 20P, 20Q:
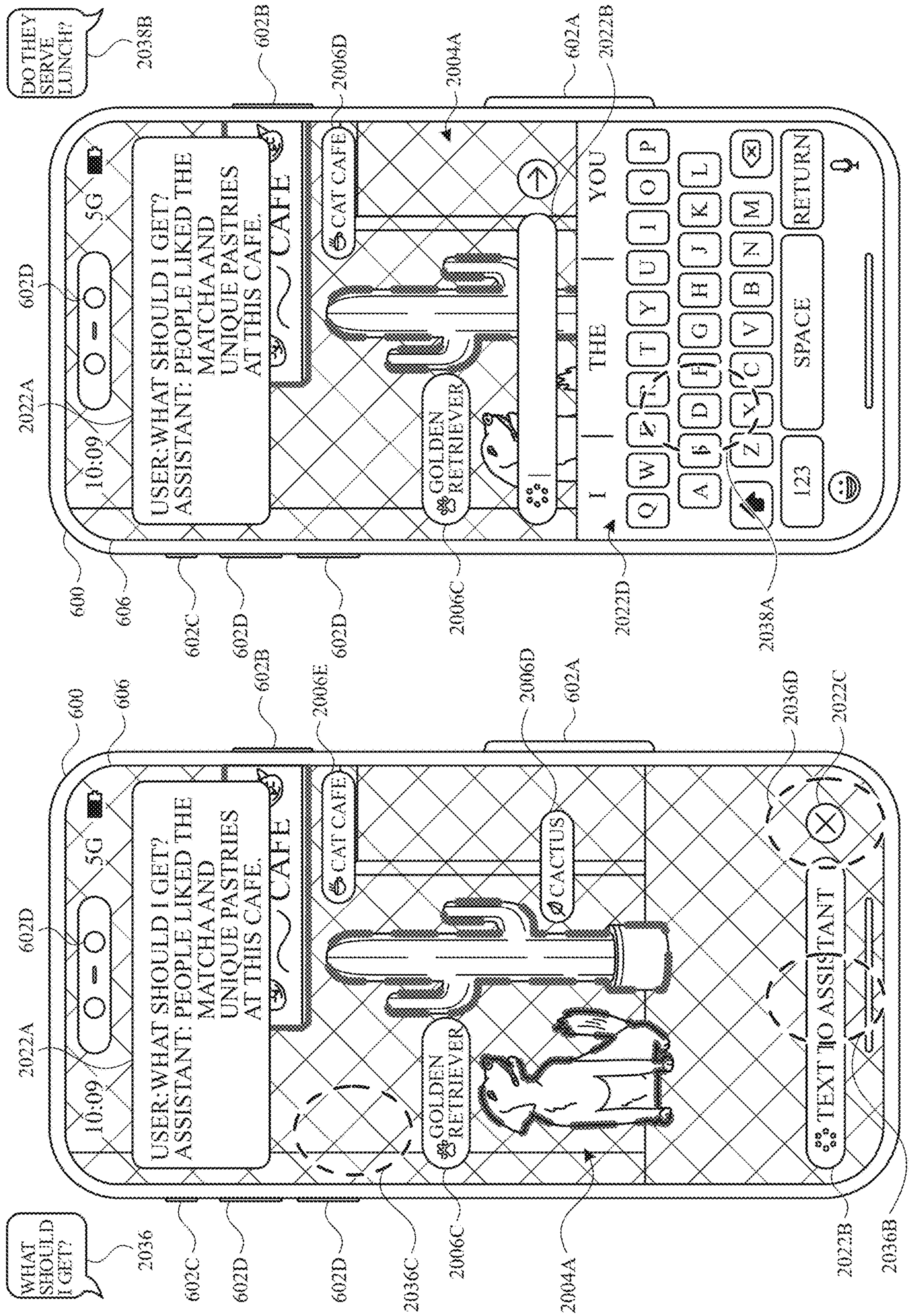

As FIG. 20P, in response to input 2032C, an input directed to assistant option 2006A while the sign is selected as the active recognized content item in viewfinder 2004A as illustrated in FIG. 20N, computer system 600 displays user interface objects for interacting with the assistant service, including dialogue panel 2022A, text input field 2022B, and exit option 2022C as described with respect to FIG. 20K. In some embodiments, as discussed with respect to FIG. 20J, computer system 600 displays privacy user interface 2018 and receives user permission (e.g., a selection of accept option 2018B) prior to providing any visual content to the assistant service and/or displaying dialogue panel 2022A, text input field 2022B, and exit option 2022C. In response to an input such as 2036C, directed to the region of viewfinder 2004A outside of the user interface objects for the assistant service, and/or input 2036D, directed to exit option 2022C, computer system 600 ceases displaying the user interface objects for interacting with the assistant service.

While displaying the user interface objects for interacting with the assistant service, computer system 600 detects speech input 2036A, "What should I get?" As illustrated in FIG. 20P, dialog panel 2022A displays a transcription of speech input 2036A and an initial response generated by the assistant service based on the natural-language prompt and/or a portion of visual content provided to the assistant service by computer system 600 (e.g., some or all of the freeze frame displayed in viewfinder 2004A and/or other whole or partial frames of camera data used to recognize the café). At FIG. 20Q, in response to detecting input 2036B, an input directed to text input field 2022B, computer system 600 displays virtual keyboard user interface 2022D for inputting natural-language text inputs to the assistant service (e.g., typing into text input field 2022B via the touch-sensitive surface of display 606). Virtual keyboard user interface 2022D partially overlays user interface 2004 and/or viewfinder 2004A such that viewfinder 2004A remains at least partially visible outside of the user interface objects for interacting with the assistant service.

At FIG. 20Q, computer system 600 detects another natural-language input (e.g., prompt), "Do they serve lunch?," directed to the assistant service, such as text (e.g., typed) input 2038A directed to virtual keyboard user interface 2022D and/or speech input 2038B. In response to receiving the natural-language input, at FIG. 20R, computer system 600 displays a transcription of the natural-language input (e.g., 2038A and/or 2038B) in dialog panel 2022A and uses the assistant service to generate another response, which is also displayed in dialog panel 2022A. Accordingly, while displaying the user interface objects for interacting with the assistant service, the user can engage in back-and-forth dialog with the assistant service about the visual context of viewfinder 2004A.

Figure 20S:
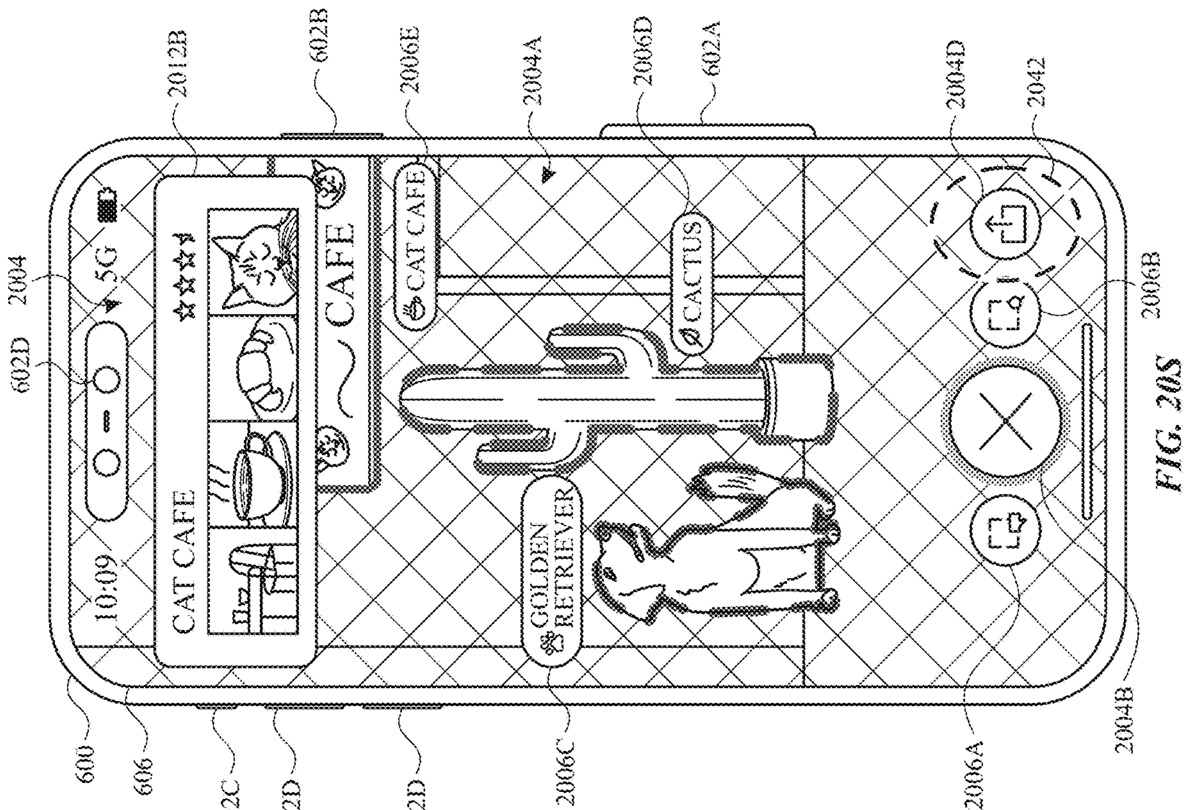
Figure 20R:
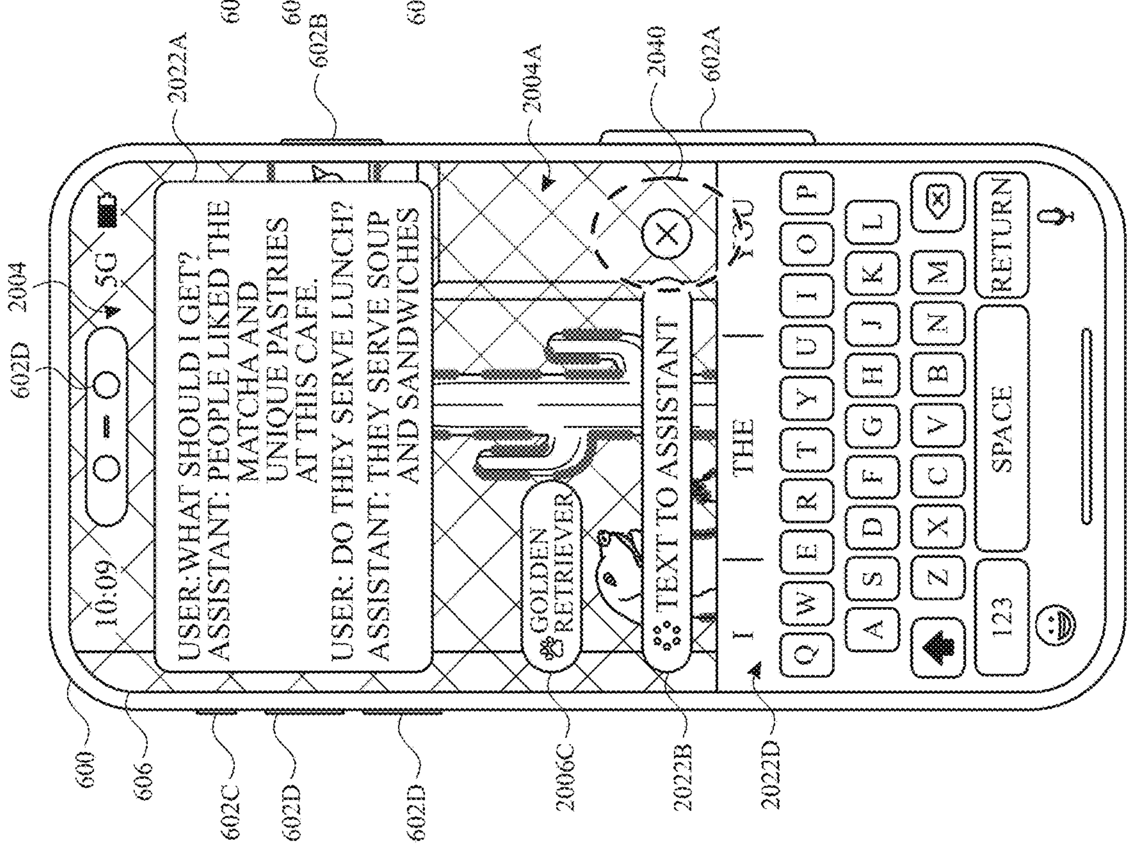

In response to detecting input 2040 directed to exit option 2022C, at FIG. 20S, computer system 600 ceases displaying the user interface objects for interacting with the assistant service (e.g., 2022A, 2022B, 2022C, and/or 2022D) and returns user interface 2004 to the appearance illustrated at FIG. 20S.

At FIG. 20S, computer system 600 detects input 2042, an input directed to share object 2004D, while the sign is selected as the active recognized content item in viewfinder 2004A. In response to input 2042, at FIG. 20T, computer system 600 displays content sharing user interface 2044, which includes user interface objects for sharing (e.g., exporting and/or transmitting) content from the visual intelligence experience with other applications, services, users, and/or devices. In response to an input such as input 2046A, directed to viewfinder 2004A outside of content sharing user interface 2044, and/or input 2046B, directed to a cancel option for content sharing user interface 2044, computer system 600 ceases displaying content sharing user interface 2044 (e.g., returning user interface 2004 to the appearance illustrated at FIG. 20S).

Figure 20U:
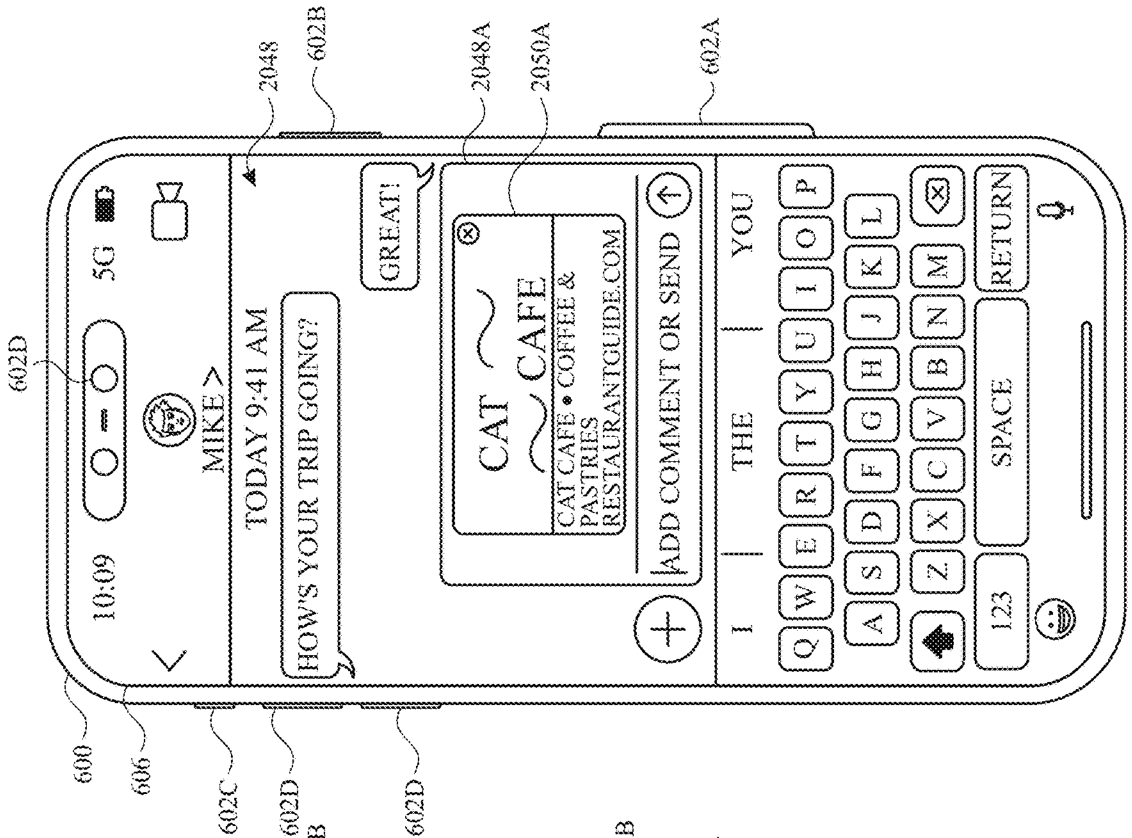

In response to input 2046C, an input directed to an option for messaging a particular contact included in content sharing user interface 2044, computer system 600 displays user interface 2048 for a messaging conversation with the particular contact (e.g., in a messaging application). As illustrated in FIGS. 20U-20V, computer system 600 populates input field 2048A for the messaging conversation with content from the visual intelligence experience. For example, as illustrated in FIG. 20U, computer system 600 populates input field 2048A with content item 2050A, a link to the information provided in content panel 2012B for the café identified from viewfinder 2004A (e.g., the link is a web link to the source of the information displayed in content 2012B). As another example, as illustrated in FIG. 20V, computer system 600 populates input field 2048A with visual content 2050B, a portion of the freeze frame displayed in viewfinder 2004A when input 2042 is detected cropped to focus on the café sign (e.g., the active recognized content item when input 2042 is detected).

Figure 20T:
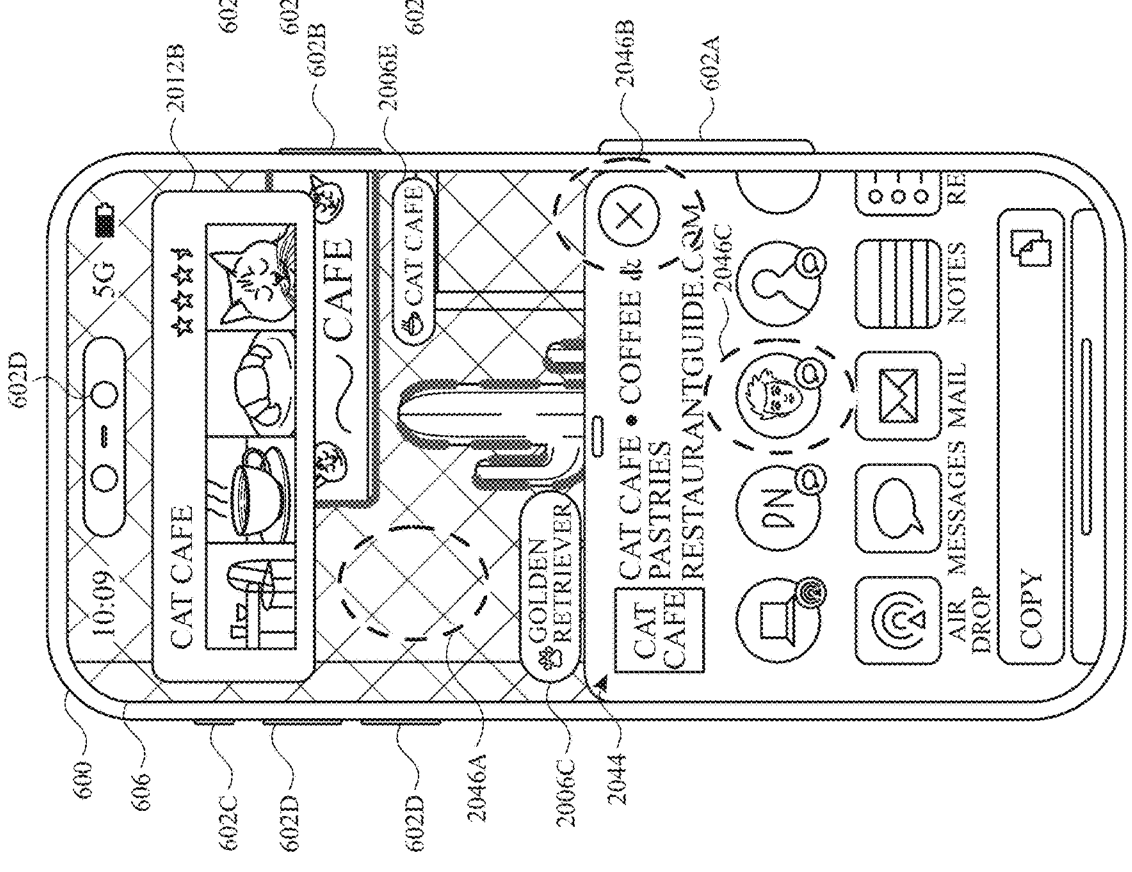
Figure 20V:
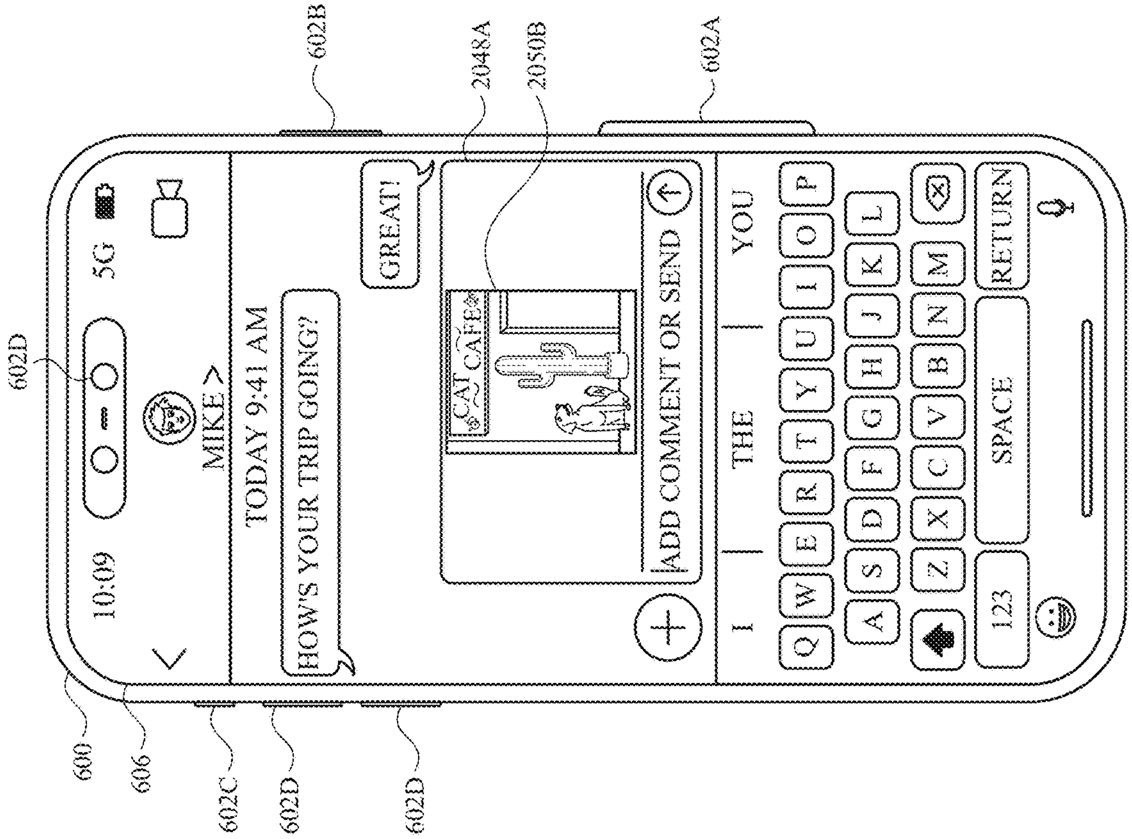
Figure 20W:
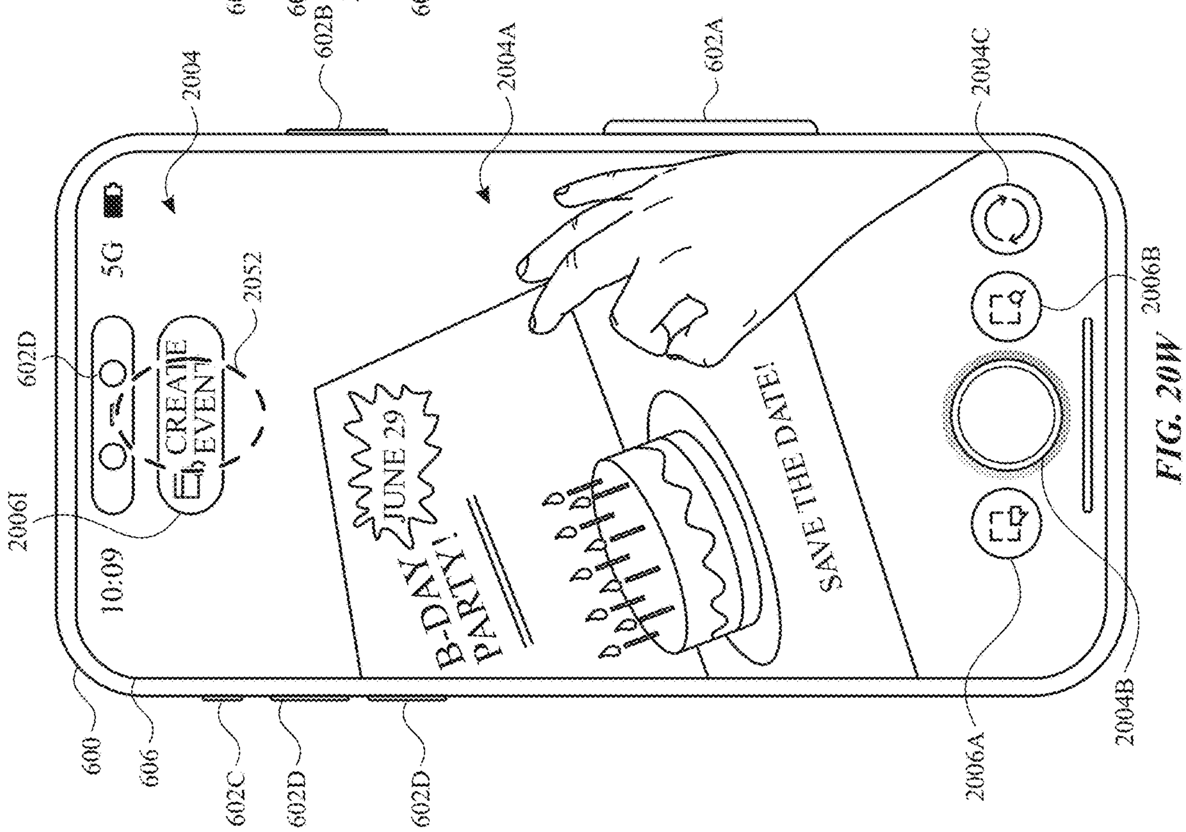

FIGS. 20W-20Z provide additional examples of interactions with visual content in the visual intelligence experience. As illustrated in FIG. 20W, while viewfinder 2004A is displayed in the live mode, the field-of-view of the cameras represented in viewfinder 2004A includes an invitation for a party. Computer system 600 determines that the field-of-view of the environment currently represented in viewfinder 2004A includes text content, a type of content included in the base set of recognized content types. Accordingly, computer system 600 displays content option 2006I, a content-specific indication based on the identified text. For example, in addition to extracting the text from viewfinder 2004A, computer system 600 processes the text based on the visual context of viewfinder 2004A to determine that the text relates to an upcoming event. Accordingly, content option 2006I provides a suggested action to add the upcoming event to a calendar application.

In response to input 2052 selecting content option 2006I, at FIG. 20×, computer system 600 displays calendar user interface 2054 partially overlaying user interface 2004 and/or viewfinder 2004A. In some embodiments, as illustrated in FIG. 20×, computer system 600 switches viewfinder 2004A to the freeze frame mode in response to input 2052 (e.g., displaying a freeze frame of the invitation in viewfinder 2004A without updating viewfinder 2004A based on the current field-of-view of the cameras). Calendar user interface 2054 includes event information determined from viewfinder 2004A and options for editing and/or adding the event information to the calendar application. For example, in response to input 2056A selecting the add option, computer system 600 causes the calendar application to create an event based on the event information determined from viewfinder 2004A (in some embodiments, without navigating to the calendar application, e.g., creating the event using a background process). For example, in response to input 2056B selecting the edit option, computer system 600 displays user interface objects for editing the event information determined from viewfinder 2004A, allowing the user to add additional details (e.g., a location for the event) and/or modify the extracted event information (e.g., adding a more specific name for the event, such as "Tina's 6th birthday party").

Figure 20X:
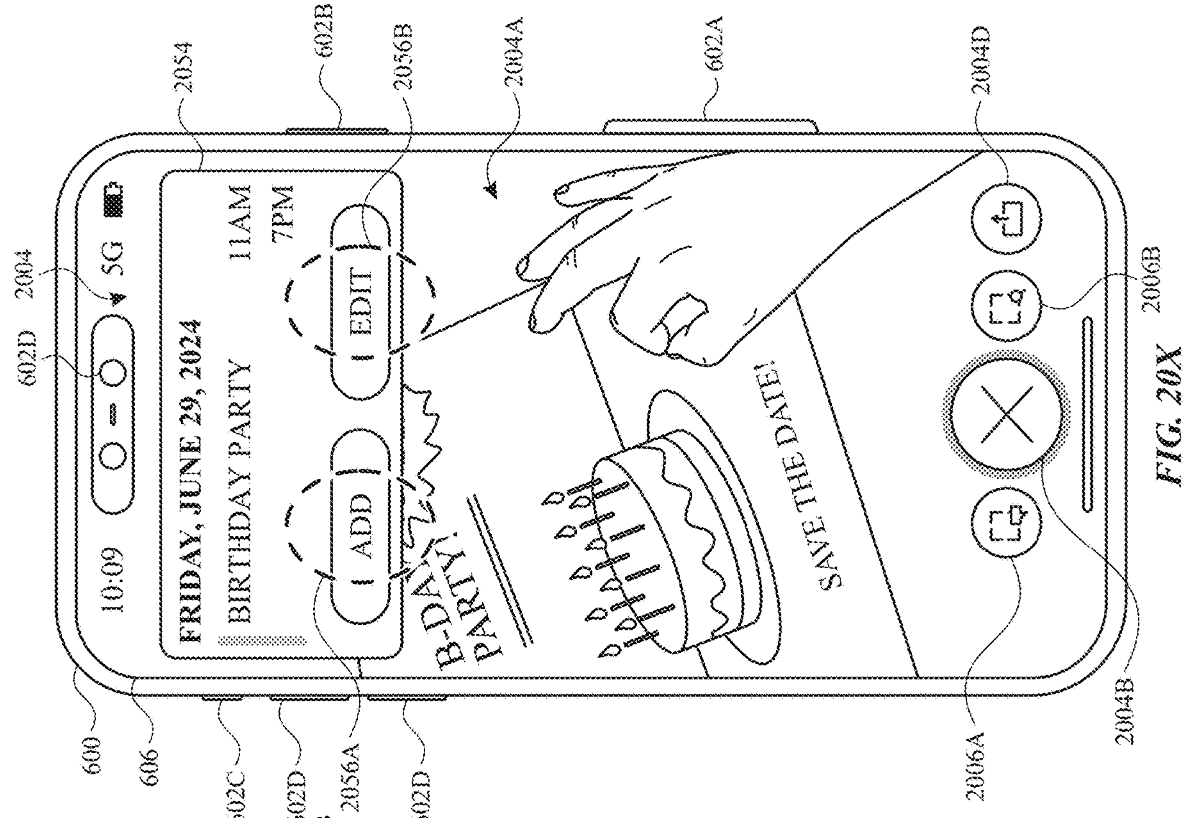
Figure 20Z:
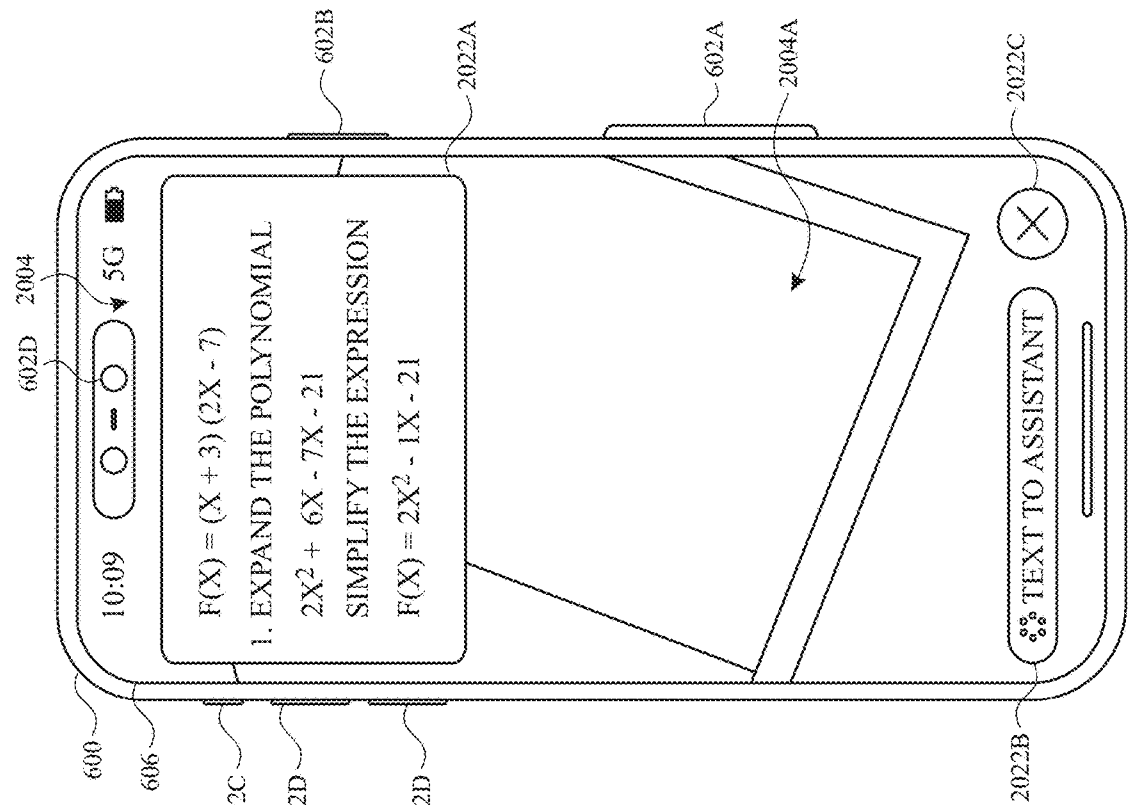
Figure 20Y:
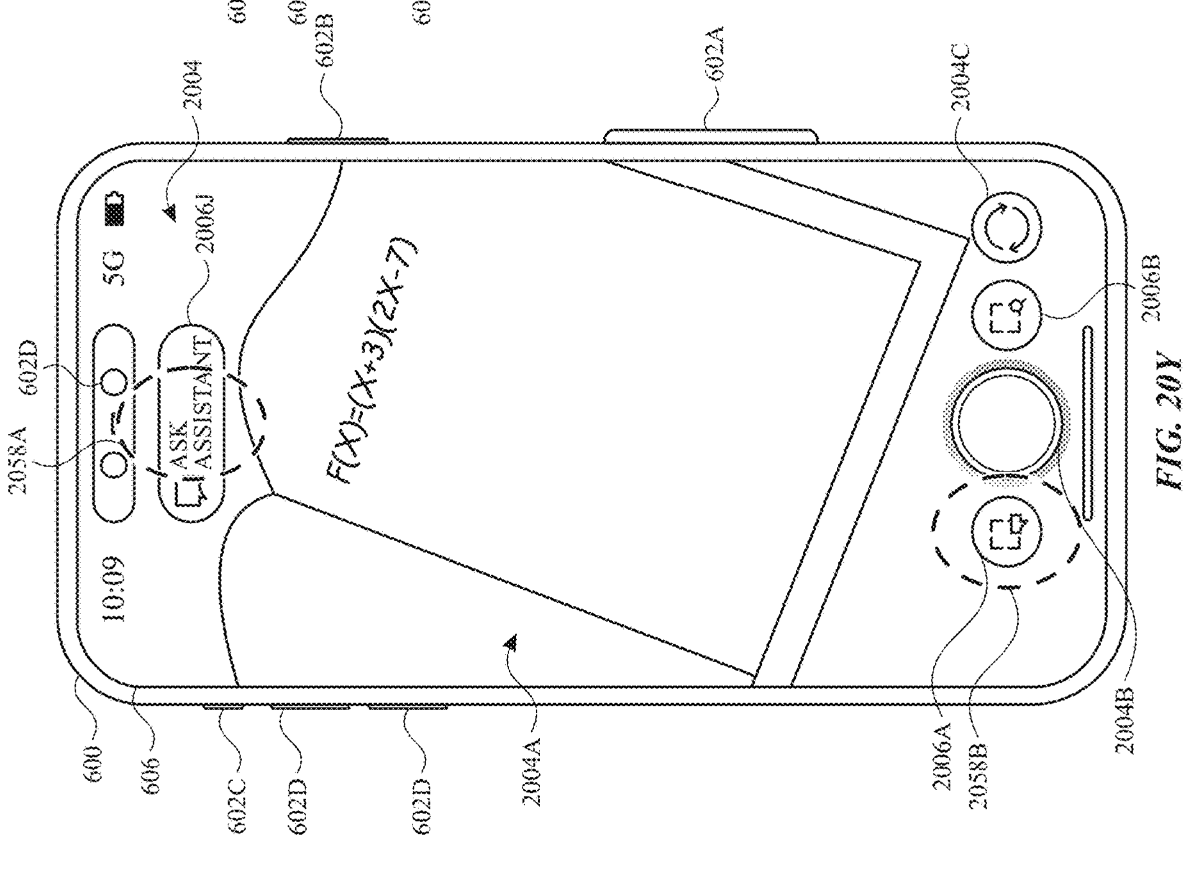
Figure 20A:
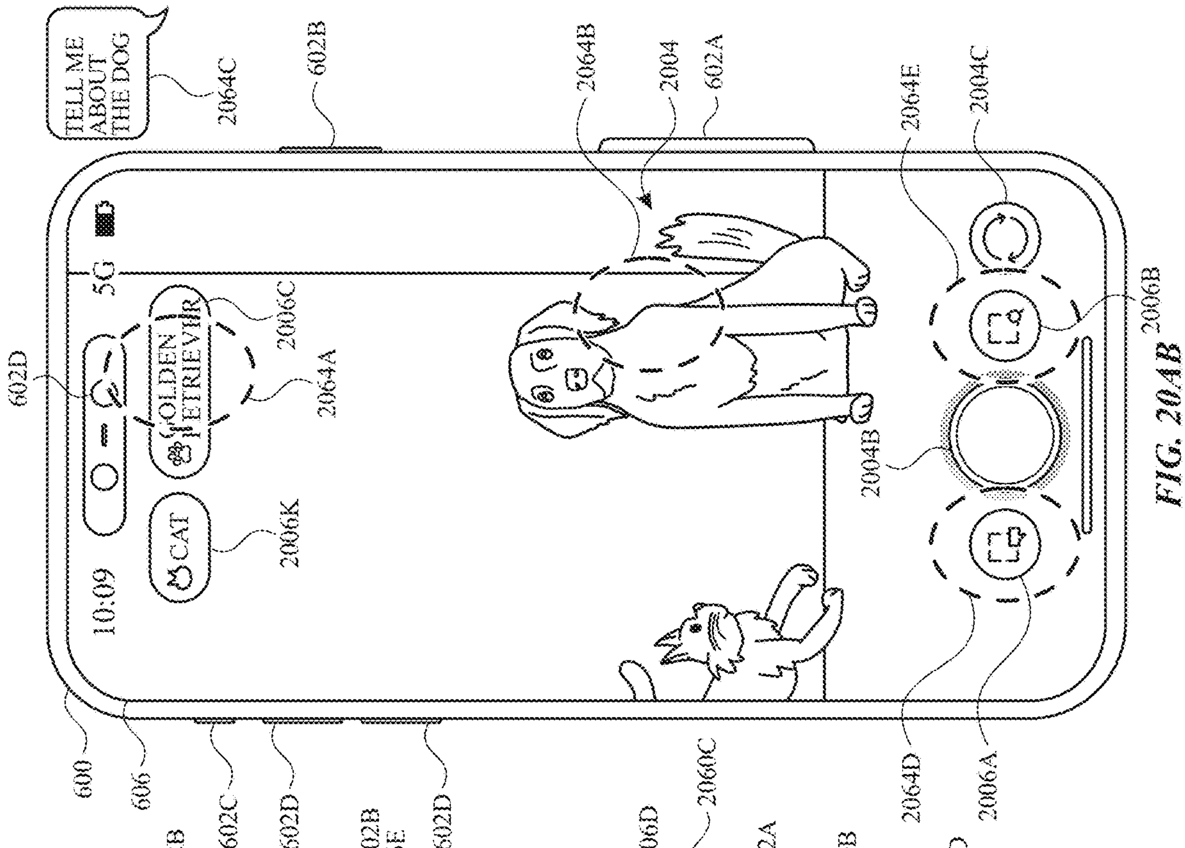
Figure 20A:
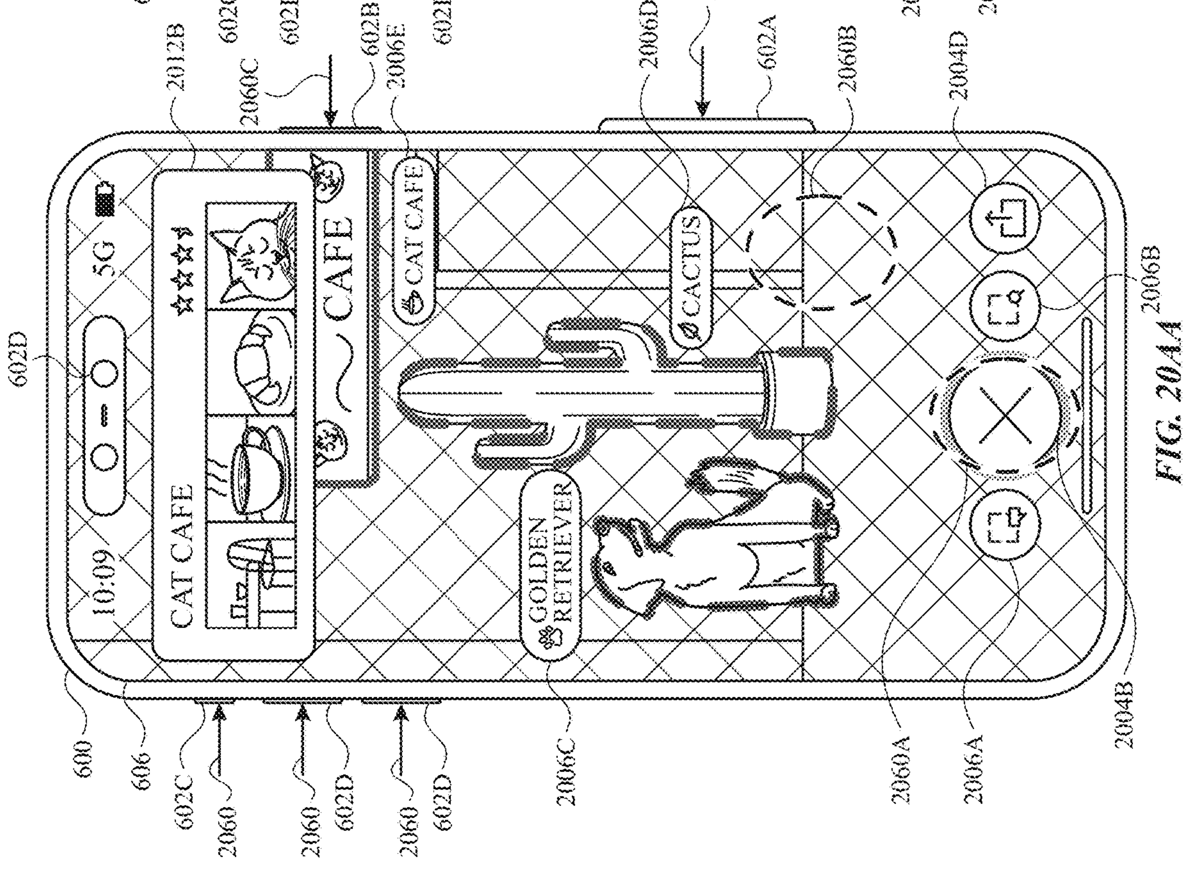
Figure 20A:
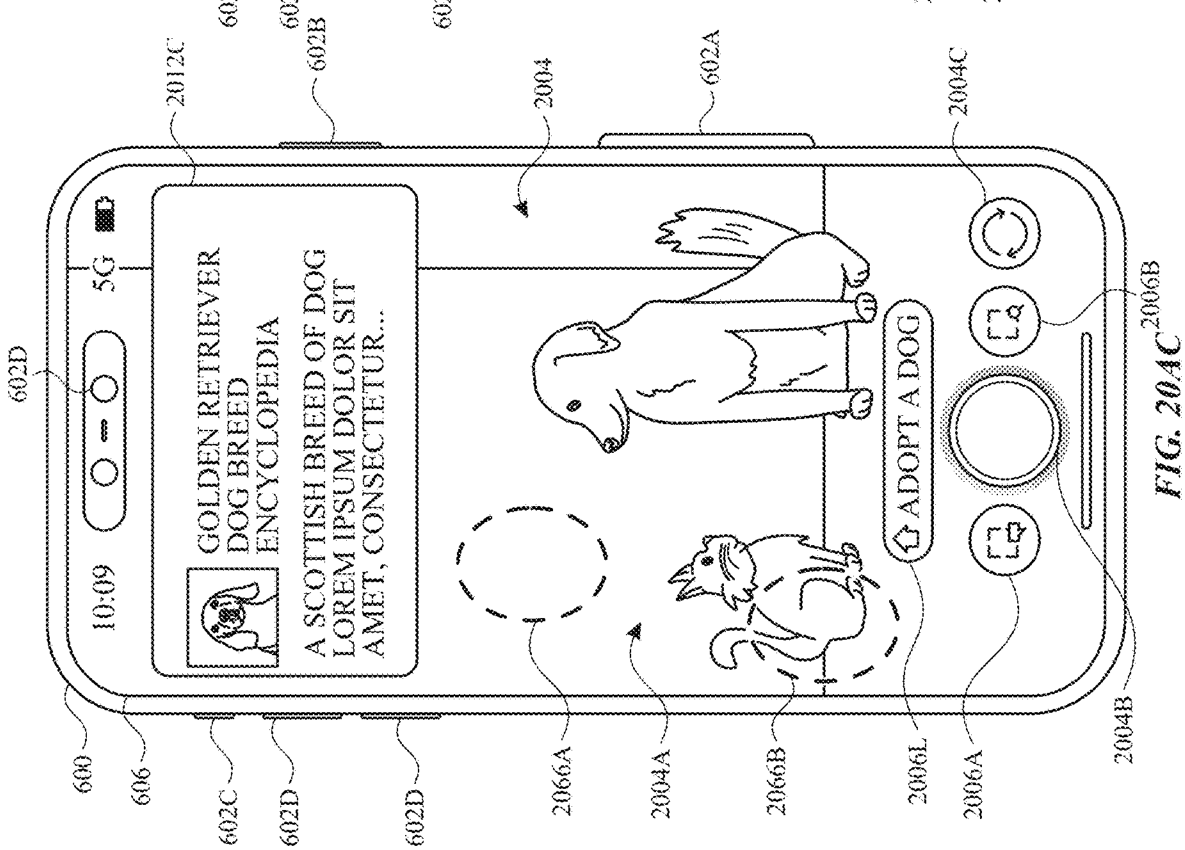
Figure 20A:
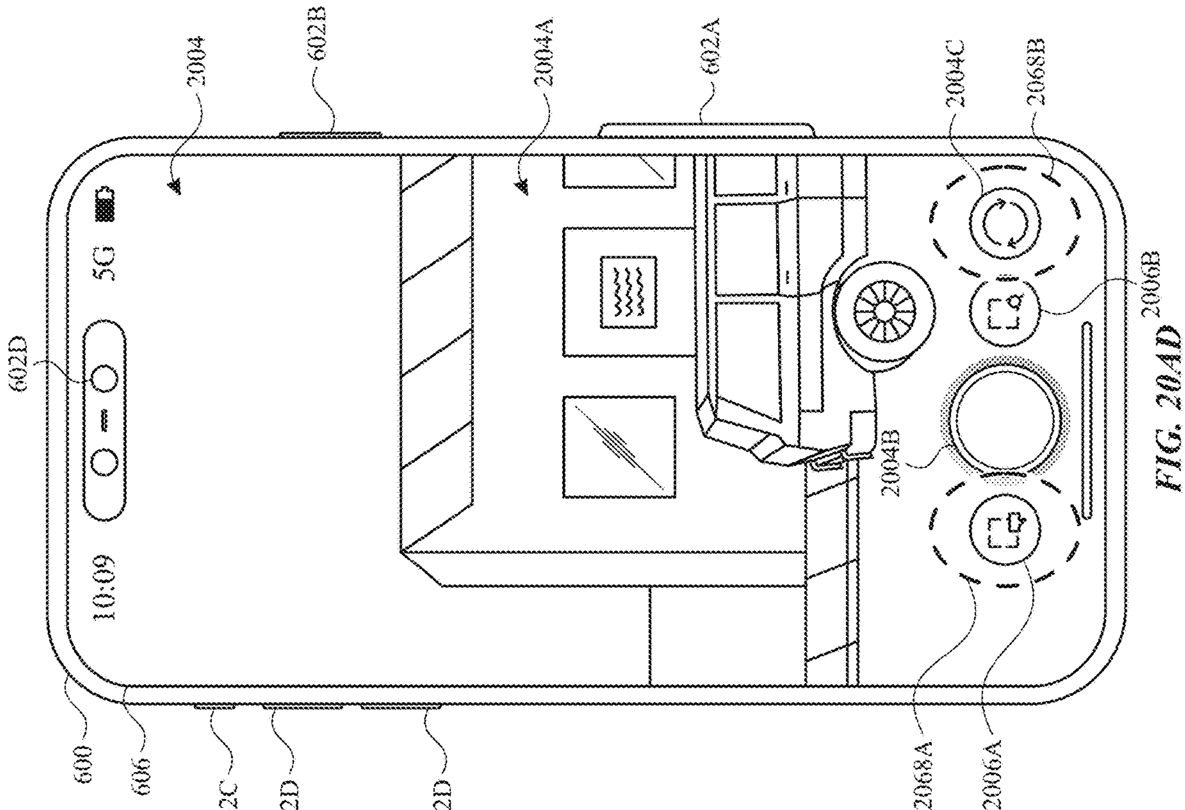
Figure 20A:
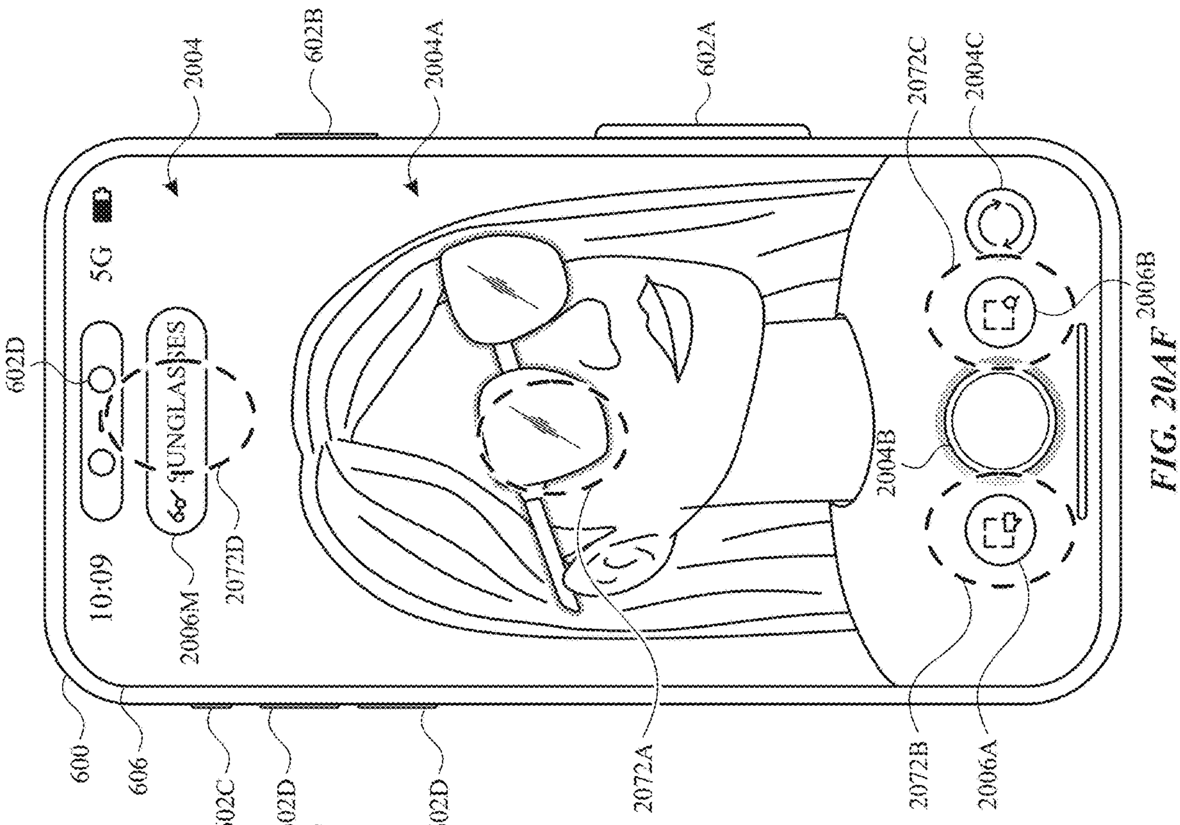
Figure 20A:
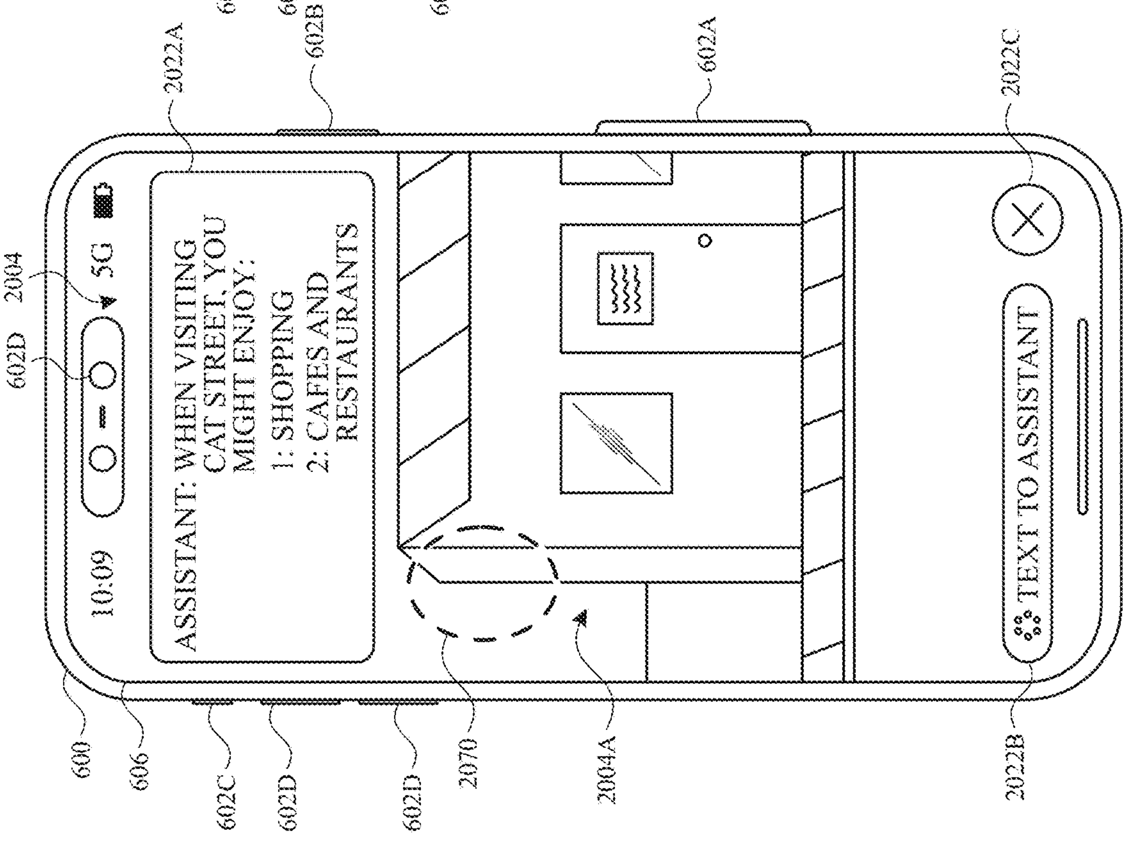
Figure 20A:
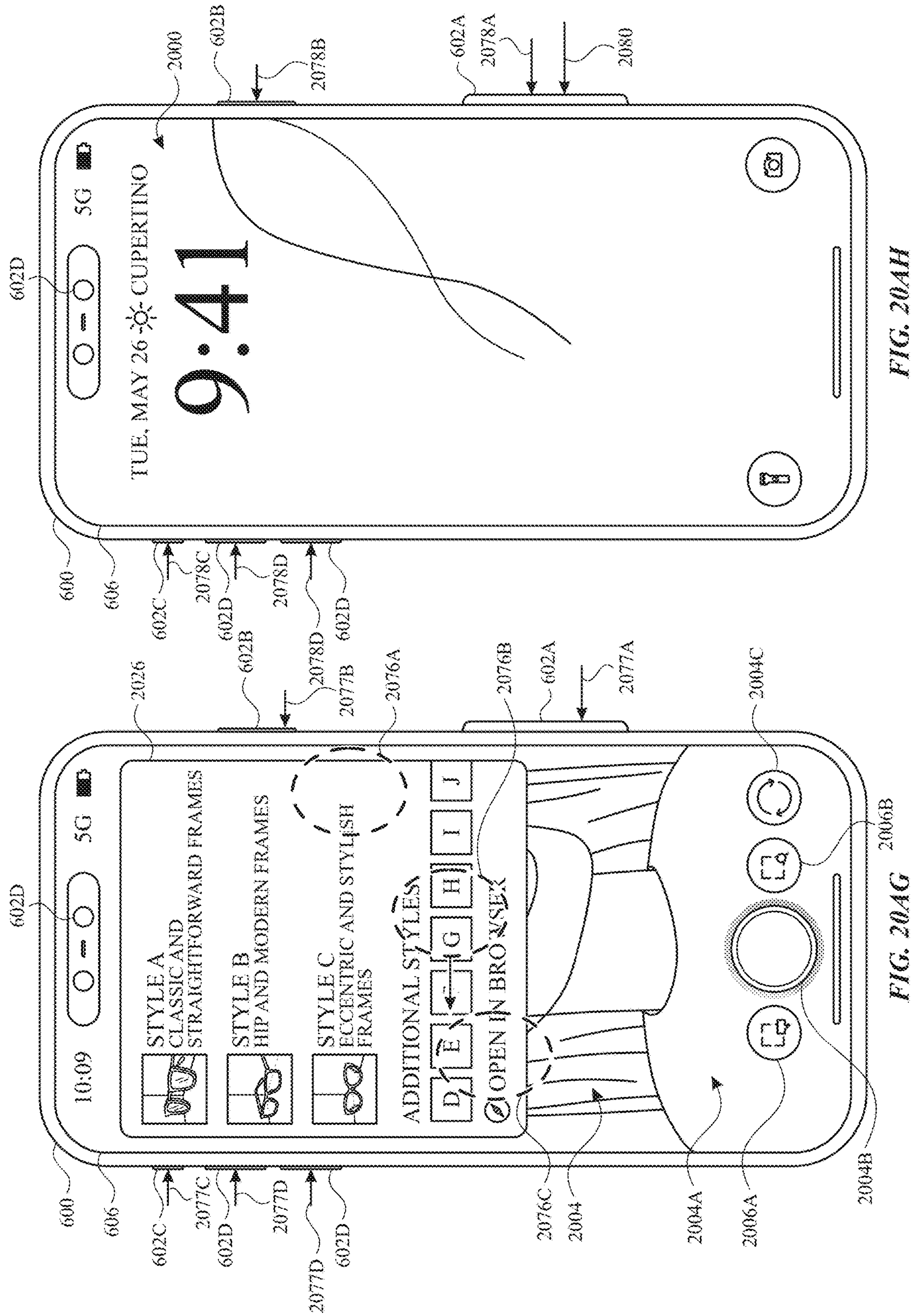
Figure 20A:
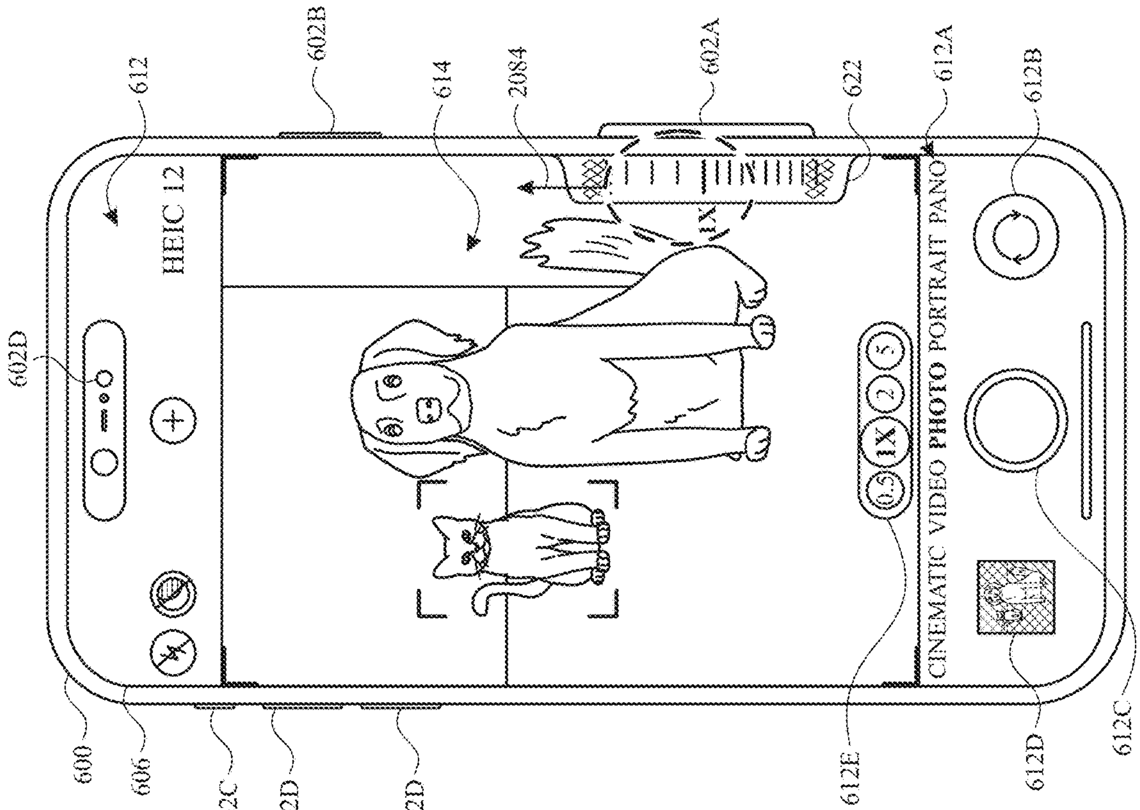
Figure 20A:
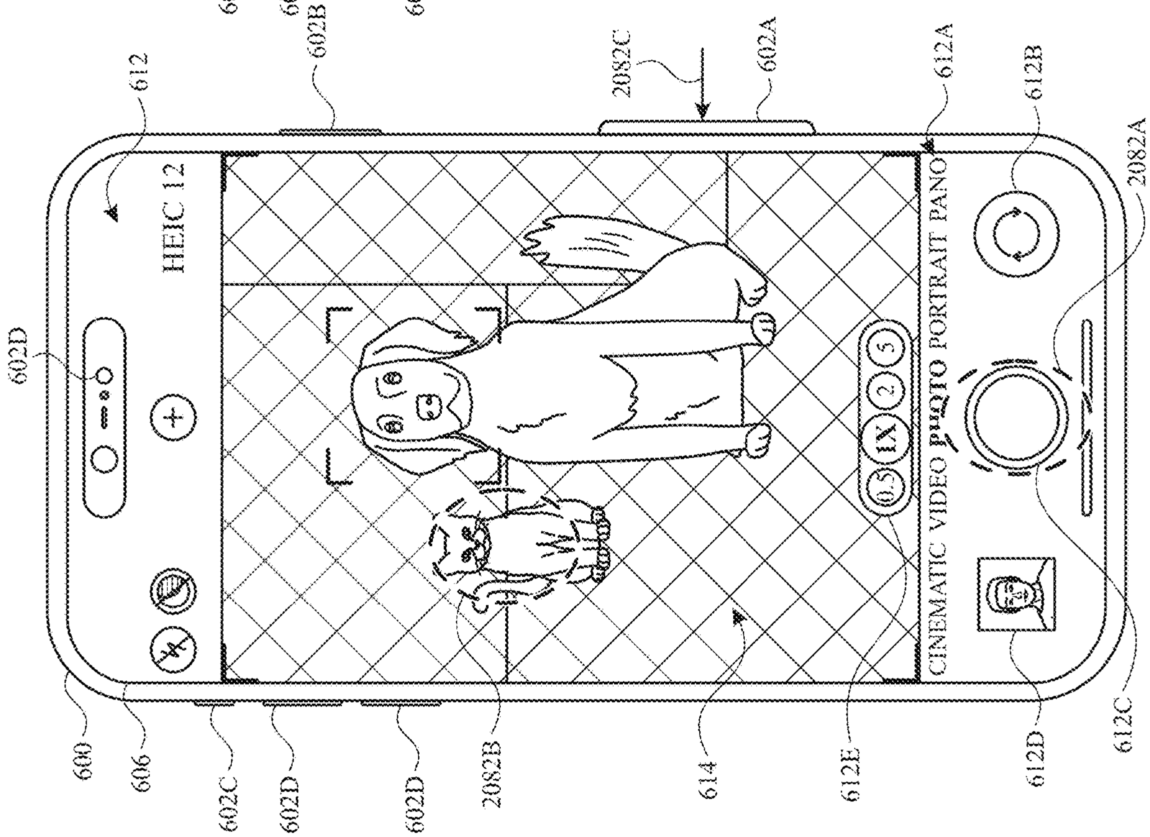
Figure 20A:
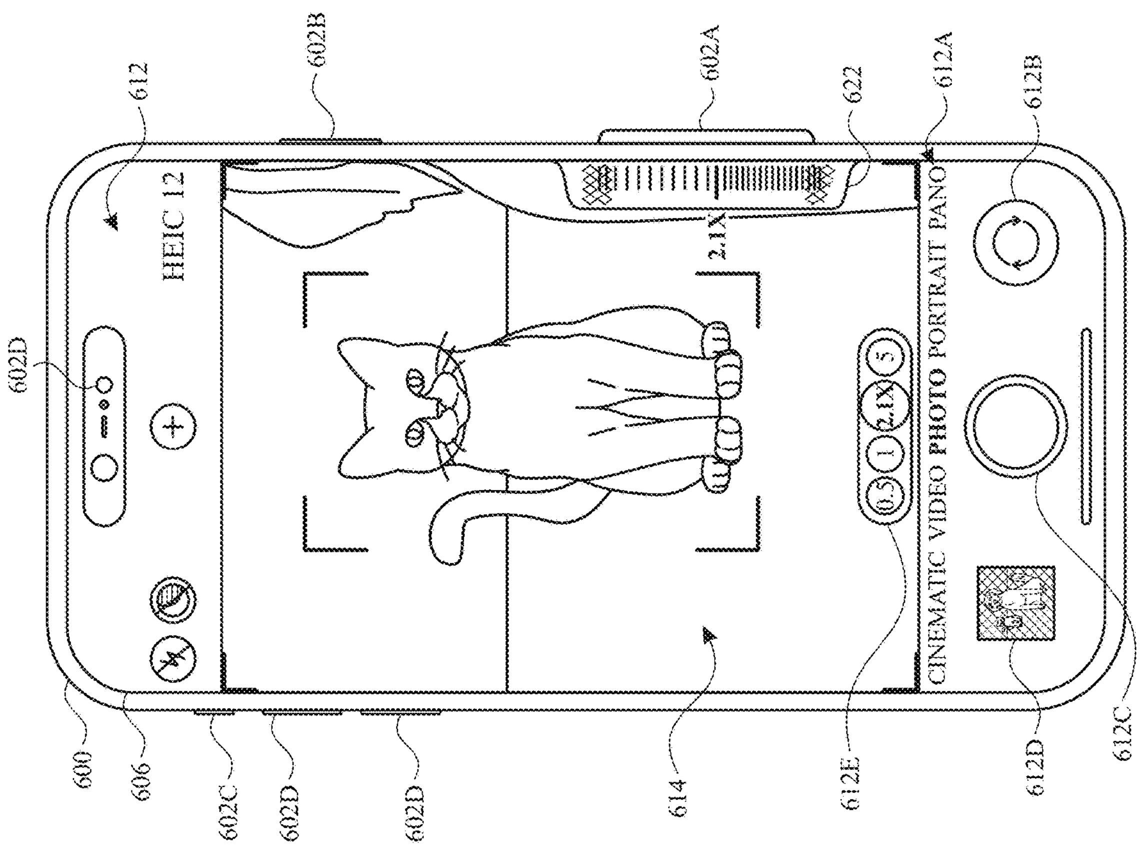
Figure 20A:
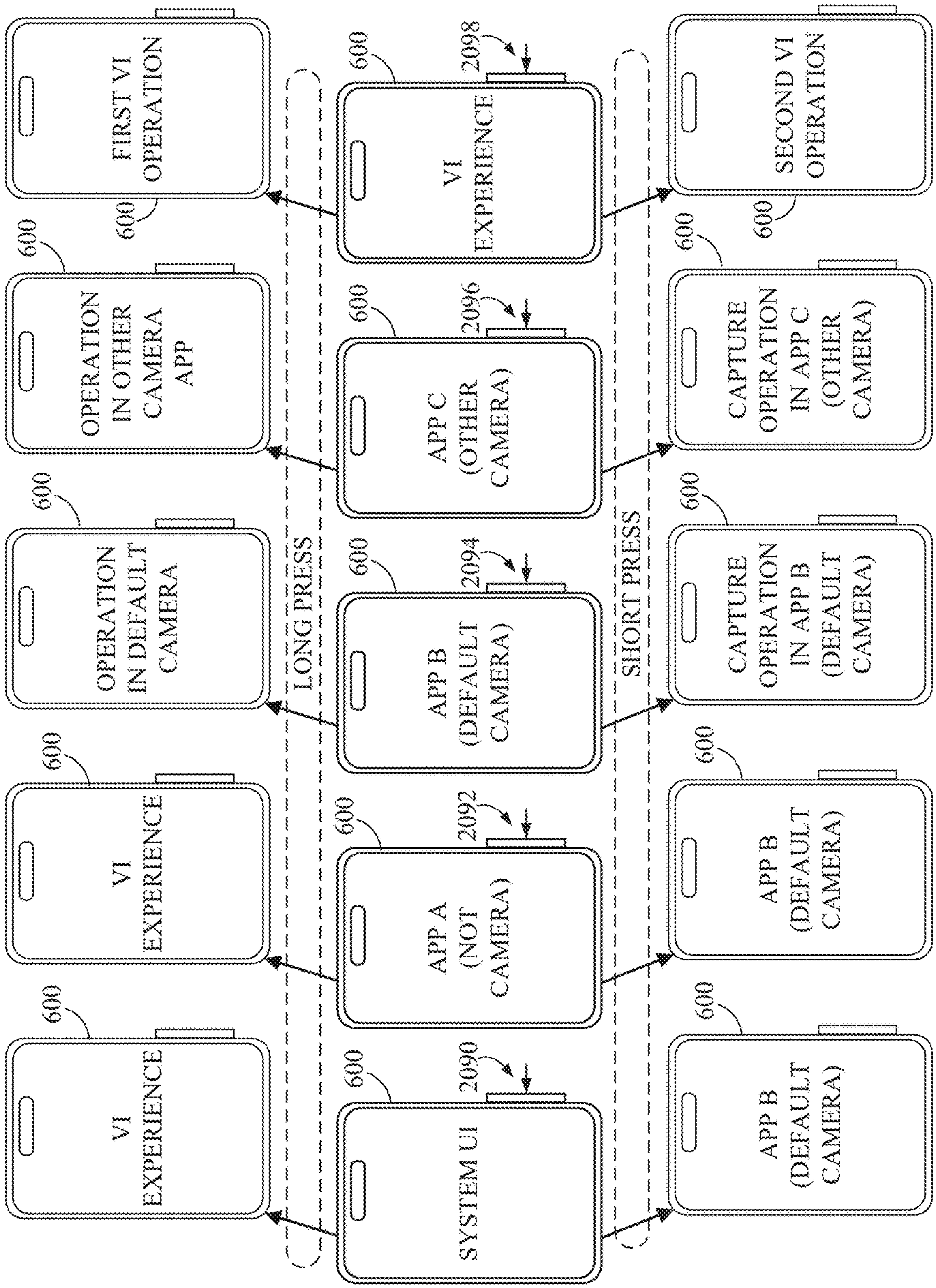

As illustrated in FIG. 20Y, while viewfinder 2004A is displayed in the live mode, the field-of-view of the cameras represented in viewfinder 2004A includes a math problem written in a notebook. Computer system 600 determines that the field-of-view of the environment currently represented in viewfinder 2004A includes a mixture of textual and symbolic content, types of content included in the base set of recognized content types. Accordingly, computer system 600 displays content option 2006J, a content-specific indication suggesting using the assistant service to analyze the contents of viewfinder 2004A. In response to input 2058A selecting content option 2006J and/or input 2058B selecting assistant option 2006A, computer system 600 initiates a process for interacting with the visual intelligence experience using the assistant service (e.g., as described above, including optionally displaying privacy user interface 2018 to request user permission to share the contents of viewfinder 2004A with the assistant service). As illustrated in FIG. 20Z, the assistant service generates a response based on the visual content of viewfinder 2004A (e.g., identifying the math problem included in the visual content to use as a prompt for response generation), which computer system 600 displays in dialog panel 2022A. As described with respect to FIGS. 20P-20R, the user can follow up with additional inputs to the assistant service using speech and/or text inputs.

At FIG. 20AA, while displaying viewfinder 2004A in the freeze frame mode as described with respect to FIGS. 20G-20T, computer system 600 detects one or more inputs such as input 2060A, an input directed to viewfinder control object 2004B, input 2060B, an input directed to viewfinder 2004A outside of the recognized content items (e.g., portions of viewfinder 2004A that do not include the dog, the cactus plant, or the sign), and/or input 2060C, one or more button press inputs directed to buttons 602A, 602B, 602C, and/or 602D. In some embodiments, input 2060C is a particular type of button input, such as a short press input (e.g., a press maintained for less than the long press duration threshold duration with at least a threshold intensity, such as a short light/partial press and/or a short hard/full press). For example, input 2060C and input 2008A (e.g., an input used to change viewfinder 2004A to the freeze frame mode, as described with respect to FIG. 20D) are the same type of input (e.g., the same type of press input is used to pause and un-pause viewfinder 2004A).

In response to detecting input 2060A, 2060B, and/or 2060C, at FIG. 20AB, computer system 600 changes viewfinder 2004A back to the live mode, displaying a live or near-live representation of the field-of-view of the one or more cameras. Accordingly, viewfinder 2004A updates to display the current field-of-view of the one or more cameras, which, at FIG. 20AB, includes the dog and a cat running into the frame. In response to detecting the animal-type content in viewfinder 2004A, computer system 600 displays content option 2006C, the content-specific option for the dog, and content option 2006K, a content-specific indication for the cat. As illustrated in FIG. 20AB, in the live mode, computer system 600 displays the content-specific options at the top of viewfinder 2004A, for instance, moving content option 2006C back to the top from the spatially-distributed position where content option 2006C was displayed in the freeze frame mode. For example, if the user selected (e.g., via viewfinder control object 2004B) to freeze viewfinder 2004A as displayed at FIG. 20AB, content option 2006C would be moved to a different spatially-distributed position than illustrated in FIGS. 20G-20T (e.g., moving to the updated position of the dog within the frame).

At FIG. 20AB, while displaying viewfinder 2004A in the live mode with content options 2006C and 2006K, computer system 600 detects an input such as input 2064A, directed to content option 2006C, input 2064B, directed to the dog in viewfinder 2004A, and/or input 2064C, a speech input, "Tell me about the dog." In response to the input (e.g., 2064A, 2064B, and/or 2064C), at FIG. 20AC, computer system 600 displays content panel 2012C, which includes additional information about the dog (e.g., based on a determination that input 2064B and/or input 2064C corresponds to the dog pictured in viewfinder 2004A). Additionally, computer system 600 displays content option 2006L, a suggested follow-up action for searching for adoptable dogs (e.g., using an adoption finder application and/or web service). In some embodiments, instead of automatically switching viewfinder 2004A to the freeze frame mode in response to input 2064A, input 2064B, and/or input 2064C, computer system 600 keeps viewfinder 2004A in the live mode as illustrated in FIG. 20AC, continuing to update viewfinder 2004A with current camera information showing the cat fully entering the frame and sitting down.

While displaying content panel 2012C with the additional information about the dog, in some embodiments, in response to detecting an input such as input 2066A and/or input 2066B directed to the region of viewfinder 2004A outside of content panel 2012C, computer system 600 ceases displaying content panel 2012C (e.g., returning user interface 2004 to the appearance illustrated at FIG. 20AB). In some embodiments, in response to detecting an input such as input 2066B, which is specifically directed to the cat in viewfinder 2004A, computer system 600 updates content panel 2012C to include additional information about the cat (e.g., replacing the additional information about the dog) and/or provides a new content option for a follow-up suggestion based on the cat.

While displaying viewfinder 2004A in the live mode, viewfinder 2004A updates to show the field-of-view of the environment illustrated at FIG. 20AD. Based on the field-of-view illustrated at FIG. 20AD, a wide shot of an exterior scene with a building and vehicle, computer system 600 determines that viewfinder 2004A does not include specific recognized content. For example, computer system 600 determines that viewfinder 2004A does not include enough visual information to identify a specific location, to identify text and/or symbols, and/or to confidently identify any other content items of a type included in the set of base types. Accordingly, at FIG. 20AD, computer system 600 displays assistant option 2006A and search option 2006B, which are non-content specific options, but does not display any content-specific options (e.g., 2006C, 2006D, 2006E, and so forth).

At FIG. 20AE, in response to detecting input 2068A selecting assistant option 2006A, computer system 600 initiates the process for interacting with the visual intelligence experience using the assistant service (e.g., as described with respect to FIGS. 20J-20K, 20P-20R, and/or 20Y-20Z, including optionally displaying privacy user interface 2018 to gain user permission to use the assistant service). In some embodiments, because computer system 600 cannot identify (e.g., and/or cannot identify with sufficient confidence) content of one of the types included in the set of base types, computer system 600 provides the assistant service with one or more whole images to analyze, such as one or more frames captured and/or represented in viewfinder 2004A when input 2068A is detected. For example, the assistant service can analyze (e.g., using image and/or video processing techniques, such as machine vision and/or other machine learning processes) the whole of the scene shown in viewfinder 2004A to identify additional information about the scene (e.g., using the totality of visual features to identify the pictured location) and generate a response (e.g., providing guide information about popular activities at the pictured location). In response to input 2070, directed to the region of viewfinder 2004A outside dialog panel 2022A, text input field 2022B, and/or exit option 2022C, computer system 600 ceases displaying the user interface objects for interacting with the assistant service.

As illustrated in FIG. 20AE, in some embodiments, computer system 600 maintains viewfinder 2004A in the live mode while using the assistant service and/or visual search engine. In other embodiments, computer system 600 automatically switches viewfinder 2004A to the freeze frame mode in response to selections of assistant option 2006A and/or search option 2006B (e.g., whether or not viewfinder 2004A is automatically frozen in response to inputs directed to viewfinder 2004A and/or content-specific content options).

In response to detecting input 2068B, an input directed to camera selection option 2006C (e.g., as illustrated in FIG. 20AD), at FIG. 20AF, computer system 600 updates viewfinder 2004A to represent a field-of-view of fourth camera 604D, the rear (e.g., user-facing/selfie) camera, instead of the forward cameras (e.g., 604A, 604B, and/or 604C) used to capture the fields-of-view represented in viewfinder 2004A in the previous figures. As illustrated in FIG. 20AF, computer system 600 determines that the field-of-view of fourth camera 604D represented in viewfinder 2004A includes sunglasses, content of the personal effects type included in the base set of recognized content types, and displays content option 2006M corresponding to the sunglasses. In some embodiments, in response to an input such as 2072A, directed to the sunglasses in viewfinder 2004A while viewfinder 2004A is in the live mode, computer system 600 visually emphasizes the sunglasses in viewfinder 2004A (e.g., as described with respect to FIG. 20G) without automatically switching to the freeze frame mode (e.g., displaying "live" highlighting of recognized content items).

The user can thus interact with visual context captured using fourth camera 604D as described with respect to the previous figures. For example, using input 2072B, directed to assistant option 2006A, input 2072C, directed to search option 2006B, and/or input 2072D, directed to content option 2006M, computer system 600 provides additional information about the recognized content item as described above. As illustrated in FIG. 20AG, in response to input 2072C directed to search option 2006B, computer system 600 initiates a process for performing a search using the visual contents of viewfinder 2004A (e.g., as described with respect to FIG. 20L and, optionally, providing privacy user interface 2018 as described with respect to FIG. 20J). At FIG. 20AG, computer system 600 displays search result panel 2026, which includes search results with image and/or video content the same as and/or similar to the representation of the sunglasses displayed in viewfinder 2004A when input 2072C is detected. The user can interact with the search results in search result panel 2026, for example, selecting a result with input 2076A to view more information about the result within search result panel 2026 (e.g., without navigating away from the visual intelligence experience), swiping across the results with input 2076B to scroll or slide to additional search results, and/or selecting an application link to view the search results in another application, such as a web browser application (e.g., navigating away from the visual intelligence experience).

As illustrated in FIG. 20AG, while displaying user interface 2004 for the visual intelligence experience, computer system 600 detects a press input directed to at least one of the hardware buttons, such as input 2077A directed to first button 602A, input 2077B directed to second button 602B, input 2077B directed to third button 602C, and/or input 2077D directed to fourth button 602D. The press input (e.g., 2077A, 2077B, 2077C, and/or 2077D) is a particular type of input, such as a long press, short press, hard/full press, light/partial press, and/or combination of presses (e.g., a double press and/or other multiple press). In response to the press input (e.g., 2077A, 2077B, 2077C, and/or 2077D), at FIG. 10AH, computer system 600 closes user interface 2004 (e.g., ending the visual intelligence experience session). In some embodiments, computer system 600 returns to user interface 2000, the user interface displayed when user interface 2004 was first opened.

At FIG. 20AH, while displaying user interface 2000, the lock screen user interface, computer system 600 detects a press input directed to at least one of the hardware buttons, such as input 2078A directed to first button 602A, input 2078B directed to second button 602B, input 2078B directed to third button 602C, and/or input 2078D directed to fourth button 602D. The press input (e.g., 2078A, 2078B, 2078C, and/or 2078D) detected at FIG. 20AH is a different type of press input than the press input described with respect to FIG. 20A and used to launch user interface 2004 for the visual intelligence experience. For example, the press input detected at FIG. 20A is a long press (e.g., a press maintained for at least a threshold duration with at least a threshold intensity, such as a long light/partial press and/or a long hard/full press) and the press input detected at FIG. 20AH is a short press (e.g., a press that is released prior to the threshold duration). For example, the press input detected at FIG. 20A is a hard/full press and the press input detected at FIG. 20AH is a light/partial press. For example, the press input detected at FIG. 20A is directed to a first set of one or more hardware buttons and the press input detected at FIG. 20AH is directed to a different set of one or more hardware buttons. In some embodiments, the detected characteristics of the press input detected at FIG. 20A that launches the visual intelligence experience differ from the detected characteristics of the press input detected at FIG. 20AH in one or more other ways.

In response to detecting the press input (e.g., 2078A, 2078B, 2078C, and/or 2078D), at FIG. 20AI, computer system 600 displays camera user interface 612 (e.g., as initially described with respect to FIG. 6E). Alternatively, in response to detecting press input 2080, a press input of the same type as the press input detected at FIG. 20A, computer system 600 would once again launch the visual intelligence experience as described with respect to FIG. 20B.

Interacting with camera user interface 612 produces different results than those described above with respect to the visual intelligence experience. For example, in response to input 2082A, an input directed to shutter affordance 612C, computer system 600 captures media (e.g., photo and/or video media) using the one or more cameras, storing the captured media item in a media library of computer system 600 and updating captured media icon 612D as illustrated in FIG. 20AJ. In contrast, computer system 600 does not capture and store media items in the media library while displaying user interface 2004, for instance, discarding the visual content represented in viewfinder 2004A once it is no longer being used (e.g., displayed in viewfinder 2004A in the live mode, displayed as a freeze frame, being analyzed to recognize content, and/or being provided to the assistant service and/or visual search engine).

As another example, in response to input 2082B, an input directed to the cat in camera preview 614, at FIG. 20AJ, computer system 600 performs an auto-focus operation in camera user interface 612, modifying camera preview 614 so the cat appears in focus. In contrast to the inputs directed to viewfinder 2004A, input 2082B does not result in pausing or freezing camera preview 614, displaying additional information about and/or related to the cat (e.g., content option 2006M), selecting the cat as an active recognized content item to be used for analysis by other services (e.g., the assistant service and/or visual search engine), and/or visually emphasizing the cat with highlighting or other edge effects.

As another example, in contrast to input 2008A, the button press input described with respect to FIG. 20D that switches viewfinder 2004A to the freeze frame mode in the visual intelligence experience, input 2082C, a button press input detected while displaying camera user interface 612, does not result in pausing or freezing camera preview 614.

In some embodiments, as described with respect to FIGS. 6U-6V, 6Y-6AD, and 8A-8P, if input 2082C is a hard/full button press, computer system 600 captures and stores media in response to input 2082C. In some embodiments, as described with respect to FIGS. 6E-6J, if input 2082C is a light/partial button press, computer system 600 displays settings control 622 (e.g., for the camera setting currently associated with the hardware button, as described with respect to FIGS. 10D-10E).

As another example, in response to detecting input 2084, an input directed to settings control 622, computer system 600 adjusts the zoom level for media capture, including updating camera preview 614 to display the field-of-view of the environment at the selected zoom level (e.g., as described with respect to FIGS. 6L-6S and/or 14A-14Z). In contrast, in some embodiments, settings control 622 is not accessible while displaying user interface 2004 for the visual intelligence experience. In some embodiments, the zoom level of viewfinder 2004A cannot be adjusted in the same manner as camera preview 614 (e.g., viewfinder 2004A is displayed with a static magnification and/or is only adjustable to certain zoom levels and/or within a certain zoom range).

The foregoing figures describe using hardware button presses detected by hardware buttons 602A, 602B, 602C, and/or 602D to perform various different operations based on the detected characteristics of the hardware button presses and/or the current context of computer system 600. FIG. 20AL illustrates one embodiment of an overall input scheme for responding to button presses (e.g., press inputs detected via one or more of first button 602A, second button 602B, third button 602C, and/or fourth button 602D) based on the type of the press. FIG. 20AL illustrates responses to two different types of presses: a long press and a short press. For example, the long press described with respect to FIG. 20AL is a press maintained for at least a threshold duration with at least a threshold intensity, such as a hard/full press maintained for over 0.25 s, 0.5 s, 1 s, 1.5 s, 2 s, 5 s, or another threshold duration, and the short press described with respect to FIG. 20AL is a press that is not maintained for at least the threshold duration with at least the threshold intensity, such as a hard/full press that is released (e.g., that drops below the hard/full press threshold intensity) prior to reaching the threshold duration of time.

As illustrated in FIG. 20AL, in response to detecting a press input 2090 while computer system 600 is displaying a system user interface, such as a lock screen (e.g., user interface 2000), a home screen, a settings user interface, a control panel user interface, a power interface (e.g., 1626), and/or another user interface provided by an operating system of computer system 600, if press input 2090 is a short press, computer system 600 launches a camera user interface (e.g., camera user interface 612) for a default camera application (e.g., as described with respect to FIGS. 10A-10B), as described with respect to FIGS. 20AH-20AI. If press input 2090 is a long press, computer system 600 launches the visual intelligence experience (e.g., user interface 2004), as described with respect to FIGS. 20A-20B.

Likewise, in response to detecting press input 2092 while computer system 600 is displaying an application user interface for a non-camera application (e.g., 610, 1200, 1214, 1600, 1628, and/or 1630, as described with respect to FIGS. 6D, 12A, 12J, 16A, 160, and 16P, respectively), computer system 600 launches the camera user interface (e.g., camera user interface 612) for the default camera application (e.g., as described with respect to FIGS. 6D-6E and/or 10A-10B) if press input 2092 a short press, and launches the visual intelligence experience (e.g., user interface 2004) if press input 2092 is a long press.

In contrast, in response to detecting press input 2094 while computer system 600 is displaying (e.g., already displaying) the camera user interface for the default camera application (e.g., camera user interface 612), computer system 600 does not launch the visual intelligence experience (e.g., user interface 2004) if press input 2094 is a long press. Instead, if press input 2094 is a long press, computer system 600 performs a first operation specific to the default camera application, such as initiating capturing video media (e.g., as described with respect to FIGS. 6Y, 8C-8E, and/or 8H-8I). As illustrated in FIG. 20AL, if press input 2094 is a short press, computer system 600 performs a second, different operation specific to the default camera application, such as capturing photo media (e.g., as described with respect to FIGS. 6U-6V and/or 8A-8B) and/or ending an ongoing video media capture (e.g., as described with respect to FIGS. 6AD and/or 8O).

Likewise, in response to detecting press input 2096 while computer system 600 is displaying a camera user interface for an application other than the default camera application (e.g., camera application 1044 for a social media application, as described with respect to FIG. 10P), computer system 600 does not launch the visual intelligence experience (e.g., user interface 2004) if press input 2096 is a long press. Instead, if press input 2096 is a long press, computer system 600 performs a first operation specific to the non-default camera application, such as initiating a video capture (e.g., the same long-press operation as the default camera application) and/or another camera operation, such as applying a filter, capturing a looping multi-frame photo, and/or another operation defined by the developers of the non-default camera application. Additionally, while computer system 600 is displaying a camera user interface for an application other than the default camera application, computer system 600 does not launch the camera user interface for the default camera application (e.g., 612) if press input 2096 is a short press (e.g., as described with respect to FIGS. 10V-10W). Instead, if press input 2096 is a short press, computer system 600 performs a second, different operation, such as capturing photo media and/or ending an ongoing video media capture.

As illustrated in FIG. 20AL, in response to detecting press input 2098 while computer system 600 is displaying (e.g., already displaying) the visual intelligence experience, computer system 600 does not launch the camera user interface for the default camera application (e.g., 612) if press input 2098 is a short press. In some embodiments, button presses can be used to perform operations within the visual intelligence experience. For example, as described with respect to FIGS. 20D and 20AA, short button presses can be used to pause and/or resume the visual intelligence view (e.g., viewfinder 2004A). In some embodiments, a long press in the visual intelligence view performs the same operation as a short press (e.g., pausing and/or resuming viewfinder 2004A) and/or a different operation than a short press, such as invoking a digital assistant session within the visual intelligence experience.

FIG. 21 is a flow diagram illustrating method 2100 for controlling visual intelligence functionality of a computer system with one or more cameras, in accordance with some embodiments. The method is performed at a computer system (e.g., 100, 300, 500, 600, and/or 1000) that is in communication with one or more display generation components (e.g., 606) (e.g., a display controller; a touch-sensitive display system; a display (e.g., integrated and/or connected), a 3D display, a transparent display, a projector, and/or a heads-up display), one or more cameras (e.g., 604A, 604B, 604C, and/or 604D) (e.g., a rear (user-facing) camera and a forward (environment-facing) camera and/or a plurality of cameras with different lenses, such as a standard camera, a telephoto camera, and/or a wide-angle camera), and one or more input devices (e.g., 602A, 602B, 602C, and/or 602D) including a hardware input device (e.g., including one or more hardware buttons and/or surfaces, such as mechanical (e.g., physically depressible), solid-state, intensity-sensitive, and/or touch-sensitive (e.g., capacitive) buttons and/or surfaces). (in some embodiments, the computer system is optionally in communication with one or more sensors, such as camera sensors, optical sensors, depth sensors, capacitive sensors, intensity sensors, motion sensors, vibration sensors, and/or audio sensors). In some embodiments, the hardware input device is included in a plurality of input devices in communication with the computer system. In some embodiments, the hardware input device is separate from a touch-sensitive surface of the display generation component, e.g., a separate button outside of a touch screen. In some embodiments, the hardware button is a customizable button, as described with respect to FIGS. 10A-11B.

The computer system (e.g., 1000) detects (2102), via the hardware input device (and/or one or more other input devices of the computer system), a press input (e.g., 2002A, 2002B, 2002C, 2002D, 2078A, 2078B, 2078C, 2078D, and/or 2080). In response to detecting the press input (2104) and in accordance with a determination that the press input satisfies a first set of one or more criteria (e.g., 2002A, 2002B, 2002C, 2002D, and/or 2080), the computer system performs (2106) a first operation (e.g., as described with respect to FIGS. 20A-20B) (e.g., invoking a visual intelligence user interface, application, overlay, and/or system experience). In some embodiments, the set of one or more criteria includes a criterion satisfied by a particular type of press input, e.g., a long/held press and/or another type of press (e.g., a light/partial press, a hard/full press, a press with movement, and/or a combination of presses). In some embodiments, the set of one or more criteria includes a criterion satisfied when the press input is detected while the computer system is not displaying a respective user interface, e.g., a camera user interface and/or another specific user interface. For example, the press input is used to perform the first operation invoking the visual intelligence user interface from most user interfaces, but used to perform a media capture operation from a camera user interface.

Performing (2106) the first operation includes displaying (2108), via the one or more display generation components, a viewfinder user interface (e.g., 2004) including a representation of a field-of-view of (e.g., detected and/or captured by) the one or more cameras (e.g., 2004A) and displaying (2110), via the one or more display generation components, one or more indications (e.g., 2006A, 2006B, 2006C, 2006D, 2006E, 2006G, 2006G, 2006H, 2006I, 2006J, 2006K, 2006L, and/or 2006M) associated with the representation of the field-of-view of the one or more cameras (e.g., as described with respect to FIGS. 20B-20AG) (e.g., indications that provide information about the visible environment and/or options for interacting with the visible environment). In some embodiments, the representation of the field-of-view of the cameras includes a live- or near-live camera feed. In some embodiments, displaying the one or more indications associated with the representation of the field-of-view of the one or more cameras includes displaying a selectable user interface object that, when selected, performs an operation based on the representation of the field-of-view of the one or more cameras (e.g., identifying content, searching for identified content, and/or initiating an interaction (e.g., with a digital assistant) using the identified content as context). In some embodiments, the computer system displays the selectable user interface object whether or not a type of content included in a set of types of content (e.g., a set including at least the first type of content and the second type of content) is detected in the representation of the field-of-view of the one or more cameras.

Displaying (2110) the one or more indications associated with the representation of the field-of-view of the one or more cameras includes, in accordance with a determination (e.g., based on image and/or video processing such as machine vision and/or machine learning techniques performed by the computer system and/or a remote computer system) that the representation of the field-of-view of the one or more cameras (e.g., the displayed portion of the field-of-view of the one or more cameras) includes a first type of content (e.g., a particular recognized object, item, and/or feature and/or class of object, item, and/or feature, such as people, pets, plants, text, symbols, contact information, landmarks, and/or miscellaneous items), displaying (2112), in the viewfinder user interface, a first indication (e.g., a tag, label, badge, selectable user interface object, border effect, glow animation, and/or other visual element and/or effect) associated with the first type of content (e.g., as described with respect to FIGS. 20C-20D, 20W, 20Y, 20AB, and/or 20AF). In some embodiments, the first type of content is included in a set of types of content (e.g., recognized content categories). In some embodiments, in accordance with a determination that the representation of the field-of-view of the one or more cameras does not include the first type of content, the computer system foregoes displaying (e.g., or ceases displaying) the first indication. In some embodiments, after displaying the first indication of the first type of content detected in the feed of the field-of-view of the one or more cameras, in response to detecting that the feed of the field-of-view of the one or more cameras does not include (e.g., no longer includes) the first type of content, ceasing displaying the first indication. In some embodiments, the first indication includes a selectable user interface element. In some embodiments, in response to detecting a selection of the first indication, the computer system performs an operation corresponding to the first indication, e.g., displaying an expanded view of the indication, displaying a user interface (e.g., overlay or full-screen) related to the content, translating the content, and/or performing an action based on the content (e.g., calling a phone number identified from the content, retrieving information related to the content, saving a location of an object identified from the content, and/or interacting with a device identified from the content).

Displaying (2110) the one or more indications associated with the representation of the field-of-view of the one or more cameras includes, in accordance with a determination (e.g., based on image and/or video processing such as machine vision and/or machine learning techniques performed by the computer system and/or a remote computer system) that the representation of the field-of-view of the one or more cameras includes a second type of content that is different from the first type of content, displaying (2114), in the viewfinder user interface, a second indication (e.g., a tag, label, badge, selectable user interface object, border effect, glow animation, and/or other visual element and/or effect) associated with the second type of content that is different from the first indication (e.g., as described with respect to FIGS. 20C-20D, 20W, 20Y, 20AB, and/or 20AF). In some embodiments, the second type of content is included in the set of types of content. In some embodiments, in accordance with a determination that the representation of the field-of-view of the one or more cameras does not include the second type of content, the computer system foregoes displaying (e.g., or ceases displaying) the second indication. In some embodiments, the computer system displays both the first indication and the second indication (e.g., if both the first type of content and the second type of content are represented in the field-of-view of the one or more cameras). In some embodiments, in accordance with a determination that the representation of the field-of-view of the one or more cameras includes a respective type of content of the set of types of content (e.g., any of the included types of content), the computer system displays a respective indication associated with the respective type of content (e.g., the first indication, the second indication, and/or another content-specific indication). In some embodiments, in accordance with a determination that the representation of the field-of-view of the one or more cameras does not include a respective type of content of the set of types of content, the computer system foregoes displaying (e.g., or ceases displaying) an indication associated with the set of types of content (e.g., the computer system does not display the first indication, the second indication, or another content-specific indication). In some embodiments, the image and/or video processing (e.g., machine vision) models used to determine whether the representation of the field-of-view of the one or more cameras include machine vision and/or AI models such as algorithmic feature extraction models, deep learning models, artificial neural networks (e.g., convolutional and/or recurrent neural networks), and/or transformer models. For example, an algorithmic feature extraction model (such as optical character recognition for text detection) includes algorithms for edge detection, corner detection, segmentation, and/or endpointing. Using a hardware button press to launch a viewfinder user interface with automatically-displayed content indicators (e.g., a visual intelligence user interface with suggestion or information elements displayed based on subject matter identified from the field-of-view of one or more cameras) provides improved control of computer system functionality without cluttering the user interface with additional displayed controls, provides improved visual feedback to the user, and reduces the number of inputs needed to perform an operation, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras) and reduces the risk that transient visual context is missed. For example, a user can quickly and intuitively launch the viewfinder using a hardware button press and begin interacting with the viewfinder using the automatically-displayed content indicators, which provide the user with visual feedback about the viewfinder user interface (e.g., the content being viewed and the available functionality).

In some embodiments, the one or more indications associated with the representation of the field-of-view of the one or more cameras includes one or more selectable user interface objects (e.g., 2006A, 2006B, 2006C, 2006D, 2006E, 2006G, 2006G, 2006H, 2006I, 2006J, 2006K, 2006L, and/or 2006M) (e.g., displayed buttons, sliders, dials, menus, platters, input fields, and/or other interactive elements). In some embodiments, the first indication and/or the second indication are selectable user interface objects. In some embodiments, at least one of the one or more selectable user interface objects is displayed whether or not the first type of content, the second type of content, and/or another respective type of content is detected in the representation of the field-of-view of the one or more cameras (e.g., at least one selectable user interface object is a default and/or non-content specific option). In some embodiments, in response to detecting (e.g., via the hardware input device and/or one or more other input devices of the computer system) an input selecting a respective selectable user interface object (e.g., 2008C, 2008D, 2008E, 2008F, 2008G, 2010B, 2010C, 2010D, 2016B, 2016C, 2032A, 2032B, 2032C, 2032D, 2052, 2058A, 2058B, 2064A, 2064C, 2064D, 2068A, 2068B, 2072A, 2072B, and/or 2072D) the computer system performs a respective operation based on the representation of the field-of-view of the one or more cameras (e.g., based at least a portion of the field-of-view of the one or more cameras represented in the viewfinder when the input is detected and/or based on a portion of the field-of-view of the one or more cameras captured shortly before, during, and/or after detecting the input). For example, the computer system performs the respective operation using current visual context determined from the viewfinder, for example, based on image and/or video processing such as machine vision and/or machine learning techniques performed by the computer system and/or a remote computer system. In some embodiments, performing the respective operation based on the representation of the field-of-view of the one or more cameras includes performing the respective operation using camera data from the one or more cameras and/or performing the respective operation using content included in, identified from, and/or determined from the camera data from the one or more cameras. Displaying the viewfinder user interface with a selectable user interface object for performing an operation using visual information included (e.g., represented) in the viewfinder user interface reduces the number of inputs needed to perform the operation, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras) and reduces the risk that transient visual context is missed.

In some embodiments, while displaying the one or more indications associated with the representation of the field-of-view of the one or more cameras, the computer system detects a change to the representation of the field-of-view of the one or more cameras (e.g., as described with respect to FIGS. 20B-20D and/or 20AB-20AF). For example, the representation of the field-of-view changes when the environment captured by the one or more cameras changes and/or when the user changes the field-of-view of the one or more cameras (e.g., moving the cameras, changing which camera or cameras are being used, changing a zoom setting, and/or otherwise adjusting the capture). For example, the computer system detects the change to the representation of the field-of-view of the one or more cameras using the camera data and/or other sensor data, such as motion data, depth sensor data, and/or light sensor data. For example, the computer system detects the change to the representation of the field-of-view of the one or more cameras using the image and/or video processing techniques, such as machine vision and/or machine learning techniques performed by the computer system and/or a remote computer system. In some embodiments, in response to detecting the change to the representation of the field-of-view of the one or more cameras, the computer system updates the one or more indications associated with the representation of the field-of-view of the one or more cameras (e.g., as described with respect to FIGS. 20B-20D and/or 20AB-20AF). In some embodiments, updating the one or more indications includes adding one or more new indications, removing one or more previously-displayed indications, and/or updating one or more previously-displayed indications. In some embodiments, updating the one or more indications associated with the representation of the field-of-view of the one or more cameras includes, in accordance with a determination that the representation of the field-of-view of the one or more cameras includes the first type of content, displaying, in the viewfinder user interface, a third indication associated with the first type of content (e.g., as described with respect to FIGS. 20C-20D, 20AB-20AC, and/or 20AF). In some embodiments, the third indication is the first indication, e.g., the computer system continues displaying the first indication if the updated field-of-view of the one or more cameras still includes the content of the first type, and, in some embodiments, updates the first indication (e.g., moving, scaling, and/or changing the appearance of the first indication based on the change to the field-of-view). In some embodiments, the third indication is a different indication than the first indication. In some embodiments, in accordance with a determination that the representation of the field-of-view of the one or more cameras does not include the first type of content, the computer system foregoes displaying the third indication and/or ceases displaying the first indication (e.g., as described with respect to FIGS. 20AD-20AE). In some embodiments, updating the one or more indications associated with the representation of the field-of-view of the one or more cameras includes, in accordance with a determination that the representation of the field-of-view of the one or more cameras includes the second type of content, displaying, in the viewfinder user interface, a fourth indication associated with the second type of content. In some embodiments, the fourth indication is the second indication or a different indication. In some embodiments, in accordance with a determination that the representation of the field-of-view of the one or more cameras does not include the second type of content, the computer system foregoes displaying the fourth indication and/or ceases displaying the second indication (e.g., as described with respect to FIGS. 20AD-20AE). In some embodiments, in accordance with a determination that the representation of the field-of-view of the one or more cameras includes a respective type of content of the set of types of content (e.g., any of the included types of content), the computer system displays a respective indication associated with the respective type of content (e.g., the first indication, the second indication, and/or another a content-specific indication). Automatically updating the viewfinder user interface to include content indicators based on the current viewfinder field-of-view in response to detecting a change to the viewfinder field-of-view performs an operation when a set of conditions has been met without requiring further user input and provides improved visual feedback to the user, which reduces the power usage and improves the battery life of the computer system by enabling the user to use the device more quickly and efficiently. For example, without the user needing to provide additional inputs to request updates, the computer system provides current, relevant feedback to the user about the field-of-view.

In some embodiments, updating the one or more indications associated with the representation of the field-of-view of the one or more cameras includes maintaining display of at least one indication of the one or more indications (e.g., 2006A, 2006B, and/or, as described with respect to FIGS. 20C-20D, 2006C) (in some embodiments, without moving, scaling, and/or changing an appearance of the at least one indication). For example, the computer system displays the at least one indication while displaying the viewfinder user interface, whether or not the representation of the field-of-view of the one or more cameras includes a particular type of content (e.g., the at least one indication includes non-content specific indications, such as Search, Ask, and/or Chat buttons. In some embodiments, the at least one indication includes one or more selectable user interface objects, such as displayed buttons, sliders, dials, menus, platters, input fields, and/or other interactive elements. Maintaining display of at least one content indicator as the field-of-view of the viewfinder changes provides improved visual feedback to the user and reduces the number of inputs needed to perform an operation, which reduces the power usage and improves the battery life of the computer system by enabling the user to use the device more quickly and efficiently. For example, the continuity of the at least one content indicator assists the user with intuitively and efficiently interacting with the viewfinder user interface.

In some embodiments, a first portion of the representation of the field-of-view of the one or more cameras includes the first type of content, and displaying the first indication associated with the first type of content includes, in accordance with a determination that the first type of content is included a second portion of the representation of the field-of-view of the one or more cameras, different from the first portion of the representation of the field-of-view of the one or more cameras, includes the first type of content (e.g., multiple elements of the first type of content are detected in the viewfinder), displaying, via the one or more display generation components, an additional indication (e.g., 2006K) associated with the first type of content concurrently with the first indication (e.g., 2006C) associated with the first type of content (e.g., as illustrated in FIG. 20AB). For example, the first portion of the field-of-view includes a first element of the first type of content (e.g., a first animal, plant, portion of text, item of contact information, symbol, device, landmark, and/or other object or informational item detected in the field-of-view of the cameras), and the second portion of the field-of-view includes a second element of the same type of content. In some embodiments, in accordance with a determination that the representation of the field-of-view of the one or more cameras includes multiple different elements of a specific type of recognized content (e.g., two or more elements of the first type, the second type, or another respective type included in the set of types of content), the computer system displays multiple content-specific indicators, e.g., one (or more) for each element of the recognized content type. In some embodiments, the first indication and the additional indication have different appearances, locations, and/or contents. Displaying the viewfinder user interface with multiple content indicators if multiple elements of a recognized type of content are detected in the viewfinder performs an operation when a set of conditions has been met without requiring further user input, provides improved visual feedback to the user, and reduces the number of inputs needed to perform an operation, which reduces the power usage and improves the battery life of the computer system by enabling the user to use the device more quickly and efficiently. For example, the multiple content indicators provide the user with improved visual feedback about content recognized in the viewfinder and assist the user in interacting with a specific element of the recognized content without the need for additional disambiguating inputs (e.g., selecting between the multiple elements of the same type).

In some embodiments, displaying the one or more indications associated with the representation of the field-of-view of the one or more cameras includes, in accordance with a determination that the representation of the field-of-view of the one or more cameras includes the first type of content and the second type of content (e.g., multiple recognized types of content are detected in the viewfinder), concurrently displaying the first indication and the second indication (e.g., as illustrated in FIG. 20D). In some embodiments, in accordance with a determination that the representation of the field-of-view of the one or more cameras includes multiple different types of recognized content (e.g., two or more of the first type, the second type, and/or the other respective types included in the set of types of content), the computer system displays multiple content-specific indicators, e.g., one (or more) for the multiple types of recognized content. Displaying the viewfinder user interface with multiple content indicators if multiple different types of content are detected in the viewfinder performs an operation when a set of conditions has been met without requiring further user input and provides improved visual feedback to the user, which reduces the power usage and improves the battery life of the computer system by enabling the user to use the device more quickly and efficiently. For example, the multiple content indicators automatically provide the user with improved visual feedback about different types of content recognized in the viewfinder.

In some embodiments, while displaying the viewfinder user interface (e.g., 2004) in a first state (e.g., a live or near-live viewfinder mode), the computer system detects, via the one or more input devices, a first user input (e.g., 2008A, 2008B, 2008C, 2008D, 2008E, 2008F, 2008G, 2008H, 2052, 2058A, 2058B, 2064A, 2064B, 2064C, 2064D, 2064E, 2066B, 2068A, 2068B, 2072A, 2072B, 2072C, and/or 2072D) (e.g., a touch, press, gesture, air gesture, speech input, and/or other type of input), wherein displaying the viewfinder user interface in the first state includes updating (e.g., refreshing and/or advancing), based on current camera data received from the one or more cameras (e.g., camera data captured while displaying the viewfinder in the first state and/or updating the representation), the representation (e.g., 2004A) of the field-of-view of the one or more cameras (e.g., as illustrated in FIGS. 20B-20D, 20W, 20Y, and/or 20AB-20AF). For example, as camera data is received from the one or more cameras, the computer system successively updates the representation of the field-of-view of the one or more cameras based on the received camera data to provide a live- or near-live view of the field-of-view of the one or more cameras. In some embodiments, the computer system updates the representation of the field-of-view of the one or more cameras at a respective frame rate (e.g., a static or dynamic feed frame rate, such as 10 FPS, 30 FPS, 60 FPS, 120 FPS, and/or a frame rate dynamically selected based on the camera frame rates, display refresh rates, processing speed, and/or other context). In some embodiments, in response to detecting the first user input and in accordance with a determination that the first user input satisfies a second set of one or more criteria, the computer system displays, via the one or more display generation components, the viewfinder interface in a second state (e.g., a paused and/or frozen viewfinder mode), wherein displaying the viewfinder user interface in the second state includes foregoing updating the representation of the field-of-view of the one or more cameras (e.g., as illustrated in FIGS. 20E-20T, 20X, and/or 20Y). In some embodiments, while displaying the viewfinder user interface in the second state, the computer system continues displaying the one or more indications associated with the representation of the field-of-view of the one or more cameras. In some embodiments, while foregoing updating the representation of the field-of-view of the one or more cameras, the representation of the field-of-view of the one or more cameras includes a respective frame of camera data from the one or more cameras (e.g., a freeze frame), such as a frame captured and/or displayed in the viewfinder near in time to (e.g., shortly before, shortly after, or while) detecting the first user input. For example, the first user input freezes the viewfinder on content that was visible in the viewfinder when the user provided the first user input. In some embodiments, the second set of one or more criteria include criteria satisfied when the first user input is directed to a particular hardware input device (e.g., 602A-602D), user interface object (e.g., 2004B and/or 2006A-2006M), and/or portion of the viewfinder user interface (e.g., 2004A). In some embodiments, the second set of one or more criteria include criteria satisfied when the first user input has particular characteristics (e.g., intensity, movement, duration, and/or patterns). For example, the computer system pauses the viewfinder in response to an input directed to a pause user interface object, in response to an input selecting a particular subject displayed in the representation of the field-of-view of the one or more cameras, in response to a hard/full press of the first hardware input device, and/or in response to a double press of the first hardware input device. Pausing the viewfinder user interface in response to a particular user input performs an operation when a set of conditions has been met without requiring further user input and provides improved visual feedback to the user, which reduces the power usage and improves the battery life of the computer system by enabling the user to use the device more quickly and efficiently. Doing so also provides improved ergonomics of computer systems. For example, automatically pausing the viewfinder user interface allows users to view and interact with content in the viewfinder for a longer amount of time (e.g., without needing to hold the cameras in a certain way), which also reduces the power consumed updating the viewfinder when the user does not need a live- or near-live view.

In some embodiments, displaying the one or more indications associated with the representation of the field-of-view of the one or more cameras includes, while displaying the viewfinder user interface in the first state (e.g., a live or near-live viewfinder mode), displaying, via the one or more display generation components, the one or more indications associated with the representation of the field-of-view of the one or more cameras within a first region (e.g., as illustrated in FIGS. 20C-20D, 20W, 20Y, 20AB-20AC, and/or 20AF) (e.g., one or more regions of the viewfinder user interface and/or representation of the field-of-view of the one or more cameras). For example, in the live- or near-live view mode, the computer system displays the content indicators overlaying a portion of the top, middle, sides, and/or bottom of viewfinder user interface and/or the representation of the field-of-view of the one or more cameras. In some embodiments, as the contents of the viewfinder update in the live or near-live mode, the computer system updates the one or more indications while continuing to display them within the first region. In some embodiments, the computer system displays content-specific indicators (e.g., the first indication and/or second indication) within a first sub-region and displays non-content specific indicators (e.g., default options, such as Search and Ask) within a second, different sub-region. In some embodiments, displaying the one or more indications associated with the representation of the field-of-view of the one or more cameras includes, while displaying the viewfinder user interface in the second state (e.g., a paused and/or frozen viewfinder mode), displaying, via the one or more display generation components, a respective indication of the one or more indications at a respective location of the representation of the field-of-view of the one or more cameras (e.g., overlaying the viewfinder) outside of the first region (e.g., as illustrated in FIG. 20G). In some embodiments, the respective location of the representation of the field-of-view of the one or more cameras corresponds to a portion of the representation of the field-of-view that includes content associated with the respective indication, such as a location at or near the displayed location of recognized content. In some embodiments, while displaying the viewfinder user interface in the second state, the computer system displays multiple indications of the one or more indications at multiple locations of the representation of the field-of-view of the one or more cameras outside of the first region, wherein the multiple locations are spatially distributed (e.g., spaced apart) across the representation of the field-of-view of the one or more cameras. Changing the location of one or more content indicators when the viewfinder user interface is paused provides improved visual feedback to the user without cluttering the user interface, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras) and reduces the risk that transient visual context is missed. For example, the content indicators are arranged to avoid obscuring the viewfinder in the live- or near-live mode, and the content indicators are arranged to provide additional feedback and/or information about recognized content in the paused mode.

In some embodiments, displaying the one or more indications associated with the representation of the field-of-view of the one or more cameras includes, while displaying the viewfinder user interface in the first state (e.g., a live or near-live viewfinder mode), displaying, via the one or more display generation components, a respective (e.g., at least one) indication of the one or more indications associated with the representation of the field-of-view of the one or more cameras at a first size and including a first amount of information (e.g., 2006D, as illustrated in FIG. 20D). For example, while displaying the viewfinder user interface in the first (e.g., live- or near-live) state, the computer system displays a compact version of the respective indication. In some embodiments, displaying the one or more indications associated with the representation of the field-of-view of the one or more cameras includes, while displaying the viewfinder user interface in the second state (e.g., a paused and/or frozen viewfinder mode), displaying, via the one or more display generation components, the respective indication at a second size that is different from the first size and including a second amount of information that is different from the first amount of information (e.g., 2012A, as illustrated in FIG. 20H). In some embodiments, the second size is a larger size (e.g., in at least one dimension) than the first size and the second amount of information is a greater amount of information (e.g., including more detailed information, additional information, and/or additional types of information that were not included when displaying the respective indication at the first size). For example, while displaying the viewfinder user interface in the second (e.g., paused) state, the computer system displays an expanded view of the respective indication. In some embodiments, when pausing the viewfinder user interface, the computer system does not change the size or amount of information included in at least one indication of the one or more indications. For example, the computer system does not expand non-content specific indications (e.g., the default Search and Ask options) and/or only expands a top-ranked indication of a plurality of displayed indications. Changing the size and contents of one or more content indicators when the viewfinder user interface is paused provides improved visual feedback to the user without cluttering the user interface, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras) and reduces the risk that transient visual context is missed. For example, in the live- or near-live mode, the computer system provides smaller or less detailed content indicators to avoid obscuring the viewfinder, then automatically emphasizes and/or updates the content indicators to provide additional feedback and/or information about recognized content in the paused mode.

In some embodiments, displaying the viewfinder interface in the second state (e.g., a paused and/or frozen viewfinder mode) includes, in response to detecting the respective input (e.g., upon initially pausing the viewfinder), displaying, via the one or more display generation components, an animation overlaying the representation of the field-of-view of the one or more cameras (e.g., as illustrated in FIGS. 20E-20F) (e.g., an animation overlaying the freeze frame displayed while displaying the viewfinder interface in the second state and forgoing updating the representation of the field-of-view of the one or more cameras). For example, the animation includes a scanning animation, such as an effect that gradually spreads across the area of the representation of the field-of-view of the one or more cameras. Displaying an animation in the viewfinder upon pausing or freezing the view provides improved visual feedback to the user, which reduces the power usage and improves the battery life of the computer system by enabling the user to use the device more quickly and efficiently. For example, the animation provides the user with visual feedback in response to the respective input, confirming that the viewfinder is being paused in response to the respective input (e.g., as opposed to inadvertently freezing up).

In some embodiments, while displaying the viewfinder user interface in the first state (e.g., a live or near-live viewfinder mode), the computer system displays a respective selectable user interface object (e.g., 2004B) (e.g., a software pause button) that, when selected, causes the computer system to display the viewfinder user interface in the second state (e.g., as illustrated in FIGS. 20D-20G) (e.g., the second set of criteria is satisfied when the first user input includes a selection of the respective selectable user interface object). In some embodiments, the respective selectable user interface object is displayed with a set of one or more colors, and the animation overlaying the representation of the field-of-view of the one or more cameras includes the set of one or more colors (e.g., as illustrated in FIGS. 20E-20F). For example, while displaying the viewfinder user interface in the first (e.g., live- or near-live) state, the computer system displays a pause or freeze button bordered, highlighted, filled, and/or animated with a particular color palette. For example, the pause animation (e.g., scanning the viewfinder) shares a common color palette with the software pause button. Displaying the viewfinder pausing animation with a color palette shared with a software button that can be used to pause the viewfinder provides improved visual feedback to the user, which reduces the power usage and improves the battery life of the computer system by enabling the user to use the device more quickly and efficiently. For example, the animation provides the user with visual feedback in response to the respective input, confirming that the viewfinder is being paused in response to the respective input and indicating that pausing can be (or was) performed in response to a selection of the software pause button.

In some embodiments, displaying the animation overlaying the representation of the field-of-view of the one or more cameras includes displaying, via the one or more display generation components, a first animation at a first portion of the representation of the field-of-view of the one or more cameras that includes a respective type of content of a set of one or more types of content (e.g., one or more portions including elements of recognized content, such as the first type of content, the second type of content, and/or another type of content), and displaying, via the one or more display generation components, a second animation at a second portion of the representation of the field-of-view of the one or more cameras that does not include the respective type of content of the set of one or more types of content (e.g., one or more portions in which elements of recognized content are not detected, such as background portions), wherein the first animation is a different type of animation than the second animation (e.g., as illustrated in FIG. 20F). For example, the first animation includes animating an outline effect (e.g., an edge glow, keyline, and/or other border) bordering the first portion and a fill effect (e.g., an area glow, shimmer, and/or other area effect) within the first portion, and the second animation includes animating a raster scanning effect passing across the second portion. Animating different portions of the viewfinder user interface differently based on whether or not the portions include recognized content provides improved visual feedback to the user, which reduces the power usage and improves the battery life of the computer system by enabling the user to use the device more quickly and efficiently. For example, the animation provides the user with visual feedback in response to the respective input, confirming that the computer system has recognized content that the user can further interact with in the paused state.

In some embodiments, while displaying the viewfinder user interface in the second state (e.g., while paused on a respective freeze frame of camera data from the one or more cameras), the computer system detects, via the one or more input devices, a second user input (e.g., 2060A), and in response to detecting the second user input and in accordance with a determination that the second user input satisfies a third set of one or more criteria, the computer system displays, via the one or more display generation components, the viewfinder user interface in the first state, wherein displaying the viewfinder user interface in the first state includes updating (e.g., refreshing and/or advancing), based on the current camera data received from the one or more cameras (e.g., camera data captured while displaying the viewfinder in the first state and/or updating the representation), the representation of the field-of-view of the one or more cameras (e.g., as illustrated in FIG. 20AB) (e.g., at the respective frame rate). For example, the computer system un-pauses or un-freezes the viewfinder and returns to a live- or near-live viewfinder mode. In some embodiments, in response to detecting the second user input and in accordance with a determination that the second user input satisfies a third set of one or more criteria, the computer system ceases displaying the respective freeze frame of camera data, e.g., replacing the freeze frame with the live- or near-live camera feed. Resuming a live- or near-live camera feed within the viewfinder user interface in response to a particular user input performs an operation when a set of conditions has been met without requiring further user input and provides improved visual feedback to the user, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras) and reduces the risk that transient visual context is missed. For example, automatically un-pausing the viewfinder allows users to quickly view and interact with new visual context in the viewfinder.

In some embodiments, the second set of one or more criteria (e.g., the criteria for pausing the viewfinder) includes a criterion that is satisfied when the first user input is directed to a respective selectable user interface object (e.g., 2004B) while displaying the viewfinder user interface in the first state (e.g., as illustrated in FIG. 20D) (in some embodiments, while the respective selectable user interface is displayed with a first appearance, e.g., a pause viewfinder appearance), and the third set of one or more criteria includes a criterion that is satisfied when the second user input is directed to the respective selectable user interface object (e.g., 2004B) while displaying the viewfinder user interface in the second state (e.g., as illustrated in FIG. 20AA) (in some embodiments, while the respective selectable user interface is displayed with a second appearance, e.g., a resume viewfinder appearance). Providing a selectable user interface object (e.g., a software button) that can be used to pause and un-pause the viewfinder provides improved control of computer system functionality without cluttering the user interface with additional displayed controls, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras), reduces the risk that transient visual context is missed, and improves the ergonomies of computer systems. For example, the selectable user interface object provides an intuitive control for pausing and un-pausing the viewfinder without unnecessarily obscuring the viewfinder or requiring the user to move their fingers around to provide different inputs for pausing and un-pausing.

In some embodiments, displaying the one or more indications associated with the representation of the field-of-view of the one or more cameras includes displaying, via the one or more display generation components (in some embodiments, while displaying the viewfinder user interface in the second state), a respective indication associated with content included (e.g., detected and/or recognized) in a respective portion of the representation of the field-of-view of the one or more cameras, wherein the respective indication is displayed with an appearance (e.g., shape, size, fill effect, animation effect, and/or other visual characteristic) based on a spatial arrangement (e.g., shape and/or size) of the content included in the respective portion of the representation of the field-of-view of the one or more cameras (e.g., as illustrated in FIGS. 20F-20H, 20J-20K, 20M-20N, 20P-20T, 20AA, and/or 20AF). For example, the respective indication includes a border, fill, lighting effect, shading effect, animation, and/or other effect that visually emphasizes the recognized content with respect to other contents of the representation of the field-of-view of the one or more cameras, by increasing the visual prominence of the recognized content (e.g., displaying the recognized content with a border, glow, and/or shimmer animation) and/or decreasing the visual prominence of the other contents (e.g., darkening, fading, blurring, and/or otherwise deemphasizing background or unselected contents). In some embodiments, the computer system displays multiple indications with appearances based on the forms of content included in multiple respective portions of the representation of the field-of-view of the one or more cameras (e.g., outlining, highlighting, and/or visually emphasizing more than one element of recognized content). In some embodiments, the multiple indications have different appearances, for instance, using different visual emphasis for a selected content element than for unselected (but still recognized) content elements. Displaying content indicators based on the form (e.g., size and shape) of recognized content in the viewfinder provides improved visual feedback to the user without cluttering the user interface, which reduces the power usage and improves the battery life of the computer system by enabling the user to use the device more quickly and efficiently. For example, the form-based content indicators, such as borders and fill effects highlighting recognized content within the viewfinder, provide the user with feedback as to which portion or portions of the viewfinder have been recognized (e.g., and are being used as visual context) while still allowing the user to view the content within the viewfinder.

In some embodiments, while displaying the one or more indications associated with the representation of the field-of-view of the one or more cameras, the computer system detects, via the one or more input devices, an input (e.g., 2008C, 2008D, 2008E, 2008F, 2008G, 2010B, 2010C, 2010D, 2014B, 2030B, 2032A, 2032B, 2032C, 2032D, 2052, 2064A, 2064D, 2064E, 2068A, 2068B, 2072B, 2072C, and/or 2072D) directed to a respective indication of the one or more indications (e.g., the first indication, the second indication, another content-specific indication, and/or a non-content specific indication, such as a Search or Ask button), wherein the respective indication is associated with a respective portion (e.g., some or all; in some embodiments, multiple portions) of the representation of the field-of-view of the one or more cameras. In some embodiments, in response to detecting the input directed to the respective indication of the one or more indications, the computer system displays, via the one or more display generation components, an expanded indication (e.g., 2012A, 2012B, 2012C, 2022A, 2026, 2034, and/or 2054), different from the respective indication, associated with the respective portion of the representation of the field-of-view of the one or more cameras (e.g., as illustrated in FIGS. 20H-20I, 20K-20L, 20N-20T, 20X, 20Z, 20AA, 20AC, 20AE, and/or 20AG). In some embodiments, the expanded indication is a different size than the respective indication, includes a different amount of information than the respective indication, differs in appearance from the respective indication, and/or differs in location from the respective indication. In some embodiments, the expanded indication replaces the respective indication (e.g., the respective indication morphs into the expanded indication when selected). For example, a content indication labeling an object expands into a panel with a longer description of the object when selected. In some embodiments, the expanded indication is displayed concurrently with the respective indication (e.g., the respective indication remains displayed after being selected). For example, a content indicator for searching the viewfinder content launches a search result panel (e.g., including search results based on some or all of the representation of the field-of-view of the one or more cameras) when selected. Displaying an expanded indicator for contents of the viewfinder in response to a selection of an initial indicator for the contents provides improved control of computer system functionality without cluttering the user interface with additional displayed controls and provides improved visual feedback to the user, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras). For example, the computer system initially displays smaller and/or less detailed content indicators to provide initial indications of available information and interactions while avoiding unnecessarily obscuring the viewfinder and/or distracting the user, and provides larger and/or more detailed content indicators by request.

In some embodiments, the respective indication of the one or more indications provides (e.g., initially provides) a first set of information (e.g., 2006C, 2006D, 2006E, and/or 2006I, as illustrated in FIGS. 20G and/or 20Y) (e.g., information associated with the respective portion of the representation of the field-of-view of the one or more cameras), and the expanded indication provides a second set of information (e.g., information associated with the respective portion of the representation of the field-of-view of the one or more cameras) that includes a greater amount of information than the first set of information (e.g., 2012A, 2012B, 2012C, and/or 2054 as illustrated in FIGS. 20H-20I, 20N, 20X, and/or 20AC). For example, the expanded indication provides information not provided by the respective indication, such as additional information, more detailed information, different information, and/or different types of information.

In some embodiments, in response to detecting the input directed to the respective indication of the one or more indications and in accordance with a determination that the respective portion of the representation of the field-of-view of the one or more cameras (e.g., the contents of the viewfinder associated with the respective indication and the expanded indication) includes a third type of content (in some embodiments, the third type of content is the same as or different from the first type of content and/or the second type of content), the computer system displays, via the one or more display generation components, a respective selectable user interface object (e.g., 2006F, 2006G, 2006H, and/or 2006L) (e.g., one or more buttons, sliders, dials, menus, platters, input fields, and/or other interactive elements) for performing a respective action (e.g., as illustrated in FIGS. 20N-200) (e.g., an action that is available for and/or recommended action the third type of content). In some embodiments, the expanded indication includes and/or is displayed concurrently with the respective selectable user interface object. In some embodiments, while displaying the respective selectable user interface object, the computer system detects a selection of the respective selectable user interface object, and in response to detecting the selection of the respective selectable user interface object, the computer system causes the respective action to be performed, e.g., based on the third type of content and/or the respective portion of the representation of the field-of-view of the one or more cameras. In some embodiments, in response to detecting the input directed to the respective indication of the one or more indications and in accordance with a determination that the respective portion of the representation of the field-of-view of the one or more cameras includes another type of content, the computer system displays, via the one or more display generation components, a selectable user interface object for performing a different action. In some embodiments, in response to detecting the input directed to the respective indication of the one or more indications and in accordance with a determination that the respective portion of the representation of the field-of-view of the one or more cameras does not include a type of content of a respective set of types of content, the computer system foregoes displaying a selectable user interface object for performing an action. Automatically providing controls for interacting with content in the viewfinder in response to a selection an initial indicator for the contents provides improved control of computer system functionality without cluttering the user interface with additional displayed controls, provides improved visual feedback to the user, and reduces the number of inputs needed to perform an operation, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras). For example, the computer system automatically surfaces controls for actions related to detected content in response to a selection of an indication of the detected content, providing the user with feedback on available, relevant interactions for the selected content when requested.

In some embodiments, the expanded indication (e.g., 2012A, 2012B, 2012C, 2022A, 2026, 2034, and/or 2054) associated with the respective portion of the representation of the field-of-view of the one or more cameras overlays (e.g., opaquely, translucently, and/or semi-transparently) at least a first portion of the representation of the field-of-view of the one or more cameras (e.g., as illustrated in FIGS. 20H-20L, 20N-20T, 20X, 20Z, 20AA, 20AC, 20AE, and/or 20AG) (e.g., the live- or near-live viewfinder or the paused/frozen viewfinder). In some embodiments, the expanded indication does not overlay at least one other portion of the representation of the field-of-view of the one or more cameras (e.g., the expanded indication does not overlay the entire viewfinder). Displaying the expanded content indicator overlaying the viewfinder provides improved visual feedback to the user, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras). For example, the user can access additional information from within the viewfinder user interface while retaining visibility of and/or being able to quickly return to the visual context of the viewfinder.

In some embodiments, the expanded indication (e.g., 2012A, 2012B, 2012C, 2022A, 2026, 2034, and/or 2054) associated with the respective portion of the representation of the field-of-view of the one or more cameras does not overlay at least a second portion of the representation of the field-of-view of the one or more cameras (e.g., the live- or near-live viewfinder or the paused/frozen viewfinder). In some embodiments, while displaying the expanded indication associated with the respective portion of the representation of the field-of-view of the one or more cameras, the computer system detects, via the one or more input devices, a respective user input (e.g., 2014A, 2016A, 2024A, 2028B, 2036C, 2046A, 2060B, 2066A, 2066B, and/or 2070) (e.g., a touch, press, gesture, and/or other type of input) directed to the second portion of the representation of the field-of-view of the one or more cameras. In some embodiment, in response to detecting the respective user input directed to the second portion of the representation of the field-of-view of the one or more cameras, the computer system ceases displaying, via the one or more display generation components, the expanded indication associated with the respective portion of the representation of the field-of-view of the one or more cameras (e.g., as illustrated in FIGS. 20L-20M). For example, the computer system closes and/or collapses the expanded indication in response to a tap on the viewfinder outside of the expanded indication. In some embodiments, in response to detecting the respective user input directed to the second portion of the representation of the field-of-view of the one or more cameras, the computer system re-displays the respective indication of the one or more indications. Dismissing an expanded indication overlaying the viewfinder in response to an input directed to the viewfinder outside of the overlay provides improved control of computer system functionality without cluttering the user interface with additional displayed controls, which reduces the power usage and improves the battery life of the computer system by enabling the user to use the device more quickly and efficiently. For example, the user can efficiently and intuitively dismiss the expanded indication without needing to seek out or navigate to a particular displayed affordance.

In some embodiments, while displaying the one or more indications associated with the representation of the field-of-view of the one or more cameras, the computer system detects, via the one or more input devices, an input (e.g., 2008F, 2008G, 2010B, 2010C, 2020B, 2032C, 2032D, 2058A, 2058B, 2064D, 2064E, 2068A, 2068B, 2072A, and/or 2072C) directed to a fifth indication (e.g., 2006A, 2006B, 2006J, and/or 2018B) of the one or more indications (e.g., the fifth indication is the first indication, second indication, third indication, fourth indication, another content-specific indication, a non-content specific indication such as a Search or Ask button, and/or a confirmation indication). In some embodiments, in response to detecting the input directed to the fifth indication of the one or more indications, the computer system obtains, from an external computer system (e.g., different from the computer system, such as an external device and/or remote server system), a result of a remote process (e.g., an image processing result, a visual search result, and/or generative AI content), wherein the result of the remote process is based on the representation of the field-of-view of the one or more cameras (e.g., the remote process analyzes, searches for, and/or generates content based on the contents of the viewfinder). In some embodiments, the computer system provides at least a portion of the representation of the field-of-view of the one or more cameras to the external computer system. In some embodiments, the computer system provides an output (e.g., 2022A and/or 2026) (e.g., a visual, audio, and/or tactile output) based on the result of the remote process (e.g., as described with respect to FIGS. 20J-20L, 20P-20R, 20Z, 20AE, and/or 20AG). For example, the remote process generates additional information about the contents of the viewfinder, and the computer system displays an output including the additional information in the viewfinder user interface. In some embodiments, the computer system presents the result (e.g., outputting search results and/or generative content received via the remote process) and/or uses the result as an intermediate result for further processing (e.g., identifying an object via the remote process and generating a further response based on the identification). Providing an output using a remote process to obtain additional information about the contents of the viewfinder in response to a selection of a content indicator reduces the number of inputs needed to perform an operation and provides improved security for operations performed using the viewfinder, which reduces the power usage and improves the battery life of the computer system by enabling the user to use the device more quickly and efficiently. For example, using a remote process to analyze, search for, and/or generate content based on the viewfinder allows users to efficiently obtain additional information from within the viewfinder (e.g., without needing to exit the viewfinder and/or manually invoke additional processes) while reducing the power usage and processing load on the computer system, and controlling the remote process using the content indicator provides the user with improved control over the security and privacy of camera data (e.g., only using the remote process when requested).

In some embodiments, while displaying the one or more indications associated with the representation of the field-of-view of the one or more cameras, the computer system detects, via the one or more input devices, an input (e.g., 2008F, 2008G, 2010B, 2010C, 2032C, 2032D, 2058B, 2064D, 2064E, 2068A, 2068B, 2072A, and/or 2072C) directed to a sixth indication (e.g., 2006A, 2006B, and/or 2006J) of the one or more indications, and in response to detecting the input and in accordance with a determination that a set of criteria is satisfied, displaying the fifth indication (e.g., 2018B, as illustrated in FIG. 20J) (e.g., an indication that enables acquisition of a result of a remote process based on the representation of the field-of-view of the one or more cameras). In some embodiments, the set of criteria is satisfied when the sixth indication is associated with the remote process. For example, the sixth indication is a Search, Ask, and/or Chat button (e.g., an option for an operation using a remote process), and/or the sixth indication is associated with a type of content (e.g., recognized content) for which the remote process can provide additional information and/or functionality. In some embodiments, the set of criteria includes a criterion that is met when the computer system requires additional confirmation and/or permission to use the remote process. For example, the sixth indication is associated with an operation using the remote process, and the fifth indication is an affordance in a confirmation user interface, e.g., seeking user permission to use the remove process and/or share camera data with the external computer system. Displaying a content indicator that can be used to control the remote process in response to a selection of another content indicator performs an operation when a set of conditions has been met without requiring further user input, provides improved control of computer system functionality without cluttering the user interface with additional displayed controls, and provides improved security for operations performed using the viewfinder, which reduces the power usage and improves the battery life of the computer system by enabling the user to use the device more quickly and efficiently. For example, the computer system conditionally displays the control indication when the remote process is relevant (e.g., when the remote process can provide additional information about contents of the viewfinder associated with the selected indication) and/or requires additional permissions to be performed (e.g., asking the user to approve use of the remote process and/or particular camera data), and does not display the control indication when the remote process is not relevant and/or available.

In some embodiments, while displaying the one or more indications associated with the representation of the field-of-view of the one or more cameras, the computer system detects, via the one or more input devices, an input (e.g., 2008C, 2008D, 2008E, 2010B, 2030B, 2032A, 2032B, 2052, 2064A, and/or 2072D) directed to a seventh indication of the one or more indications (e.g., 2006C-2006I and/or 2006K-2006M) (e.g., the seventh indication is the first indication, second indication, third indication, fourth indication, sixth indication, another content-specific indication, and/or a non-content specific indication, such as a Search or Ask button). In some embodiments, the seventh indication is displayed in response to detecting an input directed to the sixth indication, e.g., the fifth indication and seventh indication represent multiple options associated with the sixth indication. In some embodiments, in response to detecting the input directed to the seventh indication of the one or more indications, the computer system obtains a result of a second process that is different from the remote process, wherein the result of the second process is based on the representation of the field-of-view of the one or more cameras (e.g., the second process analyzes, searches for, and/or generates content based on the contents of the viewfinder), and provides (e.g., via one or more output devices such as the one or more display generation components or one or more speakers or haptic output devices) an output (e.g., 2012A, 2012B, and/or 2012C) (e.g., a visual, audio, and/or tactile output) based on the result of the second process (e.g., as illustrated in FIGS. 20H-20I, 20N, and/or 20AC). In some embodiments, the second process is a different remote process, e.g., another process executed by the external computer system and/or by another external computer system. In some embodiments, the second process is a local process, e.g., a process executed by the computer system. Displaying options for providing outputs using multiple different processes to obtain additional information about the contents of the viewfinder provides improved visual feedback to the user and provides improved security for operations performed using the viewfinder, which reduces the power usage and improves the battery life of the computer system by enabling the user to use the device more quickly and efficiently. For example, displaying the multiple options provides the user with feedback on the range of options available for analyzing, searching, and/or generating content based on the viewfinder contents, which also assists the user in managing the privacy of the camera data (e.g., by providing alternatives to the remote process, such as local processes and/or different remote processes).

In some embodiments, displaying the one or more indications associated with the representation of the field-of-view of the one or more cameras includes: in accordance with a determination that the representation of the field-of-view of the one or more cameras includes the first type of content, displaying, via the one or more display generation components, the fifth indication (e.g., 2006A, 2006B, 2006J, and/or 2018B) (e.g., for providing the output using the remote process) concurrently with the first indication (e.g., 2006C-2006I and/or 2006K-2006M) associated with the first type of content; and in accordance with a determination that the representation of the field-of-view of the one or more cameras includes the second type of content, displaying, via the one or more display generation components, the fifth indication (e.g., 2006A, 2006B, 2006J, and/or 2018B) (e.g., for providing the output using the remote process) concurrently with the second indication (e.g., 2006C-2006I and/or 2006K-2006M) associated with the second type of content. For example, the computer system provides the option to use the remote process to obtain additional information about the contents of the viewfinder for multiple different types of recognized content and/or when a particular type of content is not recognized. Displaying the option to provide an output using a remote process to obtain additional information about the contents of the viewfinder along with content-specific indicators provides improved visual feedback to the user, which reduces the power usage and improves the battery life of the computer system by enabling the user to use the device more quickly and efficiently. Doing so also assists the user with interacting with the computer system using visual inputa (e.g., context intelligently identified from the field-of-view of the one or more cameras). For example, the displayed indications provide the user with multiple types of feedback, indicating that the remote process can be used for multiple different types of recognized content and while also indicating content-specific options, assisting the user with using the variety of functionality available via the viewfinder user interface.

In some embodiments, obtaining the result of the remote process includes, in accordance with a determination that a first set of content criteria is satisfied, obtaining, from the external computer system, a first result of the remote process based on a first portion of the representation of the field-of-view of the one or more cameras (e.g., as illustrated in FIGS. 20K-20L, 20P-20R, and/or 20AG) (e.g., using the remote process to analyze, search for, and/or generate content based on a first object detected in the first portion of the viewfinder), wherein the first set of content criteria includes a criterion that is satisfied when the input (e.g., 2010C, 2010D, 2016B, 2016C, 2032C, 2032D, 2072B, and/or 2072C) directed to the fifth indication (e.g., 2006A, 2006B, 2006J, and/or 2018B) of the one or more indications was detected while displaying a selection indication (e.g., a label, badge, border, highlight, fill effect, and/or other visual indication) visually emphasizing the first portion of the representation of the field-of-view of the one or more cameras (e.g., as illustrated in FIGS. 20G, 20N, and/or 20AF) (e.g., while the first object detected in the first portion of the viewfinder is selected). In some embodiments, the selection indication is displayed with a greater visual prominence than one or more other indications of the one or more indications. For example, the selection indication is a bright highlight or border that visually emphasizes the currently-selected object, while a dimmer highlight is used to visually emphasize (to a lesser extent) objects that are not currently selected. In some embodiments, the computer system displays the selection indication associated with the first portion of the representation of the field-of-view of the one or more cameras in response to an input selecting the first portion of the representation of the field-of-view, such as an input directed to the first portion within the viewfinder and/or directed to a content indicator for content detected in the first portion. In some embodiments, the computer system displays the selection indication associated with the first portion of the representation of the field-of-view of the one or more cameras automatically, e.g., in accordance with a determination that the first portion includes a particular type of content and/or in response to detecting an input pausing/freezing the viewfinder. In some embodiments, in accordance with a determination that the first set of content criteria is satisfied, the computer system foregoes obtaining a result of the remote process based on one or more other portions of the representation of the field-of-view of the one or more cameras (e.g., the computer system uses the remote process to analyze, search for, and/or generate content based on only the first object detected in the first portion of the viewfinder). Using the remote process to provide additional information associated with a first object (e.g., element of recognized content) in the viewfinder user interface if the first object is currently selected performs an operation when a set of conditions has been met without requiring further user input and provides improved control of computer system functionality without cluttering the user interface with additional displayed controls, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras). For example, providing an output based on the selected object provides the user with targeted content without the user needing to input additional parameters and/or filter results to specify the first object.

In some embodiments, obtaining the result of the remote process includes, in accordance with a determination that a second set of content criteria is satisfied, obtaining, from the external computer system, a second result of the remote process (e.g., different from the first result of the remote process) based on a second portion, different from the first portion, of the representation of the field-of-view of the one or more cameras (e.g., as illustrated in FIGS. 20K-20L, 20P-20R, and/or 20AG) (e.g., using the remote process to analyze, search for, and/or generate content based on a second object detected in the second portion of the viewfinder), wherein the second set of content criteria includes a criterion that is satisfied when the input (e.g., 2010C, 2010D, 2016B, 2016C, 2032C, 2032D, 2072B, and/or 2072C) directed to the fifth indication (e.g., 2006A, 2006B, 2006J, and/or 2018B) of the one or more indications was detected while displaying the selection indication (e.g., a label, badge, border, highlight, fill effect, and/or other visual indication) visually emphasizing the second portion of the representation of the field-of-view of the one or more cameras (e.g., as illustrated in FIGS. 20G, 20N, and/or 20AF) (e.g., while the second object detected in the second portion of the viewfinder is selected). In some embodiments, the second portion of the representation of the field-of-view of the one or more cameras is emphasized relative to one or more other portions of the representation of the field-of-view of the one or more cameras (e.g., by changing a color, brightness of the second portion relative to one or more other portions and/or displaying a selection indication around at least some of the second portion). Using the remote process to provide additional information associated with a second object (e.g., element of recognized content) in the viewfinder user interface if the second object is currently selected performs an operation when a set of conditions has been met without requiring further user input and provides improved control of computer system functionality without cluttering the user interface with additional displayed controls, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras). For example, providing an output based on the selected object provides the user with targeted content without the user needing to input additional parameters and/or filter results to specify the second object.

In some embodiments, obtaining the result of the remote process includes, in accordance with a determination that the input (e.g., 2008F, 2008G, 2058A, 2058B, 2068A, and/or 2068B) directed to the fifth indication (e.g., 2006A, 2006B, 2006J, and/or 2018B) of the one or more indications was detected while the selection indication was not displayed (e.g., as illustrated in FIGS. 20D, 20Y, and/or 20AD) (e.g., while a particular object is not selected in the viewfinder), obtaining, from the external computer system, a third result of the remote process (e.g., different from the first result of the remote process and/or the second result of the remote process) based on a third portion of the representation of the field-of-view of the one or more cameras, wherein the third portion of the representation of the field-of-view of the one or more cameras includes the first portion and the second portion (e.g., and one or more other portions) of the representation of the field-of-view of the one or more cameras (e.g., as illustrated in FIGS. 20Z and/or 20AE). For example, if a particular object is not selected in the viewfinder, the remote process is performed using one or more full frames of the representation of the field-of-view of the one or more cameras (e.g., analyzing, searching for, and/or generating content based on the whole image(s), as opposed to only the parts of the image(s) that include the selected content). Using the remote process to provide additional information associated with the overall contents of the viewfinder if a specific object is not currently selected performs an operation when a set of conditions has been met without requiring further user input, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras). For example, if the computer system does not identify a particular object in the viewfinder and/or if the user does not select a particular object, the computer system will still provide additional information to the user via the remote process based on the whole viewfinder.

In some embodiments, providing the output based on the result of the remote process includes displaying, via the one or more display generation components, a user interface element (e.g., 2022A and/or 2026) including information based on the result of the remote process, wherein the user interface element overlays (e.g., opaquely, translucently, and/or semi-transparently) a respective portion of the representation of the field-of-view of the one or more cameras (e.g., as illustrated in FIGS. 20K-20L, 20P-20R, 20Z, 20AE, and/or 20AG) (e.g., the live- or near-live viewfinder or the paused/frozen viewfinder). In some embodiments, the user interface element does not overlay at least one other portion of the representation of the field-of-view of the one or more cameras (e.g., the user interface element does not overlay the entire viewfinder). Displaying the additional information associated with the contents of the viewfinder overlaying the viewfinder provides improved visual feedback to the user, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras). For example, the user can access additional information provided by the remote process from within the viewfinder user interface, while retaining visibility of and/or being able to quickly return to the visual context of the viewfinder.

In some embodiments, while displaying the user interface element including the information based on the result of the remote process (e.g., 2022A and/or 2026), the computer system detects, via the one or more display generation components, a respective user input (e.g., 2024A, 2028B, 2036C, and/or 2070) (e.g., a touch, press, gesture, and/or other type of input) directed to a location of the representation of the field-of-view of the one or more cameras outside of the respective portion, and in response to detecting the respective user input directed to the location of the representation of the field-of-view of the one or more cameras outside of the respective portion, the computer system ceases displaying, via the one or more display generation components, the user interface element including the information based on the result of the remote process (e.g., as illustrated in FIGS. 20L-20M). For example, the computer system closes and/or collapses the user interface element in response to a tap on the viewfinder outside of the user interface element. Dismissing the additional information from the remote process in response to an input directed to the viewfinder outside of the overlay provides improved control of computer system functionality without cluttering the user interface with additional displayed controls, which reduces the power usage and improves the battery life of the computer system by enabling the user to use the device more quickly and efficiently. For example, the user can efficiently and intuitively dismiss the additional information from the remote process without needing to seek out or navigate to a particular displayed affordance.

In some embodiments, in response to detecting the press input and in accordance with a determination that the press input satisfies a fourth set of one or more criteria, performing a second operation that is different from the first operation (e.g., as described with respect to FIG. 20AL). For example, the second operation includes opening a camera application and/or displaying a camera user interface, capturing and/or initiating capturing media via a camera user interface, displaying a user interface object (e.g., a menu, dial, slider, platter, and/or other interactive element) for selecting an operation to associate with the hardware input device, displaying a user interface object for controlling an operation associated with the hardware input device, and/or performing another operation, such as described with respect to FIGS. 6A-11B and/or 14A-19. In some embodiments, the first set of one or more criteria includes a criterion that is satisfied when the press input includes a press of a first type (e.g., a press input with particular characteristics, such as a press of a particular duration (e.g., a long or short press), a press with particular intensity (e.g., a hard/full press or a light/partial press), and/or a particular combination of presses (e.g., a double or other multiple press)), and the fourth set of one or more criteria includes a criterion that is satisfied when the press input includes a press of a second type that is different from the first type (e.g., a press input with different particular characteristics, such as a press of a different duration (e.g., a long or short press), a press with a different intensity (e.g., a hard/full press or a light/partial press), and/or a different combination of presses (e.g., a double or other multiple press)). Performing multiple different operations depending on the type of press input detected using a hardware input device (e.g., hardware button) performs an operation when a set of conditions has been met without requiring further user input, provides improved control of computer system functionality without cluttering the user interface with additional displayed controls, and reduces the number of inputs needed to perform an operation, which reduces the power usage and improves the battery life of the computer system by enabling the user to use the device more quickly and efficiently. For example, controlling multiple different operations using the same hardware input device reduces the number of display elements and/or inputs needed to access the available range of operations. Doing so also provides improved ergonomics of computer systems, for example, by expanding the operations available using a particular input device and reducing the need for users to move their hands back and forth between different user interface elements and/or input devices, which also reduces the overall number of hardware components needed for control (e.g., compared to mapping the first and second operation to different input devices), resulting in a more compact, lighter, and cheaper device.

In some embodiments, performing the second operation includes displaying, via the one or more display generation components, a media capture user interface (e.g., 612 and/or 1044) (e.g., as illustrated in FIGS. 6D-6E and/or as described with respect to FIGS. 11A-11B and/or 20AL) (e.g., for a camera application, e.g., as described with respect to FIGS. 6E and/or 10P). In some embodiments, the second set of one or more criteria includes a criterion that is satisfied when the press input is detected while the media capture user interface (e.g., a default camera user interface) is not displayed (e.g., the second type of press input opens the camera application if the camera application is not open and/or in focus). In some embodiments, the second set of one or more criteria includes a criterion that is satisfied when the press input is detected while a different media capture user interface (e.g., an alternative camera user interface) is not displayed (e.g., the second type of press input opens the camera application if no camera application (e.g., default or alternative) is open and/or in focus). Alternatively performing an operation opening the viewfinder user interface or an operation opening a camera user interface in response to different types of press inputs detected using the hardware input device (e.g., hardware button) performs an operation when a set of conditions has been met without requiring further user input, provides improved control of computer system functionality without cluttering the user interface with additional displayed controls and reduces the number of inputs needed to perform an operation, which reduces the power usage and improves the battery life of the computer system by enabling the user to use the device more quickly and efficiently. For example, accessing multiple different user interfaces using the same hardware input device reduces the number of display elements and/or inputs needed to use the viewfinder and camera functionality. Doing so also assists the user with interacting with the computer system using the one or more cameras and reduces the risk that transient visual context and/or media capture opportunities are missed.

In some embodiments, performing the second operation includes capturing (in some embodiments, initiating capturing), using the one or more cameras, a first media item (e.g., as described with respect to FIGS. 7A-7B, 11A-11B, and/or 20AL) (e.g., photo and/or video media). In some embodiments, the second set of one or more criteria includes a criterion that is satisfied when the press input is detected while the media capture user interface is displayed (e.g., the second type of press input performs a media capture operation if the camera application is in focus). In some embodiments, capturing the first media item includes compiling, encoding, and/or storing the first media item, e.g., in a media library of the computer system. In some embodiments, the viewfinder user interface does not include an option for capturing media items (e.g., the live- or near-live camera feed and/or freeze frames displayed in the viewfinder user interface are not stored as media items). Alternatively performing an operation opening the viewfinder user interface or an operation capturing media in response to different press input conditions performs an operation when a set of conditions has been met without requiring further user input, provides improved control of computer system functionality without cluttering the user interface with additional displayed controls and reduces the number of inputs needed to perform an operation, which reduces the power usage and improves the battery life of the computer system by enabling the user to use the device more quickly and efficiently. Doing so also assists the user with interacting with the computer system using the one or more cameras and reduces the risk that transient visual context and/or media capture opportunities are missed.

In some embodiments, in response to detecting the press input and in accordance with a determination that the press input satisfies a fifth set of one or more criteria, the computer system performs a third operation that is different from the first operation and different from the second operation, wherein the fifth set of one or more criteria includes a criterion that is satisfied when the press input includes a press of a third type that is different from the first type and different from the second type. For example, the computer system performs the first operation (e.g., displaying the viewfinder user interface) in response to a long press, performs the second operation (e.g., displaying the media capture user interface) in response to a hard/full press, and performs the third operation (e.g., displaying a customization menu for the hardware button) in response to a double light/partial press (e.g., 1818C and/or 1820C), as described with respect to FIGS. 18J-18K).

In some embodiments, performing the third operation includes initiating an action selecting an operation from a plurality of candidate operations to associate with the hardware input device (e.g., as described with respect to FIGS. 10A-11B and/or 18J-18K). Alternatively performing an operation opening the viewfinder user interface or an operation customizing functionality of the hardware input device in response to different press input conditions performs an operation when a set of conditions has been met without requiring further user input, provides improved control of computer system functionality without cluttering the user interface with additional displayed controls and reduces the number of inputs needed to perform an operation, which reduces the power usage and improves the battery life of the computer system by enabling the user to use the device more quickly and efficiently. Doing so also provides improved ergonomics of computer systems, for example, by expanding the operations available using a particular input device and reducing the need for users to move their hands back and forth between different user interface elements and/or input devices, which also reduces the overall number of hardware components needed for control (e.g., compared to mapping the first and second operation to different input devices), resulting in a more compact, lighter, and cheaper device. For example, the hardware input device not only provides the user with multiple functions, but also the ability to customize those functions to access an even greater range of operations using a single input device.

In some embodiments, while displaying the viewfinder user interface (e.g., 2004) including the representation of the field-of-view of the one or more cameras (e.g., 2004A), the computer system detects, via the hardware input device, a second press input (e.g., 2008A, 2077A, 2077B, 2077C, and/or 2077D). In some embodiments, in response to detecting the second press input and in accordance with a determination that the press input satisfies the fourth set of one or more criteria (e.g., the set of criteria including the criterion that is satisfied when the press input includes a press of a second type that is different from the first type), the computer system performs the second operation that is different from the first operation (e.g., as illustrated in FIGS. 20E-20G and/or 20AH). In some embodiments, performing the second operation includes ceasing performing the first operation, e.g., ceasing to display some or all of the viewfinder user interface, including the representation of the field-of-view of the one or more cameras and the one or more indications associated with the representation of the field-of-view of the one or more cameras. Alternatively performing an operation opening the viewfinder user interface or performing a different operation from within the viewfinder user interface in response to different types of press inputs performs an operation when a set of conditions has been met without requiring further user input, provides improved control of computer system functionality without cluttering the user interface with additional displayed controls and reduces the number of inputs needed to perform an operation, which reduces the power usage and improves the battery life of the computer system by enabling the user to use the device more quickly and efficiently. Doing so also provides improved ergonomics of computer systems, for example, by expanding the operations available using a particular input device and reducing the need for users to move their hands back and forth between different user interface elements and/or input devices, which also reduces the overall number of hardware components needed for control (e.g., compared to mapping the first and second operation to different input devices), resulting in a more compact, lighter, and cheaper device.

In some embodiments, while displaying the one or more indications associated with the representation of the field-of-view of the one or more cameras including a respective indication (e.g., 2004D) (e.g., a sharing button), the computer system detects, via the one or more input devices, an input (e.g., 2042) selecting the respective indication (e.g., as illustrated in FIG. 20S). In some embodiments, in response to detecting the input selecting the respective indication, the computer system initiates a process for sharing (e.g., to another service, application, computer system, and/or user) respective information associated with at least a portion of the representation of the field-of-view of the one or more cameras (e.g., as illustrated in FIGS. 20T-20V) (e.g., text, metadata, links (e.g., application deep-links and/or web links), graphics, audio, and/or other information based on content identified from the viewfinder). For example, initiating the process for sharing the respective information includes displaying a user interface including one or more selectable user interface objects corresponding to options for sharing the respective information, such as selectable user interface objects for selecting the service, application, computer system, and/or user to send the respective information. Providing an option for sharing content detected (e.g., recognized) from the viewfinder user interface provides improved visual feedback to the user and assists the user with interacting with the computer system using visual inputs (e.g., context intelligently identified from the field-of-view of the one or more cameras), which reduces the power usage and improves the battery life of the computer system by enabling the user to use the device more quickly and efficiently. For example, the respective indication provides the user with feedback on additional interactions available for the viewfinder content.

In some embodiments, displaying the one or more indications associated with the representation of the field-of-view of the one or more cameras includes, in accordance with a determination that the viewfinder user interface is displayed in a respective state (in some embodiments, the second state, e.g., the paused and/or frozen viewfinder mode), displaying, via the one or more display generation components, the respective indication (e.g., 2004D) (e.g., the sharing button), wherein displaying the viewfinder user interface in the respective state includes foregoing updating the representation of the field-of-view of the one or more cameras (e.g., as illustrated in FIGS. 20W-20X). In some embodiments, in accordance with a determination that the viewfinder user interface is not displayed in the respective state, the computer system foregoes displaying the respective indication (e.g., the sharing button is only displayed while the viewfinder is paused/frozen). Displaying the respective indication for sharing content detected (e.g., recognized) from the viewfinder user interface performs an operation when a set of conditions has been met without requiring further user input and provides improved visual feedback to the user without cluttering the user interface, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras) and reduces the risk that transient visual context is missed. For example, the computer system does not display the respective indication in the viewfinder in the live- or near-live mode, reducing visual clutter and distraction from transient visual context, and automatically displays the respective indication in the viewfinder in the paused/frozen mode, surfacing additional the functionality to the user when relevant.

In some embodiments, displaying the viewfinder user interface including the representation of the field-of-view of the one or more cameras includes: in accordance with a determination that a first set of the one or more cameras (e.g., 604A, 604B, and/or 604C) is selected, displaying, via the one or more display generation components, a representation of a field-of-view of the first set of the one or more cameras (e.g., as illustrated in FIGS. 20B-20T and/or 20W-20AE) (in some embodiments, and foregoing displaying a representation of a field-of-view of one or more cameras not included in the first set, e.g., the second set of cameras); and in accordance with a determination that a second set of the one or more cameras (e.g., 604D), different from the first set of the one or more cameras, is selected, displaying, via the one or more display generation components, a representation of a field-of-view of the second set of the one or more cameras (e.g., as illustrated in FIGS. 20AF-20AG) (in some embodiments, and foregoing displaying a representation of a field-of-view of one or more cameras not included in the second set, e.g., the first set of cameras). In some embodiments, the first set of the one or more cameras includes one or more forward (e.g., environment-facing) cameras and the second set of one or more cameras includes one or more rear (e.g., user-facing cameras). In some embodiments, while displaying the viewfinder user interface including the representation of the field-of-view of the one or more cameras (in some embodiments, and in accordance with a determination that the viewfinder user interface is displayed in a live- or near-live viewfinder mode, e.g., the first, unpaused state), the computer system displays, via the one or more display generation components, a respective selectable user interface object (e.g., 2004C); detects, via the one or more input devices, a respective user input (e.g., 2068B) directed to the respective selectable user interface object; and in response to detecting the respective user input directed to the respective selectable user interface object, selects (e.g., changing selection to) a respective set of the one or more cameras (e.g., as illustrated in FIGS. 20AD and 20AF). Providing an option for changing which camera(s) the viewfinder user interface uses provides improved visual feedback to the user and assists the user with interacting with the computer system using visual inputs (e.g., context intelligently identified from the field-of-view of the one or more cameras), which reduces the power usage and improves the battery life of the computer system by enabling the user to use the device more quickly and efficiently. For example, the respective selectable user interface object indicates the availability of different sets of cameras for use in the viewfinder and allows the user to efficiently and intuitively control the viewfinder user interface to capture the desired visual context.

In some embodiments, the first type of content and the second type of content are included in a set of recognized content types, wherein the set of recognized content types comprises one or more of the following content types (e.g., and/or one or more sub-types and/or instances of the following content types): animal types (e.g., cats, dogs, birds, rodents, insects, fish, and/or other categories, species, and/or individual animals), plant types (e.g., trees, flowers, weeds, cacti, and/or other categories, species, and/or individual plants), text types (e.g., text in different languages, alphabets, and/or character sets), symbol types (e.g., traffic symbols, laundry symbols, warning symbols, and/or other types of symbols), and contact information types (e.g., phone numbers, email addresses, physical addresses, social media accounts, and/or other types of contact information). In some embodiments, displaying the one or more indications associated with the representation of the field-of-view of the one or more cameras includes, in accordance with a determination that the representation of the field-of-view of the one or more cameras includes a type of content of the set of recognized content types, the computer system displays, in the viewfinder, an indication associated with the type of content.

In some embodiments, while displaying the viewfinder user interface (e.g., 2004) including the representation of the field-of-view of the one or more cameras (e.g., 2004A), the computer system foregoes capturing media using the one or more cameras (e.g., foregoing compiling, encoding, and/or storing camera data as a media item (e.g., photo and/or video media item) in a media library of the computer system). In some embodiments, after displaying a portion of the representation of the field-of-view of the one or more cameras (e.g., in a live- or near-live mode and/or as a freeze frame), the computer system discards the camera data corresponding to the portion (e.g., upon updating the representation of the field-of-view of the one or more cameras to a new portion and/or after a predetermined duration of time, e.g., temporarily storing the camera data in a circular buffer before overwriting it with newly-received camera data).

In some embodiments, the computer system detects, via the one or more input devices, a respective user input (e.g., a touch, press, gesture, and/or other type of input) of a respective input type (e.g., an input directed to a particular location, hardware input device, and/or user interface object; an input with particular movement, intensity, and/or duration characteristics; and/or a particular combination of inputs). In some embodiments, in response to detecting the respective user input of the respective input type and in accordance with a determination that the respective user input of the respective input type is detected while displaying the viewfinder user interface (e.g., 2004) including the representation of the field-of-view of the one or more cameras (e.g., 2004A), the computer system performs (e.g., within the viewfinder user interface) a fourth operation (e.g., as described with respect to FIGS. 20B-20T and/or 20W-20AG) (e.g., switching between the live feed mode and freeze frame mode; selecting a recognized content item in the viewfinder; initiating an operation for interacting with an assistant service, visual search engine, and/or other remote service; and/or interacting with content-specific user interface elements within the visual intelligence experience). In some embodiments, in response to detecting the respective user input of the respective input type (e.g., 2082A, 2082B, 2082C, and/or 2084) and in accordance with a determination that the respective user input of the respective input type is detected while displaying a media capture user interface (e.g., 612 and/or 1044) that is different from the viewfinder user interface, the computer system performs (e.g., within the camera user interface) a fifth operation that is different from the fourth operation (e.g., as described with respect to FIGS. 20AI-20AK). For example, in the viewfinder user interface, a tap directed to a software button displayed at particular location on a touch-sensitive display causes the viewfinder user interface to enter or exit to a paused/frozen mode (e.g., switches the viewfinder user interface between the first and the second states), and in the media capture user interface, a tap directed to a software button displayed at the same location initiates a media capture operation (e.g., capturing photo and/or video media). For example, in the viewfinder user interface, a gesture directed to the representation of the field-of-view of the one or more cameras causes additional information about the representation of the field-of-view of the one or more cameras to be displayed (e.g., as described above), and in the media capture user interface, a gesture directed to a camera viewfinder initiates a focus selection operation (e.g., selecting a portion of a field-of-view of the one or more cameras to be selected as the focal point for capturing media). In some embodiments, in accordance with a determination that the respective user input of the respective input type is detected while displaying another user interface, the computer system performs a different operation than the fourth or fifth operations and/or foregoes performing an operation. Performing different operations in response to user inputs based on whether the viewfinder user interface or a media capture user interface is displayed performs an operation when a set of conditions has been met without requiring further user input and assists the user with interacting with the computer system using the one or more cameras, which reduces the power usage and improves the battery life of the computer system by enabling the user to use the device more quickly and efficiently. For example, providing different functionality in the viewfinder user interface and the media capture user interface assists the user with understanding and using the varying functionality of the different user interfaces.

In some embodiments, the computer system is further in communication with one or more audio sensor devices. In some embodiments, the computer system detects, via the one or more audio sensor devices, a speech input (e.g., 2024B, 2036, and/or 2038B) (e.g., a spoken utterance, such as a keyword, voice command, and/or natural-language utterance). In some embodiments, in response to detecting the speech input and in accordance with a determination that the speech input satisfies a set of speech input criteria, the computer system provides an output (e.g., 2022A) (e.g., an audio, visual, and/or tactile output) including information associated with the field-of-view of the one or more cameras, wherein the set of speech input criteria includes a criterion that is satisfied when the speech input includes a request associated with the field-of-view of the one or more cameras (e.g., as illustrated in FIGS. 20K and/or 20P-20R). In some embodiments, the computer system determines that the speech input includes a request associated with the field-of-view of the one or more cameras when the speech input corresponds to an intent to analyze, use, and/or interact with visual context (e.g., either generally and/or with respect to particular visual context, such as a recognized type of content). For example, speech inputs such as "look at this," "identify this plant," "what do you see?," and "add this number to my contacts" correspond to intents to analyze, use, and/or perform an action using the visual context. Providing additional information about the contents of the viewfinder in response to a speech input provides improved control of computer system functionality without cluttering the user interface with additional displayed controls, reduces the number of inputs needed to perform an operation, and performs an operation when a set of conditions has been met without requiring further user input, which reduces the power usage and improves the battery life of the computer system by enabling the user to use the device more quickly and efficiently. Doing so also assists the user with interacting with the computer system using visual inputs (e.g., context intelligently identified from the field-of-view of the one or more cameras) and reduces the risk that transient visual context is missed. For example, enabling speech inputs in certain conditions (e.g., when the viewfinder is open and/or when the user enables a speech input mode) allows users to intuitively interact with the viewfinder in less time, with fewer inputs, and/or using fewer display elements than, e.g., typing in a prompt or manually interacting via the user interface.

In some embodiments, the set of speech input criteria includes a criterion that is satisfied when the speech input is detected while displaying, via the one or more display generation components, the viewfinder user interface including the representation of the field-of-view of the one or more cameras. In some embodiments, in accordance with a determination that the speech input is detected while displaying a different user interface, the computer system outputs a different response to the speech input (e.g., a response that is not based on the representation of the field-of-view of the one or more cameras/visual context). In some embodiments, in accordance with a determination that the speech input is detected while displaying a different user interface, the computer system foregoes responding to the speech input (e.g., responses to speech inputs are disabled in certain contexts, such as while the user is participating in a communication session on the computer system and/or when the computer system is in a locked state). Providing additional information about the contents of the viewfinder in response to a speech input when the viewfinder user interface is displayed provides improved control of computer system functionality without cluttering the user interface with additional displayed controls, reduces the number of inputs needed to perform an operation, and performs an operation when a set of conditions has been met without requiring further user input, which reduces the power usage and improves the battery life of the computer system by enabling the user to use the device more quickly and efficiently. For example, the user can intuitively and efficiently interact with the viewfinder using speech inputs when the viewfinder is open, while allowing speech inputs to be used for other purposes in other contexts and/or refraining from responding to detected audio not intended to interact with the viewfinder (e.g., avoiding false positive responses to detected audio).

In some embodiments, the set of speech input criteria includes a criterion that is satisfied when the speech input is detected after detecting (e.g., via the hardware input device and/or another input device) a selection (e.g., a touch, press, gesture, air gesture, and/or other type of input) of a respective option (e.g., 2006A) (e.g., an option for enabling speech inputs and/or an option compatible with speech inputs) for the viewfinder user interface including the representation of the field-of-view of the one or more cameras. In some embodiments, the selection of the respective option includes an input invoking a digital assistant session, such as a press input of a type associated with the digital assistant directed to the hardware input device. In some embodiments, the selection of the respective option includes an input directed to a particular user interface object displayed in the viewfinder user interface that corresponds to an operation that can accept user prompts, such as a search, ask, and/or chat operation for which a user can input prompts via text, speech, and/or other inputs. Providing additional information about the contents of the viewfinder in response to a speech input when the viewfinder user interface is displayed provides improved control of computer system functionality without cluttering the user interface with additional displayed controls, reduces the number of inputs needed to perform an operation, and performs an operation when a set of conditions has been met without requiring further user input, which reduces the power usage and improves the battery life of the computer system by enabling the user to use the device more quickly and efficiently. For example, the user can intuitively and efficiently interact with the viewfinder using speech inputs when explicitly requested and/or performing operations compatible with speech inputs, while refraining from responding to other detected audio (e.g., avoiding false positive responses).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the customization of controls for particular users. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to better customize controls for particular users. Accordingly, use of such personal information data enables users to have calculated control of the customized controls. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of customization of controls for particular users, the present technology can be configured to allow users to select to "opt in" or "opt out" of participation in the collection of personal information data during registration for services or anytime thereafter. In another example, users can select not to provide mood-associated data for customization of controls for particular users. In yet another example, users can select to limit the length of time mood-associated data is maintained or entirely prohibit the development of a baseline mood profile. In another example, users can select whether to grant permission to provide camera data to one or more services use as context for generating responses. For example, as described above, systems can request user permission prior to providing camera data to other applications and/or services, including remote (e.g., server-based) services, machine vision services, and/or generative AI services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app. For instance, a user may be prompted to grant specific data sharing permission each time systems attempt to invoke and/or share camera data with another application and/or service.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be customized for users by inferring preferences based on non-personal information data or a bare minimum amount of personal information, such as the content being requested by the device associated with a user, other non-personal information available to the customization of controls for particular users, or publicly available information. As another example, rather than share camera data directly with other applications and/or services, systems can process the camera data using local and/or secure processes to extract limited and/or anonymized information (e.g., a text description of the camera data) to share instead.

What is claimed is:

1. A computer system configured to communicate with one or more display generation components and a first input device, comprising:
 one or more processors; and
 memory storing one or more programs configured to be executed by the one or more processors, the one or more programs including instructions for:
  detecting, via the first input device, a first set of one or more inputs directed to the first input device;
  in response to detecting the first set of one or more inputs:
   in accordance with a determination that the first set of one or more inputs satisfies a first set of criteria, performing a first operation, wherein the first set of criteria includes:
    a first criterion that is satisfied when the first set of one or more inputs includes a first input intensity that exceeds a first threshold intensity; and
    a second criterion that is satisfied when the first set of one or more inputs includes more than a threshold amount of movement in a respective direction; and
   in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity;

after performing the second operation, detecting, via the first input device, a respective movement input; and in response to detecting the respective movement input and in accordance with a determination that a lift-off event was not detected in between detecting the second input intensity that exceeds the second threshold intensity and detecting the respective movement input, performing the first operation based on the respective movement input.

2. The computer system of claim 1, wherein:

performing the first operation includes changing an operation setting to a respective value; and performing the second operation includes performing the second operation based on a current value of the operation setting, wherein, in accordance with a determination that the first set of one or more inputs satisfied the first set of criteria prior to satisfying the second set of criteria, the current value of the operation setting is the respective value.

3. The computer system of claim 1, wherein:

performing the first operation includes changing a media capture setting; and performing the second operation includes capturing media based on the media capture setting.

4. The computer system of claim 3, wherein the media capture setting includes a zoom setting for media capture.

5. The computer system of claim 3, wherein the media capture setting includes a filter setting for media capture.

6. The computer system of claim 3, wherein the media capture setting includes a simulated depth-of-field setting for media capture.

7. The computer system of claim 3, wherein the media capture setting includes a media capture type setting.

8. The computer system of claim 3, wherein the media capture setting includes a focus subject selection.

9. The computer system of claim 1, wherein performing the first operation includes selecting, based on one or more characteristics of the movement in the respective direction, a first settings value from an ordered sequence of settings values.

10. The computer system of claim 9, wherein selecting the first settings value from the ordered sequence of settings values includes simulating a transfer of momentum from the movement in the respective direction to a model of the ordered sequence of settings values.

11. The computer system of claim 1, wherein performing the first operation includes selecting, based on one or more characteristics of the movement in the respective direction, a second settings value from a predetermined set of settings values.

12. The computer system of claim 1, wherein the first set of criteria includes a fourth criterion that is satisfied when the second criterion is satisfied after the first criterion is satisfied.

13. The computer system of claim 1, the one or more programs further including instructions for:

after determining that the first set of one or more inputs satisfies the first criterion, detecting a first movement input included in the first set of one or more inputs, wherein the first movement input is detected while an input intensity of the first set of one or more inputs does not exceed the first threshold intensity; and in response to the first movement input, performing the first operation based on the first movement input.

14. The computer system of claim 1, the one or more programs further including instructions for:

after determining that the first set of one or more inputs satisfies the first criterion, detecting a third movement input; and in response to detecting the third movement input:

in accordance with a determination that a lift-off of the first set of one or more inputs was not detected prior to detecting the third movement input, performing the first operation based on the third movement input.

15. The computer system of claim 1, the one or more programs further including instructions for:

in response to detecting the respective movement input and in accordance with a determination that a lift-off event was detected in between detecting the second input intensity that exceeds the second threshold intensity and detecting the respective movement input, forgoing performing the first operation based on the respective movement input.

16. The computer system of claim 1, the one or more programs further including instructions for:

in accordance with a determination that the first set of one or more inputs satisfies a set of feedback criteria, providing a non-visual feedback output, wherein the set of feedback criteria includes the first criterion that is satisfied when the first set of one or more inputs includes the first input intensity that exceeds the first threshold intensity.

17. The computer system of claim 1, wherein the first input device includes a first hardware button.

18. The computer system of claim 1, wherein a first input element is activated based on the second input intensity exceeding a third intensity threshold, and performing the second operation includes:

in accordance with a determination that the first input element remains activated for at least a second threshold amount of time, capturing video media; and in accordance with a determination that the first input element remains activated for less than the second threshold amount of time, capturing photo media.

19. The computer system of claim 1, wherein the first set of criteria and the second set of criteria each include a requirement that is satisfied when the first set of one or more inputs is detected while the computer system is displaying, via the one or more display generation components, a camera user interface; and the one or more programs further including instructions for:

in response to detecting the first set of one or more inputs and in accordance with a determination that the first set of one or more inputs satisfies a set of launch criteria, displaying, via the one or more display generation components, a respective camera user interface, wherein the set of launch criteria includes a criterion that is satisfied when a first input element is activated while the computer system is not displaying, via the one or more display generation components, a camera user interface.

20. The computer system of claim 1, the one or more programs further including instructions for:

in response to detecting the first set of one or more inputs and in accordance with a determination that the first set of one or more inputs satisfies a fourth set of criteria, displaying, via the one or more display generation components, a second set of one or more user interface objects in a respective user interface, wherein the fourth set of criteria includes:

the first criterion that is satisfied when the first set of one or more inputs includes the first input intensity that exceeds the first threshold intensity; and a criterion that is satisfied when the first set of one or more inputs is detected while displaying, via the one or more display generation components, the respective user interface.

21. The computer system of claim 1, the one or more programs further including instructions for:

while displaying, via the one or more display generation components, a user interface object corresponding to the first operation, detecting a first tap input directed to the first input device; and:

in response to detecting the first tap input, performing the first operation based on the first tap input, wherein performing the first operation based on the first tap input includes:

in accordance with a determination that the first tap input is directed to a first region of the first input device, changing a current settings value from an initial settings value to a first updated settings value selected from a predetermined set of settings values; and in accordance with a determination that the first tap input is directed to a second region of the first input device that is different from the first region of the first input device, changing the current settings value from the initial settings value to a second updated settings value selected from the predetermined set of settings values, wherein the first updated settings value is different from the second updated settings value and a direction of change from the initial settings value to the first updated settings value is different from a direction of change from the initial settings value to the second updated settings value.

22. The computer system of claim 1, the one or more programs further including instructions for:

in response to detecting the first set of one or more inputs, displaying, via the one or more display generation components, an indication of one or more characteristics of the first set of one or more inputs.

23. The computer system of claim 22, wherein displaying the indication of one or more characteristics of the first set of one or more inputs includes:

in accordance with a determination that the first set of one or more inputs includes a contact at a first location of the first input device, displaying the indication with a first appearance; and in accordance with a determination that the first set of one or more inputs includes a contact at a second location, different from the first location, of the first input device, displaying the indication with a second appearance different from the first appearance.

24. The computer system of claim 22, wherein displaying the indication of one or more characteristics of the first set of one or more inputs includes:

in accordance with a determination that the first set of one or more inputs includes an input of a first input intensity, displaying the indication with a third appearance; and in accordance with a determination that the first set of one or more inputs includes an input of a second input intensity different from the first input intensity, displaying the indication with a fourth appearance different from the third appearance.

25. The computer system of claim 22, the one or more programs further including instructions for:

while displaying the indication of the one or more characteristics of the first set of one or more inputs, detecting a change to at least one of the one or more characteristics of the first set of one or more inputs; and in response to detecting the change to at least one of the one or more characteristics of the first set of one or more inputs, changing an appearance of the indication of the one or more characteristics of the first set of one or more inputs based on the change to the one or more characteristics of the first set of one or more inputs.

26. The computer system of claim 22, the one or more programs further including instructions for:

while displaying the indication of the one or more characteristics of the first set of one or more inputs, detecting that the first set of one or more inputs satisfies a fifth set of criteria, wherein the fifth set of criteria includes the first criterion that is satisfied when the first set of one or more inputs includes the first input intensity that exceeds the first threshold intensity; and in response to detecting that the first set of one or more inputs satisfies the fifth set of criteria, displaying the indication of the one or more characteristics of the first set of one or more inputs displaying a respective user interface object corresponding to the first operation in place of the indication of the one or more characteristics of the first set of one or more inputs.

27. The computer system of claim 1, the one or more programs further including instructions for:

in response to detecting the first set of one or more inputs:

in accordance with a determination that the first set of one or more inputs satisfies an sixth set of criteria, displaying, via the one or more display generation components, a user interface object corresponding to the first operation, wherein the sixth set of criteria includes the first criterion that is satisfied when the first set of one or more inputs includes the first input intensity that exceeds the first threshold intensity; and in accordance with a determination that the first set of one or more inputs satisfies a seventh set of criteria, performing the first operation, wherein:

performing the first operation includes adjusting the user interface object; and the seventh set of criteria includes a criterion that is satisfied when the first set of one or more inputs includes a respective type of input detected while displaying the user interface object corresponding to the first operation.

28. The computer system of claim 27, the one or more programs further including instructions for:

while the user interface object corresponding to the first operation is not displayed, detecting a respective input; and in response to detecting the respective input:

in accordance with a determination that the respective input includes more than a second threshold amount of movement in the respective direction, displaying, via the one or more display generation components, the user interface object corresponding to the first operation.

29. The computer system of claim 27, the one or more programs further including instructions for:

while displaying the user interface object corresponding to the first operation, detecting a lift-off event; and in response to detecting the lift-off event and in accordance with a determination that an input that satisfies an eighth set of criteria is not detected, via the first input device, within a threshold period of time after detecting the lift-off event, ceasing displaying the user interface object corresponding to the first operation.

30. The computer system of claim 27, wherein displaying the user interface object corresponding to the first operation includes:

in accordance with a determination that an orientation of the computer system is in a first state, displaying the user interface object at a first location within a respective user interface; and in accordance with a determination that the orientation of the computer system is in second state different from the first state, displaying the user interface object at a second location, different from the first location, within the respective user interface.

31. The computer system of claim 27, wherein displaying the user interface object corresponding to the first operation includes:

in accordance with a determination that an orientation of the computer system is in a first state, displaying one or more elements of the user interface object in a first display configuration; and in accordance with a determination that the orientation of the computer system is in a second state different from the first state, displaying the or more elements of the user interface object in a second display configuration, different from the first display configuration.

32. The computer system of claim 27, the one or more programs further including instructions for:

while displaying the user interface object corresponding to the first operation, detecting a third set of one or more inputs including an input directed to a display location of the user interface object; and in response to detecting the third set of one or more inputs, performing the first operation based on the input directed to the display location of the user interface object.

33. The computer system of claim 27, wherein displaying the user interface object corresponding to the first operation includes:

displaying one or more graphical elements of a plurality of graphical elements within a first display region, wherein displaying the one or more graphical elements of the plurality of graphical elements within the first display region includes:

distorting an appearance of the one or more graphical elements at a first portion of the first display region corresponding to a first edge of the first display region; and distorting an appearance of the one or more graphical elements at a second portion of the first display region, different from the first portion of the display region, corresponding to a second edge of the first display region different from the first edge of the display region.

34. The computer system of claim 1, the one or more programs further including instructions for:

while displaying a user interface object corresponding to the first operation, detecting a second set of one or more inputs; and in response to detecting the second set of one or more inputs and in accordance with a determination that the second set of one or more inputs corresponds to a request to dismiss the user interface object corresponding to the first operation, ceasing displaying the user interface object corresponding to the first operation.

35. The computer system of claim 1, wherein:

the first set of one or more inputs includes a first movement input, wherein the first movement input is more than the threshold amount of movement in the respective direction and the first movement input moves in a first direction; and performing the first operation includes:

in accordance with a determination that the first movement input is detected while an orientation of the computer system is in a first state, changing a current settings value from an initial settings value to a first updated settings value; and in accordance with a determination that the first movement input is detected while the orientation of the computer system is in a second state different from the first state, changing the current settings value from the initial settings value to a second updated settings value different from the second updated settings value, wherein a direction of change from the initial settings value to the first updated settings value is different from a direction of change from the initial settings value to the second updated settings value.

36. A computer system configured to communicate with one or more display generation components and a first input device, comprising:

one or more processors; and memory storing one or more programs configured to be executed by the one or more processors, the one or more programs including instructions for:

detecting, via the first input device, a first set of one or more inputs directed to the first input device; and in response to detecting the first set of one or more inputs:

in accordance with a determination that the first set of one or more inputs satisfies a first set of criteria, performing a first operation, wherein the first set of criteria includes:

a first criterion that is satisfied when the first set of one or more inputs includes a first input intensity that exceeds a first threshold intensity; and a second criterion that is satisfied when the first set of one or more inputs includes more than a threshold amount of movement in a respective direction; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity, wherein:

performing the first operation includes selecting, based on one or more characteristics of the movement in the respective direction, a first settings value from an ordered sequence of settings values;

the ordered sequence of settings values includes a subset of one or more preset values, and selecting, based on the one or more characteristics of the movement in the respective direction, the first settings value from the ordered sequence of settings values includes:

in accordance with a determination that the first set of one or more inputs satisfies a set of one or more drag criteria, selecting the first settings value from the ordered sequence of settings values based on a direction of the movement in the respective direction and an amount of the movement of the first type, wherein the set of one or more drag criteria includes a criterion that is satisfied when the first set of one or more inputs includes a contact that is maintained on the first input device; and in accordance with a determination that the first set of one or more inputs satisfies a set of one or more flick criteria, selecting the first settings value from the subset of one or more preset values based on a direction of the movement in the respective direction, wherein the set of one or more flick criteria includes:

a first flick criterion that is satisfied when the first set of one or more inputs ceases to be detected on the first input device; and a second flick criterion that is satisfied when the movement in the respective direction includes more than a second threshold amount of movement within a threshold period of time before the first flick criterion is satisfied.

37. A computer system configured to communicate with one or more display generation components and a first input device, comprising:

one or more processors; and memory storing one or more programs configured to be executed by the one or more processors, the one or more programs including instructions for:

detecting, via the first input device, a first set of one or more inputs directed to the first input device;

in response to detecting the first set of one or more inputs:

in accordance with a determination that the first set of one or more inputs satisfies a first set of criteria, performing a first operation, wherein the first set of criteria includes:

a first criterion that is satisfied when the first set of one or more inputs includes a first input intensity that exceeds a first threshold intensity; and a second criterion that is satisfied when the first set of one or more inputs includes more than a threshold amount of movement in a respective direction; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity; and after determining that the first set of one or more inputs satisfies the first criterion, detecting a lift-off of the first set of one or more inputs;

after detecting the lift-off of the first set of one or more inputs, detecting, via the first input device, a second movement input; and in response to detecting the second movement input:

in accordance with a determination that the second movement input was detected within a threshold period of time after detecting the lift-off of the first set of one or more inputs, performing the first operation based on the second movement input.

38. A computer system configured to communicate with one or more display generation components and a first input device, comprising:

one or more processors; and memory storing one or more programs configured to be executed by the one or more processors, the one or more programs including instructions for:

detecting, via the first input device, a first set of one or more inputs directed to the first input device; and in response to detecting the first set of one or more inputs:

in accordance with a determination that the first set of one or more inputs satisfies a first set of criteria, performing a first operation, wherein the first set of criteria includes:

a first criterion that is satisfied when the first set of one or more inputs includes a first input intensity that exceeds a first threshold intensity; and a second criterion that is satisfied when the first set of one or more inputs includes more than a threshold amount of movement in a respective direction;

in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity; and in accordance with a determination that the first set of one or more inputs satisfies a third set of criteria, ceasing displaying, via the one or more display generation components, a first set of one or more user interface objects, wherein the third set of criteria includes:

the first criterion that is satisfied when the first set of one or more inputs includes the first input intensity that exceeds the first threshold intensity; and a criterion that is satisfied when the first set of one or more inputs is detected while displaying, via the one or more display generation components, a user interface that includes the first set of one or more user interface objects.

39. A non-transitory computer-readable storage medium storing one or more programs configured to be executed by one or more processors of a computer system that is in communication with one or more display generation components and a first input device, the one or more programs including instructions for:

detecting, via the first input device, a first set of one or more inputs directed to the first input device;

in response to detecting the first set of one or more inputs:

in accordance with a determination that the first set of one or more inputs satisfies a first set of criteria, performing a first operation, wherein the first set of criteria includes:

a first criterion that is satisfied when the first set of one or more inputs includes a first input intensity that exceeds a first threshold intensity; and a second criterion that is satisfied when the first set of one or more inputs includes more than a threshold amount of movement in a respective direction; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity;

after performing the second operation, detecting, via the first input device, a respective movement input; and in response to detecting the respective movement input and in accordance with a determination that a lift-off event was not detected in between detecting the second input intensity that exceeds the second threshold intensity and detecting the respective movement input, performing the first operation based on the respective movement input.

40. The non-transitory computer-readable storage medium of claim 39, wherein:

performing the first operation includes changing a media capture setting; and performing the second operation includes capturing media based on the media capture setting.

41. The non-transitory computer-readable storage medium of claim 39, wherein performing the first operation includes selecting, based on one or more characteristics of the movement in the respective direction, a first settings value from an ordered sequence of settings values.

42. The non-transitory computer-readable storage medium of claim 39, the one or more programs further including instructions for:

after determining that the first set of one or more inputs satisfies the first criterion, detecting a third movement input; and in response to detecting the third movement input:

in accordance with a determination that a lift-off of the first set of one or more inputs was not detected prior to detecting the third movement input, performing the first operation based on the third movement input.

43. The non-transitory computer-readable storage medium of claim 39, the one or more programs further including instructions for:

in accordance with a determination that the first set of one or more inputs satisfies a set of feedback criteria, providing a non-visual feedback output, wherein the set of feedback criteria includes the first criterion that is satisfied when the first set of one or more inputs includes the first input intensity that exceeds the first threshold intensity.

44. The non-transitory computer-readable storage medium of claim 39, wherein the first set of criteria and the second set of criteria each include a requirement that is satisfied when the first set of one or more inputs is detected while the computer system is displaying, via the one or more display generation components, a camera user interface; and the one or more programs further including instructions for:

in response to detecting the first set of one or more inputs and in accordance with a determination that the first set of one or more inputs satisfies a set of launch criteria, displaying, via the one or more display generation components, a respective camera user interface, wherein the set of launch criteria includes a criterion that is satisfied when a first input element is activated while the computer system is not displaying, via the one or more display generation components, a camera user interface.

45. The non-transitory computer-readable storage medium of claim 39, the one or more programs further including instructions for:

in response to detecting the first set of one or more inputs and in accordance with a determination that the first set of one or more inputs satisfies a fourth set of criteria, displaying, via the one or more display generation components, a second set of one or more user interface objects in a respective user interface, wherein the fourth set of criteria includes:

the first criterion that is satisfied when the first set of one or more inputs includes the first input intensity that exceeds the first threshold intensity; and a criterion that is satisfied when the first set of one or more inputs is detected while displaying, via the one or more display generation components, the respective user interface.

46. The non-transitory computer-readable storage medium of claim 39, the one or more programs further including instructions for:

while displaying, via the one or more display generation components, a user interface object corresponding to the first operation, detecting a first tap input directed to the first input device; and:

in response to detecting the first tap input, performing the first operation based on the first tap input, wherein performing the first operation based on the first tap input includes:

in accordance with a determination that the first tap input is directed to a first region of the first input device, changing a current settings value from an initial settings value to a first updated settings value selected from a predetermined set of settings values; and in accordance with a determination that the first tap input is directed to a second region of the first input device that is different from the first region of the first input device, changing the current settings value from the initial settings value to a second updated settings value selected from the predetermined set of settings values, wherein the first updated settings value is different from the second updated settings value and a direction of change from the initial settings value to the first updated settings value is different from a direction of change from the initial settings value to the second updated settings value.

47. The non-transitory computer-readable storage medium of claim 39, the one or more programs further including instructions for:

in response to detecting the first set of one or more inputs:

in accordance with a determination that the first set of one or more inputs satisfies an sixth set of criteria, displaying, via the one or more display generation components, a user interface object corresponding to the first operation, wherein the sixth set of criteria includes the first criterion that is satisfied when the first set of one or more inputs includes the first input intensity that exceeds the first threshold intensity; and in accordance with a determination that the first set of one or more inputs satisfies a seventh set of criteria, performing the first operation, wherein:

performing the first operation includes adjusting the user interface object; and the seventh set of criteria includes a criterion that is satisfied when the first set of one or more inputs includes a respective type of input detected while displaying the user interface object corresponding to the first operation.

48. The non-transitory computer-readable storage medium of claim 47, the one or more programs further including instructions for:

while displaying the user interface object corresponding to the first operation, detecting a lift-off event; and in response to detecting the lift-off event and in accordance with a determination that an input that satisfies an eighth set of criteria is not detected, via the first input device, within a threshold period of time after detecting the lift-off event, ceasing displaying the user interface object corresponding to the first operation.

49. The non-transitory computer-readable storage medium of claim 39, wherein:

the first set of one or more inputs includes a first movement input, wherein the first movement input is more than the threshold amount of movement in the respective direction and the first movement input moves in a first direction; and performing the first operation includes:

in accordance with a determination that the first movement input is detected while an orientation of the computer system is in a first state, changing a current settings value from an initial settings value to a first updated settings value; and in accordance with a determination that the first movement input is detected while the orientation of the computer system is in a second state different from the first state, changing the current settings value from the initial settings value to a second updated settings value different from the second updated settings value, wherein a direction of change from the initial settings value to the first updated settings value is different from a direction of change from the initial settings value to the second updated settings value.

50. A method, comprising:

at a computer system that is in communication with one or more display generation components and a first input device:

detecting, via the first input device, a first set of one or more inputs directed to the first input device;

in response to detecting the first set of one or more inputs:

in accordance with a determination that the first set of one or more inputs satisfies a first set of criteria, performing a first operation, wherein the first set of criteria includes:

a first criterion that is satisfied when the first set of one or more inputs includes a first input intensity that exceeds a first threshold intensity; and a second criterion that is satisfied when the first set of one or more inputs includes more than a threshold amount of movement in a respective direction; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity;

after performing the second operation, detecting, via the first input device, a respective movement input; and in response to detecting the respective movement input and in accordance with a determination that a lift-off event was not detected in between detecting the second input intensity that exceeds the second threshold intensity and detecting the respective movement input, performing the first operation based on the respective movement input.

51. The method of claim 50, wherein:

performing the first operation includes changing a media capture setting; and performing the second operation includes capturing media based on the media capture setting.

52. The method of claim 50, wherein performing the first operation includes selecting, based on one or more characteristics of the movement in the respective direction, a first settings value from an ordered sequence of settings values.

53. The method of claim 50, further comprising:

after determining that the first set of one or more inputs satisfies the first criterion, detecting a third movement input; and in response to detecting the third movement input:

in accordance with a determination that a lift-off of the first set of one or more inputs was not detected prior to detecting the third movement input, performing the first operation based on the third movement input.

54. The method of claim 50, further comprising:

in accordance with a determination that the first set of one or more inputs satisfies a set of feedback criteria, providing a non-visual feedback output, wherein the set of feedback criteria includes the first criterion that is satisfied when the first set of one or more inputs includes the first input intensity that exceeds the first threshold intensity.

55. The method of claim 50, wherein the first set of criteria and the second set of criteria each include a requirement that is satisfied when the first set of one or more inputs is detected while the computer system is displaying, via the one or more display generation components, a camera user interface; and the method further comprising:

in response to detecting the first set of one or more inputs and in accordance with a determination that the first set of one or more inputs satisfies a set of launch criteria, displaying, via the one or more display generation components, a respective camera user interface, wherein the set of launch criteria includes a criterion that is satisfied when a first input element is activated while the computer system is not displaying, via the one or more display generation components, a camera user interface.

56. The method of claim 50, further comprising:

in response to detecting the first set of one or more inputs and in accordance with a determination that the first set of one or more inputs satisfies a fourth set of criteria, displaying, via the one or more display generation components, a second set of one or more user interface objects in a respective user interface, wherein the fourth set of criteria includes:

the first criterion that is satisfied when the first set of one or more inputs includes the first input intensity that exceeds the first threshold intensity; and a criterion that is satisfied when the first set of one or more inputs is detected while displaying, via the one or more display generation components, the respective user interface.

57. The method of claim 50, further comprising:

while displaying, via the one or more display generation components, a user interface object corresponding to the first operation, detecting a first tap input directed to the first input device; and:

in response to detecting the first tap input, performing the first operation based on the first tap input, wherein performing the first operation based on the first tap input includes:

in accordance with a determination that the first tap input is directed to a first region of the first input device, changing a current settings value from an initial settings value to a first updated settings value selected from a predetermined set of settings values; and in accordance with a determination that the first tap input is directed to a second region of the first input device that is different from the first region of the first input device, changing the current settings value from the initial settings value to a second updated settings value selected from the predetermined set of settings values, wherein the first updated settings value is different from the second updated settings value and a direction of change from the initial settings value to the first updated settings value is different from a direction of change from the initial settings value to the second updated settings value.

58. The method of claim 50, further comprising:

in response to detecting the first set of one or more inputs:

in accordance with a determination that the first set of one or more inputs satisfies an sixth set of criteria, displaying, via the one or more display generation components, a user interface object corresponding to the first operation, wherein the sixth set of criteria includes the first criterion that is satisfied when the first set of one or more inputs includes the first input intensity that exceeds the first threshold intensity; and in accordance with a determination that the first set of one or more inputs satisfies a seventh set of criteria, performing the first operation, wherein:

performing the first operation includes adjusting the user interface object; and the seventh set of criteria includes a criterion that is satisfied when the first set of one or more inputs includes a respective type of input detected while displaying the user interface object corresponding to the first operation.

59. The method of claim 58, further comprising:

while displaying the user interface object corresponding to the first operation, detecting a lift-off event; and in response to detecting the lift-off event and in accordance with a determination that an input that satisfies an eighth set of criteria is not detected, via the first input device, within a threshold period of time after detecting the lift-off event, ceasing displaying the user interface object corresponding to the first operation.

60. The method of claim 50, wherein:

the first set of one or more inputs includes a first movement input, wherein the first movement input is more than the threshold amount of movement in the respective direction and the first movement input moves in a first direction; and performing the first operation includes:

in accordance with a determination that the first movement input is detected while an orientation of the computer system is in a first state, changing a current settings value from an initial settings value to a first updated settings value; and in accordance with a determination that the first movement input is detected while the orientation of the computer system is in a second state different from the first state, changing the current settings value from the initial settings value to a second updated settings value different from the second updated settings value, wherein a direction of change from the initial settings value to the first updated settings value is different from a direction of change from the initial settings value to the second updated settings value.

61. A non-transitory computer-readable storage medium storing one or more programs configured to be executed by one or more processors of a computer system that is in communication with one or more display generation components and a first input device, the one or more programs including instructions for:

detecting, via the first input device, a first set of one or more inputs directed to the first input device; and in response to detecting the first set of one or more inputs:

in accordance with a determination that the first set of one or more inputs satisfies a first set of criteria, performing a first operation, wherein the first set of criteria includes:

a first criterion that is satisfied when the first set of one or more inputs includes a first input intensity that exceeds a first threshold intensity; and a second criterion that is satisfied when the first set of one or more inputs includes more than a threshold amount of movement in a respective direction; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity, wherein:

performing the first operation includes selecting, based on one or more characteristics of the movement in the respective direction, a first settings value from an ordered sequence of settings values;

the ordered sequence of settings values includes a subset of one or more preset values, and selecting, based on the one or more characteristics of the movement in the respective direction, the first settings value from the ordered sequence of settings values includes:

in accordance with a determination that the first set of one or more inputs satisfies a set of one or more drag criteria, selecting the first settings value from the ordered sequence of settings values based on a direction of the movement in the respective direction and an amount of the movement of the first type, wherein the set of one or more drag criteria includes a criterion that is satisfied when the first set of one or more inputs includes a contact that is maintained on the first input device; and in accordance with a determination that the first set of one or more inputs satisfies a set of one or more flick criteria, selecting the first settings value from the subset of one or more preset values based on a direction of the movement in the respective direction, wherein the set of one or more flick criteria includes:

a first flick criterion that is satisfied when the first set of one or more inputs ceases to be detected on the first input device; and a second flick criterion that is satisfied when the movement in the respective direction includes more than a second threshold amount of movement within a threshold period of time before the first flick criterion is satisfied.

62. A method, comprising:

at a computer system that is in communication with one or more display generation components and a first input device:

detecting, via the first input device, a first set of one or more inputs directed to the first input device; and in response to detecting the first set of one or more inputs:

in accordance with a determination that the first set of one or more inputs satisfies a first set of criteria, performing a first operation, wherein the first set of criteria includes:

a first criterion that is satisfied when the first set of one or more inputs includes a first input intensity that exceeds a first threshold intensity; and a second criterion that is satisfied when the first set of one or more inputs includes more than a threshold amount of movement in a respective direction; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity, wherein:

performing the first operation includes selecting, based on one or more characteristics of the movement in the respective direction, a first settings value from an ordered sequence of settings values;

the ordered sequence of settings values includes a subset of one or more preset values, and selecting, based on the one or more characteristics of the movement in the respective direction, the first settings value from the ordered sequence of settings values includes:

in accordance with a determination that the first set of one or more inputs satisfies a set of one or more drag criteria, selecting the first settings value from the ordered sequence of settings values based on a direction of the movement in the respective direction and an amount of the movement of the first type, wherein the set of one or more drag criteria includes a criterion that is satisfied when the first set of one or more inputs includes a contact that is maintained on the first input device; and in accordance with a determination that the first set of one or more inputs satisfies a set of one or more flick criteria, selecting the first settings value from the subset of one or more preset values based on a direction of the movement in the respective direction, wherein the set of one or more flick criteria includes:

a first flick criterion that is satisfied when the first set of one or more inputs ceases to be detected on the first input device; and a second flick criterion that is satisfied when the movement in the respective direction includes more than a second threshold amount of movement within a threshold period of time before the first flick criterion is satisfied.

63. A non-transitory computer-readable storage medium storing one or more programs configured to be executed by one or more processors of a computer system that is in communication with one or more display generation components and a first input device, the one or more programs including instructions for:

detecting, via the first input device, a first set of one or more inputs directed to the first input device;

in response to detecting the first set of one or more inputs:

in accordance with a determination that the first set of one or more inputs satisfies a first set of criteria, performing a first operation, wherein the first set of criteria includes:

a first criterion that is satisfied when the first set of one or more inputs includes a first input intensity that exceeds a first threshold intensity; and a second criterion that is satisfied when the first set of one or more inputs includes more than a threshold amount of movement in a respective direction; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity; and after determining that the first set of one or more inputs satisfies the first criterion, detecting a lift-off of the first set of one or more inputs;

after detecting the lift-off of the first set of one or more inputs, detecting, via the first input device, a second movement input; and in response to detecting the second movement input:

in accordance with a determination that the second movement input was detected within a threshold period of time after detecting the lift-off of the first set of one or more inputs, performing the first operation based on the second movement input.

64. A method, comprising:

at a computer system that is in communication with one or more display generation components and a first input device:

detecting, via the first input device, a first set of one or more inputs directed to the first input device;

in response to detecting the first set of one or more inputs:

in accordance with a determination that the first set of one or more inputs satisfies a first set of criteria, performing a first operation, wherein the first set of criteria includes:

a first criterion that is satisfied when the first set of one or more inputs includes a first input intensity that exceeds a first threshold intensity; and a second criterion that is satisfied when the first set of one or more inputs includes more than a threshold amount of movement in a respective direction; and in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity; and after determining that the first set of one or more inputs satisfies the first criterion, detecting a lift-off of the first set of one or more inputs;

after detecting the lift-off of the first set of one or more inputs, detecting, via the first input device, a second movement input; and in response to detecting the second movement input:

in accordance with a determination that the second movement input was detected within a threshold period of time after detecting the lift-off of the first set of one or more inputs, performing the first operation based on the second movement input.

65. A non-transitory computer-readable storage medium storing one or more programs configured to be executed by one or more processors of a computer system that is in communication with one or more display generation components and a first input device, the one or more programs including instructions for:

detecting, via the first input device, a first set of one or more inputs directed to the first input device; and in response to detecting the first set of one or more inputs:

in accordance with a determination that the first set of one or more inputs satisfies a first set of criteria, performing a first operation, wherein the first set of criteria includes:

a first criterion that is satisfied when the first set of one or more inputs includes a first input intensity that exceeds a first threshold intensity; and a second criterion that is satisfied when the first set of one or more inputs includes more than a threshold amount of movement in a respective direction;

in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity; and in accordance with a determination that the first set of one or more inputs satisfies a third set of criteria, ceasing displaying, via the one or more display generation components, a first set of one or more user interface objects, wherein the third set of criteria includes:

the first criterion that is satisfied when the first set of one or more inputs includes the first input intensity that exceeds the first threshold intensity; and a criterion that is satisfied when the first set of one or more inputs is detected while displaying, via the one or more display generation components, a user interface that includes the first set of one or more user interface objects.

66. A method, comprising:

at a computer system that is in communication with one or more display generation components and a first input device:

detecting, via the first input device, a first set of one or more inputs directed to the first input device; and in response to detecting the first set of one or more inputs:

in accordance with a determination that the first set of one or more inputs satisfies a first set of criteria, performing a first operation, wherein the first set of criteria includes:

a first criterion that is satisfied when the first set of one or more inputs includes a first input intensity that exceeds a first threshold intensity; and a second criterion that is satisfied when the first set of one or more inputs includes more than a threshold amount of movement in a respective direction;

in accordance with a determination that the first set of one or more inputs directed to the first input device satisfies a second set of criteria different from the first set of criteria, performing a second operation different from the first operation, wherein the second set of criteria includes a third criterion that is satisfied when the first set of one or more inputs includes a second input intensity that exceeds a second threshold intensity that is higher than the first threshold intensity; and in accordance with a determination that the first set of one or more inputs satisfies a third set of criteria, ceasing displaying, via the one or more display generation components, a first set of one or more user interface objects, wherein the third set of criteria includes:

the first criterion that is satisfied when the first set of one or more inputs includes the first input intensity that exceeds the first threshold intensity; and a criterion that is satisfied when the first set of one or more inputs is detected while displaying, via the one or more display generation components, a user interface that includes the first set of one or more user interface objects.

* * * * *